US007188282B2

(12) United States Patent
Walmsley

(10) Patent No.: US 7,188,282 B2

(45) Date of Patent: Mar. 6, 2007

(54) TAMPER RESISTANT SHADOW MEMORY

(75) Inventor: Simon Robert Walmsley, Balmain (AU)

(73) Assignee: Silverbrook Research Pty Ltd, Balmain (AU)

( * ) Notice: Subject to any disclaimer, the term of this patent is extended or adjusted under 35 U.S.C. 154(b) by 572 days.

(21) Appl. No.: 10/727,251

(22) Filed: Dec. 2, 2003

(65) Prior Publication Data

US 2004/0227205 A1 Nov. 18, 2004

(30) Foreign Application Priority Data

Dec. 2, 2002 (AU) .............................. 2002953134
Dec. 2, 2002 (AU) .............................. 2002953135

(51) Int. Cl.
*G11C 29/00* (2006.01)

(52) U.S. Cl. ....................... 714/718; 713/162; 713/176

(58) Field of Classification Search .................. 347/19; 713/500, 194, 162; 365/145; 726/36; 355/18; 705/51; 714/718
See application file for complete search history.

(56) References Cited

U.S. PATENT DOCUMENTS 6,199,969 B1 * 3/2001 Haflinger et al. ............. 347/19
6,334,190 B1 * 12/2001 Silverbrook et al. ........ 713/500
6,354,689 B1 3/2002 Couwenhoven et al.
6,371,590 B1 * 4/2002 Hah ............................ 347/19
6,473,331 B1 * 10/2002 Takashima .................. 365/145
6,745,331 B1 * 6/2004 Silverbrook ................ 365/145
6,757,832 B1 * 6/2004 Silverbrook et al. ........ 713/194
6,803,989 B2 * 10/2004 Silverbrook ................. 355/18
6,862,582 B2 * 3/2005 Harada et al. ................ 705/51
6,986,562 B2 * 1/2006 Silverbrook ................. 347/19
2002/0060707 A1 5/2002 Yu et al.

FOREIGN PATENT DOCUMENTS

| | | | |
|---|---|---|---|
| EP | 863004 | A2 | 9/1998 |
| EP | 974467 | A1 | 1/2000 |
| EP | 983855 | A2 | 3/2000 |
| EP | 1157840 | A2 | 11/2001 |
| WO | WO 1998/040222 | A1 | 9/1998 |
| WO | WO 1999/008875 | A1 | 2/1999 |

* cited by examiner

*Primary Examiner*—David Ton

(57) ABSTRACT

An integrated circuit comprising a processor and memory, the memory storing a set of data representing program code and/or an operating value, wherein each bit of the data is stored as a bit/inverse-bit pair in corresponding pairs of physically adjacent bit cells in the memory.

19 Claims, 331 Drawing Sheets

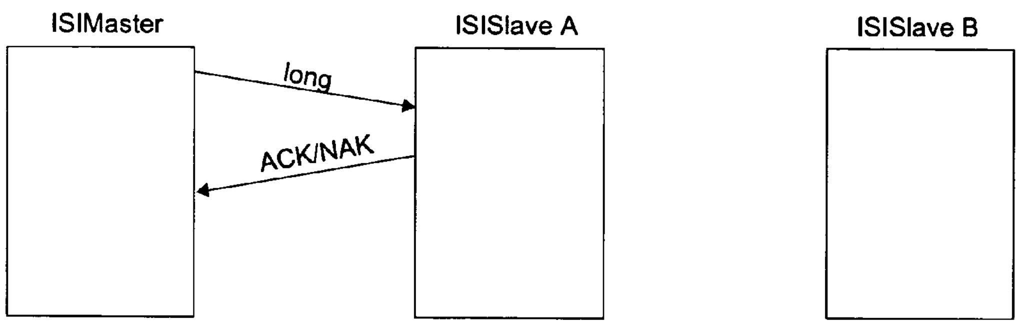
Transaction 1: Long packet to an addressed ISISlave
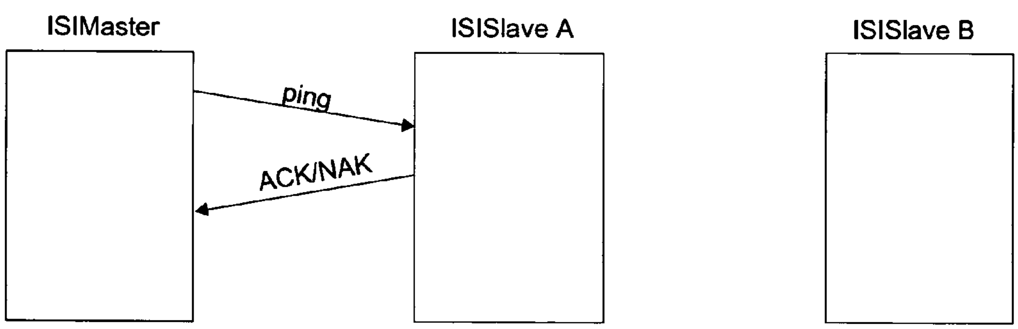
Transaction 2: Ping packet to an addressed ISISlave. ISISlave has nothing to send
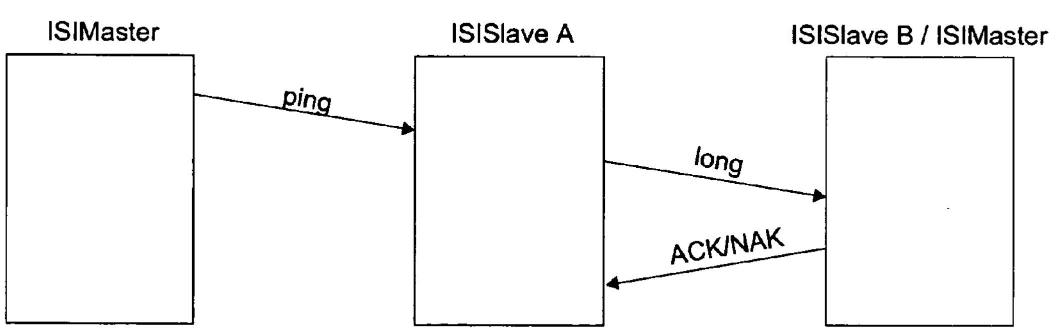
Transaction 3: Ping packet to an addressed ISISlave. ISISlaveA responds with a long packet to ISISlaveB (or the ISIMaster) and ISISlaveB (or the ISIMaster) responds with an ACK or NAK.
*FIG. 32*

Machine remains in same state by default
All outputs are zero unless otherwise stated State Description:

Idle : Normal Idle state

Compare: Compare interrupt level. Determines the interrupt source

IntClear: Interrupt clear, clear the pending bit for the current interrupt vector Read from SFU to LBD (PreviousLineFifo)

(a) Netpage tag background pattern (b) Netpage tag showing data area

ENCODED TAG DATA INTERFACE

-Encoded fixed data can be up to 120 bits long
-Use 2 buffers to allow for 2 simultaneously READs in one cycle.
-These stores hold the fixed tag data for 1 tag.
-Total memory = 120x2 = 240 bits

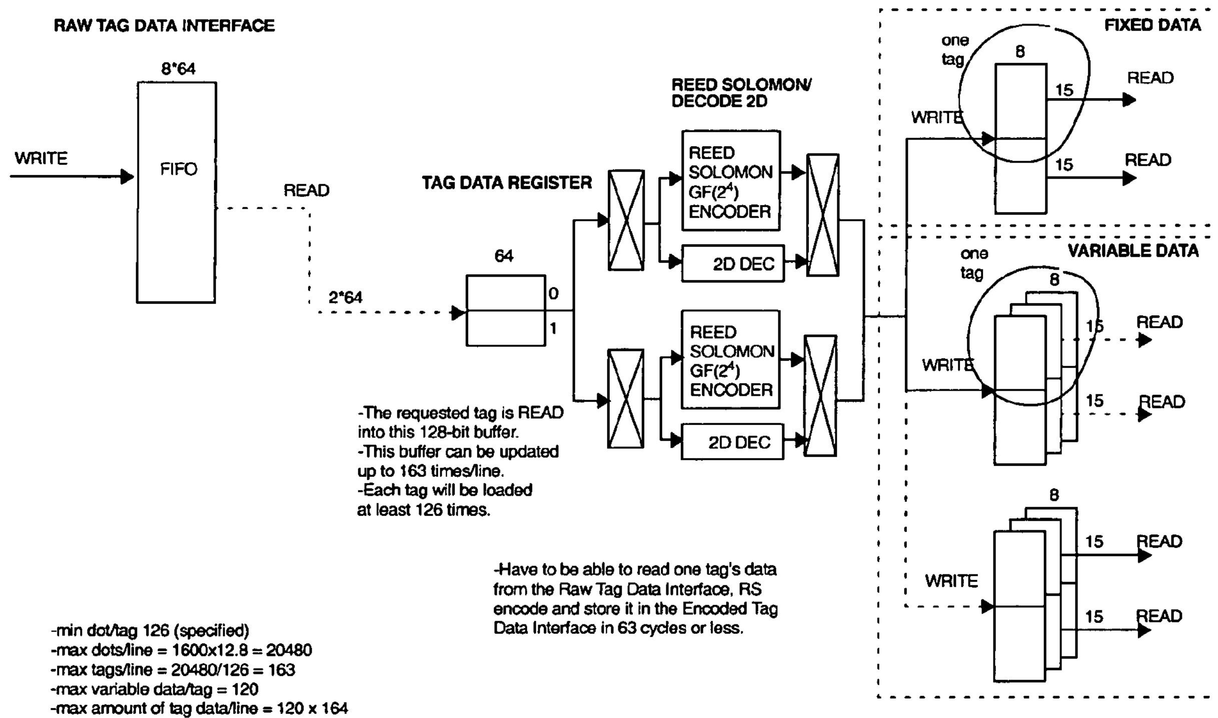

-The requested tag is READ into this 128-bit buffer.
-This buffer can be updated up to 163 times/line.
-Each tag will be loaded at least 126 times.

-Have to be able to read one tag's data from the Raw Tag Data Interface, RS encode and store it in the Encoded Tag Data Interface in 63 cycles or less.

-min dot/tag 126 (specified)
-max dots/line = 1600x12.8 = 20480
-max tags/line = 20480/126 = 163
-max variable data/tag = 120
-max amount of tag data/line = 120 x 164
-Split the 120 tag data bits into 2x64-bits (8 spare bits)
-Max memory needed for 1 line of tag data = 2x64x164 = 656x32
-Divide this in half to allow for simultaneous READ/WRITE
-Once all this data is loaded it will be valid for at least 126 lines.
-From the specification, we must be able to process 2 dots/cycle.
-126 lines contains 20480x126 = 2580480 dots.
-Therefore the data will be updated at most every 1290240 cycles.
-Total memory = 164x2x64 = 20992-bits
-The store uses 9-bit addressing. Bit-9 indicates which buffer.
-Once printing has started each half buffer has 1/2 a line in which to be loaded
i.e. for a 12,8 inch line it has 10240 dots or 5120 cycles
for an 8 inch line it has 6400 dots or 3200 cycles -Encoded variable data can be up to 360 bits long
-Use 2 buffers to allow for 2 simultaneously READs in one cycle.
-Use 2 buffers to allow for simultaneously READ/WRITE
-Total memory = 360x2x2 = 1280 bits
-Min tag width = 126 dots
so the fastest that 1 tag can be read = 126/2 = 63 cycles

FIG. 198

Machine remains in same state by default
All outputs are zero unless otherwise stated State Description:

Idle: Idle state wait for active request

ColorSelect: Select the color to update before requesting to DIU

Request: Request issued wait for acknowledge

Data0: Data word 0 transfer

Data1: Data word 1 transfer

Data2: Data word 2 transfer

Data3: Data word 3 transfer

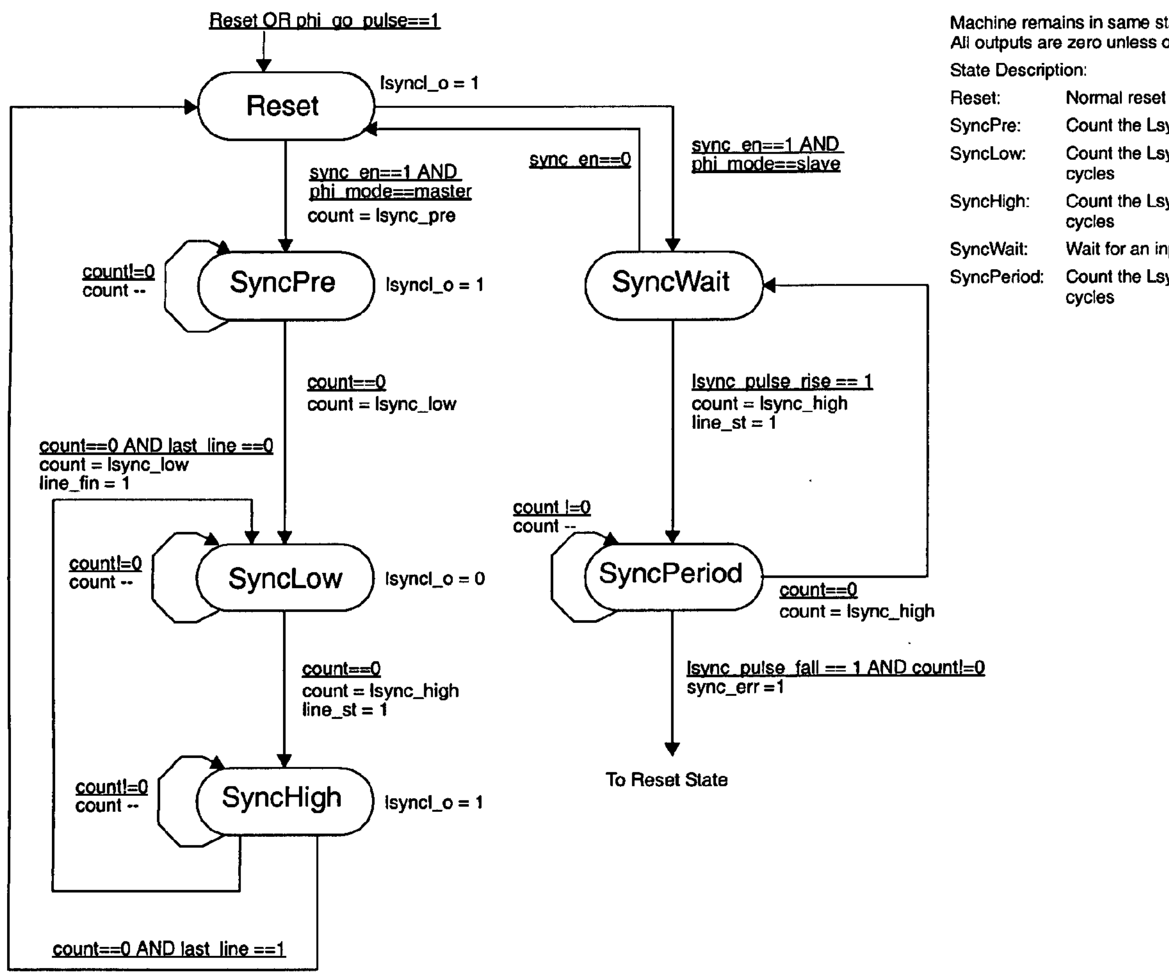

Machine remains in same state by default
All outputs are zero unless otherwise stated State Description:

| | |
|---|---|
| Reset: | Normal reset state |
| SyncPre: | Count the LsyncPre number of clock cycles |
| SyncLow: | Count the LsyncLow number of clock cycles |
| SyncHigh: | Count the LsyncHigh number of clock cycles |
| SyncWait: | Wait for an input lsync pulse |
| SyncPeriod: | Count the LsyncMinperiod number of clock cycles |

FIG. 286

Machine remains in same state by default
All outputs are zero unless otherwise stated State Description:

| | |
|---|---|
| Reset: | Normal reset state |
| FirePre: | Count the FrclkPre number of clock cycles, repeat count set to FrclkNum |
| FireHigh: | Count the FrclkHigh number of clock cycles |
| FireLow: | Count the FrclkLow number of clock cycles |

Machine remains in same state by default
All outputs are zero unless otherwise stated State Description:

| | |
|---|---|
| Reset: | Normal reset state |
| Linestart: | Start processing first part of the line, wait for both mid_pt to be active |
| LineMid: | Switch over wait state allow pipeline to clear |
| LineEnd: | Line end processing wait for both line_fin to be active |

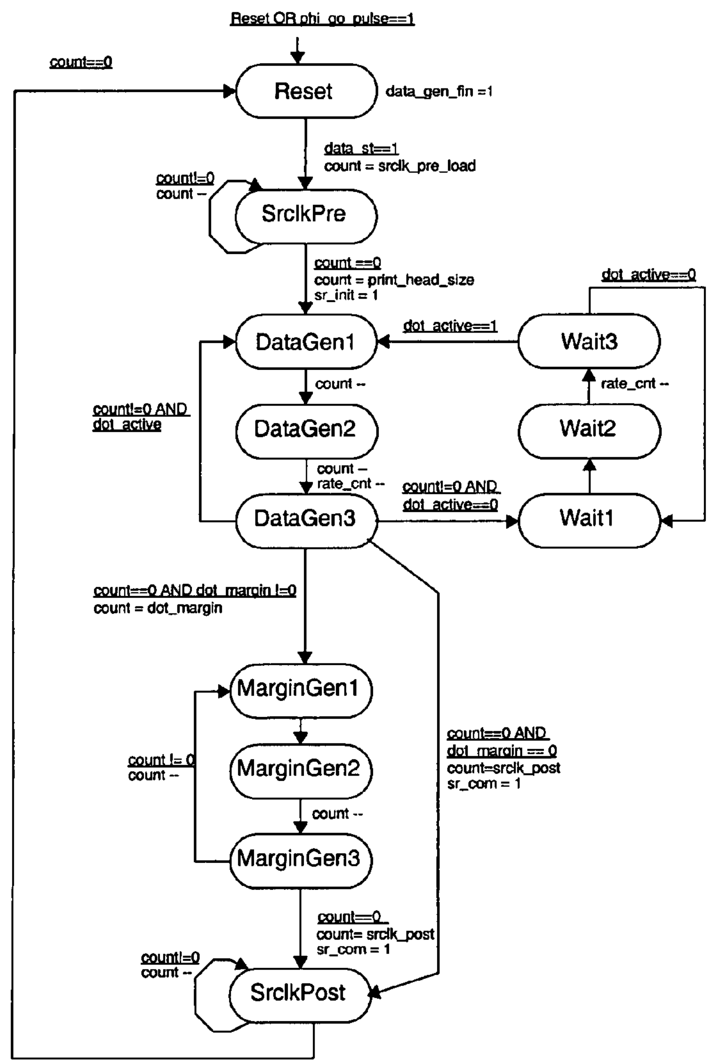

Machine remains in same state by default
All outputs are zero unless otherwise stated State Description:

| | |
|---|---|
| Reset: | Normal reset state |
| SrclkPre: | Count the SrclkPre number of clock cycles |
| DataGen1: | Read Line Dot data from buffer |
| DataGen2: | Read Line Dot data from buffer |
| DataGen3: | Data gen wait state |
| Wait1: | Data rate control wait state |
| Wait2: | Data rate control wait state |
| Wait3: | Data rate control wait state |
| MarginGen1: | Generate *DotMargin* number of dots |
| MarginGen2: | Generate *DotMargin* number of dots |
| MarginGen3: | Generate margin wait state |
| SrclkPost: | Wait for SrclkPost number of cycles |

FIG. 292

| Bit 7 | Bit 6 | Bit 5 | Bit 4 | Bit 3 | Bit 2 | Bit 1 | Bit 0 |
|---|---|---|---|---|---|---|---|
| PrlD6 | PrlD5 | PrlD4 | PrlD3 | PrlD2 | PrlD1 | PrlD0 | R/*W<br>0 = write<br>1 = read |

TAMPER RESISTANT SHADOW MEMORY

FIELD OF INVENTION

The present invention relates to securing an integrated circuit against certain forms of security attacks.

The invention has primarily been developed for use in authentication chips used in a printer system to authenticate communications between, for example, a printer controller and other peripheral devices such as ink cartridges. However, it will be appreciated that the invention can be applied to integrated circuits in other fields in which analogous problems are faced.

BACKGROUND OF INVENTION

Manufacturing a printhead that has relatively high resolution and print-speed raises a number of problems:

Difficulties in manufacturing pagewidth printheads of any substantial size arise due to the relatively small dimensions of standard silicon wafers that are used in printhead (or printhead module) manufacture. For example, if it is desired to make an 8 inch wide pagewidth printhead, only one such printhead can be laid out on a standard 8-inch wafer, since such wafers are circular in plan. Manufacturing a pagewidth printhead from two or more smaller modules can reduce this limitation to some extent, but raises other problems related to providing a joint between adjacent printhead modules that is precise enough to avoid visible artefacts (which would typically take the form of noticeable lines) when the printhead is used. The problem is exacerbated in relatively high-resolution applications because of the tight tolerances dictated by the small spacing between nozzles.

The quality of a joint region between adjacent printhead modules relies on factors including a precision with which the abutting ends of each module can be manufactured, the accuracy with which they can be aligned when assembled into a single printhead, and other more practical factors such as management of ink channels behind the nozzles. It will be appreciated that the difficulties include relative vertical displacement of the printhead modules with respect to each other.

Whilst some of these issues may be dealt with by careful design and manufacture, the level of precision required renders it relatively expensive to manufacture printheads within the required tolerances. It would be desirable to provide a solution to one or more of the problems associated with precision manufacture and assembly of multiple printhead modules to form a printhead, and especially a pagewidth printhead.

In some cases, it is desirable to produce a number of different printhead module types or lengths on a substrate to maximise usage of the substrate's surface area. However, different sizes and types of modules will have different numbers and layouts of print nozzles, potentially including different horizontal and vertical offsets. Where two or more modules are to be joined to form a single printhead, there is also the problem of dealing with different seam shapes between abutting ends of joined modules, which again may incorporate vertical or horizontal offsets between the modules. Printhead controllers are usually dedicated application specific integrated circuits (ASICs) designed for specific use with a single type of printhead module, that is used by itself rather than with other modules. It would be desirable to provide a way in which different lengths and types of printhead modules could be accounted for using a single printer controller.

Printer controllers face other difficulties when two or more printhead modules are involved, especially if it is desired to send dot data to each of the printheads directly (rather than via a single printhead connected to the controller). One concern is that data delivered to different length controllers at the same rate will cause the shorter of the modules to be ready for printing before any longer modules. Where there is little difference involved, the issue may not be of importance, but for large length differences, the result is that the bandwidth of a shared memory from which the dot data is supplied to the modules is effectively left idle once one of the modules is full and the remaining module or modules is still being filled. It would be desirable to provide a way of improving memory bandwidth usage in a system comprising a plurality of printhead modules of uneven length.

In any printing system that includes multiple nozzles on a printhead or printhead module, there is the possibility of one or more of the nozzles failing in the field, or being inoperative due to manufacturing defect. Given the relatively large size of a typical printhead module, it would be desirable to provide some form of compensation for one or more "dead" nozzles. Where the printhead also outputs fixative on a per-nozzle basis, it is also desirable that the fixative is provided in such a way that dead nozzles are compensated for.

A printer controller can take the form of an integrated circuit, comprising a processor and one or more peripheral hardware units for implementing specific data manipulation functions. A number of these units and the processor may need access to a common resource such as memory. One way of arbitrating between multiple access requests for a common resource is timeslot arbitration, in which access to the resource is guaranteed to a particular requestor during a predetermined timeslot.

One difficulty with this arrangement lies in the fact that not all access requests make the same demands on the resource in terms of timing and latency. For example, a memory read requires that data be fetched from memory, which may take a number of cycles, whereas a memory write can commence immediately. Timeslot arbitration does not take into account these differences, which may result in accesses being performed in a less efficient manner than might otherwise be the case. It would be desirable to provide a timeslot arbitration scheme that improved this efficiency as compared with prior art timeslot arbitration schemes.

Also of concern when allocating resources in a timeslot arbitration scheme is the fact that the priority of an access request may not be the same for all units. For example, it would be desirable to provide a timeslot arbitration scheme in which one requestor (typically the memory) is granted special priority such that its requests are dealt with earlier than would be the case in the absence of such priority.

In systems that use a memory and cache, a cache miss (in which an attempt to load data or an instruction from a cache fails) results in a memory access followed by a cache update. It is often desirable when updating the cache in this way to update data other than that which was actually missed. A typical example would be a cache miss for a byte resulting in an entire word or line of the cache associated with that byte being updated. However, this can have the effect of tying up bandwidth between the memory (or a memory manager) and the processor where the bandwidth is such that several cycles are required to transfer the entire word or line to the cache. It would be desirable to provide a mechanism for updating a cache that improved cache update speed and/or efficiency.

Most integrated circuits an externally provided signal as (or to generate) a clock, often provided from a dedicated clock generation circuit. This is often due to the difficulties of providing an onboard clock that can operate at a speed that is predictable. Manufacturing tolerances of such on-board clock generation circuitry can result in clock rates that vary by a factor of two, and operating temperatures can increase this margin by an additional factor of two. In some cases, the particular rate at which the clock operates is not of particular concern. However, where the integrated circuit will be writing to an internal circuit that is sensitive to the time over which a signal is provided, it may be undesirable to have the signal be applied for too long or short a time. For example, flash memory is sensitive to being written too for too long a period. It would be desirable to provide a mechanism for adjusting a rate of an on-chip system clock to take into account the impact of manufacturing variations on clockspeed.

One form of attacking a secure chip is to induce (usually by increasing) a clock speed that takes the logic outside its rated operating frequency. One way of doing this is to reduce the temperature of the integrated circuit, which can cause the clock to race. Above a certain frequency, some logic will start malfunctioning. In some cases, the malfunction can be such that information on the chip that would otherwise be secure may become available to an external connection. It would be desirable to protect an integrated circuit from such attacks.

In an integrated circuit comprising non-volatile memory, a power failure can result in unintentional behaviour. For example, if an address or data becomes unreliable due to falling voltage supplied to the circuit but there is still sufficient power to cause a write, incorrect data can be written. Even worse, the data (incorrect or not) could be written to the wrong memory. The problem is exacerbated with multi-word writes. It would be desirable to provide a mechanism for reducing or preventing spurious writes when power to an integrated circuit is failing.

In an integrated circuit, it is often desirable to reduce unauthorised access to the contents of memory. This is particularly the case where the memory includes a key or some other form of security information that allows the integrated circuit to communicate with another entity (such as another integrated circuit, for example) in a secure manner. It would be particularly advantageous to prevent attacks involving direct probing of memory addresses by physically investigating the chip (as distinct from electronic or logical attacks via manipulation of signals and power supplied to the integrated circuit).

It is also desirable to provide an environment where the manufacturer of the integrated circuit (or some other authorised entity) can verify or authorize code to be run on an integrated circuit.

Another desideratum would be the ability of two or more entities, such as integrated circuits, to communicate with each other in a secure manner. It would also be desirable to provide a mechanism for secure communication between a first entity and a second entity, where the two entities, whilst capable of some form of secure communication, are not able to establish such communication between themselves.

In a system that uses resources (such as a printer, which uses inks) it may be desirable to monitor and update a record related to resource usage. Authenticating ink quality can be a major issue, since the attributes of inks used by a given printhead can be quite specific. Use of incorrect ink can result in anything from misfiring or poor performance to damage or destruction of the printhead. It would therefore be desirable to provide a system that enables authentication of the correct ink being used, as well as providing various support systems secure enabling refilling of ink cartridges.

In a system that prevents unauthorized programs from being loaded onto or run on an integrated circuit, it can be laborious to allow developers of software to access the circuits during software development. Enabling access to integrated circuits of a particular type requires authenticating software with a relatively high-level key. Distributing the key for use by developers is inherently unsafe, since a single leak of the key outside the organization could endanger security of all chips that use a related key to authorize programs. Having a small number of people with high-security clearance available to authenticate programs for testing can be inconvenient, particularly in the case where frequent incremental changes in programs during development require testing. It would be desirable to provide a mechanism for allowing access to one or more integrated circuits without risking the security of other integrated circuits in a series of such integrated circuits.

In symmetric key security, a message, denoted by M, is plaintext. The process of transforming M into ciphertext C, where the substance of M is hidden, is called encryption. The process of transforming C back into M is called decryption. Referring to the encryption function as E, and the decryption function as D, we have the following identities:

$$E[M]=C$$

$$D[C]=M$$

Therefore the following identity is true:

$$D[E[M]]=M$$

A symmetric encryption algorithm is one where:

the encryption function E relies on key $K_1$, the decryption function D relies on key $K_2$, $K_2$ can be derived from $K_1$, and $K_1$ can be derived from $K_2$.

In most symmetric algorithms, $K_1$ equals $K_2$. However, even if $K_1$ does not equal $K_2$, given that one key can be derived from the other, a single key K can suffice for the mathematical definition. Thus:

$$E_K[M]=C$$

$$D_K[C]=M$$

The security of these algorithms rests very much in the key K. Knowledge of K allows anyone to encrypt or decrypt. Consequently K must remain a secret for the duration of the value of M. For example, M may be a wartime message "My current position is grid position 123–456". Once the war is over the value of M is greatly reduced, and if K is made public, the knowledge of the combat unit's position may be of no relevance whatsoever. The security of the particular symmetric algorithm is a function of two things: the strength of the algorithm and the length of the key.

An asymmetric encryption algorithm is one where:

the encryption function E relies on key $K_1$, the decryption function D relies on key $K_2$, $K_2$ cannot be derived from $K_1$ in a reasonable amount of time, and $K_1$ cannot be derived from $K_2$ in a reasonable amount of time.

Thus:

$$E_{K1}[M]=C$$

$$D_{K2}[C]=M$$

These algorithms are also called public-key because one key $K_1$ can be made public. Thus anyone can encrypt a message (using $K_1$) but only the person with the corresponding decryption key ($K_2$) can decrypt and thus read the message.

In most cases, the following identity also holds:

$$E_{K2}[M]=C$$

$$D_{K1}[C]=M$$

This identity is very important because it implies that anyone with the public key $K_1$ can see M and know that it came from the owner of $K_2$. No-one else could have generated C because to do so would imply knowledge of $K_2$. This gives rise to a different application, unrelated to encryption—digital signatures.

A number of public key cryptographic algorithms exist. Most are impractical to implement, and many generate a very large C for a given M or require enormous keys. Still others, while secure, are far too slow to be practical for several years. Because of this, many public key systems are hybrid—a public key mechanism is used to transmit a symmetric session key, and then the session key is used for the actual messages.

All of the algorithms have a problem in terms of key selection. A random number is simply not secure enough. The two large primes p and q must be chosen carefully—there are certain weak combinations that can be factored more easily (some of the weak keys can be tested for). But nonetheless, key selection is not a simple matter of randomly selecting 1024 bits for example. Consequently the key selection process must also be secure.

Symmetric and asymmetric schemes both suffer from a difficulty in allowing establishment of multiple relationships between one entity and a two or more others, without the need to provide multiple sets of keys. For example, if a main entity wants to establish secure communications with two or more additional entities, it will need to maintain a different key for each of the additional entities. For practical reasons, it is desirable to avoid generating and storing large numbers of keys. To reduce key numbers, two or more of the entities may use the same key to communicate with the main entity. However, this means that the main entity cannot be sure which of the entities it is communicating with. Similarly, messages from the main entity to one of the entities can be decrypted by any of the other entities with the same key. It would be desirable if a mechanism could be provided to allow secure communication between a main entity and one or more other entities that overcomes at least some of the shortcomings of prior art.

In a system where a first entity is capable of secure communication of some form, it may be desirable to establish a relationship with another entity without providing the other entity with any information related the first entity's security features. Typically, the security features might include a key or a cryptographic function. It would be desirable to provide a mechanism for enabling secure communications between a first and second entity when they do not share the requisite secret function, key or other relationship to enable them to establish trust.

A number of other aspects, features, preferences and embodiments are disclosed in the Detailed Description of the Preferred Embodiment below.

SUMMARY OF THE INVENTION

In accordance with a first aspect of the invention, there is provided an integrated circuit comprising a processor and memory, the memory storing a set of data representing program code and/or an operating value, wherein each bit of the data is stored as a bit/inverse-bit pair in corresponding pairs of physically adjacent bit cells in the memory.

Preferably, the integrated circuit further includes a memory management unit configured to receive a request for the set of data and to test, during processing of the request, whether the respective pairs of physically adjacent bit-cells that correspond to the set of data contain bit/inverse-bit pairs, thereby to confirm the validity of the set of data as stored in the memory. More preferably, the memory management unit is configured to store sets of data as sets of bit/inverse-bit pairs in the memory.

Preferably, the integrated circuit is selectively operable in either of first and second modes, wherein:

- in the first mode, the memory management unit is configured to receive and process a request for the set of data, and to test, during processing of the request, whether the respective pairs of physically adjacent bit-cells corresponding to the set of data contain bit/inverse-bit pairs, thereby to confirm the validity of the set of data as stored in the memory; and
- in the second mode, the memory management unit is configured to receive and process a request for data stored in the memory, without testing whether pairs of physically adjacent bit-cells contain bit/inverse-bit pairs.

More Preferably:

- in the first mode, the memory management unit is configured to store a set of data associated with a memory write request as a corresponding set of bit/inverse-bit pairs, each of the bit/inverse-bit pairs being physically adjacent each other; and
- in the second mode, the memory management unit is configured to store a set of data associated with a memory write request as the set of data without corresponding inverse-bits.

Preferably, the integrated circuit is configured to boot into the first mode by default.

Preferably, the integrated circuit is configured to implement a defensive action in the event the test fails.

More preferably, the defensive action includes resetting the integrated circuit.

In an alternative embodiment, the defensive reaction includes returning second data other than that the subject of the test.

Preferably, the second data is a string of identical digits.

Preferably, the defensive reaction is different depending upon whether the set of data represents program code or an operating value.

More preferably, in the event the test fails and the set of data is an operating value, the integrated circuit is configured to replace the failed value with a substitute value.

More preferably, the substitute value is selected to disrupt a program running on the integrated circuit.

Preferably, the substitute causes at least some circuitry on the integrated circuit to reset.

In a preferred embodiment, in the event the test fails, the integrated circuit is permanently prevented from running software.

Preferably, in the event the test fails, the integrated circuit is configured to delete from the memory some or all of the bit values associated with the set of data.

More preferably, in the event the test fails, the integrated circuit is configured to delete some or all of the contents of the memory.

BRIEF DESCRIPTION OF THE DRAWINGS

Preferred and other embodiments of the invention will now be described, by way of example only, with reference to the accompanying drawings, in which:

FIG. 32 shows ISI transactions

FIG. 198 shows data flow through the TDI
FIG. 286 shows a sync generator state diagram
FIG. 292 shows a data generator state diagram

FIG. 374 shows input signature data format for ReplaceKey

FIG. 375 shows a key replacement map

FIG. 376 shows a key replacement map after $K_1$ is replaced

FIG. 377 shows a key replacement process

FIG. 378 shows an output signature data format for GetProgramKey

FIG. 379 shows transfer and rollback process

FIG. 380 shows an upgrade flow

FIG. 381 shows authorised ink refill paths in the printing system

FIG. 382 shows an input signature verification data format for XferAmount

FIG. 383 shows a transfer and rollback process

FIG. 384 shows an upgrade flow

FIG. 385 shows authorised upgrade paths in the printing system

Figure 386:
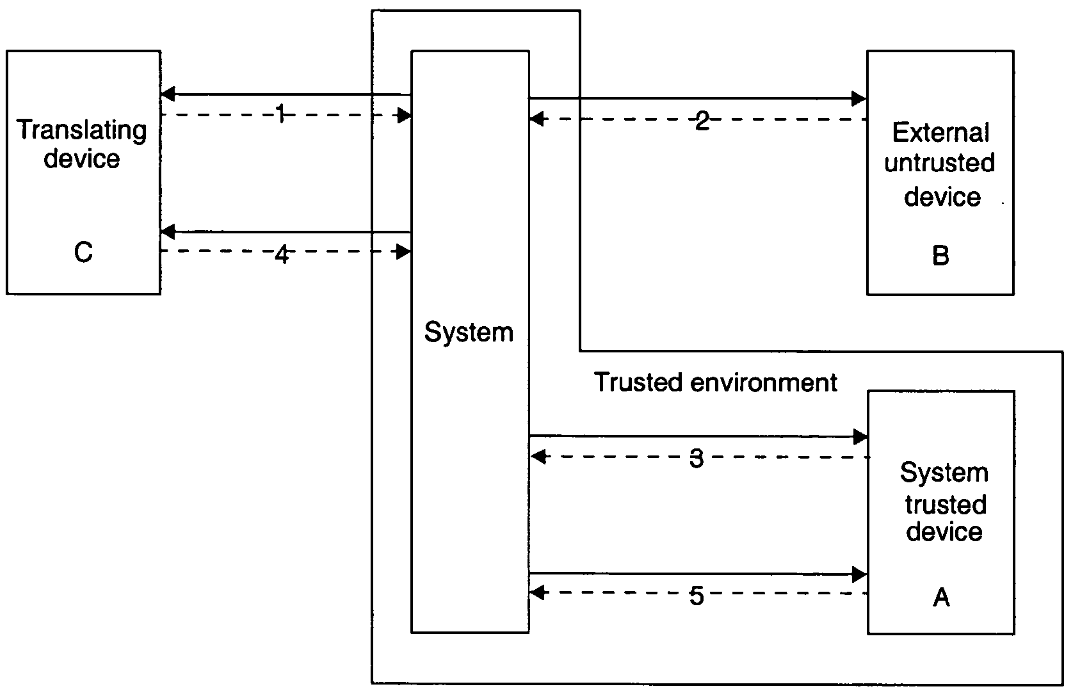

FIG. 386 shows a direct signature validation sequence

Figure 387:
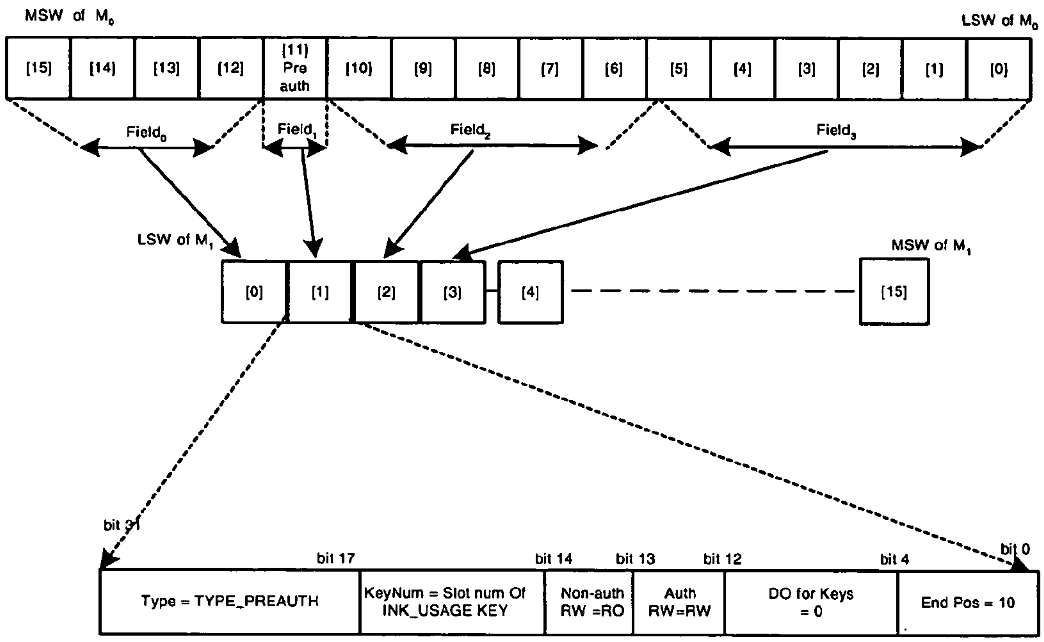

FIG. 387 shows signature validation using translation

Figure 388:
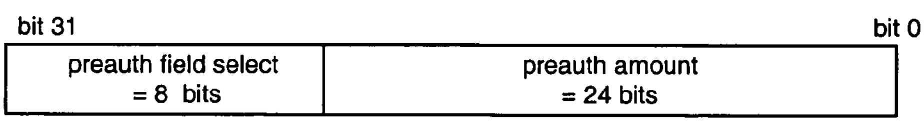

FIG. 388 shows setup of preauth field attributes

Figure 389:
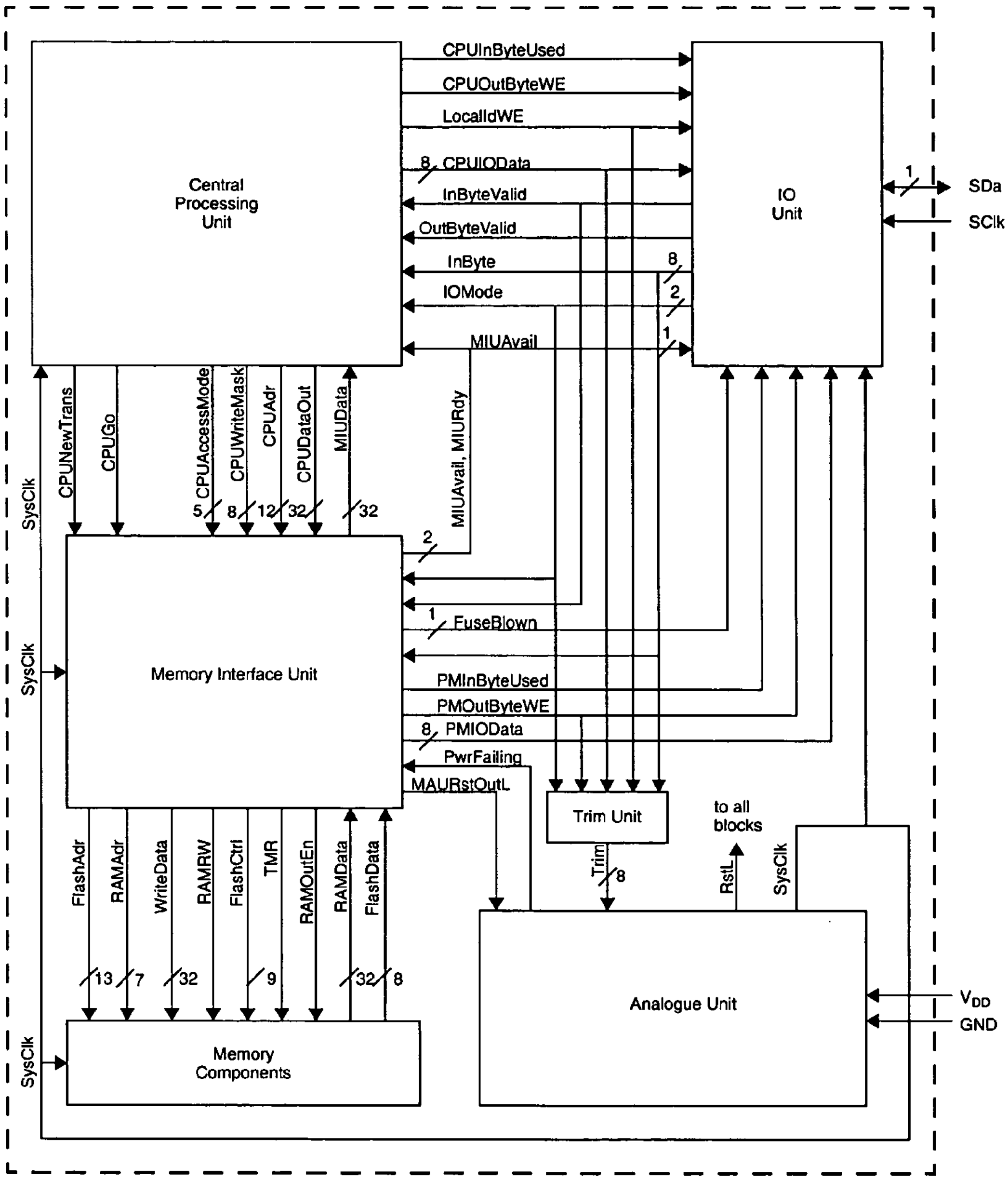

FIG. 389 shows a high level block diagram of QA Chip

Figure 390:
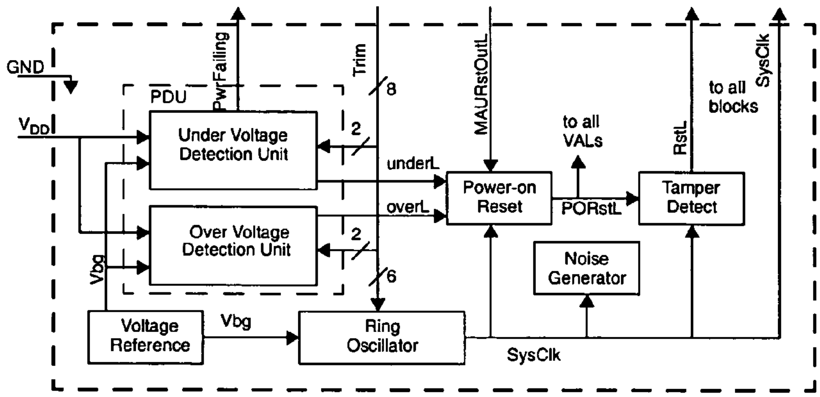

FIG. 390 shows an analogue unit

Figure 391:
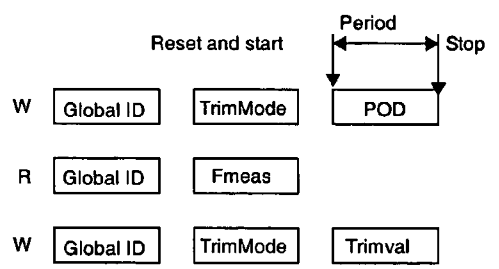

FIG. 391 shows a serial bus protocol for trimming

Figure 392:
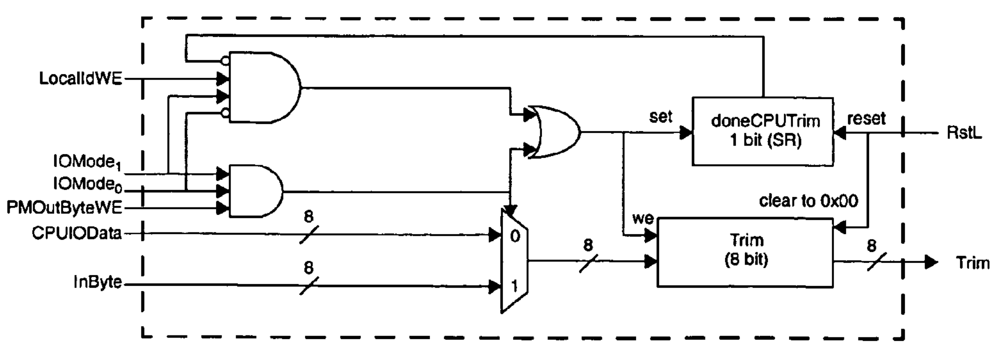

FIG. 392 shows a block diagram of a trim unit

Figure 393:
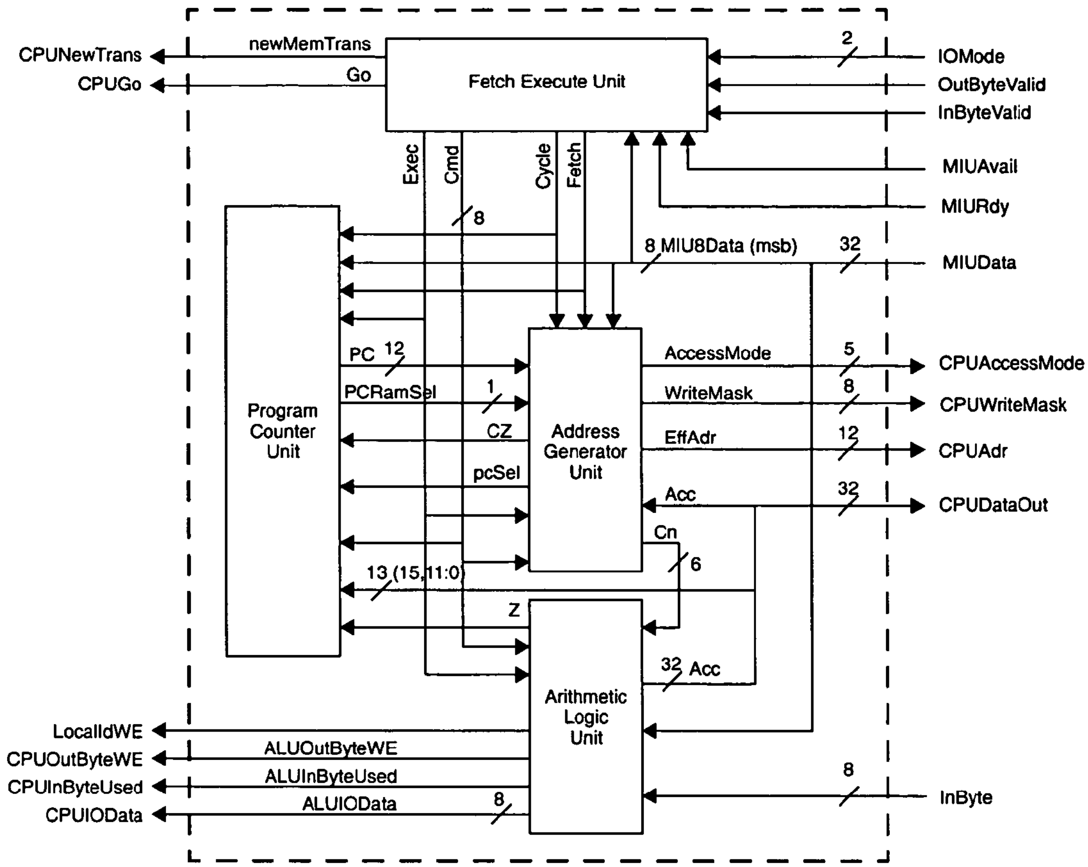

FIG. 393 shows a block diagram of a CPU of the QA chip

Figure 394:
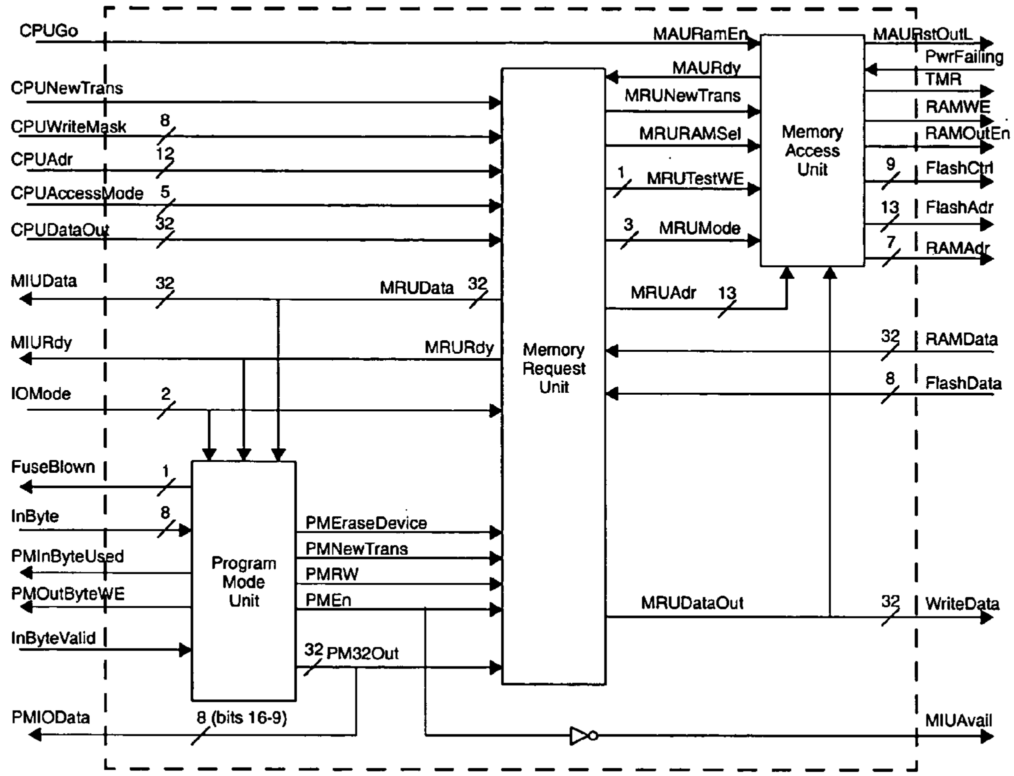

FIG. 394 shows block diagram of an MIU

Figure 395:
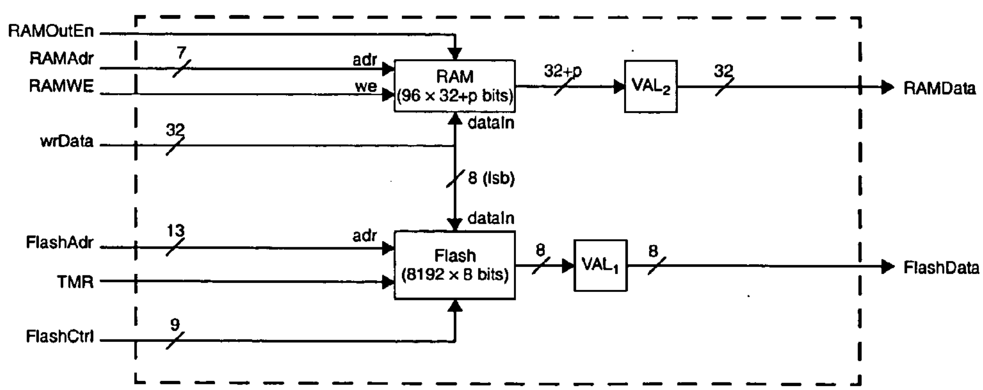

FIG. 395 shows a block diagram of memory components

Figures 396, 397:
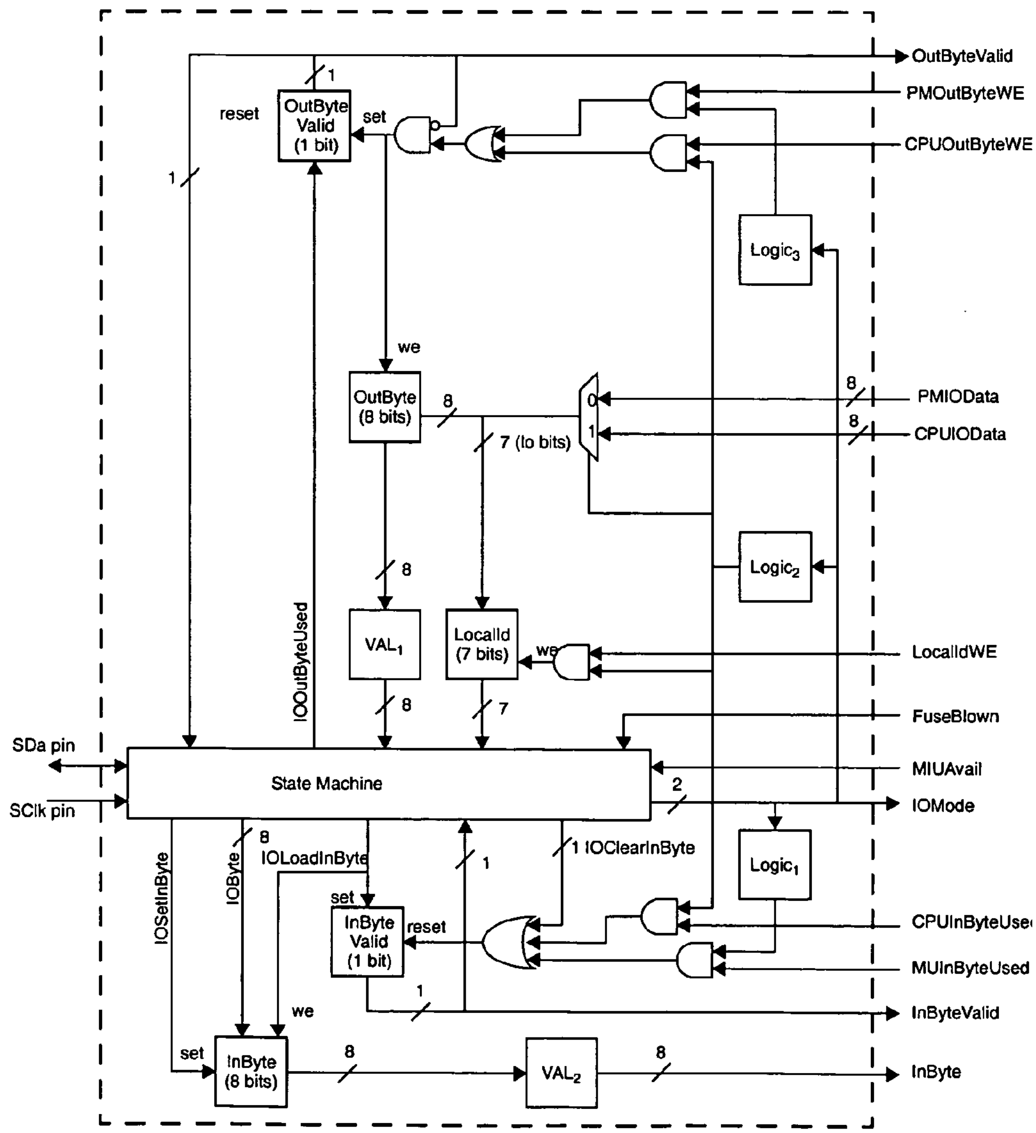

FIG. 396 shows a first byte sent to an IOU

FIG. 397 shows a block diagram of the IOU

Figure 398:
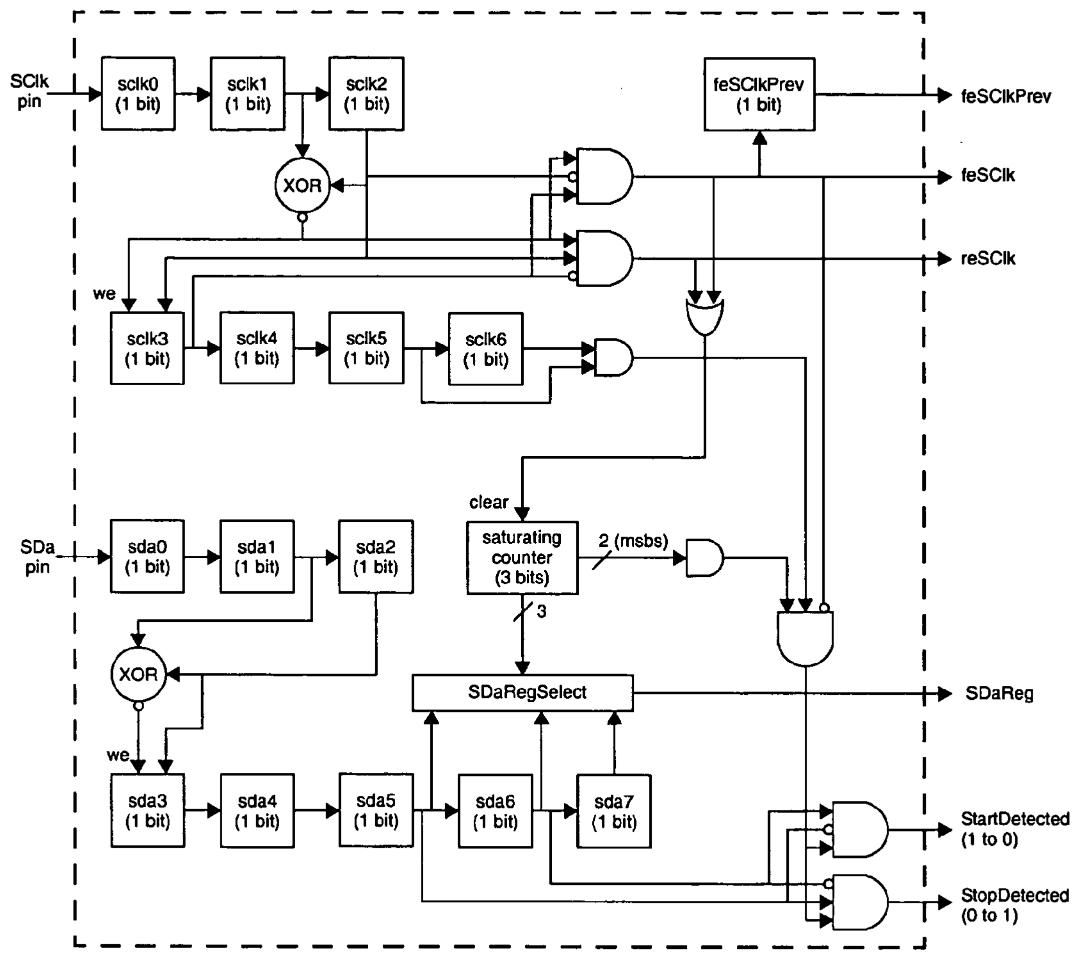
Figure 399:
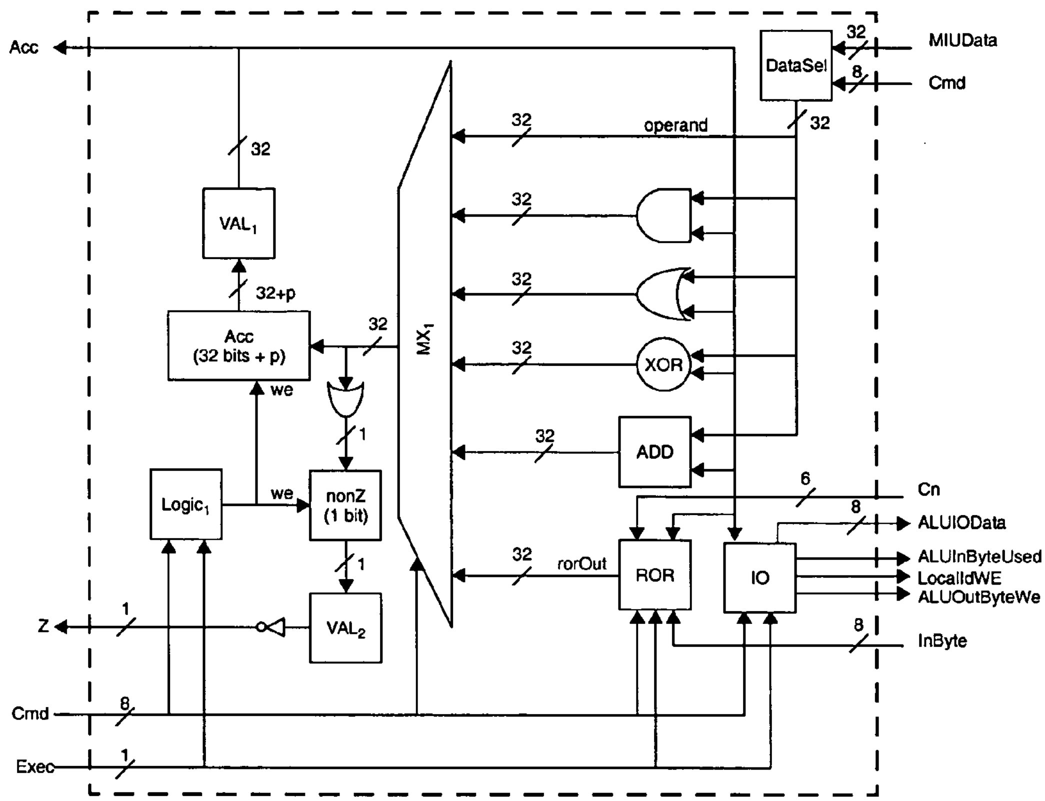
Figure 400:
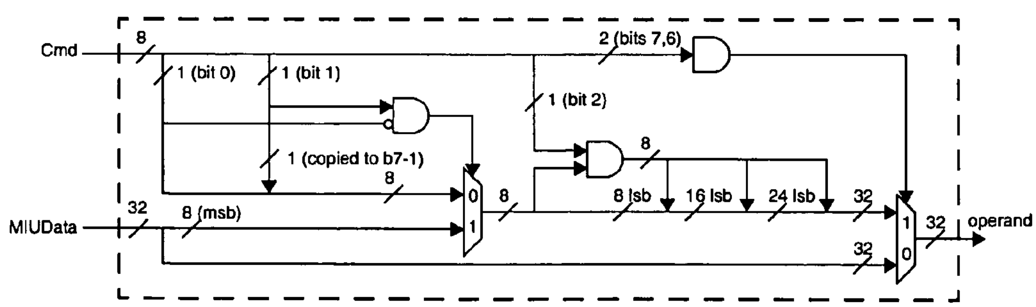
Figure 401:
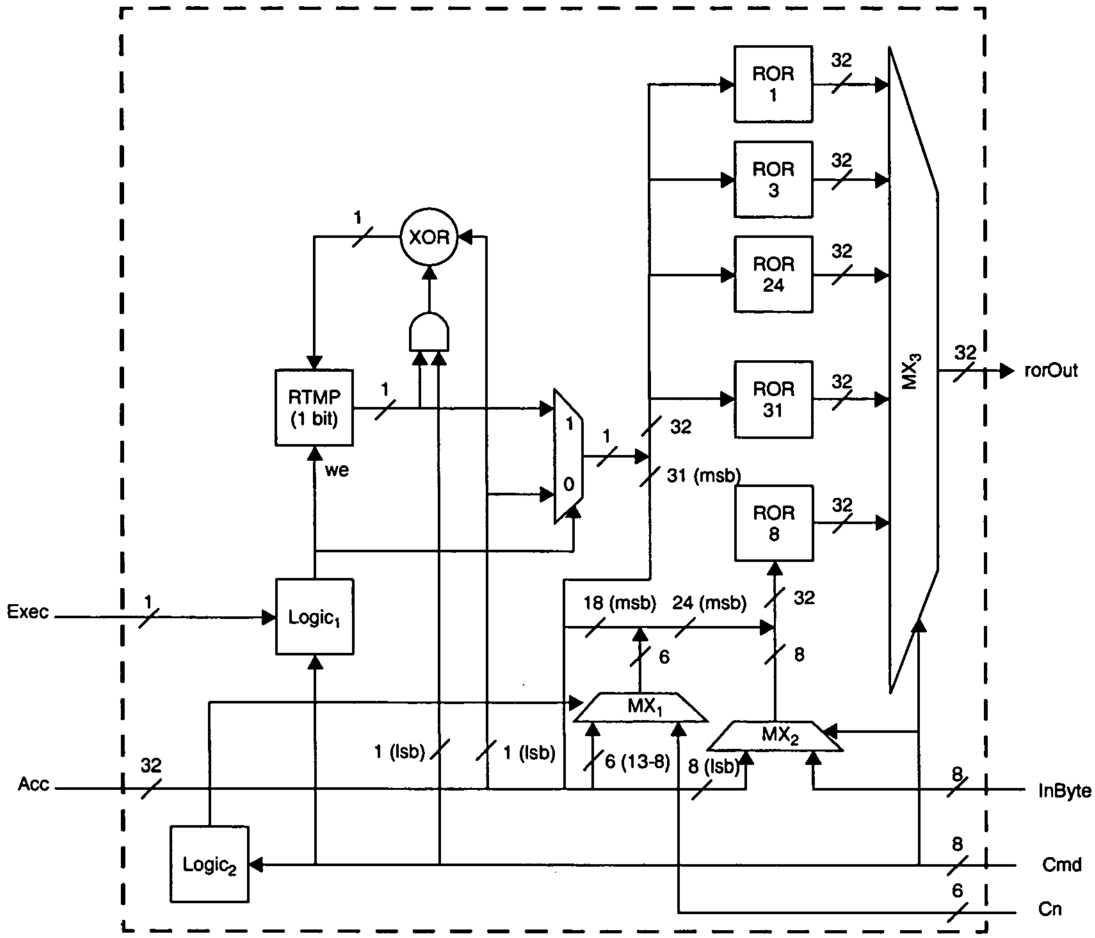
Figure 402:
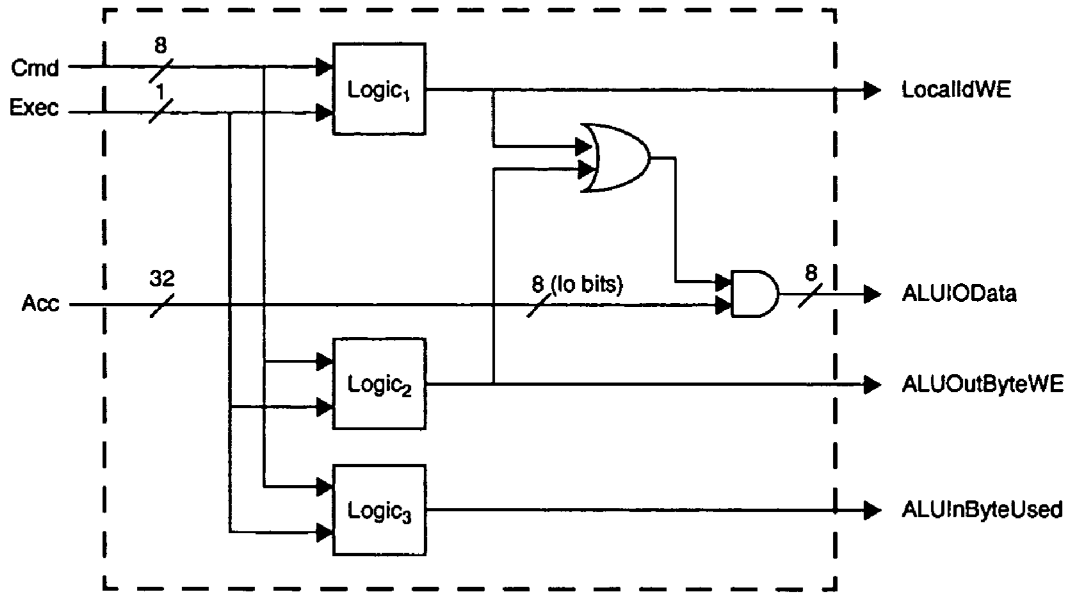
Figure 403:
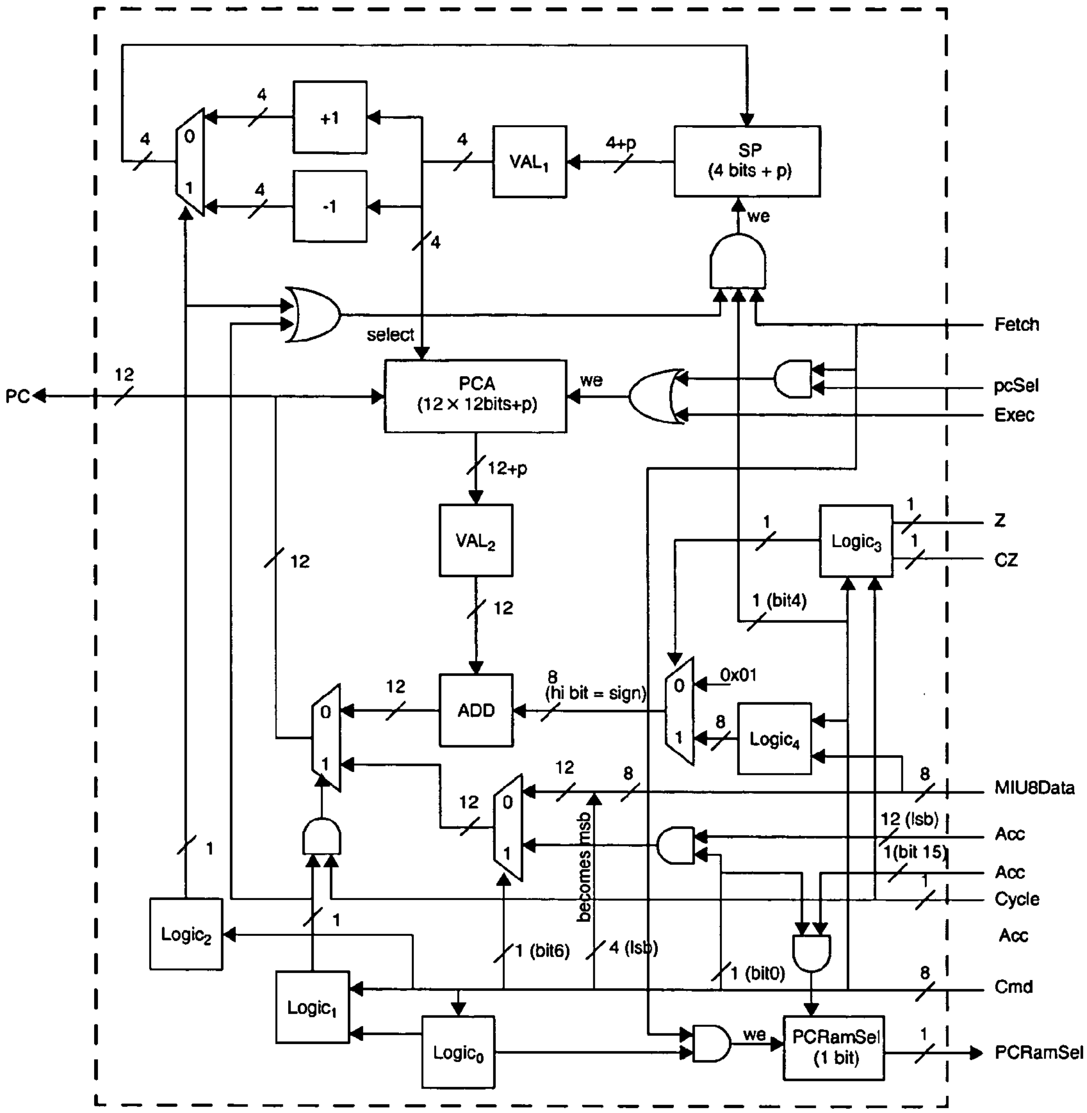
Figure 404:
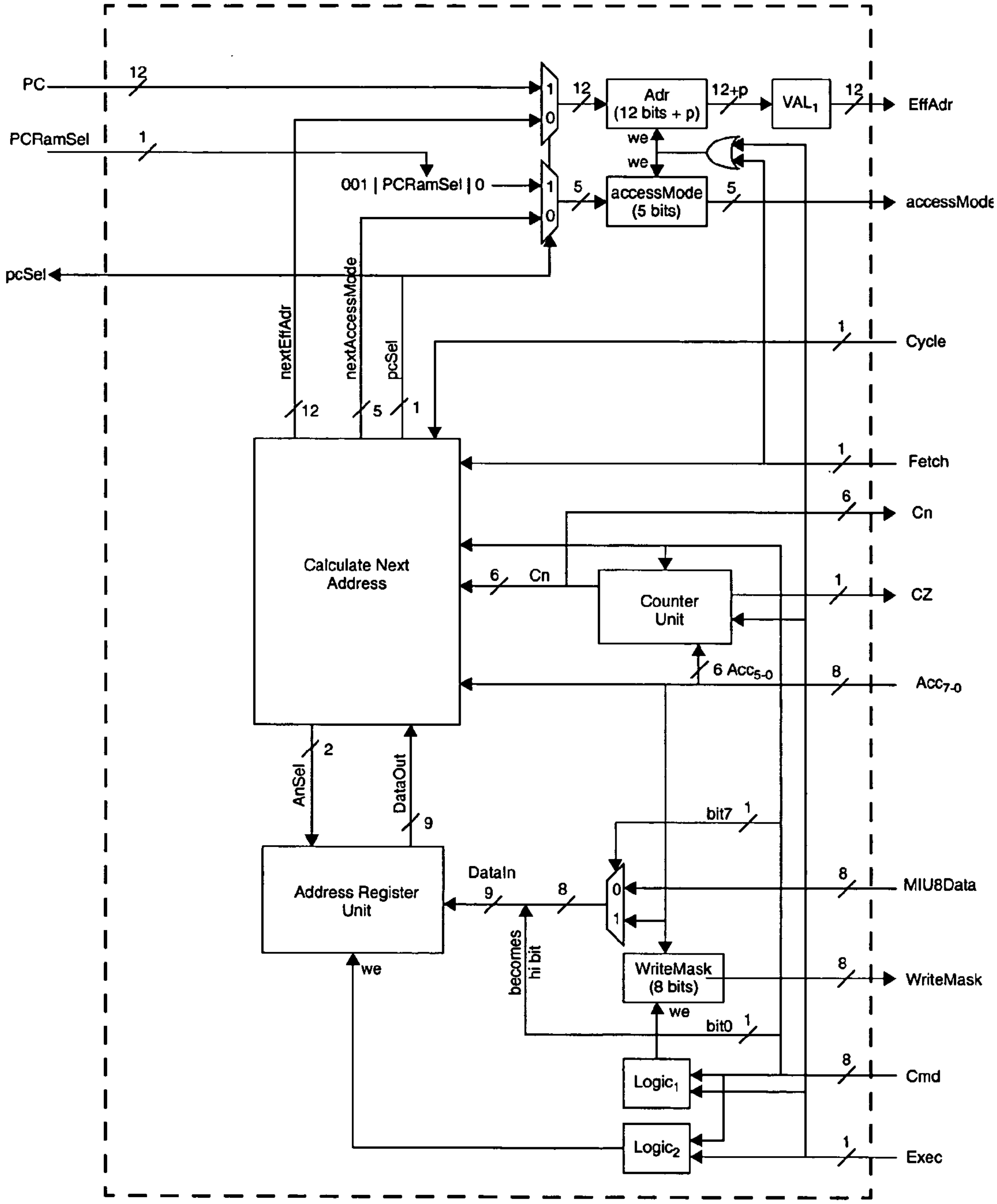
Figure 405:
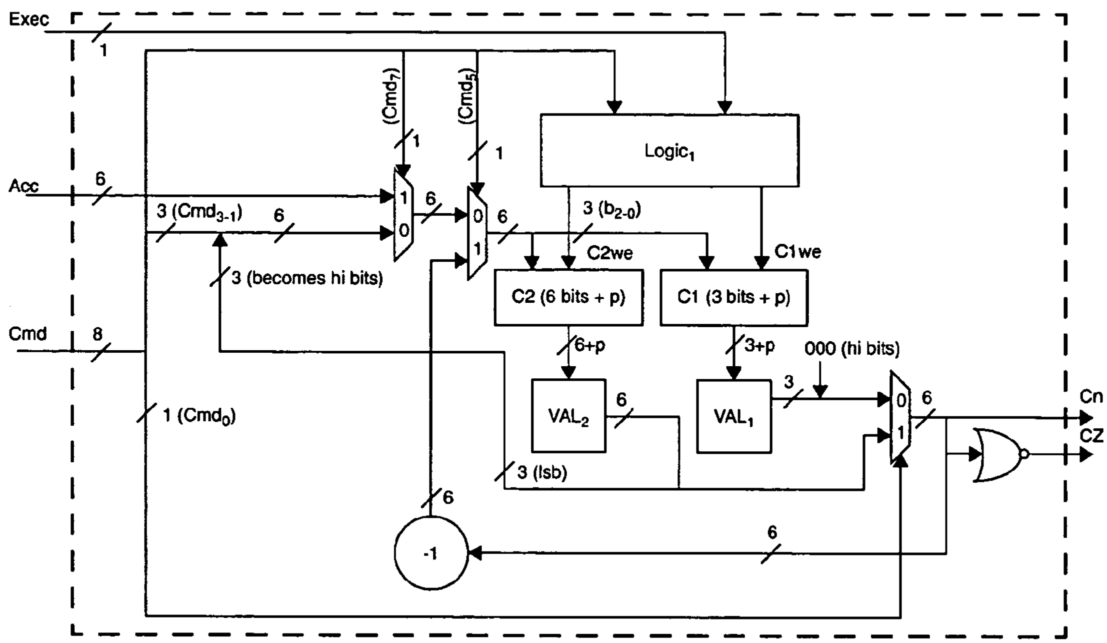
Figure 406:
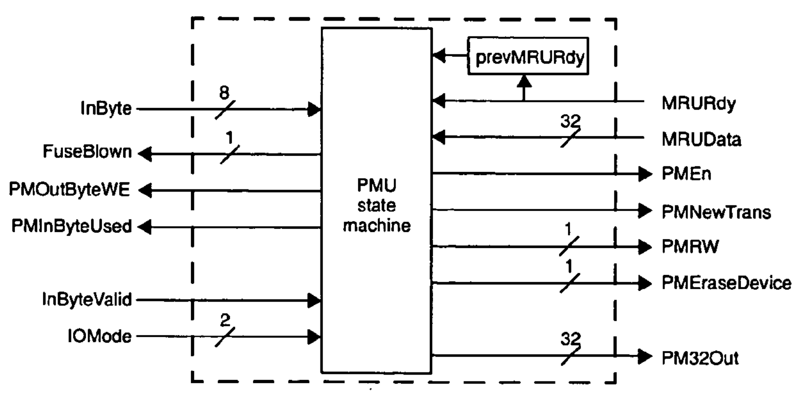
Figure 407:
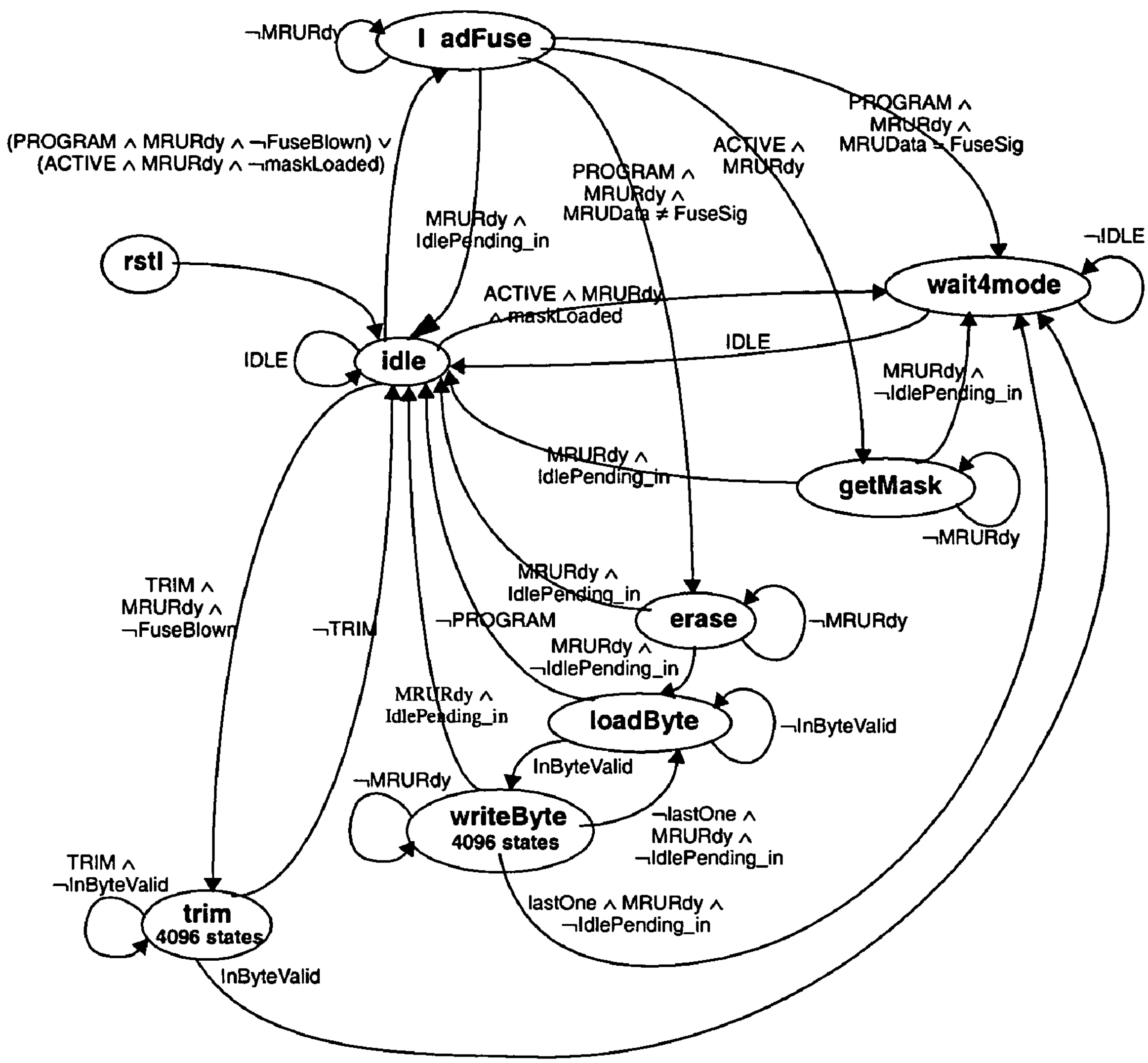
Figure 408:
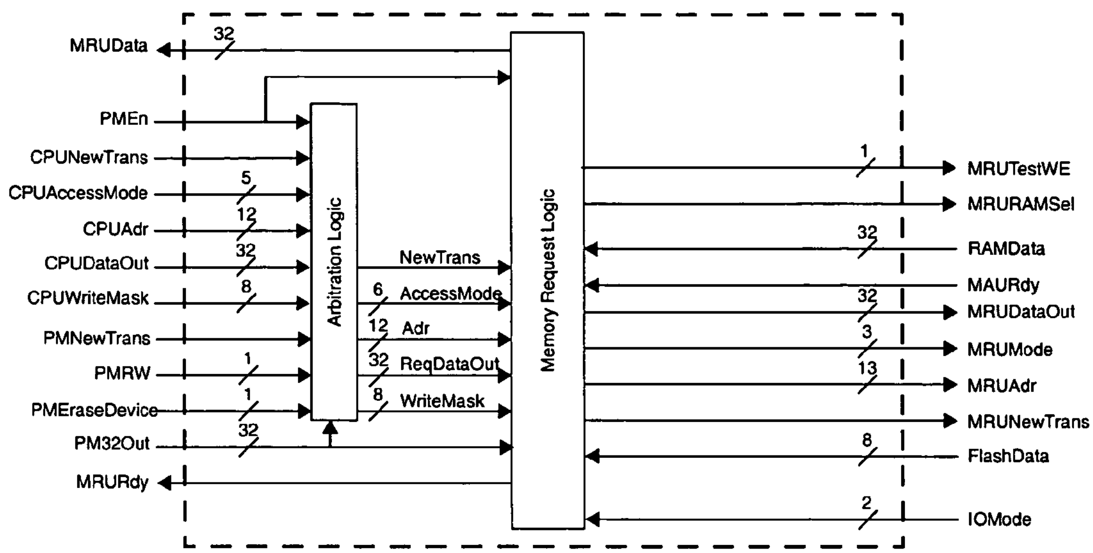
Figure 409:
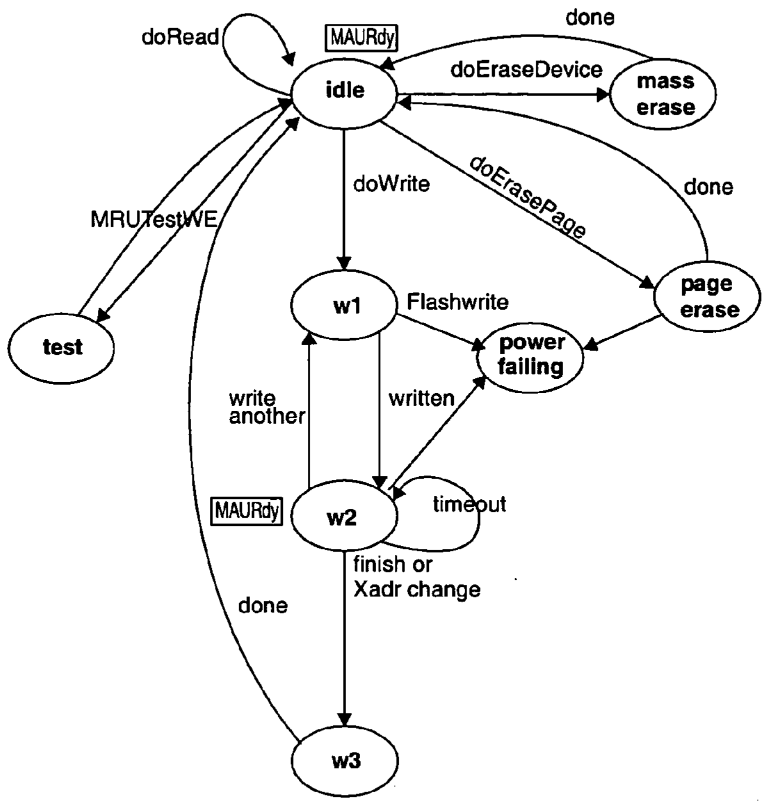
Figure 410:
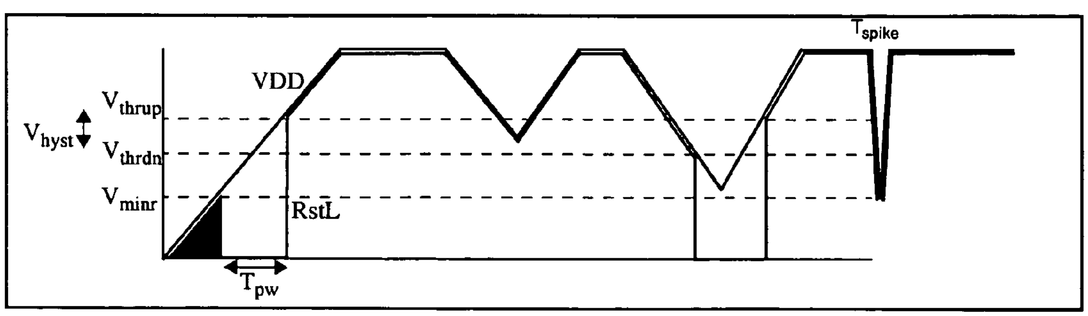
Figure 411:
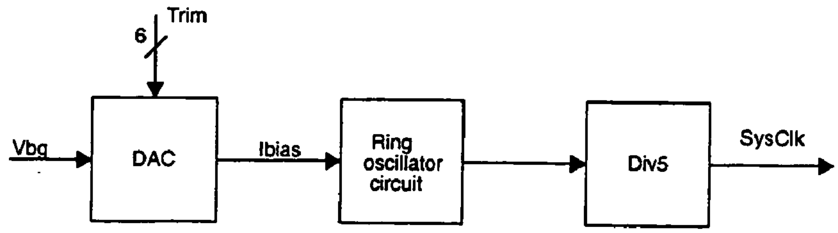
Figure 412:
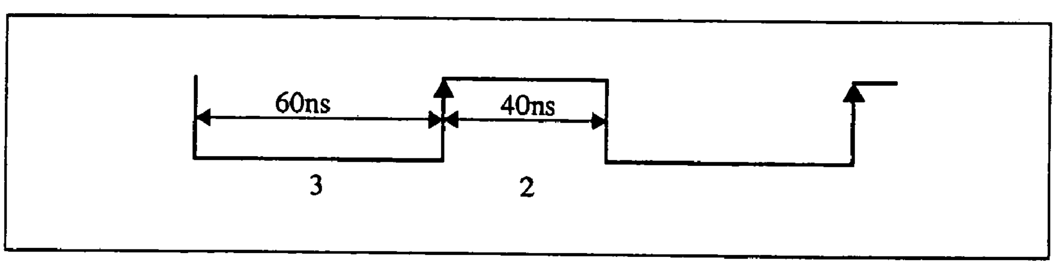

FIG. 398 shows a relationship between external SDa and SClk and generation of internal signals FIG. 399 shows block diagram of ALU FIG. 400 shows a block diagram of DataSel FIG. 401 shows a block diagram of ROR FIG. 402 shows a block diagram of the ALU's IO block FIG. 403 shows a block diagram of PCU FIG. 404 shows a block diagram of an Address Generator Unit FIG. 405 shows a block diagram for a Counter Unit FIG. 406 shows a block diagram of PMU FIG. 407 shows a state machine for PMU FIG. 408 shows a block diagram of MRU FIG. 409 shows simplified MAU state machine FIG. 410 shows power-on reset behaviour FIG. 411 shows a ring oscillator block diagram FIG. 412 shows a system clock duty cycle

DETAILED DESCRIPTION OF PREFERRED AND OTHER EMBODIMENTS

It will be appreciated that the detailed description that follows takes the form of a highly detailed design of the invention, including supporting hardware and software. A high level of detailed disclosure is provided to ensure that one skilled in the art will have ample guidance for implementing the invention.

Imperative phrases such as "must", "requires", "necessary" and "important" (and similar language) should be read as being indicative of being necessary only for the preferred embodiment actually being described. As such, unless the opposite is clear from the context, imperative wording should not be interpreted as such. Nothing in the detailed description is to be understood as limiting the scope of the invention, which is intended to be defined as widely as is defined in the accompanying claims.

Indications of expected rates, frequencies, costs, and other quantitative values are exemplary and estimated only, and are made in good faith. Nothing in this specification should be read as implying that a particular commercial embodiment is or will be capable of a particular performance level in any measurable area.

It will be appreciated that the principles, methods and hardware described throughout this document can be applied to other fields. Much of the security-related disclosure, for example, can be applied to many other fields that require secure communications between entities, and certainly has application far beyond the field of printers.

System Overview

The preferred of the present invention is implemented in a printer using microelectromechanical systems (MEMS) printheads. The printer can receive data from, for example, a personal computer such as an IBM compatible PC or Apple computer. In other embodiments, the printer can receive data directly from, for example, a digital still or video camera. The particular choice of communication link is not important, and can be based, for example, on USB, Firewire, Bluetooth or any other wireless or hardwired communications protocol.

Print System Overview

3 Introduction

This document describes the SoPEC (Small office home office Print Engine Controller) ASIC (Application Specific Integrated Circuit) suitable for use in, for example, SoHo printer products. The SoPEC ASIC is intended to be a low cost solution for bi-lithic printhead control, replacing the multichip solutions in larger more professional systems with a single chip. The increased cost competitiveness is achieved by integrating several systems such as a modified PEC1 printing pipeline, CPU control system, peripherals and memory sub-system onto one SoC ASIC, reducing component count and simplifying board design.

This section will give a general introduction to Memjet printing systems, introduce the components that make a bi-lithic printhead system, describe possible system architectures and show how several SoPECs can be used to achieve A3 and A4 duplex printing. The section "SoPEC ASIC" describes the SoC SoPEC ASIC, with subsections describing the CPU, DRAM and Print Engine Pipeline subsystems. Each section gives a detailed description of the blocks used and their operation within the overall print system. The final section describes the bi-lithic printhead construction and associated implications to the system due to its makeup.

4 Nomenclature 4.1 Bi-Lithic Printhead Notation

A bi-lithic based printhead is constructed from 2 printhead ICs of varying sizes. The notation M:N is used to express the size relationship of each IC, where M specifies one printhead IC in inches and N specifies the remaining printhead IC in inches.

The 'SoPEC/MoPEC Bilithic Printhead Reference' document [10] contains a description of the bilithic printhead and related terminology.

4.2 Definitions

The following terms are used throughout this specification:

| | |
|---|---|
| Bi-lithic printhead | Refers to printhead constructed from 2 printhead ICs |
| CPU | Refers to CPU core, caching system and MMU. |
| ISI-Bridge chip | A device with a high speed interface (such as USB2.0, Ethernet or IEEE1394) and one or more ISI interfaces. The ISI-Bridge would be the ISIMaster for each of the ISI buses it interfaces to. |

-continued

| | |
|---|---|
| ISIMaster | The ISIMaster is the only device allowed to initiate communication on the Inter Sopec Interface (ISI) bus. The ISIMaster interfaces with the host. |
| ISISlave | Multi-SoPEC systems will contain one or more ISISlave SoPECs connected to the ISI bus. ISISlaves can only respond to communication initiated by the ISIMaster. |
| LEON | Refers to the LEON CPU core. |
| LineSyncMaster | The LineSyncMaster device generates the line synchronisation pulse that all SoPECs in the system must synchronise their line outputs to. |
| Multi-SoPEC | Refers to SoPEC based print system with multiple SoPEC devices |
| Netpage | Refers to page printed with tags (normally in infrared ink). |
| PEC1 | Refers to Print Engine Controller version 1, precursor to SoPEC used to control printheads constructed from multiple angled printhead segments. |
| Printhead IC | Single MEMS IC used to construct bi-lithic printhead |
| PrintMaster | The PrintMaster device is responsible for coordinating all aspects of the print operation. There may only be one PrintMaster in a system. |
| QA Chip | Quality Assurance Chip |
| Storage SoPEC | An ISISlave SoPEC used as a DRAM store and which does not print. |
| Tag | Refers to pattern which encodes information about its position and orientation which allow it to be optically located and its data contents read. |

4.3 Acronym and Abbreviations

The following acronyms and abbreviations are used in this specification

| | |
|---|---|
| CFU | Contone FIFO Unit |
| CPU | Central Processing Unit |
| DIU | DRAM Interface Unit |
| DNC | Dead Nozzle Compensator |
| DRAM | Dynamic Random Access Memory |
| DWU | DotLine Writer Unit |
| GPIO | General Purpose Input Output |
| HCU | Halftoner Compositor Unit |
| ICU | Interrupt Controller Unit |
| ISI | Inter SoPEC Interface |
| LDB | Lossless Bi-level Decoder |
| LLU | Line Loader Unit |
| LSS | Low Speed Serial interface |
| MEMS | Micro Electro Mechanical System |
| MMU | Memory Management Unit |
| PCU | SoPEC Controller Unit |
| PHI | PrintHead Interface |
| PSS | Power Save Storage Unit |
| RDU | Real-time Debug Unit |
| ROM | Read Only Memory |
| SCB | Serial Communication Block |
| SFU | Spot FIFO Unit |
| SMG4 | Silverbrook Modified Group 4. |
| SoPEC | Small office home office Print Engine Controller |

-continued

| | |
|---|---|
| SRAM | Static Random Access Memory |
| TE | Tag Encoder |
| TFU | Tag FIFO Unit |
| TIM | Timers Unit |
| USB | Universal Serial Bus |

4.4 Pseudocode Notation

In general the pseudocode examples use C like statements with some exceptions. Symbol and naming convections used for pseudocode.

| | |
|---|---|
| // | Comment |
| = | Assignment |
| ==, !=, <, > | Operator equal, not equal, less than, greater than |
| +, −, *, /, % | Operator addition, subtraction, multiply, divide, modulus |
| &, \|, ^, <<, >>, ~ | Bitwise AND, bitwise OR, bitwise exclusive OR, left shift, right shift, complement |
| AND, OR, NOT | Logical AND, Logical OR, Logical inversion |
| [XX:YY] | Array/vector specifier |
| {a, b, c} | Concatenation operation |
| ++, −− | Increment and decrement |

4.4.1 Register and Signal Naming Conventions

In general register naming uses the C style conventions with capitalization to denote word delimiters. Signals use RTL style notation where underscore denote word delimiters. There is a direct translation between both convention. For example the CmdSourceFifo register is equivalent to cmd_source_fifo signal.

4.5 State Machine Notation

State machines should be described using the pseudocode notation outlined above. State machine descriptions use the convention of underline to indicate the cause of a transition from one state to another and plain text (no underline) to indicate the effect of the transition i.e. signal transitions which occur when the new state is entered.

Figure 1:
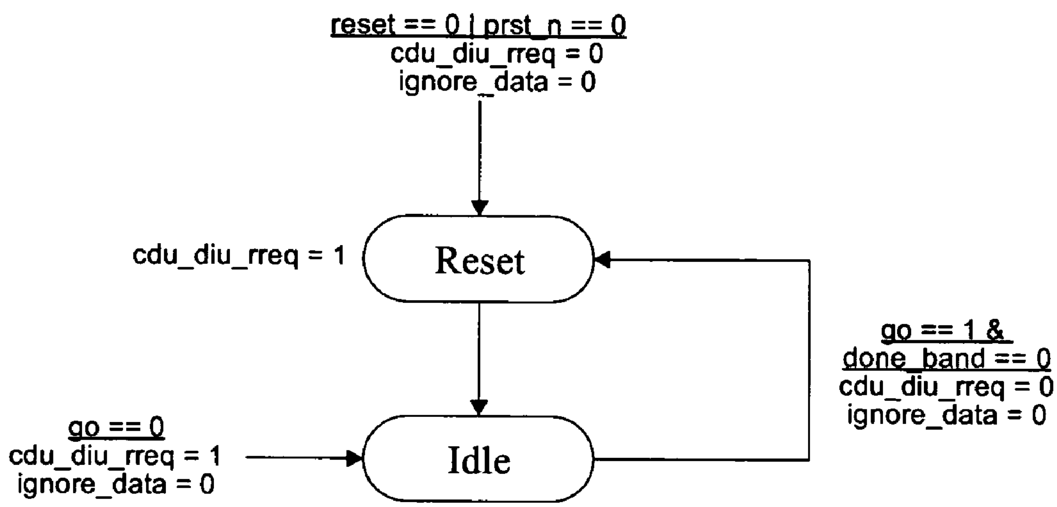
FIG. 1 is an example of state machine notation

A sample state machine is shown in FIG. 1.

5 Printing Considerations

A bi-lithic printhead produces 1600 dpi bi-level dots. On low-diffusion paper, each ejected drop forms a 22.5 μm diameter dot. Dots are easily produced in isolation, allowing dispersed-dot dithering to be exploited to its fullest. Since the bi-lithic printhead is the width of the page and operates with a constant paper velocity, color planes are printed in perfect registration, allowing ideal dot-on-dot printing. Dot-on-dot printing minimizes 'muddying' of midtones caused by inter-color bleed. A page layout may contain a mixture of images, graphics and text. Continuous-tone (contone) images and graphics are reproduced using a stochastic dispersed-dot dither. Unlike a clustered-dot (or amplitude-modulated) dither, a dispersed-dot (or frequency-modulated) dither reproduces high spatial frequencies (i.e. image detail) almost to the limits of the dot resolution, while simultaneously reproducing lower spatial frequencies to their full color depth, when spatially integrated by the eye. A stochastic dither matrix is carefully designed to be free of objectionable low-frequency patterns when tiled across the image. As such its size typically exceeds the minimum size required to support a particular number of intensity levels (e.g. 16×16×8 bits for 257 intensity levels).

Human contrast sensitivity peaks at a spatial frequency of about 3 cycles per degree of visual field and then falls off logarithmically, decreasing by a factor of 100 beyond about 40 cycles per degree and becoming immeasurable beyond 60 cycles per degree [25][25]. At a normal viewing distance of 12 inches (about 300 mm), this translates roughly to 200–300 cycles per inch (cpi) on the printed page, or 400–600 samples per inch according to Nyquist's theorem.

In practice, contone resolution above about 300 ppi is of limited utility outside special applications such as medical imaging. Offset printing of magazines, for example, uses contone resolutions in the range 150 to 300 ppi. Higher resolutions contribute slightly to color error through the dither.

Black text and graphics are reproduced directly using bi-level black dots, and are therefore not anti-aliased (i.e. low-pass filtered) before being printed. Text should therefore be supersampled beyond the perceptual limits discussed above, to produce smoother edges when spatially integrated by the eye. Text resolution up to about 1200 dpi continues to contribute to perceived text sharpness (assuming low-diffusion paper, of course).

A Netpage printer, for example, may use a contone resolution of 267 ppi (i.e. 1600 dpi/6), and a black text and graphics resolution of 800 dpi. A high end office or departmental printer may use a contone resolution of 320 ppi (1600 dpi/5) and a black text and graphics resolution of 1600 dpi. Both formats are capable of exceeding the quality of commercial (offset) printing and photographic reproduction.

6 Document Data Flow

6.1 Considerations

Because of the page-width nature of the bi-lithic printhead, each page must be printed at a constant speed to avoid creating visible artifacts. This means that the printing speed can't be varied to match the input data rate. Document rasterization and document printing are therefore decoupled to ensure the printhead has a constant supply of data. A page is never printed until it is fully rasterized. This can be achieved by storing a compressed version of each rasterized page image in memory. This decoupling also allows the RIP(s) to run ahead of the printer when rasterizing simple pages, buying time to rasterize more complex pages.

Because contone color images are reproduced by stochastic dithering, but black text and line graphics are reproduced directly using dots, the compressed page image format contains a separate foreground bi-level black layer and background contone color layer. The black layer is composited over the contone layer after the contone layer is dithered (although the contone layer has an optional black component). A final layer of Netpage tags (in infrared or black ink) is optionally added to the page for printout.

Figure 2:
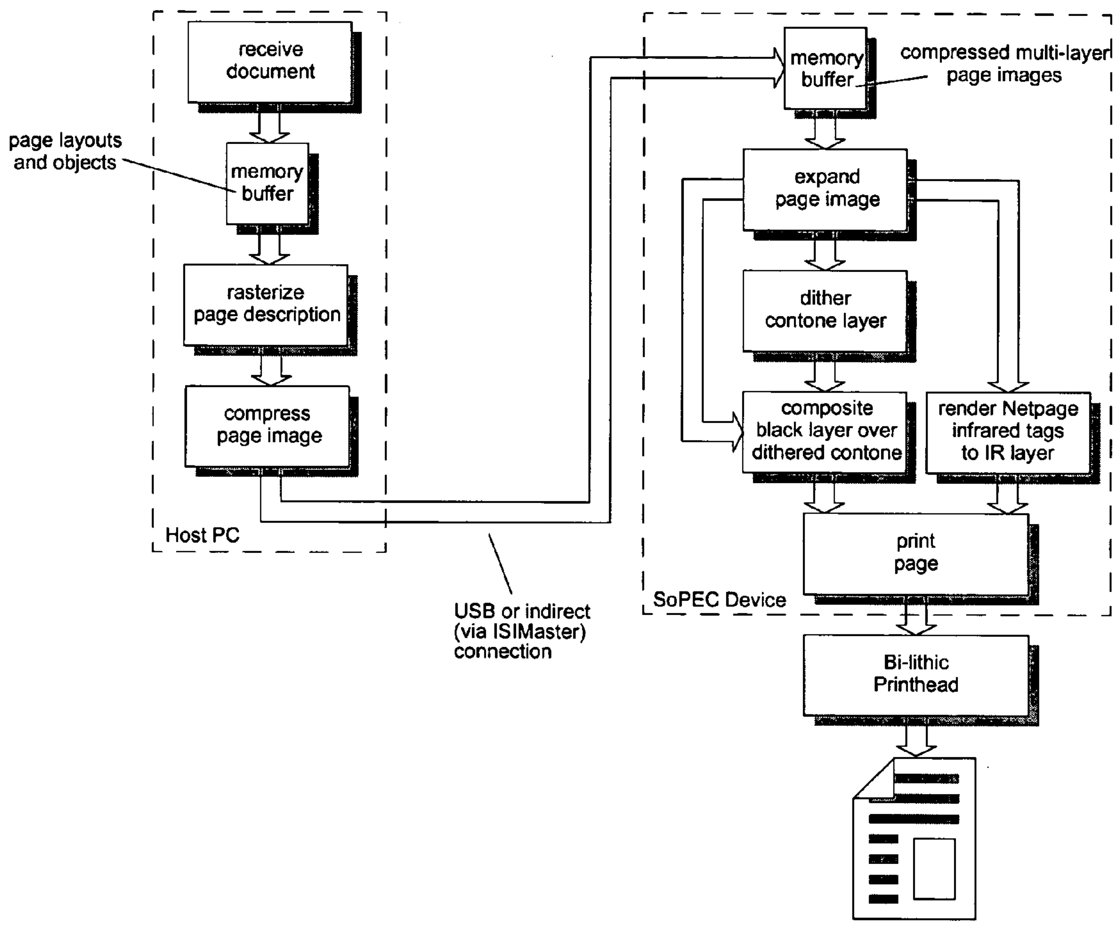
FIG. 2 shows document data flow in a printer

FIG. 2 shows the flow of a document from computer system to printed page.

At 267 ppi for example, a A4 page (8.26 inches×11.7 inches) of contone CMYK data has a size of 26.3 MB. At 320 ppi, an A4 page of contone data has a size of 37.8 MB. Using lossy contone compression algorithms such as JPEG [27], contone images compress with a ratio up to 10:1 without noticeable loss of quality, giving compressed page sizes of 2.63 MB at 267 ppi and 3.78 MB at 320 ppi.

At 800 dpi, a A4 page of bi-level data has a size of 7.4 MB. At 1600 dpi, a Letter page of bi-level data has a size of 29.5 MB. Coherent data such as text compresses very well. Using lossless bi-level compression algorithms such as SMG4 fax as discussed in Section 8.1.2.3.1, ten-point plain text compresses with a ratio of about 50:1. Lossless bi-level compression across an average page is about 20:1 with 10:1 possible for pages which compress poorly. The requirement for SoPEC is to be able to print text at 10:1 compression. Assuming 10:1 compression gives compressed page sizes of 0.74 MB at 800 dpi, and 2.95 MB at 1600 dpi.

Once dithered, a page of CMYK contone image data consists of 116 MB of bi-level data. Using lossless bi-level compression algorithms on this data is pointless precisely because the optimal dither is stochastic—i.e. since it introduces hard-to-compress disorder.

Netpage tag data is optionally supplied with the page image. Rather than storing a compressed bi-level data layer for the Netpage tags, the tag data is stored in its raw form. Each tag is supplied up to 120 bits of raw variable data (combined with up to 56 bits of raw fixed data) and covers up to a 6 mm×6 mm area (at 1600 dpi). The absolute maximum number of tags on a A4 page is 15,540 when the tag is only 2 mm×2 mm (each tag is 126 dots×126 dots, for a total coverage of 148 tags×105 tags). 15,540 tags of 128 bits per tag gives a compressed tag page size of 0.24 MB.

The multi-layer compressed page image format therefore exploits the relative strengths of lossy JPEG contone image compression, lossless bi-level text compression, and tag encoding. The format is compact enough to be storage-efficient, and simple enough to allow straightforward real-time expansion during printing.

Since text and images normally don't overlap, the normal worst-case page image size is image only, while the normal best-case page image size is text only. The addition of worst case Netpage tags adds 0.24 MB to the page image size. The worst-case page image size is text over image plus tags. The average page size assumes a quarter of an average page contains images. Table 1 shows data sizes for compressed Letter page for these different options.

TABLE 1

Data sizes for A4 page (8.26 inches × 11.7 inches)

| | 267 ppi contone 800 dpi bi-level | 320 ppi contone 1600 dpi bi-level |
|---|---|---|
| Image only (contone), 10:1 compression | 2.63 MB | 3.78 MB |
| Text only (bi-level), 10:1 compression | 0.74 MB | 2.95 MB |
| Netpage tags, 1600 dpi | 0.24 MB | 0.24 MB |
| Worst case (text + image + tags) | 3.61 MB | 6.67 MB |
| Average (text + 25% image + tags) | 1.64 MB | 4.25 MB |

6.2 Document Data Flow

The Host PC rasterizes and compresses the incoming document on a page by page basis. The page is restructured into bands with one or more bands used to construct a page. The compressed data is then transferred to the SoPEC device via the USB link. A complete band is stored in SoPEC embedded memory. Once the band transfer is complete the SoPEC device reads the compressed data, expands the band, normalizes contone, bi-level and tag data to 1600 dpi and transfers the resultant calculated dots to the bi-lithic printhead.

The document data flow is

The RIP software rasterizes each page description and compress the rasterized page image.

The infrared layer of the printed page optionally contains encoded Netpage [5] tags at a programmable density.

The compressed page image is transferred to the SoPEC device via the USB normally on a band by band basis.

The print engine takes the compressed page image and starts the page expansion.

The first stage page expansion consists of 3 operations performed in parallel expansion of the JPEG-compressed contone layer expansion of the SMG4 fax compressed bi-level layer encoding and rendering of the bi-level tag data.

The second stage dithers the contone layer using a programmable dither matrix, producing up to four bi-level layers at full-resolution.

The second stage then composites the bi-level tag data layer, the bi-level SMG4 fax de-compressed layer and up to four bi-level JPEG de-compressed layers into the full-resolution page image.

A fixative layer is also generated as required.

The last stage formats and prints the bi-level data through the bi-lithic printhead via the printhead interface.

The SoPEC device can print a full resolution page with 6 color planes. Each of the color planes can be generated from compressed data through any channel (either JPEG compressed, bi-level SMG4 fax compressed, tag data generated, or fixative channel created) with a maximum number of 6 data channels from page RIP to bi-lithic printhead color planes.

The mapping of data channels to color planes is programmable, this allows for multiple color planes in the printhead to map to the same data channel to provide for redundancy in the printhead to assist dead nozzle compensation.

Also a data channel could be used to gate data from another data channel. For example in stencil mode, data from the bilevel data channel at 1600 dpi can be used to filter the contone data channel at 320 dpi, giving the effect of 1600 dpi contone image.

6.3 Page Considerations Due to SoPEC

The SoPEC device typically stores a complete page of document data on chip. The amount of storage available for compressed pages is limited to 2 Mbytes, imposing a fixed maximum on compressed page size. A comparison of the compressed image sizes in Table 2 indicates that SoPEC would not be capable of printing worst case pages unless they are split into bands and printing commences before all the bands for the page have been downloaded. The page sizes in the table are shown for comparison purposes and would be considered reasonable for a professional level printing system. The SoPEC device is aimed at the consumer level and would not be required to print pages of that complexity. Target document types for the SoPEC device are shown Table 2.

TABLE 2

Page content targets for SoPEC

| Page Content Description | Calculation | Size (MByte) |
|---|---|---|
| Best Case picture Image, 267 ppi with 3 colors, A4 size | 8.26 × 11.7 × 267 × 267 × 3 @ 10:1 | 1.97 |
| Full page text, 800 dpi A4 size | 8.26 × 11.7 × 800 × 800 @ 10:1 | 0.74 |
| Mixed Graphics and Text Image of 6 inches × 4 inches @ 267 ppi and 3 colors | 6 × 4 × 267 × 267 × 3 @ 5:1 | 1.55 |
| Remaining area text ~73 inches$^2$, 800 dpi | 800 × 800 × 73 @ 10:1 | |
| Best Case Photo, 3 Colors, 6.6 MegaPixel Image | 6.6 Mpixel @ 10:1 | 2.00 |

If a document with more complex pages is required, the page RIP software in the host PC can determine that there is insufficient memory storage in the SoPEC for that document. In such cases the RIP software can take two courses of action. It can increase the compression ratio until the compressed page size will fit in the SoPEC device, at the expense of document quality, or divide the page into bands and allow SoPEC to begin printing a page band before all bands for that page are downloaded. Once SoPEC starts printing a page it cannot stop, if SoPEC consumes compressed data faster than the bands can be downloaded a buffer underrun error could occur causing the print to fail. A buffer underrun occurs if a line synchronisation pulse is received before a line of data has been transferred to the printhead.

Other options which can be considered if the page does not fit completely into the compressed page store are to slow the printing or to use multiple SoPECs to print parts of the page. A Storage SoPEC (Section 7.2.5) could be added to the system to provide guaranteed bandwidth data delivery. The print system could also be constructed using an ISI-Bridge chip (Section 7.2.6) to provide guaranteed data delivery.

7 Memjet Printer Architecture

The SoPEC device can be used in several printer configurations and architectures.

In the general sense every SoPEC based printer architecture will contain:

One or more SoPEC devices.

One or more bi-lithic printheads.

Two or more LSS busses.

Two or more QA chips.

USB 1.1 connection to host or ISI connection to Bridge ChIP.

ISI bus connection between SoPECs (when multiple SoPECs are used).

Some example printer configurations as outlined in Section 7.2. The various system components are outlined briefly in Section 7.1.

7.1 System Components 7.1.1 SoPEC Print Engine Controller

The SoPEC device contains several system on a chip (SoC) components, as well as the print engine pipeline control application specific logic.

7.1.1.1 Print Engine Pipeline (PEP) Logic

The PEP reads compressed page store data from the embedded memory, optionally decompresses the data and formats it for sending to the printhead. The print engine pipeline functionality includes expanding the page image, dithering the contone layer, compositing the black layer over the contone layer, rendering of Netpage tags, compensation for dead nozzles in the printhead, and sending the resultant image to the bi-lithic printhead.

7.1.1.2 Embedded CPU

SoPEC contains an embedded CPU for general purpose system configuration and management. The CPU performs page and band header processing, motor control and sensor monitoring (via the GPIO) and other system control functions. The CPU can perform buffer management or report buffer status to the host. The CPU can optionally run vendor application specific code for general print control such as paper ready monitoring and LED status update.

7.1.1.3 Embedded Memory Buffer

A 2.5 Mbyte embedded memory buffer is integrated onto the SoPEC device, of which approximately 2 Mbytes are available for compressed page store data. A compressed page is divided into one or more bands, with a number of bands stored in memory. As a band of the page is consumed by the PEP for printing a new band can be downloaded. The new band may be for the current page or the next page.

Using banding it is possible to begin printing a page before the complete compressed page is downloaded, but care must be taken to ensure that data is always available for printing or a buffer underrun may occur.

An Storage SoPEC acting as a memory buffer (Section 7.2.5) or an ISI-Bridge chip with attached DRAM (Section 7.2.6) could be used to provide guaranteed data delivery.

7.1.1.4 Embedded USB 1.1 Device

The embedded USB 1.1 device accepts compressed page data and control commands from the host PC, and facilitates the data transfer to either embedded memory or to another SoPEC device in multi-SoPEC systems.

7.1.2 Bi-lithic Printhead

The printhead is constructed by abutting 2 printhead ICs together. The printhead ICs can vary in size from 2 inches to 8 inches, so to produce an A4 printhead several combinations are possible. For example two printhead ICs of 7 inches and 3 inches could be used to create a A4 printhead (the notation is 7:3). Similarly 6 and 4 combination (6:4), or 5:5 combination. For an A3 printhead it can be constructed from 8:6 or an 7:7 printhead IC combination. For photographic printing smaller printheads can be constructed.

7.1.3 LSS Interface Bus

Each SoPEC device has 2 LSS system buses for communication with QA devices for system authentication and ink usage accounting. The number of QA devices per bus and their position in the system is unrestricted with the exception that PRINTER_QA and INK_QA devices should be on separate LSS busses.

7.1.4 QA Devices

Each SoPEC system can have several QA devices. Normally each printing SoPEC will have an associated PRINTER_QA. Ink cartridges will contain an INK_QA chip. PRINTER_QA and INK_QA devices should be on separate LSS busses. All QA chips in the system are physically identical with flash memory contents defining PRINTER_QA from INK_QA chip.

7.1.5 ISI Interface

The Inter-SoPEC Interface (ISI) provides a communication channel between SoPECs in a multi-SoPEC system. The ISIMaster can be SoPEC device or an ISI-Bridge chip depending on the printer configuration. Both compressed data and control commands are transferred via the interface.

7.1.6 ISI-Bridge Chip

A device, other than a SoPEC with a USB connection, which provides print data to a number of slave SoPECs. A bridge chip will typically have a high bandwidth connection, such as USB2.0, Ethernet or IEEE1394, to a host and may have an attached external DRAM for compressed page storage. A bridge chip would have one or more ISI interfaces. The use of multiple ISI buses would allow the construction of independent print systems within the one printer. The ISI-Bridge would be the ISIMaster for each of the ISI buses it interfaces to.

7.2 Possible SoPEC Systems

Several possible SoPEC based system architectures exist. The following sections outline some possible architectures. It is possible to have extra SoPEC devices in the system used for DRAM storage. The QA chip configurations shown are indicative of the flexibility of LSS bus architecture, but not limited to those configurations.

7.2.1 A4 Simplex with 1 SoPEC Device

Figure 3:
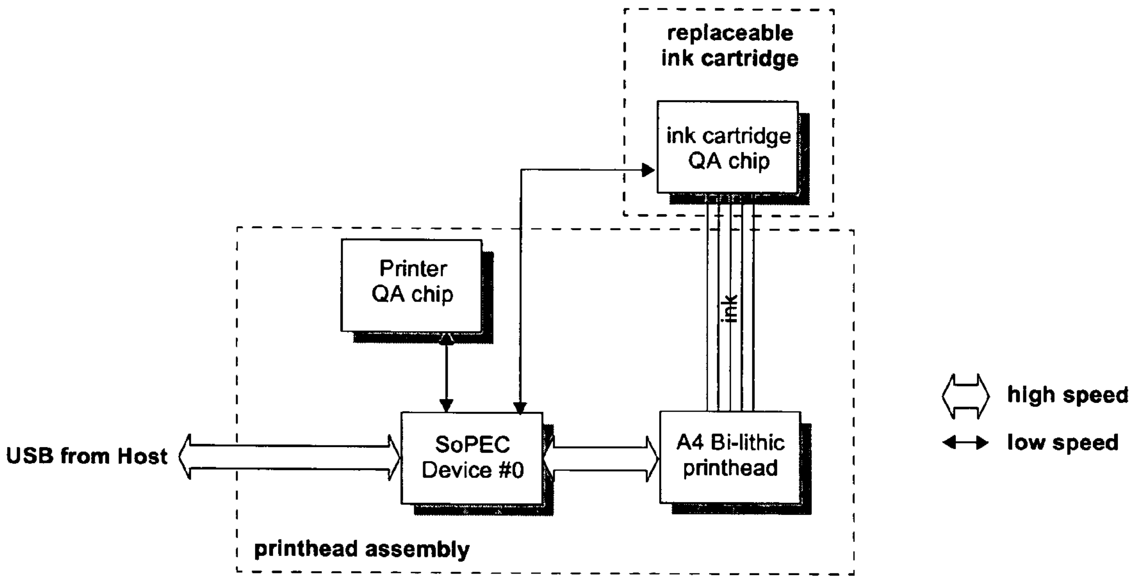
FIG. 3 is an example of a single printer controller (hereinafter "SoPEC") A4 simplex printer system

In FIG. 3, a single SoPEC device can be used to control two printhead ICs. The SoPEC receives compressed data through the USB device from the host. The compressed data is processed and transferred to the printhead.

7.2.2 A4 Duplex with 2 SoPEC Devices

Figure 4:
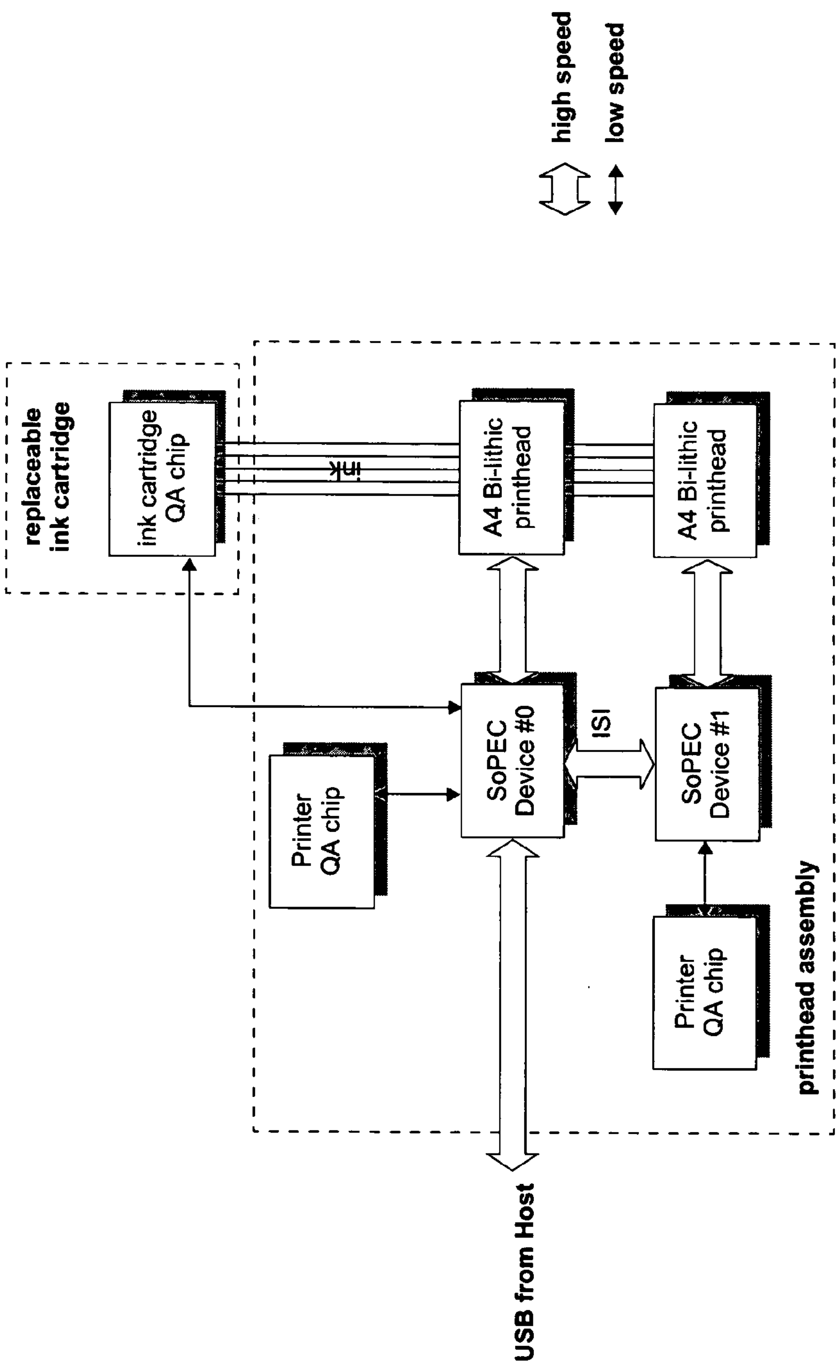
FIG. 4 is an example of a dual SoPEC A4 duplex printer system

In FIG. 4, two SoPEC devices are used to control two bi-lithic printheads, each with two printhead ICs. Each bi-lithic printhead prints to opposite sides of the same page to achieve duplex printing. The SoPEC connected to the USB is the ISIMaster SoPEC, the remaining SoPEC is an ISISlave. The ISIMaster receives all the compressed page data for both SoPECs and re-distributes the compressed data over the Inter-SoPEC Interface (ISI) bus.

It may not be possible to print an A4 page every 2 seconds in this configuration since the USB 1.1 connection to the host may not have enough bandwidth. An alternative would be for each SoPEC to have its own USB 1.1 connection. This would allow a faster average print speed.

7.2.3 A3 Simplex with 2 SoPEC Devices

Figure 5:
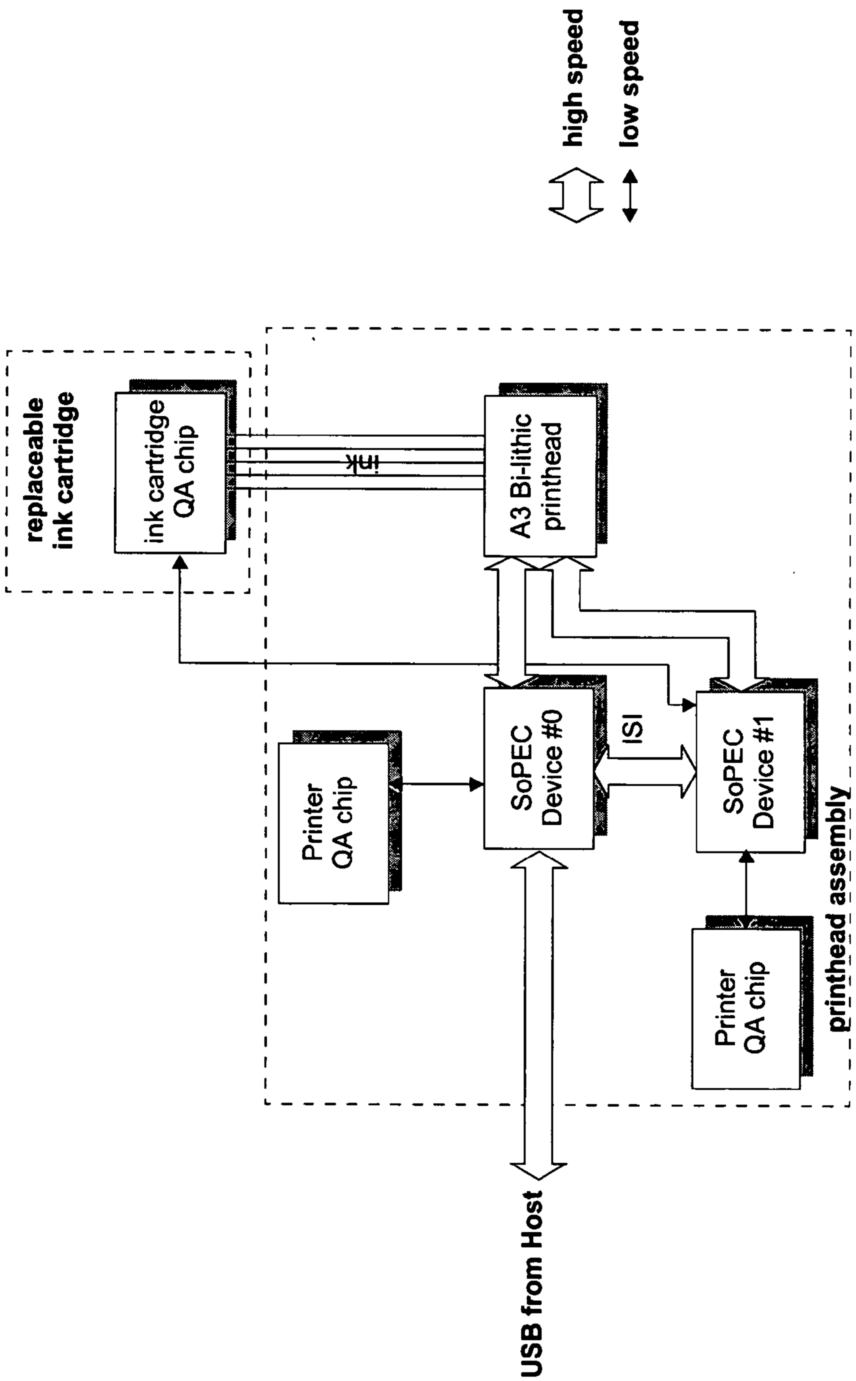
FIG. 5 is an example of a dual SoPEC A3 simplex printer system

In FIG. 5, two SoPEC devices are used to control one A3 bi-lithic printhead. Each SoPEC controls only one printhead IC (the remaining PHI port typically remains idle). This system uses the SoPEC with the USB connection as the ISIMaster. In this dual SoPEC configuration the compressed page store data is split across 2 SoPECs giving a total of 4 Mbyte page store, this allows the system to use compression rates as in an A4 architecture, but with the increased page size of A3. The ISIMaster receives all the compressed page data for all SoPECs and re-distributes the compressed data over the Inter-SoPEC Interface (ISI) bus.

It may not be possible to print an A3 page every 2 seconds in this configuration since the USB 1.1 connection to the host will only have enough bandwidth to supply 2 Mbytes every 2 seconds. Pages which require more than 2 MBytes every 2 seconds will therefore print more slowly. An alternative would be for each SoPEC to have its own USB 1.1 connection. This would allow a faster average print speed.

7.2.4 A3 Duplex with 4 SoPEC Devices

Figure 6:
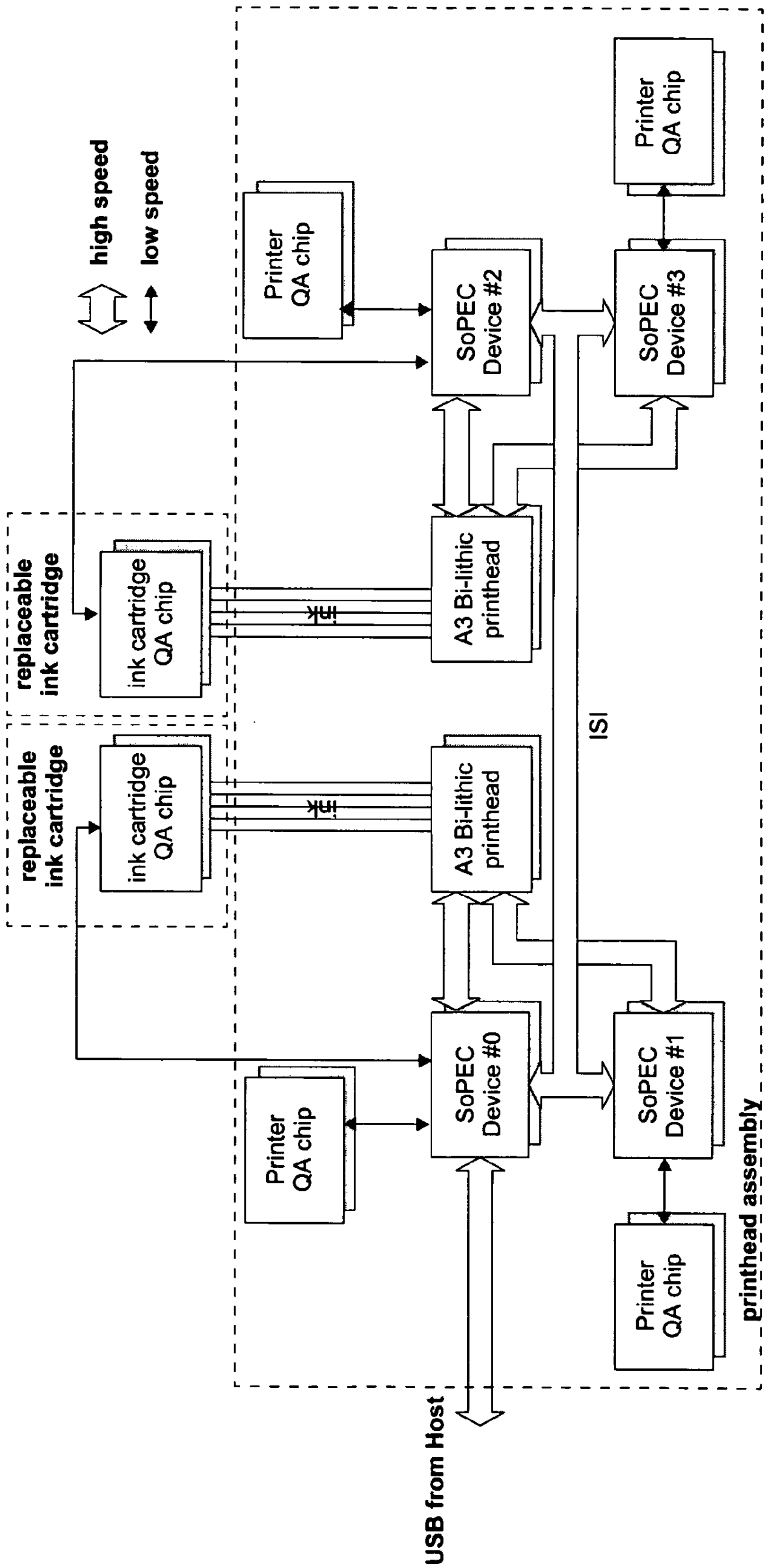
FIG. 6 is an example of a quad SoPEC A3 duplex printer system

In FIG. 6 a 4 SoPEC system is shown. It contains 2 A3 bi-lithic printheads, one for each side of an A3 page. Each printhead contain 2 printhead ICs, each printhead IC is controlled by an independent SoPEC device, with the remaining PHI port typically unused. Again the SoPEC with USB 1.1 connection is the ISIMaster with the other SoPECs as ISISlaves. In total, the system contains 8 Mbytes of compressed page store (2 Mbytes per SoPEC), so the increased page size does not degrade the system print quality, from that of an A4 simplex printer. The ISIMaster receives all the compressed page data for all SoPECs and re-distributes the compressed data over the Inter-SoPEC Interface (ISI) bus.

It may not be possible to print an A3 page every 2 seconds in this configuration since the USB 1.1 connection to the host will only have enough bandwidth to supply 2 Mbytes every 2 seconds. Pages which require more than 2 MBytes every 2 seconds will therefore print more slowly. An alternative would be for each SoPEC or set of SoPECs on the same side of the page to have their own USB 1.1 connection (as ISISlaves may also have direct USB connections to the host). This would allow a faster average print speed.

Figure 7:
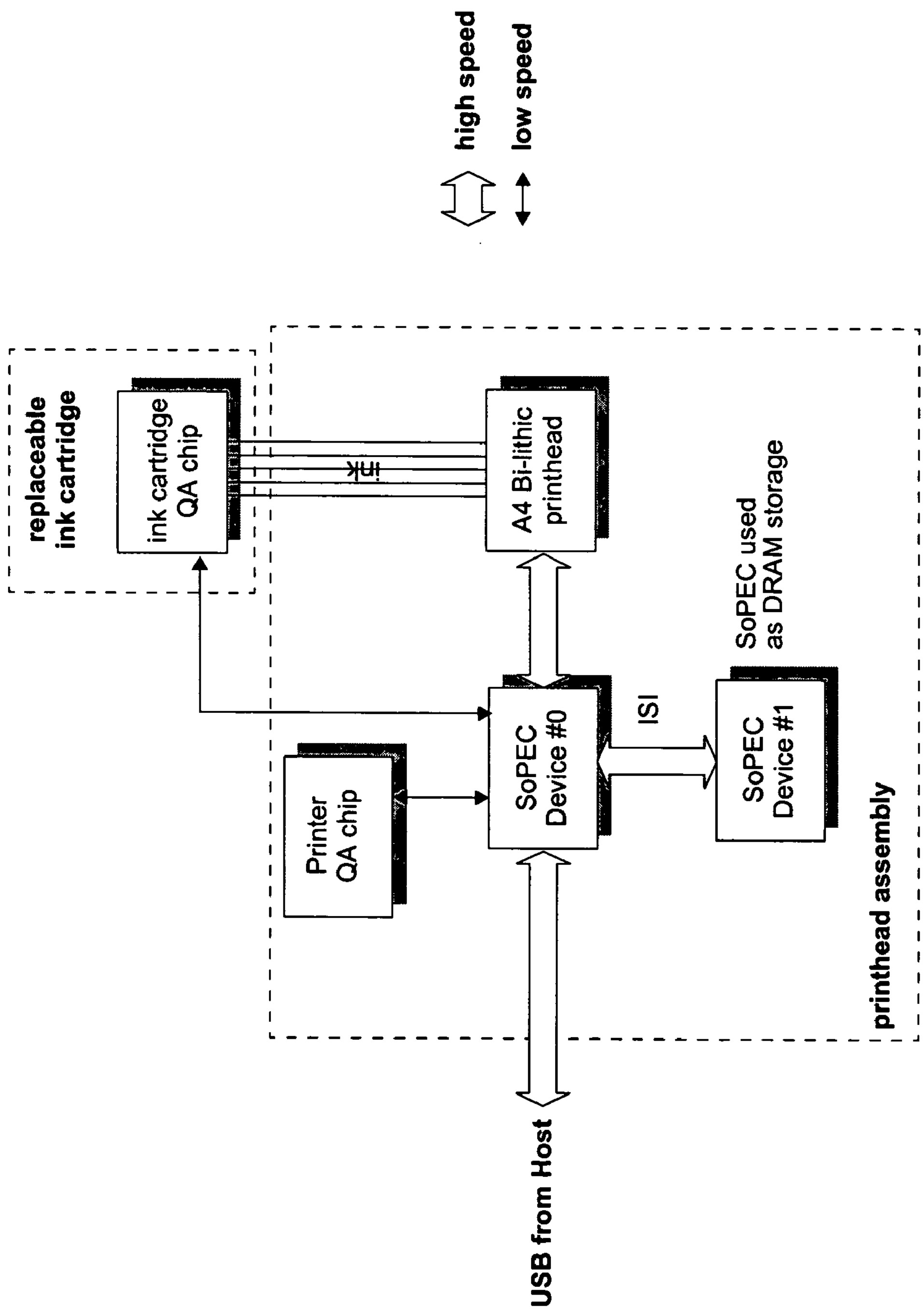
FIG. 7 is an example of a SoPEC A4 simplex printing system with an extra SoPEC used as DRAM storage

7.2.5 SoPEC DRAM storage solution: A4 Simplex with 1 printing SoPEC and 1 memory SoPEC Extra SoPECs can be used for DRAM storage e.g. in FIG. 7 an A4 simplex printer can be built with a single extra SoPEC used for DRAM storage. The DRAM SoPEC can provide guaranteed bandwidth delivery of data to the printing SoPEC. SoPEC configurations can have multiple extra SoPECs used for DRAM storage.

7.2.6 ISI-Bridge Chip Solution: A3 Duplex System with 4 SoPEC Devices

Figure 8:
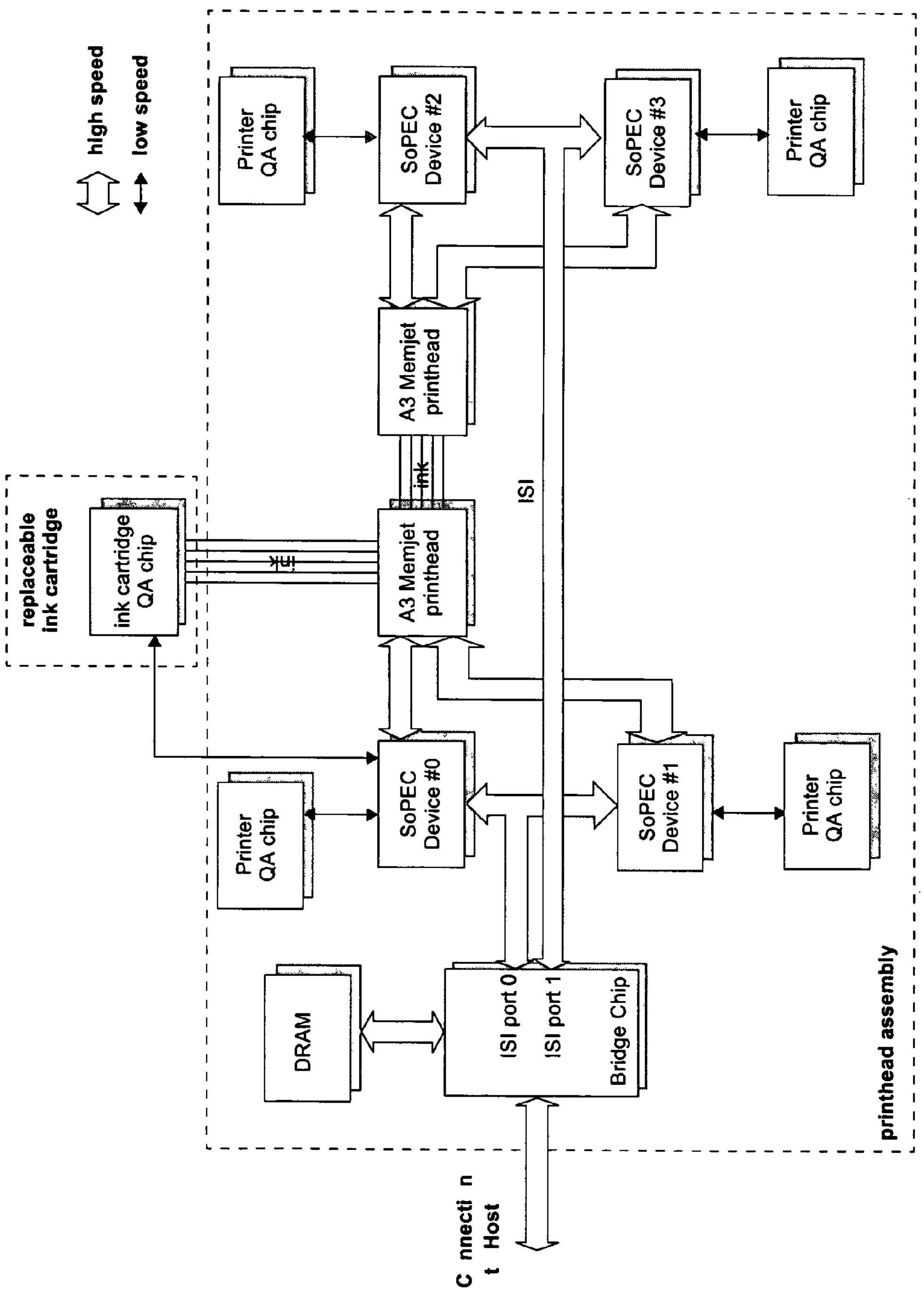
FIG. 8 is an example of an A3 duplex printing system featuring four printing SoPECs

In FIG. 8, an ISI-Bridge chip provides slave-only ISI connections to SoPEC devices. FIG. 8 shows a ISI-Bridge chip with 2 separate ISI ports. The ISI-Bridge chip is the ISIMaster on each of the ISI busses it is connected to. All connected SoPECs are ISISlaves. The ISI-Bridge chip will typically have a high bandwidth connection to a host and may have an attached external DRAM for compressed page storage.

An alternative to having a ISI-Bridge chip would be for each SoPEC or each set of SoPECs on the same side of a page to have their own USB 1.1 connection. This would allow a faster average print speed.

8 Page Format and Printflow

Figure 9:
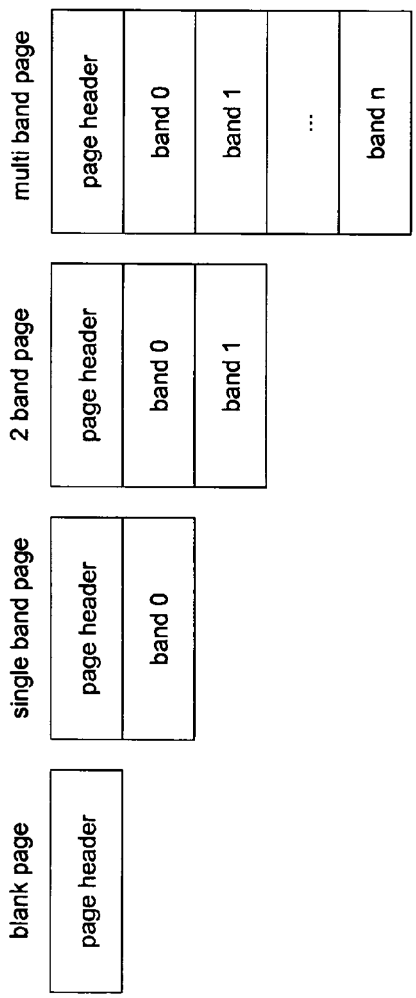
FIG. 9 shows pages containing different numbers of bands

When rendering a page, the RIP produces a page header and a number of bands (a non-blank page requires at least one band) for a page. The page header contains high level rendering parameters, and each band contains compressed page data. The size of the band will depend on the memory available to the RIP, the speed of the RIP, and the amount of memory remaining in SoPEC while printing the previous band(s). FIG. 9 shows the high level data structure of a number of pages with different numbers of bands in the page.

Figure 10:
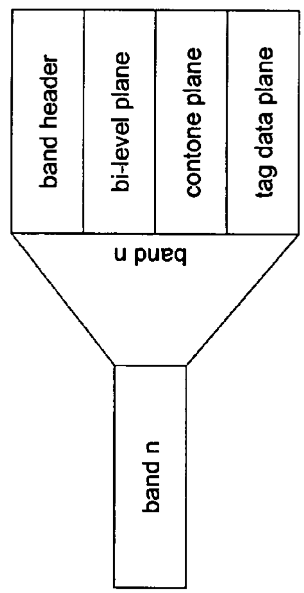
FIG. 10 shows the contents of a page band

Each compressed band contains a mandatory band header, an optional bi-level plane, optional sets of interleaved contone planes, and an optional tag data plane (for Netpage enabled applications). Since each of these planes is optional[1], the band header specifies which planes are included with the band. FIG. 10 gives a high-level breakdown of the contents of a page band.

[1]Although a band must contain at least one plane

A single SoPEC has maximum rendering restrictions as follows:

1 bi-level plane 1 contone interleaved plane set containing a maximum of 4 contone planes 1 tag data plane a bi-lithic printhead with a maximum of 2 printhead ICs The requirement for single-sided A4 single SoPEC printing is average contone JPEG compression ratio of 10:1, with a local minimum compression ratio of 5:1 for a single line of interleaved JPEG blocks.

average bi-level compression ratio of 10:1, with a local minimum compression ratio of 1:1 for a single line.

If the page contains rendering parameters that exceed these specifications, then the RIP or the Host PC must split the page into a format that can be handled by a single SoPEC.

In the general case, the SoPEC CPU must analyze the page and band headers and generate an appropriate set of register write commands to configure the units in SoPEC for that page. The various bands are passed to the destination SoPEC(s) to locations in DRAM determined by the host.

Figure 11:
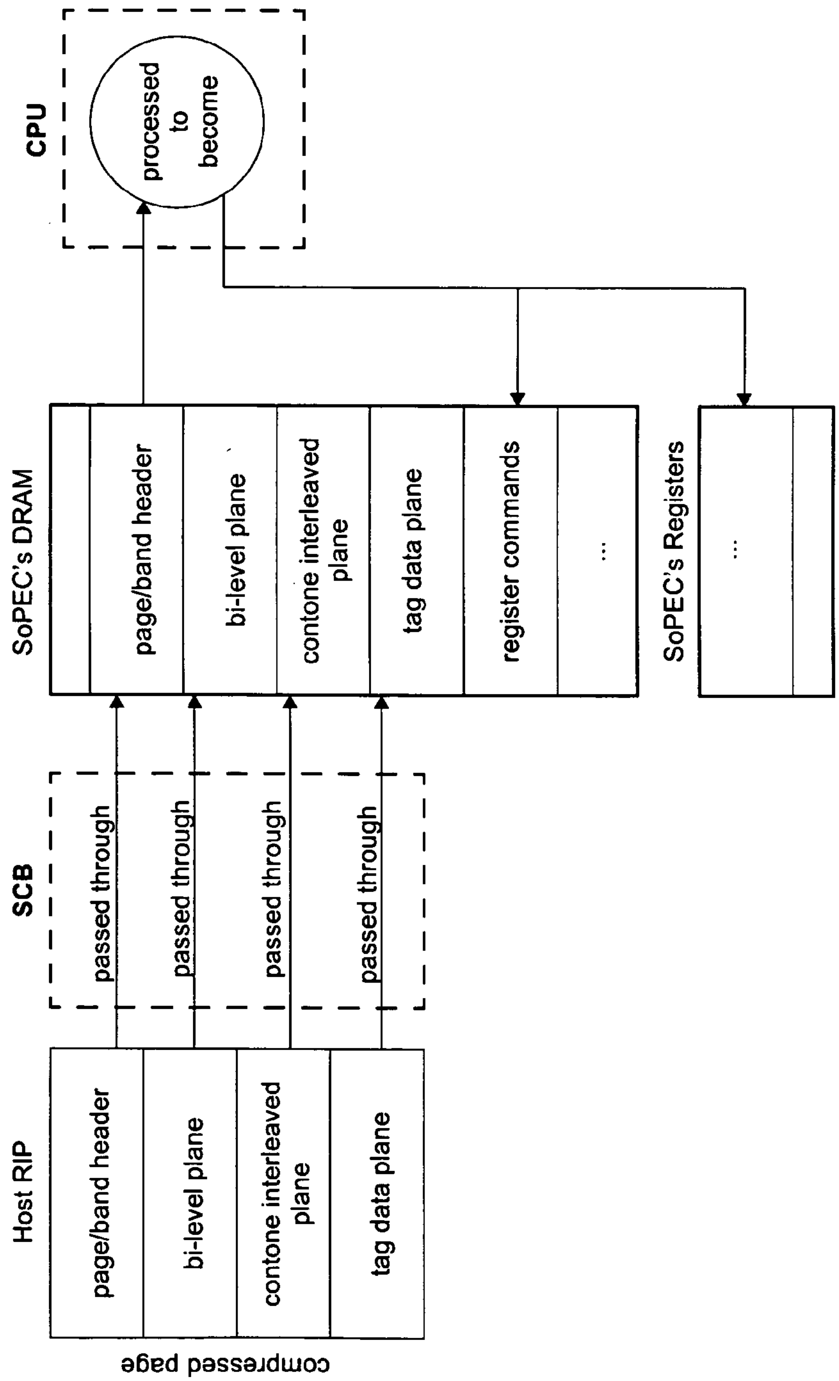
FIG. 11 illustrates a page data path from host to SoPEC
Figure 12:
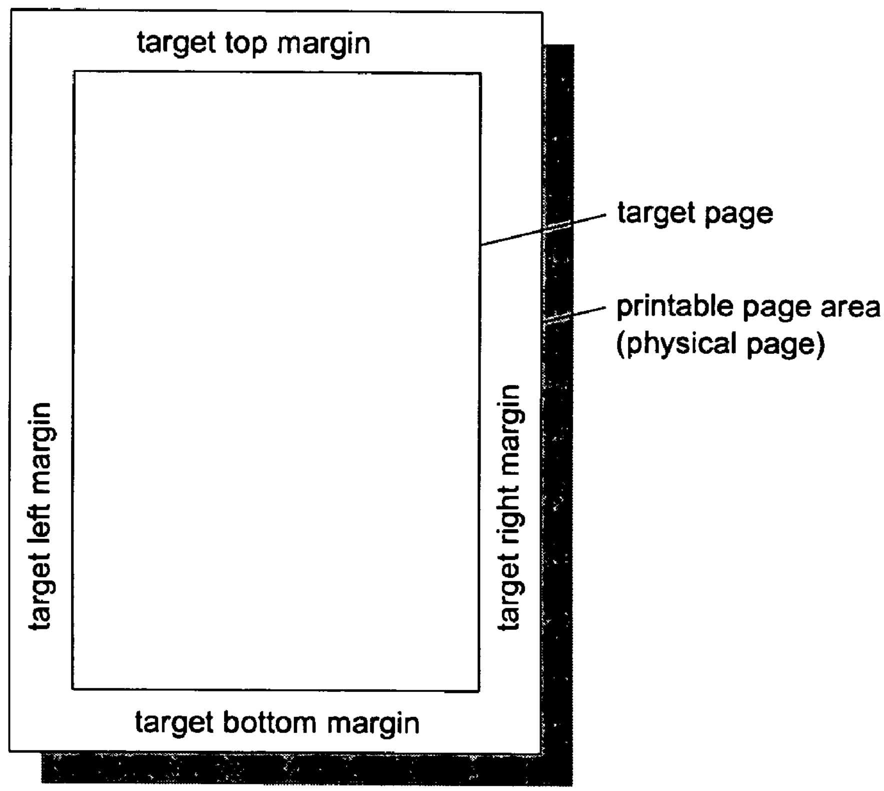
FIG. 12 shows a page structure

The host keeps a memory map for the DRAM, and ensures that as a band is passed to a SoPEC, it is stored in a suitable free area in DRAM. Each SoPEC is connected to the ISI bus or USB bus via its Serial communication Block (SCB). The SoPEC CPU configures the SCB to allow compressed data bands to pass from the USB or ISI through the SCB to SoPEC DRAM. FIG. 11 shows an example data flow for a page destined to be printed by a single SoPEC. Band usage information is generated by the individual SoPECs and passed back to the host.

SoPEC has an addressing mechanism that permits circular band memory allocation, thus facilitating easy memory management. However it is not strictly necessary that all bands be stored together. As long as the appropriate registers in SoPEC are set up for each band, and a given band is contiguous[2], the memory can be allocated in any way.

[2]Contiguous allocation also includes wrapping around in SoPEC's band store memory.

8.1 Print Engine Example Page Format

This section describes a possible format of compressed pages expected by the embedded CPU in SoPEC. The format is generated by software in the host PC and interpreted by embedded software in SoPEC. This section indicates the type of information in a page format structure, but implementations need not be limited to this format. The host PC can optionally perform the majority of the header processing.

The compressed format and the print engines are designed to allow real-time page expansion during printing, to ensure that printing is never interrupted in the middle of a page due to data underrun.

The page format described here is for a single black bi-level layer, a contone layer, and a Netpage tag layer. The black bi-level layer is defined to composite over the contone layer.

The black bi-level layer consists of a bitmap containing a 1-bit opacity for each pixel. This black layer matte has a resolution which is an integer or non-integer factor of the printer's dot resolution.

The highest supported resolution is 1600 dpi, i.e. the printer's full dot resolution.

The contone layer, optionally passed in as YCrCb, consists of a 24-bit CMY or 32-bit CMYK color for each pixel. This contone image has a resolution which is an integer or non-integer factor of the printer's dot resolution. The requirement for a single SoPEC is to support 1 side per 2 seconds A4/Letter printing at a resolution of 267 ppi, i.e. one-sixth the printer's dot resolution.

Non-integer scaling can be performed on both the contone and bi-level images. Only integer scaling can be performed on the tag data.

The black bi-level layer and the contone layer are both in compressed form for efficient storage in the printer's internal memory.

8.1.1 Page Structure

A single SoPEC is able to print with full edge bleed for Letter and A3 via different stitch part combinations of the bi-lithic printhead. It imposes no margins and so has a printable page area which corresponds to the size of its paper. The target page size is constrained by the printable page area, less the explicit (target) left and top margins specified in the page description. These relationships are illustrated below.

8.1.2 Compressed Page Format

Apart from being implicitly defined in relation to the printable page area, each page description is complete and self-contained. There is no data stored separately from the page description to which the page description refers.[3] The page description consists of a page header which describes the size and resolution of the page, followed by one or more page bands which describe the actual page content.

[3]SoPEC relies on dither matrices and tag structures to have already been set up, but these are not considered to be part of a general page format. It is trivial to extend the page format to allow exact specification of dither matrices and tag structures.

8.1.2.1 Page Header

Table 3 shows an example format of a page header.

TABLE 3

Page header format

| field | format | description |
|---|---|---|
| signature | 16-bit integer | Page header format signature. |
| version | 16-bit integer | Page header format version number. |
| structure size | 16-bit integer | Size of page header. |
| band count | 16-bit integer | Number of bands specified for this page. |
| target resolution (dpi) | 16-bit integer | Resolution of target page. This is always 1600 for the Memjet printer. |
| target page width | 16-bit integer | Width of target page, in dots. |
| target page height | 32-bit integer | Height of target page, in dots. |
| target left margin for black and contone | 16-bit integer | Width of target left margin, in dots, for black and contone. |
| target top margin for black and contone | 16-bit integer | Height of target top margin, in dots, for black and contone. |
| target right margin for black and contone | 16-bit integer | Width of target right margin, in dots, for black and contone. |
| target bottom margin for black and contone | 16-bit integer | Height of target bottom margin, in dots, for black and contone. |
| target left margin for tags | 16-bit integer | Width of target left margin, in dots, for tags. |
| target top margin for tags | 16-bit integer | Height of target top margin, in dots, for tags. |
| target right margin for tags | 16-bit integer | Width of target right margin, in dots, for tags. |
| target bottom margin for tags | 16-bit integer | Height of target bottom margin, in dots, for tags. |
| generate tags | 16-bit integer | Specifies whether to generate tags for this page (0 - no, 1 - yes). |
| fixed tag data | 128-bit integer | This is only valid if generate tags is set. |
| tag vertical scale factor | 16-bit integer | Scale factor in vertical direction from tag data resolution to target resolution. Valid range = 1–511. Integer scaling only |
| tag horizontal scale factor | 16-bit integer | Scale factor in horizontal direction from tag data resolution to target resolution. Valid range = 1–511. Integer scaling only. |
| bi-level layer vertical scale factor | 16-bit integer | Scale factor in vertical direction from bi-level resolution to target resolution (must be 1 or greater). May be non-integer. Expressed as a fraction with upper 8-bits the numerator and the lower 8 bits the denominator. |
| bi-level layer horizontal scale factor | 16-bit integer | Scale factor in horizontal direction from bi-level resolution to target resolution (must be 1 or greater). May be non-integer. Expressed as a fraction with upper 8-bits the numerator and the lower 8 bits the denominator. |

TABLE 3-continued

Page header format

| field | format | description |
|---|---|---|
| bi-level layer page width | 16-bit integer | Width of bi-level layer page, in pixels. |
| bi-level layer page height | 32-bit integer | Height of bi-level layer page, in pixels. |
| contone flags | 16 bit integer | Defines the color conversion that is required for the JPEG data.<br>Bits 2–0 specify how many contone planes there are (e.g. 3 for CMY and 4 for CMYK).<br>Bit 3 specifies whether the first 3 color planes need to be converted back from YCrCb to CMY. Only valid if b2–0 = 3 or 4.<br>0 - no conversion, leave JPEG colors alone<br>1 - color convert.<br>Bits 7–4 specifies whether the YCrCb was generated directly from CMY, or whether it was converted to RGB first via the step: R = 255-C, G = 255-M, B = 255-Y.<br>Each of the color planes can be individually inverted.<br>Bit 4:<br>0 - do not invert color plane 0<br>1 - invert color plane 0<br>Bit 5:<br>0 - do not invert color plane 1<br>1 - invert color plane 1<br>Bit 6:<br>0 - do not invert color plane 2<br>1 - invert color plane 2<br>Bit 7:<br>0 - do not invert color plane 3<br>1 - invert color plane 3<br>Bit 8 specifies whether the contone data is JPEG compressed or non-compressed:<br>0 - JPEG compressed<br>1 - non-compressed<br>The remaining bits are reserved (0). |
| contone vertical scale factor | 16-bit integer | Scale factor in vertical direction from contone channel resolution to target resolution. Valid range = 1–255. May be non-integer. Expressed as a fraction with upper 8-bits the numerator and the lower 8 bits the denominator. |
| contone horizontal scale factor | 16-bit integer | Scale factor in horizontal direction from contone channel resolution to target resolution. Valid range = 1–255. May be non-integer. Expressed as a fraction with upper 8-bits the numerator and the lower 8 bits the denominator. |
| contone page width | 16-bit integer | Width of contone page, in contone pixels. |
| contone page height | 32-bit integer | Height of contone page, in contone pixels. |
| reserved | up to 128 bytes | Reserved and 0 pads out page header to multiple of 128 bytes. |

The page header contains a signature and version which allow the CPU to identify the page header format. If the signature and/or version are missing or incompatible with the CPU, then the CPU can reject the page.

The contone flags define how many contone layers are present, which typically is used for defining whether the contone layer is CMY or CMYK. Additionally, if the color planes are CMY, they can be optionally stored as YCrCb, and further optionally color space converted from CMY directly or via RGB. Finally the contone data is specified as being either JPEG compressed or non-compressed. The page header defines the resolution and size of the target page. The bi-level and contone layers are clipped to the target page if necessary. This happens whenever the bi-level or contone scale factors are not factors of the target page width or height.

The target left, top, right and bottom margins define the positioning of the target page within the printable page area.

The tag parameters specify whether or not Netpage tags should be produced for this page and what orientation the tags should be produced at (landscape or portrait mode). The fixed tag data is also provided.

The contone, bi-level and tag layer parameters define the page size and the scale factors.

8.1.2.2 Band Format

Table 4 shows the format of the page band header.

TABLE 4

Band header format

| field | format | description |
|---|---|---|
| signature | 16-bit integer | Page band header format signature. |
| version | 16-bit integer | Page band header format version number. |
| structure size | 16-bit integer | Size of page band header. |
| bi-level layer band height | 16-bit integer | Height of bi-level layer band, in black pixels. |
| bi-level layer band data size | 32-bit integer | Size of bi-level layer band data, in bytes. |
| contone band height | 16-bit integer | Height of contone band, in contone pixels. |
| contone band data size | 32-bit integer | Size of contone plane band data, in bytes. |
| tag band height | 16-bit integer | Height of tag band, in dots. |
| tag band data size | 32-bit integer | Size of unencoded tag data band, in bytes. Can be 0 which indicates that no tag data is provided. |
| reserved | up to 128 bytes | Reserved and 0 pads out band header to multiple of 128 bytes. |

The bi-level layer parameters define the height of the black band, and the size of its compressed band data. The variable-size black data follows the page band header.

The contone layer parameters define the height of the contone band, and the size of its compressed page data. The variable-size contone data follows the black data.

The tag band data is the set of variable tag data half-lines as required by the tag encoder. The format of the tag data is found in Section 26.5.2. The tag band data follows the contone data. Table 5 shows the format of the variable-size compressed band data which follows the page band header.

TABLE 5

Page band data format

| field | format | Description |
|---|---|---|
| black data | Modified G4 facsimile bitstream[4] | Compressed bi-level layer. |
| contone data | JPEG bytestream | Compressed contone datalayer. |
| tag data map | Tag data array | Tag data format. See Section 26.5.2. |

[4]See section 8.1.2.3 on page 36 for note regarding the use of this standard

The start of each variable-size segment of band data should be aligned to a 256-bit DRAM word boundary.

The following sections describe the format of the compressed bi-level layers and the compressed contone layer. section 26.5.1 on page 410 describes the format of the tag data structures.

8.1.2.3 Bi-Level Data Compression

The (typically 1600 dpi) black bi-level layer is losslessly compressed using Silverbrook Modified Group 4 (SMG4) compression which is a version of Group 4 Facsimile compression [22] without Huffman and with simplified run length encodings. Typically compression ratios exceed 10:1. The encoding are listed in Table 6 and Table 7.

TABLE 6

Bi-Level group 4 facsimile style compression encodings

| | Encoding | Description |
|---|---|---|
| same as Group 4 Facsimile | 1000 | Pass Command: a0 ←b2, skip next two edges |
| | 1 | Vertical(0): a0 ←b1, color = !color |
| | 110 | Vertical(1): a0 ←b1 + 1, color = !color |
| | 010 | Vertical(−1): a0 ←b1 − 1, color = !color |
| | 110000 | Vertical(2): a0 ←b1 + 2, color = !color |
| | 010000 | Vertical(−2): a0 ←b1 − 2, color = !color |
| Unique to this implementation | 100000 | Vertical(3): a0 ←b1 + 3, color = !color |
| | 000000 | Vertical(−3): a0 ←b1 − 3, color = !color |
| | <RL><RL>100 | Horizontal: a0 ←a0 + <RL> + <RL> |

SMG4 has a pass through mode to cope with local negative compression. Pass through mode is activated by a special run-length code. Pass through mode continues to either end of line or for a pre-programmed number of bits, whichever is shorter. The special run-length code is always executed as a run-length code, followed by pass through. The pass through escape code is a medium length run-length with a run of less than or equal to 31.

TABLE 7

Run length (RL) encodings

| | Encoding | Description |
|---|---|---|
| Unique to this implementation | RRRRR1 | Short Black Runlength (5 bits) |
| | RRRRR1 | Short White Runlength (5 bits) |

TABLE 7-continued

Run length (RL) encodings

| Encoding | Description |
|---|---|
| RRRRRRRRRR10 | Medium Black Runlength (10 bits) |
| RRRRRRRR10 | Medium White Runlength (8 bits) |
| RRRRRRRRRR10 | Medium Black Runlength with RRRRRRRRRR <= 31, Enter pass through |
| RRRRRRRR10 | Medium White Runlength with RRRRRRRR <= 31, Enter pass through |
| RRRRRRRRRRRRRRR00 | Long Black Runlength (15 bits) |
| RRRRRRRRRRRRRRR00 | Long White Runlength (15 bits) |

Since the compression is a bitstream, the encodings are read right (least significant bit) to left (most significant bit). The run lengths given as RRRR in Table are read in the same way (least significant bit at the right to most significant bit at the left).

Each band of bi-level data is optionally self contained. The first line of each band therefore is based on a ‘previous’ blank line or the last line of the previous band.

8.1.2.3.1 Group 3 and 4 Facsimile Compression

The Group 3 Facsimile compression algorithm [22] losslessly compresses bi-level data for transmission over slow and noisy and noisy telephone lines. The bi-level data represents scanned black text and graphics on a while background, and the algorithm is tuned for this class of images (it is explicitly not tuned, for example, for halftoned bi-level images). The 1D Group 3 algorithm runlength-encodes each scanline and then Huffman-encodes the resulting runlengths. Runlengths in the range 0 to 63 are coded with terminating codes. Runlengths in the range 64 to 2623 are coded with make-up codes, each representing a multiple of 64, followed by a terminating code. Runlengths exceeding 2623 are coded with multiple make-up codes followed by a terminating code. The Huffman tables are fixed, but are separately tuned for black and white runs (except for make-up codes above 1728, which are common). When possible, the 2D Group 3 algorithm encodes a scanline as a set of short edge deltas (0,±1,±2,±3) with reference to the previous scanline. The delta symbols are entropy-encoded (so that the zero delta symbol is only one bit long etc.) Edges within a 2D-encoded line which can't be delta-encoded are runlength-encoded, and are identified by a prefix. 1D- and 2D-encoded lines are marked differently. 1D-encoded lines are generated at regular intervals, whether actually required or not, to ensure that the decoder can recover from line noise with minimal image degradation. 2D Group 3 achieves compression ratios of up to 6:1 [32]. The Group 4 Facsimile algorithm [22] losslessly compresses bi-level data for transmission over error-free communications lines (i.e. the lines are truly error-free, or error-correction is done at a lower protocol level). The Group 4 algorithm is based on the 2D Group 3 algorithm, with the essential modification that since transmission is assumed to be error-free, 1D-encoded lines are no longer generated at regular intervals as an aid to error-recovery. Group 4 achieves compression ratios ranging from 20:1 to 60:1 for the CCITT set of test images [32].

The design goals and performance of the Group 4 compression algorithm qualify it as a compression algorithm for the bi-level layers. However, its Huffman tables are tuned to a lower scanning resolution (100–400 dpi), and it encodes runlengths exceeding 2623 awkwardly.

8.1.2.4 Contone Data Compression

The contone layer (CMYK) is either a non-compressed bytestream or is compressed to an interleaved JPEG bytestream. The JPEG bytestream is complete and self-contained. It contains all data required for decompression, including quantization and Huffman tables.

The contone data is optionally converted to YCrCb before being compressed (there is no specific advantage in color-space converting if not compressing). Additionally, the CMY contone pixels are optionally converted (on an individual basis) to RGB before color conversion using R=255-C, G=255-M, B=255-Y. Optional bitwise inversion of the K plane may also be performed. Note that this CMY to RGB conversion is not intended to be accurate for display purposes, but rather for the purposes of later converting to YCrCb. The inverse transform will be applied before printing.

8.1.2.4.1 JPEG Compression

The JPEG compression algorithm [27] lossily compresses a contone image at a specified quality level. It introduces imperceptible image degradation at compression ratios below 5:1, and negligible image degradation at compression ratios below 10:1 [33].

JPEG typically first transforms the image into a color space which separates luminance and chrominance into separate color channels. This allows the chrominance channels to be subsampled without appreciable loss because of the human visual system's relatively greater sensitivity to luminance than chrominance. After this first step, each color channel is compressed separately.

The image is divided into 8×8 pixel blocks. Each block is then transformed into the frequency domain via a discrete cosine transform (DCT). This transformation has the effect of concentrating image energy in relatively lower-frequency coefficients, which allows higher-frequency coefficients to be more crudely quantized. This quantization is the principal source of compression in JPEG. Further compression is achieved by ordering coefficients by frequency to maximize the likelihood of adjacent zero coefficients, and then runlength-encoding runs of zeroes. Finally, the runlengths and non-zero frequency coefficients are entropy coded. Decompression is the inverse process of compression.

8.1.2.4.2 Non-Compressed Format

If the contone data is non-compressed, it must be in a block-based format bytestream with the same pixel order as would be produced by a JPEG decoder. The bytestream therefore consists of a series of 8×8 block of the original image, starting with the top left 8×8 block, and working horizontally across the page (as it will be printed) until the top rightmost 8×8 block, then the next row of 8×8 blocks (left to right) and so on until the lower row of 8×8 blocks (left to right). Each 8×8 block consists of 64 8-bit pixels for color plane 0 (representing 8 rows of 8 pixels in the order top left to bottom right) followed by 64 8-bit pixels for color plane 1 and so on for up to a maximum of 4 color planes.

If the original image is not a multiple of 8 pixels in X or Y, padding must be present (the extra pixel data will be ignored by the setting of margins).

8.1.2.4.3 Compressed Format

If the contone data is compressed the first memory band contains JPEG headers (including tables) plus MCUs (minimum coded units). The ratio of space between the various color planes in the JPEG stream is 1:1:1:1. No subsampling is permitted. Banding can be completely arbitrary i.e there can be multiple JPEG images per band or 1 JPEG image divided over multiple bands. The break between bands is only memory alignment based.

8.1.2.4.4 Conversion of RGB to YCrCb (in RIP)

YCrCb is defined as per CCIR 601-1 [24] except that Y, Cr and Cb are normalized to occupy all 256 levels of an 8-bit binary encoding and take account of the actual hardware implementation of the inverse transform within SoPEC.

The exact color conversion computation is as follows:

$$Y^*=(9805/32768)R+(19235/32768)G+(3728/32768)B$$

$$Cr^*=(16375/32768)R-(13716/32768)G-(2659/32768)B+128$$

$$Cb^*=-(5529/32768)R-(10846/32768)G+(16375/32768)B+128$$

Y, Cr and Cb are obtained by rounding to the nearest integer. There is no need for saturation since ranges of Y*, Cr* and Cb* after rounding are [0–255], [1–255] and [1–255] respectively. Note that full accuracy is possible with 24 bits. See [14] for more information.

SoPEC ASIC

9 Overview

The Small Office Home Office Print Engine Controller (SoPEC) is a page rendering engine ASIC that takes compressed page images as input, and produces decompressed page images at up to 6 channels of bi-level dot data as output. The bi-level dot data is generated for the Memjet bi-lithic printhead. The dot generation process takes account of printhead construction, dead nozzles, and allows for fixative generation.

A single SoPEC can control 2 bi-lithic printheads and up to 6 color channels at 10,000 lines/sec[5], equating to 30 pages per minute. A single SoPEC can perform full-bleed printing of A3, A4 and Letter pages. The 6 channels of colored ink are the expected maximum in a consumer SOHO, or office Bi-lithic printing environment:

[5] 10,000 lines per second equates to 30 A4/Letter pages per minute at 1600 dpi

- CMY, for regular color printing.
- K, for black text, line graphics and gray-scale printing.
- IR (infrared), for Netpage-enabled [5] applications.
- F (fixative), to enable printing at high speed. Because the bi-lithic printer is capable of printing so fast, a fixative may be required to enable the ink to dry before the page touches the page already printed. Otherwise the pages may bleed on each other. In low speed printing environments the fixative may not be required.

SoPEC is color space agnostic. Although it can accept contone data as CMYX or RGBX, where X is an optional 4th channel, it also can accept contone data in any print color space. Additionally, SoPEC provides a mechanism for arbitrary mapping of input channels to output channels, including combining dots for ink optimization, generation of channels based on any number of other channels etc. However, inputs are typically CMYK for contone input, K for the bi-level input, and the optional Netpage tag dots are typically rendered to an infra-red layer. A fixative channel is typically generated for fast printing applications.

SoPEC is resolution agnostic. It merely provides a mapping between input resolutions and output resolutions by means of scale factors. The expected output resolution is 1600 dpi, but SoPEC actually has no knowledge of the physical resolution of the Bi-lithic printhead.

SoPEC is page-length agnostic. Successive pages are typically split into bands and downloaded into the page store as each band of information is consumed and becomes free.

SoPEC provides an interface for synchronization with other SoPECs. This allows simple multi-SoPEC solutions for simultaneous A3/A4/Letter duplex printing. However, SoPEC is also capable of printing only a portion of a page image. Combining synchronization functionality with partial page rendering allows multiple SoPECs to be readily combined for alternative printing requirements including simultaneous duplex printing and wide format printing.

Table 8 lists some of the features and corresponding benefits of SoPEC.

TABLE 8

Features and Benefits of SoPEC

| Feature | Benefits |
|---|---|
| Optimised print architecture in hardware | 30 ppm full page photographic quality color printing from a desktop PC |
| 0.13 micron CMOS (>3 million transistors) | High speed<br>Low cost<br>High functionality |
| 900 Million dots per second | Extremely fast page generation |
| 10,000 lines per second at 1600 dpi | 0.5 A4/Letter pages per SoPEC chip per second |
| 1 chip drives up to 133,920 nozzles | Low cost page-width printers |
| 1 chip drives up to 6 color planes | 99% of SoHo printers can use 1 SoPEC device |
| Integrated DRAM | No external memory required, leading to low cost systems |
| Power saving sleep mode | SoPEC can enter a power saving sleep mode to reduce power dissipation between print jobs |
| JPEG expansion | Low bandwidth from PC<br>Low memory requirements in printer |
| Lossless bitplane expansion | High resolution text and line art with low bandwidth from PC (e.g. over USB) |
| Netpage tag expansion | Generates interactive paper |
| Stochastic dispersed dot dither | Optically smooth image quality<br>No moire effects |
| Hardware compositor for 6 image planes | Pages composited in real-time |
| Dead nozzle compensation | Extends printhead life and yield<br>Reduces printhead cost |
| Color space agnostic | Compatible with all inksets and image sources including RGB, CMYK, spot, CIE L*a*b*, hexachrome, YCrCbK, sRGB and other |
| Color space conversion | Higher quality / lower bandwidth |
| Computer interface | USB1.1 interface to host and ISI interface to ISI-Bridge chip thereby allowing connection to IEEE 1394, Bluetooth etc. |
| Cascadable in resolution | Printers of any resolution |
| Cascadable in color depth | Special color sets e.g. hexachrome can be used |
| Cascadable in image size | Printers of any width up to 16 inches |
| Cascadable in pages | Printers can print both sides simultaneously |
| Cascadable in speed | Higher speeds are possible by having each SoPEC print one vertical strip of the page. |
| Fixative channel data generation | Extremely fast ink drying without wastage |
| Built-in security | Revenue models are protected |
| Undercolor removal on dot-by-dot basis | Reduced ink usage |
| Does not require fonts for high speed operation | No font substitution or missing fonts |
| Flexible printhead configuration | Many configurations of printheads are supported by one chip type |
| Drives Bi-lithic printheads directly | No print driver chips required, results in lower cost |
| Determines dot accurate ink usage | Removes need for physical ink monitoring system in ink cartridges |

9.1 Printing Rates

The required printing rate for SoPEC is 30 sheets per minute with an inter-sheet spacing of 4 cm. To achieve a 30 sheets per minute print rate, this requires:

300 mm×63 (dot/mm)/2 sec=105.8 μseconds per line, with no inter-sheet gap.

340 mm×63 (dot/mm)/2 sec=93.3 μseconds per line, with a 4 cm inter-sheet gap.

A printline for an A4 page consists of 13824 nozzles across the page [2]. At a system clock rate of 160 MHz 13824 dots of data can be generated in 86.4 μseconds. Therefore data can be generated fast enough to meet the printing speed requirement. It is necessary to deliver this print data to the print-heads.

Printheads can be made up of 5:5, 6:4, 7:3 and 8:2 inch printhead combinations [2]. Print data is transferred to both print heads in a pair simultaneously. This means the longest time to print a line is determined by the time to transfer print data to the longest print segment. There are 9744 nozzles across a 7 inch printhead. The print data is transferred to the printhead at a rate of 106 MHz (2/3 of the system clock rate) per color plane. This means that it will take 91.9 μs to transfer a single line for a 7:3 printhead configuration. So we can meet the requirement of 30 sheets per minute printing with a 4 cm gap with a 7:3 printhead combination. There are 11160 across an 8 inch printhead. To transfer the data to the printhead at 106 MHz will take 105.3 μs. So an 8:2 printhead combination printing with an inter-sheet gap will print slower than 30 sheets per minute.

9.2 SoPEC Basic Architecture

Figure 13:
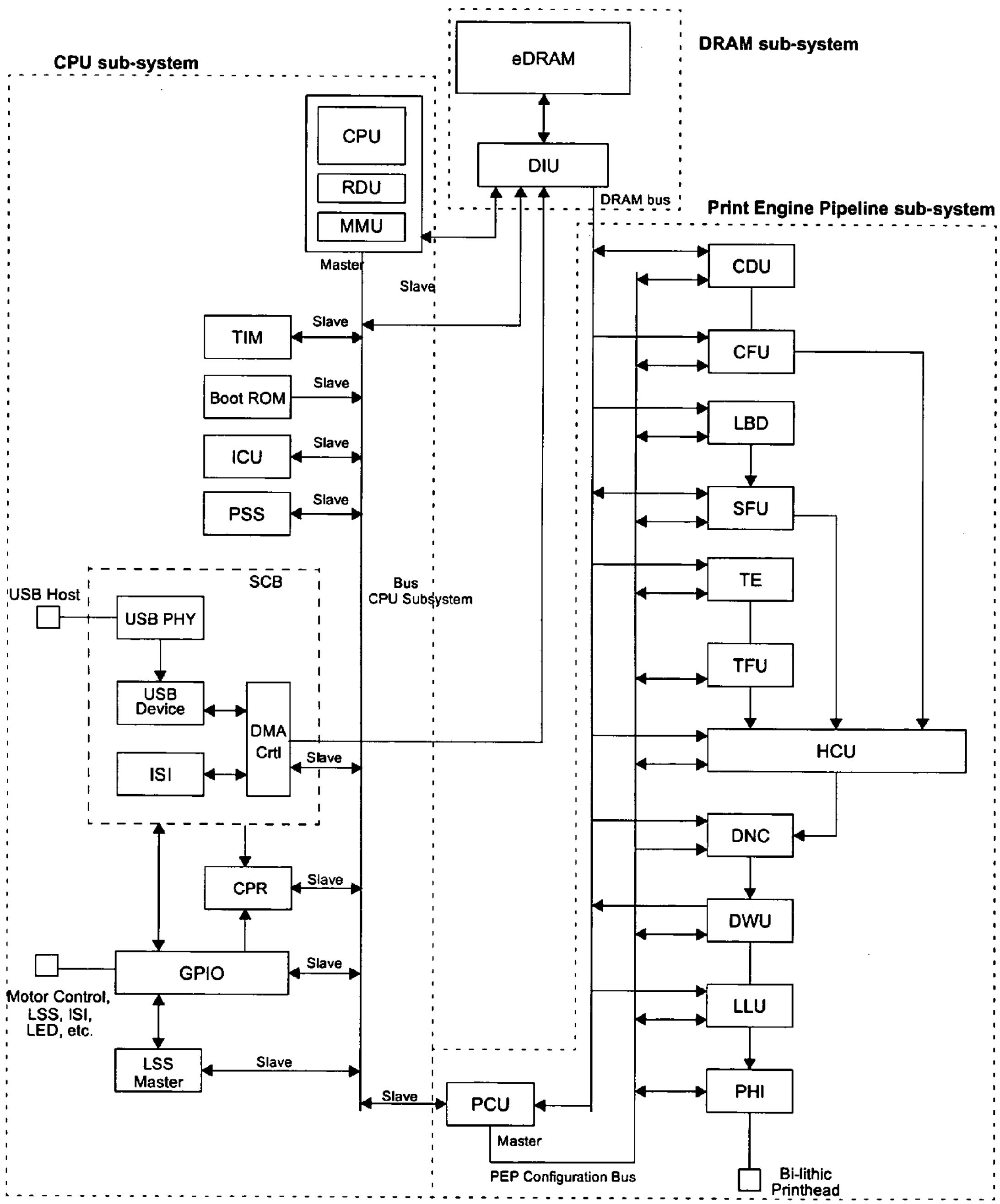
FIG. 13 shows a SoPEC system top level partition

From the highest point of view the SoPEC device consists of 3 distinct subsystems CPU Subsystem DRAM Subsystem Print Engine Pipeline (PEP) Subsystem See FIG. 13 for a block level diagram of SoPEC.

9.2.1 CPU Subsystem

The CPU subsystem controls and configures all aspects of the other subsystems. It provides general support for interfacing and synchronising the external printer with the internal print engine. It also controls the low speed communication to the QA chips. The CPU subsystem contains various peripherals to aid the CPU, such as GPIO (includes motor control), interrupt controller, LSS Master and general timers. The Serial Communications Block (SCB) on the CPU subsystem provides a full speed USB1.1 interface to the host as well as an Inter SoPEC Interface (ISI) to other SoPEC devices.

9.2.2 DRAM Subsystem

The DRAM subsystem accepts requests from the CPU, Serial Communications Block (SCB) and blocks within the PEP subsystem. The DRAM subsystem (in particular the DIU) arbitrates the various requests and determines which request should win access to the DRAM. The DIU arbitrates based on configured parameters, to allow sufficient access to DRAM for all requesters. The DIU also hides the implementation specifics of the DRAM such as page size, number of banks, refresh rates etc.

9.2.3 Print Engine Pipeline (PEP) Subsystem

The Print Engine Pipeline (PEP) subsystem accepts compressed pages from DRAM and renders them to bi-level dots for a given print line destined for a printhead interface that communicates directly with up to 2 segments of a bi-lithic printhead.

The first stage of the page expansion pipeline is the CDU, LBD and TE. The CDU expands the JPEG-compressed contone (typically CMYK) layer, the LBD expands the compressed bi-level layer (typically K), and the TE encodes Netpage tags for later rendering (typically in IR or K ink). The output from the first stage is a set of buffers: the CFU, SFU, and TFU. The CFU and SFU buffers are implemented in DRAM.

The second stage is the HCU, which dithers the contone layer, and composites position tags and the bi-level spot0 layer over the resulting bi-level dithered layer. A number of options exist for the way in which compositing occurs. Up to 6 channels of bi-level data are produced from this stage. Note that not all 6 channels may be present on the printhead. For example, the printhead may be CMY only, with K pushed into the CMY channels and IR ignored. Alternatively, the position tags may be printed in K if IR ink is not available (or for testing purposes).

The third stage (DNC) compensates for dead nozzles in the printhead by color redundancy and error diffusing dead nozzle data into surrounding dots.

The resultant bi-level 6 channel dot-data (typically CMYK-IRF) is buffered and written out to a set of line buffers stored in DRAM via the DWU.

Finally, the dot-data is loaded back from DRAM, and passed to the printhead interface via a dot FIFO. The dot FIFO accepts data from the LLU at the system clock rate (pclk), while the PHI removes data from the FIFO and sends it to the printhead at a rate of 2/3 times the system clock rate (see Section 9.1).

9.3 SoPEC Block Description

Looking at FIG. 13, the various units are described here in summary form:

TABLE 9

Units within SoPEC

| Subsystem | Unit Acronym | Unit Name | Description |
|---|---|---|---|
| DRAM | DIU | DRAM interface unit | Provides the interface for DRAM read and write access for the various SoPEC units, CPU and the SCB block. The DIU provides arbitration between competing units controls DRAM access. |
| | DRAM | Embedded DRAM | 20 Mbits of embedded DRAM, |
| CPU | CPU | Central Processing Unit | CPU for system configuration and control |
| | MMU | Memory Management Unit | Limits access to certain memory address areas in CPU user mode |
| | RDU | Real-time Debug Unit | Facilitates the observation of the contents of most of the CPU addressable registers in |

TABLE 9-continued

Units within SoPEC

| Subsystem | Unit Acronym | Unit Name | Description |
|---|---|---|---|
| | | | SoPEC in addition to some pseudo-registers in realtime. |
| | TIM | General Timer | Contains watchdog and general system timers |
| | LSS | Low Speed Serial Interfaces | Low level controller for interfacing with the QA chips |
| | GPIO | General Purpose IOs | General IO controller, with built-in Motor control unit, LED pulse units and de-glitch circuitry |
| | ROM | Boot ROM | 16 KBytes of System Boot ROM code |
| | ICU | Interrupt Controller Unit | General Purpose interrupt controller with configurable priority, and masking. |
| | CPR | Clock, Power and Reset block | Central Unit for controlling and generating the system clocks and resets and powerdown mechanisms |
| | PSS | Power Save Storage | Storage retained while system is powered down |
| | USB | Universal Serial Bus Device | USB device controller for interfacing with the host USB. |
| | ISI | Inter-SoPEC Interface | ISI controller for data and control communication with other SoPEC's in a multi-SoPEC system |
| | SCB | Serial Communication Block | Contains both the USB and ISI blocks. |
| Print Engine Pipeline (PEP) | PCU | PEP controller | Provides external CPU with the means to read and write PEP Unit registers, and read and write DRAM in single 32-bit chunks. |
| | CDU | Contone decoder unit | Expands JPEG compressed contone layer and writes decompressed contone to DRAM |
| | CFU | Contone FIFO Unit | Provides line buffering between CDU and HCU |
| | LBD | Lossless Bi-level Decoder | Expands compressed bi-level layer. |
| | SFU | Spot FIFO Unit | Provides line buffering between LBD and HCU |
| | TE | Tag encoder | Encodes tag data into line of tag dots. |
| | TFU | Tag FIFO Unit | Provides tag data storage between TE and HCU |
| | HCU | Halftoner compositor unit | Dithers contone layer and composites the bi-level spot 0 and position tag dots. |
| | DNC | Dead Nozzle Compensator | Compensates for dead nozzles by color redundancy and error diffusing dead nozzle data into surrounding dots. |
| | DWU | Dotline Writer Unit | Writes out the 6 channels of dot data for a given printline to the line store DRAM |
| | LLU | Line Loader Unit | Reads the expanded page image from line store, formatting the data appropriately for the bi-lithic printhead. |
| | PHI | PrintHead Interface | Is responsible for sending dot data to the bi-lithic printheads and for providing line synchronization between multiple SoPECs. Also provides test interface to printhead such as temperature monitoring and Dead Nozzle Identification. |

9.4 Addressing Scheme in SoPEC

SoPEC must address

20 Mbit DRAM.

PCU addressed registers in PEP.

CPU-subsystem addressed registers.

SoPEC has a unified address space with the CPU capable of addressing all CPU-subsystem and PCU-bus accessible registers (in PEP) and all locations in DRAM. The CPU generates byte-aligned addresses for the whole of SoPEC.

22 bits are sufficient to byte address the whole SoPEC address space.

9.4.1 DRAM Addressing Scheme

The embedded DRAM is composed of 256-bit words. However the CPU-subsystem may need to write individual bytes of DRAM. Therefore it was decided to make the DIU byte addressable. 22 bits are required to byte address 20 Mbits of DRAM. Most blocks read or write 256-bit words of DRAM. Therefore only the top 17 bits i.e. bits 21 to 5 are required to address 256-bit word aligned locations.

The exceptions are

CDU which can write 64-bits so only the top 19 address bits i.e. bits 21–3 are required.

The CPU-subsystem always generates a 22-bit byte-aligned DIU address but it will send flags to the DIU indicating whether it is an 8, 16 or 32-bit write.

All DIU accesses must be within the same 256-bit aligned DRAM word.

9.4.2 PEP Unit DRAM Addressing

PEP Unit configuration registers which specify DRAM locations should specify 256-bit aligned DRAM addresses i.e. using address bits 21:5. Legacy blocks from PEC1 e.g. the LBD and TE may need to specify 64-bit aligned DRAM addresses if these reused blocks DRAM addressing is difficult to modify. These 64-bit aligned addresses require address bits 21:3. However, these 64-bit aligned addresses should be programmed to start at a 256-bit DRAM word boundary.

Unlike PEC1, there are no constraints in SoPEC on data organization in DRAM except that all data structures must start on a 256-bit DRAM boundary. If data stored is not a multiple of 256-bits then the last word should be padded.

9.4.3 CPU Subsystem Bus Addressed Registers

The CPU subsystem bus supports 32-bit word aligned read and write accesses with variable access timings. See section 11.4 for more details of the access protocol used on this bus. The CPU subsystem bus does not currently support byte reads and writes but this can be added at a later date if required by imported IP.

9.4.4 PCU Addressed Registers in PEP

The PCU only supports 32-bit register reads and writes for the PEP blocks. As the PEP blocks only occupy a subsection of the overall address map and the PCU is explicitly selected by the MMU when a PEP block is being accessed the PCU does not need to perform a decode of the higher-order address bits. See Table 11 for the PEP subsystem address map.

9.5 SoPEC Memory Map 9.5.1 Main Memory Map

Figure 14:
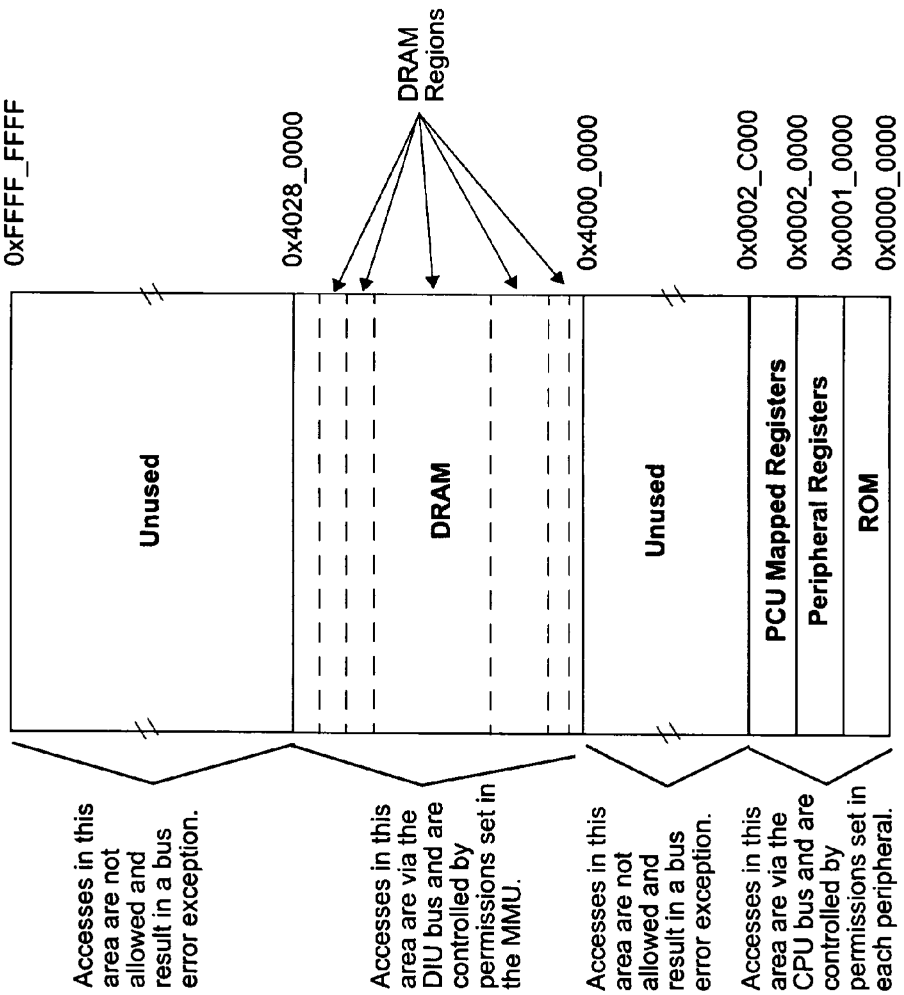
FIG. 14 shows a SoPEC CPU memory map (not to scale)

The system wide memory map is shown in FIG. 14 below. The memory map is discussed in detail in Section 11 11 Central Processing Unit (CPU).

9.5.2 CPU-Bus Peripherals Address Map

The address mapping for the peripherals attached to the CPU-bus is shown in Table 10 below. The MMU performs the decode of cpu_adr[21:12] to generate the relevant cpu_block_select signal for each block. The addressed blocks decode however many of the lower order bits of cpu_adr[11:2] are required to address all the registers within the block.

TABLE 10

CPU-bus peripherals address map

| Block_base | Address |
|---|---|
| ROM_base | 0x0000_0000 |
| MMU_base | 0x0001_0000 |
| TIM_base | 0x0001_1000 |
| LSS_base | 0x0001_2000 |
| GPIO_base | 0x0001_3000 |
| SCB_base | 0x0001_4000 |
| ICU_base | 0x0001_5000 |
| CPR_base | 0x0001_6000 |
| DIU_base | 0x0001_7000 |
| PSS_base | 0x0001_8000 |
| Reserved | 0x0001_9000 to 0x0001_FFFF |
| PCU_base | 0x0002_0000 to 0x0002_BFFF |

9.5.3 PCU Mapped Registers (PEP Blocks) Address Map

The PEP blocks are addressed via the PCU. From FIG. 14, the PCU mapped registers are in the range 0x0002_0000 to 0x0002_BFFF. From Table 11 it can be seen that there are 12 ssub-block within the PCU address space. Therefore, only four bits are necessary to address each of the sub-blocks within the PEP part of SoPEC. A further 12 bits may be used to address any configurable register within a PEP block. This gives scope for 1024 configurable registers per sub-block (the PCU mapped registers are all 32-bit addressed registers so the upper 10 bits are required to individually address them). This address will come either from the CPU or from a command stored in DRAM. The bus is assembled as follows:

address[15:12]=sub-block address, address[n:2]=register address within sub-block, only the number of bits required to decode the registers within each sub-block are used, address[1:0]=byte address, unused as PCU mapped registers are all 32-bit addressed registers.

So for the case of the HCU, its addresses range from 0x7000 to 0x7FFF within the PEP subsystem or from 0x0002_7000 to 0x0002_7FFF in the overall system.

TABLE 11

PEP blocks address map

| Block_base | Address |
|---|---|
| PCU_base | 0x0002_0000 |
| CDU_base | 0x0002_1000 |
| CFU_base | 0x0002_2000 |
| LBD_base | 0x0002_3000 |
| SFU_base | 0x0002_4000 |
| TE_base | 0x0002_5000 |
| TFU_base | 0x0002_6000 |
| HCU_base | 0x0002_7000 |
| DNC_base | 0x0002_8000 |
| DWU_base | 0x0002_9000 |
| LLU_base | 0x0002_A000 |
| PHI_base | 0x0002_B000 to 0x0002_BFFF |

9.6 Buffer Management in SoPEC

As outlined in Section 9.1, SoPEC has a requirement to print 1 side every 2 seconds i.e. 30 sides per minute.

9.6.1 Page Buffering

Approximately 2 Mbytes of DRAM are reserved for compressed page buffering in SoPEC. If a page is compressed to fit within 2 Mbyte then a complete page can be transferred to DRAM before printing. However, the time to transfer 2 Mbyte using USB 1.1 is approximately 2 seconds. The worst case cycle time to print a page then approaches 4 seconds. This reduces the worst-case print speed to 15 pages per minute.

9.6.2 Band Buffering

The SoPEC page-expansion blocks support the notion of page banding. The page can be divided into bands and another band can be sent down to SoPEC while we are printing the current band. Therefore we can start printing once at least one band has been downloaded.

The band size granularity should be carefully chosen to allow efficient use of the USB bandwidth and DRAM buffer space. It should be small enough to allow seamless 30 sides per minute printing but not so small as to introduce excessive CPU overhead in orchestrating the data transfer and parsing the band headers. Band-finish interrupts have been provided to notify the CPU of free buffer space. It is likely that the host PC will supervise the band transfer and buffer management instead of the SoPEC CPU.

If SoPEC starts printing before the complete page has been transferred to memory there is a risk of a buffer underrun occurring if subsequent bands are not transferred to SoPEC in time e.g. due to insufficient USB bandwidth caused by another USB peripheral consuming USB bandwidth. A buffer underrun occurs if a line synchronisation pulse is received before a line of data has been transferred to the printhead and causes the print job to fail at that line. If there is no risk of buffer underrun then printing can safely start once at least one band has been downloaded.

If there is a risk of a buffer underrun occurring due to an interruption of compressed page data transfer, then the safest approach is to only start printing once we have loaded up the data for a complete page. This means that a worst case latency in the region of 2 seconds (with USB1.1) will be incurred before printing the first page. Subsequent pages will take 2 seconds to print giving us the required sustained printing rate of 30 sides per minute.

A Storage SoPEC (Section 7.2.5) could be added to the system to provide guaranteed bandwidth data delivery. The print system could also be constructed using an ISI-Bridge chip (Section 7.2.6) to provide guaranteed data delivery.

The most efficient page banding strategy is likely to be determined on a per page/print job basis and so SoPEC will support the use of bands of any size.

10 SoPEC Use Cases 10.1 Introduction

This chapter is intended to give an overview of a representative set of scenarios or use cases which SoPEC can perform. SoPEC is by no means restricted to the particular use cases described and not every SoPEC system is considered here.

In this chapter we discuss SoPEC use cases under four headings:

1) Normal operation use cases.
2) Security use cases.
3) Miscellaneous use cases.
4) Failure mode use cases.

Use cases for both single and multi-SoPEC systems are outlined.

Some tasks may be composed of a number of sub-tasks.

The realtime requirements for SoPEC software tasks are discussed in "11 Central Processing Unit (CPU)" under Section 11.3 Realtime requirements.

10.2 Normal Operation in a Single SoPEC System with USB Host Connection

SoPEC operation is broken up into a number of sections which are outlined below. Buffer management in a SoPEC system is normally performed by the host.

10.2.1 Powerup

Powerup describes SoPEC initialisation following an external reset or the watchdog timer system reset.

A typical powerup sequence is:

1) Execute reset sequence for complete SoPEC.
2) CPU boot from ROM.
3) Basic configuration of CPU peripherals, SCB and DIU. DRAM initialisation. USB Wakeup.
4) Download and authentication of program (see Section 10.5.2).
5) Execution of program from DRAM.
6) Retrieve operating parameters from PRINTER_QA and authenticate operating parameters.
7) Download and authenticate any further datasets.

10.2.2 USB Wakeup

The CPU can put different sections of SoPEC into sleep mode by writing to registers in the CPR block (chapter 16). Normally the CPU sub-system and the DRAM will be put in sleep mode but the SCB and power-safe storage (PSS) will still be enabled.

Wakeup describes SoPEC recovery from sleep mode with the SCB and power-safe storage (PSS) still enabled. In a single SoPEC system, wakeup can be initiated following a USB reset from the SCB.

A typical USB wakeup sequence is:

1) Execute reset sequence for sections of SoPEC in sleep mode.
2) CPU boot from ROM, if CPU-subsystem was in sleep mode.
3) Basic configuration of CPU peripherals and DIU, and DRAM initialisation, if required.
4) Download and authentication of program using results in Power-Safe Storage (PSS) (see Section 10.5.2).
5) Execution of program from DRAM.
6) Retrieve operating parameters from PRINTER_QA and authenticate operating parameters.
7) Download and authenticate using results in PSS of any further datasets (programs).

10.2.3 Print Initialization

This sequence is typically performed at the start of a print job following powerup or wakeup:

1) Check amount of ink remaining via QA chips.
2) Download static data e.g. dither matrices, dead nozzle tables from host to DRAM.
3) Check printhead temperature, if required, and configure printhead with firing pulse profile etc. accordingly.
4) Initiate printhead pre-heat sequence, if required.

10.2.4 First Page Download

Buffer management in a SoPEC system is normally performed by the host.

First page, first band download and processing:

1) The host communicates to the SoPEC CPU over the USB to check that DRAM space remaining is sufficient to download the first band.
2) The host downloads the first band (with the page header) to DRAM.
3) When the complete page header has been downloaded the SoPEC CPU processes the page header, calculates PEP register commands and writes directly to PEP registers or to DRAM.
4) If PEP register commands have been written to DRAM, execute PEP commands from DRAM via PCU.

Remaining bands download and processing:

1) Check DRAM space remaining is sufficient to download the next band.
2) Download the next band with the band header to DRAM.
3) When the complete band header has been downloaded, process the band header according to whichever band-related register updating mechanism is being used.

10.2.5 Start Printing

1) Wait until at least one band of the first page has been downloaded.

One approach is to only start printing once we have loaded up the data for a complete page. If we start printing before the complete page has been transferred to memory we run the risk of a buffer underrun occurring because compressed page data was not transferred to SoPEC in time e.g. due to insufficient USB bandwidth caused by another USB peripheral consuming USB bandwidth.

2) Start all the PEP Units by writing to their Go registers, via PCU commands executed from DRAM or direct CPU writes. A rapid startup order for the PEP units is outlined in Table 12.

TABLE 12

Typical PEP Unit startup order for printing a page.

| Step# | Unit |
|---|---|
| 1 | DNC |
| 2 | DWU |
| 3 | HCU |
| 4 | PHI |
| 5 | LLU |
| 6 | CFU, SFU, TFU |

TABLE 12-continued

Typical PEP Unit startup order for printing a page.

| Step# | Unit |
|---|---|
| 7 | CDU |
| 8 | TE, LBD |

3) Print ready interrupt occurs (from PHI).
4) Start motor control, if first page, otherwise feed the next page. This step could occur before the print ready interrupt.
5) Drive LEDs, monitor paper status.
6) Wait for page alignment via page sensor(s) GPIO interrupt.
7) CPU instructs PHI to start producing line syncs and hence commence printing, or wait for an external device to produce line syncs.
8) Continue to download bands and process page and band headers for next page.

10.2.6 Next Page(s) Download

As for first page download, performed during printing of current page.

10.2.7 Between Bands

When the finished band flags are asserted band related registers in the CDU, LBD, TE need to be re-programmed before the subsequent band can be printed. This can be via PCU commands from DRAM. Typically only 3–5 commands per decompression unit need to be executed. These registers can also be reprogrammed directly by the CPU or most likely by updating from shadow registers. The finished band flag interrupts the CPU to tell the CPU that the area of memory associated with the band is now free.

10.2.8 During Page Print

Typically during page printing ink usage is communicated to the QA chips.
1) Calculate ink printed (from PHI).
2) Decrement ink remaining (via QA chips).
3) Check amount of ink remaining (via QA chips). This operation may be better performed while the page is being printed rather than at the end of the page.

10.2.9 Page Finish

These operations are typically performed when the page is finished:
1) Page finished interrupt occurs from PHI.
2) Shutdown the PEP blocks by de-asserting their Go registers. A typical shutdown order is defined in Table 13. This will set the PEP Unit state-machines to their idle states without resetting their configuration registers.
3) Communicate ink usage to QA chips, if required.

TABLE 13

End of page shutdown order for PEP Units.

| Step# | Unit |
|---|---|
| 1 | PHI (will shutdown by itself in the normal case at the end of a page) |
| 2 | DWU (shutting this down stalls the DNC and therefore the HCU and above) |
| 3 | LLU (should already be halted due to PHI at end of last line of page) |
| 4 | TE (this is the only dot supplier likely to be running, halted by the HCU) |
| 5 | CDU (this is likely to already be halted due to end of contone band) |

TABLE 13-continued

End of page shutdown order for PEP Units.

| Step# | Unit |
|---|---|
| 6 | CFU, SFU, TFU, LBD (order unimportant, and should already be halted due to end of band) |
| 7 | HCU, DNC (order unimportant, should already have halted) |

10.2.10 Start of Next Page

These operations are typically performed before printing the next page:
1) Re-program the PEP Units via PCU command processing from DRAM based on page header.
2) Go to Start printing.

10.2.11 End of Document

1) Stop motor control.

10.2.12 Sleep Mode

The CPU can put different sections of SoPEC into sleep mode by writing to registers in the CPR block described in Section 16.
1) Instruct host PC via USB that SoPEC is about to sleep.
2) Store reusable authentication results in Power-Safe Storage (PSS).
3) Put SoPEC into defined sleep mode.

10.3 Normal Operation in a Multi-SoPEC System—ISIMaster SoPEC

In a multi-SoPEC system the host generally manages program and compressed page download to all the SoPECs. Inter-SoPEC communication is over the ISI link which will add a latency. In the case of a multi-SoPEC system with just one USB 1.1 connection, the SoPEC with the USB connection is the ISIMaster. The ISI-bridge chip is the ISIMaster in the case of an ISI-Bridge SoPEC configuration. While it is perfectly possible for an ISISlave to have a direct USB connection to the host we do not treat this scenario explicitly here to avoid possible confusion.

In a multi-SoPEC system one of the SoPECs will be the PrintMaster. This SoPEC must manage and control sensors and actuators e.g. motor control. These sensors and actuators could be distributed over all the SoPECs in the system. An ISIMaster SoPEC may also be the PrintMaster SoPEC.

In a multi-SoPEC system each printing SoPEC will generally have its own PRINTER_QA chip (or at least access to a PRINTER_QA chip that contains the SoPEC's SoPEC_id_key) to validate operating parameters and ink usage. The results of these operations may be communicated to the PrintMaster SoPEC.

In general the ISIMaster may need to be able to:

Send messages to the ISISlaves which will cause the ISISlaves to send their status to the ISIMaster.

Instruct the ISISlaves to perform certain operations.

As the ISI is an insecure interface commands issued over the ISI are regarded as user mode commands. Supervisor mode code running on the SoPEC CPUs will allow or disallow these commands. The software protocol needs to be constructed with this in mind.

The ISIMaster will initiate all communication with the ISISlaves.

SoPEC operation is broken up into a number of sections which are outlined below.

10.3.1 Powerup

Powerup describes SoPEC initialisation following an external reset or the watchdog timer system reset.

1) Execute reset sequence for complete SoPEC.
2) CPU boot from ROM.
3) Basic configuration of CPU peripherals, SCB and DIU. DRAM initialisation USB Wakeup
4) SoPEC identification by activity on USB end-points 2–4 indicates it is the ISIMaster (unless the SoPEC CPU has explicitly disabled this function).
5) Download and authentication of program (see Section 10.5.3).
6) Execution of program from DRAM.
7) Retrieve operating parameters from PRINTER_QA and authenticate operating parameters.
8) Download and authenticate any further datasets (programs).
9) The initial dataset may be broadcast to all the ISISlaves.
10) ISIMaster master SoPEC then waits for a short time to allow the authentication to take place on the ISISlave SoPECs.
11) Each ISISlave SoPEC is polled for the result of its program code authentication process.
12) If all ISISlaves report successful authentication the OEM code module can be distributed and authenticated. OEM code will most likely reside on one SoPEC.

10.3.2 USB Wakeup

The CPU can put different sections of SoPEC into sleep mode by writing to registers in the CPR block [16]. Normally the CPU sub-system and the DRAM will be put in sleep mode but the SCB and power-safe storage (PSS) will still be enabled.

Wakeup describes SoPEC recovery from sleep mode with the SCB and power-safe storage (PSS) still enabled. For an ISIMaster SoPEC connected to the host via USB, wakeup can be initiated following a USB reset from the SCB.

A typical USB wakeup sequence is:
1) Execute reset sequence for sections of SoPEC in sleep mode.
2) CPU boot from ROM, if CPU-subsystem was in sleep mode.
3) Basic configuration of CPU peripherals and DIU, and DRAM initialisation, if required.
4) SoPEC identification by activity on USB end-points 2–4 indicates it is the ISIMaster (unless the SoPEC CPU has explicitly disabled this function).
5) Download and authentication of program using results in Power-Safe Storage (PSS) (see Section 10.5.3).
6) Execution of program from DRAM.
7) Retrieve operating parameters from PRINTER_QA and authenticate operating parameters.
8) Download and authenticate any further datasets (programs) using results in Power-Safe Storage (PSS) (see Section 10.5.3).
9) Following steps as per Powerup.

10.3.3 Print Initialization

This sequence is typically performed at the start of a print job following powerup or wakeup:
1) Check amount of ink remaining via QA chips which may be present on a ISISlave SoPEC.
2) Download static data e.g. dither matrices, dead nozzle tables from host to DRAM.
3) Check printhead temperature, if required, and configure printhead with firing pulse profile etc. accordingly. Instruct ISISlaves to also perform this operation.
4) Initiate printhead pre-heat sequence, if required. Instruct ISISlaves to also perform this operation 10.3.4 First Page Download Buffer management in a SoPEC system is normally performed by the host.
1) The host communicates to the SoPEC CPU over the USB to check that DRAM space remaining is sufficient to download the first band.
2) The host downloads the first band (with the page header) to DRAM.
3) When the complete page header has been downloaded the SoPEC CPU processes the page header, calculates PEP register commands and write directly to PEP registers or to DRAM.
4) If PEP register commands have been written to DRAM, execute PEP commands from DRAM via PCU.

Poll ISISlaves for DRAM status and download compressed data to ISISlaves.

Remaining first page bands download and processing:
1) Check DRAM space remaining is sufficient to download the next band.
2) Download the next band with the band header to DRAM.
3) When the complete band header has been downloaded, process the band header according to whichever band-related register updating mechanism is being used.

Poll ISISlaves for DRAM status and download compressed data to ISISlaves.

10.3.5 Start Printing

1) Wait until at least one band of the first page has been downloaded.
2) Start all the PEP Units by writing to their Go registers, via PCU commands executed from DRAM or direct CPU writes, in the suggested order defined in Table.
3) Print ready interrupt occurs (from PHI). Poll ISISlaves until print ready interrupt.
4) Start motor control (which may be on an ISISlave SoPEC), if first page, otherwise feed the next page. This step could occur before the print ready interrupt.
5) Drive LEDS, monitor paper status (which may be on an ISISlave SoPEC).
6) Wait for page alignment via page sensor(s) GPIO interrupt (which may be on an ISISlave SoPEC).
7) If the LineSyncMaster is a SoPEC its CPU instructs PHI to start producing master line syncs. Otherwise wait for an external device to produce line syncs.
8) Continue to download bands and process page and band headers for next page.

10.3.6 Next Page(s) Download

As for first page download, performed during printing of current page.

10.3.7 Between Bands

When the finished band flags are asserted band related registers in the CDU, LBD and TE need to be re-programmed. This can be via PCU commands from DRAM. Typically only 3–5 commands per decompression unit need to be executed. These registers can also be reprogrammed directly by the CPU or by updating from shadow registers. The finished band flag interrupts to the CPU, tell the CPU that the area of memory associated with the band is now free.

10.3.8 During Page Print

Typically during page printing ink usage is communicated to the QA chips.
1) Calculate ink printed (from PHI).
2) Decrement ink remaining (via QA chips).
3) Check amount of ink remaining (via QA chips). This operation may be better performed while the page is being printed rather than at the end of the page.

10.3.9 Page Finish

These operations are typically performed when the page is finished:
1) Page finished interrupt occurs from PHI. Poll ISISlaves for page finished interrupts.

2) Shutdown the PEP blocks by de-asserting their Go registers in the suggested order in Table. This will set the PEP Unit state-machines to their startup states.
3) Communicate ink usage to QA chips, if required.

10.3.10 Start of Next Page

These operations are typically performed before printing the next page:

1) Re-program the PEP Units via PCU command processing from DRAM based on page header.
2) Go to Start printing.

10.3.11 End of Document

1) Stop motor control. This may be on an ISISlave SoPEC.

10.3.12 Sleep Mode

The CPU can put different sections of SoPEC into sleep mode by writing to registers in the CPR block [16]. This may be as a result of a command from the host or as a result of a timeout.

1) Inform host PC of which parts of SoPEC system are about to sleep.
2) Instruct ISISlaves to enter sleep mode.
3) Store reusable cryptographic results in Power-Safe Storage (PSS).
4) Put ISIMaster SoPEC into defined sleep mode.

10.4 Normal Operation in a Multi-SoPEC System—ISISlave SoPEC

This section the outline typical operation of an ISISlave SoPEC in a multi-SoPEC system. The ISIMaster can be another SoPEC or an ISI-Bridge chip. The ISISlave communicates with the host either via the ISIMaster or using a direct connection such as USB. For this use case we consider only an ISISlave that does not have a direct host connection. Buffer management in a SoPEC system is normally performed by the host.

10.4.1 Powerup

Powerup describes SoPEC initialisation following an external reset or the watchdog timer system reset.

A typical powerup sequence is:

1) Execute reset sequence for complete SoPEC.
2) CPU boot from ROM.
3) Basic configuration of CPU peripherals, SCB and DIU. DRAM initialisation.
4) Download and authentication of program (see Section 10.5.3).
5) Execution of program from DRAM.
6) Retrieve operating parameters from PRINTER_QA and authenticate operating parameters.
7) SoPEC identification by sampling GPIO pins to determine ISIId. Communicate ISIId to ISIMaster.
8) Download and authenticate any further datasets.

10.4.2 ISI Wakeup

The CPU can put different sections of SoPEC into sleep mode by writing to registers in the CPR block [16]. Normally the CPU sub-system and the DRAM will be put in sleep mode but the SCB and power-safe storage (PSS) will still be enabled.

Wakeup describes SoPEC recovery from sleep mode with the SCB and power-safe storage (PSS) still enabled. In an ISISlave SoPEC, wakeup can be initiated following an ISI reset from the SCB. A typical ISI wakeup sequence is:

1) Execute reset sequence for sections of SoPEC in sleep mode.
2) CPU boot from ROM, if CPU-subsystem was in sleep mode.
3) Basic configuration of CPU peripherals and DIU, and DRAM initialisation, if required.
4) Download and authentication of program using results in Power-Safe Storage (PSS) (see Section 10.5.3).
5) Execution of program from DRAM.
6) Retrieve operating parameters from PRINTER_QA and authenticate operating parameters.
7) SoPEC identification by sampling GPIO pins to determine ISIId. Communicate ISIId to ISIMaster.
8) Download and authenticate any further datasets.

10.4.3 Print Initialization

This sequence is typically performed at the start of a print job following powerup or wakeup:

1) Check amount of ink remaining via QA chips.
2) Download static data e.g. dither matrices, dead nozzle tables from ISI to DRAM.
3) Check printhead temperature, if required, and configure printhead with firing pulse profile etc. accordingly.
4) Initiate printhead pre-heat sequence, if required.

10.4.4 First Page Download

Buffer management in a SoPEC system is normally performed by the host via the ISI.

1) Check DRAM space remaining is sufficient to download the first band.
2) The host downloads the first band (with the page header) to DRAM via the ISI.
3) When the complete page header has been downloaded, process the page header, calculate PEP register commands and write directly to PEP registers or to DRAM.
4) If PEP register commands have been written to DRAM, execute PEP commands from DRAM via PCU.

Remaining first page bands download and processing:

1) Check DRAM space remaining is sufficient to download the next band.
2) The host downloads the first band (with the page header) to DRAM via the ISI.
3) When the complete band header has been downloaded, process the band header according to whichever band-related register updating mechanism is being used.

10.4.5 Start Printing

1) Wait until at least one band of the first page has been downloaded.
2) Start all the PEP Units by writing to their Go registers, via PCU commands executed from DRAM or direct CPU writes, in the order defined in Table
3) Print ready interrupt occurs (from PHI). Communicate to PrintMaster via ISI.
4) Start motor control, if attached to this ISISlave, when requested by PrintMaster, if first page, otherwise feed next page. This step could occur before the print ready interrupt
5) Drive LEDS, monitor paper status, if on this ISISlave SoPEC, when requested by PrintMaster
6) Wait for page alignment via page sensor(s) GPIO interrupt, if on this ISISlave SoPEC, and send to PrintMaster.
7) Wait for line sync and commence printing.
8) Continue to download bands and process page and band headers for next page.

10.4.6 Next Page(s) Download

As for first band download, performed during printing of current page.

10.4.7 Between Bands

When the finished band flags are asserted band related registers in the CDU, LBD and TE need to be re-programmed. This can be via PCU commands from DRAM. Typically only 3–5 commands per decompression unit need to be executed. These registers can also be reprogrammed directly by the CPU or by updating from shadow registers. The finished band flag interrupts to the CPU tell the CPU that the area of memory associated with the band is now free.

10.4.8 During Page Print

Typically during page printing ink usage is communicated to the QA chips.

1) Calculate ink printed (from PHI).
2) Decrement ink remaining (via QA chips).
3) Check amount of ink remaining (via QA chips). This operation may be better performed while the page is being printed rather than at the end of the page.

10.4.9 Page Finish

These operations are typically performed when the page is finished:

1) Page finished interrupt occurs from PHI. Communicate page finished interrupt to PrintMaster.
2) Shutdown the PEP blocks by de-asserting their Go registers in the suggested order in Table. This will set the PEP Unit state-machines to their startup states.
3) Communicate ink usage to QA chips, if required.

10.4.10 Start of Next Page

These operations are typically performed before printing the next page:

1) Re-program the PEP Units via PCU command processing from DRAM based on page header.
2) Go to Start printing.

10.4.11 End of Document

Stop motor control, if attached to this ISISlave, when requested by PrintMaster.

10.4.12 Powerdown

In this mode SoPEC is no longer powered.

1) Powerdown ISISlave SoPEC when instructed by ISIMaster.

10.4.13 Sleep

The CPU can put different sections of SoPEC into sleep mode by writing to registers in the CPR block [16]. This may be as a result of a command from the host or ISIMaster or as a result of a timeout.

1) Store reusable cryptographic results in Power-Safe Storage (PSS).
2) Put SoPEC into defined sleep mode.

10.5 Security Use Cases

Please see the 'SoPEC Security Overview' [9] document for a more complete description of SoPEC security issues. The SoPEC boot operation is described in the ROM chapter of the SoPEC hardware design specification, Section 17.2.

10.5.1 Communication with the QA Chips

Communication between SoPEC and the QA chips (i.e. INK_QA and PRINTER_QA) will take place on at least a per power cycle and per page basis. Communication with the QA chips has three principal purposes: validating the presence of genuine QA chips (i.e the printer is using approved consumables), validation of the amount of ink remaining in the cartridge and authenticating the operating parameters for the printer. After each page has been printed, SoPEC is expected to communicate the number of dots fired per ink plane to the QA chipset. SoPEC may also initiate decoy communications with the QA chips from time to time.

Process:

When validating ink consumption SoPEC is expected to principally act as a conduit between the PRINTER_QA and INK_QA chips and to take certain actions (basically enable or disable printing and report status to host PC) based on the result. The communication channels are insecure but all traffic is signed to guarantee authenticity.

Known Weaknesses

All communication to the QA chips is over the LSS interfaces using a serial communication protocol. This is open to observation and so the communication protocol could be reverse engineered. In this case both the PRINTER_QA and INK_QA chips could be replaced by impostor devices (e.g. a single FPGA) that successfully emulated the communication protocol. As this would require physical modification of each printer this is considered to be an acceptably low risk. Any messages that are not signed by one of the symmetric keys (such as the SoPEC_id_key) could be reverse engineered. The imposter device must also have access to the appropriate keys to crack the system.

If the secret keys in the QA chips are exposed or cracked then the system, or parts of it, is compromised.

Assumptions:

[1] The QA chips are not involved in the authentication of downloaded SoPEC code

[2] The QA chip in the ink cartridge (INK_QA) does not directly affect the operation of the cartridge in any way i.e. it does not inhibit the flow of ink etc.

[3] The INK_QA and PRINTER_QA chips are identical in their virgin state. They only become a INK_QA or PRINTER_QA after their FlashROM has been programmed.

10.5.2 Authentication of Downloaded Code in a Single SoPEC System

Process:

1) SoPEC identification by activity on USB end-points 2–4 indicates it is the ISIMaster (unless the SoPEC CPU has explicitly disabled this function).
2) The program is downloaded to the embedded DRAM.
3) The CPU calculates a SHA-1 hash digest of the downloaded program.
4) The ResetSrc register in the CPR block is read to determine whether or not a power-on reset occurred.
5) If a power-on reset occurred the signature of the downloaded code (which needs to be in a known location such as the first or last N bytes of the downloaded code) is decrypted using the Silverbrook public boot0key stored in ROM. This decrypted signature is the expected SHA-1 hash of the accompanying program. The encryption algorithm is likely to be a public key algorithm such as RSA. If a power-on reset did not occur then the expected SHA-1 hash is retrieved from the PSS and the compute intensive decryption is not required.
6) The calculated and expected hash values are compared and if they match then the programs authenticity has been verified.
7) If the hash values do not match then the host PC is notified of the failure and the SoPEC will await a new program download.
8) If the hash values match then the CPU starts executing the downloaded program.
9) If, as is very likely, the downloaded program wishes to download subsequent programs (such as OEM code) it is responsible for ensuring the authenticity of everything it downloads. The downloaded program may contain public keys that are used to authenticate subsequent downloads, thus forming a hierarchy of authentication. The SoPEC ROM does not control these authentications—it is solely concerned with verifying that the first program downloaded has come from a trusted source.
10) At some subsequent point OEM code starts executing. The Silverbrook supervisor code acts as an O/S to the OEM user mode code. The OEM code must access most SoPEC functionality via system calls to the Silverbrook code.

11) The OEM code is expected to perform some simple 'turn on the lights' tasks after which the host PC is informed that the printer is ready to print and the Start Printing use case comes into play.

Known Weaknesses:

If the Silverbrook private boot0key is exposed or cracked then the system is seriously compromised. A ROM mask change would be required to reprogram the boot0key.

10.5.3 Authentication of Downloaded Code in a Multi-SoPEC System 10.5.3.1 ISIMaster SoPEC Process:

1) SoPEC identification by activity on USB end-points 2–4 indicates it is the ISIMaster.
2) The SCB is configured to broadcast the data received from the host PC.
3) The program is downloaded to the embedded DRAM and broadcasted to all ISISlave SoPECs over the ISI.
4) The CPU calculates a SHA-1 hash digest of the downloaded program.
5) The ResetSrc register in the CPR block is read to determine whether or not a power-on reset occurred.
6) If a power-on reset occurred the signature of the downloaded code (which needs to be in a known location such as the first or last N bytes of the downloaded code) is decrypted using the Silverbrook public boot0key stored in ROM. This decrypted signature is the expected SHA-1 hash of the accompanying program. The encryption algorithm is likely to be a public key algorithm such as RSA. If a power-on reset did not occur then the expected SHA-1 hash is retrieved from the PSS and the compute intensive decryption is not required.
7) The calculated and expected hash values are compared and if they match then the programs authenticity has been verified.
8) If the hash values do not match then the host PC is notified of the failure and the SoPEC will await a new program download.
9) If the hash values match then the CPU starts executing the downloaded program.
10) It is likely that the downloaded program will poll each ISISlave SoPEC for the result of its authentication process and to determine the number of slaves present and their ISIIds.
11) If any ISISlave SoPEC reports a failed authentication then the ISIMaster communicates this to the host PC and the SoPEC will await a new program download.
12) If all ISISlaves report successful authentication then the downloaded program is responsible for the downloading, authentication and distribution of subsequent programs within the multi-SoPEC system.
13) At some subsequent point OEM code starts executing. The Silverbrook supervisor code acts as an O/S to the OEM user mode code. The OEM code must access most SoPEC functionality via system calls to the Silverbrook code.
14) The OEM code is expected to perform some simple 'turn on the lights' tasks after which the master SoPEC determines that all SoPECs are ready to print. The host PC is informed that the printer is ready to print and the Start Printing use case comes into play.

10.5.3.2 ISISlave SoPEC Process:

1) When the CPU comes out of reset the SCB will be in slave mode, and the SCB is already configured to receive data from both the ISI and USB.
2) The program is downloaded (via ISI or USB) to embedded DRAM.
3) The CPU calculates a SHA-1 hash digest of the downloaded program.
4) The ResetSrc register in the CPR block is read to determine whether or not a power-on reset occurred.
5) If a power-on reset occurred the signature of the downloaded code (which needs to be in a known location such as the first or last N bytes of the downloaded code) is decrypted using the Silverbrook public boot0key stored in ROM. This decrypted signature is the expected SHA-1 hash of the accompanying program. The encryption algorithm is likely to be a public key algorithm such as RSA. If a power-on reset did not occur then the expected SHA-1 hash is retrieved from the PSS and the compute intensive decryption is not required.
6) The calculated and expected hash values are compared and if they match then the programs authenticity has been verified.
7) If the hash values do not match, then the ISISlave device will await a new program again
8) If the hash values match then the CPU starts executing the downloaded program.
9) It is likely that the downloaded program will communicate the result of its authentication process to the ISIMaster. The downloaded program is responsible for determining the SoPECs ISIID, receiving and authenticating any subsequent programs.
10) At some subsequent point OEM code starts executing. The Silverbrook supervisor code acts as an O/S to the OEM user mode code. The OEM code must access most SoPEC functionality via system calls to the Silverbrook code.
11) The OEM code is expected to perform some simple 'turn on the lights' tasks after which the master SoPEC is informed that this slave is ready to print. The Start Printing use case then comes into play.

Known Weaknesses

If the Silverbrook private boot0key is exposed or cracked then the system is seriously compromised.

ISI is an open interface i.e. messages sent over the ISI are in the clear. The communication channels are insecure but all traffic is signed to guarantee authenticity. As all communication over the ISI is controlled by Supervisor code on both the ISIMaster and ISISlave then this also provides some protection against software attacks.

10.5.4 Authentication and Upgrade of Operating Parameters for a Printer

The SoPEC IC will be used in a range of printers with different capabilities (e.g. A3/A4 printing, printing speed, resolution etc.). It is expected that some printers will also have a software upgrade capability which would allow a user to purchase a license that enables an upgrade in their printer's capabilities (such as print speed). To facilitate this it must be possible to securely store the operating parameters in the PRINTER_QA chip, to securely communicate these parameters to the SoPEC and to securely reprogram the parameters in the event of an upgrade. Note that each printing SoPEC (as opposed to a SoPEC that is only used for the storage of data) will have its own PRINTER_QA chip (or at least access to a PRINTER_QA that contains the SoPEC's SoPEC_id_key). Therefore both ISIMaster and ISISlave SoPECs will need to authenticate operating parameters.

Process:

1) Program code is downloaded and authenticated as described in sections 10.5.2 and 10.5.3 above.

2) The program code has a function to create the SoPEC_id_key from the unique SoPEC_id that was programmed when the SoPEC was manufactured.
3) The SoPEC retrieves the signed operating parameters from its PRINTER_QA chip. The PRINTER_QA chip uses the SoPEC_id_key (which is stored as part of the pairing process executed during printhead assembly manufacture & test) to sign the operating parameters which are appended with a random number to thwart replay attacks.
4) The SoPEC checks the signature of the operating parameters using its SoPEC_id_key. If this signature authentication process is successful then the operating parameters are considered valid and the overall boot process continues. If not the error is reported to the host PC.
5) Operating parameters may also be set or upgraded using a second key, the PrintEngineLicense_key, which is stored on the PRINTER_QA and used to authenticate the change in operating parameters.

Known Weaknesses:

It may be possible to retrieve the unique SoPEC_id by placing the SoPEC in test mode and scanning it out. It is certainly possible to obtain it by reverse engineering the device. Either way the SoPEC_id (and by extension the SoPEC_id_key) so obtained is valid only for that specific SoPEC and so printers may only be compromised one at a time by parties with the appropriate specialised equipment. Furthermore even if the SoPEC_id is compromised, the other keys in the system, which protect the authentication of consumables and of program code, are unaffected.

10.6 Miscellaneous Use Cases

There are many miscellaneous use cases such as the following examples. Software running on the SoPEC CPU or host will decide on what actions to take in these scenarios.

10.6.1 Disconnect/Re-Connect of QA Chips.

1) Disconnect of a QA chip between documents or if ink runs out mid-document.
2) Re-connect of a QA chip once authenticated e.g. ink cartridge replacement should allow the system to resume and print the next document 10.6.2 Page Arrives Before Print Ready Interrupt.

1) Engage clutch to stop paper until print ready interrupt occurs.

10.6.3 Dead-Nozzle Table Upgrade

This sequence is typically performed when dead nozzle information needs to be updated by performing a printhead dead nozzle test.

1) Run printhead nozzle test sequence
2) Either host or SoPEC CPU converts dead nozzle information into dead nozzle table.
3) Store dead nozzle table on host.
4) Write dead nozzle table to SoPEC DRAM.

10.7 Failure Mode Use Cases 10.7.1 System Errors and Security Violations

System errors and security violations are reported to the SoPEC CPU and host. Software running on the SoPEC CPU or host will then decide what actions to take.

Silverbrook code authentication failure.

1) Notify host PC of authentication failure.
2) Abort print run.

OEM code authentication failure.

1) Notify host PC of authentication failure.
2) Abort print run.

Invalid QA chip(s).

1) Report to host PC.
2) Abort print run.

MMU security violation interrupt.

1) This is handled by exception handler.
2) Report to host PC
3) Abort print run.

Invalid address interrupt from PCU.

1) This is handled by exception handler.
2) Report to host PC.
3) Abort print run.

Watchdog timer interrupt.

1) This is handled by exception handler.
2) Report to host PC.
3) Abort print run.

Host PC does not acknowledge message that SoPEC is about to power down.

1) Power down anyway.

10.7.2 Printing Errors

Printing errors are reported to the SoPEC CPU and host. Software running on the host or SoPEC CPU will then decide what actions to take.

Insufficient space available in SoPEC compressed bandstore to download a band.

1) Report to the host PC.

Insufficient ink to print.

1) Report to host PC.

Page not downloaded in time while printing.

1) Buffer underrun interrupt will occur.
2) Report to host PC and abort print run.

JPEG decoder error interrupt.

1) Report to host PC.

CPU Subsystem

11 Central Processing Unit (CPU)

11.1 Overview

The CPU block consists of the CPU core, MMU, cache and associated logic. The principal tasks for the program running on the CPU to fulfill in the system are:

Communications:

- Control the flow of data from the USB interface to the DRAM and ISI
- Communication with the host via USB or ISI
- Running the USB device driver PEP Subsystem Control:

- Page and band header processing (may possibly be performed on host PC)
- Configure printing options on a per band, per page, per job or per power cycle basis
- Initiate page printing operation in the PEP subsystem
- Retrieve dead nozzle information from the printhead interface (PHI) and forward to the host PC
- Select the appropriate firing pulse profile from a set of predefined profiles based on the printhead characteristics
- Retrieve printhead temperature via the PHI Security:

- Authenticate downloaded program code
- Authenticate printer operating parameters
- Authenticate consumables via the PRINTER_QA and INK_QA chips
- Monitor ink usage
- Isolation of OEM code from direct access to the system resources Other:

Drive the printer motors using the GPIO pins

Monitoring the status of the printer (paper jam, tray empty etc.)

Driving front panel LEDs

Perform post-boot initialisation of the SoPEC device

Memory management (likely to be in conjunction with the host PC)

Miscellaneous housekeeping tasks

Figure 15:
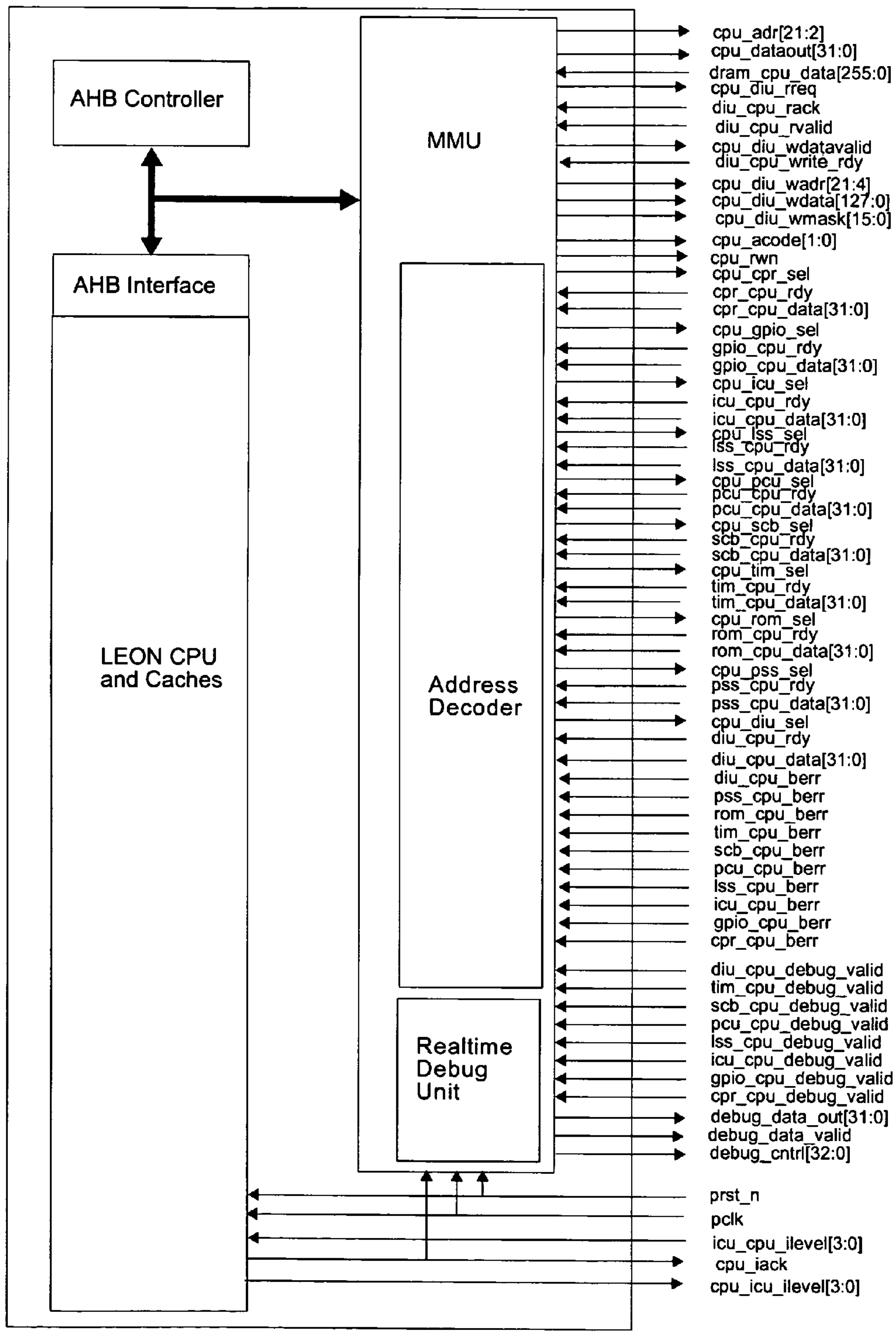
FIG. 15 is a block diagram of CPU

To control the Print Engine Pipeline the CPU is required to provide a level of performance at least equivalent to a 16-bit Hitachi H8-3664 microcontroller running at 16 MHz. An as yet undetermined amount of additional CPU performance is needed to perform the other tasks, as well as to provide the potential for such activity as Netpage page assembly and processing, RIPing etc. The extra performance required is dominated by the signature verification task and the SCB (including the USB) management task. An operating system is not required at present. A number of CPU cores have been evaluated and the LEON P1754 is considered to be the most appropriate solution. A diagram of the CPU block is shown in FIG. 15 below.

11.2 Definitions of I/Os

TABLE 14

CPU Subsystem I/Os

| Port name | Pins | I/O | Description |
|---|---|---|---|
| Clocks and Resets | | | |
| prst_n | 1 | In | Global reset. Synchronous to pclk, active low. |
| Pclk | 1 | In | Global clock |
| CPU to DIU DRAM interface | | | |
| cpu_adr[21:2] | 20 | Out | Address bus for both DRAM and peripheral access |
| cpu_dataout[31:0] | 32 | Out | Data out to both DRAM and peripheral devices. This should be driven at the same time as the cpu_adr and request signals. |
| dram_cpu_data[255:0] | 256 | In | Read data from the DRAM |
| cpu_diu_rreq | 1 | Out | Read request to the DIU DRAM |
| diu_cpu_rack | 1 | In | Acknowledge from DIU that read request has been accepted. |
| diu_cpu_rvalid | 1 | In | Signal from DIU telling SoPEC Unit that valid read data is on the dram_cpu_data bus |
| cpu_diu_wdatavalid | 1 | Out | Signal from the CPU to the DIU indicating that the data currently on the cpu_diu_wdata bus is valid and should be committed to the DIU posted write buffer |
| diu_cpu_write_rdy | 1 | In | Signal from the DIU indicating that the posted write buffer is empty |
| cpu_diu_wdadr[21:4] | 18 | Out | Write address bus to the DIU |
| cpu_diu_wdata[127:0] | 128 | Out | Write data bus to the DIU |
| cpu_diu_wmask[15:0] | 16 | Out | Write mask for the cpu_diu_wdata bus. Each bit corresponds to a byte of the 128-bit cpu_diu_wdata bus. |
| CPU to peripheral blocks | | | |
| cpu_rwn | 1 | Out | Common read/not-write signal from the CPU |
| cpu_acode[1:0] | 2 | Out | CPU access code signals.<br>cpu_acode[0] - Program (0) / Data (1) access<br>cpu_acode[1] - User (0) / Supervisor (1) access |
| cpu_cpr_sel | 1 | Out | CPR block select. |
| cpr_cpu_rdy | 1 | In | Ready signal to the CPU. When cpr_cpu_rdy is high it indicates the last cycle of the access. For a write cycle this means cpu_dataout has been registered by the CPR block and for a read cycle this means the data on cpr_cpu_data is valid. |
| cpr_cpu_berr | 1 | In | CPR bus error signal to the CPU. |
| cpr_cpu_data[31:0] | 32 | In | Read data bus from the CPR block |
| cpu_gpio_sel | 1 | Out | GPIO block select. |
| gpio_cpu_rdy | 1 | In | GPIO ready signal to the CPU. |
| gpio_cpu_berr | 1 | In | GPIO bus error signal to the CPU. |
| gpio_cpu_data[31:0] | 32 | In | Read data bus from the GPIO block |
| cpu_icu_sel | 1 | Out | ICU block select. |
| icu_cpu_rdy | 1 | In | ICU ready signal to the CPU. |
| icu_cpu_berr | 1 | In | ICU bus error signal to the CPU. |
| icu_cpu_data[31:0] | 32 | In | Read data bus from the ICU block |
| cpu_lss_sel | 1 | Out | LSS block select. |
| lss_cpu_rdy | 1 | In | LSS ready signal to the CPU. |
| lss_cpu_berr | 1 | In | LSS bus error signal to the CPU. |
| lss_cpu_data[31:0] | 32 | In | Read data bus from the LSS block |
| cpu_pcu_sel | 1 | Out | PCU block select. |
| pcu_cpu_rdy | 1 | In | PCU ready signal to the CPU. |
| pcu_cpu_berr | 1 | In | PCU bus error signal to the CPU. |
| pcu_cpu_data[31:0] | 32 | In | Read data bus from the PCU block |
| cpu_scb_sel | 1 | Out | SCB block select. |

TABLE 14-continued

CPU Subsystem I/Os

| Port name | Pins | I/O | Description |
|---|---|---|---|
| scb_cpu_rdy | 1 | In | SCB ready signal to the CPU. |
| scb_cpu_berr | 1 | In | SCB bus error signal to the CPU. |
| scb_cpu_data[31:0] | 32 | In | Read data bus from the SCB block |
| cpu_tim_sel | 1 | Out | Timers block select. |
| tim_cpu_rdy | 1 | In | Timers block ready signal to the CPU. |
| tim_cpu_berr | 1 | In | Timers bus error signal to the CPU. |
| tim_cpu_data[31:0] | 32 | In | Read data bus from the Timers block |
| cpu_rom_sel | 1 | Out | ROM block select. |
| rom_cpu_rdy | 1 | In | ROM block ready signal to the CPU. |
| rom_cpu_berr | 1 | In | ROM bus error signal to the CPU. |
| rom_cpu_data[31:0] | 32 | In | Read data bus from the ROM block |
| cpu_pss_sel | 1 | Out | PSS block select. |
| pss_cpu_rdy | 1 | In | PSS block ready signal to the CPU. |
| pss_cpu_berr | 1 | In | PSS bus error signal to the CPU. |
| pss_cpu_data[31:0] | 32 | In | Read data bus from the PSS block |
| cpu_diu_sel | 1 | Out | DIU register block select. |
| diu_cpu_rdy | 1 | In | DIU register block ready signal to the CPU. |
| diu_cpu_berr | 1 | In | DIU bus error signal to the CPU. |
| diu_cpu_data[31:0] | 32 | In | Read data bus from the DIU block |
| Interrupt signals | | | |
| icu_cpu_ilevel[3:0] | 3 | In | An interrupt is asserted by driving the appropriate priority level on icu_cpu_ilevel. These signals must remain asserted until the CPU executes an interrupt acknowledge cycle. |
| | 3 | Out | Indicates the level of the interrupt the CPU is acknowledging when cpu_iack is high |
| cpu_iack | 1 | Out | Interrupt acknowledge signal. The exact timing depends on the CPU core implementation |
| Debug signals | | | |
| diu_cpu_debug_valid | 1 | In | Signal indicating the data on the diu_cpu_data bus is valid debug data. |
| tim_cpu_debug_valid | 1 | In | Signal indicating the data on the tim_cpu_data bus is valid debug data. |
| scb_cpu_debug_valid | 1 | In | Signal indicating the data on the scb_cpu_data bus is valid debug data. |
| pcu_cpu_debug_valid | 1 | In | Signal indicating the data on the pcu_cpu_data bus is valid debug data. |
| lss_cpu_debug_valid | 1 | In | Signal indicating the data on the lss_cpu_data bus is valid debug data. |
| icu_cpu_debug_valid | 1 | In | Signal indicating the data on the icu_cpu_data bus is valid debug data. |
| gpio_cpu_debug_valid | 1 | In | Signal indicating the data on the gpio_cpu_data bus is valid debug data. |
| cpr_cpu_debug_valid | 1 | In | Signal indicating the data on the cpr_cpu_data bus is valid debug data. |
| debug_data_out | 32 | Out | Output debug data to be muxed on to the GPIO & PHI pins |
| debug_data_valid | 1 | Out | Debug valid signal indicating the validity of the data on debug_data_out. This signal is used in all debug configurations |
| debug_cntrl | 33 | Out | Control signal for each PHI bound debug data line indicating whether or not the debug data should be selected by the pin mux |

11.3 Realtime Requirements

The SoPEC realtime requirements have yet to be fully determined but they may be split into three categories: hard, firm and soft

11.3.1 Hard Realtime Requirements

Hard requirements are tasks that must be completed before a certain deadline or failure to do so will result in an error perceptible to the user (printing stops or functions incorrectly). There are three hard realtime tasks:

Motor control: The motors which feed the paper through the printer at a constant speed during printing are driven directly by the SoPEC device. Four periodic signals with different phase relationships need to be generated to ensure the paper travels smoothly through the printer. The generation of these signals is handled by the GPIO hardware (see section 13.2 for more details) but the CPU is responsible for enabling these signals (i.e. to start or stop the motors) and coordinating the movement of the paper with the printing operation of the printhead.

Buffer management: Data enters the SoPEC via the SCB at an uneven rate and is consumed by the PEP subsystem at a different rate. The CPU is responsible for managing the DRAM buffers to ensure that neither overrun nor underrun occur. This buffer management is likely to be performed under the direction of the host.

Band processing: In certain cases PEP registers may need to be updated between bands. As the timing requirements are most likely too stringent to be met by direct CPU writes to the PCU a more likely scenario is that a set of shadow registers will programmed in the compressed page units before the current band is finished, copied to band related registers by the finished band signals and the processing of the next band will continue immediately. An alternative solution is that the CPU will construct a DRAM based set of commands (see section 21.8.5 for more details) that can be executed by the PCU. The task for the CPU here is to parse the band headers stored in DRAM and generate a DRAM based set of commands for the next number of bands. The location of the DRAM based set of commands must then be written to the PCU before the current band has been processed by the PEP subsystem. It is also conceivable (but currently considered unlikely) that the host PC could create the DRAM based commands. In this case the CPU will only be required to point the PCU to the correct location in DRAM to execute commands from.

11.3.2 Firm Requirements

Firm requirements are tasks that should be completed by a certain time or failure to do so will result in a degradation of performance but not an error. The majority of the CPU tasks for SoPEC fall into this category including all interactions with the QA chips, program authentication, page feeding, configuring PEP registers for a page or job, determining the firing pulse profile, communication of printer status to the host over the USB and the monitoring of ink usage. The authentication of downloaded programs and messages will be the most compute intensive operation the CPU will be required to perform. Initial investigations indicate that the LEON processor, running at 160 MHz, will easily perform three authentications in under a second.

TABLE 15

Expected firm requirements

| Requirement | Duration |
| --- | --- |
| Power-on to start of printing first page [USB and slave SoPEC enumeration, 3 or more RSA signature verifications, code and compressed page data download and chip initialisation] | ~8 secs ?? |
| Wake-up from sleep mode to start printing [3 or more SHA-1/RSA operations, code and compressed page data download and chip re-initialisation | ~2 secs |
| Authenticate ink usage in the printer | ~0.5 secs |
| Determining firing pulse profile | ~0.1 secs |
| Page feeding, gap between pages | OEM dependent |
| Communication of printer status to host PC | ~10 ms |
| Configuring PEP registers | ?? |

11.3.3 Soft Requirements

Soft requirements are tasks that need to be done but there are only light time constraints on when they need to be done. These tasks are performed by the CPU when there are no pending higher priority tasks. As the SoPEC CPU is expected to be lightly loaded these tasks will mostly be executed soon after they are scheduled.

11.4 Bus Protocols

As can be seen from FIG. 15 above there are different buses in the CPU block and different protocols are used for each bus. There are three buses in operation:

11.4.1 AHB Bus

The LEON CPU core uses an AMBA2.0 AHB bus to communicate with memory and peripherals (usually via an APB bridge). See the AMBA specification [38], section 5 of the LEON users manual [37] and section 11.6.6.1 of this document for more details.

11.4.2 CPU to DIU Bus

This bus conforms to the DIU bus protocol described in Section 20.14.8. Note that the address bus used for DIU reads (i.e. cpu_adr(21:2)) is also that used for CPU subsystem with bus accesses while the write address bus (cpu_diu_wadr) and the read and write data buses (dram_cpu_data and cpu_diu_wdata) are private buses between the CPU and the DIU. The effective bus width differs between a read (256 bits) and a write (128 bits). As certain CPU instructions may require byte write access this will need to be supported by both the DRAM write buffer (in the AHB bridge) and the DIU. See section 11.6.6.1 for more details.

11.4.3 CPU Subsystem Bus

For access to the on-chip peripherals a simple bus protocol is used. The MMU must first determine which particular block is being addressed (and that the access is a valid one) so that the appropriate block select signal can be generated. During a write access CPU write data is driven out with the address and block select signals in the first cycle of an access. The addressed slave peripheral responds by asserting its ready signal indicating that it has registered the write data and the access can complete. The write data bus is common to all peripherals and is also used for CPU writes to the embedded DRAM. A read access is initiated by driving the address and select signals during the first cycle of an access. The addressed slave responds by placing the read data on its bus and asserting its ready signal to indicate to the CPU that the read data is valid. Each block has a separate point-to-point data bus for read accesses to avoid the need for a tri-stateable bus. All peripheral accesses are 32-bit (Programming note: char or short C types should not be used to access peripheral registers). The use of the ready signal allows the accesses to be of variable length. In most cases accesses will complete in two cycles but three or four (or more) cycles accesses are likely for PEP blocks or IP blocks with a different native bus interface. All PEP blocks are accessed via the PCU which acts as a bridge. The PCU bus uses a similar protocol to the CPU subsystem bus but with the PCU as the bus master.

The duration of accesses to the PEP blocks is influenced by whether or not the PCU is executing commands from DRAM. As these commands are essentially register writes the CPU access will need to wait until the PCU bus becomes available when a register access has been completed. This could lead to the CPU being stalled for up to 4 cycles if it attempts to access PEP blocks while the PCU is executing a command. The size and probability of this penalty is sufficiently small to have any significant impact on performance.

In order to support user mode (i.e. OEM code) access to certain peripherals the CPU subsystem bus propagates the CPU function code signals (cpu_acode[1:0]). These signals indicate the type of address space (i.e. User/Supervisor and Program/Data) being accessed by the CPU for each access. Each peripheral must determine whether or not the CPU is in the correct mode to be granted access to its registers and in some cases (e.g. Timers and GPIO blocks) different access permissions can apply to different registers within the block. If the CPU is not in the correct mode then the violation is flagged by asserting the block's bus error signal (block_cpu_berr) with the same timing as its ready signal (block_cpu_rdy) which remains deasserted. When this occurs invalid read accesses should return 0 and write accesses should have no effect.

Figure 16:
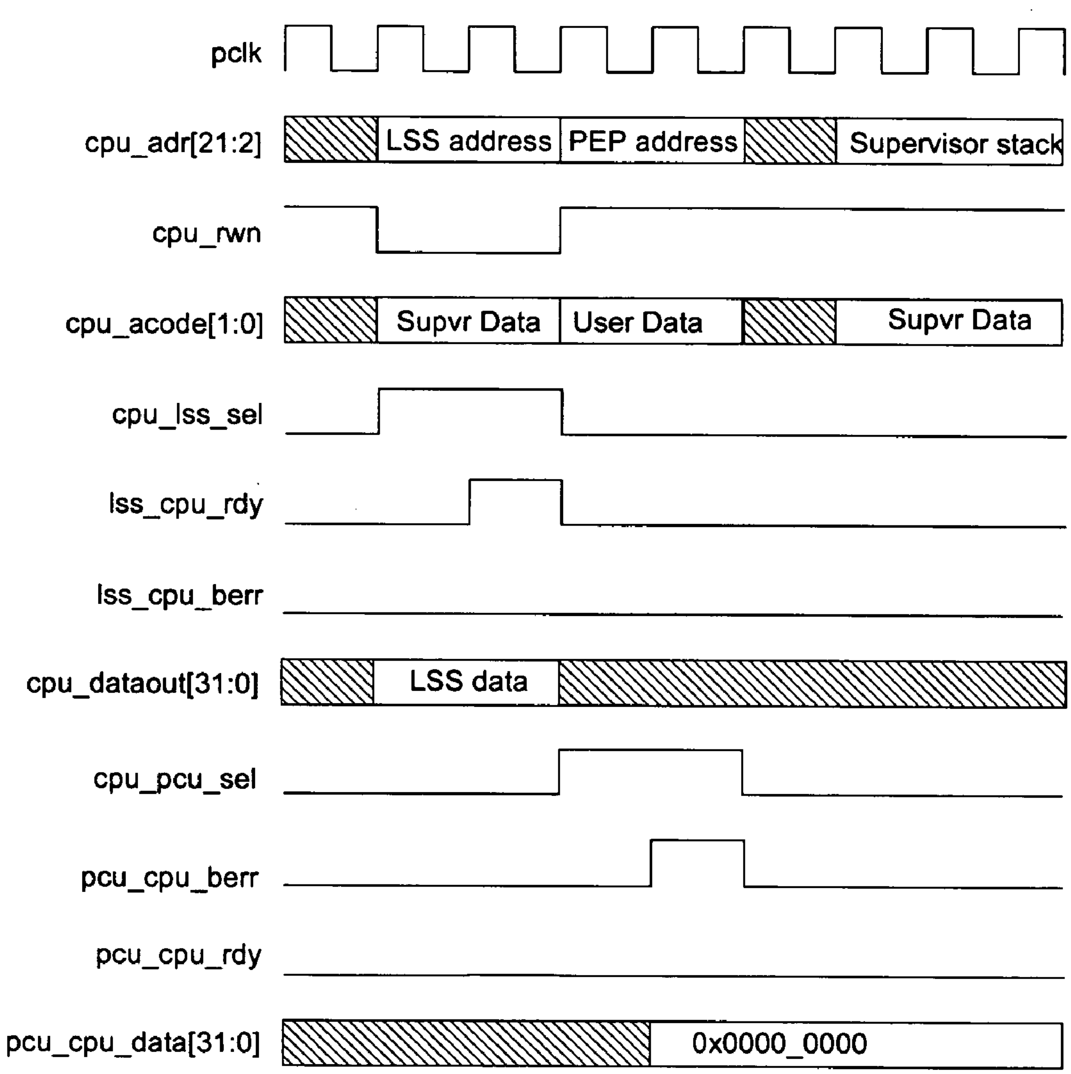
FIG. 16 shows CPU bus transactions

FIG. 16 shows two examples of the peripheral bus protocol in action. A write to the LSS block from code running in supervisor mode is successfully completed. This is immediately followed by a read from a PEP block via the PCU from code running in user mode. As this type of access is not permitted the access is terminated with a bus error. The bus error exception processing then starts directly after this—no further accesses to the peripheral should be required as the exception handler should be located in the DRAM.

Each peripheral acts as a slave on the CPU subsystem bus and its behavior is described by the state machine in section 11.4.3.1

11.4.3.1 CPU Subsystem Bus Slave State Machine

Figure 17:
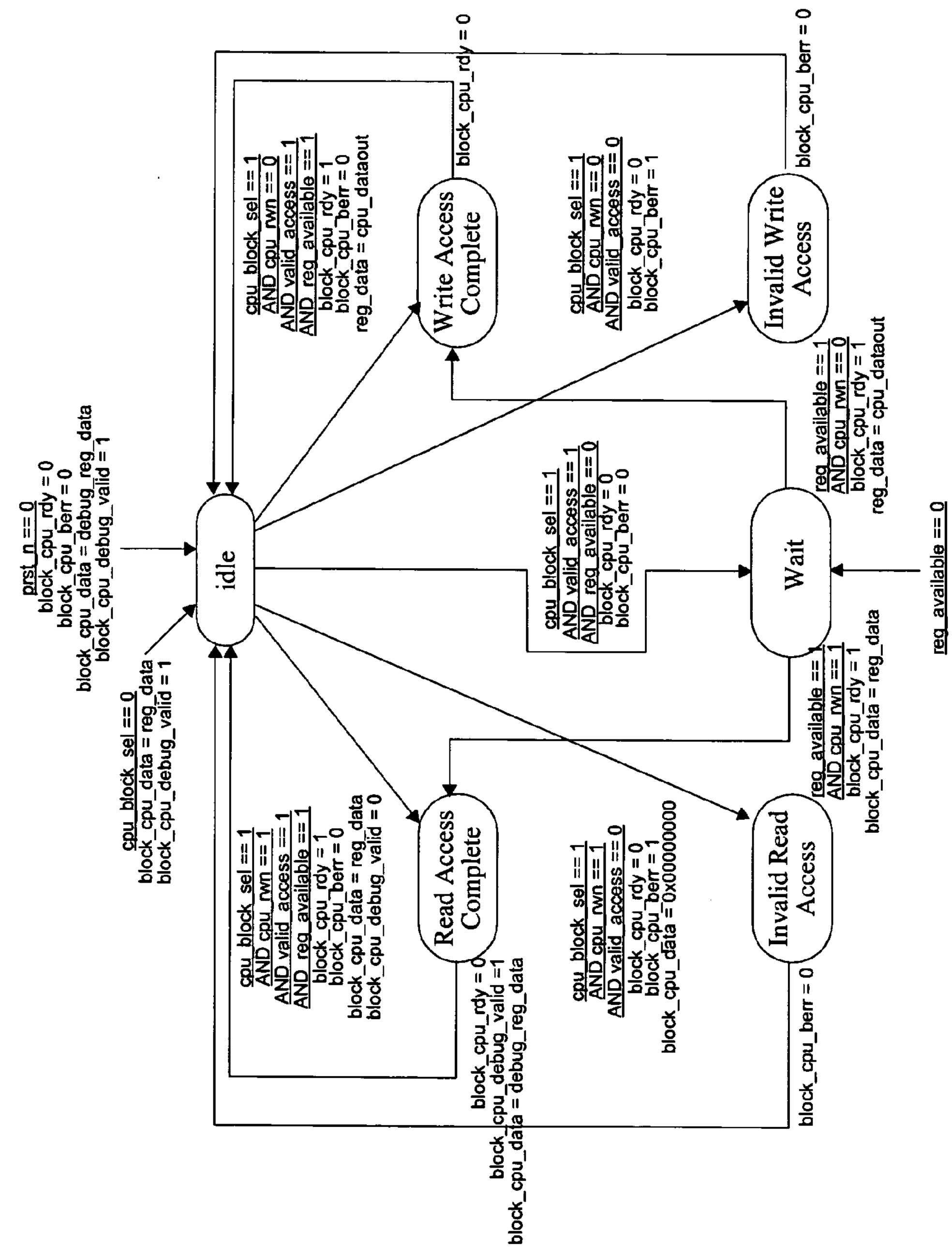
FIG. 17 shows a state machine for a CPU subsystem slave

CPU subsystem bus slave operation is described by the state machine in FIG. 17. This state machine will be implemented in each CPU subsystem bus slave. The only new signals mentioned here are the valid_access and reg_available signals. The valid_access is determined by comparing the cpu_acode value with the block or register (in the case of a block that allow user access on a per register basis such as the GPIO block) access permissions and asserting valid_access if the permissions agree with the CPU mode. The reg_available signal is only required in the PCU or in blocks that are not capable of two-cycle access (e.g. blocks containing imported IP with different bus protocols). In these blocks the reg_available signal is an internal signal used to insert wait states (by delaying the assertion of block_cpu_rdy) until the CPU bus slave interface can gain access to the register.

When reading from a register that is less than 32 bits wide the CPU subsystems bus slave should return zeroes on the unused upper bits of the block_cpu_data bus.

To support debug mode the contents of the register selected for debug observation, debug_reg, are always output on the block_cpu_data bus whenever a read access is not taking place. See section 11.8 for More Details of Debug Operation.

11.5 LEON CPU

The LEON processor is an open-source implementation of the IEEE-1754 standard (SPARC V8) instruction set. LEON is available from and actively supported by Gaisler Research (www.gaisler.com).

The following features of the LEON-2 processor will be utilised on SoPEC:

- IEEE-1754 (SPARC V8) compatible integer unit with 5-stage pipeline
- Separate instruction and data cache (Harvard architecture). 1 kbyte direct mapped caches will be used for both.
- Full implementation of AMBA-2.0 AHB on-chip bus The standard release of LEON incorporates a number of peripherals and support blocks which will not be included on SoPEC. The LEON core as used on SoPEC will consist of: 1) the LEON integer unit, 2) the instruction and data caches (currently 1 kB each), 3) the cache control logic, 4) the AHB interface and 5) possibly the AHB controller (although this functionality may be implemented in the LEON AHB bridge).

The version of the LEON database that the SoPEC LEON components will be sourced from is LEON2-1.0.7 although later versions may be used if they offer worthwhile functionality or bug fixes that affect the SoPEC design.

The LEON core will be clocked using the system clock, pclk, and reset using the prst_n_section[1] signal. The ICU will assert all the hardware interrupts using the protocol described in section 11.9. The LEON hardware multipliers and floating-point unit are not required. SoPEC will use the recommended 8 register window configuration.

Further details of the SPARC V8 instruction set and the LEON processor can be found in [36] and [37] respectively.

11.5.1 LEON Registers

Only two of the registers described in the LEON manual are implemented on SoPEC—the LEON configuration register and the Cache Control Register (CCR). The addresses of these registers are shown in Table 16. The configuration register bit fields are described below and the CCR is described in section 11.7.1.1.

11.5.1.1 LEON Configuration Register

The LEON configuration register allows runtime software to determine the settings of LEONs various configuration options. This is a read-only register whose value for the SoPEC ASIC will be 0x1071_8C00. Further descriptions of many of the bitfileds can be found in the LEON manual. The values used for SoPEC are highlighted in bold for clarity.

TABLE 16

LEON Configuration Register

| Field Name | bit(s) | Description |
|---|---|---|
| WriteProtection | 1:0 | Write protection type.<br>00 - none<br>01 - standard |
| PCICore | 3:2 | PCI core type<br>00 - none<br>01 - InSilicon<br>10 - ESA<br>11 - Other |
| FPUType | 5:4 | FPU type.<br>00 - none<br>01 - Meiko |
| MemStatus | 6 | 0 - No memory status and failing address register present<br>1 - Memory status and failing address register present |
| Watchdog | 7 | 0 - Watchdog timer not present (Note this refers to the LEON watchdog timer in the LEON timer block).<br>1 - Watchdog timer present |
| UMUL/SMUL | 8 | 0 - UMUL/SMUL instructions are not implemented<br>1 - UMUL/SMUL instructions are implemented |
| UDIV/SDIV | 9 | 0 - UMUL/SMUL instructions are not implemented<br>1 - UMUL/SMUL instructions are implemented |
| DLSZ | 11:10 | Data cache line size in 32-bit words:<br>00 - 1 word<br>01 - 2 words<br>10 - 4 words<br>11 - 8 words |
| DCSZ | 14:12 | Data cache size in kBbytes = $2^{DCSZ}$. SoPEC DCSZ = 0. |
| ILSZ | 16:15 | Instruction cache line size in 32-bit words:<br>00 - 1 word<br>01 - 2 words<br>10 - 4 words<br>11 - 8 words |
| ICSZ | 19:17 | Instruction cache size in kBbytes = $2^{ICSZ}$. SoPEC ICSZ = 0. |
| RegWin | 24:20 | The implemented number of SPARC register windows - 1.<br>SoPEC value = 7. |
| UMAC/SMAC | 25 | 0 - UMAC/SMAC instructions are not implemented |

TABLE 16-continued

LEON Configuration Register

| Field Name | bit(s) | Description |
|---|---|---|
| | | 1 - UMAC/SMAC instructions are implemented |
| Watchpoints | 28:26 | The implemented number of hardware watchpoints. SoPEC value = 4. |
| SDRAM | 29 | 0 - SDRAM controller not present<br>1 - SDRAM controller present |
| DSU | 30 | 0 - Debug Support Unit not present<br>1 - Debug Support Unit present |
| Reserved | 31 | Reserved. SoPEC value = 0. |

11.6 Memory Management Unit (MMU)

Memory Management Units are typically used to protect certain regions of memory from invalid accesses, to perform address translation for a virtual memory system and to maintain memory page status (swapped-in, swapped-out or unmapped)

Figure 18:
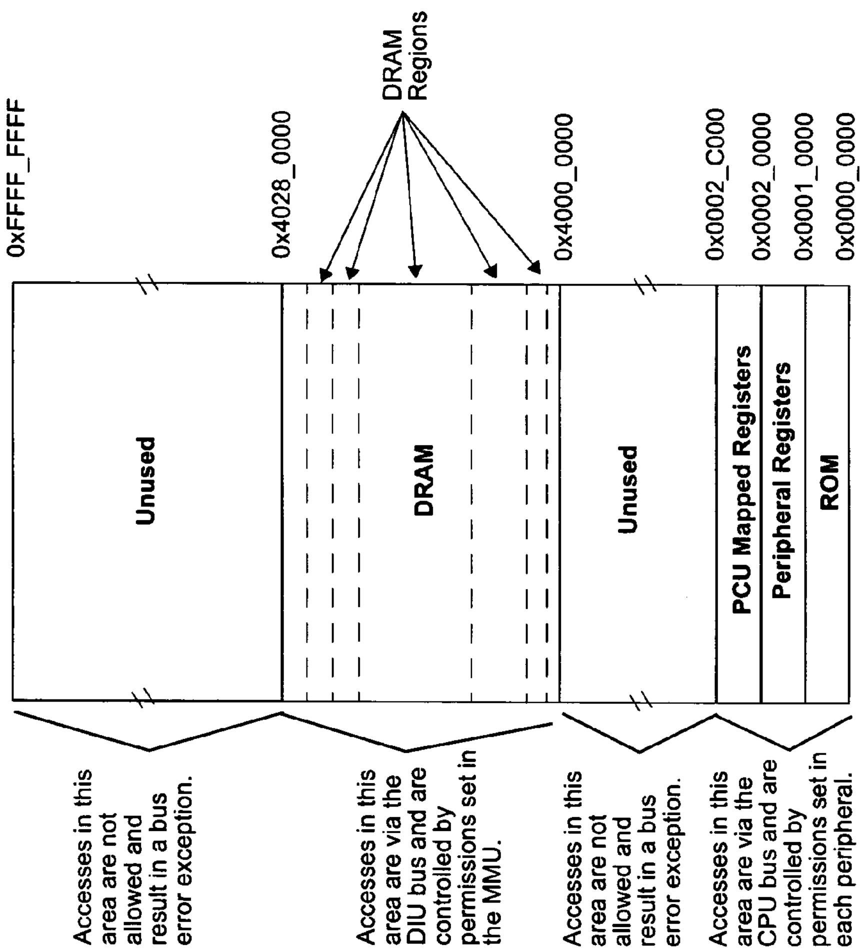
FIG. 18 shows a SoPEC CPU memory map (not to scale)

The SoPEC MMU is a much simpler affair whose function is to ensure that all regions of the SoPEC memory map are adequately protected. The MMU does not support virtual memory and physical addresses are used at all times. The SoPEC MMU supports a full 32-bit address space. The SoPEC memory map is depicted in FIG. 18 below.

The MMU selects the relevant bus protocol and generates the appropriate control signals depending on the area of memory being accessed. The MMU is responsible for performing the address decode and generation of the appropriate block select signal as well as the selection of the correct block read bus during a read access. The MMU will need to support all of the bus transactions the CPU can produce including interrupt acknowledge cycles, aborted transactions etc. When an MMU error occurs (such as an attempt to access a supervisor mode only region when in user mode) a bus error is generated. While the LEON can recognise different types of bus error (e.g. data store error, instruction access error) it handles them in the same manner as it handles all traps i.e it will transfer control to a trap handler. No extra state information is be stored because of the nature of the trap. The location of the trap handler is contained in the TBR (Trap Base Register). This is the same mechanism as is used to handle interrupts.

11.6.1 CPU-Bus Peripherals Address Map

The address mapping for the peripherals attached to the CPU-bus is shown in Table 17 below. The MMU performs the decode of the high order bits to generate the relevant cpu_block_select signal. Apart from the PCU, which decodes the address space for the PEP blocks, each block only needs to decode as many bits of cpu_adr[11:2] as required to address all the registers within the block.

TABLE 17

CPU-bus peripherals address map

| Block_base | Address |
|---|---|
| ROM_base | 0x0000_0000 |
| MMU_base | 0x0001_0000 |
| TIM_base | 0x0001_1000 |
| LSS_base | 0x0001_2000 |
| GPIO_base | 0x0001_3000 |
| SCB_base | 0x0001_4000 |

TABLE 17-continued

CPU-bus peripherals address map

| Block_base | Address |
|---|---|
| ICU_base | 0x0001_5000 |
| CPR_base | 0x0001_6000 |
| DIU_base | 0x0001_7000 |
| PSS_base | 0x0001_8000 |
| Reserved | 0x0001_9000 to 0x0001_FFFF |
| PCU_base | 0x0002_0000 |

11.6.2 DRAM Region Mapping

The embedded DRAM is broken into 8 regions, with each region defined by a lower and upper bound address and with its own access permissions.

The association of an area in the DRAM address space with a MMU region is completely under software control. Table 18 below gives one possible region mapping. Regions should be defined according to their access requirements and position in memory. Regions that share the same access requirements and that are contiguous in memory may be combined into a single region. The example below is purely for indicative purposes—real mappings are likely to differ significantly from this. Note that the RegionBottom and RegionTop fields in this example include the DRAM base address offset (0x4000_0000) which is not required when programming the RegionNTop and RegionNBottom registers. For more details, see 11.6.5.1 and 11.6.5.2.

TABLE 18

Example region mapping

| Region | RegionBottom | RegionTop | Description |
|---|---|---|---|
| 0 | 0x4000_0000 | 0x4000_0FFF | Silverbrook OS (supervisor) data |
| 1 | 0x4000_1000 | 0x4000_BFFF | Silverbrook OS (supervisor) code |
| 2 | 0x4000_C000 | 0x4000_C3FF | Silverbrook (supervisor/user) data |
| 3 | 0x4000_C400 | 0x4000_CFFF | Silverbrook (supervisor/user) code |
| 4 | 0x4026_D000 | 0x4026_D3FF | OEM (user) data |
| 5 | 0x4026_D400 | 0x4026_DFFF | OEM (user) code |
| 6 | 0x4027_E000 | 0x4027_FFFF | Shared Silverbrook/ OEM space |
| 7 | 0x4000_D000 | 0x4026_CFFF | Compressed page store (supervisor data) |

11.6.3 Non-DRAM Regions

As shown in FIG. 18 the DRAM occupies only 2.5 MBytes of the total 4 GB SoPEC address space. The non-DRAM regions of SoPEC are handled by the MMU as follows:

ROM (1x0000_000 to 1x0000_FFFF): The ROM block will control the access types allowed. The cpu_acode[1:0] signals will indicate the CPU mode and access type and the ROM block will assert rom_cpu_berr if an attempted access is forbidden. The protocol is described in more detail in section 11.4.3. The ROM block access permissions are hard wired to allow all read accesses except to the FuseChipID registers which may only be read in supervisor mode.

MMU Internal Registers (0x0001_0000 to 1x0001_0FFF): The MMU is responsible for controlling the accesses to its own internal registers and will only allow data reads and writes (no instruction fetches) from supervisor data space. All other accesses will result in the mmu_cpu_berr signal being asserted in accordance with the CPU native bus protocol.

CPU Subsystem Peripheral Registers (1x0001__1000 to 1x0001_FFFF): Each peripheral block will control the access types allowed. Every peripheral will allow supervisor data accesses (both read and write) and some blocks (e.g. Timers and GPIO) will also allow user data space accesses as outlined in the relevant chapters of this specification. Neither supervisor nor user instruction fetch accesses are allowed to any block as it is not possible to execute code from peripheral registers. The bus protocol is described in section 11.4.3.

PCU Mapped Registers (0x0002__0000 to 0x0002_BFFF): All of the PEP blocks registers which are accessed by the CPU via the PCU will inherit the access permissions of the PCU. These access permissions are hard wired to allow supervisor data accesses only and the protocol used is the same as for the CPU peripherals.

Unused address space (0x0002_C000 to 0x3FFF_FFFF and 0x4028__0000 to 0xFFFF_FFFF): All accesses to the unused portion of the address space will result in the mmu_cpu_berr signal being asserted in accordance with the CPU native bus protocol. These accesses will not propagate outside of the MMU i.e. no external access will be initiated.

11.6.4 Reset Exception Vector and Reference Zero Traps

When a reset occurs the LEON processor starts executing code from address 0x0000__0000. A common software bug is zero-referencing or null pointer de-referencing (where the program attempts to access the contents of address 0x0000__0000). To assist software debug the MMU will assert a bus error every time the locations 0x0000__0000 to 0x0000__000F (i.e. the first 4 word of the reset trap) are accessed after the reset trap handler has legitimately been retrieved immediately after reset.

11.6.5 MMU Configuration Registers

The MMU configuration registers include the RDU configuration registers and two LEON registers. Note that all the MMU configuration registers may only be accessed when the CPU is running in supervisor mode.

TABLE 19

MMU Configuration Registers

| Address offset from MMU__base | Register | #bits | Reset | Description |
|---|---|---|---|---|
| 0x00 | Region0Bottom[21:5] | 17 | 0x0__0000 | This register contains the physical address that marks the bottom of region 0 |
| 0x04 | Region0Top[21:5] | 17 | 0xF__FFFF | This register contains the physical address that marks the top of region 0. Region 0 covers the entire address space after reset whereas all other regions are zero-sized initially. |
| 0x08 | Region1Bottom[21:5] | 17 | 0xF__FFFF | This register contains the physical address that marks the bottom of region 1 |
| 0x0C | Region1Top[21:5] | 17 | 0x0__0000 | This register contains the physical address that marks the top of region 1 |
| 0x10 | Region2Bottom[21:5] | 17 | 0xF__FFFF | This register contains the physical address that marks the bottom of region 2 |
| 0x14 | Region3Top[21:5] | 17 | 0x0__0000 | This register contains the physical address that marks the top of region 2 |
| 0x18 | Region3Bottom[21:5] | 17 | 0xF__FFFF | This register contains the physical address that marks the bottom of region 3 |
| 0x1C | Region3Top[21:5] | 17 | 0x0__0000 | This register contains the physical address that marks the top of region 3 |
| 0x20 | Region4Bottom[21:5] | 17 | 0xF__FFFF | This register contains the physical address that marks the bottom of region 4 |
| 0x24 | Region4Top[21:5] | 17 | 0x0__0000 | This register contains the physical address that marks the top of region 4 |
| 0x28 | Region5Bottom[21:5] | 17 | 0xF__FFFF | This register contains the physical address that marks the bottom of region 5 |
| 0x2C | Region5Top[21:5] | 17 | 0x0__0000 | This register contains the physical address that marks the top of region 5 |
| 0x30 | Region6Bottom[21:5] | 17 | 0xF__FFFF | This register contains the physical address that marks the bottom of region 6 |
| 0x34 | Region6Top[21:5] | 17 | 0x0__0000 | This register contains the physical address that marks the top of region 6 |
| 0x38 | Region7Bottom[21:5] | 17 | 0xF__FFFF | This register contains the physical address that marks the bottom of region 7 |
| 0x3C | Region7Top[21:5] | 17 | 0x0__0000 | This register contains the physical address that marks the top of region 7 |
| 0x40 | Region0Control | 6 | 0x07 | Control register for region 0 |
| 0x44 | Region1Control | 6 | 0x07 | Control register for region 1 |
| 0x48 | Region2Control | 6 | 0x07 | Control register for region 2 |
| 0x4C | Region3Control | 6 | 0x07 | Control register for region 3 |
| 0x50 | Region4Control | 6 | 0x07 | Control register for region 4 |
| 0x54 | Region5Control | 6 | 0x07 | Control register for region 5 |
| 0x58 | Region6Control | 6 | 0x07 | Control register for region 6 |
| 0x5C | Region7Control | 6 | 0x07 | Control register for region 7 |
| 0x60 | RegionLock | 8 | 0x00 | Writing a 1 to a bit in the RegionLock register locks the value of the corresponding RegionTop, RegionBottom and RegionControl registers. The lock can only be cleared by a reset |

TABLE 19-continued

MMU Configuration Registers

| Address offset from MMU_base | Register | #bits | Reset | Description |
|---|---|---|---|---|
| | | | | and any attempt to write to a locked register will result in a bus error. |
| 0x64 | BusTimeout | 8 | 0xFF | This register should be set to the number of pclk cycles to wait after an access has started before aborting the access with a bus error. Writing 0 to this register disables the bus time-out feature. |
| 0x68 | ExceptionSource | 6 | 0x00 | This register identifies the source of the last exception. See Section 11.6.5.3 for details. |
| 0x6C | DebugSelect | 7 | 0x00 | Contains address of the register selected for debug observation. It is expected that a number of pseudo-registers will be made available for debug observation and these will be outlined during the implementation phase. |
| 0x80 to 0x108 | RDU Registers | | | See Table for details. |
| 0x140 | LEON Configuration Register | 32 | 0x1071_8 C00 | The LEON configuration register is used by software to determine the configuration of this LEON implementation. See section 11.5.1.1 for details. This register is ReadOnly. |
| 0x144 | LEON Cache Control Register | 32 | 0x0000_0 000 | The LEON Cache Control Register is used to control the operation of the caches. See section 11.6 for details. |

11.6.5.1 RegionTop and RegionBottom Registers

The 20 Mbit of embedded DRAM on SoPEC is arranged as 81920 words of 256 bits each. All region boundaries need to align with a 256-bit word. Thus only 17 bits are required for the RegionNTop and RegionNBottom registers. Note that the bottom 5 bits of the RegionNTop and RegionNBottom registers cannot be written to and read as '0' i.e. the RegionNTop and RegionNBottom registers represent byte-aligned DRAM addresses Both the RegionNTop and RegionNBottom registers are inclusive i.e. the addresses in the registers are included in the region. Thus the size of a region is (RegionNTop—RegionNBottom)+1 DRAM words.

If DRAM regions overlap (there is no reason for this to be the case but there is nothing to prohibit it either) then only accesses allowed by all overlapping regions are permitted. That is if a DRAM address appears in both Region1 and Region3 (for example) the cpu_acode of an access is checked against the access permissions of both regions. If both regions permit the access then it will proceed but if either or both regions do not permit the access then it will not be allowed. The MMU does not support negatively sized regions i.e. the value of the RegionNTop register should always be greater than or equal to the value of the RegionNBottom register. If RegionNTop is lower in the address map than RegionNTop then the region is considered to be zero-sized and is ignored.

When both the RegionNTop and RegionNBottom registers for a region contain the same value the region is then simply one 256-bit word in length and this corresponds to the smallest possible active region.

11.6.5.2 Region Control Registers

Each memory region has a control register associated with it. The RegionNControl register is used to set the access conditions for the memory region bounded by the RegionNTop and RegionNBottom registers. Table 20 describes the function of each bit field in the RegionNControl registers. All bits in a RegionNControl register are both readable and writable by design. However, like all registers in the MMU, the RegionNControl registers can only be accessed by code running in supervisor mode.

TABLE 20

Region Control Register

| Field Name | bit(s) | Description |
|---|---|---|
| SupervisorAccess | 2:0 | Denotes the type of access allowed when the CPU is running in Supervisor mode. For each access type a 1 indicates the access is permitted and a 0 indicates the access is not permitted.<br>bit0 - Data read access permission<br>bit1 - Data write access permission<br>bit2 - Instruction fetch access permission |
| UserAccess | 5:3 | Denotes the type of access allowed when the CPU is running in User mode. For each access type a 1 indicates the access is permitted and a 0 indicates the access is not permitted.<br>bit3 - Data read access permission<br>bit4 - Data write access permission<br>bit5 - Instruction fetch access permission |

11.6.5.3 ExceptionSource Register

The SPARC V8 architecture allows for a number of types of memory access error to be trapped. These trap types and trap handling in general are described in chapter 7 of the SPARC architecture manual [36]. However on the LEON processor only data_store_error and data_access_exception trap types will result from an external (to LEON) bus error.

According to the SPARC architecture manual the processor will automatically move to the next register window (i.e. it decrements the current window pointer) and copies the program counters (PC and nPC) to two local registers in the new window. The supervisor bit in the PSR is also set and the PSR can be saved to another local register by the trap handler (this does not happen automatically in hardware). The ExceptionSource register aids the trap handler by identifying the source of an exception. Each bit in the ExceptionSource register is set when the relevant trap condition and should be cleared by the trap handler by writing a '1' to that bit position.

TABLE 21

ExceptionSource Register

| Field Name | bit(s) | Description |
|---|---|---|
| DramAccessExcptn | 0 | The permissions of an access did not match those of the DRAM region it was attempting to access. This bit will also be set if an attempt is made to access an undefined DRAM region (i.e. a location that is not within the bounds of any RegionTop/RegionBottom pair) |
| PeriAccessExcptn | 1 | An access violation occurred when accessing a CPU subsystem block. This occurs when the access permissions disagree with those set by the block. |
| UnusedAreaExcptn | 2 | An attempt was made to access an unused part of the memory map |
| LockedWriteExcptn | 3 | An attempt was made to write to a regions registers (RegionTop/Bottom/Control) after they had been locked. |
| ResetHandlerExcptn | 4 | An attempt was made to access a ROM location between 0x0000_0000 and 0x0000_000F after the reset handler was executed. The most likely cause of such an access is the use of an uninitialised pointer or structure. |
| TimeoutExcptn | 5 | A bus timeout condition occurred. |

11.6.6 MMU Sub-Block Partition

Figure 19:
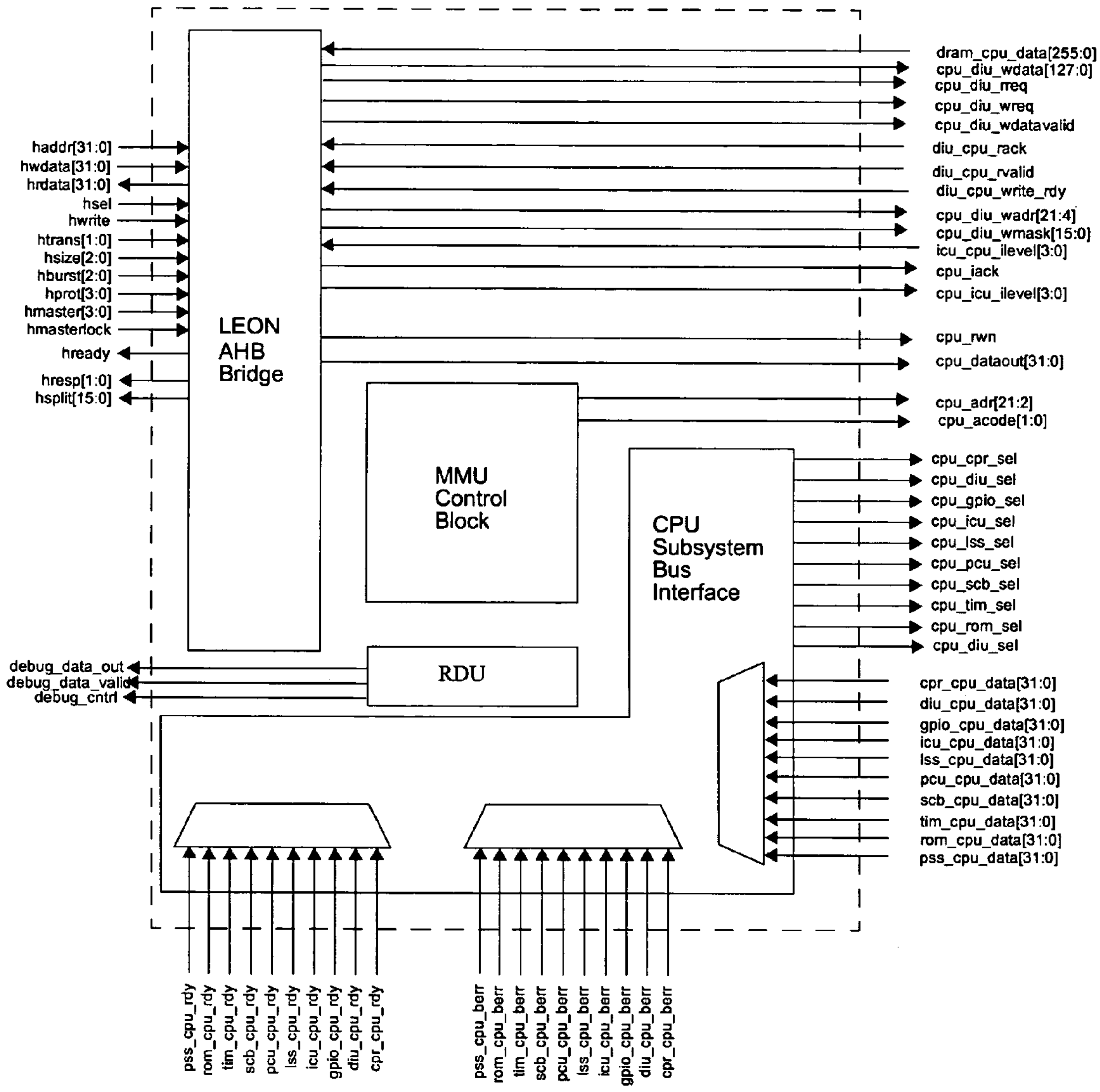
FIG. 19 shows an external signal view of a memory management unit (hereinafter "MMU") sub-block partition
Figure 20:
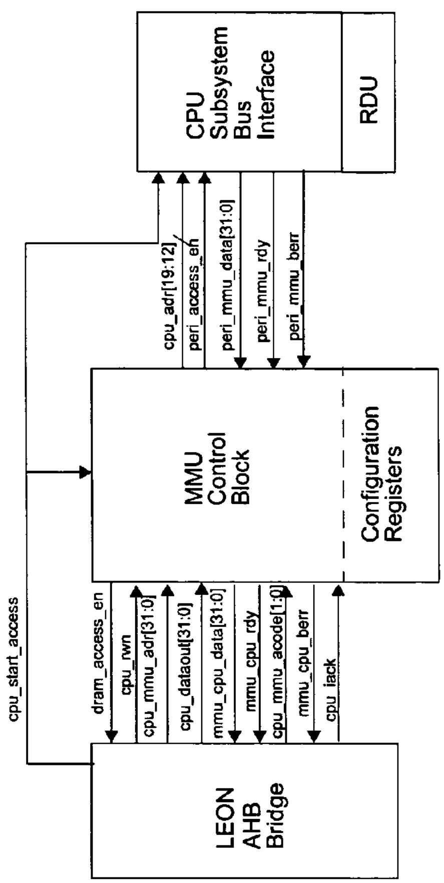
FIG. 20 shows an internal signal view of an MMU sub-block partition

As can be seen from FIG. 19 and FIG. 20 the MMU consists of three principal sub-blocks. For clarity the connections between these sub-blocks and other SoPEC blocks and between each of the sub-blocks are shown in two separate diagrams.

11.6.6.1 LEON AHB Bridge

The LEON AHB bridge consists of an AHB bridge to DIU and an AHB to CPU subsystem bus bridge. The AHB bridge will convert between the AHB and the DIU and CPU subsystem bus protocols but the address decoding and enabling of an access happens elsewhere in the MMU. The AHB bridge will always be a slave on the AHB. Note that the AMBA signals from the LEON core are contained within the ahbso and ahbsi records. The LEON records are described in more detail in section 11.7. Glue logic may be required to assist with enabling memory accesses, endianness coherency, interrupts and other miscellaneous signalling.

TABLE 22

LEON AHB bridge I/Os

| Port name | Pins | I/O | Description |
|---|---|---|---|
| Global SoPEC signals | | | |
| prst_n | 1 | In | Global reset. Synchronous to pclk, active low. |
| pclk | 1 | In | Global clock |
| LEON core to LEON AHB signals (ahbsi and ahbso records) | | | |
| ahbsi.haddr[31:0] | 32 | In | AHB address bus |
| ahbsi.hwdata[31:0] | 32 | In | AHB write data bus |
| ahbso.hrdata[31:0] | 32 | Out | AHB read data bus |
| ahbsi.hsel | 1 | In | AHB slave select signal |
| ahbsi.hwrite | 1 | In | AHB write signal:<br>1 - Write access<br>0 - Read access |
| ahbsi.htrans | 2 | In | Indicates the type of the current transfer:<br>00 - IDLE<br>01 - BUSY<br>10 - NONSEQ<br>11 - SEQ |
| ahbsi.hsize | 3 | In | Indicates the size of the current transfer:<br>000 - Byte transfer<br>001 - Halfword transfer<br>010 - Word transfer<br>011 - 64-bit transfer (unsupported?)<br>1xx - Unsupported larger wordsizes |
| ahbsi.hburst | 3 | In | Indicates if the current transfer forms part of a burst and the type of burst:<br>000 - SINGLE<br>001 - INCR<br>010 - WRAP4<br>011 - INCR4 |

TABLE 22-continued

LEON AHB bridge I/Os

| Port name | Pins | I/O | Description |
|---|---|---|---|
| | | | 100 - WRAP8<br>101 - INCR8<br>110 - WRAP16<br>111 - INCR16 |
| ahbsi.hprot | 4 | In | Protection control signals pertaining to the current access:<br>hprot[0] - Opcode(0)/Data(1) access<br>hprot[1] - User(0)/Supervisor access<br>hprot[2] - Non-bufferable(0)/Bufferable(1) access (unsupported)<br>hprot[3] - Non-cacheable(0)/Cacheable access |
| ahbsi.hmaster | 4 | In | Indicates the identity of the current bus master. This will always be the LEON core. |
| ahbsi.hmastlock | 1 | In | Indicates that the current master is performing a locked sequence of transfers. |
| ahbso.hready | 1 | Out | Active high ready signal indicating the access has completed |
| ahbso.hresp | 2 | Out | Indicates the status of the transfer:<br>00 - OKAY<br>01 - ERROR<br>10 - RETRY<br>11 - SPLIT |
| ahbso.hsplit[15:0] | 16 | Out | This 16-bit split bus is used by a slave to Indicate to the arbiter which bus masters should be allowed attempt a split transaction. This feature will be unsupported on the AHB bridge |
| Toplevel/Common LEON AHB bridge signals | | | |
| cpu_dataout[31:0] | 32 | Out | Data out bus to both DRAM and peripheral devices. |
| cpu_rwn | 1 | Out | Read/NotWrite signal. 1 = Current access is a read access, 0 = Current access is a write access |
| icu_cpu_ilevel[3:0] | 4 | In | An interrupt is asserted by driving the appropriate priority level on icu_cpu_ilevel. These signals must remain asserted until the CPU executes an interrupt acknowledge cycle. |
| cpu_icu_ilevel[3:0] | 4 | In | Indicates the level of the interrupt the CPU is acknowledging when cpu_iack is high |
| cpu_iack | 1 | Out | Interrupt acknowledge signal. The exact timing depends on the CPU core implementation |
| cpu_start_access | 1 | Out | Start Access signal indicating the start of a data transfer and that the cpu_adr, cpu_dataout, cpu_rwn and cpu_acode signals are all valid. This signal is only asserted during the first cycle of an access. |
| cpu_ben[1:0] | 2 | Out | Byte enable signals. |
| dram_cpu_data[255:0] | 256 | In | Read data from the DRAM. |
| diu_cpu_rreq | 1 | Out | Read request to the DIU. |
| diu_cpu_rack | 1 | In | Acknowledge from DIU that read request has been accepted. |
| diu_cpu_rvalid | 1 | In | Signal from DIU indicating that valid read data is on the dram_cpu_data bus |
| cpu_diu_wdatavalid | 1 | Out | Signal from the CPU to the DIU indicating that the data currently on the cpu_diu_wdata bus is valid and should be committed to the DIU posted write buffer |
| diu_cpu_write_rdy | 1 | In | Signal from the DIU indicating that the posted write buffer is empty |
| cpu_diu_wdadr[21:4] | 18 | Out | Write address bus to the DIU |
| cpu_diu_wdata[127:0] | 128 | Out | Write data bus to the DIU |
| cpu_diu_wmask[15:0] | 16 | Out | Write mask for the cpu_diu_wdata bus. Each bit corresponds to a byte of the 128-bit cpu_diu_wdata bus. |
| LEON AHB bridge to MMU Control Block signals | | | |
| cpu_mmu_adr | 32 | Out | CPU Address Bus. |
| mmu_cpu_data | 32 | In | Data bus from the MMU |
| mmu_cpu_rdy | 1 | In | Ready signal from the MMU |
| cpu_mmu_acode | 2 | Out | Access code signals to the MMU |
| mmu_cpu_berr | 1 | In | Bus error signal from the MMU |

TABLE 22-continued

LEON AHB bridge I/Os

| Port name | Pins | I/O | Description |
|---|---|---|---|
| dram_access_en | 1 | In | DRAM access enable signal. A DRAM access cannot be initiated unless it has been enabled by the MMU control unit. |

Description:

The LEON AHB bridge must ensure that all CPU bus transactions are functionally correct and that the timing requirements are met. The AHB bridge also implements a 128-bit DRAM write buffer to improve the efficiency of DRAM writes, particularly for multiple successive writes to DRAM. The AHB bridge is also responsible for ensuring endianness coherency i.e. guaranteeing that the correct data appears in the correct position on the data buses (hrdata, cpu_dataout and cpu_mmu_wdata) for every type of access. This is a requirement because the LEON uses big-endian addressing while the rest of SoPEC is little-endian.

The LEON AHB bridge will assert request signals to the DIU if the MMU control block deems the access to be a legal access. The validity (i.e. is the CPU running in the correct mode for the address space being accessed) of an access is determined by the contents of the relevant RegionNControl register. As the SPARC standard requires that all accesses are aligned to their word size (i.e. byte, half-word, word or double-word) and so it is not possible for an access to traverse a 256-bit boundary (as required by the DIU). Invalid DRAM accesses are not propagated to the DIU and will result in an error response (ahbso.hresp='01') on the AHB. The DIU bus protocol is described in more detail in section 20.9. The DIU will return a 256-bit dataword on dram_cpu_data[255:0] for every read access.

The CPU subsystem bus protocol is described in section 11.4.3. While the LEON AHB bridge performs the protocol translation between AHB and the CPU subsystem bus the select signals for each block are generated by address decoding in the CPU subsystem bus interface. The CPU subsystem bus interface also selects the correct read data bus, ready and error signals for the block being addressed and passes these to the LEON AHB bridge which puts them on the AHB bus. It is expected that some signals (especially those external to the CPU block) will need to be registered here to meet the timing requirements. Careful thought will be required to ensure that overall CPU access times are not excessively degraded by the use of too many register stages.

11.6.6.1.1 DRAM Write Buffer

Figure 21:
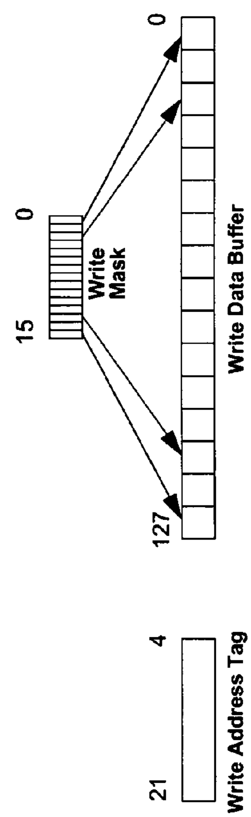
FIG. 21 shows a DRAM write buffer

The DRAM write buffer improves the efficiency of DRAM writes by aggregating a number of CPU write accesses into a single DIU write access. This is achieved by checking to see if a CPU write is to an address already in the write buffer and if so the write is immediately acknowledged (i.e. the ahbsi.hready signal is asserted without any wait states) and the DRAM write buffer updated accordingly. When the CPU write is to a DRAM address other than that in the write buffer then the current contents of the write buffer are sent to the DIU (where they are placed in the posted write buffer) and the DRAM write buffer is updated with the address and data of the CPU write. The DRAM write buffer consists of a 128-bit data buffer, an 18-bit write address tag and a 16-bit write mask. Each bit of the write mask indicates the validity of the corresponding byte of the write buffer as shown in FIG. 21 below.

The operation of the DRAM write buffer is summarised by the following set of rules:

1) The DRAM write buffer only contains DRAM write data i.e. peripheral writes go directly to the addressed peripheral.
2) CPU writes to locations within the DRAM write buffer or to an empty write buffer (i.e. the write mask bits are all 0) complete with zero wait states regardless of the size of the write (byte/half-word/word/ double-word).
3) The contents of the DRAM write buffer are flushed to DRAM whenever a CPU write to a location outside the write buffer occurs, whenever a CPU read from a location within the write buffer occurs or whenever a write to a peripheral register occurs.
4) A flush resulting from a peripheral write will not cause any extra wait states to be inserted in the peripheral write access.
5) Flushes resulting from a DRAM accesses will cause wait states to be inserted until the DIU posted write buffer is empty. If the DIU posted write buffer is empty at the time the flush is required then no wait states will be inserted for a flush resulting from a CPU write or one wait state will be inserted for a flush resulting from a CPU read (this is to ensure that the DIU sees the write request ahead of the read request). Note that in this case further wait states will also be inserted as a result of the delay in servicing the read request by the DIU.

11.6.6.1.2 DIU Interface Waveforms

Figure 22:
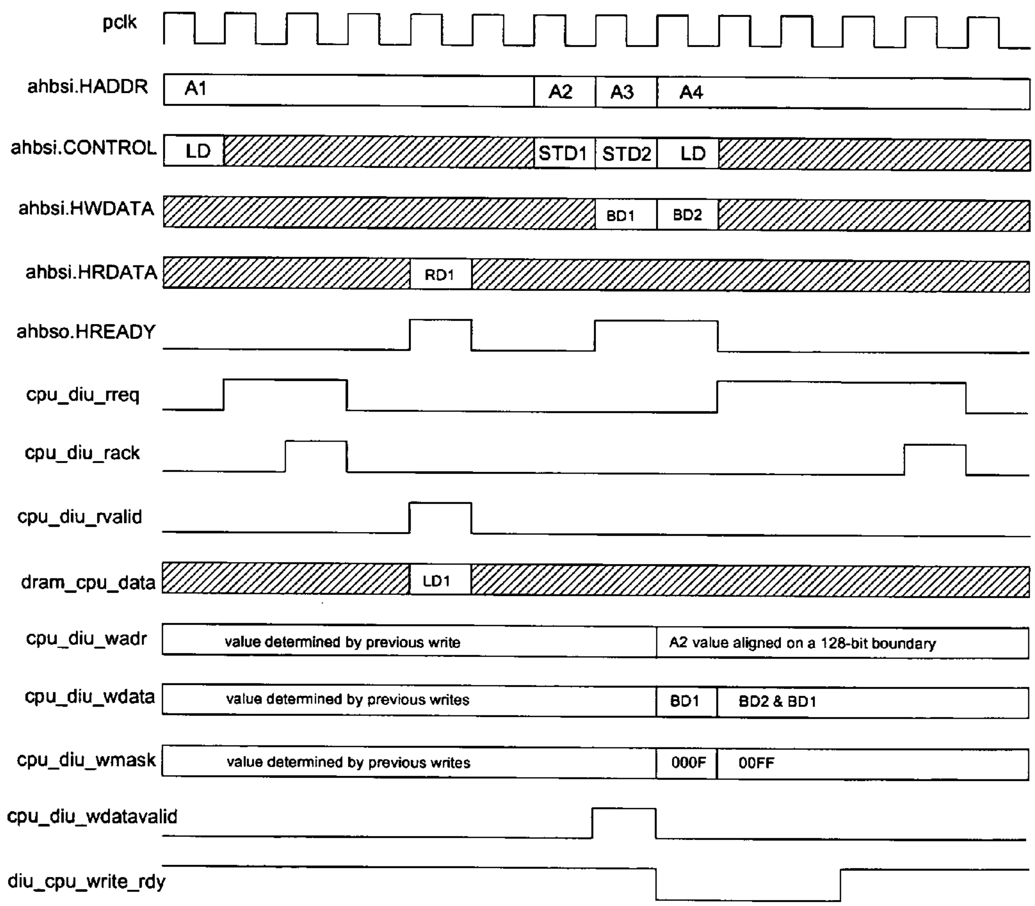
FIG. 22 shows DIU waveforms for multiple transactions

FIG. 22 below depicts the operation of the AHB bridge over a sample sequence of DRAM transactions consisting of a read into the DCache, a double-word store to an address other than that currently in the DRAM write buffer followed by an ICache line refill. To avoid clutter a number of AHB control signals that are inputs to the MMU have been grouped together as ahbsi.CONTROL and only the ahbso.HREADY is shown of the output AHB control signals.

The first transaction is a single word load ('LD'). The MMU (specifically the MMU control block) uses the first cycle of every access (i.e. the address phase of an AHB transaction) to determine whether or not the access is a legal access. The read request to the DIU is then asserted in the following cycle (assuming the access is a valid one) and is acknowledged by the DIU a cycle later. Note that the time from cpu_diu_rreq being asserted and diu_cpu_rack being asserted is variable as it depends on the DIU configuration and access patterns of DIU requestors. The AHB bridge will insert wait states until it sees the diu_cpu_rvalid signal is high, indicating the data ('LD1') on the dram_cpu_data bus is valid. The AHB bridge terminates the read access in the same cycle by asserting the ahbso.HREADY signal (together with an 'OKAY' HRESP code). The AHB bridge also selects the appropriate 32 bits ('RD1') from the 256-bit DRAM line data ('LD1') returned by the DIU corresponding to the word address given by A1.

The second transaction is an AHB two-beat incrementing burst issued by the LEON acache block in response to the execution of a double-word store instruction. As LEON is a big endian processor the address issued ('A2') during the address phase of the first beat of this transaction is the address of the most significant word of the double-word while the address for the second beat ('A3') is that of the least significant word i.e. A3=A2+4. The presence of the DRAM write buffer allows these writes to complete without the insertion of any wait states. This is true even when, as shown here, the DRAM write buffer needs to be flushed into the DIU posted write buffer, provided the DIU posted write buffer is empty. If the DIU posted write buffer is not empty (as would be signified by diu_cpu_write_rdy being low) then wait states would be inserted until it became empty. The cpu_diu_wdata buffer builds up the data to be written to the DIU over a number of transactions ('BD1' and 'BD2' here) while the cpu_dui_wmask records every byte that has been written to since the last flush—in this case the lowest word and then the second lowest word are written to as a result of the double-word store operation.

The final transaction shown here is a DRAM read caused by an ICache miss. Note that the pipelined nature of the AHB bus allows the address phase of this transaction to overlap with the final data phase of the previous transaction. All ICache misses appear as single word loads ('LD') on the AHB bus. In this case we can see that the DIU is slower to respond to this read request than to the first read request because it is processing the write access caused by the DRAM write buffer flush. The ICache refill will complete just after the window shown in FIG. 22.

11.6.6.2 CPU Subsystem Bus Interface

The CPU Subsystem Interface block handles all valid accesses to the peripheral blocks that comprise the CPU Subsystem.

TABLE 23

CPU Subsystem Bus Interface I/Os

| Port name | Pins | I/O | Description |
|---|---|---|---|
| Global SoPEC signals | | | |
| prst_n | 1 | In | Global reset. Synchronous to pclk, active low. |
| pclk | 1 | In | Global clock |
| Toplevel/Common CPU Subsystem Bus Interface signals | | | |
| cpu_cpr_sel | 1 | Out | CPR block select. |
| cpu_gpio_sel | 1 | Out | GPIO block select. |
| cpu_icu_sel | 1 | Out | ICU block select. |
| cpu_lss_sel | 1 | Out | LSS block select. |
| cpu_pcu_sel | 1 | Out | PCU block select. |
| cpu_scb_sel | 1 | Out | SCB block select. |
| cpu_tim_sel | 1 | Out | Timers block select. |
| cpu_rom_sel | 1 | Out | ROM block select. |
| cpu_pss_sel | 1 | Out | PSS block select. |
| cpu_diu_sel | 1 | Out | DIU block select. |
| cpr_cpu_data[31:0] | 32 | In | Read data bus from the CPR block |
| gpio_cpu_data[31:0] | 32 | In | Read data bus from the GPIO block |
| icu_cpu_data[31:0] | 32 | In | Read data bus from the ICU block |
| lss_cpu_data[31:0] | 32 | In | Read data bus from the LSS block |
| pcu_cpu_data[31:0] | 32 | In | Read data bus from the PCU block |
| scb_cpu_data[31:0] | 32 | In | Read data bus from the SCB block |
| tim_cpu_data[31:0] | 32 | In | Read data bus from the Timers block |
| rom_cpu_data[31:0] | 32 | In | Read data bus from the ROM block |
| pss_cpu_data[31:0] | 32 | In | Read data bus from the PSS block |
| diu_cpu_data[31:0] | 32 | In | Read data bus from the DIU block |
| cpr_cpu_rdy | 1 | In | Ready signal to the CPU. When cpr_cpu_rdy is high it indicates the last cycle of the access. For a write cycle this means cpu_dataout has been registered by the CPR block and for a read cycle this means the data on cpr_cpu_data is valid. |
| gpio_cpu_rdy | 1 | In | GPIO ready signal to the CPU. |
| icu_cpu_rdy | 1 | In | ICU ready signal to the CPU. |
| lss_cpu_rdy | 1 | In | LSS ready signal to the CPU. |
| pcu_cpu_rdy | 1 | In | PCU ready signal to the CPU. |
| scb_cpu_rdy | 1 | In | SCB ready signal to the CPU. |
| tim_cpu_rdy | 1 | In | Timers block ready signal to the CPU. |
| rom_cpu_rdy | 1 | In | ROM block ready signal to the CPU. |
| pss_cpu_rdy | 1 | In | PSS block ready signal to the CPU. |
| diu_cpu_rdy | 1 | In | DIU register block ready signal to the CPU. |
| cpr_cpu_berr | 1 | In | Bus Error signal from the CPR block |

TABLE 23-continued

CPU Subsystem Bus Interface I/Os

| Port name | Pins | I/O | Description |
|---|---|---|---|
| gpio__cpu__berr | 1 | In | Bus Error signal from the GPIO block |
| icu__cpu__berr | 1 | In | Bus Error signal from the ICU block |
| lss__cpu__berr | 1 | In | Bus Error signal from the LSS block |
| pcu__cpu__berr | 1 | In | Bus Error signal from the PCU block |
| scb__cpu__berr | 1 | In | Bus Error signal from the SCB block |
| tim__cpu__berr | 1 | In | Bus Error signal from the Timers block |
| rom__cpu__berr | 1 | In | Bus Error signal from the ROM block |
| pss__cpu__berr | 1 | In | Bus Error signal from the PSS block |
| diu__cpu__berr | 1 | In | Bus Error signal from the DIU block |
| CPU Subsystem Bus Interface to MMU Control Block signals | | | |
| cpu__adr[19:12] | 8 | In | Toplevel CPU Address bus. Only bits 19–12 are required to decode the peripherals address space |
| peri__access__en | 1 | In | Enable Access signal. A peripheral access cannot be initiated unless it has been enabled by the MMU Control Unit |
| peri__mmu__data[31:0] | 32 | Out | Data bus from the selected peripheral |
| peri__mmu__rdy | 1 | Out | Data Ready signal. Indicates the data on the peri__mmu__data bus is valid for a read cycle or that the data was successfully written to the peripheral for a write cycle. |
| peri__mmu__berr | 1 | Out | Bus Error signal. Indicates a bus error has occurred in accessing the selected peripheral |
| CPU Subsystem Bus Interface to LEON AHB bridge signals | | | |
| cpu__start__access | 1 | In | Start Access signal from the LEON AHB bridge indicating the start of a data transfer and that the cpu__adr, cpu__dataout, cpu__rwn and cpu__acode signals are all valid. This signal is only asserted during the first cycle of an access. |

Description:

The CPU Subsystem Bus Interface block performs simple address decoding to select a peripheral and multiplexing of the returned signals from the various peripheral blocks. The base addresses used for the decode operation are defined in Table. Note that access to the MMU configuration registers are handled by the MMU Control Block rather than the CPU Subsystem Bus Interface block. The CPU Subsystem Bus Interface block operation is described by the following pseudocode:

```
    masked__cpu__adr = cpu__adr[17:12]
    case (masked__cpu__adr)
    when TIM__base[17:12]
        cpu__tim__sel = peri__access__en      //  The peri__access__en
signal will have the
```

-continued

```
        peri__mmu__data = tim__cpu__data      //  timing required for
block selects
        peri__mmu__rdy = tim__cpu__rdy
        peri__mmu__berr = tim__cpu__berr
        all__other__selects = 0            //  Shorthand to ensure other
cpu__block__sel signals
                                          //  remain deasserted
    when LSS__base[17:12]
        cpu__lss__sel = peri__access__en
        peri__mmu__data = lss__cpu__data
        peri__mmu__rdy = lss__cpu__rdy
        peri__mmu__berr = lss__cpu__berr
        all__other__selects = 0
    when GPIO__base[17:12]
        cpu__gpio__sel = peri__access__en
        peri__mmu__data = gpio__cpu__data
        peri__mmu__rdy = gpio__cpu__rdy
```

-continued

```
        peri_mmu_berr = gpio_cpu_berr
        all_other_selects = 0
    when SCB_base[17:12]
        cpu_scb_sel = peri_access_en
        peri_mmu_data = scb_cpu_data
        peri_mmu_rdy = scb_cpu_rdy
        peri_mmu_berr = scb_cpu_berr
        all_other_selects = 0
    when ICU_base[17:12]
        cpu_icu_sel = peri_access_en
        peri_mmu_data = icu_cpu_data
        peri_mmu_rdy = icu_cpu_rdy
        peri_mmu_berr = icu_cpu_berr
        all_other_selects = 0
    when CPR_base[17:12]
        cpu_cpr_sel = peri_access_en
        peri_mmu_data = cpr_cpu_data
        peri_mmu_rdy = cpr_cpu_rdy
        peri_mmu_berr = cpr_cpu_berr
        all_other_selects = 0
    when ROM_base[17:12]
        cpu_rom_sel = peri_access_en
        peri_mmu_data = rom_cpu_data
        peri_mmu_rdy = rom_cpu_rdy
        peri_mmu_berr = rom_cpu_berr
        all_other_selects = 0
    when PSS_base[17:12]
        cpu_pss_sel = peri_access_en
        peri_mmu_data = pss_cpu_data
        peri_mmu_rdy = pss_cpu_rdy
        peri_mmu_berr = pss_cpu_berr
        all_other_selects = 0
```

-continued

```
    when DIU_base[17:12]
        cpu_diu_sel = peri_access_en
        peri_mmu_data = diu_cpu_data
        peri_mmu_rdy = diu_cpu_rdy
        peri_mmu_berr = diu_cpu_berr
        all_other_selects = 0
    when PCU_base[17:12]
        cpu_pcu_sel = peri_access_en
        peri_mmu_data = pcu_cpu_data
        peri_mmu_rdy = pcu_cpu_rdy
        peri_mmu_berr = pcu_cpu_berr
        all_other_selects = 0
    when others
        all_block_selects = 0
        peri_mmu_data = 0x00000000
        peri_mmu_rdy = 0
        peri_mmu_berr = 1
    end case
```

11.6.6.3 MMU Control Block

The MMU Control Block determines whether every CPU access is a valid access. No more than one cycle is to be consumed in determining the validity of an access and all accesses must terminate with the assertion of either mmu_cpu_rdy or mmu_cpu_berr. To safeguard against stalling the CPU a simple bus timeout mechanism will be supported.

TABLE 24

MMU Control Block I/Os

| Port name | Pins | I/O | Description |
|---|---|---|---|
| Global SoPEC signals | | | |
| prst_n | 1 | In | Global reset. Synchronous to pclk, active low. |
| pclk | 1 | In | Global clock |
| Toplevel/Common MMU Control Block signals | | | |
| cpu_adr[21:2] | 22 | Out | Address bus for both DRAM and peripheral access. |
| cpu_acode[1:0] | 2 | Out | CPU access code signals (cpu_mmu_acode) retimed to meet the CPU Subsystem Bus timing requirements |
| dram_access_en | 1 | Out | DRAM Access Enable signal. Indicates that the current CPU access is a valid DRAM access. |
| MMU Control Block to LEON AHB bridge signals | | | |
| cpu_mmu_adr[31:0] | 32 | In | CPU core address bus. |
| cpu_dataout[31:0] | 32 | In | Toplevel CPU data bus |
| mmu_cpu_data[31:0] | 32 | Out | Data bus to the CPU core. Carries the data for all CPU read operations |
| cpu_rwn | 1 | In | Toplevel CPU Read/notWrite signal. |
| cpu_mmu_acode[1:0] | 2 | In | CPU access code signals |
| mmu_cpu_rdy | 1 | Out | Ready signal to the CPU core. Indicates the completion of all valid CPU accesses. |
| mmu_cpu_berr | 1 | Out | Bus Error signal to the CPU core. This signal is asserted to terminate an invalid access. |
| cpu_start_access | 1 | In | Start Access signal from the LEON AHB bridge indicating the start of a data transfer and that the cpu_adr, cpu_dataout, cpu_rwn and cpu_acode signals are all valid. This signal is only asserted |

TABLE 24-continued

MMU Control Block I/Os

| Port name | Pins | I/O | Description |
|---|---|---|---|
| | | | during the first cycle of an access. |
| cpu_iack | 1 | In | Interrupt Acknowledge signal from the CPU. This signal is only asserted during an interrupt acknowledge cycle. |
| cpu_ben[1:0] | 2 | In | Byte enable signals indicating which bytes of the 32-bit bus are being accessed. |
| MMU Control Block to CPU Subsystem Bus Interface signals | | | |
| cpu_adr[17:12] | 8 | Out | Toplevel CPU Address bus. Only bits 17–12 are required to decode the peripherals address space |
| peri_access_en | 1 | Out | Enable Access signal. A peripheral access cannot be initiated unless it has been enabled by the MMU Control Unit |
| peri_mmu_data[31:0] | 32 | In | Data bus from the selected peripheral |
| peri_mmu_rdy | 1 | In | Data Ready signal. Indicates the data on the peri_mmu_data bus is valid for a read cycle or that the data was successfully written to the peripheral for a write cycle. |
| peri_mmu_berr | 1 | In | Bus Error signal. Indicates a bus error has occurred in accessing the selected peripheral |

Description:

The MMU Control Block is responsible for the MMU's core functionality, namely determining whether or not an access to any part of the address map is valid. An access is considered valid if it is to a mapped area of the address space and if the CPU is running in the appropriate mode for that address space. Furthermore the MMU control block must correctly handle the special cases that are: an interrupt acknowledge cycle, a reset exception vector fetch, an access that crosses a 256-bit DRAM word boundary and a bus timeout condition. The following pseudocode shows the logic required to implement the MMU Control Block functionality. It does not deal with the timing relationships of the various signals—it is the designer's responsibility to ensure that these relationships are correct and comply with the different bus protocols. For simplicity the pseudocode is split up into numbered sections so that the functionality may be seen more easily.

It is important to note that the style used for the pseudocode will differ from the actual coding style used in the RTL implementation. The pseudocode is only intended to capture the required functionality, to clearly show the criteria that need to be tested rather than to describe how the implementation should be performed. In particular the different comparisons of the address used to determine which part of the memory map, which DRAM region (if applicable) and the permission checking should all be performed in parallel (with results ORed together where appropriate) rather than sequentially as the pseudocode implies.

PS0 Description: This first segment of code defines a number of constants and variables that are used elsewhere in this description. Most signals have been defined in the I/O descriptions of the MMU sub-blocks that precede this section of the document. The post_reset_state variable is used later (in section PS4) to determine if we should trap a null pointer access.

```
PS0:
    const UnusedBottom = 0x002AC000
    const DRAMTop = 0x4027FFFF
    const UserDataSpace = b01
    const UserProgramSpace = b00
    const SupervisorDataSpace = b11
    const SupervisorProgramSpace = b10
    const ResetExceptionCycles = 0x2
    cpu_adr_peri_masked[5:0] = cpu_mmu_adr[17:12]
    cpu_adr_dram_masked[16:0] = cpu_mmu_adr & 0x003FFFE0
    if (prst_n = = 0) then          // Initialise everything
        cpu_adr = cpu_mmu_adr[21:2]
        peri_access_en = 0
        dram_access_en = 0
        mmu_cpu_data = peri_mmu_data
        mmu_cpu_rdy = 0
        mmu_cpu_berr = 0
        post_reset_state = TRUE
        access_initiated = FALSE
        cpu_access_cnt = 0
    // The following is used to determine if we are coming out
of reset for the purposes of
    //   reset exception vector redirection. There may be a
convenient signal in the CPU core
    // that we could use instead of this.
    if ((cpu_start_access = = 1) AND (cpu_access_cnt <
ResetExceptionCycles) AND
            (clock_tick = = TRUE)) then
        cpu_access_cnt = cpu_access_cnt +1
    else
        post_reset_state = FALSE
```

PS1 Description: This section is at the top of the hierarchy that determines the validity of an access. The address is tested to see which macro-region (i.e. Unused, CPU Subsystem or DRAM) it falls into or whether the reset exception vector is being accessed.

```
PS1:
    if (cpu_mmu_adr >= UnusedBottom) then
            // The access is to an invalid area of the address
space. See section PS2
    elsif  ((cpu_mmu_adr  >  DRAMTop)  AND (cpu_mmu_adr  <
UnusedBottom)) then
        // We are in the CPU Subsystem/PEP Subsystem address
space. See section PS3
    // Only remaining possibility is an access to DRAM address
space
    // First we need to intercept the special case for the
reset exception vector
    elsif (cpu_mmu_adr < 0x00000010) then
        // The reset exception is being accessed. See section PS4
    elsif  ((cpu_adr_dram_masked  >=  Region0Bottom)  AND
(cpu_adr_dram_masked <=
            Region0Top) ) then
            // We are in Region0. See section PS5
    elsif  ((cpu_adr_dram_masked  >=  RegionNBottom)
    AND
(cpu_adr_dram_masked <=
            RegionNTop) ) then // we are in RegionN
            // Repeat the Region0 (i.e. section PS5) logic for
each of Region1 to Region7
    else   // We could end up here if there were gaps in the
DRAM regions
        peri_access_en = 0
        dram_access_en = 0
        mmu_cpu_berr = 1        // we have an unknown access error,
```

-continued

```
most likely due to hitting
        mmu_cpu_rdy = 0         // a gap in the DRAM regions
    //  Only thing remaining is to implement a bus timeout
function. This is done in PS6
    end
```

PS2 Description: Accesses to the large unused area of the address space are trapped by this section. No bus transactions are initiated and the mmu_cpu_berr signal is asserted.

```
PS2:
    elsif (cpu_mmu_adr >= UnusedBottom) then
        peri_access_en = 0   // The access is to an invalid area
of the address space
        dram_access_en = 0
        mmu_cpu_berr = 1
        mmu_cpu_rdy = 0
```

PS3 Description: This section deals with accesses to CPU Subsystem peripherals, including the MMU itself. If the MMU registers are being accessed then no external bus transactions are required. Access to the MMU registers is only permitted if the CPU is making a data access from supervisor mode, otherwise a bus error is asserted and the access terminated. For non-MMU accesses then transactions occur over the CPU Subsystem Bus and each peripheral is responsible for determining whether or not the CPU is in the correct mode (based on the cpu_acode signals) to be permitted access to its registers. Note that all of the PEP registers are accessed via the PCU which is on the CPU Subsystem Bus.

```
PS3:
    elsif  ((cpu_mmu_adr  >  DRAMTop)  AND (cpu_mmu_adr  <
UnusedBottom)) then
        //  We are in the CPU Subsystem/PEP Subsystem address
space
        cpu_adr = cpu_mmu_adr[21:2]
        if (cpu_adr_peri_masked = = MMU_base)  then   // access is
to local registers
            peri_access_en = 0
            dram_access_en = 0
            if (cpu_acode = = SupervisorDataSpace) then
                for (i=0; i<26; i++) {
                    if ((i = = cpu_mmu_adr[6:2]) then   // selects the
addressed register
                        if (cpu_rwn = = 1) then
                            mmu_cpu_data[16:0] = MMUReg[i]
                                                            // MMUReg[i]
is one of the
                            mmu_cpu_rdy = 1         // registers
in Table
                            mmu_cpu_berr = 0
                        else   // write cycle
                            MMUReg[i] = cpu_dataout[16:0]
                            mmu_cpu_rdy = 1
                            mmu_cpu_berr = 0
                    else   // there is no register mapped to this
address
                        mmu_cpu_berr = 1   // do we really want a
```

-continued

```
bus_error here as registers
                              mmu_cpu_rdy = 0
                              // are just mirrored in other
blocks
               else // we have an access violation
                    mmu_cpu_berr = 1
                    mmu_cpu_rdy = 0
          else // access is to something else on the CPU Subsystem
Bus
               peri_access_en = 1
               dram_access_en = 0
               mmu_cpu_data = peri_mmu_data
               mmu_cpu_rdy = peri_mmu_rdy
               mmu_cpu_berr = peri_mmu_berr
```

PS4 Description: The only correct accesses to the locations beneath 0x00000010 are fetches of the reset trap handling routine and these should be the first accesses after reset. Here we trap all other accesses to these locations regardless of the CPU mode. The most likely cause of such an access will be the use of a null pointer in the program executing on the CPU.

```
PS4:
     elsif (cpu_mmu_adr < 0x00000010) then
          if (post_reset_state = = TRUE)) then
               cpu adr = cpu mmu adr[21:2]
               peri_access_en = 1
               dram_access_en = 0
               mmu_cpu_data = peri_mmu_data
               mmu_cpu_rdy = peri_mmu_rdy
```

-continued

```
               mmu_cpu_berr = peri_mmu_berr
          else   // we have a problem (almost certainly a null
pointer)
               peri_access_en = 0
               dram_access_en = 0
               mmu_cpu_berr = 1
               mmu_cpu_rdy = 0
```

PS5 Description: This large section of pseudocode simply checks whether the access is within the bounds of DRAM Region0 and if so whether or not the access is of a type permitted by the Region0Control register. If the access is permitted then a DRAM access is initiated. If the access is not of a type permitted by the Region0Control register then the access is terminated with a bus error.

```
PS5:
     elsif ((cpu_adr_dram_masked >= Region0Bottom)          AND
(cpu_adr_dram_masked <=
                    Region0Top) ) then // we are in Region0
          cpu_adr = cpu_mmu_adr[21:2]
          if (cpu_rwn = = 1) then
               if ((cpu_acode = = SupervisorProgramSpace    AND
Region0Control[2] = = 1))
                    OR (cpu_acode = = UserProgramSpace      AND
Region0Control[5] = = 1)) then
                         // this is a valid instruction
fetch from Region0
                         // The dram_cpu_data bus goes
directly to the LEON
                         // AHB bridge which also handles
the hready generation
                    peri_access_en = 0
                    dram_access_en = 1
                    mmu_cpu_berr = 0
               elsif ((cpu_acode = = SupervisorDataSpace    AND
Region0Control[0] = = 1)
                    OR (cpu_acode = = UserDataSpace         AND
Region0Control[3] = = 1)) then
                                             // this is a valid
read access from Region0
                    peri_access_en = 0
                    dram_access_en = 1
                    mmu_cpu_berr = 0
               else                          // we have an access
violation
                    peri_access_en = 0
                    dram_access_en = 0
                    mmu_cpu_berr = 1
                    mmu_cpu_rdy = 0
          else                               // it is a write access
```

-continued

```
        if  ((cpu_acode  = =  SupervisorDataSpace            AND
Region0Control[1] = = 1)
                OR  (cpu_acode  = =  UserDataSpace           AND
Region0Control[4] = = 1)) then
                                        //  this is a valid
write access to Region0
            peri_access_en = 0
            dram_access_en = 1
            mmu_cpu_berr = 0
        else                              // we have an access
violation
            peri_access_en = 0
            dram_access_en = 0
            mmu_cpu_berr = 1
            mmu_cpu_rdy = 0
```

PS6 Description: This final section of pseudocode deals with the special case of a bus timeout. This occurs when an access has been initiated but has not completed before the BusTimeout number of pclk cycles. While access to both DRAM and CPU/PEP Subsystem registers will take a variable number of cycles (due to DRAM traffic, PCU command execution or the different timing required to access registers in imported IP) each access should complete before a timeout occurs. Therefore it should not be possible to stall the CPU by locking either the CPU Subsystem or DIU buses. However given the fatal effect such a stall would have it is considered prudent to implement bus timeout detection.

```
PS6:
    // Only thing remaining is to implement a bus timeout
function.
    if ((cpu_start_access = = 1) then
        access_initiated = TRUE
        timeout_countdown = BusTimeout
    if ((mmu_cpu_rdy = = 1 ) OR (mmu_cpu_berr = =1 )) then
        access_initiated = FALSE
        peri_access_en = 0
        dram_access_en = 0
    if ((clock_tick = = TRUE) AND (access_initiated = = TRUE) AND
(BusTimeout != 0))
        if (timeout_countdown > 0) then
        timeout_countdown – –
    else   // timeout has occurred
        peri_access_en = 0            // abort the access
        dram_access_en = 0
        mmu_cpu_berr = 1
        mmu_cpu_rdy = 0
```

11.7 LEON Caches

Figure 23:
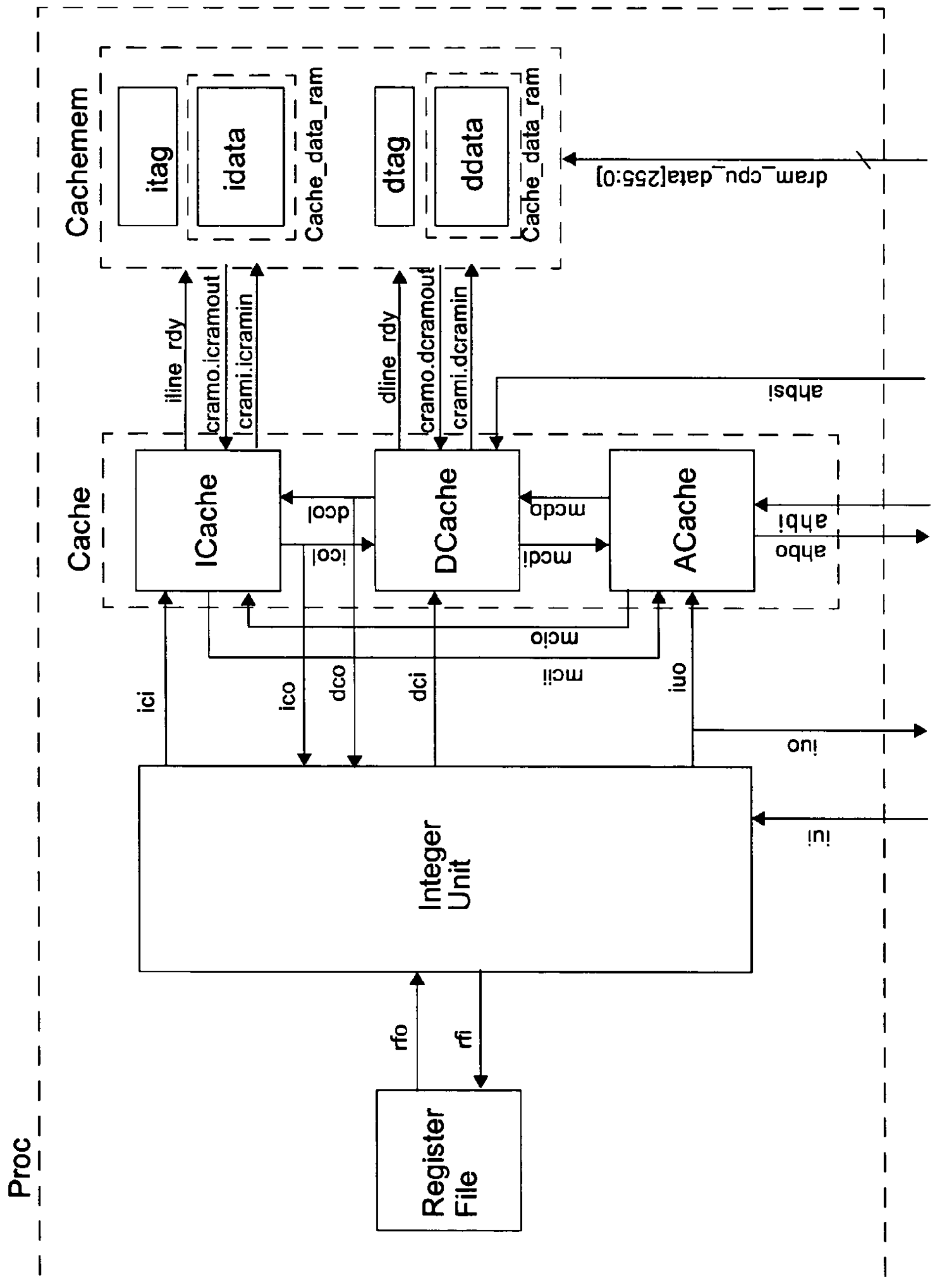
FIG. 23 shows a SoPEC LEON CPU core

The version of LEON implemented on SoPEC features 1 kB of ICache and 1 kB of DCache. Both caches are direct mapped and feature 8 word lines so their data RAMs are arranged as 32×256-bit and their tag RAMs as 32×30-bit (itag) or 32×32-bit (dtag). Like most of the rest of the LEON code used on SoPEC the cache controllers are taken from the leon2-1.0.7 release. The LEON cache controllers and cache RAMs have been modified to ensure that an entire 256-bit line is refilled at a time to make maximum use out of the memory bandwidth offered by the embedded DRAM organization (DRAM lines are also 256-bit). The data cache controller has also been modified to ensure that user mode code cannot access the DCache contents unless it is authorised to do so. A block diagram of the LEON CPU core as implemented on SoPEC is shown in FIG. 23 below.

In this diagram dotted lines are used to indicate hierarchy and red items represent signals or wrappers added as part of the SoPEC modifications. LEON makes heavy use of VHDL records and the records used in the CPU core are described in Table 25. Unless otherwise stated the records are defined in the iface.vhd file (part of the LEON release) and this should be consulted for a complete breakdown of the record elements.

TABLE 25

Relevant LEON records

| Record Name | Description |
|---|---|
| rfi | Register File Input record. Contains address, datain and control signals for the register file. |
| rfo | Register File Output record. Contains the data out of the dual read port register file. |
| ici | Instruction Cache In record. Contains program counters from different stages of the pipeline and various control signals |
| ico | Instruction Cache Out record. Contains the fetched instruction data and various control signals. This record is also sent to the DCache (i.e. icol) so that diagnostic accesses (e.g. lda/sta) can be serviced. |
| dci | Data Cache In record. Contains address and data buses from different stages of the pipeline (execute & memory) and various control signals |
| dco | Data Cache Out record. Contains the data retrieved from either memory or the caches and various control signals. This record is also sent to the ICache (i.e. dcol) so that diagnostic accesses (e.g. lda/sta) can be serviced. |
| iui | Integer Unit In record. This record contains the interrupt request level and a record for use with LEONs Debug Support Unit (DSU) |
| iuo | Integer Unit Out record. This record contains the acknowledged interrupt request level with control signals and a record for use with LEONs Debug Support Unit (DSU) |
| mcii | Memory to Cache Icache In record. Contains the address of an Icache miss and various control signals |
| mcio | Memory to Cache Icache Out record. Contains the returned data from memory and various control signals |
| mcdi | Memory to Cache Dcache In record. Contains the address and data of a Dcache miss or write and various control signals |
| mcdo | Memory to Cache Dcache Out record. Contains the returned data from memory and various control signals |

TABLE 25-continued

| Relevant LEON records | |
|---|---|
| Record Name | Description |
| ahbi | AHB In record. This is the input record for an AHB master and contains the data bus and AHB control signals. The destination for the signals in this record is the AHB controller. This record is defined in the amba.vhd file |
| ahbo | AHB Out record. This is the output record for an AHB master and contains the address and data buses and AHB control signals. The AHB controller drives the signals in this record. This record is defined in the amba.vhd file |
| ahbsi | AHB Slave In record. This is the input record for an AHB slave and contains the address and data buses and AHB control signals. It is used by the DCache to facilitate cache snooping (this feature is not enabled in SoPEC). This record is defined in the amba.vhd file |
| crami | Cache RAM In record. This record is composed of records of records which contain the address, data and tag entries with associated control signals for both the ICache RAM and DCache RAM |
| cramo | Cache RAM Out record. This record is composed of records of records which contain the data and tag entries with associated control signals for both the ICache RAM and DCache RAM |
| iline_rdy | Control signal from the ICache controller to the instruction cache memory. This signal is active (high) when a full 256-bit line (on dram_cpu_data) is to be written to cache memory. |
| dline_rdy | Control signal from the DCache controller to the data cache memory. This signal is active (high) when a full 256-bit line (on dram_cpu_data) is to be written to cache memory. |
| dram_cpu_data | 256-bit data bus from the embedded DRAM |

11.7.1 Cache Controllers

The LEON cache module consists of three components: the ICache controller (icache.vhd), the DCache controller (dcache.vhd) and the AHB bridge (acache.vhd) which translates all cache misses into memory requests on the AHB bus.

In order to enable full line refill operation a few changes had to be made to the cache controllers. The ICache controller was modified to ensure that whenever a location in the cache was updated (i.e. the cache was enabled and was being refilled from DRAM) all locations on that cache line had their valid bits set to reflect the fact that the full line was updated. The iline_rdy signal is asserted by the ICache controller when this happens and this informs the cache wrappers to update all locations in the idata RAM for that line.

A similar change was made to the DCache controller except that the entire line was only updated following a read miss and that existing write through operation was preserved. The DCache controller uses the dline_rdy signal to instruct the cache wrapper to update all locations in the ddata RAM for a line. An additional modification was also made to ensure that a double-word load instruction from a non-cached location would only result in one read access to the DIU i.e. the second read would be serviced by the data cache. Note that if the DCache is turned off then a double-word load instruction will cause two DIU read accesses to occur even though they will both be to the same 256-bit DRAM line.

The DCache controller was further modified to ensure that user mode code cannot access cached data to which it does not have permission (as determined by the relevant RegionNControl register settings at the time the cache line was loaded). This required an extra 2 bits of tag information to record the user read and write permissions for each cache line. These user access permissions can be updated in the same manner as the other tag fields (i.e. address and valid bits) namely by line refill, STA instruction or cache flush. The user access permission bits are checked every time user code attempts to access the data cache and if the permissions of the access do not agree with the permissions returned from the tag RAM then a cache miss occurs. As the MMU evaluates the access permissions for every cache miss it will generate the appropriate exception for the forced cache miss caused by the errant user code. In the case of a prohibited read access the trap will be immediate while a prohibited write access will result in a deferred trap. The deferred trap results from the fact that the prohibited write is committed to a write buffer in the DCache controller and program execution continues until the prohibited write is detected by the MMU which may be several cycles later. Because the errant write was treated as a write miss by the DCache controller (as it did not match the stored user access permissions) the cache contents were not updated and so remain coherent with the DRAM contents (which do not get updated because the MMU intercepted the prohibited write). Supervisor mode code is not subject to such checks and so has free access to the contents of the data cache.

In addition to AHB bridging, the ACache component also performs arbitration between ICache and DCache misses when simultaneous misses occur (the DCache always wins) and implements the Cache Control Register (CCR). The leon2-1.0.7 release is inconsistent in how it handles cacheability: For instruction fetches the cacheability (i.e. is the access to an area of memory that is cacheable) is determined by the ICache controller while the ACache determines whether or not a data access is cacheable. To further complicate matters the DCache controller does determine if an access resulting from a cache snoop by another AHB master is cacheable (Note that the SoPEC ASIC does not implement cache snooping as it has no need to do so). This inconsistency has been cleaned up in more recent LEON releases but is preserved here to minimise the number of changes to the LEON RTL. The cache controllers were modified to ensure that only DRAM accesses (as defined by the SoPEC memory map) are cached.

The only functionality removed as a result of the modifications was support for burst fills of the ICache. When enabled burst fills would refill an ICache line from the location where a miss occurred up to the end of the line. As the entire line is now refilled at once (when executing from DRAM) this functionality is no longer required. Furthermore more substantial modifications to the ICache controller would be needed if we wished to preserve this function without adversely affecting full line refills. The CCR was therefore modified to ensure that the instruction burst fetch bit (bit16) was tied low and could not be written to.

11.7.1.1 LEON Cache Control Register

The CCR controls the operation of both the I and D caches. Note that the bitfields used on the SoPEC implementation of this register are based on the LEON v1.0.7 implementation and some bits have their values tied off. See section 4 of the LEON manual for a description of the LEON cache controllers.

TABLE 26

LEON Cache Control Register

| Field Name | bit(s) | Description |
|---|---|---|
| ICS | 1:0 | Instruction cache state:<br>00 - disabled<br>01 - frozen<br>10 - disabled<br>11 - enabled |
| Reserved | 13:6 | Reserved. Reads as 0. |
| DCS | 3:2 | Data cache state:<br>00 - disabled<br>01 - frozen<br>10 - disabled<br>11 - enabled |
| IF | 4 | ICache freeze on interrupt<br>0 - Do not freeze the ICache contents on taking an interrupt<br>1 - Freeze the ICache contents on taking an interrupt |
| DF | 5 | DCache freeze on interrupt<br>0 - Do not freeze the DCache contents on taking an interrupt<br>1 - Freeze the DCache contents on taking an interrupt |
| Reserved | 13:6 | Reserved. Reads as 0. |
| DP | 14 | Data cache flush pending.<br>0 - No DCache flush in progress<br>1 - DCache flush in progress<br>This bit is Readonly. |
| IP | 15 | Instruction cache flush pending.<br>0 - No ICache flush in progress<br>1 - ICache flush in progress<br>This bit is Readonly. |
| IB | 16 | Instruction burst fetch enable. This bit is tied low on SoPEC because it would interfere with the operation of the cache wrappers. Burst refill functionality is automatically provided in SoPEC by the cache wrappers. |
| Reserved | 20:17 | Reserved. Reads as 0. |
| FI | 21 | Flush instruction cache. Writing a 1 this bit will flush the ICache. Reads as 0. |
| FD | 22 | Flush data cache. Writing a 1 this bit will flush the DCache. Reads as 0. |
| DS | 23 | Data cache snoop enable. This bit is tied low in SoPEC as there is no requirement to snoop the data cache. |
| Reserved | 31:24 | Reserved. Reads as 0. |

11.7.2 Cache Wrappers

The cache RAMs used in the leon2-1.0.7 release needed to be modified to support full line refills and the correct IBM macros also needed to be instantiated. Although they are described as RAMs throughout this document (for consistency), register arrays are actually used to implement the cache RAMs. This is because IBM SRAMs were not available in suitable configurations (offered configurations were too big) to implement either the tag or data cache RAMs. Both instruction and data tag RAMs are implemented using dual port (1 Read & 1 Write) register arrays and the clocked write-through versions of the register arrays were used as they most closely approximate the single port SRAM LEON expects to see.

11.7.2.1 Cache Tag RAM Wrappers

The itag and dtag RAMs differ only in their width—the itag is a 32×30 array while the dtag is a 32×32 array with the extra 2 bits being used to record the user access permissions for each line. When read using a LDA instruction both tags return 32-bit words. The tag fields are described in Table 27 and Table 28 below. Using the IBM naming conventions the register arrays used for the tag RAMs are called RA032X30D2P2W1R1M3 for the itag and RA032X32D2P2W1R1M3 for the dtag. The ibm_syncram wrapper used for the tag RAMs is a simple affair that just maps the wrapper ports on to the appropriate ports of the IBM register array and ensures the output data has the correct timing by registering it. The tag RAMs do not require any special modifications to handle full line refills.

TABLE 27

LEON Instruction Cache Tag

| Field Name | bit(s) | Description |
|---|---|---|
| Valid | 7:0 | Each valid bit indicates whether or not the corresponding word of the cache line contains valid data |
| Reserved | 9:8 | Reserved - these bits do not exist in the itag RAM. Reads as 0. |
| Address | 31:10 | The tag address of the cache line |

TABLE 28

LEON Data Cache Tag

| Field Name | bit(s) | Description |
|---|---|---|
| Valid | 7:0 | Each valid bit indicates whether or not the corresponding word of the cache line contains valid data |
| URP | 8 | User read permission.<br>0 - User mode reads will force a refill of this line<br>1 - User mode code can read from this cache line. |
| UWP | 9 | User write permission.<br>0 - User mode writes will not be written to the cache<br>1 - User mode code can write to this cache line. |
| Address | 31:10 | The tag address of the cache line |

11.7.2.2 Cache Data RAM Wrappers

Figure 24:
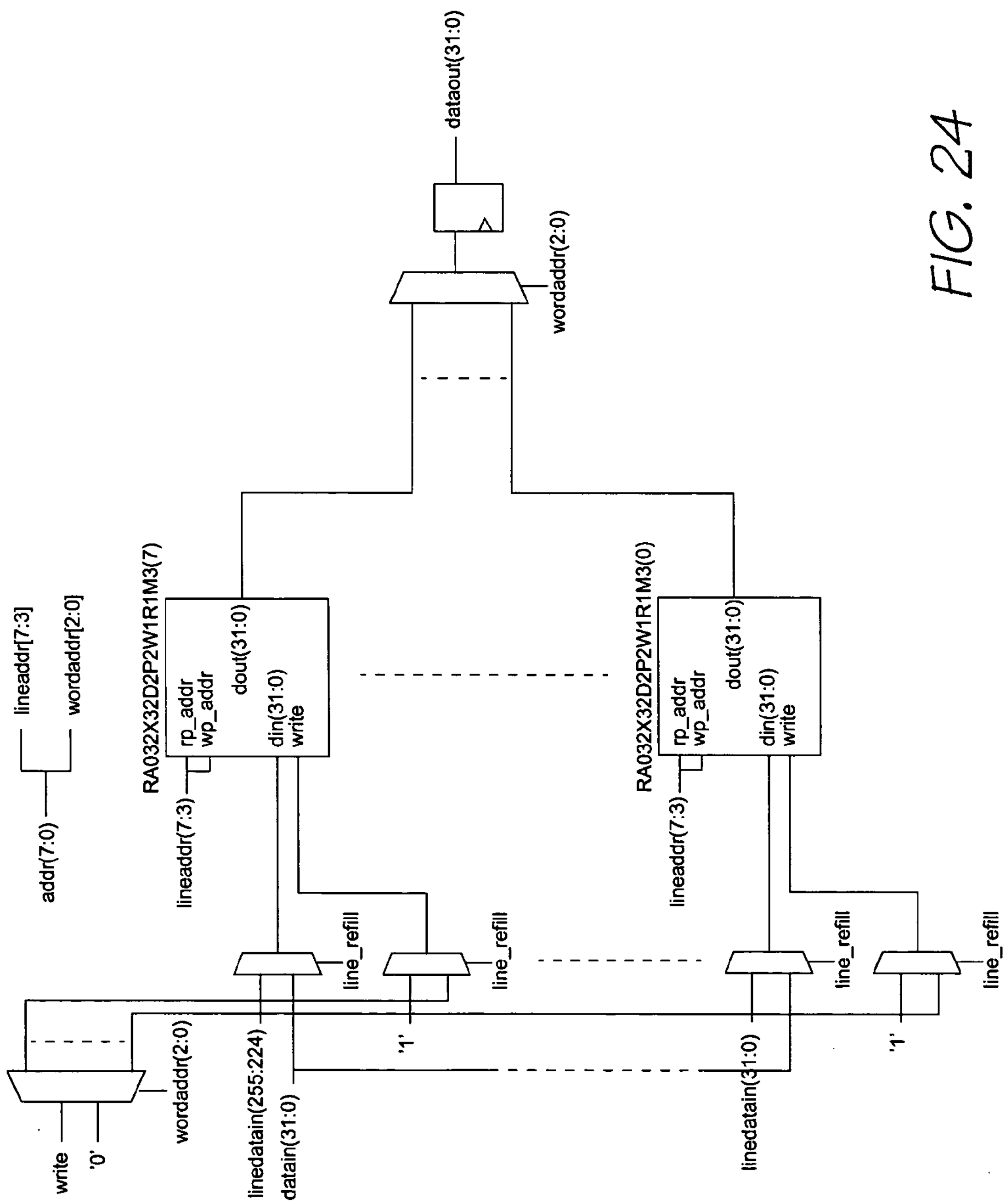
FIG. 24 shows a cache data RAM wrapper

The cache data RAM contains the actual cached data and nothing else. Both the instruction and data cache data RAMs are implemented using 8 32×32-bit register arrays and some additional logic to support full line refills. Using the IBM naming conventions the register arrays used for the tag RAMs are called RA032X32D2P2W1R1M3. The ibm_cdram_wrap wrapper used for the tag RAMs is shown in FIG. 24 below.

To the cache controllers the cache data RAM wrapper looks like a 256×32 single port SRAM (which is what they expect to see) with an input to indicate when a full line refill is taking place (the line_rdy signal). Internally the 8-bit address bus is split into a 5-bit lineaddress, which selects one of the 32 256-bit cache lines, and a 3-bit wordaddress which selects one of the 8 32-bit words on the cache line. Thus each of the 8 32×32 register arrays contains one 32-bit word of each cache line. When a full line is being refilled (indicated by both the line rdy and write signals being high) every register array is written to with the appropriate 32 bits from the linedatain bus which contains the 256-bit line returned by the DIU after a cache miss. When just one word of the cache line is to be written (indicated by the write signal being high while the line_rdy is low) then the wordaddress is used to enable the write signal to the selected register array only—all other write enable signals are kept low. The data cache controller handles byte and half-word write by means of a read-modify-write operation so writes to the cache data RAM are always 32-bit.

The wordaddress is also used to select the correct 32-bit word from the cache line to return to the LEON integer unit.

11.8 Realtime Debug Unit (RDU)

The RDU facilitates the observation of the contents of most of the CPU addressable registers in the SoPEC device in addition to some pseudo-registers in realtime. The contents of pseudo-registers, i.e. registers that are collections of otherwise unobservable signals and that do not affect the functionality of a circuit, are defined in each block as required. Many blocks do not have pseudo-registers and some blocks (e.g. ROM, PSS) do not make debug information available to the RDU as it would be of little value in realtime debug.

Figure 25:
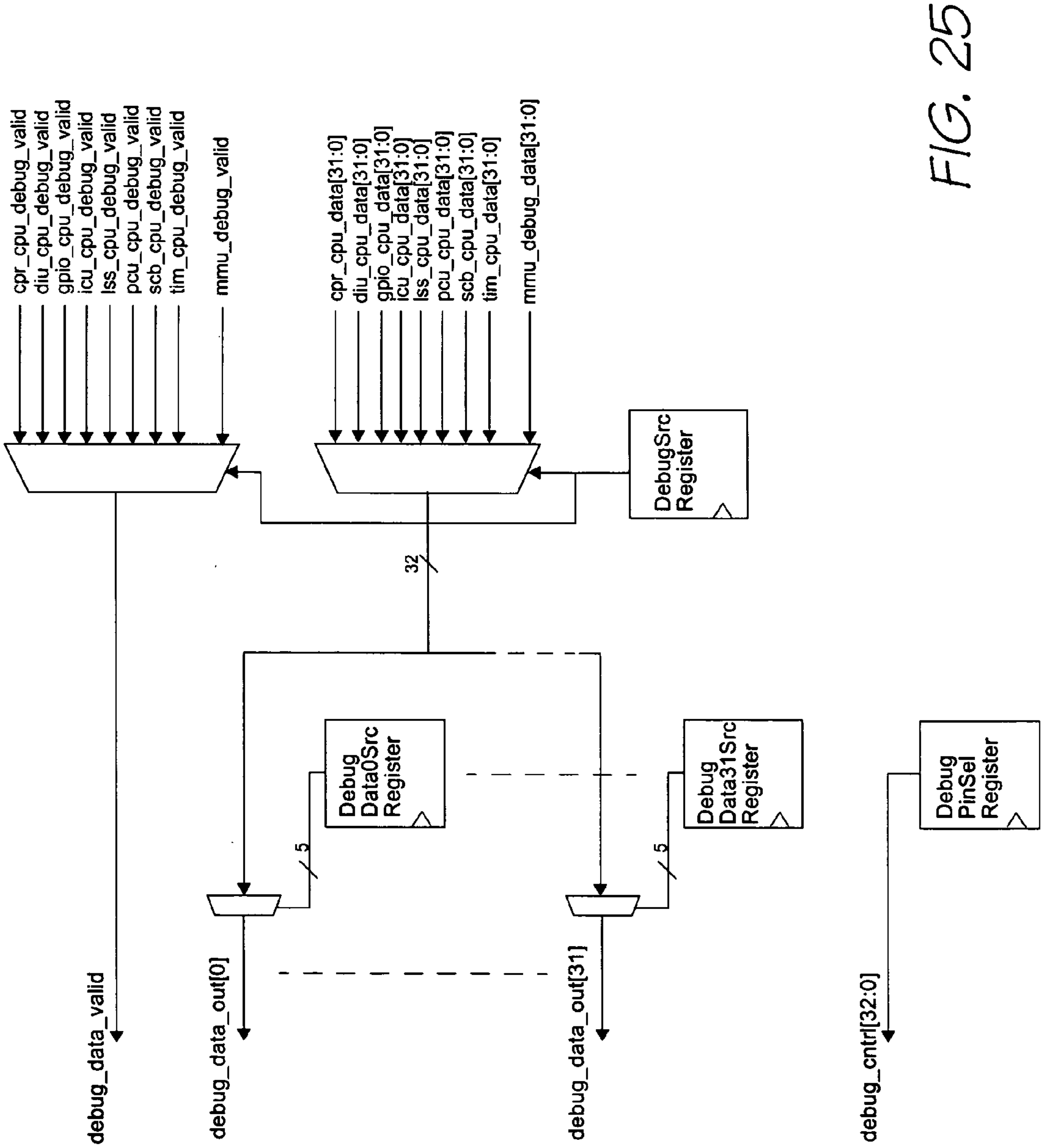
FIG. 25 shows a realtime debug unit block diagram

Each block that supports realtime debug observation features a DebugSelect register that controls a local mux to determine which register is output on the block's data bus (i.e. block_cpu_data). One small drawback with reusing the blocks data bus is that the debug data cannot be present on the same bus during a CPU read from the block. An accompanying active high block_cpu_debug_valid signal is used to indicate when the data bus contains valid debug data and when the bus is being used by the CPU. There is no arbitration for the bus as the CPU will always have access when required. A block diagram of the RDU is shown in FIG. 25.

TABLE 29

RDU I/Os

| Port name | Pins | I/O | Description |
|---|---|---|---|
| diu_cpu_data | 32 | In | Read data bus from the DIU block |
| cpr_cpu_data | 32 | In | Read data bus from the CPR block |
| gpio_cpu_data | 32 | In | Read data bus from the GPIO block |
| icu_cpu_data | 32 | In | Read data bus from the ICU block |
| lss_cpu_data | 32 | In | Read data bus from the LSS block |
| pcu_cpu_debug_data | 32 | In | Read data bus from the PCU block |
| scb_cpu_data | 32 | In | Read data bus from the SCB block |
| tim_cpu_data | 32 | In | Read data bus from the TIM block |
| diu_cpu_debug_valid | 1 | In | Signal indicating the data on the diu_cpu_data bus is valid debug data. |
| tim_cpu_debug_valid | 1 | In | Signal indicating the data on the tim_cpu_data bus is valid debug data. |
| scb_cpu_debug_valid | 1 | In | Signal indicating the data on the scb_cpu_data bus is valid debug data. |
| pcu_cpu_debug_valid | 1 | In | Signal indicating the data on the pcu_cpu_data bus is valid debug data. |
| lss_cpu_debug_valid | 1 | In | Signal indicating the data on the lss_cpu_data bus is valid debug data. |
| icu_cpu_debug_valid | 1 | In | Signal indicating the data on the icu_cpu_data bus is valid debug data. |
| gpio_cpu_debug_valid | 1 | In | Signal indicating the data on the gpio_cpu_data bus is valid debug data. |

TABLE 29-continued

RDU I/Os

| Port name | Pins | I/O | Description |
|---|---|---|---|
| cpr_cpu_debug_valid | 1 | In | Signal indicating the data on the cpr_cpu_data bus is valid debug data. |
| debug_data_out | 32 | Out | Output debug data to be muxed on to the PHI/GPIO/other pins |
| debug_data_valid | 1 | Out | Debug valid signal indicating the validity of the data on debug_data_out. This signal is used in all debug configurations |
| debug_cntrl | 33 | Out | Control signal for each debug data line indicating whether or not the debug data should be selected by the pin mux |

As there are no spare pins that can be used to output the debug data to an external capture device some of the existing I/Os will have a debug multiplexer placed in front of them to allow them be used as debug pins. Furthermore not every pin that has a debug mux will always be available to carry the debug data as they may be engaged in their primary purpose e.g. as a GPIO pin. The RDU therefore outputs a debug_cntrl signal with each debug data bit to indicate whether the mux associated with each debug pin should select the debug data or the normal data for the pin. The DebugPinSel1 and DebugPinSel2 registers are used to determine which of the 33 potential debug pins are enabled for debug at any particular time.

As it may not always be possible to output a full 32-bit debug word every cycle the RDU supports the outputting of an n-bit sub-word every cycle to the enabled debug pins. Each debug test would then need to be re-run a number of times with a different portion of the debug word being output on the n-bit sub-word each time. The data from each run should then be correlated to create a full 32-bit (or whatever size is needed) debug word for every cycle. The debug_data_valid and pclk_out signals will accompany every sub-word to allow the data to be sampled correctly. The pclk_out signal is sourced close to its output pad rather than in the RDU to minimise the skew between the rising edge of the debug data signals (which should be registered close to their output pads) and the rising edge of pclk_out.

As multiple debug runs will be needed to obtain a complete set of debug data the n-bit sub-word will need to contain a different bit pattern for each run. For maximum flexibility each debug pin has an associated DebugDataSrc register that allows any of the 32 bits of the debug data word to be output on that particular debug data pin. The debug data pin must be enabled for debug operation by having its corresponding bit in the DebugPinSel registers set for the selected debug data bit to appear on the pin.

The size of the sub-word is determined by the number of enabled debug pins which is controlled by the DebugPinSel registers. Note that the debug_data_valid signal is always output. Furthermore debug_cntrl[0] (which is configured by DebugPinSel1) controls the mux for both the debug_data_valid and pclk_out signals as both of these must be enabled for any debug operation. The mapping of debug_data_out[n] signals onto individual pins will take place outside the RDU. This mapping is described in Table 30 below.

TABLE 30

| DebugPinSel mapping | |
|---|---|
| bit # | Pin |
| DebugPinSel1 | phi_frclk. The debug_data_valid signal will appear on this pin when enabled. Enabling this pin also automatically enables the phi_readl pin which will output the pclk_out signal |
| DebugPinSel2(0–31) | gpio[0 . . . 31] |

TABLE 31

RDU Configuration Registers

| Address offset from MMU_base | Register | #bits | Reset | Description |
|---|---|---|---|---|
| 0x80 | DebugSrc | 4 | 0x00 | Denotes which block is supplying the debug data. The encoding of this block is given below.<br>0 - MMU<br>1 - TIM<br>2 - LSS<br>3 - GPIO<br>4 - SCB<br>5 - ICU<br>6 - CPR<br>7 - DIU<br>8 - PCU |
| 0x84 | DebugPinSel1 | 1 | 0x0 | Determines whether the phi_frclk and phi_readl pins are used for debug output.<br>1 - Pin outputs debug data<br>0 - Normal pin function |
| 0x88 | DebugPinSel2 | 32 | 0x0000_0000 | Determines whether a pin is used for debug data output.<br>1 - Pin outputs debug data<br>0 - Normal pin function |
| 0x8C to 0x108 | DebugDataSrc [31:0] | 32 × 5 | 0x00 | Selects which bit of the 32-bit debug data word will be output on debug_data_out[N] |

11.9 Interrupt Operation

The interrupt controller unit (see chapter 14) generates an interrupt request by driving interrupt request lines with the appropriate interrupt level. LEON supports 15 levels of interrupt with level 15 as the highest level (the SPARC architecture manual [36] states that level 15 is non-maskable but we have the freedom to mask this if desired). The CPU will begin processing an interrupt exception when execution of the current instruction has completed and it will only do so if the interrupt level is higher than the current processor priority. If a second interrupt request arrives with the same level as an executing interrupt service routine then the exception will not be processed until the executing routine has completed.

When an interrupt trap occurs the LEON hardware will place the program counters (PC and nPC) into two local registers. The interrupt handler routine is expected, as a minimum, to place the PSR register in another local register to ensure that the LEON can correctly return to its pre-interrupt state. The 4-bit interrupt level (irl) is also written to the trap type (tt) field of the TBR (Trap Base Register) by hardware. The TBR then contains the vector of the trap handler routine the processor will then jump. The TBA (Trap Base Address) field of the TBR must have a valid value before any interrupt processing can occur so it should be configured at an early stage.

Interrupt pre-emption is supported while ET (Enable Traps) bit of the PSR is set. This bit is cleared during the initial trap processing. In initial simulations the ET bit was observed to be cleared for up to 30 cycles. This causes significant additional interrupt latency in the worst case where a higher priority interrupt arrives just as a lower priority one is taken.

Figure 26:
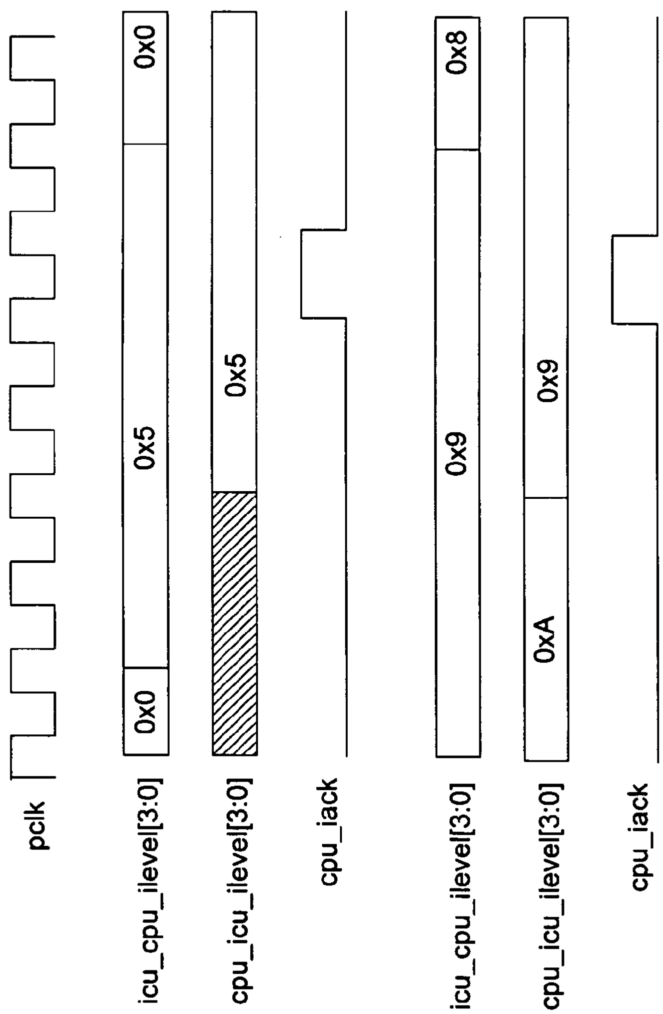
FIG. 26 shows interrupt acknowledge cycles for single and pending interrupts

The interrupt acknowledge cycles shown in FIG. 26 below are derived from simulations of the LEON processor. The SoPEC toplevel interrupt signals used in this diagram map directly to the LEON interrupt signals in the iui and iuo records. An interrupt is asserted by driving its (encoded) level on the icu_cpu_ilevel[3:0] signals (which map to iui.irl[3:0]). The LEON core responds to this, with variable timing, by reflecting the level of the taken interrupt on the cpu_icu_ilevel[3:0] signals (mapped to iuo.irl[3:0]) and asserting the acknowledge signal cpu_iack (iuo.intack). The interrupt controller then removes the interrupt level one cycle after it has seen the level been acknowledged by the core. If there is another pending interrupt (of lower priority) then this should be driven on icu_cpu_ilevel[3:0] and the CPU will take that interrupt (the level 9 interrupt in the example below) once it has finished processing the higher priority interrupt. The cpu_icu_ilevel[3:0] signals always reflect the level of the last taken interrupt, even when the CPU has finished processing all interrupts.

11.10 Boot Operation

See section 17.2 for a description of the SoPEC boot operation.

11.11 Software Debug

Software debug mechanisms are discussed in the "SoPEC Software Debug" document [15].

12 Serial Communications Block (SCB)

12.1 Overview

The Serial Communications Block (SCB) handles the movement of all data between the SoPEC and the host device (e.g. PC) and between master and slave SoPEC devices. The main components of the SCB are a Full-Speed (FS) USB Device Core, a FS USB Host Core, a Inter-SoPEC Interface (ISI), a DMA manager, the SCB Map and associated control logic. The need for these components and the various types of communication they provide is evident in a multi-SoPEC printer configuration.

12.1.1 Multi-SoPEC Systems

Figure 27:
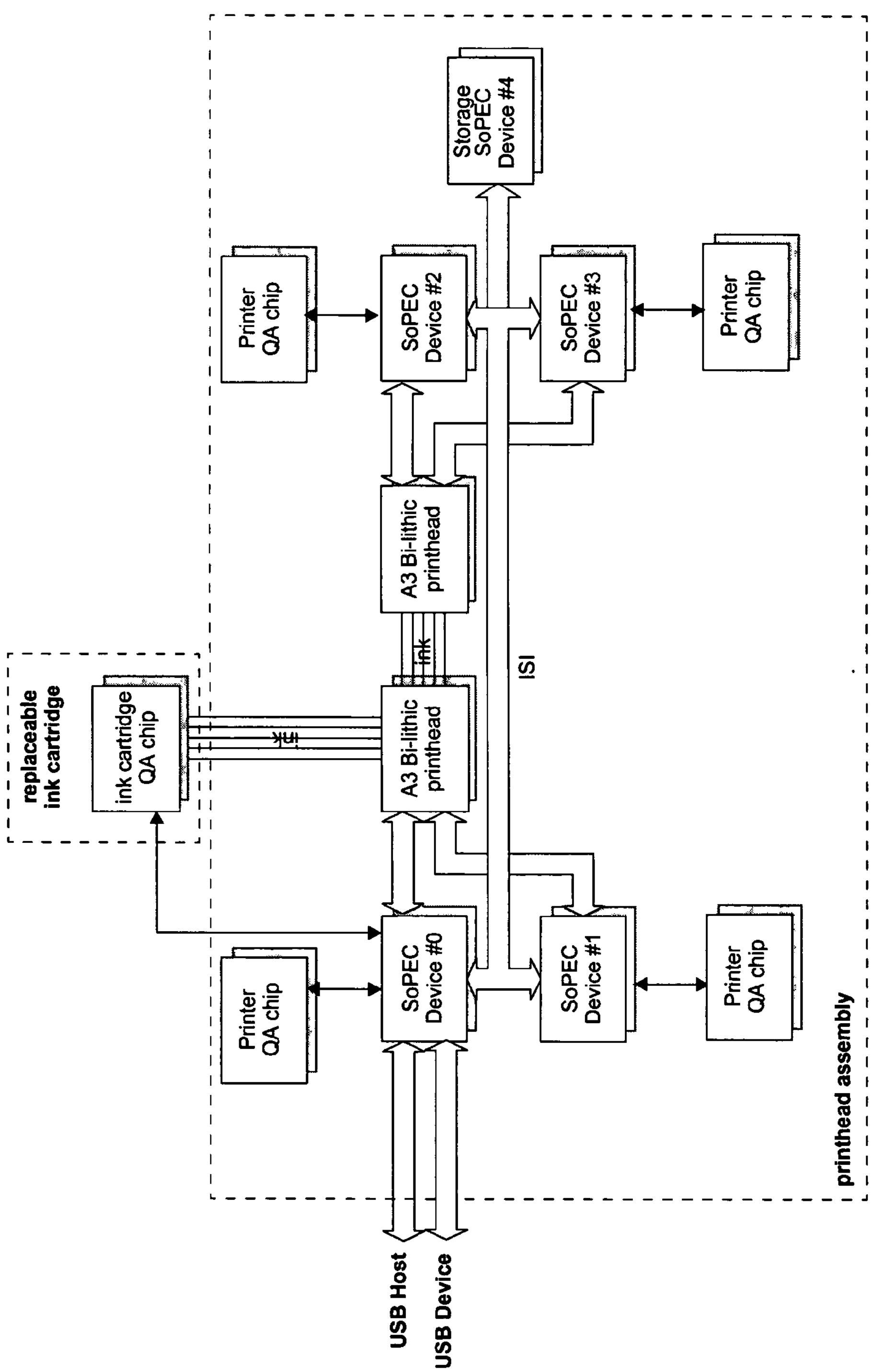
FIG. 27 shows an A3 duplex system featuring four printing SoPECs with a single SoPEC DRAM device

While single SoPEC systems are expected to form the majority of SoPEC systems the SoPEC device must also support its use in multi-SoPEC systems such as that shown in FIG. 27. A SoPEC may be assigned any one of a number of identities in a multi-SoPEC system. A SoPEC may be one or more of a PrintMaster, a LineSyncMaster, an ISIMaster, a StorageSoPEC or an ISISlave SoPEC.

12.1.1.1 ISIMaster Device

The ISIMaster is the only device that controls the common ISI lines (see FIG. 30) and typically interfaces directly with the host. In most systems the ISIMaster will simply be the SoPEC connected to the USB bus. Future systems, however, may employ an ISI-Bridge chip to interface between the host and the ISI bus and in such systems the ISI-Bridge chip will be the ISIMaster. There can only be one ISIMaster on an ISI bus.

Systems with multiple SoPECs may have more than one host connection, for example there could be two SoPECs communicating with the external host over their FS USB links (this would of course require two USB cables to be connected), but still only one ISIMaster.

While it is not expected to be required, it is possible for a device to hand over its role as the ISIMaster to another device on the ISI i.e. the ISIMaster is not necessarily fixed.

12.1.1.2 PrintMaster Device

The PrintMaster device is responsible for coordinating all aspects of the print operation. This includes starting the print operation in all printing SoPECs and communicating status back to the external host. When the ISIMaster is a SoPEC device it is also likely to be the PrintMaster as well. There may only be one PrintMaster in a system and it is most likely to be a SoPEC device.

12.1.1.3 LineSyncMaster Device

The LineSyncMaster device generates the lsync pulse that all SoPECs in the system must synchronize their line outputs with. Any SoPEC in the system could act as a LineSyncMaster although the PrintMaster is probably the most likely candidate. It is possible that the LineSyncMaster may not be a SoPEC device at all—it could, for example, come from some OEM motor control circuitry. There may only be one LineSyncMaster in a system.

12.1.1.4 Storage Device

For certain printer types it may be realistic to use one SoPEC as a storage device without using its print engine capability—that is to effectively use it as an ISI-attached DRAM. A storage SoPEC would receive data from the ISIMaster (most likely to be an ISI-Bridge chip) and then distribute it to the other SoPECs as required. No other type of data flow (e.g. ISISlave->storage SoPEC->ISISlave) would need to be supported in such a scenario. The SCB supports this functionality at no additional cost because the CPU handles the task of transferring outbound data from the embedded DRAM to the ISI transmit buffer. The CPU in a storage SoPEC will have almost nothing else to do.

12.1.1.5 ISISlave Device

Multi-SoPEC systems will contain one or more ISISlave SoPECs. An ISISlave SoPEC is primarily used to generate dot data for the printhead IC it is driving. An ISISlave will not transmit messages on the ISI without first receiving permission to do so, via a ping packet (see section 12.4.4.6), from the ISIMaster 12.1.1.6 ISI-Bridge Device SoPEC is targeted at the low-cost small office/home office (SoHo) market. It may also be used in future systems that target different market segments which are likely to have a high speed interface capability. A future device, known as an ISI-Bridge chip, is envisaged which will feature both a high speed interface (such as High-Speed (HS) USB, Ethernet or IEEE1394) and one or more ISI interfaces. The use of multiple ISI buses would allow the construction of independent print systems within the one printer. The ISI-Bridge would be the ISIMaster for each of the ISI buses it interfaces to.

12.1.1.7 External Host

The external host is most likely (but is not required) to be, a PC. Any system that can act as a USB host or that can interface to an ISI-Bridge chip could be the external host. In particular, with the development of USB On-The-Go (USB OTG), it is possible that a number of USB OTG enabled products such as PDAs or digital cameras will be able to directly interface with a SoPEC printer.

12.1.1.8 External USB Device

The external USB device is most likely (but is not required) to be, a digital camera. Any system that can act as a USB device could be connected as an external USB device. This is to facilitate printing in the absence of a PC.

12.1.2 Types of Communication 12.1.2.1 Communications with External Host

The external host communicates directly with the ISIMaster in order to print pages. When the ISIMaster is a SoPEC, the communications channel is FS USB.

12.1.2.1.1 External Host to ISIMaster Communication

The external host will need to communicate the following information to the ISIMaster device:

- Communications channel configuration and maintenance information
- Most data destined for PrintMaster, ISISlave or storage SoPEC devices. This data is simply relayed by the ISIMaster
- Mapping of virtual communications channels, such as USB endpoints, to ISI destination 12.1.2.1.2 ISIMaster to External Host Communication The ISIMaster will need to communicate the following information to the external host:

- Communications channel configuration and maintenance information
- All data originating from the PrintMaster, ISISlave or storage SoPEC devices and destined for the external host. This data is simply relayed by the ISIMaster 12.1.2.1.3 External Host to PrintMaster Communication The external host will need to communicate the following information to the PrintMaster device:

- Program code for the PrintMaster
- Compressed page data for the PrintMaster
- Control messages to the PrintMaster
- Tables and static data required for printing e.g. dead nozzle tables, dither matrices etc.
- Authenticatable messages to upgrade the printer's capabilities 12.1.2.1.4 PrintMaster to External Host Communication The PrintMaster will need to communicate the following information to the external host:

- Printer status information (i.e. authentication results, paper empty/jammed etc.)
- Dead nozzle information
- Memory buffer status information
- Power management status Encrypted SoPEC_id for use in the generation of PRINTER_QA keys during factory programming 12.1.2.1.5 External Host to ISISlave Communication All communication between the external host and ISISlave SoPEC devices must be direct (via a dedicated connection between the external host and the ISISlave) or must take place via the ISIMaster. In the case of a SoPEC ISIMaster it is possible to configure each individual USB endpoint to act as a control channel to an ISISlave SoPEC if desired, although the endpoints will be more usually used to transport data. The external host will need to communicate the following information to ISISlave devices over the comms/ISI:

Program code for ISISlave SoPEC devices

Compressed page data for ISISlave SoPEC devices

Control messages to the ISISlave SoPEC (where a control channel is supported)

Tables and static data required for printing e.g. dead nozzle tables, dither matrices etc.

Authenticatable messages to upgrade the printer's capabilities 12.1.2.1.6 ISISlave to External Host Communication All communication between the ISISlave SoPEC devices and the external host must take place via the ISIMaster. The ISISlave will need to communicate the following information to the external host over the comms/ISI:

Responses to the external host's control messages (where a control channel is supported)

Dead nozzle information from the ISISlave SoPEC.

Encrypted SoPEC_id for use in the generation of PRINTER_QA keys during factory programming 12.1.2.2 Communication with External USB Device 12.1.2.2.1 ISIMaster to External USB Device Communication Communications channel configuration and maintenance information.

12.1.2.2.2 External USB Device to ISIMaster Communication

Print data from a function on the external USB device.

12.1.2.3 Communication Over ISI 12.1.2.3.1 ISIMaster to PrintMaster Communication The ISIMaster and PrintMaster will often be the same physical device. When they are different devices then the following information needs to be exchanged over the ISI:

All data from the external host destined for the PrintMaster (see section 12.1.2.1.4).

This data is simply relayed by the ISIMaster 12.1.2.3.2 PrintMaster to ISIMaster Communication The ISIMaster and PrintMaster will often be the same physical device. When they are different devices then the following information needs to be exchanged over the ISI:

All data from the PrintMaster destined for the external host (see section 12.1.2.1.4).

This data is simply relayed by the ISIMaster 12.1.2.3.3 ISIMaster to ISISlave Communication The ISIMaster may wish to communicate the following information to the ISISlaves:

All data (including program code such as ISIId enumeration) originating from the external host and destined for the ISISlave (see section 12.1.2.1.5). This data is simply relayed by the ISIMaster wake up from sleep mode 12.1.2.3.4 ISISlave to ISIMaster Communication The ISISlave may wish to communicate the following information to the ISIMaster:

All data originating from the ISISlave and destined for the external host (see section 12.1.2.1.6). This data is simply relayed by the ISIMaster 12.1.2.3.5 PrintMaster to ISISlave Communication When the PrintMaster is not the ISIMaster all ISI communication is done in response to ISI ping packets (see 12.4.4.6). When the PrintMaster is the ISIMaster then it will of course communicate directly with the ISISlaves. The PrintMaster SoPEC may wish to communicate the following information to the ISISlaves:

Ink status e.g. requests for dotCount data i.e. the number of dots in each color fired by the printheads connected to the ISISlaves configuration of GPIO ports e.g. for clutch control and lid open detect power down command telling the ISISlave to enter sleep mode ink cartridge fail information This list is not complete and the time constraints associated with these requirements have yet to be determined.

In general the PrintMaster may need to be able to:

send messages to an ISISlave which will cause the ISISlave to return the contents of ISISlave registers to the PrintMaster or to program ISISlave registers with values sent by the PrintMaster This should be under the control of software running on the CPU which writes messages to the ISI/SCB interface.

12.1.2.3.6 ISISlave to PrintMaster Communication

ISISlaves may need to communicate the following information to the PrintMaster:

ink status e.g. dotCount data i.e. the number of dots in each color fired by the printheads connected to the ISISlaves band related information e.g. finished band interrupts page related information i.e. buffer underrun, page finished interrupts MMU security violation interrupts GPIO interrupts and status e.g. clutch control and lid open detect printhead temperature printhead dead nozzle information from SoPEC printhead nozzle tests power management status This list is not complete and the time constraints associated with these requirements have yet to be determined.

As the ISI is an insecure interface commands issued over the ISI should be of limited capability e.g. only limited register writes allowed. The software protocol needs to be constructed with this in mind. In general ISISlaves may need to return register or status messages to the PrintMaster or ISIMaster. They may also need to indicate to the PrintMaster or ISIMaster that a particular interrupt has occurred on the ISISlave. This should be under the control of software running on the CPU which writes messages to the ISI block.

12.1.2.3.7 ISISlave to ISISlave Communication

The amount of information that will need to be communicated between ISISlaves will vary considerably depending on the printer configuration. In some systems ISISlave devices will only need to exchange small amounts of control information with each other while in other systems (such as those employing a storage SoPEC or extra USB connection) large amounts of compressed page data may be moved between ISISlaves. ScenarIOs where ISISlave to ISISlave communication is required include: (a) when the PrintMaster is not the ISIMaster, (b) QA Chip ink usage protocols, (c)

data transmission from data storage SoPECs, (d) when there are multiple external host connections supplying data to the printer.

12.1.3 SCB Block Diagram

Figure 28:
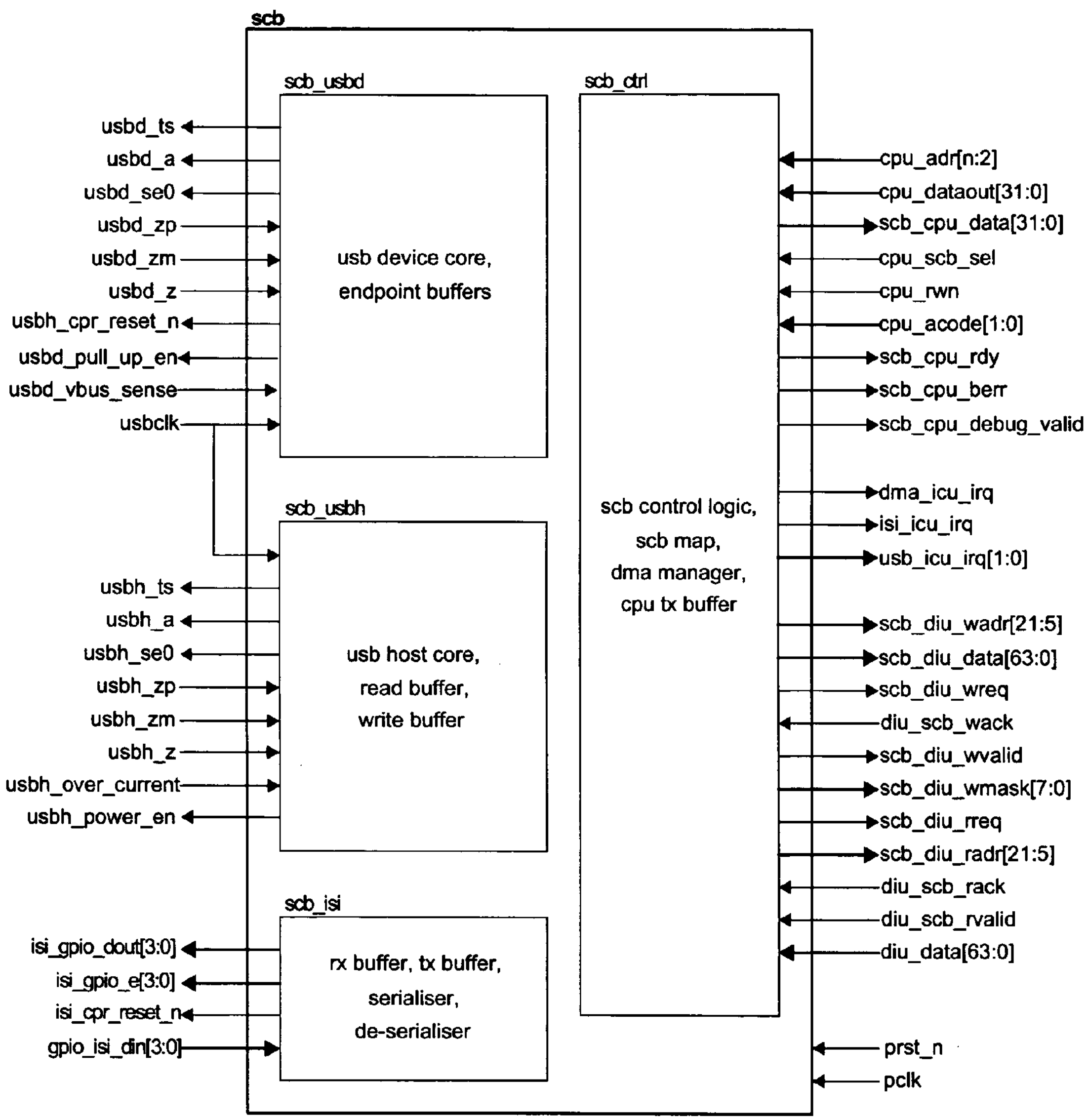
FIG. 28 is an SCB block diagram

The SCB consists of four main sub-blocks, as shown in the basic block diagram of FIG. 28.

12.1.4 Definitions of I/Os

The toplevel I/Os of the SCB are listed in Table 32. A more detailed description of their functionality will be given in the relevant sub-block sections.

TABLE 32

SCB I/O

| Port name | s | I/O | Description |
|---|---|---|---|
| Clocks and Resets | | | |
| prst_n | 1 | In | System reset signal. Active low. |
| Pclk | 1 | In | System clock. |
| usbclk | 1 | In | 48 MHz clock for the USB device and host cores. The cores also require a 12 MHz clock, which will be generated locally by dividing the 48 MHz clock by 4. |
| isi_cpr_reset_n | 1 | Out | Signal from the ISI indicating that ISI activity has been detected while in sleep mode and so the chip should be reset. Active low. |
| usbd_cpr_reset_n | 1 | Out | Signal from the USB device that a USB reset has occurred. Active low. |
| USB device IO transceiver signals | | | |
| usbd_ts | 1 | Out | USB device IO transceiver (BUSB2_PM) driver three-state control. Active high enable. |
| usbd_a | 1 | Out | USB device IO transceiver (BUSB2_PM) driver data input. |
| usbd_se0 | 1 | Out | USB device IO transceiver (BUSB2_PM) single-ended zero input. Active high. |
| usbd_zp | 1 | In | USB device IO transceiver (BUSB2_PM) D+ receiver output. |
| usbd_zm | 1 | In | USB device IO transceiver (BUSB2_PM) D− receiver output. |
| usbd_z | 1 | In | USB device IO transceiver (BUSB2_PM) differential receiver output. |
| usbd_pull_up_en | 1 | Out | USB device pull-up resistor enable. Switches power to the external pull-up resistor, connected to the D+ line that is required for device identification to the USB. Active high. |
| usbd_vbus_sense | 1 | In | USB device VBUS power sense. Used to detect power on VBUS. NOTE: The IBM Cu11 PADS are 3.3 V, VBUS is 5 V. An external voltage conversion will be necessary, e.g. resistor divider network. Active high. |
| USB host IO transceiver signals | | | |
| usbh_ts | 1 | Out | USB host IO transceiver (BUSB2_PM) driver three-state control. Active high enable |
| usbh_a | 1 | Out | USB host IO transceiver (BUSB2_PM) driver data input. |
| usbh_se0 | 1 | Out | USB host IO transceiver (BUSB2_PM) single-ended zero input. Active high. |
| usbh_zp | 1 | In | USB host IO transceiver (BUSB2_PM) D+ receiver output. |

TABLE 32-continued

SCB I/O

| Port name | s | I/O | Description |
|---|---|---|---|
| usbh_zm | 1 | In | USB host IO transceiver (BUSB2_PM) D− receiver output. |
| usbh_z | 1 | In | USB host IO transceiver (BUSB2_PM) differential receiver output. |
| usbh_over_current | 1 | In | USB host port power over current indicator. Active high. |
| usbh_power_en | 1 | Out | USB host VBUS power enable. Used for port power switching. Active high. |
| CPU Interface | | | |
| cpu_adr[n:2] | n-1 | In | CPU address bus. |
| cpu_dataout[31:0] | 32 | In | Shared write data bus from the CPU |
| scb_cpu_data[31:0] | 32 | Out | Read data bus to the CPU |
| cpu_rwn | 1 | In | Common read/not-write signal from the CPU |
| cpu_acode[1:0] | 2 | In | CPU Access Code signals. These decode as follows: 00 - User program access 01 - User data access 10 - Supervisor program access 11 - Supervisor data access |
| cpu_scb_sel | 1 | In | Block select from the CPU. When cpu_scb_sel is high both cpu_adr and cpu_dataout are valid |
| scb_cpu_rdy | 1 | Out | Ready signal to the CPU. When scb_cpu_rdy is high it indicates the last cycle of the access. For a write cycle this means cpu_dataout has been registered by the SCB and for a read cycle this means the data on scb_cpu_data is valid. |
| scb_cpu_berr | 1 | Out | Bus error signal to the CPU indicating an invalid access. |
| scb_cpu_debug_valid | 1 | Out | Signal indicating that the data currently on scb_cpu_data is valid debug data |
| Interrupt signals | | | |
| dma_icu_irq | 1 | Out | DMA interrupt signal to the interrupt controller block. |
| isi_icu_irq | 1 | Out | ISI interrupt signal to the interrupt controller block. |
| usb_icu_irq[1:0] | 2 | Out | USB host and device interrupt signals to the ICU. Bit 0 - USB Host interrupt Bit 1 - USB Device interrupt |
| DIU interface | | | |
| scb_diu_wadr[21:5] | 17 | Out | Write address bus to the DIU |
| scb_diu_data[63:0] | 64 | Out | Data bus to the DIU. |
| scb_diu_wreq | 1 | Out | Write request to the DIU |
| diu_scb_wack | 1 | In | Acknowledge from the DIU that the write request was accepted. |
| scb_diu_wvalid | 1 | Out | Signal from the SCB to the DIU indicating that the data currently on the scb_diu_data[63:0] bus is valid |
| scb_diu_wmask[7:0] | 7 | Out | Byte aligned write mask. A "1" in a bit field of "scb_diu_wmask[7:0]" means that the corresponding byte will be written to DRAM. |
| scb_diu_rreq | 1 | Out | Read request to the DIU. |
| scb_diu_radr[21:5] | 17 | Out | Read address bus to the DIU |
| diu_scb_rack | 1 | In | Acknowledge from the DIU that the read request was accepted. |
| diu_scb_rvalid | 1 | In | Signal from the DIU to the SCB indicating that the data currently on the diu_data[63:0] bus is valid |
| diu_data[63:0] | 64 | In | Common DIU data bus. |

TABLE 32-continued

| SCB I/O | | | |
|---|---|---|---|
| Port name | s | I/O | Description |
| GPIO interface | | | |
| isi_gpio_dout[3:0] | 4 | Out | ISI output data to GPIO pins |
| isi_gpio_e[3:0] | 4 | Out | ISI output enable to GPIO pins |
| gpio_isi_din[3:0] | 4 | In | Input data from GPIO pins to ISI |

12.1.5 SCB Data Flow

Figure 29:
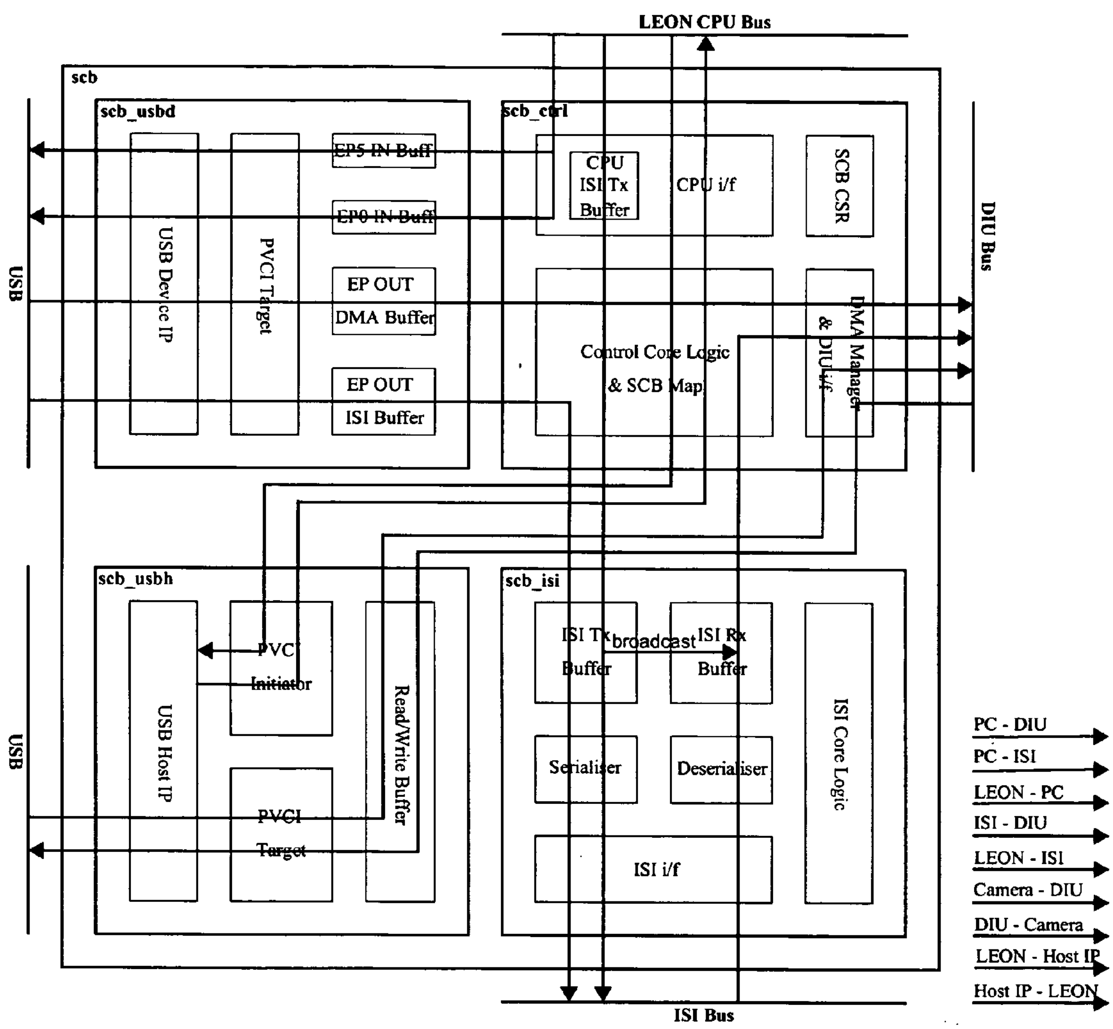
FIG. 29 is a logical view of the SCB of FIG. 28

A logical view of the SCB is shown in FIG. 29, depicting the transfer of data within the SCB.

12.2 USBD (USB Device Sub-Block)

12.2.1 Overview

The FS USB device controller core and associated SCB logic are referred to as the USB Device (USBD).

A SoPEC printer has FS USB device capability to facilitate communication between an external USB host and a SoPEC printer. The USBD is self-powered. It connects to an external USB host via a dedicated USB interface on the SoPEC printer, comprising a USB connector, the necessary discretes for USB signalling and the associated SoPEC ASIC I/Os.

The FS USB device core will be third party IP from Synopsys: TymeWare™ USB1.1 Device Controller (UDCVCI). Refer to the UDCVCI User Manual [20] for a description of the core.

The device core does not support LS USB operation. Control and bulk transfers are supported by the device. Interrupt transfers are not considered necessary because the required interrupt-type functionality can be achieved by sending query messages over the control channel on a scheduled basis. There is no requirement to support isochronous transfers.

The device core is configured to support 6 USB endpoints (EPs): the default control EP (EP0), 4 bulk OUT EPs (EP1, EP2, EP3, EP4) and 1 bulk IN EP (EP5). It should be noted that the direction of each EP is with respect to the USB host, i.e. IN refers to data transferred to the external host and OUT refers to data transferred from the external host. The 4 bulk OUT EPs will be used for the transfer of data from the external host to SoPEC, e.g. compressed page data, program data or control messages. Each bulk OUT EP can be mapped on to any target destination in a multi-SoPEC system, via the SCB Map configuration registers. The bulk IN EP is used for the transfer of data from SoPEC to the external host, e.g. a print image downloaded from a digital camera that requires processing on the external host system. Any feedback data will be returned to the external host on EP0, e.g. status information.

The device core does not provide internal buffering for any of its EPs (with the exception of the 8 byte setup data payload for control transfers). All EP buffers are provided in the SCB. Buffers will be grouped according to EP direction and associated packet destination. The SCB Map configuration registers contain a DestISIId and DestISISubId for each OUT EP, defining their EP mapping and therefore their packet destination. Refer to section Section 12.4 ISI (Inter SoPEC Interface Sub-block) for further details on ISIId and ISISubId. Refer to section Section 12.5 CTRL (Control Sub-block) for further details on the mapping of OUT EPs.

12.2.2 USBD Effective Bandwidth

The effective bandwidth between an external USB host and the printer will be influenced by:

- Amount of activity from other devices that share the USB with the printer.
- Throughput of the device controller core.
- EP buffering implementation.
- Responsiveness of the external host system CPU in handling USB interrupts.

To maximize bandwidth to the printer it is recommended that no other devices are active on the USB between the printer and the external host. If the printer is connected to a HS USB external host or hub it may limit the bandwidth available to other devices connected to the same hub but it would not significantly affect the bandwidth available to other devices upstream of the hub. The EP buffering should not limit the USB device core throughput, under normal operating conditions. Used in the recommended configuration, under ideal operating conditions, it is expected that an effective bandwidth of 8–9 Mbit/s will be achieved with bulk transfers between the external host and the printer.

12.2.3 IN EP Packet Buffer

The IN EP packet buffer stores packets originating from the LEON CPU that are destined for transmission over the USB to the external USB host. CPU writes to the buffer are 32 bits wide. USB device core reads from the buffer 32 bits wide.

128 bytes of local memory are required in total for EP0-IN and EP5-IN buffering. The IN EP buffer is a single, 2-port local memory instance, with a dedicated read port and a dedicated write port. Both ports are 32 bits wide. Each IN EP has a dedicated 64 byte packet location available in the memory array to buffer a single USB packet (maximum USB packet size is 64 bytes). Each individual 64 byte packet location is structured as 16×32 bit words and is read/written in a FIFO manner. When the device core reads a packet entry from the IN EP packet buffer, the buffer must retain the packet until the device core performs a status write, informing the SCB that the packet has been accepted by the external USB host and can be flushed. The CPU can therefore only write a single packet at a time to each IN EP. Any subsequent CPU write request to a buffer location containing a valid packet will be refused, until that packet has been successfully transmitted.

12.2.4 OUT EP Packet Buffer

The OUT EP packet buffer stores packets originating from the external USB host that are destined for transmission over DMAChannel0, DMAChannel1 or the ISI. The SCB control logic is responsible for routing the OUT EP packets from the OUT EP packet buffer to DMA or to the ISITx Buffer, based on the SCB Map configuration register settings. USB core writes to the buffer are 32 bits wide. DMA and ISI associated reads from the buffer are both 64 bits wide.

512 bytes of local memory are required in total for EP0-OUT, EP1-OUT, EP2-OUT, EP3-OUT and EP4-OUT buffering. The OUT EP packet buffer is a single, 2-port local memory instance, with a dedicated read port and a dedicated write port. Both ports are 64 bits wide. Byte enables are used for the 32 bit wide USB device core writes to the buffer. Each OUT EP can be mapped to DMAChannel0, DMAChannel1 or the ISI.

The OUT EP packet buffer is partitioned accordingly, resulting in three distinct packet FIFOs:

- USBDDMA0FIFO, for USB packets destined for DMAChannel0 on the local SoPEC.
- USBDDMA1FIFO, for USB packets destined for DMAChannel1 on the local SoPEC.
- USBDISIFIFO, for USB packets destined for transmission over the ISI.

12.2.4.1 USBDDMAnFIFO

This description applies to USBDDMA0FIFO and USBDDMA1FIFO, where 'n' represents the respective DMA channel, i.e. n=0 for USBDDMA0FIFO, n=1 for USBDDMA1FIFO. USBDDMAnFIFO services any EPs mapped to DMAChanneln on the local SoPEC device. This implies that a packet originating from an EP with an associated ISIId that matches the local SoPEC ISIId and an ISISubId=n will be written to USBDDMAnFIFO, if there is space available for that packet.

USBDDMAnFIFO has a capacity of 2×64 byte packet entries, and can therefore buffer up to 2 USB packets. It can be considered as a 2 packet entry FIFO. Packets will be read from it in the same order in which they were written, i.e. the first packet written will be the first packet read and the second packet written will be the second packet read. Each individual 64 byte packet location is structured as 8×64 bit words and is read/written in a FIFO manner.

The USBDDMAnFIFO has a write granularity of 64 bytes, to allow for the maximum USB packet size. The USBDDMAnFIFO will have a read granularity of 32 bytes to allow for the DMA write access bursts of 4×64 bit words, i.e. the DMA Manager will read 32 byte chunks at a time from the USBDDMAnFIFO 64 byte packet entries, for transfer to the DIU.

It is conceivable that a packet which is not a multiple 32 bytes in size may be written to the USBDDMAnFIFO. When this event occurs, the DMA Manager will read the contents of the remaining address locations associated with the 32 byte chunk in the USBDDMAnFIFO, transferring the packet plus whatever data is present in those locations, resulting in a 32 byte packet (a burst of 4×64 bit words) transfer to the DIU.

The DMA channels should achieve an effective bandwidth of 160 Mbits/sec (1 bit/cycle) and should never become blocked, under normal operating conditions. As the USB bandwidth is considerably less, a 2 entry packet FIFO for each DMA channel should be sufficient.

12.2.4.2 USBDISIFIFO

USBDISIFIFO services any EPs mapped to ISI. This implies that a packet originating from an EP with an associated ISId that does not match the local SoPEC ISId will be written to USBDISIFIFO if there is space available for that packet.

USBDISIFIFO has a capacity of 4×64 byte packet entries, and can therefore buffer up to 4 USB packets. It can be considered as a 4 packet entry FIFO. Packets will be read from it in the same order in which they were written, i.e. the first packet written will be the first packet read and the second packet written will be the second packet read, etc. Each individual 64 byte packet location is structured as 8×64 bit words and is read/written in a FIFO manner.

The ISI long packet format will be used to transfer data across the ISI. Each ISI long packet data payload is 32 bytes. The USBDISIFIFO has a write granularity of 64 bytes, to allow for the maximum USB packet size. The USBDISIFIFO will have a read granularity of 32 bytes to allow for the ISI packet size, i.e. the SCB will read 32 byte chunks at a time from the USBDISIFIFO 64 byte packet entries, for transfer to the ISI.

It is conceivable that a packet which is not a multiple 32 bytes in size may be written to the USBDISIFIFO, either intentionally or due to a software error. A maskable interrupt per EP is provided to flag this event. There will be 2 options for dealing with this scenario on a per EP basis:

Discard the packet.

Read the contents of the remaining address locations associated with the 32 byte chunk in the USBDISIFIFO, transferring the irregular size packet plus whatever data is present in those locations, resulting in a 32 byte packet transfer to the ISITxBuffer.

The ISI should achieve an effective bandwidth of 100 Mbits/sec (4 wire configuration). It is possible to encounter a number of retries when transmitting an ISI packet and the LEON CPU will require access to the ISI transmit buffer. However, considering the relatively low bandwidth of the USB, a 4 packet entry FIFO should be sufficient.

12.2.5 Wake-Up From Sleep Mode

The SoPEC will be placed in sleep mode after a suspend command is received by the USB device core. The USB device core will continue to be powered and clocked in sleep mode. A USB reset, as opposed to a device resume, will be required to bring SoPEC out of its sleep state as the sleep state is hoped to be logically equivalent to the power down state.

The USB reset signal originating from the USB controller will be propagated to the CPR (as usb_cpr_reset_n) if the USBWakeupEnable bit of the WakeupEnable register (see Table) has been set. The USBWakeupEnable bit should therefore be set just prior to entering sleep mode. There is a scenario that would require SoPEC to initiate a USB remote wake-up (i.e. where SoPEC signals resume to the external USB host after being suspended by the external USB host). A digital camera (or other supported external USB device) could be connected to SoPEC via the internal SoPEC USB host controller core interface. There may be a need to transfer data from this external USB device, via SoPEC, to the external USB host system for processing. If the USB connecting the external host system and SoPEC was suspended, then SoPEC would need to initiate a USB remote wake-up.

12.2.6 Implementation 12.2.6.1 USBD Sub-Block Partition

Block diagram

Definition of I/Os 12.2.6.2 USB Device IP Core 12.2.6.3 PVCI Target 12.2.6.4 IN EP Buffer 12.2.6.5 OUT EP Buffer 12.3 USBH (USB Host Sub-Block)

12.3.1 Overview

The SoPEC USB Host Controller (HC) core, associated SCB logic and associated SoPEC ASIC I/Os are referred to as the USB Host (USBH).

A SoPEC printer has FS USB host capability, to facilitate communication between an external USB device and a SoPEC printer. The USBH connects to an external USB device via a dedicated USB interface on the SoPEC printer, comprising a USB connector, the necessary discretes for USB signalling and the associated SoPEC ASIC I/Os.

The FS USB HC core are third party IP from Synopsys: DesignWare$^{R}$ USB1.1 OHCI Host Controller with PVCI (UHOSTC_PVCI). Refer to the UHOSTC_PVCI User Manual [18] for details of the core. Refer to the Open Host Controller Interface (OHCI) Specification Release [19] for details of OHCI operation.

The HC core supports Low-Speed (LS) USB devices, although compatible external USB devices are most likely to be FS devices. It is expected that communication between an external USB device and a SoPEC printer will be achieved with control and bulk transfers. However, isochronous and interrupt transfers are also supported by the HC core.

There will be 2 communication channels between the Host Controller Driver (HCD) software running on the LEON CPU and the HC core:

OHCI operational registers in the HC core. These registers are control, status, list pointers and a pointer to the Host Controller Communications Area (HCCA) in shared memory. A target Peripheral Virtual Component Interface (PCVI) on the HC core will provide LEON with direct read/write access to the operational registers. Refer to the OHCI Specification for details of these registers.

HCCA in SoPEC eDRAM. An initiator Peripheral Virtual Component Interface (PCVI) on the HC core will provide the HC with DMA read/write access to an address space in eDRAM. The HCD running on LEON will have read/write access to the same address space. Refer to the OHCI Specification for details of the HCCA.

The target PVCI interface is a 32 bit word aligned interface, with byte enables for write access. All read/write access to the target PVCI interface by the LEON CPU will be 32 bit word aligned. The byte enables will not be used, as all registers will be read and written as 32 bit words.

The initiator PVCI interface is a 32 bit word aligned interface with byte enables for write access. All DMA read/write accesses are 256 bit word aligned, in bursts of 4×64 bit words. As there is no guarantee that the read/write requests from the HC core will start at a 256 bit boundary or be 256 bits long, it is necessary to provide 8 byte enables for each of the 64 bit words in a write burst form the HC core to DMA. The signal scb_diu_wmask serves this purpose.

Configuration of the HC core will be performed by the HCD.

12.3.2 Read/Write Buffering

The HC core maximum burst size for a read/write access is 4×32 bit words. This implies that the minimum buffering requirements for the HC core will be a 1 entry deep address register and a 4 entry deep data register. It will be necessary to provide data and address mapping functionality to convert the 4×32 bit word HC core read/write bursts into 4×64 bit word DMA read/write bursts. This will meet the minimum buffering requirements.

12.3.3 USBH Effective Bandwidth

The effective bandwidth between an external USB device and a SoPEC printer will be influenced by:

Amount of activity from other devices that share the USB with the external USB device.

Throughput of the HC core.

HC read/write buffering implementation.

Responsiveness of the LEON CPU in handling USB interrupts.

Effective bandwidth between an external USB device and a SoPEC printer is not an issue. The primary application of this connectivity is the download of a print image from a digital camera. Printing speed is not important for this type of print operation. However, to maximize bandwidth to the printer it is recommended that no other devices are active on the USB between the printer and the external USB device. The HC read/write buffering in the SCB should not limit the USB HC core throughput, under normal operating conditions.

Used in the recommended configuration, under ideal operating conditions, it is expected that an effective bandwidth of 8–9 Mbit/s will be achieved with bulk transfers between the external USB device and the SoPEC printer.

12.3.4 Implementation 12.3.5 USBH Sub-Block Partition

USBH Block Diagram

Definition of I/Os.

12.3.5.1 USB Host IP Core 12.3.5.2 PVCI Target 12.3.5.3 PVCI Initiator 12.3.5.4 Read/Write Buffer 12.4 ISI (Inter SoPEC Interface Sub-Block)

12.4.1 Overview

The ISI is utilised in all system configurations requiring more than one SoPEC. An example of such a system which requires four SoPECs for duplex A3 printing and an additional SoPEC used as a storage device is shown in FIG. 27.

The ISI performs much the same function between an ISISlave SoPEC and the ISIMaster as the USB connection performs between the ISIMaster and the external host. This includes the transfer of all program data, compressed page data and message (i.e. commands or status information) passing between the ISIMaster and the ISISlave SoPECs. The ISIMaster initiates all communication with the ISISlaves.

12.4.2 ISI Effective Bandwidth

The ISI will need to run at a speed that will allow error free transmission on the PCB while minimising the buffering and hardware requirements on SoPEC. While an ISI speed of 10 Mbit/s is adequate to match the effective FS USB bandwidth it would limit the system performance when a high-speed connection (e.g. USB2.0, IEEE1394) is used to attach the printer to the PC. Although they would require the use of an extra ISI-Bridge chip such systems are envisaged for more expensive printers (compared to the low-cost basic SoPEC powered printers that are initially being targeted) in the future.

An ISI line speed (i.e. the speed of each individual ISI wire) of 32 Mbit/s is therefore proposed as it will allow ISI data to be over-sampled 5 times (at a pclk frequency of 160 MHz). The total bandwidth of the ISI will depend on the number of pins used to implement the interface. The ISI protocol will work equally well if 2 or 4 pins are used for transmission/reception. The ISINumPins register is used to select between a 2 or 4 wire ISI, giving peak raw bandwidths of 64 Mbit/s and 128 Mbit/s respectively. Using either a 2 or 4 wire ISI solution would allow the movement of data in to and out of a storage SoPEC (as described in 12.1.1.4 above), which is the most bandwidth hungry ISI use, in a timely fashion.

The ISINumPins register is used to select between a 2 or 4 wire ISI. A 2 wire ISI is the default setting for ISINumPins and this may be changed to a 4 wire ISI after initial communication has been established between the ISIMaster and all ISISlaves. Software needs to ensure that the switch from 2 to 4 wires is handled in a controlled and coordinated fashion so that nothing is transmitted on the ISI during the switch over period.

The maximum effective bandwidth of a two wire ISI, after allowing for protocol overheads and bus turnaround times, is expected to be approx. 50 Mbit/s.

12.4.3 ISI Device Identification and Enumeration

The ISIMasterSel bit of the ISICntrl register (see section Table) determines whether a SoPEC is an ISIMaster (ISIMasterSel=1), or an ISISlave (ISIMasterSel=0).

SoPEC defaults to being an ISISlave (ISIMasterSel=0) after a power-on reset—i.e. it will not transmit data on the ISI without first receiving a ping. If a SoPEC's ISIMasterSel bit is changed to 1, then that SoPEC will become the ISIMaster, transmitting data without requiring a ping, and generating pings as appropriately programmed.

ISIMasterSel can be set to 1 explicitly by the CPU writing directly to the ISICntrl register. ISIMasterSel can also be automatically set to 1 when activity occurs on any of USB endpoints 2–4 and the AutoMasterEnable bit of the ISICntrl register is also 1 (the default reset condition). Note that if AutoMasterEnable is 0, then activity on USB endpoints 2–4 will not result in ISIMasterSel being set to 1. USB endpoints 2–4 are chosen for the automatic detection since the power-on-reset condition has USB endpoints 0 and 1 pointing to ISIId 0 (which matches the local SoPEC's ISIId after power-on reset). Thus any transmission on USB endpoints 2–4 indicate a desire to transmit on the ISI which would usually indicate ISIMaster status. The automatic setting of ISIMasterSel can be disabled by clearing AutoMasterEnable, thereby allowing the SoPEC to remain an ISISlave while still making use of the USB endpoints 2–4 as external destinations.

Thus the setting of a SoPEC being ISIMaster or ISISlave can be completely under software control, or can be completely automatic.

The ISIId is established by software downloaded over the ISI (in broadcast mode) which looks at the input levels on a number of GPIO pins to determine the ISIId. For any given printer that uses a multi-SoPEC configuration it is expected that there will always be enough free GPIO pins on the ISISlaves to support this enumeration mechanism.

12.4.4 ISI Protocol

Figure 30:
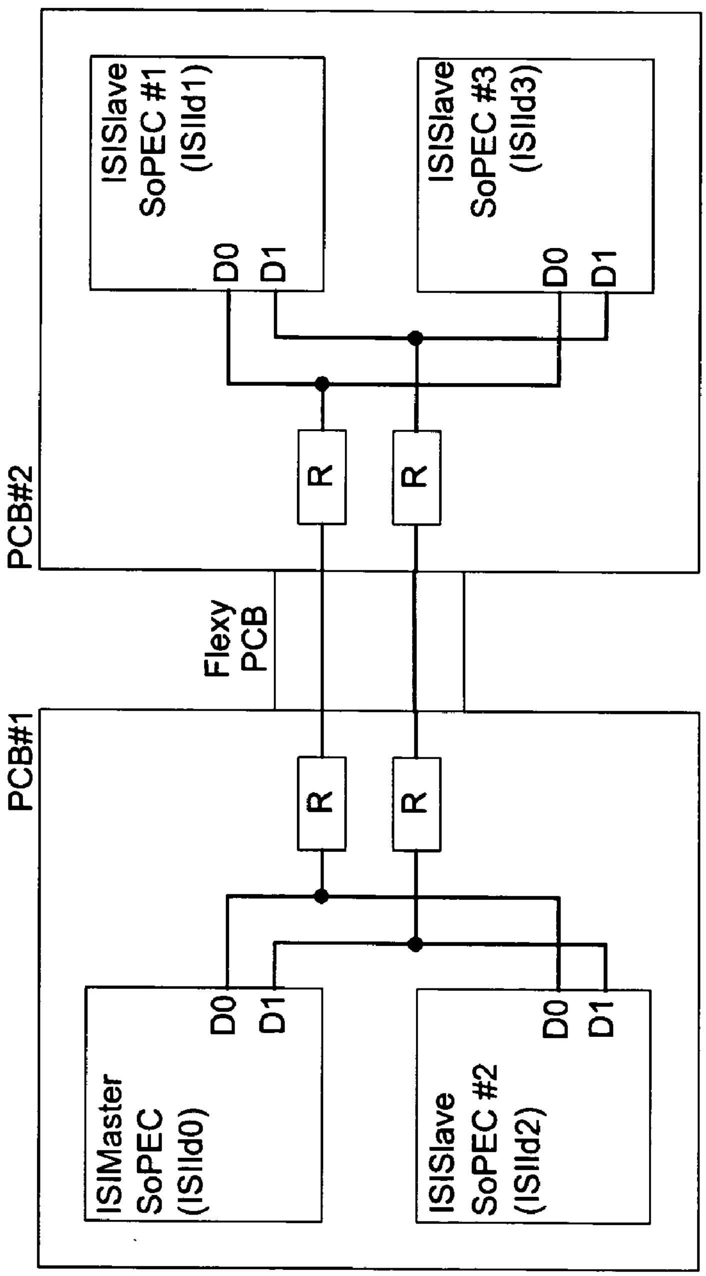
FIG. 30 shows an ISI configuration with four SoPEC devices

The ISI is a serial interface utilizing a 2/4 wire half-duplex configuration such as the 2-wire system shown in FIG. 30 below. An ISIMaster must always be present and a variable number of ISISlaves may also be on the ISI bus. The ISI protocol supports up to 14 addressable slaves, however to simplify electrical issues the ISI drivers need only allow for 5–6 ISI devices on a particular ISI bus. The ISI bus enables broadcasting of data, ISIMaster to ISISlave communication, ISISlave to ISIMaster communication and ISISlave to ISISlave communication. Flow control, error detection and retransmission of errored packets is also supported. ISI transmission is asynchronous and a Start field is present in every transmitted packet to ensure synchronization for the duration of the packet.

Figure 31:
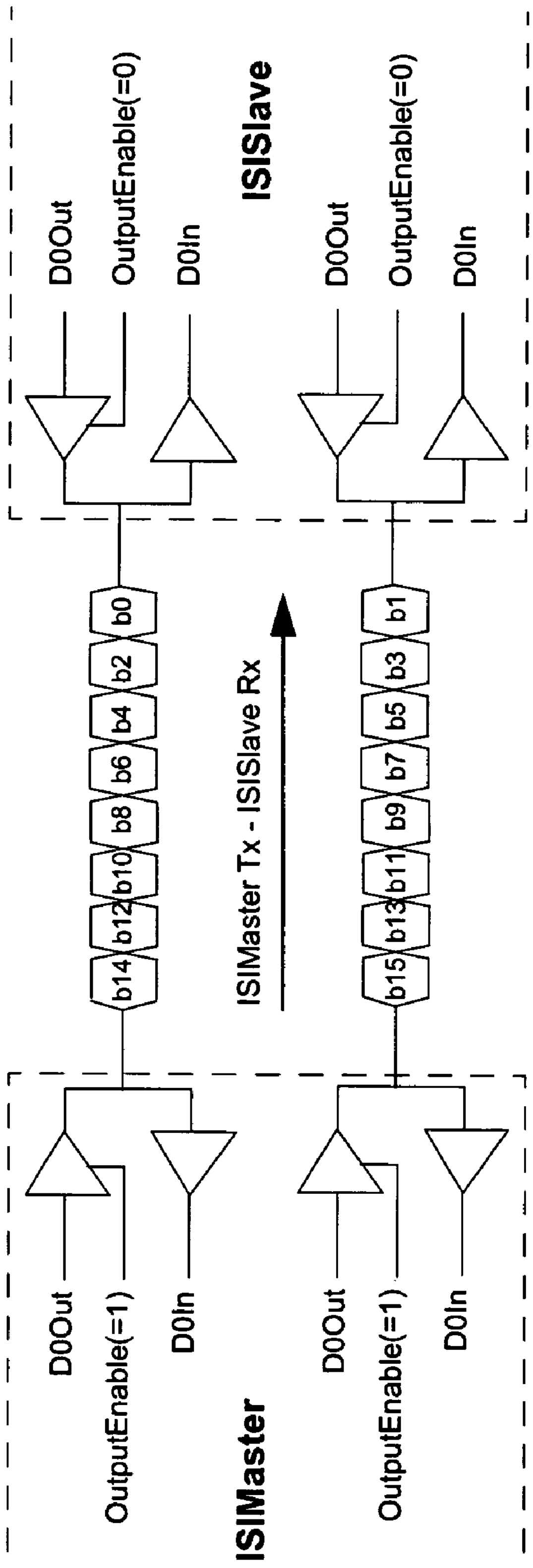
FIG. 31 shows half-duplex interleaved transmission from ISIMaster to ISISlave

To maximize the effective ISI bandwidth while minimising pin requirements a half-duplex interleaved transmission scheme is used. FIG. 31 below shows how a 16-bit word is transmitted from an ISIMaster to an ISISlave over a 2-wire ISI bus. Since data will be interleaved over the wires and a 4-wire ISI is also supported, all ISI packets should be a multiple of 4 bits.

All ISI transactions are initiated by the ISIMaster and every non-broadcast data packet needs to be acknowledged by the addressed recipient. An ISISlave may only transmit when it receives a ping packet (see section 12.4.4.6) addressed to it. To avoid bus contention all ISI devices must wait ISITurnAround bit-times (5 pclk cycles per bit) after detecting the end of a packet before transmitting a packet (assuming they are required to transmit). All non-transmitting ISI devices must tristate their Tx drivers to avoid line contention. The ISI protocol is defined to avoid devices driving out of order (e.g. when an ISISlave is no longer being addressed). As the ISI uses standard I/O pads there is no physical collision detection mechanism.

There are three types of ISI packet: a long packet (used for data transmission), a ping packet (used by the ISIMaster to prompt ISISlaves for packets) and a short packet (used to acknowledge receipt of a packet). All ISI packets are delineated by a Start and Stop fields and transmission is atomic i.e. an ISI packet may not be split or halted once transmission has started.

12.4.4.1 ISI Transactions

The different types of ISI transactions are outlined in FIG. 32 below. As described later all NAKs are inferred and $ACK_S$ are not addressed to any particular ISI device.

12.4.4.2 Start Field Description

The Start field serves two purposes: To allow the start of a packet be unambiguously identified and to allow the receiving device synchronise to the data stream. The symbol, or data value, used to identify a Start field must not legitimately occur in the ensuing packet. Bit stuffing is used to guarantee that the Start symbol will be unique in any valid (i.e. error free) packet. The ISI needs to see a valid Start symbol before packet reception can commence i.e. the receive logic constantly looks for a Start symbol in the incoming data and will reject all data until it sees a Start symbol. Furthermore if a Start symbol occurs (incorrectly) during a data packet it will be treated as the start of a new packet. In this case the partially received packet will be discarded.

The data value of the Start symbol should guarantee that an adequate number of transitions occur on the physical ISI lines to allow the receiving ISI device to determine the best sampling window for the transmitted data. The Start symbol should also be sufficiently long to ensure that the bit stuffing overhead is low but should still be short enough to reduce its own contribution to the packet overhead. A Start symbol of b01010101 is therefore used as it is an effective compromise between these constraints.

Each SoPEC in a multi-SoPEC system will derive its system clock from a unique (i.e. one per SoPEC) crystal. The system clocks of each device will drift relative to each other over any period of time. The system clocks are used for generation and sampling of the ISI data. Therefore the sampling window can drift and could result in incorrect data values being sampled at a later point in time. To overcome this problem the ISI receive circuitry tracks the sampling window against the incoming data to ensure that the data is sampled in the centre of the bit period.

12.4.4.3 Stop Field Description

A 1 bit-time Stop field of b1 per ISI line ensures that all ISI lines return to the high state before the next packet is transmitted. The stop field is driven on to each ISI line simultaneously, i.e. b11 for a 2-wire ISI and b1111 for a 4-wire ISI would be interleaved over the respective ISI lines. Each ISI line is driven high for 1 bit-time. This is necessary because the first bit of the Start field is b0.

12.4.4.4 Bit Stuffing

This involves the insertion of bits into the bitstream at the transmitting SoPEC to avoid certain data patterns. The receiving SoPEC will strip these inserted bits from the bitstream.

Bit-stuffing will be performed when the Start symbol appears at a location other than the start field of any packet, i.e. when the bit pattern b0101010 occurs at the transmitter, a 0 will be inserted to escape the Start symbol, resulting in the bit pattern b01010100. Conversely, when the bit pattern b0101010 occurs at the receiver, if the next bit is a '0' it will be stripped, if it is a '1' then a Start symbol is detected.

If the frequency variations in the quartz crystal were large enough, it is conceivable that the resultant frequency drift over a large number of consecutive 1s or 0s could cause the receiving SoPEC to loose synchronisation.[6] The quartz crystal that will be used in SoPEC systems is rated for 32 MHz @ 100 ppm. In a multi-SoPEC system with a 32 MHz+100 ppm crystal and a 32 MHz−100 ppm crystal, it would take approximately 5000 pclk cycles to cause a drift of 1 pclk cycle. This means that we would only need to bit-stuff somewhere before 1000 ISI bits of consecutive 1s or consecutive 0s, to ensure adequate synchronization. As the maximum number of bits transmitted per ISI line in a packet is 145, it should not be necessary to perform bit-stuffing for consecutive 1s or 0s. We may wish to constrain the spec of xtalin and also xtalin for the ISI-Bridge chip to ensure the ISI cannot drift out of sync during packet reception.

[6]Current max packet size~=290 bits=145 bits per ISI line (on a 2 wire ISI)=725 160 MHz cycles. Thus the pclks in the two communicating ISI devices should not drift by more than one cycle in 725 i.e. 1379 ppm. Careful analysis of the crystal, PLL and oscillator specs and the sync detection circuit is needed here to ensure our solution is robust.

Note that any violation of bit stuffing will result in the RxFrameErrorSticky status bit being set and the incoming packet will be treated as an errored packet.

12.4.4.5 ISI Long Packet

Figure 33:
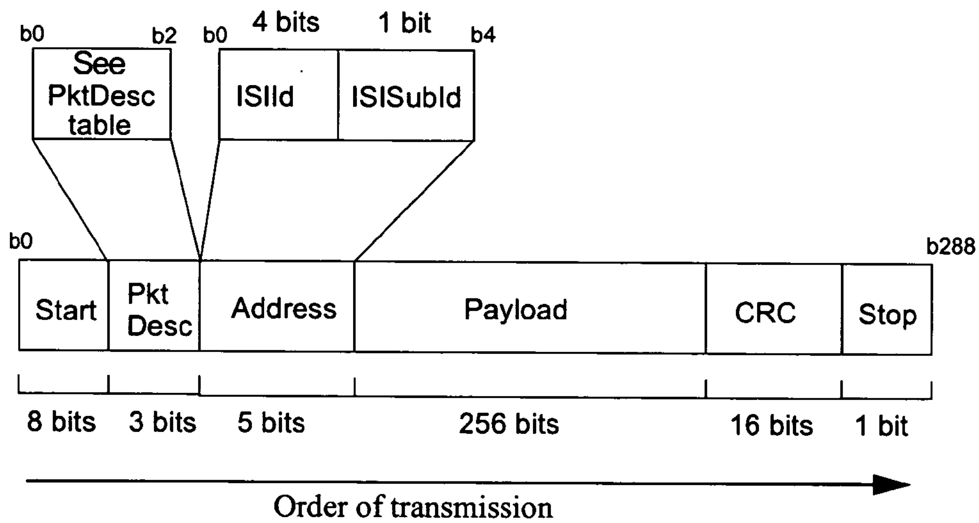
FIG. 33 shows an ISI long packet

The format of a long ISI packet is shown in FIG. 33 below. Data may only be transferred between ISI devices using a long packet as both the short and ping packets have no payload field. Except in the case of a broadcast packet, the receiving ISI device will always reply to a long packet with an explicit ACK (if no error is detected in the received packet) or will not reply at all (e.g. an error is detected in the received packet), leaving the transmitter to infer a NAK. As with all ISI packets the bitstream of a long packet is transmitted with its lsb (the leftmost bit in FIG. 33) first. Note that the total length (in bits) of an ISI long packet differs slightly between a 2 and 4-wire ISI system due to the different number of bits required for the Start and Stop fields.

All long packets begin with the Start field as described earlier. The PktDesc field is described in

TABLE 33

PktDesc field description

| Bit | Description |
|---|---|
| 0:1 | 00 - Long packet<br>01 - Reserved<br>10 - Ping packet<br>11 - Reserved |
| 2 | Sequence bit value. Only valid for long packets. See section 12.4.4.9 for a description of sequence bit operation |

Any ISI device in the system may transmit a long packet but only the ISIMaster may initiate an ISI transaction using a long packet. An ISISlave may only send a long packet in reply to a ping message from the ISIMaster. A long packet from an ISISlave may be addressed to any ISI device in the system.

The Address field is straightforward and complies with the ISI naming convention described in section 12.5.

The payload field is exactly what is in the transmit buffer of the transmitting ISI device and gets copied into the receive buffer of the addressed ISI device(s). When present the payload field is always 256 bits.

To ensure strong error detection a 16-bit CRC is appended.

12.4.4.6 ISI Ping Packet

Figure 34:
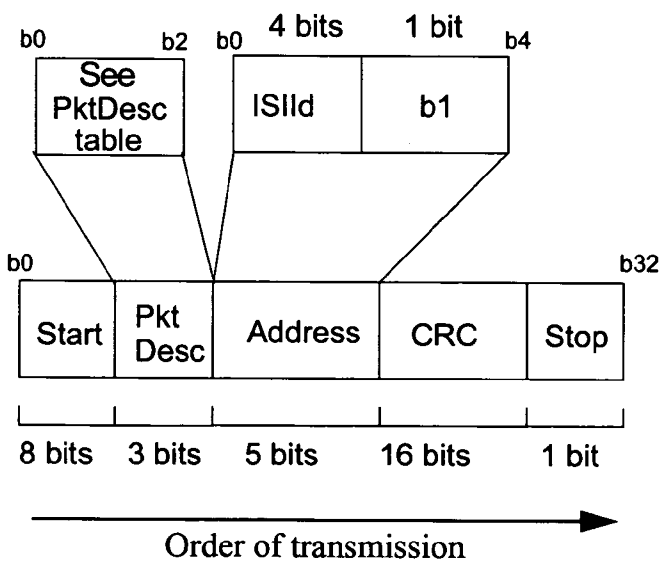
FIG. 34 shows an ISI ping packet

The ISI ping packet is used to allow ISISlaves to transmit on the ISI bus. As can be seen from FIG. 34 below the ping packet can be viewed as a special case of the long packet. In other words it is a long packet without any payload. Therefore the PktDesc field is the same as a long packet PktDesc, with the exception of the sequence bit, which is not valid for a ping packet. Both the ISISubId and the sequence bit are fixed at 1 for all ping packets. These values were chosen to maximize the hamming distance from an ACK symbol and to minimize the likelihood of bit stuffing. The ISISubId is unused in ping packets because the ISIMaster is addressing the ISI device rather than one of the DMA channels in the device. The ISISlave may address any ISIId.ISISubId in response if it wishes. The ISISlave will respond to a ping packet with either an explicit ACK (if it has nothing to send), an inferred NAK (if it detected an error in the ping packet) or a long packet (containing the data it wishes to send). Note that inferred NAKs do not result in the retransmission of a ping packet. This is because the ping packet will be retransmitted on a predetermined schedule (see 12.4.4.11 for more details).

An ISISlave should never respond to a ping message to the broadcast ISIId as this must have been sent in error. An ISI ping packet will never be sent in response to any packet and may only originate from an ISIMaster.

12.4.4.7 ISI Short Packet

Figure 35:
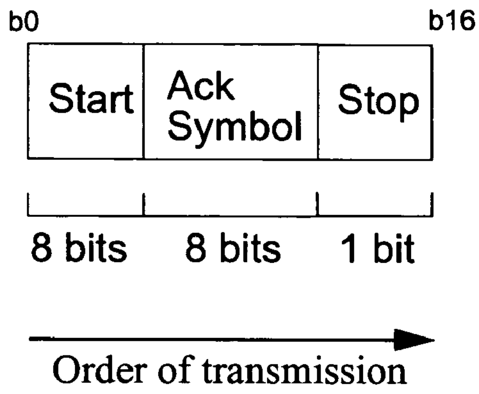
FIG. 35 shows a short ISI packet

The ISI short packet is only 17 bits long, including the Start and Stop fields. A value of b11101011 is proposed for the ACK symbol. As a 16-bit CRC is inappropriate for such a short packet it is not used. In fact there is only one valid value for a short ACK packet as the Start, ACK and Stop symbols all have fixed values. Short packets are only used for acknowledgements (i.e. explicit ACKs). The format of a short ISI packet is shown in FIG. 35 below. The ACK value is chosen to ensure that no bit stuffing is required in the packet and to minimize its hamming distance from ping and long ISI packets.

12.4.4.8 Error Detection and Retransmission

The 16-bit CRC will provide a high degree of error detection and the probability of transmission errors occurring is very low as the transmission channel (i.e. PCB traces) will have a low inherent bit error rate. The number of undetected errors should therefore be minute.

The HDLC standard CRC-16 (i.e. $G(x)=x^{16}+x^{12}+x^5+1$) is to be used for this calculation, which is to be performed serially. It is calculated over the entire packet (excluding the Start and Stop fields). A simple retransmission mechanism frees the CPU from getting involved in error recovery for most errors because the probability of a transmission error occurring more than once in succession is very, very low in normal circumstances.

After each non-short ISI packet is transmitted the transmitting device will open a reply window. The size of the reply window will be ISIShortReplyWin bit times when a short packet is expected in reply, i.e. the size of a short packet, allowing for worst case bit stuffing, bus turnarounds and timing differences. The size of the reply window will be ISILongReplyWin bit times when a long packet is expected in reply, i.e. this will be the max size of a long packet, allowing for worst case bit stuffing, bus turnarounds and timing differences. In both cases if an ACK is received the window will close and another packet can be transmitted but if an ACK is not received then the full length of the window must be waited out.

As no reply should be sent to a broadcast packet, no reply window should be required however all other long packets open a reply window in anticipation of an ACK. While the desire is to minimize the time between broadcast transmissions the simplest solution should be employed. This would imply the same size reply window as other long packets.

When a packet has been received without any errors the receiving ISI device must transmit its acknowledge packet (which may be either a long or short packet) before the reply window closes. When detected errors do occur the receiving ISI device will not send any response. The transmitting ISI device interprets this lack of response as a NAK indicating that errors were detected in the transmitted packet or that the receiving device was unable to receive the packet for some reason (e.g. its buffers are full). If a long packet was transmitted the transmitting ISI device will keep the transmitted packet in its transmit buffer for retransmission. If the transmitting device is the ISIMaster it will retransmit the packet immediately while if the transmitting device is an ISISlave it will retransmit the packet in response to the next ping it receives from the ISIMaster.

The transmitting ISI device will continue retransmitting the packet when it receives a NAK until it either receives an ACK or the number of retransmission attempts equals the value of the NumRetries register. If the transmission was unsuccessful then the transmitting device sets the TxErrorSticky bit in its ISIIntStatus register. The receiving device also sets the RxErrorSticky bit in its ISIIntStatus register whenever it detects a CRC error in an incoming packet and is not required to take any further action, as it is up to the transmitting device to detect and rectify the problem. The NumRetries registers in all ISI devices should be set to the same value for consistent operation. Note that successful transmission or reception of ping packets do not affect retransmission operation.

Note that a transmit error will cause the ISI to stop transmitting. CPU intervention will be required to resolve the source of the problem and to restart the ISI transmit operation. Receive errors however do not affect receive operation and they are collected to facilitate problem debug and to monitor the quality of the ISI physical channel. Transmit or receive errors should be extremely rare and their occurrence will most likely indicate a serious problem.

Note that broadcast packets are never acknowledged to avoid contention on the common ISI lines. If an ISISlave detects an error in a broadcast packet it should use the message passing mechanism described earlier to alert the ISIMaster to the error if it so wishes.

12.4.4.9 Sequence Bit Operation

To ensure that communication between transmitting and receiving ISI devices is correctly ordered a sequence bit is included in every long packet to keep both devices in step with each other. The sequence bit field is a constant for short or ping packets as they are not used for data transmission. In addition to the transmitted sequence bit all ISI devices keep two local sequence bits, one for each ISISubId. Furthermore each ISI device maintains a transmit sequence bit for each ISIId and ISISubId it is in communication with. For packets sourced from the external host (via USB) the transmit sequence bit is contained in the relevant USBEPnDest register while for packets sourced from the CPU the transmit sequence bit is contained in the CPUISITxBuffCntrl register. The sequence bits for received packets are stored in ISISubId0 Seq and ISISubId1 Seq registers. All ISI devices will initialize their sequence bits to 0 after reset. It is-the responsibility of software to ensure that the sequence bits of the transmitting and receiving ISI devices are correctly initialized each time a new source is selected for any ISIId.ISISubId channel.

Sequence bits are ignored by the receiving ISI device for broadcast packets. However the broadcasting ISI device is free to toggle the sequence in the broadcast packets since they will not affect operation. The SCB will do this for all USB source data so that there is no special treatment for the sequence bit of a broadcast packet in the transmitting device. CPU sourced broadcasts will have sequence bits toggled at the discretion of the program code.

Each SoPEC may also ignore the sequence bit on either of its ISISubId channels by setting the appropriate bit in the ISISubIdSeqMask register. The sequence bit should be ignored for ISISubId channels that will carry data that can originate from more than one source and is self ordering e.g. control messages.

A receiving ISI device will toggle its sequence bit addressed by the ISISubId only when the receiver is able to accept data and receives an error-free data packet addressed to it. The transmitting ISI device will toggle its sequence bit for that ISIId.ISISubId channel only when it receives a valid ACK handshake from the addressed ISI device.

Figure 36:
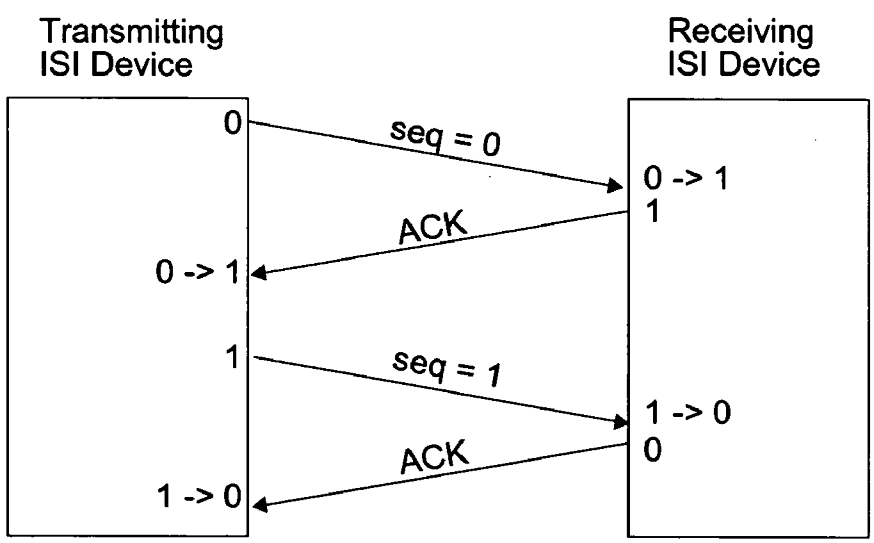
FIG. 36 shows successful transmission of two long packets with sequence bit toggling

FIG. 36 shows the transmission of two long packets with the sequence bit in both the transmitting and receiving devices toggling from 0 to 1 and back to 0 again. The toggling operation will continue in this manner in every subsequent transmission until an error condition is encountered.

Figure 37:
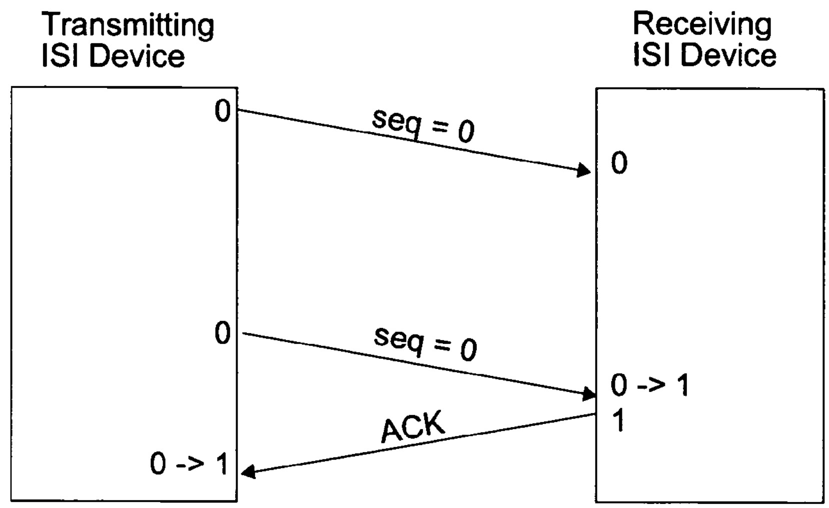
FIG. 37 shows sequence bit operation with errored long packet

When the receiving ISI device detects an error in the transmitted long packet or is unable to accept the packet (because of full buffers for example) it will not return any packet and it will not toggle its local sequence bit. An example of this is depicted in FIG. 37. The absence of any response prompts the transmitting device to retransmit the original (seq=0) packet. This time the packet is received without any errors (or buffer space may have been freed) so the receiving ISI device toggles its local sequence bit and responds with an ACK. The transmitting device then toggles its local sequence bit to a 1 upon correct receipt of the ACK.

Figure 38:
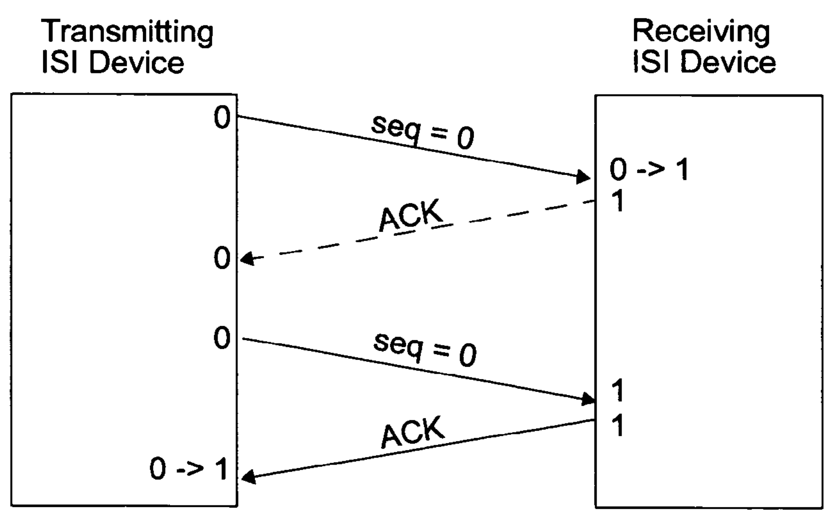
FIG. 38 shows sequence bit operation with ACK error

However it is also possible for the ACK packet from the receiving ISI device to be corrupted and this scenario is shown in FIG. 38. In this case the receiving device toggles its local sequence bit to 1 when the long packet is received without error and replies with an ACK to the transmitting device. The transmitting device does not receive the ACK correctly and so does not change its local sequence bit. It then retransmits the seq=0 long packet. When the receiving device finds that there is a mismatch between the transmitted sequence bit and the expected (local) sequence bit is discards the long packet and replies with an ACK. When the transmitting ISI device correctly receives the ACK it updates its local sequence bit to a 1, thus restoring synchronization. Note that when the ISISubIdSeqMask bit for the addressed ISISubId is set then the retransmitted packet is not discarded and so a duplicate packet will be received. The data contained in the packet should be self-ordering and so the software handling these packets (most likely control messages) is expected to deal with this eventuality.

12.4.4.10 Flow Control

The ISI also supports flow control by treating it in exactly the same manner as an error in the received packet. Because the SCB enjoys greater guaranteed bandwidth to DRAM than both the ISI and USB can supply flow control should not be required during normal operation. Any blockage on a DMA channel will soon result in the NumRetries value being exceeded and transmission from that SoPEC being halted. If a SoPEC NAKs a packet because its RxBuffer is full it will flag an overflow condition. This condition can potentially cause a CPU interrupt, if the corresponding interrupt is enabled. The RxOverflowSticky bit of its ISIIntStatus register reflects this condition. Because flow control is treated in the same manner as an error the transmitting ISI device will not be able to differentiate a flow control condition from an error in the transmitted packet.

12.4.4.11 Auto-Ping Operation

While the CPU of the ISIMaster could send a ping packet by writing the appropriate header to the CPUISITxBuffCntrl register it is expected that all ping packets will be generated in the ISI itself. The use of automatically generated ping packets ensures that ISISlaves will be given access to the ISI bus with a programmable minimum guaranteed frequency in addition to whenever it would otherwise be idle. Five registers facilitate the automatic generation of ping messages within the ISI: PingSchedule0, PingSchedule1, PingSchedule2 , ISITotalPeriod and ISILocalPeriod. Auto-pinging will be enabled if any bit of any of the PingScheduleN registers is set and disabled if all PingScheduleN registers are 0x0000.

Each bit of the 15-bit PingScheduleN register corresponds to an ISIId that is used in the Address field of the ping packet and a 1 in the bit position indicates that a ping packet is to be generated for that ISIId. A 0 in any bit position will ensure that no ping packet is generated for that ISIId. As ISISlaves may differ in their bandwidth requirement (particularly if a storage SoPEC is present) three different PingSchedule registers are used to allow an ISISlave receive up to three times the number of pings as another active ISISlave. When the ISIMaster is not sending long packets (sourced from either the CPU or USB in the case of a SoPEC ISIMaster) ISI ping packets will be transmitted according to the pattern given by the three PingScheduleN registers. The ISI will start with the lsb of PingSchedule0 register and work its way from lsb through msb of each of the PingScheduleN registers. When the msb of PingSchedule2 is reached the ISI returns to the lsb of PingSchedule0 and continues to cycle through each bit position of each PingScheduleN register. The ISI has more than enough time to work out the destination of the next ping packet while a ping or long packet is being transmitted.

With the addition of auto-ping operation we now have three potential sources of packets in an ISIMaster SoPEC: USB, CPU and auto-ping. Arbitration between the CPU and USB for access to the ISI is handled outside the ISI. To ensure that local packets get priority whenever possible and that ping packets can have some guaranteed access to the ISI we use two 4-bit counters whose reload value is contained in the ISITotalPeriod and ISILocalPeriod registers. As we saw in section 12.4.4.1 every ISI transaction is initiated by the ISIMaster transmitting either a long packet or a ping packet. The ISITotalPeriod counter is decremented for every ISI transaction (i.e. either long or ping) when its value is non-zero. The ISILocalPeriod counter is decremented for every local packet that is transmitted. Neither counter is decremented by a retransmitted packet. If the ISITotalPeriod counter is zero then ping packets will not change its value from zero. Both the ISITotalPeriod and ISILocalPeriod counters are reloaded by the next local packet transmit request after the ISITotalPeriod counter has reached zero and this local packet has priority over pings.

The amount of guaranteed ISI bandwidth allocated to both local and ping packets is determined by the values of the ISITotalPeriod and ISILocalPeriod registers. Local packets will always be given priority when the ISILocalPeriod counter is non-zero. Ping packets will be given priority when the ISILocalPeriod counter is zero and the ISITotalPeriod counter is still non-zero.

Note that ping packets are very likely to get more than their guaranteed bandwidth as they will be transmitted whenever the ISI bus would otherwise be idle (i.e. no pending local packets). In particular when the ISITotalPeriod counter is zero it will not be reloaded until another local packet is pending and so ping packets transmitted when the ISITotalPeriod counter is zero will be in addition to the guaranteed bandwidth. Local packets on the other hand will never get more than their guaranteed bandwidth because each local packet transmitted decrements both counters and will cause the counters to be reloaded when the ISITotalPeriod counter is zero. The difference between the values of the ISITotalPeriod and ISILocalPeriod registers determines the number of automatically generated ping packets that are guaranteed to be transmitted every ISITotalPeriod number of ISI transactions. If the ISITotalPeriod and ISILocalPeriod values are the same then the local packets will always get priority and could totally exclude ping packets if the CPU always has packets to send.

For example if ISITotalPeriod=0xC; ISILocalPeriod=0x8; PingSchedule0=0x0E; PingSchedule1=0x0C and PingSchedule2=0x08 then four ping messages are guaranteed to be sent in every 12 ISI transactions. Furthermore ISIId3 will receive 3 times the number of ping packets as ISId1 and ISId2 will receive twice as many as ISId1. Thus over a period of 36 contended ISI transactions (allowing for two full rotations through the three PingScheduleN registers) when local packets are always pending 24 local packets will be sent, ISId1 will receive 2 ping packets, ISId2 will receive 4 pings and ISId3 will receive 6 ping packets. If local traffic is less frequent then the ping frequency will automatically adjust upwards to consume all remaining ISI bandwidth.

12.4.5 Wake-up from Sleep Mode

Either the PrintMaster SoPEC or the external host may place any of the ISISlave SoPECs in sleep mode prior to going into sleep mode itself. The ISISlave device should then ensure that its ISIWakeupEnable bit of the WakeupEnable register (see Table 34) is set prior to entering sleep mode. In an ISISlave device the ISI block will continue to receive power and clock during sleep mode so that it may monitor the gpio_isi_din lines for activity. When ISI activity is detected during sleep mode and the ISIWakeupEnable bit is set the ISI asserts the isi_cpr_reset_n signal. This will bring the rest of the chip out of sleep mode by means of a wakeup reset. See chapter 16 for more details of reset propagation.

12.4.6 Implementation

Figure 39:
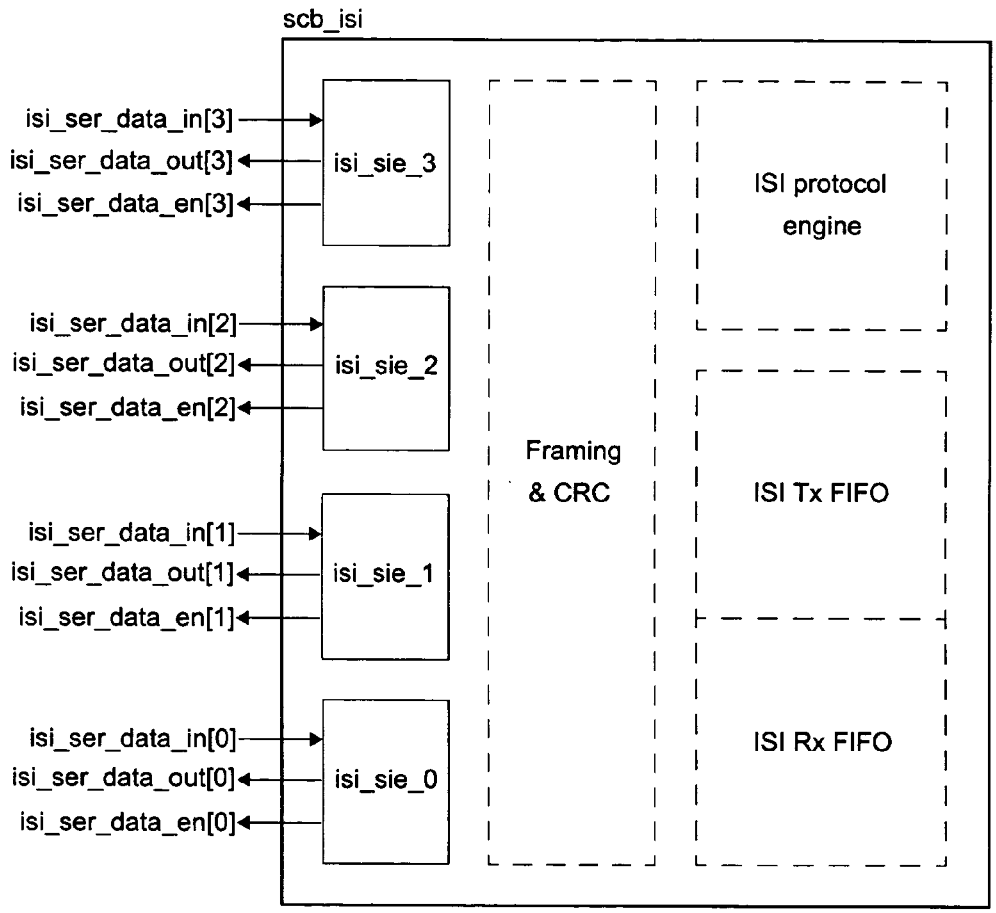
FIG. 39 shows an ISI sub-block partition

Although the ISI consists of either 2 or 4 ISI data lines over which a serial data stream is demultiplexed, each ISI line is treated as a separate serial link at the physical layer. This permits a certain amount of skew between the ISI lines that could not be tolerated if the lines were treated as a parallel bus. A lower Bit Error Rate (BER) can be achieved if the serial data recovery is performed separately on each serial link. FIG. 39 illustrates the ISI sub block partitioning.

12.4.6.1 ISI Sub-Block Partition

Definition of I/Os.

TABLE 34

ISI I/O

| Port name | Pins | I/O | Description |
|---|---|---|---|
| Clock and Reset | | | |
| isi_pclk | 1 | In | ISI primary clock. |
| isi_reset_n | 1 | In | ISI reset. Active low. Asserting isi_reset_n will reset all ISI logic. Synchronous to isi_pclk. |

TABLE 34-continued

ISI I/O

| Port name | Pins | I/O | Description |
|---|---|---|---|
| Configuration | | | |
| isi_go | 1 | In | ISI GO. Active high. When GO is de-asserted, all ISI statemachines are reset to their idle states, all ISI output signals are de-asserted, but all ISI counters retain their values. When GO is asserted, all ISI counters are reset and all ISI statemachines and output signals will return to their normal mode of operation. |
| isi_master_select | 1 | In | ISI master select. Determines whether the SoPEC is an ISIMaster or not 1 = ISIMaster 0 = ISISlave |
| isi_id[3:0] | 4 | In | ISI ID for this device. |
| isi_retries[3:0] | 4 | In | ISI number of retries. Number of times a transmitting ISI device will attempt retransmission of a NAK'd packet before aborting the transmission and flagging an error. The value of this configuration signal should not be changed while there are valid packets in the Tx buffer. |
| isi_ping_schedule0 [14:0] | 15 | In | ISI auto ping schedule #0. Denotes which ISIIds will be receive ping packets. Note that bit0 refers to ISIId0, bit1 to ISIId1 . . . bit14 to ISIId14. Setting a bit in this schedule will enable auto ping generation for the corresponding ISI ID. The ISI will start from the bit 0 of isi_ping_schedule0 and cycle through to bit 14, generating pings for each bit that is set. This operation will be performed in sequence from isi_ping_schedule0 through isi_ping_schedule2. |
| isi_ping_schedule1 [14:0] | 15 | In | As per isi_ping_schedule0. |
| isi_ping_schedule2 [14:0] | 15 | In | As per isi_ping_schedule0. |
| isi_total_period[3:0] | 4 | In | Reload value of the ISI Total Period Counter. |
| isi_local_period[3:0] | 4 | In | Reload value of the ISI Local Period Counter. |
| isi_number_pins | 1 | In | Number of active ISI data pins. Used to select how many serial data pins will be used to transmit and receive data. Should reflect the number of ISI device data pins that are in use. 1 = isi_data[3:0] active 0 = isi_data[1:0] active |
| isi_turn_around[3:0] | 4 | In | ISI bus turn around time in ISI clock cycles (32 MHz). |
| isi_short_reply_win[4:0] | 5 | In | ISI long packet reply window in ISI clock cycles (32 MHz). |
| isi_long_reply_win[8:0] | 9 | In | ISI long packet reply window in ISI clock cycles (32 MHz). |
| isi_tx_enable | 1 | In | ISI transmit enable. Active high. Enables ISI transmission of long or ping packets. ACKs may still be transmitted when this bit is 0. The value of this configuration signal should not be changed while there are valid packets in the Tx buffer. |
| isi_rx_enable | 1 | In | ISI receive enable. Active high. Enables ISI packet reception. Any activity on the ISI bus will be ignored when this signal is de-asserted. This signal should only be de-asserted if the ISI block is not required for use in the design. |
| isi_bit_stuff_rate[3:0] | 1 | In | ISI bit stuffing limit. Allows the bit stuffing counter value to be programmed. Is loaded into the 4 upper bits of the 7bit wide bit stuffing counter. The lower bits are always loaded with b111, to prevent bit stuffing for less than 7 consecutive ones or zeroes. E.g. b000 : stuff_count = b0000111 : bit stuff after 7 consecutive 0/1 b111 : stuff_count = b1111111 : bit stuff after 127 consecutive 0/1 |
| Serial Link Signals | | | |
| isi_ser_data_in[3:0] | 4 | In | ISI Serial data inputs. Each bit corresponds to a separate serial link. |
| isi_ser_data_out[3:0] | 4 | Out | ISI Serial data outputs. Each bit corresponds to a separate serial link. |
| isi_ser_data_en[3:0] | 4 | Out | ISI Serial data driver enables. Active high. Each bit corresponds to a separate serial link. |
| Tx Packet Buffer | | | |
| isi_tx_wr_en | 1 | In | ISI Tx FIFO write enable. Active high. Asserting isi_tx_wr_en will write the 64 bit data on isi_tx_wr_data to the FIFO, providing that space is available in the FIFO. If isi_tx_wr_en remains asserted after the last entry in the current packet is written, the write operation will wrap around to the start of the next packet, providing that space is available for a second packet in the FIFO. |
| isi_tx_wr_data[63:0] | 64 | In | ISI Tx FIFO write data. |
| isi_tx_ping | 1 | In | ISI Tx FIFO ping packet select. Active high. Asserting isi_tx_ping will queue a ping packet for transmission, as opposed to a long packet. Although there is no data payload for a ping packet, a packet location in the FIFO is used as a 'place holder' for the ping packet. Any data written to the associated packet |

TABLE 34-continued

ISI I/O

| Port name | Pins | I/O | Description |
|---|---|---|---|
| | | | location in the FIFO will be discarded when the ping packet is transmitted. |
| isi_tx_id[3:0] | 5 | In | ISI Tx FIFO packet ID. ISI ID for each packet written to the FIFO. Registered when the last entry of the packet is written. |
| isi_tx_sub_id | 1 | In | ISI Tx FIFO packet sub ID. ISI sub ID for each packet written to the FIFO. Registered when the last entry of the packet is written. |
| isi_tx_pkt_count[1:0] | 2 | Out | ISI Tx FIFO packet count. Indicates the number of packets contained in the FIFO. The FIFO has a capacity of 2 × 256 bit packets. Range is b00->b10. |
| isi_tx_word_count[2:0] | 3 | Out | ISI Tx FIFO current packet word count. Indicates the number of words contained in the current Tx packet location of the Tx FIFO. Each packet location has a capacity of 4 × 64 bit words. Range is b000->b100. |
| isi_tx_empty | 1 | Out | ISI Tx FIFO empty. Active high. Indicates that no packets are present in the FIFO. |
| isi_tx_full | 1 | Out | ISI Tx FIFO full. Active high. Indicates that 2 packets are present in the FIFO, therefore no more packets can be transmitted. |
| isi_tx_over_flow | 1 | Out | ISI Tx FIFO overflow. Active high. Indicates that a write operation was performed on a full FIFO. The write operation will have no effect on the contents of the FIFO or the write pointer. |
| isi_tx_error | 1 | Out | ISI Tx FIFO error. Active high. Indicates that an error occurred while transmitting the packet currently at the head of the FIFO. This will happen if the number of transmission attempts exceeds isi_tx_retries. |
| isi_tx_desc[2:0] | 3 | Out | ISI Tx packet descriptor field. ISI packet descriptor field for the packet currently at the head of the FIFO. See Table for details. Only valid when isi_tx_empty = 0, i.e. when there is a valid packet in the FIFO. |
| isi_tx_addr[4:0] | 5 | Out | ISI Tx packet address field. ISI address field for the packet currently at the head of the FIFO. See Table for details. Only valid when isi_tx_empty=0, i.e. when there is a valid packet in the FIFO. |
| Rx Packet FIFO | | | |
| isi_rx_rd_en | 1 | In | ISI Rx FIFO read enable. Active high. Asserting isi_rx_rd_en will drive isi_rx_rd_data with valid data, from the Rx packet at the head of the FIFO, providing that data is available in the FIFO. If isi_rx_rd_en remains asserted after the last entry is read from the current packet, the read operation will wrap around to the start of the next packet, providing that a second packet is available in the FIFO. |
| isi_rx_rd_data[63:0] | 64 | Out | ISI Rx FIFO read data. |
| isi_rx_sub_id | 1 | Out | ISI Rx packet sub ID. Indicates the ISI sub ID associated with the packet at the head of the Rx FIFO. |
| isi_rx_pkt_count[1:0] | 2 | Out | ISI Rx FIFO packet count. Indicates the number of packets contained in the FIFO. The FIFO has a capacity of 2 × 256 bit packets. Range is b00->b10. |
| isi_rx_word_count[2:0] | 3 | Out | ISI Rx FIFO current packet word count. Indicates the number of words contained in the Rx packet location at the head of the FIFO. Each packet location has a capacity of 4 × 64 bit words. Range is b000->b100. |
| isi_rx_empty | 1 | Out | ISI Rx FIFO empty. Active high. Indicates that no packets are present in the FIFO. |
| isi_rx_full | 1 | Out | ISI Rx FIFO full. Active high. Indicates that 2 packets are present in the FIFO, therefore no more packets can be received. |
| isi_rx_over_flow | 1 | Out | ISI Rx FIFO over flow. Active high. Indicates that a packet was addressed to the local ISI device, but the Rx FIFO was full, resulting in a NAK. |
| isi_rx_under_run | 1 | Out | ISI Rx FIFO under run. Active high. Indicates that a read operation was performed on an empty FIFO. The invalid read will return the contents of the memory location currently addressed by the FIFO read pointer and will have no effect on the read pointer. |
| isi_rx_frame_error | 1 | Out | ISI Rx framing error. Active high. Asserted by the ISI when a framing error is detected in the received packet, which can be caused by an incorrect Start or Stop field or by bit stuffing errors. The associated packet will be dropped. |
| isi_rx_crc_error | 1 | Out | ISI Rx CRC error. Active high. Asserted by the ISI when a CRC error is detected in an incoming packet. Other than dropping the errored packet ISI reception is unaffected by a CRC Error. |

12.4.6.2 ISI Serial Interface Engine (isi_sie)

There are 4 instantiations of the isi_sie sub block in the ISI, 1 per ISI serial link. The isi_sie is responsible for Rx serial data sampling, Tx serial data output and bit stuffing.

Data is sampled based on a phase detection mechanism. The incoming ISI serial data stream is over sampled 5 times per ISI bit period. The phase of the incoming data is determined by detecting transitions in the ISI serial data stream, which indicates the ISI bit boundaries. An ISI bit boundary is defined as the sample phase at which a transition was detected.

Figure 40:
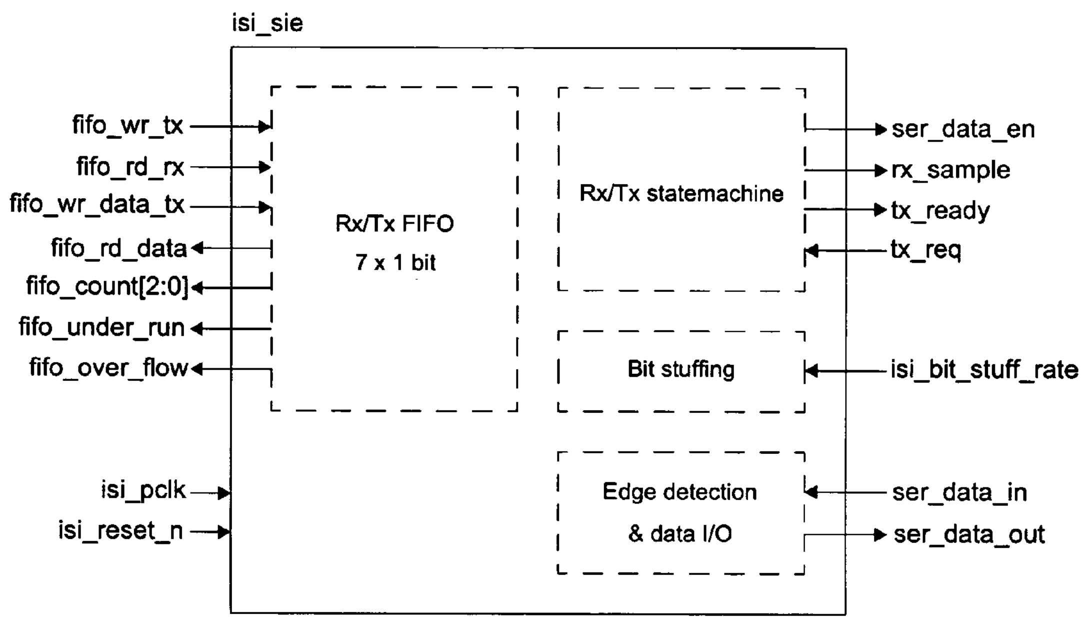
FIG. 40 shows an ISI serial interface engine functional block diagram

The basic functional components of the isi_sie are detailed in FIG. 40. These components are simply a grouping of logical functionality and do not necessarily represent hierarchy in the design.

12.4.6.2.1 SIE Edge Detection and Data I/O

Figure 41:
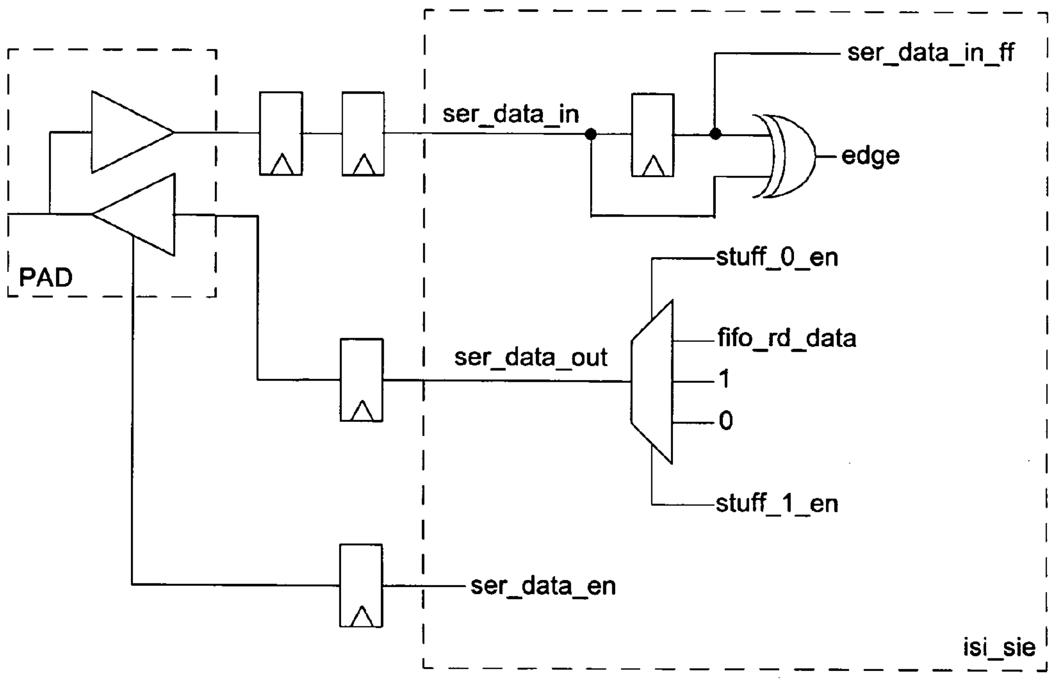
FIG. 41 is an SIE edge detection and data IO diagram

The basic structure of the data I/O and edge detection mechanism is detailed in FIG. 41.

NOTE: Serial data from the receiver in the pad MUST be synchronized to the isi_pclk domain with a 2 stage shift register external to the ISI, to reduce the risk of metastability. ser_data_out and ser_data_en should be registered externally to the ISI.

The Rx/Tx statemachine drives ser_data_en, stuff_1_en and stuff_0_en. The signal stuff_1_en and stuff_0_en cause a one or a zero to be driven on ser_data_out when they are asserted, otherwise fifo_rd_data is selected.

12.4.6.2.2 SIE Rx/Tx Statemachine

The Rx/Tx statemachine is responsible for the transmission of ISI Tx data and the sampling of ISI Rx data. Each ISI bit period is 5 isi_pclk cycles in duration.

Figure 42:
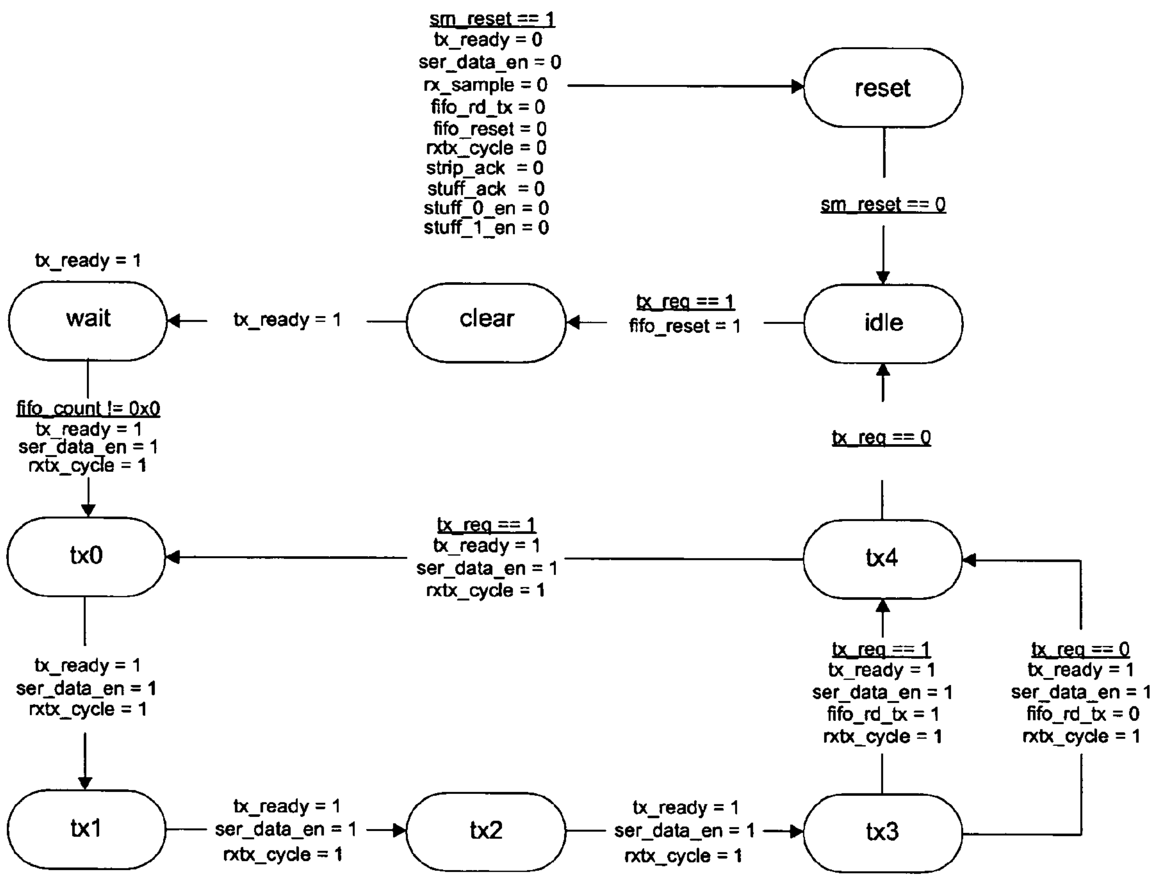
FIG. 42 is an SIE Rx/Tx state machine Tx cycle state diagram

The Tx cycle of the Rx/Tx statemachine is illustrated in FIG. 42. It generates each ISI bit that is transmitted. States tx0->tx4 represent each of the 5 isi_pclk phases that constitute a Tx ISI bit period. ser_data_en controls the tristate enable for the ISI line driver in the bidirectional pad, as shown in FIG. 41. rx_tx_cycle is asserted during both Rx and Tx states to indicate an active Rx or Tx cycle. It is primarily used to enable bit stuffing.

NOTE: All statemachine signals are assumed to be ‘0’ unless otherwise stated.

Figure 43:
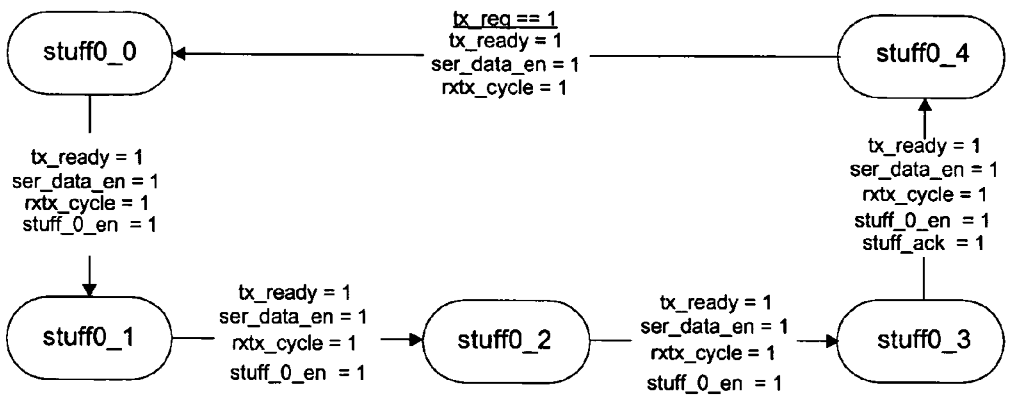
FIG. 43 shows an SIE Rx/Tx state machine Tx bit stuff '0' cycle state diagram

The Tx cycle for Tx bit stuffing when the Rx/Tx statemachine inserts a ‘0’ into the bitstream can be seen in FIG. 43.

NOTE: All statemachine signals are assumed to be ‘0’ unless otherwise stated

Figure 44:
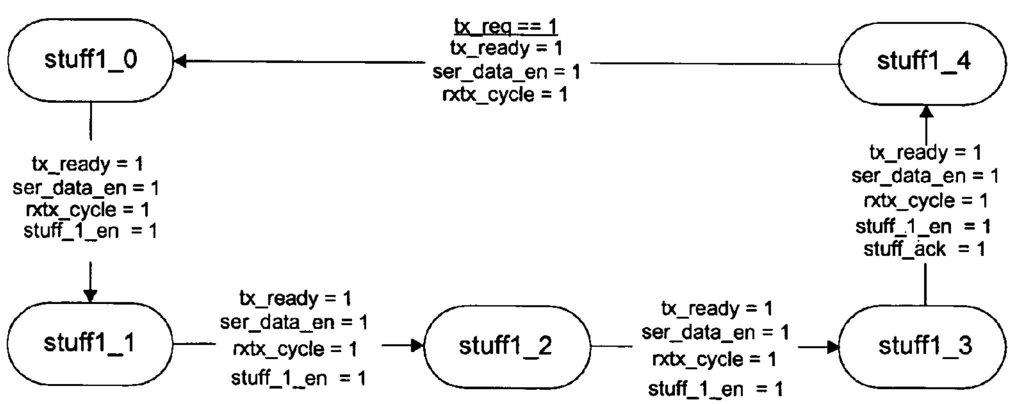
FIG. 44 shows an SIE Rx/Tx state machine Tx bit stuff '1' cycle state diagram

The Tx cycle for Tx bit stuffing when the RxTx statemachine inserts a ‘1’ into the bitstream can be seen in FIG. 44.

NOTE: All statemachine signals are assumed to be ‘0’ unless otherwise stated

The tx* and stuff* states are detailed separately for clarity. They could be easily combined when coding the statemachine, however it would be better for verification and debugging if they were kept separate.

Figure 45:
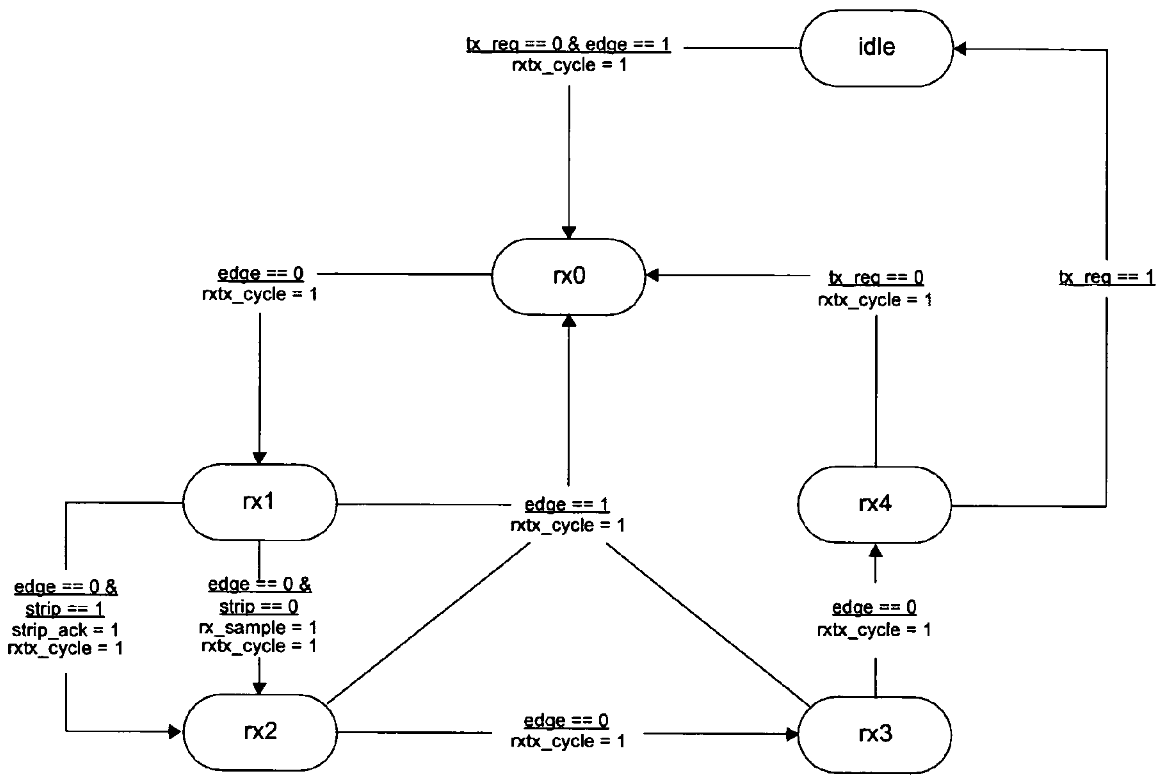
FIG. 45 shows an SIE Rx/Tx state machine Rx cycle state diagram

The Rx cycle of the ISI Rx/Tx statemachine is detailed in FIG. 45. The Rx cycle of the Rx/Tx Statemachine, samples each ISI bit that is received. States rx0->rx4 represent each of the 5 isi_pclk phases that constitute a Rx ISI bit period.

The optimum sample position for an ideal ISI bit period is 2 isi_pclk cycles after the ISI bit boundary sample, which should result in a data sample close to the centre of the ISI bit period. rx_sample is asserted during the rx2 state to indicate a valid ISI data sample on rx_bit, unless the bit should be stripped when flagged by the bit stuffing statemachine, in which case rx_sample is not asserted during rx2 and the bit is not written to the FIFO. When edge is asserted, it resets the Rx cycle to the rx0 state, from any rx state. This is how the isi_sie tracks the phase of the incoming data. The Rx cycle will cycle through states rx0->rx4 until edge is asserted to reset the sample phase, or a tx_req is asserted indicating that the ISI needs to transmit.

Due to the 5 times oversampling a maximum phase error of 0.4 of an ISI bit period (2 isi_pclk cycles out of 5) can be tolerated.

NOTE: All statemachine signals are assumed to be ‘0’ unless otherwise stated.

Figure 46:
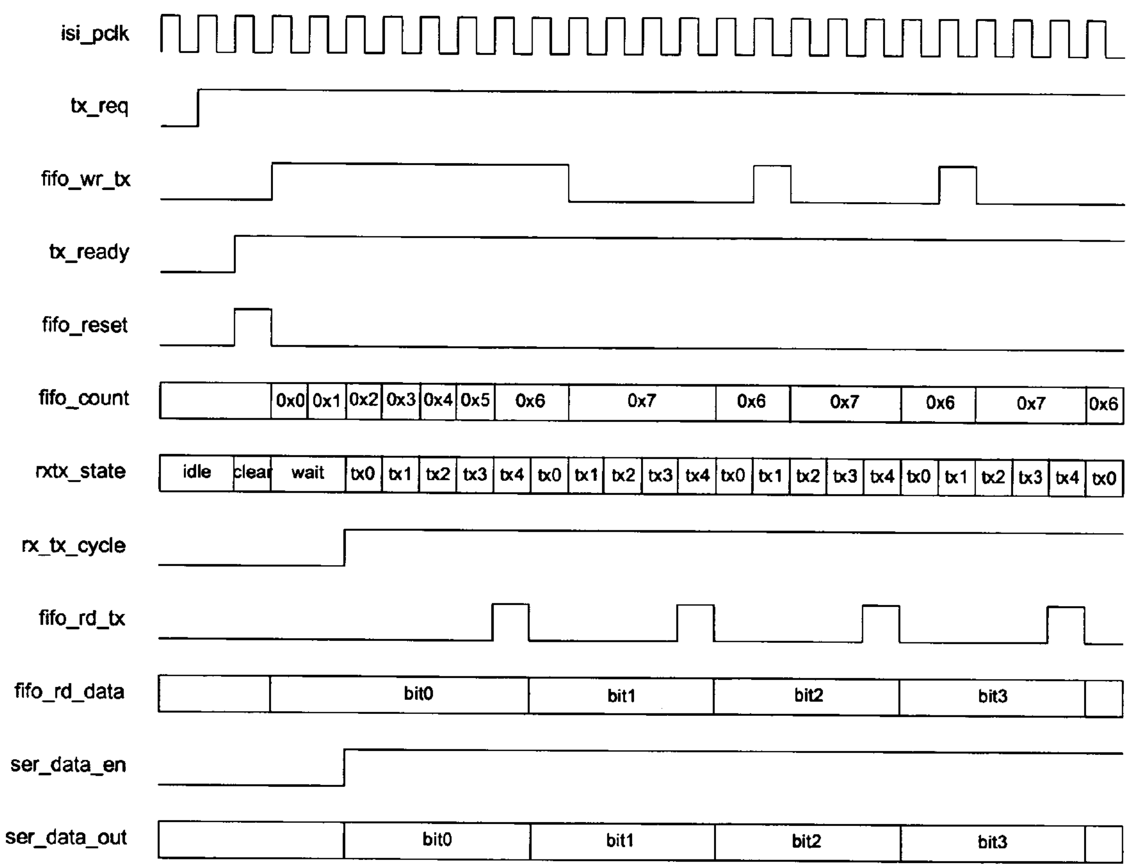
FIG. 46 shows an SIE Tx functional timing example

An example of the Tx data generation mechanism is detailed in FIG. 46. tx_req and fifo_wr_tx are driven by the framer block.

Figure 47:
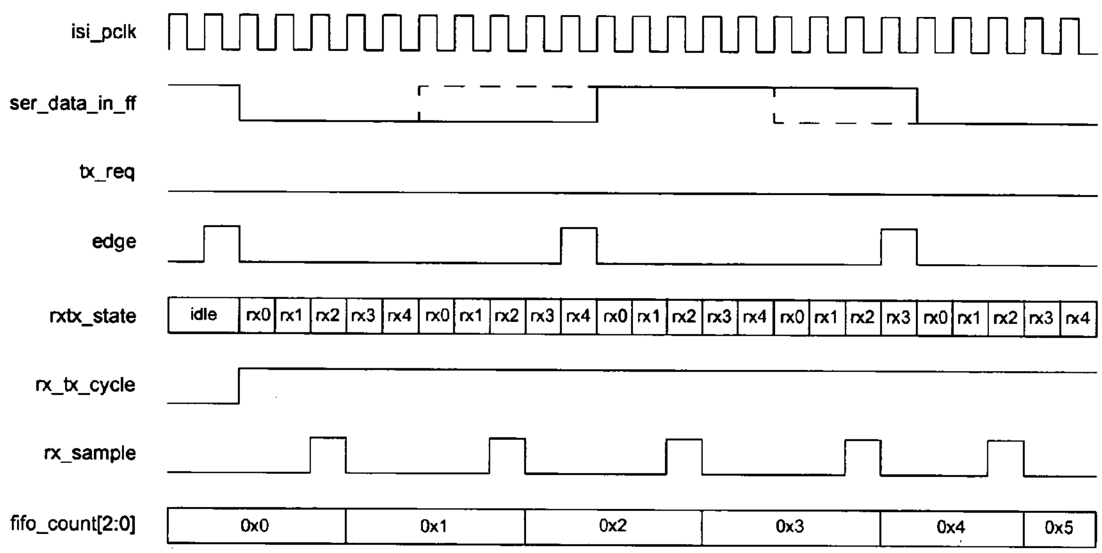
FIG. 47 shows an SIE Rx functional timing example

An example of the Rx data sampling functional timing is detailed in FIG. 47. The dashed lines on the ser_data_in_ff signal indicate where the Rx/Tx statemachine perceived the bit boundary to be, based on the phase of the last ISI bit boundary. It can be seen that data is sampled during the same phase as the previous bit was, in the absence of a transition.

12.4.6.2.3 SIE Rx/Tx FIFO

The Rx/Tx FIFO is a 7×1 bit synchronous look-ahead FIFO that is shared for Tx and Rx operations. It is required to absorb any Rx/Tx latency caused by bit stripping/stuffing on a per ISI line basis, i.e. some ISI lines may require bit stripping/stuffing during an ISI bit period while the others may not, which would lead to a loss of synchronization between the data of the different ISI lines, if a FIFO were not present in each isi_sie.

Figure 48:
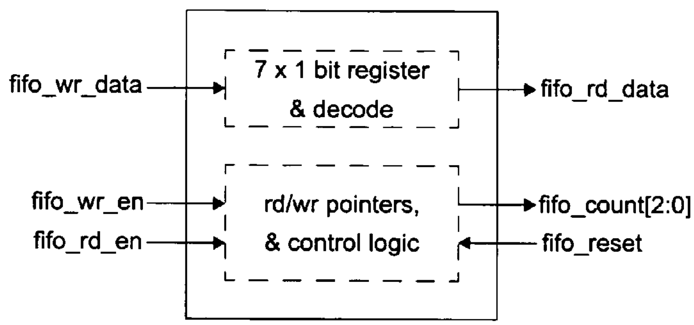
FIG. 48 shows an SIE Rx/Tx FIFO block diagram

The basic functional components of the FIFO are detailed in FIG. 48. tx_ready is driven by the Rx/Tx statemachine and selects which signals control the read and write operations. tx_ready=1 during ISI transmission and selects the fifo_*tx control and data signals. tx_ready=0 during ISI reception and selects the fifo_*rx control and data signals. fifo_reset is driven by the Rx/Tx statemachine. It is active high and resets the FIFO and associated logic before/after transmitting a packet to discard any residual data.

The size of the FIFO is based on the maximum bit stuffing frequency and the size of the shift register used to segment/re-assemble the multiple serial streams in the ISI framing logic. The maximum bit stuffing frequency is every 7 consecutive ones or zeroes. The shift register used is 32 bits wide. This implies that the maximum number of stuffed bits encountered in the time it takes to fill/empty the shift register if 4. This would suggest that 4×1 bit would be the minimum ideal size of the FIFO. However it is necessary to allow for different skew and phase error between the ISI lines, hence a 7×1 bit FIFO.

Figure 49:
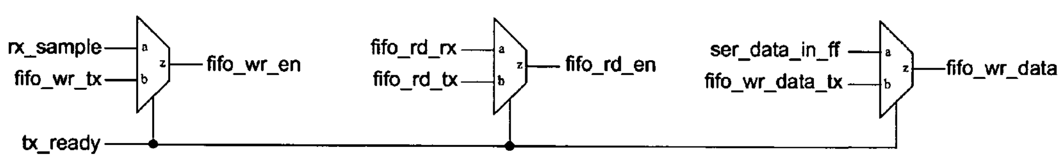
FIG. 49 shows SIE Rx/Tx FIFO control signal gating

The FIFO is controlled by the isi_sie during packet reception and is controlled by the isi_frame block during packet transmission. This is illustrated in FIG. 49. The signal tx_ready selects which mode the FIFO control signals operate in. When tx_ready=0, i.e. Rx mode, the isi_sie control signals rx_sample, fifo_rd_rx and ser_data_in_ff are selected. When tx_ready=1, i.e. Tx mode, the sie_frame control signals fifo_wr_tx, fifo_rd_tx and fifo_wr_data_tx are selected.

12.4.6.3 Bit Stuffing

Programmable bit stuffing is implemented in the isi_sie. This is to allow the system to determine the amount of bit stuffing necessary for a specific ISI system devices. It is unlikely that bit stuffing would be required in a system using a 100 ppm rated crystal. However, a programmable bit stuffing implementation is much more versatile and robust.

The bit stuffing logic consists of a counter and a statemachine that track the number of consecutive ones or zeroes that are transmitted or received and flags the Rx/Tx statemachine when the bit stuffing limit has been reached. The counter, stuff_count, is a 7 bit counter, which decrements when rx_sample is asserted on a Rx cycle or when fifo_rd_tx is asserted on a Tx cycle. The upper 4 bits of stuff_count are loaded with isi_bit_stuff_rate. The lower 3 bits of stuff_count are always loaded with b111, i.e. for isi_bit_stuff_rate=b000, the counter would be loaded with b0000111. This is to prevent bit stuffing for less than 7 consecutive ones or zeroes. This allows the bit stuffing limit to be set in the range 7–>127 consecutive ones or zeroes.

NOTE: It is extremely important that a change in the bit stuffing rate, isi_bit_stuff_rate, is carefully coordinated between ISI devices in a system. It is obvious that ISI devices will not be able to communicate reliably with each other with different bit stuffing settings. It is recommended that all ISI devices in a system default to the safest bit stuffing rate (isi_bit_stuff_rate=b000) at reset. The system can then co-ordinate the change to an optimum bit stuffing rate.

Figure 50:
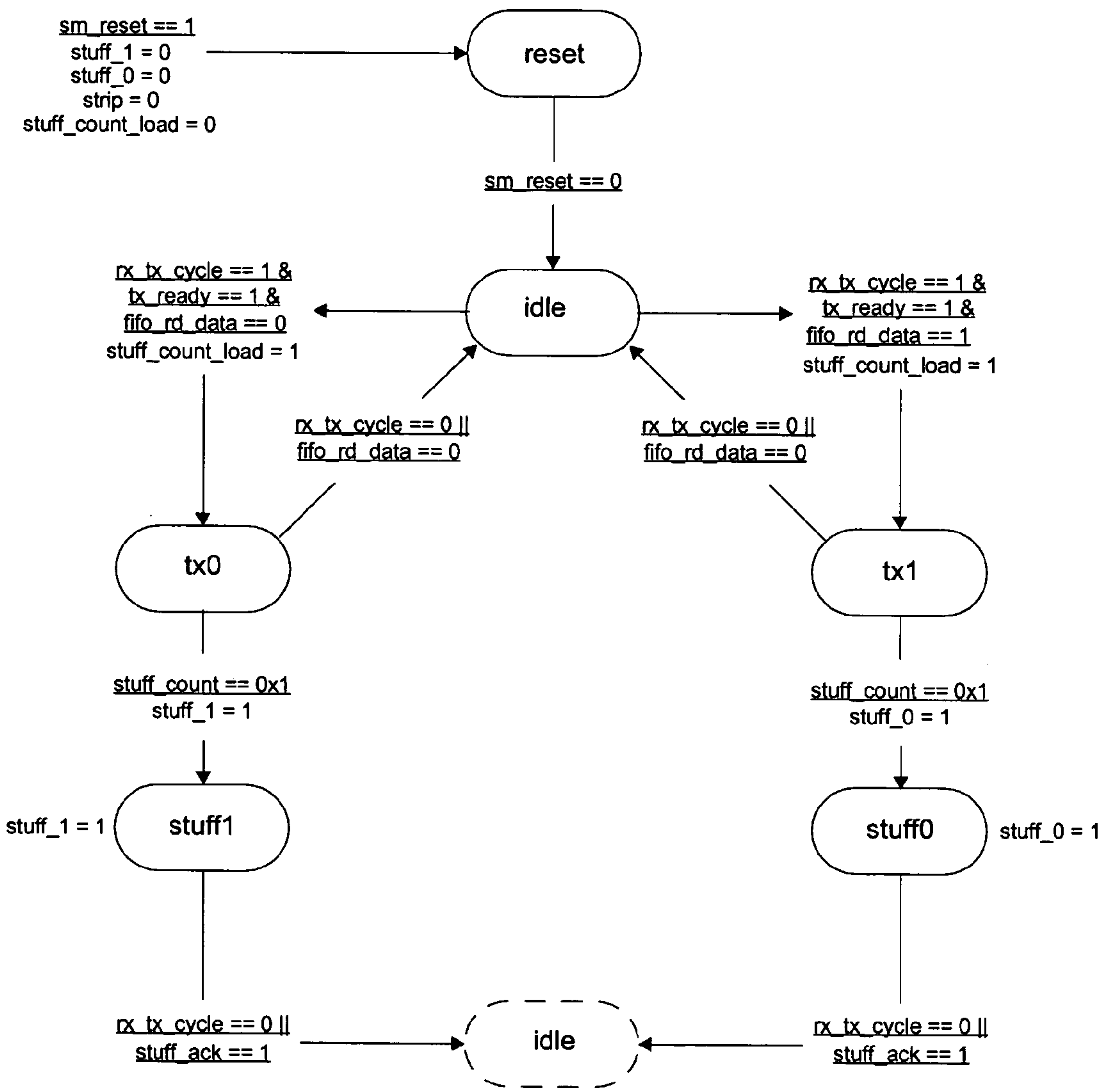
FIG. 50 shows an SIE bit stuffing state machine Tx cycle state diagram

The ISI bit stuffing statemachine Tx cycle is shown in FIG. 50. The counter is loaded when stuff_count_load is asserted.

NOTE: All statemachine signals are assumed to be '0' unless otherwise stated.

Figure 51:
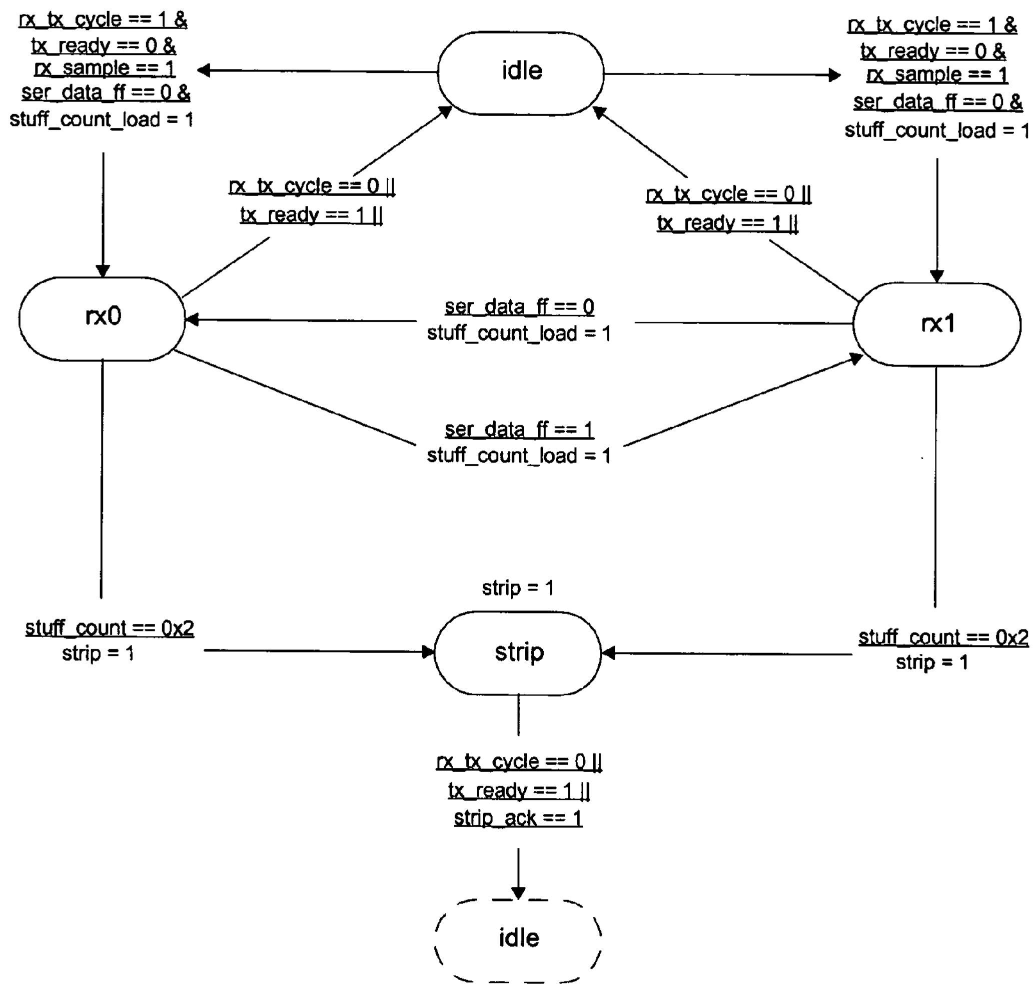
FIG. 51 shows an SIE bit stripping state machine Rx cycle state diagram

The ISI bit stuffing statemachine Rx cycle is shown in FIG. 51. It should be noted that the statemachine enters the strip state when stuff_count=0x2. This is because the statemachine can only transition to rx0 or rx1 when rx_sample is asserted as it needs to be synchronized to changes in sampling phase introduced by the Rx/Tx statemachine. Therefore a one or a zero has already been sampled by the time it enters rx0 or rx1. This is not the case for the Tx cycle, as it will always have a stable 5 isi_pclk cycles per bit period and relies purely on the data value when entering tx0 or tx1. The Tx cycle therefore enters stuff1 or stuff0 when stuff_count=0x1.

NOTE: All statemachine signals are assumed to be '0' unless otherwise stated.

12.4.6.4 ISI Framing and CRC Sub-Block (isi_frame)

12.4.6.4.1 CRC Generation/Checking

A Cyclic Redundancy Checksum (CRC) is calculated over all fields except the start and stop fields for each long or ping packet transmitted. The receiving ISI device will perform the same calculation on the received packet to verify the integrity of the packet. The procedure used in the CRC generation/checking is the same as the Frame Checking Sequence (FCS) procedure used in HDLC, detailed in ITU-T Recommendation T30[39].

Figure 52:
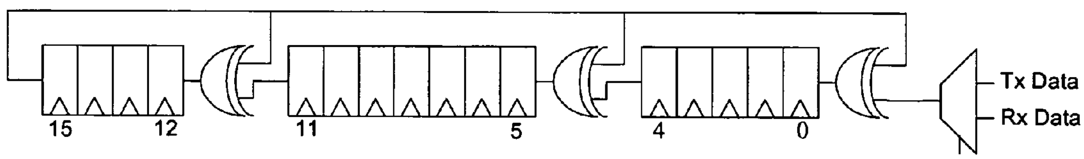
FIG. 52 shows a CRC16 generation/checking shift register

For generation/checking of the CRC field, the shift register illustrated in FIG. 52 is used to perform the modulo 2 division on the packet contents by the polynomial $G(x)=x^{16}+x^{12}+x^5+1$.

To generate the CRC for a transmitted packet, where T(x)=[Packet Descriptor field, Address field, Data Payload field] (a ping packet will not contain a data payload field).

Set the shift register to 0xFFFF.

Shift T(x) through the shift register, LSB first. This can occur in parallel with the packet transmission.

Once the each bit of T(x) has been shifted through the register, it will contain the remainder of the modulo 2 division T(x)/G(x).

Perform a ones complement of the register contents, giving the CRC field which is transmitted MSB first, immediately following the last bit of M(x To check the CRC for a received packet, where R(x)=[Packet Descriptor field, Address field, Data Payload field, CRC field] (a ping packet will not contain a data payload field).

Set the shift register to 0xFFFF.

Shift R(x) through the shift register, LSB first. This can occur in parallel with the packet reception.

Once each bit of the packet has been shifted through the register, it will contain the remainder of the modulo 2 division R(x)/G(x).

The remainder should equal b0001110100001111, for a packet without errors.

12.5 CTRL (Control Sub-Block)

12.5.1 Overview

The CTRL is responsible for high level control of the SCB sub-blocks and coordinating access between them. All control and status registers for the SCB are contained within the CTRL and are accessed via the CPU interface. The other major components of the CTRL are the SCB Map logic and the DMA Manager logic.

12.5.2 SCB Mapping

In order to support maximum flexibility when moving data through a multi-SoPEC system it is possible to map any USB endpoint onto either DMAChannel within any SoPEC in the system. The SCB map, and indeed the SCB itself is based around the concept of an ISIId and an ISISubId. Each SoPEC in the system has a unique ISIId and two ISISubIds, namely ISISubId0 and ISISubId1. We use the convention that ISISubId0 corresponds to DMAChannel0 in each SoPEC and ISISubId1 corresponds to DMAChannel1. The naming convention for the ISIId is shown in Table 35 below and this would correspond to a multi-SoPEC system such as that shown in FIG. 27. We use the term ISIId instead of SoPECId to avoid confusion with the unique ChipID used to create the SoPEC_id and SoPEC_id_key (see chapter 17 and [9] for more details).

TABLE 35

ISIId naming convention

| ISIId | SoPEC to which it refers |
|---|---|
| 0–14 | Standard device ISIIds (0 is the power-on reset value) |
| 15 | Broadcast ISIId |

The combined ISIId and ISISubId therefore allows the ISI to address DMAChannel0 or DMAChannel1 on any SoPEC device in the system. The ISI, DMA manager and SCB map hardware use the ISIId and ISISubId to handle the different data streams that are active in a multi-SoPEC system as does the software running on the CPU of each SoPEC. In this document we will identify DMAChannels as ISIx.y where x is the ISIId and y is the ISISubId. Thus ISI2.1 refers to DMAChannel1 of ISISlave2. Any data sent to a broadcast channel, i.e. ISI15.0 or ISI15.1, are received by every ISI device in the system including the ISIMaster (which may be an ISI-Bridge). The USB device controller and software stacks however have no understanding of the ISIId and ISISubId but the Silverbrook printer driver software running on the external host does make use of the ISIId and ISISubId. USB is simply used as a data transport—the mapping of USB device endpoints onto ISIId and SubId is communicated from the external host Silverbrook code to the SoPEC Silverbrook code through USB control (or possibly bulk data) messages i.e. the mapping information is simply data payload as far as USB is concerned. The code running on SoPEC is responsible for parsing these messages and configuring the SCB accordingly.

The use of just two DMAChannels places some limitations on what can be achieved without software intervention. For every SoPEC in the system there are more potential sources of data than there are sinks. For example an ISISlave could receive both control and data messages from the ISIMaster SoPEC in addition to control and data from the external host, either specifically addressed to that particular ISISlave or over the broadcast ISI channel. However all ISISlaves only have two possible data sinks, i.e. DMAChannel0 and DMAChannel1. Another example is the ISIMaster in a multi-SoPEC system which may receive control messages from each SoPEC in addition to control and data information from the external host (e.g. over USB). In this case all of the control messages are in contention for access to DMAChannel0. We resolve these potential conflicts by adopting the following conventions:

1) Control messages may be interleaved in a memory buffer: The memory buffer that the DMAChannel0 points to should be regarded as a central pool of control messages. Every control message must contain fields that identify the size of the message, the source and the destination of the control message. Control messages may therefore be multiplexed over a DMAChannel which allows several control message sources to address the same DMAChannel. Furthermore, if SoPEC-type control messages contain source and destination fields it is possible for the external host to send control messages to individual SoPECs over the ISI15.0 broadcast channel.

2) Data messages should not be interleaved in a memory buffer: As data messages are typically part of a much larger block of data that is being transferred it is not possible to control their contents in the same manner as is possible with the control messages. Furthermore we do not want the CPU to have to perform reassembly of data blocks. Data messages from different sources cannot be interleaved over the same DMAChannel—the SCB map must be reconfigured each time a different data source is given access to the DMAChannel.

3) Every reconfiguration of the SCB map requires the exchange of control messages: SoPEC's SCB map reset state is shown in Table and any subsequent modifications to this map require the exchange of control messages between the SoPEC and the external host. As the external host is expected to control the movement of data in any SoPEC system it is anticipated that all changes to the SCB map will be performed in response to a request from the external host. While the SoPEC could autonomously reconfigure the SCB map (this is entirely up to the software running on the SoPEC) it should not do so without informing the external host in order to avoid data being misrouted.

An example of the above conventions in operation is worked through in section 12.5.2.3.

12.5.2.1 SCB Map Rules

The operation of the SCB map is described by these 2 rules:

Rule 1: A packet is routed to the DMA manager if it originates from the USB device core and has an ISIId that matches the local SoPEC ISIId.

Rule 2: A packet is routed to the ISI if it originates from the CPU or has an ISIId that does not match the local SoPEC ISIId.

If the CPU erroneously addresses a packet to the ISIId contained in the ISIId register (i.e. the ISIId of the local SoPEC) then that packet will be transmitted on the ISI rather than be sent to the DMA manager. While this will usually cause an error on the ISI there is one situation where it could be beneficial, namely for initial dialog in a 2 SoPEC system as both devices come out of reset with an ISIId of 0.

12.5.2.2 External Host to ISIMaster SoPEC Communication

Although the SCB map configuration is independent of ISIMaster status, the following discussion on SCB map configurations assumes the ISIMaster is a SoPEC device rather than an ISI bridge chip, and that only a single USB connection to the external host is present. The information should apply broadly to an ISI-Bridge but we focus here on an ISIMaster SoPEC for clarity.

As the ISIMaster SoPEC represents the printer device on the PC USB bus it is required by the USB specification to have a dedicated control endpoint, EP0. At boot time the ISIMaster SoPEC will also require a bulk data endpoint to facilitate the transfer of program code from the external host. The simplest SCB map configuration, i.e. for a single stand-alone SoPEC, is sufficient for external host to ISIMaster SoPEC communication and is shown in Table 36.

TABLE 36

Single SoPEC SCB map configuration

| Source | Sink |
|---|---|
| EP0 | ISI0.0 |
| EP1 | ISI0.1 |
| EP2 | nc |
| EP3 | nc |
| EP4 | nc |

In this configuration all USB control information exchanged between the external host and SoPEC over EP0 (which is the only bidirectional USB endpoint). SoPEC specific control information (printer status, DNC info etc.) is also exchanged over EP0.

All packets sent to the external host from SoPEC over EP0 must be written into the DMA mapped EP buffer by the CPU (LEON-PC dataflow in FIG. 29). All packets sent from the external host to SoPEC are placed in DRAM by the DMA Manager, where they can be read by the CPU (PC-DIU dataflow in FIG. 29). This asymmetry is because in a multi-SoPEC environment the CPU will need to examine all incoming control messages (i.e. messages that have arrived over DMAChannel0) to ascertain their source and destination (i.e. they could be from an ISISlave and destined for the external host) and so the additional overhead in having the CPU move the short control messages to the EP0 FIFO is relatively small. Furthermore we wish to avoid making the SCB more complicated than necessary, particularly when there is no significant performance gain to be had as the control traffic will be relatively low bandwidth.

The above mechanisms are appropriate for the types of communication outlined in sections 12.1.2.1.1 through 12.1.2.1.4

12.5.2.3 Broadcast Communication

The SCB configuration for broadcast communication is also the default, post power-on reset, configuration for SoPEC and is shown in Table 37.

TABLE 37

Default SoPEC SCB map configuration

| Source | Sink |
|---|---|
| EP0 | ISI0.0 |
| EP1 | ISI0.1 |
| EP2 | ISI15.0 |
| EP3 | ISI15.1 |
| EP4 | ISI1.1 |

USB endpoints EP2 and EP3 are mapped onto ISISubID0 and ISISubId1 of ISIId15 (the broadcast ISIId channel). EP0 is used for control messages as before and EP1 is a bulk data endpoint for the ISIMaster SoPEC. Depending on what is convenient for the boot loader software, EP1 may or may not be used during the initial program download, but EP1 is highly likely to be used for compressed page or other program downloads later. For this reason it is part of the default configuration. In this setup the USB device configuration will take place, as it always must, by exchanging messages over the control channel (EP0).

One possible boot mechanism is where the external host sends the bootloader1 program code to all SoPECs by broadcasting it over EP3. Each SoPEC in the system then authenticates and executes the bootloader1 program. The ISIMaster SoPEC then polls each ISISlave (over the ISIx.0 channel). Each ISISlave ascertains its ISIId by sampling the particular GPIO pins required by the bootloader1 and reporting its presence and status back to the ISIMaster. The ISIMaster then passes this information back to the external host over EP0. Thus both the external host and the ISIMaster have knowledge of the number of SoPECs, and their ISIIds, in the system. The external host may then reconfigure the SCB map to better optimise the SCB resources for the particular multi-SoPEC system. This could involve simplifying the default configuration to a single SoPEC system or remapping the broadcast channels onto DMAChannels in individual ISISlaves.

The following steps are required to reconfigure the SCB map from the configuration depicted in Table to one where EP3 is mapped onto ISI1.0:

1) The external host sends a control message(s) to the ISIMaster SoPEC requesting that USB EP3 be remapped to ISI1.0
2) The ISIMaster SoPEC sends a control message to the external host informing it that EP3 has now been mapped to ISI1.0 (and therefore the external host knows that the previous mapping of ISI15.1 is no longer available through EP3).
3) The external host may now send control messages directly to ISISlave1 without requiring any CPU intervention on the ISIMaster SoPEC 12.5.2.4 External Host to ISISlave SoPEC Communication If the ISIMaster is configured correctly (e.g. when the ISIMaster is a SoPEC, and that SoPEC's SCB map is configured correctly) then data sent from the external host destined for an ISISlave will be transmitted on the ISI with the correct address. The ISI automatically forwards any data addressed to it (including broadcast data) to the DMA channel with the appropriate ISISubId. If the ISISlave has data to send to the external host it must do so by sending a control message to the ISIMaster identifying the external host as the intended recipient. It is then the ISIMaster's responsibility to forward this message to the external host.

With this configuration the external host can communicate with the ISISlave via broadcast messages only and this is the mechanism by which the bootloader1 program is downloaded. The ISISlave is unable to communicate with the external host (or the ISIMaster) until the bootloader1 program has successfully executed and the ISISlave has determined what its ISIId is. After the bootloader1 program (and possibly other programs) has executed the SCB map of the ISIMaster may be reconfigured to reflect the most appropriate topology for the particular multi-SoPEC system it is part of.

All communication from an ISISlave to external host is either achieved directly (if there is a direct USB connection present for example) or by sending messages via the ISIMaster. The ISISlave can never initiate communication to the external host. If an ISISlave wishes to send a message to the external host via the ISIMaster it must wait until it is pinged by the ISIMaster and then send a the message in a long packet addressed to the ISIMaster. When the ISIMaster receives the message from the ISISlave it first examines it to determine the intended destination and will then copy it into the EP0 FIFO for transmission to the external host. The software running on the ISIMaster is responsible for any arbitration between messages from different sources (including itself) that are all destined for the external host.

The above mechanisms are appropriate for the types of communication outlined in sections 12.1.2.1.5 and 12.1.2.1.6.

12.5.2.5 ISIMaster to ISISlave Communication

All ISIMaster to ISISlave communication takes place over the ISI. Immediately after reset this can only be by means of broadcast messages. Once the bootloader1 program has successfully executed on all SoPECs in a multi-SoPEC system the ISIMaster can communicate with each SoPEC on an individual basis.

If an ISISlave wishes to send a message to the ISIMaster it may do so in response to a ping packet from the ISIMaster. When the ISIMaster receives the message from the ISISlave it must interpret the message to determine if the message contains information required to be sent to the external host. In the case of the ISIMaster being a SoPEC, software will transfer the appropriate information into the EP0 FIFO for transmission to the external host.

The above mechanisms are appropriate for the types of communication outlined in sections 12.1.2.3.3 and 12.1.2.3.4.

12.5.2.6 ISISlave to ISISlave Communication

ISISlave to ISISlave communication is expected to be limited to two special cases: (a) when the PrintMaster is not the ISIMaster and (b) when a storage SoPEC is used. When the PrintMaster is not the ISIMaster then it will need to send control messages (and receive responses to these messages) to other ISISlaves. When a storage SoPEC is present it may need to send data to each SoPEC in the system. All ISISlave to ISISlave communication will take place in response to ping messages from the ISIMaster.

12.5.2.7 Use of the SCB Map in an ISISlave with a External Host Connection

After reset any SoPEC (regardless of ISIMaster/Slave status) with an active USB connection will route packets from EP0,1 to DMA channels 0,1 because the default SCB map is to map EP0 to ISIId0.0 and EP1 to ISIId0.1 and the default ISIId is 0. At some later time the SoPEC learns its true ISIId for the system it is in and re-configures its ISIId and SCB map registers accordingly. Thus if the true ISIId is 3 the external host could reconfigure the SCB map so that EP0 and EP1 (or any other endpoints for that matter) map to ISIId3.0 and 3.1 respectively. The co-ordination of the updating of the ISIId registers and the SCB map is a matter for software to take care of. While the AutoMasterEnable bit of the ISICntrl register is set the external host must not send packets down EP2–4 of the USB connection to the device intended to be an ISISlave. When AutoMasterEnable has been cleared the external host may send data down any endpoint of the USB connection to the ISISlave.

The SCB map of an ISISlave can be configured to route packets from any EP to any ISIId.ISISubId oust as an ISIMaster can). As with an ISIMaster these packets will end up in the SCBTxBuffer but while an ISIMaster would just transmit them when it got a local access slot (from ping arbitration) the ISISlave can only transmit them in response to a ping. All this would happen without CPU intervention on the ISISlave (or ISIMaster) and as long as the ping frequency is sufficiently high it would enable maximum use of the bandwidth on both USB buses.

12.5.3 DMA Manager

The DMA manager manages the flow of data between the SCB and the embedded DRAM. Whilst the CPU could be used for the movement of data in SoPEC, a DMA manager is a more efficient solution as it will handle data in a more predictable fashion with less latency and requiring less buffering. Furthermore a DMA manager is required to support the ISI transfer speed and to ensure that the SoPEC could be used with a high speed ISI-Bridge chip in the future.

The DMA manager utilizes 2 write channels (DMAChannel0, DMAChannel1) and 1 read/write channel (DMAChannel2) to provide 2 independent modes of access to DRAM via the DIU interface:

USBD/ISI type access.

USBH type access.

DIU read and write access is in bursts of 4×64 bit words. Byte aligned write enables are provided for write access. Data for DIU write accesses will be read directly from the buffers contained in the respective SCB sub-blocks. There is no internal SCB DMA buffer. The DMA manager handles all issues relating to byte/word/longword address alignment, data endianness and transaction scheduling. If a DMA channel is disabled during a DMA access, the access will be completed. Arbitration will be performed between the following DIU access requests:

USBD write request.

ISI write request.

USBH write request.

USBH read request.

DMAChannel0 will have absolute priority over any DMA requesters. In the absence of DMAChannel0 DMA requests, arbitration will be performed in a round robin manner, on a per cycle basis over the other channels.

12.5.3.1 DMA Effective Bandwidth

The DIU bandwidth available to the DMA manager must be set to ensure adequate bandwidth for all data sources, to avoid back pressure on the USB and the ISI. This is achieved by setting the output (i.e. DIU) bandwidth to be greater than the combined input bandwidths (i.e. USBD+USBH+ISI). The required bandwidth is expected to be 160 Mbits/s (1 bit/cycle @ 160 MHz). The guaranteed DIU bandwidth for the SCB is programmable and may need further analysis once there is better knowledge of the data throughput from the USB IP cores.

12.5.3.2 USBDIISI DMA Access

The DMA manager uses the two independent unidirectional write channels for this type of DMA access, one for each ISISubID, to control the movement of data. Both DMAChannel0 and DMAChannel1 only support write operation and can transfer data from any USB device DMA mapped EP buffer and from the ISI receive buffer to separate circular buffers in DRAM, corresponding to each DMA channel.

While the DMA manager performs the work of moving data the CPU controls the destination and relative timing of data flows to and from the DRAM. The management of the DRAM data buffers requires the CPU to have accurate and timely visibility of both the DMA and PEP memory usage. In other words when the PEP has completed processing of a page band the CPU needs to be aware of the fact that an area of memory has been freed up to receive incoming data. The management of these buffers may also be performed by the external host.

12.5.3.2.1 Circular Buffer Operation

The DMA manager supports the use of circular buffers for both DMAChannels. Each circular buffer is controlled by 5 registers: DMAnBottomAdr, DMAnTopAdr, DMAnMaxAdr, DMAnCurrWPtr and DMAnIntAdr. The operation of the circular buffers is shown in FIG. 53 below.

Here we see two snapshots of the status of a circular buffer with (b) occurring sometime after (a) and some CPU writes to the registers occurring in between (a) and (b). These CPU writes are most likely to be as a result of a finished band interrupt (which frees up buffer space) but could also have occurred in a DMA interrupt service routine resulting from DMAnIntAdr being hit. The DMA manager will continue filling the free buffer space depicted in (a), advancing the DMAnCurrWPtr after each write to the DIU. Note that the DMACurrWPtr register always points to the next address the DMA manager will write to. When the DMA manager reaches the address in DMAnIntAdr (i.e. DMACurrWPtr=DMAnIntAdr) it will generate an interrupt if the DMAnIntAdrMask bit in the DMAMask register is set. The purpose of the DMAnintAdr register is to alert the CPU that data (such as a control message or a page or band header) has arrived that it needs to process. The interrupt routine servicing the DMA interrupt will change the DMAnIntAdr value to the next location that data of interest to the CPU will have arrived by.

Figure 53:
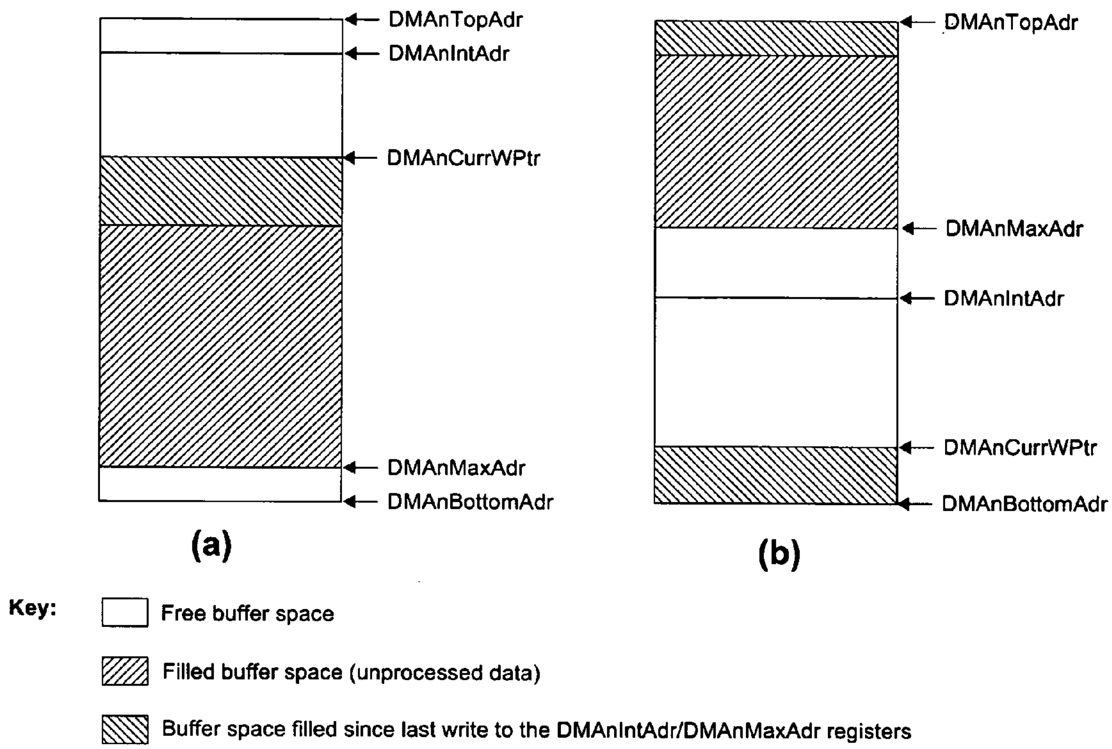
FIG. 53 shows circular buffer operation
Figure 55:
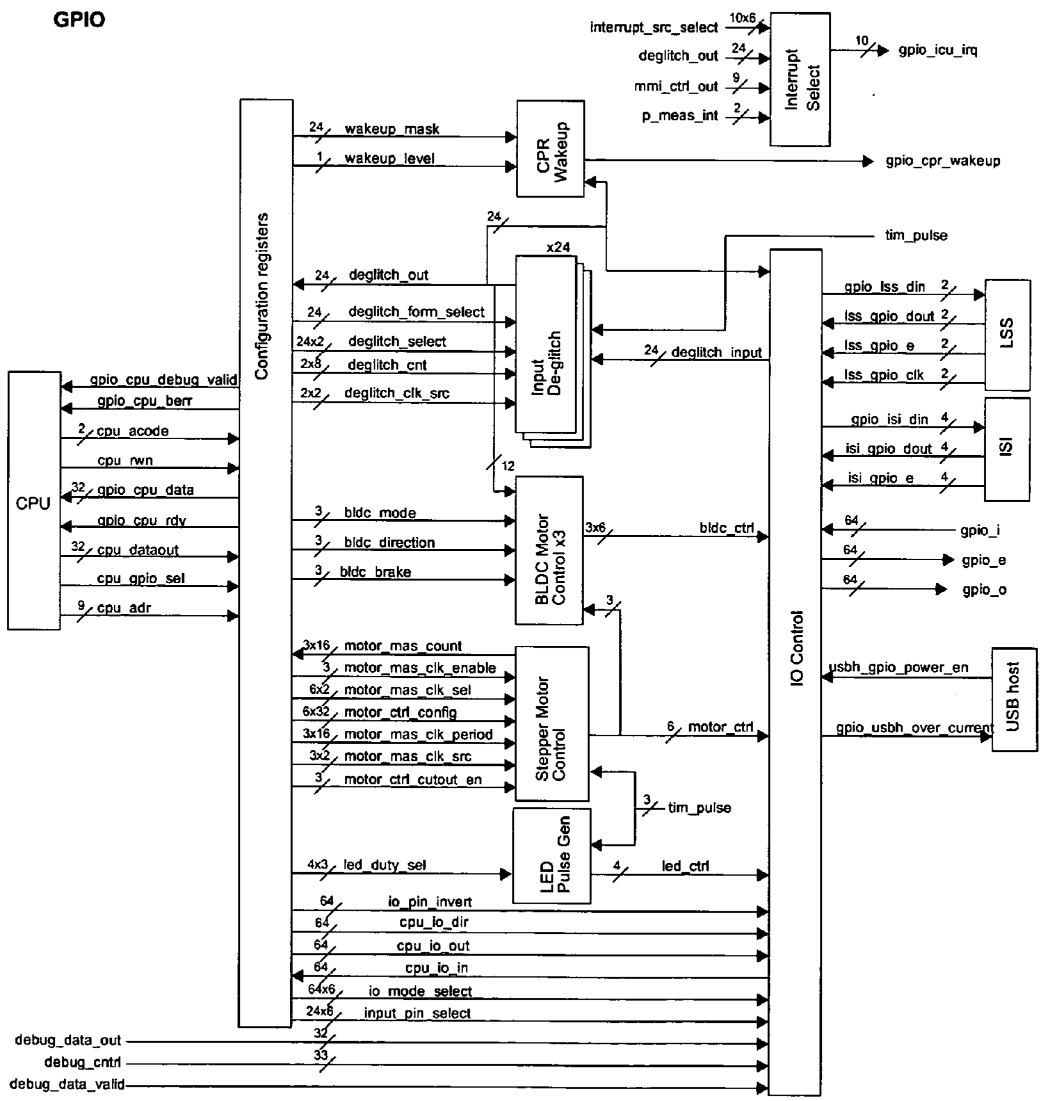
FIG. 55 shows a GPIO partition
Figure 56:
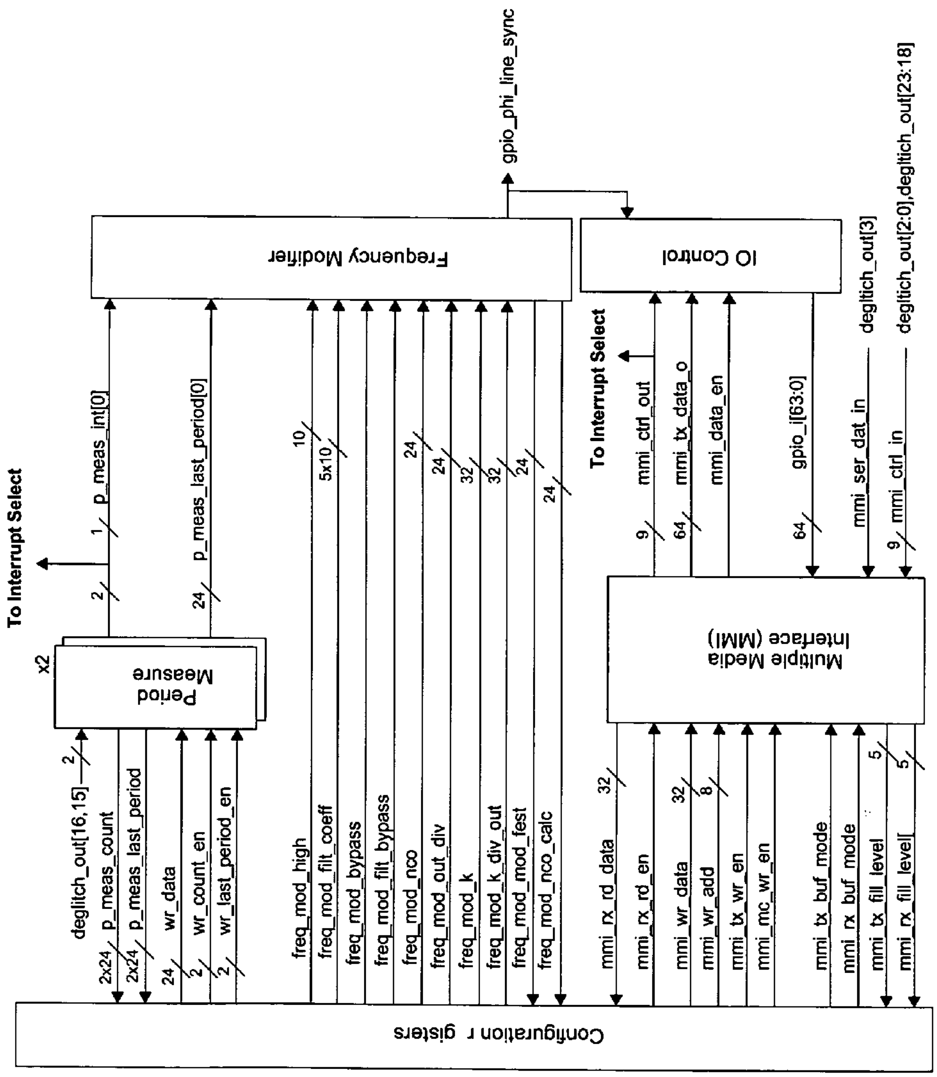
FIG. 56 shows a motor control RTL diagram
Figure 57:
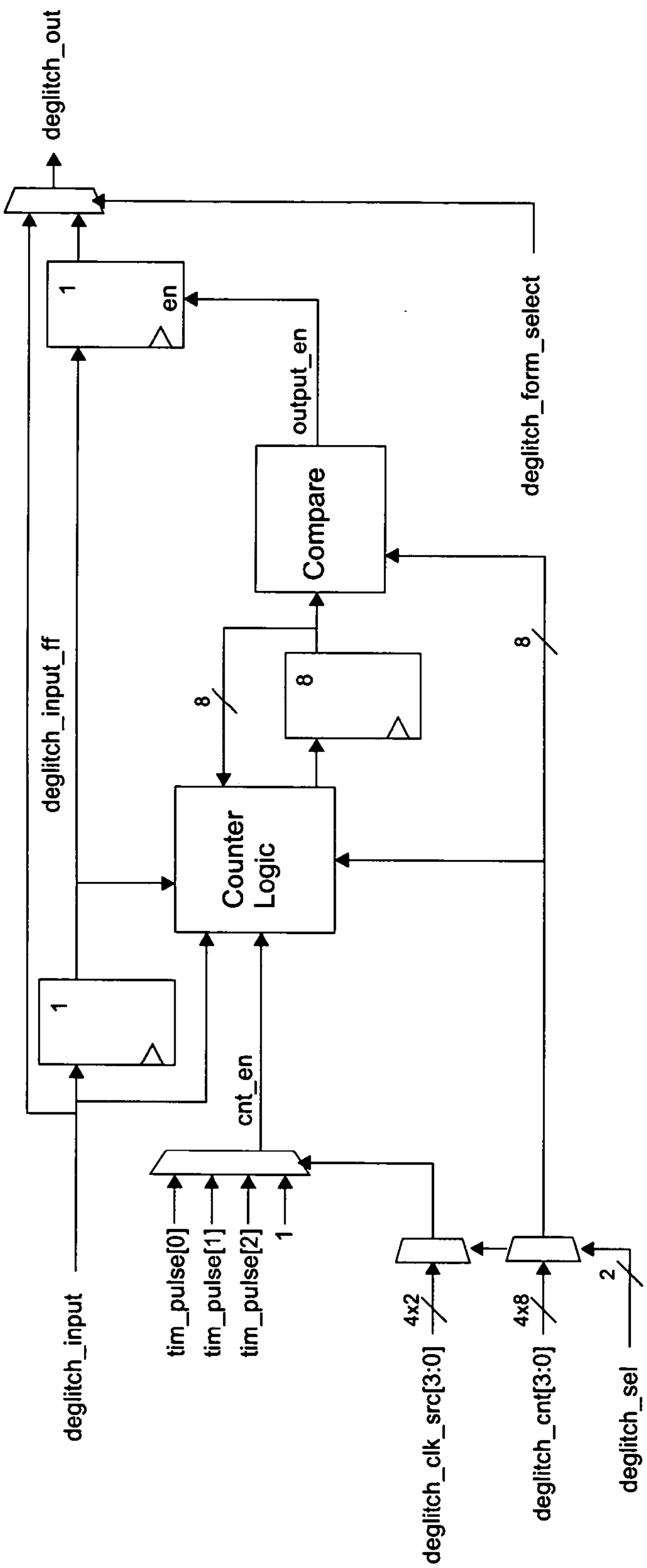
FIG. 57 is an input de-glitch RTL diagram
Figure 58:
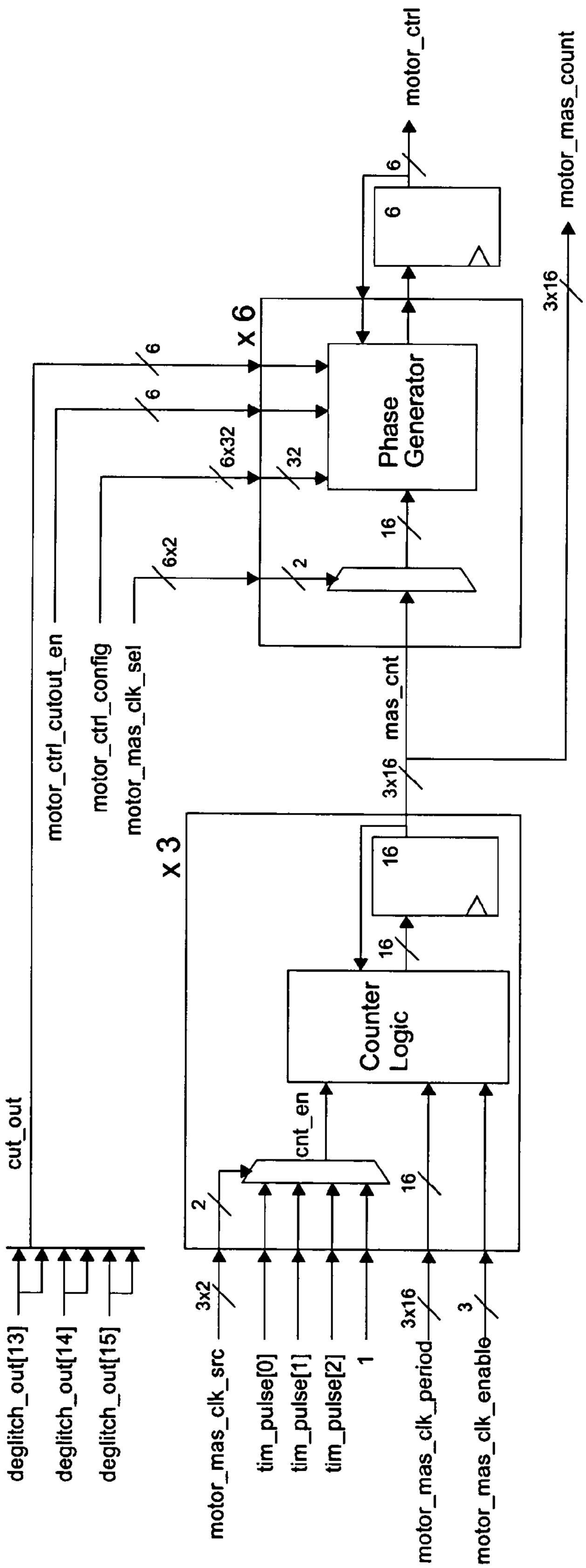
FIG. 58 is a frequency analyser RTL diagram
Figure 59:
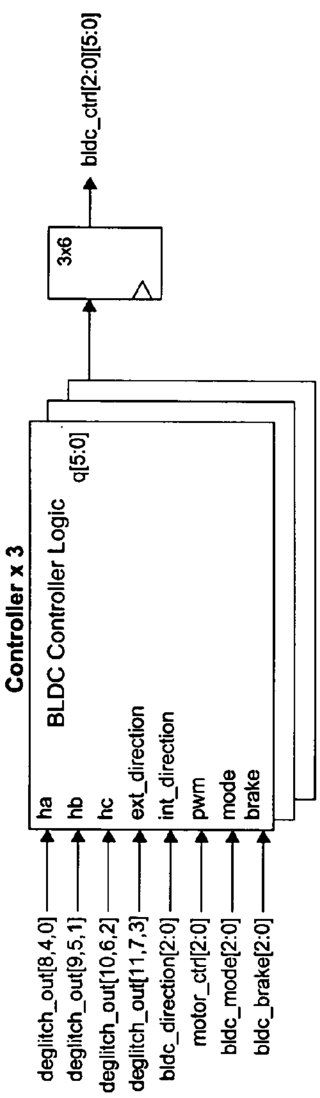
FIG. 59 shows a brushless DC controller
Figure 60:
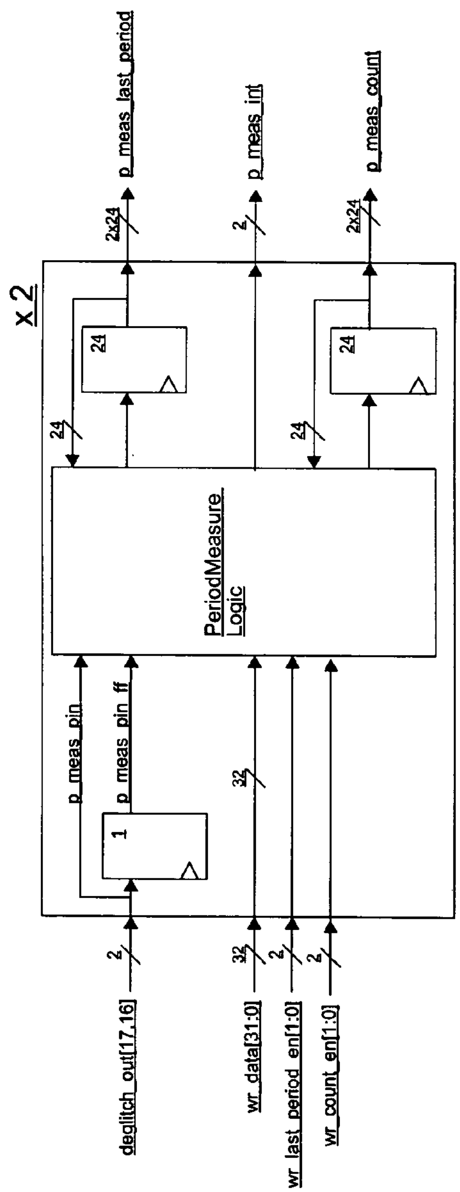
FIG. 60 shows a period measure unit
Figure 61:
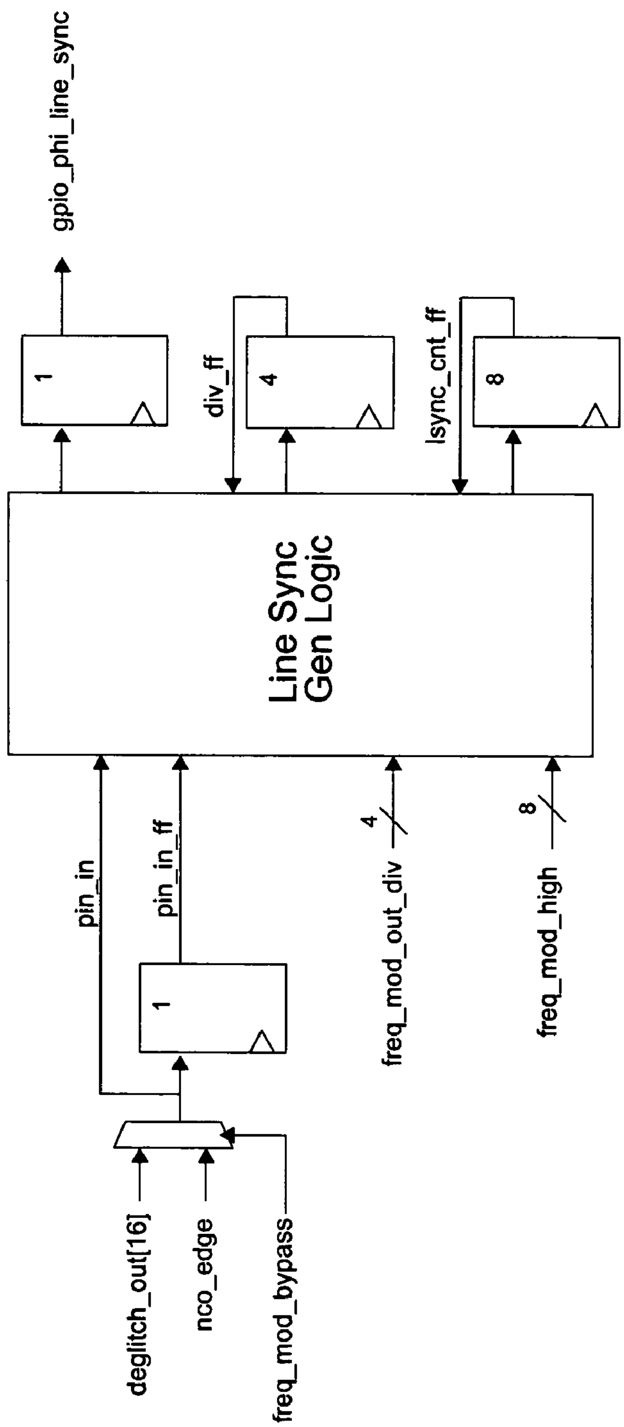
FIG. 61 shows line synch generation logic
Figure 62:
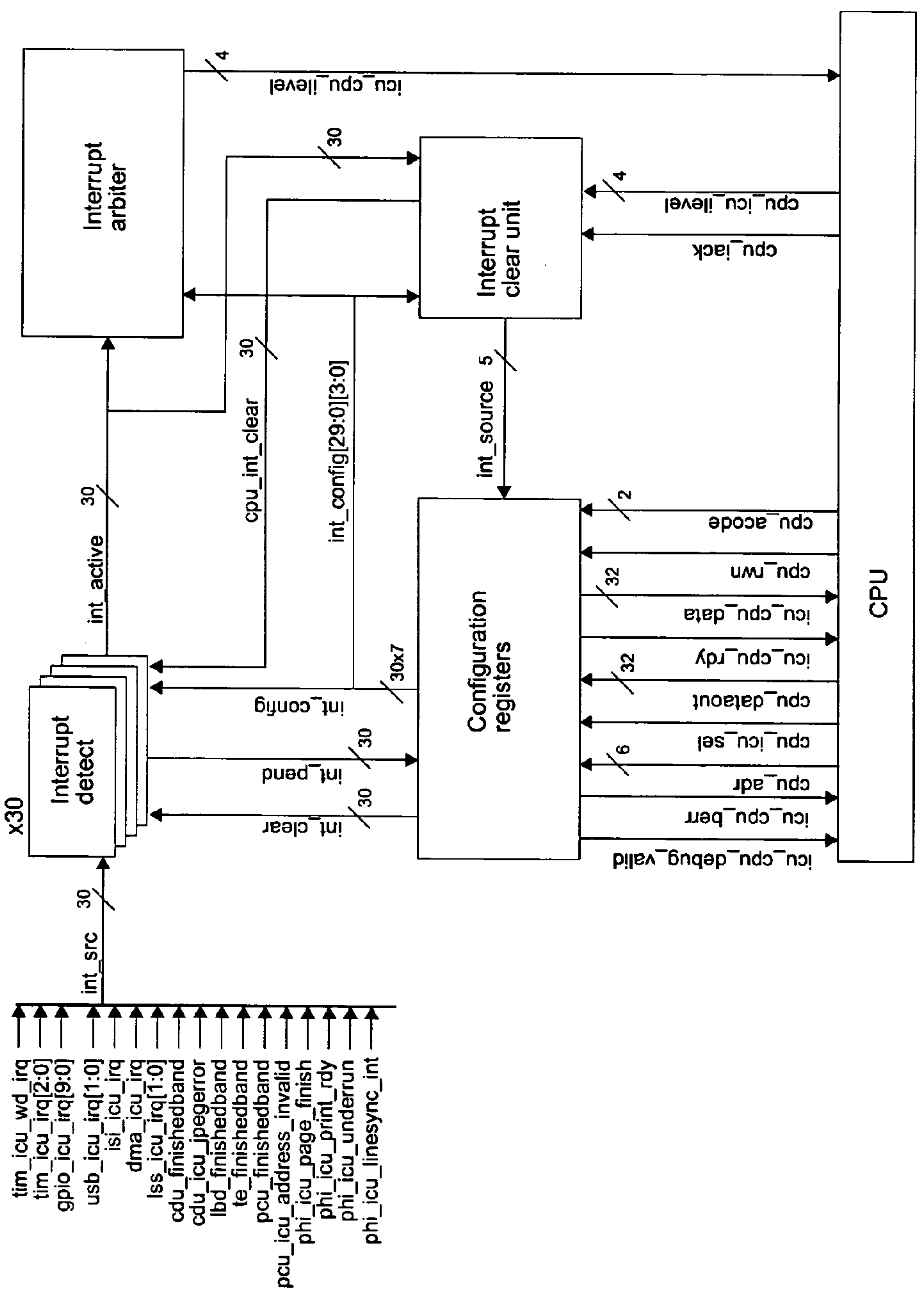
FIG. 62 shows an ICU partition
Figure 63:
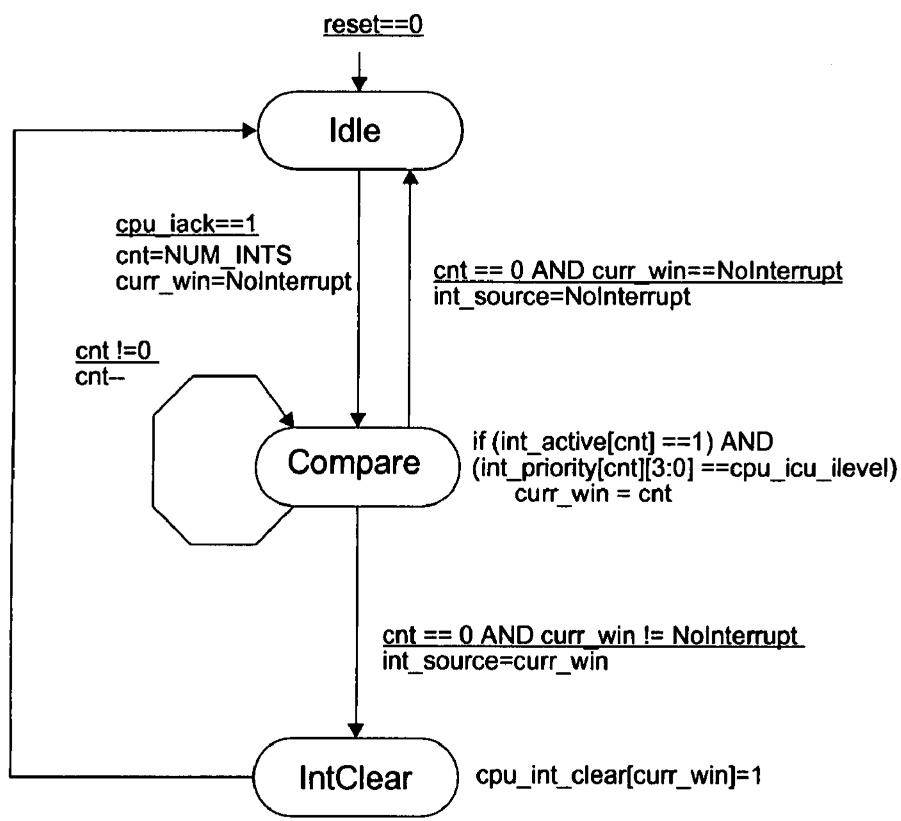
FIG. 63 is an interrupt clear state diagram FIG. 63A Timers sub-block partition diagram
Figure 63A:
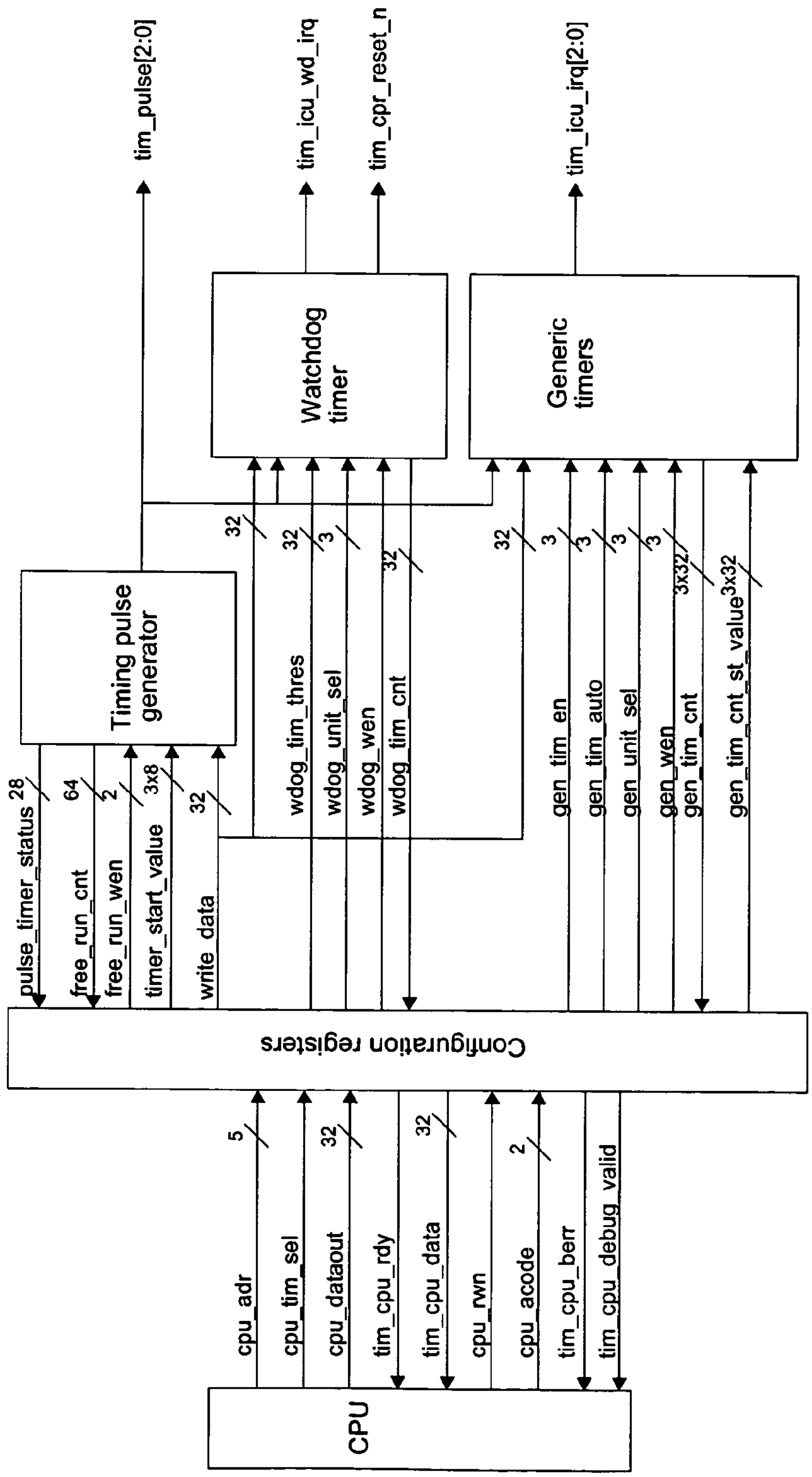
Figure 64:
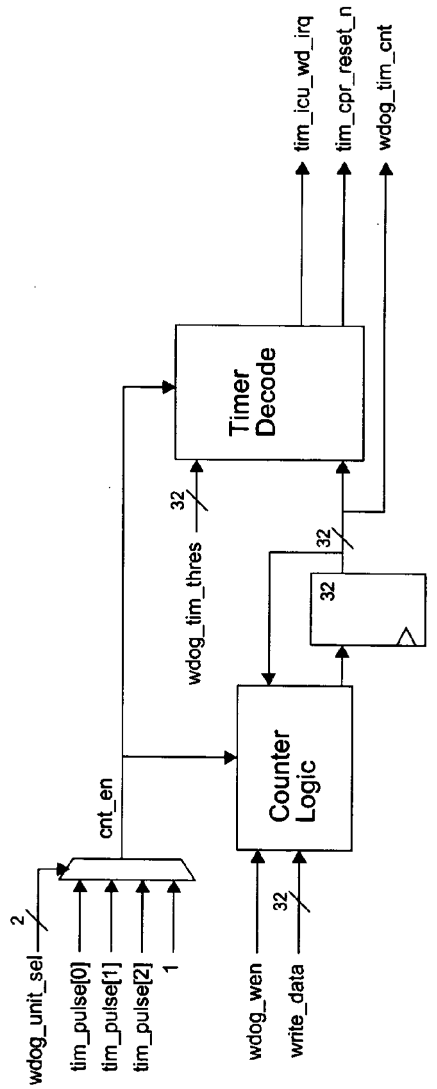
FIG. 64 is a watchdog timer RTL diagram
Figure 65:
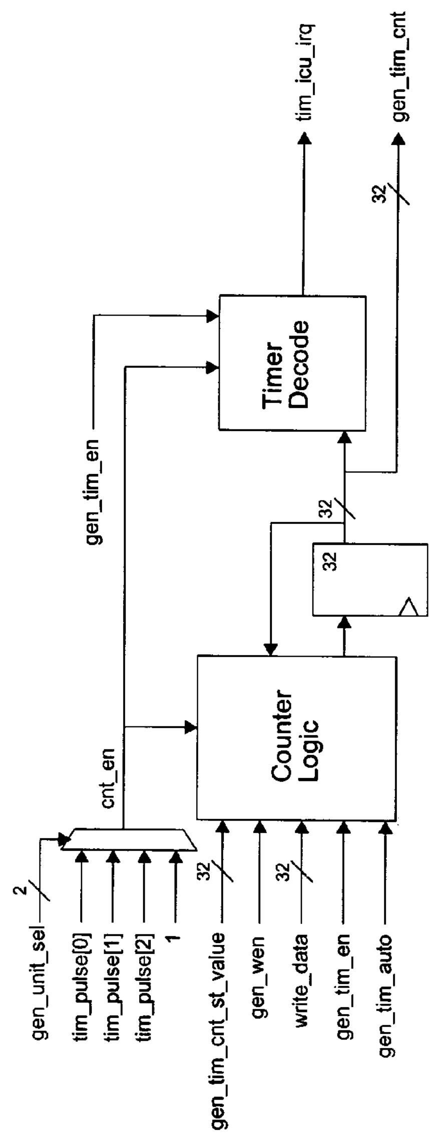
FIG. 65 is a generic timer RTL diagram
Figure 66:
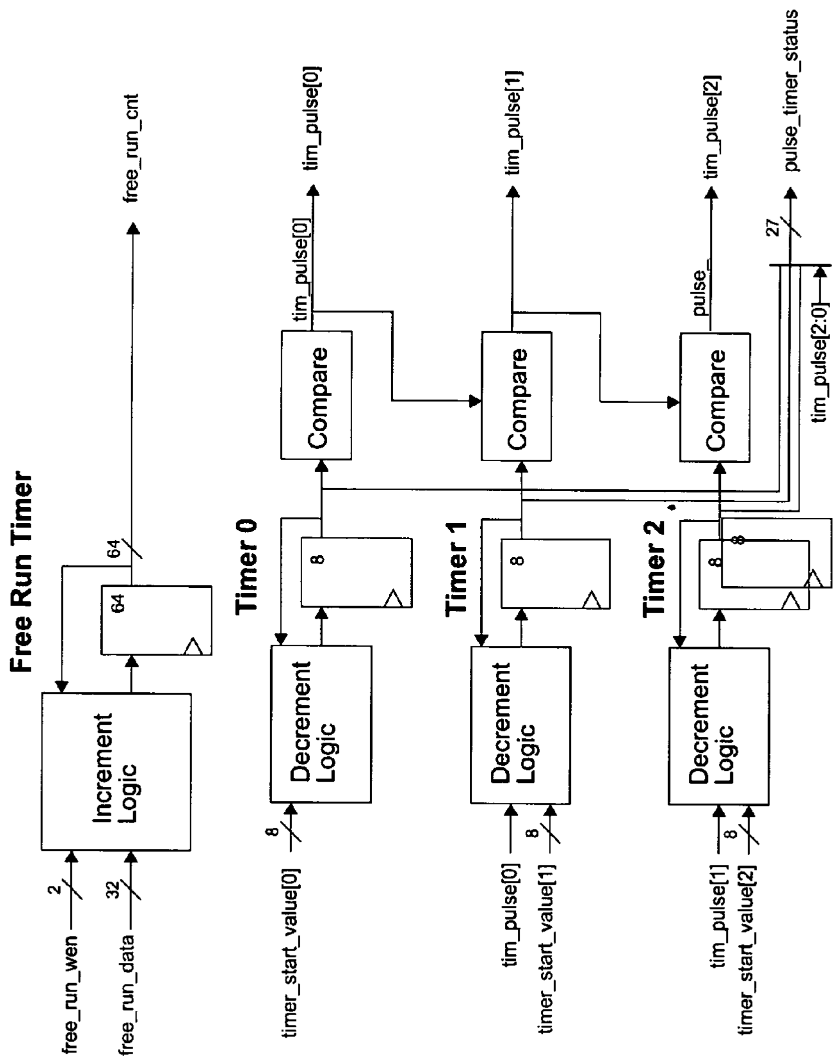
FIG. 66 is a schematic of a timing pulse generator
Figure 67:
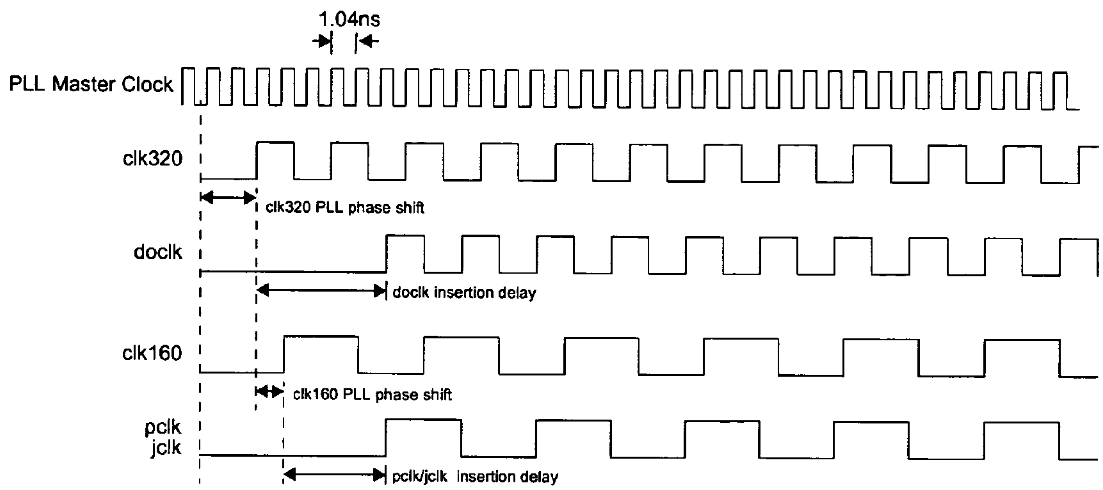
FIG. 67 is a Pulse generator RTL diagram
Figure 68:
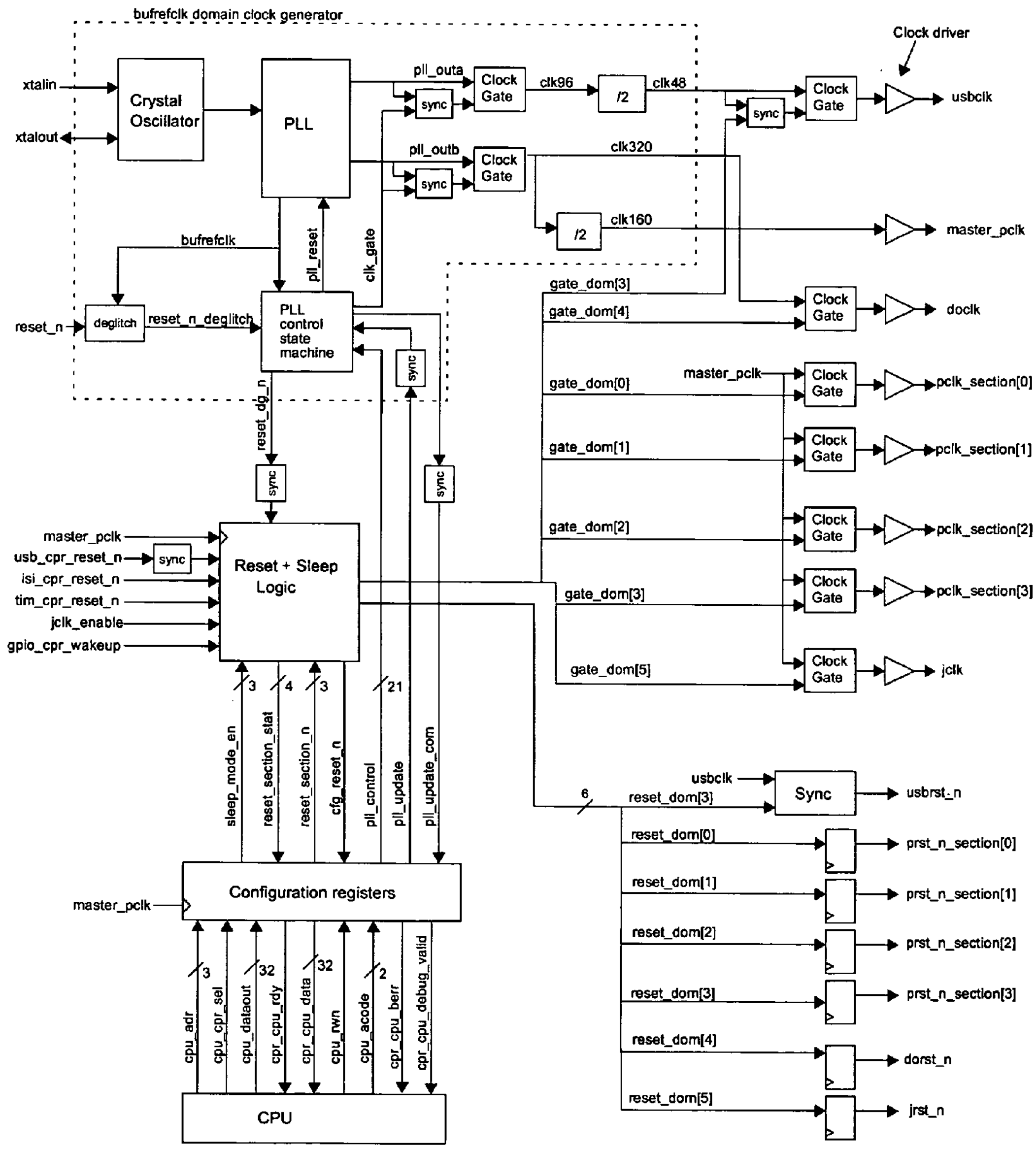
FIG. 68 shows a SoPEC clock relationship
Figure 69:
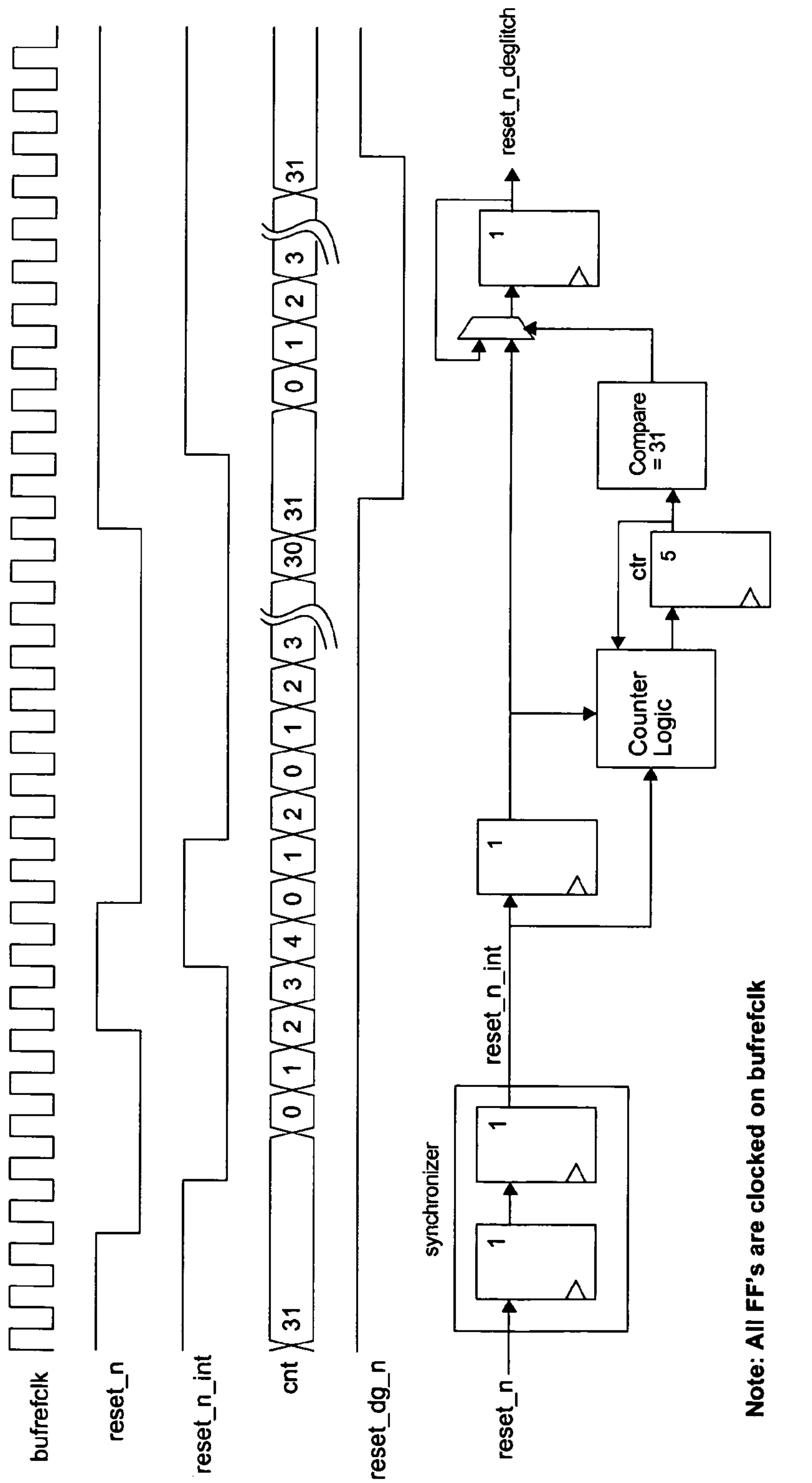
FIG. 69 shows a CPR block partition
Figure 70:
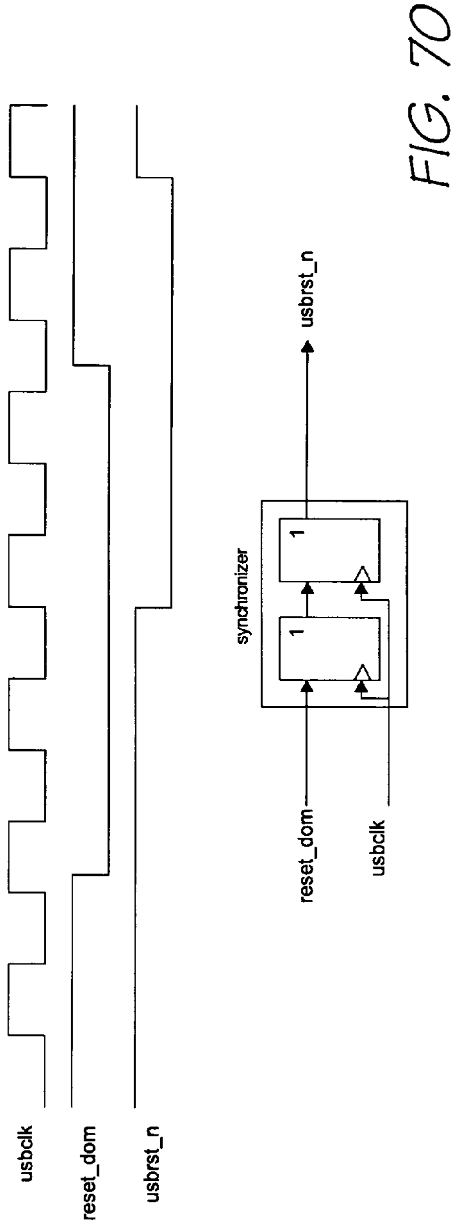
FIG. 70 shows reset deglitch logic
Figure 71:
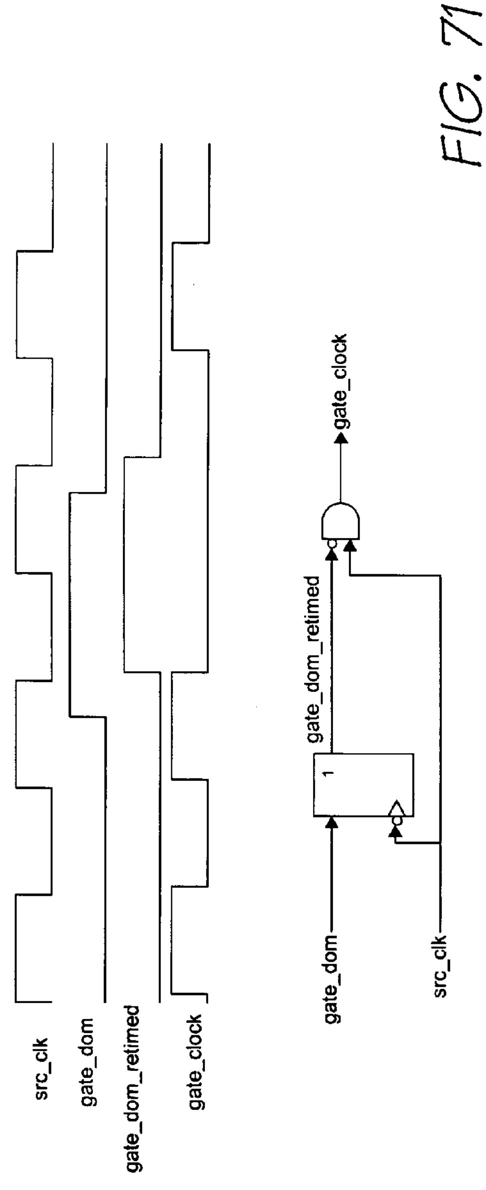
FIG. 71 shows reset synchronizer logic
Figure 72:
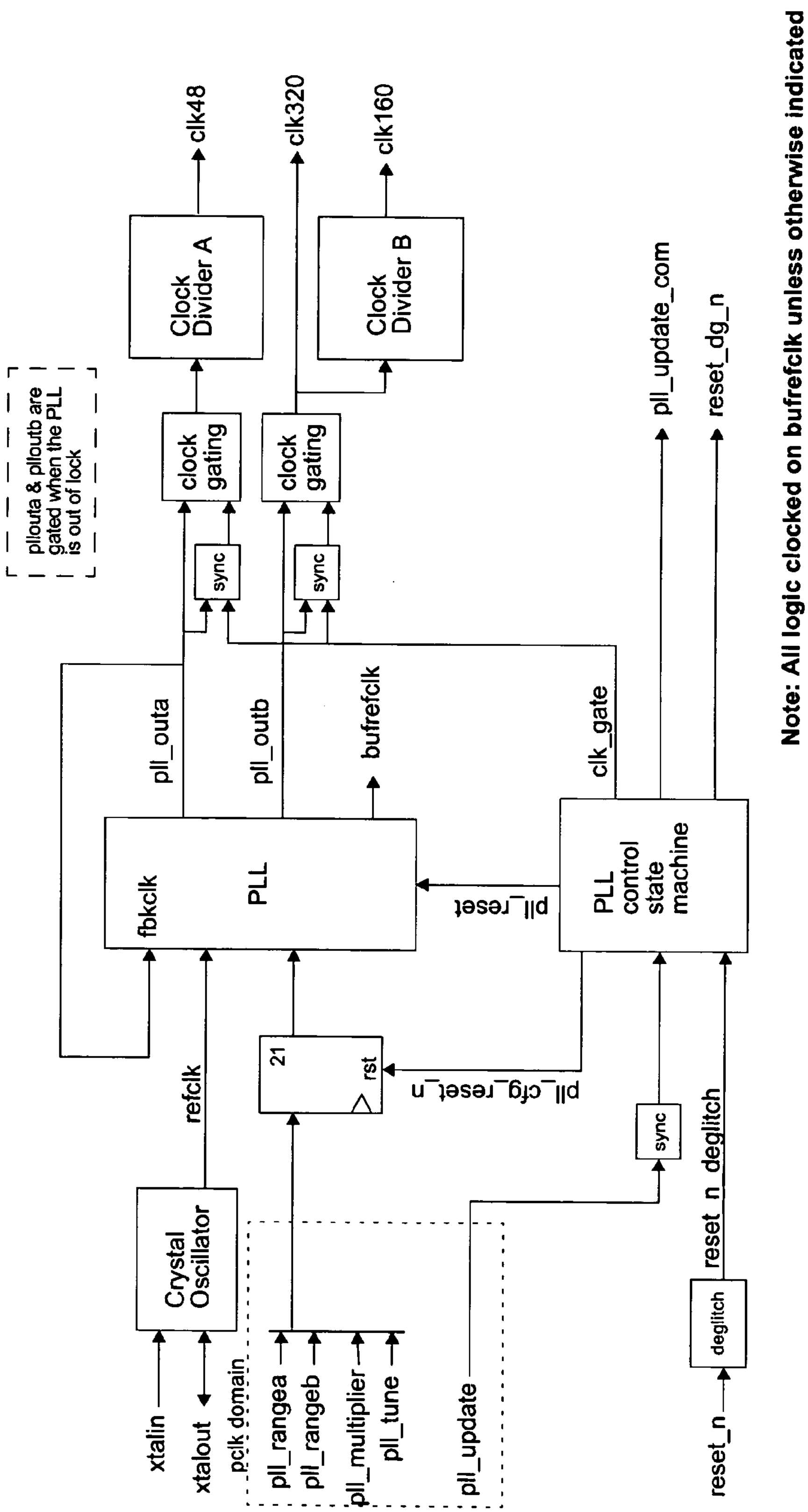
FIG. 72 is a clock gate logic diagram
Figure 73:
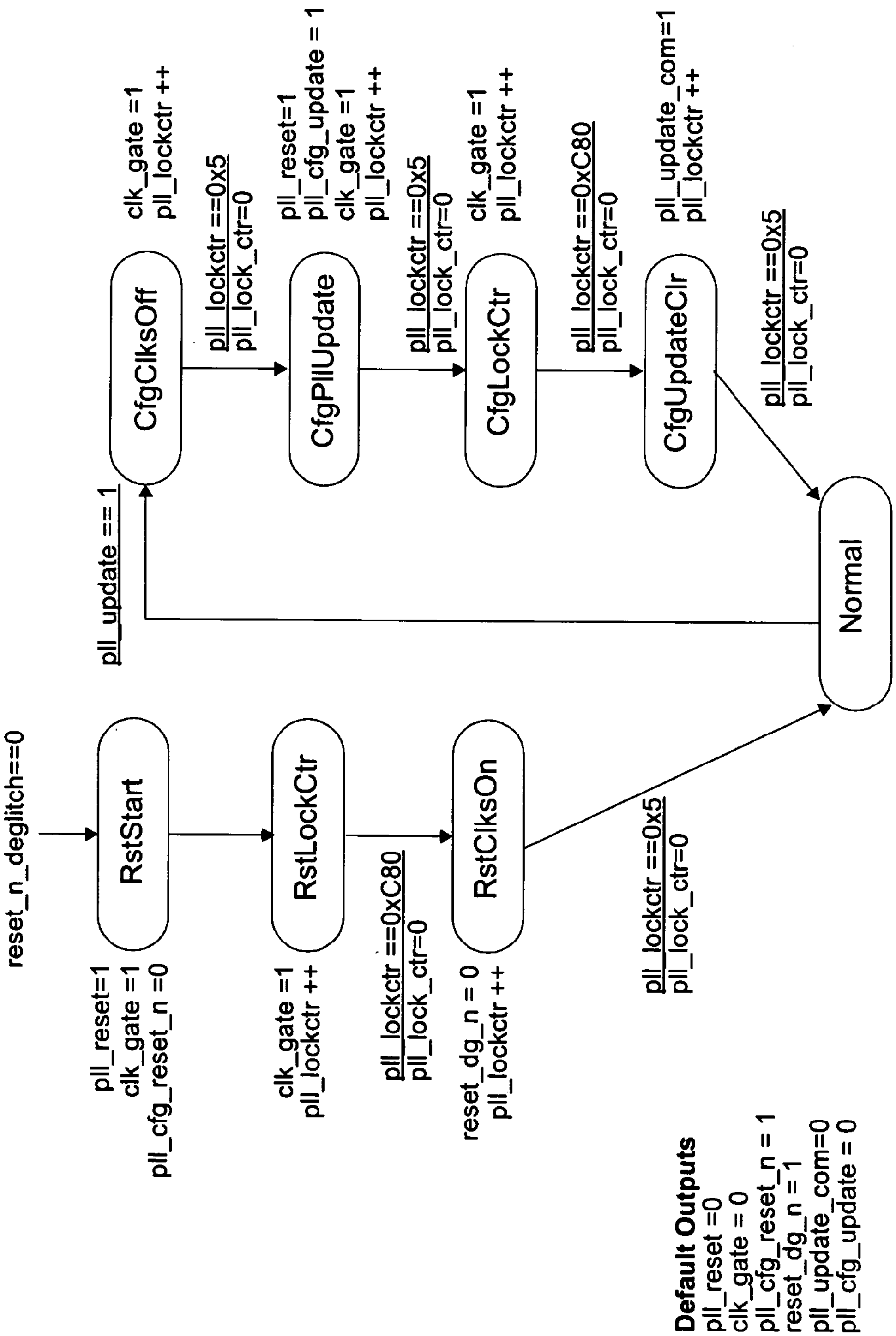
FIG. 73 shows a PLL and Clock divider logic
Figure 74:
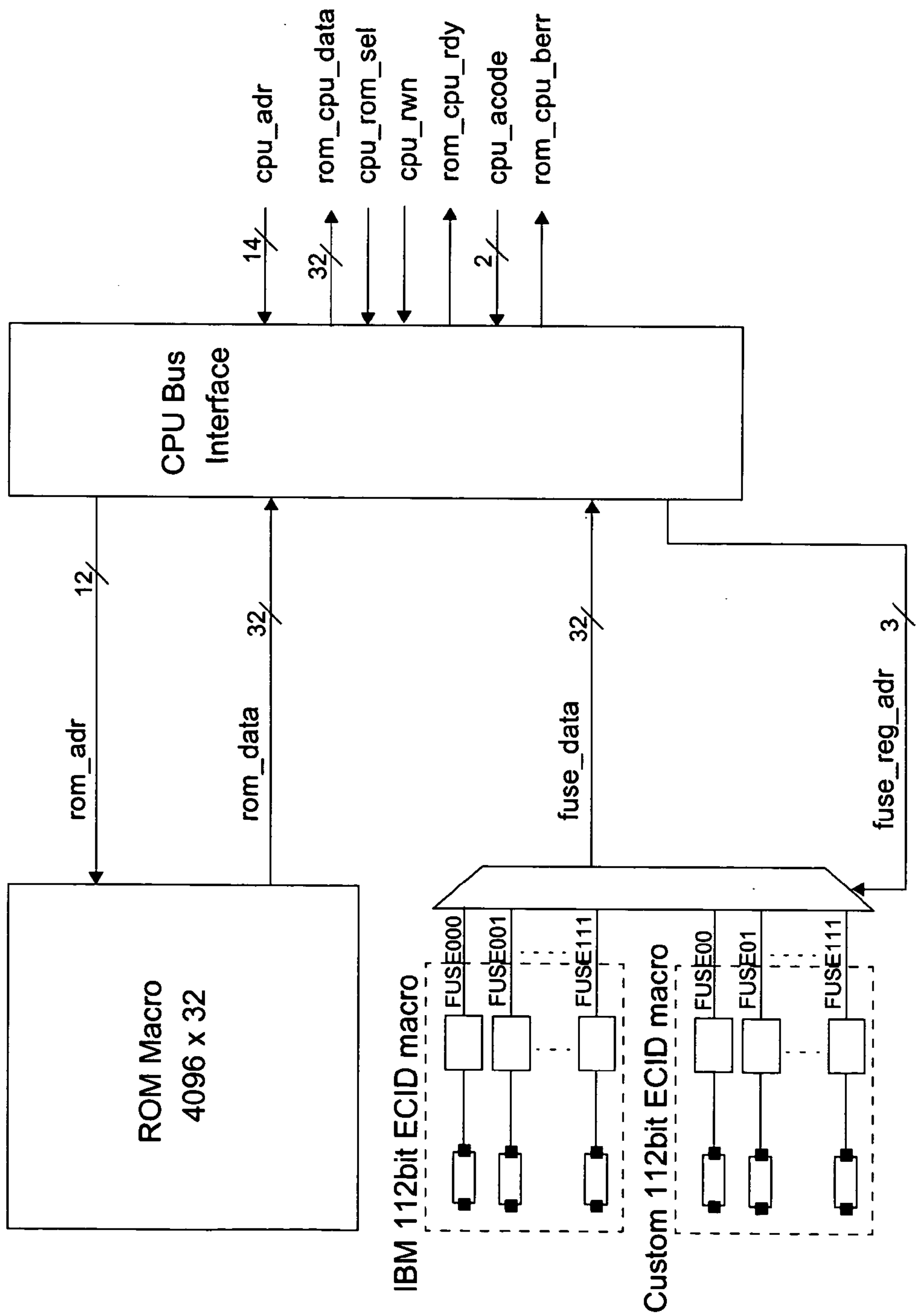
FIG. 74 shows a PLL control state machine diagram

In the scenario shown in FIG. 53 the CPU has determined (most likely as a result of a finished band interrupt) that the filled buffer space in (a) has been freed up and is therefore available to receive more data. The CPU therefore moves the DMAnMaxAdr to the end of the section that has been freed up and moves the DMAnIntAdr address to an appropriate offset from the DMAnMaxAdr address. The DMA manager continues to fill the free buffer space and when it reaches the address in DMAnTopAdr it wraps around to the address in DMAnBottomAdr and continues from there. DMA transfers will continue indefinitely in this fashion until the DMA manager reaches the address in the DMAnMaxAdr register.

The circular buffer is initialized by writing the top and bottom addresses to the DMAnTopAdr and DMAnBottomAdr registers, writing the start address (which does not have to be the same as the DMAnBottomAdr even though it usually will be) to the DMAnCurrWPtr register and appropriate addresses to the DMAnIntAdr and DMAnMaxAdr registers. The DMA operation will not commence until a 1 has been written to the relevant bit of the DMAChanEn register.

While it is possible to modify the DMAnTopAdr and DMAnBottomAdr registers after the DMA has started it should be done with caution. The DMAnCurrWPtr register should not be written to while the DMAChannel is in operation. DMA operation may be stalled at any time by clearing the appropriate bit of the DMAChanEn register or by disabling an SCB mapping or ISI receive operation.

12.5.3.2.2 Non-Standard Buffer Operation

The DMA manager was designed primarily for use with a circular buffer. However because the DMA pointers are tested for equality (i.e. interrupts generated when DMAnCurrWPtr=DMAIntAdr or DMAnCurrWPtr=DMAMaxAdr) and no bounds checking is performed on their values (i e. neither DMAnIntAdr nor DMAnMaxAdr are checked to see if they lie between DMAnBottomAdr and DMAnTopAdr) a number of non-standard buffer arrangements are possible. These include:

Dustbin buffer: If DMAnBottomAdr, DMAnTopAdr and DMAnCurrWPtr all point to the same location and both DMAnIntAdr and DMAnMaxAdr point to anywhere else then all data for that DMA channel will be dumped into the same location without ever generating an interrupt. This is the equivalent to writing to /dev/null on Unix systems.

Linear buffer: If DMAnMaxAdr and DMAnTopAdr have the same value then the DMA manager will simply fill from DMAnBottomAdr to DMAnTopAdr and then stop. DMAnIntAdr should be outside this buffer or have its interrupt disabled.

12.5.3.3 USBH DMA Access

The USBH requires DMA access to DRAM in to provide a communication channel between the USB HC and the USB HCD via a shared memory resource. The DMA manager uses two independent channels for this type of DMA access, one for reads and one for writes. The DRAM addresses provided to the DIU interface are generated based on addresses defined in the USB HC core operational registers, in USBH section 12.3.

12.5.3.4 Cache Coherency

As the CPU will be processing some of the data transferred (particularly control messages and page/band headers) into DRAM by the DMA manager, care needs to be taken to ensure that the data it uses is the most recently transferred data. Because the DMA manager will be updating the circular buffers in DRAM without the knowledge of the cache controller logic in the LEON CPU core the contents of the cache can become outdated. This situation can be easily handled by software, for example by flushing the relevant cache lines, and so there is no hardware support to enforce cache coherency.

12.5.4 ISI Transmit Buffer Arbitration

The SCB control logic will arbitrate access to the ISI transmit buffer (ISITxBuffer) interface on the ISI block. There are two sources of ISI Tx packets:

CPUISITxBuffer, contained in the SCB control block.

ISI mapped USB EP OUT buffers, contained in the USB device block.

This arbitration is controlled by the ISITxBuffArb register which contains a high priority bit for both the CPU and the USB. If only one of these bits is set then the corresponding source always has priority. Note that if the CPU is given absolute priority over the USB, then the software filling the ISI transmit buffer needs to ensure that sufficient USB traffic is allowed through. If both bits of the ISITxBufferArb have the same value then arbitration will take place on a round robin basis.

The control logic will use the USBEPnDest registers, as it will use the CPUISITxBuffCntrl register, to determine the destination of the packets in these buffers. When the ISITxBuffer has space for a packet, the SCB control logic will immediately seek to refill it. Data will be transferred directly from the CPUISITxBuffer and the ISI mapped USB EP OUT buffers to the ISITxBuffer without any intermediate buffering.

As the speed at which the ISITxBuffer can be emptied is at least 5 times greater than it can be filled by USB traffic, the ISI mapped USB EP OUT buffers should not overflow using the above scheme in normal operation. There are a number of scenarIOs which could lead to the USB EPs being temporarily blocked such as the CPU having priority, retransmissions on the ISI bus, channels being enabled (ChannelEn bit of the USBEPnDest register) with data already in their associated endpoint buffers or short packets being sent on the USB. Care should be taken to ensure that the USB bandwidth is efficiently utilised at all times.

12.5.5 Implementation 12.5.5.1 CTRL Sub-Block Partition

Block Diagram

Definition of I/Os 12.5.5.2 SCB Configuration Registers

The SCB register map is listed in Table 38. Registers are grouped according to which SCB sub-block their functionality is associated. All configuration registers reside in the CTRL sub-block. The Reset values in the table indicates the 32 bit hex value that will be returned when the CPU reads the associated address location after reset. All Registers pre-fixed with Hc refer to Host Controller Operational Registers, as defined in the OHCI Spec[19].

The SCB will only allow supervisor mode accesses to data space (i.e. cpu_acode[1:0]=b11). All other accesses will result in scb_cpu_berr being asserted.

TDB: Is read access necessary for ISI Rx/Tx buffers? Could implement the ISI interface as simple FIFOs as opposed to a memory interface.

TABLE 38

SCB control block configuration registers

| Addre ss Offset from SCB_ base | Register | #Bits | Reset | Description |
|---|---|---|---|---|
| CTRL | | | | |
| 0x000 | SCBResetN | 4 | 0x0000000F | SCB software reset. Allows individual sub-blocks to be reset separately or together. Once a reset for a block has been initiated, by writing a 0 to the relevant register field, it can not be suppressed. Each field will be set after reset. Writing 0x0 to the SBCReset register will have the same effect as CPR generated hardware reset. |
| 0x004 | SCBGo | 2 | 0x00000000 | SCB Go. Allows the ISI and CTRL sub-blocks to be selected separately or together. When go is de-asserted for a particular sub-block, its statemachines are reset to their idle states and its interface signals are de-asserted. The sub-block counters and configuration registers |

TABLE 38-continued

SCB control block configuration registers

| Addre ss Offset from SCB_ base | Register | #Bits | Reset | Description |
|---|---|---|---|---|
| | | | | retain their values. When go is asserted for a particular sub-block, its counters are reset. The sub-block configuration registers retain their values, i.e. they don't get reset. The sub-block statemachines and interface signals will return to their normal mode of operation. The CTRL field should be de-asserted before disabling the clock from any part of the SCB to avoid erroneous SCB DMA requests when the clock is enabled again. NOTE: This functionality has not been provided for the USBH and USBD sub-blocks because of the USB IP cores that they contain. We do not have direct control over the IP core statemachines and counters, and it would cause unpredictable behaviour if the cores were disabled in this way during operation. |
| 0x008 | SCBWakeupEn | 2 | 0x00000000 | USB/ISI WakeUpEnable register |
| 0x00C | SCBISITxBufferArb | 2 | 0x00000000 | ISI transmit buffer access priority register. |
| 0x010 | SCBDebugSel[11:2] | 10 | 0x00000000 | SCB Debug select register. |
| 0x014 | USBEP0Dest | 7 | 0x00000020 | This register determines which of the data sinks the data arriving in EP0 should be routed to. |
| 0x018 | USBEP1Dest | 7 | 0x00000021 | Data sink mapping for USB EP1 |
| 0x01C | USBEP2Dest | 7 | 0x0000003E | Data sink mapping for USB EP2 |
| 0x020 | USBEP3Dest | 7 | 0x0000003F | Data sink mapping for USB EP3 |
| 0x024 | USBEP4Dest | 7 | 0x00000023 | Data sink mapping for USB EP4 |
| 0x028 | DMA0BottomAdr [21:5] | 17 | | DMAChannel0 bottom address register. |
| 0x02C | DMA0TopAdr[21:5] | 17 | | DMAChannel0 top address register. |
| 0x030 | DMA0CurrWPtr[21:5] | 17 | | DMAChannel0 current write pointer. |
| 0x034 | DMA0IntAdr[21:5] | 17 | | DMAChannel0 interrupt address register. |
| 0x038 | DMA0MaxAdr [21:5] | 17 | | DMAChannel0 max address register. |
| 0x03C | DMA1BottomAdr [21:5] | 17 | | As per DMA0BottomAdr. |
| 0x040 | DMA1TopAdr[21:5] | 17 | | As per DMA0TopAdr. |
| 0x044 | DMA1CurrWPtr[21:5] | 17 | | As per DMA0CurrWPtr. |
| 0x048 | DMA1IntAdr[21:5] | 17 | | As per DMA0IntAdr. |
| 0x04C | DMA1MaxAdr[21:5] | 17 | | As per DMA0MaxAdr. |
| 0x050 | DMAAccessEn | 3 | 0x00000003 | DMA access enable. |
| 0x054 | DMAStatus | 4 | 0x00000000 | DMA status register. |
| 0x058 | DMAMask | 4 | 0x00000000 | DMA mask register. |
| 0x05C - 0x098 | CPUISITxBuff[7:0] | 32x8 | n/a | CPU ISI transmit buffer. 32-byte packet buffer, containing the payload of a CPU sourced packet destined for transmission over the ISI. The CPU has full write access to the CPUISITxBuff. NOTE: The CPU does not have read access to CPUISITxBuif. This is because the CPU is the source of the data and to avoid arbitrating read access between the CPU and the CTRL sub-block. Any CPU reads from this address space will return 0x00000000 |
| 0x09C | CPUISITxBuffCtrl | 9 | 0x00000000 | CPU ISI transmit buffer control register. |
| USBD | | | | |
| 0x100 | USBDIntStatus | 19 | 0x00000000 | USBD Interrupt event status register. |
| 0x104 | USBDISIFIFOStatus | 16 | 0x00000000 | USBD ISI mapped OUT EP packet FIFO status register. |
| 0x108 | USBDDMA0FIFO Status | 8 | 0x00000000 | USBD DMAChannel0 mapped OUT EP packet FIFO status register. |
| 0x10C | USBDDMA1FIFO Status | 8 | 0x00000000 | USBD DMAChannel1 mapped OUT EP packet FIFO status register. |

TABLE 38-continued

SCB control block configuration registers

| Addre ss Offset from SCB_ base | Register | #Bits | Reset | Description |
|---|---|---|---|---|
| 0x110 | USBDResume | 1 | 0x00000000 | USBD core resume register. |
| 0x114 | USBDSetup | 4 | 0x00000000 | USBD setup/configuration register. |
| 0x118 - 0x154 | USBDEp0InBuff[15:0] | 32x16 | n/a | USBD EP0-IN buffer.<br>64-byte packet buffer in the, containing the payload of a USB packet destined for EP0-IN.<br>The CPU has full write access to the USBDEp0InBuff<br>NOTE: The CPU does not have read access to USBDEp0InBuff. This is because the CPU is the source of the data and to avoid arbitrating read access between the CPU and the USB device core. Any CPU reads from this address space will return 0x00000000. |
| 0x158 | USBDEp0InBuffCtrl | 1 | 0x00000000 | USBD EP0-IN buffer control register. |
| 0x15C - 0x198 | USBDEp5InBuff[15:0] | 32x16 | n/a | USBD EP5-IN buffer.<br>As per USBDEp0InBuff. |
| 0x19C | USBDEp5InBuffCtrl | 1 | 0x00000000 | USBD EP5-IN buffer control register. |
| 0x1A0 | USBDMask | 19 | 0x00000000 | USBD interrupt mask register. |
| 0x1A4 | USBDDebug | 30 | 0x00000000 | USBD debug register. |
| USBH | | | | |
| 0x200 | HcRevision | | | Refer to [19] for #Bits, Reset, Description. |
| 0x204 | HcControl | | | Refer to [19] for #Bits, Reset, Description. |
| 0x208 | HcCommandStatus | | | Refer to [19] for #Bits, Reset, Description. |
| 0x20C | HcInterruptStatus | | | Refer to [19] for #Bits, Reset, Description. |
| 0x210 | HcInterruptEnable | | | Refer to [19] for #Bits, Reset, Description. |
| 0x214 | HcInterruptDisable | | | Refer to [19] for #Bits, Reset, Description. |
| 0x218 | HcHCCA | | | Refer to [19] for #Bits, Reset, Description. |
| 0x21C | HcPeriodCurrentED | | | Refer to [19] for #Bits, Reset, Description. |
| 0x220 | HcControlHeadED | | | Refer to [19] for #Bits, Reset, Description. |
| 0x224 | HcControlCurrentED | | | Refer to [19] for #Bits, Reset, Description. |
| 0x228 | HcBulkHeadED | | | Refer to [19] for #Bits, Reset, Description. |
| 0x22C | HcBulkCurrentED | | | Refer to [19] for #Bits, Reset, Description. |
| 0x230 | HcDoneHead | | | Refer to [19] for #Bits, Reset, Description. |
| 0x234 | HcFmInterval | | | Refer to [19] for #Bits, Reset, Description. |
| 0x238 | HcFmRemaining | | | Refer to [19] for #Bits, Reset, Description. |
| 0x23C | HcFmNumber | | | Refer to [19] for #Bits, Reset, Description. |
| 0x240 | HcPeriodicStart | | | Refer to [19] for #Bits, Reset, Description. |
| 0x244 | HcLSTheshold | | | Refer to [19] for #Bits, Reset, Description. |
| 0x248 | HcRhDescriptorA | | | Refer to [19] for #Bits, Reset, Description. |
| 0x24C | HcRhDescrtptorB | | | Refer to [19] for #Bits, Reset, Description. |
| 0x250 | HcRhStatus | | | Refer to [19] for #Bits, Reset, Description. |
| 0x254 | HcRhPortStatus[1] | | | Refer to [19] for #Bits, Reset, Description. |
| 0x258 | USBHStatus | 3 | 0x00000000 | USBH status register. |
| 0x25C | USBHMask | 2 | 0x00000000 | USBH interrupt mask register. |
| 0x260 | USBHDebug | 2 | 0x00000000 | USBH debug register. |
| ISI | | | | |
| 0x300 | ISICntrl | 4 | 0x0000000B | ISI Control register |
| 0x304 | ISIId | 4 | 0x00000000 | ISIId for this SoPEC. |

TABLE 38-continued

SCB control block configuration registers

| Addre ss Offset from SCB__ base | Register | #Bits | Reset | Description |
|---|---|---|---|---|
| 0x308 | ISINumRetries | 4 | 0x00000002 | Number of ISI retransmissions register. |
| 0x30C | ISIPingSchedule0 | 15 | 0x00000000 | ISI Ping schedule 0 register. |
| 0x310 | ISIPingSchedule1 | 15 | 0x00000000 | ISI Ping schedule 1 register. |
| 0x314 | ISIPingSchedule2 | 15 | 0x00000000 | ISI Ping schedule 2 register. |
| 0x318 | ISITotalPeriod | 4 | 0x0000000F | Reload value of the ISITotalPeriod counter. |
| 0x31C | ISILocalPeriod | 4 | 0x0000000F | Reload value of the ISILocalPeriod counter. |
| 0x320 | ISIIntStatus | 4 | 0x00000000 | ISI interrupt status register. |
| 0x324 | ISITxBuffStatus | 27 | 0x00000000 | ISI Tx buffer status register. |
| 0x328 | ISIRxBuffStatus | 27 | 0x00000000 | ISI Rx buffer status register. |
| 0x32C | ISIMask | 4 | 0x00000000 | ISI Interrupt mask register. |
| 0x330 - 0x34C | ISITxBuffEntry0[7:0] | 32x8 | n/a | ISI transmit Buff, packet entry #0. 32-byte packet entry in the ISITxBuff, containing the payload of an ISI Tx packet. CPU read access to ISITxBuffEntry0 is provided for observability only i.e. CPU reads of the ISITxBuffEntry0 do not alter the state of the buffer. The CPU does not have write access to the ISITxBuffEntry0. |
| 0x350 - 0x36C | ISITxBuffEntry1[7:0] | 32x8 | n/a | ISI transmit Buff, packet entry #1. As per ISITxBuffEntry0. |
| 0x370 - 0x38C | ISIRxBuffEntry0[7:0] | 32x8 | n/a | ISI receive Buff, packet entry #0. 32-byte packet entry in the ISIRxBuff, containing the payload of an ISI Rx packet. Note that the only error-free long packets are placed in the ISIRxBuffEntry0. Both ping and ACKs are consumed in the ISI. CPU access to ISIRxBuffEntry0 is provided for observability only i.e. CPU reads of the ISIRxBuffEntry0 do not alter the state of the buffer. |
| 0x390 - 0x3AC | ISIRxBuffEntry1[7:0] | 32x8 | n/a | ISI receive Buff, packet entry #1. As per ISIRxBuffEntry0. |
| 0x3B0 | ISISubId0Seq | 1 | 0x00000000 | ISI sub ID 0 sequence bit register. |
| 0x3B4 | ISISubId1Seq | 1 | 0x00000000 | ISI sub ID 1 sequence bit register. |
| 0x3B8 | ISISubIdSeqMask | 2 | 0x00000000 | ISI sub ID sequence bit mask register. |
| 0x3BC | ISINumPins | 1 | 0x00000000 | ISI number of pins register. |
| 0x3C0 | ISITurnAround | 4 | 0x0000000F | ISI bus turn around register. |
| 0x3C4 | ISITShortReplyWin | 5 | 0x0000001F | ISI short packet reply window. |
| 0x3C8 | ISITLongReplyWin | 9 | 0x000001FF | ISI long packet reply window. |
| 0x3CC | ISIDebug | 4 | 0x00000000 | ISI debug register. |

A detailed description of each register format follows. The CPU has full read access to all registers. Write access to the fields of each register is defined as:

Full: The CPU has full write access to the field, i.e. the CPU can write a 1 or a 0 to each bit.

Clear: The CPU can clear the field by writing a 1 to each bit. Writing a 0 to this type of field will have no effect.

None: The CPU has no write access to the field, i.e. a CPU write will have no effect on the field.

12.5.5.2.1 SCBResetN

TABLE 39

SCBResetN register format

| Field Name | Bit(s) | write access | Description |
|---|---|---|---|
| CTRL | 0 | Full | scb__ctrl sub-block reset. Setting this field will reset the SCB control sub-block logic, including all configuration registers. 0 = reset 1 = default state |

TABLE 39-continued

SCBResetN register format

| Field Name | Bit(s) | write access | Description |
|---|---|---|---|
| ISI | 1 | Full | scb__isi sub-block reset. Setting this field will reset the ISI sub-block logic. 0 = reset 1 = default state |
| USBH | 2 | Full | scb__usbh sub-block reset. Setting this field will reset the USB host controller core and associated logic. 0 = reset 1 = default state |
| USBD | 3 | Full | scb__usbd sub-block reset. Setting this field will reset the USB device controller core and associated logic. 0 = reset 1 = default state |

12.5.5.2.2 SCBGo

TABLE 40

SCBGo register format

| Field Name | Bit(s) | write access | Description |
|---|---|---|---|
| CTRL | 0 | Full | scb__ctrl sub-block go.<br>0 = halted<br>1 = running |
| ISI | 1 | Full | scb__isi sub-block go.<br>0 = halted<br>1 = running |

12.5.5.2.3 SCBWakeUpEn

This register is used to gate the propagation of the USB and ISI reset signals to the CPR block.

TABLE 41

SCBWakeUpEn register format

| Field Name | Bit(s) | write access | Description |
|---|---|---|---|
| USBWakeUpEn | 0 | Full | usb__cpr__reset__n propagation enable.<br>1 = enable<br>0 = disable |
| ISIWakeUpEn | 1 | Full | isi__cpr__reset__n propagation enable.<br>1 = enable<br>0 = disable |

12.5.5.2.4 SCBISITxBufferArb

This register determines which source has priority at the ISITxBuffer interface on the ISI block. When a bit is set priority is given to the relevant source. When both bits have the same value, arbitration will be performed in a round-robin manner.

TABLE 42

SCBISITxBufferArb register format

| Field Name | Bit(s) | write access | Description |
|---|---|---|---|
| CPUPriority | 0 | Full | CPU priority<br>1 = high priority<br>0 = low priority |
| USBPriority | 1 | Full | USB priority<br>1 = high priority<br>0 = low priority |

12.5.5.2.5 SCBDebugSel

Contains address of the register selected for debug observation as it would appear on cpu_adr. The contents of the selected register are output in the scb_cpu_data bus while cpu_scb_sel is low and scb_cpu_debug_valid is asserted to indicate the debug data is valid. It is expected that a number of pseudo-registers will be made available for debug observation and these will be outlined with the implementation details.

TABLE 43

SCBDebugSel register format

| Field Name | Bit(s) | write access | Description |
|---|---|---|---|
| CPUAdr | 11:2 | Full | cpu__adr register address. |

12.5.5.2.6 USBEPnDest

This register description applies to USBEP0Dest, USBEP1Dest, USBEP2Dest, USBEP3Dest, USBEP4Dest. The SCB has two routing options for each packet received, based on the DestISIId associated with the packets source EP:

To the DMA Manager

To the ISI

The SCB map therefore does not need special fields to identify the DMAChannels on the ISIMaster SoPEC as this is taken care of by the SCB hardware. Thus the USBEP0Dest and USBEP1Dest registers should be programmed with 0x20 and 0x21 (for ISI0.0 and ISI0.1) respectively to ensure data arriving on these endpoints is moved directly to DRAM.

TABLE 44

USBEPnDest register format

| Field Name | Bit(s) | Write access | Description |
|---|---|---|---|
| SequenceBit | 0 | Full | Sequence bit for packets going from USBEPn to DestISIId.DestISISubId. Every CPU write to this register initialises the value of the sequence bit and this is subsequently updated by the ISI after every successful long packet transmission. |
| DestISIId | 4:1 | Full | Destination ISI ID. Denotes the ISIId of the target SoPEC as per Table |
| DestISISubId | 5 | Full | Destination ISI sub ID. Indicates which DMAChannel of the target SoPEC the endpoint is mapped onto:<br>0 = DMAChannel0<br>1 = DMAChannel1 |
| ChannelEn | 6 | Full | Communication channel enable bit for EPn. This enables/disables the communication channel for EPn. When disabled, the SCB will not accept USB packets adressed to EPn.<br>0 = Channel disabled<br>1 = Channel enabled |

If the local SoPEC is connected to an external USB host, it is recommended that the EP0 communication channel should always remain enabled and mapped to DMAChannel0 on the local SoPEC, as this is intended as the primary control communication channel between the external USB host and the local SoPEC.

A SoPEC ISIMaster should map as many USB endpoints, under the control of the external host, as are required for the multi-SoPEC system it is part of. As already mentioned this mapping may be dynamically reconfigured.

12.5.5.2.7 DMAnBottomAdr

This register description applies to DMA0BottomAdr and DMA1BottomAdr.

TABLE 45

DMAnBottomAdr register format

| Field Name | Bit(s) | Write access | Description |
|---|---|---|---|
| DMAnBottomAdr | 21:5 | Full | The 256-bit aligned DRAM address of the bottom of the circular buffer (inclusive) serviced by DMAChanneln |

12.5.5.2.8 DMAnTopAdr

This register description applies to DMA0TopAdr and DMA1TopAdr.

TABLE 46

DMAnTopAdr register format

| Field Name | Bit(s) | Write access | Description |
|---|---|---|---|
| DMAnTopAdr | 21:5 | Full | The 256-bit aligned DRAM address of the top of the circular buffer (inclusive) serviced by DMAChanneln |

12.5.5.2.9 DMAnCurrWPtr

This register description applies to DMA0CurrWPtr and DMA1CurrWPtr.

TABLE 47

DMAnCurrWptr register format

| Field Name | Bit(s) | Write access | Description |
|---|---|---|---|
| DMAnCurrWPtr | 21:5 | Full | The 256-bit aligned DRAM address of the next location DMAChannel0 will write to. This register is set by the CPU at the start of a DMA operation and dynamically updated by the DMA manager during the operation. |

12.5.5.2.10 DMAIntAdr

This register description applies to DMA0IntAdr and DMA1IntAdr.

TABLE 48

DMAnIntAdr register format

| | Bit(s) | Write access | Description |
|---|---|---|---|
| DMAnIntAdr | 21:5 | Full | The 256-bit aligned DRAM address of the location that will trigger an interrupt when reached by DMAChanneln buffer. |

12.5.5.2.11 DMAnMaxAdr

This register description applies to DMA0MaxAdr and DMA1MaxAdr.

TABLE 49

DMAnMaxAdr register format

| Field Name | Bit(s) | Write access | Description |
|---|---|---|---|
| DMAnMaxAdr | 21:5 | Full | The 256-bit aligned DRAM address of the last free location that in the DMAChanneln circular buffer. DMAChannel0 transfers will stop when it reaches this address. |

12.5.5.2.12 DMAAccessEn

This register enables DMA access for the various requesters, on a per channel basis.

TABLE 50

DMAAccessEn register format

| Field Name | Bit(s) | Write access | Description |
|---|---|---|---|
| DMAChannel0En | 0 | Full | DMA Channel #0 access enable. This uni-directional write channel is used by the USBD and the ISI.<br>1 = enable<br>0 = disable |
| DMAChannel1En | 1 | Full | As per USBDISI0En. |
| DMAChannel2En | 2 | Full | DMA Channel #2 access enable. This bi-directional read/write channel is used by the USBH.<br>1 = enable<br>0 = disable |

12.5.5.2.13 DMAStatus

The status bits are not sticky bits i.e. they reflect the 'live' status of the channel. DMAChannelNntAdrHit and DMAChannelNMaxAdrHit status bits may only be cleared by writing to the relevant DMAnintAdr or DMAnMaxAdr register.

TABLE 51

DMAStatus register format

| Field Name | Bit(s) | Write access | Description |
|---|---|---|---|
| DMAChannel0IntAdrHit | 0 | None | DMA channel #0 interrupt address hit.<br>1 = DMAChannel0 has reached the address contained in the DMA0IntAdr register.<br>0 = default state |
| DMAChannel0MaxAdrHit | 1 | None | DMA channel #0 max address hit.<br>1 = DMAChannel0 has reached the address contained in the DMA0MaxAdr register.<br>0 = default state |
| DMAChannel1IntAdrHit | 3 | None | As per DMAChannel0IntAdrHit. |
| DMAChannel1MaxAdrHit | 4 | None | As per DMAChannel0MaxAdrHit. |

12.5.5.2.14 DMAMask Register

All bits of the DMAMask are both readable and writable by the CPU. The DMA manager cannot alter the value of this register. All interrupts are generated in an edge sensitive manner i.e. the DMA manager will generate a dma_icu_irq pulse each time a status bit goes high and its corresponding mask bit is enabled.

TABLE 52

DMAMask register format

| Field Name | Bit(s) | Write access | Description |
|---|---|---|---|
| DMAChannel0IntAdrHitIntEn | 0 | Full | DMAChannel0IntAdrHit status interrupt enable.<br>1 = enable<br>0 = disable |
| DMAChannel0MaxAdrHitIntEn | 1 | Full | DMAChannel0MaxAdrHit status interrupt enable.<br>1 = enable<br>0 = disable |
| DMAChannel1IntAdrHitIntEn | 2 | Full | As per DMAChannel0IntAdrHitIntEn |
| DMAChannel1MaxAdrHitIntEn | 3 | Full | As per DMAChannel0MaxAdrHitIntEn |

12.5.5.2.15 CPUISITxBuffCtrl Register

TABLE 53

CPUISITxBuffCtrl register format

| Field Name | Bit(s) | Write access | Description |
|---|---|---|---|
| PktValid | 0 | full | This field should be set by the CPU to indicate the validity of the CPUISITxBuff contents. This field will be cleared by the SCB once the contents of the CPUISITxBuff has been copied to the ISITxBuff.<br>NOTE: The CPU should not clear this field under normal operation. If the CPU clears this field during a packet transfer to the ISITxBuff, the transfer will be aborted - this is not recommended.<br>1 = valid packet.<br>0 = default state. |
| PktDesc | 3:1 | full | PktDesc field, as per Table, of the packet contained in the CPUISITxBuff. The CPU is responsible for maintaining the correct sequence bit value for each ISIId.ISISubId channel it communicates with. Only valid when CPU-ISITxBuffCtrl.PktValid = 1. |
| DestISIId | 7:4 | full | Denotes the ISIId of the target SoPEC as per Table. |
| DestISISubId | 8 | full | Indicates which DMAChannel of the target SoPEC the packet in the CPUISITxBuff is destined for.<br>1 = DMAChannel1<br>0 = DMAChannel0 |

12.5.5.2.16 USBDIntStatus

The USBDIntStatus register contains status bits that are related to conditions that can cause an interrupt to the CPU, if the corresponding interrupt enable bits are set in the USBDMask register. The field name extension Sticky implies that the status condition will remain registered until cleared by a CPU write of 1 to each bit of the field.

NOTE: There is no Ep0IrregPktSticky field because the default control EP will frequently receive packets that are not multiples of 32 bytes during normal operation.

TABLE 54

USBDIntStatus register format

| Field Name | Bit(s) | Write access | Description |
|---|---|---|---|
| CoreSuspendSticky | 0 | Clear | Device core USB suspend flag. Sticky.<br>1 = USB suspend state. Set when device core udcvci_suspend signal transitions from 1 -> 0.<br>0 = default value. |
| CoreUSBResetSticky | 1 | Clear | Device core USB reset flag. Sticky.<br>1 = USB reset. Set when device core udcvci_reset signal transitions from 1 -> 0.<br>0 = default value. |
| CoreUSBSOFSticky | 2 | Clear | Device core USB Start Of Frame (SOF) flag. Sticky.<br>1 = USB SOF. Set when device core udcvci_sof signal transitions from 1 -> 0<br>0 = default value. |
| CPUISITxBuffEmptySticky | 3 | Clear | CPU ISI transmit buffer empty flag. Sticky.<br>1 = empty.<br>0 = default value. |
| CPUEp0InBuffEmptySticky | 4 | Clear | CPU EP0 IN buffer empty flag. Sticky. |

TABLE 54-continued

USBDIntStatus register format

| Field Name | Bit(s) | Write access | Description |
|---|---|---|---|
| | | | 1 = empty.<br>0 = default value. |
| CPUEp5InBuffEmptySticky | 5 | Clear | CPU EP5 IN buffer empty flag. Sticky.<br>1 = empty.<br>0 = default value. |
| Ep0InNAKSticky | 6 | clear | EP0-IN NAK flag. Sticky<br>This flag is set if the USB device core issues a read request for EP0-IN and there is not a valid packet present in the EP0-IN buffer. The core will therefore send a NAK response to the IN token that was received from external USB host. This is an indicator of any back-pressure on the USB caused by EP0-IN.<br>1 = NAK sent.<br>0 = default value |
| Ep5InNAKSticky | 7 | Clear | As per Ep0InNAK. |
| Ep0OutNAKSticky | 8 | Clear | EP0-OUT NAK flag. Sticky<br>This flag is set if the USB device core issues a write request for EP0-OUT and there is no space in the OUT EP buffer for a the packet. The core will therefore send a NAK response to the OUT token that was received from external USB host. This is an indicator of any back-pressure on the USB caused by EP0-OUT.<br>1 = NAK sent.<br>0 = default value |
| Ep1OutNAKSticky | 9 | Clear | As per EP0OutNAK. |
| Ep2OutNAKSticky | 10 | Clear | As per EP0OutNAK. |
| Ep3OutNAKSticky | 11 | Clear | As per EP0OutNAK. |
| Ep4OutNAKSticky | 12 | Clear | As per EP0OutNAK. |
| Ep1IrregPktSticky | 13 | Clear | EP1-OUT irregular sized packet flag. Sticky.<br>Indicates a packet that is not a multiple of 32 bytes in size was received by EP1-OUT.<br>1 = irregular sized packet received.<br>0 = default value. |
| Ep2IrregPktSticky | 14 | Clear | As per Ep1IrregPktSticky. |
| Ep3IrregPktSticky | 15 | Clear | As per Ep1IrregPktSticky. |
| Ep4IrregPktSticky | 16 | Clear | As per Ep1IrregPktSticky. |
| OutBuffOverFlowSticky | 17 | Clear | OUT EP buffer overflow flag. Sticky.<br>This flag is set if the USB device core attempted to write a packet of more than 64 bytes to the OUT EP buffer. This is a fatal error, suggesting a problem in the USB device IP core. The SCB will take no further action.<br>1 = overflow condition detected.<br>0 = default value. |
| InBuffUnderRunSticky | 18 | clear | IN EP buffer underrun flag. Sticky.<br>This flag is set if the USB device core attempted to read more data than was present from the IN EP buffer. This is a fatal error, suggesting a problem in the USB device IP core. The SCB will take no further action.<br>1 = underrun condition detected.<br>0 = default value. |

12.5.5.2.17 USBDISIFIFOStatus

This register contains the status of the ISI mapped OUT EP packet FIFO. This is a secondary status register and will not cause any interrupts to the CPU.

TABLE 55

USBDISIFIFOStatus register format

| Field Name | Bit(s) | Write access | Description |
|---|---|---|---|
| Entry0Valid | 0 | none | FIFO entry #0 valid field.<br>This flag will be set by the USBD when the USB device core indicates the validity of packet entry #0 in the FIFO.<br>1 = valid USB packet in ISI OUT EP buffer 0.<br>0 = default value. |
| Entry0Source | 3:1 | none | FIFO entry #0 source field. |

TABLE 55-continued

USBDISIFIFOStatus register format

| Field Name | Bit(s) | Write access | Description |
|---|---|---|---|
| | | | Contains the EP associated with packet entry #0 in the FIFO. Binary Coded Decimal. Only valid when ISIBuff0PktValid = 1. |
| Entry1Valid | 4 | none | As per Entry0Valid. |
| Entry1Source | 7:5 | none | As per Entry0Source. |
| Entry2Valid | 8 | none | As per Entry0Valid. |
| Entry2Source | 11:9 | none | As per Entry0Source. |
| Entry3Valid | 12 | none | As per Entry0Valid. |
| Entry3Source | 15:13 | none | As per Entry0Source. |

12.5.5.2.18 USBDDMAOFIFOStatus

This register description applies to USBDDMAOFIFOStatus and USBDDMA1FIFOStatus.

This register contains the status of the DMAChannelN mapped OUT EP packet FIFO. This is a secondary status register and will not cause any interrupts to the CPU.

TABLE 56

USBDDMANFIFOStatus register format

| Field Name | Bit(s) | Write access | Description |
|---|---|---|---|
| Entry0Valid | 0 | none | FIFO entry #0 valid field. This flag will be set by the USBD when the USB device core indicates the validity of packet entry #0 in the FIFO. 1 = valid USB packet in ISI OUT EP buffer 0. 0 = default value. |
| Entry0Source | 3:1 | none | FIFO entry #0 source field. Contains the EP associated with packet entry #0 in the FIFO. Binary Coded Decimal. Only valid when Entry0Valid = 1. |
| Entry1Valid | 4 | none | As per Entry0Valid. |
| Entry1Source | 7:5 | none | As per Entry0Source. |

12.5.5.2.19 USBDResume

This register causes the USB device core to initiate resume signalling to the external USB host. Only applicable when the device core is in the suspend state.

TABLE 57

USBDResume register format

| Field Name | Bit(s) | Write access | Description |
|---|---|---|---|
| USBDResume | 0 | full | USBD core resume register. The USBD will clear this register upon resume notification from the device core. 1 = generate resume signalling. 0 = default value. |

12.5.5.2.20 USBDSetup

This register controls the general setup/configuration of the USBD.

TABLE 58

USBDSetup register format

| Field Name | Bit(s) | write access | Description |
|---|---|---|---|
| Ep1IrregPktCntrl | 0 | full | EP 1 OUT irregular sized packet control. An irregular sized packet is defined as a packet that is not a multiple of 32 bytes. 1 = discard irregular sized packets. 0 = read 32 bytes from buffer, regardless of packet size. |
| Ep2IrregPktCntrl | 1 | full | As per Ep1IrregPktDiscard |
| Ep3IrregPktCntrl | 2 | full | As per Ep1IrregPktDiscard |
| Ep4IrregPktCntrl | 3 | full | As per Ep1IrregPktDiscard |

12.5.5.2.21 USBDEpNInBuffCtrl Register

This register description applies to USBDEp0InBuffCtrl and USBDEp5InBuffCtrl.

TABLE 59

USBDEpNInBuffCtrl register format

| Field Name | Bit(s) | Write access | Description |
|---|---|---|---|
| PktValid | 0 | full | Setting this register validates the contents of USBDEpNInBuff. This field will be cleared by the SCB once the packet has been successfully transmitted to the external USB host. NOTE: The CPU should not clear this field under normal operation. If the CPU clears this field during a packet transfer to the USB, the transfer will be aborted - this is not recommended. 1 = valid packet. 0 = default state. |

12.5.5.2.22 USBDMask

This register serves as an interrupt mask for all USBD status conditions that can cause a CPU interrupt. Setting a field enables interrupt generation for the associated status event. Clearing a field disables interrupt generation for the associated status event. All interrupts will be generated in an edge sensitive manner, i.e. when the associated status register transitions from 0->1.

TABLE 60

USBDMask register format

| Field Name | Bit(s) | Write access | Description |
|---|---|---|---|
| CoreSuspendStickyEn | 0 | full | CoreSuspendSticky status interrupt enable. |
| CoreUSBResetStickyEn | 1 | full | CoreUSBResetSticky status interrupt enable. |
| CoreUSBSOFStickyEn | 2 | full | CoreUSBSOFSticky status interrupt enable. |
| CPUISITxBuffEmptyStickyEn | 3 | full | CPUISITxBuffEmptySticky status interrupt enable. |
| CPUEp0InBuffEmptyStickyEn | 4 | full | CPUEp0InBuffEmptySticky status interrupt enable. |
| CPUEp5InBuffEmptyStickyEn | 5 | full | CPUEp5InBuffEmptySticky status interrupt enable. |
| Ep0InNAKStickyEn | 6 | full | Ep0InNAKSticky status interrupt enable. |
| Ep5InNAKStickyEn | 7 | full | Ep5InNAKSticky status interrupt enable. |
| Ep0OutNAKStickyEn | 8 | full | Ep0OutNAKSticky status interrupt enable. |
| Ep1OutNAKStickyEn | 9 | full | Ep1OutNAKSticky status interrupt enable. |
| Ep2OutNAKStickyEn | 10 | full | Ep2OutNAKSticky status interrupt enable. |
| Ep3OutNAKStickyEn | 11 | full | Ep3OutNAKSticky status interrupt enable. |
| Ep4OutNAKStickyEn | 12 | full | Ep4OutNAKSticky status interrupt enable. |
| Ep1IrregPktStickyEn | 13 | full | Ep1IrregPktSticky status interrupt enable. |
| Ep2IrregPktStickyEn | 14 | full | Ep2IrregPktSticky status interrupt enable. |
| Ep3IrregPktStickyEn | 15 | full | Ep3IrregPktSticky status interrupt enable. |
| Ep4IrregPktStickyEn | 16 | full | Ep4IrregPktSticky status interrupt enable. |
| OutBuffOverFlowStickyEn | 17 | full | OutBuffOverFlowSticky status interrupt enable. |
| InBuffUnderRunStickyEn | 18 | full | InBuffUnderRunSticky status interrupt enable. |

12.5.5.2.23 USBDDebug

This register is intended for debug purposes only. Contains non-sticky versions of all interrupt capable status bits, which are referred to as dynamic in the table.

TABLE 61

USBDDebug register format

| Field Name | Bit(s) | write access | Description |
|---|---|---|---|
| CoreTimeStamp | 10:0 | none | USB device core frame number. |
| CoreSuspend | 11 | none | Dynamic version of CoreSuspendSticky. |
| CoreUSBReset | 12 | none | Dynamic version of CoreUSBResetSticky. |
| CoreUSBSOF | 13 | none | Dynamic version of CoreUSBSOFSticky. |
| CPUISITxBuffEmpty | 14 | none | Dynamic version of CPUISITxBuffEmptySticky. |
| CPUEp0InBuffEmpty | 15 | none | Dynamic version of CPUEp0InBuffEmptySticky. |
| CPUEp5InBuffEmpty | 16 | none | Dynamic version of CPUEp5InBuffEmptySticky. |
| Ep0InNAK | 17 | none | Dynamic version of Ep0InNAKSticky. |
| Ep5InNAK | 18 | none | Dynamic version of Ep5InNAKSticky. |
| Ep0OutNAK | 19 | none | Dynamic version of Ep0OutNAKSticky. |
| Ep1OutNAK | 20 | none | Dynamic version of Ep1OutNAKSticky. |
| Ep2OutNAK | 21 | none | Dynamic version of Ep2OutNAKSticky. |
| Ep3OutNAK | 22 | none | Dynamic version of Ep3OutNAKSticky. |
| Ep4OutNAK | 23 | none | Dynamic version of Ep4OutNAKSticky. |
| Ep1IrregPkt | 24 | none | Dynamic version of Ep1IrregPktSticky. |
| Ep2IrregPkt | 25 | none | Dynamic version of Ep2IrregPktSticky. |
| Ep3IrregPkt | 26 | none | Dynamic version of Ep3IrregPktSticky. |
| Ep4IrregPkt | 27 | none | Dynamic version of Ep4IrregPktSticky. |
| OutBuffOverFlow | 28 | none | Dynamic version of OutBuffOverFlowSticky. |

TABLE 61-continued

USBDDebug register format

| Field Name | Bit(s) | write access | Description |
|---|---|---|---|
| InBuffUnderRun | 29 | none | Dynamic version of InBuffUnderRunSticky. |

12.5.5.2.24 USBHStatus

This register contains all status bits associated with the USBH. The field name extension Sticky implies that the status condition will remain registered until cleared by a CPU write.

TABLE 62

USBHStatus register format

| Field Name | Bit(s) | Write access | Description |
|---|---|---|---|
| CoreIRQSticky | 0 | clear | HC core IRQ interrupt flag. Sticky Set when HC core UHOSTC_IrqN output signal transitions from 0 -> 1. Refer to OHCI spec for details on HC interrupt processing. 1 = IRQ interrupt from core. 0 = default value. |
| CoreSMISticky | 1 | clear | HC core SMI interrupt flag. Sticky Set when HC core UHOSTC_SmiN output signal transitions from 0 -> 1. Refer to OHCI spec for details on HC interrupt processing. 1 = SMI interrupt from HC. 0 = default value. |
| CoreBuffAcc | 2 | none | HC core buffer access flag. HC core UHOSTC_BufAcc output signal. Indicates whether the HC is accessing a descriptor or a buffer in shared system memory. 1 = buffer access 0 = descriptor access. |

12.5.5.2.25 USBHMask

This register serves as an interrupt mask for all USBH status conditions that can cause a CPU interrupt. All interrupts will be generated in an edge sensitive manner, i.e. when the associated status register transitions from 0–>1.

TABLE 63

USBHMask register format

| Field Name | Bit(s) | Write access | Description |
|---|---|---|---|
| CoreIRQIntEn | 0 | full | CoreIRQSticky status interrupt enable.<br>1 = enable.<br>0 = disable. |
| CoreSMIIntEn | 1 | full | CoreSMISticky status interrupt enable.<br>1 = enable.<br>0 = disable. |

12.5.5.2.26 USBHDebug

This register is intended for debug purposes only. Contains non-sticky versions of all interrupt capable status bits, which are referred to as dynamic in the table.

TABLE 64

USBHDebug register format

| Field Name | Bit(s) | write access | Description |
|---|---|---|---|
| CoreIRQ | 0 | none | Dynamic version of CoreIRQSticky. |
| CoreSMI | 1 | None | Dynamic version of CoreSMISticky. |

12.5.5.2.27 ISICntrl

This register controls the general setup/configuration of the ISI.

Note that the reset value of this register allows the SoPEC to automatically become an ISIMaster (AutoMasterEnable=1) if any USB packets are received on endpoints 2–4. On becoming an ISIMaster the ISIMasterSel bit is set and any USB or CPU packets destined for other ISI devices are transmitted. The CPU can override this capability at any time by clearing the AutoMasterEnable bit.

TABLE 65

ISICntrl register format

| Field Name | Bit(s) | Write access | Description |
|---|---|---|---|
| TxEnable | 0 | Full | ISI transmit enable.<br>Enables ISI transmission of long or ping packets. ACKs may still be transmitted when this bit is 0.<br>This is cleared by transmit errors and needs to be restarted by the CPU.<br>1 = Transmission enabled<br>0 = Transmission disabled |
| RxEnable | 1 | Full | ISI receive enable.<br>Enables ISI reception. This is can only be cleared by the CPU and it is only anticipated that reception will be disabled when the ISI in not in use and the ISI pins are being used by the GPIO for another purpose.<br>1 = Reception enabled<br>0 = Reception disabled |
| ISIMasterSel | 2 | Full | ISI master select.<br>Determines whether the SoPEC is an ISIMaster or not<br>1 = ISIMaster<br>0 = ISISlave |
| AutoMasterEnable | 3 | Full | SI auto master enable.<br>Enables the device to automatically become the ISIMaster if activity is detected on USB endpoints2–4.<br>1 = auto-master operation enabled<br>0 = auto-master operation disabled |

12.5.5.2.28 ISIId

TABLE 66

ISIId register format

| Field Name | Bit(s) | Write access | Description |
|---|---|---|---|
| ISIId | 3:0 | Full | ISIId for this SoPEC.<br>SoPEC resets to being an ISISlave with ISIId0. 0xF (the broadcast ISIId) is an illegal value and should not be written to this register. |

12.5.5.2.29 ISINumRetries

TABLE 67

ISINumRetries register format

| Field Name | Bit(s) | Write access | Description |
|---|---|---|---|
| ISINumRetries | 3:0 | Full | Number of ISI retransmissions to attempt in response to an inferred NAK before aborting a long packet transmission |

12.5.5.2.30 ISIPingScheduleN

This register description applies to ISIPingSchedule0, ISIPingSchedule1 and ISIPingSchedule2.

TABLE 68

ISIPingScheduleN register format

| Field Name | Bit(s) | Write access | Description |
|---|---|---|---|
| ISIPingSchedule | 14:0 | Full | Denotes which ISIIds will be receive ping packets. Note that bit0 refers to ISIId0, bit1 to ISIId1 . . . bit14 to ISIId14. |

12.5.5.2.31 ISITotalPeriod

TABLE 69

ISITotalPeriod register format

| Field Name | Bit(s) | Write access | Description |
|---|---|---|---|
| ISITotalPeriod | 3:0 | Full | Reload value of the ISITotalPeriod counter |

12.5.5.2.32 ISILocalPeriod

TABLE 70

ISILocalPeriod register format

| Field Name | Bit(s) | Write access | Description |
|---|---|---|---|
| ISILocalPeriod | 3:0 | Full | Reload value of the ISILocalPeriod counter |

12.5.5.2.33 ISIIntStatus

The ISIIntStatus register contains status bits that are related to conditions that can cause an interrupt to the CPU, if the corresponding interrupt enable bits are set in the ISIMask register.

TABLE 71

ISIIntStatus register

| Field Name | Bit(s) | Write access | Description |
|---|---|---|---|
| TxErrorSticky | 0 | None | SI transmit error flag. Sticky. Receiving ISI device would not accept the transmitted packet. Only set after NumRetries unsuccessful retransmissions, (excluding ping packets). This bit is cleared by the ISI after transmission has been re-enabled by the CPU setting the TxEnable bit of the ISICntrl register. 1 = transmit error. 0 = default state. |
| RxFrameErrorSticky | 1 | Clear | ISI receive framing error flag. Sticky. This bit is set by the ISI when a framing error detected in the received packet, which can be caused by an incorrect Start or Stop field or by bit stuffing errors. 1 = framing error detected. 0 = default state. |
| RxCRCErrorSticky | 2 | Clear | ISI receive CRC error flag. This bit is set by the ISI when a CRC error is detected in an incoming packet. Other than dropping the errored packet ISI reception is unaffected by a CRC Error. 1 = CRC error 0 = default state. |
| RxBuffOverFlowSticky | 3 | Clear | ISI receive buffer over flow flag. Sticky. An overflow has occurred in the ISI receive buffer and a packet had to be dropped. 1 = over flow condition detected. 0 = default state. |

12.5.5.2.34 ISITxBuffStatus

The ISITxBuffStatus register contains status bits that are related to the ISI Tx buffer. This is a secondary status register and will not cause any interrupts to the CPU.

TABLE 72

ISITxBuffStatus register format

| Field Name | Bit(s) | Write access | Description |
|---|---|---|---|
| Entry0PktValid | 0 | None | ISI Tx buffer entry #0 packet valid flag. This flag will be set by the ISI when a valid ISI packet is written to entry #0 in the ISITxBuff for transmission over the ISI bus. A Tx packet is considered valid when it is 32 bytes in size and the ISI has written the packet header information to Entry0PktDesc, Entry0DestISIId and Entry0DestISISubId. 1 = packet valid. 0 = default value. |
| Entry0PktDesc | 3:1 | None | ISI Tx buffer entry #0 packet descriptor. PktDesc field as per Table for the packet entry #0 in the ISITxBuff. Only valid when Entry0PktValid = 1. |
| Entry0DestISIId | 7:4 | None | ISI Tx buffer entry #0 destination ISI ID. Denotes the ISIId of the target SoPEC as per Table . Only valid when Entry0PktValid = 1. |
| Entry0DestISISubId | 8 | None | ISI Tx buffer entry #0 destination ISI sub ID. Indicates which DMAChannel on the target SoPEC that packet entry #0 in the ISITxBuff is destined for. Only valid when Entry0PktValid = 1. 1 = DMAChannel1 0 = DMAChannel0 |
| Entry1PktValid | 9 | None | As per Entry0PktValid. |
| Entry1PktDesc | 12:10 | None | As per Entry0PktDesc. |
| Entry1DestISIId | 16:13 | None | As per Entry0DestISIId. |
| Entry1DestISISubId | 17 | None | As per Entry0DestISISubId. |

12.5.5.2.35 ISIRxBuffStatus

The ISIRxBuffStatus register contains status bits that are related to the ISI Rx buffer. This is a secondary status register and will not cause any interrupts to the CPU.

TABLE 73

ISIRxBuffStatus register format

| Field Name | Bit(s) | Write access | Description |
|---|---|---|---|
| Entry0PktValid | 0 | None | ISI Rx buffer entry #0 packet valid flag. This flag will be set by the ISI when a valid ISI packet is received and written to entry #0 of the ISIRxBuff. A Rx packet is considered valid when it is 32 bytes in size and no framing or CRC errors were detected. 1 = valid packet 0 = default value |
| Entry0PktDesc | 3:1 | None | ISI Rx buffer entry #0 packet descriptor. PktDesc field as per Table for packet entry #0 of the ISIRxBuff. Only valid when Entry0PktValid = 1. |
| Entry0DestISIId | 7:4 | None | ISI Rx buffer 0 destination ISI ID. Denotes the ISIId of the target SoPEC as per Table. This should always correspond to the local SoPEC ISIId. Only valid when Entry0PktValid = 1. |
| Entry0DestISISubId | 8 | None | ISI Rx buffer 0 destination ISI sub ID. Indicates which DMAChannel on the target SoPEC that entry #0 of the ISIRxBuff is destined for. Only valid when Entry0PktValid = 1. 1 = DMAChannel1 0 = DMAChannel0 |
| Entry1PktValid | 9 | None | As per Entry0PktValid. |
| Entry1PktDesc | 12:10 | None | As per Entry0PktDesc. |
| Entry1DestISIId | 16:13 | None | As per Entry0DestISIId. |
| Entry1DestISISubId | 17 | None | As per Entry0DestISISubId. |

12.5.5.2.36 ISIMask Register

An interrupt will be generated in an edge sensitive manner i.e. the ISI will generate an isi_icu_irq pulse each time a status bit goes high and the corresponding bit of the ISIMask register is enabled.

TABLE 74

ISIMask register

| Field Name | Bit(s) | Write access | Description |
|---|---|---|---|
| TxErrorIntEn | 0 | Full | TxErrorSticky status interrupt enable. 1 = enable. 0 = disable. |
| RxFrameErrorIntEn | 1 | Full | RxFrameErrorSticky status interrupt enable. 1 = enable. 0 = disable. |
| RxCRCErrorIntEn | 2 | Full | RxCRCErrorSticky status interrupt enable. 1 = enable. 0 = disable. |
| RxBuffOverFlowIntEn | 3 | Full | RxBuffOverFlowSticky status interrupt enable. 1 = enable. 0 = disable. |

12.5.5.2.37 ISISubIdNSeq

This register description applies to ISISubId0Seq and ISISubId0Seq.

TABLE 75

ISISubIdNSeq register format

| Field Name | Bit(s) | Write access | Description |
|---|---|---|---|
| ISISubIdNSeq | 0 | Full | ISI sub ID channel N sequence bit. This bit may be initialised by the CPU but is updated by the ISI each time an error-free long packet is received. |

12.5.5.2.38 ISISubIdSeqMask

TABLE 76

ISISubIdSeqMask register format

| Field Name | Bit(s) | Write access | Description |
|---|---|---|---|
| ISISubIdSeq0Mask | 0 | Full | ISI sub ID channel 0 sequence bit mask. Setting this bit ensures that the sequence bit will be ignored for incoming packets for the ISISubId. 1 = ignore sequence bit. 0 = default state. |
| ISISubIdSeq1Mask | 1 | Full | As per ISISubIdSeq0Mask. |

12.5.5.2.39 ISINumPins

TABLE 77

ISINumPins register format

| Field Name | Bit(s) | Write access | Description |
|---|---|---|---|
| ISINumPins | 0 | Full | Select number of active ISI pins. 1 = 4 pins 0 = 2 pins |

12.5.5.2.40 ISITurnAround

The ISI bus turnaround time will reset to its maximum value of 0xF to provide a safer starting mode for the ISI bus. This value should be set to a value that is suitable for the physical implementation of the ISI bus, i.e. the lowest turn around time that the physical implementation will allow without significant degradation of signal integrity.

TABLE 78

ISITurnAround register format

| Field Name | Bit(s) | Write access | Description |
|---|---|---|---|
| ISITurnAround | 3:0 | Full | ISI bus turn around time in ISI clock cycles (32 MHz). |

12.5.5.2.41 ISIShortReplyWin

The ISI short packet reply window time will reset to its maximum value of 0x1F to provide a safer starting mode for the ISI bus. This value should be set to a value that will allow for expected frequency of bit stuffing and receiver response timing.

TABLE 79

ISIShortReplyWin register format

| Field Name | Bit(s) | Write access | Description |
|---|---|---|---|
| ISIShortReplyWin | 4:0 | Full | ISI long packet reply window in ISI clock cycles (32 MHz). |

12.5.5.2.42 ISILongReplyWin

The ISI long packet reply window time will reset to its maximum value of 0x1FF to provide a safer starting mode for the ISI bus. This value should be set to a value that will allow for expected frequency of bit stuffing and receiver response timing.

TABLE 80

ISILongReplyWin register format

| Field Name | Bit(s) | Write access | Description |
|---|---|---|---|
| ISILongReplyWin | 8:0 | Full | ISI long packet reply window in ISI clock cycles (32 MHz). |

12.5.5.2.43 ISIDebug

This register is intended for debug purposes only. Contains non-sticky versions of all interrupt capable status bits, which are referred to as dynamic in the table.

TABLE 81

ISIDebug register format

| Field Name | Bit(s) | Write access | Description |
|---|---|---|---|
| TxError | 0 | None | Dynamic version of TxErrorSticky. |
| RxFrameError | 1 | None | Dynamic version of RxFrameErrorSticky. |
| RxCRCError | 2 | None | Dynamic version of RxCRCErrorSticky. |
| RxBuffOverFlow | 3 | None | Dynamic version of RxBuffOverFlowSticky. |

12.5.5.3 CPU Bus Interface 12.5.5.4 Control Core Logic 12.5.5.5 DIU Bus Interface 12.6 DMA Regs All of the circular buffer registers are 256-bit word aligned as required by the DIU. The DMAnBottomAdr and DMAnTopAdr registers are inclusive i.e. the addresses contained in those registers form part of the circular buffer. The DMAnCurrWPtr always points to the next location the DMA manager will write to so interrupts are generated whenever the DMA manager reaches the address in either the DMAnIntAdr or DMAnMaxAdr registers rather than when it actually writes to these locations. It therefore can not write to the location in the DMAnMaxAdr register.

SCB Map Regs

The SCB map is configured by mapping a USB endpoint on to a data sink. This is performed on a endpoint basis i.e. each endpoint has a configuration register to allow its data sink be selected. Mapping an endpoint on to a data sink does not initiate any data flow—each endpoint/data sink needs to be enabled by writing to the appropriate configuration registers for the USBD, ISI and DMA manager.

13. General Purpose IO (GPIO)

13.1 Overview

The General Purpose IO block (GPIO) is responsible for control and interfacing of GPIO pins to the rest of the SoPEC system. It provides easily programmable control logic to simplify control of GPIO functions. In all there are 32 GPIO pins of which any pin can assume any output or input function. Possible output functions are 4 Stepper Motor control Outputs 12 Brushless DC Motor Control Output (total of 2 different controllers each with 6 outputs)

4 General purpose high drive pulsed outputs capable of driving LEDs.

4 Open drain IOs used for LSS interfaces

4 Normal drive low impedance IOs used for the ISI interface in Multi-SoPEC mode

Each of the pins can be configured in either input or output mode, each pin is independently controlled. A programmable de-glitching circuit exists for a fixed number of input pins. Each input is a schmidt trigger to increase noise immunity should the input be used without the de-glitch circuit. The mapping of the above functions and their alternate use in a slave SoPEC to GPIO pins is shown in Table 82 below.

TABLE 82

GPIO pin type

| GPIO pin(s) | Pin IO Type | Default Function |
|---|---|---|
| gpio[3:0] | Normal drive, low impedance IO (35 Ohm), Integrated pull-up resistor | Pins 1 and 0 in ISI Mode, pins 2 and 3 in input mode |
| gpio[7:4] | High drive, normal impedance IO (65 Ohm), intended for LED drivers | Input Mode |
| gpio[31:8] | Normal drive, normal impedance IO (65 Ohm), no pull-up | Input Mode |

13.2 Stepper Motor Control

The motor control pins can be directly controlled by the CPU or the motor control logic can be used to generate the phase pulses for the stepper motors. The controller consists of two central counters from which the control pins are derived. The central counters have several registers (see Table) used to configure the cycle period, the phase, the duty cycle, and counter granularity.

There are two motor master counters (0 and 1) with identical features. The period of the master counters are defined by the MotorMasterClkPeriod[1:0] and MotorMasterClkSrc registers i.e. both master counters are derived from the same MotorMasterClkSrc. The MotorMasterClkSrc defines the timing pulses used by the master counters to determine the timing period. The MotorMasterClkSrc can select clock sources of 1 μs, 100 μs, 10 ms and pclk timing pulses.

The MotorMasterClkPeriod[1:0] registers are set to the number of timing pulses required before the timing period re-starts. Each master counter is set to the relevant MotorMasterClkPeriod value and counts down a unit each time a timing pulse is received.

The master counters reset to MotorMasterClkPeriod value and count down. Once the value hits zero a new value is reloaded from the MotorMasterClkPeriod[1:0] registers. This ensures that no master clock glitch is generated when changing the clock period.

Each of the IO pins for the motor controller are derived from the master counters. Each pin has independent configuration registers. The MotorMasterClkSelect[3:0] registers define which of the two master counters to use as the source for each motor control pin. The master counter value is compared with the configured MotorCtrlLow and MotorCtrlHigh registers (bit fields of the MotorCtrlConfig register). If the count is equal to MotorCtrlHigh value the motor control is set to 1, if the count is equal to MotorCtrlLow value the motor control pin is set to 0.

This allows the phase and duty cycle of the motor control pins to be varied at pclk granularity. The motor control generators keep a working copy of the MotorCtrlLow, MotorCtrlHigh values and update the configured value to the working copy when it is safe to do so. This allows the phase or duty cycle of a motor control pin to be safely adjusted by the CPU without causing a glitch on the output pin.

Note that when reprogramming the MotorCtrlLow, MotorCtrlHigh registers to reorder the sequence of the transition points (e.g changing from low point less than high point to low point greater than high point and vice versa) care must still taken to avoid introducing glitching on the output pin.

13.3 LED Control

LED lifetime and brightness can be improved and power consumption reduced by driving the LEDs with a pulsed rather than a DC signal. The source clock for each of the LED pins is a 7.8 kHz (128 μs period) clock generated from the 1 μs clock pulse from the Timers block. The LEDDutySelect registers are used to create a signal with the desired waveform. Unpulsed operation of the LED pins can be achieved by using CPU IO direct control, or setting LEDDutySelect to 0. By default the LED pins are controlled by the LED control logic.

13.4 LSS Interface via GPIO

In some SoPEC system configurations one or more of the LSS interfaces may not be used. Unused LSS interface pins can be reused as general IO pins by configuring the IOModeSelect registers. When a mode select register for a particular GPIO pin is set to 23,22,21,20 the GPIO pin is connected to LSS control IOs 3 to 0 respectively.

13.5 ISI Interface via GPIO

In Multi-SoPEC mode the SCB block (in particular the ISI sub-block) requires direct access to and from the GPIO pins. Control of the ISI interface pins is determined by the IOModeSelect registers. When a mode select register for a particular GPIO pin is set to 27,26,25,24 the GPIO pin connected to the ISI control bits 3 to 0 respectively. By default the GPIO pins 1 to 0 are directly controlled by the ISI block.

In single SoPEC systems the pins can be re-used by the GPIO.

13.6 CPU GPIO Control

The CPU can assume direct control of any (or all) of the IO pins individually. On a per pin basis the CPU can turn on direct access to the pin by configuring the IOModeSelect register to CPU direct mode. Once set the IO pin assumes the direction specified by the CpuIODirection register. When in output mode the value in register CpuIOOut will be directly reflected to the output driver. When in input mode the status of the input pin can be read by reading CpuIOIn register. When writing to the CpuIOOut register the value being written is XORed with the current value in CpuIOOut. The CPU can also read the status of the 10 selected de-glitched inputs by reading the CpuIOInDeGlitch register.

13.7 Programmable De-Glitching Logic

Each IO pin can be filtered through a de-glitching logic circuit, the pin that the de-glitching logic is connected to is configured by the InputPinSelect registers. There are IO de-glitching circuits, so a maximum of IO input pin can be de-glitched at anytime.

The de-glitch circuit can be configured to sample the IO pin for a predetermined time before concluding that a pin is in a particular state. The exact sampling length is configurable, but each de-glitch circuit must use one of two possible configured values (selected by DeGlitchSelect). The sampling length is the same for both high and low states. The DeGlitchCount is programmed to the number of system time units that a state must be valid for before the state is passed on. The time units are selected by DeGlitchClkSel and can be one of 1 μs, 100 μs, 10 ms and pclk pulses.

For example if DeGlitchCount is set to 10 and DeGlitchClkSel set to 3, then the selected input pin must consistently retain its value for 10 system clock cycles (pclk) before the input state will be propagated from CpuIOIn to CpuIOInDeglitch.

13.8 Interrupt Generation

Any of the selected input pins (selected by InputPinSelect) can generate an interrupt from the raw or deglitched version of the input pin. There are IO possible interrupt sources from the GPIO to the interrupt controller, one interrupt per input pin. The InterruptSrcSelect register determines whether the raw input or the deglitched version is used as the interrupt source.

The interrupt type, masking and priority can be programmed in the interrupt controller.

13.9 Frequency Analyser

The frequency analyser measures the duration between successive positive edges on a selected input pin (selected by InputPinSelect) and reports the last period measured (FreqAnaLastPeriod) and a running average period (FreqAnaAverage).

The running average is updated each time a new positive edge is detected and is calculated by FreqAnaAverage=(FreqAnaAverage/8)*7+FreqAnaLastPeriod/8.

The analyser can be used with any selected input pin (or its deglitched form), but only one input at a time can be selected. The input is selected by the FreqAnaPinSelect (range of 0 to 9) and its deglitched form can be selected by FreqAnaPinFormSelect.

13.10 Brushless DC (BLDC) Motor Controllers

The GPIO contains 2 brushless DC (BLDC) motor controllers. Each controller consists of 3 hall inputs, a direction input, and six possible outputs. The outputs are derived from the input state and a pulse width modulated (PWM) input from the Stepper Motor controller, and is given by the truth table in Table 83.

TABLE 83

Truth Table for BLDC Motor Controllers

| direction | hc | hb | ha | q6 | q5 | q4 | q3 | q2 | q1 |
|---|---|---|---|---|---|---|---|---|---|
| 0 | 0 | 0 | 1 | 0 | 0 | 0 | 1 | PWM | 0 |
| 0 | 0 | 1 | 1 | PWM | 0 | 0 | 1 | 0 | 0 |
| 0 | 0 | 1 | 0 | PWM | 0 | 0 | 0 | 0 | 1 |
| 0 | 1 | 1 | 0 | 0 | 0 | PWM | 0 | 0 | 1 |
| 0 | 1 | 0 | 0 | 0 | 1 | PWM | 0 | 0 | 0 |
| 0 | 1 | 0 | 1 | 0 | 1 | 0 | 0 | PWM | 0 |
| 0 | 0 | 0 | 0 | 0 | 0 | 0 | 0 | 0 | 0 |
| 0 | 1 | 1 | 1 | 0 | 0 | 0 | 0 | 0 | 0 |
| 1 | 0 | 0 | 1 | 0 | 0 | PWM | 0 | 0 | 1 |
| 1 | 0 | 1 | 1 | PWM | 0 | 0 | 0 | 0 | 1 |
| 1 | 0 | 1 | 0 | PWM | 0 | 0 | 1 | 0 | 0 |
| 1 | 1 | 1 | 0 | 0 | 0 | 0 | 1 | PWM | 0 |
| 1 | 1 | 0 | 0 | 0 | 1 | 0 | 0 | PWM | 0 |

TABLE 83-continued

Truth Table for BLDC Motor Controllers

| direction | hc | hb | ha | q6 | q5 | q4 | q3 | q2 | q1 |
|---|---|---|---|---|---|---|---|---|---|
| 1 | 1 | 0 | 1 | 0 | 1 | PWM | 0 | 0 | 0 |
| 1 | 0 | 0 | 0 | 0 | 0 | 0 | 0 | 0 | 0 |
| 1 | 1 | 1 | 1 | 0 | 0 | 0 | 0 | 0 | 0 |

All inputs to a BLDC controller must be de-glitched. Each controller has its inputs hardwired to de-glitch circuits. Controller 1 hall inputs are de-glitched by circuits 2 to 0, and its direction input is de-glitched by circuit 3. Controller 2 inputs are de-glitched by circuits 6 to 4 for hall inputs and 7 for direction input.

Each controller also requires a PWM input. The stepper motor controller outputs are reused, output 0 is connected to BLDC controller 1, and output 1 to BLDC controller 2.

The controllers have two modes of operation, internal and external direction control (configured by BLDCMode). If a controller is in external direction mode the direction input is taken from a de-glitched circuit, if it is in internal direction mode the direction input is configured by the BLDCDirection register.

The BLDC controller outputs are connected to the GPIO output pins by configuring the IOModeSelect register for each pin. e.g Setting the mode register to 8 will connect q1 Controller 1 to drive the pin.

13.11 Implementation 13.11.1 Definitions of I/O

TABLE 84

I/O definition

| Port name | Pins | I/O | Description |
|---|---|---|---|
| Clocks and Resets | | | |
| Pclk | 1 | In | System Clock |
| prst_n | 1 | In | System reset, synchronous active low |
| tim_pulse[2:0] | 3 | In | Timers block generated timing pulses.<br>0 - 1 μs pulse<br>1 - 100 μs pulse<br>2 - 10 ms pulse |
| CPU Interface | | | |
| cpu_adr[8:2] | 8 | In | CPU address bus. Only 7 bits are required to decode the address space for this block |
| cpu_dataout[31:0] | 32 | In | Shared write data bus from the CPU |
| gpio_cpu_data[31:0] | 32 | Out | Read data bus to the CPU |
| cpu_rwn | 1 | In | Common read/not-write signal from the CPU |
| cpu_gpio_sel | 1 | In | Block select from the CPU. When cpu_gpio_sel is high both cpu_adr and cpu_dataout are valid |
| gpio_cpu_rdy | 1 | Out | Ready signal to the CPU. When gpio_cpu_rdy is high it indicates the last cycle of the access. For a write cycle this means cpu_dataout has been registered by the GPIO block and for a read cycle this means the data on gpio_cpu_data is valid. |
| gpio_cpu_berr | 1 | Out | Bus error signal to the CPU indicating an invalid access. |
| gpio_cpu_debug_valid | 1 | Out | Debug Data valid on gpio_cpu_data bus. Active high |
| cpu_acode[1:0] | 2 | In | CPU Access Code signals. These decode as follows:<br>00 - User program access<br>01 - User data access<br>10 - Supervisor program access<br>11 - Supervisor data access |
| IO Pins | | | |
| gpio_o[31:0] | 32 | Out | General purpose IO output to IO driver |
| gpio_i[31:0] | 32 | In | General purpose IO input from IO receiver |
| gpio_e[31:0] | 32 | Out | General purpose IO output control. Active high driving |
| GPIO to LSS | | | |
| lss_gpio_dout[1:0] | 2 | In | LSS bus data output<br>Bit 0 - LSS bus 0<br>Bit 1 - LSS bus 1 |
| gpio_lss_din[1:0] | 2 | Out | LSS bus data input<br>Bit 0 - LSS bus 0<br>Bit 1 - LSS bus 1 |
| lss_gpio_e[1:0] | 2 | In | LSS bus data output enable, active high<br>Bit 0 - LSS bus 0<br>Bit 1 - LSS bus 1 |
| lss_gpio_clk[1:0] | 2 | In | LSS bus clock output<br>Bit 0 - LSS bus 0<br>Bit 1 - LSS bus 1 |
| GPIO to ISI | | | |
| gpio_isi_din[1:0] | 2 | Out | Input data from IO receivers to ISI. |

TABLE 84-continued

I/O definition

| Port name | Pins | I/O | Description |
|---|---|---|---|
| isi_gpio_dout[1:0] | 2 | In | Data output from ISI to IO drivers |
| isi_gpio_e[1:0] | 2 | In | GPIO ISI pins output enable (active high) from ISI interface |
| usbh_gpio_power_en | 1 | In | Port Power enable from the USB host core, active high |
| gpio_usbh_over_current | 1 | Out | Over current detect to the USB host core, active high |
| Miscellaneous | | | |
| gpio_icu_irq[9:0] | 10 | Out | GPIO pin interrupts |
| gpio_cpr_wakeup | 1 | Out | SoPEC wakeup to the CPR block active high. |
| Debug | | | |
| debug_data_out[31:0] | 32 | In | Output debug data to be muxed on to the GPIO pins |
| debug_cntrl[31:0] | 32 | In | Control signal for each GPIO bound debug data line indicating whether or not the debug data should be selected by the pin mux |

13.11.2 Configuration Registers

The configuration registers in the GPIO are programmed via the CPU interface. Refer to section 11.4.3 on page 69 for a description of the protocol and timing diagrams for reading and writing registers in the GPIO. Note that since addresses in SoPEC are byte aligned and the CPU only supports 32-bit register reads and writes, the lower 2 bits of the CPU address bus are not required to decode the address space for the GPIO. When reading a register that is less than 32 bits wide zeros should be returned on the upper unused bit(s) of gpio_cpu_data. Table 85 lists the configuration registers in the GPIO block

TABLE 85

GPIO Register Definition

| Address GPIO_base + | Register | #bits | Reset | Description |
|---|---|---|---|---|
| 0x000–0x07C | IOModeSelect[31:0] | 32 × 5 | See Table for default values | Specifies the mode of operation for each GPIO pin. One 5 bit bus per pin.<br>Possible assignment values and correspond controller outputs are as follows<br>Value - Controlled by<br>3 to 0 - Output, LED controller 4 to 1<br>7 to 4 - Output Stepper Motor control 4–1<br>13 to 8 - Output BLDC 1 Motor control 6–1<br>19 to 14 - Output BLDC 2 Motor control 6–1<br>23 to 20 - LSS control 4–1<br>27 to 24 - ISI control 4–1<br>28 - CPU Direct Control<br>29 - USB power enable output<br>30 - Input Mode |
| 0x080–0xA4 | InputPinSelect[9:0] | 10 × 5 | 0x00 | Specifies which pins should be selected as inputs. Used to select the pin source to the DeGlitch Circuits. |
| CPU IO Control | | | | |
| 0x0B0 | CpuIOUserModeMask | 32 | 0x0000_0000 | User Mode Access Mask to CPU GPIO control register. When 1 user access is enabled. One bit per gpio pin. Enables access to CpuIODirection, CpuIOOut and CpuIOIn in user mode. |
| 0x0B4 | CpuIOSuperModeMask | 32 | 0xFFFF_FFFF | Supervisor Mode Access Mask to CPU GPIO control register. When 1 supervisor access is enabled. One bit per gpio pin. Enables access to CpuIODirection, CpuIOOut and CpuIOIn in supervisor mode. |
| 0x0B8 | CpuIODirection | 32 | 0x0000_0000 | Indicates the direction of each IO pin, when controlled by the CPU<br>0 - Indicates Input Mode<br>1 - Indicates Output Mode |
| 0x0BC | CpuIOOut | 32 | 0x0000_0000 | Value used to drive output pin in CPU direct mode.<br>bits31:0 - Value to drive on output GPIO pins |

TABLE 85-continued

GPIO Register Definition

| Address GPIO_base + | Register | #bits | Reset | Description |
|---|---|---|---|---|
| | | | | When written to the register assumes the new value XORed with the current value. |
| 0x0C0 | CpuIOIn | 32 | External pin value | Value received on each input pin regardless of mode. Read Only register. |
| 0x0C4 | CpuDeGlitchUserModeMask | 10 | 0x000 | User Mode Access Mask to CpuIOInDeglitch control register. When 1 user access is enabled, otherwise bit reads as zero. |
| 0x0C8 | CpuIOInDeglitch | 10 | 0x000 | Deglitched version of selected input pins. The input pins are selected by the InputPinSelect register.<br>Note that after reset this register will reflect the external pin values 256 pclk cycles after they have stabilized. Read Only register. |
| Deglitch control | | | | |
| 0x0D0–0x0D4 | DeGlitchCount[1:0] | 2 × 8 | 0xFF | Deglitch circuit sample count in DeGlitchClkSrc selected units. |
| 0x0D8–0x0DC | DeGlitchClkSrc[1:0] | 2 × 2 | 0x3 | Specifies the unit use of the GPIO deglitch circuits:<br>0 - 1 μs pulse<br>1 - 100 μs pulse<br>2 - 10 ms pulse<br>3 - pclk |
| 0x0E0 | DeGlitchSelect | 10 | 0x000 | Specifies which deglitch count (DeGlitchCount) and unit select (DeGlitchClkSrc) should be used with each de-glitch circuit<br>0 - Specifies DeGlitchCount[0] and DeGlitchClkSrc[0]<br>1 - Specifies DeGlitchCount[1] and DeGlitchClkSrc[1] |
| Motor Control | | | | |
| 0x0E4 | MotorCtrlUserModeEnable | 1 | 0x0 | User Mode Access enable to Motor control configuration registers. When 1 user access is enabled.<br>Enables user access to MotorMasterClkPeriod, MotorMasterClkSrc, MotorDutySelect, MotorPhaseSelect, MotorMasterClockEnable, MotorMasterClkSelect, BLDCMode and BLDCDirection registers |
| 0x0E8–0x0EC | MotorMasterClkPeriod[1:0] | 2 × 16 | 0x0000 | Specifies the motor controller master clock periods in MotorMasterClkSrc selected units |
| 0x0F0 | MotorMasterClkSrc | 2 | 0x0 | Specifies the unit use by the motor controller master clock generator:<br>0 - 1 μs pulse<br>1 - 100 μs pulse<br>2 - 10 ms pulse<br>3 - pclk |
| 0x0F4–0x100 | MotorCtrlConfig[3:0] | 4 × 32 | 0x0000_0000 | Specifies the transition points in the clock period for each motor control pin. One register per pin<br>bits 15:0 - MotorCtrlLow, high to low transition point<br>bits 31:16 - MotorCtrlHigh, low to high transition point |
| 0x104 | MotorMasterClkSelect | 4 | 0x0 | Specifies which motor master clock should be used as a pin generator source<br>0 - Clock derived from MotorMasterClockPeriod[0]<br>1 - Clock derived from MotorMasterClockPeriod[1] |
| 0x108 | MotorMasterClockEnable | 2 | 0x0 | Enable the motor master clock counter. When 1 count is enabled<br>Bit 0 - Enable motor master clock 0<br>Bit 1 - Enable motor master clock 1 |
| BLDC Motor Controllers | | | | |
| 0x10C | BLDCMode | 2 | 0x0 | Specifies the Mode of operation of the BLDC Controller. One bit per Controller.<br>0 - External direction control<br>1 - Internal direction control |
| 0x110 | BLDCDirection | 2 | 0x0 | Specifies the direction input of the BLDC controller. Only used when BLDC controller |

TABLE 85-continued

GPIO Register Definition

Figure 54:
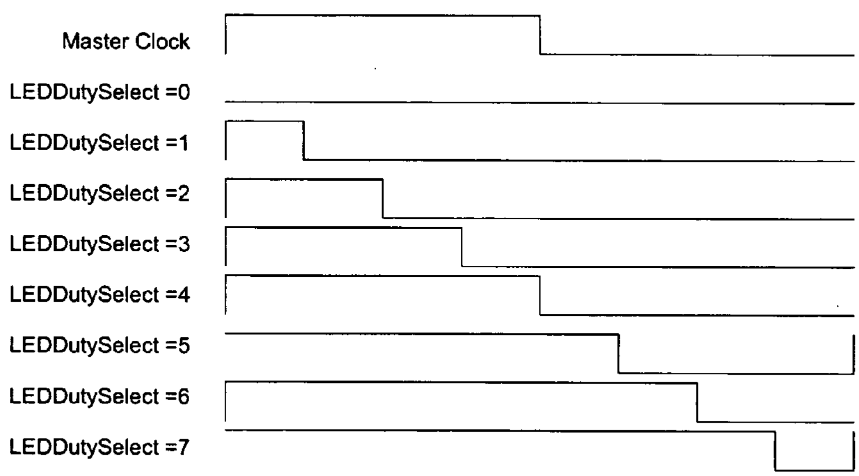
FIG. 54 shows duty cycle select

| Address GPIO_base + | Register | #bits | Reset | Description |
|---|---|---|---|---|
| | | | | is an internal direction control mode. One bit per controller. |
| LED control | | | | |
| 0x114 | LEDCtrlUserModeEnable | 4 | 0x0 | User Mode Access enable to LED control configuration registers. When 1 user access is enabled. One bit per LEDDutySelect select register. |
| 0x118–0x124 | LEDDutySelect[3:0] | 4 × 3 | 0x0 | Specifies the duty cycle for each LED control output. See FIG. 54 for encoding details. The LEDDutySelect[3:0] registers determine the duty cycle of the LED controller outputs |
| Frequency Analyser | | | | |
| 0x130 | FreqAnaUserModeEnable | 1 | 0x0 | User Mode Access enable to Frequency analyser configuration registers. When 1 user access is enabled. Controls access to FreqAnaPinFormSelect, FreqAnaLastPeriod, FreqAnaAverage and FreqAnaCountInc. |
| 0x134 | FreqAnaPinSelect | 4 | 0x00 | Selects which selected input should be used for the frequency analyses. |
| 0x138 | FreqAnaPinFormSelect | 1 | 0x0 | Selects if the frequency analyser should use the raw input or the deglitched form.<br>0 - Deglitched form of input pin<br>1 - Raw form of input pin |
| 0x13C | FreqAnaLastPeriod | 16 | 0x0000 | Frequency Analyser last period of selected input pin. |
| 0x140 | FreqAnaAverage | 16 | 0x0000 | Frequency Analyser average period of selected input pin. |
| 0x144 | FreqAnaCountInc | 20 | 0x0000 0 | Frequency Analyser counter increment amount. For each clock cycle no edge is detected on the selected input pin the accumulator is incremented by this amount. |
| 0x148 | FreqAnaCount | 32 | 0x0000_0000 | Frequency Analyser running counter (Working register) |
| Miscellaneous | | | | |
| 0x150 | InterruptSrcSelect | 10 | 0x3FF | Interrupt source select. 1 bit per selected input. Determines whether the interrupt source is direct form the selected input pin or the deglitched version. Input pins are selected by the DeGlitchPinSelect register.<br>0 - Selected input direct<br>1 - Deglitched selected input |
| 0x154 | DebugSelect[8:2] | 7 | 0x00 | Debug address select. Indicates the address of the register to report on the gpio_cpu_data bus when it is not otherwise being used. |
| 0x158–0x15C | MotorMasterCount[1:0] | 2 × 16 | 0x0000 | Motor master clock counter values.<br>Bus 0 - Master clock count 0<br>Bus 1 - Master clock count 1<br>Read Only registers |
| 0x160 | WakeUpInputMask | 10 | 0x000 | Indicates which deglitched inputs should be considered to generate the CPR wakeup. Active high |
| 0x164 | WakeUpLevel | 1 | 0 | Defines the level to detect on the masked GPIO inputs to generate a wakeup to the CPR<br>0 - Level 0<br>1 - Level 1 |
| 0x168 | USBOverCurrentPinSelect | 4 | 0x00 | Selects which deglitched input should be used for the USB over current detect. |

13.11.2.1 Supervisor and User Mode Access

The configuration registers block examines the CPU access type (cpu_acode signal) and determines if the access is allowed to that particular register, based on configured user access registers. If an access is not allowed the GPIO will issue a bus error by asserting the gpio_cpu_berr signal.

All supervisor and user program mode accesses will result in a bus error.

Access to the CpuIODirection, CpuIOOut and CpuIOIn is filtered by the CpuIOUserModeMask and CpuIOSuperModeMask registers. Each bit masks access to the corresponding bits in the CpuIO* registers for each mode, with CpuIOUserModeMask filtering user data mode access and CpuIOSuperModeMask filtering supervisor data mode access.

The addition of the CpuIOSuperModeMask register helps prevent potential conflicts between user and supervisor code read modify write operations. For example a conflict could exist if the user code is interrupted during a read modify write operation by a supervisor ISR which also modifies the CpuIO* registers.

An attempt to write to a disabled bit in user or supervisor mode will be ignored, and an attempt to read a disabled bit returns zero. If there are no user mode enabled bits then access is not allowed in user mode and a bus error will result. Similarly for supervisor mode.

When writing to the CpuIOOut register, the value being written is XORed with the current value in the CpuIOOut register, and the result is reflected on the GPIO pins.

The pseudocode for determining access to the CpuIOOut register is shown below. Similar code could be shown for the CpuIODirection and CpuIOIn registers. Note that when writing to CpuIODirection data is deposited directly and not XORed with the existing data (as in the CpuIOOut case).

```
if (cpu_acode == SUPERVISOR_DATA_MODE) then
    // supervisor mode
    if (CpuIOSuperModeMask[31:0] == 0 ) then
        // access is denied, and bus error
        gpio_cpu_berr = 1
    elsif (cpu_rwn == 1) then
        // read mode (no filtering needed)
```

-continued

```
        gpio_cpu_data[31:0] = CpuIOOut[31:0]
    else
        // write mode, filtered by mask
        mask[31:0]          = (cpu_dataout[31:0] &
CpuIOSuperModeMask[31:0])
        CpuIOOut[31:0] = (cpu_dataout[31:0] ^ mask[31:0] )
//bitwise XOR operator
elsif (cpu_acode == USER_DATA_MODE) then
    // user datamode
    if (CpuIOUserModeMask[31:0] == 0 ) then
        // access is denied, and bus error
        gpio_cpu_berr = 1
    elsif (cpu_rwn == 1) then
        // read mode, filtered by mask
        gpio_cpu_data       = ( CpuIOOut[31:0] &
CpuIOUserModeMask[31:0])
    else
        // write mode, filtered by mask
        mask[31:0]          = (cpu_dataout[31:0] &
CpuIOUserModeMask[31:0])
        CpuIOOut[31:0] = (cpu_dataout[31:0] ^ mask[31:0] )
//bitwise XOR operator
else
    // access is denied, bus error
    gpio_cpu_berr = 1
```

Table 86 details the access modes allowed for registers in the GPIO block. In supervisor mode all registers are accessible. In user mode forbidden accesses will result in a bus error (gpio_cpu_berr asserted).

TABLE 86

GPIO supervisor and user access modes

| Register Address | Registers | Access Permitted |
|---|---|---|
| 0x000–0x07C | IOModeSelect[31:0] | Supervisor data mode only |
| 0x080–0x94 | InputPinSelect[9:0] | Supervisor data mode only |
| CPU IO Control | | |
| 0x0B0 | CpuIOUserModeMask | Supervisor data mode only |
| 0x0B4 | CpuIOSuperModeMask | Supervisor data mode only |
| 0x0B8 | CpuIODirection | CpuIOUserModeMask and CpuIOSuperModeMask filtered |
| 0x0BC | CpuIOOut | CpuIOUserModeMask and CpuIOSuperModeMask filtered |
| 0x0C0 | CpuIOIn | CpuIOUserModeMask and CpuIOSuperModeMask filtered |
| 0x0C4 | CpuDeGlitchUserModeMask | Supervisor data mode only |
| 0x0C8 | CpuIOInDeglitch | CpuDeGlitchUserModeMask filtered. Unrestricted Supervisor data mode access |
| Deglitch control | | |
| 0x0D0–0x0D4 | DeGlitchCount[1:0] | Supervisor data mode only |
| 0x0D8–0x0DC | DeGlitchClkSrc[1:0] | Supervisor data mode only |
| 0x0E0 | DeGlitchSelect | Supervisor data mode only |
| Motor Control | | |
| 0x0E4 | MotorCtrlUserModeEnable | Supervisor data mode only |
| 0x0E8–0x0EC | MotorMasterClkPeriod[1:0] | MotorCtrlUserModeEnable enabled. |
| 0x0F0 | MotorMasterClkSrc | MotorCtrlUserModeEnable enabled. |
| 0x0F4–0x100 | MotorCtrlConfig[3:0] | MotorCtrlUserModeEnable enabled |
| 0x104 | MotorMasterClkSelect | MotorCtrlUserModeEnable enabled |
| 0x108 | MotorMasterClockEnable | MotorCtrlUserModeEnable enabled |
| BLDC Motor Controllers | | |
| 0x10C | BLDCMode | MotorCtrlUserModeEnable Enabled |
| 0x110 | BLDCDirection | MotorCtrlUserModeEnable Enabled |
| LED control | | |
| 0x114 | LEDCtrlUserModeEnable | Supervisor data mode only |
| 0x118–0x124 | LEDDutySelect[3:0] | LEDCtrlUserModeEnable[3:0] enabled |

TABLE 86-continued

GPIO supervisor and user access modes

| Register Address | Registers | Access Permitted |
|---|---|---|
| Frequency Analyser | | |
| 0x130 | FreqAnaUserModeEnable | Supervisor data mode only |
| 0x134 | FreqAnaPinSelect | FreqAnaUserModeEnable enabled |
| 0x138 | FreqAnaPinFormSelect | FreqAnaUserModeEnable enabled |
| 0x13C | FreqAnaLastPeriod | FreqAnaUserModeEnable enabled |
| 0x140 | FreqAnaAverage | FreqAnaUserModeEnable enabled |
| 0x144 | FreqAnaCountInc | FreqAnaUserModeEnable enabled |
| 0x148 | FreqAnaCount | FreqAnaUserModeEnable enabled |
| Miscellaneous | | |
| 0x150 | InterruptSrcSelect | Supervisor data mode only |
| 0x154 | DebugSelect[8:2] | Supervisor data mode only |
| 0x158–0x15C | MotorMasterCount[1:0] | Supervisor data mode only |
| 0x160 | WakeUpInputMask | Supervisor data mode only |
| 0x164 | WakeUpLevel | Supervisor data mode only |
| 0x168 | USBOverCurrentPinSelect | Supervisor data mode only |

13.11.3 GPIO Partition 13.11.4 IO Control

The IO control block connects the IO pin drivers to internal signalling based on configured setup registers and debug control signals.

```
// Output Control
for (i=0; i<32 ; i++) {
if (debug__cntrl[i] = = 1) then    // debug mode
      gpio__e[i] = 1;gpio__o[i] =debug__data__out[i]
else // normal mode
      case io__mode__select[i] is
            0 : gpio__e[i] =1 ;gpio__o[i] =led__ctrl[0]              // LED
output 1
            1 : gpio__e[i] =1 ;gpio__o[i] =led__ctrl[1]              // LED
output 2
            2 : gpio__e[i] =1 ;gpio__o[i] =led__ctrl[2]              // LED
output 3
            3 : gpio__e[i] =1 ;gpio__o[i] =led__ctrl[3]              // LED
output 4
            4 : gpio__e[i] =1 ;gpio__o[i] =motor__ctrl[0]        // Stepper
Motor Control 1
            5 : gpio__e[i] =1 ;gpio__o[i] =motor__ctrl[1]        // Stepper
Motor Control 2
            6 : gpio__e[i] =1 ;gpio__o[i] =motor__ctrl[2]        // Stepper
Motor Control 3
            7 : gpio__e[i] =1 ;gpio__o[i] =motor__ctrl[3]        // Stepper
Motor Control 4
            8 : gpio__e[i] =1 ;gpio__o[i] =bldc__ctrl[0][0]         // BLDC
Motor Control 1, output 1
            9 : gpio__e[i] =1 ;gpio__o[i] =bldc__ctrl[0][1]         // BLDC
Motor Control 1, output 2
            10: gpio__e[i] =1,gpio__o[i] =bldc__ctrl[0][2]          // BLDC
Motor Control 1, output 3
            11: gpio__e[i] =1 ;gpio__o[i] =bldc__ctrl[0][3]         // BLDC
Motor Control 1, output 4
            12: gpio__e[i] =1 ;gpio__o[i] =bldc__ctrl[0][4]         // BLDC
Motor Control 1, output 5
            13: gpio__e[i] =1 ;gpio__o[i] =bldc__ctrl[0][5]         // BLDC
Motor Control 1, output 6
            14: gpio__e[i] =1 ;gpio__o[i] =bldc__ctrl[1][0]         // BLDC
Motor Control 2, output 1
            15: gpio__e[i] =1 ;gpio__o[i] =bldc__ctrl[1][1]         // BLDC
Motor Control 2, output 2
            16: gpio__e[i] =1 ;gpio__o[i] =bldc__ctrl[1][2]         // BLDC
Motor Control 2, output 3
            17: gpio__e[i] =1 ;gpio__o[i] =bldc__ctrl[1][3]         // BLDC
Motor Control 2, output 4
            18: gpio__e[i] =1 ;gpio__o[i] =bldc__ctrl[1][4]         // BLDC
```

-continued

```
Motor Control 2, output 5
        19: gpio_e[i] =1 ;gpio_o[i] =bldc_ctrl[1][5]        // BLDC
Motor Control 2, output 6
        20: gpio_e[i] =1 ;gpio_o[i] =lss_gpio_clk[0]  // LSS Clk
0
        21: gpio_e[i] =1 ;gpio_o[i] =lss_gpio_clk[1]  // LSS Clk
1
        22:     gpio_e[i] =lss_gpio_e[0]            ;gpio_o[i]
=lss_gpio_dout[0]; // LSS Data 0
            gpio_lss_din[0] = gpio_i[i]
        23:     gpio_e[i] =lss_gpio_e[1]            ;gpio_o[i]
=lss_gpio_dout[1]; // LSS Data 1
            gpio_lss_din[1] = gpio_i[i]
        24:     gpio_e[i] =isi_gpio_e[0]            ;gpio_o[i]
=isi_gpio_dout[0]; // ISI Control 1
            gpio_isi_din[0] = gpio_i[i]
        25:     gpio_e[i] =isi_gpio_e[1]            ;gpio_o[i]
=isi_gpio_dout[1]; // ISI Control 2
            gpio_isi_din[1] = gpio_i[i]
        26:     gpio_e[i] =isi_gpio_e[2]            ;gpio_o[i]
=isi_gpio_dout[2]; // ISI Control 3
            gpio_isi_din[2] = gpio_i[i]
        27:     gpio_e[i] =isi_gpio_e[3]            ;gpio_o[i]
=isi_gpio_dout[3]; // ISI Control 4
            gpio_isi_din[3] = gpio_i[i]
        28: gpio_e[i] =cpu_io_dir[i]                ;gpio_o[i] =cpu_io_out[i];
// CPU Direct
        29:     gpio e[i]   =1 ;gpio o[i]   =usbh gpio power en
// USB host power enable
        30:     gpio e[i] =0 ;gpio o[i] =0
// Input only mode
    end case
    // all gpio are always readable by the CPU
    cpu_io_in[i] = gpio_i[i];
    }
```

The input selection pseudocode, for determining which pin connects to which de-glitch circuit.

```
    for( i=0 ;i < 10 ; i++) {
        pin_num                 = input_pin_select[i]
        deglitch_input[i]       = gpio_i[pin_num]
        }
```

The gpio_usbh_over_current output to the USB core is driven by a selected deglitched input (configured by the USBOverCurrentPinSelect register).

index=USBOverCurrentPinSelect gpio_usbh_over_current=cpu_io_in_deglitch[index]

13.11.5 Wakeup Generator

The wakeup generator compares the deglitched inputs with the configured mask (WakeUpInputMask) and level (WakeUpLevel), and determines whether to generate a wakeup to the CPR block.

```
    for (i =0;i<10; i++) {
        if (wakeup_level = 0) then                  // level 0 active
            wakeup  =  wakeup  OR  wakeup_input_mask[i]  AND  NOT
    cpu_io_in_deglitch[i]
        else                                        // level 1 active
            wakeup  =  wakeup  OR  wakeup_input_mask[i]  AND
    cpu_io_in_deglitch[i]
        }
    // assign the output
    gpio_cpr_wakeup = wakeup
```

13.11.6 LED Pulse Generator

The pulse generator logic consists of a 7-bit counter that is incremented on a 1 μs pulse from the timers block (tim_pulse[0]). The LED control signal is generated by comparing the count value with the configured duty cycle for the LED (led_duty_sel).

The logic is given by:

```
for (i=0 i<4 ;i++) { // for each LED pin
    // period divided into 8 segments
    period_div8 = cnt[6:4];
    if (period_div8 < led_duty_sel[i] ) then
        led_ctrl[i] = 1
    else
        led_ctrl[i] = 0
    }
```

-continued

```
        // update the counter every 1us pulse
        if (tim__pulse[0] = = 1) then
            cnt ++
```

13.11.7 Stepper Motor Control

The motor controller consists of 2 counters, and 4 phase generator logic blocks, one per motor control pin. The counters decrement each time a timing pulse (cnt_en) is received. The counters start at the configured clock period value (motor_mas_clk_period) and decrement to zero. If the counters are enabled (via motor_mas_clk_enable), the counters will automatically restart at the configured clock period value, otherwise they will wait until the counters are re-enabled.

The timing pulse period is one of pclk, 1 μs, 100 μs, 1 ms depending on the motor_mas_clk_sel signal. The counters are used to derive the phase and duty cycle of each motor control pin.

```
// decrement logic
if (cnt__en = = 1) then
    if ((mas__cnt = = 0) AND (motor__mas__clk__enable = = 1)) then
        mas__cnt = motor__mas__clk__period[15:0]
    elsif ((mas__cnt = = 0) AND (motor__mas__clk__enable = = 0)) then
        mas__cnt = 0
    else
        mas__cnt – –
    else // hold the value
        mas__cnt = mas__cnt
```

The phase generator block generates the motor control logic based on the selected clock generator (motor_mas_clk_sel) the motor control high transition point (curr_motor_ctrl_high) and the motor control low transition point (curr_motor_ctrl_low).

The phase generator maintains current copies of the motor_ctrl_config configuration value (motor_ctrl_config [31:16] becomes curr_motor_ctrl_high and motor_ctrl_config[15:0] becomes curr_motor_ctrl_low). It updates these values to the current register values when it is safe to do so without causing a glitch on the output motor pin.

Note that when reprogramming the motor_ctrl_config register to reorder the sequence of the transition points (e.g changing from low point less than high point to low point greater than high point and vice versa) care must taken to avoid introducing glitching on the output pin.

There are 4 instances one per motor control pin.

The logic is given by:

```
    // select the input counter to use
    if (motor__mas__clk__sel = = 1) then
        count = mas__cnt[1]
    else
        count = mas__cnt[0]
    // Generate the phase and duty cycle
    if (count = = curr__motor__ctrl__low) then
        motor__ctrl = 0
    elsif (count = = curr__motor__ctrl__high) then
        motor__ctrl = 1
    else
        motor__ctrl = motor__ctrl // remain the same
    // update the current registers at period boundary
    if (count = = 0) then
        curr__motor__ctrl__high = motor__ctrl__config[31:16]     //
```

-continued

```
    update to new high value
        curr__motor__ctrl__low = motor__ctrl__config[15:0]       //
    update to new high value
```

13.11.8 Input Deglitch

The input deglitch logic rejects input states of duration less than the configured number of time units (deglitch_cnt), input states of greater duration are reflected on the output cpu_io_in_deglitch. The time units used (either pclk, 1 μs, 100 μs, 1 ms) by the deglitch circuit is selected by the deglitch_clk_src bus.

There are 2 possible sets of deglitch_cnt and deglitch_clk_src that can be used to deglitch the input pins. The values used are selected by the deglitch_sel signal.

There are 10 deglitch circuits in the GPIO. Any GPIO pin can be connected to a deglitch circuit. Pins are selected for deglitching by the InputPinSelect registers.

Each selected input can be used to generate an interrupt. The interrupt can be generated from the raw input signal (deglitch_input) or a deglitched version of the input (cpu_io_in_deglitch). The interrupt source is selected by the interrupt_src_select signal.

The counter logic is given by

```
    if (deglitch__input != deglitch__input__delay) then
        cnt                             = deglitch__cnt
        output__en                      = 0
    elsif (cnt = = 0 ) then
        cnt                             = cnt
        output__en                      = 1
    elsif (cnt__en = = 1) then
        cnt – –
        output__en                      = 0
```

13.11.9 Frequency Analyser

The frequency analyser block monitors a selected deglitched input (cpu_io_in_deglitch) or a direct selected input (deglitch_input) and detects positive edges. The selected input is configured by FreqAnaPinSelect and FreqAnaPinFormSel registers. Between successive positive edges detected on the input it increments a counter (FreqAnaCount) by a programmed amount (FreqAnaCountInc) on each clock cycle. When a positive edge is detected the FreqAnaLastPeriod register is updated with the top 16 bits of the counter and the counter is reset. The frequency analyser also maintains a running average of the FreqAnaLastPeriod register. Each time a positive edge is detected on the input the FreqAnaAverage register is updated with the new calculated FreqAnaLastPeriod. The average is calculated as ⅞ the current value plus ⅛ of the new value. The FreqAnaLastPeriod, FreqAnaCount and FreqAnaAverage registers can be written to by the CPU.

The pseudocode is given by

```
    if ((pin = = 1) AND pin__delay = =0)) then    // positive edge
    detected
        freq__ana__lastperiod[15:0] = freq__ana__count[31:16]
        freq__ana__average[15:0]         = freq__ana__average[15:0]    –
    freq__ana__average [15:3]
                                          +
    freq__ana__lastperiod[15:3]
        freq__ana__count[15:0]         = 0
    else
```

-continued

```
        freq_ana_count[31:0]        = freq_ana_count[31:0] +
freq_ana_count_inc[19:0]
// implement the configuration register write
if (wr_last_en = = 1) then
        freq_ana_lastperiod = wr_data
elsif (wr_average_en = = 1 ) then
        freq_ana_average = wr_data
elsif (wr_freq_count_en = = 1) then
        freq_ana_count = wr_data
```

13.11.10 BLDC Motor Controller

The BLDC controller logic is identical for both instances, only the input connections are different. The logic implements the truth table shown in Table. The six q outputs are combinationally based on the direction, ha, hb, hc and pwm inputs. The direction input has 2 possible sources selected by the mode, the pseudocode is as follows

```
// determine if in internal or external direction mode
if (mode = = 1) then                    // internal mode
    direction = int_direction
else                                    // external mode
    direction = ext_direction
```

14 Interrupt Controller Unit (ICU)

The interrupt controller accepts up to N input interrupt sources, determines their priority, arbitrates based on the highest priority and generates an interrupt request to the CPU. The ICU complies with the interrupt acknowledge protocol of the CPU. Once the CPU accepts an interrupt (i.e. processing of its service routine begins) the interrupt controller will assert the next arbitrated interrupt if one is pending.

Each interrupt source has a fixed vector number N, and an associated configuration register, IntReg[N]. The format of the IntReg[N] register is shown in Table 87 below.

TABLE 87

IntReg[N] register format

| Field | bit(s) | Description |
|---|---|---|
| Priority | 3:0 | Interrupt priority |
| Type | 5:4 | Determines the triggering conditions for the interrupt<br>00 - Positive edge<br>10 - Negative edge<br>01 - Positive level<br>11 - Negative level |
| Mask | 6 | Mask bit.<br>1 - Interrupts from this source are enabled,<br>0 - Interrupts from this source are disabled.<br>Note that there may be additional masks in operation at the source of the interrupt. |
| Reserved | 31:7 | Reserved. Write as 0. |

Once an interrupt is received the interrupt controller determines the priority and maps the programmed priority to the appropriate CPU priority levels, and then issues an interrupt to the CPU. The programmed interrupt priority maps directly to the LEON CPU interrupt levels. Level 0 is no interrupt. Level 15 is the highest interrupt level.

14.1 Interrupt Preemption

With standard LEON pre-emption an interrupt can only be pre-empted by an interrupt with a higher priority level. If an interrupt with the same priority level (1 to 14) as the interrupt being serviced becomes pending then it is not acknowledged until the current service routine has completed. Note that the level 15 interrupt is a special case, in that the LEON processor will continue to take level 15 interrupts (i.e re-enter the ISR) as long as level 15 is asserted on the icu_cpu_ilevel. Level 0 is also a special case, in that LEON consider level 0 interrupts as no interrupt, and will not issue an acknowledge when level 0 is presented on the icu_cpu_ilevel bus.

Thus when pre-emption is required, interrupts should be programmed to different levels as interrupt priorities of the same level have no guaranteed servicing order. Should several interrupt sources be programmed with the same priority level, the lowest value interrupt source will be serviced first and so on in increasing order.

The interrupt is directly acknowledged by the CPU and the ICU automatically clears the pending bit of the lowest value pending interrupt source mapped to the acknowledged interrupt level.

All interrupt controller registers are only accessible in supervisor data mode. If the user code wishes to mask an interrupt it must request this from the supervisor and the supervisor software will resolve user access levels.

14.2 Interrupt Sources

The mapping of interrupt sources to interrupt vectors (and therefore IntReg[N] registers) is shown in Table 88 below. Please refer to the appropriate section of this specification for more details of the interrupt sources.

TABLE 88

Interrupt sources vector table

| Vector | Source | Description |
|---|---|---|
| 0 | Timers | WatchDog Timer Update request |
| 1 | Timers | Generic Timer 1 interrupt |
| 2 | Timers | Generic Timer 2 interrupt |
| 3 | PCU | PEP Sub-system Interrupt- TE finished band |
| 4 | PCU | PEP Sub-system Interrupt- LBD finished band |
| 5 | PCU | PEP Sub-system Interrupt- CDU finished band |
| 6 | PCU | PEP Sub-system Interrupt- CDU error |
| 7 | PCU | PEP Sub-system Interrupt- PCU finished band |
| 8 | PCU | PEP Sub-system Interrupt- PCU Invalid address interrupt |
| 9 | PHI | PEP Sub-system Interrupt- PHI Line Sync Interrupt |
| 10 | PHI | PEP Sub-system Interrupt- PHI Buffer underrun |
| 11 | PHI | PEP Sub-system Interrupt- PHI Page finished |
| 12 | PHI | PEP Sub-system Interrupt- PHI Print ready |
| 13 | SCB | USB Host interrupt |
| 14 | SCB | USB Device interrupt |
| 15 | SCB | ISI interrupt |
| 16 | SCB | DMA interrupt |
| 17 | LSS | LSS interrupt, LSS interface 0 interrupt request |
| 18 | LSS | LSS interrupt, LSS interface 1 interrupt request |
| 19–28 | GPIO | GPIO general purpose interrupts |
| 29 | Timers | Generic Timer 3 interrupt |

14.3 Implentation 14.3.1 Definitions of I/O

TABLE 89

Interrupt Controller Unit I/O definition

| Port name | Pins | I/O | Description |
|---|---|---|---|
| Clocks and Resets | | | |
| Pclk | 1 | In | System Clock |
| prst_n | 1 | In | System reset, synchronous active low |
| CPU interface | | | |
| cpu_adr[7:2] | 6 | In | CPU address bus. Only 6 bits are required to decode the address space for the ICU block |
| cpu_dataout[31:0] | 32 | In | Shared write data bus from the CPU |
| icu_cpu_data[31:0] | 32 | Out | Read data bus to the CPU |
| cpu_rwn | 1 | In | Common read/not-write signal from the CPU |
| cpu_icu_sel | 1 | In | Block select from the CPU. When cpu_icu_sel is high both cpu_adr and cpu_dataout are valid |
| icu_cpu_rdy | 1 | Out | Ready signal to the CPU. When icu_cpu_rdy is high it indicates the last cycle of the access. For a write cycle this means cpu_dataout has been registered by the ICU block and for a read cycle this means the data on icu_cpu_data is valid. |
| icu_cpu_ilevel[3:0] | 4 | Out | Indicates the priority level of the current active interrupt. |
| cpu_iack | 1 | In | Interrupt request acknowledge from the LEON core. |
| cpu_icu_ilevel[3:0] | 4 | In | Interrupt acknowledged level from the LEON core |
| icu_cpu_berr | 1 | Out | Bus error signal to the CPU indicating an invalid access. |
| cpu_acode[1:0] | 2 | In | CPU Access Code signals. These decode as follows:<br>00 - User program access<br>01 - User data access<br>10 - Supervisor program access<br>11 - Supervisor data access |
| icu_cpu_debug_valid | 1 | Out | Debug Data valid on icu_cpu_data bus. Active high |
| Interrupts | | | |
| tim_icu_wd_irq | 1 | In | Watchdog timer interrupt signal from the Timers block |
| tim_icu_irq[2:0] | 3 | In | Generic timer interrupt signals from the Timers block |
| gpio_icu_irq[9:0] | 10 | In | GPIO pin interrupts |
| usb_icu_irq[1:0] | 2 | In | USB host and device interrupts from the SCB<br>Bit 0 - USB Host interrupt<br>Bit 1 - USB Device interrupt |
| isi_icu_irq | 1 | In | ISI interrupt from the SCB |
| dma_icu_irq | 1 | In | DMA interrupt from the SCB |
| lss_icu_irq[1:0] | 2 | In | LSS interface interrupt request |
| cdu_finishedband | 1 | In | Finished band interrupt request from the CDU |
| cdu_icu_jpegerror | 1 | In | JPEG error interrupt from the CDU |
| lbd_finishedband | 1 | In | Finished band interrupt request from the LBD |
| te_finishedband | 1 | In | Finished band interrupt request from the TE |
| pcu_finishedband | 1 | In | Finished band interrupt request from the PCU |
| pcu_icu_address_invalid | 1 | In | Invalid address interrupt request from the PCU |
| phi_icu_underrun | 1 | In | Buffer underrun interrupt request from the PHI |
| phi_icu_page_finish | 1 | In | Page finished interrupt request from the PHI |
| phi_icu_print_rdy | 1 | In | Print ready interrupt request from the PHI |
| phi_icu_linesync_int | 1 | In | Line sync interrupt request from the PHI |

14.3.2 Configuration Registers

The configuration registers in the ICU are programmed via the CPU interface. Refer to section 11.4 on page 69 for a description of the protocol and timing diagrams for reading and writing registers in the ICU. Note that since addresses in SoPEC are byte aligned and the CPU only supports 32-bit register reads and writes, the lower 2 bits of the CPU address bus are not required to decode the address space for the ICU. When reading a register that is less than 32 bits wide zeros should be returned on the upper unused bit(s) of icu_pcu_data. Table 90 lists the configuration registers in the ICU block.

The ICU block will only allow supervisor data mode accesses (i.e. cpu_acode[1:0]=SUPERVISOR_DATA). All other accesses will result in icu_cpu_berr being asserted.

TABLE 90

ICU Register Map

| Address ICU_base + | Register | #bits | Reset | Description |
|---|---|---|---|---|
| 0x00–0x74 | IntReg[29:0] | 30 × 7 | 0x00 | Interrupt vector configuration register |
| 0x88 | IntClear | 30 | 0x0000_0000 | Interrupt pending clear register. If written with a one it clears corresponding interrupt Bits[30:0] - Interrupts sources 30 to 0 (Reads as zero) |
| 0x90 | IntPending | 30 | 0x0000_0000 | Interrupt pending register. (Read Only) Bits[30:0]- Interrupts sources 30 to 0 |
| 0xA0 | IntSource | 5 | 0x1F | Indicates the interrupt source of the last acknowledged interrupt. The NoInterrupt value is defined as all bits set to one. (Read Only) |
| 0xC0 | DebugSelect[7:2] | 6 | 0x00 | Debug address select. Indicates the address of the register to report on the icu_cpu_data bus when it is not otherwise being used. |

14.3.3 ICU Partition 114.3.4 Interrupt Detect

The ICU contains multiple instances of the interrupt detect block, one per interrupt source. The interrupt detect block examines the interrupt source signal, and determines whether it should generate request pending (int_pend) based on the configured interrupt type and the interrupt source conditions. If the interrupt is not masked the interrupt will be reflected to the interrupt arbiter via the int_active signal. Once an interrupt is pending it remains pending until the interrupt is accepted by the CPU or it is level sensitive and gets removed. Masking a pending interrupt has the effect of removing the interrupt from arbitration but the interrupt will still remain pending.

When the CPU accepts the interrupt (using the normal ISR mechanism), the interrupt controller automatically generates an interrupt clear for that interrupt source (cpu_int_clear). Alternatively if the interrupt is masked, the CPU can determine pending interrupts by polling the IntPending registers. Any active pending interrupts can be cleared by the CPU without using an ISR via the IntClear registers.

Should an interrupt clear signal (either from the interrupt clear unit or the CPU) and a new interrupt condition happen at the same time, the interrupt will remain pending. In the particular case of a level sensitive interrupt, if the level remains the interrupt will stay active regardless of the clear signal.

The logic is shown below:

```
mask                    = int_config[6]
type                    = int_config[5:4]
int_pend                = last_int_pend // the last pending
interrupt
// update the pending FF
// test for interrupt condition
if (type = = NEG_LEVEL) then
    int_pend = NOT (int_src)
elsif (type = = POS_LEVEL)
    int_pend = int_src
elsif ((type = = POS_EDGE ) AND (int_src = = 1) AND
(last_int_src = = 0))
    int_pend = 1
elsif ((type = = NEG_EDGE ) AND (int_src = = 0) AND
(last_int_src = = 1) )
    int_pend = 1
elsif ((int_clear = = 1 ) OR (cpu_int_clear= =1) ) then
```

-continued

```
    int_pend = 0
else
    int_pend = last_int_pend // stay the same as before
// mask the pending bit
if (mask = = 1) then
    int_active          = int_pend
else
    int_active          = 0
// assign the registers
last_int_src            = int_src
last_int_pend           = int_pend
```

14.3.5 Interrupt Arbiter

The interrupt arbiter logic arbitrates a winning interrupt request from multiple pending requests based on configured priority. It generates the interrupt to the CPU by setting icu_cpu_ilevel to a non-zero value. The priority of the interrupt is reflected in the value assigned to icu_cpu_ilevel, the higher the value the higher the priority, 15 being the highest, and 0 considered no interrupt.

```
// arbitrate with the current winner
int_ilevel        = 0
for (i=0;i<30;i++) {
    if ( int_active[i] = = 1) then {
        if (int_config[i][3:0] > win_int_ilevel[3:0] ) then
            win_int_ilevel[3:0] = int_config[i][3:0]
            }
        }
    }
// assign the CPU interrupt level
int_ilevel = win_int_ilevel[3:0]
```

14.3.6 Interrupt Clear Unit

The interrupt clear unit is responsible for accepting an interrupt acknowledge from the CPU, determining which interrupt source generated the interrupt, clearing the pending bit for that source and updating the IntSource register.

When an interrupt acknowledge is received from the CPU, the interrupt clear unit searches through each interrupt source looking for interrupt sources that match the acknowledged interrupt level (cpu_icu_ilevel) and determines the winning interrupt (lower interrupt source numbers have higher priority). When found the interrupt source pending bit is cleared and the IntSource register is updated with the interrupt source number.

The LEON interrupt acknowledge mechanism automatically disables all other interrupts temporarily until it has correctly saved state and jumped to the ISR routine. It is the responsibility of the ISR to re-enable the interrupts. To prevent the IntSource register indicating the incorrect source for an interrupt level, the ISR must read and store the IntSource value before re-enabling the interrupts via the Enable Traps (ET) field in the Processor State Register (PSR) of the LEON.

See section 11.9 on page 104 for a complete description of the interrupt handling procedure. After reset the state machine remains in Idle state until an interrupt acknowledge is received from the CPU (indicated by cpu_iack). When the acknowledge is received the state machine transitions to the Compare state, resetting the source counter (cnt) to the number of interrupt sources.

While in the Compare state the state machine cycles through each possible interrupt source in decrementing order. For each active interrupt source the programmed priority (int_priority[cnt][3:0]) is compared with the acknowledged interrupt level from the CPU (cpu_icu_ilevel), if they match then the interrupt is considered the new winner. This implies the last interrupt source checked has the highest priority, e.g interrupt source zero has the highest priority and the first source checked has the lowest priority. After all interrupt sources are checked the state machine transitions to the IntClear state, and updates the int_source register on the transition.

Should there be no active interrupts for the acknowledged level (e.g. a level sensitive interrupt was removed), the IntSource register will be set to NoInterrupt. NoInterrupt is defined as the highest possible value that IntSource can be set to (in this case 0x1F), and the state machine will return to Idle.

The exact number of compares performed per clock cycle is dependent the number of interrupts, and logic area to logic speed trade-off, and is left to the implementer to determine. A comparison of all interrupt sources must complete within 8 clock cycles (determined by the CPU acknowledge hardware).

When in the IntClear state the state machine has determined the interrupt source to clear (indicated by the int_source register). It resets the pending bit for that interrupt source, transitions back to the Idle state and waits for the next acknowledge from the CPU.

The minimum time between successive interrupt acknowledges from the CPU is 8 cycles.

15 Timers Block (TIM)

The Timers block contains general purpose timers, a watchdog timer and timing pulse generator for use in other sections of SoPEC.

15.1 Watchdog Timer

The watchdog timer is a 32 bit counter value which counts down each time a timing pulse is received. The period of the timing pulse is selected by the WatchDogUnitSel register. The value at any time can be read from the WatchDogTimer register and the counter can be reset by writing a non-zero value to the register. When the counter transitions from 1 to 0, a system wide reset will be triggered as if the reset came from a hardware pin.

The watchdog timer can be polled by the CPU and reset each time it gets close to 1, or alternatively a threshold (WatchDogIntThres) can be set to trigger an interrupt for the watchdog timer to be serviced by the CPU. If the WatchDogIntThres is set to N, then the interrupt will be triggered on the N to N−1 transition of the WatchDogTimer. This interrupt can be effectively masked by setting the threshold to zero. The watchdog timer can be disabled, without causing a reset, by writing zero to the WatchDogTimer register.

15.2 Timing Pulse Generator

The timing block contains a timing pulse generator clocked by the system clock, used to generate timing pulses of programmable periods. The period is programmed by accessing the TimerStartValue registers. Each pulse is of one system clock duration and is active high, with the pulse period accurate to the system clock frequency. The periods after reset are set to 1 us, 100 us and 100 ms.

The timing pulse generator also contains a 64-bit free running counter that can be read or reset by accessing the FreeRunCount registers. The free running counter can be used to determine elapsed time between events at system clock accuracy or could be used as an input source in low-security random number generator.

15.3 Generic Timers

SoPEC contains 3 programmable generic timing counters, for use by the CPU to time the system. The timers are programmed to a particular value and count down each time a timing pulse is received. When a particular timer decrements from 1 to 0, an interrupt is generated. The counter can be programmed to automatically restart the count, or wait until re-programmed by the CPU. At any time the status of the counter can be read from GenCntValue, or can be reset by writing to GenCntValue register. The auto-restart is activated by setting the GenCntAuto register, when activated the counter restarts at GenCntStartValue. A counter can be stopped or started at any time, without affecting the contents of the GenCntValue register, by writing a 1 or 0 to the relevent GenCntEnable register.

15.4 Implementation

15.4.1 Definitions of I/O

TABLE 91

Timers block I/O definition

| Port name | Pins | I/O | Description |
|---|---|---|---|
| Clocks and Resets | | | |
| Pclk | 1 | In | System Clock |
| prst_n | 1 | In | System reset, synchronous active low |
| tim_pulse[2:0] | 3 | Out | Timers block generated timing pulses, each one pclk wide |

TABLE 91-continued

Timers block I/O definition

| Port name | Pins | I/O | Description |
|---|---|---|---|
| | | | 0 - Nominal 1 µs pulse<br>1 - Nominal 100 µs pulse<br>2 - Nominal 10 ms pulse |
| CPU interface | | | |
| cpu_adr[6:2] | 5 | In | CPU address bus. Only 5 bits are required to decode the address space for the ICU block |
| cpu_dataout[31:0] | 32 | In | Shared write data bus from the CPU |
| tim_cpu_data[31:0] | 32 | Out | Read data bus to the CPU |
| cpu_rwn | 1 | In | Common read/not-write signal from the CPU |
| cpu_tim_sel | 1 | In | Block select from the CPU. When cpu_tim_sel is high both cpu_adr and cpu_dataout are valid |
| tim_cpu_rdy | 1 | Out | Ready signal to the CPU. When tim_cpu_rdy is high it indicates the last cycle of the access. For a write cycle this means cpu_dataout has been registered by the TIM block and for a read cycle this means the data on tim_cpu_data is valid. |
| tim_cpu_berr | 1 | Out | Bus error signal to the CPU indicating an invalid access. |
| cpu_acode[1:0] | 2 | In | CPU Access Code signals. These decode as follows:<br>00 - User program access<br>01 - User data access<br>10 - Supervisor program access<br>11 - Supervisor data access |
| tim_cpu_debug_valid | 1 | Out | Debug Data valid on tim_cpu_data bus. Active high |
| Miscellaneous | | | |
| tim_icu_wd_irq | 1 | Out | Watchdog timer interrupt signal to the ICU block |
| tim_icu_irq[2:0] | 3 | Out | Generic timer interrupt signals to the ICU block |
| tim_cpr_reset_n | 1 | Out | Watch dog timer system reset. |

15.4.2 Timers Sub-Block Partition

15.4.3 Watchdog Timer

The watchdog timer counts down from pre-programmed value, and generates a system wide reset when equal to one. When the counter passes a pre-programmed threshold (wdog_tim_thres) value an interrupt is generated (tim_icu_wd_irq) requesting the CPU to update the counter. Setting the counter to zero disables the watchdog reset. In supervisor mode the watchdog counter can be written to or read from at any time, in user mode access is denied. Any accesses in user mode will generate a bus error.

The counter logic is given by

```
if (wdog_wen == 1) then
    wdog_tim_cnt = write_data                // load new data
elsif ( wdog_tim_cnt == 0) then
    wdog_tim_cnt = wdog_tim_cnt              // count disabled
elsif ( cnt_en == 1 ) then
    wdog_tim_cnt--
else
    wdog_tim_cnt = wdog_tim_cnt
```

The timer decode logic is

```
if (( wdog_tim_cnt == wdog_tim_thres) AND (wdog_tim_cnt != 0
)AND (cnt_en == 1)) then
    tim_icu_wd_irq = 1
else
    tim_icu_wd_irq = 0
// reset generator logic
if (wdog_tim_cnt == 1) AND (cnt_en == 1) then
    tim_cpr_reset_n = 0
```

-continued

```
else
    tim_cpr_reset_n = 1
```

15.4.4 Generic Timers

The generic timers block consists of 3 identical counters. A timer is set to a pre-configured value (GenCntStartValue) and counts down once per selected timing pulse (gen_unit_sel). The timer can be enabled or disabled at any time (gen_tim_en), when disabled the counter is stopped but not cleared. The timer can be set to automatically restart (gen_tim_auto) after it generates an interrupt. In supervisor mode a timer can be written to or read from at any time, in user mode access is determined by the GenCntUserModeEnable register settings.

```
The counter logic is given by
if (gen_wen == 1) then
    gen_tim_cnt = write_data
elsif (( cnt_en == 1 )AND (gen_tim_en == 1 )) then
    if ( gen_tim_cnt == 1) OR ( gen_tim_cnt == 0)   then   //
counter may need re-starting
        if (gen_tim_auto == 1) then
            gen_tim_cnt = gen_tim_cnt_st_value
        else
            gen_tim_cnt = 0                          // hold
count at zero
    else
        gen_tim_cnt--
else
    gen_tim_cnt = gen_tim_cnt
The decode logic is
if (gen_tim_cnt == 1)AND ( cnt_en == 1 )AND (gen_tim_en == 1
```

-continued

```
) then
    tim_icu_irq = 1
else
    tim_icu_irq = 0
```

15.4.5 Timing Pulse Generator

The timing pulse generator contains a general free running 64-bit timer and 3 timing pulse generators producing timing pulses of one cycle duration with a programmable period. The period is programmed by changed the TimerStartValue registers, but have a nominal starting period of 1 μs, 100 μs and 1 ms. In supervisor mode the free running timer register can be written to or read from at any time, in user mode access is denied. The status of each of the timers can be read by accessing the PulseTimerStatus registers in supervisor mode. Any accesses in user mode will result in a bus error.

15.4.5.1 Free Run Timer

The increment logic block increments the timer count on each clock cycle. The counter wraps around to zero and continues incrementing if overflow occurs. When the timing register (FreeRunCount) is written to, the configuration registers block will set the free_run_wen high for a clock cycle and the value on write_data will become the new count value. If free_run_wen[1] is 1 the higher 32 bits of the counter will be written to, otherwise if free_run_wen[0] the lower 32 bits ar written to. It is the responsibility of software to handle these writes in a sensible manner.

The increment logic is given by

```
if (free_run_wen[1] = = 1) then
    free_run_cnt[63:32] = write_data
elsif (free run wen[0] = = 1) then
    free_run_cnt[31:0]   = write_data
else
    free_run_cnt ++
```

15.4.5.2 Pulse Timers

The pulse timer logic generates timing pulses of 1 clock cycle length and programmable period. Nominally they generate pulse periods of 1 μs, 100 μs and 1 ms. The logic for timer 0 is given by:

```
// Nominal 1us generator
if (pulse_0_cnt = = 0 ) then
    pulse_0_cnt = timer_start_value[0]
    tim_pulse[0] = 1
else
    pulse_0_cnt - -
    tim_pulse[0] = 0
```

The logic for timer 1 is given by:

```
// 100us generator
if ((pulse_1_cnt = = 0) AND (tim_pulse[0] = = 1)) then
    pulse_1_cnt = timer_start_value[1]
    tim_pulse[1] = 1
elsif (tim_pulse[0] = = 1) then
    pulse_1_cnt --
    tim_pulse[1] = 0
else
    pulse_1_cnt = pulse_1_cnt
    tim_pulse[1] = 0
```

The logic for the timer 2 is given by:

```
// 10ms generator
if ((pulse_2_cnt = = 0 ) AND (tim_pulse[1] = = 1)) then
    pulse_2_cnt = timer_start_value[2]
    tim_pulse[2] = 1
elsif (tim_pulse[1] = = 1) then
    pulse_2_cnt --
    tim_pulse[2] = 0
else
    pulse_2_cnt = pulse_2_cnt
    tim_pulse[2] = 0
```

15.4.6 Configuration Registers

The configuration registers in the TIM are programmed via the CPU interface. Refer to section 11.4.3 on page 69 for a description of the protocol and timing diagrams for reading and writing registers in the TIM. Note that since addresses in SoPEC are byte aligned and the CPU only supports 32-bit register reads and writes, the lower 2 bits of the CPU address bus are not required to decode the address space for the TIM. When reading a register that is less than 32 bits wide zeros should be returned on the upper unused bit(s) of tim_pcu_data. Table 92 lists the configuration registers in the TIM block.

TABLE 92

Timers Register Map

| Address TIM_base+ | Register | #bits | Reset | Description |
|---|---|---|---|---|
| 0x00 | WatchDogUnitSel | 2 | 0x0 | Specifies the units used for the watchdog timer:<br>0 - Nominal 1 μs pulse<br>1 - Nominal 100 μs pulse<br>2 - Nominal 10 ms pulse<br>3 - pclk |
| 0x04 | WatchDogTimer | 32 | 0xFFFF_FFFF | Specifies the number of units to count before watchdog timer triggers. |
| 0x08 | WatchDogIntThres | 32 | 0x0000_0000 | Specifies the threshold value below which the watchdog timer issues an interrupt |

TABLE 92-continued

Timers Register Map

| Address TIM_base+ | Register | #bits | Reset | Description |
|---|---|---|---|---|
| 0x0C–0x10 | FreeRunCount[1:0] | 2 × 32 | 0x0000_0000 | Direct access to the free running counter register.<br>Bus 0 - Access to bits 31–0<br>Bus 1 - Access to bits 63–32 |
| 0x14 to 0x1C | GenCntStartValue[2:0] | 3 × 32 | 0x0000_0000 | Generic timer counter start value, number of units to count before event |
| 0x20 to 0x28 | GenCntValue[2:0] | 3 × 32 | 0x0000_0000 | Direct access to generic timer counter registers |
| 0x2C to 0x34 | GenCntUnitSel[2:0] | 3 × 2 | 0x0 | Generic counter unit select. Selects the timing units used with corresponding counter:<br>0 - Nominal 1 μs pulse<br>1 - Nominal 100 μs pulse<br>2 - Nominal 10 ms pulse<br>3 - pclk |
| 0x38 to 0x40 | GenCntAuto[2:0] | 3 × 1 | 0x0 | Generic counter auto re-start select. When high timer automatically restarts, otherwise timer stops. |
| 0x44 to 0x4C | GenCntEnable[2:0] | 3 × 1 | 0x0 | Generic counter enable.<br>0 - Counter disabled<br>1 - Counter enabled |
| 0x50 | GenCntUserModeEnable | 3 | 0x0 | User Mode Access enable to generic timer configuration register. When 1 user access is enabled.<br>Bit 0 - Generic timer 0<br>Bit 1 - Generic timer 1<br>Bit 2 - Generic timer 2 |
| 0x54 to 0x5C | TimerStartValue[2:0] | 3 × 8 | 0x7F,<br>0x63,<br>0x63 | Timing pulse generator start value. Indicates the start value for each timing pulse timers. For timer 0 the start value specifies the timer period in pclk cycles - 1.<br>For timer 1 the start value specifies the timer period in timer 0 intervals - 1.<br>For timer 2 the start value specifies the timer period in timer 1 intervals - 1.<br>Nominally the timers generate pulses at 1 us, 100 us and 10 ms intervals respectively. |
| 0x60 | DebugSelect[6:2] | 5 | 0x00 | Debug address select. Indicates the address of the register to report on the tim_cpu_data bus when it is not otherwise being used. |
| Read Only Registers | | | | |
| 0x64 | PulseTimerStatus | 24 | 0x00 | Current pulse timer values, and pulses<br>7:0 - Timer 0 count<br>15:8 - Timer 1 count<br>23:16 - Timer 2 count<br>24 - Timer 0 pulse<br>25 - Timer 1 pulse<br>26 - Timer 2 pulse |

15.4.6.1 Supervisor and User Mode Access

The configuration registers block examines the CPU access type (cpu_acode signal) and determines if the access is allowed to that particular register, based on configured user access registers. If an access is not allowed the block will issue a bus error by asserting the tim_cpu_berr signal.

The timers block is fully accessible in supervisor data mode, all registers can written to and read from. In user mode access is denied to all registers in the block except for the generic timer configuration registers that are granted user data access. User data access for a generic timer is granted by setting corresponding bit in the GenCntUserModeEnable register. This can only be changed in supervisor data mode. If a particular timer is granted user data access then all registers for configuring that timer will be accessible. For example if timer 0 is granted user data access the GenCntStartValue[0], GenCntUnitSel[0], GenCntAuto[0], GenCntEnable[0] and GenCntValue[0] registers can all be written to and read from without any restriction.

Attempts to access a user data mode disabled timer configuration register will result in a bus error. Table 93 details the access modes allowed for registers in the TIM block. In supervisor data mode all registers are accessable. All forbidden accesses will result in a bus error (tim_cpu_berr asserted).

TABLE 93

| TIM supervisor and user access modes | | |
|---|---|---|
| Register Address | Registers | Access Permission |
| 0x00 | WatchDogUnitSel | Supervisor data mode only |
| 0x04 | WatchDogTimer | Supervisor data mode only |
| 0x08 | WatchDogIntThres | Supervisor data mode only |
| 0x0C–0x10 | FreeRunCount | Supervisor data mode only |
| 0x14 | GenCntStartValue[0] | GenCntUserModeEnable[0] |
| 0x18 | GenCntStartValue[1] | GenCntUserModeEnable[1] |
| 0x1C | GenCntStartValue[2] | GenCntUserModeEnable[2] |
| 0x20 | GenCntValue[0] | GenCntUserModeEnable[0] |
| 0x24 | GenCntValue[1] | GenCntUserModeEnable[1] |
| 0x28 | GenCntValue[2] | GenCntUserModeEnable[2] |
| 0x2C | GenCntUnitSel[0] | GenCntUserModeEnable[0] |
| 0x30 | GenCntUnitSel[1] | GenCntUserModeEnable[1] |
| 0x34 | GenCntUnitSel[2] | GenCntUserModeEnable[2] |
| 0x38 | GenCntAuto[0] | GenCntUserModeEnable[0] |
| 0x3C | GenCntAuto[1] | GenCntUserModeEnable[1] |
| 0x40 | GenCntAuto[2] | GenCntUserModeEnable[2] |
| 0x44 | GenCntEnable[0] | GenCntUserModeEnable[0] |
| 0x48 | GenCntEnable[1] | GenCntUserModeEnable[1] |
| 0x4C | GenCntEnable[2] | GenCntUserModeEnable[2] |
| 0x50 | GenCntUserModeEnable | Supervisor data mode only |
| 0x54–0x5C | TimerStartValue[2:0] | Supervisor data mode only |
| 0x60 | DebugSelect | Supervisor data mode only |
| 0x64 | PulseTimerStatus | Supervisor data mode only |

16 Clocking, Power and Reset (CPR)

The CPR block provides all of the clock, power enable and reset signals to the SoPEC device.

16.1 Powerdown Modes

The CPR block is capable of powering down certain sections of the SoPEC device. When a section is powered down (i.e. put in sleep mode) no state is retained (except the PSS storage), the CPU must re-initialize the section before it can be used again.

For the purpose of powerdown the SoPEC device is divided into sections:

TABLE 94

| Powerdown sectioning | |
|---|---|
| Section | Block |
| Print Engine Pipeline SubSystem (Section 0) | PCU |
| | CDU |
| | CFU |
| | LBD |
| | SFU |
| | TE |
| | TFU |
| | HCU |
| | DNC |
| | DWU |
| | LLU |
| | PHI |
| CPU-DRAM (Section 1) | DRAM |
| | CPU/MMU |
| | DIU |
| | TIM |
| | ROM |
| | LSS |
| | PSS |
| | ICU |
| ISI Subsystem (Section 2) | ISI (SCB) |
| | DMA Ctrl (SCB) |
| | GPIO |
| USB Subsystem (Section 3) | USB (SCB) |

Note that the CPR block is not located in any section. All configuration registers in the CPR block are clocked by an ungateable clock and have special reset conditions.

16.1.1 Sleep Mode

Each section can be put into sleep mode by setting the corresponding bit in the SleepModeEnable register. To re-enable the section the sleep mode bit needs to be cleared and then the section should be reset by writing to the relevant bit in the ResetSection register. Each block within the section should then be re-configured by the CPU.

If the CPU system (section 1) is put into sleep mode, the SoPEC device will remain in sleep mode until a system level reset is initiated from the reset pin, or a wakeup reset by the SCB block as a result of activity on either the USB or ISI bus. The watchdog timer cannot reset the device as it is in section 1 also, and will be in sleep mode.

If the CPU and ISI subsystem are in sleep mode only a reset from the USB or a hardware reset will re-activate the SoPEC device.

If all sections are put into sleep mode, then only a system level reset initiated by the reset pin will re-activate the SoPEC device.

Like all software resets in SoPEC the ResetSection register is active-low i e. a 0 should be written to each bit position requiring a reset. The ResetSection register is self-reseting.

16.1.2 Sleep Mode Powerdown Procedure

When powering down a section, the section may retain it's current state (although not gauranteed to). It is possible when powering back up a section that inconsistencies between interface state machines could cause incorrect operation. In order to prevent such condition from happening, all blocks in a section must be disabled before powering down. This will ensure that blocks are restored in a benign state when powered back up.

In the case of PEP section units setting the Go bit to zero will disable the block. The DRAM subsystem can be effectively disabled by setting the RotationSync bit to zero, and the SCB system disabled by setting the DMAAccessEn bits to zero turning off the DMA access to DRAM. Other CPU subsystem blocks without any DRAM access do not need to be disabled.

16.2 Reset Source

The SoPEC device can be reset by a number of sources. When a reset from an internal source is initiated the reset source register (ResetSrc) stores the reset source value. This register can then be used by the CPU to determine the type of boot sequence required.

16.3 Clock Relationship

The crystal oscillator excites a 32 MHz crystal through the xtalin and xtalout pins. The 32 MHz output is used by the PLL to derive the master VCO frequency of 960 MHz. The master clock is then divided to produce 320 MHz clock (clk320), 160 MHz clock (clk160) and 48 MHz (clk48) clock sources.

The phase relationship of each clock from the PLL will be defined. The relationship of internal clocks clk320, clk48 and clk160 to xtalin will be undefined.

At the output of the clock block, the skew between each pclk domain (pclk_section[2:0] and jclk) should be within skew tolerances of their respective domains (defined as less than the hold time of a D-type flip flop).

The skew between doclk and pclk should also be less than the skew tolerances of their respective domains.

The usbclk is derived from the PLL output and has no relationship with the other clocks in the system and is considered asynchronous.

16.4 PLL Control

The PLL in SoPEC can be adjusted by programming the PLLRangeA, PLLRangeB, PLLTunebits and PLLMult registers. If these registers are changed by the CPU the values are not updated until the PLLUpdate register is written to. Writing to the PLLUpdate register triggers the PLL control state machine to update the PLL configuration in a safe way. When an update is active (as indicated by PLLUpdate register) the CPU must not change any of the configuration registers, doing so could cause the PLL to lose lock indefintely, requiring a hardware reset to recover. Configuring the PLL registers in an inconsistent way can also cause the PLL to lose lock, care must taken to keep the PLL configuration within specified parameters.

The VCO frequency of the PLL is calculated by the number of divider in the feedback path. PLL output A is used as the feedback source.

$$VCO\text{freq}=REFCLK\times PLL\text{Mult}\times PLL\text{Range}A\times\text{External divider}$$

$$VCO\text{freq}=32\times 3\times 10\times 1=960\text{ Mhz.}$$

In the default PLL setup, PLLMult is set to 3, PLLRangeA is set to 3 which corresponds to a divide by 10, PLLRangeB is set to 5 which corresponds to a divide by 3.

$$PLL\text{outa}=VCO\text{freq}/PLL\text{Range}A=960\text{ Mhz}/10=96\text{ Mhz}$$

$$PLL\text{outb}=VCO\text{freq}/PLL\text{Range}B=960\text{ Mhz}/3=320\text{ Mhz}$$

See [16] for complete PLL setup parameters.

16.5 Implementation 16.5.1 Definitions of I/O

TABLE 95

CPR I/O definition

| Port name | Pins | I/O | Description |
|---|---|---|---|
| Clocks and Resets | | | |
| Xtalin | 1 | In | Crystal input, direct from IO pin. |
| Xtalout | 1 | Inout | Crystal output, direct to IO pin. |
| pclk_section[3:0] | 4 | Out | System clocks for each section |
| Doclk | 1 | Out | Data out clock (2× pclk) for the PHI block |
| Jclk | 1 | Out | Gated version of system clock used to clock the JPEG decoder core in the CDU |
| Usbclk | 1 | Out | USB clock, nominally at 48 Mhz |
| jclk_enable | 1 | In | Gating signal for jclk. When 1 jclk is enabled |
| reset_n | 1 | In | Reset signal from the reset_n pin |
| usb_cpr_reset_n | 1 | In | Reset signal from the USB block |
| isi_cpr_reset_n | 1 | In | Reset signal from the ISI block |
| tim_cpr_reset_n | 1 | In | Reset signal from watch dog timer. |
| gpio_cpr_wakeup | 1 | In | SoPEC wake up from the GPIO, active high. |
| prst_n_section[3:0] | 4 | Out | System resets for each section, synchronous active low |
| dorst_n | 1 | Out | Reset for PHI block, synchronous to doclk |
| jrst_n | 1 | Out | Reset for JPEG decoder core in CDU block, synchronous to jclk |

TABLE 95-continued

CPR I/O definition

| Port name | Pins | I/O | Description |
|---|---|---|---|
| usbrst_n | 1 | Out | Reset for the USB block, synchronous to usbclk |
| CPU interface | | | |
| cpu_adr[5:2] | 3 | In | CPU address bus. Only 4 bits are required to decode the address space for the CPR block |
| cpu_dataout[31:0] | 32 | In | Shared write data bus from the CPU |
| cpr_cpu_data[31:0] | 32 | Out | Read data bus to the CPU |
| cpu_rwn | 1 | In | Common read/not-write signal from the CPU |
| cpu_cpr_sel | 1 | In | Block select from the CPU. When cpu_cpr_sel is high both cpu_adr and cpu_dataout are valid |
| cpr_cpu_rdy | 1 | Out | Ready signal to the CPU. When cpr_cpu_rdy is high it indicates the last cycle of the access. For a write cycle this means cpu_dataout has been registered by the block and for a read cycle this means the data on cpr_cpu_data is valid. |
| cpr_cpu_berr | 1 | Out | Bus error signal to the CPU indicating an invalid access. |
| cpu_acode[1:0] | 2 | In | CPU Access Code signals. These decode as follows: 00 - User program access 01 - User data access 10 - Supervisor program access 11 - Supervisor data access |
| cpr_cpu_debug_valid | 1 | Out | Debug Data valid on cpr_cpu_data bus. Active high |

16.5.2 Configuration Registers

The configuration registers in the CPR are programmed via the CPU interface. Refer to section 11.4 on page 69 for a description of the protocol and timing diagrams for reading and writing registers in the CPR. Note that since addresses in SoPEC are byte aligned and the CPU only supports 32-bit register reads and writes, the lower 2 bits of the CPU address bus are not required to decode the address space for the CPR. When reading a register that is less than 32 bits wide zeros should be returned on the upper unused bit(s) of cpr_pcu_data. Table 96 lists the configuration registers in the CPR block.

The CPR block will only allow supervisor data mode accesses (i.e. cpu_acode[1:0]=SUPERVISOR_DATA). All other accesses will result in cpr_cpu_berr being asserted.

TABLE 96

CPR Register Map

| Address CPR_base + | Register | #bits | Reset | Description |
|---|---|---|---|---|
| 0x00 | SleepModeEnable | 4 | 0x0[a] | Sleep Mode enable, when high a section of logic is put into powerdown. Bit 0 - Controls section 0 Bit 1 - Controls section 1 Bit 2 - Controls section 2 Bit 3 - Controls section 3 Note that the SleepModeEnable register has special reset conditions. See Section 16.5.6 for details |
| 0x04 | ResetSrc | 5 | 0x1[a] | Reset Source register, indicating the source of the last reset (or wake-up) Bit 0 - External Reset Bit 1 - USB wakeup reset Bit 2 - ISI wakeup reset Bit 3 - Watchdog timer reset Bit 4 - GPIO wake-up (Read Only Register) |
| 0x08 | ResetSection | 4 | 0xF | Active-low synchronous reset for each section, self-resetting. Bit 0 - Controls section 0 Bit 1 - Controls section 1 Bit 2 - Controls section 2 Bit 3 - Controls section 3 |
| 0x0C | DebugSelect[5:2] | 4 | 0x0 | Debug address select. Indicates the address of the register to report on the cpr_cpu_data bus when it is not otherwise being used. |
| PLL Control | | | | |
| 0x10 | PLLTuneBits | 10 | 0x3BC | PLL tuning bits |
| 0x14 | PLLRangeA | 4 | 0x3 | PLLOUT A frequency selector (defaults to 60 Mhz to 125 Mhz) |
| 0x18 | PLLRangeB | 3 | 0x5 | PLLOUT B frequency selector (defaults to 200 Mhz to 400 Mhz) |
| 0x1C | PLLMultiplier | 5 | 0x03 | PLL multiplier selector, defaults to refclk × 3 |
| 0x20 | PLLUpdate | 1 | 0x0 | PLL update control. A write (of any value) to this register will cause the PLL to lose lock for ~100 us. Reading the register indicates the status of the update. 0 - PLL update complete 1 - PLL update active No writes to PLLTuneBits, PLLRangeA, PLL-RangeB, PLLMultiplier or PLLUpdate are allowed while the PLL update is active. |

[a]Reset value depends on reset source. External reset shown.

16.5.3 CPR Sub-Block Partition 16.5.4 Reset_n deglitch

The external reset_n signal is deglitched for about 1 μs. reset_n must maintain a state for 1 us second before the state is passed into the rest of the device. All deglitch logic is clocked on bufrefclk.

16.5.5 Sync Reset

The reset synchronizer retimes an asynchronous reset signal to the clock domain that it resets. The circuit prevents the inactive edge of reset occurring when the clock is rising 16.5.6 Reset Generator Logic The reset generator logic is used to determine which clock domains should be reset, based on configured reset values (reset_section_n), the external reset (reset_n), watchdog timer reset (tim_cpr_reset_n), the USB reset (usb_cpr_reset_n), the GPIO wakeup control (gpio_cpr_wakeup) and the ISI reset (isi_cpr_reset_n). The reset direct from the IO pin (reset_n) is synchronized and de-glitched before feeding the reset logic.

All resets are lengthened to at least 16 pclk cycles, regardless of the duration of the input reset. The clock for a particular section must be running for the reset to have an effect. The clocks to each section can be enabled/disabled using the SleepModeEnable register.

Resets from the ISI or USB block reset everything except its own section (section 2 or 3).

TABLE 97

Reset domains

| Reset signal | Domain |
|---|---|
| reset_dom[0] | Section 0 pclk domain (PEP) |
| reset_dom[1] | Section 1 pclk domain (CPU) |

TABLE 97-continued

| Reset domains | |
|---|---|
| Reset signal | Domain |
| reset_dom[2] | Section 2 pclk domain (ISI) |
| reset_dom[3] | Section 3 usbclk/pclk domain (USB) |
| reset_dom[4] | doclk domain |
| reset_dom[5] | jclk domain |

The logic is given by

```
if (reset_dg_n == 0) then
    reset_dom[5:0]       = 0x00        // reset everything
    reset_src[4:0]       = 0x01
    cfg_reset_n          = 0
    sleep_mode_en[3:0]   = 0x0         // re-awaken all sections
elsif (tim_cpr_reset_n == 0) then
    reset_dom[5:0]       = 0x00        // reset everything except
CPR config
    reset_src[4:0]       = 0x08
    cfg_reset_n          = 1           // CPR config stays the same
    sleep_mode_en[1]     = 0           // re-awaken section 1 only
(awake already)
elsif (usb_cpr_reset_n == 0) then
    reset_dom[5:0]       = 0x08        // all except USB domain +
CPR config
    reset_src[4:0]       = 0x02
    cfg_reset_n          = 1           // CPR config stays the same
    sleep_mode_en[1]     = 0           // re-awaken section 1 only
section 3 is awake
elsif (isi_cpr_reset_n == 0) then
    reset_dom[5:0]       = 0x04        // all except ISI domain +
CPR config
    reset_src[4:0]       = 0x04
    cfg_reset_n          = 1           // CPR config stays the same
    sleep_mode_en[1]     = 0           // re-awaken section 1 only
section 2 is awake
elsif (gpio_cpr_wakeup = 1) then
    reset_dom[5:0]       = 0x3c        // PEP and CPU sections only
    reset_src[4:0]       = 0x10
    cfg_reset_n          = 1           // CPR config stays the same
    sleep_mode_en[1]     = 0           // re-awaken section 1 only
section 2 is awake
else
    // propagate resets from reset section register
    reset_dom[5:0]       = 0x3F              // default to on
    cfg_reset_n          = 1                        // CPR cfg
registers are not in any section
    sleep_mode_en[3:0]   = sleep_mode_en[3:0]     // stay the same
by default
    if (reset_section_n[0] == 0) then
        reset_dom[5] = 0             // jclk domain
        reset_dom[4] = 0             // doclk domain
        reset_dom[0] = 0             // pclk section 0 domain
    if (reset_section_n[1] == 0) then
        reset_dom[1] = 0             // pclk section 1 domain
    if (reset_section_n[2] == 0) then
        reset_dom[2] = 0               // pclk section 2 domain
(ISI)
    if (reset_section_n[3] == 0) then
        reset_dom[3] = 0             // USB domain
```

16.5.7 Sleep Logic

The sleep logic is used to generate gating signals for each of SoPECs clock domains. The gate enable (gate_dom) is generated based on the configured sleep_mode_en and the internally generated jclk_enable signal.

The logic is given by

```
// clock gating for sleep modes
gate_dom[5:0] = 0x0                          // default to all clocks
on
if (sleep_mode_en[0] = = 1) then         // section 0 sleep
    gate_dom[0] = 1                      // pclk section 0
    gate_dom[4] = 1                      // doclk domain
    gate_dom[5] = 1                      // jclk domain
if (sleep_mode_en[1] = = 1) then         // section 1 sleep
    gate_dom[1] = 1                      // pclk section 1
if (sleep_mode_en[2] = = 1) then         // section 2 sleep
    gate_dom[2] = 1                      // pclk section 2
if (sleep_mode_en[3] = = 1) then         // section 3 sleep
    gate_dom[3] = 1                      // usb section 3
// the jclk can be turned off by CDU signal
if (jclk_enable = = 0) then
    gate_dom[5] = 1
```

The clock gating and sleep logic is clocked with the master_pclk clock which is not gated by this logic, but is synchronous to other pclk_section and jclk domains.

Once a section is in sleep mode it cannot generate a reset to restart the device. For example if section 1 is in sleep mode then the watchdog timer is effectively disabled and cannot trigger a reset.

16.5.8 Clock Gate Logic

The clock gate logic is used to safely gate clocks without generating any glitches on the gated clock. When the enable is high the clock is active otherwise the clock is gated 16.5.9 Clock Generator Logic The clock generator block contains the PLL, crystal oscillator, clock dividers and associated control logic. The PLL VCO frequency is at 960 MHz locked to a 32 MHz refclk generated by the crystal oscillator. In test mode the xtalin signal can be driven directly by the test clock generator, the test clock will be reflected on the refclk signal to the PLL.

16.5.9.1 Clock Divider A

The clock divider A block generates the 48 MHz clock from the input 96 MHz clock (pllouta) generated by the PLL. The divider is enabled only when the PLL has acquired lock.

16.5.9.2 Clock Divider B

The clock divider B block generates the 160 MHz clocks from the input 320 MHz clock (plloutb) generated by the PLL. The divider is enabled only when the PLL has acquired lock.

16.5.9.3 PLL Control State Machine

The PLL will go out of lock whenever pll_reset goes high (the PLL reset is the only active high reset in the device) or if the configuration bits pll_rangea, pll_rangeb, pll_mult, pll_tune are changed. The PLL control state machine ensures that the rest of the device is protected from glitching clocks while the PLL is being reset or it's configuration is being changed.

In the case of a hardware reset (the reset is deglitched), the state machine first disables the output clocks (via the clk_gate signal), it then holds the PLL in reset while its configuration bits are reset to default values. The state machine then releases the PLL reset and waits approx. 100 us to allow the PLL to regain lock. Once the lock time has elapsed the state machine re-enables the output clocks and resets the remainder of the device via the reset_dg_n signal.

When the CPU changes any of the configuration registers it must write to the PLLupdate register to allow the state machine to update the PLL to the new configuration setup. If a PLLUpdate is detected the state machine first gates the output clocks. It then holds the PLL in reset while the PLL configuration registers are updated. Once updated the PLL reset is released and the state machine waits approx 100 us for the PLL to regain lock before re-enabling the output clocks. Any write to the PLLUpdate register will cause the state machine to perform the update operation regardless of whether the configuration values changed or not.

All logic in the clock generator is clocked on bufrefclk which is always an active clock regardless of the state of the PLL.

17 ROM Block

17.1 Overview

The ROM block interfaces to the CPU bus and contains the SoPEC boot code. The ROM block consists of the CPU bus interface, the ROM macro and the ChipID macro. The current ROM size is 16 KBytes implemented as a 4096×32 macro. Access to the ROM is not cached because the CPU enjoys fast (no more than one cycle slower than a cache access), unarbitrated access to the ROM. Each SoPEC device is required to have a unique ChipID which is set by blowing fuses at manufacture. IBM's 300 mm ECID macro and a custom 112-bit ECID macro are used to implement the ChipID offering 224-bits of laser fuses. The exact number of fuse bits to be used for the ChipID will be determined later but all bits are made available to the CPU. The ECID macros allows all 224 bits to be read out in parallel and the ROM block will make all 224 bits available in the FuseChipID[N] registers which are readable by the CPU in supervisor mode only.

17.2 Boot Operation

The are two boot scenarIOs for the SoPEC device namely after power-on and after being awoken from sleep mode. When the device is in sleep mode it is hoped that power will actually be removed from the DRAM, CPU and most other peripherals and so the program code will need to be freshly downloaded each time the device wakes up from sleep mode. In order to reduce the wakeup boot time (and hence the perceived print latency) certain data items are stored in the PSS block (see section 18). These data items include the SHA-1 hash digest expected for the program(s) to be downloaded, the master/slave SoPEC id and some configuration parameters. All of these data items are stored in the PSS by the CPU prior to entering sleep mode. The SHA-1 value stored in the PSS is calculated by the CPU by decrypting the signature of the downloaded program using the appropriate public key stored in ROM. This compute intensive decryption only needs to take place once as part of the power-on boot sequence—subsequent wakeup boot sequences will simply use the resulting SHA-1 digest stored in the PSS. Note that the digest only needs to be stored in the PSS before entering sleep mode and the PSS can be used for temporary storage of any data at all other times.

The CPU is expected to be in supervisor mode for the entire boot sequence described by the pseudocode below. Note that the boot sequence has not been finalised but is expected to be close to the following:

```
if (ResetSrc = = 1)   then   // Reset was a power-on reset
    configure_sopec   // need to configure peris (USB, ISI, DMA, ICU etc.)
// Otherwise reset was a wakeup reset so peris etc. were already configured
PAUSE: wait until IrqSemaphore != 0   // i.e. wait until an interrupt has been serviced
if (IrqSemaphore = = DMAChan0Msg) then
```

-continued

```
        parse_msg(DMAChan0MsgPtr)   // this routine will parse the message and take any
                                     // necessary action e.g. programming the DMAChannel1 registers
    elsif (IrqSemaphore = = DMAChan1Msg) then   // program has been downloaded
        CalculatedHash = gen_sha1(ProgramLocn, ProgramSize)
        if (ResetSrc = = 1)   then
            ExpectedHash = sig_decrypt(ProgramSig, public_key)
        else
            ExpectedHash = PSSHash
        if (ExpectedHash = = CalculatedHash) then
            jmp(PrgramLocn)   // transfer control to the downloaded program
        else
            send_host_msg("Program Authentication Failed")
            goto PAUSE:
        elsif (IrqSemaphore = = timeout) then   // nothing has happened
            if (ResetSrc = = 1) then
            sleep_mode( )   // put SoPEC into sleep mode to be woken up by USB/ISI activity
            else   // we were woken up but nothing happened
                reset_sopec(PowerOnReset)
        else
            goto PAUSE
```

The boot code places no restrictions on the activity of any programs downloaded and authenticated by it other than those imposed by the configuration of the MMU i.e. the principal function of the boot code is to authenticate that any programs downloaded by it are from a trusted source. It is the responsibility of the downloaded program to ensure that any code it downloads is also authenticated and that the system remains secure. The downloaded program code is also responsible for setting the SoPEC ISIId (see section 12.5 for a description of the ISIID) in a multi-SoPEC system. See the "SoPEC Security Overview" document [9] for more details of the SoPEC security features.

17.3 Implementation

17.3.1 Definitions of I/O

TABLE 98

ROM Block I/O

| Port name | Pins | I/O | Description |
|---|---|---|---|
| Clocks and Resets | | | |
| prst_n | 1 | In | Global reset. Synchronous to pclk, active low. |
| Pclk | 1 | In | Global clock |
| CPU Interface | | | |
| cpu_adr[14:2] | 13 | In | CPU address bus. Only 13 bits are required to decode the address space for this block. |
| rom_cpu_data[31:0] | 32 | Out | Read data bus to the CPU |
| cpu_rwn | 1 | In | Common read/not-write signal from the CPU |
| cpu_acode[1:0] | 2 | In | CPU Access Code signals. These decode as follows: 00 - User program access 01 - User data access 10 - Supervisor program access 11 - Supervisor data access |
| cpu_rom_sel | 1 | In | Block select from the CPU. When cpu_rom_sel is high cpu_adr is valid |
| rom_cpu_rdy | 1 | Out | Ready signal to the CPU. When rom_cpu_rdy is high it indicates the last cycle of the access. For a read cycle this |

TABLE 98-continued

ROM Block I/O

| Port name | Pins | I/O | Description |
|---|---|---|---|
| | | | means the data on rom_cpu_data is valid. |
| rom_cpu_berr | 1 | Out | ROM bus error signal to the CPU indicating an invalid access. |

17.3.2 Configuration Registers

The ROM block will only allow read accesses to the FuseChipID registers and the ROM with supervisor data space permissions (i.e. cpu_acode[1:0]=11). Write accesses with supervisor data space permissions will have no effect. All other accesses with will result in rom_cpu_berr being asserted. The CPU subsystem bus slave interface is described in more detail in section 9.4.3.

TABLE 99

ROM Block Register Map

| Address ROM_base + | Register | #bits | Reset | Description |
|---|---|---|---|---|
| 0x4000 | FuseChipID0 | 32 | n/a | Value of corresponding fuse bits 31 to 0 of the IBM 112-bit ECID macro. (Read only) |
| 0x4004 | FuseChipID1 | 32 | n/a | Value of corresponding fuse bits 63 to 32 of the IBM 112-bit ECID macro. (Read only) |
| 0x4008 | FuseChipID2 | 32 | n/a | Value of corresponding fuse bits 95 to 64 of the IBM 112-bit ECID macro. (Read only) |
| 0x400C | FuseChipID3 | 16 | n/a | Value of corresponding fuse bits 111 to 96 of the IBM 112-bit ECID macro. (Read only) |
| 0x4010 | FuseChipID4 | 32 | n/a | Value of corresponding fuse bits 31 to 0 of the Custom 112-bit ECID macro. (Read only) |
| 0x4014 | FuseChipID5 | 32 | n/a | Value of corresponding fuse bits 63 to 32 of the Custom 112-bit ECID macro. (Read only) |
| 0x4018 | FuseChipID6 | 32 | n/a | Value of corresponding fuse bits 95 to 64 of the Custom 112-bit ECID macro. (Read only) |
| 0x401C | FuseChipID7 | 16 | n/a | Value of corresponding fuse bits 111 to 96 of the Custom 112-bit ECID macro. (Read only) |

17.3.3 Sub-Block Partition

IBM offer two variants of their ROM macros; A high performance version (ROMHD) and a low power version (ROMLD). It is likely that the low power version will be used unless some implementation issue requires the high performance version. Both versions offer the same bit density. The sub-block partition diagram below does not include the clocking and test signals for the ROM or ECID macros. The CPU subsystem bus interface is described in more detail in section 11.4.3.

17.3.4

TABLE 100

ROM Block internal signals

| Port name | Width | Description |
|---|---|---|
| Clocks and Resets | | |
| prst_n | 1 | Global reset. Synchronous to pclk, active low. |
| Pclk | 1 | Global clock |
| Internal Signals | | |
| rom_adr[11:0] | 12 | ROM address bus |
| rom_sel | 1 | Select signal to the ROM macro instructing it to access the location at rom_adr |
| rom_oe | 1 | Output enable signal to the ROM block |
| rom_data[31:0] | 32 | Data bus from the ROM macro to the CPU bus interface |
| rom_dvalid | 1 | Signal from the ROM macro indicating that the data on rom_data is valid for the address on rom_adr |
| fuse_data[31:0] | 32 | Data from the FuseChipID[N] register addressed by fuse_reg_adr |
| fuse_reg_adr[2:0] | 3 | Indicates which of the FuseChipID registers is being addressed |

Sub-Block Signal Definition

18 Power Safe Storage (PSS) Block 18.1 Overview

The PSS block provides 128 bytes of storage space that will maintain its state when the rest of the SoPEC device is in sleep mode. The PSS is expected to be used primarily for the storage of decrypted signatures associated with downloaded programmed code but it can also be used to store any information that needs to survive sleep mode (e.g. configuration details). Note that the signature digest only needs to be stored in the PSS before entering sleep mode and the PSS can be used for temporary storage of any data at all other times.

Prior to entering sleep mode the CPU should store all of the information it will need on exiting sleep mode in the PSS. On emerging from sleep mode the boot code in ROM will read the ResetSrc register in the CPR block to determine which reset source caused the wakeup. The reset source information indicates whether or not the PSS contains valid stored data, and the PSS data determines the type of boot sequence to execute. If for any reason a full power-on boot sequence should be performed (e.g. the printer driver has been updated) then this is simply achieved by initiating a full software reset.

Note that a reset or a powerdown (powerdown is implemented by clock gating) of the PSS block will not clear the contents of the 128 bytes of storage. If clearing of the PSS storage is required, then the CPU must write to each location individually.

18.2 Implementation

The storage area of the PSS block will be implemented as a 128-byte register array. The array is located from PSS_base through to PSS_base+0x7F in the address map. The PSS block will only allow read or write accesses with supervisor data space permissions (i.e. cpu_acode[1:0]=11). All other accesses will result in pss_cpu_berr being asserted. The CPU subsystem bus slave interface is described in more detail in section 11.4.3.

18.2.1 Definitions of I/O

TABLE 101

PSS Block I/O

| Port name | Pins | I/O | Description |
|---|---|---|---|
| Clocks and Resets | | | |
| prst_n | 1 | In | Global reset. Synchronous to pclk, active low. |
| Pclk | 1 | In | Global clock |
| CPU Interface | | | |
| cpu_adr[6:2] | 5 | In | CPU address bus. Only 5 bits are required to decode the address space for this block. |
| cpu_dataout[31:0] | 32 | In | Shared write data bus from the CPU |
| pss_cpu_data[31:0] | 32 | Out | Read data bus to the CPU |
| cpus_rwn | 1 | In | Common read/not-write signal from the CPU |
| cpu_acode[1:0] | 2 | In | CPU Access Code signals. These decode as follows:<br>00 - User program access<br>01 - User data access<br>10 - Supervisor program access<br>11 - Supervisor data access |
| cpu_pss_sel | 1 | In | Block select from the CPU. When cpu_pss_sel is high both cpu_adr and cpu_dataout are valid |
| pss_cpu_rdy | 1 | Out | Ready signal to the CPU. When pss_cpu_rdy is high it indicates the last cycle of the access. For a read cycle this means the data on pss_cpu_data is valid. |
| pss_cpu_berr | 1 | Out | PSS bus error signal to the CPU indicating an invalid access. |

19 Low Speed Serial Interface (LSS)

19.1 Overview

Figure 75:
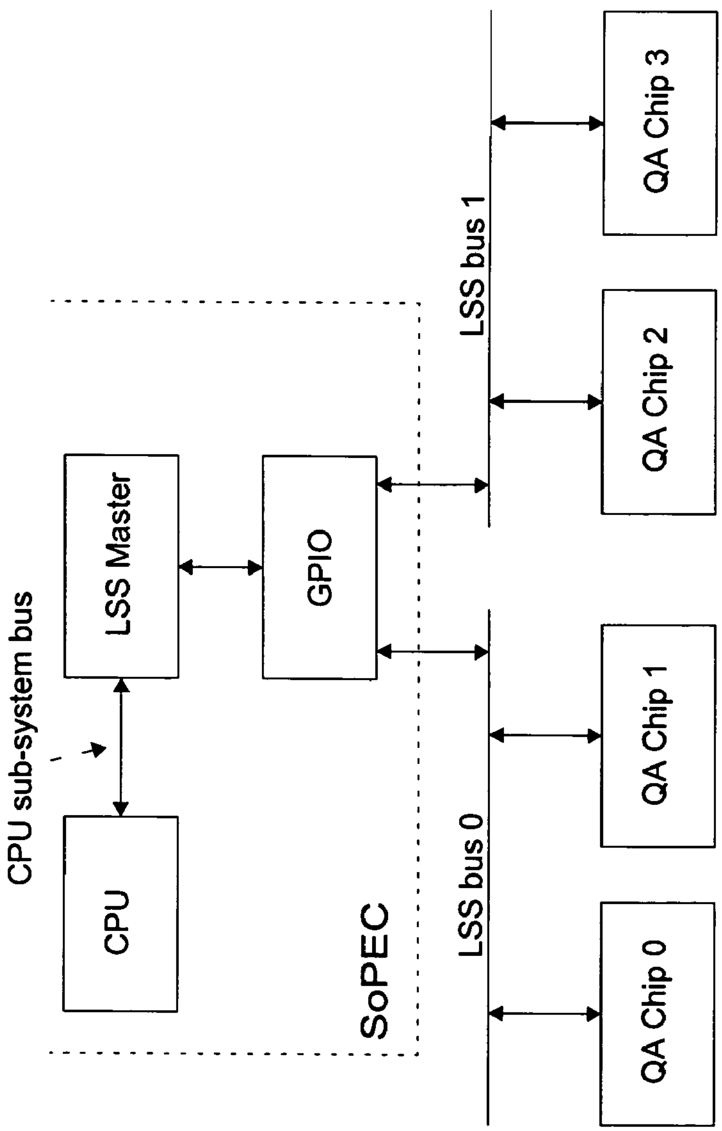
FIG. 75 shows a LSS master system-level interface

The Low Speed Serial Interface (LSS) provides a mechanism for the internal SoPEC CPU to communicate with external QA chips via two independent LSS buses. The LSS communicates through the GPIO block to the QA chips. This allows the QA chip pins to be reused in multi-SoPEC environments. The LSS Master system-level interface is illustrated in FIG. 75. Note that multiple QA chips are allowed on each LSS bus.

19.2 QA Communication

The SoPEC data interface to the QA Chips is a low speed, 2 pin, synchronous serial bus. Data is transferred to the QA chips via the lss_data pin synchronously with the lss_clk pin. When the lss_clk is high the data on lss_data is deemed to be valid. Only the LSS master in SoPEC can drive the lss_clk pin, this pin is an input only to the QA chips. The LSS block must be able to interface with an open-collector pull-up bus. This means that when the LSS block should transmit a logical zero it will drive 0 on the bus, but when it should transmit a logical 1 it will leave high-impedance on the bus (i.e. it doesn't drive the bus). If all the agents on the LSS bus adhere to this protocol then there will be no issues with bus contention.

The LSS block controls all communication to and from the QA chips. The LSS block is the bus master in all cases. The LSS block interprets a command register set by the SoPEC CPU, initiates transactions to the QA chip in question and optionally accepts return data. Any return information is presented through the configuration registers to the SoPEC CPU. The LSS block indicates to the CPU the completion of a command or the occurrence of an error via an interrupt. The LSS protocol can be used to communicate with other LSS slave devices (other than QA chips). However should a LSS slave device hold the clock low (for whatever reason), it will be in violation of the LSS protocol and is not supported. The LSS clock is only ever driven by the LSS master.

19.2.1 Start and Stop Conditions

Figure 76:
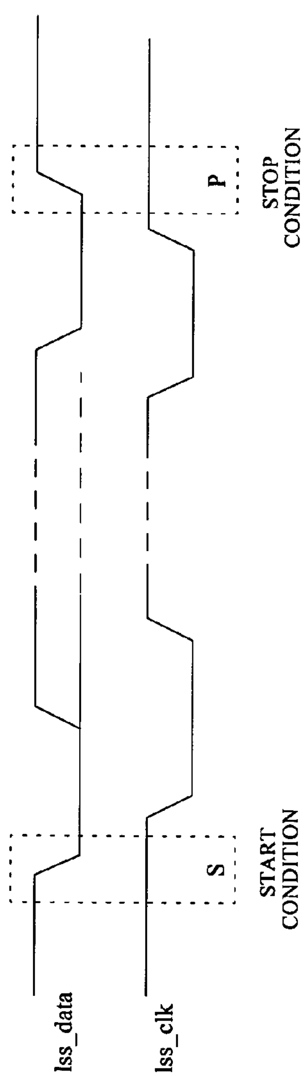
FIG. 76 shows START and STOP conditions

All transmissions on the LSS bus are initiated by the LSS master issuing a START condition and terminated by the LSS master issuing a STOP condition. START and STOP conditions are always generated by the LSS master. As illustrated in FIG. 76, a START condition corresponds to a high to low transition on lss_data while lss_clk is high. A STOP condition corresponds to a low to high transition on lss_data while lss_clk is high.

19.2.2 Data Transfer

Data is transferred on the LSS bus via a byte orientated protocol. Bytes are transmitted serially. Each byte is sent most significant bit (MSB) first through to least significant bit (LSB) last. One clock pulse is generated for each data bit transferred. Each byte must be followed by an acknowledge bit.

The data on the lss_data must be stable during the HIGH period of the lss_clk clock. Data may only change when lss_clk is low. A transmitter outputs data after the falling edge of lss_clk and a receiver inputs the data at the rising edge of lss_clk. This data is only considered as a valid data bit at the next lss_clk falling edge provided a START or STOP is not detected in the period before the next lss_clk falling edge. All clock pulses are generated by the LSS block. The transmitter releases the lss_data line (high) during the acknowledge clock pulse (ninth clock pulse). The receiver must pull down the lss_data line during the acknowledge clock pulse so that it remains stable low during the HIGH period of this clock pulse.

Figure 77:
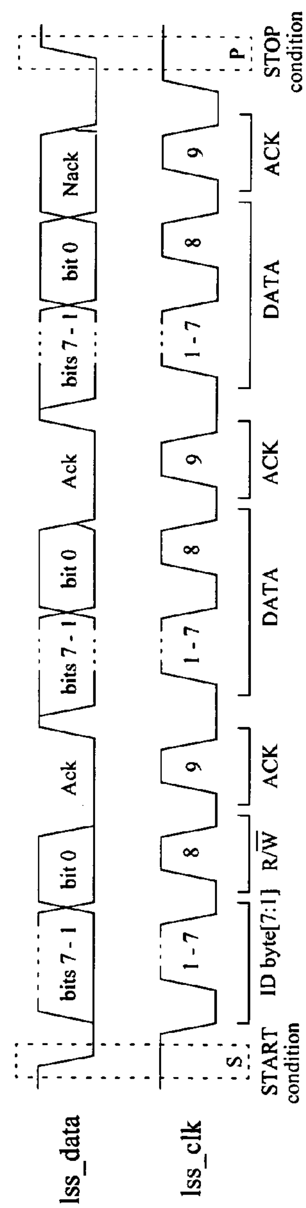
FIG. 77 shows an LSS transfer of 2 data bytes
Figure 78:
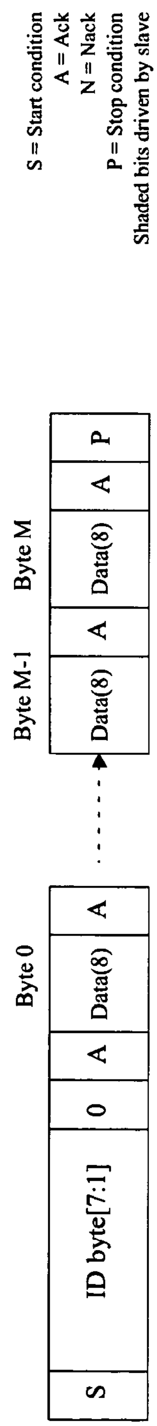
FIG. 78 is an example of an LSS write to a QA Chip

Data transfers follow the format shown in FIG. 77. The first byte sent by the LSS master after a START condition is a primary id byte, where bits 7–2 form a 6-bit primary id (0 is a global id and will address all QA Chips on a particular LSS bus), bit 1 is an even parity bit for the primary ID, and bit 0 forms the read/write sense. Bit 0 is high if the following command is a read to the primary id given or low for a write command to that id. An acknowledge is generated by the QA chip(s) corresponding to the given id (if such a chip exists) by driving the lss_data line low synchronous with the LSS master generated ninth lss_clk.

19.2.3 Write Procedure

Figure 79:
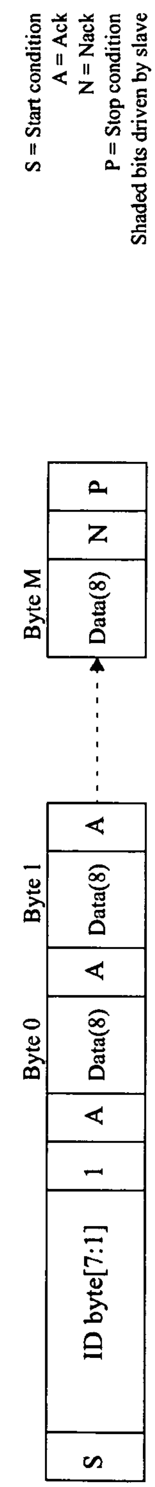
FIG. 79 is an example of an LSS read from QA Chip

The protocol for a write access to a QA Chip over the LSS bus is illustrated in FIG. 79 below. The LSS master in SoPEC initiates the transaction by generating a START condition on the LSS bus. It then transmits the primary id byte with a 0 in bit 0 to indicate that the following command is a write to the primary id. An acknowledge is generated by the QA chip corresponding to the given primary id. The LSS master will clock out M data bytes with the slave QA Chip acknowledging each successful byte written. Once the slave QA chip has acknowledged the $M^{th}$ data byte the LSS master issues a STOP condition to complete the transfer. The QA chip gathers the M data bytes together and interprets them as a command. See QA Chip Interface Specification for more details on the format of the commands used to communicate with the QA chip[8]. Note that the QA chip is free to not acknowledge any byte transmitted. The LSS master should respond by issuing an interrupt to the CPU to indicate this error. The CPU should then generate a STOP condition on the LSS bus to gracefully complete the transaction on the LSS bus.

19.2.4 Read Procedure

The LSS master in SoPEC initiates the transaction by generating a START condition on the LSS bus. It then transmits the primary id byte with a 1 in bit 0 to indicate that the following command is a read to the primary id. An acknowledge is generated by the QA chip corresponding to the given primary id. The LSS master releases the lss_data bus and proceeds to clock the expected number of bytes from the QA chip with the LSS master acknowledging each successful byte read. The last expected byte is not acknowledged by the LSS master. It then completes the transaction by generating a STOP condition on the LSS bus. See QA Chip Interface Specification for more details on the format of the commands used to communicate with the QA chip[8].

19.3 Implementation

Figure 80:
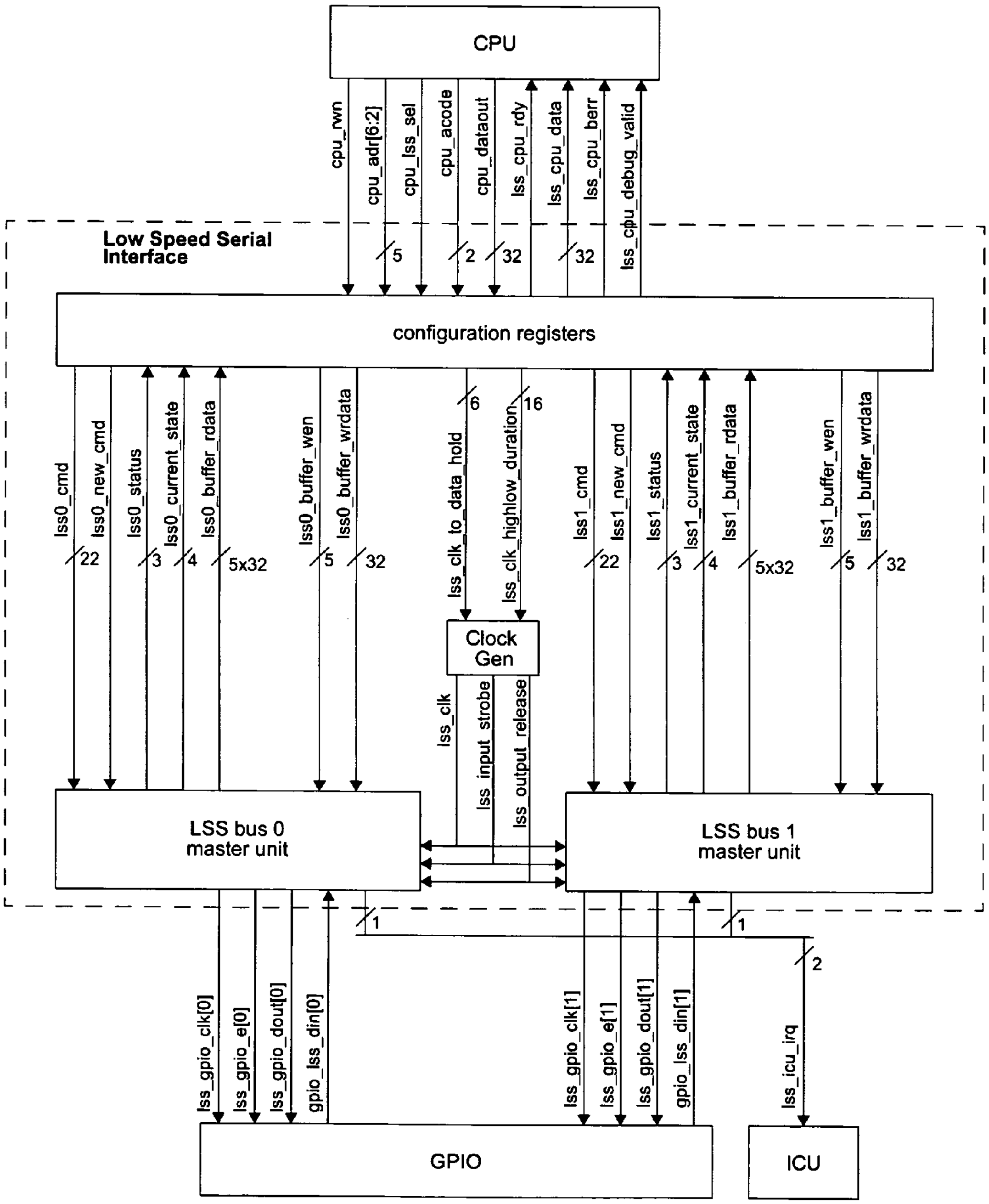
FIG. 80 shows an LSS block diagram
Figure 81:
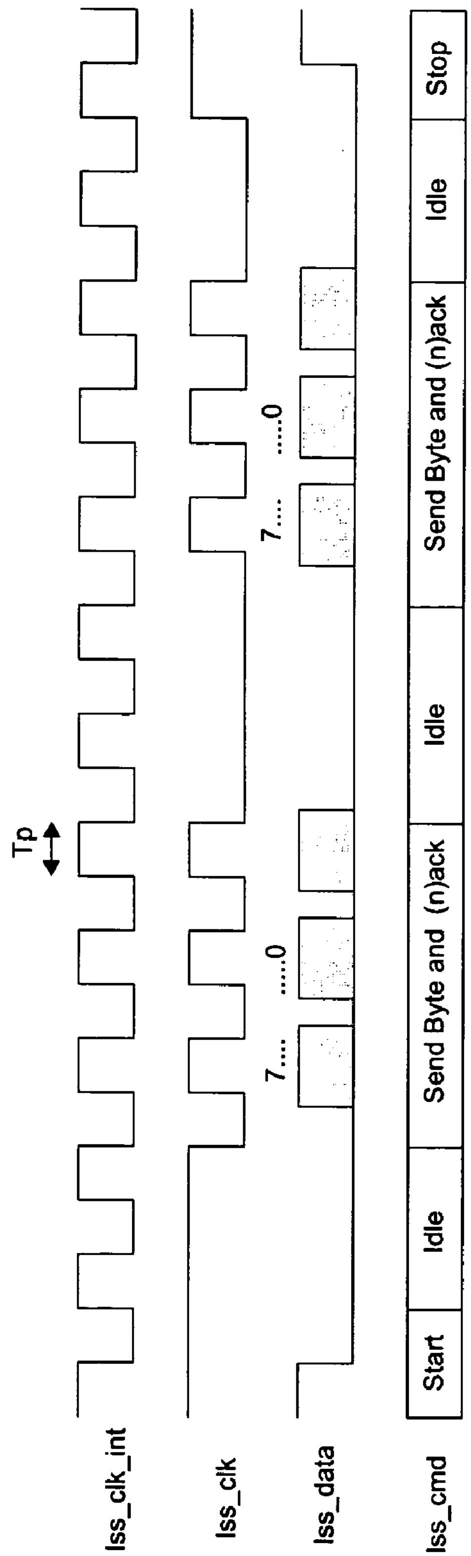
FIG. 81 shows an LSS multi-command transaction

A block diagram of the LSS master is given in FIG. 80. It consists of a block of configuration registers that are programmed by the CPU and two identical LSS master units that generate the signalling protocols on the two LSS buses as well as interrupts to the CPU. The CPU initiates and terminates transactions on the LSS buses by writing an appropriate command to the command register, writes bytes to be transmitted to a buffer and reads bytes received from a buffer, and checks the sources of interrupts by reading status registers.

19.3.1 Definitions of IO

TABLE 102

LSS IO pins definitions

| Port name | Pins | I/O | Description |
|---|---|---|---|
| Clocks and Resets | | | |
| Pclk | 1 | In | System Clock |
| prst_n | 1 | In | System reset, synchronous active low |
| CPU Interface | | | |
| cpu_rwn | 1 | In | Common read/not-write signal from the CPU |
| cpu_adr[6:2] | 5 | In | CPU address bus. Only 5 bits are required to decode the address space for this block |
| cpu_dataout[31:0] | 32 | In | Shared write data bus from the CPU |
| cpu_acode[1:0] | 2 | In | CPU access code signals.<br>cpu_acode[0] - Program (0)/Data (1) access<br>cpu_acode[1] - User (0)/Supervisor (1) access |
| cpu_lss_sel | 1 | In | Block select from the CPU. When cpu_lss_sel is high both cpu_adr and cpu_dataout are valid |
| lss_cpu_rdy | 1 | Out | Ready signal to the CPU. When lss_cpu_rdy is high it indicates the last cycle of the access. For a write cycle this means cpu_dataout has been registered by the LSS block and for a read cycle this means the data on lss_cpu_data is valid. |
| lss_cpu_berr | 1 | Out | LSS bus error signal to the CPU. |
| lss_cpu_data[31:0] | 32 | Out | Read data bus to the CPU |
| lss_cpu_debug_valid | 1 | Out | Active high. Indicates the presence of valid debug data on lss_cpu_data. |
| GPIO for LSS buses | | | |
| lss_gpio_dout[1:0] | 2 | Out | LSS bus data output<br>Bit 0 - LSS bus 0<br>Bit 1 - LSS bus 1 |
| gpio_lss_din[1:0] | 2 | In | LSS bus data input<br>Bit 0 - LSS bus 0<br>Bit 1 - LSS bus 1 |
| lss_gpio_e[1:0] | 2 | Out | LSS bus data output enable, active high<br>Bit 0 - LSS bus 0<br>Bit 1 - LSS bus 1 |
| lss_gpio_clk[1:0] | 2 | Out | LSS bus clock output<br>Bit 0 - LSS bus 0<br>Bit 1 - LSS bus 1 |
| ICU interface | | | |
| lss_icu_irq[1:0] | 2 | Out | LSS interrupt requests<br>Bit 0 - interrupt associated with LSS bus 0<br>Bit 1 - interrupt associated with LSS bus 1 |

19.3.2 Configuration Registers

The configuration registers in the LSS block are programmed via the CPU interface. Refer to section 11.4 on page 69 for the description of the protocol and timing diagrams for reading and writing registers in the LSS block. Note that since addresses in SoPEC are byte aligned and the CPU only supports 32-bit register reads and writes, the lower 2 bits of the CPU address bus are not required to decode the address space for the LSS block. Table 103 lists the configuration registers in the LSS block. When reading a register that is less than 32 bits wide zeros should be returned on the upper unused bit(s) of lss_cpu_data.

The input cpu_acode signal indicates whether the current CPU access is supervisor, user, program or data. The configuration registers in the LSS block can only be read or written by a supervisor data access, i.e. when cpu_acode equals b11. If the current access is a supervisor data access then the LSS responds by asserting lss_cpu_rdy for a single clock cycle.

If the current access is anything other than a supervisor data access, then the LSS generates a bus error by asserting lss_cpu_berr for a single clock cycle instead of lss_cpu_rdy as shown in section 11.4 on page 69. A write access will be ignored, and a read access will return zero.

TABLE 103

LSS Control Registers

| Address (LSS_base +) | Register | #bits | Reset | Description |
|---|---|---|---|---|
| Control registers | | | | |
| 0x00 | Reset | 1 | 0x1 | A write to this register causes a reset of the LSS. |
| 0x04 | LssClockHighLowDuration | 16 | 0x00C8 | Lss_clk has a 50:50 duty cycle, this register defines the period of lss_clk by means of specifying the duration (in pclk cycles) that lss_clk is low (or high). The reset value specifies transmission over the LSS bus at a nominal rate of 400 kHz, corresponding to a low (or high) duration of 200 pclk (160 Mhz) cycles. Register should not be set to values less than 8. |
| 0x08 | LssClocktoDataHold | 6 | 0x3 | Specifies the number of pclk cycles that Data must remain valid for after the falling edge of lss_clk. Minimum value is 3 cycles, and must to programmed to be less than LssClockHighLowDuration. |
| LSS bus 0 registers | | | | |
| 0x10 | Lss0IntStatus | 3 | 0x0 | LSS bus 0 interrupt status registers<br>Bit 0 - command completed successfully<br>Bit 1 - error during processing of command, not -acknowledge received after transmission of primary id byte on LSS bus 0<br>Bit 2 - error during processing of command, not -acknowledge received after transmission of data byte on LSS bus 0<br>All the bits in Lss0IntStatus are cleared when the Lss0Cmd register gets written to.<br>(Read only register) |
| 0x14 | Lss0CurrentState | 4 | 0x0 | Gives the current state of the LSS bus 0 state machine. (Read only register). (Encoding will be specified upon state machine implementation) |
| 0x18 | Lss0Cmd | 21 | 0x00_0000 | Command register defining sequence of events to perform on LSS bus 0 before interrupting CPU. A write to this register causes all the bits in the Lss0IntStatus register to be cleared as well as generating a lss0_new_cmd pulse. |
| 0x1C–0x2C | Lss0Buffer[4:0] | 5 × 32 | 0x0000_0000 | LSS Data buffer. Should be filled with transmit data before transmit command, or read data bytes received after a valid read command. |
| LSS bus 1 registers | | | | |
| 0x30 | Lss1IntStatus | 3 | 0x0 | LSS bus 1 interrupt status registers<br>Bit 0 - command completed successfully<br>Bit 1 - error during processing of command, not -acknowledge received after transmission of primary id byte on LSS bus 1<br>Bit 2 - error during processing of command, not -acknowledge received after transmission of data byte on LSS bus 1<br>All the bits in Lss1IntStatus are cleared when the Lss1Cmd register gets written to.<br>(Read only register) |
| 0x34 | Lss1CurrentState | 4 | 0x0 | Gives the current state of the LSS bus 1 state machine. (Read only register) (Encoding will be specified upon state machine implementation) |

TABLE 103-continued

LSS Control Registers

| Address (LSS_base +) | Register | #bits | Reset | Description |
|---|---|---|---|---|
| 0x38 | Lss1Cmd | 21 | 0x00_0000 | Command register defining sequence of events to perform on LSS bus 1 before interrupting CPU. A write to this register causes all the bits in the Lss1IntStatus register to be cleared as well as generating a lss1_new_cmd pulse. |
| 0x3C–0x4C | Lss1Buffer[4:0] | 5 × 32 | 0x0000_0000 | LSS Data buffer. Should be filled with transmit data before transmit command, or read data bytes received after a valid read command. |
| Debug registers | | | | |
| 0x50 | LssDebugSel[6:2] | 5 | 0x00 | Selects register for debug output. This value is used as the input to the register decode logic instead of cpu_adr[6:2] when the LSS block is not being accessed by the CPU, i.e. when cpu_lss_sel is 0. The output lss_cpu_debug_valid is asserted to indicate that the data on lss_cpu_data is valid debug data. This data can be multiplexed onto chip pins during debug mode. |

19.3.2.1 LSS Command Registers

The LSS command registers define a sequence of events to perform on the respective LSS bus before issuing an interrupt to the CPU. There is a separate command register and interrupt for each LSS bus. The format of the command is given in Table 104. The CPU writes to the command register to initiate a sequence of events on an LSS bus. Once the sequence of events has completed or an error has occurred, an interrupt is sent back to the CPU.

Some example commands are:

- a single START condition (Start=1, IdByteEnable=0, RdWrEnable=0, Stop=0)
- a single STOP condition (Start=0, IdByteEnable=0, RdWrEnable=0, Stop=1)
- a START condition followed by transmission of the id byte (Start=1, IdByteEnable=1, RdWrEnable=0, Stop=0, IdByte contains primary id byte)
- a write transfer of 20 bytes from the data buffer (Start=0, IdByteEnable=0, RdWrEnable=1, RdWrSense=0, Stop=0, TxRxByteCount=20)
- a read transfer of 8 bytes into the data buffer (Start=0, IdByteEnable=0, RdWrEnable=1, RdWrSense=1, ReadNack=0, Stop=0, TxRxByteCount=8)
- a complete read transaction of 16 bytes (Start=1, IdByteEnable=1, RdWrEnable=1, RdWrSense=1, ReadNack=1, Stop=1, IdByte contains primary id byte, TxRxByteCount=16), etc.

The CPU can thus program the number of bytes to be transmitted or received (up to a maximum of 20) on the LSS bus before it gets interrupted. This allows it to insert arbitrary delays in a transfer at a byte boundary. For example the CPU may want to transmit 30 bytes to a QA chip but insert a delay between the $20^{th}$ and $21^{st}$ bytes sent. It does this by first writing 20 bytes to the data buffer. It then writes a command to generate a START condition, send the primary id byte and then transmit the 20 bytes from the data buffer. When interrupted by the LSS block to indicate successful completion of the command the CPU can then write the remaining 10 bytes to the data buffer. It can then wait for a defined period of time before writing a command to transmit the 10 bytes from the data buffer and generate a STOP condition to terminate the transaction over the LSS bus.

An interrupt to the CPU is generated for one cycle when any bit in LssNIntStatus is set. The CPU can read LssNIntStatus to discover the source of the interrupt. The LssNIntStatus registers are cleared when the CPU writes to the LssNCmd register. A null command write to the LssNCmd register will cause the LssNIntStatus registers to clear and no new command to start. A null command is defined as Start, IdbyteEnable, RdWrEnable and Stop all set to zero.

TABLE 104

LSS command register description

| bit(s) | name | Description |
|---|---|---|
| 0 | Start | When 1, issue a START condition on the LSS bus. |
| 1 | IdByteEnable | ID byte transmit enable:<br>1 - transmit byte in IdByte field<br>0 - ignore byte in IdByte field |
| 2 | RdWrEnable | Read/write transfer enable:<br>0 - ignore settings of RdWrSense, ReadNack and TxRxByteCount<br>1 - if RdWrSense is 0, then perform a write transfer of TxRxByteCount bytes from the data buffer. if RdWrSense is 1, then perform a read transfer of TxRxByteCount bytes into the data buffer. Each byte should be acknowledged and the last byte received is acknowledged/not-acknowledged according to the setting of ReadNack. |
| 3 | RdWrSense | Read/write sense indicator:<br>0 - write<br>1 - read |
| 4 | ReadNack | Indicates, for a read transfer, whether to issue an acknowledge or a not-acknowledge after the last byte received (indicated by TxRxByteCount).<br>0 - issue acknowledge after last byte received<br>1 - issue not-acknowledge after last byte received. |

TABLE 104-continued

| LSS command register description | | |
|---|---|---|
| bit(s) | name | Description |
| 5 | Stop | When 1, issue a STOP condition on the LSS bus. |
| 7:6 | reserved | Must be 0 |
| 15:8 | IdByte | Byte to be transmitted if IdByteEnable is 1. Bit 8 corresponds to the LSB. |
| 20:16 | TxRxByteCount | Number of bytes to be transmitted from the data buffer or the number of bytes to be received into the data buffer. The maximum value that should be programmed is 20, as the size of the data buffer is 20 bytes. Valid values are 1 to 20, 0 is valid when RdWrEnable = 0, other cases are invalid and undefined. |

The data buffer is implemented in the LSS master block. When the CPU writes to the LssNBuffer registers the data written is presented to the LSS master block via the lssN_buffer_wrdata bus and configuration registers block pulses the lssN_buffer_wen bit corresponding to the register written. For example if LssNBuffer[2] is written to lssN_buffer_wen[2] will be pulsed. When the CPU reads the LssNBuffer registers the configuration registers block reflect the lssN_buffer_rdata bus back to the CPU.

19.3.3 LSS Master Unit

Figure 83:
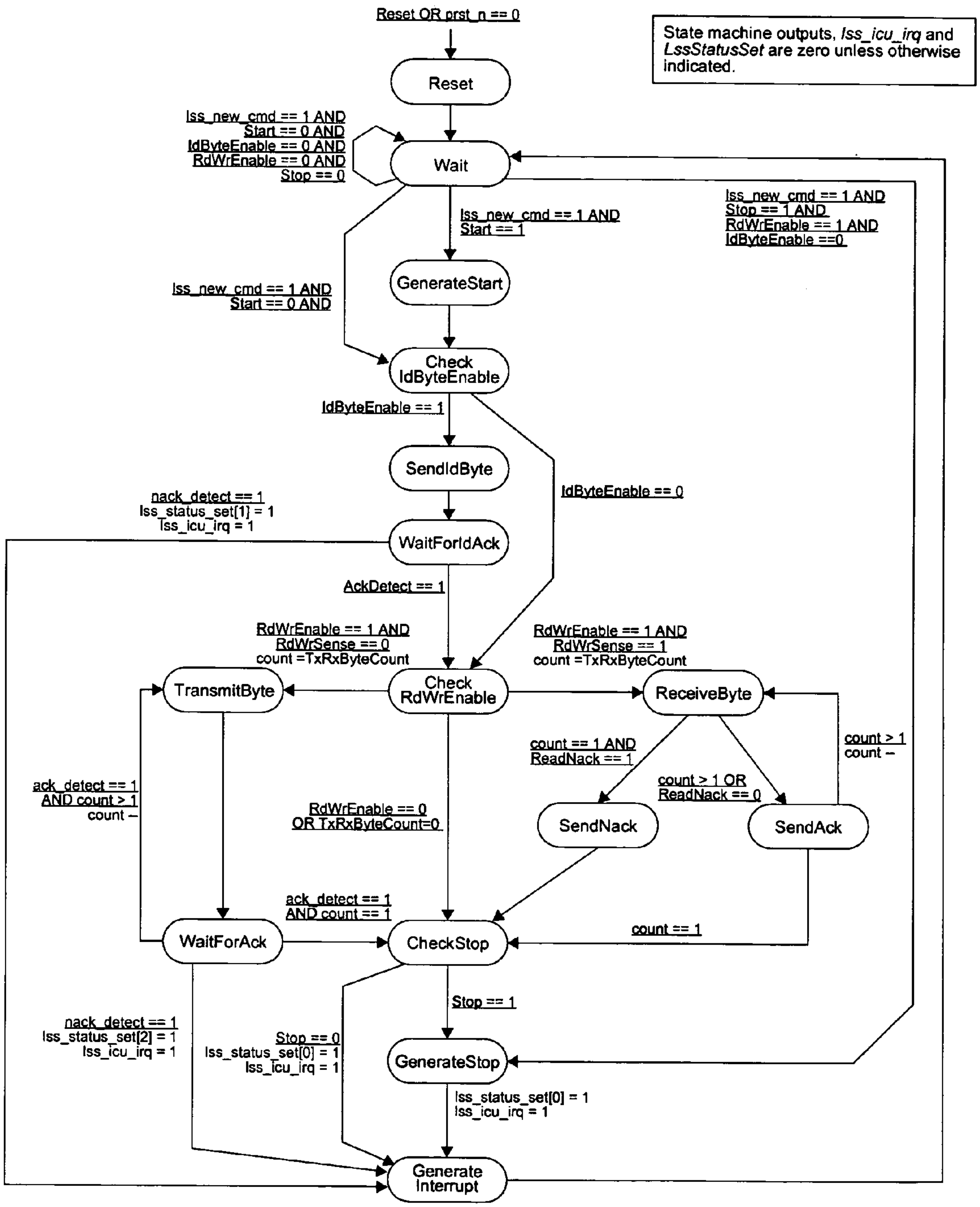
FIG. 83 shows an LSS master state machine

The LSS master unit is instantiated for both LSS bus 0 and LSS bus 1. It controls transactions on the LSS bus by means of the state machine shown in FIG. 83, which interprets the commands that are written by the CPU. It also contains a single 20 byte data buffer used for transmitting and receiving data.

The CPU can write data to be transmitted on the LSS bus by writing to the LssNBuffer registers. It can also read data that the LSS master unit receives on the LSS bus by reading the same registers. The LSS master always transmits or receives bytes to or from the data buffer in the same order.

For a transmit command, LssNBuffer[0][7:0] gets transmitted first, then LssNBuffer[0][15:8], LssNBuffer[0][23:16], LssNBuffer[0][31:24], LssNBuffer[1][7:0] and so on until TxRxByteCount number of bytes are transmitted. A receive command fills data to the buffer in the same order. Each new command the buffer start point is reset.

All state machine outputs, flags and counters are cleared on reset. After a reset the state machine goes to the Reset state and initialises the LSS pins (lss_clk is set to 1, lss_data is tristated and allowed to be pulled up to 1). When the reset condition is removed the state machine transitions to the Wait state.

It remains in the Wait state until lss_new_cmd equals 1. If the Start bit of the command is 0 the state machine proceeds directly to the CheckIdByteEnable state. If the Start bit is 1 it proceeds to the GenerateStart state and issues a START condition on the LSS bus.

In the CheckIdByteEnable state, if the IdByteEnable bit of the command is 0 the state machine proceeds directly to the CheckRdWrEnable state. If the IdByteEnable bit is 1 the state machine enters the SendIdByte state and the byte in the IdByte field of the command is transmitted on the LSS. The WaitForIdAck state is then entered. If the byte is acknowledged, the state machine proceeds to the CheckRdWrEnable state. If the byte is not-acknowledged, the state machine proceeds to the GenerateInterrupt state and issues an interrupt to indicate a not-acknowledge was received after transmission of the primary id byte.

In the CheckRdWrEnable state, if the RdWrEnable bit of the command is 0 the state machine proceeds directly to the CheckStop state. If the RdWrEnable bit is 1, count is loaded with the value of the TxRxByteCount field of the command and the state machine enters either the ReceiveByte state if the RdWrSense bit of the command is 1 or the TransmitByte state if the RdWrSense bit is 0.

For a write transaction, the state machine keeps transmitting bytes from the data buffer, decrementing count after each byte transmitted, until count is 1. If all the bytes are successfully transmitted the state machine proceeds to the CheckStop state. If the slave QA chip not-acknowledges a transmitted byte, the state machine indicates this error by issuing an interrupt to the CPU and then entering the GenerateInterrupt state.

For a read transaction, the state machine keeps receiving bytes into the data buffer, decrementing count after each byte transmitted, until count is 1. After each byte received the LSS master must issue an acknowledge. After the last expected byte (i.e. when count is 1) the state machine checks the ReadNack bit of the command to see whether it must issue an acknowledge or not-acknowledge for that byte. The CheckStop state is then entered.

In the CheckStop state, if the Stop bit of the command is 0 the state machine proceeds directly to the GenerateInterrupt state. If the Stop bit is 1 it proceeds to the GenerateStop state and issues a STOP condition on the LSS bus before proceeding to the GenerateInterrupt state. In both cases an interrupt is issued to indicate successful completion of the command.

The state machine then enters the Wait state to await the next command. When the state machine reenters the Wait state the output pins (lss_and lss_clk) are not changed, they retain the state of the last command. This allows the possibility of multi-command transactions. The CPU may abort the current transfer at any time by performing a write to the Reset register of the LSS block.

19.3.3.1 START and STOP Generation

START and STOP conditions, which signal the beginning and end of data transmission, occur when the LSS master generates a falling and rising edge respectively on the data while the clock is high.

In the GenerateStart state, lss_gpio_clk is held high with lss_gpio_e remaining deasserted (so the data line is pulled high externally) for LssClockHighLowDuration pclk cycles. Then lss_gpio_e is asserted and lss_gpio_dout is pulled low (to drive a 0 on the data line, creating a falling edge) with lss_gpio_clk remaining high for another LssClockHighLowDuration pclk cycles.

In the GenerateStop state, both lss_gpio_clk and lss_gpio_dout are pulled low followed by the assertion of lss_gpio_e to drive a 0 while the clock is low. After LssClockHighLowDuration pclk cycles, lss_gpio_clk is set high. After a further LssClockHighLowDuration pclk cycles, lss_gpio_e is deasserted to release the data bus and create a rising edge on the data bus during the high period of the clock.

Figure 82:
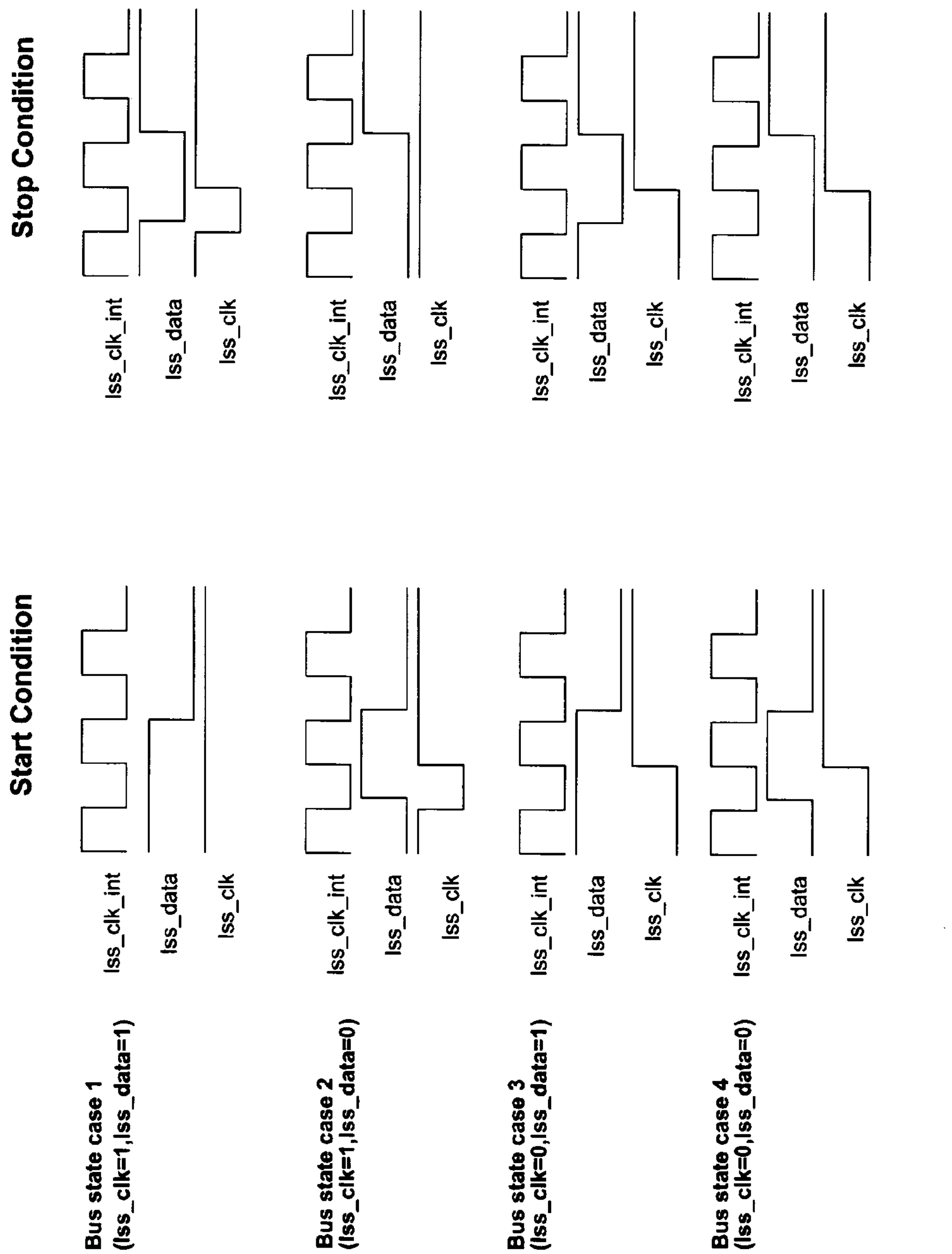
FIG. 82 shows start and stop generation based on previous bus state

If the bus is not in the required state for start and stop generation (lss_clk=1, lss_data=1 for start, and lss_clk=1, lss_data=0), the state machine moves the bus to the correct state and proceeds as described above. FIG. 82 shows the transition timing from any bus state to start and stop generation 19.3.3.2 Clock Pulse Generation The LSS master holds lss_gpio_clk high while the LSS bus is inactive. A clock pulse is generated for each bit transmitted or received over the LSS bus. It is generated by first holding lss_gpio_clk low for LssClockHighLowDuration pclk cycles, and then high for LssClockHighLowDuration pclk cycles.

19.3.3.3 Data De-Glitching

When data is received in the LSS block it is passed to a de-glitching circuit. The de-glitch circuit samples the data 3 times on pclk and compares the samples. If all 3 samples are the same then the data is passed, otherwise the data is ignored.

Note that the LSS data input on SoPEC is double registered in the GPIO block before being passed to the LSS.

19.3.3.4 Data Reception

The input data, gpio_lss_di, is first synchronised to the pclk domain by means of two flip-flops clocked by pclk (the double register resides in the GPIO block). The LSS master generates a clock pulse for each bit received. The output lss_gpio_e is deasserted LssClockToDataHold pclk cycles after the falling edge of lss_gpio_clk to release the data bus. The value on the synchronised gpio_lss_di is sampled Tstrobe number of clock cycles after the rising edge of lss_gpio_clk (the data is de-glitched over a further 3 stage register to avoid possible glitch detection). See FIG. 84 for further timing information.

In the ReceiveByte state, the state machine generates 8 clock pulses. At each Tstrobe time after the rising edge of lss_gpio_clk the synchronised gpio_lss_di is sampled. The first bit sampled is LssNBuffer[0][7], the second LssNBuffer[0][6], etc to LssNBuffer[0][0]. For each byte received the state machine either sends an NAK or an ACK depending on the command configuration and the number of bytes received.

In the SendNack state the state machine generates a single clock pulse. lss_gpio_e is deasserted and the LSS data line is pulled high externally to issue a not-acknowledge.

In the SendAck state the state machine generates a single clock pulse. lss_gpio_e is asserted and a 0 driven on lss_gpio_dout after lss_gpio_clk falling edge to issue an acknowledge.

19.3.3.5 Data Transmission

The LSS master generates a clock pulse for each bit transmitted. Data is output on the LSS bus on the falling edge of lss_gpio_clk.

When the LSS master drives a logical zero on the bus it will assert lss_gpio_e and drive a 0 on lss_gpio_dout after lss_gpio_clk falling edge. lss_gpio_e will remain asserted and lss_gpio_dout will remain low until the next lss_clk falling edge.

When the LSS master drives a logical one lss_gpio_e should be deasserted at lss_gpio_clk falling edge and remain deasserted at least until the next lss_gpio_clk falling edge. This is because the LSS bus will be externally pulled up to logical one via a pull-up resistor.

In the SendId byte state, the state machine generates 8 clock pulses to transmit the byte in the IdByte field of the current valid command. On each falling edge of lss_gpio_clk a bit is driven on the data bus as outlined above. On the first falling edge IdByte[7] is driven on the data bus, on the second falling edge IdByte[6] is driven out, etc.

In the TransmitByte state, the state machine generates 8 clock pulses to transmit the byte at the output of the transmit FIFO. On each falling edge of lss_gpio_clk a bit is driven on the data bus as outlined above. On the first falling edge LssNBuffer[0][7] is driven on the data bus, on the second falling edge LssNBuffer[0][6] is driven out, etc on to LssNBuffer[0][7] bits.

In the WaitForAck state, the state machine generates a single clock pulse. At Tstrobe time after the rising edge of lss_gpio_clk the synchronized gpio_lss_di is sampled. A 0 indicates an acknowledge and ack_detect is pulsed, a 1 indicates a not-acknowledge and nack_detect is pulsed.

19.3.3.6 Data Rate Control

The CPU can control the data rate by setting the clock period of the LSS bus clock by programming appropriate value in LssClockHighLowDuration. The default setting for the register is 200 (pclk cycles) which corresponds to transmission rate of 400 kHz on the LSS bus (the lss_clk is high for LssClockHighLowDuration cycles then low for LssClockHighLowDuration cycles). The lss_clk will always have a 50:50 duty cycle. The LssClockHighLowDuration register should not be set to values less than 8.

The hold time of lss_data after the falling edge of lss_clk is programmable by the LssClocktoDataHold register. This register should not be programmed to less than 2 or greater than the LssClockHighLowDuration value.

19.3.3.7 LSS Master Timing Parameters

Figure 84:
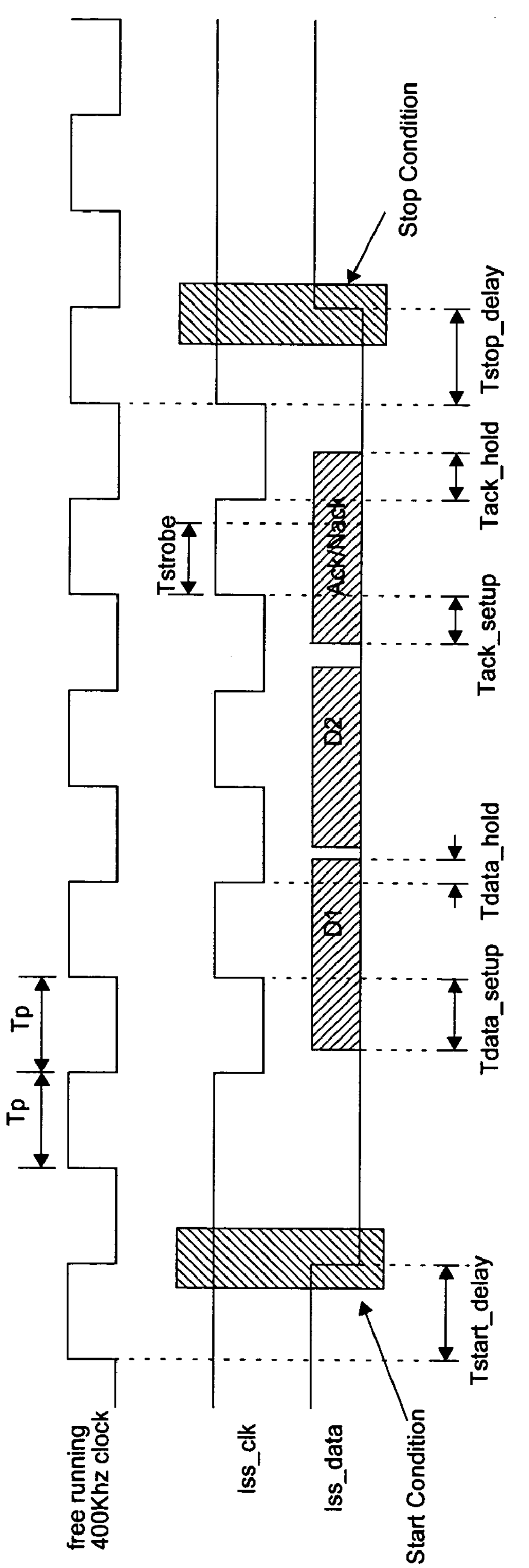
FIG. 84 shows LSS master timing

The LSS master timing parameters are shown in FIG. 84 and the associated values are shown in Table 105.

TABLE 105

LSS master timing parameters

| Parameter | Description | min | nom | max | unit |
|---|---|---|---|---|---|
| LSS Master Driving | | | | | |
| Tp | LSS clock period divided by 2 | 8 | 200 | FFFF | pclk cycles |
| Tstart_delay | Time to start data edge from rising clock edge | Tp + LssClocktoDataHold | | | pclk cycles |
| Tstop_delay | Time to stop data edge from rising clock edge | Tp + LssClocktoDataHold | | | pclk cycles |
| Tdata_setup | Time from data setup to rising clock edge | Tp − 2 − LssClocktoDataHold | | | pclk cycles |
| Tdata_hold | Time from falling clock edge to data hold | LssClocktoDataHold | | | pclk cycles |
| Tack_setup | Time that outgoing (N)Ack is setup before lss_clk rising edge | Tp − 2 − LssClocktoDataHold | | | pclk cycles |
| Tack_hold | Time that outgoing (N)Ack is held after lss_clk falling edge | LssClocktoDataHold | | | pclk cycles |
| LSS Master Sampling | | | | | |
| Tstrobe | LSS master strobe point for incoming data and (N)Ack values | Tp − 2 | | Tp − 2 | pclk cycles |

DRAM Subsystem

20 DRAM Interface Unit (DIU)

20.1 Overview

Figure 85:
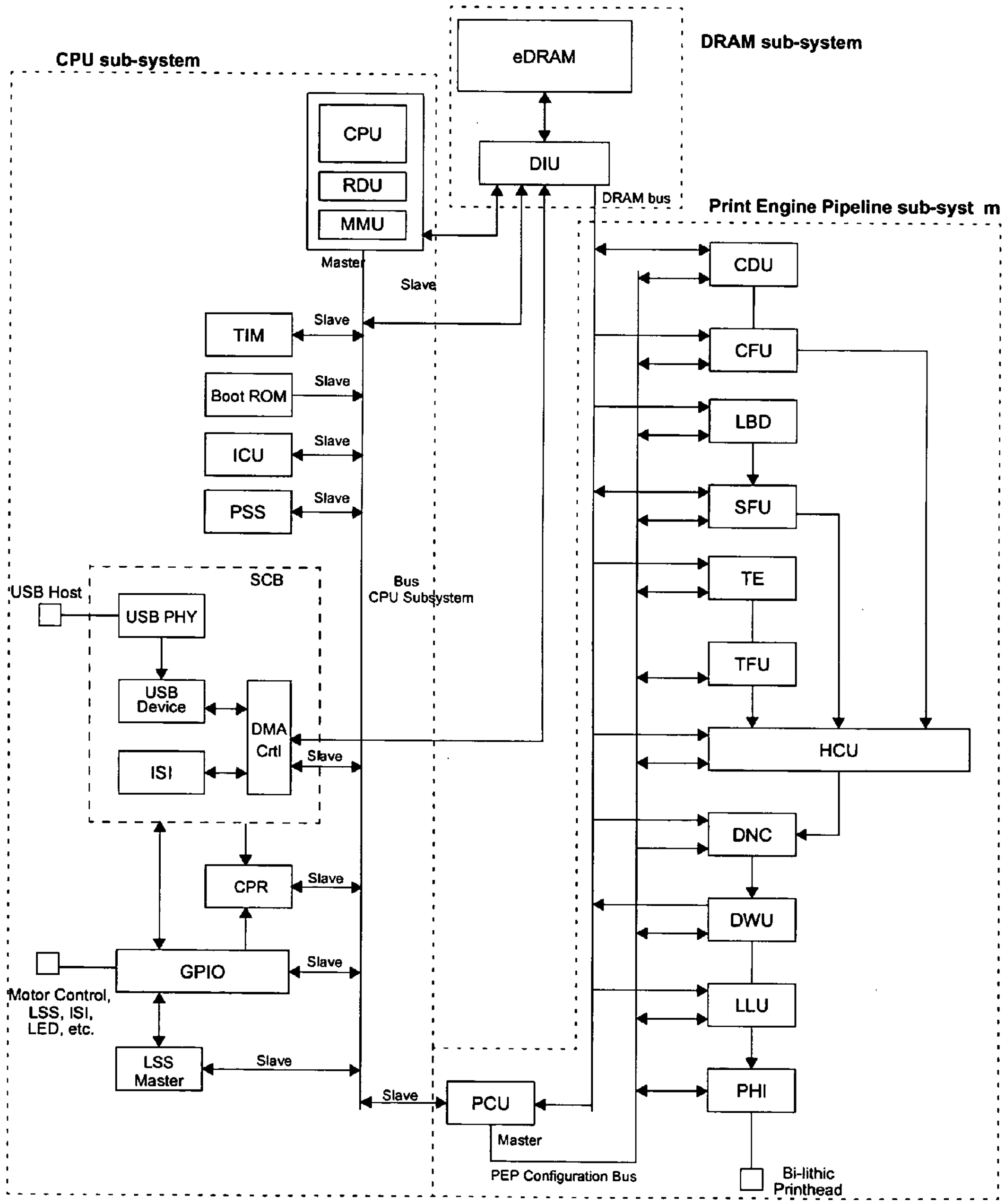
FIG. 85 shows a SoPEC system top level partition

FIG. 85 shows how the DIU provides the interface between the on-chip 20 Mbit embedded DRAM and the rest of SoPEC. In addition to outlining the functionality of the DIU, this chapter provides a top-level overview of the memory storage and access patterns of SoPEC and the buffering required in the various SoPEC blocks to support those access requirements.

The main functionality of the DIU is to arbitrate between requests for access to the embedded DRAM and provide read or write accesses to the requesters. The DIU must also implement the initialisation sequence and refresh logic for the embedded DRAM.

The arbitration scheme uses a fully programmable timeslot mechanism for non-CPU requesters to meet the bandwidth and latency requirements for each unit, with unused slots re-allocated to provide best effort accesses. The CPU is allowed high priority access, giving it minimum latency, but allowing bounds to be placed on its bandwidth consumption.

The interface between the DIU and the SoPEC requesters is similar to the interface on PEC1 i.e. separate control, read data and write data busses.

The embedded DRAM is used principally to store:

CPU program code and data.

PEP (re)programming commands.

Compressed pages containing contone, bi-level and raw tag data and header information.

Decompressed contone and bi-level data.

Dotline store during a print.

Print setup information such as tag format structures, dither matrices and dead nozzle information.

20.2 IBM Cu-11 Embedded DRAM

20.2.1 Single Bank

SoPEC will use the 1.5 V core voltage option in IBM's 0.13 μm class Cu-11 process.

The random read/write cycle time and the refresh cycle time is 3 cycles at 160 MHz [16]. An open page access will complete in 1 cycle if the page mode select signal is clocked at 320 MHz or 2 cycles if the page mode select signal is clocked every 160 MHz cycle. The page mode select signal will be clocked at 160 MHz in SoPEC in order to simplify timing closure. The DRAM word size is 256 bits.

Most SoPEC requesters will make single 256 bit DRAM accesses (see Section 20.4). These accesses will take 3 cycles as they are random accesses i.e. they will most likely be to a different memory row than the previous access.

The entire 20 Mbit DRAM will be implemented as a single memory bank. In Cu-11, the maximum single instance size is 16 Mbit. The first 1 Mbit tile of each instance contains an area overhead so the cheapest solution in terms of area is to have only 2 instances. 16 Mbit and 4 Mbit instances would together consume an area of 14.63 $mm^2$ as would 2 times 10 Mbit instances. 4 times 5 Mbit instances would require 17.2 $mm^2$.

The instance size will determine the frequency of refresh. Each refresh requires 3 clock cycles. In Cu-11 each row consists of 8 columns of 256-bit words. This means that 10 Mbit requires 5120 rows. A complete DRAM refresh is required every 3.2 ms. Two times 10 Mbit instances would require a refresh every 100 clock cycles, if the instances are refreshed in parallel.

The SoPEC DRAM will be constructed as two 10 Mbit instances implemented as a single memory bank.

20.3 SoPEC Memory Usage Requirements

The memory usage requirements for the embedded DRAM are shown in Table 106.

TABLE 106

Memory Usage Requirements

| Block | Size | Description |
|---|---|---|
| Compressed page store | 2048 Kbytes | Compressed data page store for Bi-level and contone data |
| Decompressed Contone Store | 108 Kbyte | 13824 lines with scale factor 6 = 2304 pixels, store 12 lines, 4 colors = 108 kB<br>13824 lines with scale factor 5 = 2765 pixels, store 12 lines, 4 colors = 130 kB |
| Spot line store | 5.1 Kbyte | 13824 dots/line so 3 lines is 5.1 kB |
| Tag Format Structure | Typically 12 Kbyte (2.5 mm tags @ 800 dpi) | 55 kB in for 384 dot line tags<br>2.5 mm tags (1/10th inch) @ 1600 dpi require 160 dot lines = 160/384 × 55 or 23 kB<br>2.5 mm tags (1/10th inch) @ 800 dpi require 80/384 × 55 = 12 kB |
| Dither Matrix store | 4 Kbytes | 64 × 64 dither matrix is 4 kB<br>128 × 128 dither matrix is 16 kB<br>256 × 256 dither matrix is 64 kB |
| DNC Dead Nozzle Table | 1.4 Kbytes | Delta encoded, (10 bit delta position + 6 dead nozzle mask) × % Dnozzle<br>5% dead nozzles requires (10 + 6) × 692 Dnozzles = 1.4 Kbytes |
| Dot-line store | 369.6 Kbytes | Assume each color row is separated by 5 dot lines on the print head<br>The dot line store will be<br>0 + 5 + 10 . . . 50 + 55 = 330 half dot lines + 48 extra half dot lines (4 per dot row) + 60 extra half dot lines estimated to account for printhead misalignment = 438 half dot lines. |

TABLE 106-continued

| Memory Usage Requirements | | |
|---|---|---|
| Block | Size | Description |
| | | 438 half dot lines of 6912 dots = 369.6 Kbytes |
| PCU Program code | 8 Kbytes | 1024 commands of 64 bits = 8 kB |
| CPU | 64 Kbytes | Program code and data |
| TOTAL | 2620 Kbytes (12 Kbyte TFS storage) | |

Note:
Total storage is fixed to 2560 Kbytes to align to 20 Mbit DRAM. This will mean that less space than noted in Table may be available for the compressed band store.

20.4 SoPEC Memory Access Patterns

Table 107 shows a summary of the blocks on SoPEC requiring access to the embedded DRAM and their individual memory access patterns. Most blocks will access the DRAM in single 256-bit accesses. All accesses must be padded to 256-bits except for 64-bit CDU write accesses and CPU write accesses. Bits which should not be written are masked using the individual DRAM bit write inputs or byte write inputs, depending on the foundry. Using single 256-bit accesses means that the buffering required in the SoPEC DRAM requesters will be minimized.

TABLE 107

| Memory access patterns of SoPEC DRAM Requesters | | |
|---|---|---|
| DRAM requester | Direction | Memory access pattern |
| CPU | R | Single 256-bit reads. |
| | W | Single 32-bit, 16-bit or 8-bit writes. |
| SCB | R | Single 256-bit reads. |
| | W | Single 256-bit writes, with byte enables. |
| CDU | R | Single 256-bit reads of the compressed contone data. |
| | W | Each CDU access is a write to 4 consecutive DRAM words in the same row but only 64 bits of each word are written with the remaining bits write masked. The access time for this 4 word page mode burst is 3 + 2 + 2 + 2 = 9 cycles if the page mode select signal is clocked at 160 MHz. |
| CFU | R | Single 256 bit reads. |
| LBD | R | Single 256 bit reads. |
| SFU | R | Separate single 256 bit reads for previous and current line but sharing the same DIU interface |
| | W | Single 256 bit writes. |
| TE(TD) | R | Single 256 bit reads. Each read returns 2 times 128 bit tags. |
| TE(TFS) | R | Single 256 bit reads. TFS is 136 bytes. This means there is unused data in the fifth 256 bit read. A total of 5 reads is required. |
| HCU | R | Single 256 bit reads. 128 × 128 dither matrix requires 4 reads per line with double buffering. 256 × 256 dither matrix requires 8 reads at the end of the line with single buffering. |
| DNC | R | Single 256 bit dead nozzle table reads. Each dead nozzle table read con tains 16 dead-nozzle tables entries each of 10 delta bits plus 6 dead nozzle mask bits. |
| DWU | W | Single 256 bit writes since enable/disable DRAM access per color plane. |
| LLU | R | Single 256 bit reads since enable/disable DRAM access per color plane. |
| PCU | R | Single 256 bit reads. Each PCU command is 64 bits so each 256 bit word can contain 4 PCU commands. PCU reads from DRAM used for reprogramming PEP should be executed with minimum latency. If this occurs between pages then there will be free bandwidth as most of the other SoPEC Units will not be requesting from DRAM. If this occurs between bands then the LDB, CDU and TE bandwidth will be free. So the PCU should have a high priority to access to any spare bandwidth. |
| Refresh | | Single refresh. |

20.5 Buffering Required in SoPEC DRAM Requesters

If each DIU access is a single 256-bit access then we need to provide a 256-bit double buffer in the DRAM requester. If the DRAM requester has a 64-bit interface then this can be implemented as an 8×64-bit FIFO.

TABLE 108

Buffer sizes in SoPEC DRAM requesters

| DRAM Requester | Direction | Access patterns | Buffering required in block |
|---|---|---|---|
| CPU | R | Single 256-bit reads. | Cache. |
| | W | Single 32-bit writes but allowing 16-bit or byte addressable writes. | None. |
| SCB | R | Single 256-bit reads. | Double 256-bit buffer. |
| | W | Single 256-bit writes, with byte enables. | Double 256-bit buffer. |
| CDU | R | Single 256-bit reads of the compressed contone data. | Double 256-bit buffer. |
| | W | Each CDU access is a write to 4 consecutive DRAM words in the same row but only 64 bits of each word are written with the remaining bits write masked. | Double half JPEG block buffer. |
| CFU | R | Single 256 bit reads. | Triple 256-bit buffer. |
| LBD | R | Single 256 bit reads. | Double 256-bit buffer. |
| SFU | R | Separate single 256 bit reads for previous and cur rent line but sharing the same DIU interface | Double 256-bit buffer for each read channel. |
| | W | Single 256 bit writes. | Double 256-bit buffer. |
| TE(TD) | R | Single 256 bit reads. | Double 256-bit buffer. |
| TE(TFS) | R | Single 256 bit reads. TFS is 136 bytes. This means there is unused data in the fifth 256 bit read. A total of 5 reads is required. | Double line-buffer for 136 bytes implemented in TE. |
| HCU | R | Single 256 bit reads. 128 × 128 dither matrix requires 4 reads per line with double buffering. 256 × 256 dither matrix requires 8 reads at the end of the line with single buffering. | Configurable between double 128 byte buffer and single 256 byte buffer. |
| DNC | R | Single 256 bit reads | Double 256-bit buffer. Deeper buffering could be specified to cope with local clusters of dead nozzles. |
| DWU | W | Single 256 bit writes per enabled odd/even color plane. | Double 256-bit buffer per color plane. |
| LLU | R | Single 256 bit reads per enabled odd/even color plane. | Double 256-bit buffer per color plane. |
| PCU | R | Single 256 bit reads. Each PCU command is 64 bits so each 256 bit DRAM read can contain 4 PCU commands. Requested command is read from DRAM together with the next 3 contiguous 64-bits which are cached to avoid unnecessary DRAM reads. | Single 256-bit buffer. |
| Refresh | | Single refresh. | None. |

20.6 SoPEC DIU Bandwidth Requirements

TABLE 109

SoPEC DIU Bandwidth Requirements

| Block Name | Direction | Number of cycles between each 256-bit DRAM access to meet peak bandwidth | Peak Bandwidth which must be supplied (bits/cycle) | Average Bandwidth (bits/cycle) | Example number of allocated timeslots[1] |
|---|---|---|---|---|---|
| CPU | R | | | | |
| | W | | | | |
| SCB | R | | | | |
| | W | 3482 | 0.734 | 0.3933 | 1 |

TABLE 109-continued

SoPEC DIU Bandwidth Requirements

| Block Name | Direction | Number of cycles between each 256-bit DRAM access to meet peak bandwidth | Peak Bandwidth which must be supplied (bits/cycle) | Average Bandwidth (bits/cycle) | Example number of allocated timeslots[1] |
|---|---|---|---|---|---|
| CDU | R | 128 (SF = 4), 288 (SF = 6), 1:1 compression 4 | 64/n2 (SF = n), 1.8 (SF = 6), 4 (SF = 4) (1:1 compression) | 32/10*n2 (SF = n), 0.09 (SF = 6), 0.2 (SF = 4) (10:1 compression) 5 | 1 (SF = 6) 2 (SF = 4) |
| | W | For individual accesses: 16 cycles (SF = 4), 36 cycles (SF = 6), n2 cycles (SF = n). Will be implemented as a page mode burst of 4 accesses every 64 cycles (SF = 4), 144 (SF = 6), 4*n2 (SF = n) cycles 6 | 64/n2 (SF = n), 1.8 (SF = 6), 4 (SF = 4) | 32/n2 (SF = n) 7, 0.9 (SF = 6), 2 (SF = 4) | 2 (SF = 6) 8 4 (SF = 4) |
| CFU | R | 32 (SF = 4), 48 (SF = 6) 9 | 32/n (SF = n), 5.4 (SF = 6), 8 (SF = 4) | 32/n (SF = n), 5.4 (SF = 6), 8 (SF = 4) | 6 (SF = 6) 8 (SF = 4) |
| LBD | R | 256 (1:1 compression) 10 | 1 (1:1 compression) | 0.1 (10:1 compression) 11 | 1 |
| SFU | R | 12812 | 2 | 2 | 2 |
| | W | 25613 | 1 | 1 | 1 |
| TE(TD) | R | 25214 | 1.02 | 1.02 | 1 |
| TE(TFS) | R | 5 reads per line 15 | 0.093 | 0.093 | 0 |
| HCU | R | 4 reads per line for 128 × 128 dither matrix 16 | 0.074 | 0.074 | 0 |
| DNC | R | 106 (5% dead-nozzles 10-bit delta encoded) 17 | 2.4 (clump of dead nozzles) | 0.8 (equally spaced dead nozzles) | 3 |
| DWU | W | 6 writes every 25618 | 6 | 6 | 6 |
| LLU | R | 8 reads every 25619 | 8 | 6 | 8 |
| PCU | R | 25620 | 1 | 1 | 1 |
| Refresh | | 10021 | 2.56 | 2.56 | 3 (effective) |
| TOTAL | | | SF = 6:34.9 SF = 4:41.9 excluding CPU | SF = 6:27.5 SF = 4:31.2 excluding CPU | SF = 6:36 excluding CPU. SF = 4:41 excluding CPU |

Notes:

1: The number of allocated timeslots is based on 64 timeslots each of 1 bit/cycle but broken down to a granularity of 0.25 bit/cycle. Bandwidth is allocated based on peak bandwidth.

2: Wire-speed bandwidth for a 4 wire SCB configuration is 32 Mbits/s for each wire plus 12 Mbit/s for USB. This is a maximum of 138 Mbit/s. The maximum effective data rate is 26 Mbits/s for each wire plus 8 Mbit/s for USB. This is 112 Mbit/s. 112 Mbit/s is 0.734 bits/cycle or 256 bits every 348 cycles.

3: Wire-speed bandwidth for a 2 wire SCB configuration is 32 Mbits/s for each wire plus 12 Mbit/s for USB. This is a maximum of 74 Mbit/s. The maximum effective data rate is 26 Mbits/s for each wire plus 8 Mbit/s for USB. This is 60 Mbit/s. 60 Mbit/s is 0.393 bits/cycle or 256 bits every 650 cycles.

4: At 1:1 compression CDU must read a 4 color pixel (32 bits) every $SF^2$ cycles.

5: At 10:1 average compression CDU must read a 4 color pixel (32 bits) every $10*SF^2$ cycles.

6: 4 color pixel (32 bits) is required, on average, by the CFU every $SF^2$ (scale factor) cycles. The time available to write the data is a function of the size of the buffer in DRAM. 1.5 buffering means 4 color pixel (32 bits) must be written every $SF^2/2$ (scale factor) cycles. Therefore, at a scale factor of SF, 64 bits are required every $SF^2$ cycles.

Since 64 valid bits are written per 256-bit write (Figure n page379 on page Err r! B kmark not defined.) then the DRAM is accessed every $SF^2$ cycles i.e. at SF4 an access every 16 cycles, at SF6 an access every 36 cycles.

If a page mode burst of 4 accesses is used then each access takes (3 + 2 + 2 + 2) equals 9 cycles. This means at SF, a set of 4 back-to-back accesses must occur every $4*SF^2$cycles. This assumes the page mode select signal is clocked at 160 MHz. CDU timeslots therefore take 9 cycles.

For scale factors lower than 4 double buffering will be used.

7: The peak bandwidth is twice the average bandwidth in the case of 1.5 buffering.

8: Each CDU(W) burst takes 9 cycles instead of 4 cycles for other accesses so CDU timeslots are longer.

9: 4 color pixel (32 bits) read by CFU every SF cycles. At SF4, 32 bits is required every 4 cycles or 256 bits every 32 cycles. At SF6, 32 bits every 6 cycles or 256 bits every 48 cycles.

10: At 1:1 compression require 1 bit/cycle or 256 bits every 256 cycles.

11: The average bandwidth required at 10:1 compression is 0.1 bits/cycle.

TABLE 109-continued

SoPEC DIU Bandwidth Requirements

| Block Name | Direction | Number of cycles between each 256-bit DRAM access to meet peak bandwidth | Peak Bandwidth which must be supplied (bits/cycle) | Average Bandwidth (bits/cycle) | Example number of allocated timeslots[1] |
|---|---|---|---|---|---|

12: Two separate reads of 1 bit/cycle.
13: Write at 1 bit/cycle.
14: Each tag can be consumed in at most 126 dot cycles and requires 128 bits. This is a maximum rate of 256 bits every 252 cycles.
15: 17 × 64 bit reads per line in PEC1 is 5 × 256 bit reads per line in SoPEC. Double-line buffered storage.
16: 128 bytes read per line is 4 × 256 bit reads per line. Double-line buffered storage.
17: 5% dead nozzles 10-bit delta encoded stored with 6-bit dead nozzle mask requires 0.8 bits/cycle read access or a 256-bit access every 320 cycles. This assumes the dead nozzles are evenly spaced out. In practice dead nozzles are likely to be clumped. Peak bandwidth is estimated as 3 times average bandwidth.
18: 6 bits/cycle requires 6 × 256 bit writes every 256 cycles.
19: 6 bits/160 MHz SoPEC cycle average but will peak at 2 × 6 bits per 106 MHz print head cycle or 8 bits/ SoPEC cycle. The PHI can equalise the DRAM access rate over the line so that the peak rate equals the average rate of 6 bits/ cycle. The print head is clocked at an effective speed of 106 MHz.
20: Assume one 256 read per 256 cycles is sufficient i.e. maximum latency of 256 cycles per access is allowable.
21: Refresh must occur every 3.2 ms. Refresh occurs row at a time over 5120 rows of 2 parallel 10 Mbit instances. Refresh must occur every 100 cycles. Each refresh takes 3 cycles.

20.7 DIU BUS Topology 20.7.1 Basic Topology

TABLE 110

SoPEC DIU Requesters

| Read | Write | Other |
|---|---|---|
| CPU | CPU | Refresh |
| SCB | SCB | |
| CDU | CDU | |
| CFU | SFU | |
| LBD | DWU | |
| SFU | | |
| TE(TD) | | |
| TE(TFS) | | |
| HCU | | |
| DNC | | |
| LLU | | |
| PCU | | |

Table 110 shows the DIU requesters in SoPEC. There are 12 read requesters and 5 write requesters in SoPEC as compared with 8 read requesters and 4 write requesters in PEC1. Refresh is an additional requester.

In PEC1, the interface between the DIU and the DIU requesters had the following main features:

- separate control and address signals per DIU requester multiplexed in the DIU according to the arbitration scheme,
- separate 64-bit write data bus for each DRAM write requester multiplexed in the DIU,
- common 64-bit read bus from the DIU with separate enables to each DIU read requester.

Timing closure for this bussing scheme was straightforward in PEC1. This suggests that a similar scheme will also achieve timing closure in SoPEC. SoPEC has 5 more DRAM requesters but it will be in a 0.13 um process with more metal layers and SoPEC will run at approximately the same speed as PEC1.

Using 256-bit busses would match the data width of the embedded DRAM but such large busses may result in an increase in size of the DIU and the entire SoPEC chip. The SoPEC requestors would require double 256-bit wide buffers to match the 256-bit busses. These buffers, which must be implemented in flip-flops, are less area efficient than 8-deep 64-bit wide register arrays which can be used with 64-bit busses. SoPEC will therefore use 64-bit data busses. Use of 256-bit busses would however simplify the DIU implementation as local buffering of 256-bit DRAM data would not be required within the DIU.

20.7.1.1 CPU DRAM Access

The CPU is the only DIU requestor for which access latency is critical. All DIU write requesters transfer write data to the DIU using separate point-to-point busses. The CPU will use the cpu_dataout[31:0] bus. CPU reads will not be over the shared 64-bit read bus. Instead, CPU reads will use a separate 256-bit read bus.

20.7.2 Making More Efficient Use of DRAM Bandwidth

The embedded DRAM is 256-bits wide. The 4 cycles it takes to transfer the 256-bits over the 64-bit data busses of SoPEC means that effectively each access will be at least 4 cycles long. It takes only 3 cycles to actually do a 256-bit random DRAM access in the case of IBM DRAM.

20.7.2.1 Common Read Bus

Figure 86:
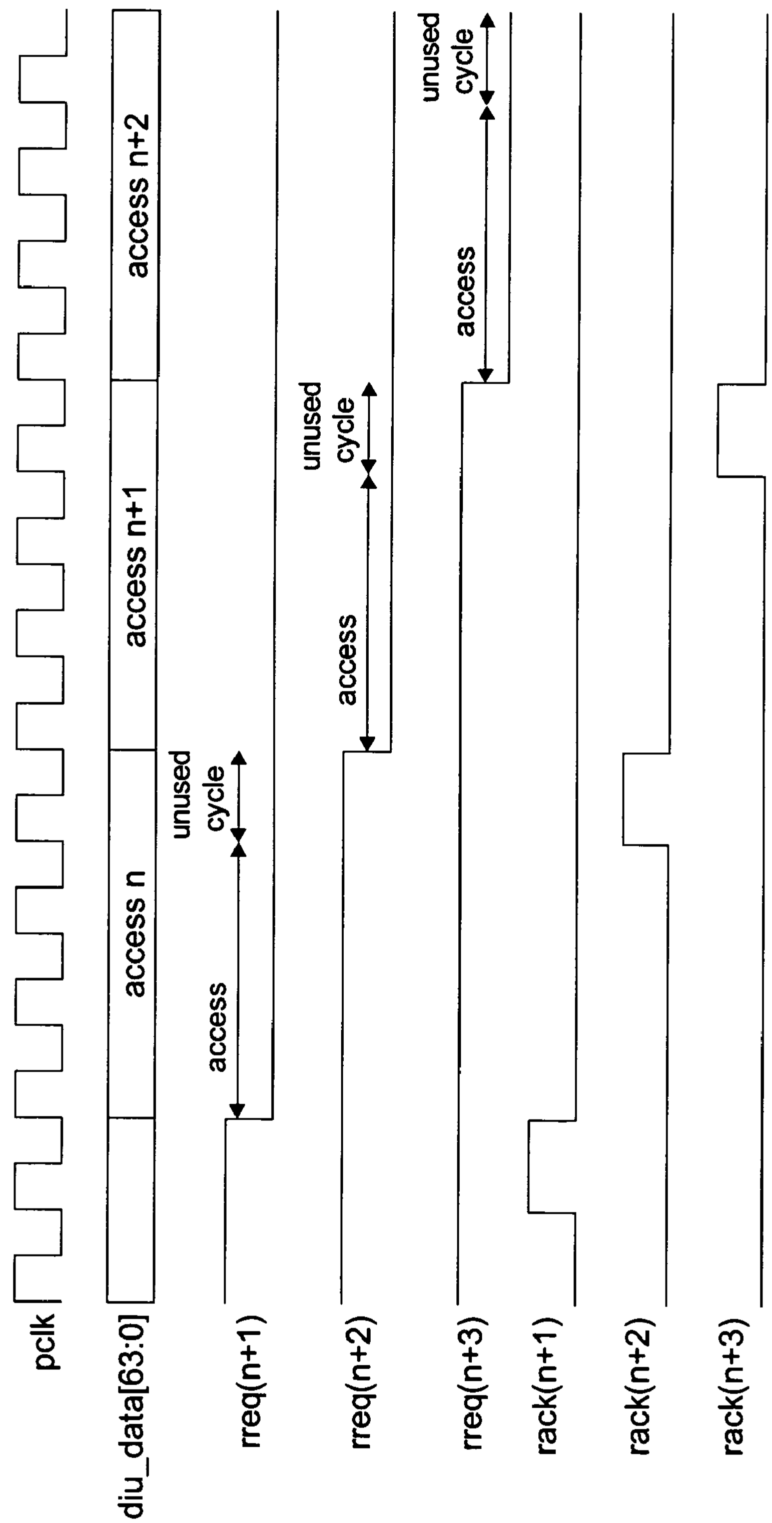
FIG. 86 shows an ead bus with 3 cycle random DRAM read accesses

If we have a common read data bus, as in PEC1, then if we are doing back to back read accesses the next DRAM read cannot start until the read data bus is free. So each DRAM read access can occur only every 4 cycles. This is shown in FIG. 86 with the actual DRAM access taking 3 cycles leaving 1 unused cycle per access.

20.7.2.2 Interleaving CPU and Non-CPU Read Accesses

The CPU has a separate 256-bit read bus. All other read accesses are 256-bit accesses are over a shared 64-bit read bus. Interleaving CPU and non-CPU read accesses means the effective duration of an interleaved access timeslot is the DRAM access time (3 cycles) rather than 4 cycles.

Figure 87:
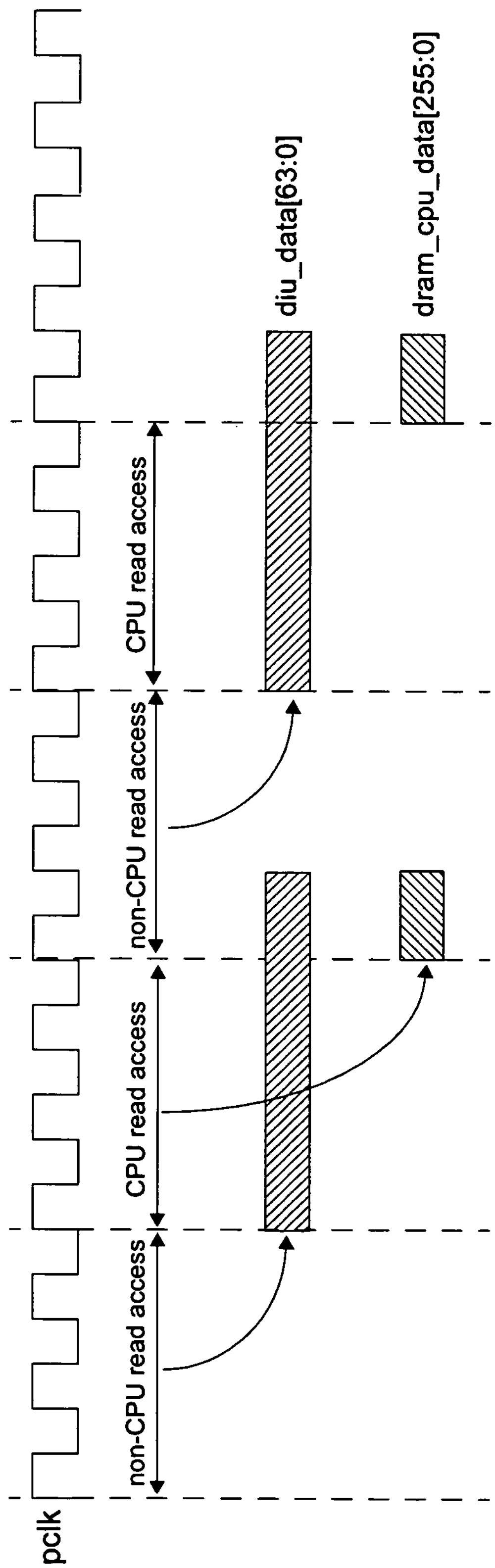
FIG. 87 shows interleaving of CPU and non-CPU read accesses

FIG. 87 shows interleaved CPU and non-CPU read accesses.

20.7.2.3 Interleaving Read and Write Accesses

Having separate write data busses means write accesses can be interleaved with each other and with read accesses. So now the effective duration of an interleaved access timeslot is the DRAM access time (3 cycles) rather than 4 cycles. Interleaving is achieved by ordering the DIU arbitration slot allocation appropriately.

Figure 88:
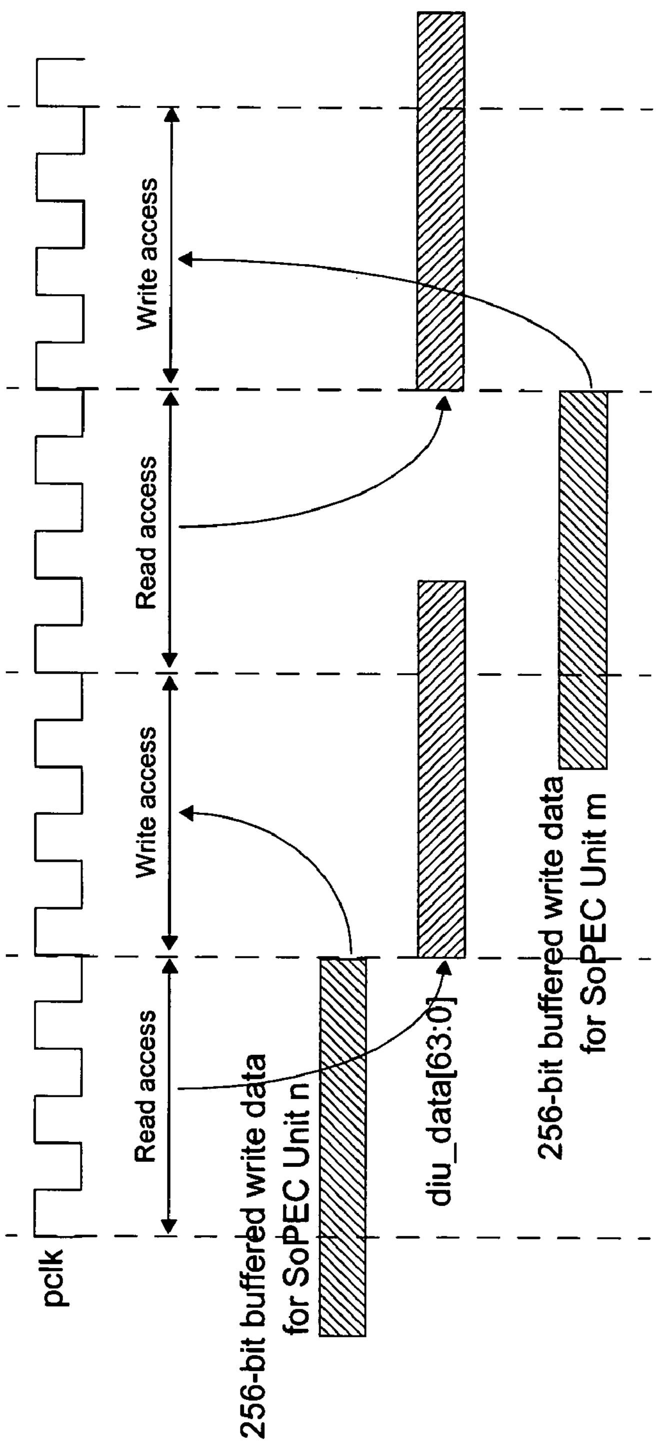
FIG. 88 shows interleaving of read and write accesses with 3 cycle random DRAM accesses
Figure 89:
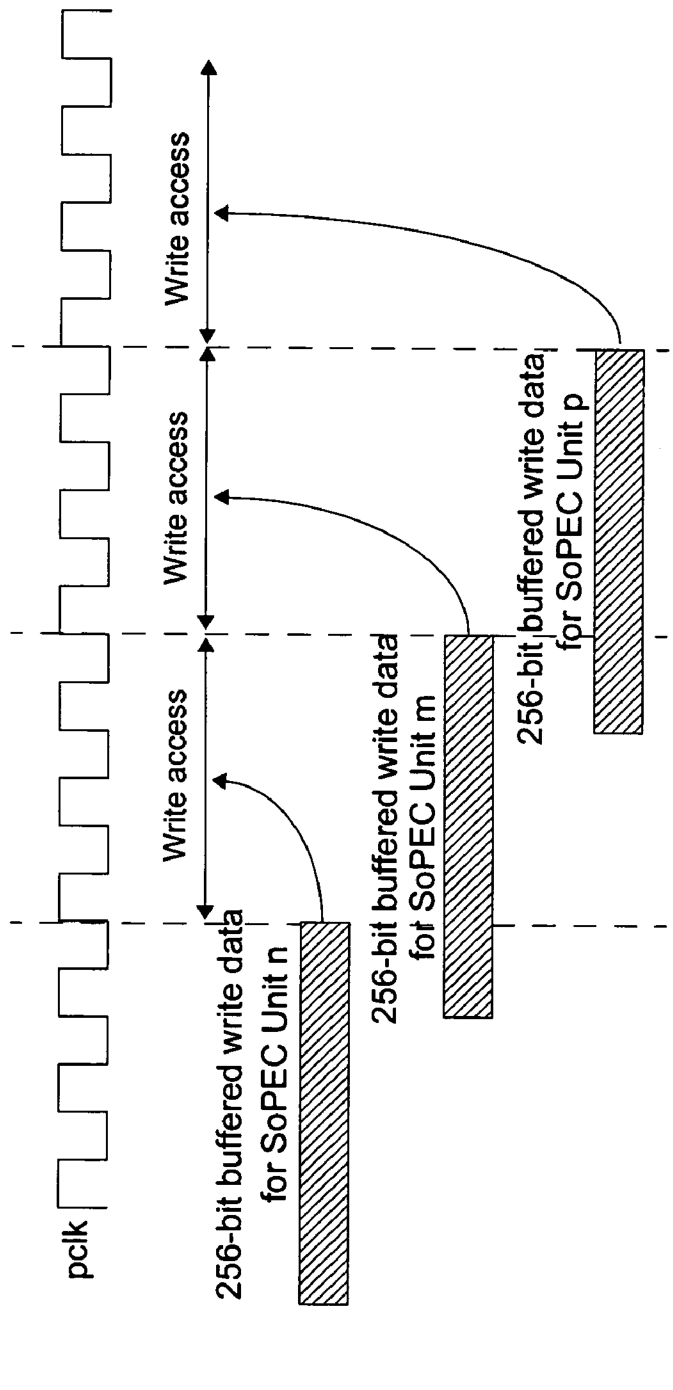
FIG. 89 shows interleaving of write accesses with 3 cycle random DRAM accesses

FIG. 88 shows interleaved read and write accesses. FIG. 89 shows interleaved write accesses.

256-bit write data takes 4 cycles to transmit over 64-bit busses so a 256-bit buffer is required in the DIU to gather the write data from the write requester. The exception is CPU write data which is transferred in a single cycle.

FIG. 89 shows multiple write accesses being interleaved to obtain 3 cycle DRAM access. Since two write accesses can overlap two sets of 256-bit write buffers and multiplexors to connect two write requestors simultaneously to the DIU are required.

Write requestors only require approximately one third of the total non-CPU bandwidth. This means that a rule can be introduced such that non-CPU write requestors are not allocated adjacent timeslots. This means that a single 256-bit write buffer and multiplexor to connect the one write requestor at a time to the DIU is all that is required.

Note that if the rule prohibiting back-to-back non-CPU writes is not adhered to, then the second write slot of any attempted such pair will be disregarded and re-allocated under the unused read round-robin scheme.

20.7.3 Bus Widths Summary

TABLE 111

SoPEC DIU Requesters Data Bus Width

| Read | Bus access width | Write | Bus access width |
|---|---|---|---|
| CPU | 256 (separate) | CPU | 32 |
| SCB | 64 (shared) | SCB | 64 |
| CDU | 64 (shared) | CDU | 64 |
| CFU | 64 (shared) | SFU | 64 |
| LBD | 64 (shared) | DWU | 64 |
| SFU | 64 (shared) | | |
| TE(TD) | 64 (shared) | | |
| TE(TFS) | 64 (shared) | | |
| HCU | 64 (shared) | | |
| DNC | 64 (shared) | | |
| LLU | 64 (shared) | | |
| PCU | 64 (shared) | | |

20.7.4 Conclusions

Timeslots should be programmed to maximise interleaving of shared read bus accesses with other accesses for 3 cycle DRAM access. The interleaving is achieved by ordering the DIU arbitration slot allocation appropriately. CPU arbitration has been designed to maximise interleaving with non-CPU requesters 20.8 SoPEC DRAM Addressing Scheme The embedded DRAM is composed of 256-bit words. However the CPU-subsystem may need to write individual bytes of DRAM. Therefore it was decided to make the DIU byte addressable. 22 bits are required to byte address 20 Mbit of DRAM.

Most blocks read or write 256 bit words of DRAM. Therefore only the top 17 bits i.e. bits 21 to 5 are required to address 256-bit word aligned locations.

The exceptions are

CDU which can write 64-bits so only the top 19 address bits i.e. bits 21–3 are required.

CPU writes can be 8, 16 or 32-bits. The cpu_diu_wmask [1:0] pins indicate whether to write 8, 16 or 32 bits.

All DIU accesses must be within the same 256-bit aligned DRAM word. The exception is the CDU write access which is a write of 64-bits to each of 4 contiguous 256-bit DRAM words.

20.8.1 Write Address Constaints Specific to the CDU

Note the following conditions which apply to the CDU write address, due to the four masked page-mode writes which occur whenever a CDU write slot is arbitrated.

The CDU address presented to the DIU is cdu_diu_wadr [21:3].

Bits [4:3] indicate which 64-bit segment out of 256 bits should be written in 4 successive masked page-mode writes.

Each 10-Mbit DRAM macro has an input address port of width [15:0]. Of these bits, [2:0] are the "page address". Page-mode writes, where you just vary these LSBs (i.e. the "page" or column address), but keep the rest of the address constant, are faster than random writes. This is taken advantage of for CDU writes.

To guarantee against trying to span a page boundary, the DIU treats "cdu_diu_wadr[6:5]" as being fixed at "00".

From cdu_diu_wadr[21:3], a initial address of cdu_diu_wadr[21:7], concatenated with "00", is used as the starting location for the first CDU write. This address is then auto-incremented a further three times.

20.9 DIU Protocols

The DIU protocols are

Pipelined i.e. the following transaction is initiated while the previous transfer is in progress.

Split transaction i.e. the transaction is split into independent address and data transfers.

20.9.1 Read Protocol Except CPU

The SoPEC read requestors, except for the CPU, perform single 256-bit read accesses with the read data being transferred from the DIU in 4 consecutive cycles over a shared 64-bit read bus, diu_data[63:0]. The read address <unit>_diu_radr[21:5] is 256-bit aligned.

The read protocol is:

<unit>_diu_rreq is asserted along with a valid <unit>_diu_radr[21:5].

The DIU acknowledges the request with diu_<unit>_rack. The request should be deasserted. The minimum number of cycles between <unit>_diu_rreq being asserted and the DIU generating an diu_<unit>_rack strobe is 2 cycles (1 cycle to register the request, 1 cycle to perform the arbitration—see Section 20.14.10).

The read data is returned on diu_data[63:0] and its validity is indicated by diu_<unit>_rvalid. The overall 256 bits of data are transferred over four cycles in the order: [63:0]->[127:64]->[191:128]->[255:192].

When four diu_<unit>_rvalid pulses have been received then if there is a further request <unit>_diu_rreq should be asserted again. diu_<unit>_rvalid will be always be asserted by the DIU for four consecutive cycles. There is a fixed gap of 2 cycles between diu_<unit>_rack and the first diu_<unit>_rvalid pulse. For more detail on the timing of such reads and the implications for back-to-back sequences, see Section 20.14.10.

20.9.2 Read Protocol for CPU

The CPU performs single 256-bit read accesses with the read data being transferred from the DIU over a dedicated 256-bit read bus for DRAM data, dram_cpu_data[255.0]. The read address cpu_adr[21:5] is 256-bit aligned.

The CPU DIU read protocol is:

cpu_diu_rreq is asserted along with a valid cpu_adr[21:5].

The DIU acknowledges the request with diu_cpu_rack. The request should be deasserted. The minimum number of cycles between cpu_diu_rreq being asserted and the DIU generating a cpu_diu_rack strobe is 1 cycle (1 cycle to perform the arbitration—see Section 20.14.10).

The read data is returned on dram_cpu_data[255:0] and its validity is indicated by diu_cpu_rvalid.

When the diu_cpu_rvalid pulse has been received then if there is a further request cpu_diu_rreq should be asserted again. The diu_cpu_rvalid pulse with a gap of 1 cycle after rack (1 cycle for the read data to be returned from the DRAM—see Section 20.14.10).

20.9.3 Write Protocol Except CPU and CDU

The SoPEC write requestors, except for the CPU and CDU, perform single 256-bit write accesses with the write data being transferred to the DIU in 4 consecutive cycles over dedicated point-to-point 64-bit write data busses. The write address <unit>_diu_wadr[21:5] is 256-bit aligned.

The write protocol is:

<unit>_diu_wreq is asserted along with a valid <unit>_diu_wadr[21:5].

The DIU acknowledges the request with diu_<unit>_wack. The request should be deasserted. The minimum number of cycles between <unit>_diu_wreq being asserted and the DIU generating an diu_<unit>_wack strobe is 2 cycles (1 cycle to register the request, 1 cycle to perform the arbitration—see Section 20.14.10).

In the clock cycles following diu_<unit>_wack the SoPEC Unit outputs the <unit>_diu_data[63:0], asserting <unit>_diu_wvalid. The first <unit>_diu_wvalid pulse can occur the clock cycle after diu_<unit>_wack. <unit>_diu_wvalid remains asserted for the following 3 clock cycles. This allows for reading from an SRAM where new data is available in the clock cycle after the address has changed e.g. the address for the second 64-bits of write data is available the cycle after diu_<unit>_wack meaning the second 64-bits of write data is a further cycle later. The overall 256 bits of data is transferred over four cycles in the order: [63:0]->[127:64]->[191:128]->[255:192].

Figure 92:
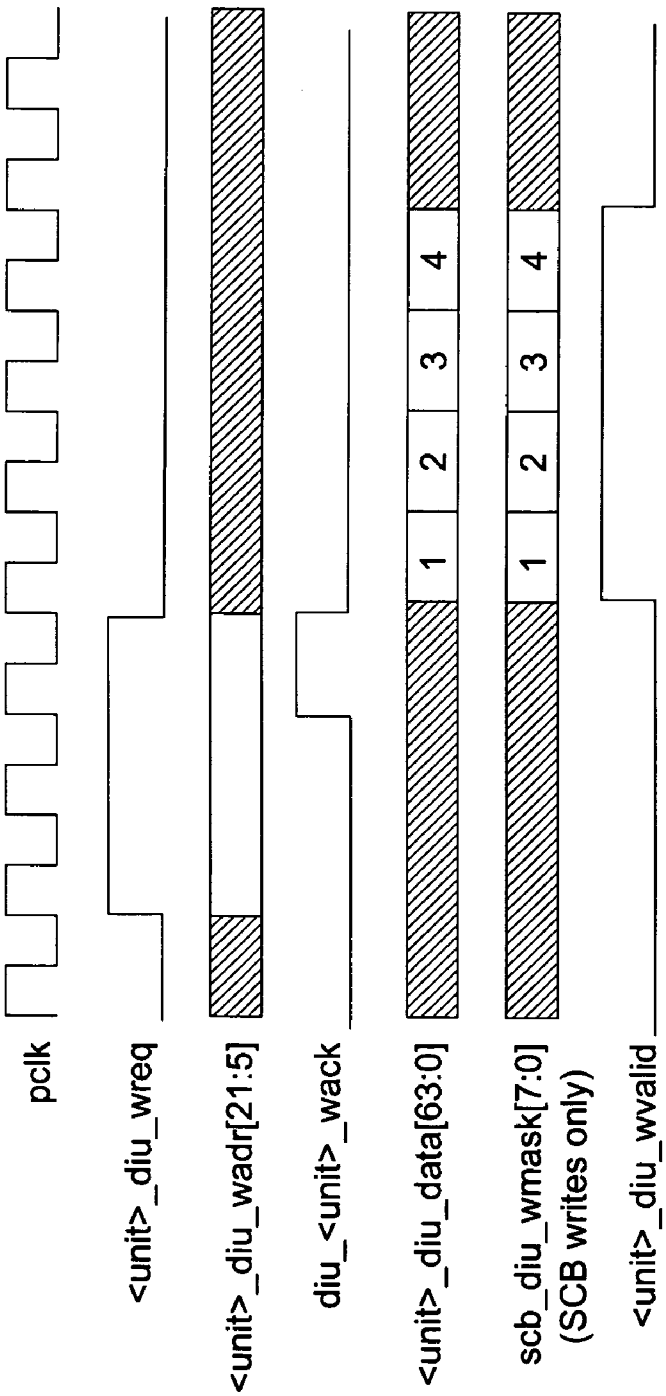
FIG. 92 shows a write protocol for a SoPEC Unit making a single 256-bit access

Note that for SCB writes, each 64-bit quarter-word has an 8-bit byte enable mask associated with it. A different mask is used with each quarter-word. The 4 mask values are transferred along with their associated data, as shown in FIG. 92.

If four consecutive <unit>_diu_wvalid pulses are not provided by the requester, then the arbitration logic will disregard the write and re-allocate the slot under the unused read round-robin scheme.

Once all the write data has been output then if there is a further request <unit>_diu_wreq should be asserted again.

20.9.4 CPU Write Protocol

The CPU performs single 128-bit writes to the DIU on a dedicated write bus, cpu_diu_wdata[127:0]. There is an accompanying write mask, cpu_diu_wmask[15:0], consisting of 16 byte enables and the CPU also supplies a 128-bit aligned write address on cpu_diu_wadr[21:4]. Note that writes are posted by the CPU to the DIU and stored in a 1-deep 35 buffer. When the DAU subsequently arbitrates in favour of the CPU, the contents of the buffer are written to DRAM.

Figure 93:
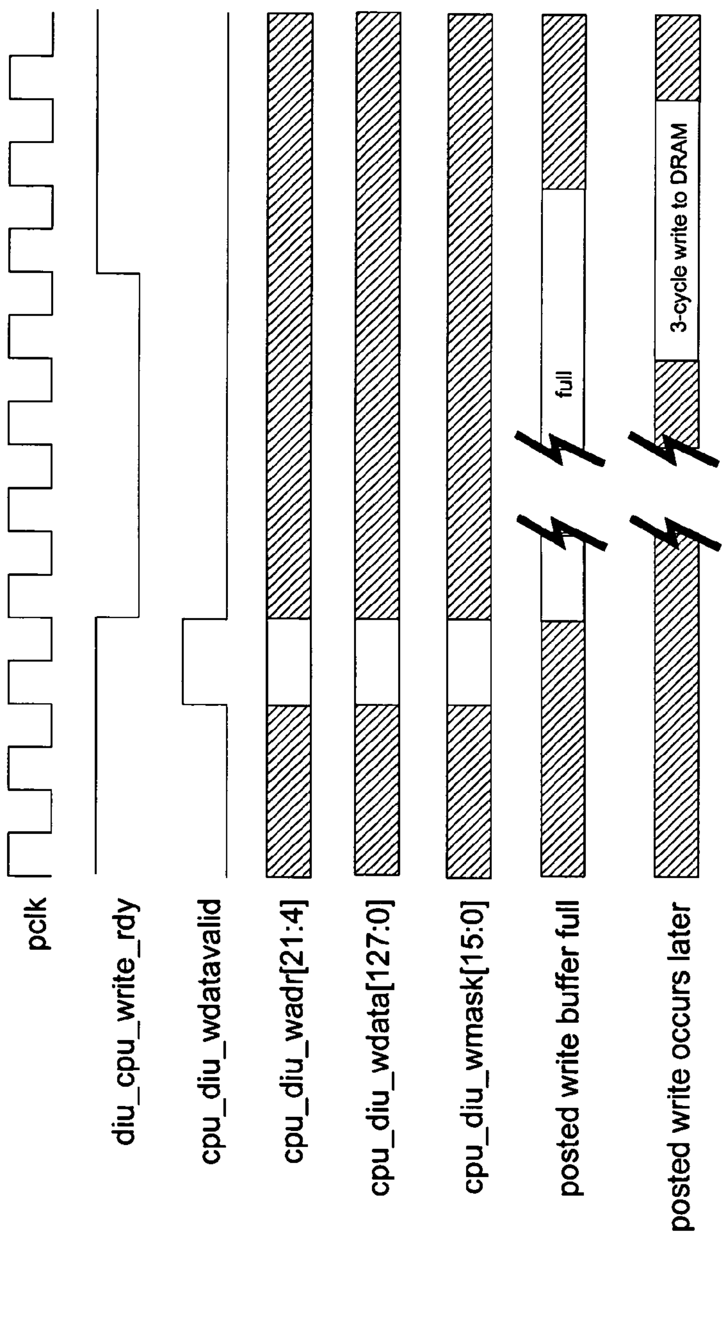
FIG. 93 shows a protocol for a posted, masked, 128-bit write by the CPU

The CPU write protocol, illustrated in FIG. 93, is as follows:—

The DIU signals to the CPU via diu_cpu_write_rdy that its write buffer is empty and that the CPU may post a write whenever it wishes.

The CPU asserts cpu_diu_wdatavalid to enable a write into the buffer and to confirm the validity of the write address, data and mask.

The DIU de-asserts diu_cpu_write_rdy in the following cycle to indicate that its buffer is full and that the posted write is pending execution.

When the CPU is next awarded a DRAM access by the DAU, the buffer's contents are written to memory. The DIU re-asserts diu_cpu_write_rdy once the write data has been captured by DRAM, namely in the "MSN1" DCU state.

The CPU can then, if it wishes, asynchronously use the new value of .diu_cpu_write_rdy to enable a new posted write in the same "MSN1" cycle.

20.9.5 CDU Write Protocol

The CDU performs four 64-bit word writes to 4 contiguous 256-bit DRAM addresses with the first address specified by cdu_diu_wadr[21:3]. The write address cdu_diu_wadr[21:5] is 256-bit aligned with bits cdu_diu_wadr[4:3] allowing the 64-bit word to be selected.

The write protocol is:

cdu_diu_wdata is asserted along with a valid cdu_diu_wadr[21:3].

The DIU acknowledges the request with diu_cdu_wack. The request should be deasserted. The minimum number of cycles between cdu_diu_wreq being asserted and the DIU generating an diu_cdu_wack strobe is 2 cycles (1 cycle to register the request, 1 cycle to perform the arbitration—see Section 20.14.10).

In the clock cycles following diu_cdu_wack the CDU outputs the cdu_diu_data[63:0], together with asserted cdu_diu_wvalid. The first cdu_diu_wvalid pulse can occur the clock cycle after diu_cdu_wack. cdu_diu_wvalid remains asserted for the following 3 clock cycles. This allows for reading from an SRAM where new data is available in the clock cycle after the address has changed e.g. the address for the second 64-bits of write data is available the cycle after diu_cdu_wack meaning the second 64-bits of write data is a further cycle later. Data is transferred over the 4-cycle window in an order, such that each successive 64 bits will be written to a monotonically increasing (by 1 location) 256-bit DRAM word.

If four consecutive cdu_diu_wvalid pulses are not provided with the data, then the arbitration logic will disregard the write and re-allocate the slot under the unused read round-robin scheme.

Once all the write data has been output then if there is a further request cdu_diu_wreq should be asserted again.

20.10 DIU Arbitration Mechanism

The DIU will arbitrate access to the embedded DRAM. The arbitration scheme is outlined in the next sections.

20.10.1 Timeslot Based Arbitration Scheme

Table summarised the bandwidth requirements of the SoPEC requestors to DRAM. If we allocate the DIU requestors in terms of peak bandwidth then we require 35.25 bits/cycle (at SF=6) and 40.75 bits/cycle (at SF=4) for all the requestors except the CPU.

A timeslot scheme is defined with 64 main timeslots. The number of used main timeslots is programmable between 1 and 64.

Since DRAM read requesters, except for the CPU, are connected to the DIU via a 64-bit data bus each 256-bit DRAM access requires 4 pclk cycles to transfer the read data over the shared read bus. The timeslot rotation period for 64 timeslots each of 4 pclk cycles is 256 pclk cycles or 1.6 μs, assuming pclk is 160 MHz. Each timeslot represents a 256-bit access every 256 pclk cycles or 1 bit/cycle. This is the granularity of the majority of DIU requesters bandwidth requirements in Table.

The SoPEC DIU requesters can be represented using 4 bits (Table n page 288 on page 268). Using 64 timeslots means that to allocate each timeslot to a requester, a total of 64×5-bit configuration registers are required for the 64 main timeslots.

Timeslot based arbitration works by having a pointer point to the current timeslot. When re-arbitration is signaled the arbitration winner is the current timeslot and the pointer advances to the next timeslot. Each timeslot denotes a single access. The duration of the timeslot depends on the access.

Note that advancement through the timeslot rotation is dependent on an enable bit, RotationSync, being set. The consequences of clearing and setting this bit are described in section 20.14.12.2.1 on page 295.

If the SoPEC Unit assigned to the current timeslot is not requesting then the unused timeslot arbitration mechanism outlined in Section 20.10.6 is used to select the arbitration winner.

Note that there is always an arbitration winner for every slot. This is because the unused read re-allocation scheme includes refresh in its round-robin protocol. If all other blocks are not requesting, an early refresh will act as fall-back for the slot.

20.10.2 Separate Read and Write Arbitration Windows

For write accesses, except the CPU, 256-bits of write data are transferred from the SoPEC DIU write requestors over 64-bit write busses in 4 clock cycles. This write data transfer latency means that writes accesses, except for CPU writes and also the CDU, must be arbitrated 4 cycles in advance. (The CDU is an exception because CDU writes can start once the first 64-bits of write data have been transferred since each 64-bits is associated with a write to a different 256-bit word).

Figure 96:
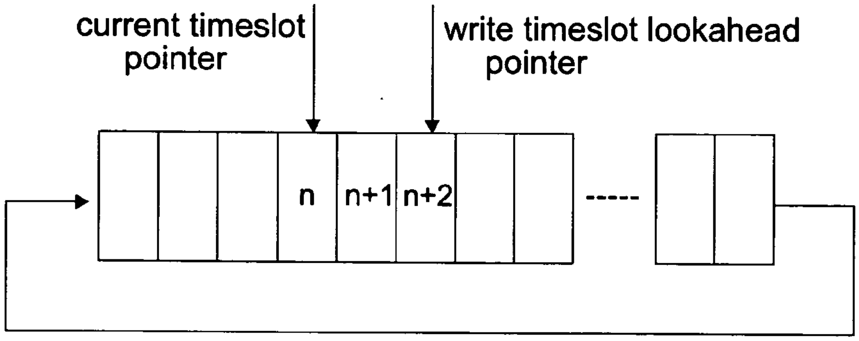
FIG. 96 shows timeslot-based arbitration with separate pointers

Since write arbitration must occur 4 cycles in advance, and the minimum duration of a timeslot duration is 3 cycles, the arbitration rules must be modified to initiate write accesses in advance. Accordingly, there is a write timeslot lookahead pointer shown in FIG. 96 two timeslots in advance of the current timeslot pointer.

The following examples illustrate separate read and write timeslot arbitration with no adjacent write timeslots. (Recall rule on adjacent write timeslots introduced in Section 20.7.2.3 on page 238.)

Figure 97:
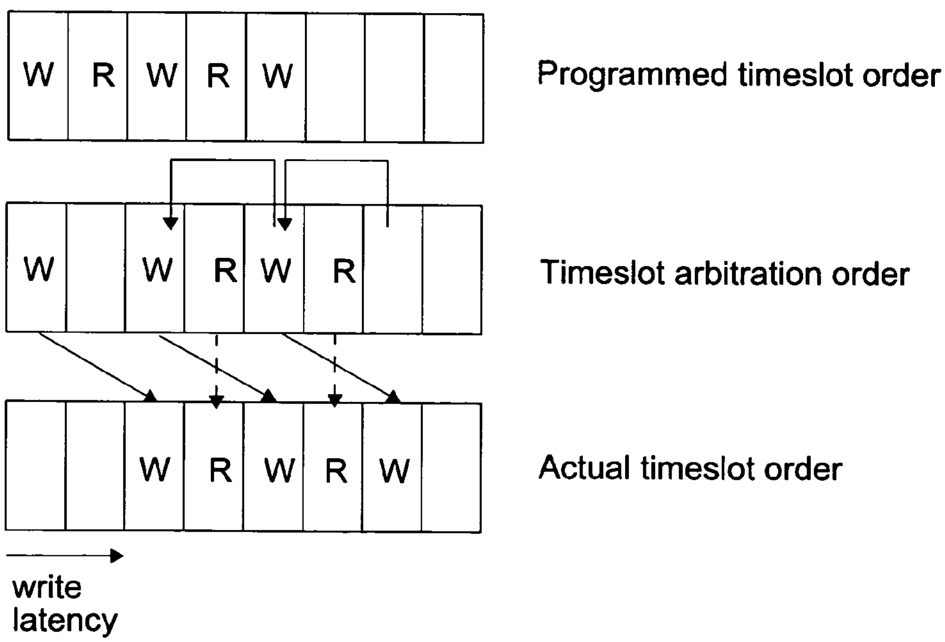
FIG. 97 shows a first example (a) of separate read and write arbitration

In FIG. 97 writes are arbitrated two timeslots in advance. Reads are arbitrated in the same timeslot as they are issued. Writes can be arbitrated in the same timeslot as a read. During arbitration the command address of the arbitrated SoPEC Unit is captured.

Figure 98:
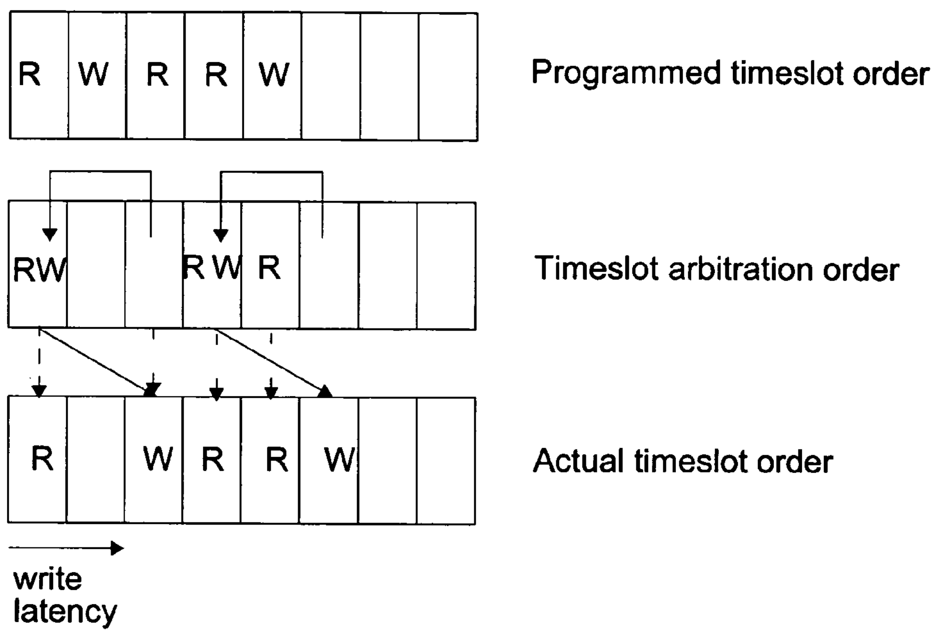
FIG. 98 shows a second example (b) of separate read and write arbitration
Figure 99:
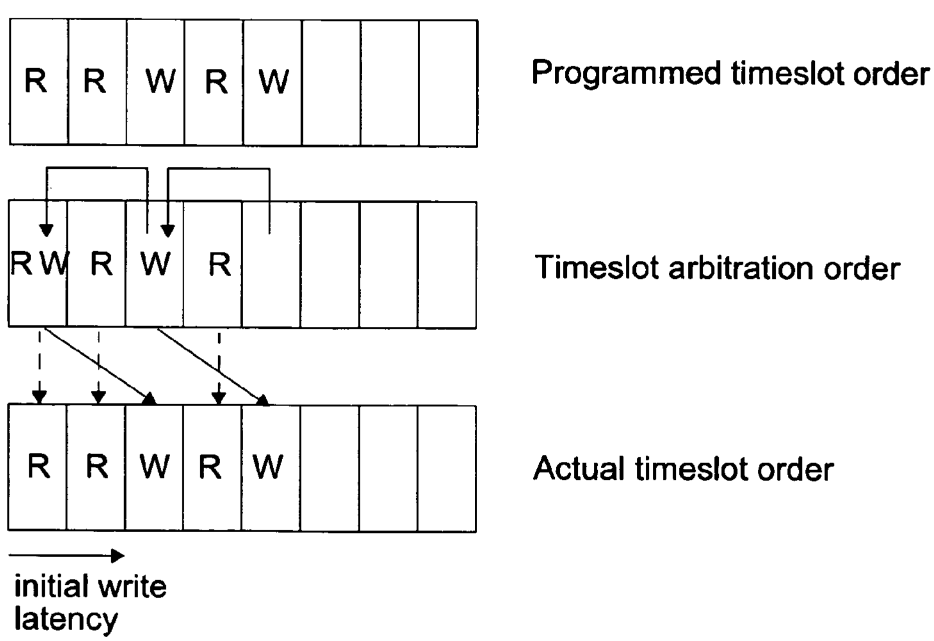
FIG. 99 shows a third example (c) of separate read and write arbitration

Other examples are shown in FIG. 98 and FIG. 99. The actual timeslot order is always the same as the programmed timeslot order i.e. out of order accesses do not occur and data coherency is never an issue.

Each write must always incur a latency of two timeslots.

Startup latency may vary depending on the position of the first write timeslot. This startup latency is not important.

Table 112 shows the 4 scenarios depending on whether the current timeslot and write timeslot lookahead pointers point to read or write accesses.

TABLE 112

Arbitration with separate windows for read and write accesses

| current timeslot pointer | write timeslot lookahead pointer | actions |
|---|---|---|
| Read | write | Initiate DRAM read, Initiate write arbitration |
| Read1 | read2 | Initiate DRAM read1. |
| Write1 | write2 | Initiate write2 arbitration. Execute DRAM write1. |
| Write | read | Execute DRAM write. |

If the current timeslot pointer points to a read access then this will be initiated immediately. If the write timeslot lookahead pointer points to a write access then this access is arbitrated immediately, or immediately after the read access associated with the current timeslot pointer is initiated.

When a write access is arbitrated the DIU will capture the write address. When the current timeslot pointer advances to the write timeslot then the actual DRAM access will be initiated. Writes will therefore be arbitrated 2 timeslots in advance of the DRAM write occurring.

At initialisation, the write lookahead pointer points to the first timeslot. The current timeslot pointer is invalid until the write lookahead pointer advances to the third timeslot when the current timeslot pointer will point to the first timeslot. Then both pointers advance in tandem.

CPU write accesses are excepted from the lookahead mechanism.

If the selected SoPEC Unit is not requesting then there will be separate read and write selection for unused timeslots. This is described in Section 20.10.6.

20.10.3 Arbitration of CPU Accesses

What distinguishes the CPU from other SoPEC requesters, is that the CPU requires minimum latency DRAM access i.e. preferably the CPU should get the next available timeslot whenever it requests.

The minimum CPU read access latency is estimated in Table 113. This is the time between the CPU making a request to the DIU and receiving the read data back from the DIU.

TABLE 113

Estimated CPU read access latency ignoring caching

| CPU read access latency | Duration |
|---|---|
| CPU cache miss | 1 cycle |
| CPU MMU logic issues request and DIU arbitration completes | 1 cycle |
| Transfer the read address to the DRAM | 1 cycle |
| DRAM read latency | 1 cycle |
| Register the read data in CPU bridge | 1 cycle |
| Register the read data in CPU | 1 cycle |
| CPU cache miss | 1 cycle |
| CPU MMU logic issues request and DIU arbitration completes | 1 cycle |
| TOTAL gap between requests | 6 cycles |

If the CPU, as is likely, requests DRAM access again immediately after receiving data from the DIU then the CPU could access every second timeslot if the access latency is 6 cycles. This assumes that interleaving is employed so that timeslots last 3 cycles. If the CPU access latency were 7 cycles, then the CPU would only be able to access every third timeslot.

If a cache hit occurs the CPU does not require DRAM access. For its next DIU access it will have to wait for its next assigned DIU slot. Cache hits therefore will reduce the number of DRAM accesses but not speed up any of those accesses.

To avoid the CPU having to wait for its next timeslot it is desirable to have a mechanism for ensuring that the CPU always gets the next available timeslot without incurring any latency on the non-CPU timeslots.

This can be done by defining each timeslot as consisting of a CPU access preceding a non-CPU access. Each timeslot will last 6 cycles i.e. a CPU access of 3 cycles and a non-CPU access of 3 cycles. This is exactly the interleaving behaviour outlined in Section 20.7.2.2. If the CPU does not require an access, the timeslot will take 3 or 4 and the timeslot rotation will go faster. A summary is given in Table 114.

TABLE 114

Timeslot access times.

| Access | Duration | Explanation |
|---|---|---|
| CPU access + non-CPU access | 3 + 3 = 6 cycles | Interleaved access |
| non-CPU access | 4 cycles | Access and preceding access both to shared read bus |
| non-CPU access | 3 cycles | Access and preceding access not both to shared read bus |
| CDU write access | 3 + 2 + 2 + 2 = 9 cycles | Page mode select signal is clocked at 160 MHz |

CDU write accesses require 9 cycles. CDU write accesses preceded by a CPU access require 12 cycles. CDU timeslots therefore take longer than all other DIU requestors timeslots.

With a 256 cycle rotation there can be 42 accesses of 6 cycles.

For low scale factor applications, it is desirable to have more timeslots available in the same 256 cycle rotation. So two counters of 4-bits each are defined allowing the CPU to get a maximum of (CPUPreAccessTimeslots+1) pre-accesses for every (CPUTotalTimeslots+1) main slots. A timeslot counter starts at CPUTotalTimeslots and decrements every timeslot, while another counter starts at CPUPreAccessTimeslots and decrements every timeslot in which the CPU uses its access. When the CPU pre-access counter goes to zero before CPUTotalTimeslots, no further CPU accesses are allowed. When the CPUTotalTimeslots counter reaches zero both counters are reset to their respective initial values.

The CPU is not included in the list of SoPEC DIU requesters, Table, for the main timeslot allocations. The CPU cannot therefore be allocated main timeslots. It relies on pre-accesses in advance of such slots as the sole method for DRAM transfers.

CPU access to DRAM can never be fully disabled, since to do so would render SoPEC inoperable. Therefore the CPUPreAccessTimeslots and CPUTotalTimeslots register values are interpreted as follows: In each succeeding window of (CPUTotalTimeslots+1) slots, the maximum quota of CPU pre-accesses allowed is (CPUPreAccessTimeslots+1). The "+1" implementations mean that the CPU quota cannot be made zero.

The various modes of operation are summarised in Table 115 with a nominal rotation period of 256 cycles.

TABLE 115

CPU timeslot allocation modes with nominal rotation period of 256 cycles

| Access Type | Nominal Timeslot duration | Number of timeslots | Notes |
|---|---|---|---|
| CPU Pre-access i.e. CPUPreAccessTimeslots = CPUTotalTimeslots | 6 cycles | 42 timeslots | Each access is CPU + non-CPU. If CPU does not use a timeslot then rotation is faster. |
| Fractional CPU Pre-access i.e. CPUPreAccessTimeslots < CPUTotalTimeslots | 4 or 6 cycles | 42–64 timeslots | Each CPU + non-CPU access requires a 6 cycle timeslot. Individual non-CPU timeslots take 4 cycles if current access and preceding access are both to shared read bus. Individual non-CPU timeslots take 3 cycles if current access and preceding access are not both to shared read bus. |

20.10.4 CDU Accesses

As indicated in Section 20.10.3, CDU write accesses require 9 cycles. CDU write accesses preceded by a CPU access require 12 cycles. CDU timeslots therefore take longer than all other DIU requestors timeslots. This means that when a write timeslot is unused it cannot be re-allocated to a CDU write as CDU accesses take 9 cycles. The write accesses which the CDU write could otherwise replace require only 3 or 4 cycles.

Unused CDU write accesses can be replaced by any other write access according to 20.10.6.1 Unused write timeslots allocation on page 247.

20.10.5 Refresh Controller

Refresh is not included in the list of SoPEC DIU requesters, Table, for the main timeslot allocations. Timeslots cannot therefore be allocated to refresh.

The DRAM must be refreshed every 3.2 ms. Refresh occurs row at a time over 5120 rows of 2 parallel 10 Mbit instances. A refresh operation must therefore occur every 100 cycles. The refresh_period register has a default value of 99. Each refresh takes 3 cycles.

A refresh counter will count down the number of cycles between each refresh. When the down-counter reaches 0, the refresh controller will issue a refresh request and the down-counter is reloaded with the value in refresh_period and the count-down resumes immediately. Allocation of main slots must take into account that a refresh is required at least once every 100 cycles. Refresh is included in the unused read and write timeslot allocation. If unused timeslot allocation results in refresh occurring early by N cycles, then the refresh counter will have counted down to N. In this case, the refresh counter is reset to refresh_period and the countdown recommences. Refresh can be preceded by a CPU access in the same way as any other access. This is controlled by the CPUPreAccessTimeslots and CPUTotalTimeslots configuration registers. Refresh will therefore not affect CPU performance. A sequence of accesses including refresh might therefore be CPU, refresh, CPU, actual timeslot.

20.10.6 Allocating Unused Timeslots

Unused slots are re-allocated separately depending on whether the unused access was a read access or a write access. This is best-effort traffic. Only unused non-CPU accesses are re-allocated.

20.10.6.1 Unused Write Timeslots Allocation

Unused write timeslots are re-allocated according to a fixed priority order shown in Table 116.

TABLE 116

Unused write timeslot priority order

| Name | Priority Order |
|---|---|
| SCB(W) | 1 |
| SFU(W) | 2 |
| DWU | 3 |
| Unused read timeslot allocation | 4 |

CDU write accesses cannot be included in the unused timeslot allocation for write as CDU accesses take 9 cycles. The write accesses which the CDU write could otherwise replace require only 3 or 4 cycles.

Unused write timeslot allocation occurs two timeslots in advance as noted in Section 20.10.2. If the units at priorities 1–3 are not requesting then the timeslot is re-allocated according to the unused read timeslot allocation scheme described in Section 20.10.6.2. However, the unused read timeslot allocation will occur when the current timeslot pointer of FIG. 96 reaches the timeslot i.e. it will not occur in advance.

20.10.6.2 Unused Read Timeslots Allocation

Unused read timeslots are re-allocated according to a two level round-robin scheme. The SoPEC Units included in read timeslot re-allocation is shown in Table 117.

TABLE 117

Unused read timeslot allocation

| Name |
|---|
| SCB(R) |
| CDU(R) |
| CFU |
| LBD |
| SFU(R) |
| TE(TD) |
| TE(TFS) |
| HCU |
| DNC |
| LLU |
| PCU |
| CPU/Refresh |

Each SoPEC requestor has an associated bit, ReadRoundRobinLevel, which indicates whether it is in level 1 or level 2 round-robin.

TABLE 118

Read round-robin level selection

| Level | Action |
|---|---|
| ReadRoundRobinLevel = 0 | Level 1 |
| ReadRoundRobinLevel = 1 | Level 2 |

A pointer points to the most recent winner on each of the round-robin levels. Re-allocation is carried out by traversing level 1 requesters, starting with the one immediately succeeding the last level 1 winner. If a requesting unit is found, then it wins arbitration and the level 1 pointer is shifted to its position. If no level 1 unit wants the slot, then level 2 is similarly examined and its pointer adjusted.

Since refresh occupies a (shared) position on one of the two levels and continually requests access, there will always be some round-robin winner for any unused slot.

20.10.6.2.1 Shared CPU/Refresh Round-Robin Position

Note that the CPU can conditionally be allowed to take part in the unused read round-robin scheme. Its participation is controlled via the configuration bit EnableCPURoundRobin. When this bit is set, the CPU and refresh share a joint position in the round-robin order, shown in Table. When cleared, the position is occupied by refresh alone.

If the shared position is next in line to be awarded an unused non-CPU read/write slot, then the CPU will have first option on the slot. Only if the CPU doesn't want the access, will it be granted to refresh. If the CPU is excluded from the round robin, then any awards to the position benefit refresh.

20.11 Guidelines for Programming the DIU

Some guidelines for programming the DIU arbitration scheme are given in this section together with an example.

20.11.1 Circuit Latency

Circuit latency is a fixed service delay which is incurred, as and from the acceptance by the DIU arbitration logic of a block's pending read/write request. It is due to the processing time of the request, readying the data, plus the DRAM access time. Latencies differ for read and write requests. See Tables 79 and 80 for respective breakdowns.

If a requesting block is currently stalled, then the longest time it will have to wait between issuing a new request for data and actually receiving it would be its timeslot period, plus the circuit latency overhead, along with any intervening non-standard slot durations, such as refresh and CDU(W). In any case, a stalled block will always incur this latency as an additional overhead, when coming out of a stall.

In the case where a block starts up or unstalls, it will start processing newly-received data at a time beyond its serviced timeslot equivalent to the circuit latency. If the block's timeslots are evenly spaced apart in time to match its processing rate, (in the hope of minimising stalls,) then the earliest that the block could restall, if not re-serviced by the DIU, would be the same latency delay beyond its next timeslot occurrence. Put another way, the latency incurred at start-up pushes the potential DIU-induced stall point out by the same fixed delta beyond each successive timeslot allocated to the block. This assumes that a block re-requests access well in advance of its upcoming timeslots. Thus, for a given stall-free run of operation, the circuit latency overhead is only incurred inititially when unstalling.

While a block can be stalled as a result of how quickly the DIU services its DRAM requests, it is also prone to stalls caused by its upstream or downstream neighbours being able to supply or consume data which is transferred between the blocks directly, (as opposed to via the DIU). Such neighbour-induced stalls, often occurring at events like end of line, will have the effect that a block's DIU read buffer will tend to fill, as the block stops processing read data. Its DIU write buffer will also tend to fill, unable to despatch to DRAM until the downstream block frees up shared-access DRAM locations. This scenario is beneficial, in that when a block unstalls as a result of its neighbour releasing it, then that block's read/write DIU buffers will have a fill state less likely to stall it a second time, as a result of DIU service delays.

A block's slots should be scheduled with a service guarantee in mind. This is dictated by the block's processing rate and hence, required access to the DRAM. The rate is expressed in terms of bits per cycle across a processing window, which is typically (though not always) 256 cycles. Slots should be evenly interspersed in this window (or "rotation") so that the DIU can fulfill the block's service needs.

The following ground rules apply in calculating the distribution of slots for a given non-CPU block:—

The block can, at maximum, suffer a stall once in the rotation, (i.e. unstall and restall) and hence incur the circuit latency described above.

This rule is, by definition, always fulfilled by those blocks which have a service requirement of only 1 bit/cycle (equivalent to 1 slot/rotation) or fewer. It can be shown that the rule is also satisfied by those blocks requiring more than 1 bit/cycle. See Section 20.12.1 Slot Distributions and Stall Calculations for Individual Blocks, on page 255.

Within the rotation, certain slots will be unavailable, due to their being used for refresh. (See Section 20.11.2 Refresh latencies)

In programming the rotation, account must be taken of the fact that any CDU(W) accesses will consume an extra 6 cycles/access, over and above the norm, in CPU pre-access mode, or 5 cycles/access without pre-access.

The total delay overhead due to latency, refreshes and CDU(W) can be factored into the service guarantee for all blocks in the rotation by deleting once, (i.e. reducing the rotation window,) that number of slots which equates to the cumulative duration of these various anomalies.

The use of lower scale factors will imply a more frequent demand for slots by non-CPU blocks. The percentage of slots in the overall rotation which can therefore be designated as CPU pre-access ones should be calculated last, based on what can be accommodated in the light of the non-CPU slot need.

Read latency is summarised below in Table 119.

TABLE 119

Read latency

| Non-CPU read access latency | Duration |
|---|---|
| non-CPU read requestor internally generates DIU request | 1 cycle |
| register the non- CPU read request | 1 cycle |
| complete the arbitration of the request | 1 cycle |
| transfer the read address to the DRAM | 1 cycle |
| DRAM read latency | 1 cycle |
| register the DRAM read data in DIU | 1 cycle |
| register the 1st 64-bits of read data in requester | 1 cycle |
| register the 2nd 64-bits of read data in requester | 1 cycle |
| register the 3rd 64-bits of read data in requester | 1 cycle |
| register the 4th 64-bits of read data in requester | 1 cycle |
| TOTAL | 10 cycles |

Write latency is summarised in Table 120.

TABLE 120

Write latency

| Non-CPU write access latency | Duration |
|---|---|
| non-CPU write requestor internally generates DIU request | 1 cycle |
| register the non-CPU write request | 1 cycle |
| complete the arbitration of the request | 1 cycle |
| transfer the acknowledge to the write requester | 1 cycle |
| transfer the 1st 64 bits of write data to the DIU | 1 cycle |
| transfer the 2nd 64 bits of write data to the DIU | 1 cycle |
| transfer the 3rd 64 bits of write data to the DIU | 1 cycle |
| transfer the 4th 64 bits of write data to the DIU | 1 cycle |
| Write to DRAM with locally registered write data | 1 cycle |
| TOTAL | 9 cycles |

Timeslots removed to allow for read latency will also cover write latency, since the former is the larger of the two.

20.11.2 Refresh Latencies

The number of allocated timeslots for each requester needs to take into account that a refresh must occur every 100 cycles. This can be achieved by deleting timeslots from the rotation since the number of timeslots is made programmable.

Refresh is preceded by a CPU access in the same way as any other access. This is controlled by the CPUPreAccessTimeslots and CPUTotalTimeslots configuration registers. Refresh will therefore not affect CPU performance.

As an example, in CPU pre-access mode each timeslot will last 6 cycles. If the timeslot rotation has 50 timeslots then the rotation will last 300 cycles. The refresh controller will trigger a refresh every 100 cycles. Up to 47 timeslots can be allocated to the rotation ignoring refresh. Three timeslots deleted from the 50 timeslot rotation will allow for the latency of a refresh every 100 cycles.

20.11.3 Ensuring Sufficient DNC and PCU Access

PCU command reads from DRAM are exceptional events and should complete in as short a time as possible. Similarly, we must ensure there is sufficient free bandwidth for DNC accesses e.g. when clusters of dead nozzles occur. In Table DNC is allocated 3 times average bandwidth. PCU and DNC can also be allocated to the level 1 round-robin allocation for unused timeslots so that unused timeslot bandwidth is preferentially available to them.

20.11.4 Basing Timeslot Allocation on Peak Bandwidths

Since the embedded DRAM provides sufficient bandwidth to use 1:1 compression rates for the CDU and LBD, it is possible to simplify the main timeslot allocation by basing the allocation on peak bandwidths. As combined bi-level and tag bandwidth at 1:1 scaling is only 5 bits/cycle, we will usually only consider the contone scale factor as the variable in determining timeslot allocations.

If slot allocation is based on peak bandwidth requirements then DRAM access will be guaranteed to all SoPEC requesters. If we do not allocate slots for peak bandwidth requirements then we can also allow for the peaks deterministically by adding some cycles to the print line time.

20.11.5 Adjacent Timeslot Restrictions 20.11.5.1 Non-CPU Write Adjacent Timeslot Restrictions Non-CPU write requesters should not be assigned adjacent timeslots as described in Section 20.7.2.3. This is because adjacent timeslots assigned to non-CPU requestors would require two sets of 256-bit write buffers and multiplexors to connect two write requestors simultaneously to the DIU. Only one 256-bit write buffer and multiplexor is implemented. Recall from section 20.7.2.3 on page 238 that if adjacent non-CPU writes are attempted, that the second write of any such pair will be disregarded and re-allocated under the unused read scheme.

20.11.5.2 Same DIU Requestor Adjacent Timeslot Restrictions

All DIU requesters have state-machines which request and transfer the read or write data before requesting again. From FIG. 90 read requests have a minimum separation of 9 cycles. From FIG. 92 write requests have a minimum separation of 7 cycles. Therefore adjacent timeslots should not be assigned to a particular DIU requester because the requester will not be able to make use of all these slots.

In the case that a CPU access precedes a non-CPU access timeslots last 6 cycles so write and read requesters can only make use of every second timeslot. In the case that timeslots are not preceded by CPU accesses timeslots last 4 cycles so the same write requester can use every second timeslot but the same read requestor can use only every third timeslot. Some DIU requestors may introduce additional pipeline delays before they can request again. Therefore timeslots should be separated by more than the minimum to allow a margin.

20.11.6 Line Margin

The SFU must output 1 bit/cycle to the HCU. Since HCUNumDots may not be a multiple of 256 bits the last 256-bit DRAM word on the line can contain extra zeros. In this case, the SFU may not be able to provide 1 bit/cycle to the HCU. This could lead to a stall by the SFU. This stall could then propagate if the margins being used by the HCU are not sufficient to hide it. The maximum stall can be estimated by the calculation: DRAM service period—X scale factor * dots used from last DRAM read for HCU line.

Similarly, if the line length is not a multiple of 256-bits then e.g. the LLU could read data from DRAM which contains padded zeros. This could lead to a stall. This stall could then propagate if the page margins cannot hide it.

A single addition of 256 cycles to the line time will suffice for all DIU requesters to mask these stalls.

20.12 Example Outline DIU Programming

TABLE 121

Timeslot allocation based on peak bandwidth

| Block Name | Direction | Peak Bandwidth which must be supplied (bits/cycle) | MainTimeslots allocated |
|---|---|---|---|
| SCB | R | | |
| | W | 0.734[7] | 1 |
| CDU | R | 0.9 (SF = 6), 2 (SF = 4) | 1 (SF = 6) 2 (SF = 4) |
| | W | 1.8 (SF = 6),[8] 4 (SF = 4) | 2 (SF = 6) 4 (SF = 4) |
| CFU | R | 5.4 (SF = 6), 8 (SF = 4) | 6 (SF = 6) 8 (SF = 4) |
| LBD | R | 1 | 1 |
| SFU | R | 2 | 2 |
| | W | 1 | 1 |
| TE(TD) | R | 1.02 | 1 |
| TE(TFS) | R | 0.093 | 0 |
| HCU | R | 0.074 | 0 |
| DNC | R | 2.4 | 3 |
| DWU | W | 6 | 6 |
| LLU | R | 8 | 8 |
| PCU | R | 1 | 1 |
| TOTAL | | | 33 (SF = 6) 38 (SF = 4) |

[7]The SCB figure of 0.734 bits/cycle applies to multi-SoPEC systems. For single-SoPEC systems, the figure is 0.050 bits/cycle.

[8]Bandwidth for CDU(W) is peak value. Because of 1.5 buffering in DRAM, peak CDU(W) b/w equals 2 × average CDU(W) b/w. For CDU (R), peak b/w = average CDU(R) b/w.

Table 121 shows an allocation of main timeslots based on the peak bandwidths of Table The bandwidth required for each unit is calculated allowing extra cycles for read and write circuit latency for each access requiring a bandwidth of more than 1 bit/cycle. Fractional bandwidth is supplied via unused read slots.

The timeslot rotation is 256 cycles. Timeslots are deleted from the rotation to allow for circuit latencies for accesses of up to 1 bit per cycle i.e. 1 timeslot per rotation.

EXAMPLE 1

Scale-Factor=6

Program the MainTimeslot configuration register (Table) for peak required bandwidths of SoPEC Units according to the scale factor.

Program the read round-robin allocation to share unused read slots. Allocate PCU, DNC, HCU and TFS to level 1 read round-robin.

Assume scale-factor of 6 and peak bandwidths from Table

Assign all DIU requestors except TE(TFS) and HCU to multiples of 1 timeslot, as indicated in Table, where each timeslot is 1 bit/cycle. This requires 33 timeslots.

No timeslots are explicitly allocated for the fractional bandwidth requirements of TE(TFS) and HCU accesses. Instead, these units are serviced via unused read slots.

Allow 3 timeslots to allow for 3 refreshes in the rotation.

Therefore, 36 scheduled slots are used in the rotation for main timeslots and refreshes, some or all of which may be able to have a CPU pre-access, provided they fit in the rotation window.

Each of the 2 CDU(W) accesses requires 9 cycles. Per access, this implies an overhead of 1 slot (12 cycles instead of 6) in pre-access mode, or 1.25 slots (9 cycles instead of 4) for no pre-access. The cumulative overhead of the two accesses is either 2 slots (pre-access) or 3 slots (no pre-access).

Assuming all blocks require a service guarantee of no more than a single stall across 256 bits, allow 10 cycles for read latency, which also takes care of 9-cycle write latency. This can be accounted for by reserving 2 six-cycle slots (CPU pre-access) or 3 four-cycle slots (no pre-access).

Assume a 256 cycle timeslot rotation.

CDU(W) and read latency reduce the number of available cycles in a rotation to: 256−2×6−2×6=232 cycles (CPU pre-access) or 256−3×4−3×4=232 cycles (no pre-access).

As a result, 232 cycles available for 36 accesses implies each access can take 232/36=6.44 cycles maximum. So, all accesses can have a pre-access.

Therefore the CPU achieves a pre-access ratio of 36/36=100% of slots in the rotation.

EXAMPLE 2

Scale-Factor=4

Program the MainTimeslot configuration register (Table) for peak required bandwidths of SoPEC Units according to the scale factor. Program the read round-robin allocation to share unused read slots. Allocate PCU, DNC, HCU and TFS to level 1 read round-robin.

Assume scale-factor of 4 and peak bandwidths from Table

Assign all DIU requestors except TE(TFS) and HCU multiples of 1 timeslot, as indicated in Table, where each timeslot is 1 bit/cycle. This requires 38 timeslots.

No timeslots are explicitly allocated for the fractional bandwidth requirements of TE(TFS) and HCU accesses. Instead, these units are serviced via unused read slots.

Allow 3 timeslots to allow for 3 refreshes in the rotation.

Therefore, 41 scheduled slots are used in the rotation for main timeslots and refreshes, some or all of which can have a CPU pre-access, provided they fit in the rotation window.

Each of the 4 CDU(W) accesses requires 9 cycles. Per access, this implies an overhead of 1 slot (12 cycles instead of 6) for pre-access mode, or 1.25 slots (9 cycles instead of 4) for no pre-access. The cumulative overhead of the four accesses is either 4 slots (pre-access) or 5 slots (no pre-access).

Assuming all blocks require a service guarantee of no more than a single stall across 256 bits, allow 10 cycles for read latency, which also takes care of 9-cycle write latency. This can be accounted for by reserving 2 six-cycle slots (CPU pre-access) or 3 four-cycle slots (no pre-access).

Assume a 256 cycle timeslot rotation.

CDU(W) and read latency reduce the number of available cycles in a rotation to: 256−4×6−2×6=220 cycles (CPU pre-access) or 256−5×4−3×4=224 cycles (no pre-access).

As a result, between 220 and 224 cycles are available for 41 accesses, which implies each access can take between 220/41=5.36 cycles and 224/41=5.46 cycles.

Work out how many slots can have a pre-access: For the lower number of 220 cycles, this implies (41−n)*6+n*4<=220, where n=number of slots with no pre-access cycle. Solving the equation gives n>=13. Check answer: 28*6+13*4=220.

So 28 slots out of the 41 in the rotation can have CPU pre-accesses.

The CPU thus achieves a pre-access ratio of 28/41=68.3% of slots in the rotation.

20.12.1 Slot Distributions and Stall Calculations for Individual Blocks

The following sections show how the slots for blocks with a service requirement greater than 1 bit/cycle should be distributed. Calculations are included to check that such blocks will not suffer more than one stall per rotation.

20.12.1.1 SFU

This has 2 bits/cycle on read but this is two separate channels of 1 bit/cycle sharing the same DIU interface so it is effectively 2 channels each of 1 bit/cycle so allowing the same margins as the LBD will work.

20.12.1.2 DWU

The DWU has 12 double buffers in each of the 6 colour planes, odd and even. These buffers are filled by the DNC and will request DIU access when double buffers fill. The DNC supplies 6 bits to the DWU every cycle (6 odd in one cycle, 6 even in the next cycle). So the service deadline is 512 cycles, given 6 accesses per 256-cycle rotation.

20.12.1.3 CFU

Here the requirement is that the DIU stall should be less than the time taken for the CFU to consume one third of its triple buffer. The total DIU stall=refresh latency+extra CDU (W) latency+read circuit latency=3+5 (for 4 cycle timeslots)+10=18 cycles. The CFU can consume its data at 8 bits/cycle at SF=4. Therefore 256 bits of data will last 32 cycles so the triple buffer is safe. In fact we only need an extra 144 bits of buffering or 3×64 bits. But it is safer to have the full extra 256 bits or 4×64 bits of buffering.

20.12.1.4 LLU

The LLU has 2 channels, each of which could request at 6 bits/106 MHz channel or 4 bits/160 MHz cycle, giving a total of 8 bits/160 MHz cycle. The service deadline for each channel is 256×106 MHz cycles, i.e. all 6 colours must be transferred in 256 cycles to feed the printhead. This equates to 384×160 MHz cycles.

Over a span of 384 cycles, there will be 6 CDU(W) accesses, 4 refreshes and one read latency encountered at most. Assuming CPU pre-accesses for these occurrences, this means the number of available cycles is given by 384−6×6−4×6−10=314 cycles.

For a CPU pre-access slot rate of 50%, 314 cycles implies 31 CPU and 63 non-CPU accesses (31×6+32×4=314). For 12 LLU accesses interspersed amongst these 63 non-CPU slots, implies an LLU allocation rate of approximately one slot in 5.

If the CPU pre-access is 100% across all slots, then 314 cycles gives 52 slots each to CPU and non-CPU accesses, (52×6=312 cycles). Twelve accesses spread over 52 slots, implies a 1-in-4 slot allocation to the LLU.

The same LLU slot allocation rate (1 slot in 5, or 1 in 4) can be applied to programming slots across a 256-cycle rotation window. The window size does not affect the occurrence of LLU slots, so the 384-cycle service requirement will be fulfilled.

20.12.1.5 DNC

This has a 2.4 bits/cycle bandwidth requirement. Each access will see the DIU stall of 18 cycles. 2.4 bits/cycle corresponds to an access every 106 cycles within a 256 cycle rotation. So to allow for DIU latency we need an access every 106–18 or 88 cycles. This is a bandwidth of 2.9 bits/cycle, requiring 3 timeslots in the rotation.

20.12.1.6 CDU

The JPEG decoder produces 8 bits/cycle. Peak CDUR[ead] bandwidth is 4 bits/cycle (SF=4), peak CDUW[rite] bandwidth is 4 bits/cycle (SF=4). both with 1.5 DRAM buffering.

The CDU(R) does a DIU read every 64 cycles at scale factor 4 with 1.5 DRAM buffering. The delay in being serviced by the DIU could be read circuit latency (10)+ refresh (3)+extra CDU(W) cycles (6)=19 cycles. The JPEG decoder can consume each 256 bits of DIU-supplied data at 8 bits/cycle, i.e. in 32 cycles. If the DIU is 19 cycles late (due to latency) in supplying the read data then the JPEG decoder will have finished processing the read data 32+19=49 cycles after the DIU access. This is 64–49=15 cycles in advance of the next read. This 15 cycles is the upper limit on how much the DIU read service can further be delayed, without causing a stall. Given this margin, a stall on the read side will not occur.

On the write side, for scale factor 4, the access pattern is a DIU writes every 64 cycles with 1.5 DRAM buffereing. The JPEG decoder runs at 8 bits cycle and consumes 256 bits in 32 cycles. The CDU will not stall if the JPEG decode time (32)+DIU stall (19)<64, which is true.

20.13 CPU DRAM Access Performance

The CPU's share of the timeslots can be specified in terms of guaranteed bandwidth and average bandwidth allocations.

The CPU's access rate to memory depends on the CPU read access latency i.e. the time between the CPU making a request to the DIU and receiving the read data back from the DIU.

how often it can get access to DIU timeslots.

Table estimated the CPU read latency as 6 cycles.

How often the CPU can get access to DIU timeslots depends on the access type. This is summarised in Table 122.

TABLE 122

CPU DRAM access performance

| Access Type | Nominal Timeslot Duration | CPU DRAM access rate | Notes |
|---|---|---|---|
| CPU Pre-access | 6 cycles | Lower bound (guaranteed bandwidth) is 160 MHz/6 = 26.27 MHz | CPU can access every timeslot. |
| Frac-tional CPU Pre-access | 4 or 6 cycles | Lower bound (guaranteed bandwidth) is (160 MHz * N/P) | CPU accesses precede a fraction N of time-slots where N = C/T. C = CPUPreAccessTimeslots T = CPUTotalTimeslots P = (6*C + 4*(T − C))/T |

In both CPU Pre-access and Fractional CPU Pre-access modes, if the CPU is not requesting the timeslots will have a duration of 3 or 4 cycles depending on whether the current access and preceding access are both to the shared read bus. This will mean that the timeslot rotation will run faster and more bandwidth is available.

If the CPU runs out of its instruction cache then instruction fetch performance is only limited by the on-chip bus protocol. If data resides in the data cache then 160 MHz performance is achieved. Accessing memory mapped registers, PSS or ROM with a 3 cycle bus protocol (address cycle+data cycle) gives 53 MHz performance.

Due to the action of CPU caching, some bandwidth limiting of the CPU in Fractional CPU Pre-access mode is expected to have little or no impact on the overall CPU performance.

20.14 Implementation

The DRAM Interface Unit (DIU) is partitioned into 2 logical blocks to facilitate design and verification.

a. The DRAM Arbitration Unit (DAU) which interfaces with the SoPEC DIU requesters.

b. The DRAM Controller Unit (DCU) which accesses the embedded DRAM.

The basic principle in design of the DIU is to ensure that the eDRAM is accessed at its maximum rate while keeping the CPU read access latency as low as possible.

The DCU is designed to interface with single bank 20 Mbit IBM Cu-11 embedded DRAM performing random accesses every 3 cycles. Page mode burst of 4 write accesses, associated with the CDU, are also supported.

The DAU is designed to support interleaved accesses allowing the DRAM to be accessed every 3 cycles where back-to-back accesses do not occur over the shared 64-bit read data bus.

20.14.1 DIU Partition 20.14.2 Definition of DCU IO

TABLE 123

DCU interface

| Port Name | Pins | I/O | Description |
|---|---|---|---|
| Clocks and Resets | | | |
| pclk | 1 | In | SoPEC Functional clock |
| dau_dcu_reset_n | 1 | In | Active-low, synchronous reset in pclk domain. Incorporates DAU hard and soft resets. |
| Inputs from DAU | | | |
| dau_dcu_msn2stall | 1 | In | Signal indicating from DAU Arbitration Logic which when asserted stalls DCU in MSN2 state. |
| dau_dcu_adr[21:5] | 17 | In | Signal indicating the address for the DRAM access. This is a 256-bit aligned DRAM address. |
| dau_dcu_rwn | 1 | In | Signal indicating the direction for the DRAM access (1 = read, 0 = write). |
| dau_dcu_cduwpage | 1 | In | Signal indicating if access is a CDU write page mode access (1 = CDU page mode, 0 = not CDU page mode). |
| dau_dcu_refresh | 1 | In | Signal indicating that a refresh command is to be issued. If asserted dau_dcu_adr, dau_dcu_rwn and dau_dcu_cduwpage are ignored. |
| dau_dcu_wdata | 256 | In | 256-bit write data to DCU |
| dau_dcu_wmask | 32 | In | Byte encoded write data mask for 256-bit dau_dcu_wdata to DCU Polarity: A "1" in a bit field of dau_dcu_wmask means that the corresponding byte in the 256-bit dau_dcu_wdata is written to DRAM. |

TABLE 123-continued

| DCU interface | | | |
|---|---|---|---|
| Port Name | Pins | I/O | Description |
| Outputs to DAU | | | |
| dcu_dau_adv | 1 | Out | Signal indicating to DAU to supply next command to DCU |
| dcu_dau_wadv | 1 | Out | Signal indicating to DAU to initiate next non-CPU write |
| dcu_dau_refreshcomplete | 1 | Out | Signal indicating that the DCU has completed a refresh. |
| dcu_dau_rdata | 256 | Out | 256-bit read data from DCU. |
| dcu_dau_rvalid | 1 | Out | Signal indicating valid read data on dcu_dau_rdata. |

20.14.3 DRAM Access Types

The DRAM access types used in SoPEC are summarised in Table 124. For a refresh operation the DRAM generates the address internally.

TABLE 124

| SoPEC DRAM access types | |
|---|---|
| Type | Access |
| Read | Random 256-bit read |
| Write | Random 256-bit write with byte write masking<br>Page mode write for burst of 4 256-bit words with byte write masking |
| Refresh | Single refresh |

20.14.4 Constructing the 20 Mbit DRAM from Two 10 Mbit Instances

The 20 Mbit DRAM is constructed from two 10 Mbit instances. The address ranges of the two instances are shown in Table 125.

TABLE 125

| Address ranges of the two 10 Mbit instances in the 20 Mbit DRAM | | | |
|---|---|---|---|
| Instance | Address | Hex 256-bit word address | Binary 256-bit word address |
| Instance0 | First word in lower 10 Mbit | 00000 | 0 0000 0000 0000 0000 |
| Instance0 | Last word in lower 10 Mbit | 09FFF | 0 1001 1111 1111 1111 |
| Instance1 | First word in upper 10 Mbit | 0A000 | 0 1010 0000 0000 0000 |
| Instance1 | Last word in upper 10 Mbit | 13FFF | 1 0011 1111 1111 1111 |

There are separate macro select signals, inst0_MSN and inst1_MSN, for each instance and separate dataout busses inst0_DO and inst1_DO, which are multiplexed in the DCU. Apart from these signals both instances share the DRAM output pins of the DCU.

The DRAM Arbitration Unit (DAU) generates a 17 bit address, dau_dcu_adr[21:5], sufficient to address all 256-bit words in the 20 Mbit DRAM. The upper 5 bits are used to select between the two memory instances by gating their MSN pins. If instance1 is selected then the lower 16-bits are translated to map into the 10 Mbit range of that instance. The multiplexing and address translation rules are shown in Table 126.

In the case that the DAU issues a refresh, indicated by dau_dcu_refresh, then both macros are selected. The other control signals

TABLE 126

| Instance selection and address translation | | | | | |
|---|---|---|---|---|---|
| dau_dcu_refresh | DAU Address bits dau_dcu_adr[21:17] | Instance selected | inst0_MSN | inst1_MSN | Address translation |
| 0 | <01010 | Instance0 | MSN | 1 | A[15:0] = dau_dcu_adr[20:5] |
| | >=01010 | Instance1 | 1 | MSN | A[15:0] = dau_dcu_adr[21:5] − hA000 |
| 1 | — | Instance0 and Instance1 | MSN | MSN | — |

dau_dcuadr[21:5], dau_dcu_rwn and dau_dcu_cduwpage are ignored.

Figure 102:
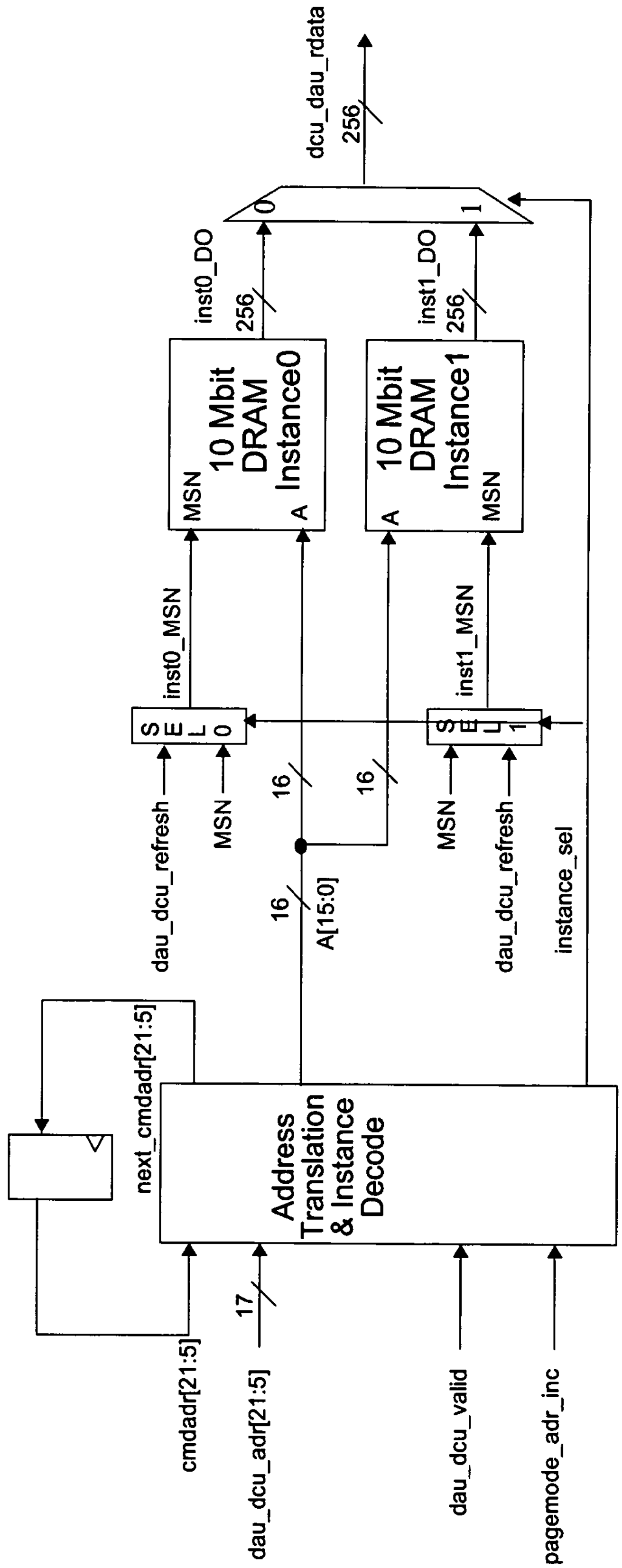
FIG. 102 shows multiplexing and address translation logic for two memory instances

The instance selection and address translation logic is shown in FIG. 102.

The address translation and instance decode logic also increments the address presented to the 20 DRAM in the case of a page mode write. Pseudo code is given below.

```
if rising_edge(dau_dcu_valid) then
    //capture the address from the DAU
    next_cmdadr[21:5] = dau_dcu_adr[21:5]
elsif pagemode_adr_inc = = 1 then
    //increment the address
    next_cmdadr[21:5] = cmdadr[21:5] + 1
else
    next_cmdadr[21:5] = cmdadr[21:5]
if rising_edge(dau_dcu_valid) then
    //capture the address from the DAU
    adr_var[21:5] := dau_dcu_adr[21:5]
else
    adr_var[21:5] := cmdadr[21:5]
if adr_var[21:17] < 01010 then
    //choose instance0
    instance_sel = 0
    A[15:0] = adr_var[20:5]
else
    //choose instance1
    instance_sel = 1
        A[15:0] = adr_var[21:5] - hA000
```

Pseudo code for the select logic, SEL0, for DRAM Instance0 is given below.

```
//instance0 selected or refresh
if instance_sel = = 0 OR dau_dcu_refresh = = 1 then
    inst0_MSN = MSN
else
    inst0_MSN = 1
```

Pseudo code for the select logic, SEL1, for DRAM instance1 is given below.

```
//instance1 selected or refresh
if instance_sel = = 1 OR dau_dcu_refresh = = 1 then
    inst1_MSN = MSN
else
    inst1_MSN = 1
```

During a random read, the read data is returned, on dcu_dau_rdata, after time $T_{acc}$, the random access time, which varies between 3 and 8 ns (see Table). To avoid any metastability issues the read data must be captured by a flip-flop which is enabled 2 pclk cycles or 12.5 ns after the DRAM access has been started. The DCU generates the enable signal dcu_dau_rvalid to capture dcu_dau_rdata.

The byte write mask dau_dcu_wmask[31:0] must be expanded to the bit write mask bitwritemask[255:0] needed by the DRAM.

20.14.5 DAU-DCU Interface Description

Figure 103:
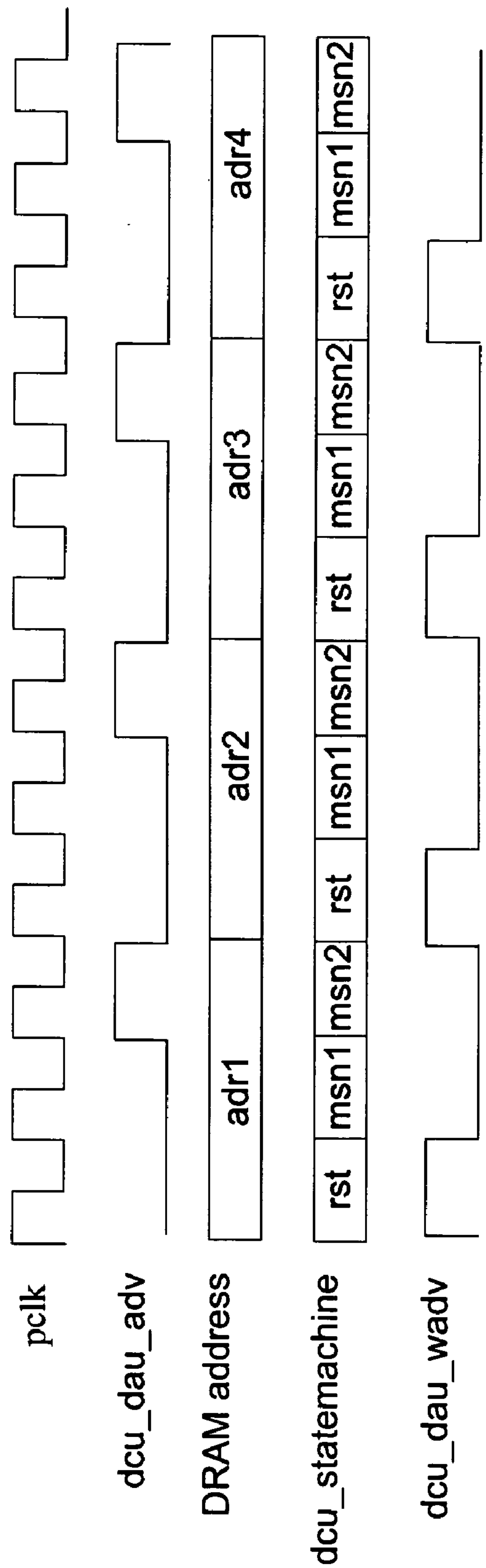
FIG. 103 shows a timing of dau_dcu_valid, dcu_dau_adv and dcu_dau_wadv

The DCU asserts dcu_dau_adv in the MSN2 state to indicate to the DAU to supply the next command. dcu_dau_adv causes the DAU to perform arbitration in the MSN2 cycle. The resulting command is available to the DCU in the following cycle, the RST state. The timing is shown in FIG. 103. The command to the DRAM must be valid in the RST and MSN1 states, or at least meet the hold time requirement to the MSN falling edge at the start of the MSN1 state.

Note that the DAU issues a valid arbitration result following every dcu_dau_adv pulse. If no unit is requesting DRAM access, then a fall-back refresh request will be issued. When dau_dcu_refresh is asserted the operation is a refresh and dau_dcu_adr, dau_dcu_rwn and dau_dcu_cduwpage are ignored.

The DCU generates a second signal, dcu_dau_wadv, which is asserted in the RST state. This indicates to the DAU that it can perform arbitration in advance for non-CPU writes. The reason for performing arbitration in advance for non-CPU writes is explained in "Command Multiplexor Sub-block

TABLE 136

Command Multiplexor Sub-block IO Definition

| Port name | Pins | I/O | Description |
|---|---|---|---|
| Clocks and Resets | | | |
| pclk | 1 | In | System Clock |
| prst_n | 1 | In | System reset, synchronous active low |
| DIU Read Interface to SoPEC Units | | | |
| <unit>_diu_radr[21:5] | 17 | In | Read address to DIU 17 bits wide (256-bit aligned word). |
| diu_<unit>_rack | 1 | Out | Acknowledge from DIU that read request has been accepted and new read address can be placed on <unit>_diu_radr |
| DIU Write Interface to SoPEC Units | | | |
| <unit>_diu_wadr[21:5] | 17 | In | Write address to DIU except CPU, SCB, CDU 17 bits wide (256-bit aligned word) |
| cpu_diu_wadr[21:4]] | 22 | In | CPU Write address to DIU (128-bit aligned address.) |
| cpu_diu_wmask | 16 | In | Byte enables for CPU write. |
| cdu_diu_wadr[21:3] | 19 | In | CDU Write address to DIU 19 bits wide (64-bit aligned word) Addresses cannot cross a 256-bit word DRAM boundary. |
| diu_<unit>_wack | 1 | Out | Acknowledge from DIU that write request has been accepted and new write address can be placed on <unit>_diu_wadr |
| Outputs to CPU Interface and Arbitration Logic sub-block | | | |
| re_arbitrate | 1 | Out | Signalling telling the arbitration logic to choose the next arbitration winner. |
| re_arbitrate_wadv | 1 | Out | Signal telling the arbitration logic to choose the next arbitration winner for non-CPU writes 2 timeslots in advance |
| Debug Outputs to CPU Configuration and Arbitration Logic Sub-block | | | |
| write_sel | 5 | Out | Signal indicating the SoPEC Unit for which the current write transaction is occurring. Encoding is described in Table. |
| write_complete | 1 | Out | Signal indicating that write transaction to SoPEC Unit indicated by write_sel is complete. |
| Inputs from CPU Interface and Arbitration Logic sub-block | | | |
| arb_gnt | 1 | In | Signal lasting 1 cycle which indicates arbitration has occurred and arb_sel is valid. |
| arb_sel | 5 | In | Signal indicating which requesting SoPEC Unit has won arbitration. Encoding is described in Table. |
| dir_sel | 2 | In | Signal indicating which sense of access associated with arb_sel |

TABLE 136-continued

Command Multiplexor Sub-block IO Definition

| Port name | Pins | I/O | Description |
|---|---|---|---|
| | | | 00: issue non-CPU write<br>01: read winner<br>10: write winner<br>11: refresh winner |
| Inputs from Read Write Multiplexor Sub-block | | | |
| write_data_valid | 2 | In | Signal indicating that valid write data is available for the current command.<br>00 = not valid<br>01 = CPU write data valid<br>10 = non-CPU write data valid<br>11 = both CPU and non-CPU write data valid |
| wdata | 256 | In | 256-bit non-CPU write data |
| cpu_wdata | 32 | In | 32-bit CPU write data |
| Outputs to Read Write Multiplexor Sub-block | | | |
| write_data_accept | 2 | Out | Signal indicating the Command Multiplexor has accepted the write data from the write multiplexor<br>00 = not valid<br>01 = accepts CPU write data<br>10 = accepts non-CPU write data<br>11 = not valid |
| Inputs from DCU | | | |
| dcu_dau_adv | 1 | In | Signal indicating to DAU to supply next command to DCU |
| dcu_dau_wadv | 1 | In | Signal indicating to DAU to initiate next non-CPU write |
| Outputs to DCU | | | |
| dau_dcu_adr[21:5] | 17 | Out | Signal indicating the address for the DRAM access. This is a 256-bit aligned DRAM address. |
| dau_dcu_rwn | 1 | Out | Signal indicating the direction for the DRAM access (1 = read, 0 = write). |
| dau_dcu_cduwpage | 1 | Out | Signal indicating if access is a CDU write page mode access (1 = CDU page mode, 0 = not CDU page mode). |
| dau_dcu_refresh | 1 | Out | Signal indicating that a refresh command is to be issued. If asserted dau_dcu_adr, dau_dcu_rwn and dau_dcu_cduwpage are ignored. |
| dau_dcu_wdata | 256 | Out | 256-bit write data to DCU |
| dau_dcu_wmask | 32 | Out | Byte encoded write data mask for 256-bit dau_dcu_wdata to DCU |

The DCU state-machine can stall in the MSN2 state when the signal dau_dcu_msn2stall is asserted by the DAU Arbitration Logic, The states of the DCU state-machine are summarised in Table 127.

TABLE 127

States of the DCU state-machine

| State | Description |
|---|---|
| RST | Restore state |
| MSN1 | Macro select state 1 |
| MSN2 | Macro select state 2 |

20.14.6 DCU State Machines

Figure 104:
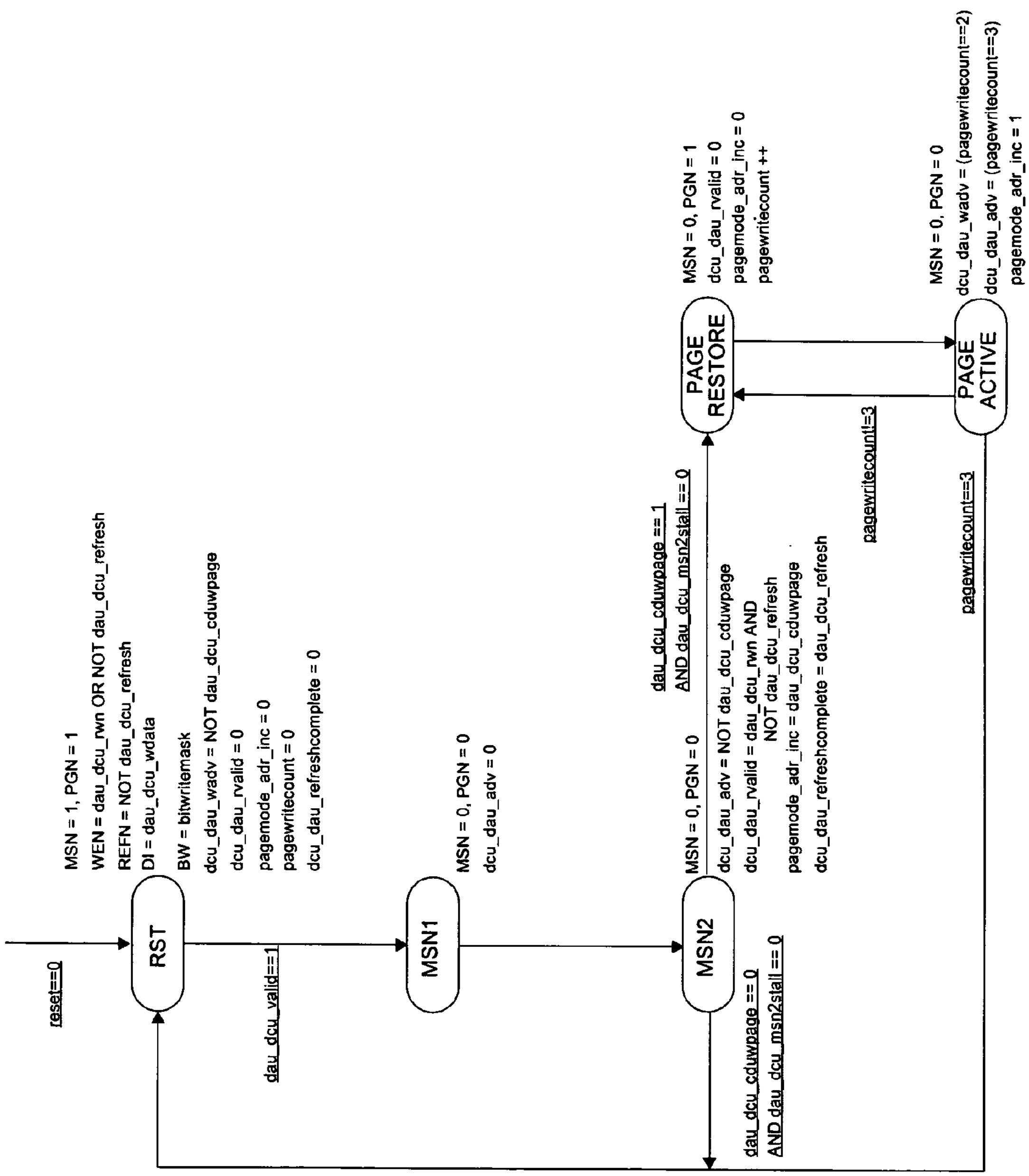
FIG. 104 shows a DCU state machine

The IBM DRAM has a simple SRAM like interface. The DRAM is accessed as a single bank. The state machine to access the DRAM is shown in FIG. 104.

The signal pagemode_adr_inc is exported from the DCU as dcu_dau_cduwaccept. dcu_dau_cduwaccept tells the DAU to supply the next write data to the DRAM 20.14.7 CU-11DRAM Timing Diagrams The IBM Cu-11 embedded DRAM datasheet is referenced as [16].

Table 128 shows the timing parameters which must be obeyed for the IBM embedded DRAM.

TABLE 128

1.5 V Cu-11 DRAM a.c. parameters

| Symbol | Parameter | Min | Max | Units |
|---|---|---|---|---|
| $T_{set}$ | Input setup to MSN/PGN | 1 | — | ns |
| $T_{hld}$ | Input hold to MSN/PGN | 2 | — | ns |
| $T_{acc}$ | Random access time | 3 | 8 | ns |
| $T_{act}$ | MSN active time | 8 | 100 k | ns |
| $T_{res}$ | MSN restore time | 4 | — | ns |
| $T_{cyc}$ | Random R/W cycle time | 12 | — | ns |
| $T_{rfc}$ | Refresh cycle time | 12 | — | ns |
| $T_{accp}$ | Page mode access time | 1 | 3.9 | ns |
| $T_{pa}$ | PGN active time | 1.6 | — | ns |
| $T_{pr}$ | PGN restore time | 1.6 | — | ns |
| $T_{pcyc}$ | PGN cycle time | 4 | — | ns |
| $T_{mprd}$ | MSN to PGN restore delay | 6 | — | ns |
| $T_{actp}$ | MSN active for page mode | 12 | — | ns |
| $T_{ref}$ | Refresh period | — | 3.2 | ms |
| $T_{pamr}$ | Page active to MSN restore | 4 | — | ns |

The IBM DRAM is asynchronous. In SoPEC it interfaces to signals clocked on pclk. The following timing diagrams show how the timing parameters in Table 129 are satisfied in SoPEC.

20.14.8 Definition of DAU IO

TABLE 129

DAU interface

| Port Name | Pins | I/O | Description |
|---|---|---|---|
| Clocks and Resets | | | |
| pclk | 1 | In | SoPEC Functional clock |
| prst_n | 1 | In | Active-low, synchronous reset in pclk domain |
| dau_dcu_reset_n | 1 | Out | Active-low, synchronous reset in pclk domain. This reset signal, exported to the DCU, incorporates the locally captured DAU version of hard reset (prst_n) and the soft reset configuration register bit "Reset". |
| CPU Interface | | | |
| cpu_adr | 22 | In | CPU address bus for both DRAM and configuration register access.<br>9 bits (bits 10:2) are required to decode the configuration register address space.<br>22 bits can address the DRAM at byte level. DRAM addresses cannot cross a 256-bit word DRAM boundary. |
| cpu_dataout | 32 | In | Shared write data bus from the CPU for DRAM and configuration data |
| diu_cpu_data | 32 | Out | Configuration, status and debug read data bus to the CPU |
| diu_cpu_debug_valid | 1 | Out | Signal indicating the data on the diu_cpu_data bus is valid debug data. |

TABLE 129-continued

DAU interface

| Port Name | Pins | I/O | Description |
|---|---|---|---|
| cpu_rwn | 1 | In | Common read/not-write signal from the CPU |
| cpu_acode | 2 | In | CPU access code signals. cpu_acode[0] - Program (0)/ Data (1) access cpu_acode[1] - User (0)/ Supervisor (1) access The DAU will only allow supervisor mode accesses to data space. |
| cpu_diu_sel | 1 | In | Block select from the CPU. When cpu_diu_sel is high both cpu_adr and cpu_dataout are valid |
| diu_cpu_rdy | 1 | Out | Ready signal to the CPU. When diu_cpu_rdy is high it indicates the last cycle of the access. For a write cycle this means cpu_dataout has been registered by the block and for a read cycle this means the data on diu_cpu_data is valid. |
| diu_cpu_berr | 1 | Out | Bus error signal to the CPU indicating an invalid access. |
| DIU Read Interface to SoPEC Units | | | |
| <unit>_diu_rreq | 1 | In | SoPEC unit requests DRAM read. A read request must be accompanied by a valid read address. |
| <unit>_diu_ radr[21:5] | 17 | In | Read address to DIU 17 bits wide (256-bit aligned word). Note: "<unit>" refers to non-CPU requesters only. CPU addresses are provided via "cpu_adr". |
| diu_<unit>_ rack | 1 | Out | Acknowledge from DIU that read request has been accepted and new read address can be placed on <unit>_diu_radr |
| diu_data | 64 | Out | Data from DIU to SoPEC Units except CPU. First 64-bits is bits 63:0 of 256 bit word Second 64-bits is bits 127:64 of 256 bit word Third 64-bits is bits 191:128 of 256 bit word Fourth 64-bits is bits 255:192 of 256 bit word |
| dram_cpu_data | 256 | Out | 256-bit data from DRAM to CPU. |
| diu_<unit>_ rvalid | 1 | Out | Signal from DIU telling SoPEC Unit that valid read data is on the diu_data bus |
| DIU Write Interface to SoPEC Units | | | |
| <unit>_diu_ wreq | 1 | In | SoPEC unit requests DRAM write. A write request must be accompanied by a valid write address. Note: "<unit>" refers to non-CPU requesters only. |
| <unit>_diu_ wadr[21:5] | 17 | In | Write address to DIU except CPU, CDU 17 bits wide (256-bit aligned word) Note: "<unit>" refers to non-CPU requesters, excluding the CDU. |
| scb_diu_ wmask[7:0] | 8 | In | Byte write enables applicable to a given 64-bit quarter-word transferred from the SCB. Note that different mask values are used with each quarter-word. Requirement for the USB host core. |
| diu_cpu_ write_rdy | 1 | Out | Flag indicating that the CPU posted write buffer is empty. |
| cpu_diu_ wdatavalid | 1 | In | Write enable for the CPU posted write buffer. Also confirms that the CPU write data, address and mask are valid. |
| cpu_diu_wdata | 128 | In | CPU write data which is loaded into the posted write buffer. |
| cpu_diu_ wadr[21:4] | 18 | In | 128-bit aligned CPU write address. |
| cpu_diu_ wmask[15:0] | 16 | In | Byte enables for 128-bit CPU posted write. |
| cdu_diu_ wadr[21:3] | 19 | In | CDU Write address to DIU 19 bits wide (64-bit aligned word) Addresses cannot cross a 256-bit word DRAM boundary. |
| diu_<unit>_ wack | 1 | Out | Acknowledge from DIU that write request has been accepted and new write address can be placed on <unit>_diu_wadr |
| <unit>_diu_ data[63:0] | 64 | In | Data from SoPEC Unit to DIU except CPU. First 64-bits is bits 63:0 of 256 bit word Second 64-bits is bits 127:64 of 256 bit word Third 64-bits is bits 191:128 of 256 bit word Fourth 64-bits is bits 255:192 of 256 bit word Note: "<unit>" refers to non-CPU requesters only. |
| <unit>_diu_ wvalid | 1 | In | Signal from SoPEC Unit indicating that data on <unit>_diu_data is valid. Note: "<unit>" refers to non-CPU requesters only. |
| Outputs to DCU | | | |
| dau_dcu_ msn2stall | 1 | Out | Signal indicating from DAU Arbitration Logic which when de-asserted stalls DCU in MSN2 state. |
| dau_dcu_ adr[21:5] | 17 | Out | Signal indicating the address for the DRAM access. This is a 256-bit aligned DRAM address. |
| dau_dcu_rwn | 1 | Out | Signal indicating the direction for the DRAM access (1 = read, 0 = write). |
| dau_dcu_ cduwpage | 1 | Out | Signal indicating if access is a CDU write page mode access (1 = CDU page mode, 0 = not CDU page mode). |
| dau_dcu_refresh | 1 | Out | Signal indicating that a refresh command is to be issued. If asserted dau_dcu_cmd_adr, dau_dcu_rwn and dau_dcu_cduwpage are ignored. |
| dau_dcu_wdata | 256 | Out | 256-bit write data to DCU |
| dau_dcu_wmask | 32 | Out | Byte-encoded write data mask for 256-bit dau_dcu_wdata to DCU Polarity: A "1" in a bit |

TABLE 129-continued

| DAU interface | | | |
|---|---|---|---|
| Port Name | Pins | I/O | Description |
| | | | field of dau_dcu_wmask means that the corresponding byte in the 256-bit dau_dcu_wdata is written to DRAM. |
| Inputs from DCU | | | |
| dcu_dau_adv | 1 | In | Signal indicating to DAU to supply next command to DCU |
| dcu_dau_wadv | 1 | In | Signal indicating to DAU to initiate next non-CPU write |
| dcu_dau_refreshcomplete | 1 | In | Signal indicating that the DCU has completed a refresh. |
| dcu_dau_rdata | 256 | In | 256-bit read data from DCU. |
| dcu_dau_rvalid | 1 | In | Signal indicating valid read data on dcu_dau_rdata. |

The CPU subsystem bus interface is described in more detail in Section 11.4.3. The DAU block will only allow supervisor-mode accesses to update its configuration registers (i.e. cpu_acode[1:0]=b11). All other accesses will result in diu_cpu_berr being asserted.

20.14.9 DAU Configuration Registers

TABLE 130

| DAU configuration registers | | | | |
|---|---|---|---|---|
| Address (DIU_base +) | Register | # bits | Reset | Description |
| Reset | | | | |
| 0x00 | Reset | 1 | 0x1 | A write to this register causes a reset of the DIU. This register can be read to indicate the reset state: 0 - reset in progress 1 - reset not in progress |
| Refresh | | | | |
| 0x04 | RefreshPeriod | 9 | 0x063 | Refresh controller. When set to 0 refresh is off, otherwise the value indicates the number of cycles, less one, between each refresh. [Note that for a system clock frequency of 160 MHz, a value exceeding 0x63 (indicating a 100-cycle refresh period) should not be programmed, or the DRAM will malfunction.] |
| Timeslot allocation and control | | | | |
| 0x08 | NumMainTimeslots | 6 | 0x01 | Number of main timeslots (1–64) less one |
| 0x0C | CPUPreAccessTimeslots | 4 | 0x0 | (CPUPreAccessTimeslots + 1) main slots out of a total of (CPUTotalTimeslots + 1) are preceded by a CPU access. |
| 0x10 | CPUTotalTimeslots | 4 | 0x0 | (CPUPreAccessTimeslots + 1) main slots out of a total of (CPUTotalTimeslots + 1) are preceded by a CPU access. |
| 0x100–0x1FC | MainTimeslot[63:0] | 64 × 4 | [63:1][3:0] = 0x0 [0][3:0] = 0xE | Programmable main timeslots (up to 64 main timeslots). |
| 0x200 | ReadRoundRobinLevel | 12 | 0x000 | For each read requester plus refresh 0 = level1 of round-robin 1 = level2 of round-robin The bit order is defined in Table. |
| 0x204 | EnableCPURoundRobin | 1 | 0x1 | Allows the CPU to particpate in the unused read round-robin scheme. If disabled, the shared CPU/refresh round-robin position is dedicated solely to refresh. |
| 0x208 | RotationSync | 1 | 0x1 | Writing 0, followed by 1 to this bit allows the timeslot rotation to advance on a cycle basis which can be determined by the CPU. |
| 0x20C | minNonCPUReadAdr | 12 | 0x800 | 12 MSBs of lowest DRAM address which may be read by non-CPU requesters. |
| 0x210 | minDWUWriteAdr | 12 | 0x800 | 12 MSBs of lowest DRAM address which may be written to by the DWU. |

TABLE 130-continued

DAU configuration registers

| Address (DIU_base +) | Register | # bits | Reset | Description |
|---|---|---|---|---|
| 0x214 | minNonCPUWriteAdr | 12 | 0x800 | 12 MSBs of lowest DRAM address which may be written to by non-CPU requesters other than the DWU. |
| Debug | | | | |
| 0x300 | DebugSelect[11:2] | 10 | 0x304 | Debug address select. Indicates the address of the register to report on the diu_cpu_data bus when it is not otherwise being used. When this signal carries debug information the signal diu_cpu_debug_valid will be asserted. |
| Debug: arbitration and performance | | | | |
| 0x304 | ArbitrationHistory | 22 | — | Bit 0 = arb_gnt<br>Bit 1 = arb_executed<br>Bit 6:2 = arb_sel[4:0]<br>Bit 12:7 = timeslot_number[5:0]<br>Bit 15:13 = access_type[2:0]<br>Bit 16 = back2back_non_cpu_write<br>Bit 17 = sticky_back2back_non_cpu_write<br>(Sticky version of same, cleared on reset.)<br>Bit 18 = rotation_sync<br>Bit 20:19 = rotation_state<br>Bit 21 = sticky_invalid_non_cpu_adr<br>See Section 20.14.9.2 DIU Debug for a description of the fields.<br>Read only register. |
| 0x308 | DIUPerformance | 31 | — | Bit 0 = cpu_diu_rreq<br>Bit 1 = scb_diu_rreq<br>Bit 2 = cdu_diu_rreq<br>Bit 3 = cfu_diu_rreq<br>Bit 4 = lbd_diu_rreq<br>Bit 5 = sfu_diu_rreq<br>Bit 6 = td_diu_rreq<br>Bit 7 = tfs_diu_rreq<br>Bit 8 = hcu_diu_rreq<br>Bit 9 = dnc_diu_rreq<br>Bit 10 = llu_diu_rreq<br>Bit 11 = pcu_diu_rreq<br>Bit 12 = cpu_diu_wreq<br>Bit 13 = scb_diu_wreq<br>Bit 14 = cdu_diu_wreq<br>Bit 15 = sfu_diu_wreq<br>Bit 16 = dwu_diu_wreq<br>Bit 17 = refresh_req<br>Bit 22:18 = read_sel[4:0]<br>Bit 23 = read_complete<br>Bit 28:24 = write_sel[4:0]<br>Bit 29 = write_complete<br>Bit 30 = dcu_dau_refreshcomplete<br>See Section 20.14.9.2 DIU Debug for a description of the fields.<br>Read only register. |
| Debug DIU read requesters interface signals | | | | |
| 0x30C | CPUReadInterface | 25 | — | Bit 0 = cpu_diu_rreq<br>Bit 22:1 = cpu_adr[21:0]<br>Bit 23 = diu_cpu_rack<br>Bit 24 = diu_cpu_rvalid<br>Read only register. |
| 0x310 | SCBReadInterface | 20 | | Bit 0 = scb_diu_rreq<br>Bit 17:1 = scb_diu_radr[21:5]<br>Bit 18 = diu_scb_rack<br>Bit 19 = diu_scb_rvalid<br>Read only register. |
| 0x314 | CDUReadInterface | 20 | — | Bit 0 = cdu_diu_rreq<br>Bit 17:1 = cdu_diu_radr[21:5]<br>Bit 18 = diu_cdu_rack<br>Bit 19 = diu_cdu_rvalid<br>Read only register. |
| 0x318 | CFUReadInterface | 20 | — | Bit 0 = cfu_diu_rreq<br>Bit 17:1 = cfu_diu_radr[21:5]<br>Bit 18 = diu_cfu_rack |

TABLE 130-continued

DAU configuration registers

| Address (DIU_base +) | Register | # bits | Reset | Description |
| --- | --- | --- | --- | --- |
| | | | | Bit 19 = diu_cfu_rvalid<br>Read only register. |
| 0x31C | LBDReadInterface | 20 | — | Bit 0 = lbd_diu_rreq<br>Bit 17:1 = lbd_diu_radr[21:5]<br>Bit 18 = diu_lbd_rack<br>Bit 19 = diu_lbd_rvalid<br>Read only register. |
| 0x320 | SFUReadInterface | 20 | — | Bit 0 = sfu_diu_rreq<br>Bit 17:1 = sfu_diu_radr[21:5]<br>Bit 18 = diu_sfu_rack<br>Bit 19 = diu_sfu_rvalid<br>Read only register. |
| 0x324 | TDReadInterface | 20 | — | Bit 0 = td_diu_rreq<br>Bit 17:1 = td_diu_radr[21:5]<br>Bit 18 = diu_td_rack<br>Bit 19 = diu_td_rvalid<br>Read only register. |
| 0x328 | TFSReadInterface | 20 | — | Bit 0 = tfs_diu_rreq<br>Bit 17:1 = tfs_diu_radr[21:5]<br>Bit 18 = diu_tfs_rack<br>Bit 19 = diu_tfs_rvalid<br>Read only register. |
| 0x32C | HCUReadInterface | 20 | — | Bit 0 = hcu_diu_rreq<br>Bit 17:1 = hcu_diu_radr[21:5]<br>Bit 18 = diu_hcu_rack<br>Bit 19 = diu_hcu_rvalid<br>Read only register. |
| 0x330 | DNCReadInterface | 20 | — | Bit 0 = dnc_diu_rreq<br>Bit 17:1 = dnc_diu_radr[21:5]<br>Bit 18 = diu_dnc_rack<br>Bit 19 = diu_dnc_rvalid<br>Read only register. |
| 0x334 | LLUReadInterface | 20 | — | Bit 0 = llu_diu_rreq<br>Bit 17:1 = lluu_diu_radr[21:5]<br>Bit 18 = diu_llu_rack<br>Bit 19 = diu_llu_rvalid<br>Read only register. |
| 0x338 | PCUReadInterface | 20 | — | Bit 0 = pcu_diu_rreq<br>Bit 17:1 = pcu_diu_radr[21:5]<br>Bit 18 = diu_pcu_rack<br>Bit 19 = diu_pcu_rvalid<br>Read only register. |
| Debug DIU write requesters interface signals | | | | |
| 0x33C | CPUWriteInterface | 27 | — | Bit 0 = cpu_diu_wreq<br>Bit 22:1 = cpu_adr[21:0]<br>Bit 24:23 = cpu_diu_wmask[1:0]<br>Bit 25 = diu_cpu_wack<br>Bit 26 = cpu_diu_wvalid<br>Read only register. |
| 0x340 | SCBWriteInterface | 20 | — | Bit 0 = scb_diu_wreq<br>Bit 17:1 = scb_diu_wadr[21:5]<br>Bit 18 = diu_scb_wack<br>Bit 19 = scb_diu_wvalid<br>Read only register. |
| 0x344 | CDUWriteInterface | 22 | — | Bit 0 = cdu_diu_wreq<br>Bit 19:1 = cdu_diu_wadr[21:3]<br>Bit 20 = diu_cdu_wack<br>Bit 21 = cdu_diu_wvalid<br>Read only register. |
| 0x348 | SFUWriteInterface | 20 | — | Bit 0 = sfu_diu_wreq<br>Bit 17:1 = sfu_diu_wadr[21:5]<br>Bit 18 = diu_sfu_wack<br>Bit 19 = sfu_diu_wvalid<br>Read only register. |
| 0x34C | DWUWriteInterface | 20 | — | Bit 0 = dwu_diu_wreq<br>Bit 17:1 = dwu_diu_wadr[21:5]<br>Bit 18 = diu_dwu_wack<br>Bit 19 = dwu_diu_wvalid<br>Read only register. |
| Debug DAU-DCU interface signals | | | | |
| 0x350 | DAU-DCUInterface | 25 | — | Bit 16:0 = dau_dcu_adr[21:5]<br>Bit 17 = dau_dcu_rwn |

TABLE 130-continued

DAU configuration registers

| Address (DIU_base +) | Register | # bits | Reset | Description |
|---|---|---|---|---|
| | | | | Bit 18 = dau_dcu_cduwpage<br>Bit 19 = dau_dcu_refresh<br>Bit 20 = dau_dcu_msn2stall<br>Bit 21 = dcu_dau_adv<br>Bit 22 = dcu_dau_wadv<br>Bit 23 = dcu_dau_refreshcomplete<br>Bit 24 = dcu_dau_rvalid<br>Read only register. |

Each main timeslot can be assigned a SoPEC DIU requestor according to Table 131.

TABLE 131

SoPEC DIU requester encoding for main timeslots.

| Name | Index (binary) | Index (HEX) |
|---|---|---|
| Write | | |
| SCB(W) | b0_0000 | 0x00 |
| CDU(W) | b0001 | 0x1 |
| SFU(W) | b0010 | 0x2 |
| DWU | b0011 | 0x3 |
| Read | | |
| SCB(R) | b0100 | 0x4 |
| CDU(R) | b0101 | 0x5 |
| CFU | b0110 | 0x6 |
| LBD | b0111 | 0x7 |
| SFU(R) | b1000 | 0x8 |
| TE(TD) | b1001 | 0x9 |
| TE(TFS) | b1010 | 0xA |
| HCU | b1011 | 0xB |
| DNC | b1100 | 0xC |
| LLU | b1101 | 0xD |
| PCU | b1110 | 0xE |

ReadRoundRobinLevel and ReadRoundRobinEnable registers are encoded in the bit order defined in Table 132.

TABLE 132

Read round-robin registers bit order

| Name | Bit index |
|---|---|
| SCB(R) | 0 |
| CDU(R) | 1 |
| CFU | 2 |
| LBD | 3 |
| SFU(R) | 4 |
| TE(TD) | 5 |
| TE(TFS) | 6 |
| HCU | 7 |
| DNC | 8 |
| LLU | 9 |
| PCU | 10 |
| CPU/Refresh | 11 |

20.14.9.1 Configuration Register Reset State

The RefreshPeriod configuration register has a reset value of 0×063 which ensures that a refresh will occur every 100 cycles and the contents of the DRAM will remain valid.

The CPUPreAccessTimeslots and CPUTotalTimeslots configuration registers both have a reset value of 0x0. Matching values in these two registers means that every slot has a CPU pre-acess. NumMainTimeslots is reset to 0x1, so there are just 2 main timeslots in the rotation initially. These slots alternate between SCB writes and PCU reads, as defined by the reset value of MainTimeslot[63:0], thus respecting at reset time the general rule that adjacent non-CPU writes are not permitted.

The first access issued by the DIU after reset will be a refresh.

20.14.9.2 DIU Debug

External visibility of the DIU must be provided for debug purposes. To facilitate this debug registers are added to the DIU address space.

The DIU CPU system data bus diu_cpu_data[31:0] returns configuration and status register information to the CPU. When a configuration or status register is not being read by the CPU debug data is returned on diu_cpu_data [31:0] instead. An accompanying active high diu_cpu_debug_valid signal is used to indicate when the data bus contains valid debug data.

The DIU features a DebugSelect register that controls a local multiplexor to determine which register is output on diu_cpu_data[31:0].

Three kinds of debug information are gathered:

a. The order and access type of DIU requesters winning arbitration.

This information can be obtained by observing the signals in the ArbitrationHistory debug register at DIU_Base+ 0x304 described in Table 133.

TABLE 133

ArbitrationHistory debug register description, DIU_base + 0x304

| Field name | Bits | Description |
|---|---|---|
| arb_gnt | 1 | Signal lasting 1 cycle which is asserted in the cycle following a main arbitration or pre-arbitration. |
| arb_executed | 1 | Signal lasting 1 cycle which indicates that an arbitration result has actually been executed. Is used to differentiate between *pre*-arbitration and *main* arbitration, both of which cause arb_gnt to be asserted. If arb_executed and arb_gnt are both high, then a main (executed) arbitration is indicated. |
| arb_sel | 5 | Signal indicating which requesting SoPEC Unit has won arbitration. Encoding is described in Table. Refresh winning arbitration is indicated by access_type. |

TABLE 133-continued

ArbitrationHistory debug register description, DIU_base + 0x304

| Field name | Bits | Description |
| --- | --- | --- |
| timeslot_number | 6 | Signal indicating which main time-slot is either currently being serviced, or about to be serviced. The latter case applies where a main slot is preempted by a CPU pre-access or a scheduled refresh. |
| access_type | 3 | Signal indicating the origin of the winning arbitration<br>000 = Standard CPU pre-access.<br>001 = Scheduled refresh.<br>010 = Standard non-CPU timeslot.<br>011 = CPU access via unused read/write slot, re-allocated by round robin.<br>100 = Non-CPU write via unused write slot, re-allocated at prearbitration.<br>101 = Non-CPU read via unused read/write slot, re-allocated by round robin.<br>110 = Refresh via unused read/write slot, re-allocated by round robin.<br>111 = CPU/Refresh access due to RotationSync = 0. |
| back2back_non_cpu_write | 1 | Instantaneous indicator of attempted illegal back-to-back non-CPU write. (Recall from section 20.7.2.3 on page 212 that the second write of any such pair is disregarded and re-allocated via the unused read round-robin scheme.) |
| sticky_back2back_non_cpu_write | 1 | Sticky version of same, cleared on reset. |
| rotation_sync | 1 | Current value of the RotationSync configuration bit. |
| rotation_state | 2 | These bits indicate the current status of pre-arbitration and main timeslot rotation, as a result of the RotationSync setting.<br>00 = Pre-arb enabled, rotation enabled.<br>01 = Pre-arb disabled, rotation enabled.<br>10 = Pre-arb disabled, rotation disabled.<br>11 = Pre-arb enabled, rotation disabled.<br>00 is the normal functional setting when RotationSync is 1.<br>01 indicates that pre-arbitration has halted at the end of its rotation because of RotationSync having been cleared. However the main arbitration has yet to finish its current rotation.<br>10 indicates that both pre-arb and the main rotation have halted, due to RotationSync being 0 and that only CPU accesses and refreshes are allowed.<br>11 indicates that RotationSync has just been changed from 0 to 1 and that pre-arbitration is being given a head start to look ahead for non-CPU writes, in advance of the main rotation starting up again. |
| sticky_invalid_non_cpu_adr | 1 | Sticky bit to indicate an attempted non-CPU access with an invalid address. Cleared by reset or by an explicit write by the CPU. |

TABLE 134 arb_sel, read_sel and write_sel encoding

| Name | Index (binary) | Index (HEX) |
| --- | --- | --- |
| Write | | |
| SCB(W) | b0_0000 | 0x00 |
| CDU(W) | b0_0001 | 0x01 |
| SFU(W) | b0_0010 | 0x02 |
| DWU | b0_0011 | 0x03 |
| Read | | |
| SCB(R) | b0_0100 | 0x04 |
| CDU(R) | b0_0101 | 0x05 |
| CFU | b0_0110 | 0x06 |
| LBD | b0_0111 | 0x07 |
| SFU(R) | b0_1000 | 0x08 |
| TE(TD) | b0_1001 | 0x09 |
| TE(TFS) | b0_1010 | 0x0A |
| HCU | b0_1011 | 0x0B |
| DNC | b0_1100 | 0x0C |
| LLU | b0_1101 | 0x0D |
| PCU | b0_1110 | 0x0E |
| Refresh | | |
| Refresh | b0_1111 | 0x0F |
| CPU | | |
| CPU(R) | b1_0000 | 0x10 |
| CPU(W) | b1_0001 | 0x11 |

The encoding for arb_sel is described in Table 134.

b. The time between a DIU requester requesting an access and completing the access.

This information can be obtained by observing the signals in the DIUPerformance debug register at DIU_Base+0x308 described in Table 135. The encoding for read_sel and write_sel is described in Table. The data collected from DIUPerformance can be post-processed to count the number of cycles between a unit requesting DIU access and the access being completed.

TABLE 135

DIUPerformance debug register description, DIU_base + 0x308

| Field name | Bits | Description |
| --- | --- | --- |
| <unit>_diu_rreq | 12 | Signal indicating that SoPEC unit requests DRAM read. |
| <unit>_diu_wreq | 5 | Signal indicating that SoPEC unit requests DRAM write. |
| refresh_req | 1 | Signal indicating that refresh has requested a DIU access. |
| read_sel[4:0] | 5 | Signal indicating the SoPEC Unit for which the current read transaction is occurring. Encoding is described in Table. |
| read_complete | 1 | Signal indicating that read transaction to SoPEC Unit indicated by read_sel is complete i.e. that the last read data has been output by the DIU. |
| write_sel[4:0] | 5 | Signal indicating the SoPEC Unit for which the current write transaction is occurring. Encoding is described in Table. |
| write_complete | 1 | Signal indicating that write transaction to SoPEC Unit indicated by write_sel is complete i.e. that the |

TABLE 135-continued

DIUPerformance debug register description, DIU_base + 0x308

| Field name | Bits | Description |
|---|---|---|
| | | last write data has been transferred to the DIU. |
| dcu_refresh_complete | 1 | Signal indicating that refresh has completed. |

c. Interface Signals to DIU Requestors and DAU-DCU Interface

All interface signals with the exception of data busses at the interfaces between the DAU and DCU and DIU write and read requestors can be monitored in debug mode by observing debug registers DIU_Base+0x314 to DIU_Base+0x354.

20.14.10 DRAM Arbitration Unit (DAU)

Figure 101:
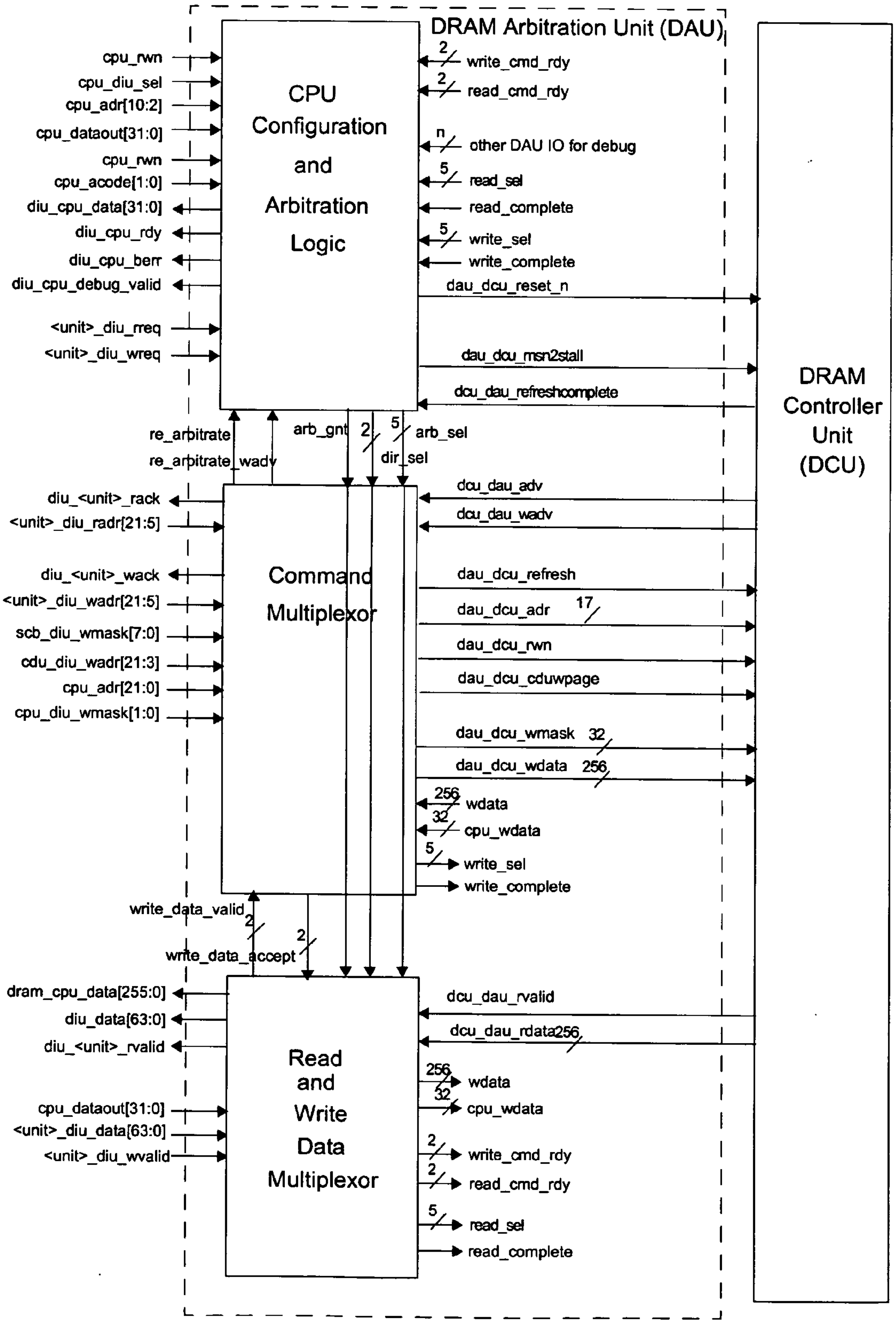
FIG. 101 shows a DIU partition

The DAU is shown in FIG. 101.

The DAU is composed of the following sub-blocks a. CPU Configuration and Arbitration Logic sub-block.

b. Command Multiplexor sub-block.

c. Read and Write Data Multiplexor sub-block.

The function of the DAU is to supply DRAM commands to the DCU.

The DCU requests a command from the DAU by asserting dcu_dau_adv.

The DAU Command Multiplexor requests the Arbitration Logic sub-block to arbitrate the next DRAM access. The Command Multiplexor passes dcu_dau_adv as the re_arbitrate signal to the Arbitration Logic sub-block.

If the RotationSync bit has been cleared, then the arbitration logic grants exclusive access to the CPU and scheduled refreshes. If the bit has been set, regular arbitration occurs. A detailed description of RotationSync is given in section 20.14.12.2.1 on page 295.

Until the Arbitration Logic has a valid result it stalls the DCU by asserting dau_dcu_msn2stall. The Arbitration Logic then returns the selected arbitration winner to the Command Multiplexor which issues the command to the DRAM. The Arbitration Logic could stall for example if it selected a shared read bus access but the Read Multiplexor indicated it was busy by de-asserting read_cmd_rdy[1].

In the case of a read command the read data from the DRAM is multiplexed back to the read requestor by the Read Multiplexor. In the case of a write operation the Write Multiplexor multiplexes the write data from the selected DIU write requester to the DCU before the write command can occur. If the write data is not available then the Command Multiplexor will keep dau_dcu_valid de-asserted. This will stall the DCU until the write command is ready to be issued.

Arbitration for non-CPU writes occurs in advance. The DCU provides a signal dcu_dau_wadv which the Command Multiplexor issues to the Arbitrate Logic as re_arbitrate_wadv. If arbitration is blocked by the Write Multiplexor being busy, as indicated by write_cmd_rdy [1] being de-asserted, then the Arbitration Logic will stall the DCU by asserting dau_dcu_msn2stall until the Write Multiplexor is ready.

20.14.10.1 Read Accesses

Figure 109:
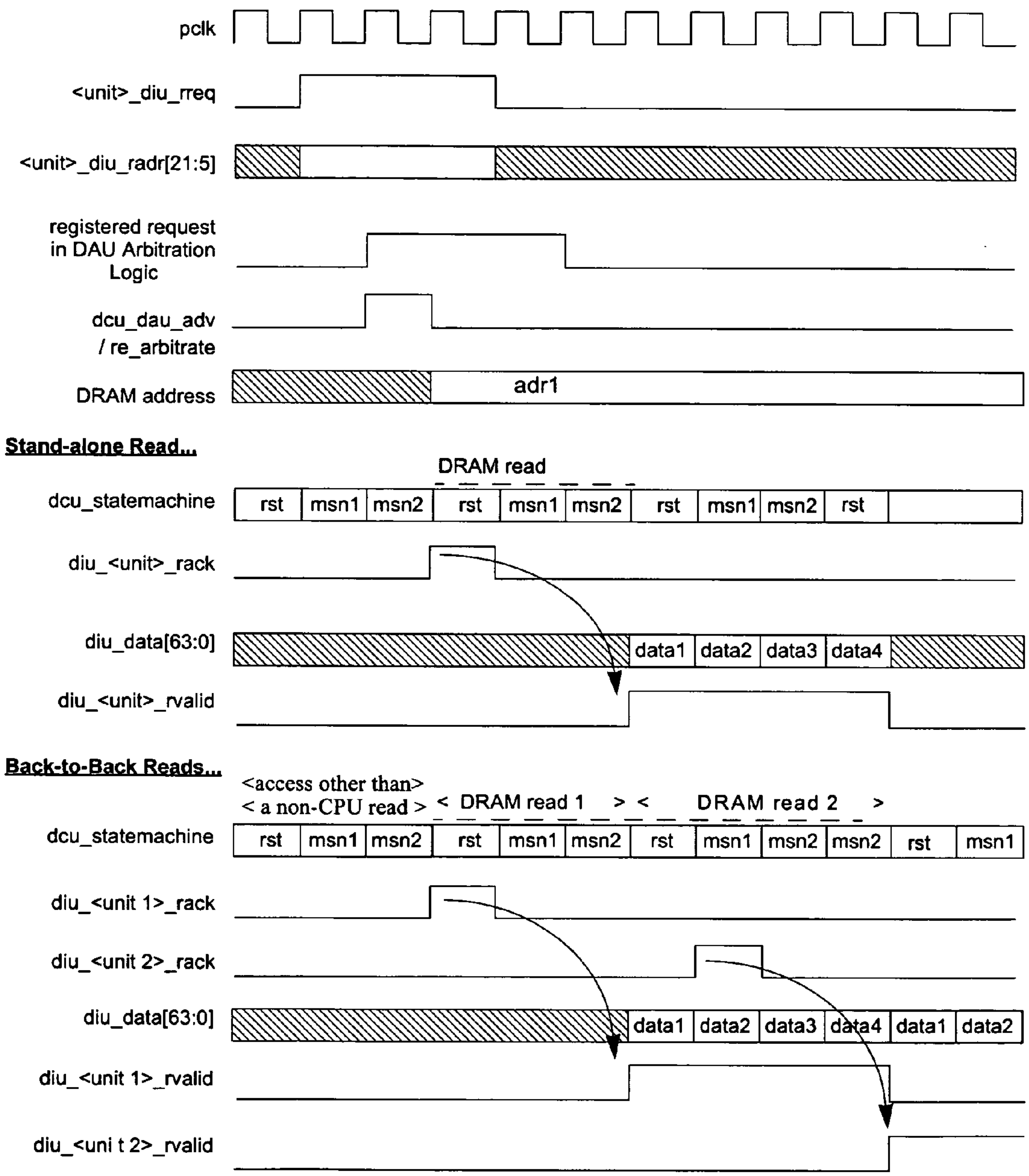
FIG. 109 shows timing of non-CPU DIU read access

The timing of a non-CPU DIU read access are shown in FIG. 109. Note re_arbitrate is asserted in the MSN2 state of the previous access.

Note the fixed timing relationship between the read acknowledgment and the first rvalid for all non-CPU reads. This means that the second and any later reads in a back-to-back non-CPU sequence have their acknowledgments asserted one cycle later, i.e. in the "MSN1" DCU state.

Figure 110:
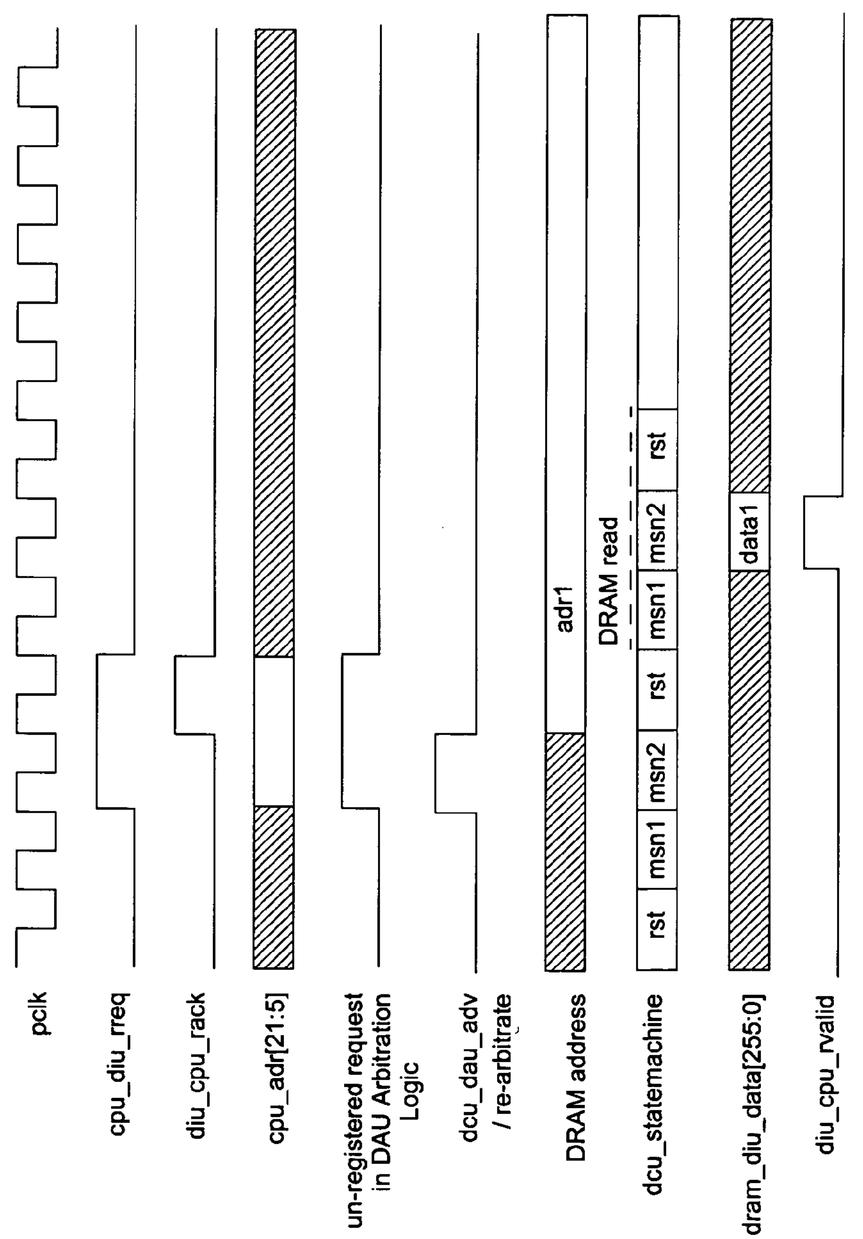
FIG. 110 shows timing of CPU DIU read access

The timing of a CPU DIU read access is shown in FIG. 110. Note re_arbitrate is asserted in the MSN2 state of the previous access.

Some points can be noted from FIG. 109 and FIG. 110.

DIU requests:

For non-CPU accesses the <unit>_diu_rreq signals are registered before the arbitration can occur.

For CPU accesses the cpu_diu_rreq signal is not registered to reduce CPU DIU access latency.

Arbitration occurs when the dcu_dau_adv signal from the DCU is asserted. The DRAM address for the arbitration winner is available in the next cycle, the RST state of the DCU.

The DRAM access starts in the MSN1 state of the DCU and completes in the RST state of the DCU.

Read data is available:

In the MSN2 cycle where it is output unregistered to the CPU

In the MSN2 cycle and registered in the DAU before being output in the next cycle to all other read requesters in order to ease timing.

The DIU protocol is in fact:

Pipelined i.e. the following transaction is initiated while the previous transfer is in progress.

Split transaction i.e. the transaction is split into independent address and data transfers.

Some general points should be noted in the case of CPU accesses:

Since the CPU request is not registered in the DIU before arbitration, then the CPU must generate the request, route it to the DAU and complete arbitration all in 1 cycle. To facilitate this CPU access is arbitrated late in the arbitration cycle (see Section 20.14.12.2).

Since the CPU read data is not registered in the DAU and CPU read data is available 8 ns after the start of the access then 4.5 ns are available for routing and any shallow logic before the CPU read data is captured by the CPU (see Section 20.14.4).

Figure 111:
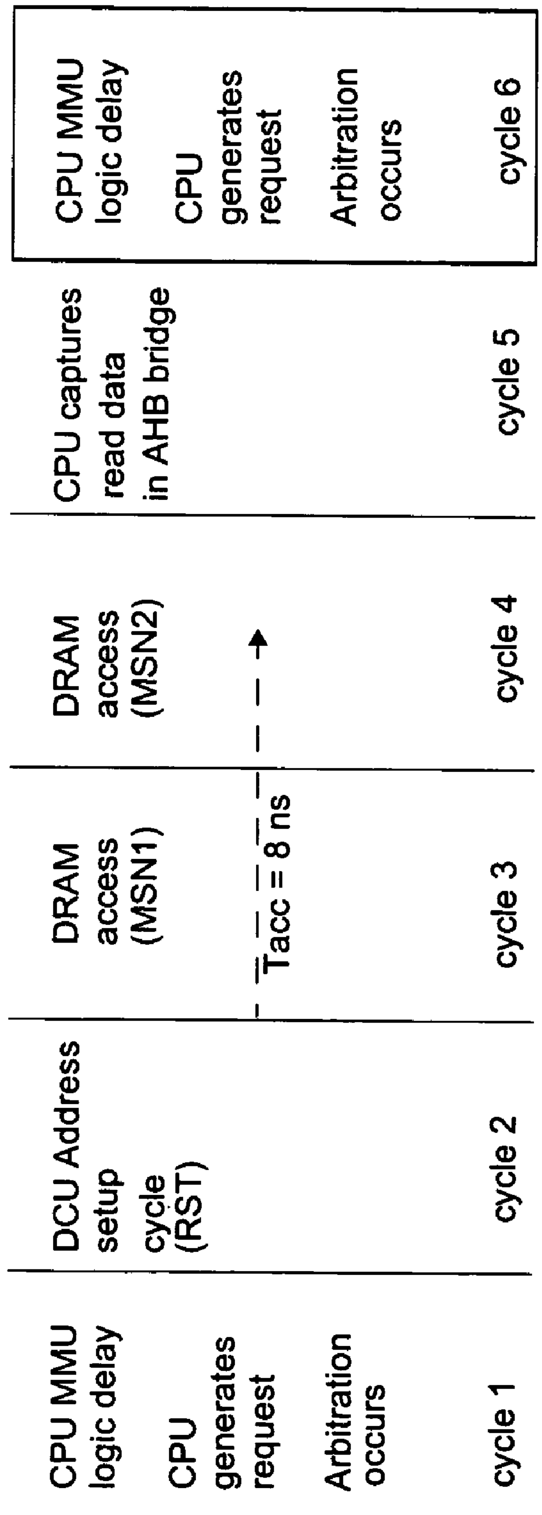
FIG. 111 shows a CPU DIU read access

The phases of CPU DIU read access are shown in FIG. 111. This matches the timing shown in Table 135.

20.14.10.2 Write Accesses

Figure 112:
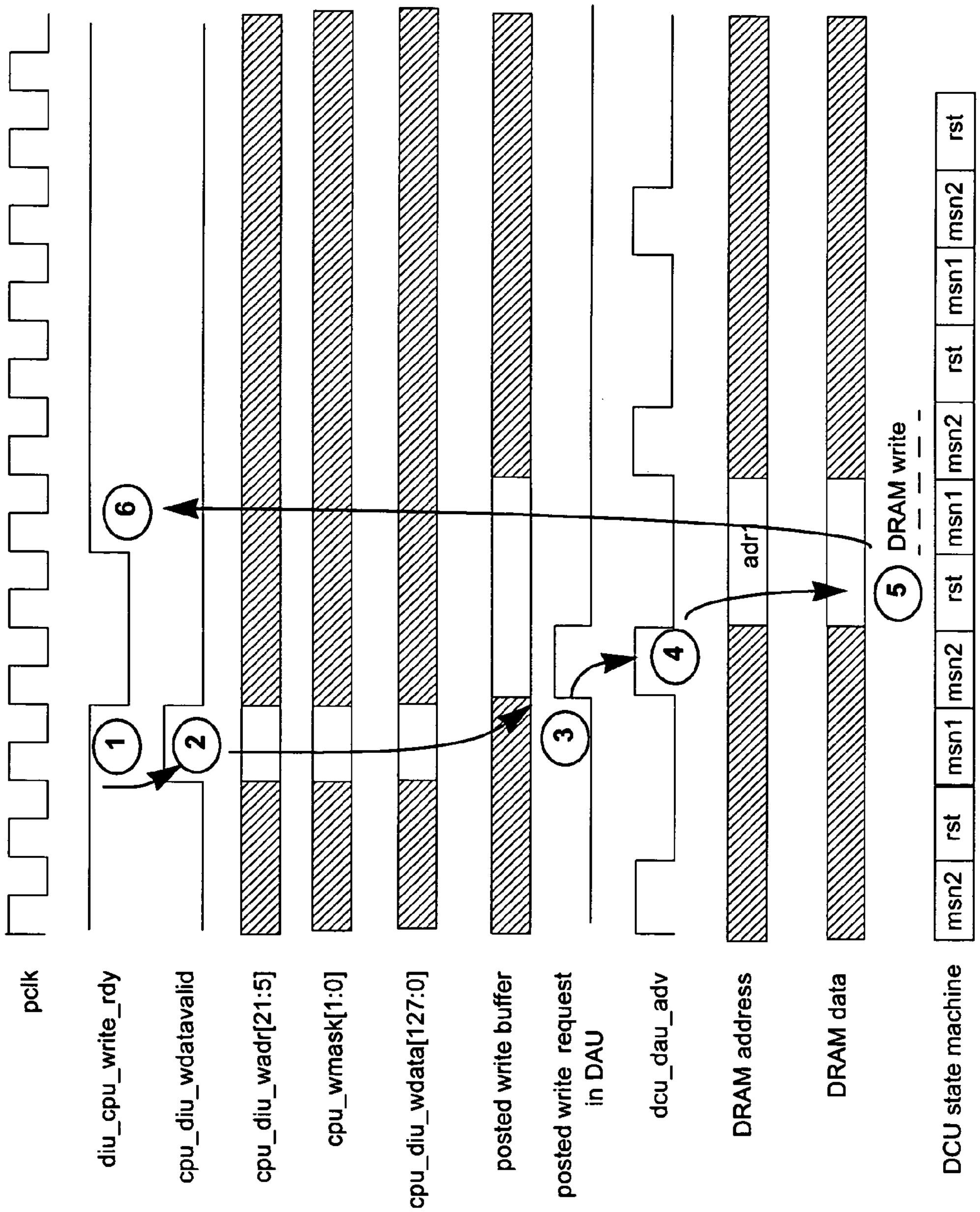
FIG. 112 shows timing of CPU DIU write access

CPU writes are posted into a 1-deep write buffer in the DIU and written to DRAM as shown below in FIG. 112.

The sequence of events is as follows:—

[1] The DIU signals that its buffer for CPU posted writes is empty (and has been for some time in the case shown).

[2] The CPU asserts "cpu_diu_wdatavalid" to enable a write to the DIU buffer and presents valid address, data and write mask. The CPU considers the write posted and thus complete in the cycle following [2] in the diagram below.

[3] The DIU stores the address/data/mask in its buffer and indicates to the arbitration logic that a posted write wishes to participate in any upcoming arbitration.

[4] Provided the CPU still has a pre-access entitlement left, or is next in line for a round-robin award, a slot is arbitrated in favour of the posted write. Note that posted CPU writes have higher arbitration priority than simultaneous CPU reads.

[5] The DRAM write occurs.

[6] The earliest that "diu_cpu_write_rdy" can be re-asserted in the "MSN1" state of the DRAM write. In the same cycle, having seen the re-assertion, the CPU can asynchronously turn around "cpu_diu_wdatavalid" and enable a subsequent posted write, should it wish to do so.

The timing of a non-CPU/non-CDU DIU write access is shown below in FIG. 113.

Compared to a read access, write data is only available from the requester 4 cycles after the address. An extra cycle is used to ensure that data is first registered in the DAU, before being despatched to DRAM. As a result, writes are pre-arbitrated 5 cycles in advance of the main arbitration decision to actually write the data to memory.

The diagram above shows the following sequence of events:—

[1] A non-CPU block signals a write request.

[2] A registered version of this is available to the DAU arbitration logic.

[3] Write pre-arbitration occurs in favour of the requester.

[4] A write acknowledgment is returned by the DIU.

[5] The pre-arbitration will only be upheld if the requester supplies 4 consecutive write data quarter-words, qualified by an asserted wvalid flag.

[6] Provided this has happened, the main arbitration logic is in a position at [6] to reconfirm the pre-arbitration decision. Note however that such reconfirmation may have to wait a further one or two DRAM accesses, if the write is pre-empted by a CPU pre-access and/or a scheduled refresh.

[7] This is the earliest that the write to DRAM can occur.

Note that neither the arbitration at [8] nor the pre-arbitration at [9] can award its respective slot to a non-CPU write, due to the ban on back-to-back accesses.

Figure 114:
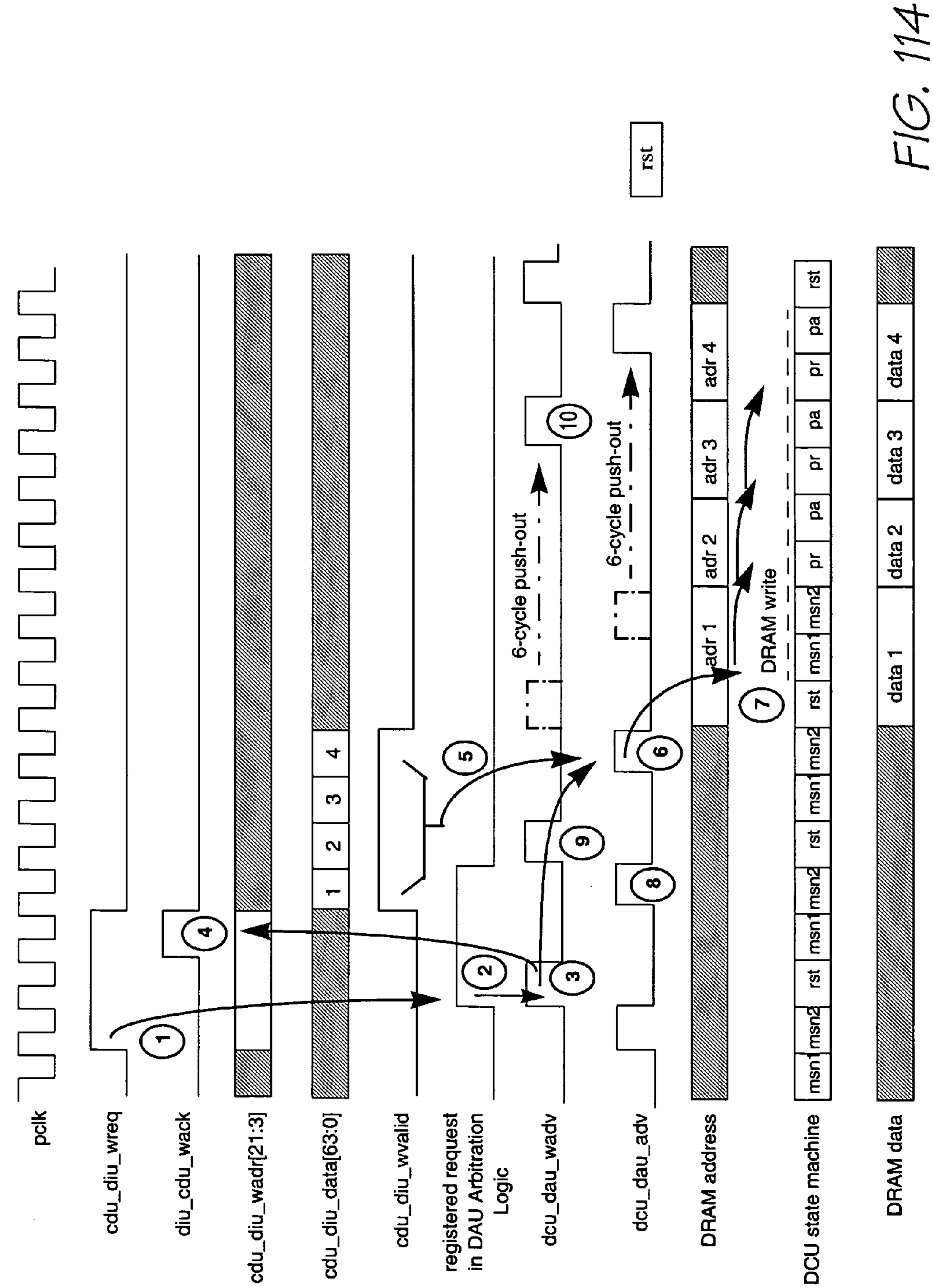
FIG. 114 shows timing of CDU DIU write access

The timing of a CDU DIU write access is shown overleaf in FIG. 114.

This is simular to a regular non-CPU write access, but uses page mode to carry out 4 consecutive DRAM writes to contiguous addresses. As a consequence, subsequent accesses are delayed by 6 cycles, as shown in the diagram. Note that a new write can be pre-arbitrated at [10] in FIG. 114.

20.14.11 Command Multiplexor Sub-Block

TABLE 136

Command Multiplexor Sub-block IO Definition

| Port name | Pins | I/O | Description |
|---|---|---|---|
| Clocks and Resets | | | |
| pclk | 1 | In | System Clock |
| prst_n | 1 | In | System reset, synchronous active low |
| DIU Read Interface to SoPEC Units | | | |
| <unit>_diu_radr[21:5] | 17 | In | Read address to DIU 17 bits wide (256-bit aligned word). |
| diu_<unit>_rack | 1 | Out | Acknowledge from DIU that read request has been accepted and new read address can be placed on <unit>_diu_radr |
| DIU Write Interface to SoPEC Units | | | |
| <unit>_diu_wadr[21:5] | 17 | In | Write address to DIU except CPU, SCB, CDU 17 bits wide (256-bit aligned word) |

TABLE 136-continued

Command Multiplexor Sub-block IO Definition

| Port name | Pins | I/O | Description |
|---|---|---|---|
| cpu_diu_wadr[21:4]] | 22 | In | CPU Write address to DIU (128-bit aligned address.) |
| cpu_diu_wmask | 16 | In | Byte enables for CPU write. |
| cdu_diu_wadr[21:3] | 19 | In | CDU Write address to DIU 19 bits wide (64-bit aligned word) Addresses cannot cross a 256-bit word DRAM boundary. |
| diu_<unit>_wack | 1 | Out | Acknowledge from DIU that write request has been accepted and new write address can be placed on <unit>_diu_wadr |
| Outputs to CPU Interface and Arbitration Logic sub-block | | | |
| re_arbitrate | 1 | Out | Signalling telling the arbitration logic to choose the next arbitration winner. |
| re_arbitrate_wadv | 1 | Out | Signal telling the arbitration logic to choose the next arbitration winner for non-CPU writes 2 timeslots in advance |
| Debug Outputs to CPU Configuration and Arbitration Logic Sub-block | | | |
| write_sel | 5 | Out | Signal indicating the SoPEC Unit for which the current write transaction is occurring. Encoding is described in Table. |
| write_complete | 1 | Out | Signal indicating that write transaction to SoPEC Unit indicated by write_sel is complete. |
| Inputs from CPU Interface and Arbitration Logic sub-block | | | |
| arb_gnt | 1 | In | Signal lasting 1 cycle which indicates arbitration has occurred and arb_sel is valid. |
| arb_sel | 5 | In | Signal indicating which requesting SoPEC Unit has won arbitration. Encoding is described in Table. |
| dir_sel | 2 | In | Signal indicating which sense of access associated with arb_sel<br>00: issue non-CPU write<br>01: read winner<br>10: write winner<br>11: refresh winner |
| Inputs from Read Write Multiplexor Sub-block | | | |
| write_data_valid | 2 | In | Signal indicating that valid write data is available for the current command.<br>00 = not valid<br>01 = CPU write data valid<br>10 = non-CPU write data valid<br>11 = both CPU and non-CPU write data valid |
| wdata | 256 | In | 256-bit non-CPU write data |
| cpu_wdata | 32 | In | 32-bit CPU write data |
| Outputs to Read Write Multiplexor Sub-block | | | |
| write_data_accept | 2 | Out | Signal indicating the Command Multiplexor has accepted the write data from the write multiplexor<br>00 = not valid<br>01 = accepts CPU write data<br>10 = accepts non-CPU write data<br>11 = not valid |
| Inputs from DCU | | | |
| dcu_dau_adv | 1 | In | Signal indicating to DAU to supply next command to DCU |
| dcu_dau_wadv | 1 | In | Signal indicating to DAU to initiate next non-CPU write |

TABLE 136-continued

| Port name | Pins | I/O | Description |
|---|---|---|---|
| Command Multiplexor Sub-block IO Definition | | | |
| Outputs to DCU | | | |
| dau_dcu_adr[21:5] | 17 | Out | Signal indicating the address for the DRAM access. This is a 256-bit aligned DRAM address. |
| dau_dcu_rwn | 1 | Out | Signal indicating the direction for the DRAM access (1 = read, 0 = write). |
| dau_dcu_cduwpage | 1 | Out | Signal indicating if access is a CDU write page mode access (1 = CDU page mode, 0 = not CDU page mode). |
| dau_dcu_refresh | 1 | Out | Signal indicating that a refresh command is to be issued. If asserted dau_dcu_adr, dau_dcu_rwn and dau_dcu_cduwpage are ignored. |
| dau_dcu_wdata | 256 | Out | 256-bit write data to DCU |
| dau_dcu_wmask | 32 | Out | Byte encoded write data mask for 256-bit dau_dcu_wdata to DCU |

20.14.11.1 Command Multiplexor Sub-Block Description

The Command Multiplexor sub-block issues read, write or refresh commands to the DCU, according to the SoPEC Unit selected for DRAM access by the Arbitration Logic. The Command Multiplexor signals the Arbitration Logic to perform arbitration to select the next SoPEC Unit for DRAM access. It does this by asserting the re_arbitrate signal. re_arbitrate is asserted when the DCU indicates on dcu_dau_adv that it needs the next command.

Figure 115:
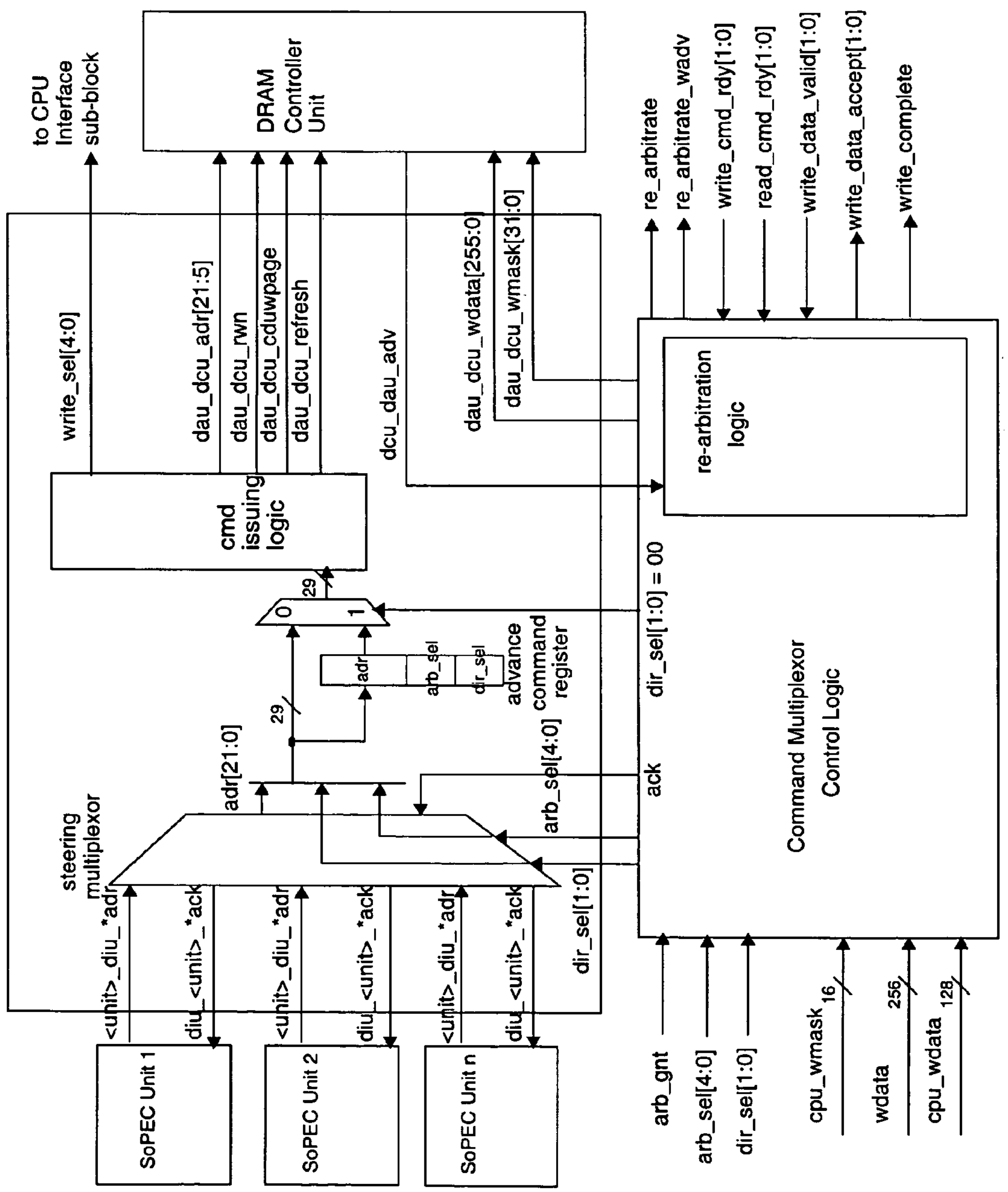
FIG. 115 shows command multiplexor sub-block partition

The Command Multiplexor is shown in FIG. 115.

Initially, the issuing of commands is described. Then the additional complexity of handling non-CPU write commands arbitrated in advance is introduced.

DAU-DCU Interface

See Section 20.14.5 for a description of the DAU-DCU interface.

Generating re_arbitrate

The condition for asserting re_arbitrate is that the DCU is looking for another command from the DAU. This is indicated by dcu_dau_adv being asserted.

```
re_arbitrate=dcu_dau_adv
```

Interface to SoPEC DIU Requestors

When the Command Multiplexor initiates arbitration by asserting re_arbitrate to the Arbitration Logic sub-block, the arbitration winner is indicated by the arb_sel[4:0] and dir_sel[1:0] signals returned from the Arbitration Logic. The validity of these signals is indicated by arb_gnt. The encoding of arb_sel[4:0] is shown in Table.

Figure 116:
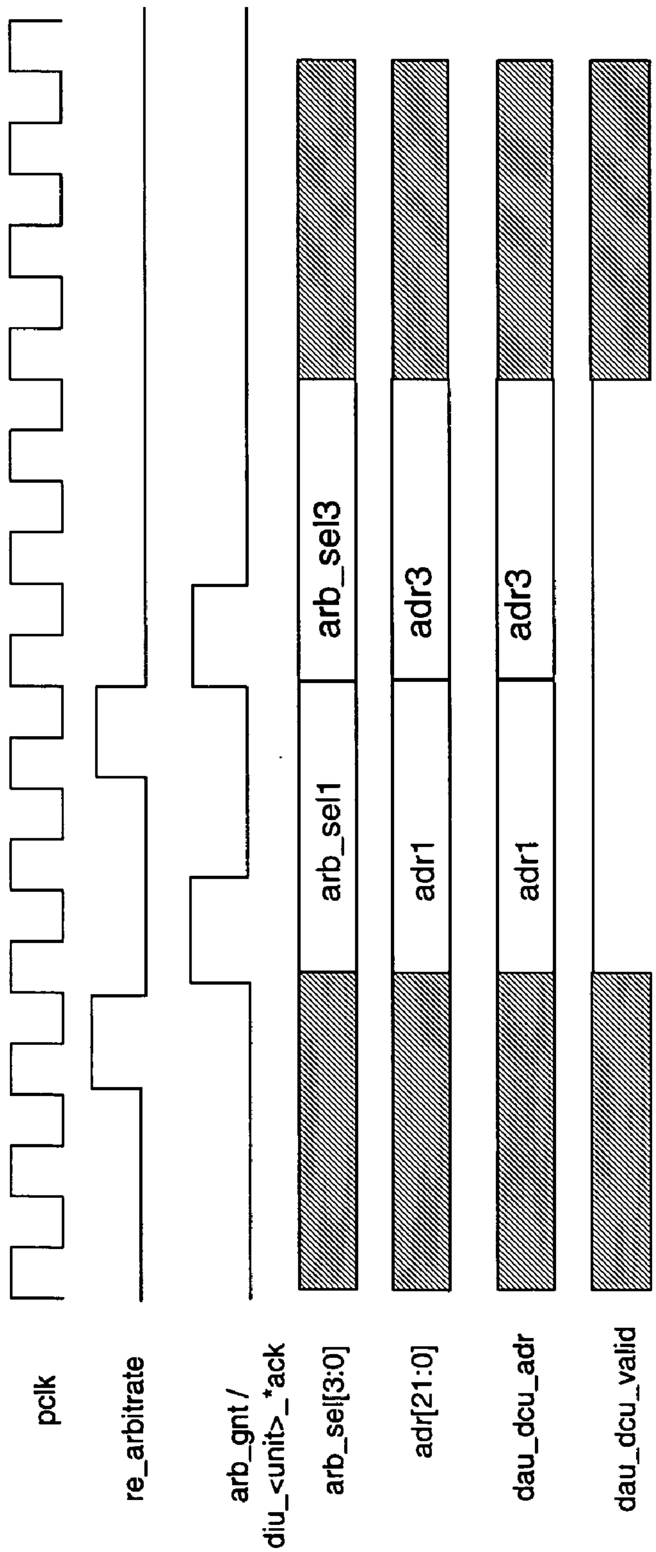
FIG. 116 shows command multiplexor timing at DIU requesters interface

The value of arb_sel[4:0] is used to control the steering multiplexor to select the DIU address of the winning arbitration requestor. The arb_gnt signal is decoded as an acknowledge, diu_<unit>_*ack back to the winning DIU requestor. The timing of these operations is shown in FIG. 116. adr[21:0] is the output of the steering multiplexor controlled by arb_sel[4:0]. The steering multiplexor can acknowledge DIU requestors in successive cycles.

Command Issuing Logic

The address presented by the winning SoPEC requestor from the steering multiplexor is presented to the command issuing logic together with arb_sel[4:0] and dir_sel[1:0].

The command issuing logic translates the winning command into the signals required by the DCU. adr_[21:0], arb_sel[4:0] and dir_sel[1:0] comes from the steering multiplexor.

```
dau_dcu_adr[21:5] = adr[21:5]
dau_dcu_rwn = (dir_sel[1:0] = = read)
dau_dcu_cduwpage = (arb_sel[4:0] = = CDU write)
    dau_dcu_refresh = (dir_sel[1:0] = = refresh)
```

dau_dcu_valid indicates that a valid command is available to the DCU.

For a write command, dau_dcu_valid will not be asserted until there is also valid write data present. This is indicated by the signal write_data_valid[1:0] from the Read Write Data Multiplexor sub-block.

For a write command, the data issued to the DCU on dau_dcu_wdata[255:0] is multiplexed from cpu_wdata[31:0] and wdata[255:0] depending on whether the write is a CPU or non-CPU write.

The write data from the Write Multiplexor for the CDU is available on wdata[63:0]. This data must be issued to the DCU on dau_dcu_wdata[255:0]. wdata[63:0] is copied to each 64-bit word of dau_dcu_wdata[255:0].

```
dau_dcu_wdata[255:0] = 0x00000000
if (arb_sel[4:0]= =CPU write) then
    dau_dcu_wdata[31:0] = cpu_wdata[31:0]
elsif (arb_sel[4:0]= =CDU write)) then
    dau_dcu_wdata[63:0] = wdata[63:0]
    dau_dcu_wdata[127:64] = wdata[63:0]
    dau_dcu_wdata[191:128] = wdata[63:0]
    dau_dcu_wdata[255:192] = wdata[63:0]
else
    dau_dcu_wdata[255:0] = wdata [255:0]
```

CPU Write Masking

The CPU write data bus is only 128 bits wide. cpu_diu_wmask[15:0] indicates how many bytes of that 128 bits should be written. The associated address cpu_diu_wadr[21:4] is a 128-bit aligned address. The actual DRAM write must be a 256-bit access. The command multiplexor issues the 256-bit DRAM address to the DCU on dau_dcu_adr[21:5]. cpu_diu_wadr[4] and cpu_diu_wmask[15:0] are used jointly to construct a byte write mask dau_dcu_wmask[31:0] for this 256-bit write access.

CDU Write Masking

The CPU performs four 64-bit word writes to 4 contiguous 256-bit DRAM addresses with the first address specified by cdu_diu_wadr[21:3]. The write address cdu_diu_wadr[21:5] is 256-bit aligned with bits cdu_diu_wadr[4:3] allowing the 64-bit word to be selected. If these 4 DRAM words lie in the same DRAM row then an efficient access will be obtained.

The command multiplexor logic must issue 4 successive accesses to 256-bit DRAM addresses cdu_diu_wadr[21:5],+1,+2,+3.

dau_dcu_wmask[31:0] indicates which 8 bytes (64-bits) of the 256-bit word are to be written.

dau_dcu_wmask[31:0] is calculated using cdu_diu_wadr[4:3] i.e. bits 8*cdu_diu_wadr[4:3] to 8*(cdu_diu_wadr[4:3]+1)−1 of dau_dcu_wmask[31:0]are asserted.

Arbitrating Non-CPU Writes in Advance

In the case of a non-CPU write commands, the write data must be transferred from the SoPEC requester before the write can occur. Arbitration should occur early to allow for any delay for the write data to be transferred to the DRAM.

Figure 113:
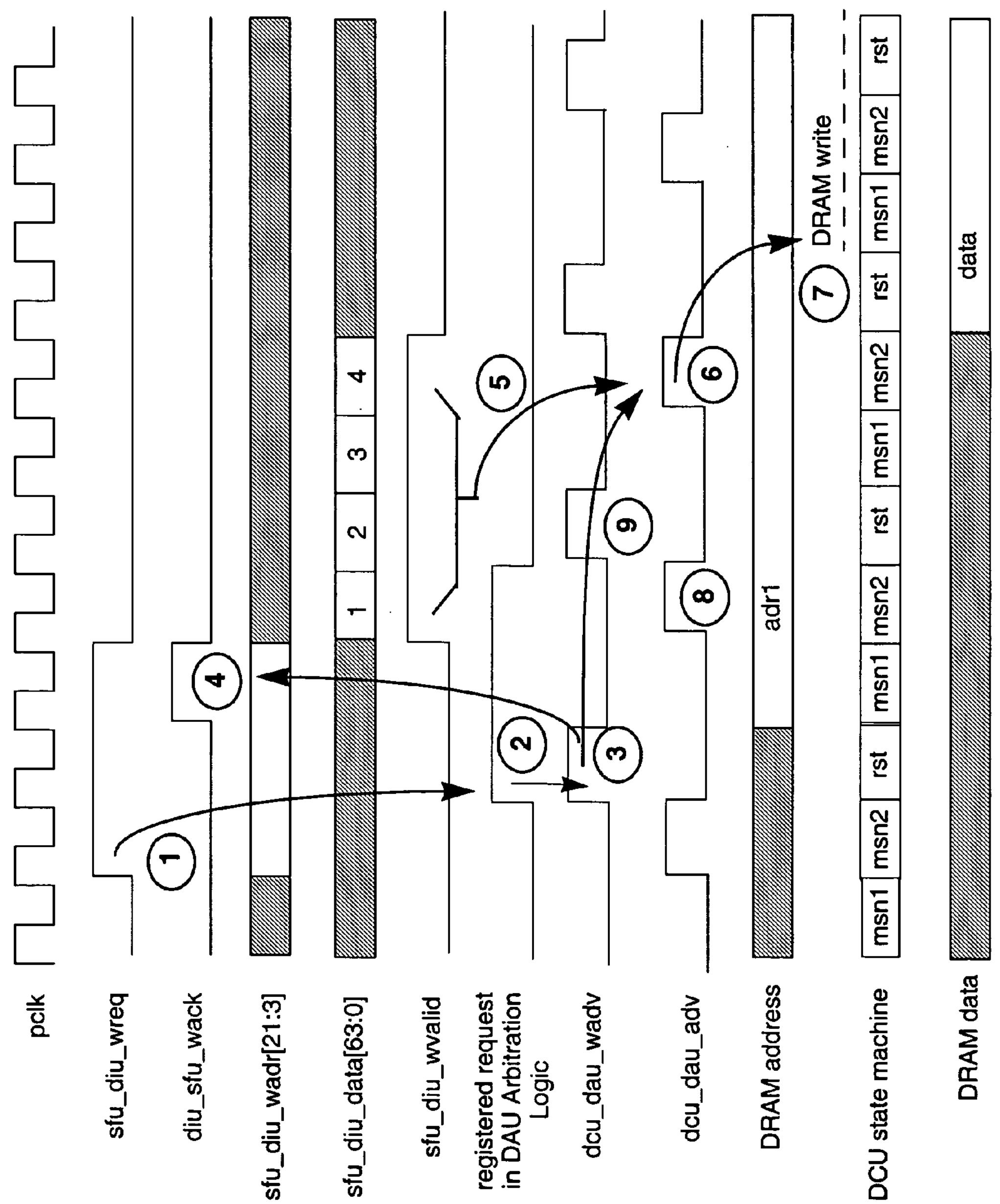
FIG. 113 shows timing of a non-CDU/non-CPU DIU write access

FIG. 113 indicates that write data transfer over 64-bit busses will take a further 4 cycles after the address is transferred. The arbitration must therefore occur 4 cycles in advance of arbitration for read accesses, FIG. 109 and FIG. 110, or for CPU writes FIG. 112. Arbitration of CDU write accesses, FIG. 114, should take place 1 cycle in advance of arbitration for read and CPU write accesses. To simplify implementation CDU write accesses are arbitrated 4 cycles in advance, similar to other non-CPU writes.

Figure 117:
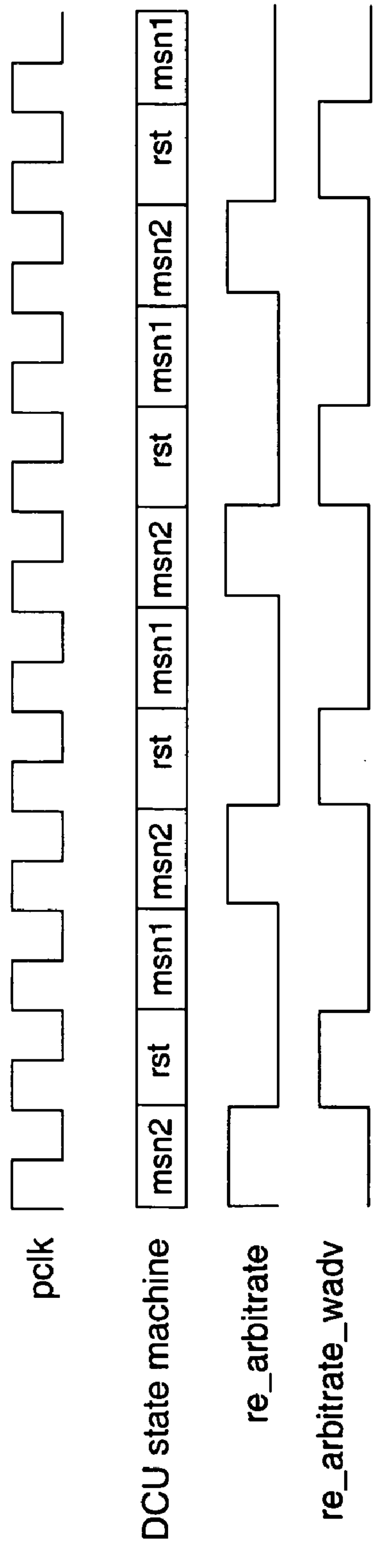
FIG. 117 shows generation of re_arbitrate and re_arbitrate_wadv

The Command Multiplexor generates another version of re_arbitrate called re_arbitrate_wadv based on the signal dcu_dau_wadv from the DCU. In the 3 cycle DRAM access dcu_dau_adv and therefore re_arbitrate are asserted in the MSN2 state of the DCU state-machine. dcu_dau_wadv and therefore re_arbitrate_wadv will therefore be asserted in the following RST state, see FIG. 117. This matches the timing required for non-CPU writes shown in FIG. 113 and FIG. 114.

re_arbitrate_wadv causes the Arbitration Logic to perform an arbitration for non-CPU in advance.

```
re_arbitrate=dcu_dau_adv

re_arbitrate_wadv=dcu_dau_wadv
```

If the winner of this arbitration is a non-CPU write then arb_gnt is asserted and the arbitration winner is output on arb_sel[4:0] and dir_sel[1:0]. Otherwise arb_gnt is not asserted.

Since non-CPU write commands are arbitrated early, the non-CPU command is not issued to the DCU immediately but instead written into an advance command register.

```
if (arb__sel(4:0 = = non-CPU write) then
    advance__cmd__register[3:0] = arb__sel[4:0]
    advance__cmd__register[5:4] = dir__sel[1:0]
    advance__cmd__register[27:6] = adr[21:0]
```

If a DCU command is in progress then the arbitration in advance of a non-CPU write command will overwrite the steering multiplexor input to the command issuing logic. The arbitration in advance happens in the DCU MSN1 state. The new command is available at the steering multiplexor in the MSN2 state. The command in progress will have been latched in the DRAM by MSN falling at the start of the MSN1 state.

Issuing Non-CPU Write Commands

The arb_sel[4:0] and dir_[1:0] values generated by the Arbitration Logic reflect the out of order arbitration sequence.

This out of order arbitration sequence is exported to the Read Write Data Multiplexor sub-block.

This is so that write data in available in time for the actual write operation to DRAM. Otherwise a latency would be introduced every time a write command is selected.

However, the Command Multiplexor must execute the command stream in-order. In-order command execution is achieved by waiting until re_arbitrate has advanced to the non-CPU write timeslot from which re_arbitrate_wadv has previously issued a non-CPU write written to the advance command register.

If re_arbitrate_wadv arbitrates a non-CPU write in advance then within the Arbitration Logic the timeslot is marked to indicate whether a write was issued.

When re_arbitrate advances to a write timeslot in the Arbitration Logic then one of two actions can occur depending on whether the slot was marked by re_arbitrate_wadv to indicate whether a write was issued or not.

Non-CPU write arbitrated by re_arbitrate_wadv

If the timeslot has been marked as having issued a write then the arbitration logic responds to re_arbitrate by issuing arb_sel[4:0], dir_sel[1:0] and asserting arb_gnt as for a normal arbitration but selecting a non-CPU write access. Normally, re_arbitrate does not issue non-CPU write accesses. Non-CPU writes are arbitrated by re_arbitrate_wadv. dir_sel[1:0]==00 indicates a non-CPU write issued by re_arbitrate.

The command multiplexor does not write the command into the advance command register as it has already been placed there earlier by re_arbitrate_wadv. Instead, the already present write command in the advance command register is issued when write_data_valid[1]=1. Note, that the value of arb_sel[4:0] issued by re_arbitrate could specify a different write than that in the advance command register since time has advanced. It is always the command in the advance command register that is issued. The steering multiplexor in this case must not issue an acknowledge back to SoPEC requester indicated by the value of arb_sel[4:0].

```
if (dir__sel[1:0] = = 00) then
    command__issuing__logic[27:0]                    = =
advance__cmd__register[27:0]
  else
    command__issuing__logic[27:0]                    = =
steering__multiplexor[27:0]
  ack = arb__gnt AND NOT (dir__sel[1:0] = = 00)
```

Non-CPU write not arbitrated by re_arbitrate_wadv

If the timeslot has been marked as not having issued a write, the re_arbitrate will use the un-used read timeslot selection to replace the un-used write timeslot with a read timeslot according to Section 20.10.6.2 Unused read timeslots allocation.

The mechanism for write timeslot arbitration selects non-CPU writes in advance. But the selected non-CPU write is stored in the Command Multiplexor and issued when the write data is available.

This means that even if this timeslot is overwritten by the CPU reprogramming the timeslot before the write command is actually issued to the DRAM, the originally arbitrated non-CPU write will always be correctly issued.

Accepting Write Commands

When a write command is issued then write_data_accept[1:0] is asserted. This tells the Write Multiplexor that the current write data has been accepted by the DRAM and the write multiplexor can receive write data from the next arbitration winner if it is a write. write_data_accept[1:0] differentiates between CPU and non-CPU writes. A write command is known to have been issued when re_arbitrate_wadv to decide on the next command is detected.

In the case of CDU writes the DCU will generate a signal dcu_dau_cduwaccept which tells the Command Multiplexor to issue a write_data_accept[1]. This will result in the Write Multiplexor supplying the next CDU write data to the DRAM.

```
    write_data_accept[0] = RISING EDGE(re_arbitrate_wadv)
                              AND
command_issuing_logic(dir_sel[1]= =1)
                              AND
command_issuing_logic(arb_sel[4:0]= =CPU)
    write_data_accept[1] = (RISING EDGE(re_arbitrate_wadv)
                              AND
command_issuing_logic(dir_sel[1]= =1)
                              AND
command_issuing_logic(arb_sel[4:0]= =non_CPU))
                              OR
dcu_dau_cduwaccept= =1
```

Debug logic output to CPU Configuration and Arbitration Logic sub-block write_sel[4:0] reflects the value of arb_sel [4:0] at the command issuing logic. The signal write complete is asserted when every any bit of write_data_accept [1:0] is asserted.

```
    write_complete    =    write_data_accept[0]    OR
write_data_accept[0]
```

write_sel[4:0]and write_complete are CPU readable from the DIUPerformance nad WritePerformance status registers. When write_complete is asserted write_sel[4:0] will indicate which write access the DAU has issued.

20.14.12 CPU Configuration and Arbitration Logic Sub-Block

TABLE 137

CPU Configuration and Arbitration Logic Sub-block IO Definition

| Port name | Pins | I/O | Description |
|---|---|---|---|
| Clocks and Resets | | | |
| Pclk | 1 | In | System Clock |
| prst_n | 1 | In | System reset, synchronous active low |
| CPU Interface data and control signals | | | |
| cpu_adr[10:2] | 9 | In | 9 bits (bits 10:2) are required to decode the configuration register address space. |
| cpu_dataout | 32 | In | Shared write data bus from the CPU for DRAM and configuration data |
| diu_cpu_data | 32 | Out | Configuration, status and debug read data bus to the CPU |
| diu_cpu_debug_valid | 1 | Out | Signal indicating the data on the diu_cpu_data bus is valid debug data. |
| cpu_rwn | 1 | In | Common read/not-write signal from the CPU |
| cpu_acode | 2 | In | CPU access code signals. cpu_acode[0] - Program (0)/ Data (1) access cpu_acode[1] - User (0)/ Supervisor (1) access The DAU will only allow supervisor mode accesses to data space. |
| cpu_diu_sel | 1 | In | Block select from the CPU. When cpu_diu_sel is high both cpu_adr and cpu_dataout are valid |
| diu_cpu_rdy | 1 | Out | Ready signal to the CPU. When diu_cpu_rdy is high it indicates the last cycle of the access. For a write cycle this means cpu_dataout has been registered by the block and for a read cycle this means the data on diu_cpu_data is valid. |
| diu_cpu_berr | 1 | Out | Bus error signal to the CPU indicating an invalid access. |
| DIU Read Interface to SoPEC Units | | | |
| <unit>_diu_rreq | 11 | In | SoPEC unit requests DRAM read. |
| DIU Write Interface to SoPEC Units | | | |
| diu_cpu_write_rdy | 1 | In | Indicator that CPU posted write buffer is empty. |
| <unit>_diu_wreq | 4 | In | Non- CPU SoPEC unit requests DRAM write. |
| Inputs from Command Multiplexor sub-block | | | |
| re_arbitrate | 1 | In | Signal telling the arbitration logic to choose the next arbitration winner. |
| re_arbitrate_wadv | 1 | In | Signal telling the arbitration logic to choose the next arbitration winner for non-CPU writes 2 timeslots in advance |
| Outputs to DCU | | | |
| dau_dcu_msn2stall | 1 | Out | Signal indicating from DAU Arbitration Logic which when asserted stalls DCU in MSN2 state. |
| Inputs from Read and Write Multiplexor sub-block | | | |
| read_cmd_rdy | 2 | In | Signal indicating that read multiplexor is ready for next read read command. 00 = not ready 01 = ready for CPU read 10 = ready for non-CPU read 11 = ready for both CPU and non-CPU reads |
| write_cmd_rdy | 2 | In | Signal indicating that write multiplexor is ready for next write command. 00 = not ready 01 = ready for CPU write 10 = ready for non-CPU write 11 = ready for both CPU and non-CPU write |
| Outputs to other DAU sub-blocks | | | |
| arb_gnt | 1 | In | Signal lasting 1 cycle which indicates arbitration has occurred and arb_sel is valid. |
| arb_sel | 5 | In | Signal indicating which requesting SoPEC Unit has won arbitration. Encoding is described in Table. |
| dir_sel | 2 | In | Signal indicating which sense of access associated with arb_sel 00: issue non-CPU write 01: read winner 10: write winner 11: refresh winner |
| Debug Inputs from Read-Write Multiplexor sub-block | | | |
| read_sel | 5 | In | Signal indicating the SoPEC Unit for which the current read transaction is occurring. Encoding is described in Table. |
| read_complete | 1 | In | Signal indicating that read transaction to SoPEC Unit indicated by read_sel is complete. |

TABLE 137-continued

CPU Configuration and Arbitration Logic Sub-block IO Definition

| Port name | Pins | I/O | Description |
|---|---|---|---|
| Debug Inputs from Command Multiplexor sub-block | | | |
| write_sel | 5 | In | Signal indicating the SoPEC Unit for which the current write transaction is occurring. Encoding is described in Table. |
| write_complete | 1 | In | Signal indicating that write transaction to SoPEC Unit indicated by write_sel is complete. |
| Debug Inputs from DCU | | | |
| dcu_dau_refreshcomplete | 1 | In | Signal indicating that the DCU has completed a refresh. |

TABLE 137-continued

CPU Configuration and Arbitration Logic Sub-block IO Definition

| Port name | Pins | I/O | Description |
|---|---|---|---|
| Debug Inputs from DAU IO | | | |
| various | n | In | Various DAU IO signals which can be monitored in debug mode |

Figure 118:
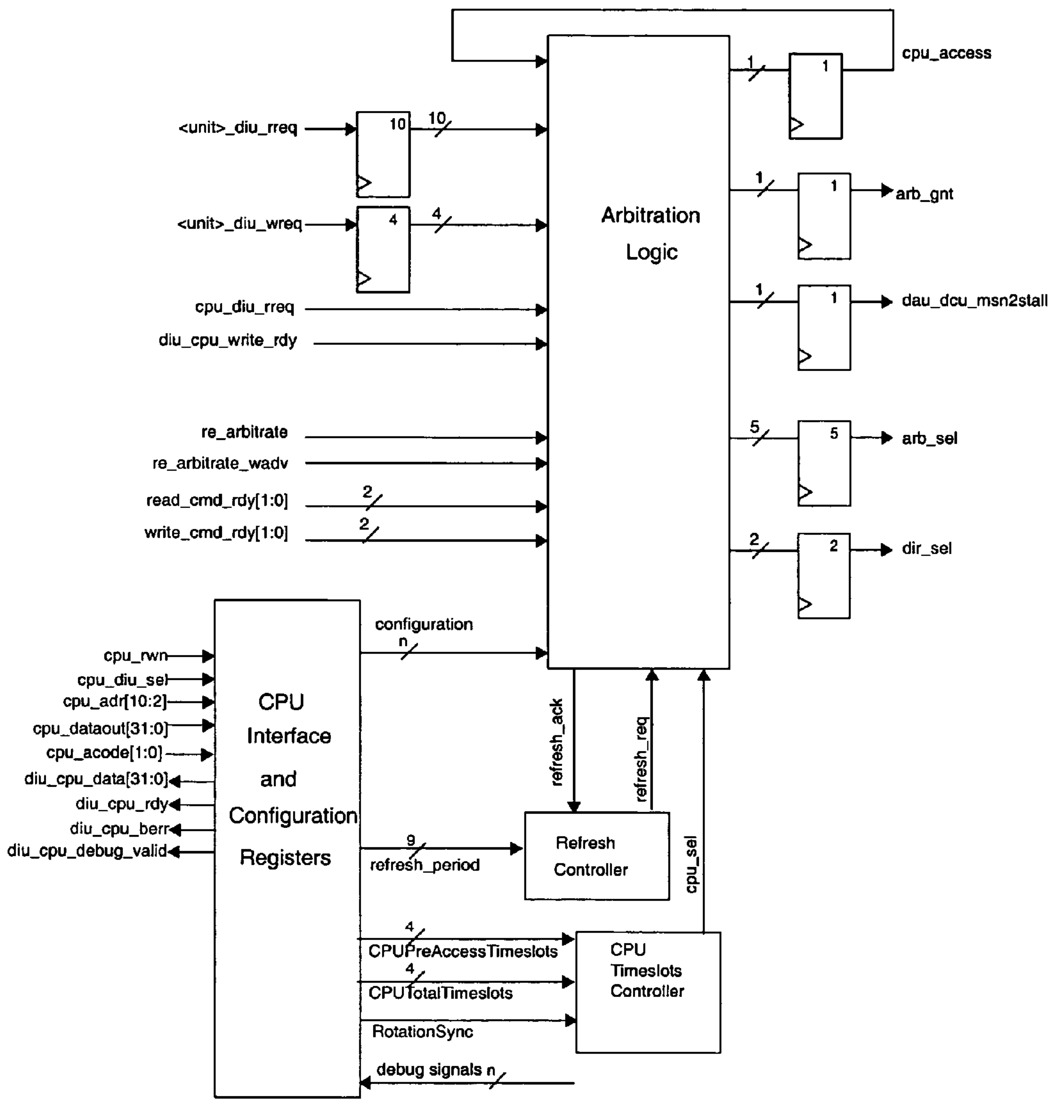
FIG. 118 shows CPU interface and arbitration logic

The CPU Interface and Arbitration Logic sub-block is shown in FIG. 118.

20.14.12.1 CPU Interface and Configuration Registers Description

The CPU Interface and Configuration Registers sub-block provides for the CPU to access DAU specific registers by reading or writing to the DAU address space.

The CPU subsystem bus interface is described in more detail in Section 11.4.3. The DAU block will only allow supervisor mode accesses to data space (i.e. cpu_acode[1:0]=b11). All other accesses will result in diu_cpu_berr being asserted.

The configuration registers described in Section 20.14.9

TABLE 130

DAU configuration registers

| Address (DIU_base +) | Register | # bits | Reset | Description |
|---|---|---|---|---|
| Reset | | | | |
| 0x00 | Reset | 1 | 0x1 | A write to this register causes a reset of the DIU. This register can be read to indicate the reset state:<br>0 - reset in progress<br>1 - reset not in progress |
| Refresh | | | | |
| 0x04 | RefreshPeriod | 9 | 0x063 | Refresh controller. When set to 0 refresh is off, otherwise the value indicates the number of cycles, less one, between each refresh. [Note that for a system clock frequency of 160 MHz, a value exceeding 0x63 (indicating a 100-cycle refresh period) should not be programmed, or the DRAM will malfunction.] |
| Timeslot allocation and control | | | | |
| 0x08 | NumMainTimeslots | 6 | 0x01 | Number of main timeslots (1–64) less one |
| 0x0C | CPUPreAccessTimeslots | 4 | 0x0 | (CPUPreAccessTimeslots + 1) main slots out of a total of (CPUTotalTimeslots + 1) are preceded by a CPU access. |
| 0x10 | CPUTotalTimeslots | 4 | 0x0 | (CPUPreAccessTimeslots + 1) main slots out of a total of (CPUTotalTimeslots + 1) are preceded by a CPU access. |
| 0x100–0x1FC | MainTimeslot[63:0] | 64 × 4 | [63:1][3:0] = 0x0<br>[0][3:0] = 0xE | Programmable main timeslots (up to 64 main timeslots). |
| 0x200 | ReadRoundRobinLevel | 12 | 0x000 | For each read requester plus refresh<br>0 = level1 of round-robin<br>1 = level2 of round-robin<br>The bit order is defined in Table. |

TABLE 130-continued

DAU configuration registers

| Address (DIU_base +) | Register | # bits | Reset | Description |
|---|---|---|---|---|
| 0x204 | EnableCPURoundRobin | 1 | 0x1 | Allows the CPU to particpate in the unused read round-robin scheme. If disabled, the shared CPU/refresh round-robin position is dedicated solely to refresh. |
| 0x208 | RotationSync | 1 | 0x1 | Writing 0, followed by 1 to this bit allows the timeslot rotation to advance on a cycle basis which can be determined by the CPU. |
| 0x20C | minNonCPUReadAdr | 12 | 0x800 | 12 MSBs of lowest DRAM address which may be read by non-CPU requesters. |
| 0x210 | minDWUWriteAdr | 12 | 0x800 | 12 MSBs of lowest DRAM address which may be written to by the DWU. |
| 0x214 | minNonCPUWriteAdr | 12 | 0x800 | 12 MSBs of lowest DRAM address which may be written to by non-CPU requesters other than the DWU. |
| Debug | | | | |
| 0x300 | DebugSelect[11:2] | 10 | 0x304 | Debug address select. Indicates the address of the register to report on the diu_cpu_data bus when it is not otherwise being used. When this signal carries debug information the signal diu_cpu_debug_valid will be asserted. |
| Debug: arbitration and performance | | | | |
| 0x304 | ArbitrationHistory | 22 | — | Bit 0 = arb_gnt<br>Bit 1 = arb_executed<br>Bit 6:2 = arb_sel[4:0]<br>Bit 12:7 = timeslot_number[5:0]<br>Bit 15:13 = access_type[2:0]<br>Bit 16 = back2back_non_cpu_write<br>Bit 17 = sticky_back2back_non_cpu_write (Sticky version of same, cleared on reset.)<br>Bit 18 = rotation_sync<br>Bit 20:19 = rotation_state<br>Bit 21 = sticky_invalid_non_cpu_adr<br>See Section 20.14.9.2 DIU Debug for a description of the fields.<br>Read only register. |
| 0x308 | DIUPerformance | 31 | — | Bit 0 = cpu_diu_rreq<br>Bit 1 = scb_diu_rreq<br>Bit 2 = cdu_diu_rreq<br>Bit 3 = cfu_diu_rreq<br>Bit 4 = lbd_diu_rreq<br>Bit 5 = sfu_diu_rreq<br>Bit 6 = td_diu_rreq<br>Bit 7 = tfs_diu_rreq<br>Bit 8 = hcu_diu_rreq<br>Bit 9 = dnc_diu_rreq<br>Bit 10 = llu_diu_rreq<br>Bit 11 = pcu_diu_rreq<br>Bit 12 = cpu_diu_wreq<br>Bit 13 = scb_diu_wreq<br>Bit 14 = cdu_diu_wreq<br>Bit 15 = sfu_diu_wreq<br>Bit 16 = dwu_diu_wreq<br>Bit 17 = refresh_req<br>Bit 22:18 = read_sel[4:0]<br>Bit 23 = read_complete<br>Bit 28:24 = write_sel[4:0]<br>Bit 29 = write_complete<br>Bit 30 = dcu_dau_refreshcomplete<br>See Section 20.14.9.2 DIU Debug for a description of the fields.<br>Read only register. |

TABLE 130-continued

DAU configuration registers

| Address (DIU_base +) | Register | # bits | Reset | Description |
|---|---|---|---|---|
| Debug DIU read requesters interface signals | | | | |
| 0x30C | CPUReadInterface | 25 | — | Bit 0 = cpu_diu_rreq<br>Bit 22:1 = cpu_adr[21:0]<br>Bit 23 = diu_cpu_rack<br>Bit 24 = diu_cpu_rvalid<br>Read only register. |
| 0x310 | SCBReadInterface | 20 | | Bit 0 = scb_diu_rreq<br>Bit 17:1 = scb_diu_radr[21:5]<br>Bit 18 = diu_scb_rack<br>Bit 19 = diu_scb_rvalid<br>Read only register. |
| 0x314 | CDUReadInterface | 20 | — | Bit 0 = cdu_diu_rreq<br>Bit 17:1 = cdu_diu_radr[21:5]<br>Bit 18 = diu_cdu_rack<br>Bit 19 = diu_cdu_rvalid<br>Read only register. |
| 0x318 | CFUReadInterface | 20 | — | Bit 0 = cfu_diu_rreq<br>Bit 17:1 = cfu_diu_radr[21:5]<br>Bit 18 = diu_cfu_rack<br>Bit 19 = diu_cfu_rvalid<br>Read only register. |
| 0x31C | LBDReadInterface | 20 | — | Bit 0 = lbd_diu_rreq<br>Bit 17:1 = lbd_diu_radr[21:5]<br>Bit 18 = diu_lbd_rack<br>Bit 19 = diu_lbd_rvalid<br>Read only register. |
| 0x320 | SFUReadInterface | 20 | — | Bit 0 = sfu_diu_rreq<br>Bit 17:1 = sfu_diu_radr[21:5]<br>Bit 18 = diu_sfu_rack<br>Bit 19 = diu_sfu_rvalid<br>Read only register. |
| 0x324 | TDReadInterface | 20 | — | Bit 0 = td_diu_rreq<br>Bit 17:1 = td_diu_radr[21:5]<br>Bit 18 = diu_td_rack<br>Bit 19 = diu_td_rvalid<br>Read only register. |
| 0x328 | TFSReadInterface | 20 | — | Bit 0 = tfs_diu_rreq<br>Bit 17:1 = tfs_diu_radr[21:5]<br>Bit 18 = diu_tfs_rack<br>Bit 19 = diu_tfs_rvalid<br>Read only register. |
| 0x32C | HCUReadInterface | 20 | — | Bit 0 = hcu_diu_rreq<br>Bit 17:1 = hcu_diu_radr[21:5]<br>Bit 18 = diu_hcu_rack<br>Bit 19 = diu_hcu_rvalid<br>Read only register. |
| 0x330 | DNCReadInterface | 20 | — | Bit 0 = dnc_diu_rreq<br>Bit 17:1 = dnc_diu_radr[21:5]<br>Bit 18 = diu_dnc_rack<br>Bit 19 = diu_dnc_rvalid<br>Read only register. |
| 0x334 | LLUReadInterface | 20 | — | Bit 0 = llu_diu_rreq<br>Bit 17:1 = lluu_diu_radr[21:5]<br>Bit 18 = diu_llu_rack<br>Bit 19 = diu_llu_rvalid<br>Read only register. |
| 0x338 | PCUReadInterface | 20 | — | Bit 0 = pcu_diu_rreq<br>Bit 17:1 = pcu_diu_radr[21:5]<br>Bit 18 = diu_pcu_rack<br>Bit 19 = diu_pcu_rvalid<br>Read only register. |
| Debug DIU write requesters interface signals | | | | |
| 0x33C | CPUWriteInterface | 27 | — | Bit 0 = cpu_diu_wreq<br>Bit 22:1 = cpu_adr[21:0]<br>Bit 24:23 = cpu_diu_wmask[1:0]<br>Bit 25 = diu_cpu_wack<br>Bit 26 = cpu_diu_wvalid<br>Read only register. |
| 0x340 | SCBWriteInterface | 20 | — | Bit 0 = scb_diu_wreq<br>Bit 17:1 = scb_diu_wadr[21:5]<br>Bit 18 = diu_scb_wack |

TABLE 130-continued

DAU configuration registers

| Address (DIU_base +) | Register | # bits | Reset | Description |
|---|---|---|---|---|
| | | | | Bit 19 = scb_diu_wvalid<br>Read only register. |
| 0x344 | CDUWriteInterface | 22 | — | Bit 0 = cdu_diu_wreq<br>Bit 19:1 = cdu_diu_wadr[21:3]<br>Bit 20 = diu_cdu_wack<br>Bit 21 = cdu_diu_wvalid<br>Read only register. |
| 0x348 | SFUWriteInterface | 20 | — | Bit 0 = sfu_diu_wreq<br>Bit 17:1 = sfu_diu_wadr[21:5]<br>Bit 18 = diu_sfu_wack<br>Bit 19 = sfu_diu_wvalid<br>Read only register. |
| 0x34C | DWUWriteInterface | 20 | — | Bit 0 = dwu_diu_wreq<br>Bit 17:1 = dwu_diu_wadr[21:5]<br>Bit 18 = diu_dwu_wack<br>Bit 19 = dwu_diu_wvalid<br>Read only register. |
| Debug DAU-DCU interface signals | | | | |
| 0x350 | DAU-DCUInterface | 25 | — | Bit 16:0 = dau_dcu_adr[21:5]<br>Bit 17 = dau_dcu_rwn<br>Bit 18 = dau_dcu_cduwpage<br>Bit 19 = dau_dcu_refresh<br>Bit 20 = dau_dcu_msn2stall<br>Bit 21 = dcu_dau_adv<br>Bit 22 = dcu_dau_wadv<br>Bit 23 = dcu_dau_refreshcomplete<br>Bit 24 = dcu_dau_rvalid<br>Read only register. |

are implemented here.

20.14.12.2 Arbitration Logic Description

Figure 119:
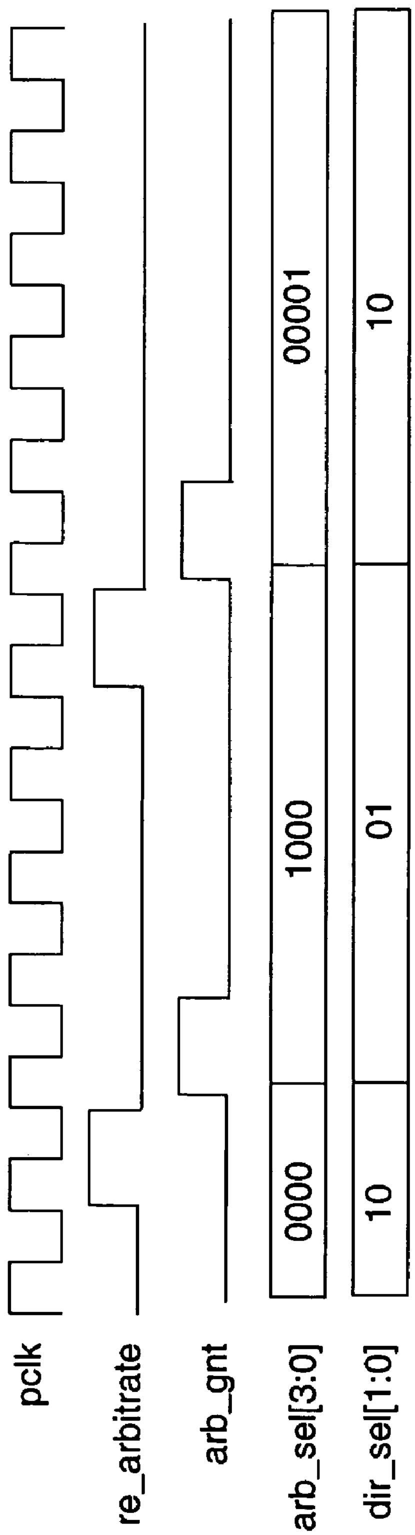
FIG. 119 shows arbitration timing
Figure 120:
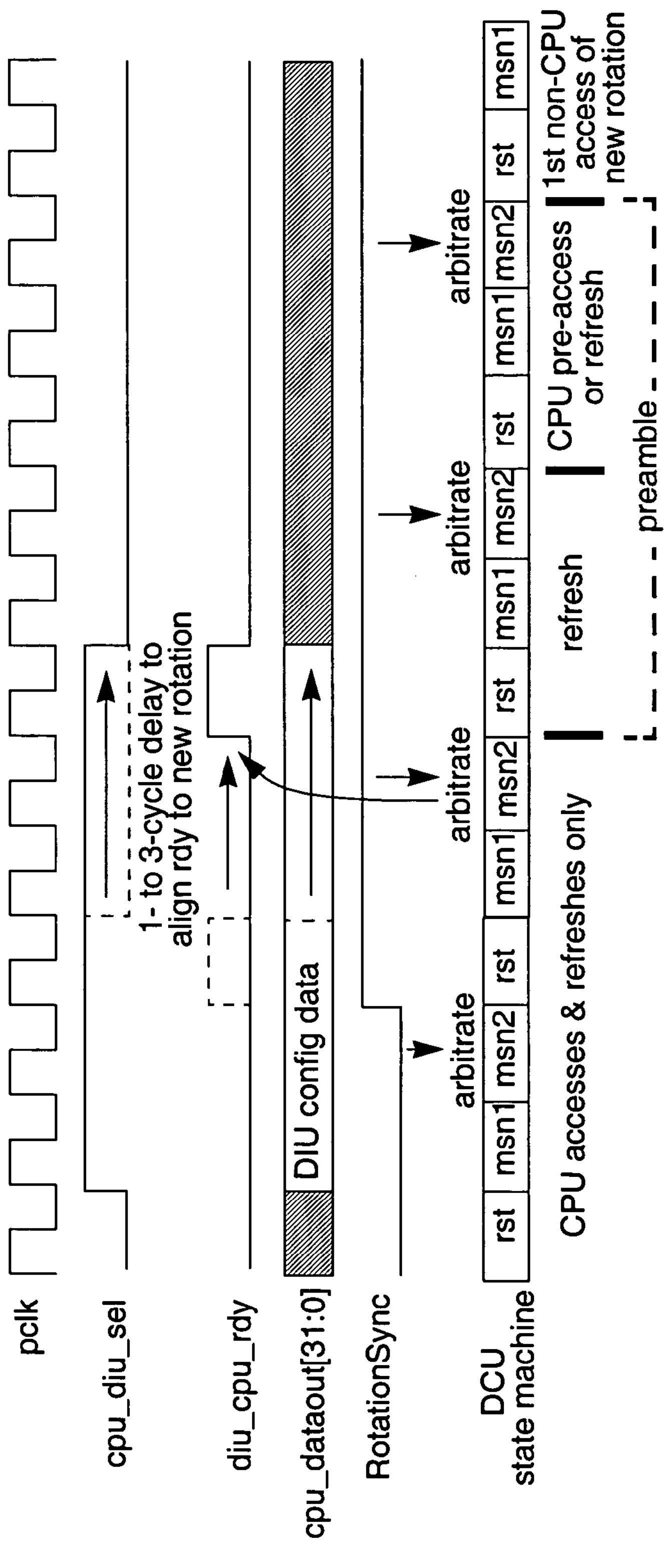
FIG. 120 shows setting RotationSync to enable a new rotation.

Arbitration is triggered by the signal re_arbitrate from the Command Multiplexor sub-block with the signal arb_gnt indicating that arbitration has occurred and the arbitration winner is indicated by arb_sel[4:0]. The encoding of arb_sel [4:0] is shown in Table. The signal dir_sel[1:0] indicates if the arbitration winner is a read, write or refresh. Arbitration should complete within one clock cycle so arb_gnt is normally asserted the clock cycle after re_arbitrate and stays high for 1 clock cycle. arb_sel[4:0] and dir_sel[1:0] remain persistent until arbitration occurs again. The arbitration timing is shown in FIG. 119.

20.14.12.2.1 Rotation Synchronisation

A configuration bit, RotationSync, is used to initialise advancement through the timeslot rotation, in order that the CPU will know, on a cycle basis, which timeslot is being arbitrated. This is essential for debug purposes, so that exact arbitration sequences can be reproduced.

In general, if RotationSync is set, slots continue to be arbitrated in the regular order specified by the timeslot rotation. When the bit is cleared, the current rotation continues until the slot pointers for pre- and main arbitration reach zero. The arbitration logic then grants DRAM access exclusively to the CPU and refreshes.

Figure 105:
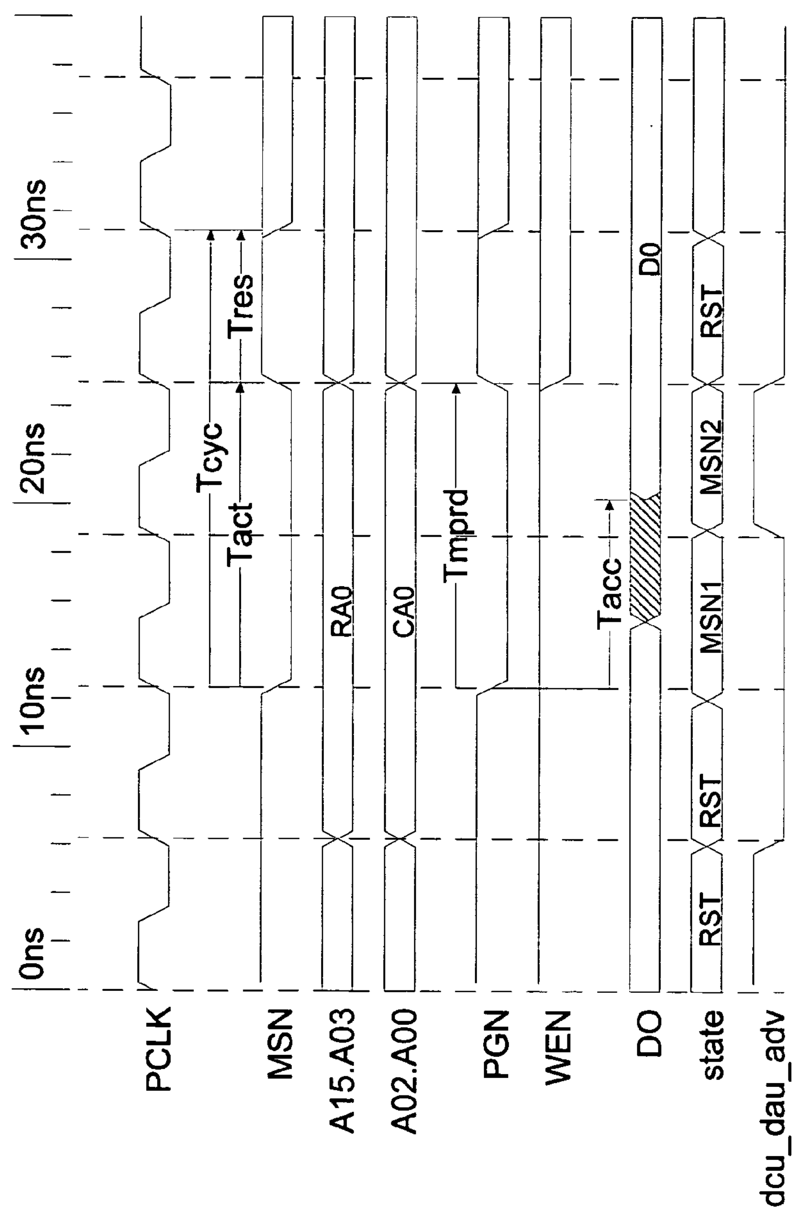
FIG. 105 shows random read timing
Figure 106:
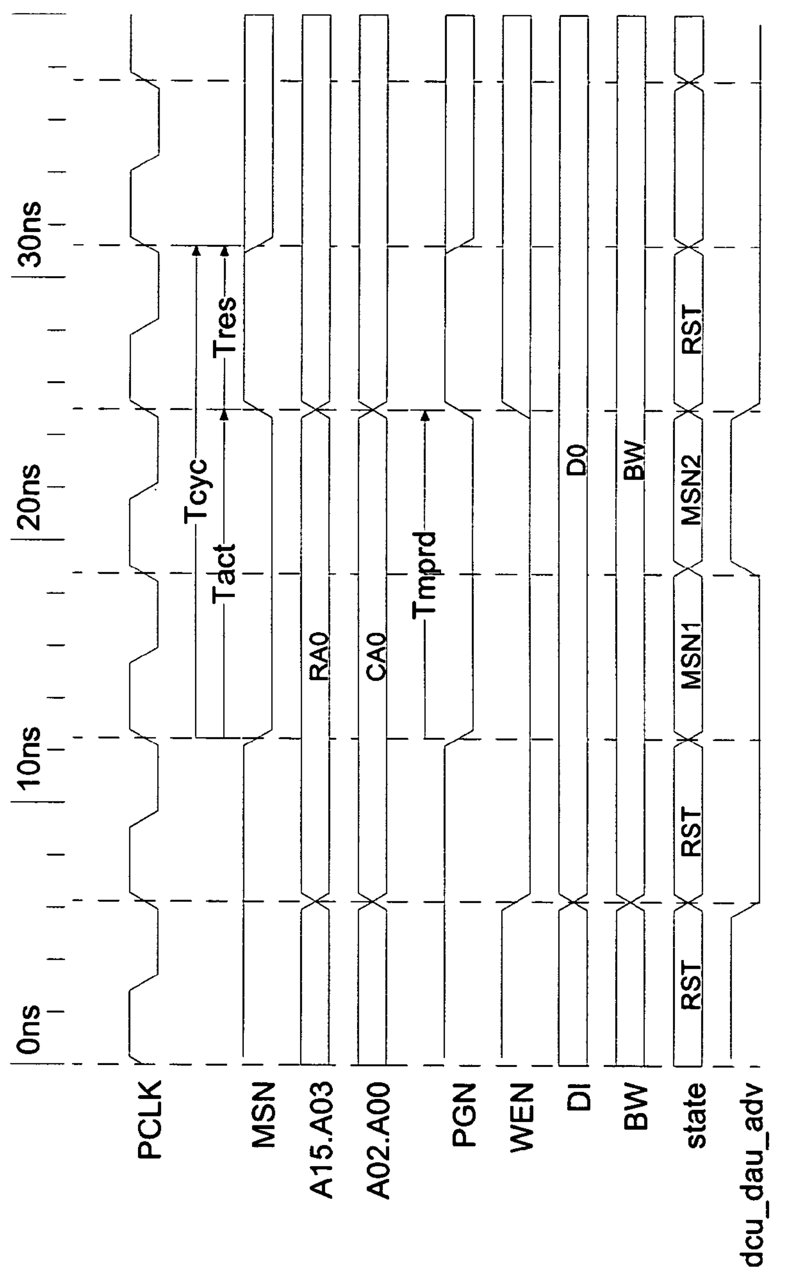
FIG. 106 shows random write timing
Figure 107:
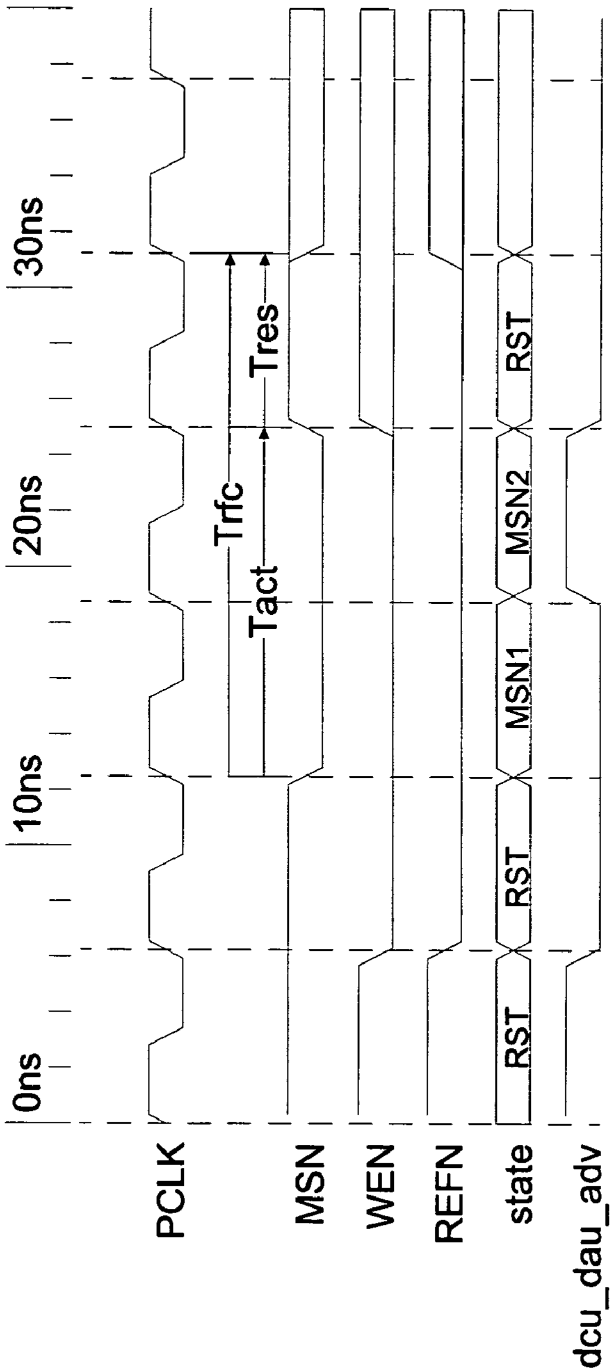
FIG. 107 shows refresh timing
Figure 108:
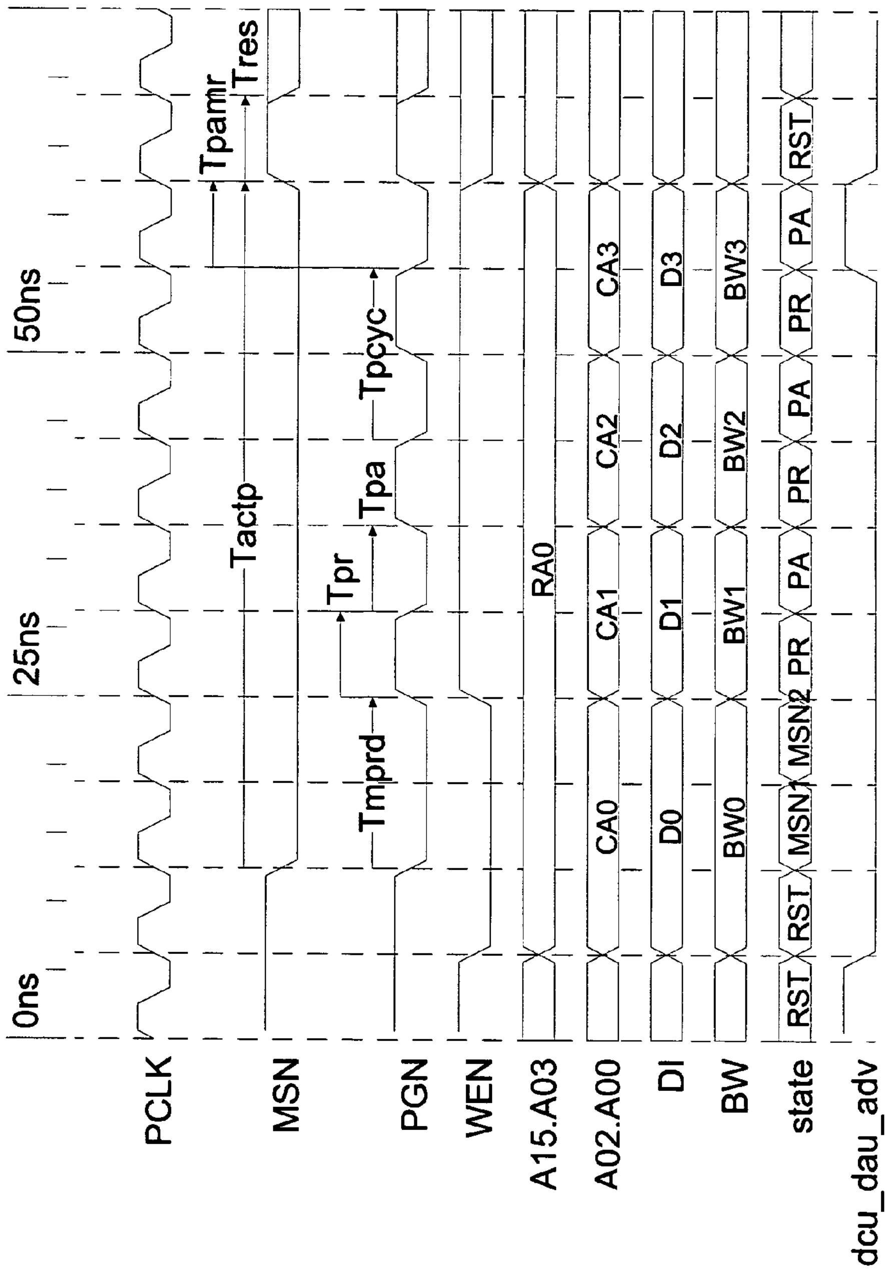
FIG. 108 shows page mode write timing

When the CPU again writes to RotationSync to cause a 0-to-1 transition of the bit, the rdy acknowledgment back to the CPU for this write will be exactly coincident with the RST cycle of the initial refresh which heralds the enabling of a new rotation. This refresh, along with the second access which can be either a CPU pre-access or a refresh, (depending on the CPU's request inputs), form a 2-access "preamble" before the first non-CPU requester in the new rotation can be serviced. This preamble is necessary to give the write pre-arbitration the necessary head start on the main arbitration, so that write data can be loaded in time. See FIG. 105 below. The same preamble procedure is followed when emerging from reset.

The alignment of rdy with the commencement of the rotation ensures that the CPU is always able to calculate at any point how far a rotation has progressed. RotationSync has a reset value of 1 to ensure that the default power-up rotation can take place.

Note that any CPU writes to the DIU's other configuration registers should only be made when RotationSync is cleared. This ensures that accesses by non-CPU requesters to DRAM are not affected by partial configuration updates which have yet to be completed.

20.14.12.2.2 Motivation for Rotation Synchronisation

The motivation for this feature is that communications with SoPEC from external sources are synchronised to the internal clock of our position within a DIU full timeslot rotation. This means that if an external source told SoPEC to start a print 3 separate times, it would likely be at three different points within a full DIU rotation. This difference means that the DIU arbitration for each of the runs would be different, which would manifest itself externally as anomalous or inconsistent print performance. The lack of reproducibility is the problem here.

However, if in response to the external source saying to start the print, we caused the internal to pass through a known state at a fixed time offset to other internal actions, this would result in reproducible prints. So, the plan is that the software would do a rotation synchronise action, then writes "Go" into various PEP units to cause the prints. This means the DIU state will be the identical with respect to the PEP units state between separate runs.

20.14.12.2.3 Wind-Down Protocol when Rotation Synchronisation is Initiated

When a zero is written to "RotationSync", this initiates a "wind-down protocol" in the DIU, in which any rotation already begun must be fully completed. The protocol implements the following sequence:—

The pre-arbitration logic must reach the end of whatever rotation it is on and stop pre-arbitrating.

Only when this has happened, does the main arbitration consider doing likewise with its current rotation. Note that the main arbitration lags the pre-arbitration by at least 2 DRAM accesses, subject to variation by CPU pre-accesses and/or scheduled refreshes, so that the two arbitration processes are sometimes on different rotations.

Once the main arbitration has reached the end of its rotation, rotation synchronisation is considered to be fully activated. Arbitration then proceeds as outlined in the next section.

20.14.12.2.4 Arbitration During Rotation Synchronisation

Note that when RotationSync is '0' and, assuming the terminating rotation has completely drained out, then DRAM arbitration is granted according to the following fixed priority order:—Scheduled Refresh->CPU(W)->CPU(R)->Default Refresh.

CPU pre-access counters play no part in arbitration during this period. It is only subsequently, when emerging from rotation sync, that they are reloaded with the values of CPUPreAccessTimeslots and CPUTotalTimeslots and normal service resumes.

20.14.12.2.5 Timeslot-Based Arbitration

Figure 95:
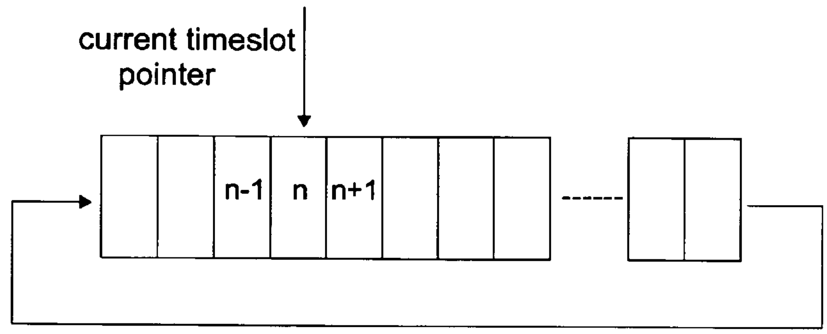
FIG. 95 shows timeslot-based arbitration
Figure 100:
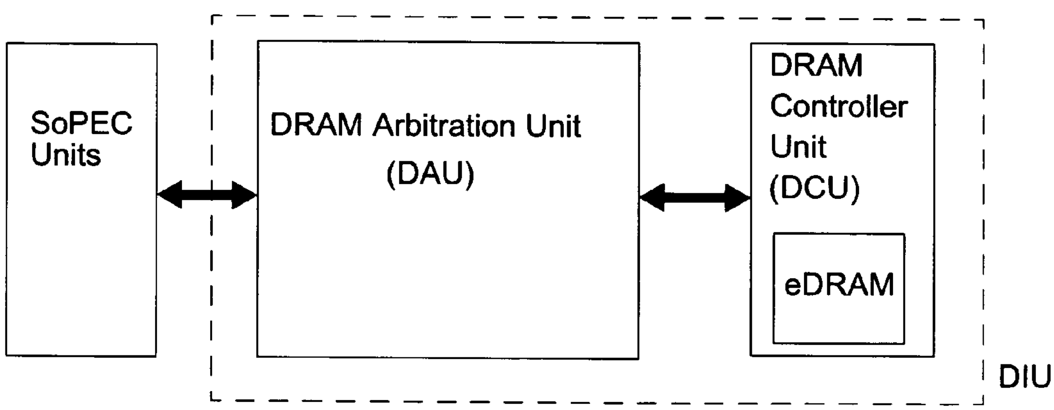
FIG. 100 shows a DIU partition
Figure 121:
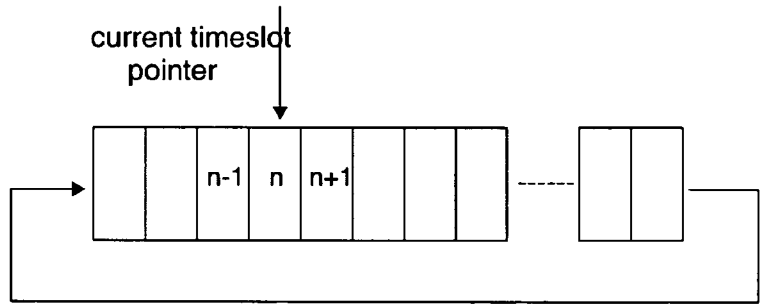
FIG. 121 shows a timeslot based arbitration
Figure 122:
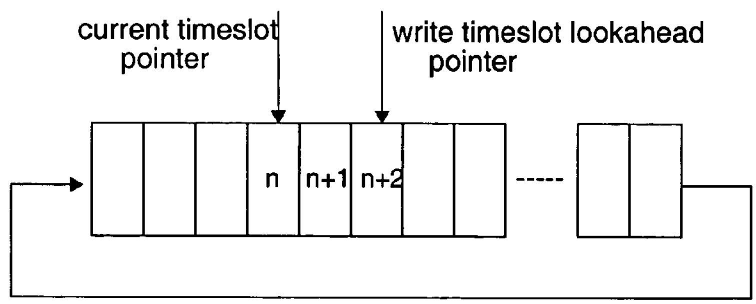
FIG. 122 shows a timeslot based arbitration with separate pointers
Figure 123:
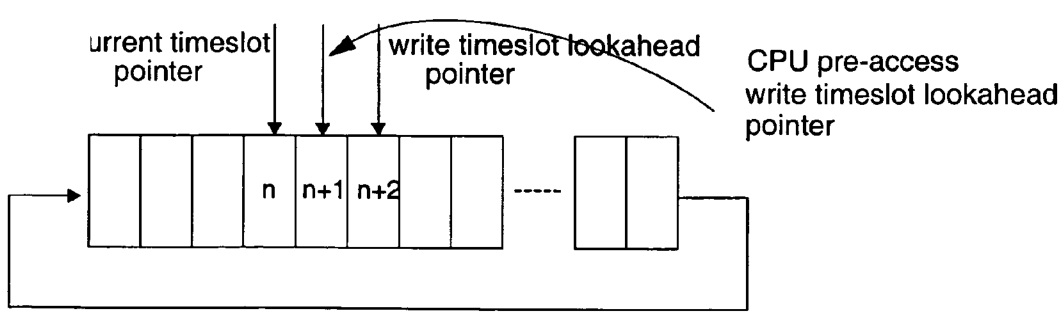
FIG. 123 shows a CPU pre-access write lookahead pointer

Timeslot-based arbitration works by having a pointer point to the current timeslot. This is shown in FIG. 95 repeated here as FIG. 121. When re-arbitration is signaled the arbitration winner is the current timeslot and the pointer advances to the next timeslot. Each timeslot denotes a single access. The duration of the timeslot depends on the access.

If the SoPEC Unit assigned to the current timeslot is not requesting then the unused timeslot arbitration mechanism outlined in Section 20.10.6 is used to select the arbitration winner. Note that this unused slot re-allocation is guaranteed to produce a result, because of the inclusion of refresh in the round-robin scheme.

Pseudo-code to represent arbitration is given below:

```
if re_arbitrate = = 1 then
        arb_gnt = 1
    if current timeslot requesting then
            choose(arb_sel, dir_sel) at current timeslot
    else // un-used timeslot scheme
            choose winner according to un-used timeslot allocation of Section 20.10.6
        arb_gnt = 0
```

20.14.12.3 Arbitrating Non-CPU Writes in Advance

In the case of a non-CPU write commands, the write data must be transferred from the SoPEC requester before the write can occur. Arbitration should occur early to allow for any delay for the write data to be transferred to the DRAM.

FIG. 113 indicates that write data transfer over 64-bit busses will take a further 4 cycles after the address is transferred. The arbitration must therefore occur 4 cycles in advance of arbitration for read accesses, FIG. 109 and FIG. 110, or for CPU writes FIG. 112. Arbitration of CDU write accesses, FIG. 114, should take place 1 cycle in advance of arbitration for read and CPU write accesses. To simplify implementation CDU write accesses are arbitrated 4 cycles in advance, similar to other non-CPU writes.

The Command Multiplexor generates a second arbitration signal re_arbitrate_wadv which initiates the arbitration in advance of non-CPU write accesses.

The timeslot scheme is then modified to have 2 separate pointers:

re_arbitrate can arbitrate read, refresh and CPU read and write accesses according to the position of the current timeslot pointer.

re_arbitrate_wadv can arbitrate only non-CPU write accesses according to the position of the write lookahead pointer.

Pseudo-code to represent arbitration is given below:

```
//re_arbitrate
if (re arbitrate = = 1) AND (current timeslot pointer!= non-CPU write) then
    arb_gnt = 1
    if current timeslot requesting then
            choose(arb_sel, dir_sel) at current timeslot
    else // un-used read timeslot scheme
        choose winner according to un-used read timeslot allocation of Section 20.10.6.2
```

If the SoPEC Unit assigned to the current timeslot is not requesting then the unused read timeslot arbitration mechanism outlined in Section 20.10.6.2 is used to select the arbitration winner.

```
//re_arbitrate_wadv
if (re_arbitrate_wadv = = 1) AND (write lookahead timeslot pointer = = non-CPU write) then
    if write lookahead timeslot requesting then
            choose(arb_sel, dir_sel) at write lookahead timeslot
        arb_gnt = 1
    elsif un-used write timeslot scheme has a requestor
        choose winner according to un-used write timeslot allocation of Section 20.10.6.1
        arb_gnt = 1
    else
        //no arbitration winner
        arb_gnt = 0
```

re_arbitrate is generated in the MSN2 state of the DCU state-machine, whereas re_arbitrate_wadv is generated in the RST state. See FIG. 103.

The write lookahead pointer points two timeslots in advance of the current timeslot pointer.

Therefore re_arbitrate_wadv causes the Arbitration Logic to perform an arbitration for non-CPU two timeslots in advance. As noted in Table, each timeslot lasts at least 3 cycles. Therefor re_arbitrate_wadv arbitrates at least 4 cycles in advance.

At initialisation, the write lookahead pointer points to the first timeslot. The current timeslot pointer is invalid until the write lookahead pointer advances to the third timeslot when the current timeslot pointer will point to the first timeslot. Then both pointers advance in tandem.

Some accesses can be preceded by a CPU access as in Table. These CPU accesses are not allocated timeslots. If this is the case the timeslot will last 3 (CPU access)+3 (non-CPU access)=6 cycles. In that case, a second write lookahead pointer, the CPU pre-access write lookahead pointer, is selected which points only one timeslot in advance. re_arbitrate_wadv will still arbitrate 4 cycles in advance.

20.14.12.3.1 Issuing Non-CPU Write Commands

Although the Arbitration Logic will arbitrate non-CPU writes in advance, the Command Multiplexor must issue all accesses in the timeslot order. This is achieved as follows:

If re_arbitrate_wadv arbitrates a non-CPU write in advance then within the Arbitration Logic the timeslot is marked to indicate whether a write was issued.

```
//re__arbitrate__wadv
if (re__arbitrate__wadv = = 1) AND (write lookahead timeslot
pointer = = non-CPU write) then
    if write lookahead timeslot requesting then
            choose(arb__sel, dir__sel) at write lookahead timeslot
        arb__gnt = 1
        MARK__timeslot = 1
    elsif un-used write timeslot scheme has a requestor
        choose winner according to un-used write timeslot
allocation of Section 20.10.6.1
        arb__gnt = 1
        MARK__timeslot = 1
    else
        //no pre-arbitration winner
        arb__gnt = 0
        MARK__timeslot = 0
```

When re_arbitrate advances to a write timeslot in the Arbitration Logic then one of two actions can occur depending on whether the slot was marked by re_arbitrate_wadv to indicate whether a write was issued or not.

Non-CPU write arbitrated by re_arbitrate_wadv

If the timeslot has been marked as having issued a write then the arbitration logic responds to re_arbitrate by issuing arb_sel[4:0], dir_sel[1:0] and asserting arb gnt as for a normal arbitration but selecting a non-CPU write access. Normally, re_arbitrate does not issue non-CPU write accesses. Non-CPU writes are arbitrated by re_arbitrate_wadv. dir_sel[1:0]==00 indicates a non-CPU write issued by re_arbitrate.

Non-CPU write not arbitrated by re_arbitrate_wadv

If the timeslot has been marked as not having issued a write, the re_arbitrate will use the un-used read timeslot selection to replace the un-used write timeslot with a read timeslot according to Section 20.10.6.2 Unused read timeslots allocation.

```
//re__arbitrate except for non-CPU writes
if (re__arbitrate = = 1) AND (current timeslot pointer!= non-
CPU write) then
    arb__gnt = 1
    if current timeslot requesting then
            choose(arb__sel, dir__sel) at current timeslot
    else // un-used read timeslot scheme
        choose winner according to un-used read timeslot
allocation of Section 20.10.6.2
        arb__gnt = 1
//non-CPU write MARKED as issued
elsif (re arbitrate = = 1) AND (current timeslot pointer = =
non-CPU write) AND
            (MARK__timeslot = = 1) then
            //indicate to Command Multiplexor that non-CPU write
has been arbitrated in
            //advance
            arb__gnt = 1
            dir__sel[1:0] = = 00
//non-CPU write not MARKED as issued
elsif (re__arbitrate = = 1) AND (current timeslot pointer = =
```

-continued

```
non-CPU write) AND
            (MARK__timeslot = = 0) then
        choose winner according to un-used read timeslot
allocation of Section 20.10.6.2
        arb__gnt = 1
```

20.14.12.4 Flow Control

If read commands are to win arbitration, the Read Multiplexor must be ready to accept the read data from the DRAM. This is indicated by the read_cmd_rdy[1:0] signal. read_cmd_rdy[1:0] supplies flow control from the Read Multiplexor.

```
    read__cmd__rdy[0]= =1 //Read multiplexor ready for CPU
read
    read__cmd__rdy[1]= =1 //Read multiplexor ready for non-CPU
read
```

The Read Multiplexor will normally always accept CPU reads, see Section 20.14.13.1, so read_cmd_rdy[0]==1 should always apply.

Similarly, if write commands are to win arbitration, the Write Multiplexor must be ready to accept the write data from the winning SoPEC requestor. This is indicated by the write_cmd_rdy[1:0] signal. write_cmd_rdy[1:0] supplies flow control from the Write Multiplexor.

```
        write__cmd__rdy[0]= =1 //Write multiplexor ready for CPU
    write
        write cmd rdy [1]= =1 //Write multiplexor ready for non-
    CPU write
```

The Write Multiplexor will normally always accept CPU writes, see Section 20.14.13.2, so write_cmd_rdy[0]==1 should always apply.

Non-CPU Read Flow Control

If re_arbitrate selects an access then the signal dau_dcu_msn2stall is asserted until the Read Write Multiplexor is ready.

arb_gnt is not asserted until the Read Write Multiplexor is ready.

This mechanism will stall the DCU access to the DRAM until the Read Write Multiplexor is ready to accept the next data from the DRAM in the case of a read.

```
    //other access flow control
    dau__dcu__msn2stall = (((re__arbitrate selects CPU read) AND
        read__cmd__rdy[0]= =0) OR
                        (re arbitrate selects non-CPU
    read) AND         read__cmd__rdy[1]= =0))
    arb__gnt not asserted until dau__dcu__msn2stall de-asserts
```

20.14.12.5 Arbitration Hierarchy

CPU and refresh are not included in the timeslot allocations defined in the DAU configuration registers of Table.

The hierarchy of arbitration under normal operation is a. CPU access b. Refresh access c. Timeslot access.

Figure 124:
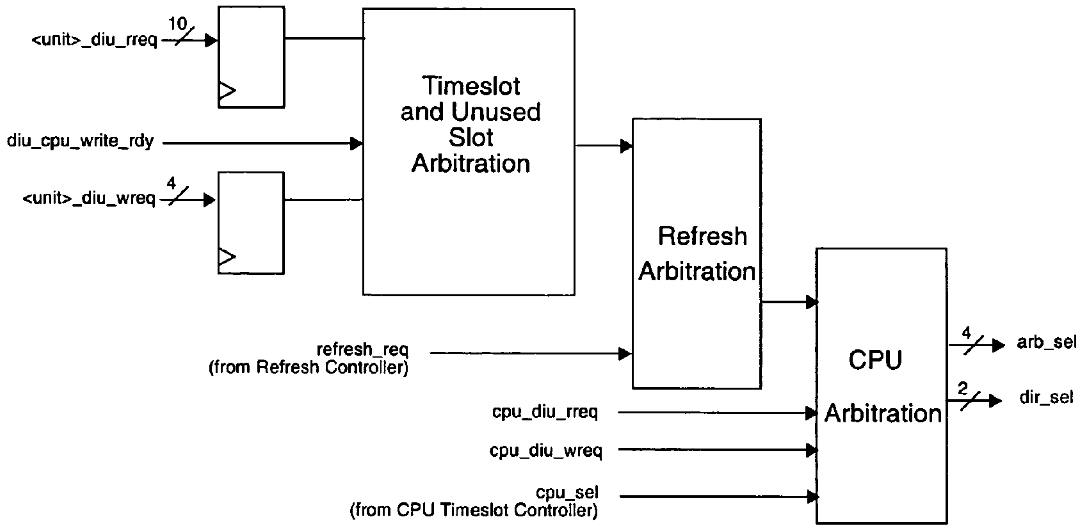
FIG. 124 shows arbitration hierarchy

This is shown in FIG. 124. The first DRAM access issued after reset must be a refresh.

As shown in FIG. 118, the DIU request signals <unit>_diu_rreq, <unit>_diu_wreq are registered at the input of the arbitration block to ease timing. The exceptions are the refresh_req signal, which is generated locally in the sub-block and cpu_diu_rreq. The CPU read request signal is not registered so as to keep CPU DIU read access latency to a minimum. Since CPU writes are posted, cpu_diu_wreq is registered so that the DAU can process the write at a later juncture. The arbitration logic is coded to perform arbitration of non-CPU requests first and then to gate the result with the CPU requests. In this way the CPU can make the requests available late in the arbitration cycle.

Note that when RotationSync is set to '0', a modified hierarchy of arbitration is used. This is outlined in section 20.14.12.2.3 on page 280.

20.14.12.6 Timeslot Access

The basic timeslot arbitration is based on the MainTimeslot configuration registers. Arbitration works by the timeslot pointed to by either the current or write lookahead pointer winning arbitration. The pointers then advance to the next timeslot. This was shown in FIG. 90. Each main timeslot pointer gets advanced each time it is accessed regardless of whether the slot is used.

20.14.12.7 Unused Timeslot Allocation

If an assigned slot is not used (because its corresponding SoPEC Unit is not requesting) then it is reassigned according to the scheme described in Section 20.10.6.

Only used non-CPU accesses are reallocated. CDU write accesses cannot be included in the unused timeslot allocation for write as CDU accesses take 6 cycles. The write accesses which the CDU write could otherwise replace require only 3 or 4 cycles.

Unused write accesses are re-allocated according to the fixed priority scheme of Table. Unused read timeslots are re-allocated according to the two-level round-robin scheme described in Section 20.10.6.2.

A pointer points to the most recently re-allocated unit in each of the round-robin levels. If the unit immediately succedling the pointer is requesting, then this unit wins the arbitration and the pointer is advanced to reflect the new winner. If this is not the case, then the subsequent units (wrapping back eventually to the pointed unit) in the level 1 round-robin are examined. When a requesting unit is found this unit wins the arbitration and the pointer is adjusted. If no unit is requesting then the pointer does not advance and the second level of round-robin is examined in a similar fashion. In the following pseudo-code the bit indices are for the ReadRoundRobinLevel configuration register described in Table.

```
//choose the winning arbitration level
level1 = 0
level2 = 0
for i = 0 to 11
    if unit(i) requesting AND ReadRoundRobinLevel(i) =
0 then
    level1 = 1
    if unit(i) requesting AND ReadRoundRobinLevel(i) =
1 then
    level2 = 1
```

Round-robin arbitration is effectively a priority assignment with the units assigned a priority according to the round-robin order of Table but starting at the unit currently pointed to.

```
//levelptr is pointer of selected round robin level
priority is array 0 to 11 // index 0 is SCBR(0) etc.
from Table
//assign decreasing priorities from the current
pointer; maximum priority is 11
for i = 1 to 12
    priority (levelptr + i) = 12 − i
  i++
```

The arbitration winner is the one with the highest priority provided it is requesting and its ReadRoundRobinLevel bit points to the chosen level. The levelptr is advanced to the arbitration winner.

Figure 125:
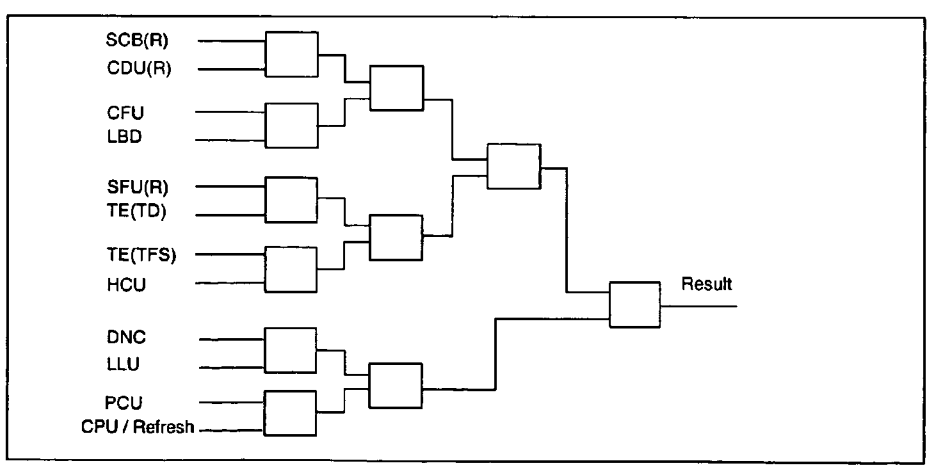
FIG. 125 shows hierarchical round-robin priority comparison

The priority comparison can be done in the hierarchical manner shown in FIG. 125.

20.14.12.8 How Non-CPU Address Restrictions Affect Arbitration

Recall from Table "DAU configuration registers," on page 288, "DAU configuration registers," on page 268 that there are minimum valid DRAM addresses for non-CPU accesses, defined by minNonCPUReadAdr, minDWUWriteAdr and minNonCPUWriteAdr. Similarly, a non-CPU requester may not try to access a location above the high memory mark.

To ensure compliance with these address restrictions, the following DIU response occurs for any incorrectly addressed non-CPU writes:—

Issue a write acknowledgment at pre-arbitration time, to prevent the write requester from hanging.

Disregard the incoming write data and write valids and void the pre-arbitration.

Subsequently re-allocate the write slot at main arbitration time via the round robin.

For any incorrectly addressed non-CPU reads, the response is:—

Arbitrate the slot in favour of the scheduled, misbehaving requester.

Issue the read acknowledgement and rvalids to keep the requester from hanging.

Intercept the read data coming from the DCU and send back all zeros instead.

If an invalidly addressed non-CPU access is attempted, then a sticky bit, sticky_invalid_non_cpu_adr, is set in the ArbitrationHistory configuration register. See Table n page 293 on page 275 for details.

20.14.12.9 Refresh Controller Description

The refresh controller implements the functionality described in detail in Section 20.10.5. Refresh is not included in the timeslot allocations.

CPU and refresh have priority over other accesses. If the refresh controller is requesting i.e. refresh_req is asserted, then the refresh request will win any arbitration initiated by re_arbitrate. When the refresh has won the arbitration refresh_req is de-asserted.

The refresh counter is reset to RefreshPeriod[8:0] i.e. the number of cycles between each refresh. Every time this counter decrements to 0, a refresh is issued by asserting refresh_req. The counter immediately reloads with the value in RefreshPeriod[8:0] and continues its countdown. It does not wait for an acknowledgment, since the priority of a refresh request supersedes that of any pending non-CPU access and it will be serviced immediately. In this way, a refresh request is guaranteed to occur every (RefreshPeriod [8:0+1) cycles. A given refresh request may incur some incidental delay in being serviced, due to alignment with DRAM accesses and the possibility of a higher-priority CPU pre-access.

Refresh is also included in the unused read and write timeslot allocation, having second option on awards to a round-robin position shared with the CPU. A refresh issued as a result of an unused timeslot allocation also causes the refresh counter to reload with the value in RefreshPeriod[8: 0]. The first access issued by the DAU after reset must be a refresh. This assures that refreshes for all DRAM words fall within the required 3.2 ms window.

```
        //issue a refresh request if counter reaches 0 or at
reset or for re-allocated slot
        if  RefreshPeriod  !=  0  AND  (refresh_cnt  ==  0  OR
                diu_soft_reset_n == 0 OR
                        prst_n            ==0             OR
unused_timeslot_allocation == 1) then
            refresh_req = 1
        //de-assert refresh request when refresh acked
        else if refresh_ack == 1 then
            refresh_req = 0
        //refresh counter
if refresh_cnt == 0 OR diu_soft_reset_n == 0 OR prst_n ==0
                            OR unused_timeslot_allocation ==
                            1 then
            refresh_cnt = RefreshPeriod
        else
            refresh_cnt = refresh_cnt − 1
```

Refresh can preceded by a CPU access in the same way as any other access. This is controlled by the CPUPreAccessTimeslots and CPUTotalTimeslots configuration registers. Refresh will therefore not affect CPU performance. A sequence of accesses including refresh might therefore be CPU, refresh, CPU, actual timeslot.

20.14.12.10 CPU Timeslot Controller Description

CPU accesses have priority over all other accesses. CPU access is not included in the timeslot allocations. CPU access is controlled by the CPUPreAccessTimeslots and CPUTotalTimeslots configuration registers.

To avoid the CPU having to wait for its next timeslot it is desirable to have a mechanism for ensuring that the CPU always gets the next available timeslot without incurring any latency on the non-CPU timeslots.

This is be done by defining each timeslot as consisting of a CPU access preceding a non-CPU access. Two counters of 4-bits each are defined allowing the CPU to get a maximum of (CPUPreAccessTimeslots+1) pre-accesses out of a total of (CPUTotalTimeslots+1) main slots. A timeslot counter starts at CPUTotalTimeslots and decrements every timeslot, while another counter starts at CPUPreAccessTimeslots and decrements every timeslot in which the CPU uses its access. If the pre-access entitlement is used up before (CPUTotalTimeslots+1) slots, no further CPU accesses are allowed. When the CPUTotalTimeslots counter reaches zero both counters are reset to their respective initial values.

When CPUPreAccessTimeslots is set to zero then only one pre-access will occur during every (CPUTotalTimeslots+1) slots.

20.14.12.10.1 Conserving CPU Pre-Accesses

In section 20.10.6.2.1 on page 249, it is described how the CPU can be allowed participate in the unused read round-robin scheme. When enabled by the configuration bit EnableCPURoundRobin, the CPU shares a joint position in the round robin with refresh. In this case, the CPU has priority, ahead of refresh, in availing of any unused slot awarded to this position.

Such CPU round-robin accesses do not count towards depleting the CPU's quota of pre-accesses, specified by CPUPreAccessTimeslots. Note that in order to conserve these pre-accesses, the arbitration logic, when faced with the choice of servicing a CPU request either by a pre-access or by an immediately following unused read slot which the CPU is poised to win, will opt for the latter.

20.14.13 Read and Write Data Multiplexor Sub-Block

TABLE 138

Read and Write Multiplexor Sub-block IO Definition

| Port name | Pins | I/O | Description |
|---|---|---|---|
| **Clocks and Resets** | | | |
| Pclk | 1 | In | System Clock |
| prst_n | 1 | In | System reset, synchronous active low |
| **DIU Read Interface to SoPEC Units** | | | |
| diu_data | 64 | Out | Data from DIU to SoPEC Units except CPU.<br>First 64-bits is bits 63:0 of 256 bit word<br>Second 64-bits is bits 127:64 of 256 bit word<br>Third 64-bits is bits 191:128 of 256 bit word<br>Fourth 64-bits is bits 255:192 of 256 bit word |
| dram_cpu_data | 256 | Out | 256-bit data from DRAM to CPU. |
| diu_<unit>_rvalid | 1 | Out | Signal from DIU telling SoPEC Unit that valid read data is on the diu_data bus |
| **DIU Write Interface to SoPEC Units** | | | |
| <unit>_diu_data | 64 | In | Data from SoPEC Unit to DIU except CPU.<br>First 64-bits is bits 63:0 of 256 bit word<br>Second 64-bits is bits 127:64 of 256 bit word<br>Third 64-bits is bits 191:128 of 256 bit word<br>Fourth 64-bits is bits 255:192 of 256 bit word |
| cpu_diu_wdatat | 128 | In | Write data from CPU to DIU. |
| <unit>_diu_wvalid | 1 | In | Signal from SoPEC Unit indicating that data on <unit>_diu_data is valid. Note that "unit" refers to non-CPU requesters only. |
| cpu_diu_wdatavalid | 1 | In | Write enable for the CPU posted write buffer. Also confirms the validity of cpu_diu_wdata. |
| diu_cpu_write_rdy | 1 | Out | Indicator that the CPU posted write buffer is empty. |
| **Inputs from CPU Configuration and Arbitration Logic Sub-block** | | | |
| arb_gnt | 1 | In | Signal lasting 1 cycle which indicates arbitration has occurred and arb_sel is valid. |
| arb_sel | 5 | In | Signal indicating which requesting SoPEC Unit has won arbitration. Encoding is described in Table. |
| dir_sel | 2 | In | Signal indicating which sense of access associated with arb_sel<br>00: issue non-CPU write<br>01: read winner<br>10: write winner<br>11: refresh winner |

TABLE 138-continued

| Read and Write Multiplexor Sub-block IO Definition | | | |
|---|---|---|---|
| Port name | Pins | I/O | Description |
| Outputs to Command Multiplexor Sub-block | | | |
| write_data_valid | 2 | Out | Signal indicating that valid write data is available for the current command.<br>00 = not valid<br>01 = CPU write data valid<br>10 = non-CPU write data valid<br>11 = both CPU and non-CPU write data valid |
| wdata | 256 | Out | 256-bit non-CPU write data |
| cpu_wdata | 32 | Out | 32-bit CPU write data |
| Inputs from Command Multiplexor Sub-block | | | |
| write_data_accept | 2 | In | Signal indicating the Command Multiplexor has accepted the write data from the write multiplexor<br>00 = not valid<br>01 = accepts CPU write data<br>10 = accepts non-CPU write data<br>11 = not valid |
| Inputs from DCU | | | |
| dcu_dau_rdata | 256 | In | 256-bit read data from DCU. |
| dcu_dau_rvalid | 1 | In | Signal indicating valid read data on dcu_dau_rdata. |
| Outputs to CPU Configuration and Arbitration Logic Sub-block | | | |
| read_cmd_rdy | 2 | Out | Signal indicating that read multiplexor is ready for next read read command.<br>00 = not ready<br>01 = ready for CPU read<br>10 = ready for non-CPU read<br>11 = ready for both CPU and non-CPU reads |
| write_cmd_rdy | 2 | Out | Signal indicating that write multiplexor is ready for next write command.<br>00 = not ready<br>01 = ready for CPU write<br>10 = ready for non-CPU write<br>11 = ready for both CPU and non-CPU writes |
| Debug Outputs to CPU Configuration and Arbitration Logic Sub-block | | | |
| read_sel | 5 | Out | Signal indicating the SoPEC Unit for which the current read transaction is occurring. Encoding is described in Table. |
| read_complete | 1 | Out | Signal indicating that read transaction to SoPEC Unit indicated by read_sel is complete. |

20.14.13.1 Read Multiplexor Logic Description

The Read Multiplexor has 2 read channels a separate read bus for the CPU, dram_cpu_data[255:0].

and a shared read bus for the rest of SoPEC, diu_data[63:0.

The validity of data on the data busses is indicated by signals diu_<unit>_rvalid.

Figure 90:
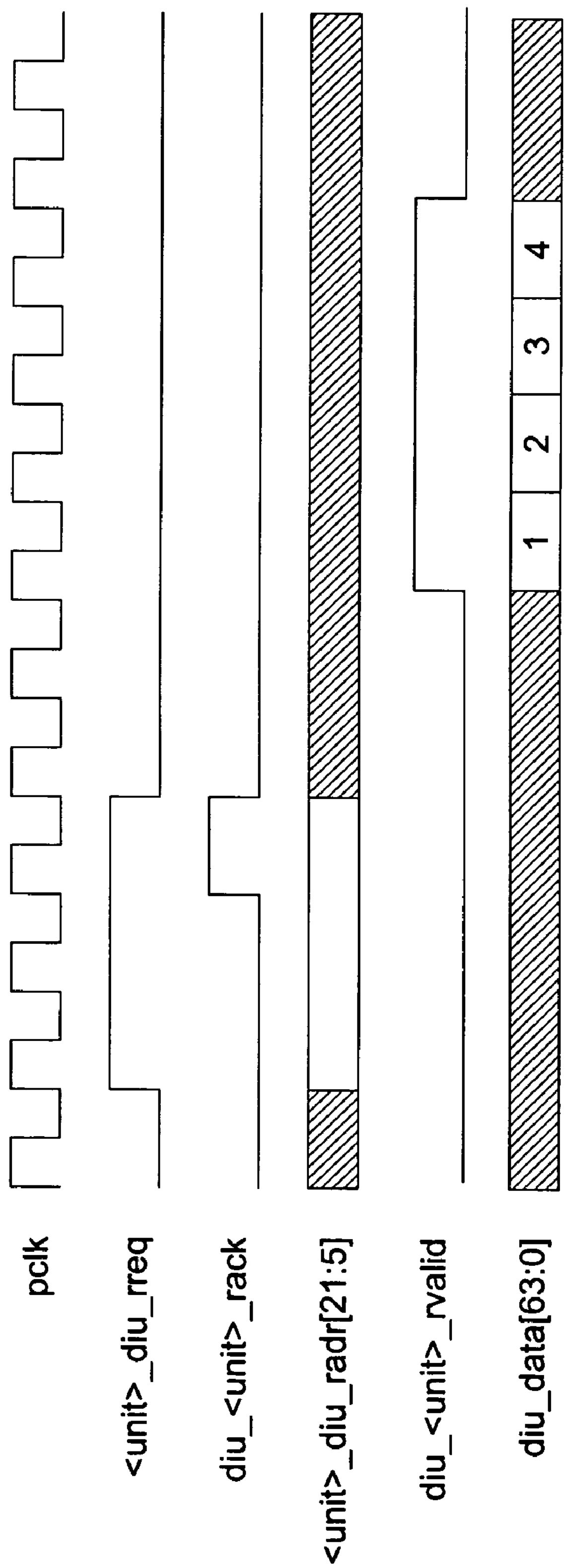
FIG. 90 shows a read protocol for a SoPEC Unit making a single 256-bit access
Figure 91:
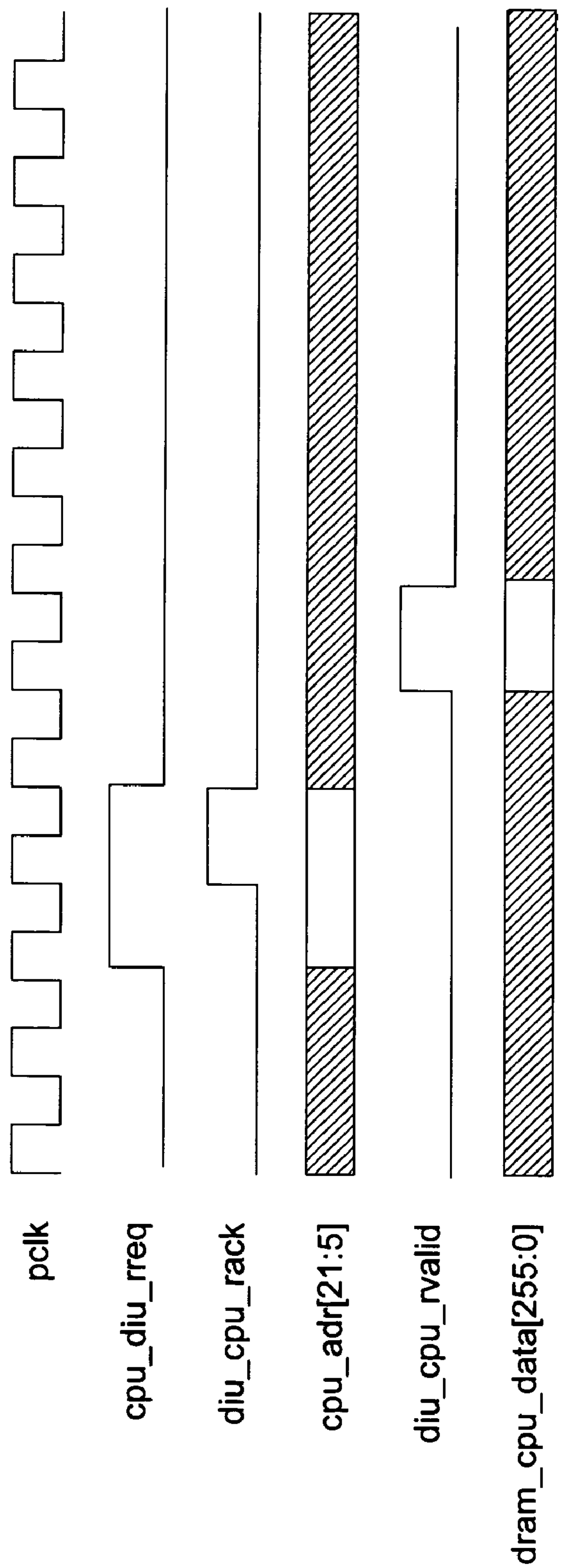
FIG. 91 shows a read protocol for a SoPEC Unit making a single 256-bit access

Timing waveforms for non-CPU and CPU DIU read accesses are shown in FIG. 90 and FIG. 91, respectively.

Figure 127:
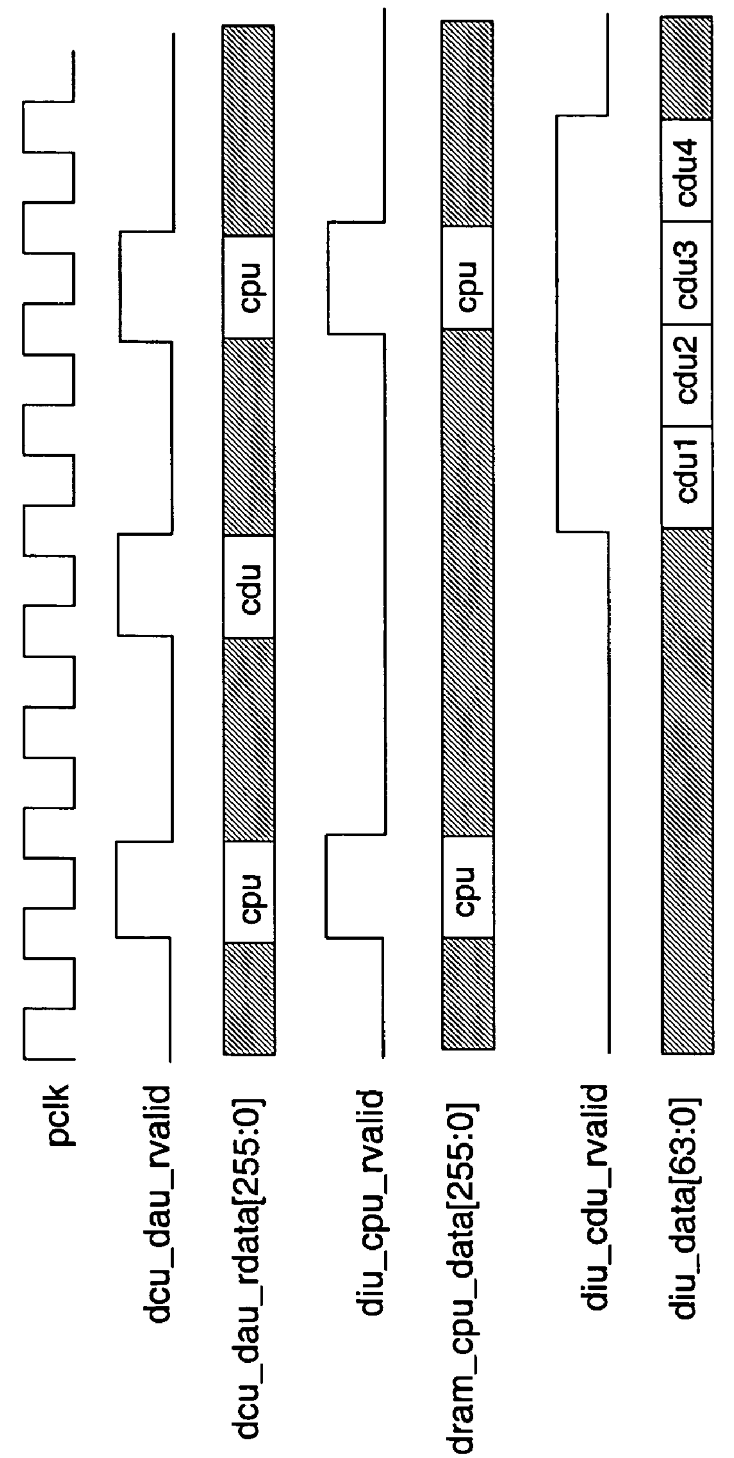
FIG. 127 shows a read command queue (4 deep buffer)

The Read Multiplexor timing is shown in FIG. 127. FIG. 127 shows both CPU and non-CPU reads. Both CPU and non-CPU channels are independent i.e. data can be output on the CPU read bus while non-CPU data is being transmitted in 4 cycles over the shared 64-bit read bus. CPU read data, dram_cpu_data[255.0], is available in the same cycle as output from the DCU. CPU read data needs to be registered immediately on entering the CPU by a flip-flop enabled by the diu_cpu_rvalid signal.

Figure 126:
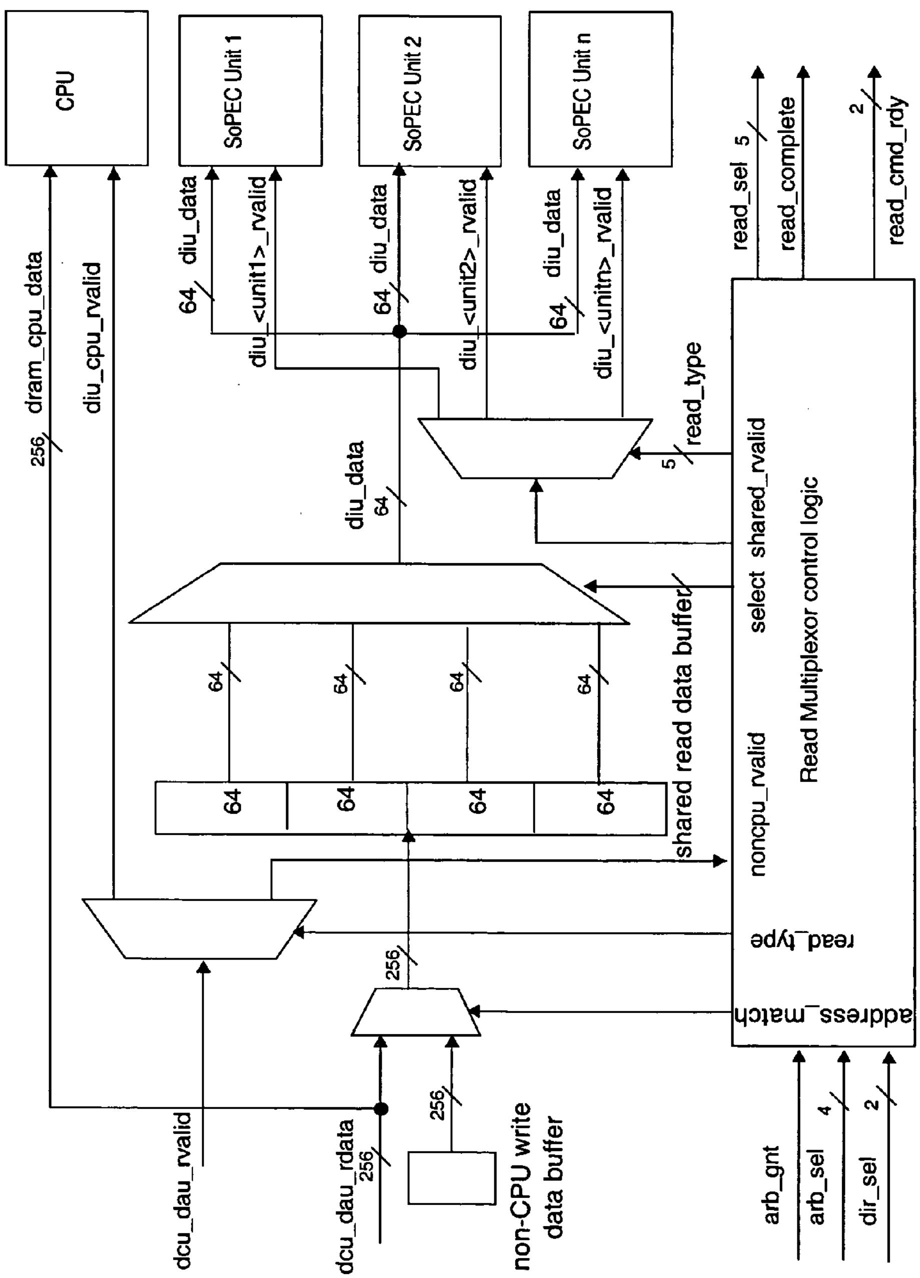
FIG. 126 shows a read multiplexor partition

To ease timing, non-CPU read data from the DCU is first registered in the Read Multiplexor by capturing it in the shared read data buffer of FIG. 126 enabled by the dcu_dau_rvalid signal.

The data is then partitioned in 64-bit words on diu_data [63:0].

20.14.13.1.1 Non-CPU Read Data Coherency

Note that for data coherency reasons, a non-CPU read will always result in read data being returned to the requester which includes the after-effects of any pending (i.e. pre-arbitrated, but not yet executed) non-CPU write to the same address, which is currently cached in the non-CPU write buffer. This is shown graphically in Figure n page 319 on page Error! B kmark not defined.

Should the pending write be partially masked, then the read data returned must take account of that mask. Pending, masked writes by the CDU and SCB, as well as all unmasked non-CPU writes are fully supported.

Since CPU writes are dealt with on a dedicated write channel, no attempt is made to implement coherency between posted, unexecuted CPU writes and non-CPU reads to the same address.

20.14.13.1.2 Read Multiplexor Command Queue

When the Arbitration Logic sub-block issues a read command the associated value of arb_sel[4:0], which indicates which SoPEC Unit has won arbitration, is written into a buffer, the read command queue.

```
write_en = arb_gnt AND dir_sel[1:0]= ="01"
if write_en= =1 then
    WRITE arb_sel into read command queue
```

Figure 128:
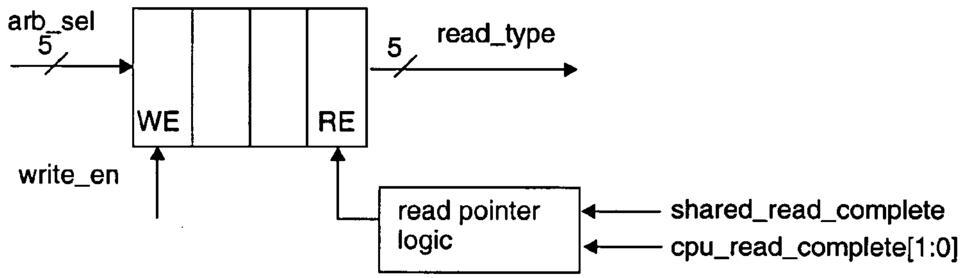
FIG. 128 shows state-machines for shared read bus accesses

The encoding of arb_sel[4:0] is given in Table. dir_sel[1:0=="01" indicates that the operation is a read. The read command queue is shown in FIG. 128.

The command queue could contain values of arb_sel[4:0] for 3 reads at a time.

In the scenario of FIG. 127 the command queue can contain 2 values of arb_sel[4:0] i.e. for the simultaneous CDU and CPU accesses.

Figure 130:
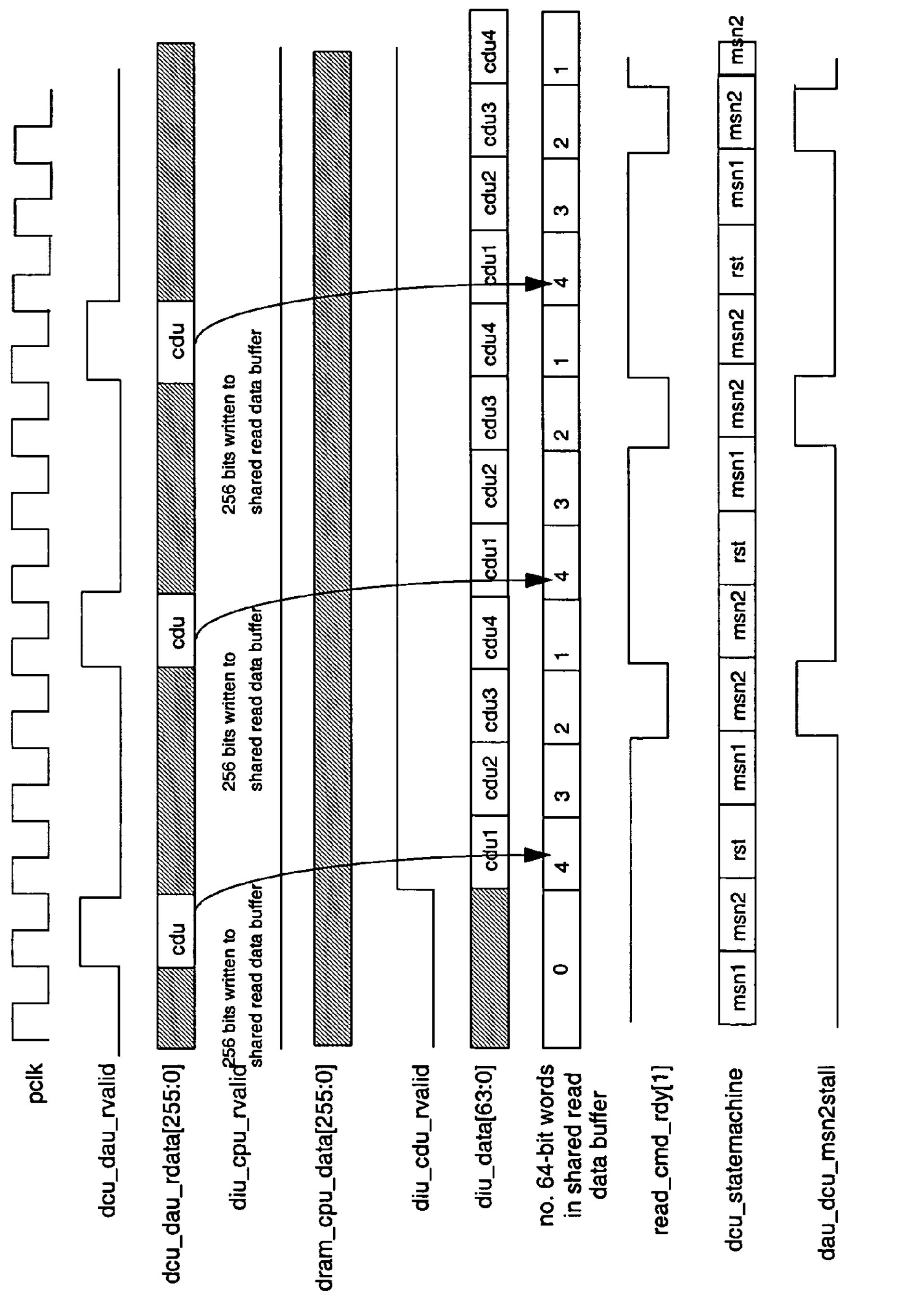
FIG. 130 shows a read multiplexer timing for back-to-back shared read bus transfer
Figure 131:
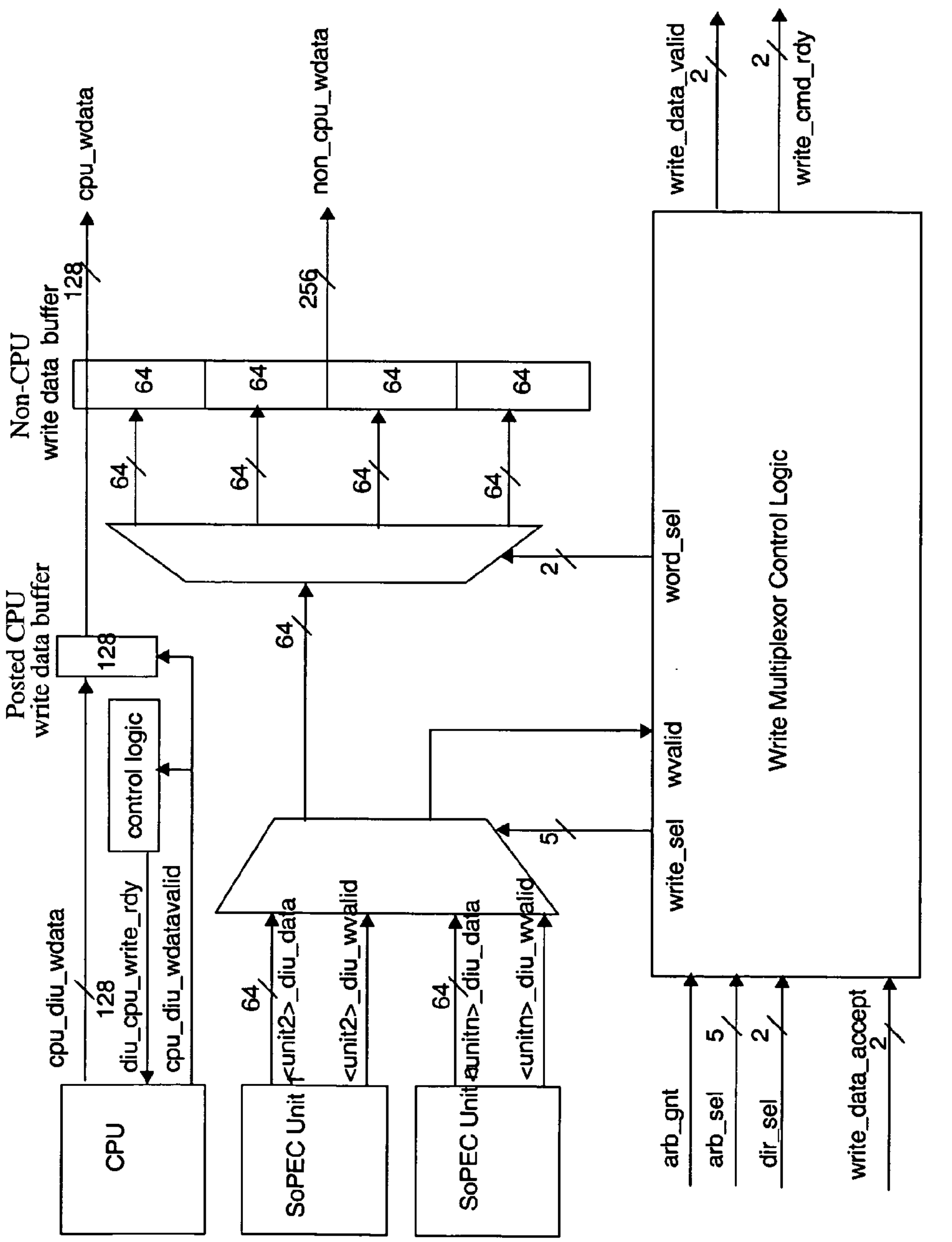
FIG. 131 shows a write multiplexer partition
Figure 132:
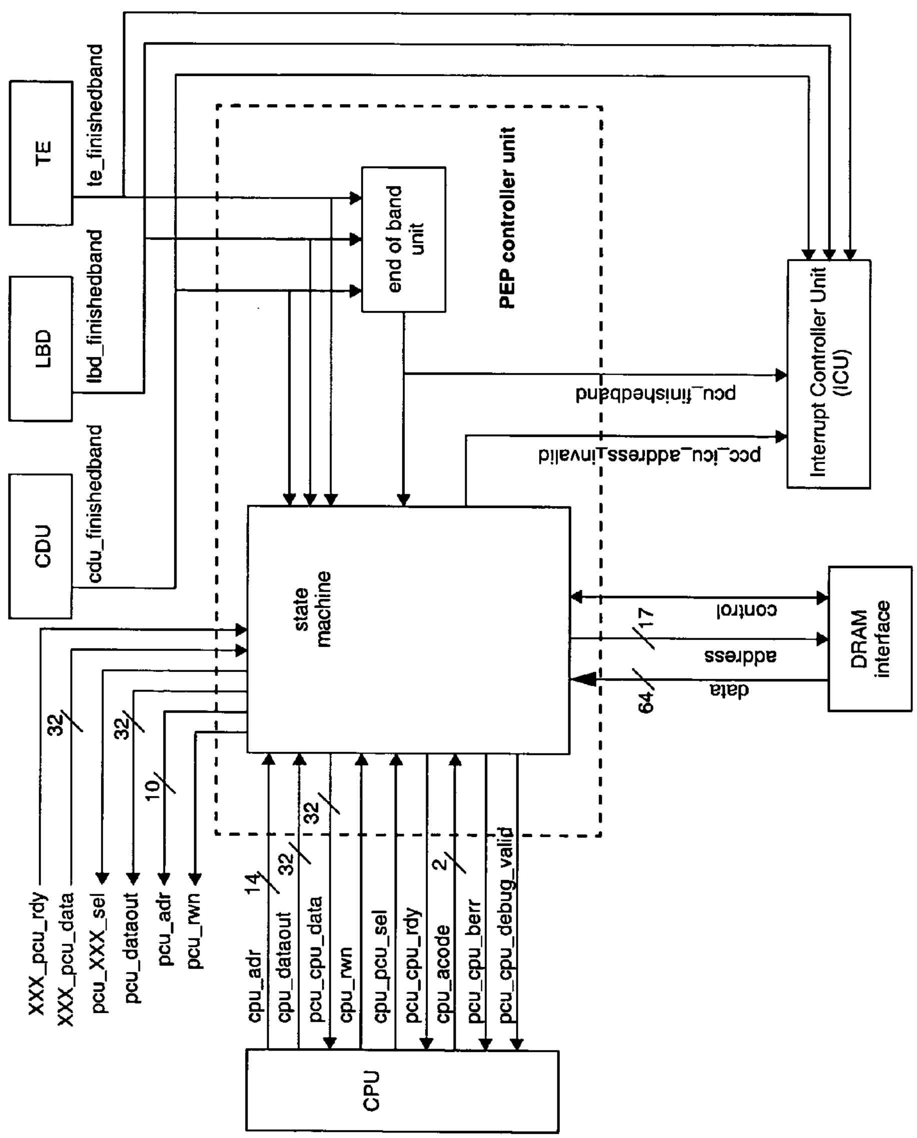
FIG. 132 shows a block diagram of a PCU

In the scenario of FIG. 130, the command queue can contain 3 values of arb_sel[4:0] i.e. at the time of the second dcu_dau_rvalid pulse the command queue will contain an arb_sel[4:0] for the arbitration performed in that cycle, and the two previous arb_sel[4:0] values associated with the data for the first two dcu_dau_rvalid pulses, the data associated with the first dcu_dau_rvalid pulse not having been fully transfered over the shared read data bus.

The read command queue is specified as 4 deep so it is never expected to fill.

The top of the command queue is a signal read_type[4:0] which indicates the destination of the current read data. The encoding of read_type[4:0] is given in Table.

20.14.13.1.3 CPU Reads

Read data for the CPU goes straight out on dram_cpu_data[255:0] and dcu_dau_rvalid is output on diu_cpu_rvalid.

cpu_read_complete(0) is asserted when a CPU read at the top of the read command queue occurs. cpu_read_complete (0) causes the read command queue to be popped.

```
cpu_read_complete(0) = (read_type[4:0] = = CPU read) AND
(dcu_dau_rvalid = = 1)
```

If the current read command queue location points to a non-CPU access and the second read command queue location points to a CPU access then the next dcu_dau_rvalid pulse received is associated with a CPU access. This is the scenario illustrated in FIG. 127. The dcu_dau_rvalid pulse from the DCU must be output to the CPU as diu_cpu_rvalid. This is achieved by using cpu_read_complete(1) to multiplex dcu_dau_rvalid to diu_cpu_rvalid. cpu_read_complete(1) is also used to pop the second from top read command queue location from the read command queue.

```
cpu_read_complete(1) = (read_type = = non-CPU read)
                     AND      SECOND (read_type
= = CPU read) AND (dcu_dau_rvalid = = 1)
```

20.14.13.1.4 Multiplexing dcu_dau_rvalid read_type[4:0] and cpu_read_complete(1) multiplexes the data valid signal, dcu_dau_rvalid, from the DCU, between the CPU and the shared read bus logic. diu_cpu_rvalid is the read valid signal going to the CPU. noncpu_rvalid is the read valid signal used by the Read Multiplexor control logic to generate read valid signals for non-CPU reads.

```
if read_type[4:0] = = CPU-read then
//select CPU
    diu_cpu_rvalid:= 1
    noncpu_rvalid:= 0
if      (read_type[4:0]= =      non-CPU-read)      AND
SECOND(read_type[4:0]= = CPU-read)
    AND dcu_dau_rvalid = = 1 then
//select CPU
    diu_cpu_rvalid:= 1
    noncpu_rvalid:= 0
else
    //select shared read bus logic
    diu_cpu_rvalid:= 0
    noncpu_rvalid:= 1
```

20.14.13.1.5 Non-CPU Reads

Read data for the shared read bus is registered in the shared read data buffer using noncpu_rvalid. The shared read buffer has 5 locations of 64 bits with separate read pointer, read_ptr[2:0], and write pointer, write_ptr[2:0].

```
if noncpu_rvalid = = 1 and (4 spaces in shared read
buffer) then
    shared_read_data_buffer[write_ptr]          =
dcu_dau_data[63:0]
    shared_read_data_buffer[write_ptr+1]        =
dcu_dau_data[127:64]
    shared_read_data_buffer[write_ptr+2]        =
dcu_dau_data[191:128]
    shared_read_data_buffer[write_ptr+3]        =
dcu_dau_data[255:192]
```

The data written into the shared read buffer must be output to the correct SoPEC DIU read requestor according to the value of read_type[4:0] at the top of the command queue. The data is output 64 bits at a time on diu_data[63:0] according to a multiplexor controlled by read_ptr[2:0].

diu_data[63:0]=shared_read_data_buffer[read_ptr]

FIG. 126 shows how read_type[4:0] also selects which shared read bus requesters diu_<unit>_rvalid signal is connected to shared_rvalid. Since the data from the DCU is registered in the Read Multiplexor then shared_rvalid is a delayed version of noncpu_rvalid.

When the read valid, diu_<unit>_rvalid, for the command associated with read_type[4:0] has been asserted for 4 cycles then a signal shared_read_complete is asserted. This indicates that the read has completed. shared_read_complete causes the value of read_type[4:0] in the read command queue to be popped.

Figure 129:
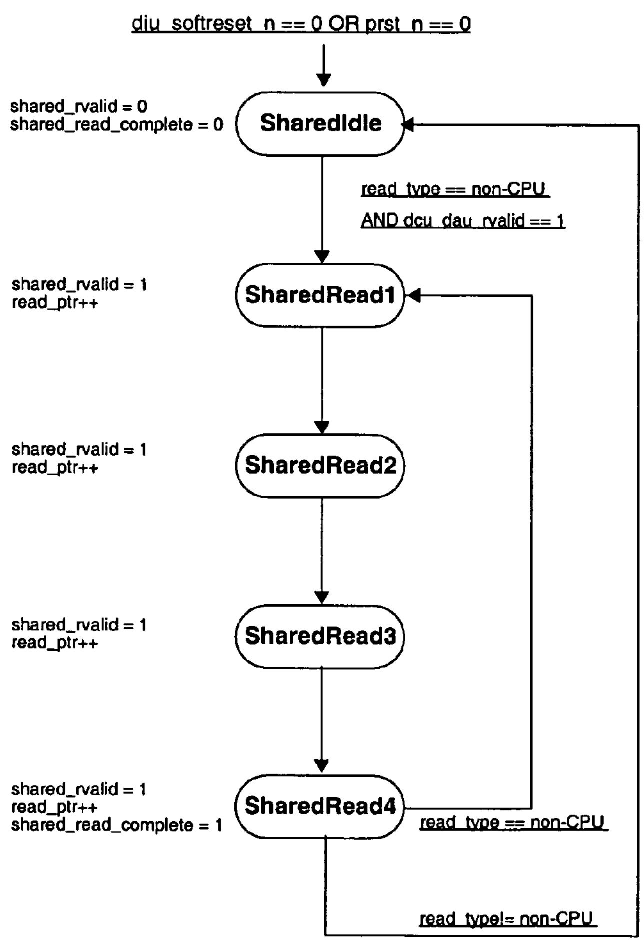
FIG. 129 shows a write multiplexor partition

A state machine for shared read bus access is shown in FIG. 129. This show the generation of shared_rvalid, shared_read_complete and the shared read data buffer read pointer, read_ptr[2:0], being incremented.

Some points to note from FIG. 129 are:

shared_rvalid is asserted the cycle after dcu_dau_rvalid associated with a shared read bus access. This matches the cycle delay in capturing dau_dcu_data[255:0] in the shared read data buffer. shared_rvalid remains asserted in the case of back to back shared read bus accesses.

shared_read_complete is asserted in the last shared_rvalid cycle of a non-CPU access. shared_read_complete causes the shared read data queue to be popped.

20.14.13.1.6 Read Command Queue Read Pointer Logic

The read command queue read pointer logic works as follows.

```
if shared_read_complete = = 1 OR cpu_read_complete(0) = = 1
then
    POP top of read command queue
if cpu_read_complete(1) = = 1 then
    POP second read command queue location
```

20.14.13.1.7 Debug Signals shared_read_complete and cpu_read_complete together define read_complete which indicates to the debug logic that a read has completed. The source of the read is indicated on read_sel[4:0].

```
    read_complete      =      shared_read_complete      OR
cpu_read_complete(0)
                       OR cpu_read_complete(1)
    if cpu_read_complete(1) = = 1 then
        read_sel:= SECOND(read_type)
    else
        read_sel:= read_type
```

20.14.13.1.8 Flow Control

There are separate indications that the Read Multiplexor is able to accept CPU and shared read bus commands from the Arbitration Logic. These are indicated by read_cmd_rdy[1:0].

The Arbitration Logic can always issue CPU reads except if the read command queue fills. The read command queue should be large enough that this should never occur.

```
    //Read Multiplexor ready for Arbitration Logic to
issue CPU reads
    read_cmd_rdy[0] = = read command queue not full
```

For the shared read data, the Read Multiplexor deasserts the shared read bus read_cmd_rdy[1] indication until a space is available in the read command queue. The read command queue should be large enough that this should never occur.

read_cmd_rdy[1] is also deasserted to provide flow control back to the Arbitration Logic to keep the shared read data bus just full.

```
//Read Multiplexor not ready for Arbitration Logic to
issue non-CPU reads
read_cmd_rdy[1] = (read command queue not full) AND
(flow_control = 0)
```

The flow control condition is that DCU read data from the second of two back-to-back shared read bus accesses becomes available. This causes read_cmd_rdy[1] to de-assert for 1 cycle, resulting in a repeated MSN2 DCU state. The timing is shown in FIG. 130.

```
flow_control = (read_type[4:0] = = non-CPU read)
            AND SECOND(read_type[4:0] = = non-
CPU read)
            AND (current DCU state = = MSN2)
        AND (previous DCU state = = MSN1).
```

FIG. 130 shows a series of back to back transfers over the shared read data bus. The exact timing of the implementation must not introduce any additional latency on shared read bus read transfers i.e. arbitration must be re-enabled just in time to keep back to back shared read bus data full.

The following sequence of events is illustrated in FIG. 130:

Data from the first DRAM access is written into the shared read data buffer.

Data from the second access is available 3 cycles later, but its transfer into the shared read buffer is delayed by a cycle, due to the MSN2 stall condition. (During this delay, read data for access 2 is maintained at the output of the DRAM.) A similar 1-cycle delay is introduced for every subsequent read access until the back-to-back sequence comes to an end.

Note that arbitration always occurs during the last MSN2 state of any access. So, for the second and later of any back-to-back non-CPU reads, arbitration is delayed by one cycle, i.e. it occurs every fourth cycle instead of the standard every third.

This mechanism provides flow control back to the Arbitration Logic sub-block. Using this mechanism means that the access rate will be limited to which ever takes longer—DRAM access or transfer of read data over the shared read data bus. CPU reads are always be accepted by the Read Multiplexor.

20.14.13.2 Write Multiplexor Logic Description

The Write Multiplexor supplies write data to the DCU.

There are two separate write channels, one for CPU data on cpu_diu_[127:0], one for non-CPU data on non_cpu_wdata[255:0]. A signal write_data_valid[1:0] indicates to the Command Multiplexor that the data is valid. The Command Multiplexor then asserts a signal write_data_accept[1:0] indicating that the data has been captured by the DRAM and the appropriate channel in the Write Multiplexor can accept the next write data.

Figure 94:
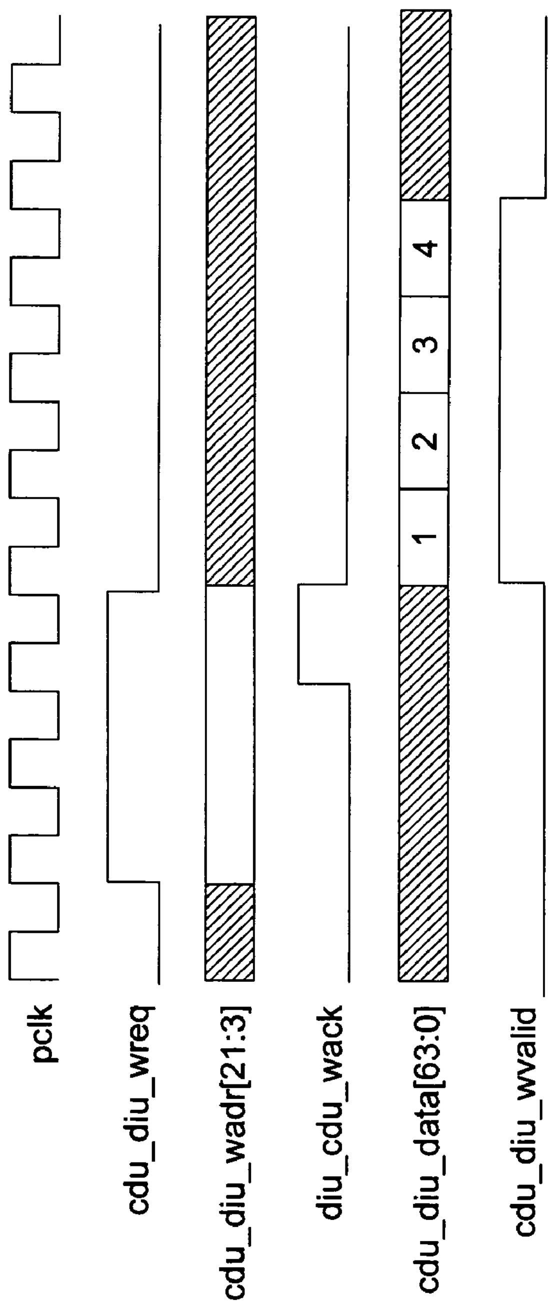
FIG. 94 shows a write protocol shown for CDU making four contiguous 64-bit accesses

Timing waveforms for write accesses are shown in FIG. 92 to FIG. 94, respectively.

There are 3 types of write accesses:

CPU Accesses

CPU write data on cpu_diu_wdata[127:0] is output on cpu_wdata[127:0]. Since CPU writes are posted, a local buffer is used to store the write data, address and mask until the CPU wins arbitration. This buffer is one position deep. write_data_valid[0], which is synonymous with !diu_cpu_write_rdy, remains asserted until the Command Multiplexor indicates it has been written to the DRAM by asserting write_data_accept[0]. The CPU write buffer can then accept new posted writes.

For non-CPU writes, the Write Multiplexor multiplexes the write data from the DIU write requester to the write data buffer and the <unit>_diu_wvalid signal to the write multiplexor control logic.

CDU Accesses 64-bits of write data each for a masked write to a separate 256-bit word are transferred to the Write Multiplexor over 4 cycles.

When a CDU write is selected the first 64-bits of write data on cdu_diu_wdata[63:0] are multiplexed to non_cpu_wdata[63:0]. write_data_valid[1] is asserted to indicate a non-CPU access when cdu_diu_wvalid is asserted. The data is also written into the first location in the write data buffer. This is so that the data can continue to be output on non_cpu_wdata[63:0] and write_data_valid[1] remains asserted until the Command Multiplexor indicates it has been written to the DRAM by asserting write_data_accept[1]. Data continues to be accepted from the CDU and is written into the other locations in the write data buffer. Successive write_data_accept[1] pulses cause the successive 64-bit data words to be output on wdata[63:0] together with write_data_valid[1]. The last write_data_accept[1] means the write buffer is empty and new write data can be accepted.

Other Write Accesses.

256-bits of write data are transferred to the Write Multiplexor over 4 successive cycles.

When a write is selected the first 64-bits of write data on <unit>_diu_wdata[63:0] are written into the write data buffer. The next 64-bits of data are written to the buffer in successive cycles. Once the last 64-bit word is available on <unit>_diu_wdata[63:0] the entire word is output on non_cpu_wdata[255:0], write_data_valid [1] is asserted to indicate a non-CPU access, and the last 64-bit word is written into the last location in the write data buffer. Data continues to be output on non_cpu_wdata[255:0] and write_data_valid[1] remains asserted until the Command Multiplexor indicates it has been written to the DRAM by asserting write_data_accept[1]. New write data can then be written into the write buffer.

CPU Write Multiplexor Control Logic

When the Command Multiplexor has issued the CPU write it asserts write_data_accept[0]. write_data_accept[0] causes the write multiplexor to assert write_cmd_rdy[0].

The signal write_cmd_rdy[0] tells the Arbitration Logic sub-block that it can issue another CPU write command i.e. the CPU write data buffer is empty.

Non-CPU Write Multiplexor Control Logic

The signal write_cmd_rdy[1] tells the Arbitration Logic sub-block that the Write Multiplexor is ready to accept another non-CPU write command. When write_cmd_rdy[1]

is asserted the Arbitration Logic can issue a write command to the Write Multiplexor. It does this by writing the value of arb_sel[4:0] which indicates which SoPEC Unit has won arbitration into a write command register, write_cmd[3:0].

```
    write_en = arb_gnt AND dir_sel[1]= =1 AND arb_sel = non-
CPU
    if write_en= =1 then
        write_cmd = arb_sel
```

The encoding of arb_sel[4:0] is given in Table. dir_sel[1] ==1 indicates that the operation is a write. arb_sel[4:0] is only written to the write command register if the write is a non-CPU write.

A rule was introduced in Section 20.7.2.3 Interleaving read and write accesses to the effect that non-CPU write accesses would not be allocated adjacent timeslots. This means that a single write command register is required.

The write command register, write_cmd[3:0], indicates the source of the write data. write_cmd[3:0] multiplexes the write data <unit>_diu_wdata, and the data valid signal, <unit>_diu_wvalid, from the selected write requestor to the write data buffer. Note, that CPU write data is not included in the multiplex as the CPU has its own write channel. The <unit>_diu_wvalid are counted to generate the signal word_sel[1:0] which decides which 64-bit word of the write data buffer to store the data from <unit>_diu_wdata.

```
    //when the Command Multiplexor accepts the write data
    if write_data_accept[1] = 1 then
        //reset the word select signal
            word_sel[1:0]=00
    //when wvalid is asserted
    if wvalid = 1 then
        //increment the word select signal
        if word_sel[1:0] = = 11 then
            word_sel[1:0] = = 00
        else
            word_sel[1:0] = = word_sel[1:0] + 1
```

wvalid is the <unit>_diu_wvalid signal multiplexed by write_cmd[3:0]. word_sel[1:0] is reset when the Command Multiplexor accepts the write data. This is to ensure that word_sel[1:0] is always starts at 00 for the first wvalid pulse of a 4 cycle write data transfer.

The write command register is able to accept the next write when the Command Multiplexor accepts the write data by asserting write_data_accept[1]. Only the last write_data_accept[1] pulse associated with a CDU access (there are 4) will cause the write command register to be ready to accept the next write data.

Flow Control Back to the Command Multiplexor write_cmd rdy[0] is asserted when the CPU data buffer is empty.

write_cmd_rdy[1] is asserted when both the write command register and the write data buffer is empty.

PEP Subsystem

21 PEP Controller Unit (PCU)

21.1 Overview

The PCU has three functions:

The first is to act as a bus bridge between the CPU-bus and the PCU-bus for reading and writing PEP configuration registers.

The second is to support page banding by allowing the PEP blocks to be reprogrammed between bands by retrieving commands from DRAM instead of being programmed directly by the CPU.

The third is to send register debug information to the RDU, within the CPU subsystem, when the PCU is in Debug Mode.

21.2 Interfaces Between PCU and Other Units

21.3 Bus Bridge

The PCU is a bus-bridge between the CPU-bus and the PCU-bus. The PCU is a slave on the CPU-bus but is the only master on the PCU-bus. See Figure page 39 on page Error! Bookmark not defined.

21.3.1 CPU Accessing PEP

All the blocks in the PEP can be addressed by the CPU via the PCU. The MMU in the CPU-subsystem will decode a PCU select signal, cpu_pcu_sel, for all the PCU mapped addresses (see section 11.4.3 on page 69). Using cpu_adr bits 15–12 the PCU will decode individual block selects for each of the blocks within the PEP. The PEP blocks then decode the remaining address bits needed to address their PCU-bus mapped registers. Note: the CPU is only permitted to perform supervisor-mode data-type accesses of the PEP, i.e. cpu_acode=11. If the PCU is selected by the CPU and any other code is present on the cpu_acode bus the access is ignored by the PCU and the pcu_cpu_berr signal is strobed, CPU commands have priority over DRAM commands. When the PCU is executing each set of four commands retrieved from DRAM the CPU can access PCU-bus registers. In the case that DRAM commands are being executed and the CPU resets the CmdSource to zero, the contents of the DRAM CmdFifo is invalidated and no further commands from the fifo are executed. The CmdPending and NextBandCmdEnable work registers are also cleared.

When a DRAM command writes to the CmdAdr register it means the next DRAM access will occur at the address written to CmdAdr. Therefore if the JUMP instruction is the first command in a group of four, the other three commands get executed and then the PCU will issue a read request to DRAM at the address specified by the JUMP instruction. If the JUMP instruction is the second command then the following two commands will be executed before the PCU requests from the new DRAM address specified by the JUMP instruction etc. Therefore the PCU will always execute the remaining commands in each four command group before carrying out the JUMP instruction.

21.4 Page Banding

The PCU can be programmed to associate microcode in DRAM with each finishedband signal. When a finishedband signal is asserted the PCU will read commands from DRAM and execute these commands. These commands are each 64-bits (see Section 21.8.5) and consist of 32-bit address bits and 32 data bits and allow PCU mapped registers to be programmed directly by the PCU.

If more than one finishedband signal is received at the same time, or others are received while microcode is already executing, the PCU will hold the commands as pending, and will execute them at the first opportunity.

Each microcode program associated with cdu_finishedband, lbd_finishedband and te_finishedband would simply restart the appropriate unit with new addresses—a total of about 4 or 5 microcode instructions. As well, or alternatively, pcu_finishedband can be used to set up all of the units and therefore involves many more instructions. This minimizes the time that a unit is idle in between bands. The pcu_finishedband control signal is issued once the specified combination of CDU, LBD and TE (programmed in BandSelectMask) have finished their processing for a band.

21.5 Interrupts, Address Legality and Security

Interrupts are generated when the various page expansion units have finished a particular band of data from DRAM. The cdu_finishedband, lbd_finishedband and te_finishedband signals are combined in the PCU into a single interrupt pcu_finishedband which is exported by the PCU to the interrupt controller.

The PCU mapped registers should only be accessible from Supervisor Data Mode. The area of DRAM where PCU commands are stored should be a Supervisor Mode only DRAM area, although this is not enforced by the PCU.

When the PCU is executing commands from DRAM, any block-address decoded from a command which is not part of the PEP block-address map will cause the PCU to ignore the command and strobe the pcu_icu_address_invalid interrupt signal. The CPU can then interrogate the PCU to find the source of the illegal command. The MMU will ensure that the CPU cannot address an invalid PEP subsystem block.

When the PCU is executing commands from DRAM, any address decoded from a command which is not part of the PEP address map will cause the PCU to:

Cease execution of current command and flush all remaining commands already retrieved from DRAM.

Clear CmdPending work-register.

Clear NextBandCmdEnable registers.

Set CmdSource to zero.

In addition to cancelling all current and pending DRAM accesses the PCU strobes the pcu_icu_address_invalid interrupt signal. The CPU can then interrogate the PCU to find the source of the illegal command.

21.6 Debug Mode

When the need to monitor the (possibly changing) value in any PEP configuration register the PCU may be placed in Debug Mode. This is done via the CPU setting certain Debug Address register within the PCU. Once in Debug Mode the PCU continually reads the target PEP configuration register and sends the read value to the RDU. Debug Mode has the lowest priority of all PCU functions: if the CPU wishes to perform an access or there are DRAM commands to be executed they will interrupt the Debug access, and the PCU will resume Debug access once a CPU or DRAM command has completed.

21.7 Implementation 21.7.1 Definitions of I/O

TABLE 139

PCU Port List

| Port Name | Pins | I/O | Description |
|---|---|---|---|
| Clocks and Resets | | | |
| Pclk | 1 | In | SoPEC functional clock |
| prst_n | 1 | In | Active-low, synchronous reset in pclk domain |
| End of Band Functionality | | | |
| cdu_finishedband | 1 | In | Finished band signal from CDU |
| lbd_finishedband | 1 | In | Finished band signal from LBD |
| te_finishedband | 1 | In | Finished band signal from TE |
| pcu_finishedband | 1 | Out | Asserted once the specified combination of CDU, LBD, and TE have finished their processing for a band. |

TABLE 139-continued

PCU Port List

| Port Name | Pins | I/O | Description |
|---|---|---|---|
| PCU address error | | | |
| pcu_icu_address_invalid | 1 | Out | Strobed if PCU decodes a non PEP address from commands retrieved from DRAM or CPU. |
| CPU Subsystem Interface Signals | | | |
| cpu_adr[15:2] | 14 | In | CPU address bus. 14 bits are required to decode the address space for the PEP. |
| cpu_dataout [31:0] | 32 | In | Shared write data bus from the CPU |
| pcu_cpu_data[31:0] | 32 | Out | Read data bus to the CPU |
| cpu_rwn | 1 | In | Common read/not-write signal from the CPU |
| cpu_acode [1:0] | 2 | In | CPU Access Code signals. These decode as follows: 00 - User program access 01 - User data access 10 - Supervisor program access 11 - Supervisor data access |
| cpu_pcu_sel | 1 | In | Block select from the CPU. When cpu_pcu_sel is high both cpu_adr and cpu_dataout are valid |
| pcu_cpu_rdy | 1 | Out | Ready signal to the CPU. When pcu_cpu_rdy is high it indicates the last cycle of the access. For a write cycle this means cpu_dataout has been registered by the block and for a read cycle this means the data on pcu_cpu_data is valid. |
| pcu_cpu_berr | 1 | Out | Bus error signal to the CPU indicating an invalid access. |
| pcu_cpu_debug_valid | 1 | Out | Debug Data valid on pcu_cpu_data bus. Active high. |
| PCU Interface to PEP blocks | | | |
| pcu_adr[11:2] | 10 | Out | PCU address bus. The 10 least significant bits of cpu_adr [15:2] allow 1024 32-bit word addressable locations per PEP block. Only the number of bits required to decode the address space are exported to each block. |
| pcu_dataout [31:0] | 32 | Out | Shared write data bus from the PCU |
| <unit>_pcu_datain[31:0] | 32 | In | Read data bus from each PEP subblock to the PCU |
| pcu_rwn | 1 | Out | Common read/not-write signal from the PCU |
| pcu_<unit>_sel | 1 | Out | Block select for each PEP block from the PCU. Decoded from the 4 most significant bits of cpu_adr[15:2]. When pcu_<unit>_sel is high both pcu_adr and pcu_dataout are valid |
| <unit>_pcu_rdy | 1 | In | Ready from each PEP block signal to the PCU. When <unit>_pcu_rdy is high it indicates the last cycle of the access. For a write cycle this means pcu_dataout has been registered by the block and for a read cycle this means the data on <unit>_pcu_datain is valid. |
| DIU Read Interface signals | | | |
| pcu_diu_rreq | 1 | Out | PCU requests DRAM read. A read request must be accompanied by a valid read address. |

TABLE 139-continued

PCU Port List

| Port Name | Pins | I/O | Description |
|---|---|---|---|
| pcu_diu_radr [21:5] | 17 | Out | Read address to DIU 17 bits wide (256-bit aligned word). |
| diu_pcu_rack | 1 | In | Acknowledge from DIU that read request has been accepted and new read address can be placed on pcu_diu_radr |
| diu_data[63:0] | 64 | In | Data from DIU to PCU. First 64-bits is bits 63:0 of 256 bit word Second 64-bits is bits 127:64 of 256 bit word Third 64-bits is bits 191:128 of 256 bit word Fourth 64-bits is bits 255:192 of 256 bit word |
| diu_pcu_rvalid | 1 | In | Signal from DIU telling PCU that valid read data is on the diu_data bus |

21.7.2 Configuration Registers

TABLE 140

PCU Configuration Registers

| Address PCU_base+ | register | # bits | reset | description |
|---|---|---|---|---|
| Control registers | | | | |
| 0x00 | Reset | 1 | 0x1 | A write to this register causes a reset of the PCU. This register can be read to indicate the reset state:<br>0 - reset in progress<br>1 - reset not in progress |
| 0x04 | CmdAdr[21:5] (256-bit aligned DRAM address) | 17 | 0x00 000 | The address of the next set of commands to retrieve from DRAM. When this register is written to, either by the CPU or DRAM command, 1 is also written to CmdSource to cause the execution of the commands at the specified address. |
| 0x08 | BandSelectMask [2:0] | 3 | 0x0 | Selects which input finishedBand flags are to be watched to generate the combined pcu_finishedband signal.<br>Bit0 - lbd_finishedband<br>Bit1 - cdu_finishedband<br>Bit2 - te_finishedband |
| 0x0C, 0x10, 0x14, 0x18 | NextBandCmdAdr [3:0][21:5] (256-bit aligned DRAM address) | 4 × 17 | 0x00 000 | The address to transfer to CmdAdr as soon as possible after the next finishedBand[n] signal has been received as long as NextBandCmdEnable[n] is set. A write from the PCU to NextBandCmdAdr[n] with a non-zero value also sets NextBandCmdEnable[n]. A write from the PCU to NextBandCmdAdr[n] with a 0 value clears NextBandCmdEnable[n]. |
| 0x1C | NextCmdAdr[21:5] | 17 | 0x00 000 | The address to transfer to CmdAdr when the CPU pending bit (CmdPending[4]) get serviced. A write from the PCU to NextCmdAdr[n] with a non-zero value also sets CmdPending[4]. A write from the PCU to NextCmdAdr[n] with a 0 value clears CmdPending[4] |
| 0x20 | CmdSource | 1 | 0x0 | 0 - commands are taken from the CPU<br>1 - commands are taken from the CPU as well as DRAM at CmdAdr. |

TABLE 140-continued

PCU Configuration Registers

| Address PCU_base+ | register | # bits | reset | description |
|---|---|---|---|---|
| 0x24 | DebugSelect[15:2] | 14 | 0x00 00 | Debug address select. Indicates the address of the register to report on the pcu_cpu_data bus when it is not otherwise being used, and the PEP bus is not being used<br>Bits [15:12] select the unit (see Table )<br>Bits [11:2] select the register within the unit |
| Work registers (read only) | | | | |
| 0x28 | InvalidAddress [21:3] (64-bit aligned DRAM) | 19 | 0 | DRAM Address of current 64-bit command attempting to execute. Read only register. |
| 0x2C | CmdPending | 5 | 0x00 | For each bit n, where n is 0 to 3<br>0 -no commands pending for NextBandCmdAdr[n]<br>1 -commands pending for NextBandCmdAdr[n]<br>For bit 4<br>0 -no commands pending for NextCmdAdr[n]<br>1 -commands pending for NextCmdAdr[n]<br>Read only register. |
| 0x34 | FinishedSoFar | 3 | 0x0 | The appropriate bit is set whenever the corresponding input finishedBand flag is set and the corresponding bit in the BandSelectMask bit is also set. If all FinishedSoFar bits are set wherever BandSelect bits are also set, all FinishedSoFar bits are cleared and the output pcu_finishedband signal is given. Read only register. |
| 0x38 | NextBandCmdEnable | 4 | 0x0 | This register can be written to indirectly (i.e. the bits are set or cleared via writes to NextBandCmdAdr[n])<br>For each bit:<br>0 - do nothing at the next finishedBand[n] signal.<br>1 - Execute instructions at NextBandCmdAdr[n] as soon as possible after receipt of the next finishedBand[n] signal.<br>Bit0 - lbd_finishedband<br>Bit1 - cdu_finishedband<br>Bit2 - te_finishedband<br>Bit3 - pcu_finishedband<br>Read only register. |

21.8 Detailed Description

21.8.1 PEP Blocks Register Map

All PEP accesses are 32-bit register accesses.

From Table 140 it can be seen that four bits only are necessary to address each of the sub-blocks within the PEP part of SoPEC. Up to 14 bits may be used to address any configurable 32-bit register within PEP. This gives scope for 1024 configurable registers per sub-block. This address will come either from the CPU or from a command stored in DRAM. The bus is assembled as follows:

adr[15:12]=sub-block address adr[n:2]=32-bit register address within sub-block, only the number of bits required to decode the registers within each sub-block are used.

TABLE 141

PEP blocks Register Map

| Block | Block Select Decode = cpu_adr[15:12] |
|---|---|
| PCU | 0x0 |
| CDU | 0x1 |
| CFU | 0x2 |
| LBD | 0x3 |
| SFU | 0x4 |
| TE | 0x5 |
| TFU | 0x6 |

TABLE 141-continued

PEP blocks Register Map

| Block | Block Select Decode = cpu_adr[15:12] |
|---|---|
| HCU | 0x7 |
| DNC | 0x8 |
| DWU | 0x9 |
| LLU | 0xA |
| PHI | 0xB |
| Reserved | 0xC to 0xF |

21.8.2 Internal PCU PEP Protocol

The PCU performs PEP configuration register accesses via a select signal, pcu_<block>_sel. The read/write sense of the access is communicated via the pcu_rwn signal (1=read, 0=write). Write data is clocked out, and read data clocked in upon receipt of the appropriate select-read/write-address combination.

Figure 133:
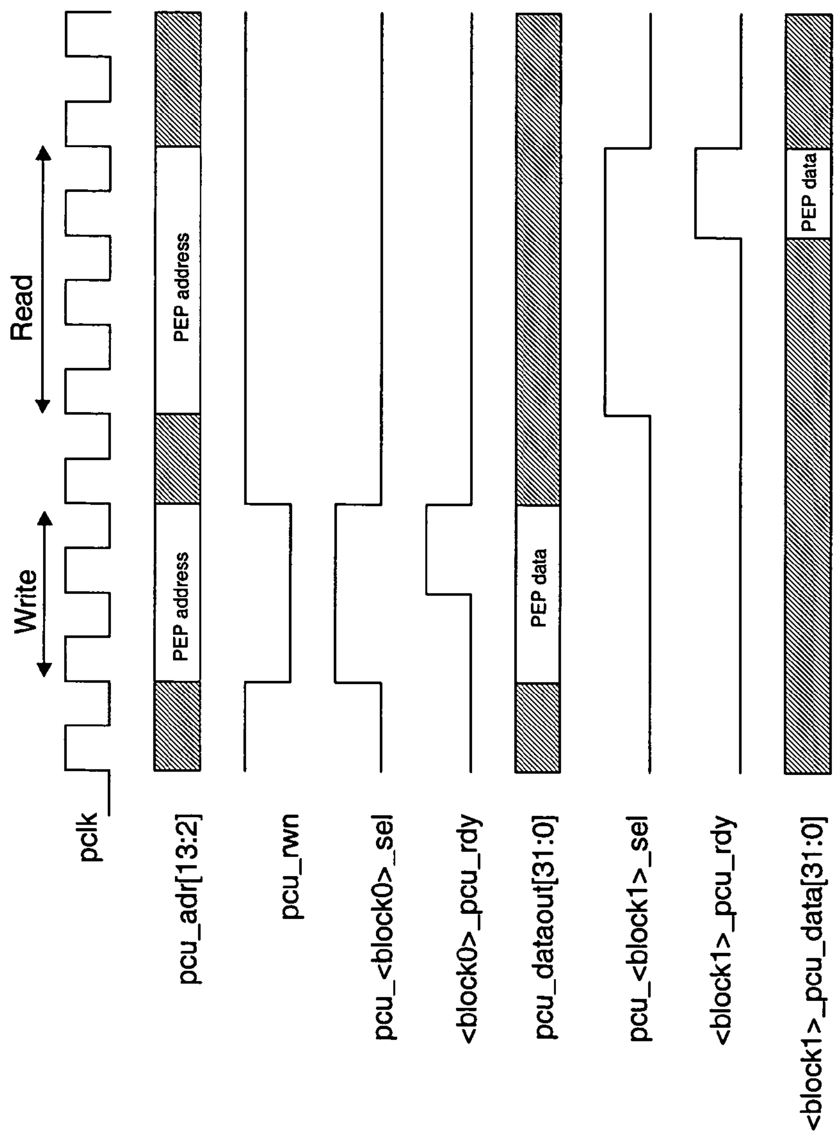
FIG. 133 shows PCU accesses to PEP registers
Figure 134:
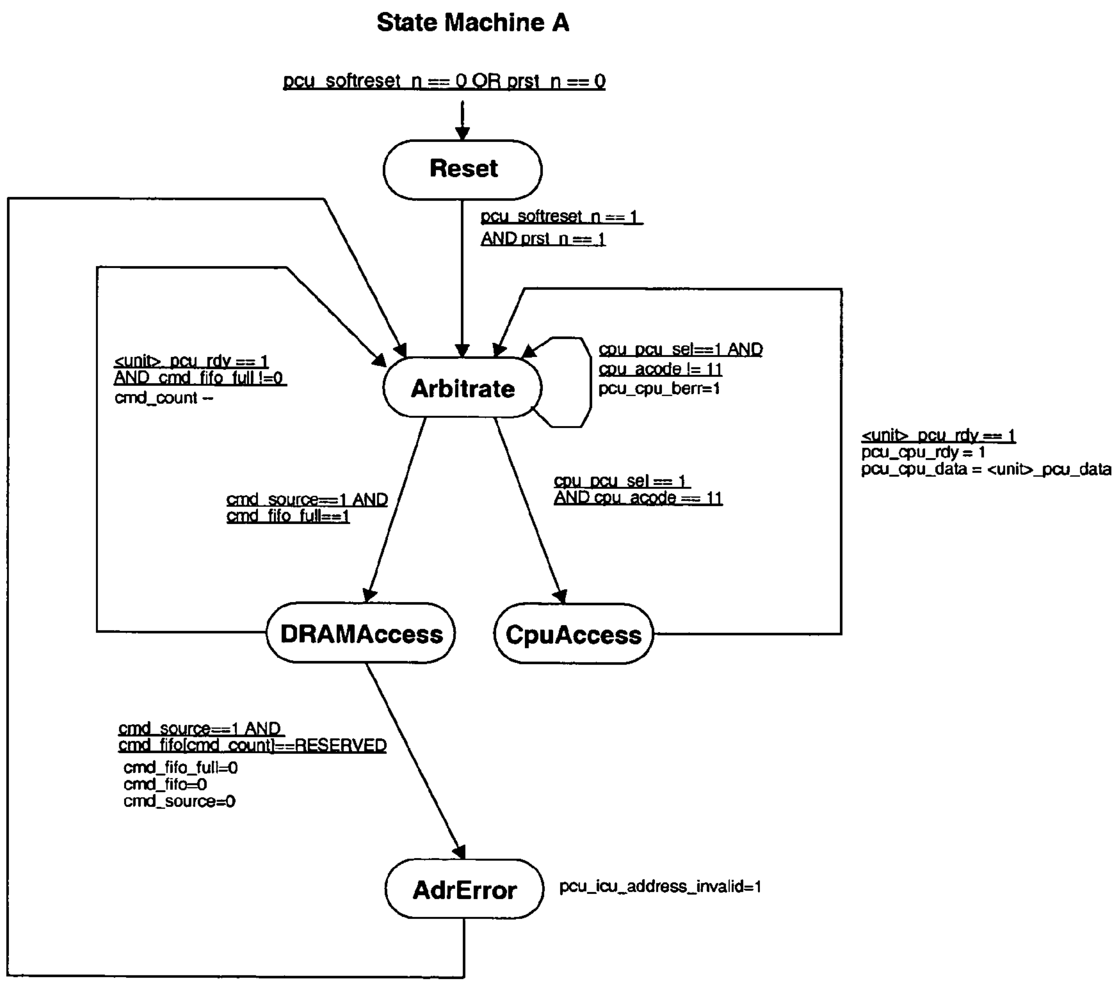
FIG. 134 shows command arbitration and execution
Figure 135:
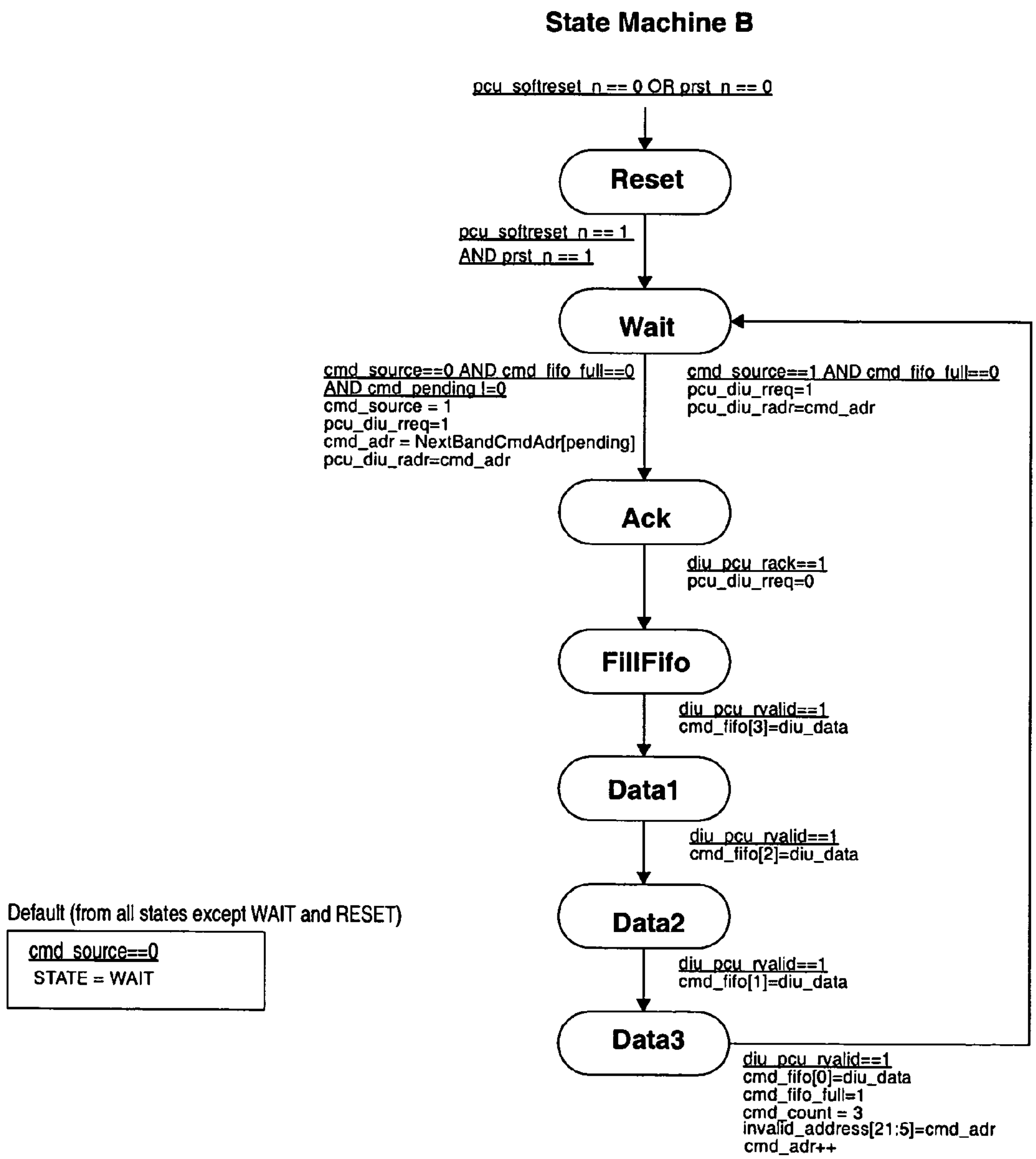
FIG. 135 shows DRAM command access state machine

FIG. 133 shows a write operation followed by a read operation. The read operation is shown with wait states while the PEP block returns the read data.

For access to the PEP blocks a simple bus protocol is used. The PCU first determines which particular PEP block is being addressed so that the appropriate block select signal can be generated. During a write access PCU write data is driven out with the address and block select signals in the first cycle of an access. The addressed PEP block responds by asserting its ready signal indicating that it has registered the write data and the access can complete. The write data bus is common to all PEP blocks.

A read access is initiated by driving the address and select signals during the first cycle of an access. The addressed PEP block responds by placing the read data on its bus and asserting its ready signal to indicate to the PCU that the read data is valid. Each block has a separate point-to-point data bus for read accesses to avoid the need for a tri-stateable bus.

Consecutive accesses to a PEP block must be separated by at least a single cycle, during which the select signal must be de-asserted.

21.8.3 PCU DRAM Access Requirements

The PCU can execute register programming commands stored in DRAM. These commands can be executed at the start of a print run to initialize all the registers of PEP. The PCU can also execute instructions at the start of a page, and between bands. In the inter-band time, it is critical to have the PCU operate as fast as possible. Therefore in the inter-page and inter-band time the PCU needs to get low latency access to DRAM.

A typical band change requires on the order of 4 commands to restart each of the CDU, LBD, and TE, followed by a single command to terminate the DRAM command stream. This is on the order of 5 commands per restart component.

The PCU does single 256 bit reads from DRAM. Each PCU command is 64 bits so each 256 bit DRAM read can contain 4 PCU commands. The requested command is read from DRAM together with the next 3 contiguous 64-bits which are cached to avoid unnecessary DRAM reads. Writing zero to CmdSource causes the PCU to flush commands and terminate program access from DRAM for that command stream. The PCU requires a 256-bit buffer to the 4 PCU commands read by each 256-bit DRAM access. When the buffer is empty the PCU can request DRAM access again. Adding a 256-bit double buffer would allow the next set of 4 commands to be fetched from DRAM while the current commands are being executed.

1024 commands of 64 bits requires 8 kB of DRAM storage.

Programs stored in DRAM are referred to as PCU Program Code.

21.8.4 End of Band Unit

The state machine is responsible for watching the various input xx_finishedband signals, setting the FinishedSoFar flags, and outputting the pcu_finishedband flags as specified by the BandSelect register.

Each cycle, the end of band unit performs the following tasks:

```
pcu_finishedband = (FinishedSoFar[0] == BandSelectMask[0]) AND
                   (FinishedSoFar[1] == BandSelectMask[1]) AND
                   (FinishedSoFar[2] == BandSelectMask[2]) AND
                   (BandSelectMask[0] OR BandSelectMask[1] OR BandSelectMask[2])
    if (pcu_finishedband == 1) then
        FinishedSoFar[0] = 0
        FinishedSoFar[1] = 0
        FinishedSoFar[2] = 0
    else
        FinishedSoFar[0] = (FinishedSoFar[0] OR lbd_finishedband) AND BandSelectMask[0]
        FinishedSoFar[1] = (FinishedSoFar[1] OR cdu_finishedband) AND BandSelectMask[1]
        FinishedSoFar[2] = (FinishedSoFar[2] OR te_finishedband) AND BandSelectMask[2]
```

Note that it is the responsibility of the microcode at the start of printing a page to ensure that all 3 FinishedSoFar bits are cleared. It is not necessary to clear them between bands since this happens automatically.

If a bit of BandSelectMask is cleared, then the corresponding bit of FinishedSoFar has no impact on the generation of pcu_finishedband.

21.8.5 Executing Commands From DRAM

Registers in PEP can be programmed by means of simple 64-bit commands fetched from DRAM. The format of the commands is given in Table 142. Register locations can have a data value of up to 32 bits. Commands are PEP register write commands only.

TABLE 142

Register write commands in PEP

| command | bits 63–32 | bits 31–16 | bits 15–2 | bits 1–0 |
|---|---|---|---|---|
| Register write | data | zero | 32-bit word address | zero |

Due attention must be paid to the endianness of the processor. The LEON processor is a big-endian processor (bit 7 is the most significant bit).

21.8.6 General Operation

Upon a Reset condition, CmdSource is cleared (to 0), which means that all commands are initially sourced only from the CPU bus interface. Registers and can then be written to or read from one location at a time via the CPU bus interface.

If CmdSource is 1, commands are sourced from the DRAM at CmdAdr and from the CPU bus.

Writing an address to CmdAdr automatically sets CmdSource to 1, and causes a command stream to be retrieved from DRAM. The PCU will execute commands from the CPU or from the DRAM command stream, giving higher priority to the CPU always.

If CmdSource is 0 the DRAM requester examines the CmdPending bits to determine if a new DRAM command stream is pending. If any of CmdPending bits are set, then the appropriate NextBandCmdAdr or NextCmdAdr is copied to CmdAdr (causing CmdSource to get set to 1) and a new command DRAM stream is retrieved from DRAM and executed by the PCU. If there are multiple pending commands the DRAM requestor will service the lowest number pending bit first. Note that a new DRAM command stream only gets retrieved when the current command stream is empty.

If there are no DRAM commands pending, and no CPU commands the PCU defaults to an idle state. When idle the PCU address bus defaults to the DebugSelect register value (bits 11 to 2 in particular) and the default unit PCU data bus is reflected to the CPU data bus. The default unit is determined by the DebugSelect register bits 15 to 12.

In conjunction with this, upon receipt of a finishedBand[n] signal, NextBandCmdEnable[n] is copied to CmdPending[n] and NextBandCmdEnable[n] is cleared. Note, each of the LBD, CDU, and TE (where present) may be re-programmed individually between bands by appropriately setting NextBandCmdAdr[2-0] respectively. However, execution of inter-band commands may be postponed until all blocks specified in the BandSelectMask register have pulsed their finishedband signal. This may be accomplished by only setting NextBandCmdAdr[3] (indirectly causing NextBandCmdEnable[3] to be set) in which case it is the pcu_finishedband signal which causes NextBandCmdEnable[3] to be copied to CmdPending[3].

To conveniently update multiple registers, for example at the start of printing a page, a series of Write Register commands can be stored in DRAM. When the start address of the first Write Register command is written to the CmdAdr register (via the CPU), the CmdSource register is automatically set to 1 to actually start the execution at CmdAdr. Alternatively the CPU can write to NextCmdAdr causing the CmdPending[4] bit to get set, which will then get serviced by the DRAM requester in the pending bit arbitration order.

The final instruction in the command block stored in DRAM must be a register write of 0 to CmdSource so that no more commands are read from DRAM. Subsequent commands will come from pending programs or can be sent via the CPU bus interface.

21.8.6.1 Debug Mode

Debug mode is implemented by reusing the normal CPU and DRAM access decode logic. When in the Arbitrate state (see state machine A below), the PEP address bus is defaulted to the value in the DebugSelect register. The top bits of the DebugSelect register are used to decode a select to a PEP unit and the remaining bits are reflected on the PEP address bus. The selected units read data bus is reflected on the pcu_cpu_data bus to the RDU in the CPU. The pcu_cpu_debug_valid signal indicates to the RDU that the data on the pcu_cpu_data bus is valid debug data.

Normal CPU and DRAM command access will require the PEP bus, and as such will cause the debug data to be invalid during the access, this is indicated to the RDU by setting pcu_cpu_debug_valid to zero.

The decode logic is:

```
// Default Debug decode
if state = = Arbitrate then
    if (cpu_pcu_sel = =         1  AND  cpu_acode  /=
SUPERVISOR_DATA_MODE) then
        pcu_cpu_debug_valid       = 0 // bus error
condition
        pcu_cpu_data              = 0
    else
        <unit>                    = decode(DebugSelect[15:12])
        if (<unit> = = PCU ) then
            pcu_cpu_data          = Internal PCU register
        else
            pcu_cpu_data          = <unit>_pcu_datain[31:0]
        pcu_adr[11:2]             = DebugSelect[11:2]
        pcu_cpu_debug_valid       = 1 AFTER 4 clock cycles
else
    pcu_cpu_debug_valid           = 0
```

21.8.7 State Machines

DRAM command fetching and general command execution is accomplished using two state machines. State machine A evaluates whether a CPU or DRAM command is being executed, and proceeds to execute the command(s). Since the CPU has priority over the DRAM it is permitted to interrupt the execution of a stream of DRAM commands.

Machine B decides which address should be used for DRAM access, fetches commands from DRAM and fills a command fifo which A executes. The reason for separating the two functions is to facilitate the execution of CPU or Debug commands while state machine B is performing DRAM reads and filling the command fifo. In the case where state machine A is ready to execute commands (in its Arbitrate state) and it sees both a full DRAM command fifo and an active cpu_pcu_sel then the DRAM commands are executed last.

21.8.7.1 State Machine A: Arbitration and Execution of Commands

The state-machine enters the Reset state when there is an active strobe on either the reset pin, prst_n, or the PCU's soft-reset register. All registers in the PCU are zeroed, unless otherwise specified, on the next rising clock edge. The PCU self-deasserts the soft reset in the pclk cycle after it has been asserted.

The state changes from Reset to Arbitrate when prst_n==1 and PCU_softreset==1.

The state-machine waits in the Arbitrate state until it detects a request for CPU access to the PEP units (cpu_pcu_sel==1 and cpu_acode==11) or a request to execute DRAM commands CmdSource==1, and DRAM commands are available, CmdFifoFull==1. Note if (cpu_pcu_sel==1 and cpu_acode !=11) the CPU is attempting an illegal access. The PCU ignores this command and strobes the cpu_pcu_berr for one cycle.

While in the Arbitrate state the machine assigns the DebugSelect register to the PCU unit decode logic and the remaining bits to the PEP address bus. When in this state the debug data returned from the selected PEP unit is reflected on the CPU bus (pcu_cpu_data bus) and the pcu_cpu_debug valid=1.

If a CPU access request is detected (cpu_pcu_sel==1 and cpu_acode==11) then the machine proceeds to the CpuAccess state. In the CpuAccess state the cpu address is decoded and used to determine the PEP unit to select. The remaining address bits are passed through to the PEP address bus. The machine remains in the CpuAccess state until a valid ready from the selected PEP unit is received. When received the machine returns to the arbitrate state, and the ready signal to the CPU is pulsed.

// decode the logic pcu_<unit>_sel =decode(cpu_adr[15:12])

pcu_adr[11:2]=cpu_adr[11:2]

The CPU is prevented from generating an invalid PEP unit address (prevented in the MMU) and so CPU accesses cannot generate an invalid address error.

If the state machine detects a request to execute DRAM commands (CmdSource==1), it will wait in the Arbitrate state until commands have been loaded into the command FIFO from DRAM (all controlled by state machine B). When the DRAM commands are available (cmd_fifo_full==1) the state machine will proceed to the DRAMAccess state.

When in the DRAMAccess state the commands are executed from the cmd_fifo. A command in the cmd_fifo consists of 64-bits (or which the FIFO holds 4). The decoding of the 64-bits to commands is given in Table. For each command the decode is // DRAM command decode pcu_<unit>_sel=decode(cmd_fifo[cmd_count] [15:12])

pcu_adr[11:2]=cmd_fifo[cmd_count] [11:2]

pcu_dataout=cmd_fifo[cmd_count] [63:32]

When the selected PEP unit returns a ready signal (<unit>_pcu_rdy==1) indicating the command has completed, the state machine will return to the Arbitrate state. If more commands exists (cmd_count !=0) the transition will decrement the command count.

When in the DRAMAccess state, if when decoding the DRAM command address bus (cmd_fifo[cmd_count] [15.12]), the address selects a reserved address, the state machine proceeds to the AdrError state, and then back to the Arbitrate state. An address error interrupt will be generated and the DRAM command FIFOs will be cleared.

A CPU access can pre-empt any pending DRAM commands. After each command is completed the state machine returns to the Arbitrate state. If a CPU access is required and DRAM command stream is executing the CPU access always takes priority. If a CPU or DRAM command sets the CmdSource to 0, all subsequent DRAM commands in the command FIFO are cleared. If the CPU sets the CmdSource to 0 the CmdPending and NextBandCmdEnable work registers are also cleared.

21.8.7.2 State Machine B: Fetching DRAM Commands

A system reset (prst_n==0) or a software reset (pcu_softreset_n==0) will cause the state machine to reset to the Reset state. The state machine remains in the Reset until both reset conditions are removed. When removed the machine proceeds to the Wait state.

The state machine waits in the Wait state until it determines that commands are needed from DRAM. Two possible conditions exist that require DRAM access. Either the PCU is processing commands which must be fetched from DRAM (cmd_source==1), and the command FIFO is empty (cmd_fifo_full==0), or the cmd_source==0 and the command FIFO is empty and there are some commands pending (cmd_pending !=0). In either of these conditions the machine proceeds to the Ack state and issues a read request to DRAM (pcu_diu_rreq==1), it calculates the address to read from dependent on the transition condition. In the command pending transition condition, the highest priority NextBandCmdAdr (or NextCmdAdr) that is pending is used for the read address (pcu_diu_radr) and is also copied to the CmdAdr register. If multiple pending bits are set the lowest pending bits are serviced first. In the normal PCU processing transition the pcu_diu_radr is the CmdAdr register.

When an acknowledge is received from the DRAM the state machine goes to the FillFifo state. In the FillFifo state the machine waits for the DRAM to respond to the read request and transfer data words. On receipt of the first word of data diu_pcu_rvalid==1, the machine stores the 64-bit data word in the command FIFO (cmd_fifo[3]) and transitions to the Data1, Data2, Data3 states each time waiting for a diu_pcu_rvalid==1 and storing the transferred data word to cmd_fifo[2], cmd_fifo[1] and cmd_fifo[0] respectively.

When the transfer is complete the machine returns to the Wait state, setting the cmd_count to 3, the cmd_fifo_full is set to 1 and the CmdAdr is incremented.

If the CPU sets the CmdSource register low while the PCU is in the middle of a DRAM access, the statemachine returns to the Wait state and the DRAM access is aborted.

21.8.7.3 PCU_ICU_Address_Invalid Interrupt

When the PCU is executing commands from DRAM, addresses decoded from commands which are not PCU mapped addresses (4-bits only) will result in the current command being ignored and the pcu_icu_address_invalid interrupt signal is strobed. When an invalid command occurs all remaining commands already retrieved from DRAM are flushed from the CmdFifo, and the CmdPending, NextBandCmdEnable and CmdSource registers are cleared to zero.

The CPU can then interrogate the PCU to find the source of the illegal DRAM command via the InvalidAddress register.

The CPU is prevented by the MMU from generating an invalid address command.

22 Contone Decoder Unit (CDU)

22.1 Overview

The Contone Decoder Unit (CDU) is responsible for performing the optional decompression of the contone data layer.

The input to the CDU is up to 4 planes of compressed contone data in JPEG interleaved format. This will typically be 3 planes, representing a CMY contone image, or 4 planes representing a CMYK contone image. The CDU must support a page of A4 length (11.7 inches) and Letter width (8.5 inches) at a resolution of 267 ppi in 4 colors and a print speed of 1 side per 2 seconds.

The CDU and the other page expansion units support the notion of page banding. A compressed page is divided into one or more bands, with a number of bands stored in memory. As a band of the page is consumed for printing a new band can be downloaded. The new band may be for the current page or the next page. Band-finish interrupts have been provided to notify the CPU of free buffer space.

The compressed contone data is read from the on-chip DRAM. The output of the CDU is the decompressed contone data, separated into planes. The decompressed contone image is written to a circular buffer in DRAM with an expected minimum size of 12 lines and a configurable maximum. The decompressed contone image is subsequently read a line at a time by the CFU, optionally color converted, scaled up to 1600 ppi and then passed on to the HCU for the next stage in the printing pipeline. The CDU also outputs a cdu_finishedband control flag indicating that the CDU has finished reading a band of compressed contone data in DRAM and that area of DRAM is now free. This flag is used by the PCU and is available as an interrupt to the CPU.

22.2 Storage Requirements for Decompressed Contone Data in DRAM

A single SoPEC must support a page of A4 length (11.7 inches) and Letter width (8.5 inches) at a resolution of 267 ppi in 4 colors and a print speed of 1 side per 2 seconds. The printheads specified in the Bi-lithic Printhead Specification [2] have 13824 nozzles per color to provide full bleed printing for A4 and Letter. At 267 ppi, there are 2304 contone pixels[9] per line represented by 288 JPEG blocks per color. However each of these blocks actually stores data for 8 lines, since a single JPEG block is 8×8 pixels. The CDU produces contone data for 8 lines in parallel, while the HCU processes data linearly across a line on a line by line basis. The contone data is decoded only once and then buffered in DRAM. This means we require two sets of 8 buffer-lines—one set of 8 buffer lines is being consumed by the CFU while the other set of 8 buffer lines is being generated by the CDU.

[9]Pixels may be 8, 16, 24 or 32 bits depending on the number of color planes (8-bits per color)

The buffer requirement can be reduced by using a 1.5 buffering scheme, where the CDU fills 8 lines while the CFU consumes 4 lines. The buffer space required is a minimum of 12 line stores per color, for a total space of 108 KBytes[10]. A circular buffer scheme is employed whereby the CDU may only begin to write a line of JPEG blocks (equals 8 lines of contone data) when there are 8-lines free in the buffer. Once the full 8 lines have been written by the CDU, the CFU may now begin to read them on a line by line basis.

[10]12 lines×4 colors×2304 bytes (assumes 267 ppi, 4 color, full bleed A4/Letter)

This reduction in buffering comes with the cost of an increased peak bandwidth requirement for the CDU write access to DRAM. The CDU must be able to write the decompressed contone at twice the rate at which the CFU reads the data. To allow for trade-offs to be made between peak bandwidth and amount of storage, the size of the circular buffer is configurable. For example, if the circular buffer is configured to be 16 lines it behaves like a double-buffer scheme where the peak bandwidth requirements of the CDU and CFU are equal. An increase over 16 lines allows the CDU to write ahead of the CFU and provides it with a margin to cope with very poor local compression ratios in the image.

SoPEC should also provide support for A3 printing and printing at resolutions above 267 ppi. This increases the storage requirement for the decompressed contone data (buffer) in DRAM. Table 143 gives the storage requirements for the decompressed contone data at some sample contone resolutions for different page sizes. It assumes 4 color planes of contone data and a 1.5 buffering scheme.

TABLE 143

Storage requirements for decompressed contone data (buffer)

| Page size | Contone resolution (ppi) | Scale factor[a] | Pixels per line | Storage required (kBytes) |
|---|---|---|---|---|
| A4/ Letter[b] | 267 | 6 | 2304 | 108[d] |
| | 400 | 4 | 3456 | 162 |
| | 800 | 2 | 6912 | 324 |
| A3[c] | 267 | 6 | 3248 | 152.25 |
| | 400 | 4 | 4872 | 228.37 |
| | 800 | 2 | 9744 | 456.75 |

[a]Required for CFU to convert to final output at 1600 dpi
[b]Bi-lithic printhead has 13824 nozzles per color providing full bleed printing for A4/Letter
[c]Bi-lithic printhead has 19488 nozzles per color providing full bleed printing for A3
[d]12 lines × 4 colors × 2304 bytes.

22.3 Decompression Performance Requirements

The JPEG decoder core can produce a single color pixel every system clock (pclk) cycle, making it capable of decoding at a peak output rate of 8 bits/cycle. SoPEC processes 1 dot (bi-level in 6 colors) per system clock cycle to achieve a print speed of 1 side per 2 seconds for full bleed A4/Letter printing. The CFU replicates pixels a scale factor (SF) number of times in both the horizontal and vertical directions to convert the final output to 1600 ppi. Thus the CFU consumes a 4 color pixel (32 bits) every SF×SF cycles. The 1.5 buffering scheme described in section 22.2 on page 327 means that the CDU must write the data at twice this rate. With support for 4 colors at 267 ppi, the decompression output bandwidth requirement is 1.78 bits/cycle[11].

[11]2×((4 colors×8 bits)/(6×6 cycles))=1.78 bits/cycle

The JPEG decoder is fed directly from the main memory via the DRAM interface. The amount of compression determines the input bandwidth requirements for the CDU. As the level of compression increases, the bandwidth decreases, but the quality of the final output image can also decrease. Although the average compression ratio for contone data is expected to be 10:1, the average bandwidth allocated to the CDU allows for a local minimum compression ratio of 5:1 over a single line of JPEG blocks. This equates to a peak input bandwidth requirement of 0.36 bits/cycle for 4 colors at 267 ppi, full bleed A4/Letter printing at 1 side per 2 seconds.

Table 144 gives the decompression output bandwidth requirements for different resolutions of contone data to meet a print speed of 1 side per 2 seconds. Higher resolution requires higher bandwidth and larger storage for decompressed contone data in DRAM. A resolution of 400 ppi contone data in 4 colors requires 4 bits/cycle[12], which is practical using a 1.5 buffering scheme. However, a resolution of 800 ppi would require a double buffering scheme (16 lines) so the CDU only has to match the CFU consumption rate. In this case the decompression output bandwidth requirement is 8 bits/cycle[13], the limiting factor being the output rate of the JPEG decoder core.

[12]2×((4 colors×8 bits)/(4×4 cycles))=4 bits/cycle
[13](4 colors×8 bits)/(2×2 cycles)=8 bits/cycle

TABLE 144

CDU performance requirements for full bleed A4/Letter printing at 1 side per 2 seconds.

| Contone resolution (ppi) | Scale factor | Decompression output bandwidth requirement (bits/cycle)[a] |
|---|---|---|
| 267 | 6 | 1.78 |
| 400 | 4 | 4 |
| 800 | 2 | 8[b] |

[a]Assumes 4 color pixel contone data and a 12 line buffer.
[b]Scale factor 2 requires at least a 16 line buffer.

22.4 Data Flow

Figure 136:
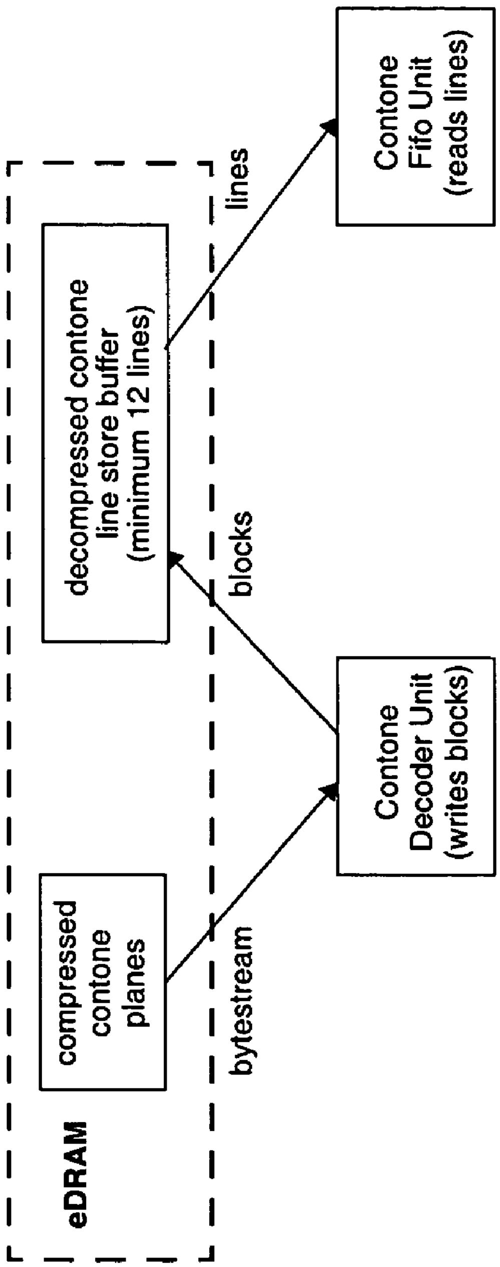
FIG. 136 shows an outline of contone data flow with respect to CDU

FIG. 136 shows the general data flow for contone data—compressed contone planes are read from DRAM by the CDU, and the decompressed contone data is written to the 12-line circular buffer in DRAM. The line buffers are subsequently read by the CFU.

The CDU allows the contone data to be passed directly on, which will be the case if the color represented by each color plane in the JPEG image is an available ink. For example, the four colors may be C, M, Y, and K, directly represented by CMYK inks. The four colors may represent gold, metallic green etc. for multi-SoPEC printing with exact colors.

However JPEG produces better compression ratios for a given visible quality when luminance and chrominance channels are separated. With CMYK, K can be considered to be luminance, but C, M, and Y each contain luminance information, and so would need to be compressed with appropriate luminance tables. We therefore provide the means by which CMY can be passed to SoPEC as YCrCb. K does not need color conversion. When being JPEG compressed, CMY is typically converted to RGB, then to YCrCb and then finally JPEG compressed. At decompression, the YCrCb data is obtained and written to the decompressed contone store by the CDU. This is read by the CFU where the YCrCb can then be optionally color converted to RGB, and finally back to CMY.

The external RIP provides conversion from RGB to YCrCb, specifically to match the actual hardware implementation of the inverse transform within SoPEC, as per CCIR 601-2 [24] except that Y, Cr and Cb are normalized to occupy all 256 levels of an 8-bit binary encoding.

The CFU provides the translation to either RGB or CMY. RGB is included since it is a necessary step to produce CMY, and some printers increase their color gamut by including RGB inks as well as CMYK.

22.5 Implementation

Figure 137:
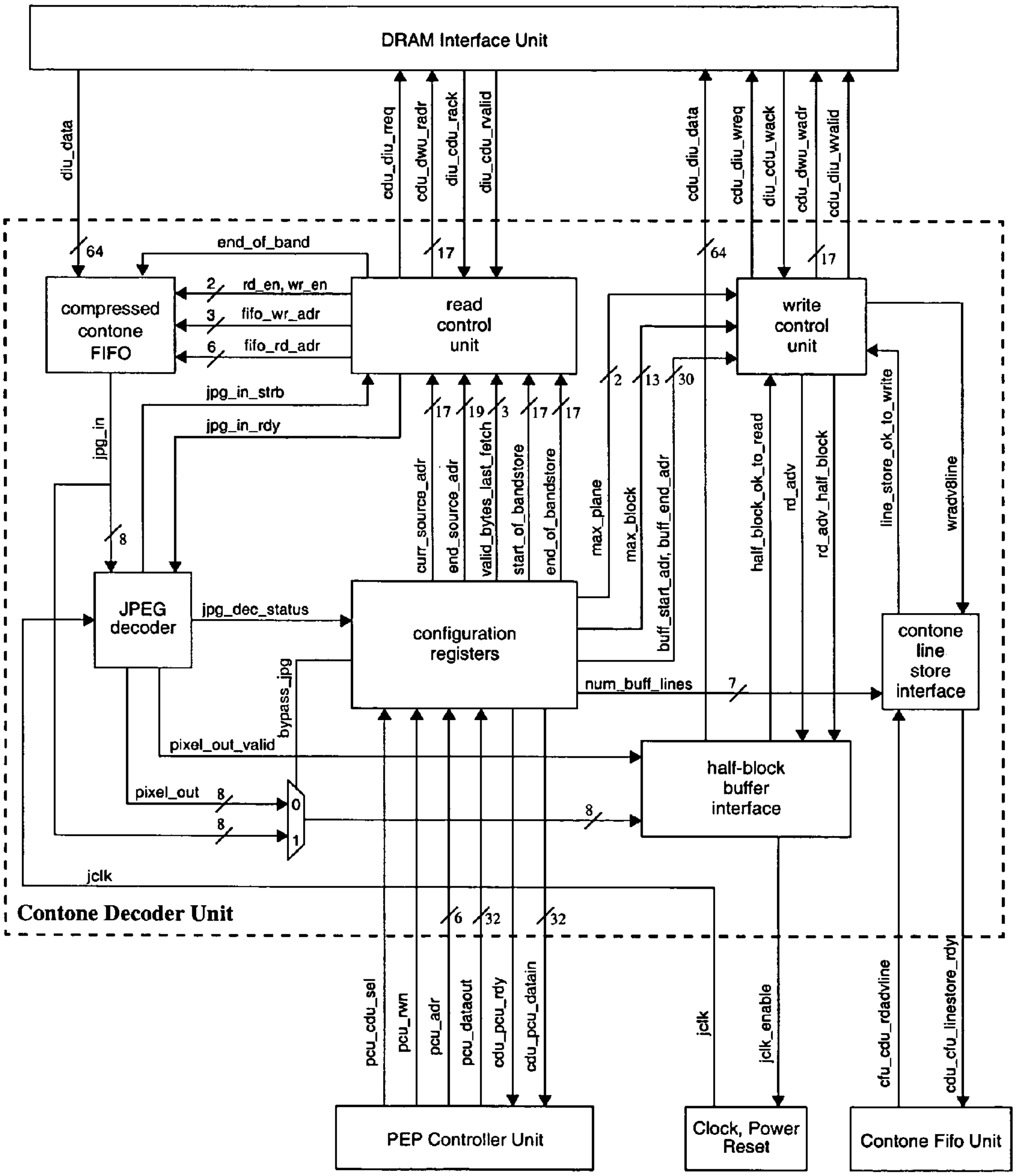
FIG. 137 shows a DRAM storage arrangement for a single line of JPEG 8×8 blocks in 4 colors

A block diagram of the CDU is shown in FIG. 137.

All output signals from the CDU (cdu_cfu_wradv8line, cdu_finishedband, cdu_icu_jpegerror, and control signals to the DIU) must always be valid after reset. If the CDU is not currently decoding, cdu_cfu_wradv8line, cdu_finishedband and cdu_icu_jpegerror will always be 0.

The read control unit is responsible for keeping the JPEG decoder's input FIFO full by reading compressed contone bytestream from external DRAM via the DIU, and produces the cdu_finishedband signal. The write control unit accepts the output from the JPEG decoder a half JPEG block (32 bytes) at a time, writes it into a double-buffer, and writes the double buffered decompressed half blocks to DRAM via the DIU, interacting with the CFU in order to share DRAM buffers.

22.5.1 Definitions of I/O

TABLE 145

CDU port list and description

| Port name | Pins | I/O | Description |
|---|---|---|---|
| Clocks and reset | | | |
| Pclk | 1 | In | System clock. |
| Jclk | 1 | In | Gated version of system clock used to clock the JPEG decoder core and logic at the output of the core. Allows for stalling of the JPEG core at a pixel sample boundary. |
| jclk_enable | 1 | Out | Gating signal for jclk. |
| prst_n | 1 | In | System reset, synchronous active low. |
| jrst_n | 1 | In | Reset for jclk domain, synchronous active low. |
| PCU interface | | | |
| pcu_cdu_sel | 1 | In | Block select from the PCU. When pcu_cdu_sel is high both pcu_adr and pcu_dataout are valid. |
| pcu_rwn | 1 | In | Common read/not-write signal from the PCU. |
| pcu_adr[7:2] | 6 | In | PCU address bus. Only 6 bits are required to decode the address space for this block. |
| pcu_dataout[31:0] | 32 | In | Shared write data bus from the PCU. |
| cdu_pcu_rdy | 1 | Out | Ready signal to the PCU. When cdu_pcu_rdy is high it indicates the last cycle of the access. For a write cycle this means pcu_dataout has been registered by the block and for a read cycle this means the data on cdu_pcu_datain is valid. |
| cdu_pcu_datain[31:0] | 32 | Out | Read data bus to the PCU. |
| DIU read interface | | | |
| cdu_diu_rreq | 1 | Out | CDU read request, active high. A read request must be accompanied by a valid read address. |
| diu_cdu_rack | 1 | In | Acknowledge from DIU, active high. |

TABLE 145-continued

CDU port list and description

| Port name | Pins | I/O | Description |
|---|---|---|---|
| | | | Indicates that a read request has been accepted and the new read address can be placed on the address bus, cdu_diu_radr. |
| cdu_diu_radr[21:5] | 17 | Out | CDU read address. 17 bits wide (256-bit aligned word). |
| diu_cdu_rvalid | 1 | In | Read data valid, active high. Indicates that valid read data is now on the read data bus, diu_data. |
| diu_data[63:0] | 64 | In | Read data from DRAM. |
| DIU write interface | | | |
| cdu_diu_wreq | 1 | Out | CDU write request, active high. A write request must be accompanied by a valid write address and valid write data. |
| diu_cdu_wack | 1 | In | Acknowledge from DIU, active high. Indicates that a write request has been accepted and the new write address can be placed on the address bus, cdu_diu_wadr. |
| cdu_diu_wadr[21:3] | 19 | Out | CDU write address. 19 bits wide (64-bit aligned word). |
| cdu_diu_wvalid | 1 | Out | Write data valid, active high. Indicates that valid data is now on the write data bus, cdu_diu_data. |
| cdu_diu_data[63:0] | 64 | Out | Write data bus. |
| CFU interface | | | |
| cfu_cdu_rdadvline | 1 | In | Read line pulse, active high. Indicates that the CFU has finished reading a line of decompressed contone data to the circular buffer in DRAM and that line of the buffer is now free. |
| cdu_cfu_linestore_rdy | 1 | Out | Indicates if the contone line store has 1 or more lines available to read by the CFU. |
| TE and LBD interface | | | |
| cdu_start_of_bandstore[21:5] | 17 | Out | Points to the 256-bit word that defines the start of the memory area allocated for page bands. |
| cdu_end_of_bandstore[21:5] | 17 | Out | Points to the 256-bit word that defines the last address of the memory area allocated for page bands. |
| ICU interface | | | |
| cdu_finishedband | 1 | Out | CDU's finishedBand flag, active high. Interrupt to the CPU to indicate that the CDU has finished processing a band of compressed contone data in DRAM and that area of DRAM is now free. This signal goes to both the interrupt controller and the PCU. |
| cdu_icu_jpegerror | 1 | Out | Active high interrupt indicating an error has occurred in the JPEG decoding process and decompression has stopped. A reset of the CDU must be performed to clear this interrupt. |

22.5.2 Configuration Registers

The configuration registers in the CDU are programmed via the PCU interface. Refer to section 21.8.2 on page 321 for the description of the protocol and timing diagrams for reading and writing registers in the CDU. Note that since addresses in SoPEC are byte aligned and the PCU only supports 32-bit register reads and writes, the lower 2 bits of the PCU address bus are not required to decode the address space for the CDU. When reading a register that is less than 32 bits wide zeros should be returned on the upper unused bit(s) of cdu_pcu_datain.

Since the CDU, LBD and TE all access the page band store, they share two registers that enable sequential memory accesses to the page band stores to be circular in nature. Table 146 lists these two registers.

TABLE 146

Registers shared between the CDU, LBD, and TE

| Address (CDU_base+) | Register name | #bits | Value on reset | description |
|---|---|---|---|---|
| Setup registers (remain constant during the processing of multiple bands) | | | | |
| 0x80 | StartOfBandStore[21:5] | 17 | 0x0_0000 | Points to the 256-bit word that defines the start of the memory area allocated for page bands. Circular address generation wraps to this start address. |
| 0x84 | EndOfBandStore[21:5] | 17 | 0x1_3FFF | Points to the 256-bit word that defines the last address of the memory area allocated for page bands. If the current read address is from this address, then instead of adding 1 to the current address, the current address will be loaded from the StartOfBandStore register. |

The software reset logic should include a circuit to ensure that both the pclk and jclk domains are reset regardless of the state of the jclk_enable when the reset is initiated.

The CDU contains the following additional registers:

TABLE 147

CDU registers

| Address (CDU_base+) | Register name | #bits | Value on reset | Description |
|---|---|---|---|---|
| Control registers | | | | |
| 0x00 | Reset | 1 | 0x1 | A write to this register causes a reset of the CDU. This terminates all internal operations within the CS6150. All configuration data previously loaded into the core except for the tables is deleted. |
| 0x04 | Go | 1 | 0x0 | Writing 1 to this register starts the CDU. Writing 0 to this register halts the CDU. When Go is deasserted the state-machines go to their idle states but all counters and configuration registers keep their values. When Go is asserted all counters are reset, but configuration registers keep their values (i.e. they don't get reset). NextBandEnable is cleared when Go is asserted. The CPU must be started before the CDU is started. Go must |

TABLE 147-continued

CDU registers

| Address (CDU_base+) | Register name | #bits | Value on reset | Description |
|---|---|---|---|---|
| | | | | remain low for at least 384 jclk cycles after a hardware reset (prst_n = 0) to allow the JPEG core to complete its memory itnitialisation sequence. This register can be read to determine if the CDU is running (1 - running, 0 - stopped). |
| Setup registers | | | | |
| 0x0C | NumLinesAvail | 7 | 0x0 | The number of image lines of data that there is space available for in the decompressed data buffer in DRAM. If this drops < 8 the CDU will stall. In normal operation this value will start off atNumBuffLines and will be decremented by 8 whenever the CDU writes a line of JPEG blocks (8 lines of data) to DRAM and incremented by 1 whenever the CPU reads a line of data from DRAM. NumLinesAvail can be overwritten by the CPU to prevent the CDU from stalling. |
| 0x10 | MaxPlane | 2 | 0x0 | Defines the number of contone planes - 1. For example, this will be 0 for K (greyscale printing), 2 for CMY, and 3 for CMYK. |
| 0x14 | MaxBlock | 13 | 0x000 | Number of JPEG MCUs (or JPEG block equivalents, i.e. 8 × 8 bytes) in a line - 1. |
| 0x18 | BuffStartAdr[21:7] | 15 | 0x0000 | Points to the start of the decompressed contone circular buffer in DRAM, aligned to a half JPEG block boundary. A half JPEG block consists of 4 words of 256-bits, enough to hold 32 contone pixels in 4 colors, i.e. half a JPEG block. |
| 0x1C | BuffEndAdr[21:7] | 15 | 0x0000 | Points to the start of the last half JPEG block at the end of the decompressed contone circular buffer in DRAM, aligned to a half JPEG block boundary. A half JPEG block consists of 4 words of 256-bits, enough to hold 32 contone pixels in 4 colors, i.e. half a JPEG block. |
| 0x20 | NumBuffLines[6:2] | 5 | 0x03 | Defines size of buffer in DRAM in terms of the number of decompressed contone lines. The size of the buffer should be a multiple of 4 lines with a minimum size of 8 lines. |

TABLE 147-continued

CDU registers

| Address (CDU_base+) | Register name | #bits | Value on reset | Description |
|---|---|---|---|---|
| 0x24 | BypassJpg | 1 | 0x0 | Determines whether or not the JPEG decoder will be bypassed (and hence pixels are copied directly from input to output) 0 - don't bypass, 1 - bypass Should not be changed between bands. |
| 0x30 | NextBandCurrSourceAdr[21:5] | 17 | 0x0_0000 | The 256-bit aligned word address containing the start of the next band of compressed contone data in DRAM. This value is copied to CurrSourceAdr when both DoneBand is 1 and NextBandEnable is 1, or when Go transitions from 0 to 1. |
| 0x34 | NextBandEndSourceAdr[21:3] | 19 | 0x0_0000 | The 64-bit aligned word address containing the last bytes of the next band of compressed contone data in DRAM. This value is copied to EndSourceAdrm when when both DoneBand is 1 and NextBandEnable is 1, or when Go transitions from 0 to 1. |
| 0x38 | NextBandValidBytesLastFetch | 3 | 0x0 | Indicates the number of valid bytes - 1 in the last 64-bit fetch of the next band of compressed contone data from DRAM. eg 0 implies bits 7:0 are valid, 1 implies bits 15:0 are valid, 7 implies all 63:0 bits are valid etc. This value is copied to ValidBytesLastFetch when both DoneBand is 1 and NextBandEnable is 1, or when Go transitions from 0 to 1. |
| 0x3C | NextBandEnable | 1 | 0x0 | When NextBandEnable is 1 and DoneBand is 1 NextBandCurrSourceAdr is copied to CurrSourceAdr, NextBandEndSourceAdr is copied to EndSourceAdr NextBandValidBytesLastFetch is copied to ValidBytesLastFetch DoneBand is cleared, NextBandEnable is cleared. NextBandEnable is cleared when Go is asserted. Note that DoneBand gets cleared regardless of the state of Go. |
| Read-only registers | | | | |
| 0x40 | DoneBand | 1 | 0x0 | Specifies whether or not the current band has finished loading into the local FIFO. It is cleared to 0 when Go transitions from 0 to 1. When the |

TABLE 147-continued

CDU registers

| Address (CDU_base+) | Register name | #bits | Value on reset | Description |
|---|---|---|---|---|
| | | | | last of the compressed contone data for the band has been loaded into the local FIFO, the cdu_finishedband signal is given out and the DoneBandflag is set. If NextBandEnable is 1 at this time then CurrSourceAdr, EndSourceAdr and ValidBytesLastFetch are updated with the values for the next band and DoneBand is cleared. Processing of the next band starts immediately. If NextBandEnable is 0 then the remainder of the CDU will continue to run, decompressing the data already loaded, while the read control unit waits for NextBandEnable to be set before it restarts. |
| 0x44 | CurrSourceAdr[21:5] | 17 | 0x0_0000 | The current 256-bit aligned word address within the current band of compressed contone data in DRAM. |
| 0x48 | EndSourceAdr[21:3] | 19 | 0x0_0000 | The 64-bit aligned word address containing the last bytes of the current band of compressed contone data in DRAM. |
| 0x4C | ValidBytesLastFetch | 3 | 0x00 | Indicates the number of valid bytes - 1 in the last 64-bit fetch of the current band of compressed contone data from DRAM. eg 0 implies bits 7:0 are valid, 1 implies bits 15:0 are valid, 7 implies all 63:0 bits are valid etc. |
| JPEG decoder core setup registers | | | | |
| 0x50 | JpgDecMask | 5 | 0x00 | As segments are decoded they can also be output on the DecJpg (JpgDecHdr) port with the user selecting the segments for output by setting bits in the JpgDecMask port as follows:<br>4 SOF + SOS + DNL<br>3 COM + APP<br>2 DRI<br>1 DQT<br>0 DHT<br>If any one of the bits of JpgDecMask is asserted then the SOI and EOI markers are also passed to the DecJpg port. |
| 0x54 | JpgDecTType | 1 | 0x0 | Test type selector:<br>0 - DCT coefficients |

TABLE 147-continued

CDU registers

| Address (CDU_base+) | Register name | #bits | Value on reset | Description |
|---|---|---|---|---|
| | | | | displayed on JpgDecTdata 1 - QDCT coefficient displayed on JpgDecTdata |
| 0x58 | JpgDecTestEn | 1 | 0x0 | Signal which causes the memories to be bypassed for test purposes. |
| 0x5C | JpgDecPType | 4 | 0x0 | Signal specifying parameters to be placed on port JpgDecPValue (See Table). |
| JPEG decoder core read-only status registers | | | | |
| 0x60 | JpgDecHdr | 8 | 0x00 | Selected header segments from the JPEG stream that is currently being decoded. Segments selected using JpgMask. |
| 0x64 | JpgDecTData | 13 | 0x0000 | 12 - TSOS output of CS1650, indicates the first output byte of the first 8 × 8 block of the test data. 11 - TSOB output of CS1650, indicates the first output byte of each 8 × 8 block of test data. 10-0 - 11-bit output test data port - displays DCT coefficients or quantized coefficients depending on value of JpgDecTType. |
| 0x68 | JpgDecPValue | 16 | 0x0000 | Decoding parameter bus which enables various parameters used by the core to be read. The data available on the PValue port is for information only, and does not contain control signals for the decoder core. |
| 0x6C | JpgDecStatus | 24 | 0x00_0000 | Bit 23 - jpg_core_stall (if set, indicates that the JPEG core is stalled by gating of jclk as the output JPEG halfblock double-buffers of the CDU are full) Bit 22 - pix_out_valid (This signal is an output from the JPEG decoder core and is asserted when a pixel is being output Bits 21–16 - fifo_contents (Number of bytes in compressed contone FIFO at the input of CDU which feeds the JPEG decoder core) Bits 15–0 are JPEG decoder status outputs from the CS6150 (see Table for description of bits). |

22.5.3 Typical Operation

The CDU should only be started after the CFU has been started.

For the first band of data, users set up NextBandCurrSourceAdr, NextBandEndSourceAdr, NextBandValidBytesLastFetch, and the various MaxPlane, MaxBlock, BuffStartBlockAdr, BuffEndBlockAdr and NumBuffLines. Users then set the CDU's Go bit to start processing of the band. When the compressed contone data for the band has finished being read in, the cdu_finishedband interrupt will be sent to the PCU and CPU indicating that the memory associated with the first band is now free. Processing can now start on the next band of contone data.

In order to process the next band NextBandCurrSourceAdr, NextBandEndSourceAdr and NextBandValidBytesLastFetch need to be updated before finally writing a 1 to NextBandEnable. There are 4 mechanisms for restarting the CDU between bands:

a. cdu_finishedband causes an interrupt to the CPU. The CDU will have set its DoneBand bit. The CPU reprograms the NextBandCurrSourceAdr, NextBandEndSourceAdr and NextBandValidBytesLastFetch registers, and sets NextBandEnable to restart the CDU.

b. The CPU programs the CDU's NextBandCurrSourceAdr, NextBandCurrEndAdr and NextBandValidBytesLastFetch registers and sets the NextBandEnable bit before the end of the current band. At the end of the current band the CDU sets DoneBand. As NextBandEnable is already 1, the CDU starts processing the next band immediately.

c. The PCU is programmed so that cdu_finishedband triggers the PCU to execute commands from DRAM to reprogram the NextBandCurrSourceAdr, NextBandEndSourceAdr and NextBandValidBytesLastFetch registers and set the NextBandEnable bit to start the CDU processing the next band. The advantage of this scheme is that the CPU could process band headers in advance and store the band commands in DRAM ready for execution.

d. This is a combination of b and c above. The PCU (rather than the CPU in b) programs the CDU's NextBandCurrSourceAdr, NextBandCurrEndAdr and NextBandValidBytesLastFetch registers and sets the NextBandEnable bit before the end of the current band. At the end of the current band the CDU sets DoneBand and pulses cdu_finishedband. As NextBandEnable is already 1, the CDU starts processing the next band immediately. Simultaneously, cdu_finishedband triggers the PCU to fetch commands from DRAM. The CDU will have restarted by the time the PCU has fetched commands from DRAM. The PCU commands program the CDU's next band shadow registers and sets the NextBandEnable bit.

If an error occurs in the JPEG stream, the JPEG decoder will suspend its operation, an error bit will be set in the JpgDecStatus register and the core will ignore any input data and await a reset before starting decoding again. An interrupt is sent to the CPU by asserting cdu_icu_jpegerror and the CDU should then be reset by means of a write to its Reset register before a new page can be printed.

22.5.4 Read Control Unit

Figure 138:
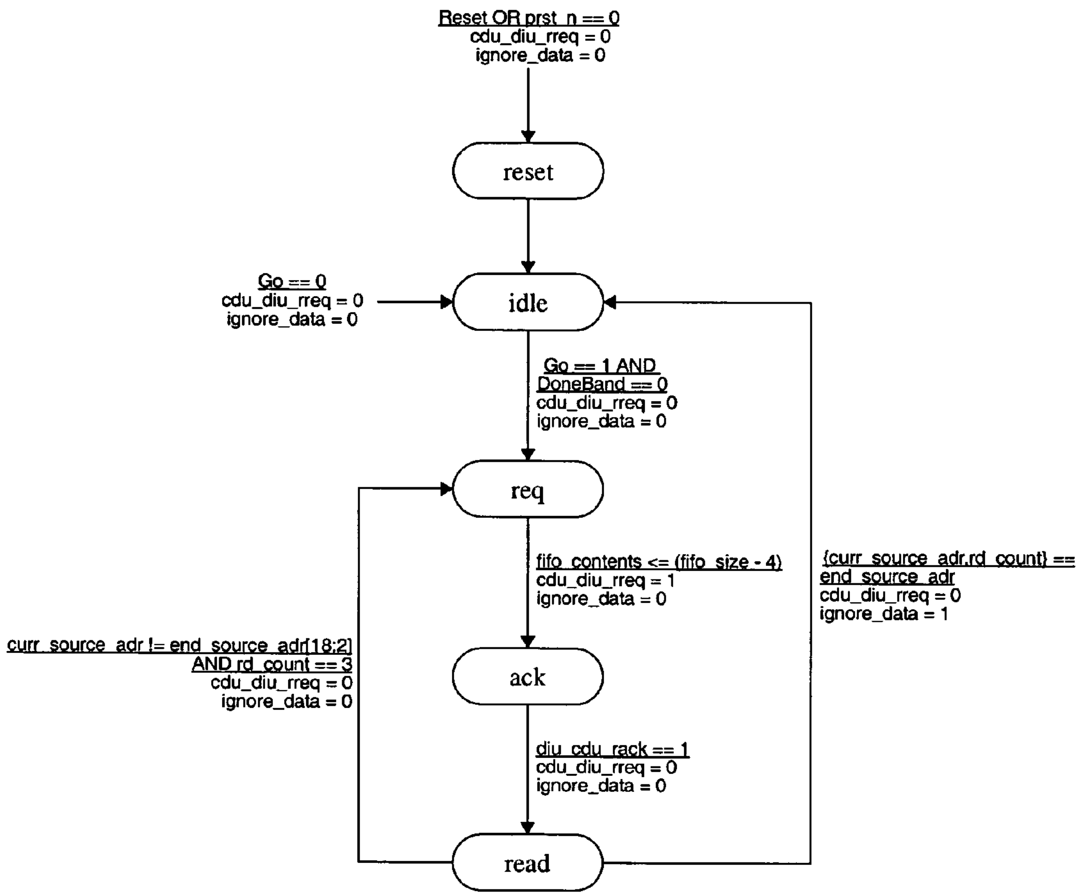
FIG. 138 shows a read control unit state machine

The read control unit is responsible for reading the compressed contone data and passing it to the JPEG decoder via the FIFO. The compressed contone data is read from DRAM in single 256-bit accesses, receiving the data from the DIU over 4 clock cycles (64-bits per cycle). The protocol and timing for read accesses to DRAM is described in section 20.9.1 on page 240. Read accesses to DRAM are implemented by means of the state machine described in FIG. 138. All counters and flags should be cleared after reset. When Go transitions from 0 to 1 all counters and flags should take their initial value. While the Go bit is set, the state machine relies on the DoneBand bit to tell it whether to attempt to read a band of compressed contone data. When DoneBand is set, the state machine does nothing. When DoneBand is clear, the state machine continues to load data into the JPEG input FIFO up to 256-bits at a time while there is space available in the FIFO. Note that the state machine has no knowledge about numbers of blocks or numbers of color planes—it merely keeps the JPEG input FIFO full by consecutive reads from DRAM. The DIU is responsible for ensuring that DRAM requests are satisfied at least at the peak DRAM read bandwidth of 0.36 bits/cycle (see section 22.3 on page 329).

A modulo 4 counter, rd_count, is use to count each of the 64-bits received in a 256-bit read access. It is incremented whenever diu_cdu_rvalid is asserted. As each 64-bit value is returned, indicated by diu_cdu_rvalid being asserted, curr_source_adr is compared to both end_source_adr and end_of_bandstore:

If {curr_source_adr rd_count} equals end_source_adr, the end_of_band control signal sent to the FIFO is 1 (to signify the end of the band), the finishedCDUBand signal is output, and the DoneBand bit is set. The remaining 64-bit values in the burst from the DIU are ignored, i.e. they are not written into the FIFO.

If rd_count equals 3 and {curr_source_adr, rd_count} does not equal end_source_adr, then curr_source_adr is updated to be either start_of_bandstore or curr_source_adr+1, depending on whether curr_source_adr also equals end_of_bandstore. The end_of_band control signal sent to the FIFO is 0.

curr_source_adr is output to the DIU as cdu_diu_radr.

A count is kept of the number of 64-bit values in the FIFO. When diu_cdu_rvalid is 1 and ignore_data is 0, data is written to the FIFO by asserting FifoWr, and fifo_contents[3:0] and fifo_wr_adr[2:0] are both incremented.

When fifo_contents[3:0] is greater than 0, jpg_in_strb is asserted to indicate that there is data available in the FIFO for the JPEG decoder core. The JPEG decoder core asserts jpg_in_rdy when it is ready to receive data from the FIFO. Note it is also possible to bypass the JPEG decoder core by setting the BypassJpg register to 1. In this case data is sent directly from the FIFO to the half-block double-buffer. While the JPEG decoder is not stalled (jpg_core_stall equal 0), and jpg_in_rdy (or bypass_jpg) and jpg_in_strb are both 1, a byte of data is consumed by the JPEG decoder core. fifo_rd_adr[5:0] is then incremented to select the next byte. The read address is byte aligned, i.e. the upper 3 bits are input as the read address for the FIFO and the lower 3 bits are used to select a byte from the 64 bits. If fifo_rd_adr[2:0=111 then the next 64-bit value is read from the FIFO by asserting fifo_rd, and fifo_contents[3:0] is decremented.

22.5.5 Compressed Contone FIFO

The compressed contone FIFO conceptually is a 64-bit input, and 8-bit output FIFO to account for the 64-bit data transfers from the DIU, and the 8-bit requirement of the JPEG decoder.

In reality, the FIFO is actually 8 entries deep and 65-bits wide (to accommodate two 256-bit accesses), with bits 63–0 carrying data, and bit 64 containing a 1-bit end_of_band flag. Whenever 64-bit data is written to the FIFO from the DIU, an end of band flag is also passed in from the read control unit. The end_of_band bit is 1 if this is the last data transfer for the current band, and 0 if it is not the last transfer. When end_of_band=1 during an input, the ValidBytesLastFetch register is also copied to an image version of the same.

On the JPEG decoder side of the FIFO, the read address is byte aligned, i.e. the upper 3 bits are input as the read address for the FIFO and the lower 3 bits are used to select a byte from the 64 bits (1st byte corresponds to bits 7–0, second byte to bits 15–8 etc.). If bit 64 is set on the read, bits 63–0 contain the end of the bytestream for that band, and only the bytes specified by the image of ValidBytesLastFetch are valid bytes to be read and presented to the JPEG decoder. Note that ValidBytesLastFetch is copied to an image register as it may be possible for the CDU to be reprogrammed for the next band before the previous band's compressed contone data has been read from the FIFO (as an additional effect of this, the CDU has a non-problematic limitation in that each band of contone data must be more than 4×64-bits, or 32 bytes, in length).

22.5.6 CS6150 JPEG Decoder

JPEG decoder functionality is implemented by means of a modified version of the Amphion CS6150 JPEG decoder core. The decoder is run at a nominal clock speed of 160 MHz. (Amphion have stated that the CS6150 JPEG decoder core can run at 185 MHz in 0.13 um technology). The core is clocked by jclk which a gated version of the system clock pclk. Gating the clock provides a mechanism for stalling the JPEG decoder on a single color pixel-by-pixel basis. Control of the flow of output data is also provided by the PixOutEnab input to the JPEG decoder. However, this only allows stalling of the output at a JPEG block boundary and is insufficient for SoPEC. Thus gating of the clock is employed and PixOutEnab is instead tied high.

The CS6150 decoder automatically extracts all relevant parameters from the JPEG bytestream and uses them to control the decoding of the image. The JPEG bytestream contains data for the Huffman tables, quantization tables, restart interval definition and frame and scan headers. The decoder parses and checks the JPEG bytestream automatically detecting and processing all the JPEG marker segments. After identifying the JPEG segments the decoder re-directs the data to the appropriate units to be stored or processed as appropriate. Any errors detected in the bytestream, apart from those in the entropy coded segments, are signalled and, if an error is found, the decoder stops reading the JPEG stream and waits to be reset.

JPEG images must have their data stored in interleaved format with no subsampling. Images longer than 65536 lines are allowed: these must have an initial imageHeight of 0. If the image has a Define Number Lines (DNL) marker at the end (normally necessary for standard JPEG, but not necessary for SoPEC's version of the CS6150), it must be equal to the total image height mod 64 k or an error will be generated.

See the CS6150 Databook [21] for more details on how the core is used, and for timing diagrams of the interfaces. Note that [21] does not describe the use of the DNL marker in images of more than 64 k lines length as this is a modification to the core.

The CS6150 decoder can be bypassed by setting the BypassJpg register. If this register is set, then the data read from DRAM must be in the same format as if it was produced by the JPEG decoder: 8×8 blocks of pixels in the correct color order. The data is uncompressed and is therefore lossless.

The following subsections describe the means by which the CS6150 internals can be made visible.

22.5.6.1 JPEG Decoder Reset

The JPEG decoder has 2 possible types of reset, an asynchronous reset and a synchronous clear. In SoPEC the asynchronous reset is connected to the hardware synchronous reset of the CDU and can be activated by any hardware reset to SoPEC (either from external pin or from any of the wake-up sources, e.g. USB activity, Wake-up register timeout) or by resetting the PEP section (ResetSection register in the CPR block).

The synchronous clear is connected to the software reset of the CDU and can be activated by the low to high transition of the Go register, or a software reset via the Reset register.

The 2 types of reset differ, in that the asynchronous reset, resets the JPEG core and causes the core to enter a memory initialization sequence that takes 384 clock cycles to complete after the reset is deasserted. The synchronous clear resets the core, but leaves the memory as is. This has some implications for programming the CDU.

In general the CDU should not be started (i.e. setting Go to 1) until at least 384 cycles after a hardware reset. If the CDU is started before then, the memory initialization sequence will be terminated leaving the JPEG core memory in an unknown state. This is allowed if the memory is to be initialized from the incoming JPEG stream.

22.5.6.2 JPEG Decoder Parameter Bus

The decoding parameter bus JpgDecPValue is a 16-bit port used to output various parameters extracted from the input data stream and currently used by the core. The 4-bit selector input (JpgDecPType) determines which internal parameters are displayed on the parameter bus as per Table 148. The data available on the PValue port does not contain control signals used by the CS6150.

TABLE 148

Parameter bus definitions

| PType | Output orientation | PValue |
|---|---|---|
| 0x0 | FY[15:0] | FY: number of lines in frame |
| 0x1 | FX[15:0] | FX: number of columns in frame |
| 0x2 | 00_YMCU[13:0] | YMCU: number of MCUs in Y direction of the current scan |
| 0x3 | 00_XMCU[13:0] | XMCU: number of MCUs in X direction of the current scan |
| 0x4 | Cs0[7:0]_Tq0[1:0]_ V0[2:0]_H0[2:0] | Cs0: identifier for the first scan component Tq0: quantization table identifier for the first scan component V0: vertical sampling factor for the first scan component. Values = 1–4 H0: horizontal sampling factor for the first scan component. Values = 1–4 |
| 0x5 | Cs1[7:0]_Tq1[1:0]_ V1[2:0]_H1[2:0] | Cs1, Tq1, V1 and H1 for the second scan component. V1, H1 undefined if NS < 2 |
| 0x6 | Cs2[7:0]_Tq2[1:0]_ V2[2:0]_H2[2:0] | Cs2, Tq2, V2 and H2 for the second scan component. V2, H2 undefined if NS < 3 |
| 0x7 | Cs3[7:0]_Tq3[1:0]_ V3[2:0]_H3[2:0] | Cs3, Tq3, V3 and H3 for the second scan component. V3, H3 undefined if NS < 4 |
| 0x8 | CsH[15:0] | CsH: no. of rows in current scan |
| 0x9 | CsV[15:0] | CsV: no. of columns in current scan |
| 0xA | DRI[15:0] | DRI: restart interval |
| 0xB | 000_HMAX[2:0]_ VMAX[2:0]_ MCUBLK[3:0]_NS[2:0] | HMAX: maximal horizontal sampling factor in frame VMAX: maximal vertical sampling factor in frame MCUBLK: number of blocks per MCU of the current scan, from 1 to 10 NS: number of scan components in current scan, 1–4 |

22.5.6.3 JPEG Decoder Status Register

The status register flags indicate the current state of the CS6150 operation. When an error is detected during the decoding process, the decompression process in the JPEG decoder is suspended and an interrupt is sent to the CPU by asserting cdu_icu_jpegerror (generated from DecError). The CPU can check the source of the error by reading the JpgDecStatus register. The CS6150 waits until a reset process is invoked by asserting the hard reset prst_n or by a soft reset of the CDU. The individual bits of JpgDecStatus are set to zero at reset and active high to indicate an error condition as defined in Table 149.

Note: A DecHfError will not block the input as the core will try to recover and produce the correct amount of pixel data. The DecHfError is cleared automatically at the start of the next image and so no intervention is required from the user. If any of the other errors occur in the decode mode then, following the error cancellation, the core will discard all input data until the next Start Of Image (SOI) without triggering any more errors.

The progress of the decoding can be monitored by observing the values of TblDef, IDctInProg, DecInProg and JpgInProg.

TABLE 149

JPEG decoder status register definitions

| Bit | Name | Description |
|---|---|---|
| 15–12 | TblDef[7:4] | Indicates the number of Huffman tables defined, 1 bit/table. |
| 11–8 | TblDef[3:0] | Indicates the number of quantization tables defined, 1 bit/table. |
| 7 | DecHfError | Set when an undefined Huffman table symbol is referenced during decoding. |
| 6 | CtlError | Set when an invalid SOF parameter or an invalid SOS parameter is detected. Also set when there is a mismatch between the DNL segment input to the core and the number of lines in the input image which have already been decoded. Note that SoPEC's implementation of the CS6150 does not require a final DNL when the initial setting for ImageHeight is 0. This is to allow images longer than 64k lines. |
| 5 | HtError | Set when an invalid DHT segment is detected. |
| 4 | QtError | Set when an invalid DQT segment is detected. |
| 3 | DecError | Set when anything other than a JPEG marker is input. Set when any of DecFlags[6:4] are set. Set when any data other than the SOI marker is detected at the start of a stream. Set when any SOF marker is detected other than SOF0. Set if incomplete Huffman or quantization definition is detected. |
| 2 | IDctInProg | Set when IDCT starts processing first data of a scan. Cleared when IDCT has processed the last data of a scan. |
| 1 | DecInProg | For each scan this signal is asserted after the SigSOS (Start of Scan Segment) signal has been output from the core and is deasserted when the decoding of a scan is complete. It indicates that the core is in the decoding state. |
| 0 | JpgInProg | Set when core starts to process input data (JpgIn) and de-asserted when decoding has been completed i.e. when the last pixel of last block of the image is output. |

22.5.7 Half-Block Buffer Interface

Since the CDU writes 256 bits (4×64 bits) to memory at a time, it requires a double-buffer of 2×256 bits at its output. This is implemented in an 8×64 bit FIFO. It is required to be able to stall the JPEG decoder core at its output on a half JPEG block boundary, i.e. after 32 pixels (8 bits per pixel). We provide a mechanism for stalling the JPEG decoder core by gating the clock to the core (with jclk_enable) when the FIFO is full. The output FIFO is responsible for providing two buffered half JPEG blocks to decouple JPEG decoding (read control unit) from writing those JPEG blocks to DRAM (write control unit). Data coming in is in 8-bit quantities but data going out is in 64-bit quantities for a single color plane.

22.5.8 Write Control Unit

Figure 139:
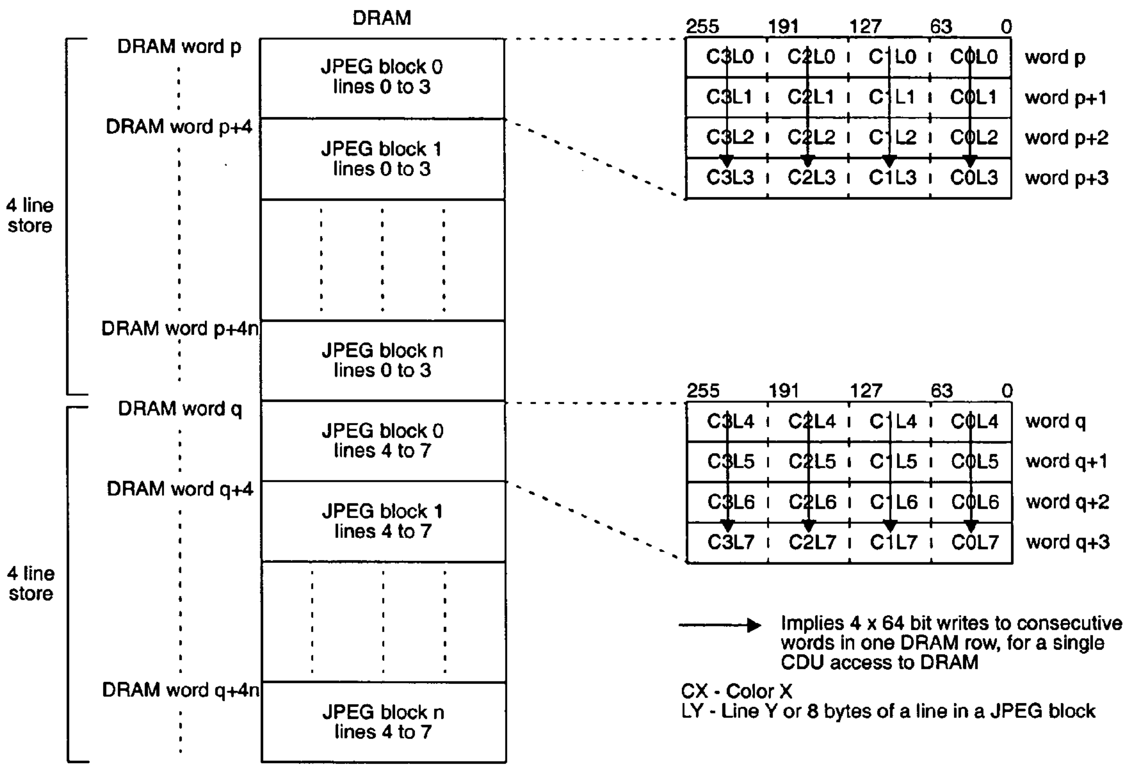
FIG. 139 shows a memory arrangement of JPEG blocks

A line of JPEG blocks in 4 colors, or 8 lines of decompressed contone data, is stored in DRAM with the memory arrangement as shown FIG. 139. The arrangement is in order to optimize access for reads by writing the data so that 4 color components are stored together in each 256-bit DRAM word.

The CDU writes 8 lines of data in parallel but stores the first 4 lines and second 4 lines separately in DRAM. The write sequence for a single line of JPEG 8×8 blocks in 4 colors, as shown in FIG. 139, is as follows below and corresponds to the order in which pixels are output from the JPEG decoder core:

block 0, color 0, line 0 in word p bits 63–0, line 1 in word p+1 bits 63–0,
line 2 in word p+2 bits 63–0, line 3 in word p+3 bits 63–0,
block 0, color 0, line 4 in word q bits 63–0, line 5 in word q+1 bits 63–0,
line 6 in word q+2 bits 63–0, line 7 in word q+3 bits 63–0,
block 0, color 1, line 0 in word p bits 127–64, line 1 in word p+1 bits 127–64,
line 2 in word p+2 bits 127–64, line 3 in word p+3 bits 127–64,
block 0, color 1, line 4 in word q bits 127–64, line 5 in word q+1 bits 127–64,
line 6 in word q+2 bits 127–64, line 7 in word q+3 bits 127–64,
repeat for block 0 color 2, block 0 color 3........
block 1, color 0, line 0 in word p+4 bits 63–0, line 1 in word p+5 bits 63–0,
etc...................................................
block N, color 3, line 4 in word q+4n bits 255–192, line 5 in word q+4n+1 bits 255–192,
line 6 in word q+4n+2 bits 255–192, line 7 in word q+4n+3 bit 255–192

In SoPEC data is written to DRAM 256 bits at a time. The DIU receives a 64-bit aligned address from the CDU, i.e. the lower 2 bits indicate which 64-bits within a 256-bit location are being written to. With that address the DIU also receives half a JPEG block (4 lines) in a single color, 4×64 bits over 4 cycles. All accesses to DRAM must be padded to 256 bits or the bits which should not be written are masked using the individual bit write inputs of the DRAM. When writing decompressed contone data from the CDU, only 64 bits out of the 256-bit access to DRAM are valid, and the remaining bits of the write are masked by the DIU. This means that the decompressed contone data is written to DRAM in 4 back-to-back 64-bit write masked accesses to 4 consecutive 256-bit DRAM locations/words.

Figure 140:
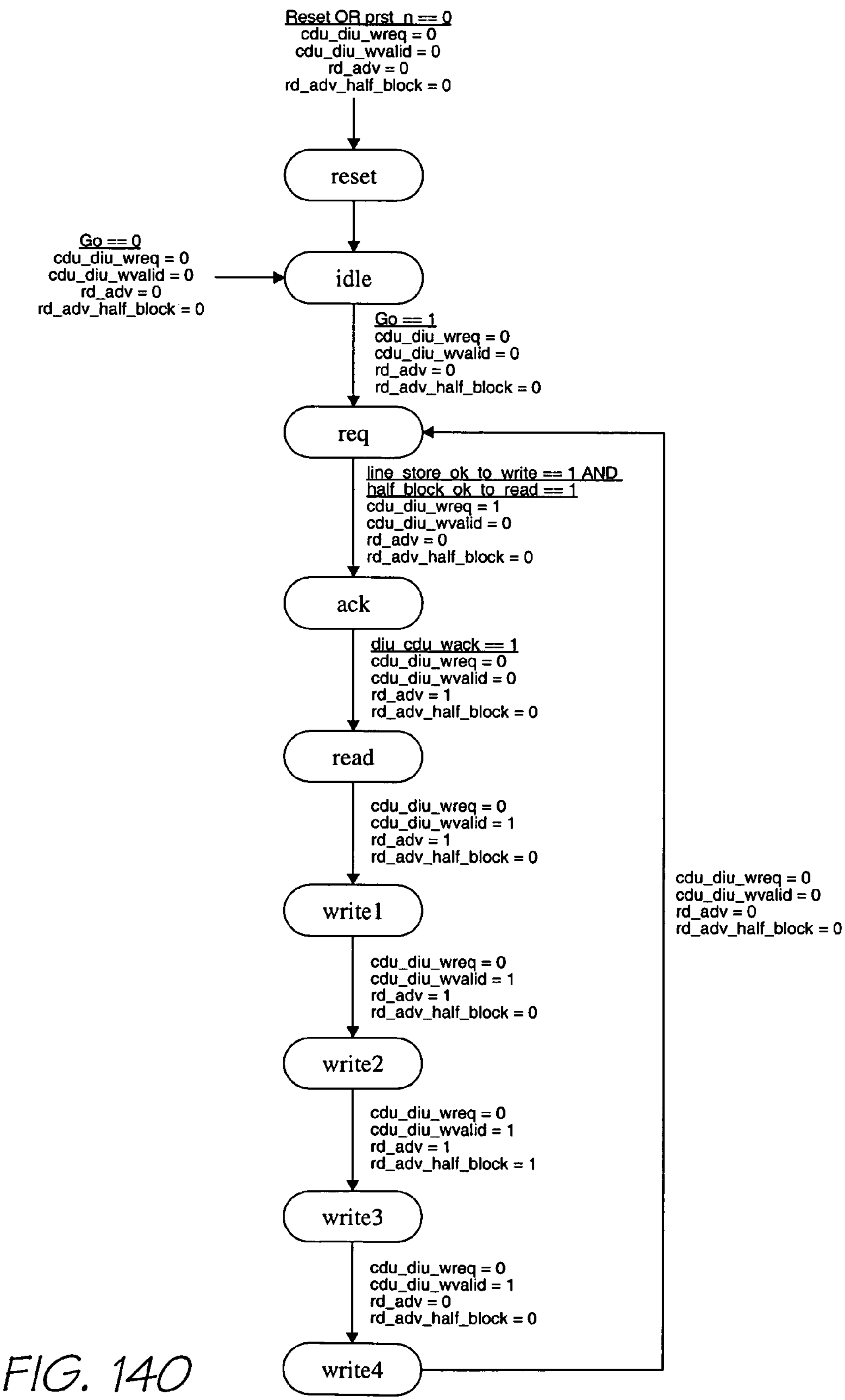
FIG. 140 shows a contone data write state machine

Writing of decompressed contone data to DRAM is implemented by the state machine in FIG. 140. The CDU writes the decompressed contone data to DRAM half a JPEG block at a time, 4×64 bits over 4 cycles. All counters and flags should be cleared after reset. When Go transitions from 0 to 1 all counters and flags should take their initial value. While the Go bit is set, the state machine relies on the half_block_ok_to_read and line_store_ok_to_write flags to tell it whether to attempt to write a half JPEG block to DRAM. Once the half-block buffer interface contains a half JPEG block, the state machine requests a write access to DRAM by asserting cdu_diu_wreq and providing the write address, corresponding to the first 64-bit value to be written, on cdu_diu_wadr (only the address the first 64-bit value in each access of 4×64 bits is issued by the CDU. The DIU can generate the addresses for the second, third and fourth 64-bit values). The state machine then waits to receive an acknowledge from the DIU before initiating a read of 4×64-bit values from the half-block buffer interface by asserting rd_adv for 4 cycles. The output cdu_diu_wvalid is asserted in the cycle after rd_adv to indicate to the DIU that valid data is present on the cdu_diu_data bus and should be written to the specified address in DRAM. A rd_adv_half_block pulse is then sent to the half-block buffer interface to indicate that the current read buffer has been read and should now be available to be written to again. The state machine then returns to the request state.

The pseudocode below shows how the write address is calculated on a per clock cycle basis. Note counters and flags should be cleared after reset. When Go transitions from 0 to 1 all counters and flags should be cleared and lwr_halfblock_adr gets loaded with buff_start_adr and upr_halfblock_adr gets loaded with buff_start_adr+max_block+1.

```
// assign write address output to DRAM
    cdu_diu_wadr[6:5]  = 00              // corresponds to
linenumber, only first address is
                                   // issued for each DRAM
access. Thus line is always 0.
                                   // The DIU generates these
bits of the address.
    cdu_diu_wadr[4:3] = color
    if (half = = 1) then
        cdu_diu_wadr[21:7] = upr_halfblock_adr       // for lines
4–7 of JPEG block
    else
        cdu_diu_wadr[21:7] = lwr_halfblock_adr       // for lines
0–3 of JPEG block
// update half, color, block and addresses after each DRAM
write access
    if (rd_adv_half_block = = 1) then
        if (half = = 1) then
            half = 0
            if (color = = max_plane) then
                color = 0
                if (block = = max_block) then        // end of
                                                     writing
a line of JPEG blocks
                    pulse wradv8line
                    block = 0
                    // update half block address for start of next
line of JPEG blocks taking
                    // account of address wrapping in circular
buffer and 4 line offset
```

-continued

```
                    if (upr_halfblock_adr = = buff_end_adr) then
                        upr_halfblock_adr = buff_start_adr +
max_block + 1
                    elsif (upr_halfblock_adr +
                    max_block + 1 = =
buff end adr) then
                        upr_halfblock_adr =
                        buff_start_adr
                    else
                        upr_halfblock_adr =
                        upr_halfblock_adr +
max block + 2
                else
                    block ++
                    upr_halfblock_adr ++ // move to address
for lines 4–7 for next block
            else
                color ++
        else
            half = 1
            if (color = = max_plane) then
                if (block = = max_block) then // end of writing a
line of JPEG blocks
                    // update half block address for start of next
line of JPEG blocks taking
                    // account of address wrapping in circular
buffer and 4 line offset
                    if (lwr_halfblock_adr = = buff_end_adr) then
                        lwr_halfblock_adr = buff_start_adr +
max block + 1
                    elsif (lwr_halfblock_adr + max_block + 1 = =
buff_end_adr) then
                        lwr_halfblock_adr = buff_start_adr
                    else
                        lwr_halfblock_adr = lwr_halfblock_adr +
max_block + 2
                else
                    lwr_halfblock_adr ++       // move to address
for lines 0–3 for next block
```

22.5.9 Contone Line Store Interface

The contone line store interface is responsible for providing the control over the shared resource in DRAM. The CDU writes 8 lines of data in up to 4 color planes, and the CFU reads them line-at-a-time. The contone line store interface provides the mechanism for keeping track of the number of lines stored in DRAM, and provides signals so that a given line cannot be read from until the complete line has been written.

The CDU writes 8 lines of data in parallel but writes the first 4 lines and second 4 lines to separate areas in DRAM. Thus, when the CFU has read 4 lines from DRAM that area now becomes free for the CDU to write to. Thus the size of the line store in DRAM should be a multiple of 4 lines.

The minimum size of the line store interface is 8 lines, providing a single buffer scheme. Typical sizes are 12 lines for a 1.5 buffer scheme while 16 lines provides a double-buffer scheme.

The size of the contone line store is defined by num_buff_lines. A count is kept of the number of lines stored in DRAM that are available to be written to. When Go transitions from 0 to 1, NumLinesAvail is set to the value of num_buff_lines. The CDU may only begin to write to DRAM as long as there is space available for 8 lines, indicated when the line_store_ok_to_write bit is set.

When the CDU has finished writing 8 lines, the write control unit sends an wradv8line pulse to the contone line store interface, and NumLinesAvail is decremented by 8. The write control unit then waits for line_store_ok_to_write to be set again.

If the contone line store is not empty (has one or more lines available in it), the CDU will indicate to the CFU via the cdu_cfu_linestore_rdy signal. The cdu_cfu_linestore_rdy signal is generated by comparing the NumLinesAvail with the programmed num_buff_lines. As the CFU reads a line from the contone line store it will pulse the rdadvline to indicate that it has read a full line from the line store. NumLinesAvail is incremented by 1 on receiving a rdadvline pulse.

To enable running the CDU while the CFU is not running the NumLinesAvail register can also be updated via the configuration register interface. In this scenario the CPU polls the value of the NumLinesAvail register and overwrites it to prevent stalling of the CDU (NumLinesAvail<8). The CPU will always have priority in any updating of the NumLinesAvail register.

23 Contone FIFO Unit (CFU)

23.1 Overview

The Contone FIFO Unit (CFU) is responsible for reading the decompressed contone data layer from the circular buffer in DRAM, performing optional color conversion from YCrCb to RGB followed by optional color inversion in up to 4 color planes, and then feeding the data on to the HCU. Scaling of data is performed in the horizontal and vertical directions by the CFU so that the output to the HCU matches the printer resolution. Non-integer scaling is supported in both the horizontal and vertical directions. Typically, the scale factor will be the same in both directions but may be programmed to be different.

23.2 Bandwidth Requirements

The CFU must read the contone data from DRAM fast enough to match the rate at which the contone data is consumed by the HCU.

Pixels of contone data are replicated a X scale factor (SF) number of times in the X direction and Y scale factor (SF) number of times in the Y direction to convert the final output to 1600 dpi. Replication in the X direction is performed at the output of the CFU on a pixel-by-pixel basis while replication in the Y direction is performed by the CFU reading each line a number of times, according to the Y-scale factor, from DRAM. The HCU generates 1 dot (bi-level in 6 colors) per system clock cycle to achieve a print speed of 1 side per 2 seconds for full bleed A4/Letter printing. The CFU output buffer needs to be supplied with a 4 color contone pixel (32 bits) every SF cycles. With support for 4 colors at 267 ppi the CFU must read data from DRAM at 5.33 bits/cycle[14].

[14]32 bits/6 cycles=5.33 bits/cycle

23.3 Color Space Conversion

The CFU allows the contone data to be passed directly on, which will be the case if the color represented by each color plane in the JPEG image is an available ink. For example, the four colors may be C, M, Y, and K, directly represented by CMYK inks. The four colors may represent gold, metallic green etc. for multi-SoPEC printing with exact colors.

JPEG produces better compression ratios for a given visible quality when luminance and chrominance channels are separated. With CMYK, K can be considered to be luminance, but C, M and Y each contain luminance information and so would need to be compressed with appropriate luminance tables. We therefore provide the means by which CMY can be passed to SoPEC as YCrCb. K does not need color conversion.

When being JPEG compressed, CMY is typically converted to RGB, then to YCrCb and then finally JPEG compressed. At decompression, the YCrCb data is obtained, then color converted to RGB, and finally back to CMY.

The external RIP provides conversion from RGB to YCrCb, specifically to match the actual hardware implementation of the inverse transform within SoPEC, as per CCIR 601-2 [24] except that Y, Cr and Cb are normalized to occupy all 256 levels of an 8-bit binary encoding.

The CFU provides the translation to either RGB or CMY. RGB is included since it is a necessary step to produce CMY, and some printers increase their color gamut by including RGB inks as well as CMYK.

Consequently the JPEG stream in the color space convertor is one of:

- 1 color plane, no color space conversion
- 2 color planes, no color space conversion
- 3 color planes, no color space conversion
- 3 color planes YCrCb, conversion to RGB
- 4 color planes, no color space conversion
- 4 color planes YCrCbX, conversion of YCrCb to RGB, no color conversion of X The YCrCb to RGB conversion is described in [14]. Note that if the data is non-compressed, there is no specific advantage in performing color conversion (although the CDU and CFU do permit it).

23.4 Color Space Inversion

In addition to performing optional color conversion the CFU also provides for optional bit-wise inversion in up to 4 color planes. This provides the means by which the conversion to CMY may be finalised, or to may be used to provide planar correlation of the dither matrices.

The RGB to CMY conversion is given by the relationship:

C=255−R

M=255−G

Y=255−B

These relationships require the page RIP to calculate the RGB from CMY as follows:

R=255−C

G=255−M

B=255−Y

23.5 Scaling

Scaling of pixel data is performed in the horizontal and vertical directions by the CFU so that the output to the HCU matches the printer resolution. The CFU supports non-integer scaling with the scale factor represented by a numerator and a denominator. Only scaling up of the pixel data is allowed, i.e. the numerator should be greater than or equal to the denominator. For example, to scale up by a factor of two and a half, the numerator is programmed as 5 and the denominator programmed as 2.

Scaling is implemented using a counter as described in the pseudocode below. An advance pulse is generated to move to the next dot (x-scaling) or line (y-scaling).

```
if (count + denominator − numerator >= 0) then
    count = count + denominator − numerator
    advance = 1
else
    count = count + denominator
    advance = 0
```

23.6 Lead-In and Lead-Out Clipping

The JPEG algorithm encodes data on a block by block basis, each block consists of 64 8-bit pixels (representing 8 rows each of 8 pixels). If the image is not a multiple of 8 pixels in X and Y then padding must be present. This padding (extra pixels) will be present after decoding of the JPEG bytestream.

Extra padded lines in the Y direction (which may get scaled up in the CFU) will be ignored in the HCU through the setting of the BottomMargin register.

Extra padded pixels in the X direction must also be removed so that the contone layer is clipped to the target page as necessary.

Figure 141:
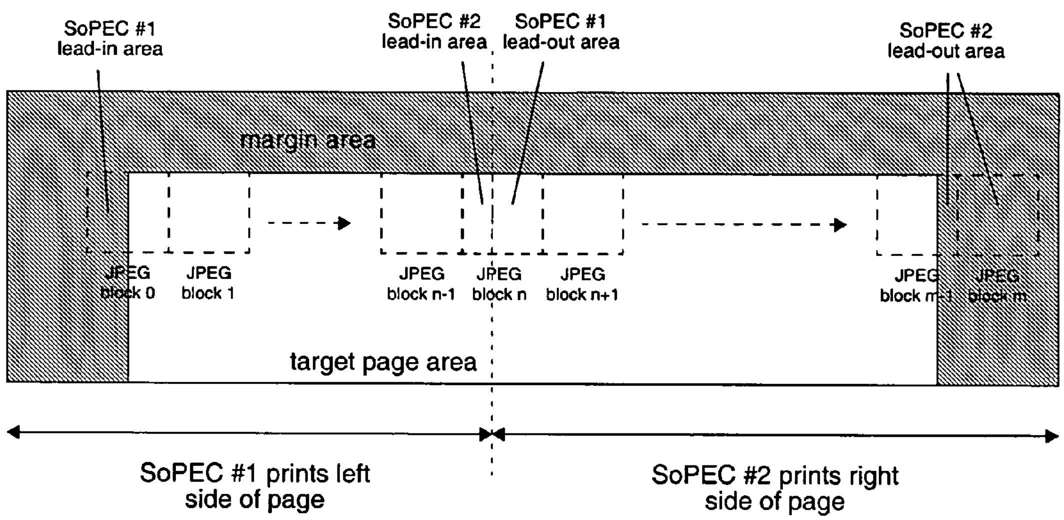
FIG. 141 shows lead-in and lead-out clipping of contone data in multi-SoPEC environment

In the case of a multi-SoPEC system, 2 SoPECs may be responsible for printing the same side of a page, e.g. SoPEC #1 controls printing of the left side of the page and SoPEC #2 controls printing of the right side of the page and shown in FIG. 141. The division of the contone layer between the 2 SoPECs may not fall on a 8 pixel (JPEG block) boundary. The JPEG block on the boundary of the 2 SoPECs (JPEG block n below) will be the last JPEG block in the line printed by SoPEC #1 and the first JPEG block in the line printed by SoPEC #2. Pixels in this JPEG block not destined for SoPEC #1 are ignored by appropriately setting the LeadOutClipNum. Pixels in this JPEG block not destined for SoPEC #2 must be ignored at the beginning of each line. The number of pixels to be ignored at the start of each line is specified by the LeadInClipNum register. It may also be the case that the CDU writes out more JPEG blocks than is required to be read by the CFU, as shown for SBPEC #2 below. In this case_the value of the MaxBlock register in the CDU is set to correspond to JPEG block m but the value for the MaxBlock register in the CFU is set to correspond to JPEG block m−1. Thus JPEG block m is not read in by the CFU. Additional clipping on contone pixels is required when they are scaled up to the printer's resolution. The scaling of the first valid pixel in the line is controlled by setting the XstartCount register. The HcuLineLength register defines the size of the target page for the contone layer at the printer's resolution and controls the scaling of the last valid pixel in a line sent to the HCU.

23.7 Implementation

Figure 142:
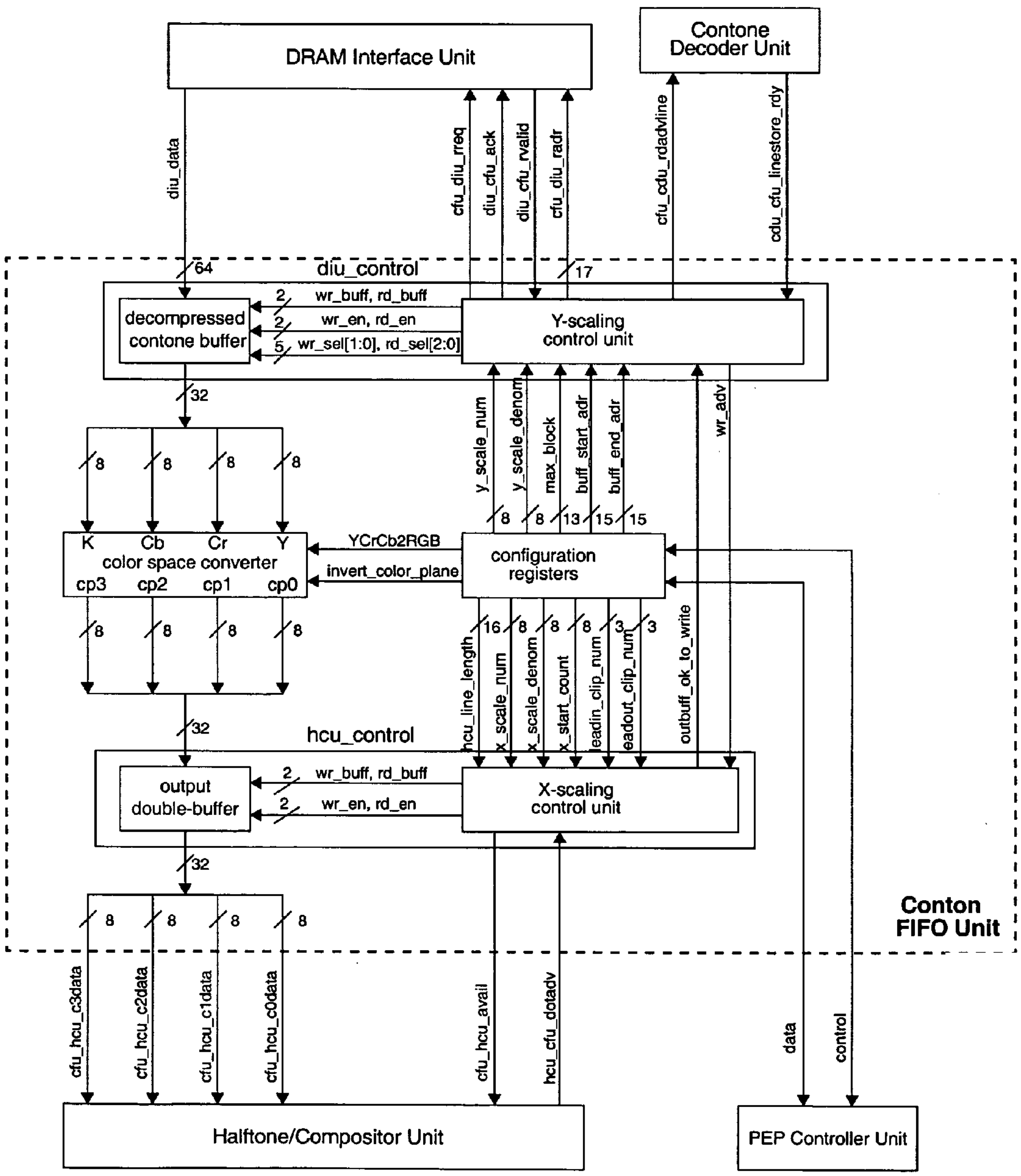
FIG. 142 shows a block diagram of CFU

FIG. 142 shows a block diagram of the CFU.

23.7.1 Definitions of I/O

TABLE 150

CFU port list and description

| Port Name | Pins | I/O | Description |
|---|---|---|---|
| Clocks and reset | | | |
| pclk | 1 | In | System clock |
| prst_n | 1 | In | System reset, synchronous active low. |
| PCU interface | | | |
| pcu_cfu_sel | 1 | In | Block select from the PCU. When pcu_cfu_sel is high both pcu_adr and pcu_dataout are valid. |
| pcu_rwn | 1 | In | Common read/not-write signal from the PCU. |
| pcu_adr[6:2] | 4 | In | PCU address bus. Only 5 bits are required to decode the address space for this block. |
| pcu_dataout[31:0] | 32 | In | Shared write data bus from the PCU. |
| cfu_pcu_rdy | 1 | Out | Ready signal to the PCU. When cfu_pcu_rdy is high it indicates the last cycle of the access. For a write cycle this means pcu_dataout has been registered by the block and for a read cycle this means the data on cfu_pcu_datain is valid. |
| cfu_pcu_datain[31:0] | 32 | Out | Read data bus to the PCU. |
| DIU interface | | | |
| cfu_diu_rreq | 1 | Out | CFU read request, active high. A read request must be accompanied by a valid read address. |
| diu_cfu_rack | 1 | In | Acknowledge from DIU, active high. Indicates that a read request has been accepted and the new read address can be placed on the address bus, cfu_diu_radr. |
| cfu_diu_radr[21:5] | 17 | Out | CFU read address. 17 bits wide (256-bit aligned word). |
| diu_cfu_rvalid | 1 | In | Read data valid, active high. Indicates that valid read data is now on the read data bus, diu_data. |
| diu_data[63:0] | 64 | In | Read data from DRAM. |
| CDU interface | | | |
| cdu_cfu_linestore_rdy | 1 | In | When high indicates that the contone line store has 1 or more lines available to be read by the CFU. |
| cfu_cdu_rdadvline | 1 | Out | Read line pulse, active high. Indicates that the CFU has finished reading a line of decompressed contone data to the circular buffer in DRAM and that line of the buffer is now free. |
| HCU interface | | | |
| hcu_cfu_advdot | 1 | In | Informs the CFU that the HCU has captured the pixel data on cfu_hcu_c[0–3]data lines and the CFU can now place the next pixel on the data lines. |
| cfu_hcu_avail | 1 | Out | Indicates valid data present on cfu_hcu_c[0–3]data lines. |
| cfu_hcu_c0data[7:0] | 8 | Out | Pixel of data in contone plane 0. |
| cfu_hcu_c1data[7:0] | 8 | Out | Pixel of data in contone plane 1. |
| cfu_hcu_c2data[7:0] | 8 | Out | Pixel of data in contone plane 2. |
| cfu_hcu_c3data[7:0] | 8 | Out | Pixel of data in contone plane 3. |

23.7.2 Configuration Registers

The configuration registers in the CFU are programmed via the PCU interface. Refer to section 21.8.2 on page 321 for the description of the protocol and timing diagrams for reading and writing registers in the CFU. Note that since addresses in SoPEC are byte aligned and the PCU only supports 32-bit register reads and writes, the lower 2 bits of the PCU address bus are not required to decode the address space for the CFU. When reading a register that is less than 32 bits wide zeros should be returned on the upper unused bit(s) of cfu_pcu_datain. The configuration registers of the CFU are listed in Table 151:

TABLE 151

CFU registers

| Address (CFU_base +) | Register Name | #bits | Value on Reset | Description |
|---|---|---|---|---|
| Control registers | | | | |
| 0x00 | Reset | 1 | 0x1 | A write to this register causes a reset of the CFU. |
| 0x04 | Go | 1 | 0x0 | Writing 1 to this register starts the CFU. Writing 0 to this register halts the CFU. When Go is deasserted the state-machines go to their idle states but all counters and configuration registers keep their values. When Go is asserted all counters are reset, but configuration registers keep their values (i.e. they don't get reset). The CFU must be started before the CDU is started. This register can be read to determine if the CFU is running (1 - running, 0 - stopped). |
| Setup registers | | | | |
| 0x10 | MaxBlock | 13 | 0x000 | Number of JPEG MCUs (or JPEG block equivalents, i.e. 8 × 8 bytes) in a line - 1. |
| 0x14 | BuffStartAdr[21:7] | 15 | 0x0000 | Points to the start of the decompressed contone circular buffer in DRAM, aligned to a half JPEG block boundary. A half JPEG block consists of 4 words of 256-bits, enough to hold 32 contone pixels in 4 colors, i.e. half a JPEG block |
| 0x18 | BuffEndAdr[21:7] | 15 | 0x0000 | Points to the end of the decompressed contone circular buffer in DRAM, aligned to a half JPEG block boundary (address is inclusive). A half JPEG block consists of 4 words of 256-bits, enough to hold 32 contone pixels in 4 colors, i.e. half a JPEG block. |
| 0x1C | 4LineOffset | 13 | 0x0000 | Defines the offset between the start of one 4 line store to the start of the next 4 line store - 1. In Figure n page394 on page Error! Bookmark not defined., if BufStartAdr corresponds to line 0 block 0 then BuffStartAdr + 4LineOffset corresponds to line 4 block 0. 4LineOffset is specified in units of 128 bytes, eg 0–128 bytes, 1–256 bytes etc. This register is required in addition to MaxBlock |

TABLE 151-continued

CFU registers

| Address (CFU_base +) | Register Name | #bits | Value on Reset | Description |
|---|---|---|---|---|
| | | | | as the number of JPEG blocks in a line required by the CFU may be different from the number of JPEG blocks in a line written by the CDU. |
| 0x20 | YCrCb2RGB | 1 | 0x0 | Set this bit to enable conversion from YCrCb to RGB. Should not be changed between bands. |
| 0x24 | InvertColorPlane | 4 | 0x0 | Set these bits to perform bit-wise inversion on a per color plane basis.<br>bit0 - 1 invert color plane 0<br>- 0 do not convert<br>bit1 - 1 invert color plane 1<br>- 0 do not convert<br>bit2 - 1 invert color plane 2<br>- 0 do not convert<br>bit3 - 1 invert color plane 3<br>Should not be changed between bands. |
| 0x28 | HcuLineLength | 16 | 0x0000 | Number of contone pixels - 1 in a line after scaling). Equals the number of hcu_cfu_dotadv pulses - 1 received from the HCU for each line of contone data. |
| 0x2C | LeadInClipNum | 3 | 0x0 | Number of contone pixels to be ignored at the start of a line (from JPEG block 0 in a line). They are not passed to the output buffer to be scaled in the X direction. |
| 0x30 | LeadOutClipNum | 3 | 0x0 | Number of contone pixels to be ignored at the end of a line (from JPEG block MaxBlock in a line). They are not passed to the output buffer to be scaled in the X direction. |
| 0x34 | XstartCount | 8 | 0x00 | Value to be loaded at the start of every line into the counter used for scaling in the X direction. Used to control the scaling of the first pixel in a line to be sent to the HCU. This value will typically be zero, except in the case where a number of dots are clipped on the lead in to a line. |
| 0x38 | XscaleNum | 8 | 0x01 | Numerator of contone scale factor in X direction. |
| 0x3C | XscaleDenom | 8 | 0x01 | Denominator of contone scale factor in X direction. |
| 0x40 | YscaleNum | 8 | 0x01 | Numerator of contone scale factor in Y direction. |
| 0x44 | YscaleDenom | 8 | 0x01 | Denominator of contone scale factor in Y direction. |

23.7.3 Storage of Decompressed Contone Data in DRAM

The CFU reads decompressed contone data from DRAM in single 256-bit accesses. JPEG blocks of decompressed contone data are stored in DRAM with the memory arrangement as shown The arrangement is in order to optimize access for reads by writing the data so that 4 color components are stored together in each 256-bit DRAM word. The means that the CFU reads 64-bits in 4 colors from a single line in each 256-bit DRAM access.

Figure 143:
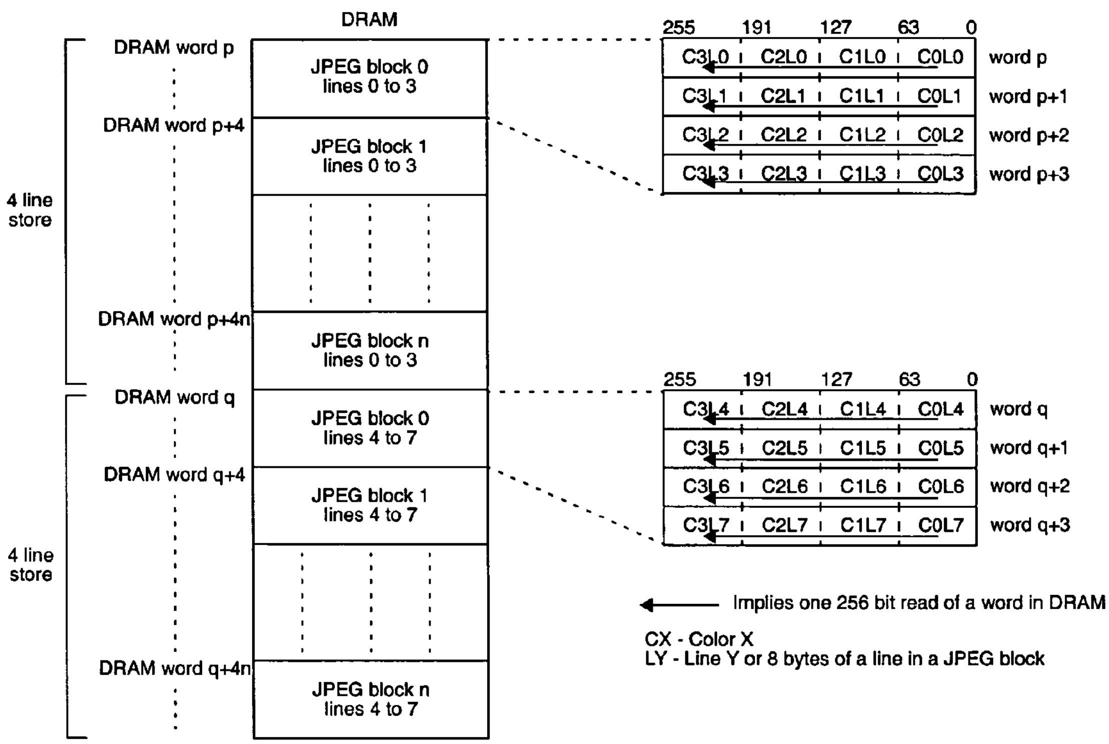
FIG. 143 shows a DRAM storage arrangement for a single line of JPEG blocks in 4 colors

The CFU reads data line at a time in 4 colors from DRAM. The read sequence, as shown in FIG. 143, is as follows:

line 0, block 0 in word p of DRAM
line 0, block 1 in word p+4 of DRAM
. . .
line 0, block n in word p+4n of DRAM
(repeat to read line a number of times according to scale factor)
line 1, block 0 in word p+1 of DRAM
line 1, block 1 in word p+5 of DRAM
etc . . .

The CFU reads a complete line in up to 4 colors a Y scale factor number of times from DRAM before it moves on to read the next. When the CFU has finished reading 4 lines of contone data that 4 line store becomes available for the CDU to write to.

23.7.4 Decompressed Contone Buffer

Since the CFU reads 256 bits (4 colors×64 bits) from memory at a time, it requires storage of at least 2×256 bits at its input. To allow for all possible DIU stall conditions the input buffer is increased to 3×256 bits to meet the CFU target bandwidth requirements. The CFU receives the data from the DIU over 4 clock cycles (64-bits of a single color per cycle). It is implemented as 4 buffers. Each buffer conceptually is a 64-bit input and 8-bit output buffer to account for the 64-bit data transfers from the DIU, and the 8-bit output per color plane to the color space converter.

On the DRAM side, wr_buff indicates the current buffer within each triple-buffer that writes are to occur to. wr_sel selects which triple-buffer to write the 64 bits of data to when wr_en is asserted. On the color space converter side, rd_buff indicates the current buffer within each triple-buffer that reads are to occur from. When rd_en is asserted a byte is read from each of the triple-buffers in parallel. rd_sel is used to select a byte from the 64 bits (1st byte corresponds to bits 7–0, second byte to bits 15–8 etc.).

Due to the limitations of available register arrays in IBM technology, the decompressed contone buffer is implemented as a quadruple buffer. While this offers some benefits for the CFU it is not necessitated by the bandwidth requirements of the CFU.

23.7.5 Y-Scaling Control Unit

Figure 144:
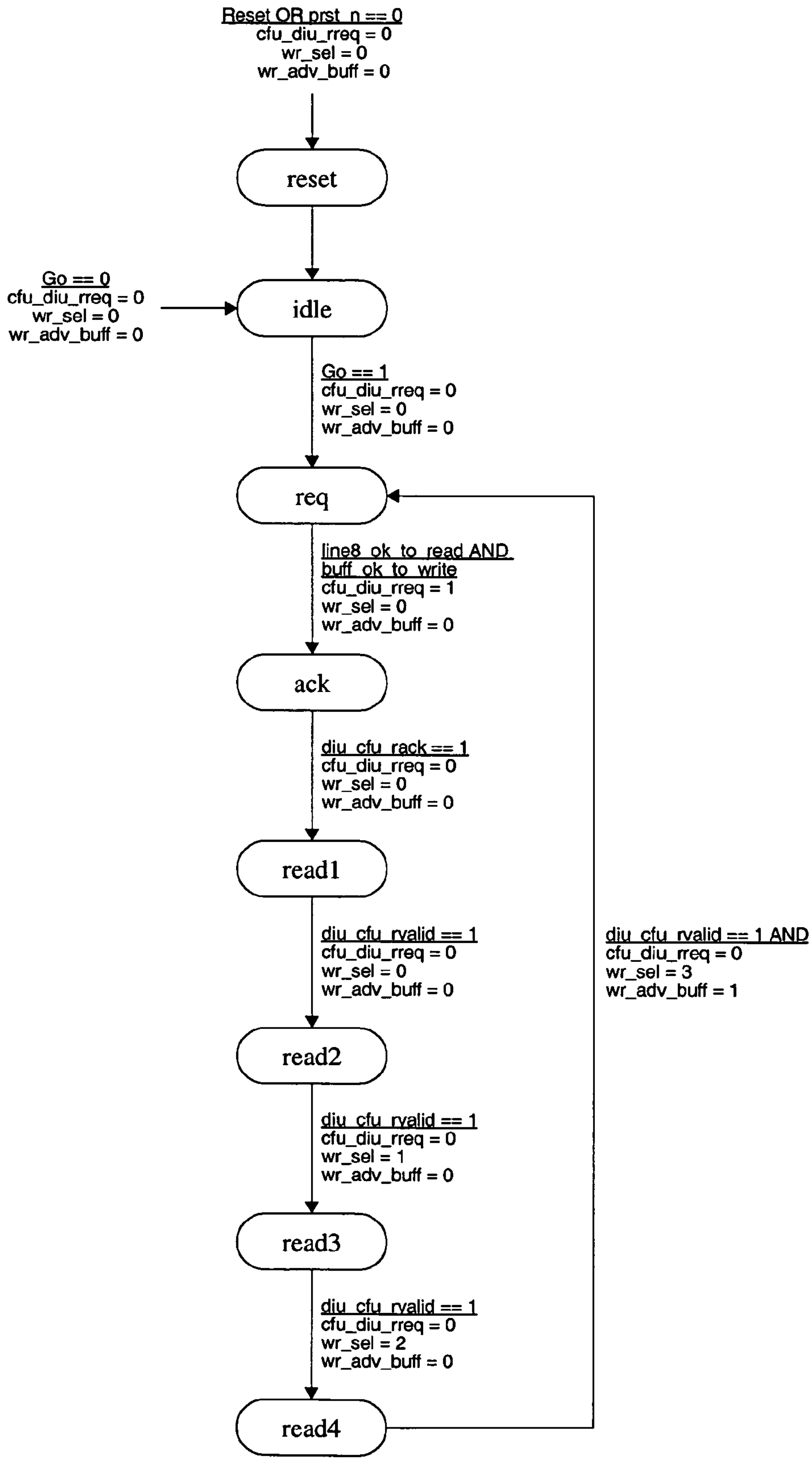
FIG. 144 shows a block diagram of color space converter

The Y-scaling control unit is responsible for reading the decompressed contone data and passing it to the color space converter via the decompressed contone buffer. The decompressed contone data is read from DRAM in single 256-bit accesses, receiving the data from the DIU over 4 clock cycles (64-bits per cycle). The protocol and timing for read accesses to DRAM is described in section 20.9.1 on page 240. Read accesses to DRAM are implemented by means of the state machine described in FIG. 144.

All counters and flags should be cleared after reset. When Go transitions from 0 to 1 all counters and flags should take their initial value. While the Go bit is set, the state machine relies on the line8_ok_to_read and buff_ok_to_write flags to tell it whether to attempt to read a line of compressed contone data from DRAM. When line8_ok_to_read is 0 the state machine does nothing. When line8_ok_to_read is 1 the state machine continues to load data into the decompressed contone buffer up to 256-bits at a time while there is space available in the buffer. A bit is kept for the status of each 64-bit buffer: buff_avail[0] and buff_avail[1]. It also keeps a single bit (rd_buff) for the current buffer that reads are to occur from, and a single bit (wr_buff) for the current buffer that writes are to occur to.

- buff ok_to_write equals ~buff_avail[wr_buff]. When a wr_adv_buff pulse is received, buff_avail[wr_buff] is set, and wr_buff is inverted. Whenever diu_cfu_rvalid is asserted, wr_en is asserted to write the 64-bits of data from DRAM to the buffer selected by wr_sel and wr_buff.
- buff ok_to_read equals buff_avail[rd_buff]. If there is data available in the buffer and the output double-buffer has space available (outbuff_ok_to_write equals 1) then data is read from the buffer by asserting rd_en and rd_sel gets incremented to point to the next value. wr_adv is asserted in the following cycle to write the data to the output double-buffer of the CFU. When finished reading the buffer, rd_sel equals b111 and rd_en is asserted, buff_avail[rd_buff] is set, and rd_buff is inverted.

Each line is read a number of times from DRAM, according to the Y-scale factor, before the CFU moves on to start reading the next line of decompressed contone data. Scaling to the printhead resolution in the Y direction is thus performed.

The pseudocode below shows how the read address from DRAM is calculated on a per clock cycle basis. Note all counters and flags should be cleared after reset or when Go is cleared. When a 1 is written to Go, both curr_halfblock and line_start_halfblock get loaded with buff_start_adr, and y_scale_count gets loaded with y_scale_denom. Scaling in the Y direction is implemented by line replication by re-reading lines from DRAM. The algorithm for non-integer scaling is described in the pseudocode below.

```
// assign read address output to DRAM
    cdu_diu_wadr[21:7] = curr_halfblock
    cdu_diu_wadr[6:5] = line[1:0]
// update block, line, y_scale_count and addresses after
each DRAM read access
    if (wr_adv_buff = = 1) then
        if (block = = max_block) then // end of reading a line
of contone in up to 4 colors
            block = 0
            // check whether to advance to next line of contone
data in DRAM
            if (y_scale_count + y_scale_denom –
            y_scale_num >= 0)
then
                y_scale_count = y_scale_count +
                y_scale_denom –
y_scale_num
                pulse RdAdvline
                if (line = = 3) then          // end of reading 4 line
store of contone data
                    line = 0
                    // update half block address for start of next
line taking account of
                    // address wrapping in circular buffer and 4
line offset
                    if (curr_halfblock = = buff_end_adr) then
                        curr_halfblock = buff_start_adr
                        line_start_adr = buff_start_adr
                    elsif ( (line_start_adr   +
                    4line_offset)   = =
buff_end_adr) ) then
                        curr_halfblock = buff_start_adr
                        line_start_adr = buff_start_adr
                    else
                        curr_halfblock    =
                        line_start_adr    +
4line_offset
                        line_start_adr    =
                        line_start_adr    +
4line_offset
                else
                    line ++
                    curr_halfblock = line_start_adr
            else
                // re-read current line from DRAM
```

-continued

```
            y__scale__count = y__scale__count + y__scale__denom
            curr__halfblock = line__start__adr
    else
        block ++
        curr__halfblock ++
```

23.7.6 Contone Line Store Interface

The contone line store interface is responsible for providing the control over the shared resource in DRAM. The CDU writes 8 lines of data in up to 4 color planes, and the CFU reads them line-at-a-time. The contone line store interface provides the mechanism for keeping track of the number of lines stored in DRAM, and provides signals so that a given line cannot be read from until the complete line has been written.

A count is kept of the number of lines that have been written to DRAM by the CDU and are available to be read by the CFU. At start-up, buff_lines_avail is set to the 0. The CFU may only begin to read from DRAM when the CDU has written 8 complete lines of contone data. When the CDU has finished writing 8 lines, it sends an cdu_cfu_wradv8line pulse to the CFU, and buff_lines_avail is incremented by 8. The CFU may continue reading from DRAM as long as buff_lines_avail is greater than 0. line8_ok_to_read is set while buff_lines_avail is greater than 0. When it has completely finished reading a line of contone data from DRAM, the Y-scaling control unit sends a RdAdvLine signal to contone line store interface and to the CDU to free up the line in the buffer in DRAM. buff_lines_avail is decremented by 1 on receiving a RdAdvline pulse.

23.7.7 Color Space Converter (CSC)

The color space converter consists of 2 stages: optional color conversion from YCrCb to RGB followed by optional bit-wise inversion in up to 4 color planes.

The convert YCrCb to RGB block takes 3 8-bit inputs defined as Y, Cr, and Cb and outputs either the same data YCrCb or RGB. The YCrCb2RGB parameter is set to enable the conversion step from YCrCb to RGB. If YCrCb2RGB equals 0, the conversion does not take place, and the input pixels are passed to the second stage. The 4th color plane, if present, bypasses the convert YCrCb to RGB block. Note that the latency of the convert YCrCb to RGB block is 1 cycle. This latency should be equalized for the 4th color plane as it bypasses the block.

The second stage involves optional bit-wise inversion on a per color plane basis under the control of invert_color_plane. For example if the input is YCrCbK, then YCrCb2RGB can be set to 1 to convert YCrCb to RGB, and invert_color_plane can be set to 0111 to then convert the RGB to CMY, leaving K unchanged.

If YCrCb2RGB equals 0 and invert_color_plane equals 0000, no color conversion or color inversion will take place, so the output pixels will be the same as the input pixels.

Figure 145:
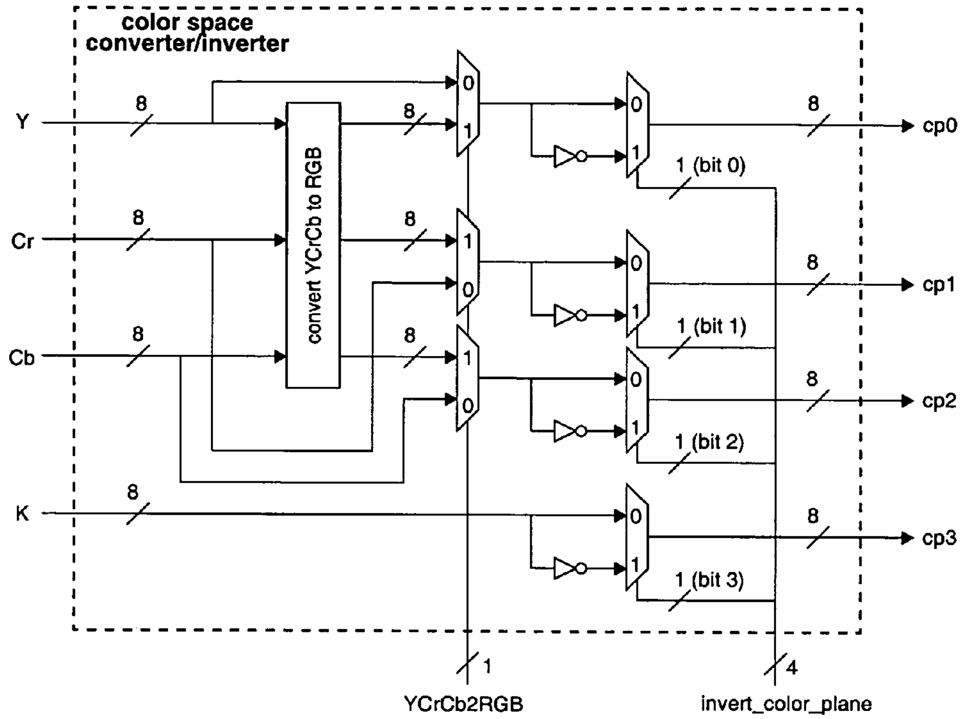
FIG. 145 shows a converter/invertor
Figure 146:
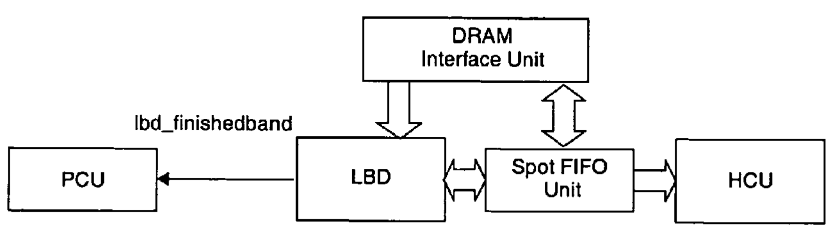
FIG. 146 shows a high-level block diagram of LBD in context

FIG. 145 shows a block diagram of the color space converter.

The convert YCrCb to RGB block is an implementation of [14]. Although only 10 bits of coefficients are used (1 sign bit, 1 integer bit, 8 fractional bits), full internal accuracy is maintained with 18 bits. The conversion is implemented as follows:

$$R^* = Y + (359/256)(Cr-128)$$

$$G^* = Y - (183/256)(Cr-128) - (88/256)(Cb-128)$$

$$B^* = Y + (454/256)(Cb-128)$$

R*, G* and B* are rounded to the nearest integer and saturated to the range 0–255 to give R, G and B. Note that, while a Reset results in all-zero output, a zero input gives output RGB=[0[15], 136[16], 0[17]].

[15] −179 is saturated to 0

[16] 135.5, with rounding becomes 136.

[17] −227 is saturated to 0

23.7.8 X-Scaling Control Unit

The CFU has a 2×32-bit double-buffer at its output between the color space converter and the HCU. The X-scaling control unit performs the scaling of the contone data to the printers output resolution, provides the mechanism for keeping track of the current read and write buffers, and ensures that a buffer cannot be read from until it has been written to.

A bit is kept for the status of each 32-bit buffer: buff_avail[0] and buff_avail[1]. It also keeps a single bit (rd_buff) for the current buffer that reads are to occur from, and a single bit (wr_buff) for the current buffer that writes are to occur to.

The output value outbuff_ok_to_write equals ~buff_avail [wr_buff]. Contone pixels are counted as they are received from the Y-scaling control unit, i.e. when wr_adv is 1. Pixels in the lead-in and lead-out areas are ignored, i.e. they are not written to the output buffer. Lead-in and lead-out clipping of pixels is implemented by the following pseudocode that generates the wr_en pulse for the output buffer.

```
if (wradv = = 1) then
    if (pixel__count = = {max__block,b111}) then
        pixel__count = 0
    else
        pixel__count ++
    if ((pixel__count < leadin__clip__num)
            OR (pixel__count > ({max__block,b111} −
leadout__clip__num))) then
        wr__en = 0
    else
        wr__en = 1
```

When a wr_en pulse is sent to the output double-buffer, buff_avail[wr_buff] is set, and wr_buff is inverted.

The output cfu_hcu_avail equals buff_avail[rd_buff]. When cfu_hcu_avail equals 1, this indicates to the HCU that data is available to be read from the CFU. The HCU responds by asserting hcu_cfu_advdot to indicate that the HCU has captured the pixel data on cfu_hcu_c[0–3]data lines and the CFU can now place the next pixel on the data lines.

The input pixels from the CSC may be scaled a non-integer number of times in the X direction to produce the output pixels for the HCU at the printhead resolution. Scaling is implemented by pixel replication. The algorithm for non-integer scaling is described in the pseudocode below. Note, x_scale_count should be loaded with x_start_count after reset and at the end of each line. This controls the amount by which the first pixel is scaled by. hcu_line_length and hcu_cfu_dotadv control the amount by which the last pixel in a line that is sent to the HCU is scaled by.

```
if (hcu__cfu__dotadv = = 1) then
    if (x__scale__count + x__scale__denom − x__scale__num >= 0)
then
        x__scale__count = x__scale__count +
        x__scale__denom −
```

-continued

```
x_scale_num
            rd_en = 1
        else
            x_scale_count = x_scale_count + x_scale_denom
            rd_en = 0
    else
            x_scale_count = x_scale_count
            rd_en = 0
```

When a rd_en pulse is received, buff_avail[rd_buff] is cleared, and rd_buff is inverted.

A 16-bit counter, dot_adv_count, is used to keep a count of the number of hcu_cfu_dotadv pulses received from the HCU. If the value of dot_adv_count equals hcu_line_length and a hcu_cfu_dotadv pulse is received, then a rd_en pulse is genrated to present the next dot at the output of the CFU, dot_adv_count is reset to 0 and x_scale_count is loaded with x_start_count.

24 Lossless Bi-Level Decoder (LBD)

24.1 Overview

The Lossless Bi-level Decoder (LBD) is responsible for decompressing a single plane of bi-level data. In SoPEC bi-level data is limited to a single spot color (typically black for text and line graphics).

The input to the LBD is a single plane of bi-level data, read as a bitstream from DRAM. The LBD is programmed with the start address of the compressed data, the length of the output (decompressed) line, and the number of lines to decompress. Although the requirement for SoPEC is to be able to print text at 10:1 compression, the LBD can cope with any compression ratio if the requested DRAM access is available. A pass-through mode is provided for 1:1 compression. Ten-point plain text compresses with a ratio of about 50:1. Lossless bi-level compression across an average page is about 20:1 with 10:1 possible for pages which compress poorly.

The output of the LBD is a single plane of decompressed bi-level data. The decompressed bi-level data is output to the SFU (Spot FIFO Unit), and in turn becomes an input to the HCU (Halftoner/Compositor unit) for the next stage in the printing pipeline. The LBD also outputs a lbd_finishedband control flag that is used by the PCU and is available as an interrupt to the CPU.

24.2 Main Features OF LBD

Figure 147:
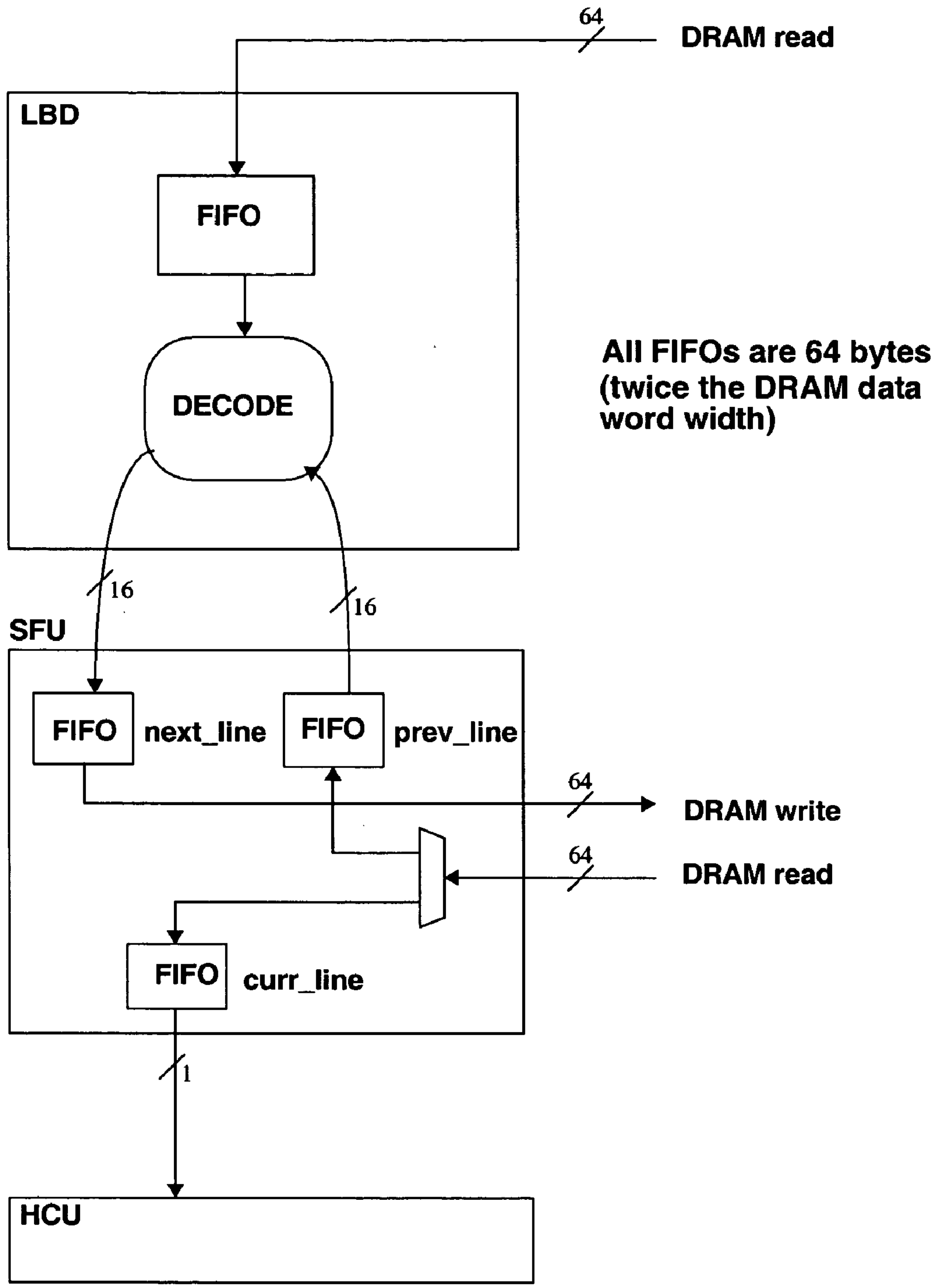
FIG. 147 shows a schematic outline of the LBD and the SFU

FIG. 147 shows a schematic outline of the LBD and SFU.

The LBD is required to support compressed images of up to 800 dpi. If possible we would like to support bi-level images of up to 1600 dpi. The line buffers must therefore be long enough to store a complete line at 1600 dpi.

The PEC1 LBD is required to output 2 dots/cycle to the HCU. This throughput capability is retained for SoPEC to minimise changes to the block, although in SoPEC the HCU will only read 1 dot/cycle. The PEC1 LDB outputs 16 bits in parallel to the PEC1 spot buffer. This is also retained for SoPEC. Therefore the LBD in SoPEC can run much faster than is required. This is useful for allowing stalls, e.g. due to band processing latency, to be absorbed.

The LBD has a pass through mode to cope with local negative compression. Pass through mode is activated by a special run-length code. Pass through mode continues to either end of line or for a pre-programmed number of bits, whichever is shorter. The special run-length code is always executed as a run-length code, followed by pass through.

The LBD outputs decompressed bi-level data to the NextLineFiFO in the Spot FIFO Unit (SFU). This stores the decompressed lines in DRAM, with a typical minimum of 2 lines stored in DRAM, nominally 3 lines up to a programmable number of lines. The SFU's NextLineFIFO can fill while the SFU waits for write access to DRAM. Therefore the LBD must be able to support stalling at its coding process. This is provided by the SFU via it's output during a line.

The LBD uses the previous line in the decoding process. This is provided by the SFU via it's PrevLineFIFO. Decoding can stall in the LBD while this FIFO waits to be filled from DRAM. A signal sfu_lbd_rdy indicates that both the SFU's NextLineFIFO and PrevLineFIFO are available for writing and reading, respectively.

A configuration register in the LBD controls whether the first line being decoded at the start of a band uses the previous line read from the SFU or uses an all 0's line instead.

The line length is stored in DRAM must be programmable to a value greater than 128. An A4 line of 13824 dots requires 1.7 Kbytes of storage. An A3 line of 19488 dots requires 2.4 Kbytes of storage.

The compressed spot data can be read at a rate of 1 bit/cycle for pass through mode 1:1 compression.

The LBD finished band signal is exported to the PCU and is additionally available to the CPU as an interrupt.

24.2.1 Bi-Level Decoding in the LBD

The black bi-level layer is losslessly compressed using Silverbrook Modified Group 4 (SMG4) compression which is a version of Group 4 Facsimile compression [22] without Huffman and with simplified run length encodings. The encoding are listed in Table 152 and Table 153.

TABLE 152

Bi-Level group 4 facsimile style compression encodings

| | Encoding | Description |
|---|---|---|
| same as Group 4 Facsimile | 1000 | Pass Command: a0 ←b2, skip next two edges |
| | 1 | Vertical(0): a0 ←b1, color = !color |
| | 110 | Vertical(1): a0 ←b1 + 1, color = !color |
| | 010 | Vertical(−1): a0 ←b1 − 1, color = !color |
| | 110000 | Vertical(2): a0 ←b1 + 2, color = !color |
| | 010000 | Vertical(−2): a0 ←b1 − 2, color = !color |
| Unique to this implementation | 100000 | Vertical(3): a0 ←b1 + 3, color = !color |
| | 000000 | Vertical(−3): a0 ←b1 − 3, color = !color |
| | <RL><RL>100 | Horizontal: a0 ←a0 + <RL> + <RL> |

SMG4 has a pass through mode to cope with local negative compression. Pass through mode is activated by a special run-length code. Pass through mode continues to either end of line or for a pre-programmed number of bits, whichever is shorter. The special run-length code is always executed as a run-length code, followed by pass through. The pass through escape code is a medium length run-length with a run of less than or equal to 31.

TABLE 153

Run length (RL) encodings

| | Encoding | Description |
|---|---|---|
| Unique to this implementation | RRRRR1 | Short Black Runlength (5 bits) |
| | RRRRR1 | Short White Runlength (5 bits) |
| | RRRRRRRRRR10 | Medium Black Runlength (10 bits) |
| | RRRRRRRR10 | Medium White Runlength (8 bits) |
| | RRRRRRRRRR10 | Medium Black Runlength with RRRRRRRRRR <= 31, Enter pass through |
| | RRRRRRRR10 | Medium White Runlength with RRRRRRRR <= 31, Enter pass through |
| | RRRRRRRRRRRRRRR00 | Long Black Runlength (15 bits) |
| | RRRRRRRRRRRRRRR00 | Long White Runlength (15 bits) |

Since the compression is a bitstream, the encodings are read right (least significant bit) to left (most significant bit). The run lengths given as RRRRR in Table 153 are read in the same way (least significant bit at the right to most significant bit at the left).

There is an additional enhancement to the G4 fax algorithm, it relates to pass through mode. It is possible for data to compress negatively using the G4 fax algorithm. On occasions like this it would be easier to pass the data to the LBD as un-compressed data. Pass through mode is a new feature that was not implemented in the PEC1 version of the LBD. When the LBD is in pass through mode the least significant bit of the data stream is an un-compressed bit. This bit is used to construct the current line.

To enter pass through mode the LBD takes advantage of the way run lengths can be written.

Usually if one of the runlength pair is less than or equal to 31 it should be encoded as a short runlength. However under the coding scheme of Table it is still legal to write it as a medium or long runlength. The LBD has been designed so that if a short runlength value is detected in a medium runlength then once the horizontal command containing this runlength is decoded completely this will tell the LBD to enter pass through mode and the bits following the runlength is un-compressed data. The number of bits to pass through is either a programmed number of bits or the end of the line which ever comes first. Once the pass through mode is completed the current color is the same as the color of the last bit of the passed through data.

24.2.2 DRAM Access Requirements

The compressed page store for contone, bi-level and raw tag data is 2 Mbytes. The LBD will access the compressed page store in single 256-bit DRAM reads. The LBD will need a 256-bit double buffer in its interface to the DIU. The LBD's DIU bandwidth requirements are summarized in Table 154

TABLE 154

DRAM bandwidth requirements

| Direction | Maximum number of cycles between each 256-bit DRAM access | Peak Bandwidth (bits/cycle) | Average Bandwidth (bits/cycle) |
|---|---|---|---|
| Read | 2561 (1:1 compression) | 1 (1:1 compression) | 0.1 (10:1 compression) |

1: At 1:1 compression the LBD requires 1 bit/cycle or 256 bits every 256 cycles.

24.3 Implementation 24.3.1 Definitions of IO

TABLE 155

LBD Port List

| Port Name | Pins | I/O | Description |
|---|---|---|---|
| Clocks and Resets | | | |
| Pclk | 1 | In | SoPEC Functional clock. |
| prst_n | 1 | In | Global reset signal. |
| Bandstore signals | | | |
| cdu_endofbandstore[21:5] | 17 | In | Address of the end of the current band of data. 256-bit word aligned DRAM address. |
| cdu_startofbandstore[21:5] | 17 | In | Address of the start of the current band of data. 256-bit word aligned DRAM address. |
| lbd_finishedband | 1 | Out | LBD finished band signal to PCU and Interrupt Controller. |
| DIU Interface signals | | | |
| lbd_diu_rreq | 1 | Out | LBD requests DRAM read. A read request must be accompanied by a valid read address. |
| lbd_diu_radr[21:5] | 17 | Out | Read address to DIU 17 bits wide (256-bit aligned word). |
| diu_lbd_rack | 1 | In | Acknowledge from DIU that read request has been accepted and new read address can be placed on lbd_diu_radr. |
| diu_data[63:0] | 64 | In | Data from DIU to SoPEC Units. First 64-bits is bits 63:0 of 256 bit word. Second 64-bits is bits 127:64 of 256 bit word. Third 64-bits is bits 191:128 of 256 bit word. Fourth 64-bits is bits 255:192 of 256 bit word. |
| diu_lbd_rvalid | 1 | In | Signal from DIU telling SoPEC Unit that valid read data is on the diu_data bus |
| PCU Interface data and control signals | | | |
| pcu_addr[5:2] | 4 | In | PCU address bus. Only 4 bits are required to decode the address space for this block. |
| pcu_dataout[31:0] | 32 | In | Shared write data bus from the PCU. |
| lbd_pcu_datain[31:0] | 32 | Out | Read data bus from the LBD to the PCU. |

TABLE 155-continued

LBD Port List

| Port Name | Pins | I/O | Description |
|---|---|---|---|
| pcu__rwn | 1 | In | Common read/not-write signal from the PCU. |
| pcu__lbd__sel | 1 | In | Block select from the PCU. When pcu__lbd__sel is high both pcu__addr and pcu__dataout are valid. |
| lbd__pcu__rdy | 1 | Out | Ready signal to the PCU. When lbd__pcu__rdy is high it indicates the last cycle of the access. For a write cycle this means pcu__dataout has been registered by the block and for a read cycle this means the data on lbd__pcu__datain is valid. |
| SFU Interface data and control signals | | | |
| sfu__lbd__rdy | 1 | In | Ready signal indicating SFU has previous line data available for reading and is also ready to be written to. |
| lbd__sfu__advline | 1 | Out | Advance line signal to previous and next line buffers |
| lbd__sfu__pladvword | 1 | Out | Advance word signal for previous line buffer. |
| sfu__lbd__pldata[15:0] | 16 | In | Data from the previous line buffer. |
| lbd__sfu__wdata[15:0] | 16 | Out | Write data for next line buffer. |
| lbd__sfu__wdatavalid | 1 | Out | Write data valid signal for next line buffer data. |

24.3.2 Configuration Registers

TABLE 156

LBD Configuration Registers

| Address (LBD__base +) | Register Name | # Bits | Value on Reset | Description |
|---|---|---|---|---|
| Control registers | | | | |
| 0x00 | Reset | 1 | 0x1 | A write to this register causes a reset of the LBD.<br>This register can be read to indicate the reset state:<br>0 - reset in progress<br>1 - reset not in progress |
| 0x04 | Go | 1 | 0x0 | Writing 1 to this register starts the LBD.<br>Writing 0 to this register halts the LBD.<br>The Go register is reset to 0 by the LBD when it finishes processing a band.<br>When Go is deasserted the state-machines go to their idle states but all counters and configuration registers keep their values.<br>When Go is asserted all counters are reset, but configuration registers keep their values (i.e. they don't get reset).<br>The LBD should only be started after the SFU is started.<br>This register can be read to determine if the LBD is running<br>(1 - running, 0 - stopped). |
| Setup registers (constant for during processing the page) | | | | |
| 0x08 | LineLength | 16 | 0x0000 | Width of expanded bi-level line (in dots) (must be set greater than 128 bits). |
| 0x0C | PassThroughEnable | 1 | 0x1 | Writing 1 to this register enables passthrough mode.<br>Writing 0 to this register disables pass-through mode thereby making the LBD compatible with PEC1. |
| 0x10 | PassThroughDotLength | 16 | 0x0000 | This is the dot length - 1 for which pass-through mode will last. If the end of the line is reached first then pass-through will be disabled. The value written to this register must be a non-zero value. |
| Work registers (need to be set up before processing a band) | | | | |
| 0x14 | NextBandCurrReadAdr[21:5] (256-bit aligned DRAM address) | 17 | 0x00000 | Shadow register which is copied to CurrReadAdr when (NextBandEnable = = 1 & Go = = 0). |

TABLE 156-continued

LBD Configuration Registers

| Address (LBD_base +) | Register Name | # Bits | Value on Reset | Description |
|---|---|---|---|---|
| | | | | NextBandCurrReadAdr is the address of the start of the next band of compressed bi-level data in DRAM. |
| 0x18 | NextBandLinesRemaining | 15 | 0x0000 | Shadow register which is copied to LinesRemaining when (NextBandEnable = = 1 & Go = = 0). NextBandLinesRemaining is the number of lines to be decoded in the next band of compressed bi-level data. |
| 0x1C | NextBandPrevLineSource | 1 | 0x0 | Shadow register which is copied to PrevLineSource when (NextBandEnable = = 1 & Go = = 0). 1 - use the previous line read from the SFU for decoding the first line at the start of the next band. 0 - ignore the previous line read from the SFU for decoding the first line at the start of the next band (an all 0's line is used instead). |
| 0x20 | NextBandEnable | 1 | 0x0 | If (NextBandEnable = = 1 & Go = = 0) then NextBandCurrReadAdr is copied to CurrReadAdr, NextBandLinesRemaining is copied to LinesRemaining, NextBandPrevLineSource is copied to PrevLineSource, Go is set, NextBandEnable is cleared. To start LBD processing NextBandEnable should be set. |
| Work registers (read only for external access) | | | | |
| 0x24 | CurrReadAdr[21:5] (256-bit aligned DRAM address) | 17 | — | The current 256-bit aligned read address within the compressed bi-level image (DRAM address). Read only register. |
| 0x28 | LinesRemaining | 15 | — | Count of number of lines remaining to be decoded. The band has finished when this number reaches 0. Read only register. |
| 0x2C | PrevLineSource | 1 | — | 1 - uses the previous line read from the SFU for decoding the first line at the start of the next band. 0 - ignores the previous line read from the SFU for decoding the first line at the start of the next band (an all 0's line is used instead). Read only register. |
| 0x30 | CurrWriteAdr | 15 | — | The current dot position for writing to the SFU. Read only register. |
| 0x34 | FirstLineOfBand | 1 | — | Indicates whether the current line is considered to be the first line of the band. Read only register. |

24.3.3 Starting the LBD Between Bands

The LBD should be started after the SFU. The LBD is programed with a start address for the compressed bi-level data, a decode line length, the source of the previous line and a count of how many lines to decode. The LBD's NextBandEnable bit should then be set (this will set LBD Go). The LBD decodes a single band and then stops, clearing it's Go bit and issuing a pulse on lbd_finishedband. The LBD can then be restarted for the next band, while the HCU continues to process previously decoded bi-level data from the SFU.

There are 4 mechanisms for restarting the LBD between bands:

a. lbd_finishedband causes an interrupt to the CPU. The LBD will have stopped and cleared its Go bit. The CPU reprograms the LBD, typically the NextBandCurrReadAdr, NextBandLinesRemaining and NextBandPrevLineSource shadow registers, and sets NextBandEnable to restart the LBD.

b. The CPU programs the LBD's NextBandCurrReadAdr, NextBandLinesRemaining, and NextBandPrevLineSource shadow registers and sets the NextBandEnable flag before the end of the current band. At the end of the band the LBD clears Go, NextBandEnable is already set so the LBD restarts immediately.

c. The PCU is programmed so that lbd_finishedband triggers the PCU to execute commands from DRAM to reprogram the LBD's NextBandCurrReadAdr, NextBandLinesRemaining, and NextBandPrevLineSource shadow registers and set NextBandEnable to restart the LBD. The advantage of this scheme is that the CPU could process band headers in advance and store the band commands in DRAM ready for execution.

d. This is a combination of b and c above. The PCU (rather than the CPU in b) programs the LBD's NextBandCurrReadAdr, NextBandLinesRemaining, and NextBandPrevLineSource shadow registers and sets the NextBandEnable flag before the end of the current band. At the end of the band the LBD clears Go and pulses lbd_finishedband. NextBandEnable is already set so the LBD restarts immediately. Simultaneously, lbd_finishedband triggers the PCU to fetch commands from DRAM. The LBD will have restarted by the time the PCU has fetched commands from DRAM. The PCU commands program the LBD's shadow registers and sets NextBandEnable for the next band.

24.3.4 Top-Level Description

Figure 148:
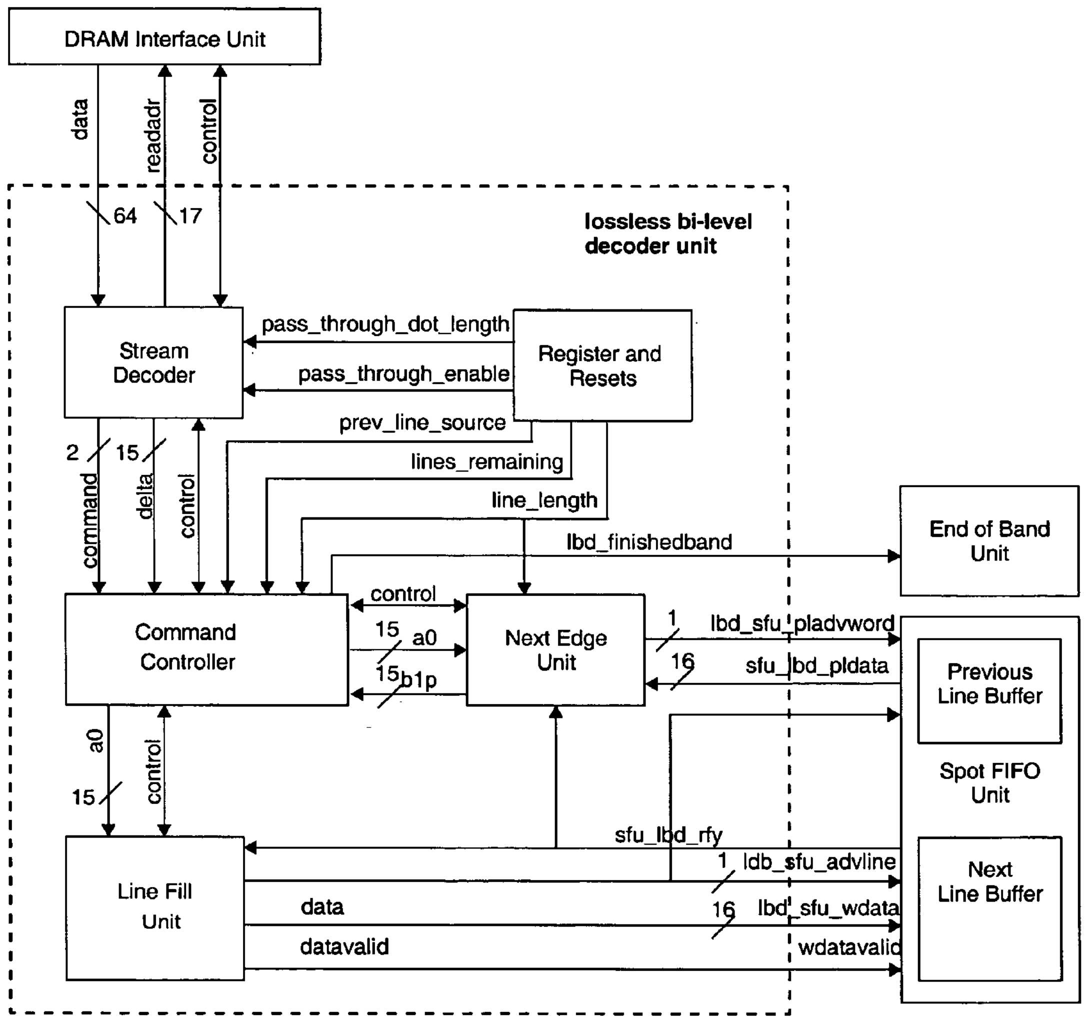
FIG. 148 shows a block diagram of lossless bi-level decoder

A block diagram of the LBD is shown in FIG. 148.

The LBD contains the following sub-blocks:

TABLE 157

Functional sub-blocks in the LBD

| name | Description |
|---|---|
| Registers and Resets | PCU interface and configuration registers. Also generates the Go and the Reset signals for the rest of the LBD |
| Stream Decoder | Accesses the bi-level description from the DRAM through the DIU interface. It decodes the bit stream into a command with arguments, which it then passes to the command controller. |
| Command Controller | Interprets the command from the stream decoder and provide the line fill unit with a limit address and color to fill the SFU Next Line Buffer. It also provides the next edge unit starting address to look for the next edge. |
| Next Edge Unit | Scans through the Previous Line Buffer using its current address to find the next edge of a color provided by the command controller. The next edge unit outputs this as the next current address back to the command controller and sets a valid bit when this address is at the next edge. |
| Line Fill Unit | Fills the SFU Next Line Buffer with a color from its current address up to a limit address. The color and limit are provided by the command controller. |

In the following description the LBD decodes data for its current decode line but writes this data into the SFU's next line buffer.

Naming of signals and logical blocks are taken from [22].

The LBD is able to stall mid-line should the SFU be unable to supply a previous line or receive a current line frame due to band processing latency.

All output control signals from the LBD must always be valid after reset. For example, if the LBD is not currently decoding, lbd_sfu_advline (to the SFU) and lbd_finished-band will always be 0.

24.3.5 Registers and Resets Sub-Block Description

Since the CDU, LBD and TE all access the page band store, they share two registers that enable sequential memory accesses to the page band stores to be circular in nature. The CDU chapter lists these two registers. The register descriptions for the LBD are listed in Table.

During initialisation of the LBD, the LineLength and the LinesRemaining configuration values are written to the LBD. The 'Registers and Resets' sub-block supplies these signals to the other sub-blocks in the LBD. In the case of LinesRemaining, this number is decremented for every line that is completed by the LBD.

If pass through is used during a band the PassThrough-Enable register needs to be programmed and PassThrough-DotLength programmed with the length of the compressed bits in pass through mode.

PrevLineSource is programmed during the initialisation of a band, if the previous line supplied for the first line is a valid previous line, a 1 is written to PrevLineSource so that the data is used. If a 0 is written the LBD ignores the previous line information supplied and acts as if it is receiving all zeros for the previous line regardless of what the out of the SFU is.

The 'Registers and Resets' sub-block also generates the resets used by the rest of the LBD and the Go bit which tells the LBD that it can start requesting data from the DIU and commence decoding of the compressed data stream.

24.3.6 Stream Decoder Sub-Block Description

The Stream Decoder reads the compressed bi-level image from the DRAM via the DIU (single accesses of 256-bits) into a double 256-bit FIFO. The barrel shift register uses the 64-bit word from the FIFO to fill up the empty space created by the barrel shift register as it is shifting it's contents. The bit stream is decoded into a command/arguments pair, which in turn is passed to the command controller.

Figure 149:
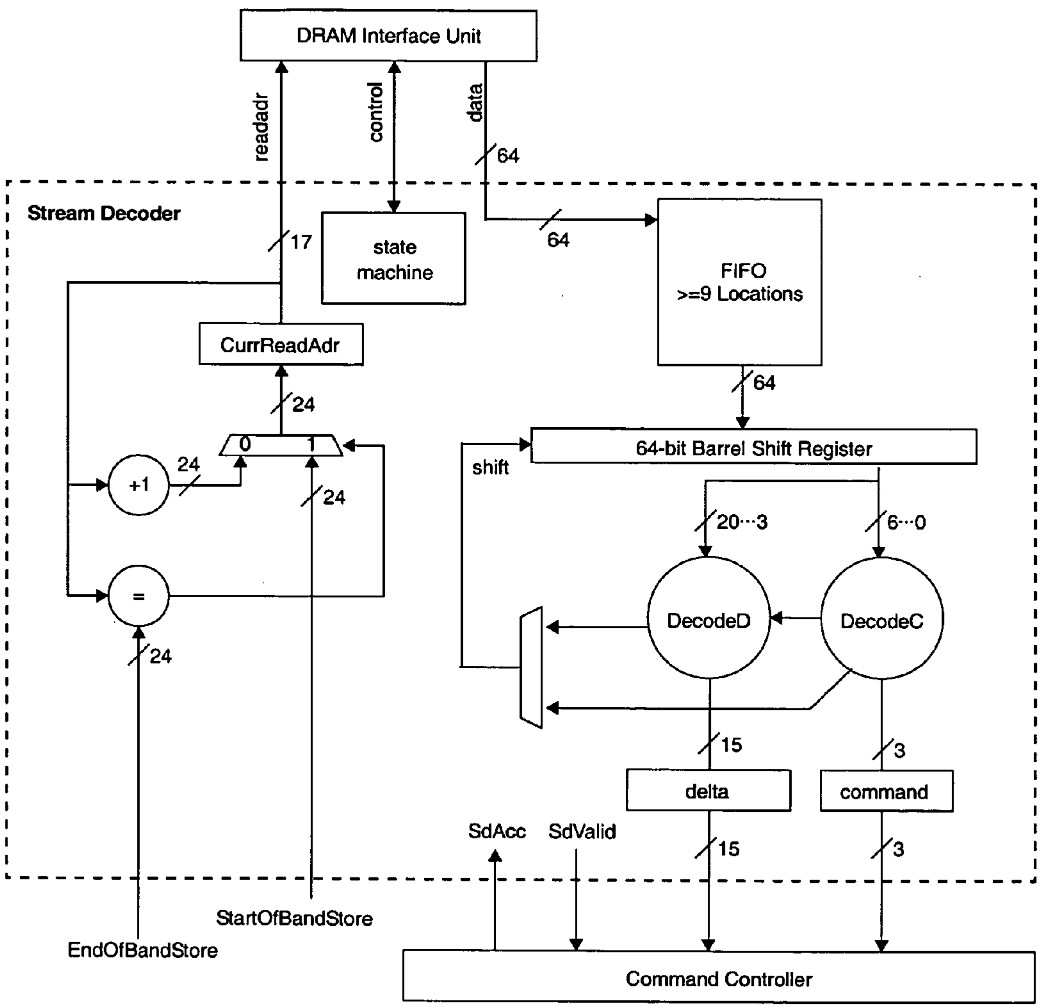
FIG. 149 shows a stream decoder block diagram

A dataflow block diagram of the stream decoder is shown in FIG. 149.

24.3.6.1 DecodeC—Decode Command

The DecodeC logic encodes the command from bits 6..0 of the bit stream to output one of three commands: SKIP, VERTICAL and RUNLENGTH. It also provides an output to indicate how many bits were consumed, which feeds back to the barrel shift register.

There is a fourth command, PASS_THROUGH, which is not encoded in bits 6..0, instead it is inferred in a special runlength. If the stream decoder detects a short runlength value, i.e. a number less than 31, encoded as a medium runlength this tell the Stream Decoder that once the horizontal command containing this runlength is decoded completely the LBD enters PASS_THROUGH mode. Following the runlength there will be a number of bits that represent un-compressed data. The LBD will stay in PASS_THROUGH mode until all these bits have been decoded successfully, this will occur once a programmed number of bits is reached or the line ends, which ever comes first.

24.3.6.2 DecodeD—Decode Delta

The DecodeD logic decodes the run length from bits 20..3 of the bit stream. If DecodeC is decoding a vertical command, it will cause DecodeD to put constants of −3 through 3 on its output. The output delta is a 15 bit number, which is generally considered to be positive, but since it needs to only address to 13824 dots for an A4 page and 19488 dots for an A3 page (of 32,768), a 2's complement representation of −3, −2, −1 will work correctly for the data pipeline that follows. This unit also outputs how many bits were consumed.

In the case of PASS_THROUGH mode, DecodeD parses the bits that represent the un-compressed data and this is used by the Line Fill Unit to construct the current line frame.

DecodeD parses the bits at one bit per clock cycle and passes the bit in the less significant bit location of delta to the line fill unit.

DecodeD currently requires to know the color of the run length to decode it correctly as black and white runs are encoded differently. The stream decoder keeps track of the next color based on the current color and the current command.

24.3.6.3 State-Machine

This state machine continuously fetches consecutive DRAM data whenever there is enough free space in the FIFO, thereby keeping the barrel shift register full so it can continually decode commands for the command controller. Note in FIG. 149 that each read cycle curr_read_addr is compared to end_of_band_store. If the two are equal, curr_read_addr is loaded with start_of_band_store (circular memory addressing). Otherwise curr_read_addr is simply incremented. start_of_band_store and end_of_band_store need to be programed so that the distance between them is a multiple of the 256-bit DRAM word size.

When the state machine decodes a SKIP command, the state machine provides two SKIP instructions to the command controller.

The RUNLENGTH command has two different run lengths. The two run lengths are passed to the command controller as separate RUNLENGTH instructions. In the first instruction fetch, the first run length is passed, and the state machine selects the DecodeD shift value for the barrel shift. In the second instruction fetch from the command controller another RUNLENGTH instruction is generated and the respective shift value is decoded. This is achieved by forcing DecodeC to output a second RUNLENGTH instruction and the respective shift value is decoded.

For PASS_THROUGH mode, the PASS THROUGH command is issued every time the command controller requests a new command. It does this until all the uncompressed bits have been processed.

24.3.7 Command Controller Sub-Block Description

The Command Controller interprets the command from the Stream Decoder and provides the line fill unit with a limit address and color to fill the SFU Next Line Buffer. It provides the next edge unit with a starting address to look for the next edge and is responsible for detecting the end of line and generating the eob_cc signal that is passed to the line fill unit.

Figure 150:
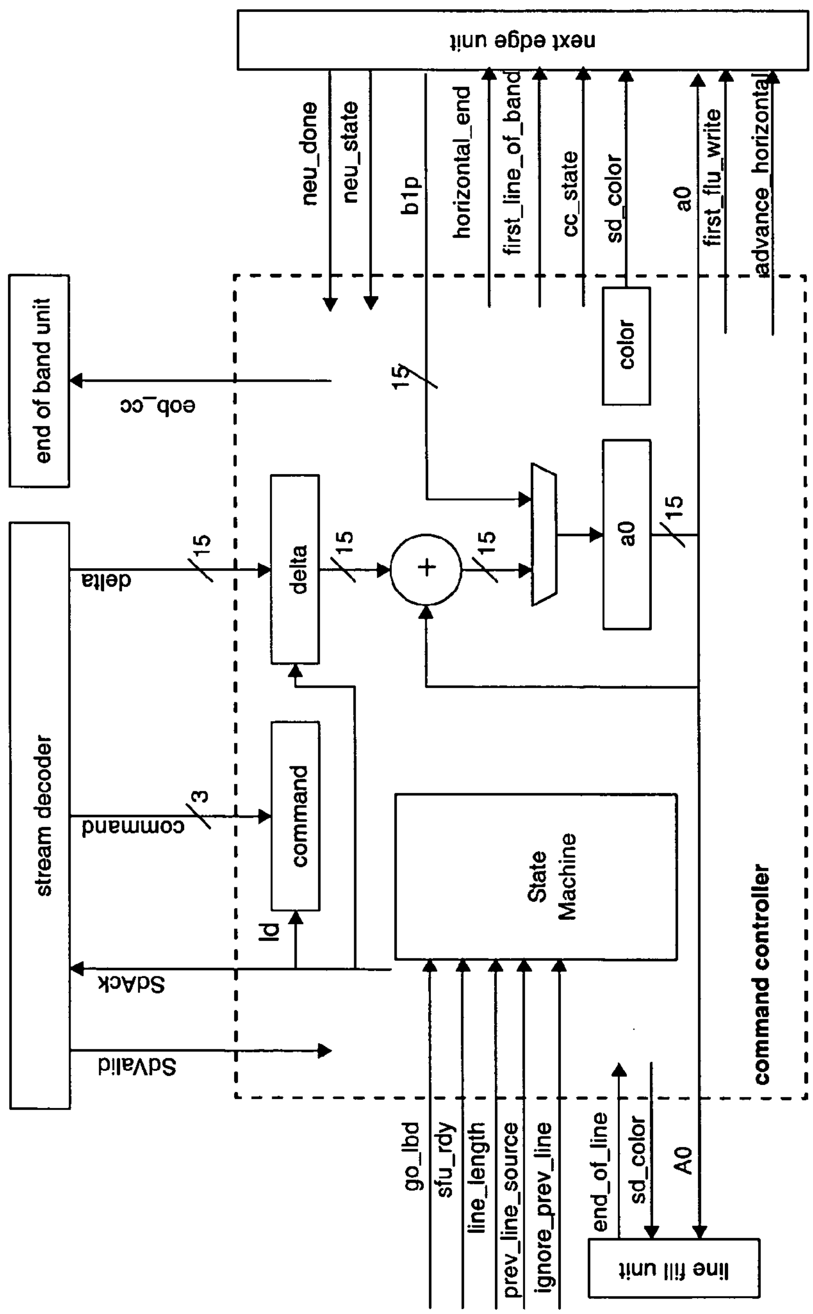
FIG. 150 shows a command controller block diagram
Figure 151:
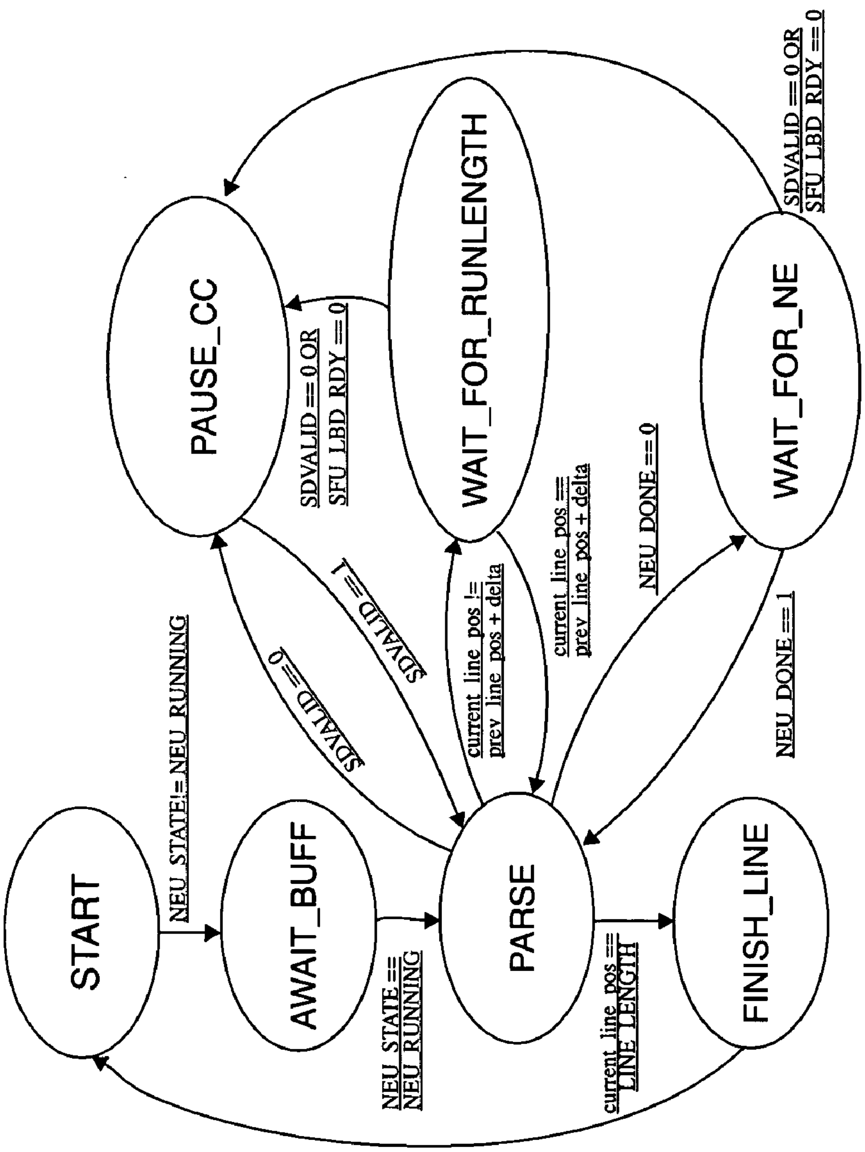
FIG. 151 shows a state diagram for command controller (CC) state machine

A dataflow block diagram of the command controller is shown in FIG. 150. Note that data names such as a0 and b1*p* are taken from [22], and they denote the reference or starting changing element on the coding line and the first changing element on the reference line to the right of a0 and of the opposite color to a0 respectively.

24.3.7.1 State Machine

The following is an explanation of all the states that the state machine utilizes.

i Start

This is the state that the Command Controller enters when a hard or soft reset occurs or when Go has been de-asserted. This state cannot be left until the reset has been removed, Go has been asserted and the NEU (Next Edge Unit), the SD (Stream Decoder) and the SFU are ready.

ii AWAIT_BUFFER

The NEU contains a buffer memory for the data it receives from the SFU. When the command controller enters this state the NEU detects this and starts buffering data, the command controller is able to leave this state when the state machine in the NEU has entered the NEU_RUNNING state. Once this occurs the command controller can proceed to the PARSE state.

iii PAUSE_CC

During the decode of a line it is possible for the FIFO in the stream decoder to get starved of data if the DRAM is not able to supply replacement data fast enough. Additionally the SFU can also stall mid-line due to band processing latency. If either of these cases occurs the LBD needs to pause until the stream decoder gets more of the compressed data stream from the DRAM or the SFU can receive or deliver new frames. All of the remaining states check if sdvalid goes to zero (this denotes a starving of the stream decoder) or if sfu_lbd_rdy goes to zero and that the LBD needs to pause. PAUSE_CC is the state that the command controller enters to achieve this and it does not leave this state until sdvalid and sfu_lbd_rdy are both asserted and the LBD can recommence decompressing.

iv PARSE

Once the command controller enters the PARSE state it uses the information that is supplied by the stream decoder. The first clock cycle of the state sees the sdack signal getting asserted informing the stream decoder that the current register information is being used so that it can fetch the next command.

When in this state the command controller can receive one of four valid commands:

a) Runlength or Horizontal

For this command the value given as delta is an integer that denotes the number of bits of the current color that must be added to the current line.

Should the current line position, a0, be added to the delta and the result be greater than the final position of the current frame being processed by the Line Fill Unit (only 16 bits at a time), it is necessary for the command controller to wait for the Line Fill Unit (LFU) to process up to that point. The command controller changes into the WAIT_FOR_RUNLENGTH state while this occurs.

When the current line position, a1, and the delta together equal or exceed the LINE_LENGTH, which is programmed during initialisation, then this denotes that it is the end of the current line. The command controller signals this to the rest of the LBD and then returns to the START state.

b) Vertical

When this command is received, it tells the command controller that, in the previous line, it needs to find a change from the current color to opposite of the current color, i.e. if the current color is white it looks from the current position in the previous line for the next time where there is a change in color from white to black. It is important to note that if a black to white change occurs first it is ignored.

Once this edge has been detected, the delta will denote which of the vertical commands to use, refer to Table. The delta will denote where the changing element in the current line is relative to the changing element on the previous line, for a Vertical(2) the new changing element position in the current line will correspond to the two bits extra from changing element position in the previous line.

Should the next edge not be detected in the current frame under review in the NEU, then the command controller enters the WAIT_FOR_NE state and waits there until the next edge is found.

c) Skip

A skip follow the same functionality as to Vertical(0) commands but the color in the current line is not changed as it is been filled out. The stream decoder supplies what looks like two separate skip commands that the command controller treats the same a two Vertical(0) commands and has been coded not to change the current color in this case.

d) Pass Through

When in pass through mode the stream decoder supplies one bit per clock cycle that is uses to construct the current frame. Once pass through mode is completed, which is controlled in the stream decoder, the LBD can recommence normal decompression again. The current color after pass through mode is the same color as the last bit in uncompressed data stream. Pass through mode does not need an extra state in the command controller as each pass through command received from the stream decoder can always be processed in one clock cycle.

v WAIT_FOR_RUNLENGTH

As some RUNLENGTH's can carry over more than one 16-bit frame, this means that the Line Fill Unit needs longer than one clock cycle to write out all the bits represented by the RUNLENGTH.

After the first clock cycle the command controller enters into the WAIT_FOR_RUNLENGTH state until all the RUNLENGTH data has been consumed. Once finished and provided it is not the end of the line the command controller will return to the PARSE state.

vi WAIT_FOR_NE

Similar to the RUNLENGTH commands the vertical commands can sometimes not find an edge in the current 16-bit frame. After the first clock cycle the command controller enters the WAIT_FOR_NE state and remains here until the edge is detected. Provided it is not the end of the line the command controller will return to the PARSE state.

vii FINISH_LINE

At the end of a line the command controller needs to hold its data for the SFU before going back to the START state. Command controller remains in the FINISH_LINE state for one clock cycle to achieve this.

24.3.8 Next Edge Unit Sub-Block Description

Figure 152:
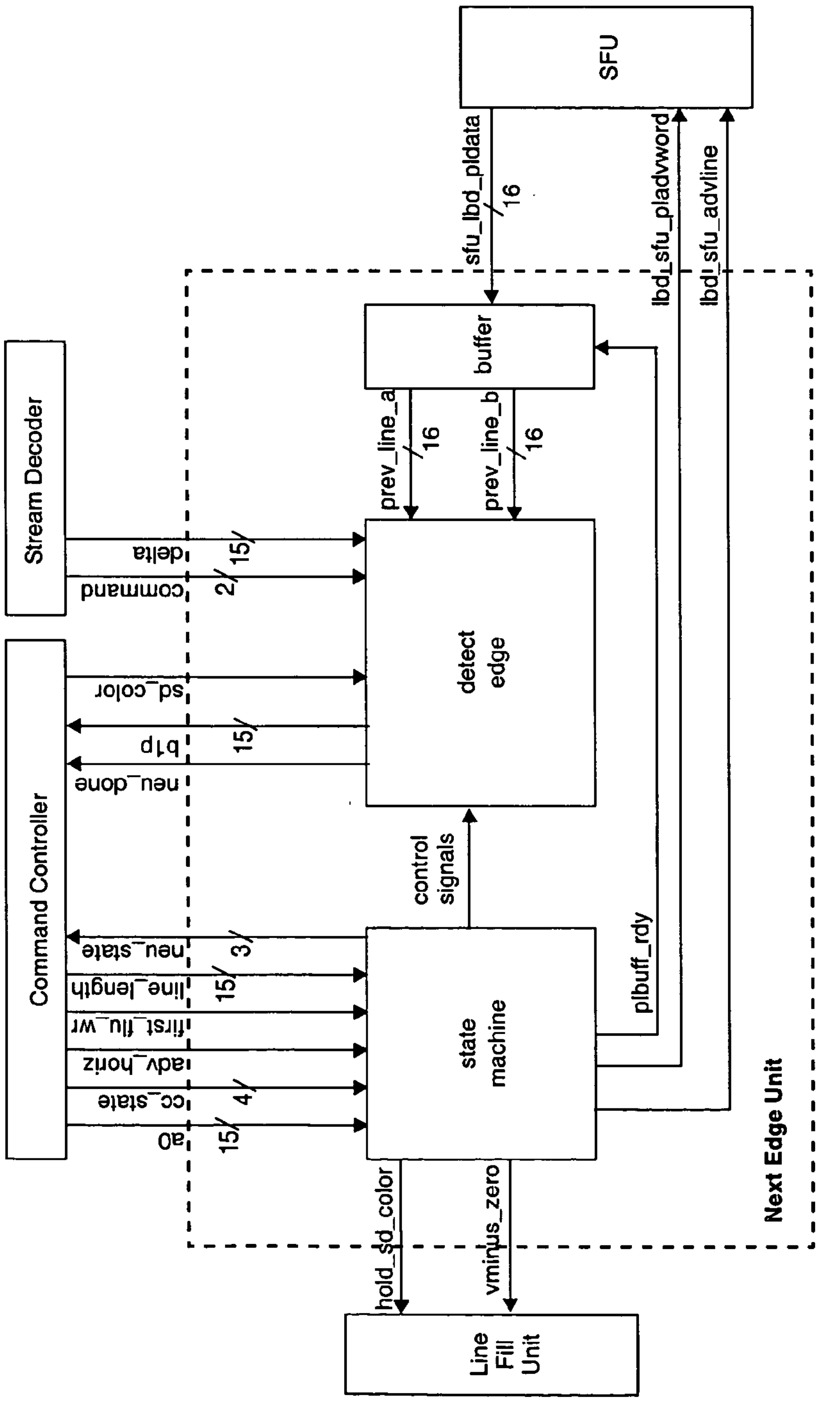
FIG. 152 shows a next edge unit block diagram

The Next Edge Unit (NEU) is responsible for detecting color changes, or edges, in the previous line based on the current address and color supplied by the Command Controller. The NEU is the interface to the SFU and it buffers the previous line for detecting an edge. For an edge detect operation the Command Controller supplies the current address, this typically was the location of the last edge, but it could also be the end of a run length. With the current address a color is also supplied and using these two values the NEU will search the previous line for the next edge. If an edge is found the NEU returns this location to the Command Controller as the next address in the current line and it sets a valid bit to tell the Command Controller that the edge has been detected. The Line Fill Unit uses this result to construct the current line. The NEU operates on 16-bit words and it is possible that there is no edge in the current 16 bits in the NEU. In this case the NEU will request more words from the SFU and will keep searching for an edge. It will continue doing this until it finds an edge or reaches the end of the previous line, which is based on the LINE_LENGTH. A dataflow block diagram of the Next Edge unit is shown in FIG. 152.

24.3.8.1 NEU Buffer

The algorithm being employed for decompression is based on the whole previous line and is not delineated during the line. However the Next Edge Unit, NEU, can only receive 16 bits at a time from the SFU. This presents a problem for vertical commands if the edge occurs in the successive frame, but refers to a changing element in the current frame.

To accommodate this the NEU works on two frames at the same time, the current frame and the first 3 bits from the successive frame. This allows for the information that is needed from the previous line to construct the current frame of the current line.

Figure 153:
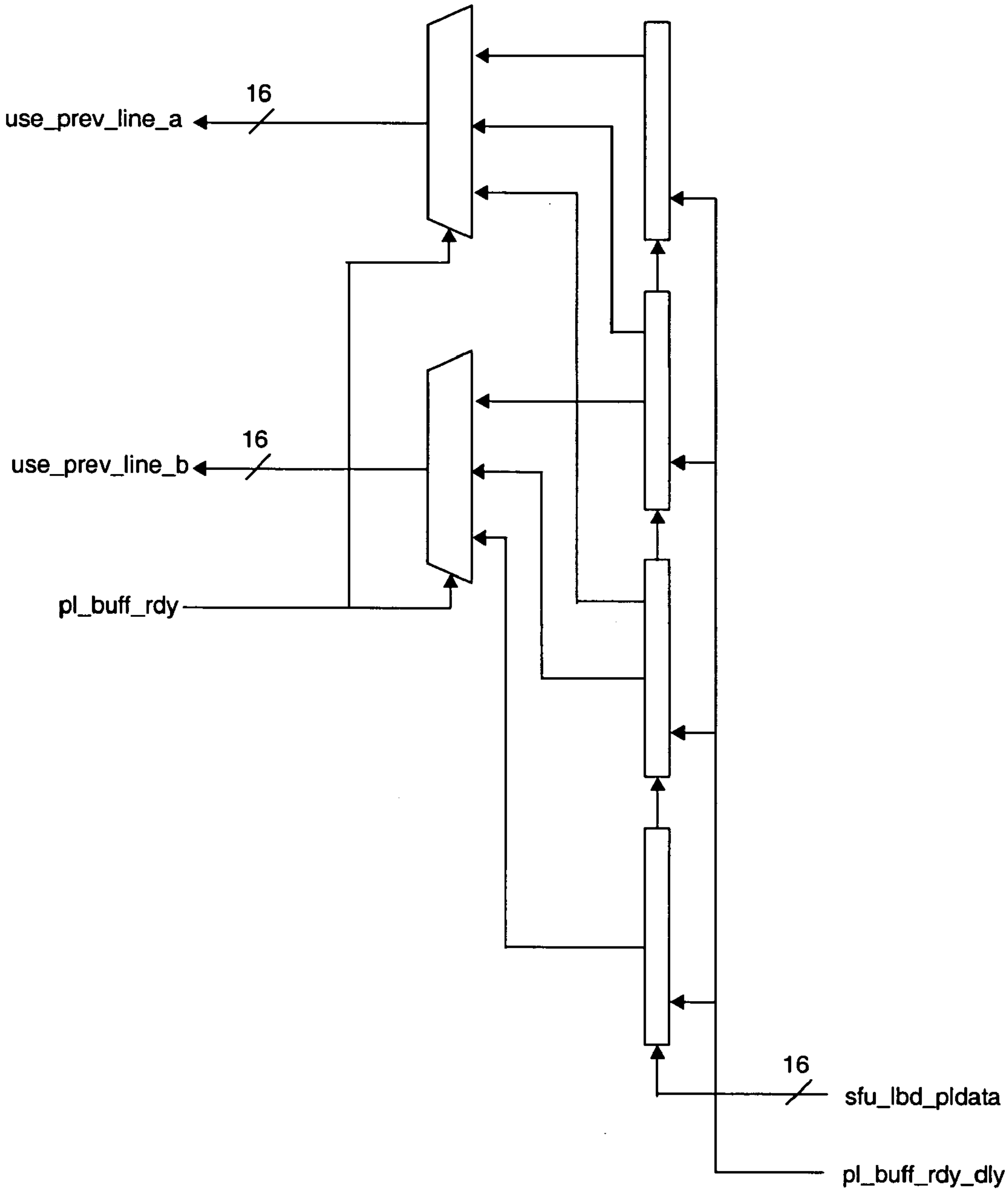
FIG. 153 shows a next edge unit buffer diagram

In addition to this buffering there is also buffering right after the data is received from the SFU as the SFU output is not registered. The current implementation of the SFU takes two clock cycles from when a request for a current line is received until it is returned and registered. However when NEU requests a new frame it needs it on the next clock cycle to maintain a decoded rate of 2 bits per clock cycle. A more detailed diagram of the buffer in the NEU is shown in FIG. 153.

The output of the buffer are two 16-bit vectors, use_prev_line_a and use_prev_line_b, that are used to detect an edge that is relevant to the current line being put together in the Line Fill Unit.

24.3.8.2 NEU Edge Detect

Figure 154:
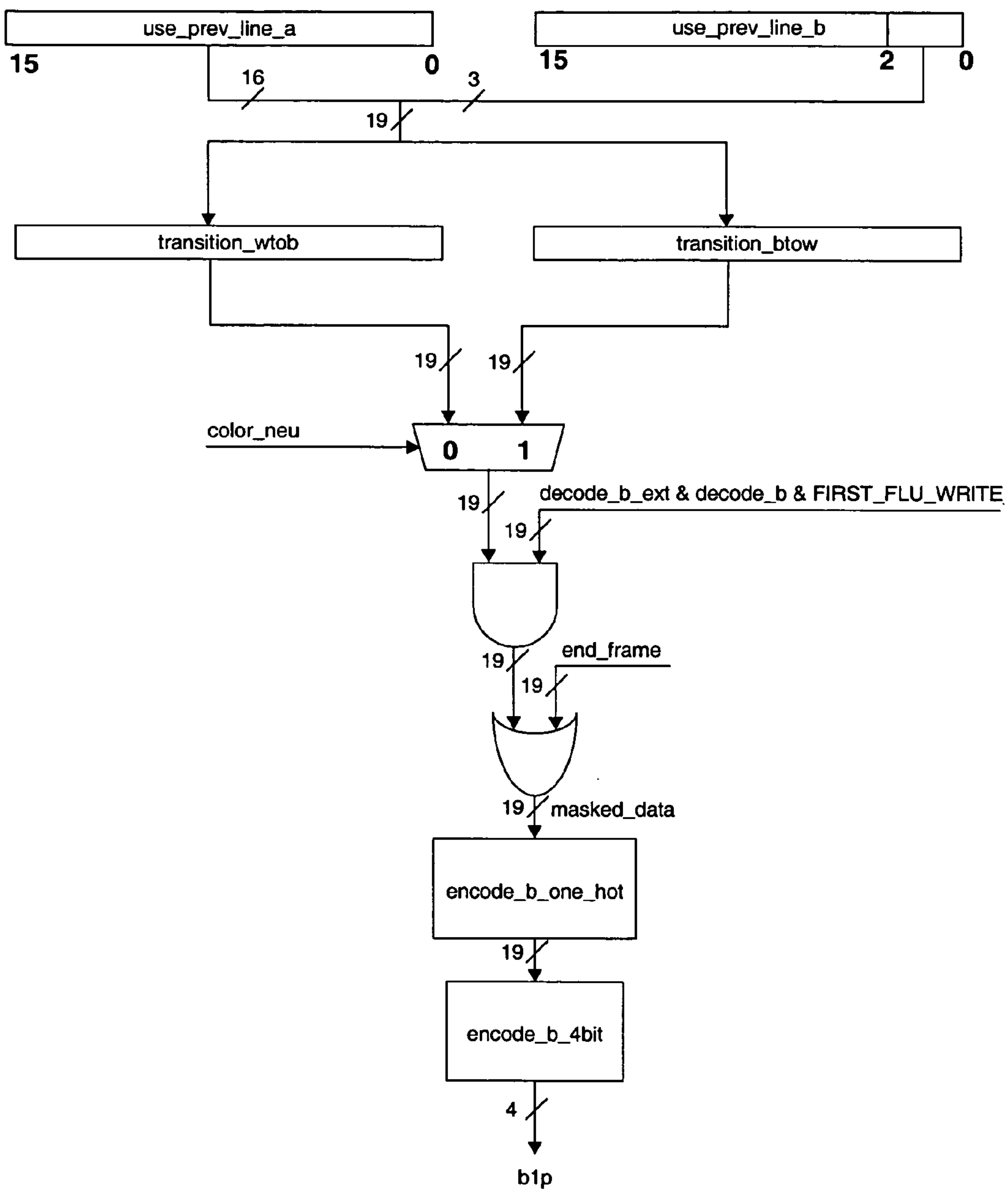
FIG. 154 shows a next edge unit edge detect diagram
Figure 155:
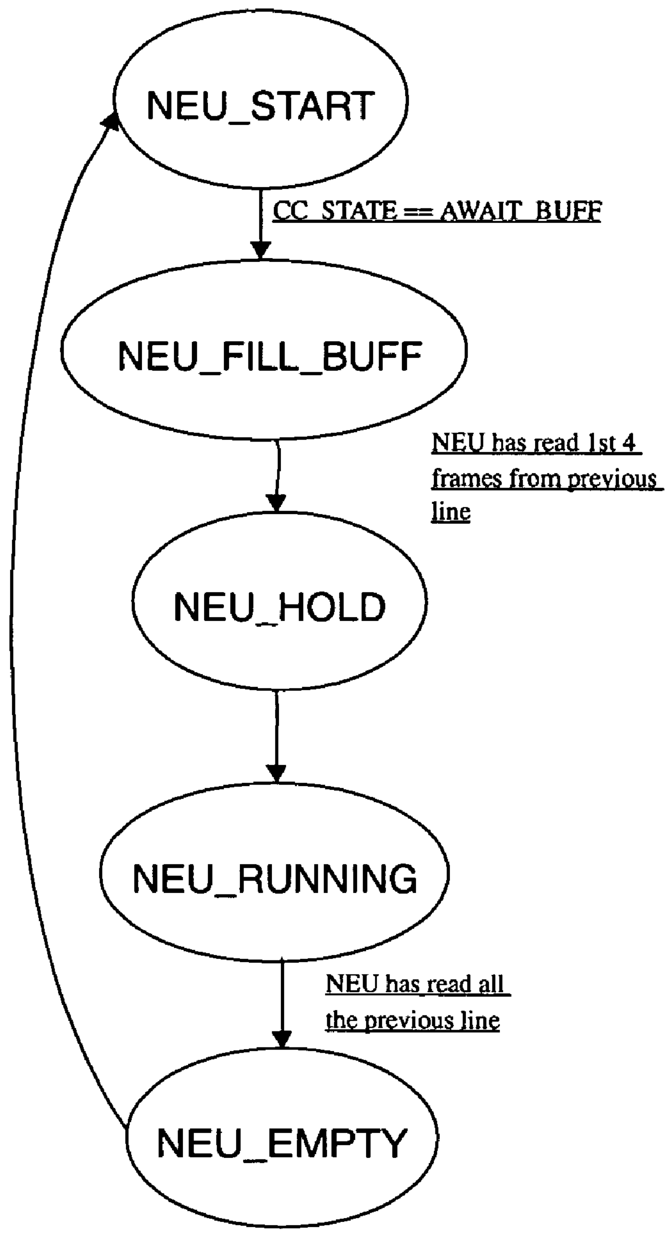
FIG. 155 shows a state diagram for the next edge unit state machine
Figure 156:
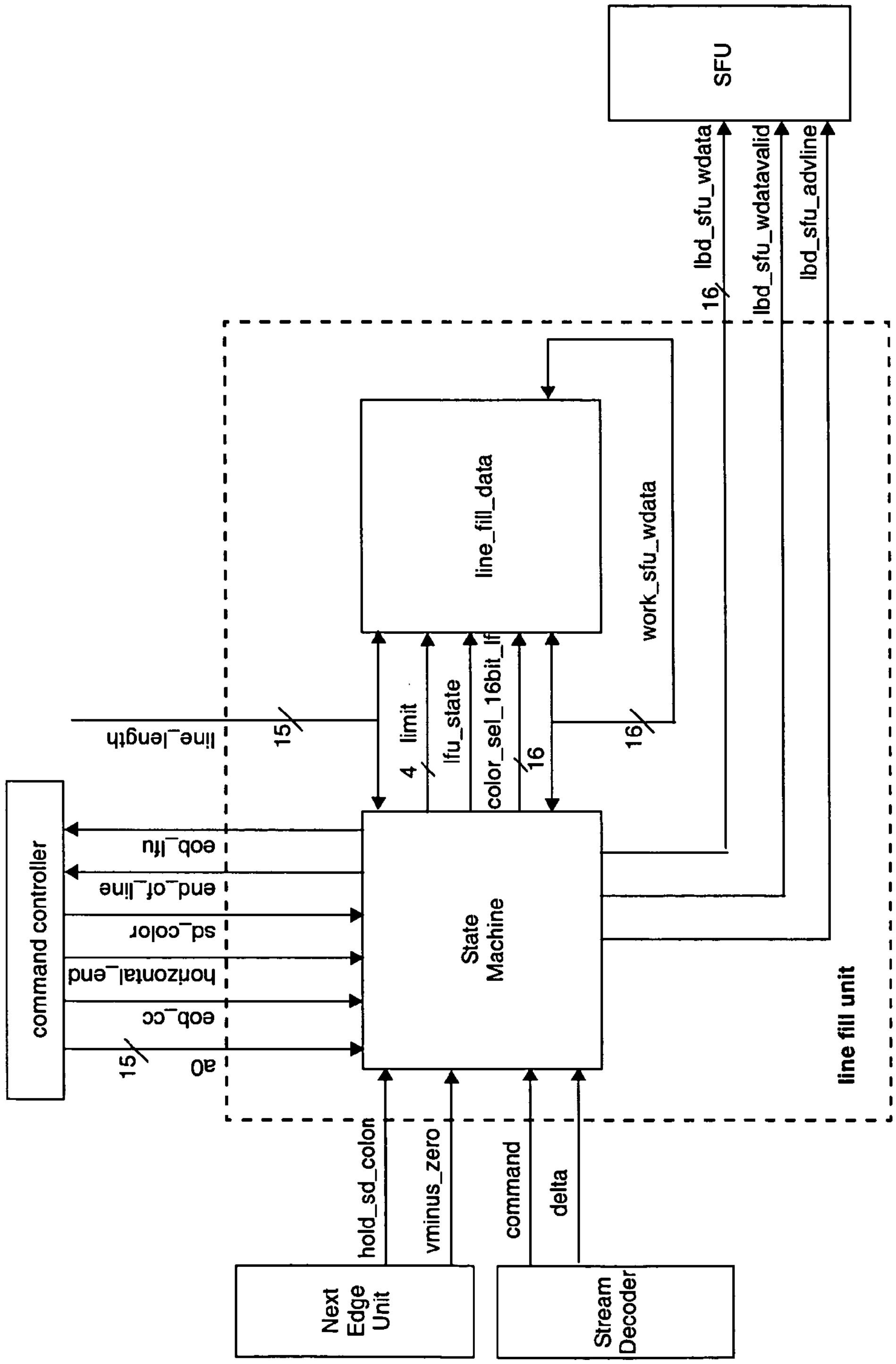
FIG. 156 shows a line fill unit block diagram
Figure 157:
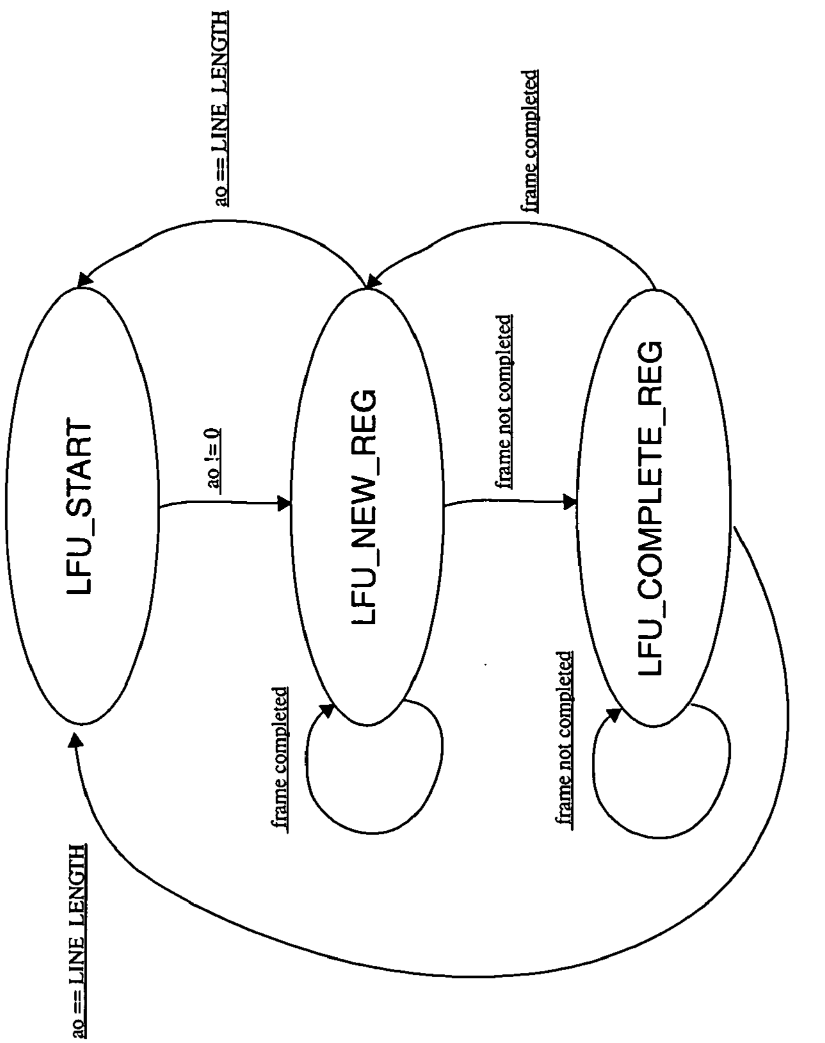
FIG. 157 shows a state diagram for the Line Fill Unit (LFU) state machine

The NEU Edge Detect block takes the two 16 bit vectors supplied by the buffer and based on the current line position in the current line, a0, and the current color, sd_color, it will detect if there is an edge relevant to the current frame. If the edge is found it supplies the current line position, b1p, to the command controller and the line fill unit. The configuration of the edge detect is shown in FIG. 154.

The two vectors from the buffer, use_prev_line_a and use_prev_line_b, pass into two sub-blocks, transition_wtob and transition_btow. transition_wtob detects if any white to black transitions occur in the 19 bit vector supplied and outputs a 19-bit vector displaying the transitions. transition_wtob is functionally the same as transition_btow, but it detects white to black transitions.

The two 19-bit vectors produced enter into a multiplexer and the output of the multiplexer is controlled by color_neu. color_neu is the current edge transition color that the edge detect is searching for.

The output of the multiplexer is masked against a 19-bit vector, the mask is comprised of three parts concatenated together: decode_b_ext, decode_b and FIRST_FLU_WRITE.

The output of transition_wtob (and it complement transition_btow) are all the transitions in the 16 bit word that is under review. The decode_b is a mask generated from a0. In bit-wise terms all the bits above and including a0 are 1's and all bits below a0 are 0's. When they are gated together it means that all the transitions below a0 are ignored and the first transition after a0 is picked out as the next edge.

The decode_b block decodes the 4 lsb of the current address (a0) into 16-bit mask bits that control which of the data bits are examined. Table 158 shows the truth table for this block.

TABLE 158

Decode_b truth table

| input | output |
|---|---|
| 0000 | 1111111111111111 |
| 0001 | 1111111111111110 |
| 0010 | 1111111111111100 |
| 0011 | 1111111111111000 |
| 0100 | 1111111111110000 |
| 0101 | 1111111111100000 |
| 0110 | 1111111111000000 |
| 0111 | 1111111110000000 |
| 1000 | 1111111100000000 |
| 1001 | 1111111000000000 |
| 1010 | 1111110000000000 |
| 1011 | 1111100000000000 |
| 1100 | 1111000000000000 |
| 1101 | 1110000000000000 |
| 1110 | 1100000000000000 |
| 1111 | 1000000000000000 |

For cases when there is a negative vertical command from the stream decoder it is possible that the edge is in the three lower significant bits of the next frame. The decode_b_ext block supplies the mask so that the necessary bits can be used by the NEU to detect an edge if present, Table 159 shows the truth table of this block.

TABLE 159

Decode_b_ext truth table

| delta | output |
|---|---|
| Vertical(−3) | 111 |
| Vertical(−2) | 111 |
| Vertical(−1) | 011 |
| OTHERS | 001 |

FIRST_FLU_WRITE is only used in the first frame of the current line. 2.2.5 a) in [22] refers to "Processing the first picture element", in which it states that "The first starting picture element, a0, on each coding line is imaginarily set at a position just before the first picture element, and is regarded as a white picture element". transition_wtob and transition_btow are set up produce this case for every single frame. However it is only used by the NEU if it is not masked out. This occurs when FIRST_FLU_WRITE is '1' which is only asserted at the beginning of a line. 2.2.5 b) in [22] covers the case of "Processing the last picture element", this case states that "The coding of the coding line continues until the position of the imaginary changing element situated after the last actual element is coded". This means that no matter what the current color is the NEU needs to always find an edge at the end of a line. This feature is used with negative vertical commands.

The vector, end_frame, is a "one-hot" vector that is asserted during the last frame. It asserts a bit in the end of line position, as determined by LineLength, and this simulates an edge in this location which is ORed with the transition's vector. The output of this, masked_data, is sent into the encodeB_one_hot block 24.3.8.3 Encode_b_one_hot The encode_b_one_hot block is the first stage of a two stage process that encodes the data to determine the address of the 0 to 1 transition. Table 160 lists the truth table outlining the functionally required by this block.

TABLE 160

Encode_b_one_hot Truth Table

| Input | output |
|---|---|
| XXXXXXXXXXXXXXXXXX1 | 0000000000000000001 |
| XXXXXXXXXXXXXXXXX10 | 0000000000000000010 |
| XXXXXXXXXXXXXXXX100 | 0000000000000000100 |
| XXXXXXXXXXXXXXX1000 | 0000000000000001000 |
| XXXXXXXXXXXXXX10000 | 0000000000000010000 |
| XXXXXXXXXXXXX100000 | 0000000000000100000 |
| XXXXXXXXXXXX1000000 | 0000000000001000000 |
| XXXXXXXXXXX10000000 | 0000000000010000000 |
| XXXXXXXXXX100000000 | 0000000000100000000 |
| XXXXXXXXX1000000000 | 0000000001000000000 |
| XXXXXXXX10000000000 | 0000000010000000000 |
| XXXXXXX100000000000 | 0000000100000000000 |
| XXXXXX1000000000000 | 0000001000000000000 |
| XXXXX10000000000000 | 0000010000000000000 |
| XXXX100000000000000 | 0000100000000000000 |
| XXX1000000000000000 | 0001000000000000000 |
| XX10000000000000000 | 0010000000000000000 |
| X100000000000000000 | 0100000000000000000 |
| 1000000000000000000 | 1000000000000000000 |
| 0000000000000000000 | 0000000000000000000 |

The output of encode_b_one_hot is a "one-hot" vector that will denote where that edge transition is located. In cases of multiple edges, only the first one will be picked.

24.3.8.4 Encode_b_4 Bit

Encode_b_4 bit is the second stage of the two stage process that encodes the data to determine the address of the 0 to 1 transition.

Encode_b_4 bit receives the "one-hot" vector from encode_b_one_hot and determines the bit location that is asserted. If there is none present this means that there was no edge present in this frame. If there is a bit asserted the bit location in the vector is converted to a number, for example if bit 0 is asserted then the number is one, if bit one is asserted then the number is one, etc. The delta supplied to the NEU determines what vertical command is being processed. The formula that is implemented to return b1*p* to the command controller is:

for $V(n)$ $b1p=x+n$ modulus16 where x is the number that was extracted from the "one-hot" vector and n is the vertical command.

24.3.8.5 State Machine

The following is an explanation of all the states that the NEU state machine utilizes.

i NEU_START

This is the state that NEU enters when a hard or soft reset occurs or when Go has been de-asserted. This state can not left until the reset has been removed, Go has been asserted and it detects that the command controller has entered it's AWAIT_BUFF state. When this occurs the NEU enters the NEU_FILL_BUFF state.

ii NEU_FILL_BUFF

Before any compressed data can be decoded the NEU needs to fill up its buffer with new data from the SFU. The rest of the LBD waits while the NEU retrieves the first four frames from the previous line. Once completed it enters the NEU_HOLD state.

iii NEU_HOLD

The NEU waits in this state for one clock cycle while data requested from the SFU on the last access returns.

iv NEU_RUNNING

NEU_RUNNING controls the requesting of data from the SFU for the remainder of the line by pulsing lbd_sfu_pladvword when the LBD needs a new frame from the SFU. When the NEU has received all the word it needs for the current line, as denoted by the LineLength, the NEU enters the NEU_EMPTY state.

v NEU_EMPTY

NEU waits in this state while the rest of the LBD finishes outputting the completed line to the SFU. The NEU leaves this state when Go gets deasserted. This occurs when the end_of_line signal is detected from the LBD.

24.3.9 Line Fill Unit Sub-Block Description

The Line Fill Unit, LFU, is responsible for filling the next line buffer in the SFU. The SFU receives the data in blocks of sixteen bits. The LFU uses the color and a0 provided by the Command Controller and when it has put together a complete 16-bit frame, it is written out to the SFU. The LBD signals to the SFU that the data is valid by strobing the lbd_sfu_wdatavalid signal.

When the LFU is at the end of the line for the current line data it strobes lbd_sfu_advline to indicate to the SFU that the end of the line has occurred.

A dataflow block diagram of the line fill unit is shown in FIG. 154.

The dataflow above has the following blocks:

24.3.9.1 State Machine

The following is an explanation of all the states that the LFU state machine utilizes.

i LFU_START

This is the state that the LFU enters when a hard or soft reset occurs or when Go has been de-asserted. This state can not left until the reset has been removed, Go has been asserted and it detects that a0 is no longer zero, this only occurs once the command controller start processing data from the Next Edge Unit, NEU.

ii LFU_NEW REG

LFU_NEW_REG is only entered at the beginning of a new frame. It can remain in this state on subsequent cycles if a whole frame is completed in one clock cycle. If the frame is completed the LFU will output the data to the SFU with the write enable signal. However if a frame is not completed in one clock cycle the state machine will change to the LFU_COMPLETE_REG state to complete the remainder of the frame. LFU_NEW_REG handles all the lbd_sfu_wdata writes and asserts lbd_sfu_wdatavalid as necessary.

iii LFU_COMPLETE_REG

LFU_COMPLETE_REG fills out all the remaining parts of the frame that were not completed in the first clock cycle. The command controller supplies the a0 value and the color and the state machine uses these to derive the limit and color_sel__16 bit_lf which the line_fill_data block needs to construct a frame. Limit is the four lower significant bits of a0 and color_sel__16 bit_if is a 16-bit wide mask of sd_color. The state machine also maintains a check on the upper eleven bits of a0. If these increment from one clock cycle to the next that means that a frame is completed and the data can be written to the SFU. In the case of the LineLength being reached the Line Fill Unit fills out the remaining part of the frame with the color of the last bit in the line that was decoded.

24.3.9.2 line_fill_data line_fill_data takes the limit value and the color_sel__16 bit_lf values and constructs the current frame that the command controller and the next edge unit are decoding. The following pseudo code illustrate the logic followed by the line_fill_data. work_sfu_wdata is exported by the LBD to the SFU as lbd_sfu_wdata.

```
if (lfu_state == LFU_START) OR (lfu_state ==
LFU_NEW_REG) then
    work_sfu_wdata = color_sel_16bit_lf
else
    work_sfu_wdata[(15 - limit) downto limit] =
        color_sel_16bit_lf[(15 - limit) downto limit]
```

25 Spot FIFO Unit (SFU)

25.1 Overview

The Spot FIFO Unit (SFU) provides the means by which data is transferred between the LBD and the HCU. By abstracting the buffering mechanism and controls from both units, the interface is clean between the data user and the data generator. The amount of buffering can also be increased or decreased without affecting either the LBD or HCU. Scaling of data is performed in the horizontal and vertical directions by the SFU so that the output to the HCU matches the printer resolution. Non-integer scaling is supported in both the horizontal and vertical directions. Typically, the scale factor will be the same in both directions but may be programmed to be different.

25.2 Main Features of the SFU

The SFU replaces the Spot Line Buffer Interface (SLBI) in PEC1. The spot line store is now located in DRAM.

The SFU outputs the previous line to the LBD, stores the next line produced by the LBD and outputs the HCU read line. Each interface to DRAM is via a feeder FIFO. The LBD interfaces to the SFU with a data width of 16 bits. The SFU interfaces to the HCU with a data width of 1 bit. Since the DRAM word width is 256-bits but the LBD line length is a multiple of 16 bits, a capability to flush the last multiples of 16-bits at the end of a line into a 256-bit DRAM word size is required. Therefore, SFU reads of DRAM words at the end of a line, which do not fill the DRAM word, will already be padded.

A signal sfu_lbd_rdy to the LBD indicates that the SFU is available for writing and reading. For the first LBD line after SFU Go has been asserted, previous line data is not supplied until after the first lbd_sfu_advline strobe from the LBD (zero data is supplied instead), and sfu_lbd_rdy to the LBD indicates that the SFU is available for writing. lbd_sfu_advline tells the SFU to advance to the next line. lbd_sfu_pladvword tells the SFU to supply the next 16-bits of previous line data. Until the number of lbd_sfu_pladvword strobes received is equivalent to the LBD line length, sfu_lbd_rdy indicates that the SFU is available for both reading and writing. Thereafter it indicates the SFU is available for writing. The LBD should not generate lbd_sfu_pladvword or lbd_sfu_advline strobes until sfu_lbd_rdy is asserted.

A signal sfu_hcu_avail indicates that the SFU has data to supply to the HCU. Another signal hcu_sfu_advdot, from the HCU, tells the SFU to supply the next dot. The HCU should not generate the hcu_sfu_advdot signal until sfu_hcu_avail is true. The HCU can therefore stall waiting for the sfu_hcu_avail signal.

X and Y non-integer scaling of the bi-level dot data is performed in the SFU.

At 1600 dpi the SFU requires 1 dot per cycle for all DRAM channels, 3 dots per cycle in total (read+read+write). Therefore the SFU requires two 256 bit read DRAM access per 256 cycles, 1 write access every 256 cycles. A single DIU read interface will be shared for reading the current and previous lines from DRAM.

25.3 Bi-Level Dram Memory Buffer between LBD, SFU and HCU

Figure 158:
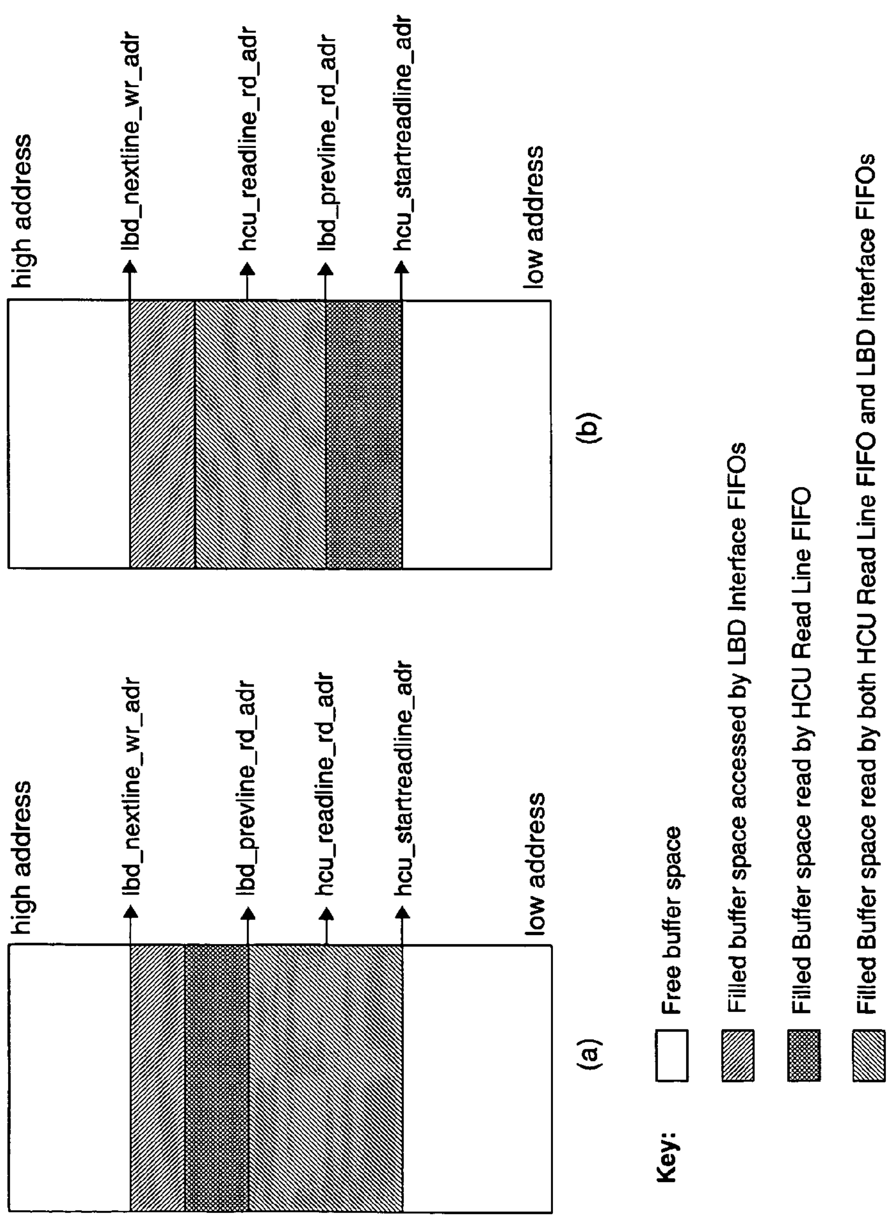
FIG. 158 shows a bi-level DRAM buffer
Figure 159:
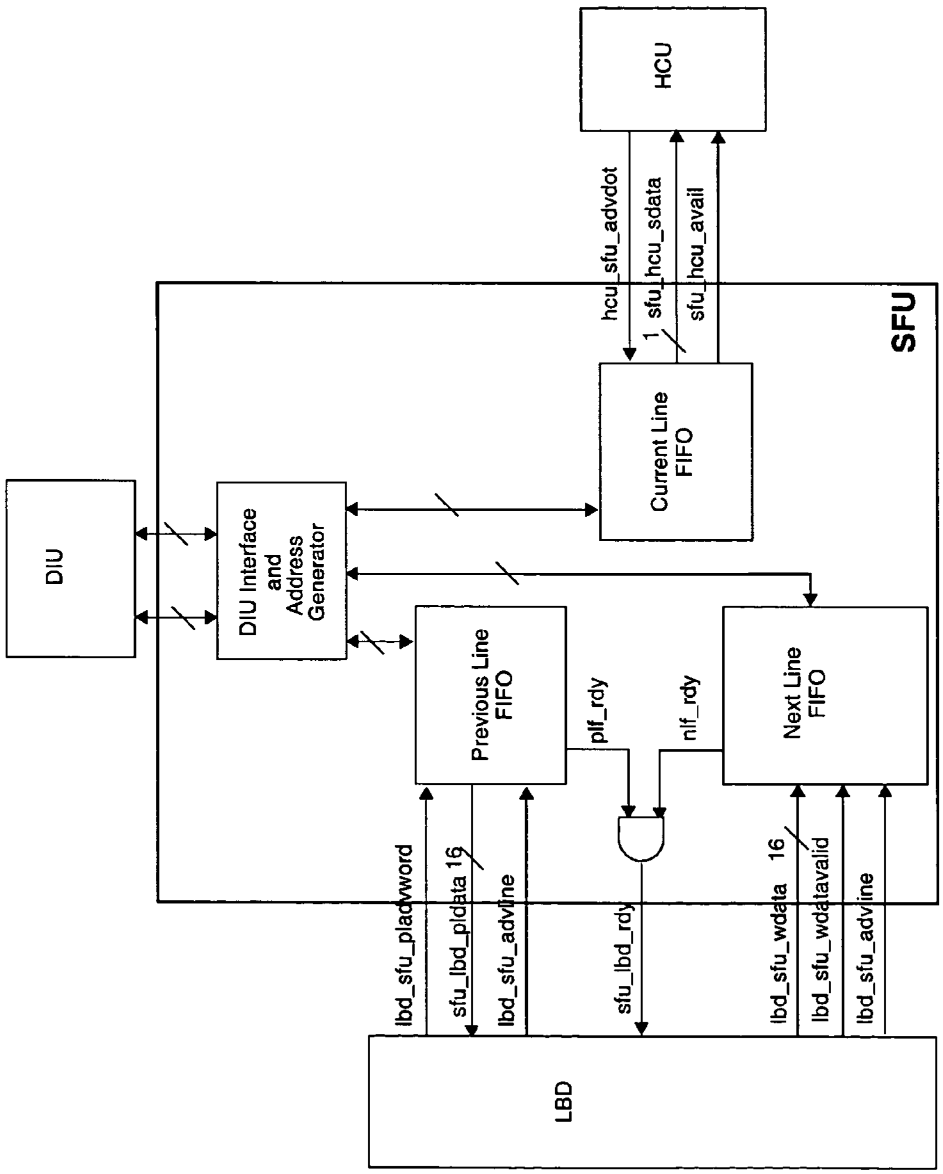
FIG. 159 shows interfaces between LBD/SFU/HCU
Figure 160:
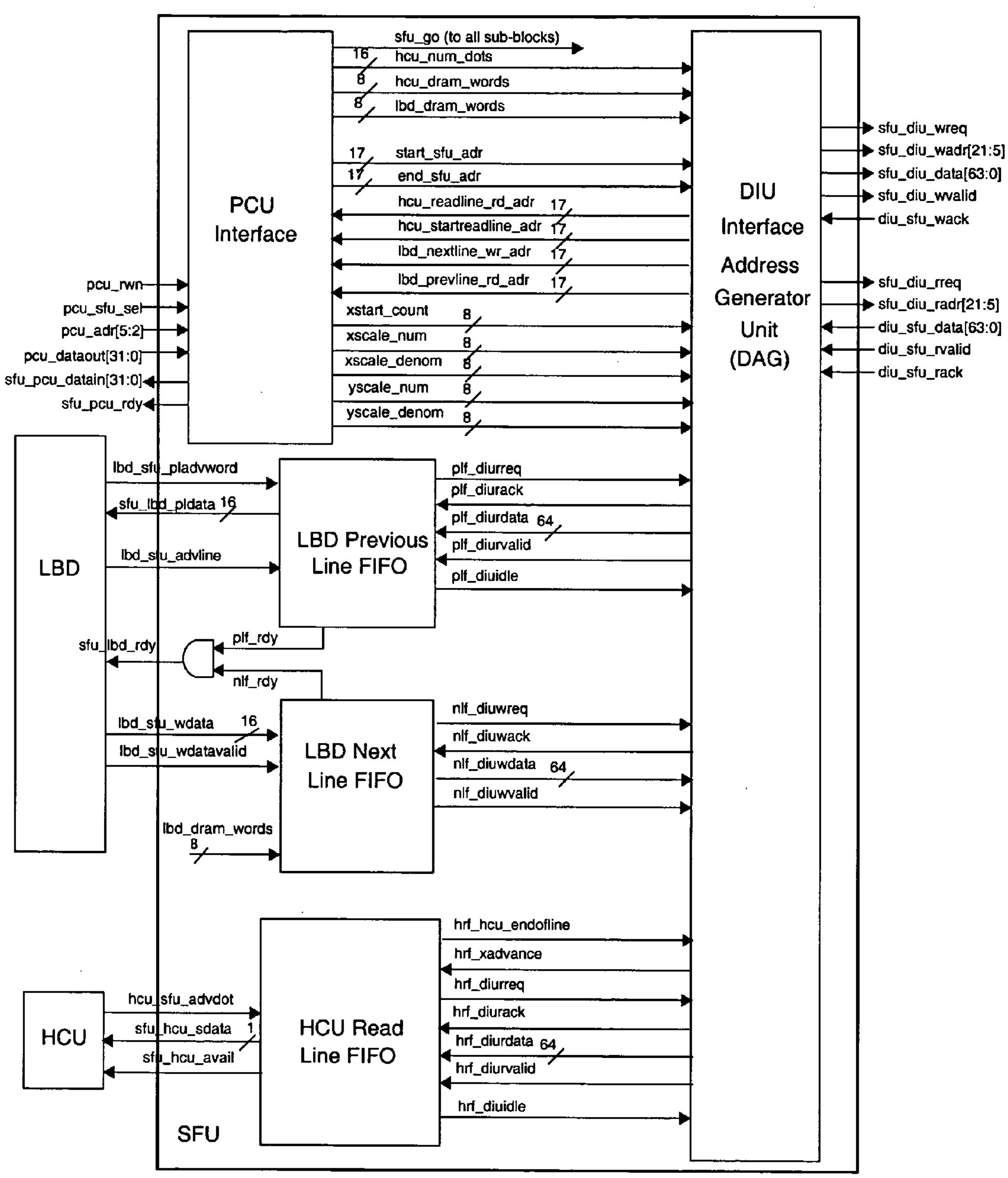
FIG. 160 shows an SFU sub-block partition
Figure 161:
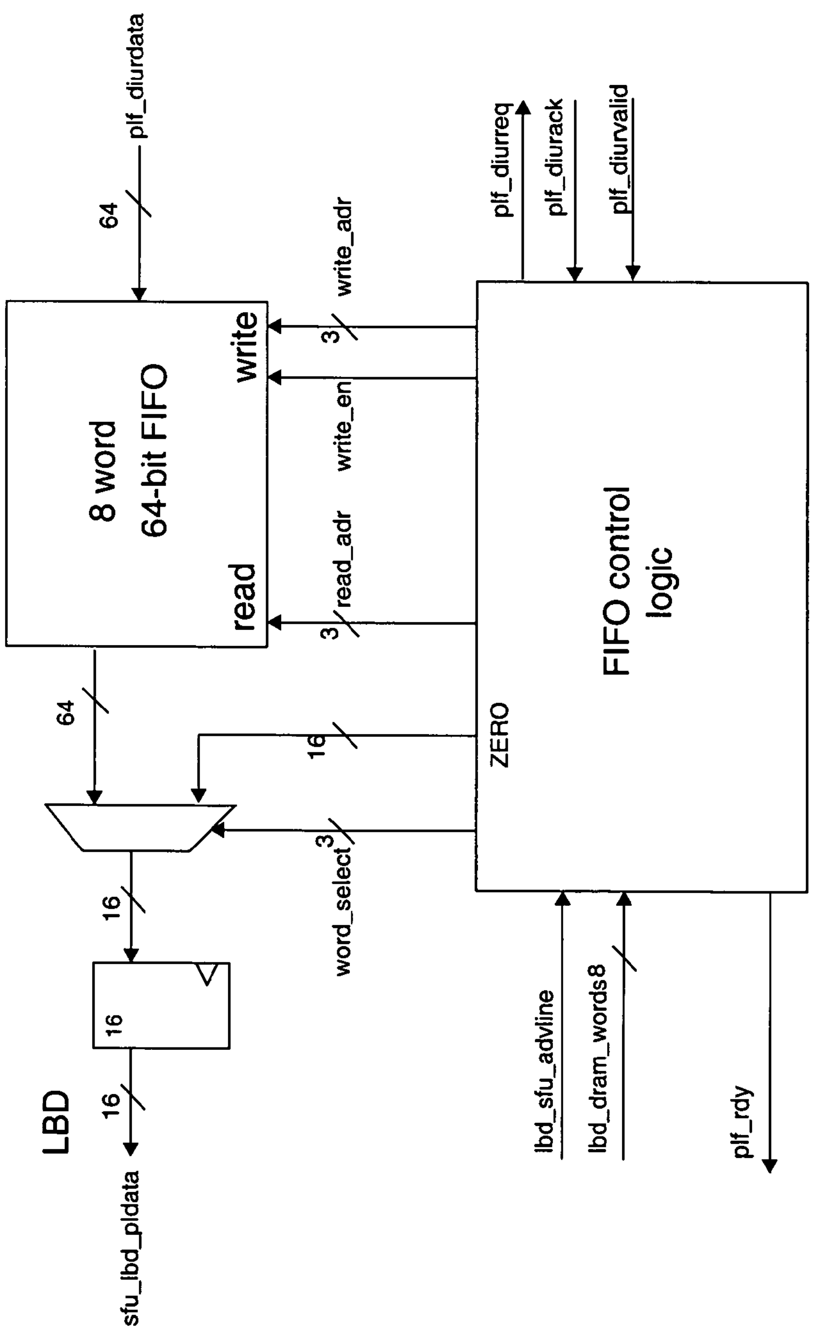
FIG. 161 shows an LBDPrevLineFifo sub-block
Figure 162:
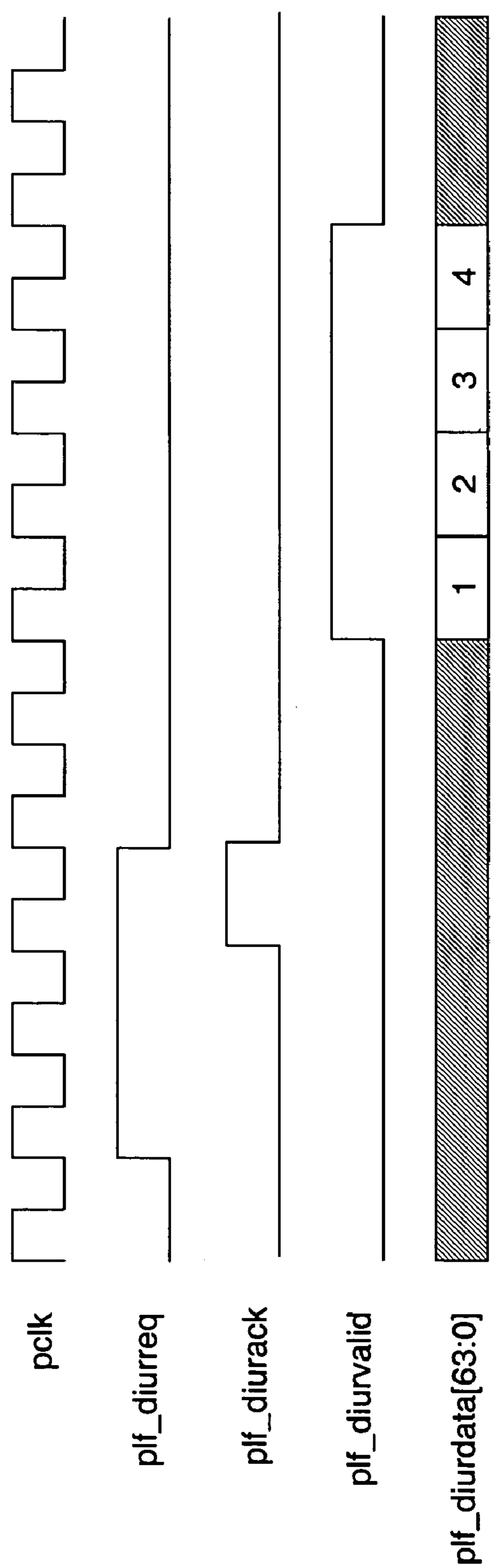
FIG. 162 shows timing of signals on the LBDPrevLineFIFO interface to DIU and address generator

FIG. 158 shows a bi-level buffer store in DRAM. FIG. 158(*a*) shows the LBD previous line address reading after the HCU read line address in DRAM. FIG. 158(*b*) shows the LBD previous line address reading before the HCU read line address in DRAM.

Although the LBD and HCU read and write complete lines of data, the bi-level DRAM buffer is not line based. The buffering between the LBD, SFU and HCU is a FIFO of programmable size. The only line based concept is that the line the HCU is currently reading cannot be over-written because it may need to be re-read for scaling purposes.

The SFU interfaces to DRAM via three FIFOs:

a. The HCUReadLineFIFO which supplies dot data to the HCU.

b. The LBDNextLineFIFO which writes decompressed bi-level data from the LBD.

c. The LBDPrevLineFIFO which reads previous decompressed bi-level data for the LBD.

There are four address pointers used to manage the bi-level DRAM buffer:

a. hcu_readline_rd_adr[21:5] is the read address in DRAM for the HCUReadLineFIFO.
b. hcu_startreadline_adr[21:5] is the start address in DRAM for the current line being read by the HCUReadLineFIFO.
c. lbd_nextline_wr_adr[21:5] is the write address in DRAM for the LBDNextLineFIFO.
d. lbd_prevline_rd_adr[21:5] is the read address in DRAM for the LBDPrevLineFIFO.

The address pointers must obey certain rules which indicate whether they are valid:

a. hcu_readline_rd_adr is only valid if it is reading earlier in the line than lbd_nextline_wr_adr is writing i.e. the fifo is not empty
b. The SFU (lbd_nextline_wr_adr) cannot overwrite the current line that the HCU is reading from (hcu_startreadline_adr) i.e. the fifo is not full, when compared with the HCU read line pointer
c. The LBDNextLineFIFO (lbd_nextline_wr_adr) must be writing earlier in the line than LBDPrevLineFIFO (lbd_prevline_rd_adr) is reading and must not overwrite the current line that the HCU is reading from i.e. the fifo is not full when compared to the PrevLineFifo read pointer
d. The LBDPrevLineFIFO (lbd_prevline_rd_adr) can read right up to the address that LBDNextLineFIFO (lbd_nextline_wr_adr) is writing i.e the fifo is not empty.
e. At startup i.e. when sfu_go is asserted, the pointers are reset to start_sfu_adr[21:5].
f. The address pointers can wrap around the SFU bi-level store area in DRAM.

As a guideline, the typical FIFO size should be a minimum of 2 lines stored in DRAM, nominally 3 lines, up to a programmable number of lines. A larger buffer allows lines to be decompressed in advance. This can be useful for absorbing local complexities in compressed bi-level images.

25.4 DRAM Access Requirements

The SFU has 1 read interface to the DIU and 1 write interface. The read interface is shared between the previous and current line read FIFOs.

The spot line store requires 5.1 Kbytes of DRAM to store 3 A4 lines. The SFU will read and write the spot line store in single 256-bit DRAM accesses. The SFU will need 256-bit double buffers for each of its previous, current and next line interfaces.

The SFU's DIU bandwidth requirements are summarized in Table 161.

TABLE 161

DRAM bandwidth requirements

| Direction | Maximum number of cycles between each 256-bit DRAM access | Peak Bandwidth required to be supported by DIU (bits/cycle) | Average Bandwidth (bits/cycle) |
|---|---|---|---|
| Read | 1281 | 2 | 2 |
| Write | 2562 | 1 | 1 |

1: Two separate reads of 1 bit/cycle.
2: Write at 1 bit/cycle.

25.5 Scaling

Scaling of bi-level data is performed in both the horizontal and vertical directions by the SFU so that the output to the HCU matches the printer resolution. The SFU supports non-integer scaling with the scale factor represented by a numerator and a denominator. Only scaling up of the bi-level data is allowed, i.e. the numerator should be greater than or equal to the denominator. Scaling is implemented using a counter as described in the pseudocode below. An advance pulse is generated to move to the next dot (x-scaling) or line (y-scaling).

```
if (count + denominator >= numerator) then
    count = (count + denominator) - numerator
    advance = 1
else
    count = count + denominator
    advance = 0
```

X scaling controls whether the SFU supplies the next dot or a copy of the current dot when the HCU asserts hcu_sfu_advdot. The SFU counts the number of hcu_sfu_advdot signals from the HCU. When the SFU has supplied an entire HCU line of data, the SFU will either re-read the current line from DRAM or advance to the next line of HCU read data depending on the programmed Y scale factor.

An example of scaling for numerator=7 and denominator=3 is given in Table 162. The signal advance if asserted causes the next input dot to be output on the next cycle, otherwise the same input dot is output

TABLE 162

Non-integer scaling example for scaleNum = 7, scaleDenom = 3

| count | advance | dot |
|---|---|---|
| 0 | 0 | 1 |
| 3 | 0 | 1 |
| 6 | 1 | 1 |
| 2 | 0 | 2 |
| 5 | 1 | 2 |
| 1 | 0 | 3 |
| 4 | 1 | 3 |
| 0 | 0 | 4 |
| 3 | 0 | 4 |
| 6 | 1 | 4 |
| 2 | 0 | 5 |

25.6 Lead-In and Lead-Out Clipping

To account for the case where there may be two SoPEC devices, each generating its own portion of a dot-line, the first dot in a line may not be replicated the total scale-factor number of times by an individual SoPEC. The dot will ultimately be scaled-up correctly with both devices doing part of the scaling, one on its lead-out and the other on its lead in. Scaled up dots on the lead-out, i.e. which go beyond the HCU linelength, will be ignored. Scaling on the lead-in, i.e. of the first valid dot in the line, is controlled by setting the XstartCount register.

At the start of each line count in the pseudo-code above is set to XstartCount. If there is no lead-in, XstartCount is set to 0 i.e. the first value of count in Table. If there is lead-in then XstartCount needs to be set to the appropriate value of count in the sequence above.

25.7 Interfaces Between LDB, SFU and HCU 25.7;1 LDB-SFU Interfaces

The LBD has two interfaces to the SFU. The LBD writes the next line to the SFU and reads the previous line from the SFU.

25.7.1.1 LBDNextLineFIFO Interface

The LBDNextLineFIFO interface from the LBD to the SFU comprises the following signals:

lbd_sfu_wdata, 16-bit write data.

lbd_sfu_wdatavalid, write data valid.

lbd_sfu_advline, signal indicating LDB has advanced to the next line.

The LBD should not write to the SFU until sfu_lbd_rdy is true. The LBD can therefore stall waiting for the sfu_lbd_rdy signal.

25.7.1.2 LBDPrevLineFIFO Interface

The LBDPrevLineFIFO interface from the SFU to the LBD comprises the following signals:

sfu_lbd_pldata, 16-bit data.

The previous line read buffer interface from the LBD to the SDU comprises the following signals:

lbd_sfu_pladvword, signal indicating to the SFU to supply the next 16-bit word.

lbd_sfu_advline, signal indicating LDB has advanced to the next line.

Previous line data is not supplied until after the first lbd_sfu_advline strobe from the LBD (zero data is supplied instead). The LBD should not assert lbd_sfu_pladvword unless sfu_lbd_rdy is asserted.

25.7.1.3 Common Control Signals sfu_lbd_rdy indicates to the LBD that the SFU is available for writing. After the first lbd_sfu_advline and before the number of lbd_sfu_pladvword strobes received is equivalent to the LBD line length, sfu_lbd_rdy indicates that the SFU is available for both reading and writing.

Thereafter it indicates the SFU is available for writing.

The LBD should not generate lbd_sfu_pladvword or lbd_sfu_advline strobes until sfu_lbd_rdy is asserted.

25.7.2 SFU-HCU Current Line FIFO Interface

The interface from the SFU to the HCU comprises the following signals:

sfu_hcu_sdata, 1-bit data.

sfu_hcu_avail, data valid signal indicating that there is data available in the SFU HCUReadLineFIFO.

The interface from HCU to SFU comprises the following signals:

hcu_sfu_advdot, indicating to the SFU to supply the next dot.

The HCU should not generate the hcu_sfu_advdot signal until sfu_hcu_avail is true. The HCU can therefore stall waiting for the sfu_hcu_avail signal.

25.8 Implementation 25.8.1 Definitions of IO

TABLE 163

SFU Port List

| Port Name | Pins | I/O | Description |
|---|---|---|---|
| Clocks and Resets | | | |
| Pclk | 1 | In | SoPEC Functional clock. |
| prst_n | 1 | In | Global reset signal. |
| DIU Read Interface signals | | | |
| sfu_diu_rreq | 1 | Out | SFU requests DRAM read. A read request must be accompanied by a valid read address. |
| sfu_diu_radr[21:5] | 17 | Out | Read address to DIU 17 bits wide (256-bit aligned word). |
| diu_sfu_rack | 1 | In | Acknowledge from DIU that read request has been accepted and new read address can be placed on sfu_diu_radr. |
| diu_data[63:0] | 64 | In | Data from DIU to SoPEC Units. First 64-bits are bits 63:0 of 256 bit word. Second 64-bits are bits 127:64 of 256 bit word. Third 64-bits are bits 191:128 of 256 bit word. Fourth 64-bits are bits 255:192 of 256 bit word. |
| diu_sfu_rvalid | 1 | In | Signal from DIU telling SoPEC Unit that valid read data is on the diu_data bus. |
| DIU Write Interface signals | | | |
| sfu_diu_wreq | 1 | Out | SFU requests DRAM write. A write request must be accompanied by a valid write address together with valid write data and a write valid. |
| sfu_diu_wadr[21:5] | 17 | Out | Write address to DIU 17 bits wide (256-bit aligned word). |
| diu_sfu_wack | 1 | In | Acknowledge from DIU that write request has been accepted and new write address can be placed on sfu_diu_wadr. |
| sfu_diu_data[63:0] | 64 | Out | Data from SFU to DIU. First 64-bits are bits 63:0 of 256 bit word. Second 64-bits are bits 127:64 of 256 bit word. Third 64-bits are bits 191:128 of 256 bit word. Fourth 64-bits are bits 255:192 of 256 bit word. |
| sfu_diu_wvalid | 1 | Out | Signal from PEP Unit indicating that data on sfu_diu_data is valid. |
| PCU Interface data and control signals | | | |
| pcu_adr[5:2] | 4 | In | PCU address bus. Only 4 bits are required to decode the address space for this block |
| pcu_dataout[31:0] | 32 | In | Shared write data bus from the PCU |
| sfu_pcu_datain[31:0] | 32 | Out | Read data bus from the SFU to the PCU |
| pcu_rwn | 1 | In | Common read/not-write signal from the PCU |
| pcu_sfu_sel | 1 | In | Block select from the PCU. When pcu_sfu_sel is high both pcu_adr and pcu_dataout are valid |
| sfu_pcu_rdy | 1 | Out | Ready signal to the PCU. When sfu_pcu_rdy is high it indicates the last cycle of the access. For a write cycle this means pcu_dataout has been registered by the block and for a read cycle this means the data on sfu_pcu_datain is valid. |
| LBD Interface Data and Control Signals | | | |
| sfu_lbd_rdy | 1 | Out | Signal indication that SFU has previous line data available and is ready to be written to. |
| lbd_sfu_advline | 1 | In | Line advance signal for both next and previous lines. |

TABLE 163-continued

SFU Port List

| Port Name | Pins | I/O | Description |
|---|---|---|---|
| lbd_sfu_pladvword | 1 | In | Advance word signal for previous line buffer. |
| sfu_lbd_pldata[15:0] | 16 | Out | Data from the previous line buffer. |
| lbd_sfu_wdata[15:0] | 16 | In | Write data for next line buffer. |
| lbd_sfu_wdatavalid | 1 | In | Write data valid signal for next line buffer data. |
| HCU Interface Data and Control Signals | | | |
| hcu_sfu_advdot | 1 | In | Signal indicating to the SFU that the HCU is ready to accept the next dot of data from SFU. |
| sfu_hcu_sdata | 1 | Out | Bi-level dot data. |
| sfu_hcu_avail | 1 | Out | Signal indicating valid bi-level dot data on sfu_hcu_sdata. |

25.8.2 Configuration Registers

TABLE 164

SFU Configuration Registers

| Address (SFU_base +) | register name | # bits | value on reset | description |
|---|---|---|---|---|
| Control registers | | | | |
| 0x00 | Reset | 1 | 0x1 | A write to this register causes a reset of the SFU.<br>This register can be read to indicate the reset state:<br>0 - reset in progress<br>1 - reset not in progress |
| 0x04 | Go | 1 | 0x0 | Writing 1 to this register starts the SFU. Writing 0 to this register halts the SFU.<br>When Go is deasserted the state-machines go to their idle states but all counters and configuration registers keep their values.<br>When Go is asserted all counters are reset, but configuration registers keep their values (i.e. they don't get reset).<br>The SFU must be started before the LBD is started.<br>This register can be read to determine if the SFU is running (1 - running, 0 - stopped). |
| Setup registers (constant for during processing the page) | | | | |
| 0x08 | HCUNumDots | 16 | 0x0000 | Width of HCU line (in dots). |
| 0x0C | HCUDRAMWords | 8 | 0x00 | Number of 256-bit DRAM words in a HCU line − 1. |
| 0x10 | LBDDRAMWords | 8 | 0x00 | Number of 256-bit words in a LBD line − 1.<br>(LBD line length must be at least 128 bits). |
| 0x14 | StartSfuAdr[21:5] (256-bit aligned DRAM address) | 17 | 0x0000 0 | First SFU location in memory. |
| 0x18 | EndSfuAdr[21:5] (256-bit aligned DRAM address) | 17 | 0x0000 0 | Last SFU location in memory. |
| 0x1C | XstartCount | 8 | 0x00 | Value to be loaded at the start of every line into the counter used for scaling in the X direction. Used to control the scaling of the first dot in a line.<br>This value will typically equal zero, except in the case where a number of dots are clipped on the lead in to a line. XstartCount must be programmed to be less than the XscaleNum value. |

TABLE 164-continued

SFU Configuration Registers

| Address (SFU_base +) | register name | # bits | value on reset | description |
|---|---|---|---|---|
| 0x20 | XscaleNum | 8 | 0x01 | Numerator of spot data scale factor in X direction. |
| 0x24 | XscaleDenom | 8 | 0x01 | Denominator of spot data scale factor in X direction. |
| 0x28 | YscaleNum | 8 | 0x01 | Numerator of spot data scale factor in Y direction. |
| 0x2C | YscaleDenom | 8 | 0x01 | Denominator of spot data scale factor in Y direction. |
| Work registers (PCU has read-only access) | | | | |
| 0x30 | HCUReadLineAdr[21:5] (256-bit aligned DRAM address) | 17 | — | Current address pointer in DRAM to HCU read data. Read only register. |
| 0x34 | HCUStartReadLineAdr[21:5] (256-bit aligned DRAM address) | 17 | — | Start address in DRAM of line being read by HCU buffer in DRAM. Read only register. |
| 0x38 | LBDNextLineAdr[21:5] (256-bit aligned DRAM address) | 17 | — | Current address pointer in DRAM to LBD write data. Read only register |
| 0x3C | LBDPrevLineAdr[21:5] (256-bit aligned DRAM address) | 17 | — | Current address pointer in DRAM to LBD read data. Read only register |

25.8.3 SFU Sub-Block Partition

The SFU contains a number of sub-blocks:

| Name | description |
|---|---|
| PCU Interface | PCU interface, configuration and status registers. Also generates the Go and the Reset signals for the rest of the SFU |
| LBD Previous Line FIFO | Contains FIFO which is read by the LBD previous line interface. |
| LBD Next Line FIFO | Contains FIFO which is written by the LBD next line interface. |
| HCU Read Line FIFO | Contains FIFO which is read by the HCU interface. |
| DIU Interface and Address Generator | Contains DIU read interface and DIU write interface. Manages the address pointers for the bi-level DRAM buffer. Contains X and Y scaling logic. |

The various FIFO sub-blocks have no knowledge of where in DRAM their read or write data is stored. In this sense the FIFO sub-blocks are completely de-coupled from the bi-level DRAM buffer. All DRAM address management_is centralised in the DIU Interface and Address Generation sub-block. DRAM access is pre-emptive i.e. after a FIFO unit has made an access then as soon as the FIFO has space to read or data to write a DIU access will be requested immediately. This ensures there are no unnecessary stalls introduced e.g. at the end of an LBD or HCU line.

There now follows a description of the SFU sub-blocks.

25.8.4 PCU Interface Sub-Block

The PCU interface sub-block provides for the CPU to access SFU specific registers by reading or writing to the SFU address space.

25.8.5 LBDPrevLineFIFO Sub-Block

TABLE 165

LBDPrevLineFIFO Additional IO Definitions

| Port Name | Pins | I/O | Description |
|---|---|---|---|
| Internal Output | | | |
| plf_rdy | 1 | Out | Signal indicating LBDPrevLineFIFO is ready to be read from. Until the first lbd_sfu_advline for a band has been received and after the number of reads from DRAM for a line is received is equal to LBDDRAMWords, plf_rdy is always asserted. During the second and subsequent lines plf_rdy is deasserted whenever the LBDPrevLineFIFO has one word left in the FIFO.. |
| DIU and Address Generation sub-block Signals | | | |
| plf_diurreq | 1 | Out | Signal indicating the LBDPrevLineFIFO has 256-bits of data free. |
| plf_diurack | 1 | In | Acknowledge that read request has been accepted and plf_diurreq should be de-asserted. |
| plf_diurdata | 1 | In | Data from the DIU to LBDPrevLineFIFO. First 64-bits are bits 63:0 of 256 bit word. Second 64-bits are bits 127:64 of 256 bit word. Third 64-bits are bits 191:128 of 256 bit word. Fourth 64-bits is are 255:192 of 256 bit word. |
| plf_diurrvalid | 1 | In | Signal indicating data on plf_diurdata is valid. |
| plf_diuidle | 1 | Out | Signal indicating DIU state-machine is in the IDLE state. |

25.8.5.1 General Description

The LBDPrevLineFIFO sub-block comprises a double 256-bit buffer between the LBD and the DIU Interface and Address Generator sub-block. The FIFO is implemented as 8 times 64-bit words. The FIFO is written by the DIU Interface and Address Generator sub-block and read by the LBD.

Whenever 4 locations in the FIFO are free the FIFO will request 256-bits of data from the DIU Interface and Address Generation sub-block by asserting plf_diurreq. A signal plf_diurack indicates that the request has been accepted and plf_diurreq should be de-asserted.

The data is written to the FIFO as 64-bits on plf_diurdata[63:0] over 4 clock cycles. The signal plf_diurvalid indicates that the data returned on plf_diurdata[63:0] is valid. plf_diurvalid is used to generate the FIFO write enable, write_en, and to increment the FIFO write address, write_adr[2:0]. If the LBDPrevLineFIFO still has 256-bits free then plf_diurreq should be asserted again.

The DIU Interface and Address Generation sub-block handles all address pointer management and DIU interfacing and decides whether to acknowledge a request for data from the FIFO.

Figure 163:
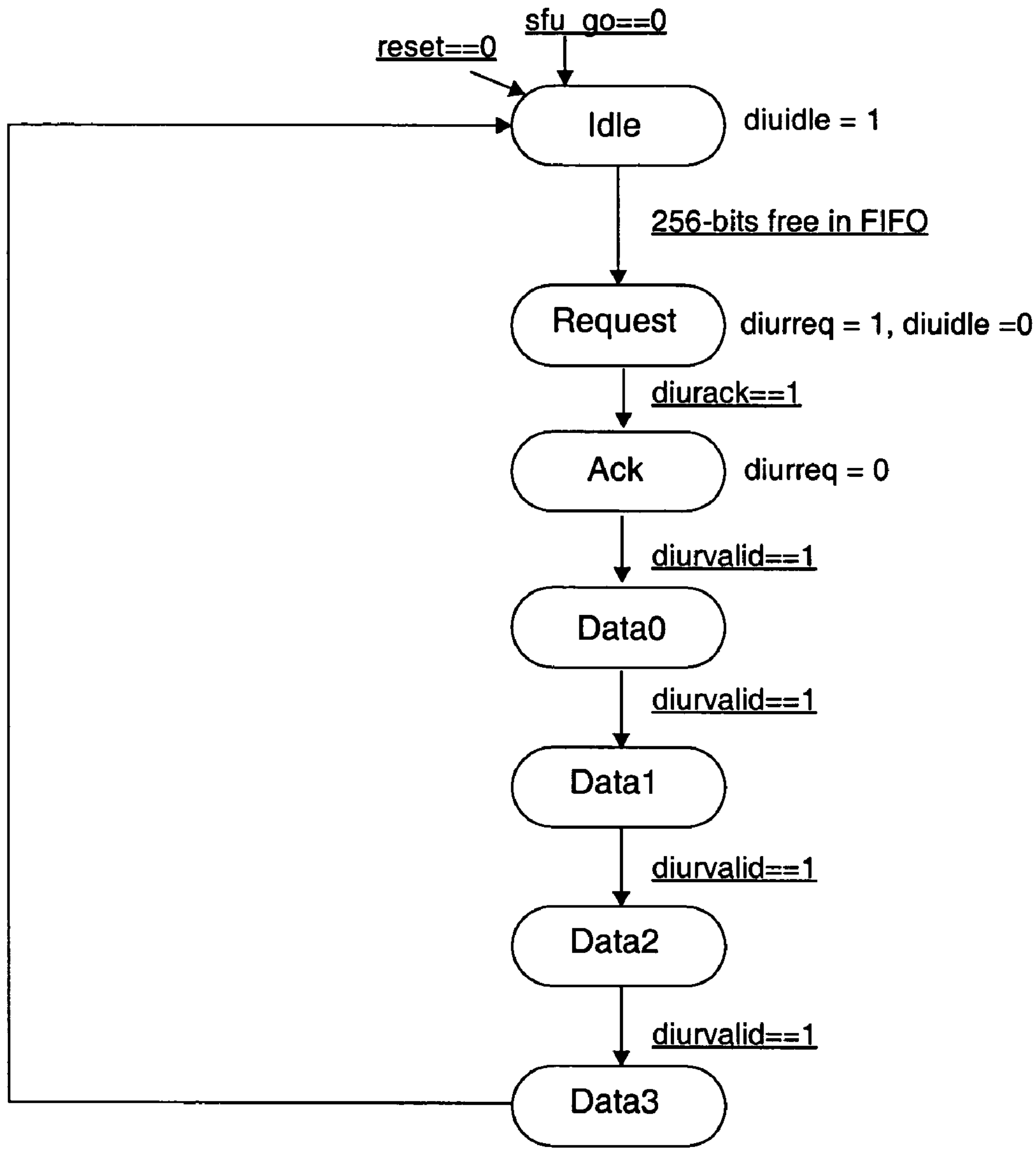
FIG. 163 shows timing of signals on LBDPrevLineFIFO interface to DIU and address generator
Figure 164:
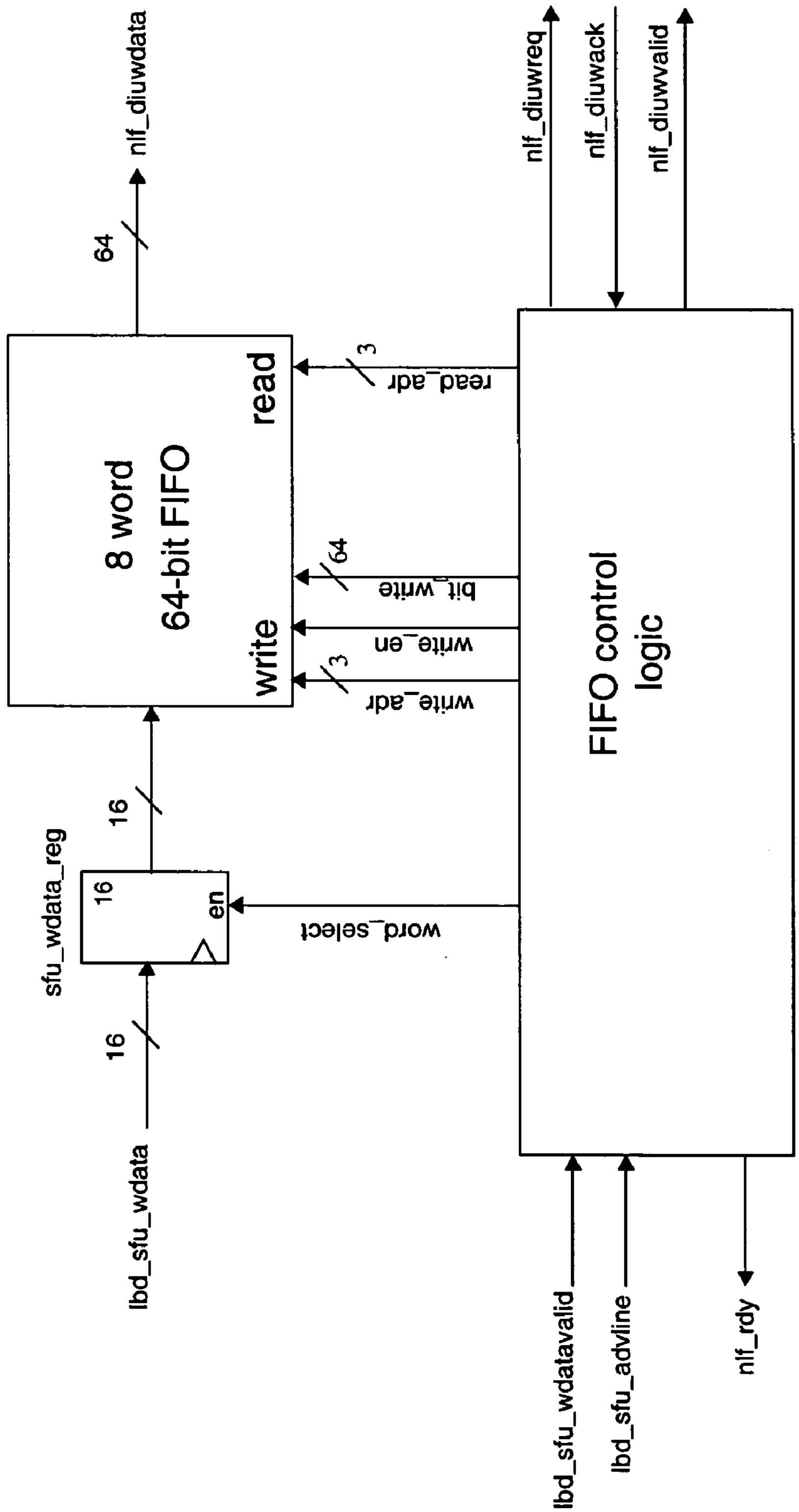
FIG. 164 shows LBDNextLineFifo sub-block
Figure 165:
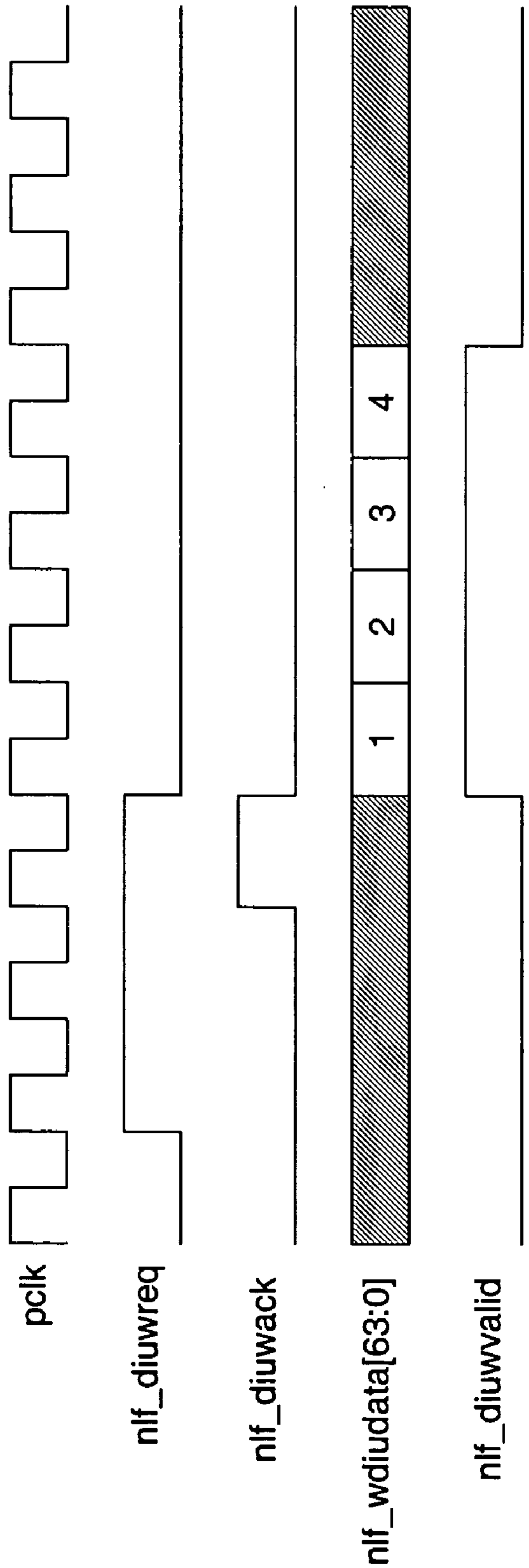
FIG. 165 shows timing of signals on LBDNextLineFIFO interface to DIU and address generator

The state diagram of the LBDPrevLineFIFO DIU Interface is shown in FIG. 163. If sfu_go is deasserted then the state-machine returns to its idle state.

The LBD reads 16-bit wide data from the LBDPrevLineFIFO on sfu_lbd_pldata[15:0]. lbd_sfu_pladvword from the LBD tells the LBDPrevLineFIFO to supply the next 16-bit word. The FIFO control logic generates a signal word_select which selects the next 16-bits of the 64-bit FIFO word to output on sfu_lbd_pldata[15:0]. When the entire current 64-bit FIFO word has been read by the LBD lbd_sfu_pladvword will cause the next word to be popped from the FIFO. Previous line data is not supplied until after the first lbd_sfu_advline strobe from the LBD after sfu_go is asserted (zero data is supplied instead). Until the first lbd_sfu_advline strobe after sfu_go lbd_sfu_pladvword strobes are ignored.

The LBDPrevLineFIFO control logic uses a counter, pl_count[7:0], to counts the number of DRAM read accesses for the line. When the pl_count counter is equal to the LBDDRAMWords, a complete line of data has been read by the LBD the plf_rdy is set high, and the counter is reset. It remains high until the next lbd_sfu_advline strobe from the LBD. On receipt of the lbd_sfu_advline strobe the remaining data in the 256-bit word in the FIFO is ignored, and the FIFO read_adr is rounded up if required.

The LBDPrevLineFIFO generates a signal plf_rdy to indicate that it has data available. Until the first lbd_sfu_advline for a band has been received and after the number of DRAM reads for a line is equal to LBDDRAMWords, plf_rdy is always asserted. During the second and subsequent lines plf_rdy is deasserted whenever the LBDPrevLineFIFO has one word left.

The last 256-bit word for a line read from DRAM can contain extra padding which should not be output to the LBD. This is because the number of 16-bit words per line may not fit exactly into a 256-bit DRAM word. When the count of the number of DRAM reads for a line is equal to lbd_dram_words the LBDPrevLineFIFO must adjust the FIFO write address to point to the next 256-bit word boundary in the FIFO for the next line of data. At the end of a line the read address must round up the nearest 256-bit word boundary and ignore the remaining 16-bit words. This can be achieved by considering the FIFO read address, read adr[2:0], will require 3 bits to address 8 locations of 64-bits. The next 256-bit aligned address is calculated by inverting the MSB of the read_adr and setting all other bits to 0.

```
if (read_adr[1:0] /= b00 AND lbd_sfu_advline = = l)then
    read_adr[1:0] = b00
    read_adr[2] = ~read_adr[2]
```

25.8.6 LBDNextLineFIFO Sub-Block

TABLE 166

LBDNextLineFIFO Additional IO Definition

| Port Name | Pins | I/O | Description |
|---|---|---|---|
| LBDNextLineFIFO Interface Signals | | | |
| nlf_rdy | 1 | Out | Signal indicating LBDNextLineFIFO is ready to be written to i.e. there is space in the FIFO. |
| DIU and Address Generation sub-block Signals | | | |
| nlf_diuwreq | 1 | Out | Signal indicating the LBDNextLineFIFO has 256-bits of data for writing to the DIU. |
| nlf_diuwack | 1 | In | Acknowledge from DIU that write request has been accepted and write data can be output on nlf_diuwdata together with nlf_diuwvalid. |
| nlf_diuwdata | 1 | Out | Data from LBDNextLineFIFO to DIU Interface.<br>First 64-bits is bits 63:0 of 256 bit word<br>Second 64-bits is bits 127:64 of 256 bit word<br>Third 64-bits is bits 191:128 of 256 bit word<br>Fourth 64-bits is bits 255:192 of 256 bit word |
| nlf_diuwvalid | 1 | In | Signal indicating that data on wlf_diuwdata is valid. |

25.8.6.1 General Description

Figure 166:
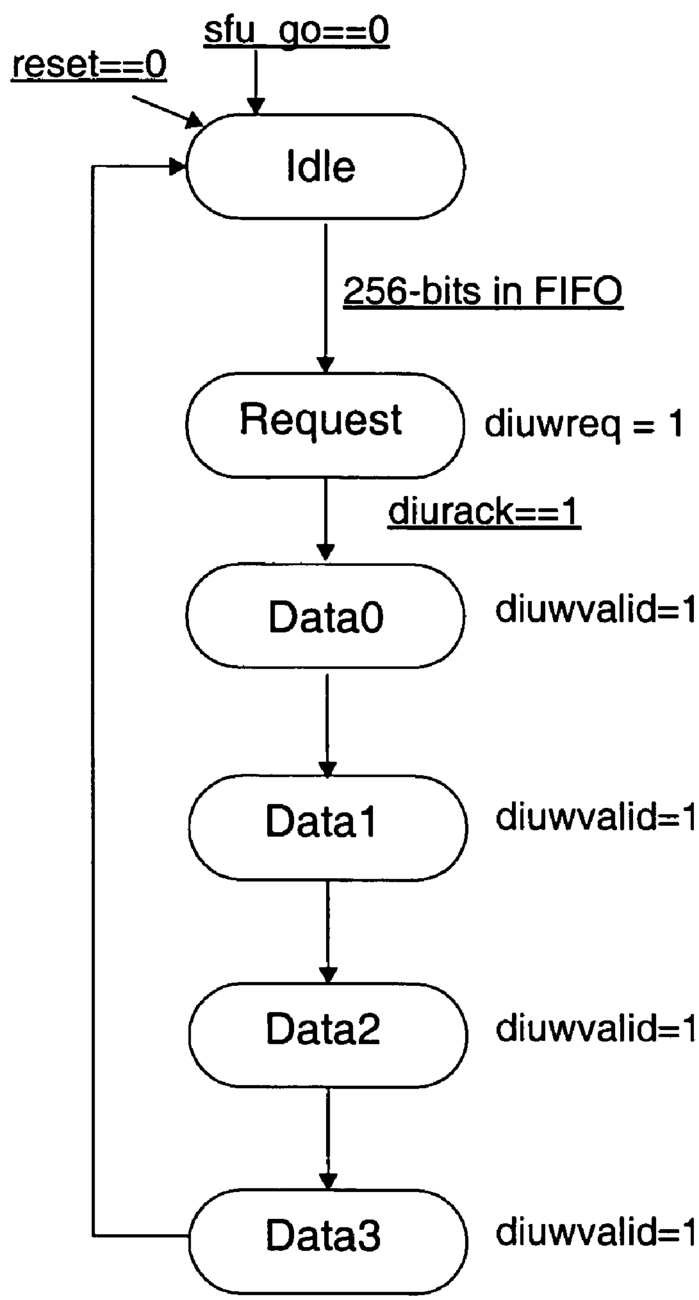
FIG. 166 shows LBDNextLineFIFO DIU interface state diagram

The LBDNextLineFIFO sub-block comprises a double 256-bit buffer between the LBD and the DIU Interface and Address Generator sub-block. The FIFO is implemented as 8 times 64-bit words. The FIFO is written by the LBD and read by the DIU Interface and Address Generator. Whenever 4 locations in the FIFO are full the FIFO will request 256-bits of data to be written to the DIU Interface and Address Generator by asserting nlf_diuwreq. A signal nlf_diuwack indicates that the request has been accepted and nlf_diuwreq should be de-asserted. On receipt of nlf_diuwack, the data is sent to the DIU Interface as 64-bits on nlf_diuwdata[63:0] over 4 clock cycles. The signal nlf_diuwvalid indicates that the data on nlf_diuwdata[63:0] is valid. nlf_diuwvalid should be asserted with the smallest latency after nlf_diuwack. If the LBDNextLineFIFO still has 256-bits more to transfer then nlf_diuwreq should be asserted again. The state diagram of the LBDNextLineFIFO DIU Interface is shown in FIG. 166. If sfu_go is deasserted then the state-machine returns to its Idle state.

The signal nlf_rdy indicates that the LBDNextLineFIFO has space for writing by the LBD. The LBD writes 16-bit wide data supplied on lbd_sfu_wdata[15:0]. lbd_sfu_wvalid indicates that the data is valid.

The LBDNextLineFIFO control logic counts the number of lbd_sfu_wvalid signals and is used to correctly address into the next line FIFO. The lbd_sfu_wvalid counter is rounded up to the nearest 256-bit word when a lbd_sfu_advline strobe is received from the LBD. Any data remaining in the FIFO is flushed to DRAM with padding being added to fill a complete 256-bit word.

25.8.7 sfu_lbd_rdy Generation

The signal sfu_lbd_rdy is generated by ANDing plf_rdy from the LBDPrevLineFIFO and nlf_rdy from the LBDNextLineFIFO.

sfu_lbd_rdy indicates to the LBD that the SFU is available for writing i.e. there is space available in the LBDNextLineFIFO. After the first ibd_sfu_advline and before the number of lbd_sfu_pladvword strobes received is equivalent to the line length, sfu_lbd_rdy indicates that the SFU is available for both reading, i.e. there is data in the LBDPrevLineFIFO, and writing.

Thereafter it indicates the SFU is available for writing.

25.8.8 LBD-SFU Interfaces Timing Waveform Description

Figure 167:
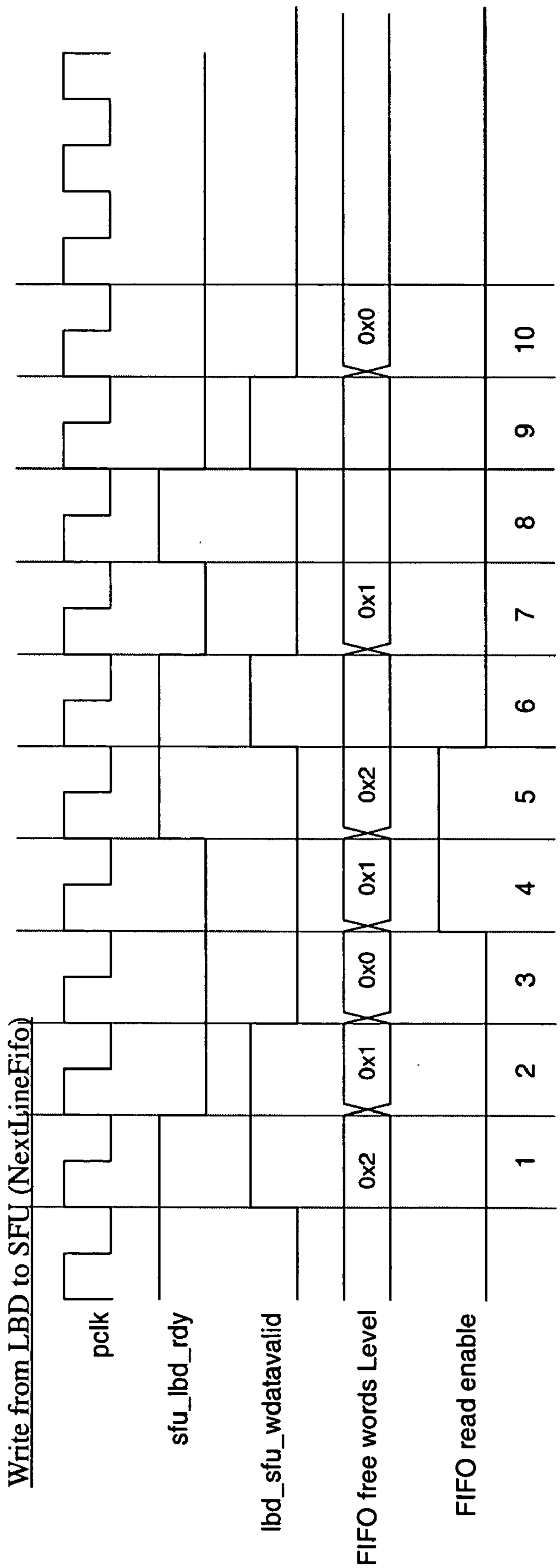
FIG. 167 shows an LDB to SFU write interface
Figure 168:
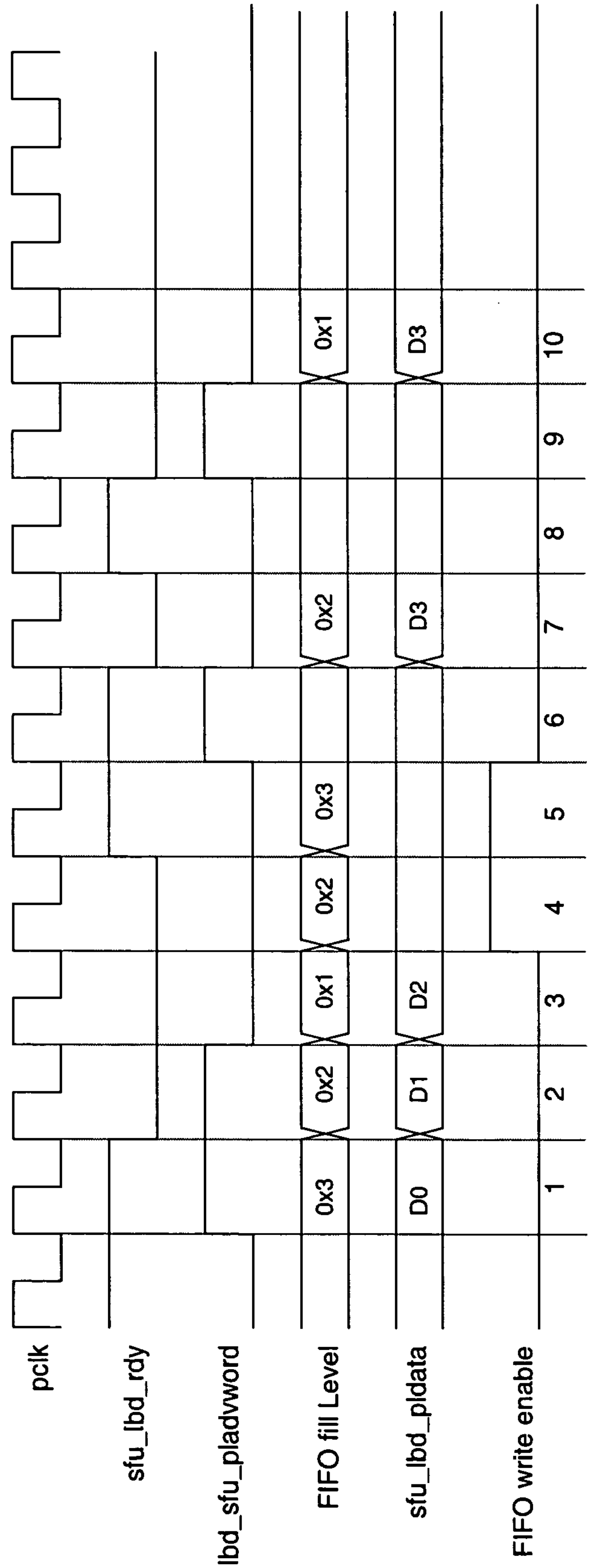
FIG. 168 shows an LDB to SFU read interface (within a line)
Figure 169:
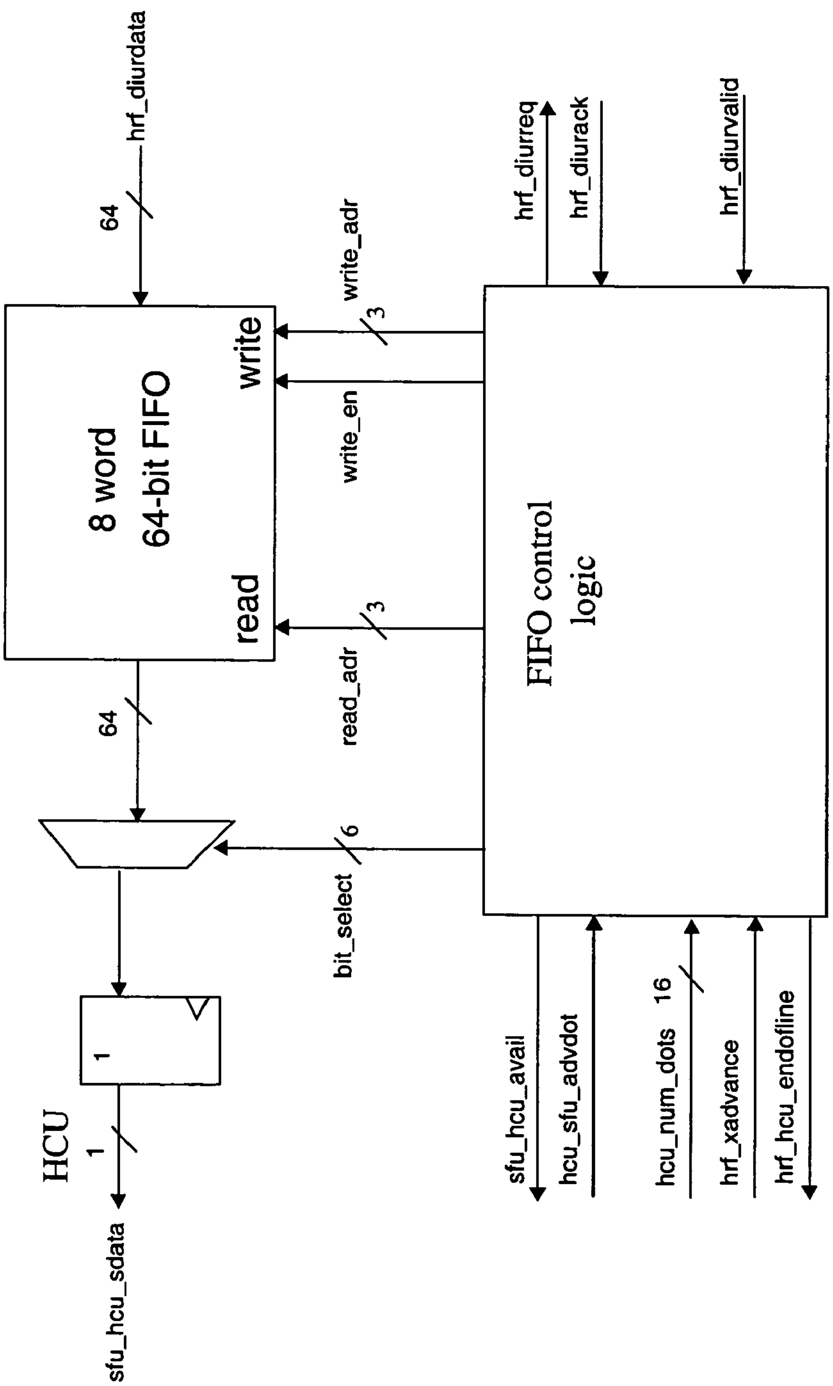
FIG. 169 shows an HCUReadLineFifo Sub-block
Figure 170:
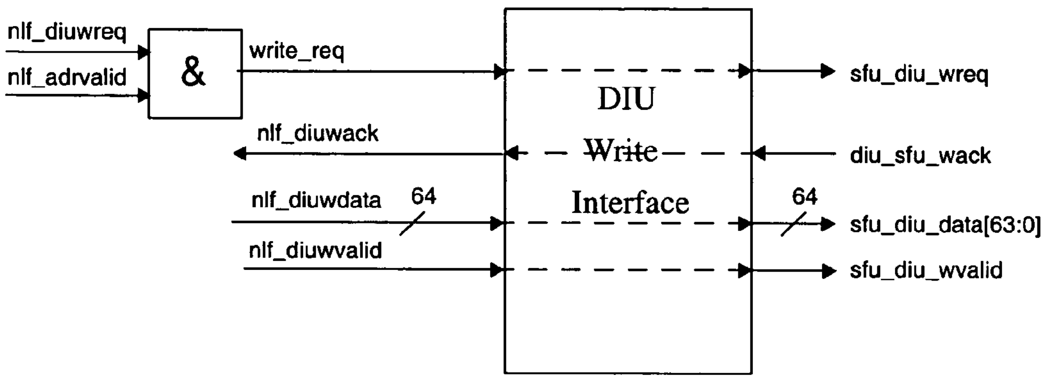
FIG. 170 shows a DIU write Interface

In FIG. 167 and FIG. 168, shows the timing of the data valid and ready signals between the SFU and LBD. A diagram and pseudocode is given for both read and write interfaces between the SFU and LBD.

25.8.8.1 LBD-SFU Write Interface Timing

The main points to note from FIG. 167 are:

In clock cycle 1 sfu_lbd_rdy detects that it has only space to receive 2 more 16 bit words from the LBD after the current clock cycle.

The data on lbd_sfu_wdata is valid and this is indicated by lbd_sfu_wdatavalid being asserted.

In clock cycle 2 sfu_lbd_rdy is deasserted however the LBD can not react to this signal until clock cycle 3. So in clock cycle 3 there is also valid data from the LBD which consumes the last available location available in the FIFO in the SFU (FIFO free level is zero).

In clock cycle 4 and 5 the FIFO is read and 2 words become free in the FIFO.

In cycle 4 the SFU determines that the FIFO has more room and asserts the ready signal on the next cycle.

The LBD has entered a pause mode and waits for sfu_lbd_rdy to be asserted again, in cycle 5 the LBD sees the asserted ready signal and responds by writing one unit into the FIFO, in cycle 6.

The SFU detects it has 2 spaces left in the FIFO and the current cycle is an active write (same as in cycle 1), and deasserts the ready on the next cycle.

In cycle 7 the LBD did not have data to write into the FIFO, and so the FIFO remains with one space left The SFU toggles the ready signal every second cycle, this allows the LBD to write one unit at a time to the FIFO.

In cycle 9 the LBD responds to the single ready pulse by writing into the FIFO and consuming the last remaining unit free.

The write interface pseudocode for generating the ready is.

```
// ready generation pseudocode
if (fifo__free__level > 2) then
    nlf__rdy = 1
elsif (fifo__free__level = = 2) then
    if (lbd__sfu__wdatavalid = = 1)then
        nlf__rdy = 0
    else
        nlf__rdy = 1
elsif (fifo__free__level = = 1) then
    if (lbd__sfu__wdatavalid = = 1)then
        nlf__rdy = 0
    else
        nlf__rdy = NOT(sfu__lbd__rdy)
else
    nlf__rdy       = 0
sfu__lbd__rdy = (nlf__rdy AND plf__rdy)
```

25.8.8.2 SFU-LBD Read Interface

The read interface is similar to the write interface except that read data (sfu_lbd_pldata) takes an extra cycle to respond to the data advance signal (lbd_sfu_pladvword signal).

It is not possible to read the FIFO totally empty during the processing of a line, one word must always remain in the FIFO. At the end of a line the fifo can be read to totally empty. This functionality is controlled by the SFU with the generation of the plf_signal.

There is an apparent corner case on the read side which should be highlighted. On examination this turns out to not be an issue.

Scenario 1:

sfu_lbd_rdy will go low when there is still is still 2 pieces of data in the FIFO. If there is a lbd_sfu_pladvword pulse in the next cycle the data will appear on sfu_lbd_pldata[15:0].

Scenario 2:

sfu_lbd_rdy will go low when there is still 2 pieces of data in the FIFO. If there is no lbd_sfu_pladvword pulse in the next cycle and it is not the end of the page then the SFU will read the data for the next line from DRAM and the read FIFO will fill more, sfu_lbd_rdy will assert again, and so the data will appear on sfu_lbd_pldata [15:0]. If it happens that the next line of data is not available yet the sfu_lbd_pldata bus will go invalid until the next lines data is available. The LBD does not sample the sfu_lbd_pldata bus at this time (i.e. after the end of a line) and it is safe to have invalid data on the bus.

Scenario 3:

sfu_lbd_rdy will go low when there is still 2 pieces of data in the FIFO. If there is no lbd_sfu_pladvword pulse in the next cycle and it is the end of the page then the SFU will do no more reads from DRAM, sfu_lbd_rdy will remain de-asserted, and the data will not be read out from the FIFO. However last line of data on the page is not needed for decoding in the LBD and will not be read by the LBD. So scenario 3 will never apply.

The pseudocode for the read FIFO ready generation

```
// ready generation pseudocode
if (pl__count = = lbd__dram__words) then
    plf__rdy = 1
elsif (fifo__fill__level > 3)then
    plf__rdy = 1
elsif (fifo__fill__level = = 3) then
    if (lbd__sfu__pladvword = = 1)then
        plf__rdy = 0
    else
        plf__rdy = 1
elsif (fifo__fill__level = = 2) then
    if (lbd__sfu__pladvword = = 1)then
        plf__rdy = 0
    else
        plf__rdy = NOT(sfu__lbd__rdy)
else
    plf__rdy   = 0
sfu__lbd__rdy = (plf__rdy AND nlf__rdy)
```

25.8.9 HCUReadLineFIFO Sub-Block

TABLE 167

HCUReadLineFIFO Additional IO Definition

| Port Name | Pins | I/O | Description |
|---|---|---|---|
| DIU and Address Generation sub-block Signals | | | |
| hrf_xadvance | 1 | In | Signal from horizontal scaling unit<br>1 - supply the next dot<br>1 - supply the current dot |
| hrf_hcu_endofline | 1 | Out | Signal lasting 1 cycle indicating then end of the HCU read line. |
| hrf_diurreq | 1 | Out | Signal indicating the HCUReadLineFIFO has space for 256-bits of DIU data. |
| hrf_diurack | 1 | In | Acknowledge that read request has been accepted and hrf_diurreq should be de-asserted. |
| hrf_diurdata | 1 | In | Data from HCUReadLineFIFO to DIU.<br>First 64-bits are bits 63:0 of 256 bit word.<br>Second 64-bits are bits 127:64 of 256 bit word.<br>Third 64-bits are bits 191:128 of 256 bit word.<br>Fourth 64-bits are bits 255:192 of 256 bit word. |
| hrf_diurvalid | 1 | In | Signal indicating data on hrf_diurdata is valid. |
| hrf_diuidle | 1 | Out | Signal indicating DIU state-machine is in the IDLE state. |

25.8.9.1 General Description

The HCUReadLineFIFO sub-block comprises a double 256-bit buffer between the HCU and the DIU Interface and Address Generator sub-block. The FIFO is implemented as 8 times 64-bit words. The FIFO is written by the DIU Interface and Address Generator sub-block and read by the HCU.

The DIU Interface and Address Generation (DAG) sub-block interface of the HCUReadLineFIFO is identical to the LBDPrevLineFIFO DIU interface.

Whenever 4 locations in the FIFO are free the FIFO will request 256-bits of data from the DAG sub-block by asserting hrf_diurreq. A signal hrf_diurack indicates that the request has been accepted and hrf_diurreq should be de-asserted.

The data is written to the FIFO as 64-bits on hrf_diurdata[63:0] over 4 clock cycles. The signal hrf_diurvalid indicates that the data returned on hrf_diurdata[63:0] is valid. hrf_diurvalid is used to generate the FIFO write enable, write_en, and to increment the FIFO write address, write_adr[2:0]. If the HCUReadLineFIFO still has 256-bits free then hrf_diurreq should be asserted again.

The HCUReadLineFIFO generates a signal sfu_hcu_avail to indicate that it has data available for the HCU. The HCU reads single-bit data supplied on sfu_hcu_sdata. The FIFO control logic generates a signal bit_select which selects the next bit of the 64-bit FIFO word to output on sfu_hcu_sdata. The signal hcu_sfu_advdot tells the HCUReadLineFIFO to supply the next dot (hrf_xadvance=1) or the current dot (hrf_xadvance=0) on sfu_hcu_sdata according to the hrf_xadvance signal from the scaling control unit in the DAG sub-block. The HCU should not generate the hcu_sfu_advdot signal until sfu_hcu_avail is true. The HCU can therefore stall waiting for the sfu_hcu_avail signal.

When the entire current 64-bit FIFO word has been read by the HCU hcu_sfu_advdot will cause the next word to be popped from the FIFO.

The last 256-bit word for a line read from DRAM and written into the HCUReadLineFIFO can contain dots or extra padding which should not be output to the HCU. A counter in the HCUReadLineFIFO, hcuadvdot_count[15:0], counts the number of hcu_sfu_advdot strobes received from the HCU. When the count equals hcu_num_dots[15:0] the HCUReadLineFIFO must adjust the FIFO read address to point to the next 256-bit word boundary in the FIFO. This can be achieved by considering the FIFO read address, read_adr[2:0], will require 3 bits to address 8 locations of 64-bits. The next 256-bit aligned address is calculated by inverting the MSB of the read_adr and setting all other bits to 0.

```
If (hcuadvdot_count = = hcu_num_dots) then
    read_adr[1:0] = b00
    read_adr[2] = ~read_adr[2]
```

The DIU Interface and Address Generator sub-block scaling unit also needs to know when hcuadvdot_count equals hcu_num_dots. This condition is exported from the HCUReadLineFIFO as the signal hrf_hcu_endofline. When the hrf_hcu_endofline is asserted the scaling unit will decide based on vertical scaling whether to go back to the start of the current line or go onto the next line.

25.8.9.2 DRAM Access Limitation

The SFU must output 1 bit/cycle to the HCU. Since HCUNumDots may not be a multiple of 256 bits the last 256-bit DRAM word on the line can contain extra zeros. In this case, the SFU may not be able to provide 1 bit/cycle to the HCU. This could lead to a stall by the SFU. This stall could then propagate if the margins being used by the HCU are not sufficient to hide it. The maximum stall can be estimated by the calculation: DRAM service period−X scale factor*dots used from last DRAM read for HCU line.

25.8.10 DIU Interface and Address Generator Sub-Block

TABLE 168

DIU Interface and Address Generator Additional IO Description

| Port name | Pins | I/O | Description |
|---|---|---|---|
| Internal LBDPrevLineFIFO Inputs | | | |
| plf_diurreq | 1 | In | Signal indicating the LBDPrevLineFIFO has 256-bits of data free. |
| plf_diurack | 1 | Out | Acknowledge that read request has been accepted and plf_diurreq should be de-asserted. |
| plf_diurdata | 1 | Out | Data from the DIU to LBDPrevLineFIFO.<br>First 64-bits are bits 63:0 of 256 bit word<br>Second 64-bits are bits 127:64 of 256 bit word<br>Third 64-bits are bits 191:128 of 256 bit word<br>Fourth 64-bits are bits 255:192 of 256 bit word |
| plf_diurvalid | 1 | Out | Signal indicating data on plf_diurdata is valid. |

TABLE 168-continued

DIU Interface and Address Generator Additional IO Description

| Port name | Pins | I/O | Description |
|---|---|---|---|
| plf_diuidle | 1 | In | Signal indicating DIU state-machine is in the IDLE state. |
| Internal LBDNextLineFIFO Inputs | | | |
| nlf_diuwreq | 1 | In | Signal indicating the LBDNextLineFIFO has 256-bits of data for writing to the DIU. |
| nlf_diuwack | 1 | Out | Acknowledge from DIU that write request has been accepted and write data can be output on nlf_diuwdata together with nlf_diuwvalid. |
| nlf_diuwdata | 1 | In | Data from LBDNextLineFIFO to DIU Interface. First 64-bits are bits 63:0 of 256 bit word Second 64-bits are bits 127:64 of 256 bit word Third 64-bits are bits 191:128 of 256 bit word Fourth 64-bits are bits 255:192 of 256 bit word |
| nlf_diuwvalid | 1 | In | Signal indicating that data on wlf_diuwdata is valid. |
| Internal HCUReadLineFIFO Inputs | | | |
| hrf_hcu_endofline | 1 | In | Signal lasting 1 cycle indicating then end of the HCU read line. |
| hrf_xadvance | 1 | Out | Signal from horizontal scaling unit 1 - supply the next dot 1 - supply the current dot |
| hrf_diurreq | 1 | In | Signal indicating the HCUReadLineFIFO has space for 256-bits of DIU data. |
| hrf_diurack | 1 | Out | Acknowledge that read request has been accepted and hrf_diurreq should be de-asserted. |
| hrf_diurdata | 1 | Out | Data from HCUReadLineFIFO to DIU. First 64-bits are bits 63:0 of 256 bit word Second 64-bits are bits 127:64 of 256 bit word Third 64-bits are bits 191:128 of 256 bit word Fourth 64-bits are bits 255:192 of 256 bit word |
| hrf_diurvalid | 1 | Out | Signal indicating data on plf_diurdata is valid. |
| hrf_diuidle | 1 | In | Signal indicating DIU state-machine is in the IDLE state. |

25.8.10.1 General Description

The DIU Interface and Address Generator (DAG) sub-block manages the bi-level buffer in DRAM. It has a DIU Write Interface for the LBDNextLineFIFO and a DIU Read Interface shared between the HCUReadLineFIFO and LBDPrevLineFIFO.

All DRAM address management is centralised in the DAG. DRAM access is pre-emptive i.e. after a FIFO unit has made an access then as soon as the FIFO has space to read or data to write a DIU access will be requested immediately. This ensures there are no unnecessary stalls introduced e.g. at the end of an LBD or HCU line.

The control logic for horizontal and vertical non-integer scaling logic is completely contained in the DAG sub-block. The scaling control unit exports the hlf_xadvance signal to the HCUReadLineFIFO which indicates whether to replicate the current dot or supply the next dot for horizontal scaling.

25.8.10.2 DIU Write Interface

The LBDNextLineFIFO generates all the DIU write interface signals directly except for sfu_diu_wadr[21:5] which is generated by the Address Generation logic The DIU request from the LBDNextLineFIFO will be negated if its respective address pointer in DRAM is invalid i.e. nlf_adrvalid=0. The implementation must ensure that no erroneous requests occur on sfu_diu_wreq.

25.8.10.3 DIU Read Interface

Both HCUReadLineFIFO and LBDPrevLineFIFO share the read interface. If both sources request simultaneously, then the arbitration logic implements a round-robin sharing of read accesses between the HCUReadLineFIFO and LBDPrevLineFIFO.

Figure 171:
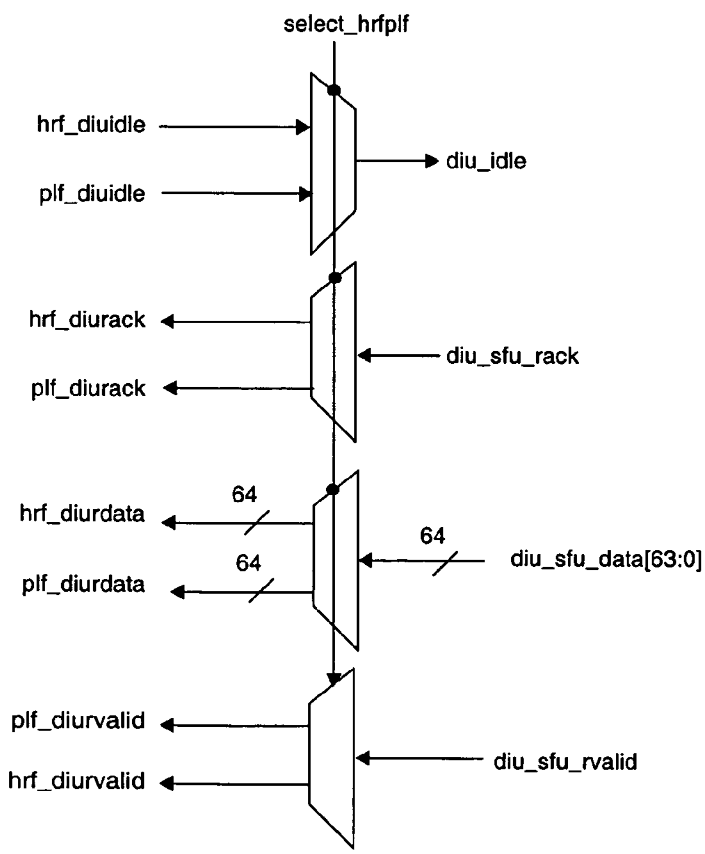
FIG. 171 shows a DIU Read Interface multiplexing by select_hrfplf

The DIU read request arbitration logic generates a signal, select_hrfplf, which indicates whether the DIU access is from the HCUReadLineFIFO or LBDPrevLineFIFO (0=HCUReadLineFIFO, 1=LBDPrevLineFIFO). FIG. 171 shows select_hrfplf multiplexing the returned DIU acknowledge and read data to either the HCUReadLineFIFO or LBDPrevLineFIFO.

Figure 172:
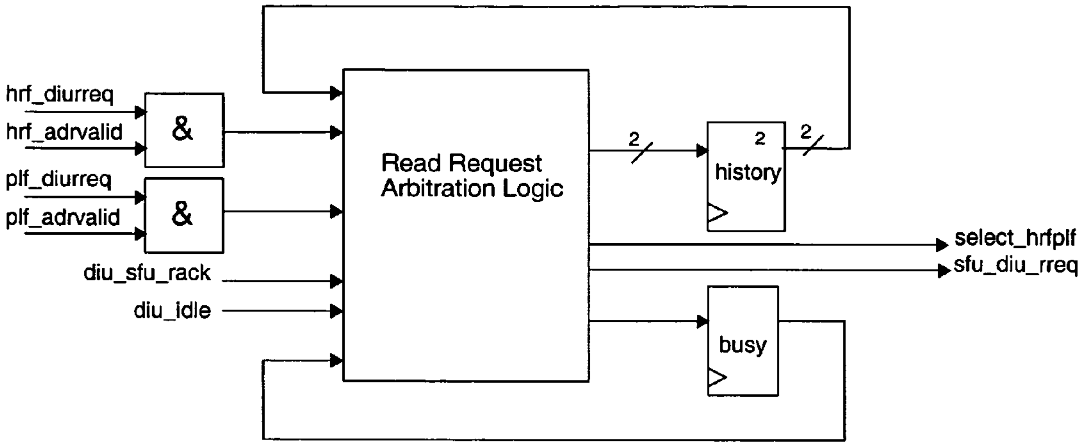
FIG. 172 shows DIU read request arbitration logic
Figure 173:
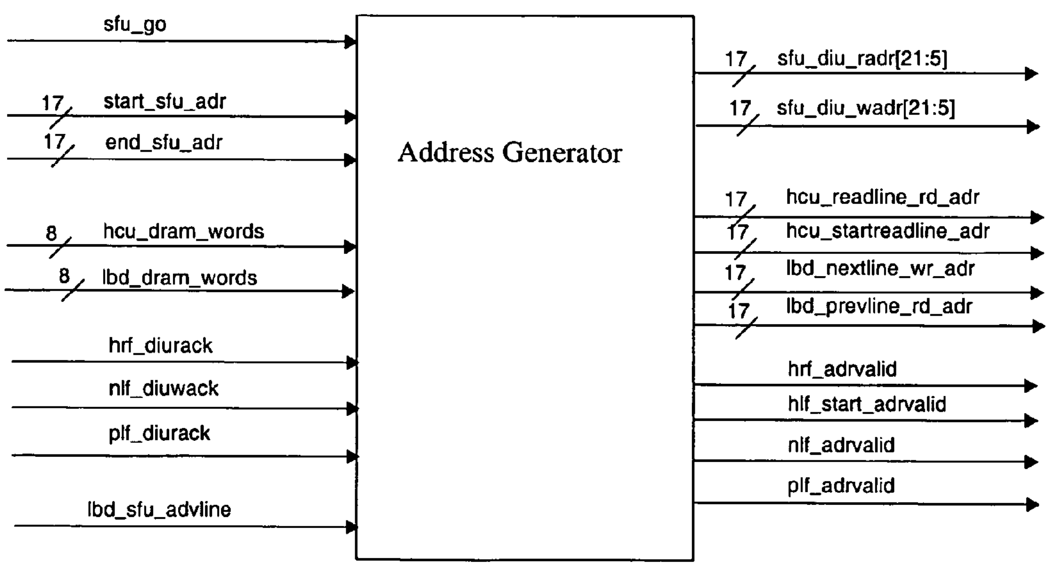
FIG. 173 shows address generation
Figure 174:
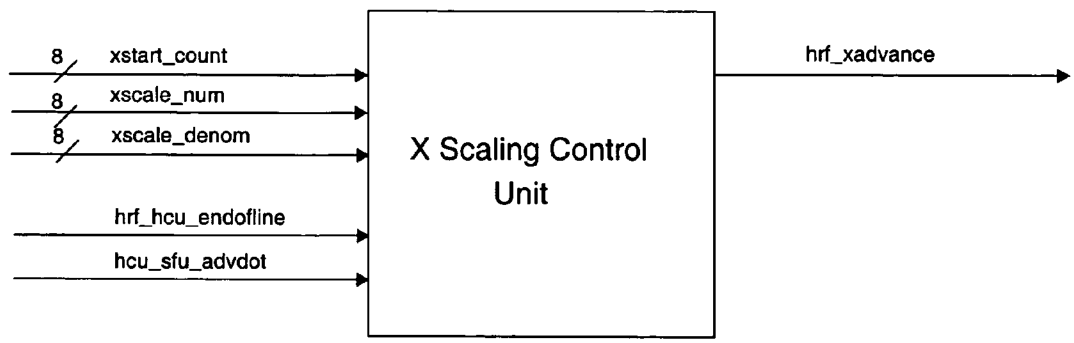
FIG. 174 shows an X scaling control unit
Figure 175:
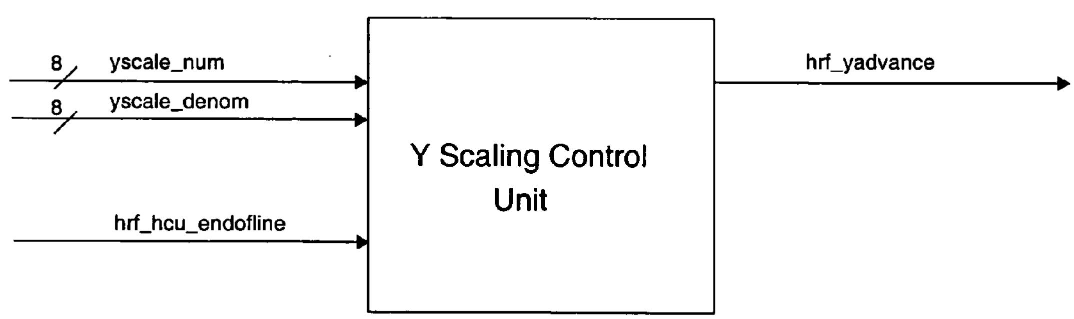
FIG. 175 Y shows a scaling control unit

The DIU read request arbitration logic is shown in FIG. 172. The arbitration logic will select a DIU read request on hrf_diurreq or plf_diurreq and assert sfu_diu_rreq which goes to the DIU. The accompanying DIU read address is generated by the Address Generation Logic. The select signal select_hrfplf will be set according to the arbitration winner (0=HCUReadLineFIFO, 1=LBDPrevLineFIFO). sfu_diu_rreq is cleared when the DIU acknowledges the request on diu_sfu_rack. Arbitration cannot take place again until the DIU state-machine of the arbitration winner is in the idle state, indicated by diu_idle. This is necessary to ensure that the DIU read data is multiplexed back to the FIFO that requested it.

The DIU read requests from the HCUReadLineFIFO and LBDPrevLineFIFO will be negated if their respective addresses in DRAM are invalid, hrf_adrvalid=0 or plf_adrvalid=0. The implementation must ensure that no erroneous requests occur on sfu_diu_rreq.

If the HCUReadLineFIFO and LBDPrevLineFIFO request simultaneously, then if the request is not following immediately another DIU read port access, the arbitration logic will choose the HCUReadLineFIFO by default. If there are back to back requests to the DIU read port then the arbitration logic implements a round-robin sharing of read accesses between the HCUReadLineFIFO and LBDPrevLineFIFO.

A pseudo-code description of the DIU read arbitration is given below.

```
// history is of type {none, hrf, plf}, hrf is
HCUReadLineFIFO, plf is LBDPrevLineFIFO
    // initialisation on reset
    select_hrfplf = 0 // default choose hrf
    history = none // no DIU read access immediately preceding
    // state-machine is busy between asserting sfu_diu_rreq
and diu_idle = 1
    // if DIU read requester state-machine is in idle state
then de-assert busy
    if (diu_idle = = 1) then
        busy = 0
    //if acknowledge received from DIU then de-assert DIU
request
    if (diu_sfu_rack = = 1) then
        //de-assert request in response to acknowledge
        sfu_diu_rreq = 0
    // if not busy then arbitrate between incoming requests
    // if request detected then assert busy
    if (busy = = 0) then
        //if there is no request
        if (hrf_diurreq = = 0) AND (plf_diurreq = = 0) then
            sfu_diu_rreq = 0
            history = none
        // else there is a request
        else {
            // assert busy and request DIU read access
            busy = 1
            sfu_diu_rreq = 1
            // arbitrate in round-robin fashion between the
requestors
            // if only HCUReadLineFIFO requesting choose
HCUReadLineFIFO
            if (hrf_diurreq = = 1) AND (plf_diurreq = = 0) then
                history = hrf
                select_hrfplf = 0
            // if only LBDPrevLineFIFO requesting choose
LBDPrevLineFIFO
            if (hrf_diurreq = = 0) AND (plf_diurreq = = 1) then
                history = plf
                select_hrfplf = 1
            //if both HCUReadLineFIFO and LBDPrevLineFIFO
requesting
            if (hrf_diurreq = = 1) AND (plf_diurreq = = 1) then
                    // no immediately preceding request choose
HCUReadLineFIFO
                if (history = = none) then
                        history = hrf
                        select_hrfplf = 0
                    // if previous winner was HCUReadLineFIFO choose
LBDPrevLineFIFO
                elsif (history = = hrf) then
                        history = plf
                        select_hrfplf = 1
                    // if previous winner was LBDPrevLineFIFO choose
HCUReadLineFIFO
                elsif (history = = plf) then
                        history = hrf
                    select_hrfplf = 0
            // end there is a request
            }
```

25.8.10.4 Address Generation Logic

The DIU interface generates the DRAM addresses of data read and written by the SFU's FIFOs. A write request from the LBDNextLineFIFO on nlf_diuwreq causes a write request from the DIU Write Interface. The Address Generator supplies the DRAM write address on sfu_diu_wadr[21:5].

A winning read request from the DIU read request arbitration logic causes a read request from the DIU Read Interface. The Address Generator supplies the DRAM read address on sfu_diu_radr[21:5].

The address generator is configured with the number of DRAM words to read in a HCU line, hcu_dram_words, the first DRAM address of the SFU area, start_sfu_adr[21:5], and the last DRAM address of the SFU area, end_sfu_adr [21:5].

Note hcu_dram_words configuration register specifies the the number of DRAM words consumed per line in the HCU, while lbd_dram_words specifies the number of DRAM words generated per line by the LBD. These values are not required to be the same.

For example the LBD may store 10 DRAM words per line (lbd_dram_words=10), but the HCU may consume 5 DRAM words per line. In such case the hcu_dram_words would be set to 5 and the HCU Read Line FIFO would trigger a new line after it had consumed 5 DRAM words (via hrf_hcu_endofline).

Address Generation

There are four address pointers used to manage the bi-level DRAM buffer:

a. hcu_readline_rd_adr is the read address in DRAM for the HCUReadLineFIFO.
b. hcu_startreadline_adr is the start address in DRAM for the current line being read by the HCUReadLineFIFO.
c. lbd_nextline_wr_adr is the write address in DRAM for the LBDNextLineFIFO.
d. lbd_prevline_rd_adr is the read address in DRAM for the LBDPrevLineFIFO.

The current value of these address pointers are readable by the CPU.

Four corresponding address valid flags are required to indicate whether the address pointers are valid, based on whether the FIFOs are full or empty.

a. hlf_adrvalid, derived from hrf_nlf_fifo_emp
b. hlf_start_adrvalid, derived from start_hrd_nlf_fifo_emp
c. nlf_adrvalid. derived from nlf_plf_fifo_full and nlf_hrf_fifo_full
d. plf_adrvalid. derived from plf_nlf_fifo_emp DRAM requests from the FIFOs will not be issued to the DIU until the appropriate address flag is valid.

Once a request has been acknowledged, the address generation logic can calculate the address of the next 256-bit word in DRAM, ready for the next request.

Rules for Address Pointers

The address pointers must obey certain rules which indicate whether they are valid:

a. hcu_readline_rd_adr is only valid if it is reading earlier in the line than lbd_nextline_wr_adr is writing i.e. the fifo is not empty
b. The SFU (lbd_nextline_wr_adr) cannot overwrite the current line that the HCU is reading from (hcu_startreadline_adr) i.e. the fifo is not full, when compared with the HCU read line pointer
c. The LBDNextLineFIFO (lbd_nextline_wr_adr) must be writing earlier in the line than LBD-PrevLineFIFO (lbd_prevline_rd_adr) is reading and must not overwrite the current line that the HCU is reading from i.e. the fifo is not full when compared to the PrevLineFifo read pointer
d. The LBDPrevLineFIFO (lbd_prevline_rd_adr) can read right up to the address that LBDNextLineFIFO (lbd_nextline_wr_adr) is writing i.e the fifo is not empty.
e. At startup i.e. when sfu_go is asserted, the pointers are reset to start_sfu_adr[21:5].
f. The address pointers can wrap around the SFU bi-level store area in DRAM.

Address Generator Pseudo-Code:

Initialization:

```
if (sfu__go rising edge) then
    //initialise address pointers to start of SFU address
space
    lbd__prevline__rd__adr        = start__sfu__adr[21:5]
    lbd__nextline__wr__adr        = start__sfu__adr[21:5]
    hcu__readline__rd__adr        = start__sfu__adr[21:5]
    hcu__startreadline__adr       = start__sfu__adr[21:5]
    lbd__nextline__wr__wrap       = 0
    lbd__prevline__rd__wrap       = 0
    hcu__startreadline__wrap      = 0
    hcu__readline__rd__wrap       = 0
    }
```

Determine FIFO fill and emplty status:

```
// calculate which FIFOs are full and empty
plf__nlf__fifo__emp    =    (lbd__prevline__rd__adr    = =
lbd__nextline__wr__adr) AND
                  (lbd__prevline__rd__wrap              = =
lbd__nextline__wr__wrap)
nlf__plf__fifo__full    =    (lbd__nextline__wr__adr    = =
lbd__prevline__rd__adr) AND
                  (lbd__prevline__rd__wrap              !=
lbd__nextline__wr__wrap)
nlf__hrf__fifo__full    =    (lbd__nextline__wr__adr    = =
hcu__startreadline__adr) AND
                  (hcu__startreadline__wrap             !=
lbd__nextline__wr__wrap)
// hcu start address can jump addresses and so needs
comparitor
if (hcu__startreadline__wrap = = lbd__nextline__wr__wrap) then
    start__hrf__nlf__fifo__emp  =   (hcu__startreadline__adr
>=lbd__nextline__wr__adr)
else
    start__hrf__nlf__fifo__emp  =  NOT(hcu__startreadline__adr
>=lbd__nextline__wr__adr)
// hcu read address can jump addresses and so needs
comparitor
if (hcu__readline__rd__wrap = = lbd__nextline__wr__wrap) then
    hrf__nlf__fifo__emp  =      (hcu__readline__rd__adr
>=lbd__nextline__wr__adr)
else
    hrf__nlf__fifo__emp     =     NOT(hcu__readline__rd__adr
>=lbd__nextline__wr__adr)
```

Address pointer updating:

```
// LBD Next line FIFO
// if DIU write acknowledge and LBDNextLineFIFO is not full
with reference to PLF and HRF
if (diu__sfu__wack = = 1 AND nlf__plf__fifo__full != 1 AND
nlf__hrf__fifo__full !=1 ) then
    if      (lbd__nextline__wr__adr     = =     end sfu adr)     then
// if end of SFU address range
        lbd__nextline__wr__adr = start__sfu__adr                //
go to start of SFU address range
        lbd__nextline__wr__wrap= NOT (lbd__nextline__wr__wrap)   //
invert the wrap bit
    else
        lbd__nextline__wr__adr++                                 //
increment address pointer
// LBD PrevLine FIFO
```

-continued

```
//if DIU read acknowledge and LBDPrevLineFIFO is not empty
if (diu_sfu_rack == 1 AND select_hrfplf == 1 AND
plf_nlf_fifo_emp !=1) then
    if (lbd_prevline_rd_adr == end_sfu_adr) then
        lbd_prevline_rd_adr = start_sfu_adr                    //
go to start of SFU address range
        lbd_prevline_rd_wrap= NOT (lbd_prevline_rd_wrap)       //
invert the wrap bit
    else
        lbd_prevline_rd_adr++                                  //
increment address pointer
// HCU ReadLine FIFO
// if DIU read acknowledge and HCUReadLineFIFO fifo is not
empty
if (diu_sfu_rack == 1 AND select_hrfplf == 0 AND
hrf_nlf_fifo_emp != 1) then
    // going to update hcu read line address
    if (hrf_hcu_endofline == 1) AND (hrf_yadvance == 1) then {
// read the next line from DRAM
        // advance to start of next HCU line in DRAM
        hcu_startreadline_adr = hcu_startreadline_adr +
lbd_dram_words
        offset = hcu_startreadline_adr - end_sfu_adr - 1
// allow for address wraparound
        if (offset >= 0) then
            hcu_startreadline_adr = start_sfu_adr + offset
                hcu_startreadline_wrap=
NOT(hcu_startreadline_wrap)
        hcu_readline_rd_adr = hcu_startreadline_adr
        hcu_readline_rd_wrap= hcu_startreadline_wrap
        }
    elsif (hrf_hcu_endofline == 1) AND (hrf_yadvance == 0)
then
        hcu_readline_rd_adr = hcu_startreadline_adr            //
restart and re-use the same line
        hcu_readline_rd_wrap= hcu_startreadline_wrap
    elsif (hcu readline rd adr == end sfu adr) then
// check if the FIFO needs to wrap space
        hcu_readline_rd_adr = start_sfu_adr                    //
go to start of SFU address space
        hcu_readline_rd_wrap= NOT (hcu_readline_rd_wrap)
    else
        hcu_readline_rd_adr ++                                 //
increment address pointer
```

25.8.10.4.1 X Scaling of Data for HCUReadLineFIFO

The signal hcu_sfu_advdot tells the HCUReadLineFIFO to supply the next dot or the current dot on sfu_hcu_sdata according to the hrf_xadvance signal from the scaling control unit. When hrf_xadvance is 1 the HCUReadLineFIFO should supply the next dot. When hrf_xadvance is 0 the HCUReadLineFIFO should supply the current dot.

The algorithm for non-integer scaling is described in the pseudocode below. Note, x_scale_count should be loaded with x_start_count after reset and at the end of each line. The end of the line is indicated by hrf_hcu_endofline from the HCUReadLineFIFO.

```
    if (hcu_sfu_advdot == 1) then
        if (x_scale_count + x_scale_denom - x_scale_num >= 0)
then
            x_scale_count = x_scale_count + x_scale_denom -
x_scale_num
            hrf_xadvance = 1
        else
            x_scale_count = x_scale_count + x_scale_denom
            hrf_xadvance = 0
    else
        x_scale_count = x_scale_count
        hrf_xadvance = 0
```

25.8.10.4.2 Y Scaling of Data for HCUReadLineFIFO

The HCUReadLineFIFO counts the number of hcu_sfu_advdot strobes received from the HCU. When the count equals hcu_num_dots the HCUReadLineFIFO will assert hrf_hcu_endofline for a cycle.

The algorithm for non-integer scaling is described in the pseudocode below. Note, y_scale_count should be loaded with zero after reset.

```
    if (hrf_hcu_endofline == 1) then
        if (y_scale_count + y_scale_denom - y_scale_num >= 0)
then
            y_scale_count = y_scale_count + y_scale_denom -
y_scale_num
            hrf_yadvance = 1
        else
            y_scale_count = y_scale_count + y_scale_denom
            hrf_yadvance = 0
    else
        y_scale_count = y_scale_count
        hrf_yadvance = 0
```

When the hrf_hcu_endofline is asserted the Y scaling unit will decide whether to go back to the start of the current line, by setting hrf_yadvance=0, or go onto the next line, by setting hrf_yadvance=1.

Figure 176:
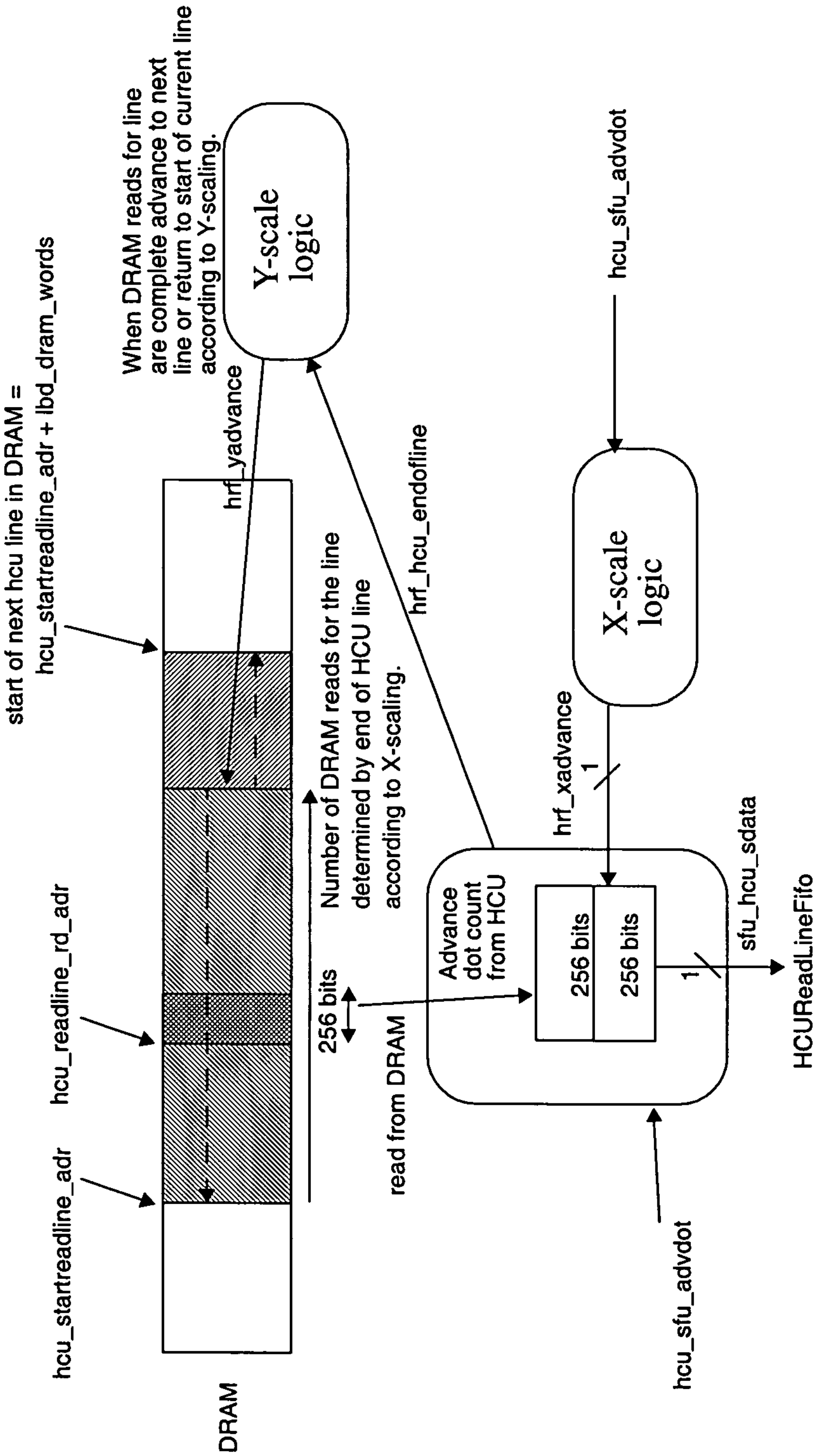
FIG. 176 shows an overview of X and Y scaling at HCU interface

FIG. 176 shows an overview of X and Y scaling for HCU data.

26 Tag Encoder (TE)

26.1 Overview

The Tag Encoder (TE) provides functionality for Netpage-enabled applications, and typically requires the presence of IR ink (although K ink can be used for tags in limited circumstances). The TE encodes fixed data for the page being printed, together with specific tag data values into an error-correctable encoded tag which is subsequently printed in infrared or black ink on the page. The TE places tags on a triangular grID, and can be programmed for both landscape and portrait orientations.

Basic tag structures are normally rendered at 1600 dpi, while tag data is encoded into an arbitrary number of printed dots. The TE supports integer scaling in the Y-direction while the TFU supports integer scaling in the X-direction. Thus, the TE can render tags at resolutions less than 1600 dpi which can be subsequently scaled up to 1600 dpi.

Figure 177:
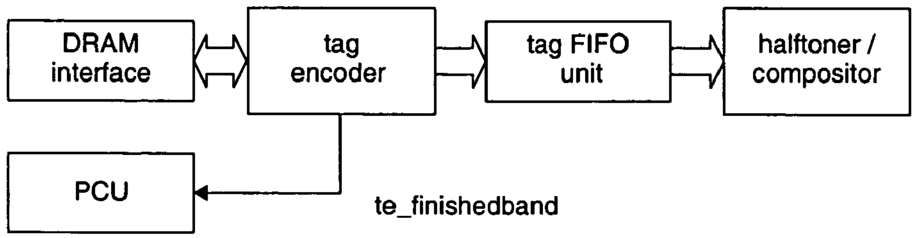
FIG. 177 shows a high level block diagram of TE in context

The output from the TE is buffered in the Tag FIFO Unit (TFU) which is in turn used as input by the HCU. In addition, a te_finishedband signal is output to the end of band unit once the input tag data has been loaded from DRAM. The high level data path is shown by the block diagram in FIG. 177.

After passing through the HCU, the tag plane is subsequently printed with an infrared-absorptive ink that can be read by a Netpage sensing device. Since black ink can be IR absorptive, limited functionality can be provided on offset-printed pages using black ink on otherwise blank areas of the page—for example to encode buttons. Alternatively an invisible infrared ink can be used to print the position tags over the top of a regular page. However, if invisible IR ink is used, care must be taken to ensure that any other printed information on the page is printed in infrared-transparent CMY ink, as black ink will obscure the infrared tags. The monochromatic scheme was chosen to maximize dynamic range in blurry reading environments.

When multiple SoPEC chips are used for printing the same side of a page, it is possible that a single tag will be produced by two SoPEC chips. This implies that the TE must be able to print partial tags.

The throughput requirement for the SoPEC TE is to produce tags at half the rate of the PEC1 TE. Since the TE is reused from PEC1, the SoPEC TE over-produces by a factor of 2. In PEC1, in order to keep up with the HCU which processes 2 dots per cycle, the tag data interface has been designed to be capable of encoding a tag in 63 cycles. This is actually accomplished in approximately 52 cycles within PEC1. If the SoPEC TE were to be modified from two dots production per cycle to a nominal one dot per cycle it should not lose the 63/52 cycle performance edge attained in the PEC1 TE.

26.2 What are Tags?

The first barcode was described in the late 1940's by Woodland and Silver, and finally patented in 1952 (U.S. Pat. No. 2,612,994) when electronic parts were scarce and very expensive. Now however, with the advent of cheap and readily available computer technology, nearly every item purchased from a shop contains a barcode of some description on the packaging. From books to CDs, to grocery items, the barcode provides a convenient way of identifying an object by a product number. The exact interpretation of the product number depends on the type of barcode. Warehouse inventory tracking systems let users define their own product number ranges, while inventory in shops must be more universally encoded so that products from one company don't overlap with products from another company. Universal Product Codes (UPC) were introduced in the mid 1970's at the request of the National Association of Food Chains for this very reason. Barcodes themselves have been specified in a large number of formats. The older barcode formats contain characters that are displayed in the form of lines. The combination of black and white lines describe the information the barcodes contains. Often there are two types of lines to form the complete barcode: the characters (the information itself) and lines to separate blocks for better optical recognition. While the information may change from barcode to barcode, the lines to separate blocks stays constant. The lines to separate blocks can therefore be thought of as part of the constant structural components of the barcode.

Barcodes are read with specialized reading devices that then pass the extracted data onto the computer for further processing. For example, a point-of-sale scanning device allows the sales assistant to add the scanned item to the current sale, places the name of the item and the price on a display device for verification etc. Light-pens, gun readers, scanners, slot readers, and cameras are among the many devices used to read the barcodes.

Figure 178:
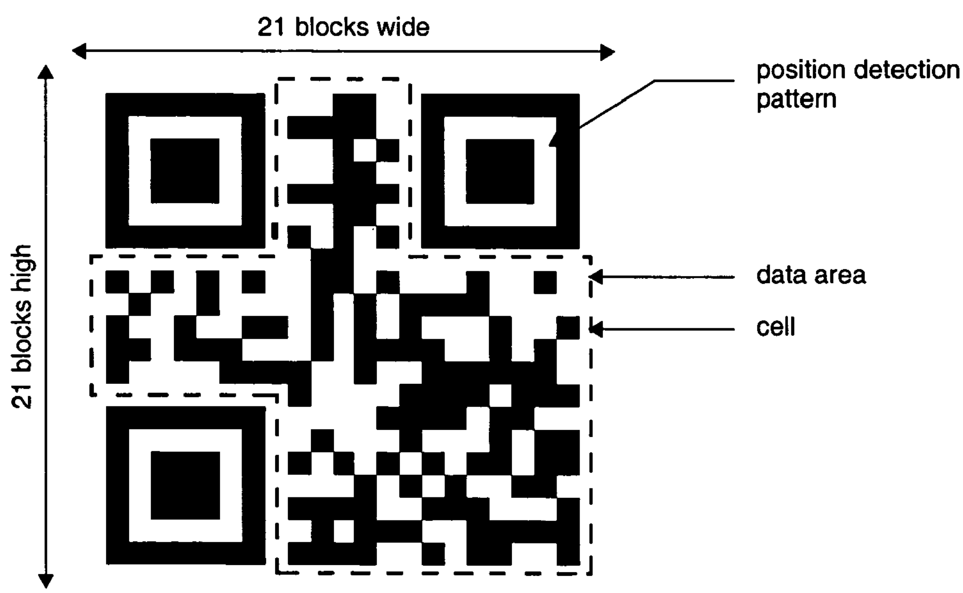
FIG. 178 shows a QR Code

To help ensure that the data extracted was read correctly, checksums were introduced as a crude form of error detection. More recent barcode formats, such as the Aztec 2D barcode developed by Andy Longacre in 1995 (U.S. Pat. No. 5,591,956), but now released to the public domain, use redundancy encoding schemes such as Reed-Solomon. Reed Solomon encoding is adequately discussed in [28], [30] and [34]. The reader is advised to refer to these sources for background information. Very often the degree of redundancy encoding is user selectable. More recently there has also been a move from the simple one dimensional barcodes (line based) to two dimensional barcodes. Instead of storing the information as a series of lines, where the data can be extracted from a single dimension, the information is encoded in two dimensions. Just as with the original barcodes, the 2D barcode contains both information and structural components for better optical recognition. FIG. 178 shows an example of a QR Code (Quick Response Code), developed by Denso of Japan (U.S. Pat. No. 5,726,435). Note the barcode cell is comprised of two areas: a data area (depends on the data being stored in the barcode), and a constant position detection pattern. The constant position detection pattern is used by the reader to help locate the cell itself, then to locate the cell boundaries, to allow the reader to determine the original orientation of the cell (orientation can be determined by the fact that there is no 4th corner pattern).

The number of barcode encoding schemes grows daily. Yet very often the hardware for producing these barcodes is specific to the particular barcode format. As printers become more and more embedded, there is an increasing desire for real-time printing of these barcodes. In particular, Netpage enabled applications require the printing of 2D barcodes (or tags) over the page, preferably in infra-red ink. The tag encoder in SoPEC uses a generic barcode format encoding scheme which is particularly suited to real-time printing. Since the barcode encoding format is generic, the same rendering hardware engine can be used to produce a wide variety of barcode formats.

Unfortunately the term "barcode" is interpreted in different ways by different people. Sometimes it refers only to the data area component, and does not include the constant position detection pattern. In other cases it refers to both data and constant position detection pattern.

We therefore use the term tag to refer to the combination of data and any other components (such as position detection pattern, blank space etc. surround) that must be rendered to help hold or locate/read the data. A tag therefore contains the following components:

- data area(s). The data area is the whole reason that the tag exists. The tag data area(s) contains the encoded data (optionally redundancy-encoded, perhaps simply checksummed) where the bits of the data are placed within the data area at locations specified by the tag encoding scheme.
- constant background patterns, which typically includes a constant position detection pattern. These help the tag reader to locate the tag. They include components that are easy to locate and may contain orientation and perspective information in the case of 2D tags. Constant background patterns may also include such patterns as a blank area surrounding the data area or position detection pattern. These blank patterns can aid in the decoding of the data by ensuring that there is no interference between tags or data areas.

In most tag encoding schemes there is at least some constant background pattern, but it is not necessarily required by all. For example, if the tag data area is enclosed by a physical space and the reading means uses a non-optical location mechanism (e.g. physical alignment of surface to data reader) then a position detection pattern is not required.

Figure 179:
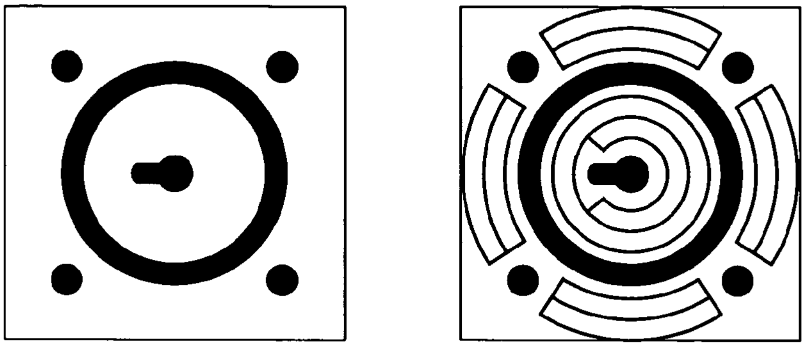
FIG. 179 shows Netpage tag structure
Figure 180:
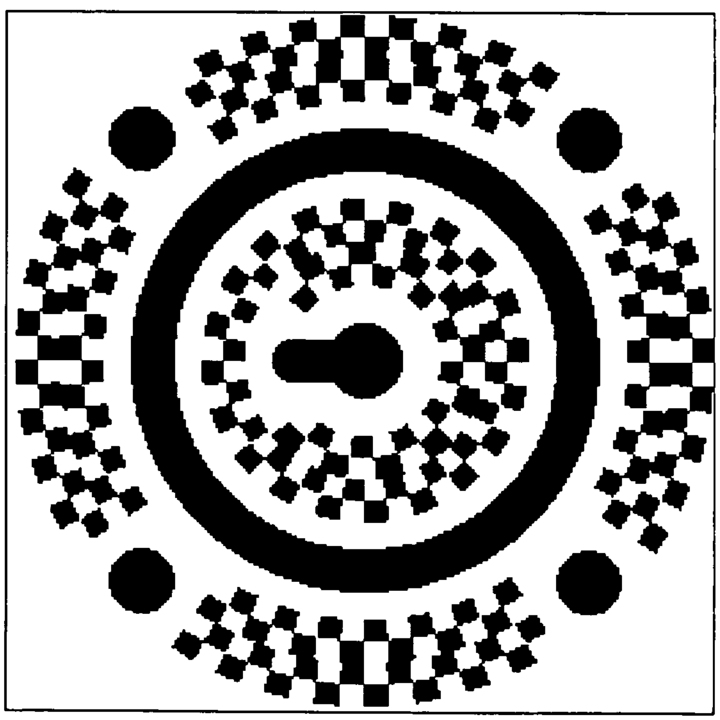
FIG. 180 shows a Netpage tag with data rendered at 1600 dpi (magnified view)

Different tag encoding schemes have different sized tags, and have different allocation of physical tag area to constant position detection pattern and data area. For example, the QR code has 3 fixed blocks at the edges of the tag for position detection pattern (see FIG. 178) and a data area in the remainder. By contrast, the Netpage tag structure (see FIGS. 179 and 180) contains a circular locator component, an orientation feature, and several data areas. FIG. 179(*a*) shows the Netpage tag constant background pattern in a resolution independent form. FIG. 179(*b*) is the same as FIG. 179(*a*), but with the addition of the data areas to the Netpage tag. FIG. 180 is an example of dot placement and rendering to 1600 dpi for a Netpage tag. Note that in FIG. 180 a single bit of data is represented by many physical output dots to form a block within the data area.

26.2.1 Contents of the Data Area

The data area contains the data for the tag.

Figure 181:
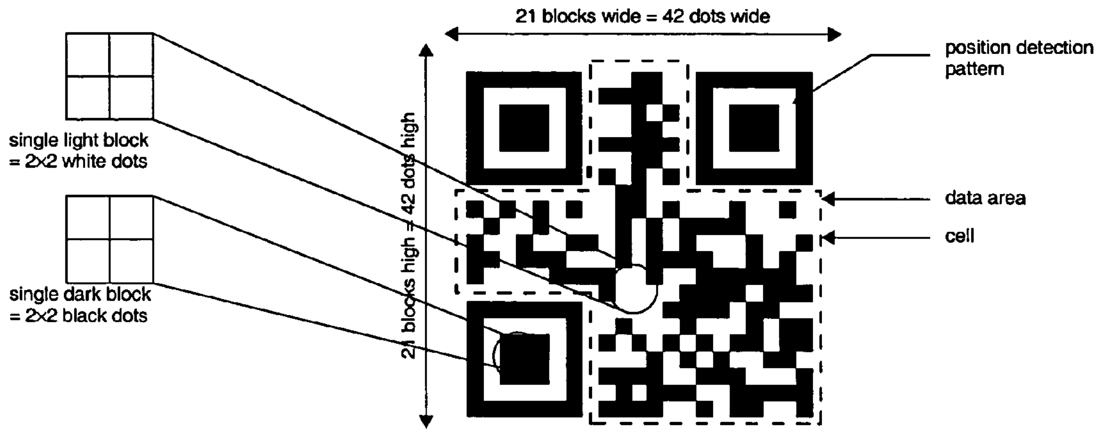
FIG. 181 shows an example of 2×2 dots for each block of QR code

Depending on the tag's encoding format, a single bit of data may be represented by a number of physical printed dots. The exact number of dots will depend on the output resolution and the target reading/scanning resolution. For example, in the QR code (see FIG. 178), a single bit is represented by a dark module or a light module, where the exact number of dots in the dark module or light module depends on the rendering resolution and target reading/scanning resolution. For example, a dark module may be represented by a square block of printed dots (all on for binary 1, or all off for binary 0), as shown in FIG. 181.

The point to note here is that a single bit of data may be represented in the printed tag by an arbitrary printed shape. The smallest shape is a single printed dot, while the largest shape is theoretically the whole tag itself, for example a giant macrodot comprised of many printed dots in both dimensions.

An ideal generic tag definition structure allows the generation of an arbitrary printed shape from each bit of data.

26.2.2 What do the Bits Represent?

Given an original number of bits of data, and the desire to place those bits into a printed tag for subsequent retrieval via a reading/scanning mechanism, the original number of bits can either be placed directly into the tag, or they can be redundancy-encoded in some way. The exact form of redundancy encoding will depend on the tag format.

The placement of data bits within the data area of the tag is directly related to the redundancy mechanism employed in the encoding scheme. The idea is generally to place data bits together in 2D so that burst errors are averaged out over the tag data, thus typically being correctable. For example, all the bits of Reed-Solomon codeword would be spread out over the entire tag data area so to minimize being affected by a burst error.

Since the data encoding scheme and shape and size of the tag data area are closely linked, it is desirable to have a generic tag format structure. This allows the same data structure and rendering embodiment to be used to render a variety of tag formats.

26.2.2.1 Fixed and Variable Data Components

In many cases, the tag data can be reasonably divided into fixed and variable components. For example, if a tag holds N bits of data, some of these bits may be fixed for all tags while some may vary from tag to tag.

For example, the Universal product code allows a country code and a company code. Since these bits don't change from tag to tag, these bits can be defined as fixed, and don't need to be provided to the tag encoder each time, thereby reducing the bandwidth when producing many tags.

Another example is Netpage tags. A single printed page contains a number of Netpage tags. The page-id will be constant across all the tags, even though the remainder of the data within each tag may be different for each tag. By reducing the amount of variable data being passed to SoPEC's tag encoder for each tag, the overall bandwidth can be reduced.

Depending on the embodiment of the tag encoder, these parameters will be either implicit or explicit, and may limit the size of tags renderable by the system. For example, a software tag encoder may be completely variable, while a hardware tag encoder such as SoPEC's tag encoder may have a maximum number of tag data bits.

26.2.2.2 Redundancy-Encode the Tag Data within the Tag Encoder

Instead of accepting the complete number of TagData bits encoded by an external encoder, the tag encoder accepts the basic non-redundancy-encoded data bits and encodes them as required for each tag. This leads to significant savings of bandwidth and on-chip storage.

In SoPEC's case for Netpage tags, only 120 bits of original data are provided per tag, and the tag encoder encodes these 120 bits into 360 bits. By having the redundancy encoder on board the tag encoder the effective bandwidth and internal storage required is reduced to only 33% of what would be required if the encoded data was read directly.

26.3 Placement of Tags on a Page

Figure 182:
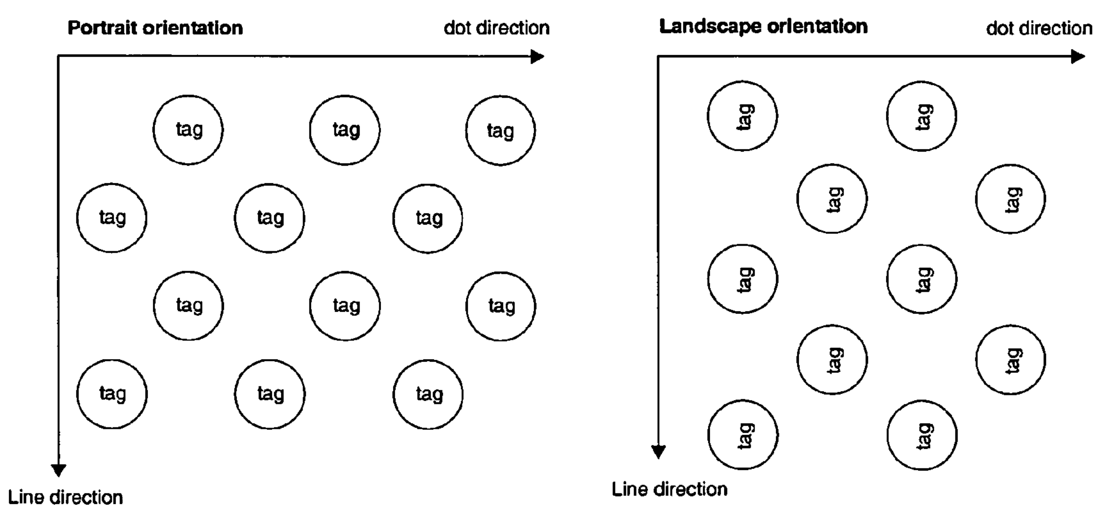
FIG. 182 shows placement of tags for portrait & landscape printing

The TE places tags on the page in a triangular grid arrangement as shown in FIG. 182. The triangular mesh of tags combined with the restriction of no overlap of columns or rows of tags means that the process of tag placement is greatly simplified. For a given line of dots, all the tags on that line correspond to the same part of the general tag structure. The triangular placement can be considered as alternative lines of tags, where one line of tags is inset by one amount in the dot dimension, and the other line of dots is inset by a different amount. The dot inter-tag gap is the same in both lines of tag, and is different from the line inter-tag gap.

Note also that as long as the tags themselves can be rotated, portrait and landscape printing are essentially the same—the placement parameters of line and dot are swapped, but the placement mechanism is the same.

Figure 183:
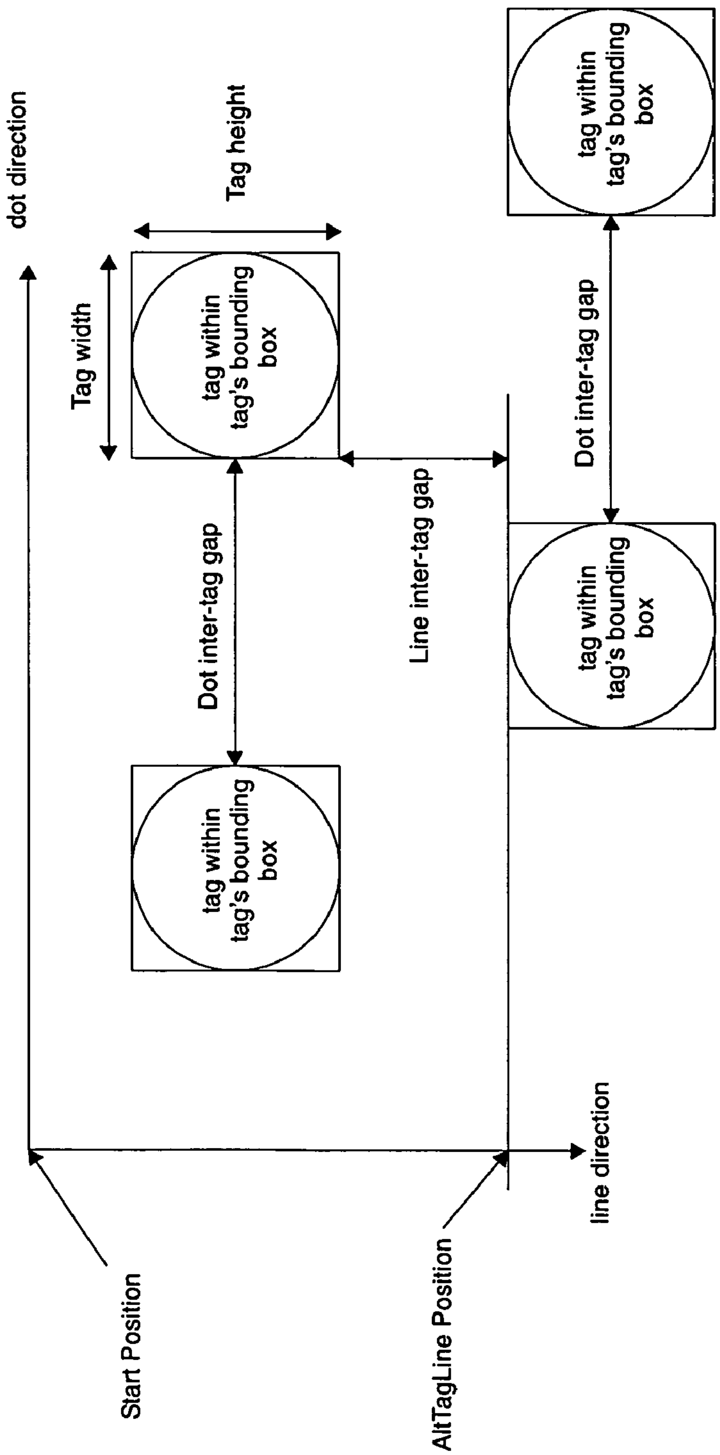
FIG. 183 shows agGeneral representation of tag placement

The general case for placement of tags therefore relies on a number of parameters, as shown in FIG. 183.

The parameters are more formally described in Table 169. Note that these are placement parameters and not registers.

TABLE 169

Tag placement parameters

| parameter | description | restrictions |
|---|---|---|
| Tag height | The number of dot lines in a tag's bounding box | minimum 1 |
| Tag width | The number of dots in a single line of the tag's bounding box. The number of dots in the tag itself may vary depending on the shape of the tag, but the number of dots in the bounding box will be constant (by definition). | minimum 1 |
| Dot inter-tag gap | The number of dots from the edge of one tag's bounding box to the start of the next tag's bounding box, in the dot direction. | minimum = 0 |
| Line inter-tag gap | The number of dot lines from the edge of one tag's bounding box to the start of the next tag's bounding box, in the line direction. | minimum = 0 |
| Start Position | Defines the status of the top left dot on the page - is an offset in dot & row within the tag or the inter-tag gap. | — |
| AltTagLinePosition | Defines the status for the start of the alternate row of tags. Is an offset in dot within the tag or within the dot inter-tag gap (the row position is always 0). | — |

26.4 Basic Tag Encoding Parameters

SoPEC's tag encoder imposes range restrictions on tag encoding parameters as a direct result of on-chip buffer sizes. Table 170 lists the basic encoding parameters as well as range restrictions where appropriate. Although the restrictions were chosen to take the most likely encoding scenarIOs into account, it is a simple matter to adjust the buffer sizes and corresponding addressing to allow arbitrary encoding parameters in future implementations.

TABLE 170

Encoding parameters

| name | definition | maximum value imposed by TE |
|---|---|---|
| W | page width | $2^{14}$ dotpairs or 20.48 inches at 1600 dpi |
| S | tag size | typical tag size is 2 mm × 2 mm maximum tag size is 384 dots × 384 dots before scaling i.e. 6 mm × 6 mm at 1600 dpi |
| N | number of dots in each dimension of the tag | 384 dots before scaling |
| E | redundancy encoding for tag data | Reed-Solomon GF($2^4$) at 5:10 or 7:8 |
| $D_F$ | size of fixed data (unencoded) | 40 or 56 bits |
| $R_F$ | size of redundancy-encoded fixed data | 120 bits |
| $D_V$ | size of variable data (unencoded) | 120 or 112 bits |
| $R_V$ | size of redundancy-encoded variable data | 360 or 240 bits |
| T | tags per page width | 256 |

The fixed data for the tags on a page need only be supplied to the TE once. It can be supplied as 40 or 56 bits of unencoded data and encoded within the TE as described in Section 26.4.1. Alternatively it can be supplied as 120 bits of pre-encoded data (encoded arbitrarily).

The variable data for the tags on a page are those 112 or 120 data bits that are variable for each tag. Variable tag data is supplied as part of the band data, and is always encoded by the TE as described in Section 26.4.1, but may itself be arbitrarily pre-encoded.

26.4.1 Redundancy Encoding

The mapping of data bits (both fixed and variable) to redundancy encoded bits relies heavily on the method of redundancy encoding employed. Reed-Solomon encoding was chosen for its ability to deal with burst errors and effectively detect and correct errors using a minimum of redundancy. Reed Solomon encoding is adequately discussed in [28], [30] and [34]. The reader is advised to refer to these sources for background information.

In this implementation of the TE we use Reed-Solomon encoding over the Galois Field GF($2^4$). Symbol size is 4 bits. Each codeword contains 15 4-bit symbols for a codeword length of 60 bits. The primitive polynomial is $p(x)=x^4+x+1$, and the generator polynomial is $g(x)=(x+\alpha)(x+\alpha^2) \ldots (x+\alpha^{2t})$, where t=the number of symbols that can be corrected.

Of the 15 symbols, there are two possibilities for encoding:

- RS(15, 5): 5 symbols original data (20 bits), and 10 redundancy symbols (40 bits). The 10 redundancy symbols mean that we can correct up to 5 symbols in error. The generator polynomial is therefore $g(x)=(x+\alpha)(x+\alpha^2) \ldots (x+\alpha^{10})$.
- RS(15, 7): 7 symbols original data (28 bits), and 8 redundancy symbols (32 bits). The 8 redundancy symbols mean that we can correct up to 4 symbols in error. The generator polynomial is $g(x)=(x+\alpha)(x+\alpha^2) \ldots (x+\alpha^8)$.

In the first case, with 5 symbols of original data, the total amount of original data per tag is 160 bits (40 fixed, 120 variable). This is redundancy encoded to give a total amount of 480 bits (120 fixed, 360 variable) as follows:

- Each tag contains up to 40 bits of fixed original data. Therefore 2 codewords are required for the fixed data, giving a total encoded data size of 120 bits. Note that this fixed data only needs to be encoded once per page.
- Each tag contains up to 120 bits of variable original data. Therefore 6 codewords are required for the variable data, giving a total encoded data size of 360 bits.

In the second case, with 7 symbols of original data, the total amount of original data per tag is 168 bits (56 fixed, 112 variable). This is redundancy encoded to give a total amount of 360 bits (120 fixed, 240 variable) as follows:

Each tag contains up to 56 bits of fixed original data. Therefore 2 codewords are required for the fixed data, giving a total encoded data size of 120 bits. Note that this fixed data only needs to be encoded once per page.

Each tag contains up to 112 bits of variable original data. Therefore 4 codewords are required for the variable data, giving a total encoded data size of 240 bits.

The choice of data to redundancy ratio depends on the application.

26.5 Data Structures Used by Tag Encoder 26.5.1 Tag Format Structure

The Tag Format Structure (TFS) is the template used to render tags, optimized so that the tag can be rendered in real time. The TFS contains an entry for each dot position within the tag's bounding box. Each entry specifies whether the dot is part of the constant background pattern or part of the tag's data component (both fixed and variable).

The TFS is very similar to a bitmap in that it contains one entry for each dot position of the tag's bounding box. The TFS therefore has TagHeight×TagWidth entries, where TagHeight matches the height of the bounding box for the tag in the line dimension, and TagWidth matches the width of the bounding box for the tag in the dot dimension. A single line of TFS entries for a tag is known as a tag line structure.

Figure 184:
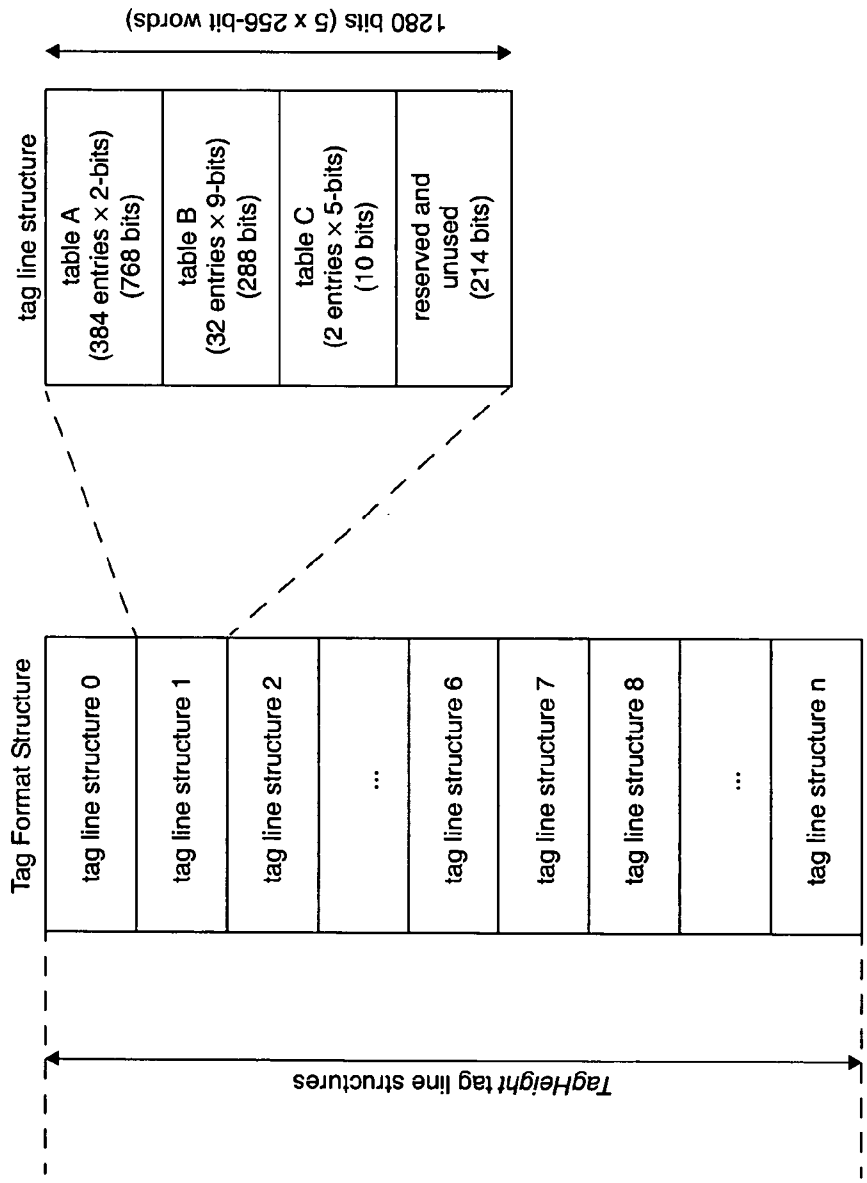
FIG. 184 shows composition of SoPEC's tag format structure

The TFS consists of TagHeight number of tag line structures, one for each 1600 dpi line in the tag's bounding box. Each tag line structure contains three contiguous tables, known as tables A, B, and C. Table A contains 384 2-bit entries, one entry for each of the maximum number of dots in a single line of a tag (see Table). The actual number of entries used should match the size of the bounding box for the tag in the dot dimension, but all 384 entries must be present. Table B contains 32 9-bit data addresses that refer to (in order of appearance) the data dots present in the particular line. All 32 entries must be present, even if fewer are used. Table C contains two 5-bit pointers into table B, and therefore comprises 10 bits. Padding of 214 bits is added. The total length of each tag line structure is therefore 5×256-bit DRAM words. Thus a TFS containing TagHeight tag line structures requires a TagHeight*160 bytes. The structure of a TFS is shown in FIG. 184.

A full description of the interpretation and usage of Tables A, B and C is given in section 26.8.3 on page 444.

26.5.1.1 Scaling a Tag

If the size of the printed dots is too small, then the tag can be scaled in one of several ways. Either the tag itself can be scaled by N dots in each dimension, which increases the number of entries in the TFS. As an alternative, the output from the TE can be scaled up by pixel replication via a scale factor greater than 1 in the both the TE and TFU.

For example, if the original TFS was 21×21 entries, and the scaling were a simple 2×2 dots for each of the original dots, we could increase the TFS to be 42×42. To generate the new TFS from the old, we would repeat each entry across each line of the TFS, and then we would repeat each line of the TFS. The net number of entries in the TFS would be increased fourfold (2×2).

Figure 185:
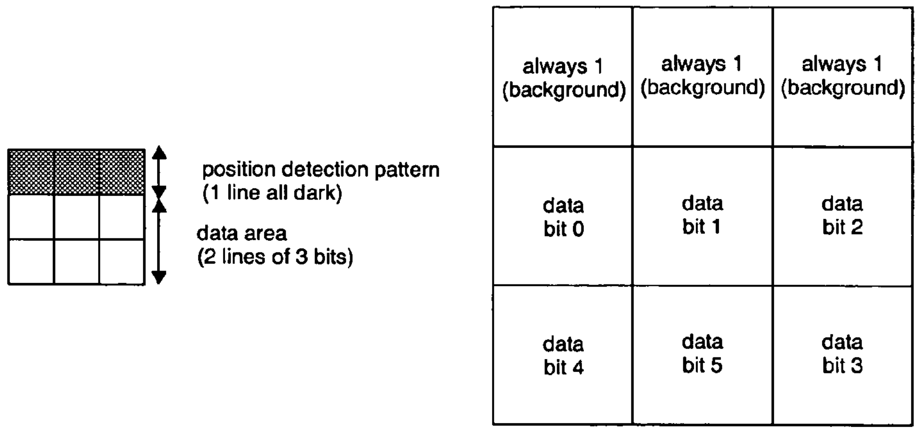
FIG. 185 shows a simple 3×3 tag structure
Figure 186:
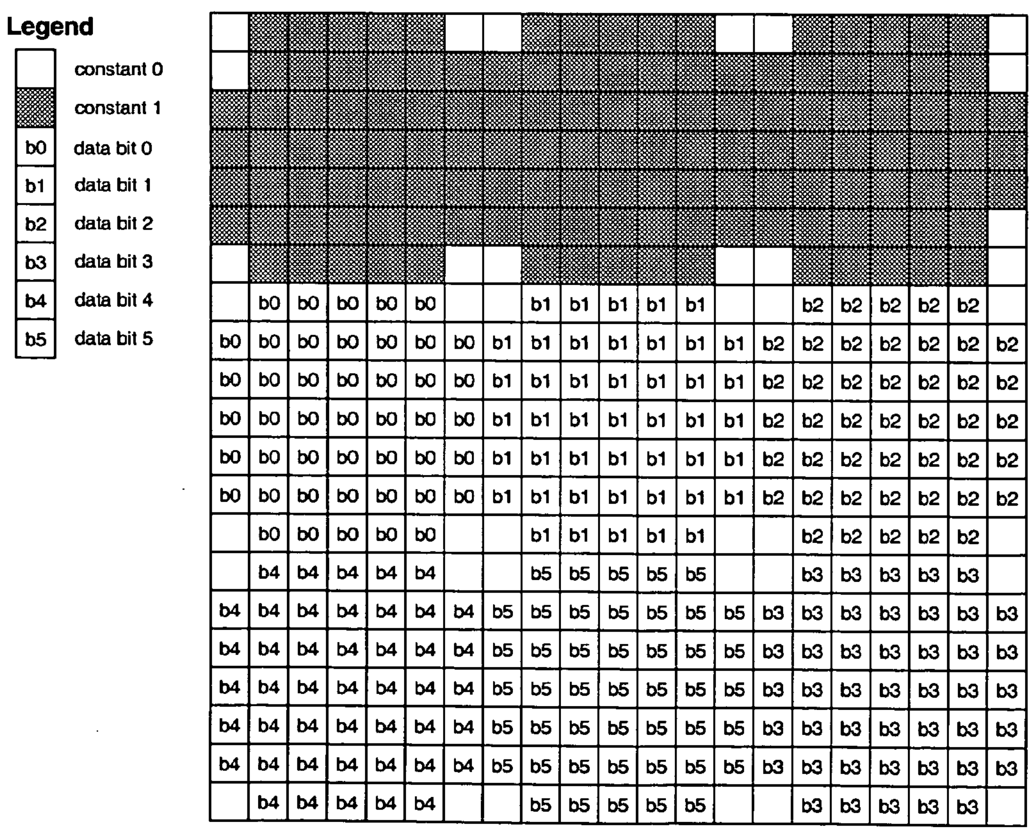
FIG. 186 shows 3×3 tag redesigned for 21×21 area (not simple replication)
Figure 187:
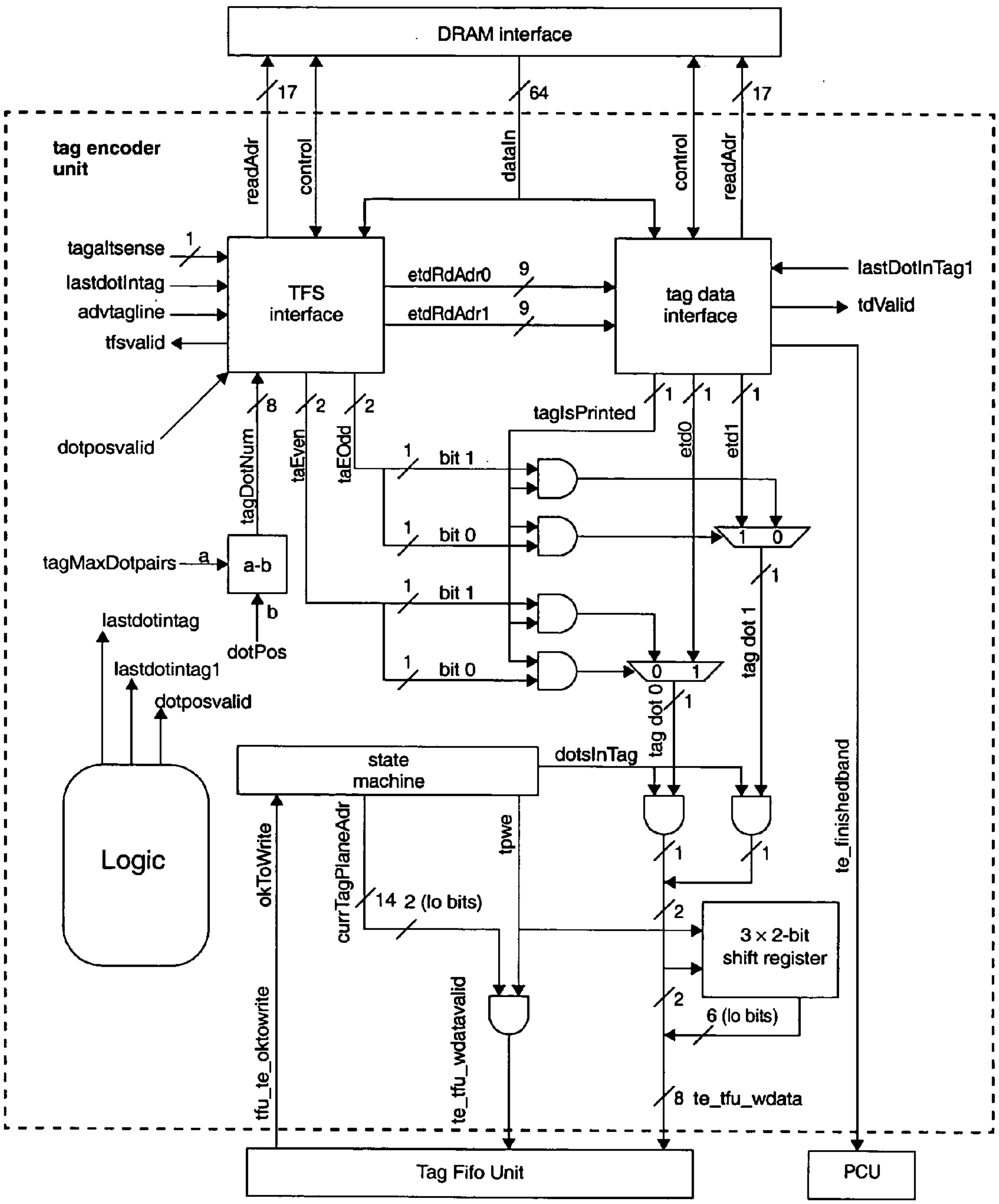
FIG. 187 shows a TE Block Diagram

The TFS allows the creation of macrodots instead of simple scaling. Looking at FIG. 185 for a simple example of a 3×3 dot tag, we may want to produce a physically large printed form of the tag, where each of the original dots was represented by 7×7 printed dots. If we simply performed replication by 7 in each dimension of the original TFS, either by increasing the size of the TFS by 7 in each dimension or putting a scale-up on the output of the tag generator output, then we would have 9 sets of 7×7 square blocks. Instead, we can replace each of the original dots in the TFS by a 7×7 dot definition of a rounded dot. FIG. 186 shows the results.

Consequently, the higher the resolution of the TFS the more printed dots can be printed for each macrodot, where a macrodot represents a single data bit of the tag. The more dots that are available to produce a macrodot, the more complex the pattern of the macrodot can be. As an example, Figure n page 461 on page Error! Bookmark not defined. shows the Netpage tag structure rendered such that the data bits are represented by an average of 8 dots×8 dots (at 1600 dpi), but the actual shape structure of a dot is not square. This allows the printed Netpage tag to be subsequently read at any orientation.

26.5.2 Raw Tag Data

The TE requires a band of unencoded variable tag data if variable data is to be included in the tag bit-plane. A band of unencoded variable tag data is a set of contiguous unencoded tag data records, in order of encounter top left of printed band from top left to lower right. An unencoded tag data record is 128 bits arranged as follows: bits 0–111 or 0–119 are the bits of raw tag data, bit 120 is a flag used by the TE (TagIsPrinted), and the remaining 7 bits are reserved (and should be 0). Having a record size of 128 bits simplifies the tag data access since the data of two tags fits into a 256-bit DRAM word. It also means that the flags can be stored apart from the tag data, thus keeping the raw tag data completely unrestricted. If there is an odd number of tags in line then the last DRAM read will contain a tag in the first 128 bits and padding in the final 128 bits.

The TagIsPrinted flag allows the effective specification of a tag resolution mask over the page. For each tag position the TagIsPrinted flag determines whether any of the tag is printed or not. This allows arbitrary placement of tags on the page. For example, tags may only be printed over particular active areas of a page. The TagIsPrinted flag allows only those tags to be printed. TagIsPrinted is a 1 bit flag with values as shown in Table 171.

TABLE 171

TagIsPrinted values

| Value | description |
|---|---|
| 0 | Don't print the tag in this tag position. Output 0 for each dot within the tag bounding box. |
| 1 | Print the tag as specified by the various tag structures. |

26.5.3 DRAM Storage Requirements

The total DRAM storage required by a single band of raw tag data depends on the number of tags present in that band. Each tag requires 128 bits. Consequently if there are N tags in the band, the size in DRAM is 16N bytes.

The maximum size of a line of tags is 163×128 bits. When maximally packed, a row of tags contains 163 tags (see Table) and extends over a minimum of 126 print lines. This equates to 282 KBytes over a Letter page.

The total DRAM storage required by a single TFS is TagHeight/7 KBytes (including padding). Since the likely maximum value for TagHeight is 384 (given that SoPEC restricts TagWidth to 384), the maximum size in DRAM for a TFS is 55 KBytes.

26.5.4 DRAM Access Requirements

The TE has two separate read interfaces to DRAM for raw tag data, TD, and tag format structure, TFS.

The memory usage requirements are shown in Table 172. Raw tag data is stored in the compressed page store

TABLE 172

Memory usage requirements

| Block | Size | Description |
|---|---|---|
| Compressed page store | 2048 Kbytes | Compressed data page store for Bi-level, contone and raw tag data. |
| Tag Format Structure | 55 Kbyte (384 dot line tags @ 1600 dpi) | 55 kB in PEC1 for 384 dot line tags (the benchmark) at 1600 dpi 2.5 mm tags (1/10th inch) @ 1600 dpi require 160 dot lines = 160/384 × 55 or 23 kB 2.5 mm tags @ 800 dpi require 80/384 × 55 = 12 kB |

The TD interface will read 256-bits from DRAM at a time. Each 256-bit read returns 2 times 128-bit tags. The TD interface to the DIU will be a 256-bit double buffer. If there is an odd number of tags in line then the last DRAM read will contain a tag in the first 128 bits and padding in the final 128 bits.

The TFS interface will also read 256-bits from DRAM at a time. The TFS required for a line is 136 bytes. A total of 5 times 256-bit DRAM reads is required to read the TFS for a line with 192 unused bits in the fifth 256-bit word. A 136-byte double-line buffer will be implemented to store the TFS data.

The TE's DIU bandwidth requirements are summarized in Table 173.

TABLE 173

DRAM bandwidth requirements

| Block Name | Direction | Maximum number of cycles between each 256-bit DRAM access | Peak Bandwidth (bits/cycle) | Average Bandwidth (bits/cycle) |
|---|---|---|---|---|
| TD | Read | Single 256 bit reads 1. | 1.02 | 1.02 |
| TFS | Read | Single 256 bit reads 2. TFS is 136 bytes. This means there is unused data in the fifth 256 bit read. A total of 5 reads is required. | 0.093 | 0.093 |

1: Each 2 mm tag lasts 126 dot cycles and requires 128 bits. This is a rate of 256 bits every 252 cycles.
2: 17 × 64 bit reads per line in PEC1 is 5 × 256 bit reads per line in SoPEC with unused bits in the last 256-bit read.

26.5.5 TD and TFS Bandstore Wrapping

TABLE 174

Bandstore Inputs from CDU

| Port Name | Pins | I/O | Description |
|---|---|---|---|
| cdu_endofbandstore[21:5] | 17 | In | Address of the end of the current band of data. 256-bit word aligned DRAM address. |
| cdu_startofbandstore[21:5] | 17 | In | Address of the start of the current band of data. 256-bit word aligned DRAM address. |

Both TD and TFS storage in DRAM can wrap around the bandstore area. The bounds of the band store are described by inputs from the CDU shown in Table 174. The TD and TFS DRAM interfaces therefore support bandstore wrapping. If the TD or TFS DRAM interface increments an address it is checked to see if it matches the end of bandstore address. If so, then the address is mapped to the start of the bandstore.

26.5.6 Tag Sizes

SoPEC allows for tags to be between 0 to 384 dots. A typical 2 mm tag requires 126 dots. Short tags do not change the internal bandwidth or throughput behaviours at all. Tag height is specified so as to allow the DRAM storage for raw tag data to be specified. Minimum tag width is a condition imposed by throughput limitations, so if the width is too small TE cannot consistently produce 2 dots per cycle across several tags (also there are raw tag data bandwidth implications). Thinner tags still work, they just take longer and/or need scaling.

26.6 Implementation 26.6.1 Tag Encoder Architecture

A block diagram of the TE can be seen below.

The TE writes lines of bi-level tag plane data to the TFU for later reading by the HCU. The TE is responsible for merging the encoded tag data with the tag structure (interpreted from the TFS). Y-integer scaling of tags is performed in the TE with X-integer scaling of the tags performed in the TFU. The encoded tag layer is generated 2 bits at a time and output to the TFU at this rate. The HCU however only consumes 1 bit per cycle from the TFU. The TE must provide support for 126 dot Tags (2 mm densely packed) with 108 Tags per line with 128 bits per tag.

The tag encoder consists of a TFS interface that loads and decodes TFS entries, a tag data interface that loads tag raw data, encodes it, and provides bit values on request, and a state machine to generate appropriate addressing and control signals. The TE has two separate read interfaces to DRAM for raw tag data, TD, and tag format structure, TFS.

It is possible that the raw tag data interface, the TD, to the DIU could be replaced by a hardware state machine at a later stage. This would allow flexibility in the generation of tags. Support for Y scaling needs to be added to the PEC1 TE. The PEC1 TE already allows stalling at its output during a line when tfu_te_oktowrite is deasserted.

26.6.2 Y-Scaling Output Lines

In order to support scaling in the Y direction the following modifications to the PEC1 TE are suggested to the Tag Data Interface, Tag Format Structure Interface and TE Top Level:

- for Tag Data Interface: program the configuration registers of Table, firstTagLineHeight and tagMaxLine with true value i.e. not multiplied up by the scale factor YScale. Within the Tag Data interface there are two counters, countx and county that have a direct bearing on the rawTagDataAddr generation. countx decrements as tags are read from DRAM. It is reset to NumTags [RtdTagSense] at start of each line of tags. county is decremented as each line of tags is completely read from DRAM i.e. countx=0. Scaling may be performed by counting the number of times countx reaches zero and only decrementing county when this number reaches YScale. This will cause the TagData Interface to read each line of tag data NumTags[RtdTagSense] *YScale times.

for Tag Format Structure Interface: The implication of Y-scaling for the TFS is that each Tag Line Structure is used YScale times. This may be accomplished in either of two ways:

For each Tag Line Structure read it once from DRAM and reuse YScale times. This involves gating the control of TFS buffer flipping with YScale. Because of the way in which this advTfsLine and advTagLine related functionality is coded in the PEC1 TFS this solution is judged to be error-prone.

Fetch each TagLineStructure YScale times. This solution involves controlling the activity of currTfsAddr with YScale.

In SoPEC the TFS must supply five addresses to the DIU to read each individual Tag Line Structure. The DIU returns 4*64-bit words for each of the 5 accesses. This is different from the behaviour in PEC1, where one address is given and 17 data-words were returned by the DIU.

Since the behaviour of the currTfsAddr must be changed to meet the requirements of the SoPEC DIU it makes sense to include the Y-Scaling into this change i.e. a count of the number of completed sets of 5 accesses to the DIU is compared to YScale. Only when this count equals YScale can currTfsAddr be loaded with the base address of the next lines Tag Line Structure in DRAM, otherwise it is re-loaded with the base address of the current lines Tag Line Structure in DRAM.

Figure 188:
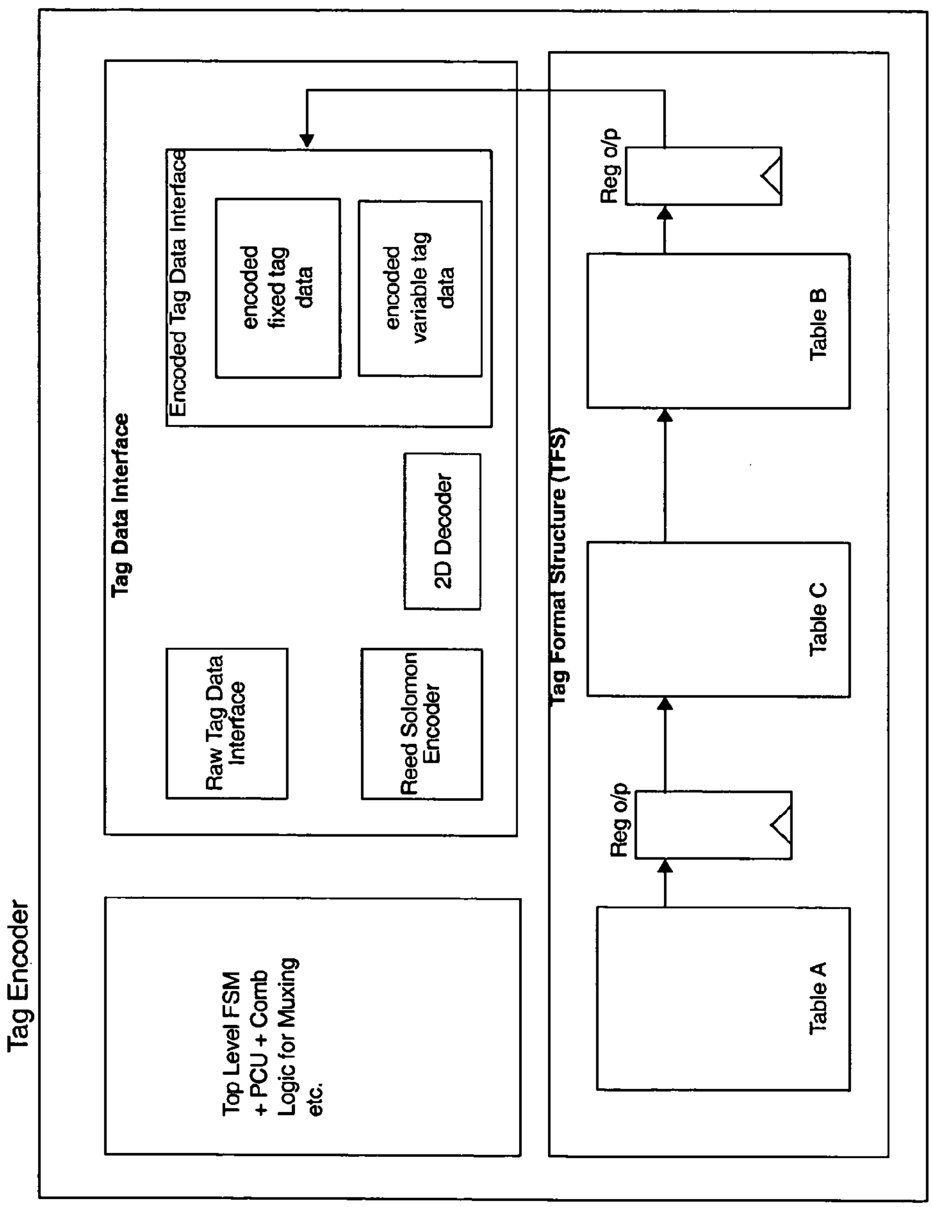
FIG. 188 shows a TE Hierarchy

For Top Level: The Top Level of the TE has a counter, LinePos, which is used to count the number of completed output lines when in a tag gap or in a line of tags. At the start (i.e. top-left hand dot-pair) of a gap or tag LinePos is loaded with either TagGapLine or TagMaxLine. The value of LinePos is decremented at last dot-pair in line. Y-Scaling may be accomplished by gating the decrement of LinePos based on YScale value 26.6.3 TE Physical Hierarchy FIG. 188 above illustrates the structural hierarchy of the TE. The top level contains the Tag Data Interface (TDI), Tag Format Structure (TFS), and an FSM to control the generation of dot pairs along with a clocked process to carry out the PCU read/write decoding. There is also some additional logic for muxing the output data and generating other control signals. At the highest level, the TE state machine processes the output lines of a page one line at a time, with the starting position either in an inter-tag gap or in a tag (a SoPEC may be only printing part of a tag due to multiple SoPECs printing a single line).

If the current position is within an inter-tag gap, an output of 0 is generated. If the current position is within a tag, the tag format structure is used to determine the value of the output dot, using the appropriate encoded data bit from the fixed or variable data buffers as necessary. The TE then advances along the line of dots, moving through tags and inter-tag gaps according to the tag placement parameters.

26.6.4 IO Definitions

TABLE 175

TE Port List

| Port Name | Pins | I/O | Description |
|---|---|---|---|
| Clocks and Resets | | | |
| Pclk | 1 | In | SoPEC Functional clock. |
| prst_n | 1 | In | Global reset signal. |
| Bandstore Signals | | | |
| cdu_endofbandstore[21:5] | 17 | In | Address of the end of the current band of data. 256-bit word aligned DRAM address. |
| cdu_startofbandstore[21:5] | 17 | In | Address of the start of the current band of data. 256-bit word aligned DRAM address. |
| te_finishedband | 1 | Out | TE finished band signal to PCU and ICU. |
| PCU Interface data and control signals | | | |
| pcu_addr[8:2] | 7 | In | PCU address bus. 7 bits are required to decode the address space for this block. |
| pcu_dataout[31:0] | 32 | In | Shared write data bus from the PCU. |
| te_pcu_datain[31:0] | 32 | Out | Read data bus from the TE to the PCU. |
| pcu_rwn | 1 | In | Common read/not-write signal from the PCU. |
| pcu_te_sel | 1 | In | Block select from the PCU. When pcu_te_sel is high both pcu_addr and pcu_dataout are valid. |
| te_pcu_rdy | 1 | Out | Ready signal to the PCU. When te_pcu_rdy is high it indicates the last cycle of the access. For a write cycle this means pcu_dataout has been registered by the block and for a read cycle this means the data on te_pcu_datain is valid. |
| TD (raw Tag Data) DIU Read Interface signals | | | |
| td_diu_rreq | 1 | Out | TD requests DRAM read. A read request must be accompanied by a valid read address. |
| td_diu_radr[21:5] | 17 | Out | TD read address to DIU. 17 bits wide (256-bit aligned word). |
| diu_td_rack | 1 | In | Acknowledge from DIU that TD read request has been accepted and new read address can be placed on te_diu_radr. |

TABLE 175-continued

TE Port List

| Port Name | Pins | I/O | Description |
|---|---|---|---|
| diu_data[63:0] | 64 | In | Data from DIU to TE.<br>First 64-bits are bits 63:0 of 256 bit word;<br>Second 64-bits are bits 127:64 of 256 bit word;<br>Third 64-bits are bits 191:128 of 256 bit word;<br>Fourth 64-bits are bits 255:192 of 256 bit word. |
| diu_td_rvalid | 1 | In | Signal from DIU telling TD that valid read data is on the diu_data bus. |
| TFS (Tag Format Structure) DIU Read Interface signals | | | |
| tfs_diu_rreq | 1 | Out | TFS requests DRAM read. A read request must be accompanied by a valid read address. |
| tfs_diu_radr[21:5] | 17 | Out | TFS Read address to DIU<br>17 bits wide (256-bit aligned word). |
| diu_tfs_rack | 1 | In | Acknowledge from DIU that TFS read request has been accepted and new read address can be placed on tfs_diu_radr. |
| diu_data[63:0] | 64 | In | Data from DIU to TE.<br>First 64-bits are bits 63:0 of 256 bit word;<br>Second 64-bits are bits 127:64 of 256 bit word;<br>Third 64-bits are bits 191:128 of 256 bit word;<br>Fourth 64-bits are bits 255:192 of 256 bit word. |
| diu_tfs_rvalid | 1 | In | Signal from DIU telling TFS that valid read data is on the diu_data bus. |
| TFU Interface data and control signals | | | |
| tfu_te_oktowrite | 1 | In | Ready signal indicating TFU has space available and is ready to be written to. Also asserted from the point that the TFU has recieved its expected number of bytes for a line until the next te_tfu_wradvline |
| te_tfu_wdata[7:0] | 8 | Out | Write data for TFU. |
| te_tfu_wdatavalid | 1 | Out | Write data valid signal. This signal remains high whenever there is valid output data on te_tfu_wdata |
| te_tfu_wradvline | 1 | Out | Advance line signal strobed when the last byte in a line is placed on te_tfu_wdata |

26.6.5 Configuration Registers

The configuration registers in the TE are programmed via the PCU interface. Refer to section 21.8.2 on page 321 for the description of the protocol and timing diagrams for reading and writing registers in the TE. Note that since addresses in SoPEC are byte aligned and the PCU only supports 32-bit register reads and writes the lower 2 bits of the PCU address bus are not required to decode the address space for the TE. Table 176 lists the configuration registers in the TE. Registers which address DRAM are 64-bit DRAM word aligned as this is the case for the PEC1 TE. SoPEC assumes a 256-bit DRAM word size. If the TE can be easily modified then the DRAM word addressing should be modified to 256-bit word aligned addressing. Otherwise, software should program these the 64-bit word aligned addresses on a 256-bit DRAM word boundary.

TABLE 176

TE Configuration Registers

| Address TE_base+ | register name | # bits | value on reset | description |
|---|---|---|---|---|
| Control registers | | | | |
| 0x00 | Reset | 1 | 1 | A write to this register causes a reset of the TE.<br>This register can be read to indicate the reset state:<br>0 - reset in progress<br>1 - reset not in progress |
| 0x04 | Go | 1 | 0 | Writing 1 to this register starts the TE. Writing 0 to this register halts the TE.<br>When Go is deasserted the state-machines go to their idle states but all counters and configuration registers keep their values. |

TABLE 176-continued

TE Configuration Registers

| Address TE_base+ | register name | # bits | value on reset | description |
|---|---|---|---|---|
| | | | | When Go is asserted all counters are reset, but configuration registers keep their values (i.e. they don't get reset). NextBandEnable is cleared when Go is asserted. The TFU must be started before the TE is started. This register can be read to determine if the TE is running (1 = running, 0 = stopped). |
| Setup registers (constant for processing of a page) | | | | |
| 0x40 | TfsStartAdr (64-bit aligned DRAM address - should start at a 256-bit aligned location) | 19 | 0 | Points to the first word of the first TFS line in DRAM. |
| 0x44 | TfsEndAdr (64-bit aligned DRAM address - should start at a 256-bit aligned location) | 19 | 0 | Points to the first word of the last TFS line in DRAM. |
| 0x48 | TfsFirstLineAdr (64-bit aligned DRAM address) | 19 | 0 | Points to the first word of the first TFS line to be encountered on the page. If the start of the page is in an inter-tag gap, then this value will be the same as TFSStartAdr since the first tag line reached will be the top line of a tag. |
| 0x4C | DataRedun | 1 | 0 | Defines the data to redundancy ratio for the Reed Solomon encoder. Symbol size is always 4 bits, Codeword size is always 15 symbols (60 bits).<br>0–5 data symbols (20 bits), 10 redundancy symbols (40 bits)<br>1–7 data symbols (28 bits), 8 redundancy symbols (32 bits) |
| 0x50 | Decode2DEn | 1 | 0 | Determines whether or not the data bits are to be 2D decoded rather than redundancy encoded (each 2 bits of the data bits becomes 4 output data bits).<br>0 = redundancy encode data<br>1 = decode each 2 bits of data into 4 bits |
| 0x54 | VariableDataPresent | 1 | 0 | Defines whether or not there is variable data in the tags. If there is none, no attempt is made to read tag data, and tag encoding should only reference fixed tag data. |
| 0x58 | EncodeFixed | 1 | 0 | Determines whether or not the lower 40 (or 56) bits of fixed data should be encoded into 120 bits or simply used as is. |
| 0x5C | TagMaxDotpairs | 8 | 0 | The width of a tag in dot-pairs, minus 1.<br>Minimum 0, Maximum = 191. |

TABLE 176-continued

TE Configuration Registers

| Address TE_base+ | register name | # bits | value on reset | description |
|---|---|---|---|---|
| 0x60 | TagMaxLine | 9 | 0 | The number of lines in a tag, minus 1. Minimum 0, Maximum = 383. |
| 0x64 | TagGapDot | 14 | 0 | The number of dot pairs between tags in the dot dimension minus 1. Only valid if TagGapPresent[bit 0] = 1. |
| 0x68 | TagGapLine | 14 | 0 | Defines the number of dotlines between tags in the line dimension minus 1. Only valid if TagGapPresent[bit1] = 1. |
| 0x6C | DotPairsPerLine | 14 | 0 | Number of output dot pairs to generate per tag line. |
| 0x70 | DotStartTagSense | 2 | 0 | Determines for the first/even (bit 0) and second/odd (bit 1) rows of tags whether or not the first dot position of the line is in a tag. 1 = in a tag, 0 = in an inter-tag gap. |
| 0x74 | TagGapPresent | 2 | 0 | Bit 0 is 1 if there is an inter-tag gap in the dot dimension, and 0 if tags are tightly packed. Bit 1 is 1 if there is an inter-tag gap in the line dimension, and 0 if tags are tightly packed. |
| 0x78 | YScale | 8 | 1 | Tag scale factor in Y direction. Output lines to the TFU will be generated YScale times. |
| 0x80 to 0x84 | DotStartPos | 2 × 14 | 0 | Determines for the first/even (0) and second/odd (1) rows of tags the number of dotpairs remaining minus 1, in either the tag or inter-tag gap at the start of the line. |
| 0x88 to 0x8C | NumTags | 2 × 8 | 0 | Determines for the first/even and second/odd rows of tags how many tags are present in a line (equals number of tags minus 1). |
| Setup band related registers | | | | |
| 0xC0 | NextBandStartTagDataAdr (64-bit aligned DRAM address - should start at a 256-bit aligned location) | | | Holds the value of StartTagDataAdr for the next band. This value is copied to StartTagDataAdr when DoneBand is 1 and NextBandEnable is 1, or when Go transitions from 0 to 1. |
| 0xC4 | NextBandEndOfTagData (64-bit aligned DRAM address) | | | Holds the value of EndOfTagData for the next band. This value is copied to EndOfTagData when DoneBand is 1 and NextBandEnable is 1, or when Go transitions from 0 to 1. |
| 0xC8 | NextBandFirstTagLineHeight | 9 | 0 | Holds the value of FirstTagLineHeight for the next band. This value is copied to FirstTagLineHeight when DoneBand gets is 1 and NextBandEnable is 1, or when Go transitions from 0 to 1. |

TABLE 176-continued

TE Configuration Registers

| Address TE_base+ | register name | # bits | value on reset | description |
|---|---|---|---|---|
| 0xCC | NextBandEnable | | | When NextBandEnable is 1 and DoneBand is 1, then when te_finishedband is set at the end of a band: NextBandStartTagDataAdr is copied to StartTagDataAdr NextBandEndOfTagData is copied to EndOfTagData NextBandFirstTagLineHeight is copied to FirstTagLineHeight DoneBand is cleared NextBandEnable is cleared. NextBandEnable is cleared when Go is asserted. |
| Read-only band related registers | | | | |
| 0xD0 | DoneBand | 1 | 0 | Specifies whether the tag data interface has finished loading all the tag data for the band. It is cleared to 0 when Go transitions from 0 to 1. When the tag data interface has finished loading all the tag data for the band, the te_finishedband signal is given out and the DoneBand flag is set. If NextBandEnable is 1 at this time then startTagDataAdr, endOfTagData and firstTaglineHeight are updated with the values for the next band and DoneBand is cleared. Processing of the next band starts immediately. If NextBandEnable is 0 then the remainder of the TE will continue to run,, while the read control unit waits for NextBandEnable to be set before it restarts. Read only. |
| 0xD4 | StartTagDataAdr (64-bit aligned DRAM address - should start at a 256-bit aligned location) | 19 | 0 | The start address of the current row of raw tag data. This is initially points to the first word of the band's tag data, which should be aligned to a 128-bit boundary (i.e. the lower bit of this address should be 0). Read only. |
| 0xD8 | EndOfTagData (64-bit aligned DRAM address) | 19 | 0 | Points to the address of the final tag for the band. When all the tag data up to and including address endOfTagData has been read in, the te_finishedband signal is given and the doneBand flag is set. Read only. |
| 0xDC | FirstTagLineHeight | 9 | 0 | The number of lines minus 1 in the first tag encountered in this band. This will be equal to TagMaxLine if the band starts at a tag boundary. Read only. |
| Work registers (set before starting the TE and must not be touched between bands) | | | | |
| 0x100 | LineInTag | 1 | 0 | Determines whether or not |

TABLE 176-continued

TE Configuration Registers

| Address TE_base+ | register name | # bits | value on reset | description |
|---|---|---|---|---|
| | | | | the first line of the page is in a line of tags or in an inter-tag gap. 1 - in a tag, 0 - in an inter-tag gap. |
| 0x104 | LinePos | 14 | 0 | The number of lines remaining minus 1, in either the tag or the inter-tag gap in at the start of the page. |
| 0x110 to 0x11C | TagData | 4 × 32 | 0 | This 128 bit register must be set up initially with the fixed data record for the page. This is either the lower 40 (or 56) bits (and the encodeFixed register should be set), or the lower 120 bits (and encodedFixed should be clear). The tagData[0] register contains the lower 32 bits and the tagData[3] register contains the upper 32 bits. This register is used throughout the tag encoding process to hold the next tag's variable data. |
| Work registers (set internally) Read-only from the point of view of PCU register access | | | | |
| 0x140 | DotPos | 14 | 0 | Defines the number of dotpairs remaining in either the tag or inter-tag gap. Does not need to be setup. |
| 0x144 | CurrTagPlaneAdr | 14 | 0 | The dot-pair number being generated. |
| 0x148 | DotsInTag | 1 | 0 | Determines whether the current dot pair is in a tag or not 1 - in a tag, 0 - in an inter-tag gap. |
| 0x14C | TagAltSense | 1 | 0 | Determines whether the production of output dots is for the first (and subsequent even) or second (and subsequent odd) row of tags. |
| 0x154 | CurrTFSAdr (64-bit aligned DRAM address) | 19 | 0 | Points to the start next line of the TFS to be read in. |
| 0x158 | ReadsRemaining | 4 | 0 | Number of reads remaining in the current burst from the raw tag data interface |
| 0x15C | CountX | 8 | 0 | The number of tags remaining to be read (minus 1) by the raw tag data interface for the current line. |
| 0x160 | CountY | 9 | 0 | The number of times (minus 1) the tag data for the current line of tags needs to be read in by the raw tag data interface. |
| 0x164 | RtdTagSense | 1 | 0 | Determines whether the raw tag data interface is currently reading even rows of tags (=0) or odd rows of tags (=1) with respect to the start of the page. Note that this can be different from tagAltSense since the raw tag data interface is reading ahead of the production of dots. |

TABLE 176-continued

TE Configuration Registers

| Address TE_base+ | register name | # bits | value on reset | description |
|---|---|---|---|---|
| 0x168 | RawTagDataAdr (64-bit aligned DRAM address) | 19 | 0 | The current read address within the unencoded raw tag data. |

Figure 189:
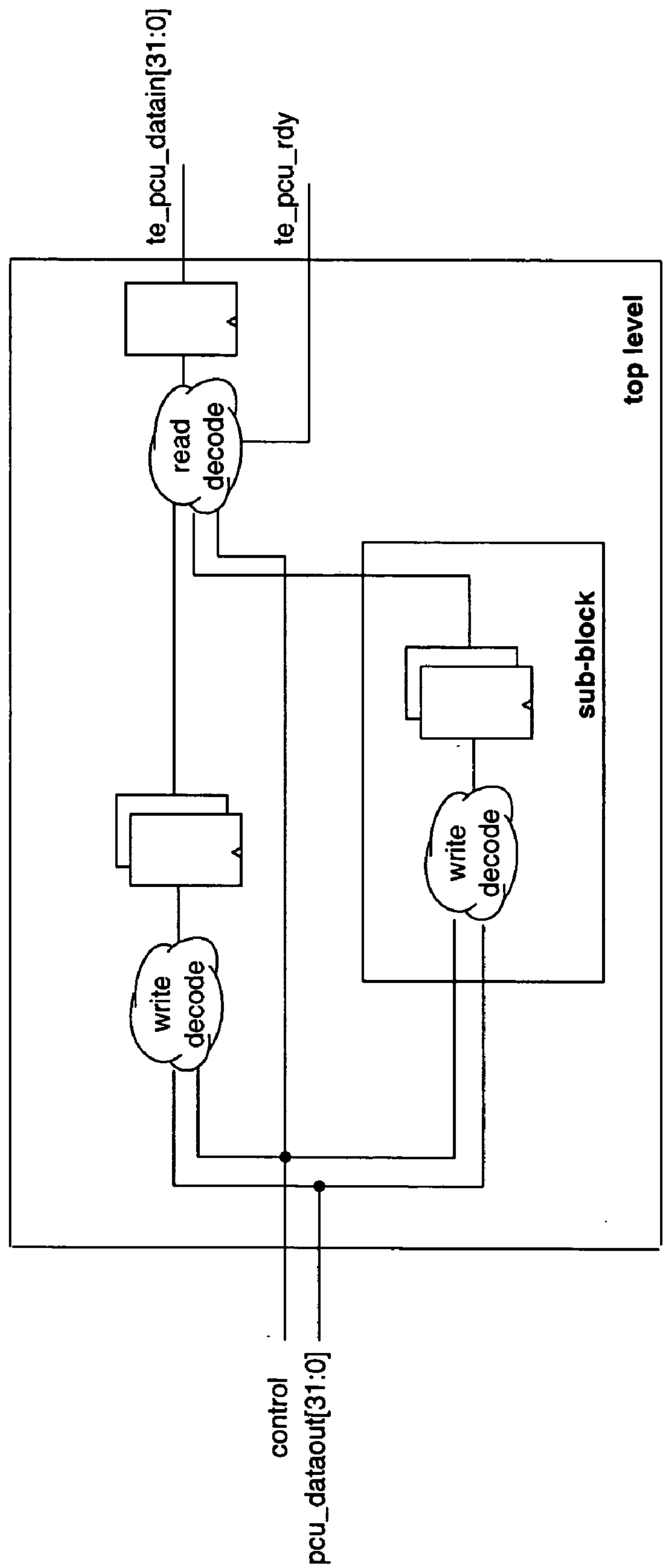
FIG. 189 shows a block diagram of PCU accesses
Figure 190:
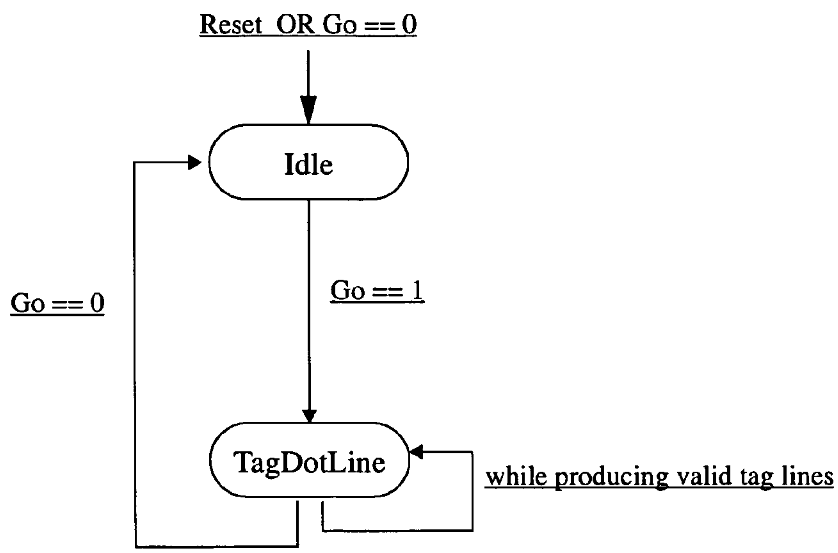
FIG. 190 shows a tag encoder top-level FSM

The PCU accessible registers are divided amongst the TE top level and the TE sub-blocks. This is achieved by including write decoders in the sub-blocks as well as the top level, see FIG. 189. In order to perform reads the sub-block registers are fed to the top level where the read decode is carried out on all the PCU accessible TE registers.

26.6.5.1 Starting the TE and Restarting the TE Between Bands

The TE must be started after the TFU.

For the first band of data, users set up NextBandStartTagDataAdr, NextBandEndTagData and NextBandFirstTagLineHeight as well as other TE configuration registers. Users then set the TE's Go bit to start processing of the band. When the tag data for the band has finished being decoded, the te_finishedband interrupt will be sent to the PCU and ICU indicating that the memory associated with the first band is now free. Processing can now start on the next band of tag data.

In order to process the next band NextBandStartTagDataAdr, NextBandEndTagData and NextBandFirstTagLineHeight need to be updated before writing a 1 to NextBandEnable. There are 4 mechanisms for restarting the TE between bands:

a. te_finishedband causes an interrupt to the CPU. The TE will have set its DoneBand bit. The CPU reprograms the NextBandStartTagDataAdr, NextBandEndTagData and NextBandFirstTagLineHeight registers, and sets NextBandEnable to restart the TE.
b. The CPU programs the TE's NextBandStartTagDataAdr, NextBandEndTagData and NextBandFirstTagLineHeight registers and sets the NextBandEnable flag before the end of the current band. At the end of the current band the TE sets DoneBand. As NextBandEnable is already 1, the TE starts processing the next band immediately.
c. The PCU is programmed so that te_finishedband triggers the PCU to execute commands from DRAM to reprogram the NextBandStaifTagDataAdr, NextBandEndTagData and NextBandFirstTagLineHeight registers and set the NextBandEnable bit to start the TE processing the next band. The advantage of this scheme is that the CPU could process band headers in advance and store the band commands in DRAM ready for execution.
d. This is a combination of b and c above. The PCU (rather than the CPU in b) programs the TE's NextBandStartTagDataAdr, NextBandEndTagData and NextBandFirstTagLineHeight registers and sets the NextBandEnable bit before the end of the current band. At the end of the current band the TE sets DoneBand and pulses te_finishedband. As NextBandEnable is already 1, the TE starts processing the next band immediately. Simultaneously, te_finishedband triggers the PCU to fetch commands from DRAM. The TE will have restarted by the time the PCU has fetched commands from DRAM. The PCU commands program the TE next band shadow registers and sets the NextBandEnable bit.

After the first tag on the page, all bands have their first tag start at the top i.e. NextBandFirstTagLineHeight=TagMaxLine. Therefore the same value of NextBandFirstTagLineHeight will normally be used for all bands. Certainly, NextBandFirstTagLineHeight should not need to change after the second time it is programmed.

26.6.6 TE Top Level FSM

The following diagram illustrates the states in the FSM.

At the highest level, the TE state machine steps through the output lines of a page one line at a time, with the starting position either in an inter-tag gap (signal dotsintag=0) or in a tag (signals tfsvalid and tdvalid and lineintag=1) (a SoPEC may be only printing part of a tag due to multiple SoPECs printing a single line).

If the current position is within an inter-tag gap, an output of 0 is generated. If the current position is within a tag, the tag format structure is used to determine the value of the output dot, using the appropriate encoded data bit from the fixed or variable data buffers as necessary. The TE then advances along the line of dots, moving through tags and inter-tag gaps according to the tag placement parameters.

Table 177 highlights the signals used within the FSM.

TABLE 177

Signals used within TE top level FSM

| Signal Name | Function |
|---|---|
| pclk | Sync clock used to register all data within the FSM |
| prst_n, te_reset | Reset signals |
| advtagline | 1 cycles pulse indicating to TDI and TFS sub-blocks to move onto the next line of Tag data |
| currdotlineadr[13:0] | Address counter starting 2 pclk ahead of currtagplaneadr to generate the correct dotpair for the current line |
| dotpos | Counter to identify how many dotpairs wide the tag/gap is |
| dotsintag | Signal identifying whether the dotpair are in a tag(1)/gap(0) |
| lineintag_temp | Identical to lineintag but generated 1 pclk earlier |
| linepos_shadow | Shadow register for linepos due to linepos being written to by 2 different processes |
| talaltsense | Flag which alternates between tag/gap lines |
| te_state | FSM state variable |
| teplanebuf | 6-bit shift register used to format dotpairs into a byte for the TFU |
| wradvline | Advance line signal strobed when the last byte in a line is placed on te_tfu_wdata |

Due to the 2 system clock delay in the TFS (both Table A and Table B outputs are registered) the TE FSM is working 2 system clock cycles AHEAD of the logic generating the write data for the TFU. As a result the following control signals had to be single/double registered on the system clock.

The tag_dot_line state can be broken down into 3 different stages.

Stage1:—The state tag_dot_line is entered due to the go signal becoming active. This state controls the writing of dotbytes to the TFU. As long as the tag line buffer address is not equal to the dotpairsperline register value and tfu_te_oktowrite is active, and there is valid TFS and TD available or taggaps, dotpairs are buffered into bytes and written to the TFU. The tag line buffer address is used internally but not supplied to the TFU since the TFU is a FIFO rather than the line store used in PEC1.

While generating the dotline of a tag/gap line (lineintag flag=1) the dot position counter dotpos is decremented/reloaded (with tagmaxdotpairs or taggapdot) as the TE moves between tags/gaps. The dotsintag flag is toggled between tags/gaps (0 for a gap, 1 for a tag). This pattern continues until the end of a dotline approaches (currdotlineadr==dotpairsperline). 2 system clock cycles before the end of the dotline the lineintag and tagaltsense signals must be prepared for the next dotline be it in a tag/gap dotline or a purely gap dotline.

Stage2:—At this point the end of a dot line is reached so it is time to decrement the linepos counter if still in a tag/gap row or reload the linepos register, dotpos counter and reprogram the dotsintag flag if going onto another tag/gap or pure gap row. Any signal with the_temp extension means this register is updated a cycle early in order for the real register to get its correct value while switching between dot lines and tag rows when dotpos and linepos counters reach zero i.e when dotpos=0 the end of a tag/gap has been reached, when linepos=0 the end of a tag row is reached. This stage uses the signals lineintag temp and tagaltsense which were generated one system clock cycle earlier in Stage 1.

Stage3:—This stage implements the writing of dotpairs to the correct part of the 6-bit shift register based on the LSBs of currtagplaneadr and also implements the counter for the currtagplaneadr. The currtagplaneadr is reset on reaching currtagplaneadr=(dotpairsperline−1). All the qualifier signals e.g dotsintag for this stage are delayed by 2 system clock cycles i.e. the currtagplaneadr (which is the internal write address not needed by the TFU) cannot be incremented until the dotpairs are available which is always 2 system clock cycles later than when currdotlineadr is incremented.

The wradvline and advtagline pulses are generated using the same logic (currently separated in the PEC1 Tag Encoder VHDL for clarity). Both of these pulses used to update further registers hence the reason they do not use the delayed by 2 system clock cycle qualifiers.

26.6.7 Combinational Logic

The TDI is responsible for providing the information data for a tag while the TFSI is responsible for deciding whether a particular dot on the tag should be printed as background pattern or tag information. Every dot within a tag's boundary is either an information dot or part of the background pattern. The resulting lines of dots are stored in the TFU.

The TFSI reads one Tag Line Structure (TLS) from the DIU for every dot line of tags. Depending on the current printing position within the tag (indicated by the signal tagdotnum), the TFS interface outputs dot information for two dots and if necessary the corresponding read addresses for encoded tag data. The read address are supplied to the TDI which outputs the corresponding data values.

Figure 192:
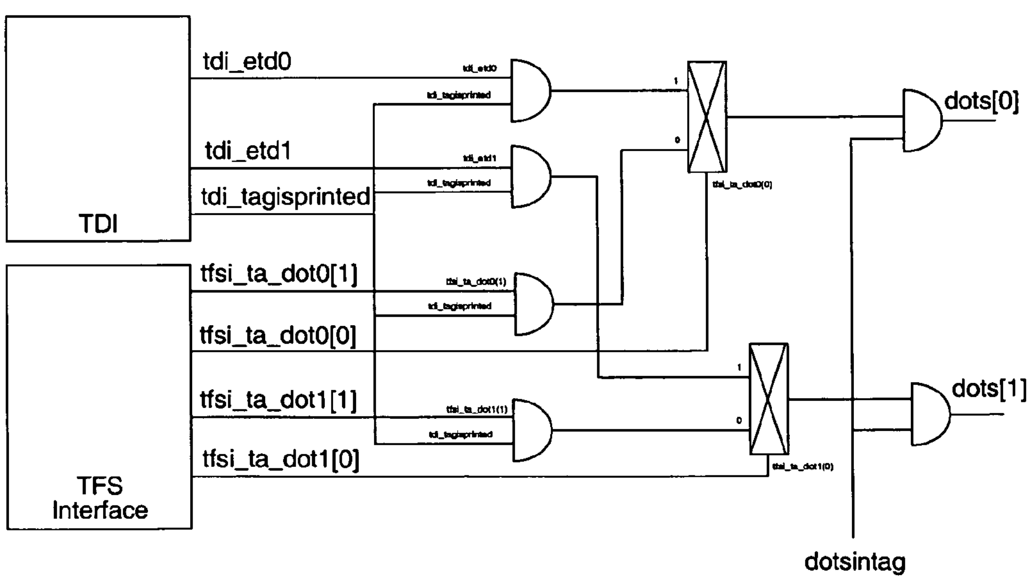
FIG. 192 shows logic to combine dot information and encoded data
Figure 191:
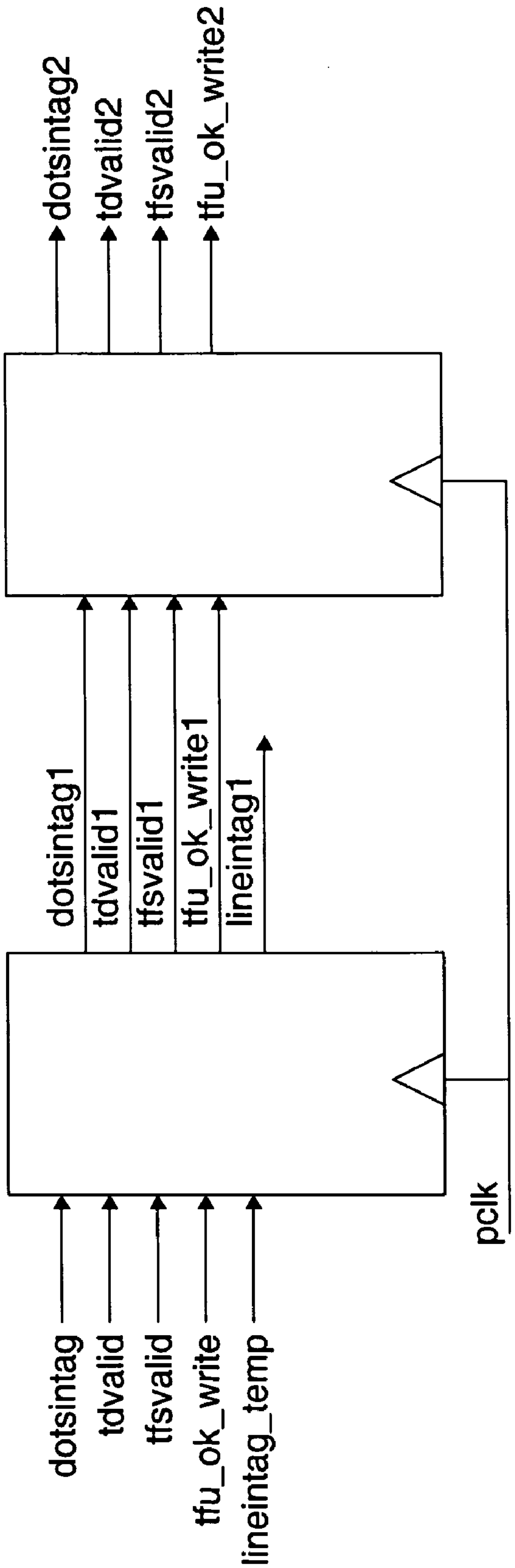
FIG. 191 shows generated control signals
Figure 193:
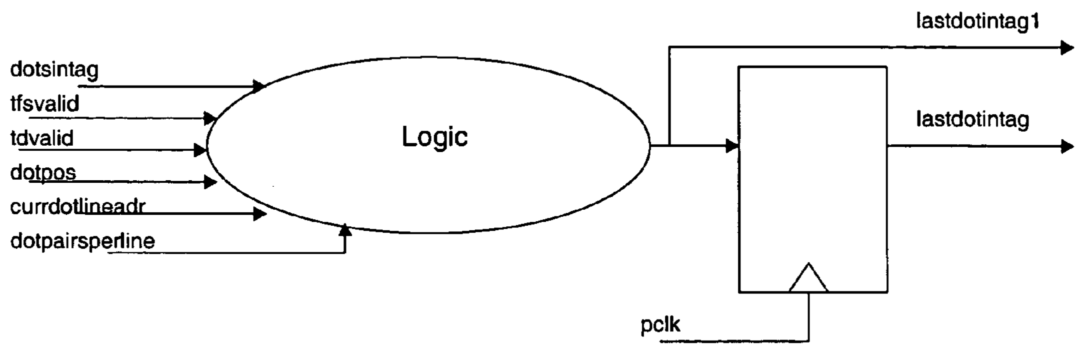
FIG. 193 shows generation of Lastdotintag/1
Figure 194:
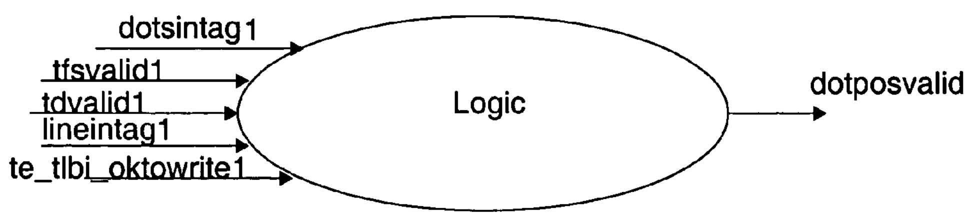
FIG. 194 shows generation of Dot Position Valid
Figure 195:
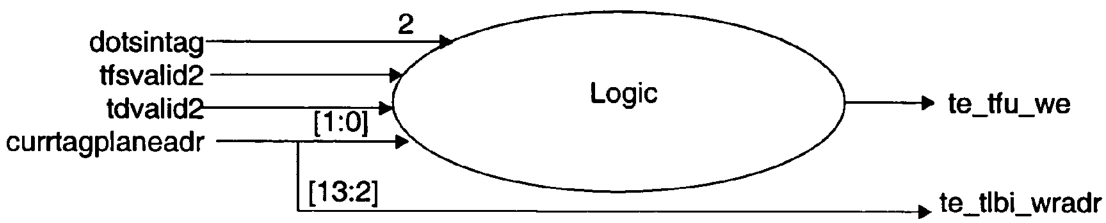
FIG. 195 shows generation of write enable to the TFU
Figure 196:
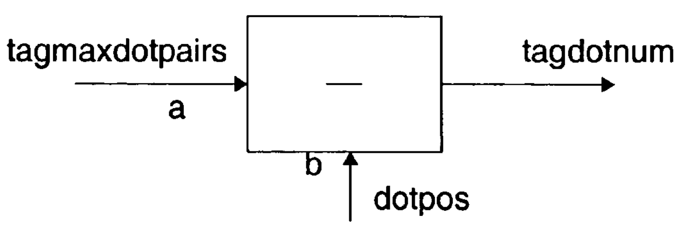
FIG. 196 shows generation of Tag Dot Number
Figure 197:
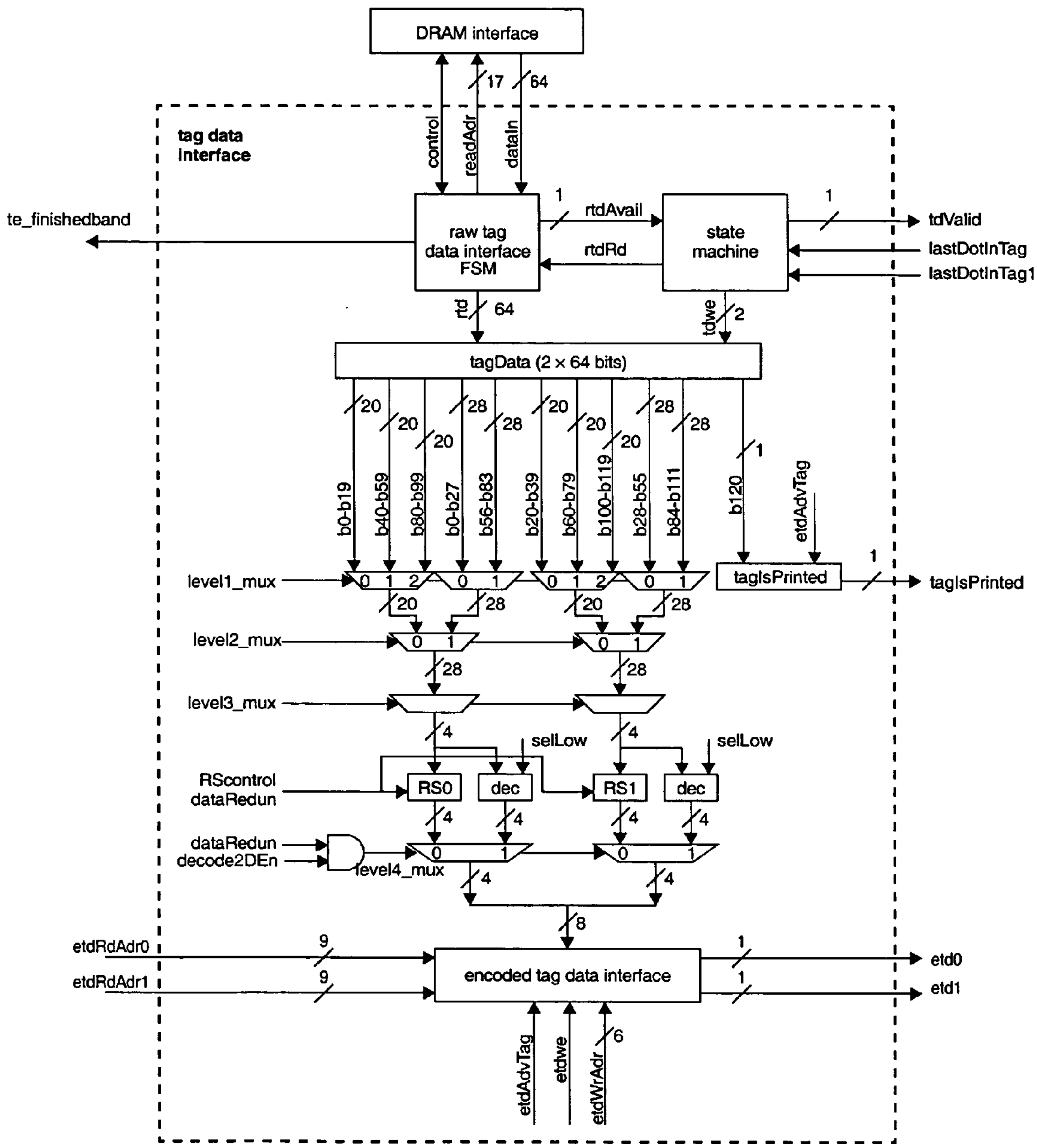
FIG. 197 shows TDI Architecture

These data values (tdi_etd0 and tdi_etd1) are then combined with the dot information (tfsi_ta_dot0 and tfsi_ta_dot1) to produce the dot values that will actually be printed on the page (dots), see FIG. 192.

The signal lastdotintag is generated by checking that the dots are in a tag (dotsintag=1) and that the dotposition counter dotpos is equal to zero. It is also used by the TFS to load the index address register with zeros at the end of a tag as this is always the starting index when going from one tag to the next. lastdotintag is gated with advtagline in the TFSi (Table C) where adv_tfs_line pulse is used to update the Table C address reg for the new tag line—this is because lastdotintag occurs a cycle earlier than adv_tfs_line which would result in the wrong Table C value for the last dotpair. lastdotintag is also used in the TDi FSM (etd_switch state) to pulse the etd_advtag signal hence switching buffers in the ETDi for the next tag.

The signal lastdotintag1 is identical to lastdotintag except it is combinatorially generated (1 cycle earlier than lastdotintag, except at the end of a tagline). lastdotintag1 signal is only used in the TDi to reset the tdvalid signal on the cycle when dotpos=0. Note the UNSIGNED(currdotlineadr)=UNSIGNED(dotpairsperline)−1 not UNSIGNED(currdotlineadr)=UNSIGNED(dotpairsperline)−2 as in the lastdotintag_gen process as this is an combinatorial process.

The dotposvalid signal is created based on being in a tag line (lineintag1=1), dots being in a tag (dotsintag1=1), having a valid tag format structure available (tfsvalid1=1) and having encoded tag data available (tdvalid1=1). Note that each of the qualifier signals are delayed by 1 pclk cycle due to the registering of Table A output data into Table C where dotposvalid is used. The dotposvalid signal is used as an enable to load the Table C address register with the next index into Table B which in turn provides the 2 addresses to make 2 dots available.

The signal te_tfu_wdatavalid can only be active if in a taggap or if valid tag data is available (tdvalid2 and tfsvalid2) and the currtagpplaneadr(1:0) equal 11 i.e. a byte of data has been generated by combining four dotpairs.

The signal tagdotnum tells the TFS how many dotpairs remain in a tag/gap. It is calculated by subtracting the value in the dotpos counter from the value programmed in the tagmaxdotpairs register.

26.7 Tag Data Interface (TDI)

26.7.1 I/O Specification

TABLE 178

TDI Port List

| signal name | I/O | Description |
|---|---|---|
| Clocks and Resets | | |
| pclk | In | SoPEC system clock |
| prst_n | In | Active-low, synchronous reset in pclk domain. |
| DIU Read Interface Signals | | |
| diu_data[63:0] | In | Data from DRAM. |
| td_diu_rreq | Out | Data request to DRAM. |
| td_diu_radr[21:5] | Out | Read address to DRAM. |

TABLE 178-continued

TDI Port List

| signal name | I/O | Description |
|---|---|---|
| diu_td_rack | In | Data acknowledge from DRAM. |
| diu_td_rvalid | In | Data valid signal from DRAM. |
| PCU Interface Data, Control Signals and | | |
| pcu_dataout[31:0] | In | PCU writes this data. |
| pcu_addr[8:2] | In | PCU accesses this address. |
| pcu_rwn | In | Global read/write-not signal from PCU. |
| pcu_te_sel | In | PCU selects TE for r/w access. |
| pcu_te_reset | In | PCU reset. |
| td_te_doneband | Out | PCU readable registers. |
| td_te_dataredun | | |
| td_te_decode2den | | |
| td_te_variabledatapresent | | |
| td_te_encodefixed | | |
| td_te_numtags0 | | |
| td_te_numtags1 | | |
| td_te_starttagdataadr | | |
| td_te_rawtagdataadr | | |
| td_te_endoftagdata | | |
| td_te_firsttaglineheight | | |
| td_te_tagdata0 | | |
| td_te_tagdata1 | | |
| td_te_tagdata2 | | |
| td_te_tagdata3 | | |
| td_te_countx | | |
| td_te_county | | |
| td_te_rtdtagsense | | |
| td_te_readsremaining | | |
| TFS (Tag Format Structure) | | |
| tfsi_adr0[8:0] | In | Read address for dot0 |
| tfsi_adr1[8:0] | In | Read address for dot1 |
| Bandstore Signals | | |
| cdu_startofbandstore[24:0] | In | Start memory area allocated for page bands |
| cdu_endofbandstore[24:0] | In | Last address of the memory allocated for page bands |
| te_finishedband | Out | Tag encoder band finished |

26.7.2 Introduction

The tag data interface is responsible for obtaining the raw tag data and encoding it as required by the tag encoder. The smallest typical tag placement is 2 mm×2 mm, which means a tag is at least 126 1600 dpi dots wide.

In PEC1, in order to keep up with the HCU which processes 2 dots per cycle, the tag data interface has been designed to be capable of encoding a tag in 63 cycles. This is actually accomplished in approximately 52 cycles within PEC1. For SoPEC the TE need only produce one dot per cycle; it should be able to produce tags in no more than twice the time taken by the PEC1 TE. Moreover, any change in implementation from two dots to one dot per cycle should not lose the 63/52 cycle performance edge attained in the PEC1 TE.

As shown in FIG. 198, the tag data interface contains a raw tag data interface FSM that fetches tag data from DRAM, two symbol-at-a-time GF($2^4$) Reed-Solomon encoders, an encoded data interface and a state machine for controlling the encoding process. It also contains a tagData register that needs to be set up to hold the fixed tag data for the page.

The type of encoding used depends on the registers TE_encodefixed, TE_dataredun and TE_decode2den the options being, (15,5) RS coding, where every 5 input symbols are used to produce 15 output symbols, so the output is 3 times the size of the input. This can be performed on fixed and variable tag data.

(15,7) RS coding, where every 7 input symbols are used to produce 15 output symbols, so for the same number of input symbols, the output is not as large as the (15,5) code (for more details see section 26.7.6 on page 435). This can be performed on fixed and variable tag data.

2D decoding, where each 2 input bits are used to produce 4 output bits. This can be performed on fixed and variable tag data.

no coding, where the data is simply passed into the Encoded Data Interface. This can be performed on fixed data only.

Each tag is made up of fixed tag data (i.e. this data is the same for each tag on the page) and variable tag data (i.e. different for each tag on the page).

Fixed tag data is either stored in DRAM as 120-bits when it is already coded (or no coding is required), 40-bits when (15,5) coding is required or 56-bits when (15,7) coding is required. Once the fixed tag data is coded it is 120-bits long. It is then stored in the Encoded Tag Data Interface. The variable tag data is stored in the DRAM in uncoded form. When (15,5) coding is required, the 120-bits stored in DRAM are encoded into 360-bits. When (15,7) coding is required, the 112-bits stored in DRAM are encoded into 240-bits. When 2D decoding is required the 120-bits stored in DRAM are converted into 240-bits. In each case the encoded bits are stored in the Encoded Tag Data Interface.

The encoded fixed and variable tag data are eventually used to print the tag.

The fixed tag data is loaded in once from the DRAM at the start of a page. It is encoded as necessary and is then stored in one of the 8×15-bits registers/RAMs in the Encoded Tag Data Interface. This data remains unchanged in the registers/RAMs until the next page is ready to be processed.

The 120-bits of unencoded variable tag data for each tag is stored in four 32-bit words. The TE re-reads the variable tag data, for a particular tag from DRAM, every time it produces that tag. The variable tag data FIFO which reads from DRAM has enough space to store 4 tags.

26.7.2.1 Bandstore Wrapping

Both TD and TFS storage in DRAM can wrap around the bandstore area. The bounds of the band store are described by inputs from the CDU shown in Table. The TD and TFS DRAM interfaces therefore support bandstore wrapping. If the TD or TFS DRAM interface increments an address it is checked to see if it matches the end of bandstore address. If so, then the address is mapped to the start of the bandstore.

26.7.3 Data Flow

An overview of the dataflow through the TDI can be seen in FIG. 198 below.

The TD interface consists of the following main sections:

the Raw Tag Data Interface—fetches tag data from DRAM;

the tag data register;

2 Reed Solomon encoders—each encodes one 4-bit symbol at a time;

the Encoded Tag Data Interface—supplies encoded tag data for output;

Two 2D decoders.

The main performance specification for PEC1 is that the TE must be able to output data at a continuous rate of 2 dots per cycle.

26.7.4 Raw Tag Data Interface

The raw tag data interface (RTDI) provides a simple means of accessing raw tag data in DRAM. The RTDI passes tag data into a FIFO where it can be subsequently read as required. The 64-bit output from the FIFO can be read directly, with the value of the wr_rd_counter being used to set/reset as the enable signal (rtdAvail). The FIFO is clocked out with receipt of an rtdRd signal from the TS FSM.

Figure 199:
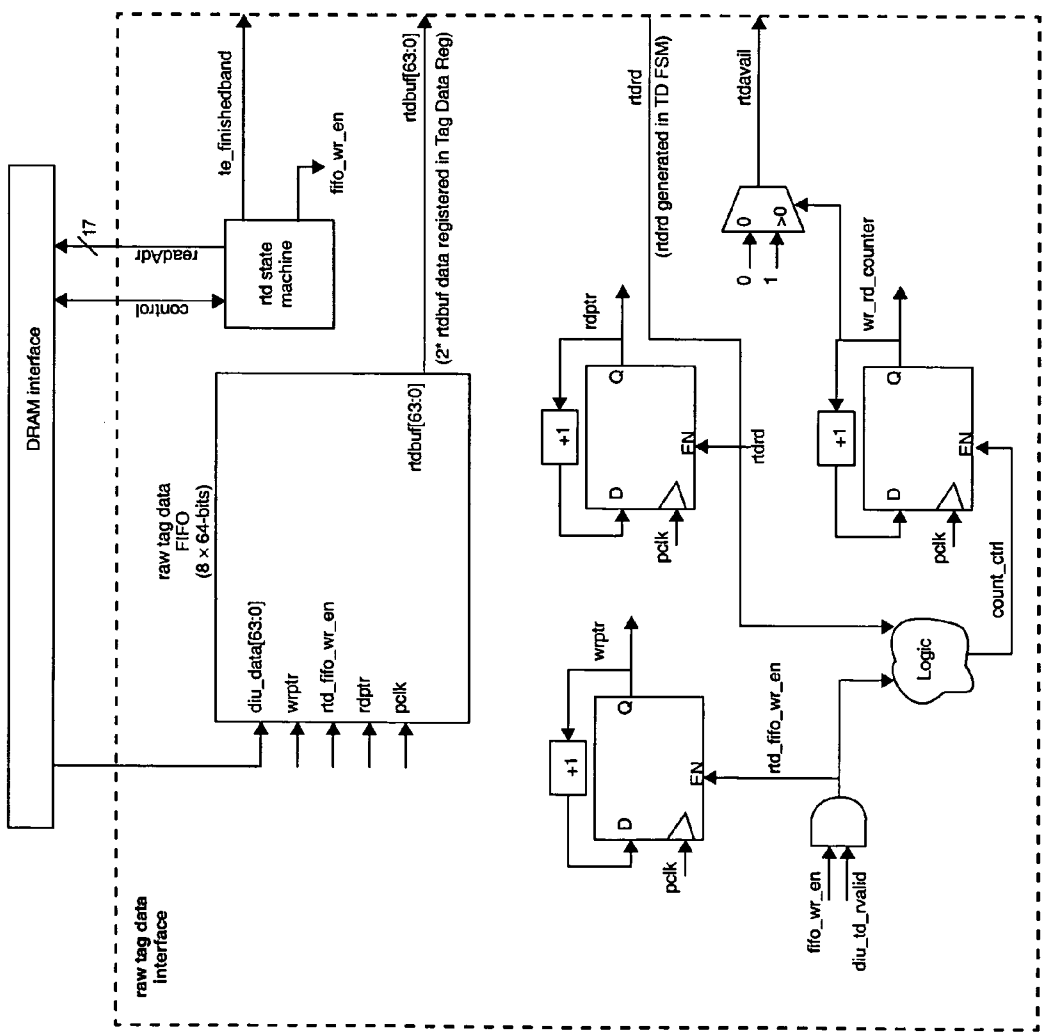
FIG. 199 shows raw tag data interface block diagram

FIG. 199 shows a block diagram of the raw tag data interface.

26.7.4.1 RTDI FSM

The RTDI state machine is responsible for keeping the raw tag FIFO full. The state machine reads the line of tag data once for each printline that uses the tag. This means a given line of tag data will be read TagHeight times. Typically this will be 126 times or more, based on an approximately 2 mm tag. Note that the first line of tag data may be read fewer times since the start of the page may be within a tag. In addition odd and even rows of tags may contain different numbers of tags. Section 26.6.5.1 outlines how to start the TE and restart it between bands. Users must set the NextBandStartTagDataAdr, NextBandEndOfTagData, NextBandFirstTagLineHeight and numTags[0], numTags[1] registers before starting the TE by asserting Go.

To restart the tag encoder for second and subsequent bands of a page, the NextBandStartTagDataAdr, NextBandEndOfTagData and NextBandFirstTagLineHeight registers need to be updated (typically numTags[0] and numTags[1] will be the same if the previous band contains an even number of tag rows) and NextBandEnable set. See Section 26.6.5.1 for a full description of the four ways of reprogramming the TE between bands.

The tag data is read once for every printline containing tags. When maximally packed, a row of tags contains 163 tags (see Table n page465 on page 408).

Figure 200:
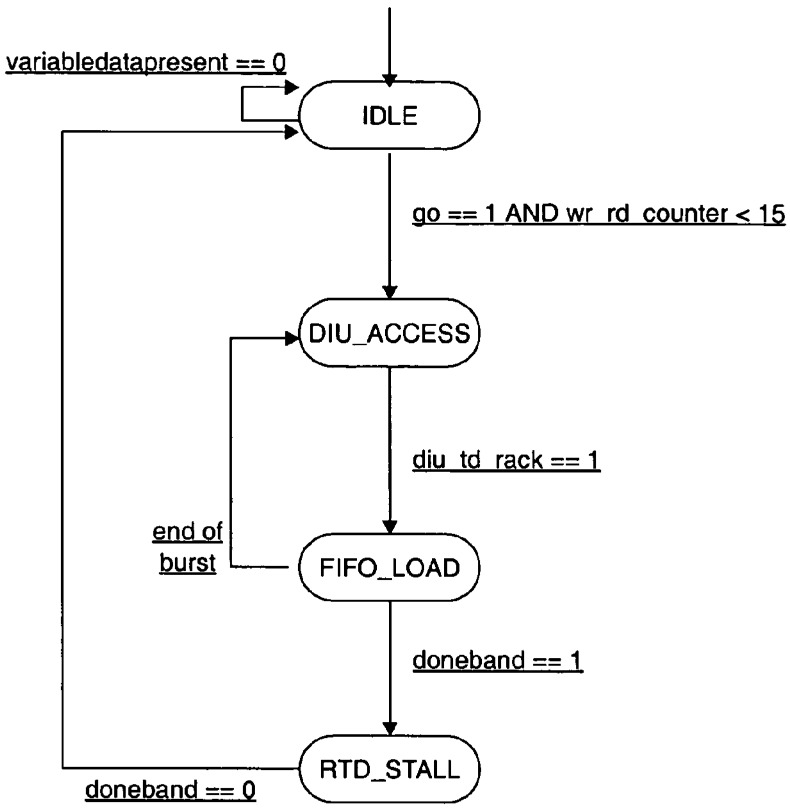
FIG. 200 shows an RTDI State Flow Diagram
Figure 201:
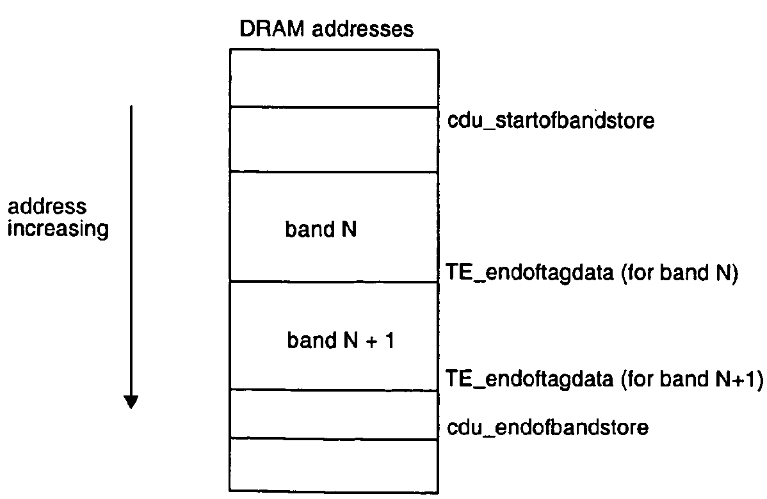
FIG. 201 shows a relationship between TE_endoftagdata, cdu_startofbandstore and cdu_endofbandstore

The RTDI State Flow diagram is shown in FIG. 200. An explanation of the states follows:

- idle state:—Stay in the idle state if there is no variable data present. If there is variable data present and there are at least 4 spaces left in the FIFO then request a burst of 2 tags from the DRAM (1*256 bits). Counter countx is assigned the number of tags in a even/odd line which depends on the value of register rtdtagsense. Downcounter county is assigned the number of dot lines high a tag will be (min 126). Initially it must be set the firsttaglineheight value as the TE may be between pages (i.e. a partial tag). For normal tag generation county will take the value of tagmaxline register.
- diu_access:—The diu_access state will generate a request to the DRAM if there are at least 4 spaces in the FIFO. This is indicated by the counter wr_rd_counter which is incremented/decremented on writes/reads of the FIFO. As long as wr_rd_counter is less than 4 (FIFO is 8 high) there must be 4 locations free. A control signal called td_diu_radrvalid is generated for the duration of the DRAM burst access. Addresses are sent in bursts of 1. The counter burst_count controls this signal, (will involve modification to existing TE code.) If there is an odd number of tags in line then the last DRAM read will contain a tag in the first 128 bits and padding in the final 128 bits.
- fifo_load:—This state controls the addressing to the DRAM. Counters countx and county are used to monitor whether the TE is processing a line of dots within a row of tags. When countx is zero it means all tag dots for this row are complete. When county is zero it means the TE is on the last line of dots (prior to Y scaling) for this row of tags. When a row of tags is complete the sense of rtdtagsense is inverted (odd/even). The rawtagdataadr is compared to the te_endoftagdata address. If rawtagdataadr=endoftagdata the doneband signal is set, the finishedband signal is pulsed, and the FSM enters the rtd_stall state until the doneband signal is reset to zero by the PCU by which time the rawtagdata, endoftagedata and firsttaglineheight registers are setup with new values to restart the TE. This state is used to count the 64-bit reads from the DIU. Each time diu_td_rvalid is high rtd_data_count is incremented by 1. The compare of rtd_data_count=rtd_num is necessary to find out when either all 4*64-bit data has been received or n*64-bit data (depending on a match of rawtagdataadr=endoftagdata in the middle of a set of 4*64-bit values being returned by the DIU.
- rtd_stall:—This state waits for the the doneband signal to be reset (see page 426 for a description of how this occurs). Once reset the FSM returns to the idle state. This states also performs the same count on the diu_data read as above in the case where diu_td_rvalid has not gone high by the time the addressing is complete and the end of band data has been reached i.e. rawtagdataadr=endoftagdata 26.7.5 TDI State Machine The tag data state machine has two processing phases. The first processing phase is to encode the fixed tag data stored in the 128-bit (2×64-bit) tag data register. The second is to encode tag data as it is required by the tag encoder.

When the Tag Encoder is started up, the fixed tag data is already preloaded in the 128 bit tag data record. If encodeFixed is set, then the 2 codewords stored in the lower bits of the tag data record need to be encoded: 40 bits if dataRedun=0, and 56 bits if dataRedun=1. If encodeFixed is clear, then the lower 120 bits of the tag data record must be passed to the encoded tag data interface without being encoded.

When encodeFixed is set, the symbols derived from codeword 0 are written to codeword 6 and the symbols derived from codeword 1 are written to codeword 7. The data symbols are stored first and then the remaining redundancy symbols are stored afterwards, for a total of 15 symbols. Thus, when dataRedun=0, the 5 symbols derived from bits 0–19 are written to symbols 0–4, and the redundancy symbols are written to symbols 5–14. When dataRedun=1, the 7 symbols derived from bits 0–27 are written to symbols 0–6, and the redundancy symbols are written to symbols 7–14.

When encodeFixed is clear, the 120 bits of fixed data is copied directly to codewords 6 and 7.

Figure 202:
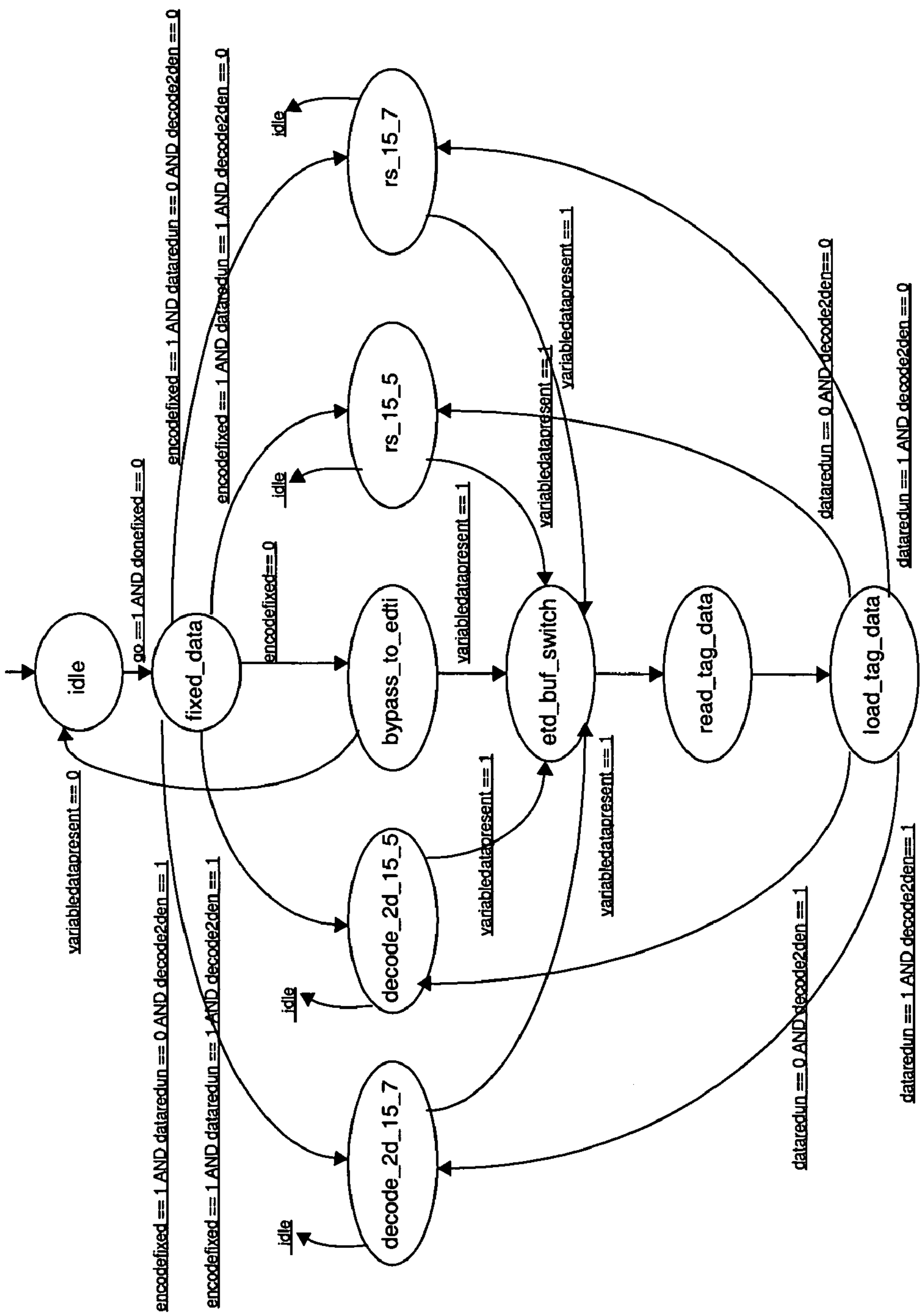
FIG. 202 shows a TDi State Flow Diagram
Figure 203:
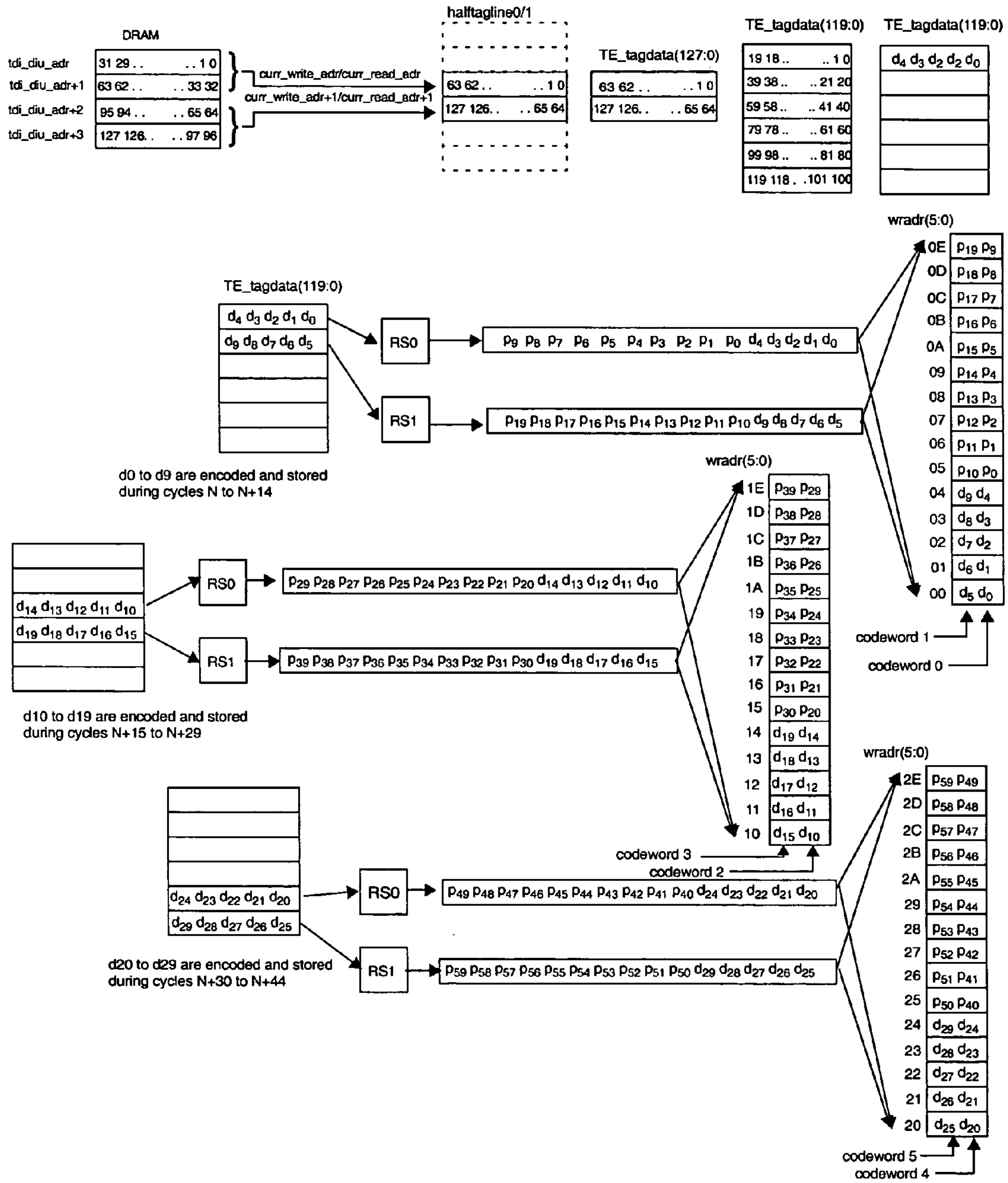
FIG. 203 shows mapping of the tag data to codewords 0–7
Figure 204:
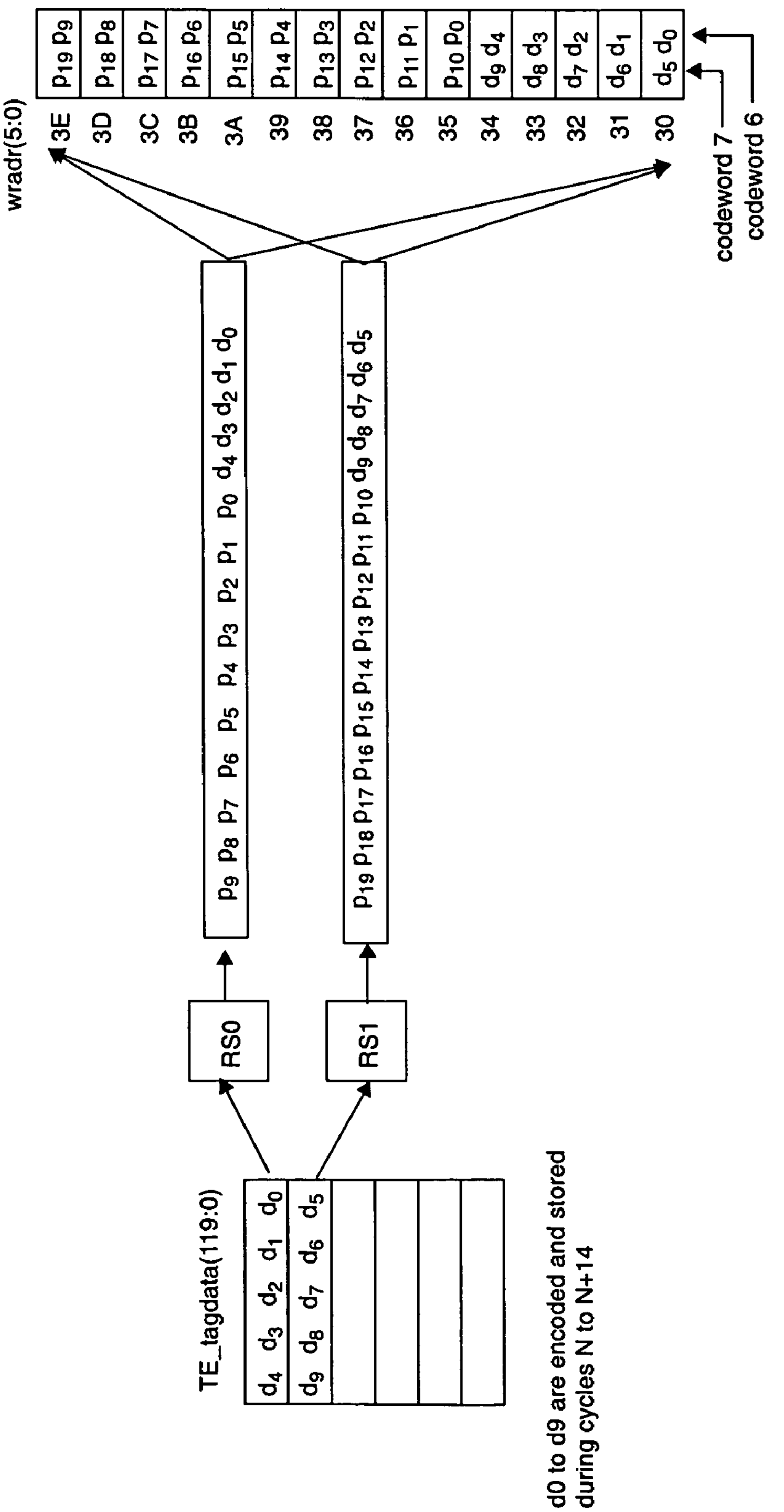
FIG. 204 shows coding and mapping of uncoded fixed tag data for (15,5) RS encoder
Figure 205:
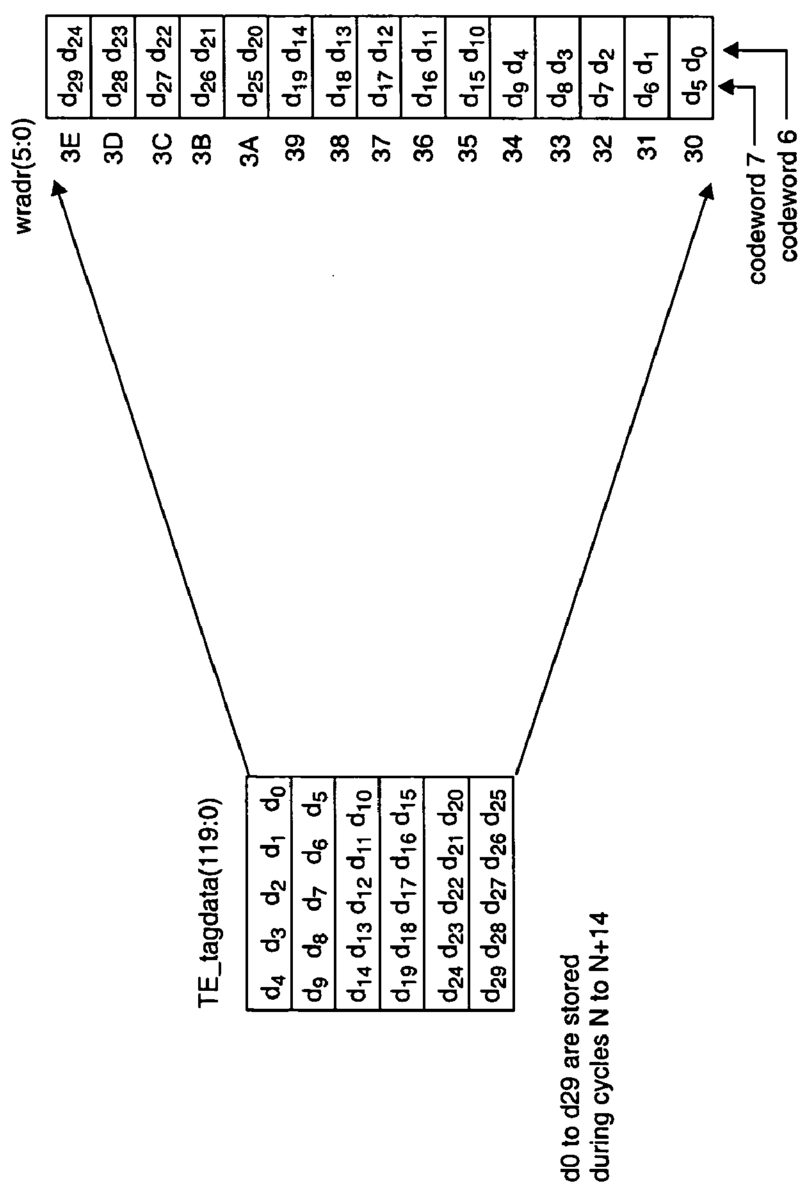
FIG. 205 shows mapping of pre-coded fixed tag data
Figure 206:
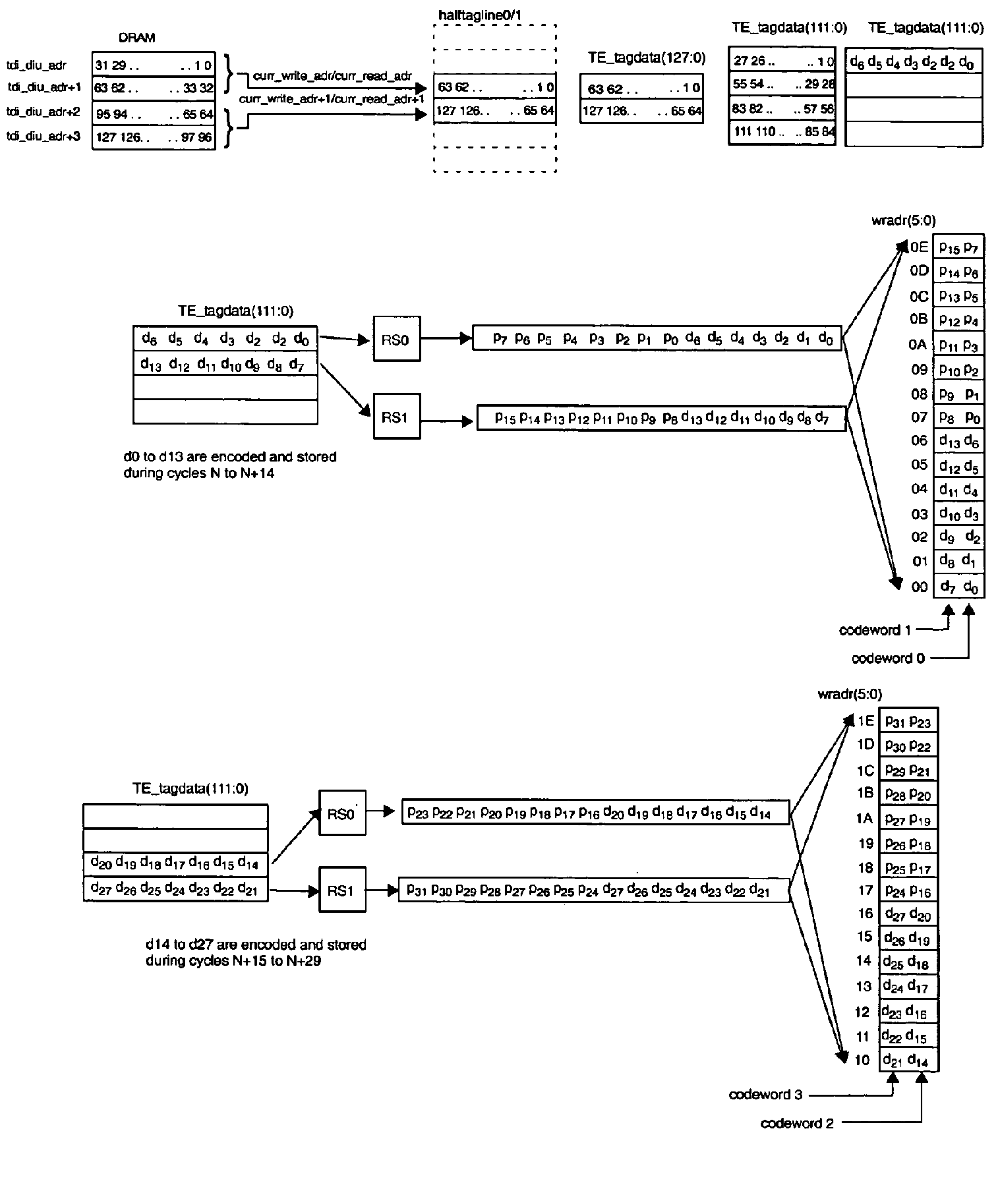
FIG. 206 shows coding and mapping of variable tag data for (15,7) RS encoder
Figure 207:
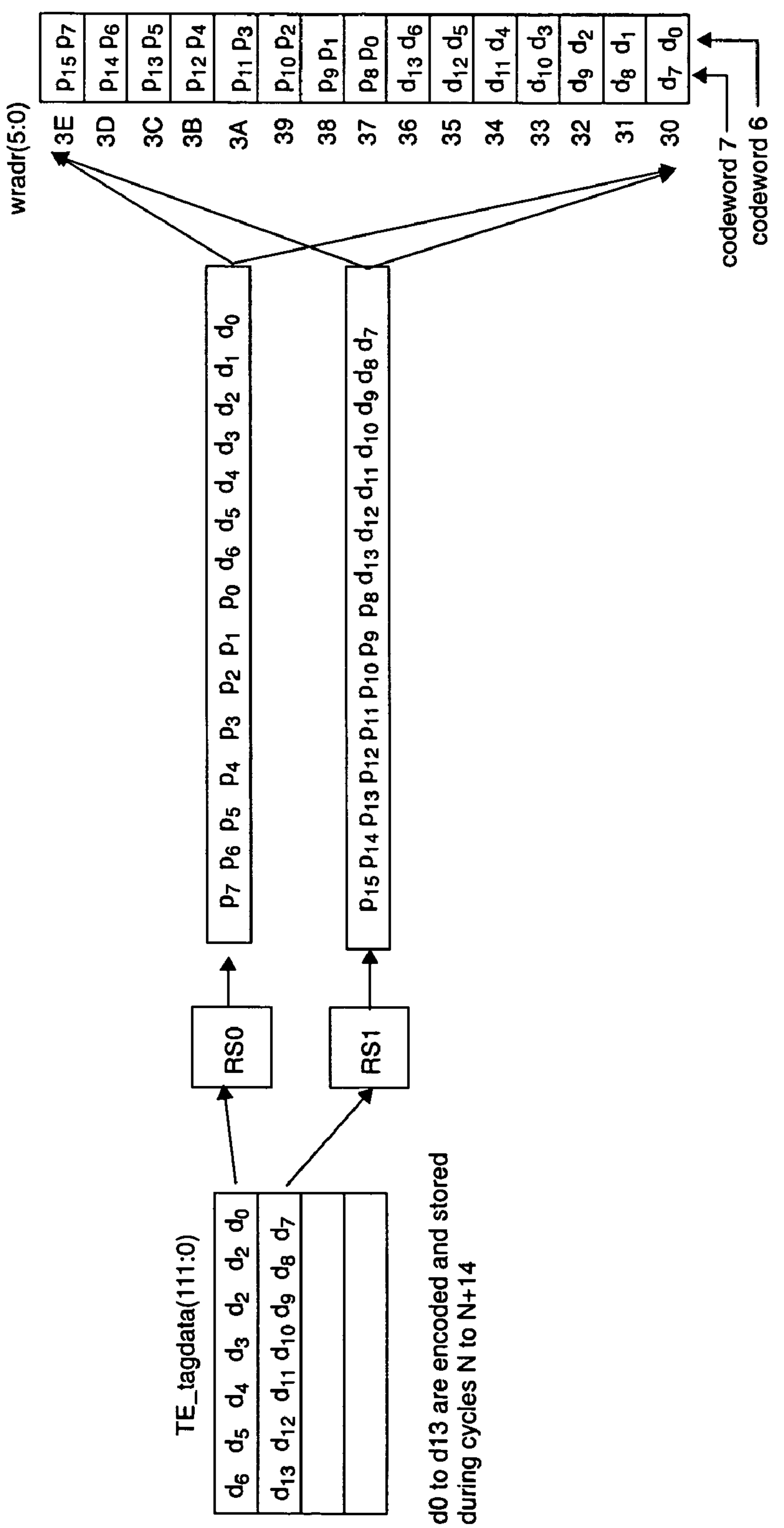
FIG. 207 shows coding and mapping of uncoded fixed tag data for (15,7) RS encoder
Figure 208:
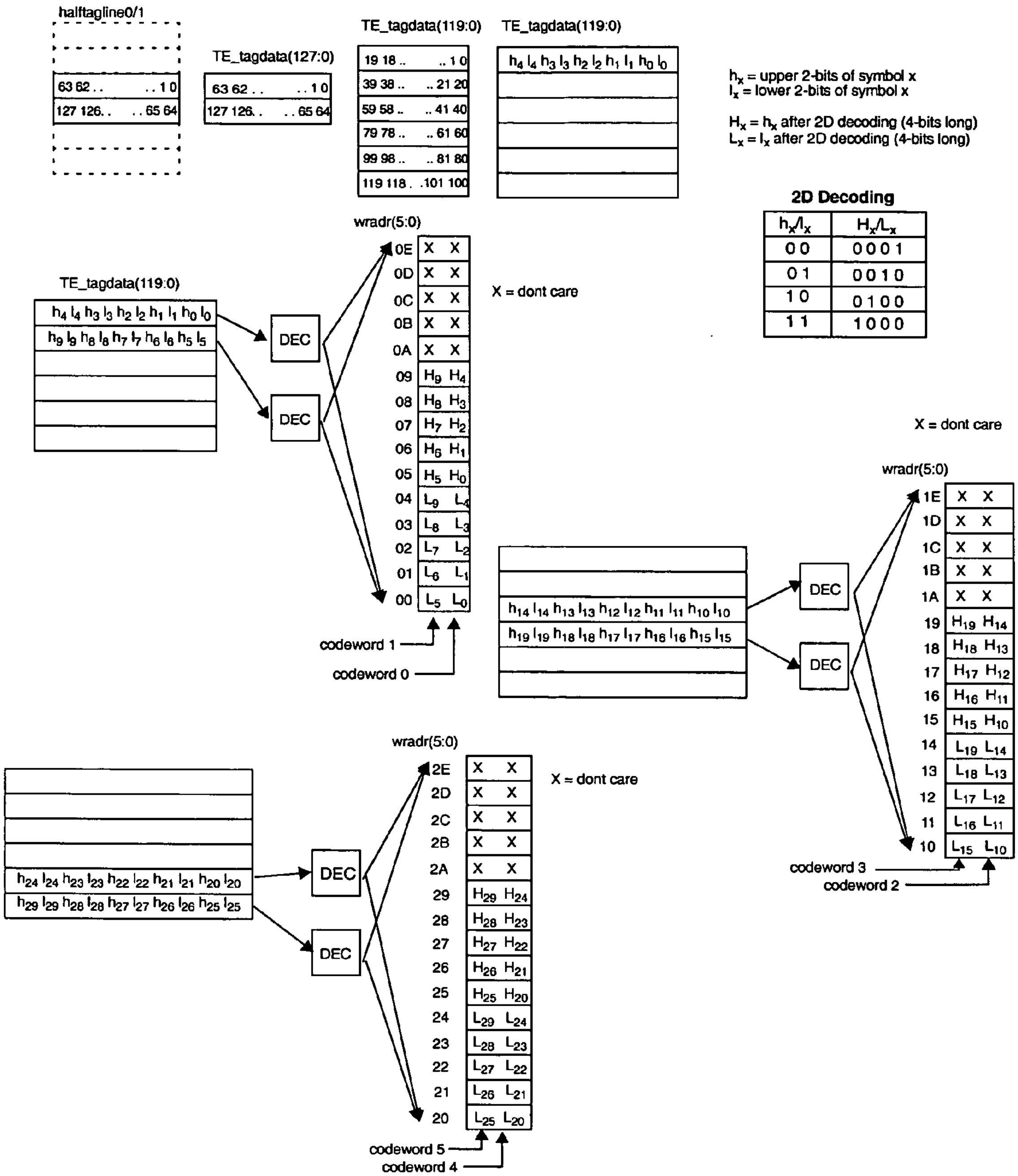
FIG. 208 shows mapping of 2D decoded variable tag data
Figure 209:
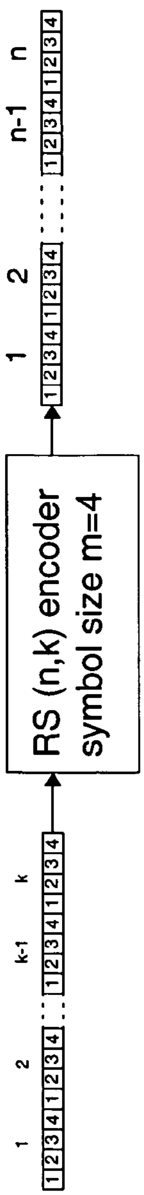
FIG. 209 shows a simple block diagram for an m=4 Reed Solomon encoder
Figure 210:
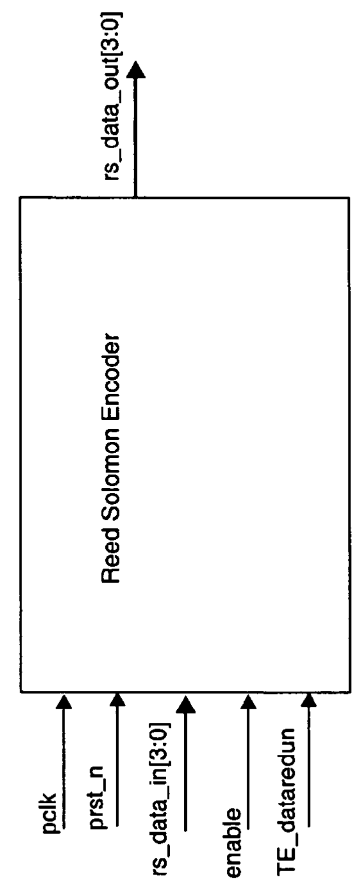
FIG. 210 shows an RS encoder I/O diagram

The TDI State Flow diagram is shown in FIG. 202. An explanation of the states follows.

- idle:—In the idle state wait for the tag encoder go signal—top_go=1. The first task is to either store or encode the Fixed data. Once the Fixed data is stored or encoded/stored the donefixed flag is set. If there is no variable data the FSM returns to the idle state hence the reason to check the donefixed flag before advancing i.e. only store/encode the fixed data once.
- fixed_data:—In the fixed_data state the FSM must decode whether to directly store the fixed data in the ETDi or if the fixed data needs to be either (15:5) (40-bits) or (15:7) (56-bits) RS encoded or 2D decoded. The values stored in registers encodefixed and dataredun and decode2den determine what the next state should be.
- bypass to etdi:—The bypass_to_etdi takes 120-bits of fixed data(pre-encoded) from the tag_data(127:0) register and stores it in the 15*8 (by 2 for simultaneous reads) buffers. The data is passed from the tag data register through 3 levels of muxing (level1, level2, level3) where it enters the RS0/RS1 encoders (which are now in a straight through mode (i.e. control_5 and control_7 are zero hence the data passes straight from the input to the output). The MSBs of the etd_wr_adr must be high to store this data as codewords 6, 7.

etd_buf_switch:—This state is used to set the tdvalid signal and pulse the etd_adv_tag signal which in turn is used to switch the read write sense of the ETDi buffers (wrsb0). The firsttime signal is used to identify the first time a tag is encoded. If zero it means read the tag data from the RTDi FIFO and encode. Once encoded and stored the FSM returns to this state where it evaluates the sense of tdvalid. First time around it will be zero so this sets tdvalid and returns to the readtagdata state to fill the 2nd ETDi buffer. After this the FSM returns to this state and waits for the lastdotintag signal to arrive. In between tags when the lastdotingtag signal is received the etd_adv_tag is pulsed and the FSM goes to the readtagdata state. However if the lastdotintag signal arrives at the end of a line there is an extra 1 cycle delay introduced in generating the etd_adv_tag pulse (via etd_adv_tag_endofline) due to the pipelining in the TFS. This allows all the previous tag to be read from the correct buffer and seamless transfer to the other buffer for the next line.

readtagdata:—The readtagdata state waits to receive a rtdavail signal from the raw tag data interface which indicates there is raw tag data available. The tag_data register is 128-bits so it takes 2 pulses of the rtdrd signal to get the 2*64-bits into the tag_data register. If the rtdavail signal is set rtdrd is pulsed for 1 cycle and the FSM steps onto the loadtagdata state. Initially the flag first64 bits will be zero. The 64-bits of rtd are assigned to the tag_data[63:0] and the flag first64 bits is set to indicate the first raw tag data read is complete. The FSM then steps back to the read_tagdata state where it generates the second rtdrd pulse. The FSM then steps onto the loadtagdata state for where the second 64-bits of rawtag data are assigned to tag_data [128:64].

loadtagdata:—The loadtagdata state writes the raw tag data into the tag_data register from the RTDi FIFO. The first64 bits flag is reset to zero as the tag_data register now contains 120/112 bits of variable data. A decode of whether to (15:5) or (15:7) RS encode or 2D decode this data decides the next state.

rs__15__5:—The rs__15__5 (Reed Solomon (15:5) mode) state either encodes 40-bit Fixed data or 120-bit Variable data and provides the encoded tag data write address and write enable (etd_wr_adr and etdwe respectively). Once the fixed tag data is encoded the donefixed flag is set as this only needs to be done once per page. The variabledatapresent register is then polled to see if there is variable data in the tags. If there is variable data present then this data must be read from the RTDi and loaded into the tag_data register. Else the tdvalid flag must be set and FSM returns to the idle state. control__5 is a control bit for the RS Encoder and controls feedforward and feedback muxes that enable (15:5) encoding.

The rs__15__5 state also generates the control signals for passing 120-bits of variable tag data to the RS encoder in 4-bit symbols per clock cycle. rs_counter is used both to control the level1_mux and act as the 15-cycle counter of the RS Encoder. This logic cycles for a total of 3*15 cycles to encode the 120-bits.

rs__15__7:—The rs__15__7 state is similar to the rs__15__5 state except the level1_mux has to select 7 4-bit symbols instead of 5.

decode__2d 15__5, decode__2d__15__7:—The decode__2d states provides the control signals for passing the 120-bit variable data to the 2D decoder. The 2 lsbs are decoded to create 4 bits. The 4 bits from each decoder are combined and stored in the ETDi. Next the 2 MSBs are decoded to create 4 bits. Again the 4 bits from each decoder are combined and stored in the ETDi.

As can be seen from Figure n page 488 on page Error! Bookmark not defined. there are 3 stages of muxing between the Tag Data register and the RS encoders or 2D decoders. Levels 1–2 are controlled by level1_mux and level2_mux which are generated within the TDi FSM as is the write address to the ETDi buffers (etd_wr_adr)

FIGS. 203 through 208 illustrate the mappings used to store the encoded fixed and variable tag data in the ETDI buffers.

26.7.6 Reed Solomon (RS) Encoder 26.7.7 Introduction

A Reed Solomon code is a non binary, block code. If a symbol consists of m bits then there are $q=2^m$ possible symbols defining the code alphabet. In the TE, m=4 so the number of possible symbols is q=16.

An (n,k) RS code is a block code with k information symbols and n code-word symbols. RS codes have the property that the code word n is limited to at most q+1 symbols in length.

In the case of the TE, both (15,5) and (15,7) RS codes can be used. This means that up to 5 and 4 symbols respectively can be corrected.

Only one type of RS coder is used at any particular time. The RS coder to be used is determined by the registers TE_dataredun and TE_decode2den:

TE_dataredun=0 and TE_decode2den=0, then use the (15,5) RS coder

TE_dataredun=1 and TE_decode2den=0, then use the (15,7) RS coder

For a (15,k) RS code with m=4, k 4-bit information symbols applied to the coder produce 15 4-bit codeword symbols at the output. In the TE, the code is systematic so the first k codeword symbols are the same the as the k input information symbols.

A simple block diagram can be seen in.

26.7.8 I/O Specification

A I/O diagram of the RS encoder can be seen in.

26.7.9 Proposed Implementation

In the case of the TE, (15,5) and (15,7) codes are to be used with 4-bits per symbol.

The primitive polynomial is $p(x)=x^4x+x+1$

In the case of the (15,5) code, this gives a generator polynomial of $$g(x)=(x+a)(x+a^2)(x+a^3)(x+a^4)(x+a^5)(x+a^6)(x+a^7)(x+a^8)(x+a^9)(x+a^{10})$$

$$g(x)=x^{10}+a^2x^9+a^3x^8+a^9x^7+a^6x^6+a^{14}x^5+a^2x^4+ax^3+a^6x^2+ax+a^{10}$$

$$g(x)=x^{10}+g_9x^9+g_8x^8+g_7x^7+g_6x^6+g_5x^5+g_4x^4+g_3x^3+g_2x^2+g_1x+g_0$$

In the case of the (15,7) code, this gives a generator polynomial of $$h(x)=(x+a)(x+a^2)(x+a^3)(x+a^4)(x+a^5)(x+a^6)(x+a^7)(x+a^8)$$

$$h(x)=x^8+a^{14}x^7+a^2x^6+a^4x^5+a^2x^4+a^{13}x^3+a^5x^2+a^{11}x+a^6$$

$$h(x)=x^8+h_7x^7+h_6x^6+h_5x^5+h_4x^4+h_3x^3+h_2x^2+h_1x+h_0$$

The output code words are produced by dividing the generator polynomial into a polynomial made up from the input symbols.

Figure 211:
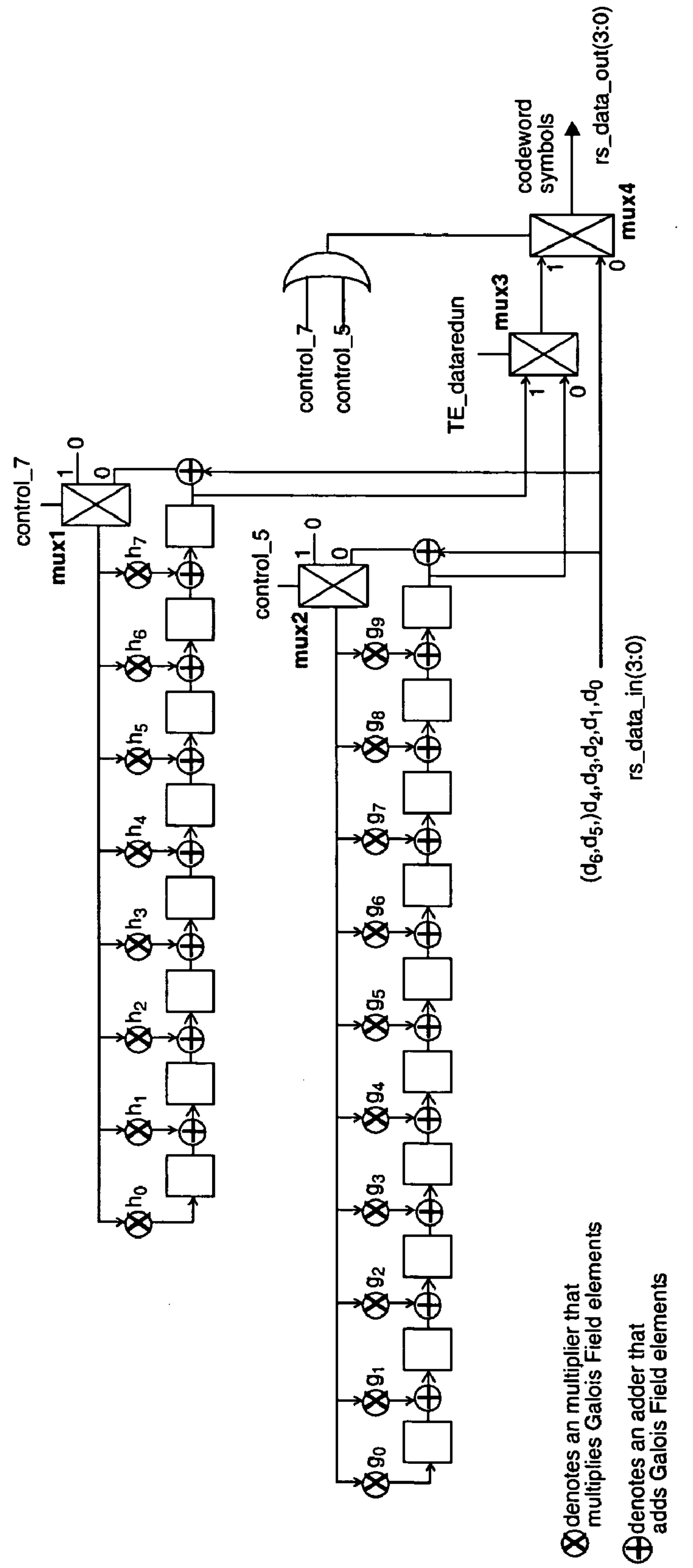
FIG. 211 shows a (15,5) & (15,7) RS encoder block diagram
Figure 212:
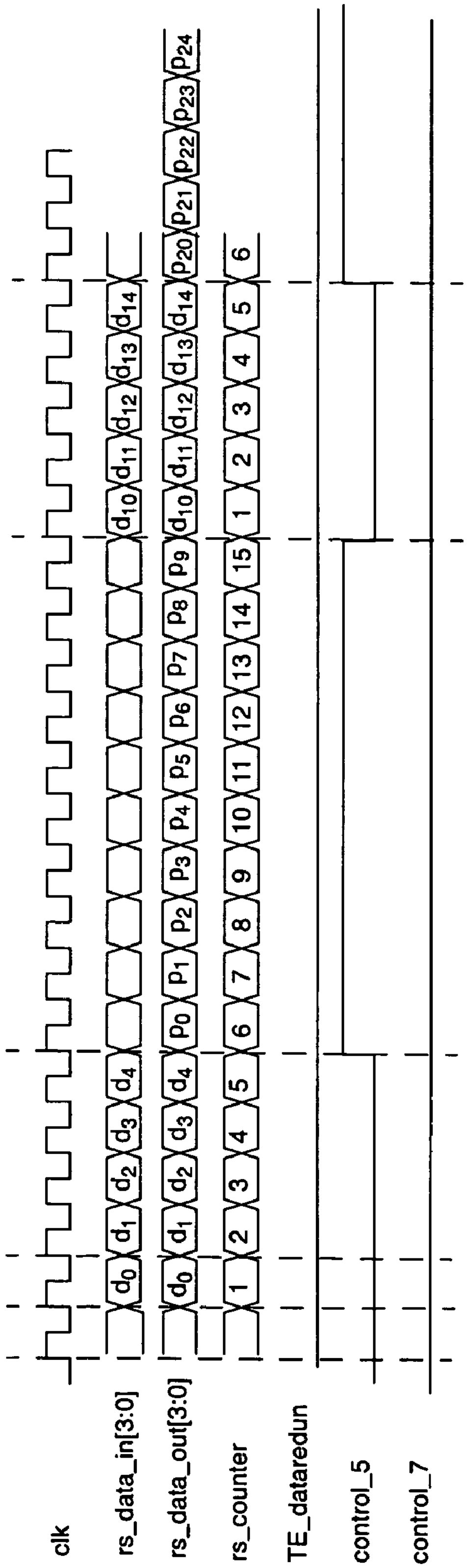
FIG. 212 shows a (15,5) RS encoder timing diagram
Figure 213:
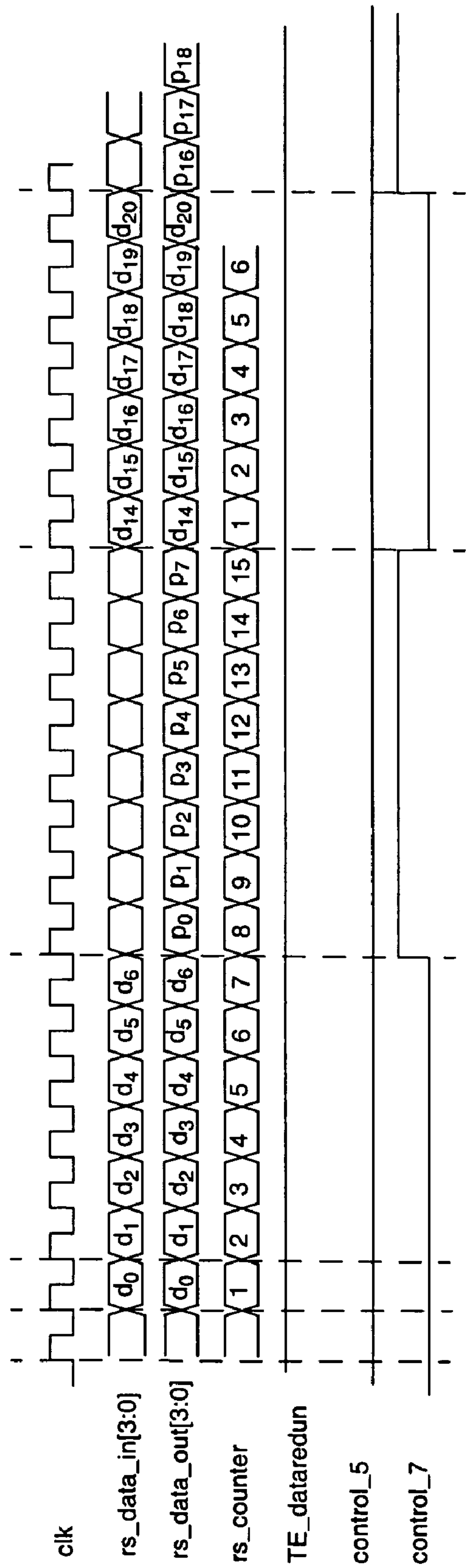
FIG. 213 shows a (15,7) RS encoder timing diagram

This division is accomplished using the circuit shown in FIG. 211.

The data in the circuit are Galois Field elements so addition and multiplication are performed using special circuitry. These are explained in the next sections.

The RS coder can operate either in (15,5) or (15,7) mode. The selection is made by the registers TE_dataredun and TE_decode2den.

When operating in (15,5) mode control_7 is always zero and when operating in (15,7) mode control_5 is always zero.

Firstly consider (15,5) mode i.e. TE_dataredun is set to zero.

For each new set of 5 input symbols, processing is as follows:

The 4-bits of the first symbol $d_0$ are fed to the input port rs_data_in(3:0) and control__5 is set to 0. mux2 is set so as to use the output as feedback. control__5 is zero so mux4 selects the input (rs_data_in) as the output (rs_data_out). Once the data has settled (<<1 cycle), the shift registers are clocked. The next symbol $d_1$ is then applied to the input, and again after the data has settled the shift registers are clocked again. This is repeated for the next 3 symbols $d_2$, $d_3$ and $d_4$. As a result, the first 5 outputs are the same as the inputs. After 5 cycles, the shift registers now contain the next 10 required outputs. control__5 is set to 1 for the next 10 cycles so that zeros are fed back by mux2 and the shift register values are fed to the output by mux3 and mux4 by simply clocking the registers.

A timing diagram is shown below.

Secondly consider (15,7) mode i.e. TE_dataredun is set to one.

In this case processing is similar to above except that control__7 stays low while 7 symbols ($d_0$, $d_1$ . . . $d_6$) are fed in. As well as being fed back into the circuit, these symbols are fed to the output.

After these 7 cycles, control__7 is set to 1 and the contents of the shift registers are fed to the output.

A timing diagram is shown below.

The enable signal can be used to start/reset the counter and the shift registers.

The RS encoders can be designed so that encoding starts on a rising enable edge. After 15 symbols have been output, the encoder stops until a rising enable edge is detected. As a result there will be a delay between each codeword.

Alternatively, once the enable goes high the shift registers are reset and encoding will proceed until it is told to stop. rs_data_in must be supplied at the correct time. Using this method, data can be continuously output at a rate of 1 symbol per cycle, even over a few codewords.

Alternatively, the RS encoder can request data as it requires.

The performance criterion that must be met is that the following must be carried out within 63 cycles load one tag's raw data into TE_tagdata encode the raw tag data store the encoded tag data in the Encoded Tag Data Interface In the case of the raw fixed tag data at the start of a page, there is no definite performance criterion except that it should be encoded and stored as fast as possible.

26.7.10 Galois Field Elements and Their Representation

A Galois Field is a set of elements in which we can do addition, subtraction, multiplication and division without leaving the set.

The TE uses RS encoding over the Galois Field $GF(2^4)$. There are $2^4$ elements in $GF(2^4)$ and they are generated using the primitive polynomial $p(x)=x^4+x+1$.

The 16 elements of $GF(2^4)$ can be represented in a number of different ways. Table 179 shows three possible representations—the power, polynomial and 4-tuple representation.

TABLE 179

$GF(2^4)$ representations

| power representation | Polynomial Representation | 4-tuple representation (a0 a1 a2 a3) |
|---|---|---|
| 0 | 0 | (0 0 0 0) |
| 1 | 1 | (1 0 0 0) |
| A | x | (0 1 0 0) |
| $\alpha^2$ | ~~ccccccccccccccc~~ $x^2$ | (0 0 1 0) |
| $\alpha^3$ | $x^3$ | (0 0 0 1) |
| $\alpha^4$ | $1 + x$ | (1 1 0 0) |
| $\alpha^5$ | $x + x^2$ | (0 1 1 0) |
| $a^6$ | $x^2 + x^3$ | (0 0 1 1) |
| $\alpha^7$ | $1 + x$ ~~cccccccc~~ $+ x^3$ | (1 1 0 1) |
| $\alpha^8$ | $1 + x^2$ | (1 0 1 0) |
| $\alpha^9$ | | (0 1 0 1) |
| | x ~~cccccccccc~~ $+ x^3$ | |
| $\alpha^{10}$ | $1 + x + x^2$ | (1 1 1 0) |
| $\alpha^{11}$ | $x + x^2 + x^3$ | (0 1 1 1) |
| $\alpha^{12}$ | $1 + x + x^2 + x^3$ | (1 1 1 1) |
| $\alpha^{13}$ | $1 + x^2 + x^3$ | (1 0 1 1) |
| $\alpha^{14}$ | $1 + x^3$ | (1 0 0 1) |

26.7.11 Multiplication of $GF(2^4)$ Elements

The multiplication of two field elements $\alpha^a$ and $\alpha^b$ is defined as $$\alpha^c=\alpha^a.\alpha^b=\alpha^{(a+b)modulo\ 15}$$

Thus $$\alpha^1.\alpha^2=\alpha^3$$

$$\alpha^5.\alpha^{10}=\alpha^{15}$$

$$\alpha^6.\alpha^{12}=\alpha^3$$

So if we have the elements in exponential form, multiplication is simply a matter of modulo 15 addition.

If the elements are in polynomial/tuple form, the polynomials must be multiplied and reduced mod $x^4+x+1$.

Suppose we wish to multiply the two field elements in $GF(2^4)$:

$$\alpha^a=a_3x^3+a_2x^2+a_1x^1+a_0$$

$$\alpha^b=b_3x^3+b_2x^2+b_1x^1+b_0$$

where $a_i$, $b_i$ are in the field (0,1) (i.e. modulo 2 arithmetic)

Multiplying these out and using $x^4+x+1=0$ we get:

$$\alpha^{a+b}=[(a_0b_3+a_1b_2+a_2b_1+a_3b_0)+a_3b_3]x^3+[(a_0b_2+a_1b_1+a_2b_0)+a_3b_3+(a_3b_2+a_2b_3)]x^2+[(a_0b_1+a_1b_0)+(a_3b_2+a_2b_3)+(a_1b_3+a_2b_2+a_3b_1)]x+[(a_0b_0+a_1b_3+a_2b_2+a_3b_1)]$$

$$\alpha^{a+b}=[a_0b_3+a_1b_2+a_2b_1+a_3(b_0+b_3)]x^3+[a_0b_2+a_1b_1+a_2(b_0+b_3)+a_3(b_2+b_3)]x^2+[a_0b_1+a_1(b_0+b_3)+a_2(b_2+b_3)+a_3(b_1+b_2)]^x+[a_0b_0+a_1b_3+a_2b_2+a_3b_1]$$

If we wish to multiply an arbitrary field element by a fixed field element we get a more simple form. Suppose we wish to multiply $\alpha^b$ by $\alpha^3$.

In this case $\alpha^3=x^3$ so (a0 a1 a2 a3)=(0001). Substituting this into the above equation gives $$\alpha^c=(b_0+b_3)x^3+(b_2+b_3)x^2+(b_1+b_2)x+b_1$$

Figure 214:
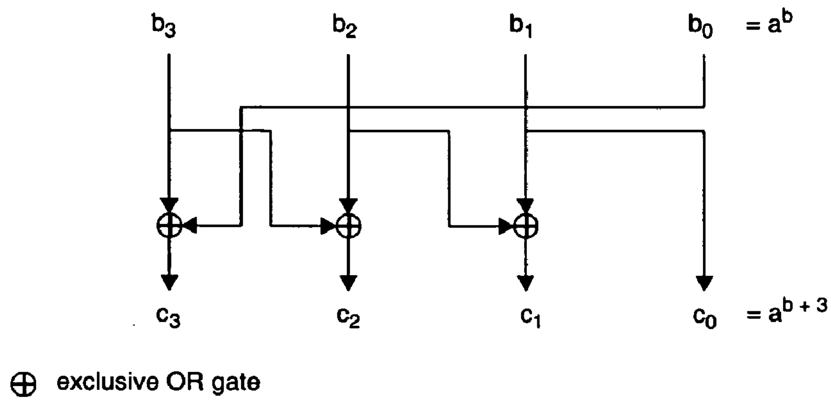
FIG. 214 shows a circuit for multiplying by $alpha^3$

This can be implemented using simple XOR gates as shown in FIG. 214

26.7.12 Addition of GF($2^4$) Elements

If the elements are in their polynomial/tuple form, polynomials are simply added.

Suppose we wish to add the two field elements in GF($2^4$):

$$\alpha^9=a_3x^3+a_2x^2+a_1x+a_0$$

$$\alpha^b=b_3x^3+b_2x^2+b_1x+b_0$$

where $a_i$, $b_i$ are in the field (0,1) (i.e. modulo 2 arithmetic)

$$\alpha^c=\alpha^a+\alpha^b=(a_3+b_3)x^3+(a_2+b_2)x^2+(a_1+b_1)x+(a_0+b_0)$$

Figure 215:
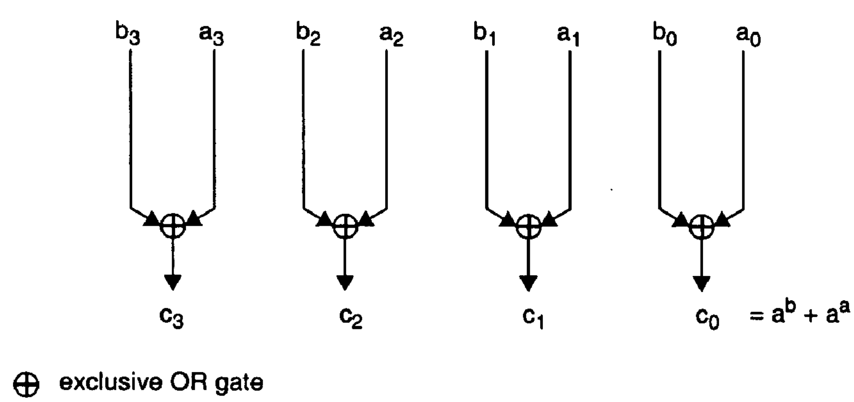
FIG. 215 shows adding two field elements
Figure 216:
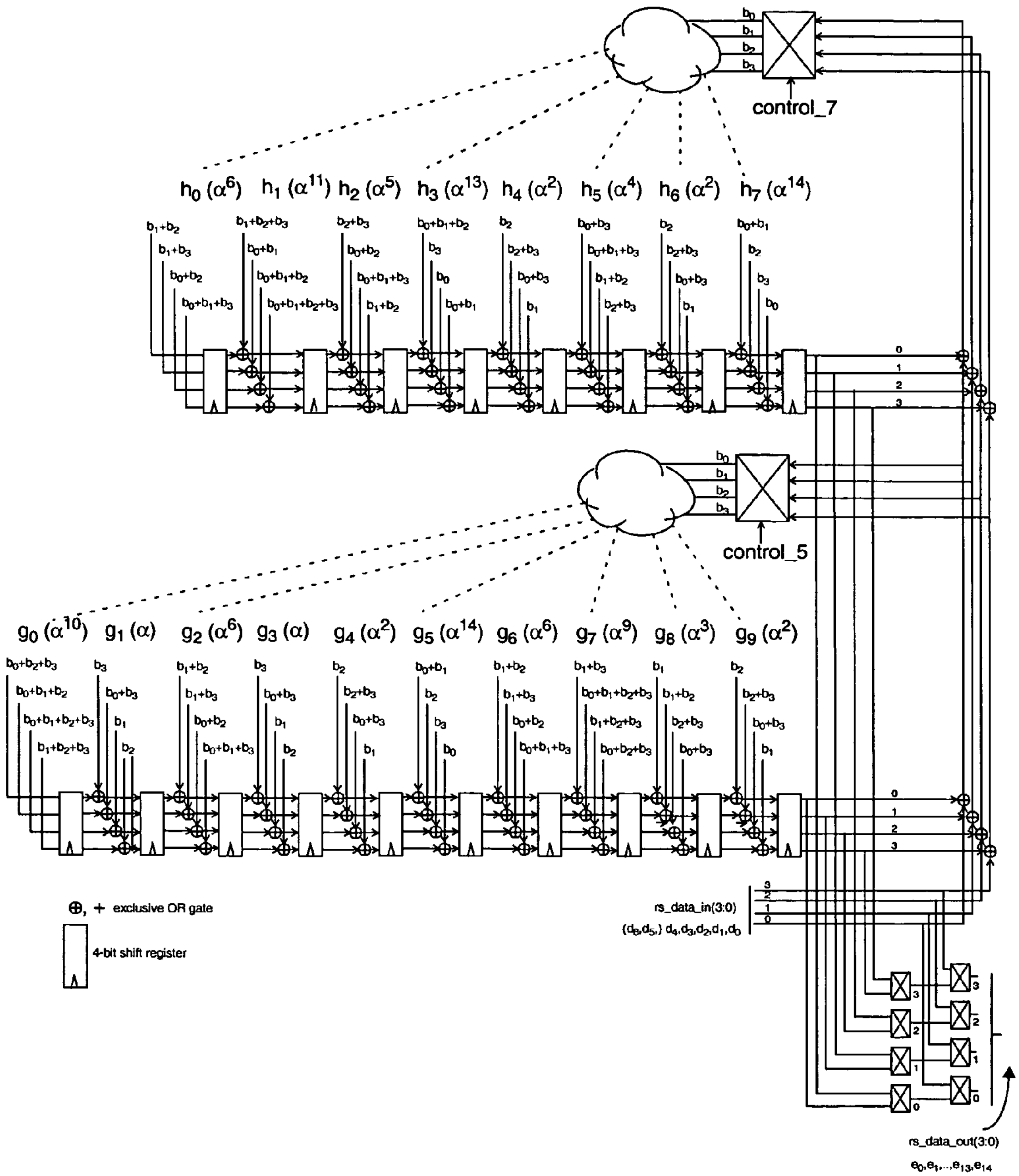
FIG. 216 shows an RS encoder implementation

Again this can be implemented using simple XOR gates as shown in FIG. 215

26.7.13 Reed Solomon Implementation

The designer can decide to create the relevant addition and multiplication circuits and instantiate them where necessary. Alternatively the feedback multiplications can be combined as follows. Consider the multiplication $$\alpha^a.\alpha^b=\alpha^c$$

or in terms of polynomials $$(a_3x^3+a_2x^2+a_1x+a_0).(b_3x^3+b_2x^2+b_1x+b_0)=(c_3x^3+c_2x^2+c_1x+c_0)$$

If we substitute all of the possible field elements in for $\alpha^a$ and express $\alpha^c$ in terms of $\alpha^b$, we get the table of results shown in Table 180.

The implementation of the circuit can be seen in FIG. The main components are XOR gates, 4-bit shift registers and multiplexers.

The RS encoder has 4 input lines labelled 0, 1, 2 & 3 and 4 output lines labelled 0, 1, 2 & 3. This labelling corresponds to the subscripts of the polynomial/4-tuple representation. The mapping of 4-bit symbols from the TE tagdata register into the RS is as follows:

the LSB in the TE_tagdata is fed into line0 the next most significant LSB is fed into line1 the next most significant LSB is fed into line2 the MSB is fed into line3

The RS output mapping to the Encoded tag data interface is similiar. Two encoded symbols are stored in an 8-bit address. Within these 8 bits:

line0 is fed into the LSB (bit 0/4)

line1 is fed into the next most significant LSB (bit 1/5)

line2 is fed into the next most significant LSB (bit 2/6)

line3 is fed into the MSB (bit 3/7)

267.14 2D Decoder

The 2D decoder is selected when TE_decode2den=1. It operates on variable tag data only. its function is to convert 2-bits into 4-bits according to Table 181.

TABLE 181

Operation of 2D decoder

| input | output |
|---|---|
| 0 0 | 0 0 0 1 |
| 0 1 | 0 0 1 0 |
| 1 0 | 0 1 0 0 |
| 1 1 | 1 0 0 0 |

TABLE 180

$\alpha^c$ multiplied by all field elements, expressed in terms of $\alpha^b$

αa = a3x3 + a2x2 + a1x + a0

Figure 217:
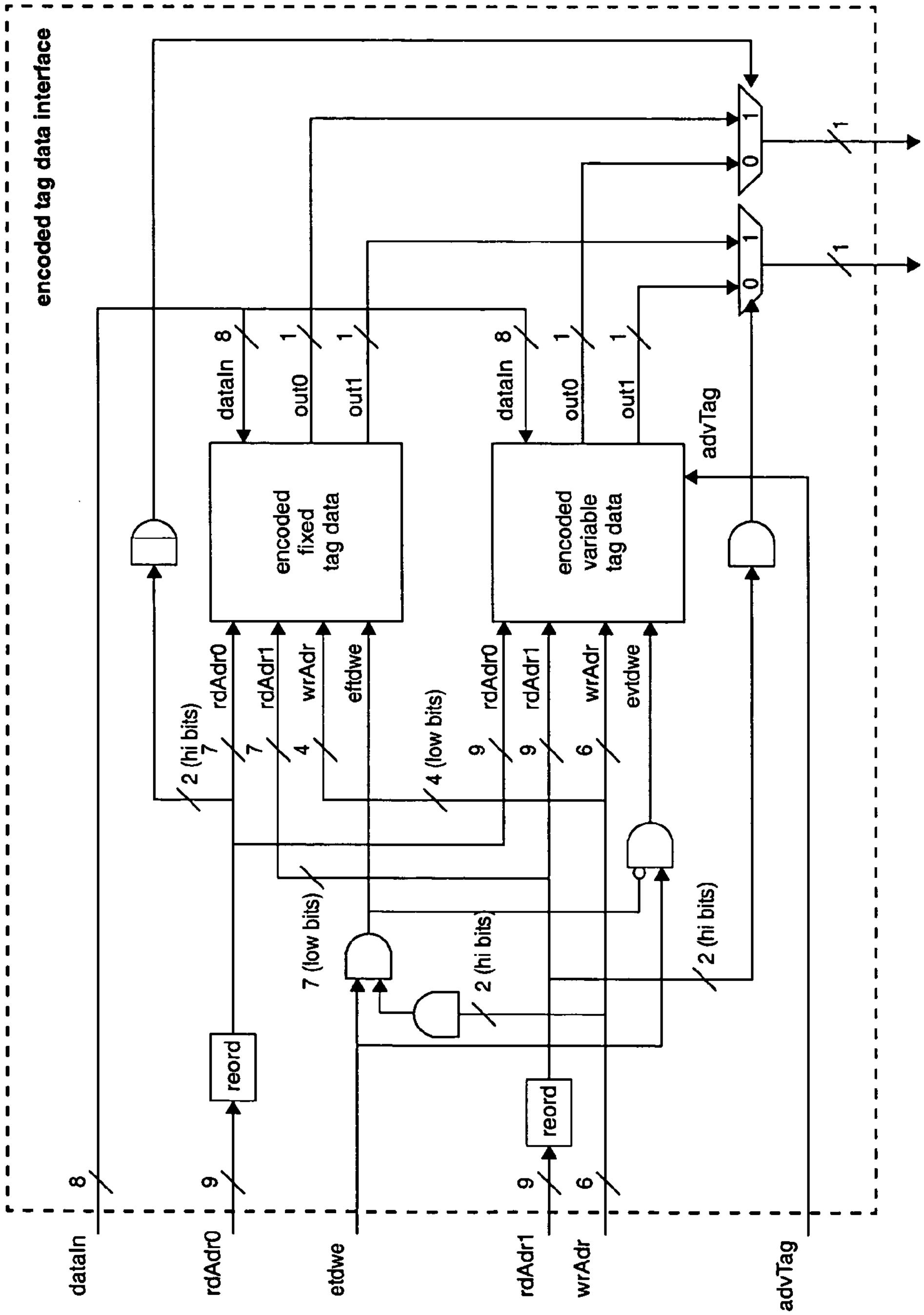
FIG. 217 shows an encoded tag data interface

| fixed field element | (a0 a1 a2 a3) | c3x3 + c2x2 + c1x + c0: c0 | c1 | c2 | c3 |
|---|---|---|---|---|---|
| 0 | (0 0 0 0) | | | | |
| 1 | (1 0 0 0) | $b_0$ | $b_1$ | $b_2$ | $b_3$ |
| a | (0 1 0 0) | $b_3$ | $b_0 + b_3$ | $b_1$ | $b_2$ |
| $\alpha^2$ | (0 0 1 0) | $b_2$ | $b_2 + b_3$ | $b_0 + b_3$ | $b_1$ |
| $\alpha^3$ | (0 0 0 1) | $b_1$ | $b_1 + b_2$ | $b_2 + b_3$ | $b_0 + b_3$ |
| $\alpha^4$ | (1 1 0 0) | $b_0 + b_3$ | $b_0 + b_1 + b_3$ | $b_1 + b_2$ | $b_2 + b_3$ |
| $\alpha^5$ | (0 1 1 0) | $b_2 + b_3$ | $b_0 + b_2$ | $b_0 + b_1 + b_3$ | $b_1 + b_2$ |
| $a^6$ | (0 0 1 1) | $b_1 + b_2$ | $b_1 + b_3$ | $b_0 + b_2$ | $b_0 + b_1 + b_3$ |
| $\alpha^7$ | (1 1 0 1) | $b_0 + b_1 + b_3$ | $b_0 + b_2 + b_3$ | $b_1 + b_3$ | $b_0 + b_2$ |
| $\alpha^8$ | (1 0 1 0) | $b_0 + b_2$ | $b_1 + b_2 + b_3$ | $b_0 + b_2 + b_3$ | $b_1 + b_3$ |
| $\alpha^9$ | (0 1 0 1) | $b_1 + b_3$ | $b_0 + b_1 + b_2 + b_3$ | $b_1 + b_2 + b_3$ | $b_0 + b_2 + b_3$ |
| $\alpha^{10}$ | (1 1 1 0) | $b_0 + b_2 + b_3$ | $b_0 + b_1 + b_2$ | $b_0 + b_1 + b_2 + b_3$ | $b_1 + b_2 + b_3$ |
| $\alpha^{11}$ | (0 1 1 1) | $b_1 + b_2 + b_3$ | $b_0 + b_1$ | $b_0 + b_1 + b_2$ | $b_0 + b_1 + b_2 + b_3$ |
| $\alpha^{12}$ | (1 1 1 1) | $b_0 + b_1 + b_2 + b_3$ | $b_0$ | $b_0 + b_1$ | $b_0 + b_1 + b_2$ |
| $\alpha^{13}$ | (1 0 1 1) | $b_0 + b_1 + b_2$ | $b_3$ | $b_0$ | $b_0 + b_1$ |
| $\alpha^{14}$ | (1 0 0 1) | $b_0 + b_1$ | $b_2$ | $b_3$ | $b_0$ |

the following signals are required:

$b_0$, $b_1$, $b_2$, $b_3$, $(b_0+b_1)$, $(b_0+b_2)$, $(b_0+b_3)$, $(b_1+b_2)$, $(b_1+b_3)$, $(b_2+b_3)$, $(b_0+b_1+b_2)$, $(b_0+b_1+b_3)$, $(b_0+b_2+b_3)$, $(b_1+b_2+b_3)$, $(b_0+b_1+b_2+b_3)$ 26.7.15 Encoded Tag Data Interface The encoded tag data interface contains an encoded fixed tag data store interface and an encoded variable tag data store interface, as shown in FIG. 217.

The two reord units simply reorder the 9 input bits to map low-order codewords into the bit selection component of the address as shown in Table 182. Reordering of write addresses is not necessary since the addresses are already in the correct format.

TABLE 182

| Reord unit | | | | |
|---|---|---|---|---|
| | input | | output | |
| bit# | bit | interpretation | bit | interpretation |
| 8 | A | select 1 of 8 codewords | A | select 1 of 4 codeword tables |
| 7 | B | | B | |
| 6 | C | | D | select 1 of 15 symbols |
| 5 | D | select 1 of 15 symbols | E | |
| 4 | E | | F | |
| 3 | F | | G | |
| 2 | G | | C | select 1 of 8 bits |
| 1 | H | select 1 of 4 bits | H | |
| 0 | I | | I | |

Figure 218:
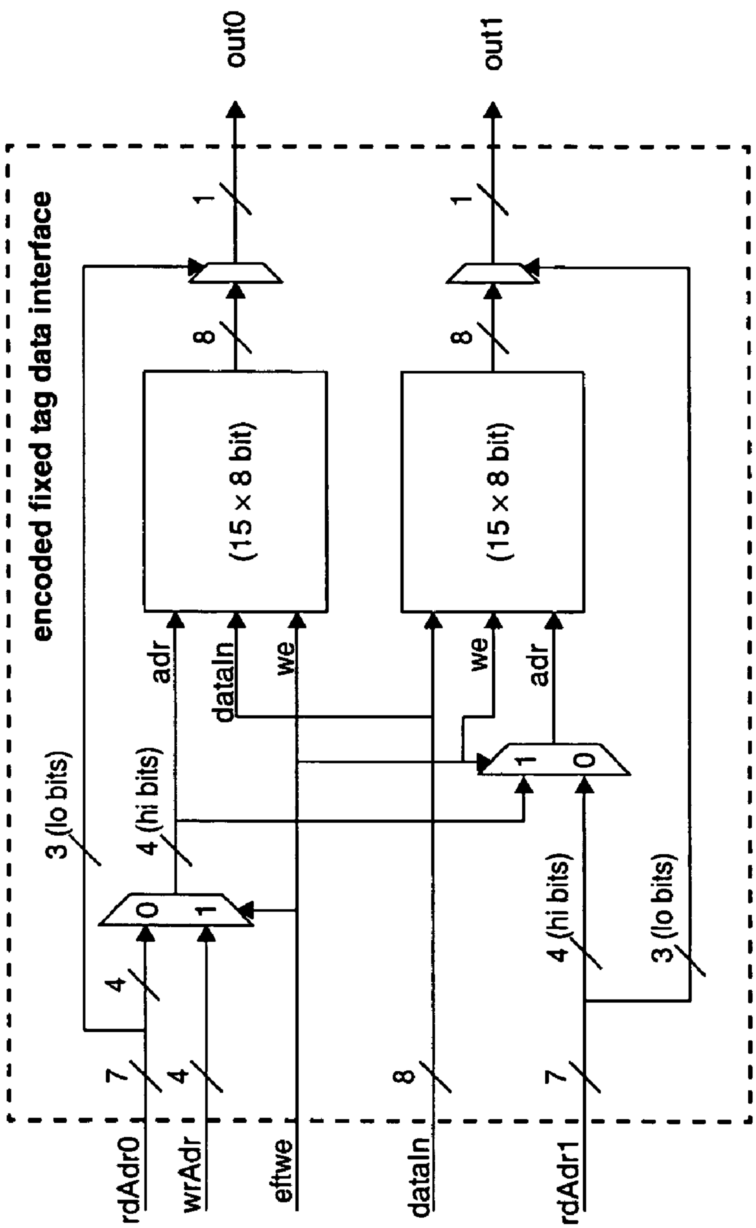
FIG. 218 shows an encoded fixed tag data interface

The encoded fixed data interface is a single 15×8-bit RAM with 2 read ports and 1 write port. As it is only written to during page setup time (it is fixed for the duration of a page) there is no need for simultaneous read/write access. However the fixed data store must be capable of decoding two simultaneous reads in a single cycle. FIG. 218 shows the implementation of the fixed data store.

The encoded variable tag data interface is a double buffered 3×15×8-bit RAM with 2 read ports and 1 write port. The double buffering allows one tag's data to be read (two reads in a single cycle) while the next tag's variable data is being stored. Write addressing is 6 bits: 2 bits of address for selecting 1 of 3, and 4 bits of address for selecting 1 of 15. Read addressing is the same with the addition of 3 more address bits for selecting 1 of 8.

Figure 219:
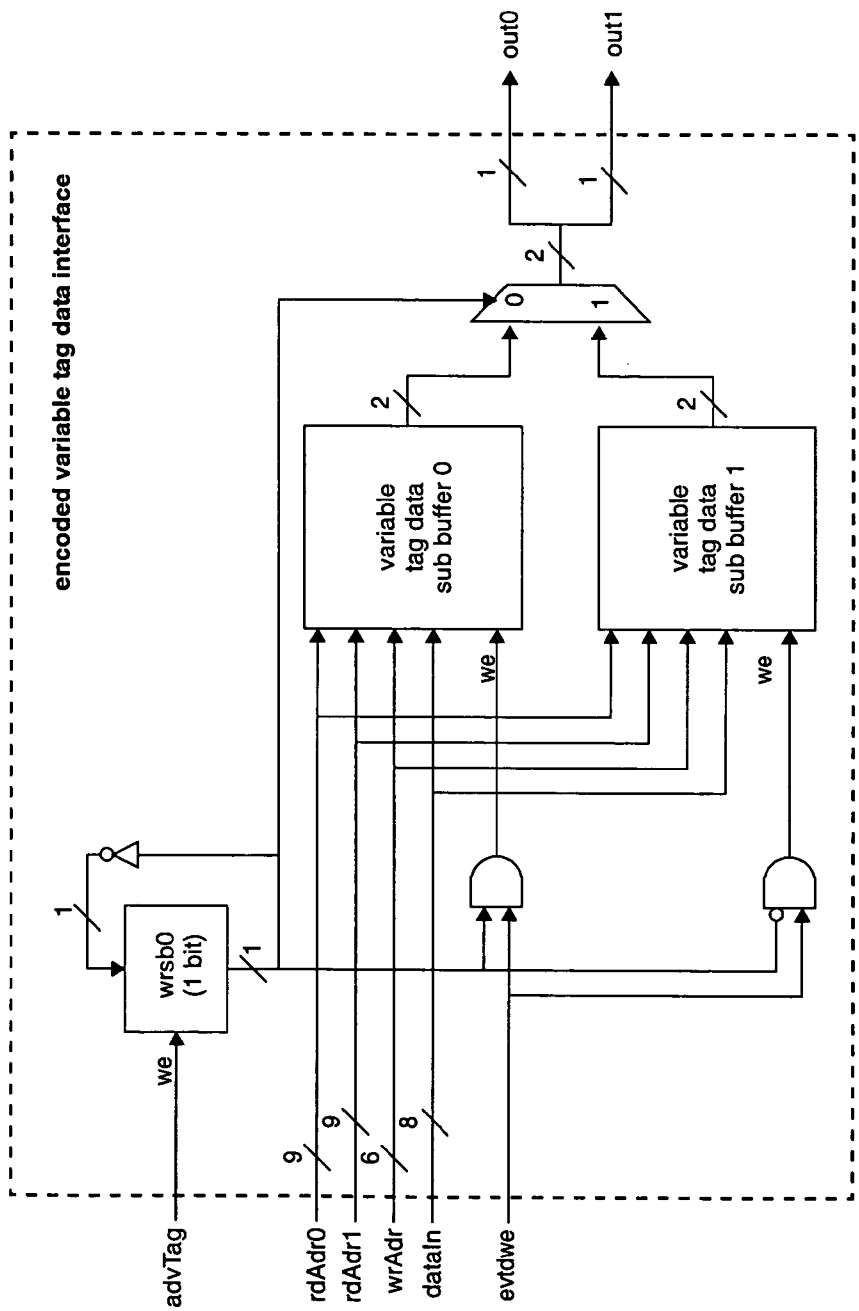
FIG. 219 shows an encoded variable tag data interface
Figure 220:
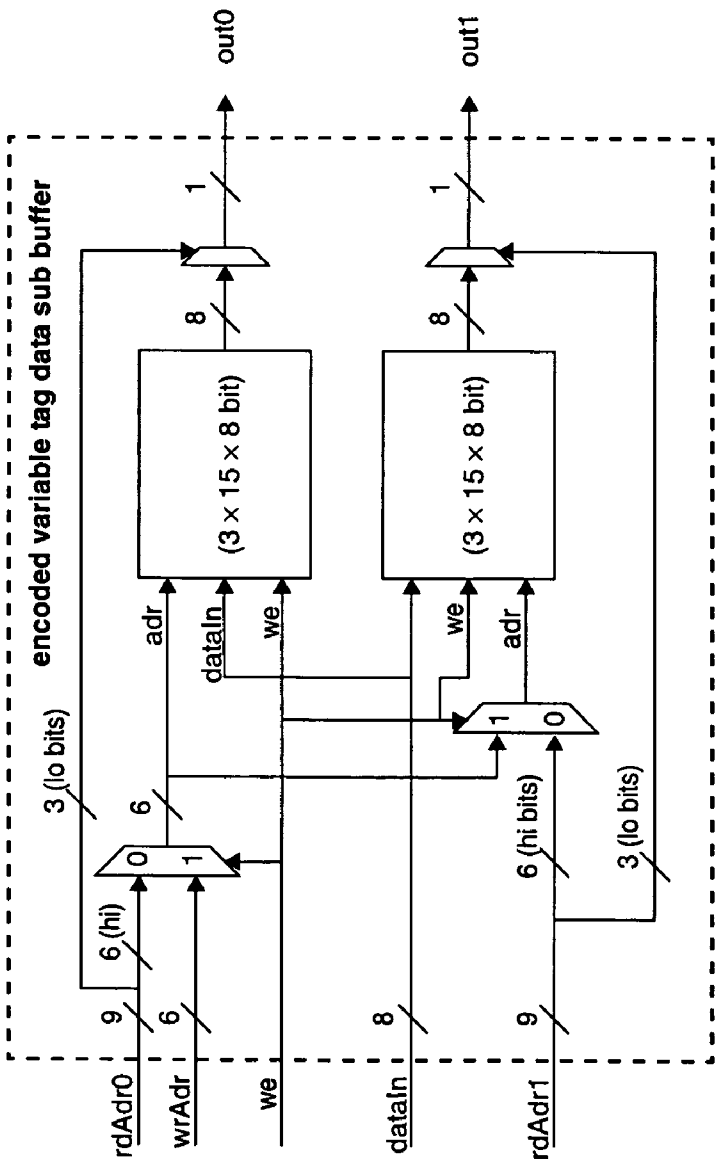
FIG. 220 shows an encoded variable tag data sub-buffer

FIG. 219 shows the implementation of the encoded variable tag data store. Double buffering is implemented via two sub-buffers. Each time an AdvTag pulse is received, the sense of which sub-buffer is being read from or written to changes. This is accomplished by a 1-bit flag called wrsb0. Although the initial state of wrsb0 is irrelevant, it must invert upon receipt of an AdvTag pulse. The structure of each sub-buffer is shown in FIG. 220.

26.8 Tag Format Structure (TFS) Interface 26.8.1 Introduction

The TFS specifies the contents of every dot position within a tags border i.e.:

is the dot part of the background?

is the dot part of the data?

Figure 221:
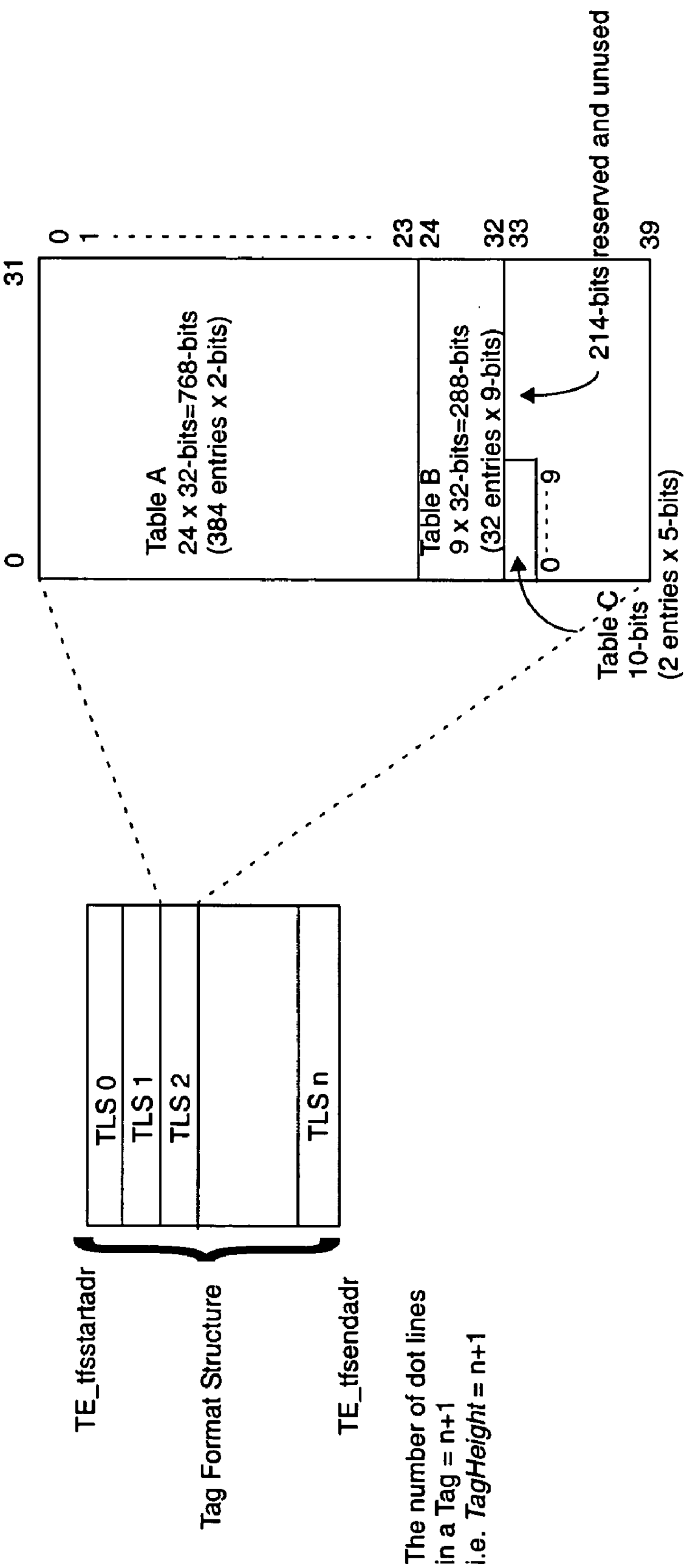
FIG. 221 shows a breakdown of the tag format structure
Figure 222:
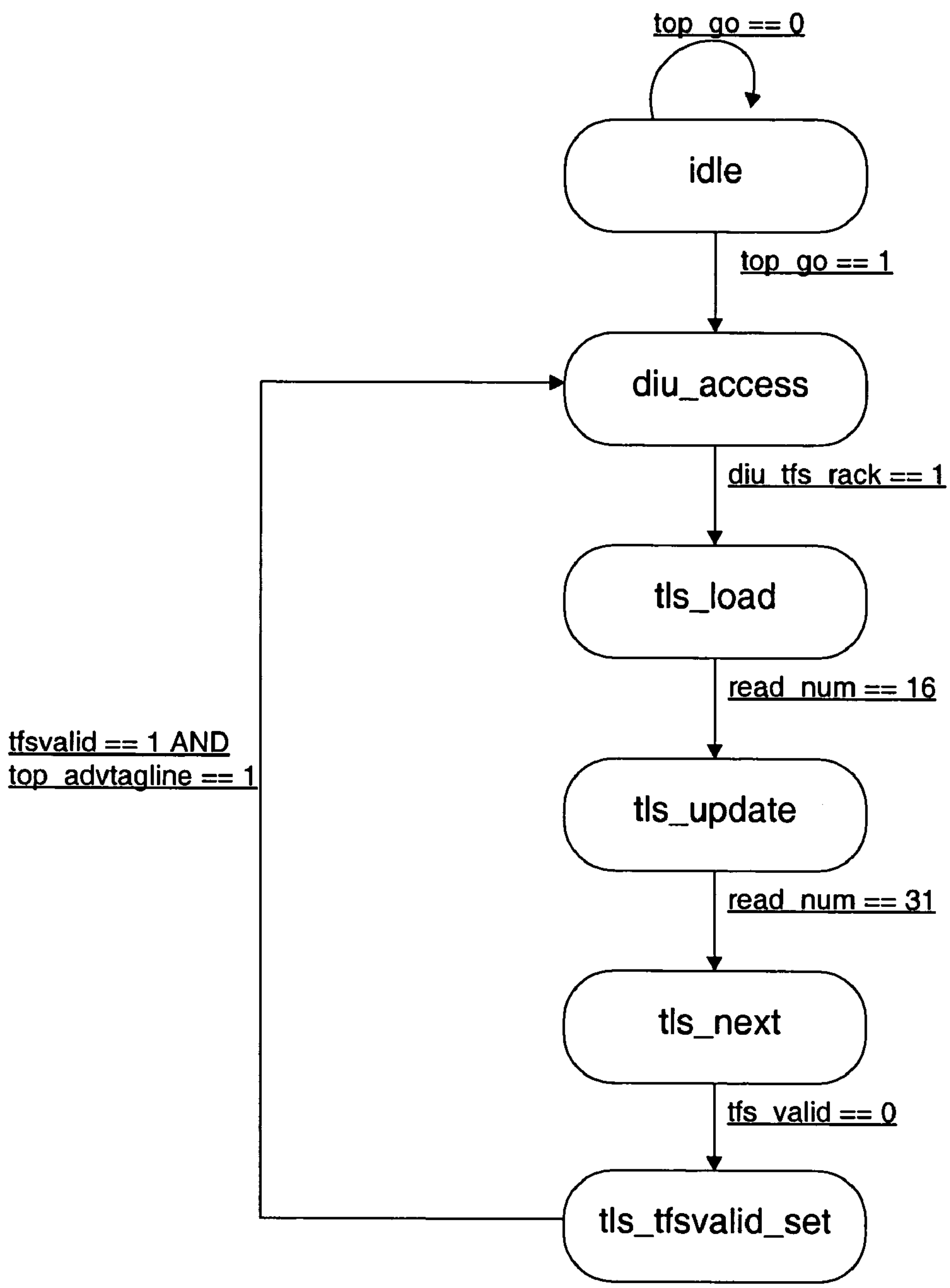
FIG. 222 shows a TFSI FSM state flow diagram

The TFS is broken up into Tag Line Structures (TLS) which specify the contents of every dot position in a particular line of a tag. Each TLS consists of three tables—A, B and C (see FIG. 221).

For a given line of dots, all the tags on that line correspond to the same tag line structure. Consequently, for a given line of output dots, a single tag line structure is required, and not the entire TFS. Double buffering allows the next tag line structure to be fetched from the TFS in DRAM while the existing tag line structure is used to render the current tag line.

The TFS interface is responsible for loading the appropriate line of the tag format structure as the tag encoder advances through the page. It is also responsible for producing table A and table B outputs for two consecutive dot positions in the current tag line.

There is a TLS for every dot line of a tag.

All tags that are on the same line have the exact same TLS.

A tag can be up to 384 dots wide, so each of these 384 dots must be specified in the TLS.

The TLS information is stored in DRAM and one TLS must be read into the TFS Interface for each line of dots that are outputted to the Tag Plane Line Buffers.

Each TLS is read from DRAM as 5 times 256-bit words with 214 padded bits in the last 256-bit DRAM read.

26.8.2 I/O Specification

TABLE 183

| Tag Format Structure Interface Port List | | |
|---|---|---|
| signal name | signal type | description |
| Pclk | In | SoPEC system clock |
| prst_n | In | Active-low, synchronous reset in pclk domain |
| top_go | In | Go signal from TE top level |
| DRAM | | |
| diu_data[63:0] | In | Data from DRAM |
| diu_tfs_rack | In | Data acknowledge from DRAM |
| diu_tfs_rvalid | In | Data valid from DRAM |
| tfs_diu_rreq | Out | Read request to DRAM |
| tfs_diu_radr[21:5] | Out | Read address to DRAM |
| tag encoder top level | | |
| top_advtagline | In | Pulsed after the last line of a row of tags |
| top_tagaltsense | In | For even tag rows = 0 i.e. 0, 2, 4 . . . For odd tag rows = 1 i.e. 1, 3, 5 . . . |
| top_lastdotintag | In | Last dot in tag is currently being processed |
| top_dotposvalid | In | Current dot position is a tag dot and its structure data and tag data is available |
| top_tagdotnum[7:0] | In | Counts from zero up to TE_tagmaxdotpairs (min. = 1, max. = 192) |
| tfsi_valid | Out | TLS tables A, B and C, ready for use |
| tfsi_ta_dot0[1:0] | Out | Even entry from Table A corresponding to top_tagdotnum |
| tfsi_ta_dot1[1:0] | Out | Odd entry from Table A corresponding to top_tagdotnum |
| tag encoder top level (PCU read decoder) | | |
| tfs_te_tfsstartadr[23:0] | Out | TFS tfsstartadr register |
| tfs_te_tfsendadr[23:0] | Out | TFS tfsendadr register |
| tfs_te_tfsfirstlineadr[23:0] | Out | TFS tfsfirstlineadr register |
| tfs_te_currtfsadr[23:0] | Out | TFS currtfsadr register |
| TDI | | |
| tfsi_tdi_adr0[8:0] | Out | Read address for dot0 (even dot) |
| tfsi_tdi_adr1[8:0] | Out | Read address for dot1 (odd dot) |

26.8.2.1 State Machine

The state machine is responsible for generating control signals for the various TFS table units, and to load the appropriate line from the TFS. The states are explained below.

idle:—Wait for top_go to become active. Pulse adv_tfs_line for 1 cycle to reset tawradr and tbwradr registers. Pulsing adv_tfs_line will switch the read/write sense of Table B so switching Table A here as well to keep things the same i.e. wrta0=NOT(wrta0).

diu_access:—In the diu_access state a request is sent to the DIU. Once an ack signal is received Table A write enable is asserted and the FSM moves to the tls_load state.

tls_load:—The DRAM access is a burst of 5 256-bit accesses, ultimately returned by the DIU as 5*(4*64 bit) words. There will be 192 padded bits in the last 256-bit DRAM word. The first 12 64-bit words reads are for Table A, words 12 to 15 and some of 16 are for Table B while part of read 16 data is for Table C. The counter read_num is used to identify which data goes to which table. The table B data is stored temporarily in a 288-bit register until the tls_update state hence tbwe does not become active until read_num=16).

The DIU data goes directly into Table A (12*64).

The DIU data for Table B is loaded into a 288-bit register.

The DIU data goes directly into Table C.

tls_update:—The 288-bits in Table B need to written to a 32*9 buffer. The tls_update state takes care of this using the read_num counter.

tls_next:—This state checks the logic level of tfsvalid and switches the read/write senses of Table A (wrta0) and Table B a cycle later (using the adv_tfs_line pulse). The reason for switching Table A a cycle early is to make sure the top_level address via tagdotnum is pointing to the correct buffer. Keep in mind the top_level is working a cycle ahead of Table A and 2 cycles ahead of Table B.

If tfsValid is 1, the state machine waits until the advTagLine signal is received. When it is received, the state machine pulses advTFSLine (to switch read/write sense in tables A, B, C), and starts reading the next line of the TFS from currTFSAdr.

If tfsValid is 0, the state machine pulses advTFSLine (to switch read/write sense in tables A, B, C) and then jumps to the tls_tfsvalid_set state where the signal tfsValid is set to 1 (allowing the tag encoder to start, or to continue if it had been stalled). The state machine can then start reading the next line of the TFS from currTFSAdr.

tls_tfsvalid_next:—Simply sets the tfsvalid signal and returns the FSM to the diu_access state. If an advTagLine signal is received before the next line of the TFS has been read in, tfsValid is cleared to 0 and processing continues as outlined above.

26.8.2.2 Bandstore Wrapping

Both TD and TFS storage in DRAM can wrap around the bandstore area. The bounds of the band store are described by inputs from the CDU shown in Table. The TD and TFS DRAM interfaces therefore support bandstore wrapping. If the TD or TFS DRAM interface increments an address it is checked to see if it matches the end of bandstore address. If so, then the address is mapped to the start of the bandstore.

The TFS state flow diagram is shown in below.

26.8.3 Generating a Tag from Tables A, B and C

The TFS contains an entry for each dot position within the tag's bounding box. Each entry specifies whether the dot is part of the constant background pattern or part of the tag's data component (both fixed and variable).

The TFS therefore has TagHeight×TagWidth entries, where TagHeight is the height of the tag in dot-lines and TagWidth is the width of the tag in dots. The TFS entries that specify a single dot-line of a tag are known as a Tag Line Structure.

The TFS contains a TLS for each of the 1600 dpi lines in the tag's bounding box. Each TLS contains three contiguous tables, known as tables A, B and C.

Table A contains 384 2-bit entries i.e. one entry for each dot in a single line of a tag up to the maximum width of a tag. The actual number of entries used should match the size of the bounding box for the tag in the dot dimension, but all 384 entries must be present.

Table B contains 32 9-bit data address that refer to (in order of appearance) the data dots present in the particular line. Again, all 32 entries must be present, even if fewer are used.

Table C contains two 5-bit pointers into table B and is followed by 22 unused bits. The total length of each TLS is therefore 34 32-bit words.

Each output dot value is generated as follows: Each entry in Table A consists of 2-bits—bit0 and bit1. These 2-bits are interpreted according to Table 184, Table 185 and Table 186.

TABLE 184

Interpretation of bit0 from entry in Table A

| bit0 | interpretation |
|---|---|
| 0 | the output bit comes directly from bit1 (see Table). |
| 1 | the output bit comes from a data bit. Bit1 is used in conjunction with Tag Line Structure Table B to determine which data bit will be output. |

TABLE 185

Interpretation of bit1 from entry in table A when bit0 = 0

| bit 1 | interpretation |
|---|---|
| 0 | output 0 |
| 1 | output 1 |

TABLE 186

Interpretation of bit1 from entry in table A when bit0 = 1

| bit 1 | interpretation |
|---|---|
| 0 | output data bit pointed to by current index into Table B. |
| 1 | output data bit pointed to by current index into Table B, and advance index by 1. |

If bit0=0 then the output dot for this entry is part of the constant background pattern. The dot value itself comes from bit1 i.e. if bit1=0 then the output is 0 and if bit1=1 then the output is 1. If bit0=1 then the output dot for this entry comes from the variable or fixed tag data. Bit1 is used in conjunction with Tables B and C to determine data bits to use.

To understand the interpretation of bit1 when bit0=1 we need to know what is stored in Table B. Table B contains the addresses of all the data bits that are used in the particular line of a tag in order of appearance. Therefore, up to 32 different data bits can appear in a line of a tag. The address of the first data dot in a tag will be given by the address stored in entry 0 of Table B. As we advance along the various data dots we will advance through the various Table B entries. Each Table B entry is 9-bits long and each points to a specific variable or fixed data bit for the tag. Each tag contains a maximum of 120 fixed and 360 variable data bits, for a total of 480 data bits. To aid address decoding, the addresses are based on the RS encoded tag data. Table lists the interpretation of the 9-bit addresses.

TABLE 187

Interpretation of 9-bit tag data address in Table B

| bit pos | name | description |
|---|---|---|
| 8 | CodeWordSelect | Select 1 of 8 codewords. Codewords 0, 1, 2, 3, 4, 5 are variable data. Codewords 6, 7 are fixed data. |
| 7 | | |
| 6 | | |
| 5 | SymbolSelect | Select 1 of 15 symbols (1111 invalid) |
| 4 | | |
| 3 | | |
| 2 | | |
| 1 | BitSelect | Select 1 of 4 bits from the selected symbols |
| 0 | | |

If the fixed data is supplied to the TE in an unencoded form, the symbols derived from codeword 0 of fixed data are written to codeword 6 and the symbols derived from fixed data codeword 1 are written to codeword 7. The data symbols are stored first and then the remaining redundancy symbols are stored afterwards, for a total of 15 symbols. Thus, when 5 data symbols are used, the 5 symbols derived from bits 0–19 are written to symbols 0–4, and the redundancy symbols are written to symbols 5–14. When 7 data symbols are used, the 7 symbols derived from bits 0–27 are written to symbols 0–6, and the redundancy symbols are written to symbols 7–14

However, if the fixed data is supplied to the TE in a pre-encoded form, the encoding could theoretically be anything. Consequently the 120 bits of fixed data is copied to codewords 6 and 7 as shown in Table 188.

TABLE 188

Mapping of fixed data to codeword/symbols when no redundancy encoding

| input bits | output symbol range | output codeword |
|---|---|---|
| 0–19 | 0–4 | 6 |
| 20–39 | 0–4 | 7 |
| 40–59 | 5–9 | 6 |
| 60–79 | 5–9 | 7 |
| 80–99 | 10–14 | 6 |
| 100–119 | 10–14 | 7 |

It is important to note that the interpretation of bit1 from Table A (when bit0=1) is relative. A 5-bit index is used to cycle through the data address in Table B. Since the first tag on a particular line may or may not start at the first dot in the tag, an initial value for the index into Table B is needed. Subsequent tags on the same line will always start with an index of 0, and any partial tag at the end of a line will simply finish before the entire tag has been rendered. The initial index required due to the rendering of a partial tag at the start of a line is supplied by Table C. The initial index will be different for each TLS and there are two possible initial indexes since there are effectively two types of rows of tags in terms of initial offsets.

Table C provides the appropriate start index into Table B (2 5-bit indices). When rendering even rows of tags, entry 0 is used as the initial index into Table B, and when rendering odd rows of tags, entry 1 is used as the initial index into Table B. The second and subsequent tags start at the left most dots position within the tag, so can use an initial index of 0.

26.8.4 Architecture

Figure 223:
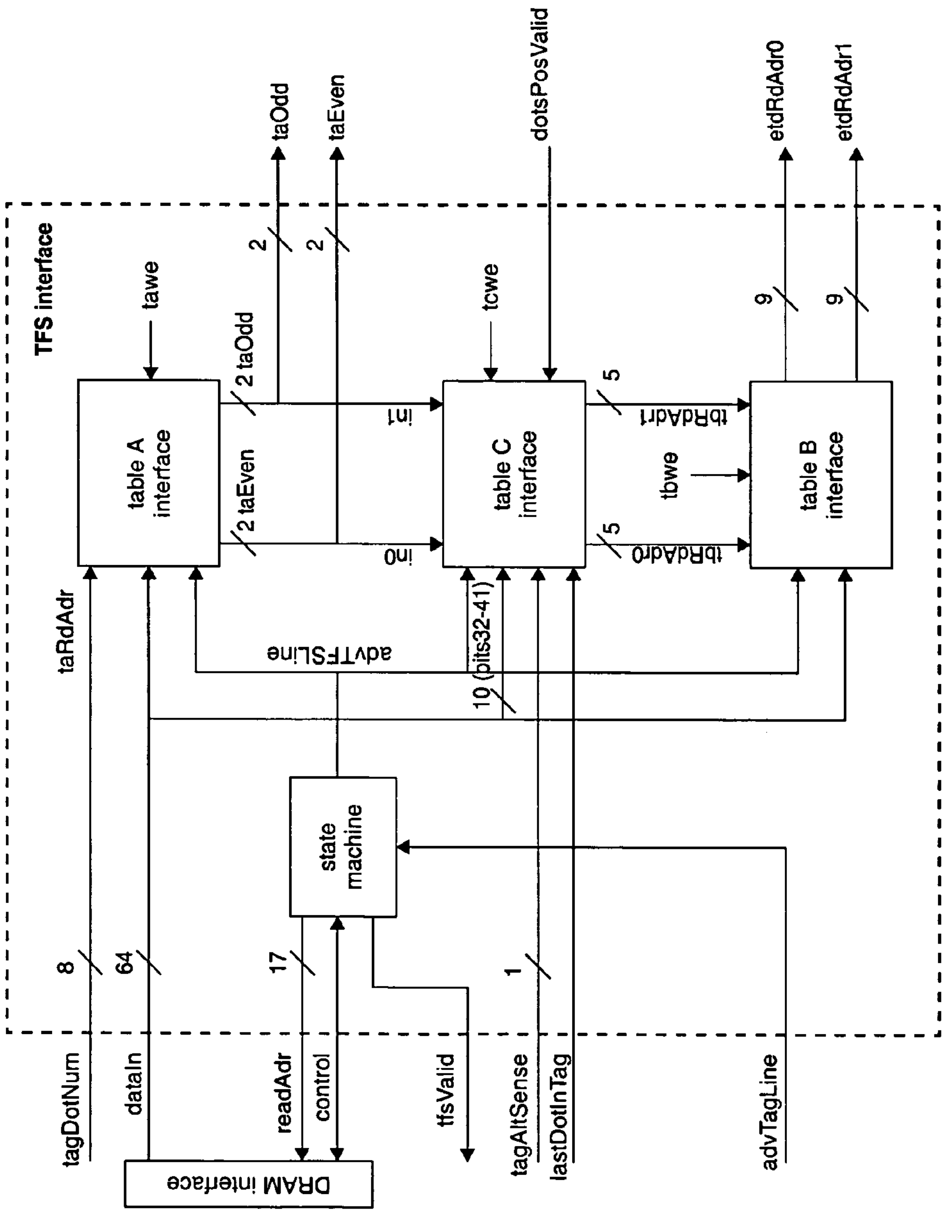
FIG. 223 shows a TFS block diagram

A block diagram of the Tag Format Structure Interface can be seen in FIG. 223.

26.8.4.1 Table A Interface

Figure 224:
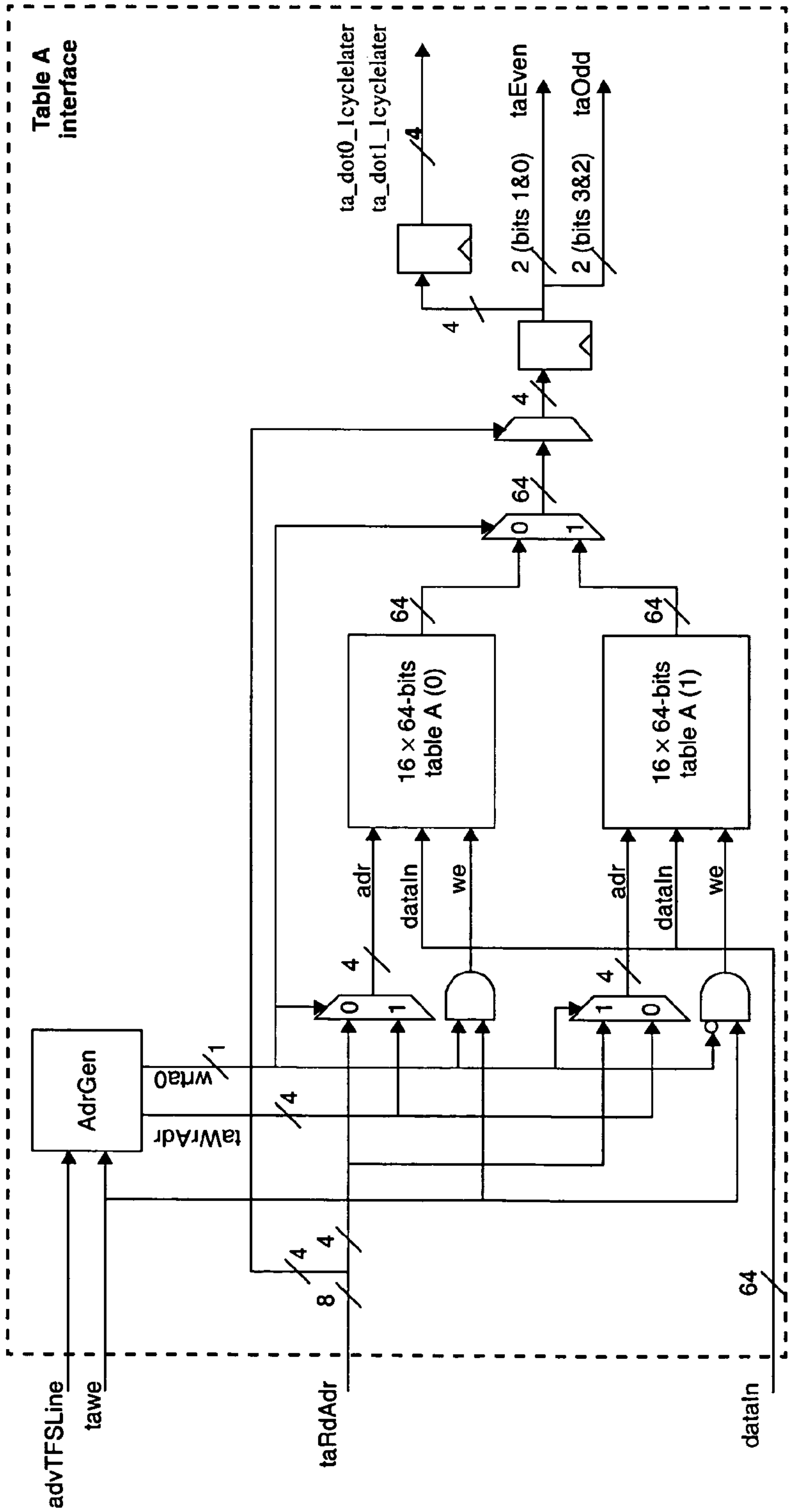
FIG. 224 shows a table A interface block diagram
Figure 225:
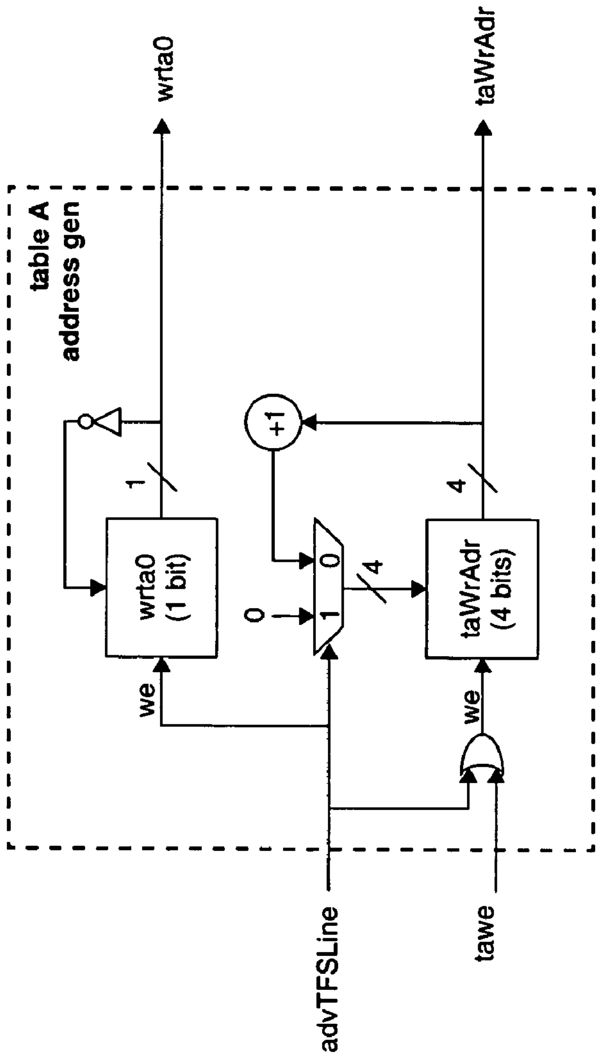
FIG. 225 shows a table A address generator

The implementation of table A is two 16×64-bit RAMs with a small amount of control logic, as shown in FIG. 224. While one RAM is read from for the current line's table A data (4 bits representing 2 contiguous table A entries), the other RAM is being written to with the next line's table A data (64-bits at a time).

Note:—The Table A data to be printed (if each LSB=0) must be passed to the top_level 2 cycles after the read of Table A due to the 2-stage pipelining in the TFS from registering Table A and Table B outputs hence this extra registering stage for the generation of ta_dot0__1 cyclelater and ta_dot1__1 cyclelater.

Each time an AdvTFSLine pulse is received, the sense of which RAM is being read from or written to changes. This is accomplished by a 1-bit flag called wrta0. Although the initial state of wrta0 is irrelevant, it must invert upon receipt of an AdvTFSLine pulse. A 4-bit counter called taWrAdr keeps the write address for the 12 writes that occur after the start of each line (specified by the AdvTFSLine control input). The tawe (table A write enable) input is set whenever the data in is to be written to table A. The taWrAdr address counter automatically increments with each write to table A. Address generation for tawe and taWrAdr is shown in Table 189.

26.8.4.2 Table C Interface

Figure 226:
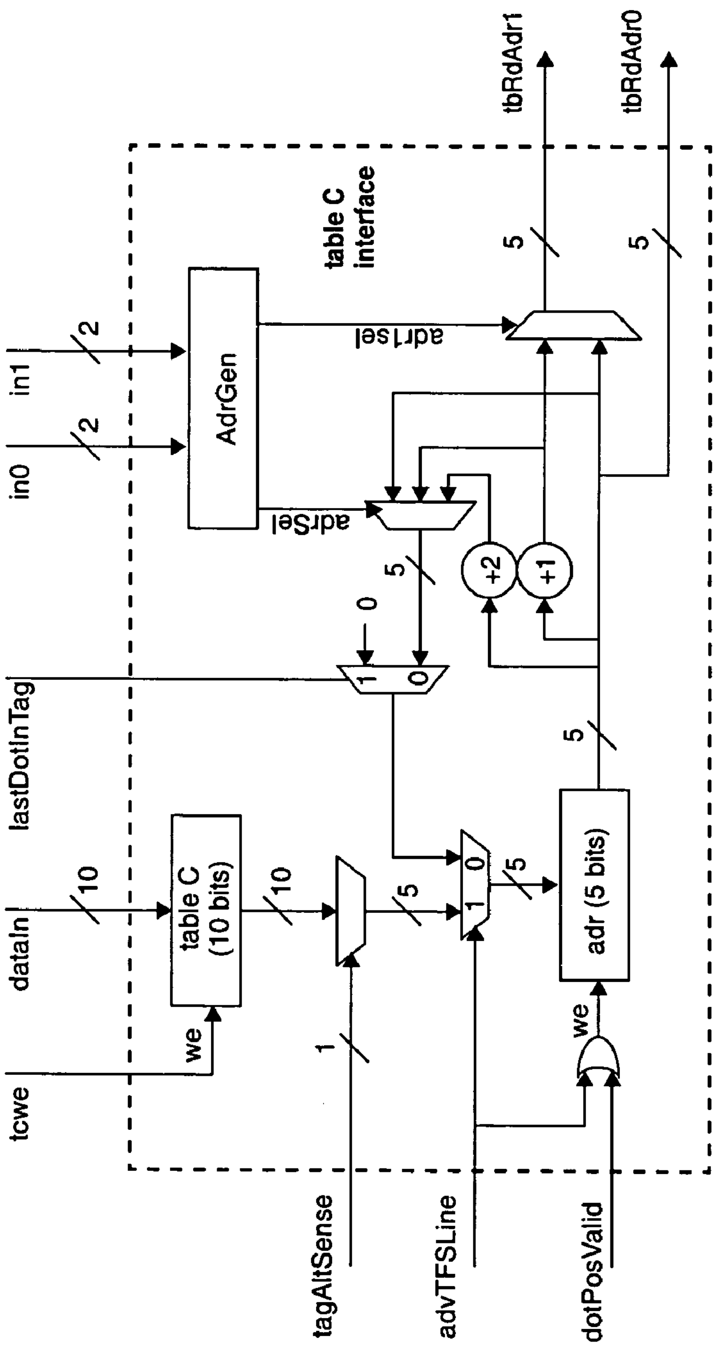
FIG. 226 shows a table C interface block diagram

A block diagram of the table C interface is shown below in FIG. 226.

The address generator for table C contains a 5 bit address register adr that is set to a new address at the start of processing the tag (either of the two table C initial values based on tagAltSense at the start of the line, and 0 for subsequent tags on the same line). Each cycle two addresses into table B are generated based on the two 2-bit inputs (in0 and in1). As shown in Section 189, the output address tbRdAdr0 is always adr and tbRdAdr1 is one of adr and adr+1, and at the end of the cycle adr takes on one of adr, adr+1, and adr+2.

TABLE 189

AdrGen lookup table

| inputs | | outputs | | |
|---|---|---|---|---|
| in0 | in1 | adr0Sel | adr1Sel | adrSel |
| 00 | 00 | X[18] | X | adr |
| 00 | 01 | X | adr | adr |
| 00 | 10 | X | X | adr |
| 00 | 11 | X | adr | adr+1 |
| 01 | 00 | adr | X | adr |
| 01 | 01 | adr | adr | adr |
| 01 | 10 | adr | X | adr |
| 01 | 11 | adr | adr | adr+1 |
| 10 | 00 | X | X | adr |
| 10 | 01 | X | adr | adr |
| 10 | 10 | X | X | adr |
| 10 | 11 | X | adr | adr+1 |
| 11 | 00 | adr | X | adr+1 |
| 11 | 01 | adr | adr+1 | adr+1 |
| 11 | 10 | adr | X | adr+1 |
| 11 | 11 | adr | adr+1 | adr+2 |

[18]X = don't care state.

26.8.4.3 Table B Interface

Figure 227:
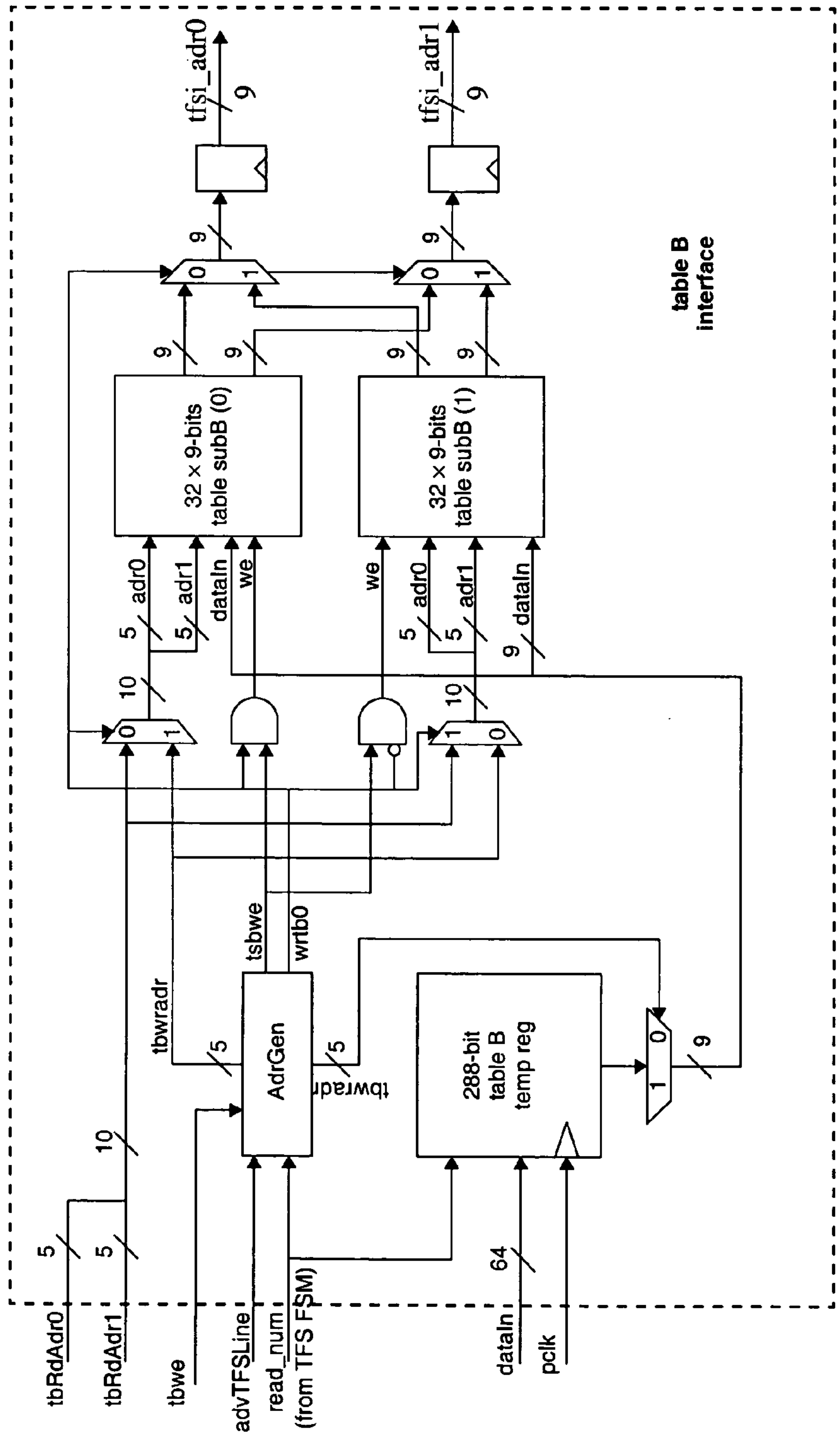
FIG. 227 shows a table B interface block diagram
Figure 228:
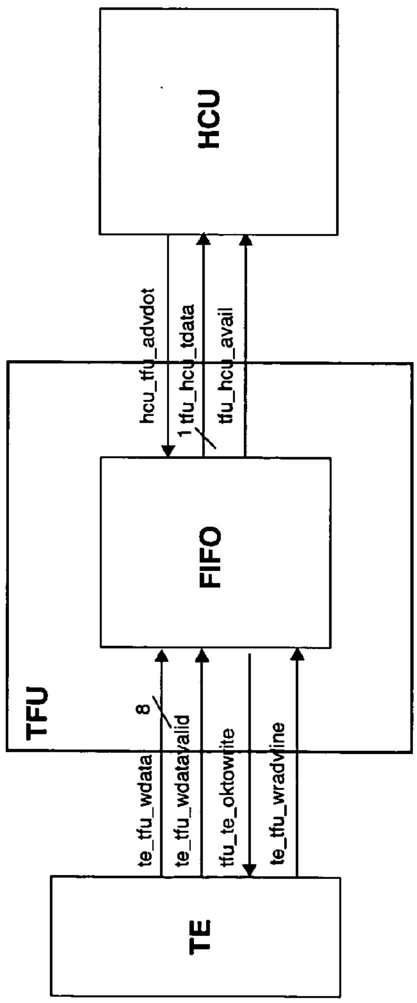
FIG. 228 shows interfaces between TE, TFU and HCU

The table B interface implementation generates two encoded tag data addresses (tfsi_adr0, tfsu_adr1) based on two table B input addresses (tbRdAdr0, tbRdAdr1). A block diagram of table B can be seen in FIG. 227.

Table B data is initially loaded into the 288-bit table B temporary register via the TFS FSM. Once all 288-bit entries have been loaded from DRAM, the data is written in 9-bit chunks to the 32*9 register arrays based on tbwradr.

Each time an AdvTFSLine pulse is received, the sense of which sub buffer is being read from or written to changes. This is accomplished by a 1-bit flag called wrtb0. Although the initial state of wrtb0 is irrelevant, it must invert upon receipt of an AdvTFSLine pulse.

Note:—The output addresses from Table B are registered.

27 Tag FIFO Unit (TFU)

27.1 Overview

The Tag FIFO Unit (TFU) provides the means by which data is transferred between the Tag Encoder (TE) and the HCU. By abstracting the buffering mechanism and controls from both units, the interface is clean between the data user and the data generator.

The TFU is a simple FIFO interface to the HCU. The Tag Encoder will provide support for arbitrary Y integer scaling up to 1600 dpi. X integer scaling of the tag dot data is performed at the output of the FIFO in the TFU. There is feedback to the TE from the TFU to allow stalling of the TE during a line. The TE interfaces to the TFU with a data width of 8 bits. The TFU interfaces to the HCU with a data width of 1 bit.

The depth of the TFU FIFO is chosen as 16 bytes so that the FIFO can store a single 126 dot tag.

27.1.1 Interfaces Between TE, TFU and HCU 27.1.1.1 TE-TFU Interface

The interface from the TE to the TFU comprises the following signals:

te_tfu_wdata, 8-bit write data.

te_tfu_wdatavalid, write data valid.

te_tfu_wradvline, accompanies the last valid 8-bit write data in a line.

The interface from the TFU to TE comprises the following signal:

tfu_te_oktowrite, indicating to the TE that there is space available in the TFU FIFO.

The TE writes data to the TFU FIFO as long as the TFU's tfu_te_oktowrite output bit is set. The TE write will not occur unless data is accompanied by a data valid signal.

27.1.1.2 TFU-HCU Interface

The interface from the TFU to the HCU comprises the following signals:

tfu_hcu_tdata, 1-bit data.

tfu_hcu_avail, data valid signal indicating that there is data available in the TFU FIFO.

The interface from HCU to TFU comprises the following signal:

hcu_tfu_ready, indicating to the TFU to supply the next dot.

27.1.1.2.1 X Scaling

Tag data is replicated a scale factor (SF) number of times in the X direction to convert the final output to 1600 dpi. Unlike both the CFU and SFU, which support non-integer scaling, the scaling is integer only. Replication in the X direction is performed at the output of the TFU FIFO on a dot-by-dot basis.

To account for the case where there may be two SoPEC devices, each generating its own portion of a dot-line, the first dot in a line may not be replicated the total scale-factor number of times by an individual TFU. The dot will ultimately be scaled-up correctly with both devices doing part of the scaling, one on its lead-out and the other on its lead in.

Note two SoPEC TEs may be involved in producing the same byte of output tag data straddling the printhead boundary. The HCU of the left SoPEC will accept from its TE the correct amount of dots, ignoring any dots in the last byte that do not apply to its printhead. The TE of the right SoPEC will be programmed the correct number of dots into the tag and its output will be byte aligned with the left edge of the printhead.

27.2 Definitions OF I/O

TABLE 190

TFU Port List

| Port Name | Pins | I/O | Description |
|---|---|---|---|
| Clocks and Resets | | | |
| Pclk | 1 | In | SoPEC Functional clock. |
| Prst_n | 1 | In | Global reset signal. |
| PCU Interface data and control signals | | | |
| Pcu_adr[4:2] | 2 | In | PCU address bus. Only 3 bits are required to decode the address space for this block. |
| Pcu_dataout[31:0] | 32 | In | Shared write data bus from the PCU. |
| Tfu_pcu_datain[31:0] | 32 | Out | Read data bus from the TFU to the PCU. |
| Pcu_rwn | 1 | In | Common read/not-write signal from the PCU. |
| Pcu_tfu_sel | 1 | In | Block select from the PCU. When pcu_tfu_sel is high both pcu_adr and pcu_dataout are valid. |
| Tfu_pcu_rdy | 1 | Out | Ready signal to the PCU. When tfu_pcu_rdy is high it indicates the last cycle of the access. For a write cycle this means pcu_dataout has been registered by the block and for a read cycle this means the data on tfu_pcu_datain is valid. |
| TE Interface data and control signals | | | |
| Te_tfu_wdata[7:0] | 8 | In | Write data for TFU FIFO. |
| Te_tfu_wdatavalid | 1 | In | Write data valid signal. |
| Te_tfu_wradvline | 1 | In | Advance line signal strobed when the last byte in a line is placed on te_tfu_wdata |
| tfu_te_oktowrite | 1 | Out | Ready signal indicating TFU has space available in it's FIFO and is ready to be written to. |
| HCU Interface data and control signals | | | |
| Hcu_tfu_advdot | 1 | In | Signal indicating to the TFU that the HCU is ready to accept the next dot of data from TFU. |
| tfu_hcu_tdata | 1 | Out | Data from the TFU FIFO. |
| tfu_hcu_avail | 1 | Out | Signal indicating valid data available from TFU FIFO. |

27.3 Configuration Registers

TABLE 191

TFU Configuration Registers

| Address TFU_Base + | register name | #bits | value on reset | description |
|---|---|---|---|---|
| Control registers | | | | |
| 0x00 | Reset | 1 | 1 | A write to this register causes a reset of the TFU. This register can be read to indicate the reset state: 0 - reset in progress 1 - reset not in progress. |
| 0x04 | Go | 1 | see text | Writing 1 to this register starts the TFU. Writing 0 to this register halts the TFU. When Go is deasserted the state-machines go to their idle states but all counters and configuration registers keep their values. When Go is asserted all counters are reset, but configuration registers keep their values (i.e. they don't get reset). The TFU must be started before the TE is started. This register can be read to determine if the TFU is running (1 = running, 0 = stopped). |
| Setup registers (constant during processing of page) | | | | |
| 0x08 | XScale | 8 | 1 | Tag scale factor in X direction. |
| 0x0C | XFracScale | 8 | 1 | Tag scale factor in X direction for the first dot in a line (must be programmed to be less than or equal to XScale) |
| 0x10 | TEByteCount | 12 | 0 | The number of bytes to be accepted from the TE per line. Once this number of bytes have been received subsequent bytes are ignored until there is a strobe on the te_tfu_wradvline |
| 0x14 | HCUDotCount | 16 | 0 | The number of (optionally) x-scaled dots per line to be supplied to the HCU. Once this number has been reached the remainder of the current FIFO byte is ignored. |

27.4 Detailed Description

Figure 229:
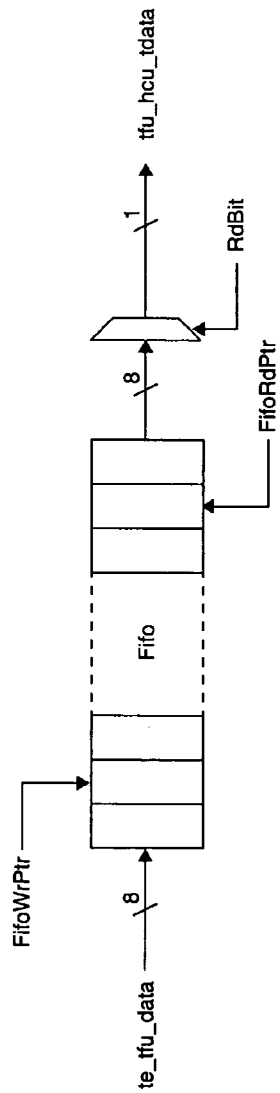
FIG. 229 shows a 16-byte FIFO in TFU

The FIFO is a simple 16-byte store with read and write pointers, and a contents store, FIG. 229. 16 bytes is sufficient to store a single 126 dot tag.

Each line a total of TEByteCount bytes is read into the FIFO. All subsequent bytes are ignored until there is a strobe on the te_tfu_wradvline signal, whereupon bytes for the next line are stored. On the HCU side, a total of HCUDotCount dots are produced at the output. Once this count is reached any more dots in the FIFO byte currently being processed are ignored. For the first dot in the next line the start of line scale factor, XFracScale, is used.

The behaviour of these signals and the control signals between the TFU and the TE and HCU is detailed below.

```
    // Concurrently Executed Code:
    // TE always allowed to write when there's either (a)
room or (b) no room and all
    // bytes for that line have been received.
    if ((FifoCntnts != FifoMax) OR (FifoCntnts = = FifoMax
and ByteToRx = = 0)) then
        tfu_te_oktowrite = 1
    else
        tfu_te_oktowrite = 0
```

-continued

```
    // Data presented to HCU when there is (a) data in
FIFO and (b) the HCU has not
    // received all dots for a line
    if (FifoCntnts != 0) AND (BitToTx != 0)then
        tfu_hcu_avail = 1
    else
        tfu_hcu_avail = 0
    // Output mux of FIFO data
    tfu_hcu_tdata = Fifo[FifoRdPnt] [RdBit]
    // Sequentially Executed Code:
    if (te_tfu_wdatavalid = = 1) AND (FifoCntnts !=
FifoMax) AND (ByteToRx != 0) then
        Fifo[FifoWrPnt] = te_tfu_wdata
        FifoWrPnt ++
        FifoContents ++
        ByteToRx --
    if (te_tfu_wradvline = = 1) then
        ByteToRx = TEByteCount
    if (hcu_tfu_advdot = = 1 and FifoCntnts != 0) then {
        BitToTx ++
        if (RepFrac = = 1) then
            RepFrac = Xscale
            if (RdBit = 7) then
                RdBit = 0
                FifoRdPnt ++
                FifoContents --
```

-continued

```
        else
            RdBit++
    else
        RepFrac--
    if (BitToTx = = 1) then {
        RepFrac = XFracScale
        RdBit = 0
        FifoRdPnt ++
        FifoContents--
        BitToTx = HCUDotCount
        }
    }
```

What is not detailed above is the fact that, since this is a circular buffer, both the fifo read and write-pointers wrap-around to zero after they reach two. Also not detailed is the fact that if there is a change of both the read and write-pointer in the same cycle, the fifo contents counter remains unchanged.

28 Alftoner Compositor Unit (HCU)

28.1 Overview

The Halftoner Compositor Unit (HCU) produces dots for each nozzle in the destination printhead taking account of the page dimensions (including margins). The spot data and tag data are received in bi-level form while the pixel contone data received from the CFU must be dithered to a bi-level representation. The resultant 6 bi-level planes for each dot position on the page are then remapped to 6 output planes and output dot at a time (6 bits) to the next stage in the printing pipeline, namely the dead nozzle compensator (DNC).

28.2 Data Flow

Figure 230:
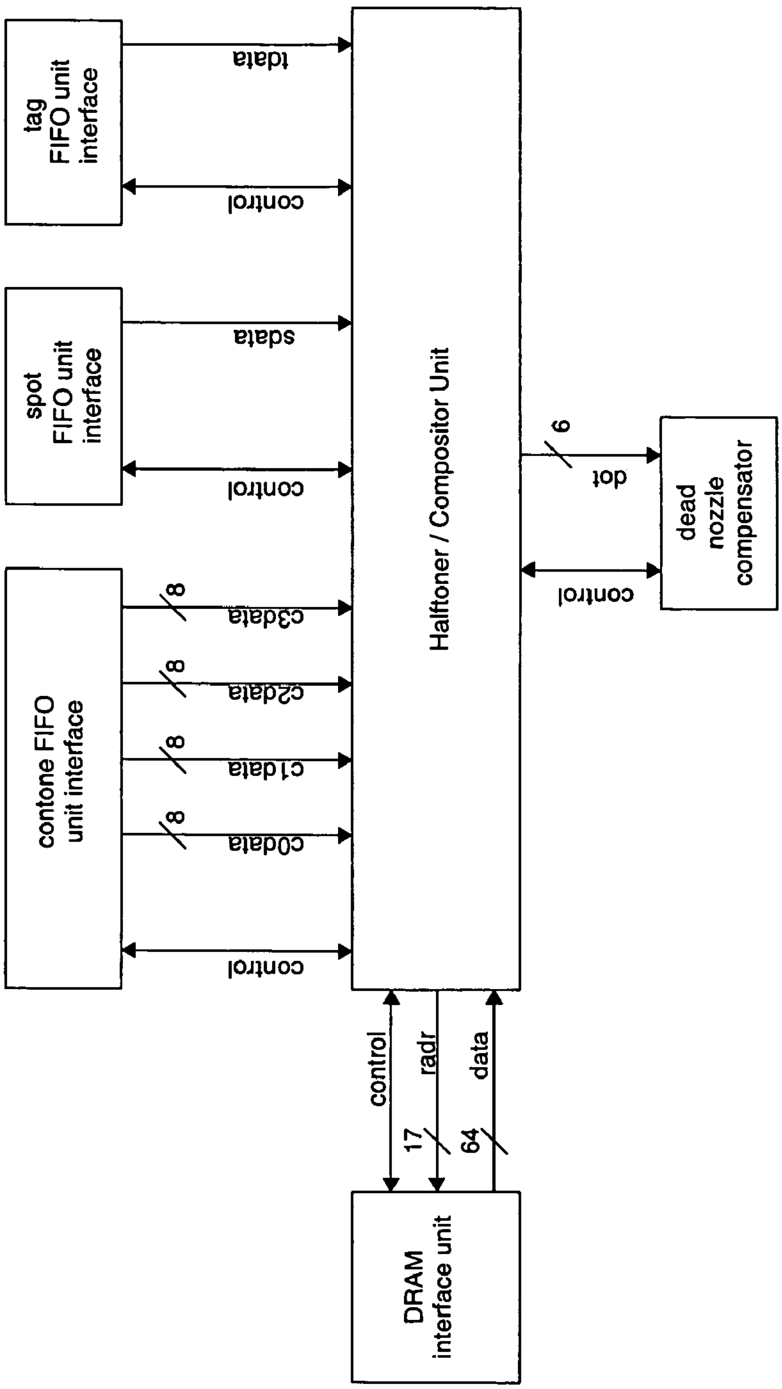
FIG. 230 shows a high level block diagram showing the HCU and its external interfaces

FIG. 230 shows a simple dot data flow high level block diagram of the HCU. The HCU reads contone data from the CFU, bi-level spot data from the SFU, and bi-level tag data from the TFU. Dither matrices are read from the DRAM via the DIU. The calculated output dot (6 bits) is read by the DNC.

The HCU is given the page dimensions (including margins), and is only started once for the page. It does not need to be programmed in between bands or restarted for each band. The HCU will stall appropriately if its input buffers are starved. At the end of the page the HCU will continue to produce 0 for all dots as long as data is requested by the units further down the pipeline (this allows later units to conveniently flush pipelined data).

The HCU performs a linear processing of dots calculating the 6-bit output of a dot in each cycle. The mapping of 6 calculated bits to 6 output bits for each dot allows for such example mappings. as compositing of the spot0 layer over the appropriate contone layer (typically black), the merging of CMY into K (if K is present in the printhead), the splitting of K into CMY dots if there is no K in the printhead, and the generation of a fixative output bitstream.

28.3 Dram Storage Requirements

SoPEC allows for a number of different dither matrix configurations up to 256 bytes wide. The dither matrix is stored in DRAM. Using either a single or double-buffer scheme a line of the dither matrix must be read in by the HCU over a SoPEC line time. SoPEC must produce 13824 dots per line for A4/Letter printing which takes 13824 cycles.

The following give the storage and bandwidths requirements for some of the possible configurations of the dither matrix.

4 Kbyte DRAM storage required for one 64×64 (preferred) byte dither matrix 6.25 Kbyte DRAM storage required for one 80×80 byte dither matrix 16 Kbyte DRAM storage required for four 64×64 byte dither matrices 64 Kbyte DRAM storage required for one 256×256 byte dither matrix It takes 4 or 8 read accesses to load a line of dither matrix into the dither matrix buffer, depending on whether we're using a single or double buffer (configured by DoubleLineBuff register).

28.4 Implementation

Figure 231:
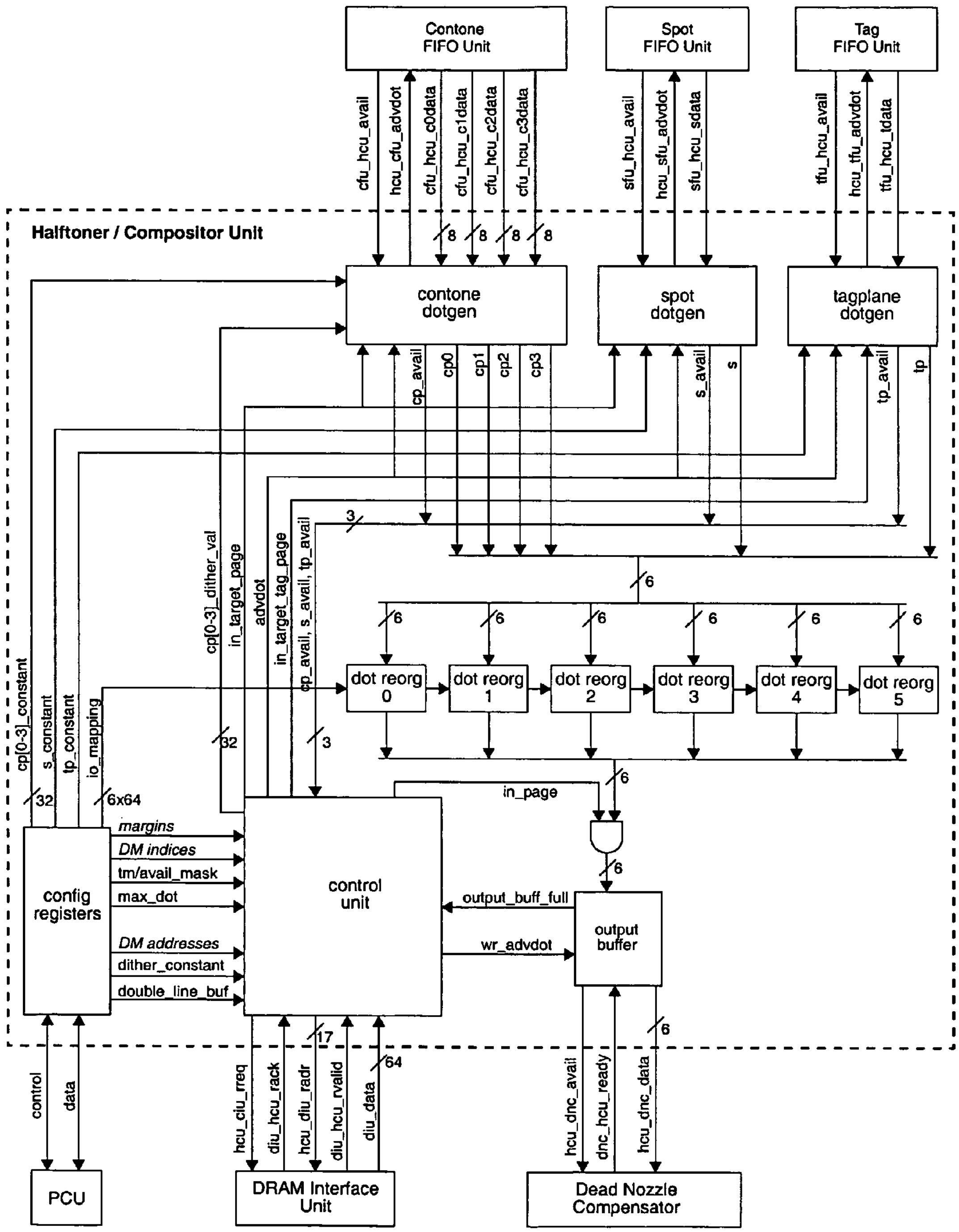
FIG. 231 shows a block diagram of the HCU

A block diagram of the HCU is given in FIG. 231.

28.4.1 Definition of I/O

TABLE 192

HCU port list and description

| Port name | Pins | I/O | Description |
|---|---|---|---|
| Clocks and reset | | | |
| Pclk | 1 | In | System clock. |
| prst_n | 1 | In | System reset, synchronous active low. |
| PCU interface | | | |
| pcu_hcu_sel | 1 | In | Block select from the PCU. When pcu_hcu_sel is high both pcu_adr and pcu_dataout are valid. |
| pcu_rwn | 1 | In | Common read/not-write signal from the PCU. |
| pcu_adr[7:2] | 6 | In | PCU address bus. Only 6 bits are required to decode the address space for this block. |
| pcu_dataout[31:0] | 32 | In | Shared write data bus from the PCU. |
| hcu_pcu_rdy | 1 | Out | Ready signal to the PCU. When hcu_pcu_rdy is high it indicates the last cycle of the access. For a write cycle this means pcu_dataout has been registered by the block and for a read cycle this means the data on hcu_pcu_datain is valid. |
| hcu_pcu_datain[31:0] | 32 | Out | Read data bus to the PCU. |

TABLE 192-continued

HCU port list and description

| Port name | Pins | I/O | Description |
|---|---|---|---|
| DIU interface | | | |
| hcu_diu_rreq | 1 | Out | HCU read request, active high. A read request must be accompanied by a valid read address. |
| diu_hcu_rack | 1 | In | Acknowledge from DIU, active high. Indicates that a read request has been accepted and the new read address can be placed on the address bus, hcu_diu_radr. |
| hcu_diu_radr[21:5] | 17 | Out | HCU read address. 17 bits wide (256-bit aligned word). |
| diu_hcu_rvalid | 1 | In | Read data valid, active high. Indicates that valid read data is now on the read data bus, diu_data. |
| diu_data[63:0] | 64 | In | Read data from DIU. |
| CFU interface | | | |
| cfu_hcu_avail | 1 | In | Indicates valid data present on cfu_hcu_c[3–0]data lines. |
| cfu_hcu_c0data[7:0] | 8 | In | Pixel of data in contone plane 0. |
| cfu_hcu_c1data[7:0] | 8 | In | Pixel of data in contone plane 1. |
| cfu_hcu_c2data[7:0] | 8 | In | Pixel of data in contone plane 2. |
| cfu_hcu_c3data[7:0] | 8 | In | Pixel of data in contone plane 3. |
| hcu_cfu_advdot | 1 | Out | Informs the CFU that the HCU has captured the pixel data on cfu_hcu_c[3–0]data lines and the CFU can now place the next pixel on the data lines. |
| SFU interface | | | |
| sfu_hcu_avail | 1 | In | Indicates valid data present on sfu_hcu_sdata. |
| sfu_hcu_sdata | 1 | In | Bi-level dot data. |
| hcu_sfu_advdot | 1 | Out | Informs the SFU that the HCU has captured the dot data on sfu_hcu_sdata and the SFU can now place the next dot on the data line. |
| TFU interface | | | |
| tfu_hcu_avail | 1 | In | Indicates valid data present on tfu_hcu_tdata. |
| tfu_hcu_tdata | 1 | In | Tag dot data. |
| hcu_tfu_advdot | 1 | Out | Informs the TFU that the HCU has captured the dot data on tfu_hcu_tdata and the TFU can now place the next dot on the data line. |
| DNC interface | | | |
| dnc_hcu_ready | 1 | In | Indicates that DNC is ready to accept data from the HCU. |
| hcu_dnc_avail | 1 | Out | Indicates valid data present on hcu_dnc_data. |
| hcu_dnc_data[5:0] | 6 | Out | Output bi-level dot data in 6 ink planes. |

28.4.2 Configuration Registers

The configuration registers in the HCU are programmed via the PCU interface. Refer to section 21.8.2 on page 321 for the description of the protocol and timing diagrams for reading and writing registers in the HCU. Note that since addresses in SoPEC are byte aligned and the PCU only supports 32-bit register reads and writes, the lower 2 bits of the PCU address bus are not required to decode the address space for the HCU. When reading a register that is less than 32 bits wide zeros should be returned on the upper unused bit(s) of hcu_pcu_datain. The configuration registers of the HCU are listed in Table 193.

TABLE 193

HCU Registers

| Address (HCU_base +) | Register Name | #bits | Value on Reset | Description |
|---|---|---|---|---|
| Control registers | | | | |
| 0x00 | Reset | 1 | 0x1 | A write to this register causes a reset of the HCU. |
| 0x04 | Go | 1 | 0x0 | Writing 1 to this register starts the HCU. Writing 0 to this register halts the HCU. When Go is asserted all counters, flags etc. are cleared or given their initial value, but configuration registers |

TABLE 193-continued

HCU Registers

| Address (HCU_base +) | Register Name | #bits | Value on Reset | Description |
|---|---|---|---|---|
| | | | | keep their values. When Go is deasserted the state-machines go to their idle states but all counters and configuration registers keep their values. The HCU should be started after the CFU, SFU, TFU, and DNC. This register can be read to determine if the HCU is running (1 = running, 0 = stopped). |
| Setup registers (constant for during processing) | | | | |
| 0x10 | AvailMask | 4 | 0x0 | Mask used to determine which of the dotgen units etc. are to be checked before a dot is generated by the HCU within the specified margins for the specified color plane. If the specified dotgen unit is stalled, then the HCU will also stall. See Table for bit allocation and definition. |
| 0x14 | TMMask | 4 | 0x0 | Same as AvailMask, but used in the top margin area before the appropriate target page is reached. |
| 0x18 | PageMarginY | 32 | 0x0000_0000 | The first line considered to be off the page. |
| 0x1C | MaxDot | 16 | 0x0000 | This is the maximum dot number − 1 present across a page. For example if a page contains 13824 dots, then MaxDot will be 13823. |
| 0x20 | TopMargin | 32 | 0x0000_0000 | The first line on a page to be considered within the target page for contone and spot data. (0 = first printed line of page) |
| 0x24 | BottomMargin | 32 | 0x0000_0000 | The first line in the target bottom margin for contone and spot data (i.e. first line after target page). |
| 0x28 | LeftMargin | 16 | 0x0000 | The first dot on a line within the target page for contone and spot data. |
| 0x2C | RightMargin | 16 | 0xFFFF | The first dot on a line within the target right margin for contone and spot data. |
| 0x30 | TagTopMargin | 32 | 0x0000_0000 | The first line on a page to be considered within the target page for tag data. (0 = first printed line of page) |
| 0x34 | TagBottomMargin | 32 | 0x0000_0000 | The first line in the target bottom margin for tag data (i.e. first line after target page). |
| 0x38 | TagLeftMargin | 16 | 0x0000 | The first dot on a line within the target page for tag data. |

TABLE 193-continued

HCU Registers

| Address (HCU_base +) | Register Name | #bits | Value on Reset | Description |
|---|---|---|---|---|
| 0x3C | TagRightMargin | 16 | 0xFFFF | The first dot on a line within the target right margin for tag data. |
| 0x44 | StartDMAdr[21:5] | 17 | 0x0_0000 | Points to the first 256-bit word of the first line of the dither matrix in DRAM. |
| 0x48 | EndDMAdr[21:5] | 17 | 0x0_0000 | Points to the last address of the group of four 256-bit reads (or 8 if single buffering) that reads in the last line of the dither matrix. |
| 0x4C | LineIncrement | 5 | 0x2 | The number of 256-bit words in DRAM from the start of one line of the dither matrix and the start of the next line, i.e. the value by which the DRAM address is incremented at the start of a line so that it points to the start of the next line of the dither matrix. |
| 0x50 | DMInitIndexC0 | 8 | 0x00 | If using the single-buffer scheme this register represents the initial index within 256-byte dither matrix line buffer for contone plane 0. If using double-buffer scheme, only the 7 lsbs are used. |
| 0x54 | DMLwrIndexC0 | 8 | 0x00 | If using the single-buffer scheme this register represents the lower index within 256-byte dither matrix line buffer for contone plane 0. If using double-buffer scheme, only the 7 lsbs are used. |
| 0x58 | DMUprIndexC0 | 8 | 0x3F | If using the single-buffer scheme this register represents the upper index within 256-byte dither matrix line buffer for contone plane 0. After reading the data at this location the index wraps to DMLwrIndexC0. If using double-buffer scheme, only the 7 lsbs are used. |
| 0x5C | DMInitIndexC1 | 8 | 0x00 | If using the single-buffer scheme this register represents the initial index within 256-byte dither matrix line buffer for contone plane 1. If using double-buffer scheme, only the 7 lsbs are used. |
| 0x60 | DMLwrIndexC1 | 8 | 0x00 | If using the single-buffer scheme this register represents the lower index within 256-byte dither matrix line buffer for contone plane 1. If using double-buffer scheme, only the 7 lsbs are used. |
| 0x64 | DMUprIndexC1 | 8 | 0x3F | If using the single-buffer scheme this register represents the upper index within 256-byte dither matrix line buffer for contone plane 1. After |

TABLE 193-continued

HCU Registers

| Address (HCU_base +) | Register Name | #bits | Value on Reset | Description |
|---|---|---|---|---|
| | | | | reading the data at this location the index wraps to DMLwrIndexC1. If using double-buffer scheme, only the 7 lsbs are used. |
| 0x68 | DMInitIndexC2 | 8 | 0x00 | If using the single-buffer scheme this register represents the initial index within 256-byte dither matrix line buffer for contone plane 2. If using double-buffer scheme, only the 7 lsbs are used. |
| 0x6C | DMLwrIndexC2 | 8 | 0x00 | If using the single-buffer scheme this register represents the lower index within 256-byte dither matrix line buffer for contone plane 2. If using double-buffer scheme, only the 7 lsbs are used. |
| 0x70 | DMUprIndexC2 | 8 | 0x3F | If using the single-buffer scheme this register represents the upper index within 256-byte dither matrix line buffer for contone plane 2. After reading the data at this location the index wraps to DMLwrIndexC2. If using double-buffer scheme, only the 7 lsbs are used. |
| 0x74 | DMInitIndexC3 | 8 | 0x00 | If using the single-buffer scheme this register represents the initial index within 256-byte dither matrix line buffer for contone plane 3. If using double-buffer scheme, only the 7 lsbs are used. |
| 0x78 | DMLwrIndexC3 | 8 | 0x00 | If using the single-buffer scheme this register represents the lower index within 256-byte dither matrix line buffer for contone plane 3. If using double-buffer scheme, only the 7 lsbs are used. |
| 0x7C | DMUprIndexC3 | 8 | 0x3F | If using the single-buffer scheme this register represents the upper index within 256-byte dither matrix line buffer for contone plane 3. After reading the data at this location the index wraps to DMLwrIndexC3. If using double-buffer scheme, only the 7 lsbs are used. |
| 0x80 | DoubleLineBuf | 1 | 0x1 | Selects the dither line buffer mode to be single or double buffer.<br>0 - single line buffer mode<br>1 - double line buffer mode |
| 0x84 to 0x98 | IOMappingLo | 6 × 32 | 0x0000_0000 | The dot reorg mapping for output inks 0 to 5. For each ink's 64-bit IOMapping value, |

TABLE 193-continued

HCU Registers

| Address (HCU_base +) | Register Name | #bits | Value on Reset | Description |
|---|---|---|---|---|
| | | | | IOMappingLo represents the low order 32 bits. |
| 0x9C to 0xB0 | IOMappingHi | 6 × 32 | 0x0000_0000 | The dot reorg mapping for output inks 0 to 5. For each ink's 64-bit IOMapping value, IOMappingHi represents the high order 32 bits. |
| 0xB4 to 0xC0 | cpConstant | 4 × 8 | 0x00 | The constant contone value to output for contone plane N when printing in the margin areas of the page. This value will typically be 0. |
| 0xC4 | sConstant | 1 | 0x0 | The constant bi-level value to output for spot when printing in the margin areas of the page. This value will typically be 0. |
| 0xC8 | tConstant | 1 | 0x0 | The constant bi-level value to output for tag data when printing in the margin areas of the page. This value will typically be 0. |
| 0xCC | DitherConstant | 8 | 0xFF | The constant value to use for dither matrix when the dither matrix is not available, i.e. when the signal dm_avail is 0. This value will typically be 0xFF so that cpConstant can easily be 0x00 or 0xFF without requiring a dither matrix (DitherConstant is primarily used for threshold dithering in the margin areas). |
| Debug registers (read only) | | | | |
| 0xD0 | HcuPortsDebug | 14 | N/A | Bit 13 = tfu_hcu_avail<br>Bit 12 = hcu_tfu_advdot<br>Bit 11 = sfu_hcu_avail<br>Bit 10 = hcu_sfu_advdot<br>Bit 9 = cfu_hcu_avail<br>Bit 8 = hcu_cfu_advdot<br>Bit 7 = dnc_hcu_ready<br>Bit 6 = hcu_dnc_avail<br>Bits 5–0 = hcu_dnc_data |
| 0xD4 | HcuDotgenDebug | 15 | N/A | Bit 14 = after_top_margin<br>Bit 13 = in_tag_target_page<br>Bit 12 = in_target_page<br>Bit 11 = tp_avail<br>Bit 10 = s_avail<br>Bit 9 = cp_avail<br>Bit 8 = dm_avail<br>Bit 7 = advdot<br>Bits 5–0 = [tp, s, cp3, cp2, cp1, cp0] (i.e. 6 bit input to dot reorg units) |
| 0xD8 | HcuDitherDebug1 | 17 | N/A | Bit 17 = advdot<br>Bit 16 = dm_avail<br>Bit 15–8 = cp1_dither_val<br>Bits 7–0 = cp0_dither_val |
| 0xDC | HcuDitherDebug2 | 17 | N/A | Bit 17 = advdot<br>Bit 16 = dm_avail<br>Bit 15–8 = cp3_dither_val<br>Bits 7–0 = cp2_dither_vall |

28.4.3 Control Unit

Figure 232:
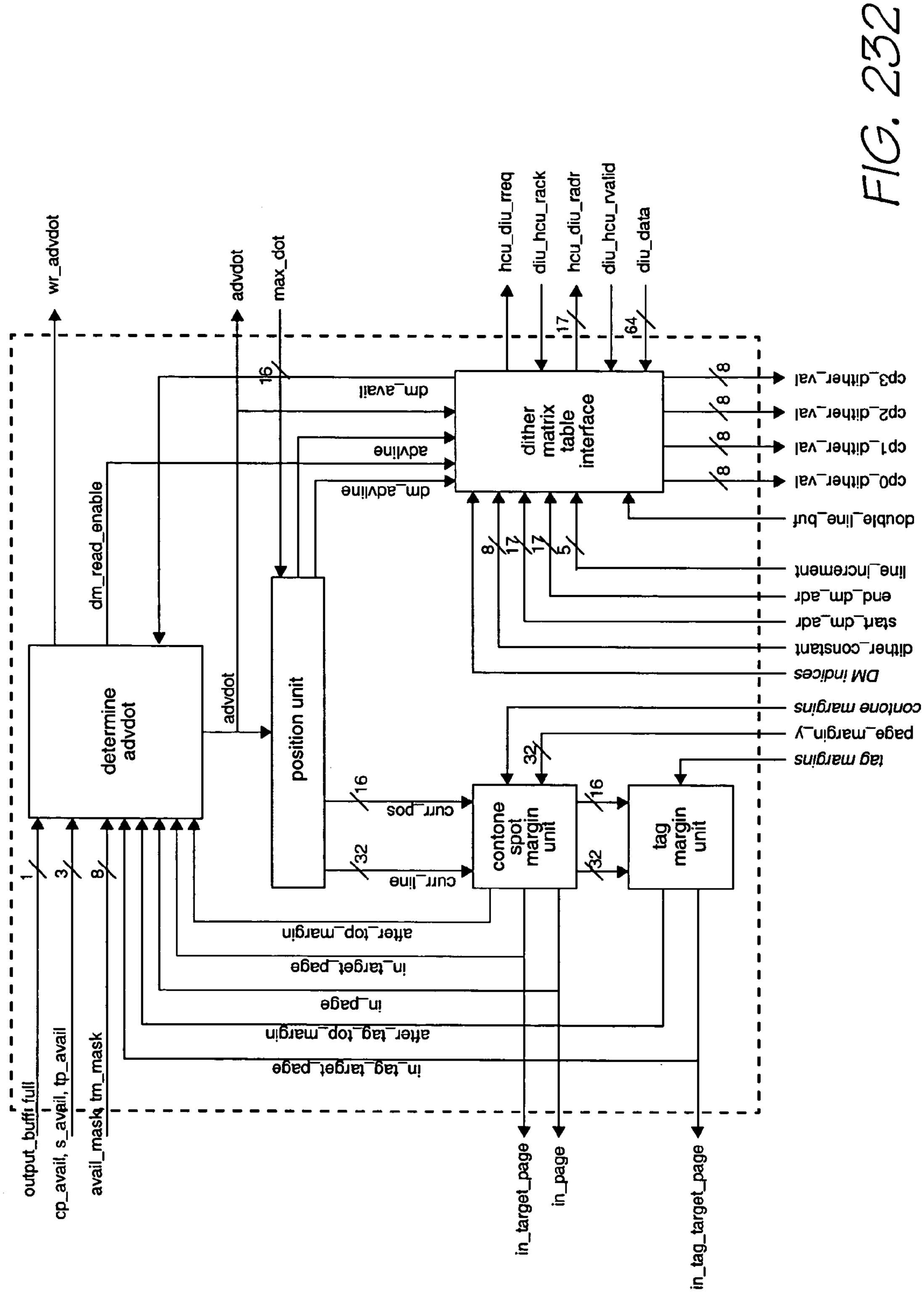
FIG. 232 shows a block diagram of the control unit

The control unit is responsible for controlling the overall flow of the HCU. It is responsible for determining whether or not a dot will be generated in a given cycle, and what dot will actually be generated—including whether or not the dot is in a margin area, and what dither cell values should be used at the specific dot location. A block diagram of the control unit is shown in FIG. 232.

The inputs to the control unit are a number of avail flags specifying whether or not a given dotgen unit is capable of supplying 'real' data in this cycle. The term 'real' refers to data generated from external sources, such as contone line buffers, bi-level line buffers, and tag plane buffers. Each dotgen unit informs the control unit whether or not a dot can be generated this cycle from real data. It must also check that the DNC is ready to receive data.

The contone/spot margin unit is responsible for determining whether the current dot coordinate is within the target contone/spot margins, and the tag margin unit is responsible for determining whether the current dot coordinate is within the target tag margins.

The dither matrix table interface provides the interface to DRAM for the generation of dither cell values that are used in the halftoning process in the contone dotgen unit.

28.4.3.1 Determine advdot

The HCU does not always require contone planes, bi-level or tag planes in order to produce a page. For example, a given page may not have a bi-level layer, or a tag layer. In addition, the contone and bi-level parts of a page are only required within the contone and bi-level page margins, and the tag part of a page is only required within the tag page margins. Thus output dots can be generated without contone, bi-level or tag data before the respective top margins of a page has been reached, and 0s are generated for all color planes after the end of the page has been reached (to allow later stages of the printing pipeline to flush).

Consequently the HCU has an AvailMask register that determines which of the various input avail flags should be taken notice of during the production of a page from the first line of the target page, and a TMMask register that has the same behaviour, but is used in the lines before the target page has been reached (i.e. inside the target top margin area). The dither matrix mask bit TMask[0] is the exception, it applies to all margins areas not just the top margin. Each bit in the AvailMask refers to a particular avail bit: if the bit in the AvailMask register is set, then the corresponding avail bit must be 1 for the HCU to advance a dot. The bit to avail correspondence is shown in Table 194. Care should be taken with TMMask—if the particular data is not available after the top margin has been reached, then the HCU will stall. Note that the avail bits for contone and spot colors are ANDed with in_target_page after the target page area has been reached to allow dot production in the contone/spot margin areas without needing any data in the CFU and SFU. The avail bit for tag color is ANDed with in_tag_target_page after the target tag page area has been reached to allow dot production in the tag margin areas without needing any data in the TFU.

TABLE 194

Correspondence between bit in AvailMask and avail flag

| bit # in AvailMask | avail flag | description |
|---|---|---|
| 0 | dm__avail | dither matrix data available |
| 1 | cp__avail | contone pixels available |
| 2 | s__avail | spot color available |
| 3 | tp__avail | tag plane available |

Figure 233:
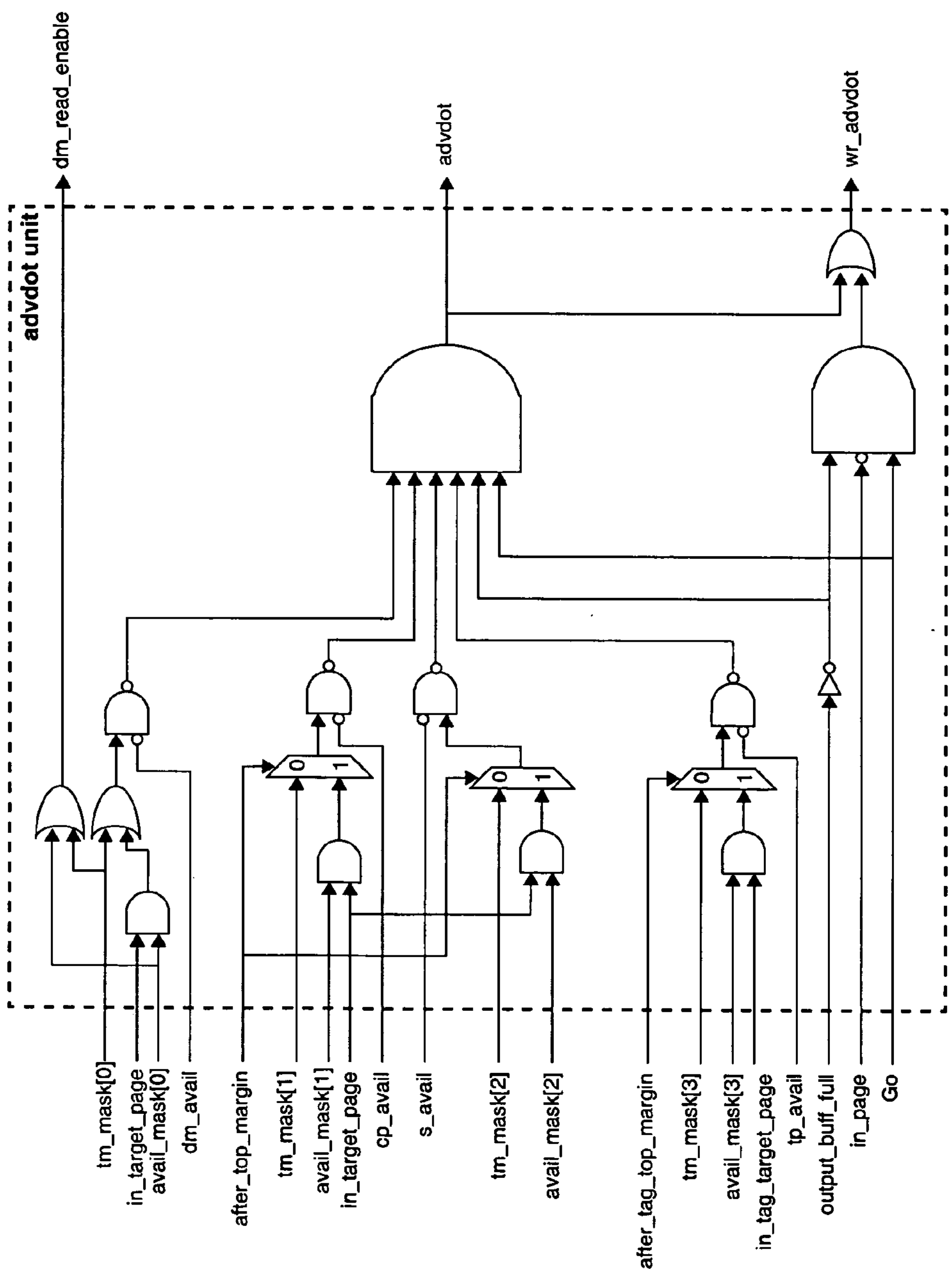
FIG. 233 shows a block diagram of determine advdot unit

Each of the input avail bits is processed with its appropriate mask bit and the after_top_margin flag (note the dither matrix is the exception it is processed with in_target_page). The output bits are ANDed together along with Go and output_buff_full (which specifies whether the output buffer is ready to receive a dot in this cycle) to form the output bit advdot. We also generate wr_advdot. In this way, if the output buffer is full or any of the specified avail flags is clear, the HCU will stall. When the end of the page is reached, in_page will be deasserted and the HCU will continue to produce 0 for all dots as long as the DNC requests data. A block diagram of the determine advdot unit is shown in FIG. 233.

The advance dot block also determines if current page needs dither matrix, it indicates to the dither matrix table interface block via the dm_read_enable signal. If no dither is required in the margins or in the target page then dm_read_enable will be 0 and no dither will be read in for this page.

28.4.3.2 Position Unit

The position unit is responsible for outputting the position of the current dot (curr_pos, curr_line) and whether or not this dot is the last dot of a line (advline). Both curr_pos and curr_line are set to 0 at reset or when Go transitions from 0 to 1. The position unit relies on the advdot input signal to advance through the dots on a page. Whenever an advdot pulse is received, curr_pos gets incremented. If curr_pos equals max_dot then an advline pulse is generated as this is the last dot in a line, curr_line gets incremented, and the curr_pos is reset to 0 to start counting the dots for the next line.

The position unit also generates a filtered version of advline called dm_advline to indicate to the dither matrix pointers to increment to the next line. The dm_advline is only incremented when dither is required for that line.

```
if ((after__top__margin AND avail__mask[0]) OR tm__mask[0]) then
    dm__advline = advline
else
    dm__advline = 0
```

28.4.3.3 Margin Unit

Figure 234:
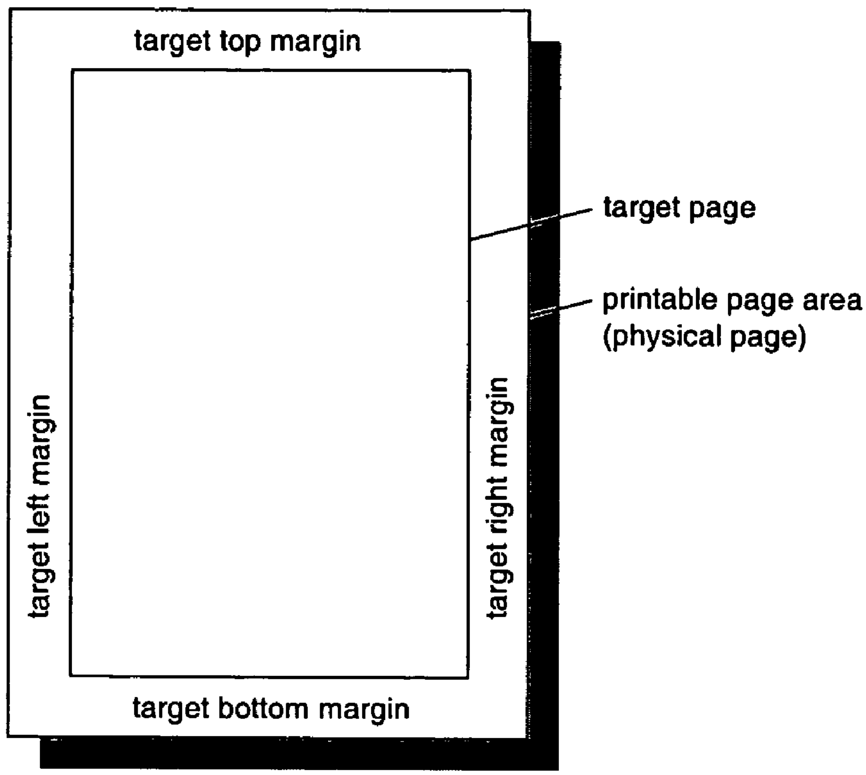
FIG. 234 shows a page structure

The responsibility of the margin unit is to determine whether the specific dot coordinate is within the page at all, within the target page or in a margin area (see FIG. 234). This unit is instantiated for both the contone/spot margin unit and the tag margin unit.

The margin unit takes the current dot and line position, and returns three flags.

- the first, in_page is 1 if the current dot is within the page, and 0 if it is outside the page.
- the second flag, in_target_page, is 1 if the dot coordinate is within the target page area of the page, and 0 if it is within the target top/left/bottom/right margins.
- the third flag, after_top_margin, is 1 if the current dot is below the target top margin, and 0 if it is within the target top margin.

Figure 235:
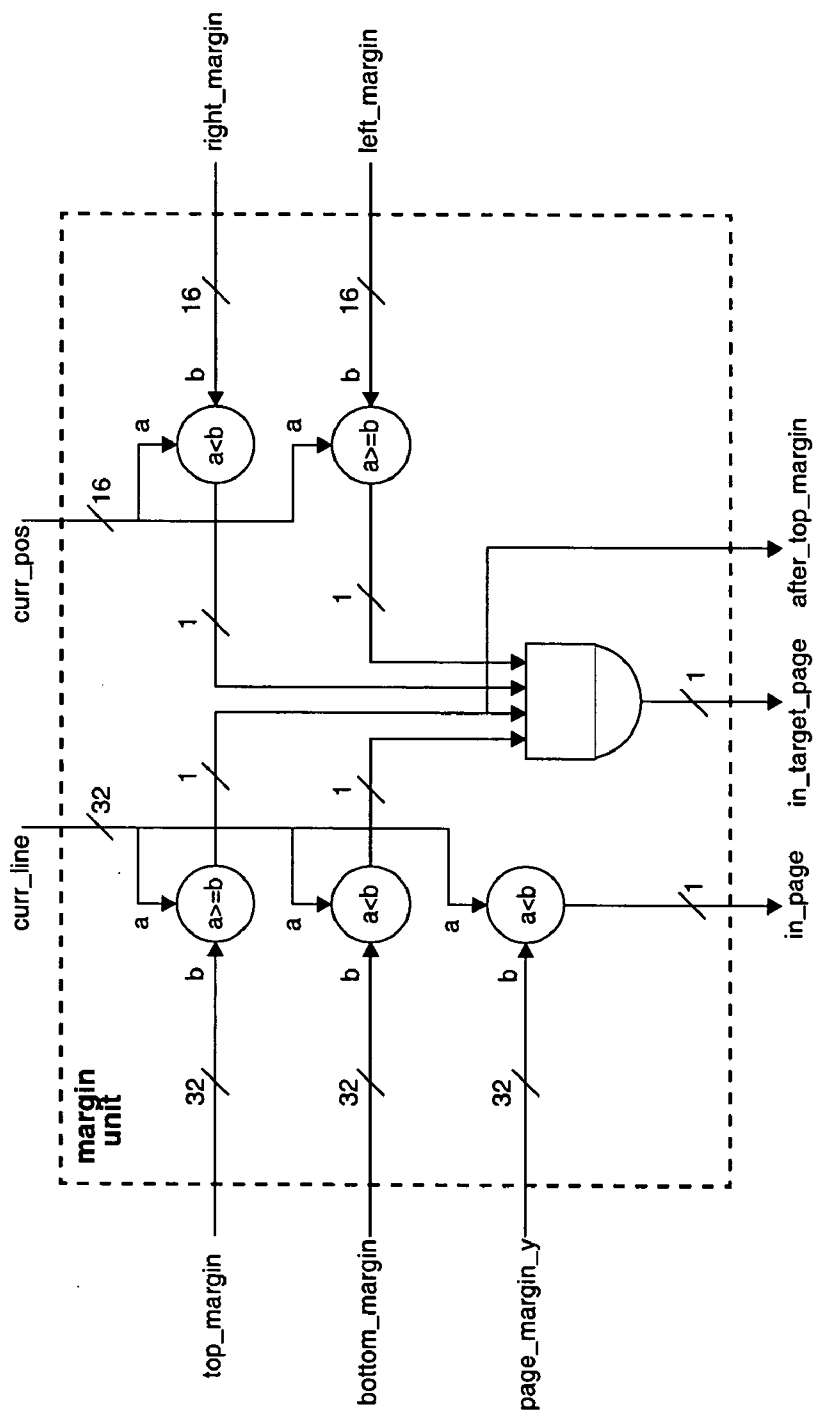
FIG. 235 shows a block diagram of a margin unit

A block diagram of the margin unit is shown in FIG. 235.

28.4.3.4 Dither Matrix Table Interface

The dither matrix table interface provides the interface to DRAM for the generation of dither cell values that are used in the halftoning process in the contone dotgen unit. The control flag dm_read_enable enables the reading of the dither matrix table line structure from DRAM. If dm_read_enable is 0, the dither matrix is not specified in DRAM and no DRAM accesses are attempted. The dither matrix table interface has an output flag dm_avail which specifies if the current line of the specified matrix is available. The HCU can be directed to stall when dm_avail is 0 by setting the appropriate bit in the HCU's AvailMask or TMMask registers. When dm_avail is 0 the value in the DitherConstant register is used as the dither cell values that are output to the contone dotgen unit.

Figure 236:
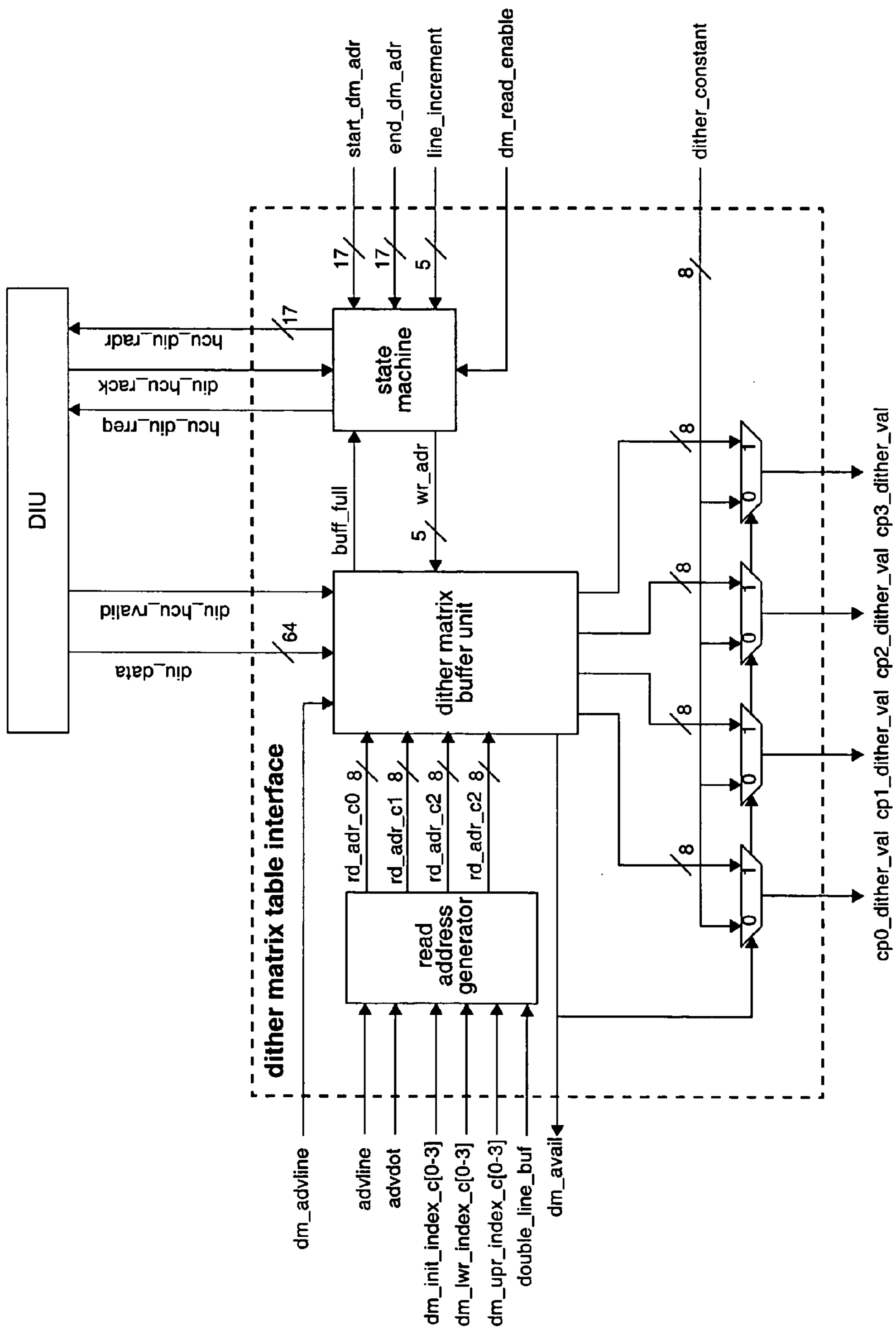
FIG. 236 shows a block diagram of a dither matrix table interface

The dither matrix table interface consists of a state machine that interfaces to the DRAM interface, a dither matrix buffer that provides dither matrix values, and a unit to generate the addresses for reading the buffer. FIG. 236 shows a block diagram of the dither matrix table interface.

28.4.3.5 Dither Data Structure in DRAM

The dither matrix is stored in DRAM in 256-bit words, transferred to the HCU in 64-bit words and consumed by the HCU in bytes. Table 195 shows the 64-bit words mapping to 256-bit word addresses, and Table 196 shows the 8-bits dither value mapping in the 64-bits word.

TABLE 195

Dither Data stored in DRAM

| Address[21:5] | Data[255:0] | | | |
|---|---|---|---|---|
| 00000 | D3 [255:192] | D2 [191:128] | D1 [127:64] | D0 [63:0] |
| 00001 | D7 [255:192] | D6 [191:128] | D5 [127:64] | D4 [63:0] |
| 00010 | D11 [255:192] | D10 [191:128] | D9 [127:64] | D8 [63:0] |
| 00011 | D15 [255:192] | D14 [191:128] | D13 [127:64] | D12 [63:0] |
| 00100 | D19 [255:192] | D18 [191:128] | D17 [127:64] | D16 [63:0] |
| etc | | | | |

When the HCU first requests data from DRAM, the 64-bits word transfer order will be D0,D1,D2,D3. On the second request the transfer order will be D4,D5,D6,D7 and so on for other requests.

TABLE 196

Dither data stored in HCUs line buffer

| Dither index [7:0] | Data[7:0] |
|---|---|
| 00 | D0[7:0] |
| 01 | D0[15:8] |
| 02 | D0[23:16] |
| 03 | D0[31:24] |
| 04 | D0[39:32] |
| 05 | D0[47:40] |
| 06 | D0[55:48] |
| 07 | D0[63:56] |
| 08 | D1[7:0] |
| 09 | D1[15:8] |
| 0A | D1[23:16] |
| 0B | D1[31:24] |
| 0C | D1[39:32] |
| 0D | D1[47:40] |
| 0E | D1[55:48] |
| 0F | D1[63:56] |
| 10 | D2[7:0] |
| 11 | D2[15:8] |
| 12 | D2[23:16] |
| 13 | D2[32:24] |
| 14 | D2[39:32] |
| 15 | D2[47:40] |
| 16 | D2[55:48] |
| 17 | D2[63:56] |
| 18 | D3[7:0] |
| 19 | D3[15:8] |
| 1A | D3[23:16] |
| 1B | D3[31:24] |
| 1C | D3[39:32] |
| 1D | D3[47:40] |
| 1E | D3[55:48] |
| 1F | D3[63:56] |
| 20 | D4[7:0] |
| 21 | D4[15:8] |
| 22 | D4[23:16] |
| 23 | D4[31:24] |
| 24 | D4[39:32] |
| 25 | D4[47:40] |
| 26 | D4[55:48] |
| 27 | D4[63:56] |
| 28 | D5[7:0] |
| 29 | D5[15:8] |
| 2A | D5[23:16] |
| 2B | D5[31:24] |
| 2C | D5[39:32] |
| 2D | D5[47:40] |
| 2E | D5[55:48] |
| 2F | D5[63:56] |
| etc. | etc. |

28.4.3.5.1 Dither Matrix Buffer

The state machine loads dither matrix table data a line at a time from DRAM and stores it in a buffer. A single line of the dither matrix is either 256 or 128 8-bit entries, depending on the programmable bit DoubleLineBuf. If this bit is enabled, a double-buffer mechanism is employed such that while one buffer is read from for the current line's dither matrix data (8 bits representing a single dither matrix entry), the other buffer is being written to with the next line's dither matrix data (64-bits at a time). Alternatively, the single buffer scheme can be used, where the data must be loaded at the end of the line, thus incurring a delay.

The single/double buffer is implemented using a 256 byte 3-port register array, two reads, one write port, with the reads clocked at double the system clock rate (320 MHz) allowing 4 reads per clock cycle.

The dither matrix buffer unit also provides the mechanism for keeping track of the current read and write buffers, and providing the mechanism such that a buffer cannot be read from until it has been written to. In this case, each buffer is a line of the dither matrix, i.e. 256 or 128 bytes.

The dither matrix buffer maintains a read and write pointer for the dither matrix. The output value dm_avail is derived by comparing the read and write pointers to determine when the dither matrix is not empty. The write pointer wr_adr is incremented each time a 64-bit word is written to the dither matrix buffer and the read pointer rd_ptr is incremented each time dm_advline is received. If double_line_buf is 0 the rd_ptr will increment by 2, otherwise it will increment by 1. If the dither matrix buffer is full then no further writes will be allowed (buff_full=1), or if the buffer is empty no further buffer reads are allowed (buff_emp=1).

The read addresses are byte aligned and are generated by the read address generator. A single dither matrix entry is represented by 8 bits and an entry is read for each of the four contone planes in parallel. If double buffer is used (double_line_buf=1) the read address is derived from 7-bit address from the read address generator and 1-bit from the read pointer. If double_line_buf=0 then the read address is the full 8-bits from the read address generator.

```
if (double_line_buf = = 1 )then
    read_port[7:0]  =  {rd_ptr[0],rd_adr[6:0] }         //
concatenation
else
    read_port[7:0] = rd_adr[7:0]
```

28.4.3.5.2 Read Address Generator

For each contone plane there is a initial, lower and upper index to be used when reading dither cell values from the dither matrix double buffer. The read address for each plane is used to select a byte from the current 256-byte read buffer. When Go gets set (0 to 1 transition), or at the end of a line, the read addresses are set to their corresponding initial index. Otherwise, the read address generator relies on advdot to advance the addresses within the inclusive range specified the lower and upper indices, represented by the following pseudocode:

```
if (advdot = = 1) then
    if (advline = = 1) then
        rd_adr = dm_init_index
    elsif (rd_adr = = dm_upr_index) then
        rd_adr = dm_lwr_index
    else
        rd_adr ++
else
    rd_adr = rd_adr
```

28.4.3.5.3 State Machine

Figure 238:
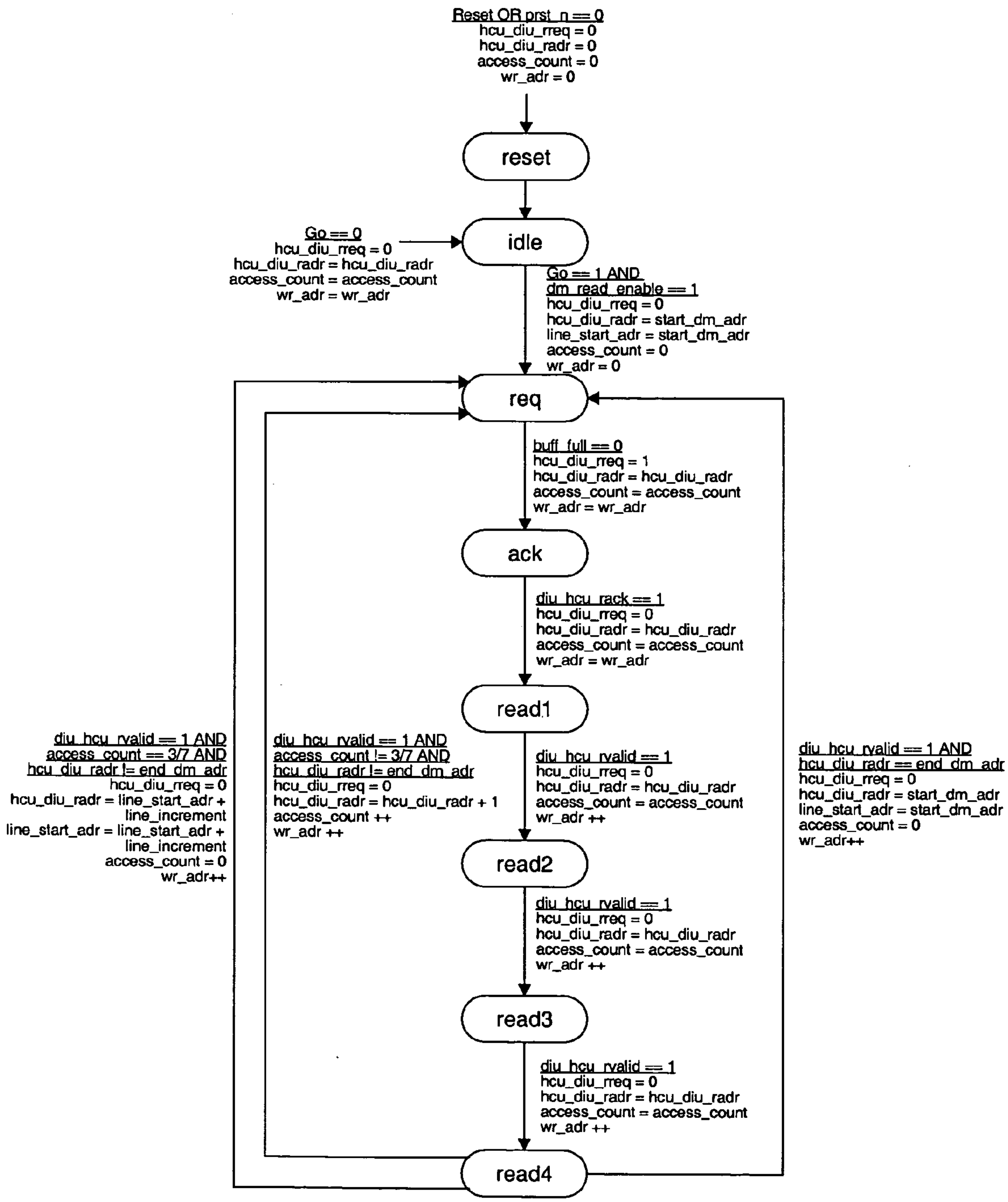
FIG. 238 shows a state machine to read dither matrix table

The dither matrix is read from DRAM in single 256-bit accesses, receiving the data from the DIU over 4 clock cycles (64-bits per cycle). The protocol and timing for read accesses to DRAM is described in section 20.9.1 on page 240. Read accesses to DRAM are implemented by means of the state machine described in FIG. 238.

All counters and flags should be cleared after reset or when Go transitions from 0 to 1. While the Go bit is 1, the state machine relies on the dm_read_enable bit to tell it whether to attempt to read dither matrix data from DRAM. When dm_read_enable is clear, the state machine does nothing and remains in the idle state. When dm_read_enable is set, the state machine continues to load dither matrix data, 256-bits at a time (received over 4 clock cycles, 64 bits per cycle), while there is space available in the dither matrix buffer, (buff_full !=1).

The read address and line_start_adr are initially set to start_dm_adr. The read address gets incremented after each read access. It takes 4 or 8 read accesses to load a line of dither matrix into the dither matrix buffer, depending on whether we're using a single or double buffer. A count is kept of the accesses to DRAM. When a read access completes and access_count equals 3 or 7, a line of dither matrix has just been loaded from and the read address is updated to line_start_adr plus line_increment so it points to the start of the next line of dither matrix. (line_start_adr is also updated to this value). If the read address equals end_dm_adr then the next read address will be start_dm_adr, thus the read address wraps to point to the start of the area in DRAM where the dither matrix is stored.

The write address for the dither matrix buffer is implemented by means of a modulo-32 counter that is initially set to 0 and incremented when diu_hcu_rvalid is asserted.

Figure 237:
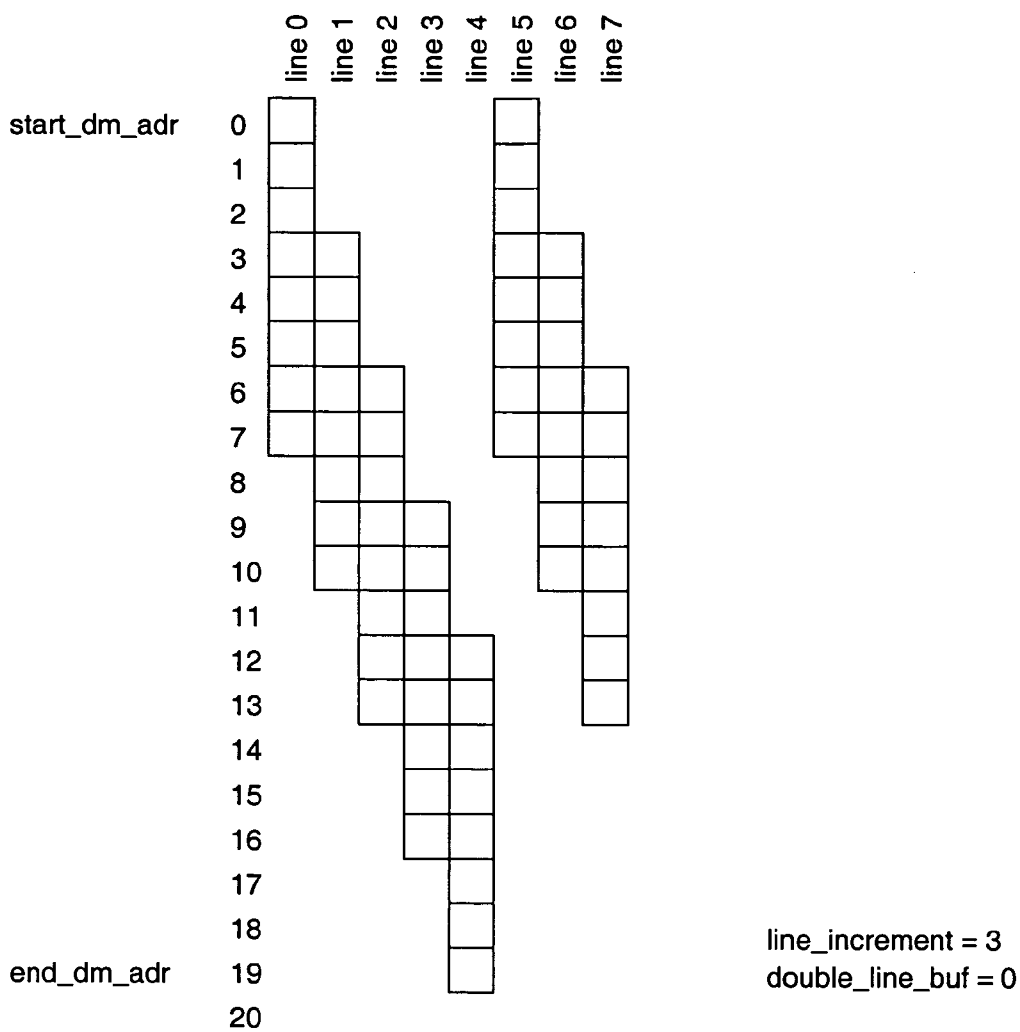
FIG. 237 shows an example of reading lines of dither matrix from DRAM

FIG. 237 shows an example of setting start_dm_adr and end_dm_adr values in relation to the line increment and double line buffer settings. The calculation of end_dm_adr is

```
// end_dm_adr calculation
dm_height = Dither matrix height in lines
if (double_line_buf = = 1)         //
    end_dm_adr[21:5] = start_dm_adr[21:5] + (((dm_height –
1)*line_inc) + 3) << 5)
else
    end_dm_adr[21:5] = start_dm_adr[21:5] + (((dm_height –
1)*line_inc) + 7) << 5)
```

28.4.4 Contone Dotgen Unit

The contone dotgen unit is responsible for producing a dot in up to 4 color planes per cycle. The contone dotgen unit also produces a cp_avail flag which specifies whether or not contone pixels are currently available, and the output hcu_cfu_advdot to request the CFU to provide the next contone pixel in up to 4 color planes.

Figure 239:
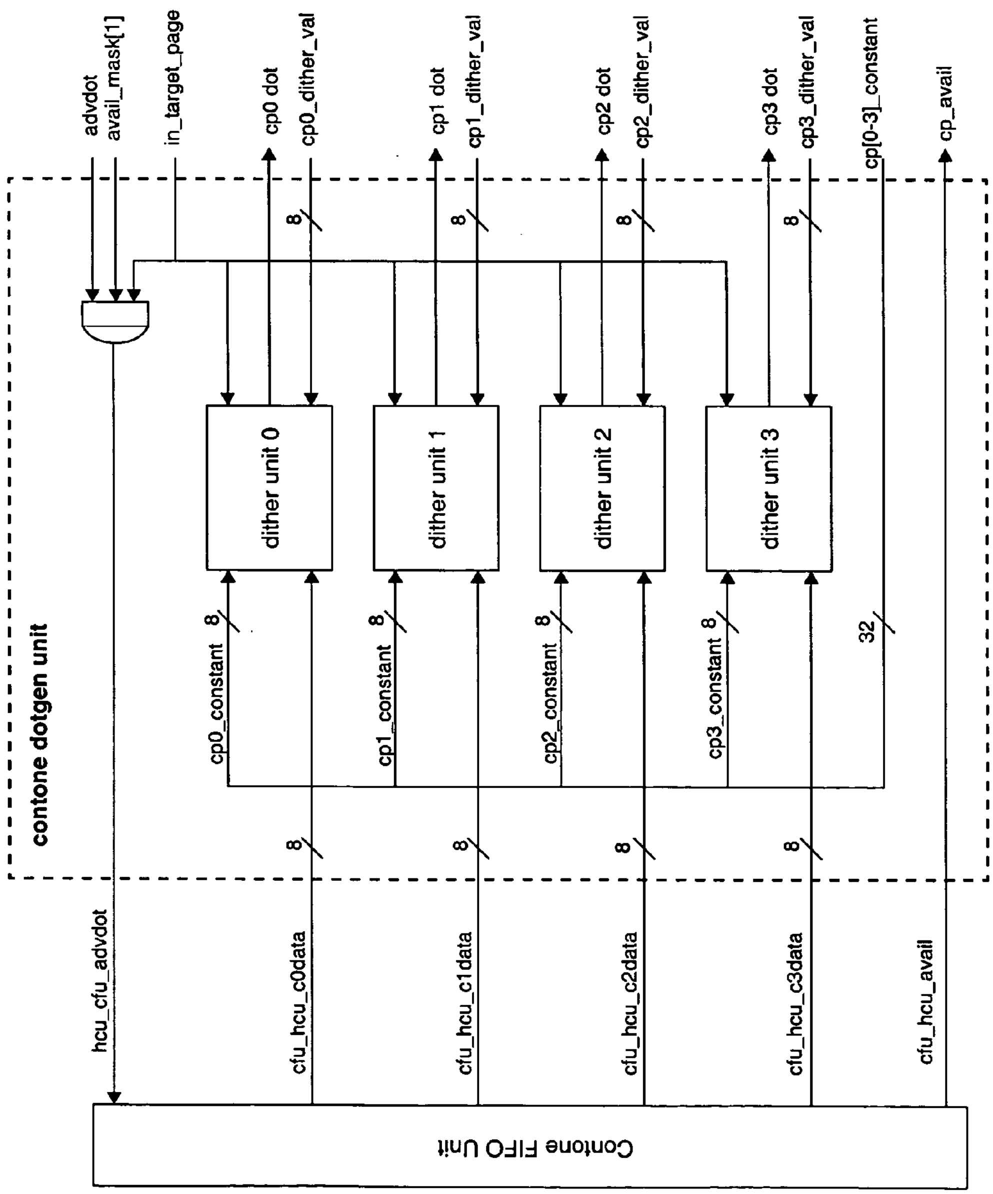
FIG. 239 shows a contone dotgen unit

The block diagram for the contone dotgen unit is shown in FIG. 239.

A dither unit provides the functionality for dithering a single contone plane. The contone image is only defined within the contone/spot margin area. As a result, if the input flag in_target_page is 0, then a constant contone pixel value is used for the pixel instead of the contone plane.

The resultant contone pixel is then halftoned. The dither value to be used in the halftoning process is provided by the control data unit. The halftoning process involves a comparison between a pixel value and its corresponding dither value. If the 8-bit contone value is greater than or equal to the 8-bit dither matrix value a 1 is output. If not, then a 0 is output. This means each entry in the dither matrix is in the range 1–255 (0 is not used).

Note that constant use is dependant on the in_target_page signal only, if in_target_page is 1 then the cfu_hcu_c*_data should be allowed to pass through, regardless of the stalling behaviour or the avail_mask[1] setting. This allows a constant value to be setup on the CFU output data, and the use of different constants while inside and outside the target page. The hcu_cfu_advdot will always be zero if the avail_mask[1] is zero.

28.4.5 Spot Dotgen Unit

The spot dotgen unit is responsible for producing a dot of bi-level data per cycle. It deals with bi-level data (and therefore does not need to halftone) that comes from the LBD via the SFU. Like the contone layer, the bi-level spot layer is only defined within the contone/spot margin area. As a result, if input flag in_target_page is 0, then a constant dot value (typically this would be 0) is used for the output dot.

The spot dotgen unit also produces a s_avail flag which specifies whether or not spot dots are currently available for this spot plane, and the output hcu_sfu_advdot to request the SFU to provide the next bi-level data value. The spot dotgen unit can be represented by the following pseudocode:

```
s_avail = sfu_hcu_avail
if (in_target_page = = 1 AND avail_mask[2] = = 0 )OR
          (in_target_page = = 0) then
     hcu_sfu_advdot = 0
else
     hcu_sfu_advdot = advdot
if (in_target_page = = 1) then
     sp = sfu_hcu_sdata
else
     sp = sp_constant
```

Note that constant use is dependant on the in target_page signal only, if in_target_page is 1 then the sfu_hcu_data should be allowed to pass through, regardless of the stalling behaviour or the avail_mask setting. This allows a constant value to be setup on the SFU output data, and the use of different constants while inside and outside the target page. The hcu_sfu_advdot will always be zero if the avail_mask [2] is zero.

28.4.6 Tag Dotgen Unit

This unit is very similar to the spot dotgen unit (see Section 28.4.5) in that it deals with bi-level data, in this case from the TE via the TFU. The tag layer is only defined within the tag margin area. As a result, if input flag in_tag_target_page is 0, then a constant dot value, tp_constant (typically this would be 0), is used for the output dot. The tagplane dotgen unit also produces a tp_avail flag which specifies whether or not tag dots are currently available for the tagplane, and the output hcu_tfu_advdot to request the TFU to provide the next bi-level data value.

The hcu_tfu_advdot generation is similar to the SFU and CFU, except it depends only on in_target_page and advdot. It does not take into account the avail mask when inside the target page.

28.4.7 Dot Reorg Unit

The dot reorg unit provides a means of mapping the bi-level dithered data, the spot0 color, and the tag data to output inks in the actual printhead. Each dot reorg unit takes a set of 6 1-bit inputs and produces a single bit output that represents the output dot for that color plane.

The output bit is a logical combination of any or all of the input bits. This allows the spot color to be placed in any output color plane (including infrared for testing purposes), black to be merged into cyan, magenta and yellow (in the case of no black ink in the Memjet printhead), and tag dot data to be placed in a visible plane. An output for fixative can readily be generated by simply combining desired input bits.

The dot reorg unit contains a 64-bit lookup to allow complete freedom with regards to mapping. Since all possible combinations of input bits are accounted for in the 64 bit lookup, a given dot reorg unit can take the mapping of other reorg units into account. For example, a black plane reorg unit may produce a 1 only if the contone plane 3 or spot color inputs are set (this effectively composites black bi-level over the contone). A fixative reorg unit may generate a 1 if any 2 of the output color planes is set (taking into account the mappings produced by the other reorg units). If dead nozzle replacement is to be used (see section 29.4.2 on page 473), the dot reorg can be programmed to direct the dots of the specified color into the main plane, and 0 into the other. If a nozzle is then marked as dead in the DNC, swapping the bits between the planes will result in 0 in the dead nozzle, and the required data in the other plane.

If dead nozzle replacement is to be used, and there are no tags, the TE can be programmed with the position of dead nozzles and the resultant pattern used to direct dots into the specified nozzle row. If only fixed background TFS is to be used, a limited number of nozzles can be replaced. If variable tag data is to be used to specify dead nozzles, then large numbers of dead nozzles can be readily compensated for.

The dot reorg unit can be used to average out the nozzle usage when two rows of nozzles share the same ink and tag encoding is not being used. The TE can be programmed to produce a regular pattern (e.g. 0101 on one line, and 1010 on the next) and this pattern can be used as a directive as to direct dots into the specified nozzle row.

Figure 240:
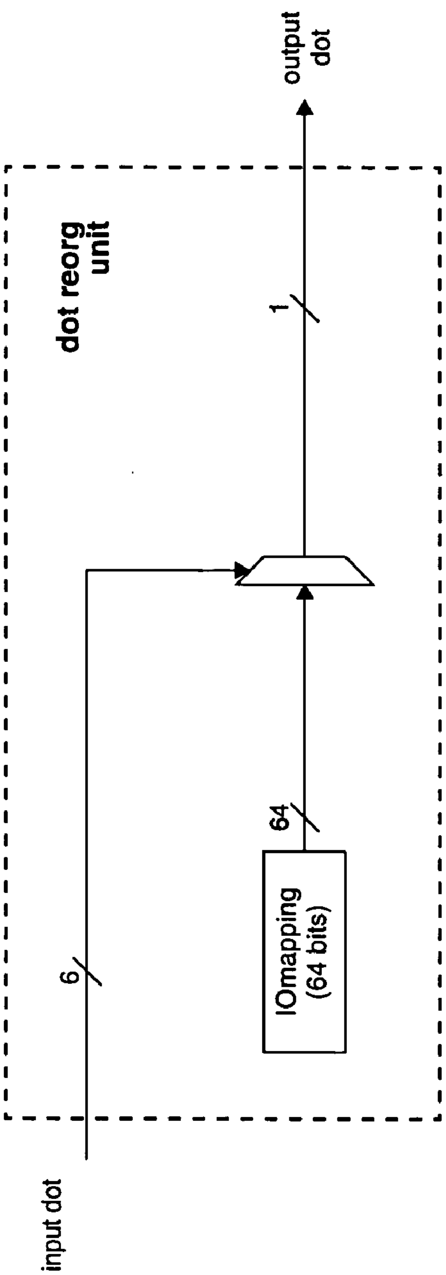
FIG. 240 shows a block diagram of dot reorg unit

Each reorg unit contains a 64-bit IOMapping value programmable as two 32-bit HCU registers, and a set of selection logic based on the 6-bit dot input ($2^6$=64 bits), as shown in FIG. 240. The mapping of input bits to each of the 6 selection bits is as defined in Table 197.

TABLE 197

Mapping of input bits to 6 selection bits

| address bit of lookup | tied to | likely interpretation |
|---|---|---|
| 0 | bi-level dot from contone layer 0 | cyan |
| 1 | bi-level dot from contone layer 1 | magenta |
| 2 | bi-level dot from contone layer 2 | yellow |
| 3 | bi-level dot from contone layer 3 | black |
| 4 | bi-level spot0 dot | black |
| 5 | bi-level tag dot | infra-red |

28.4.8 Output Buffer

The output buffer de-couples the stalling behaviour of the feeder units from the stalling behaviour of the DNC. The larger the buffer the greater de-coupling. Currently the output buffer size is 2, but could be increased if needed at the cost of extra area.

If the Go bit is set to 0 no read or write of the output buffer is permitted. On a low to high transition of the Go bit the contents of the output buffer are cleared.

The output buffer also implements the interface logic to the DNC. If there is data in the output buffer the hcu_dnc_avail signal will be 1, otherwise is will be 0. If both hcu_dnc_avail and dnc_hcu_ready are 1 then data is read from the output buffer.

On the write side if there is space available in the output buffer the logic indicates to the control unit via the output_buff_full signal. The control unit will then allow writes to the output buffer via the wr_advdot signal. If the writes to the output buffer are after the end of a page (indicated by in_page equal to 0) then all dots written into the output buffer are set to zero.

28.4.8.1 HCU to DNC Interface

Figure 241:
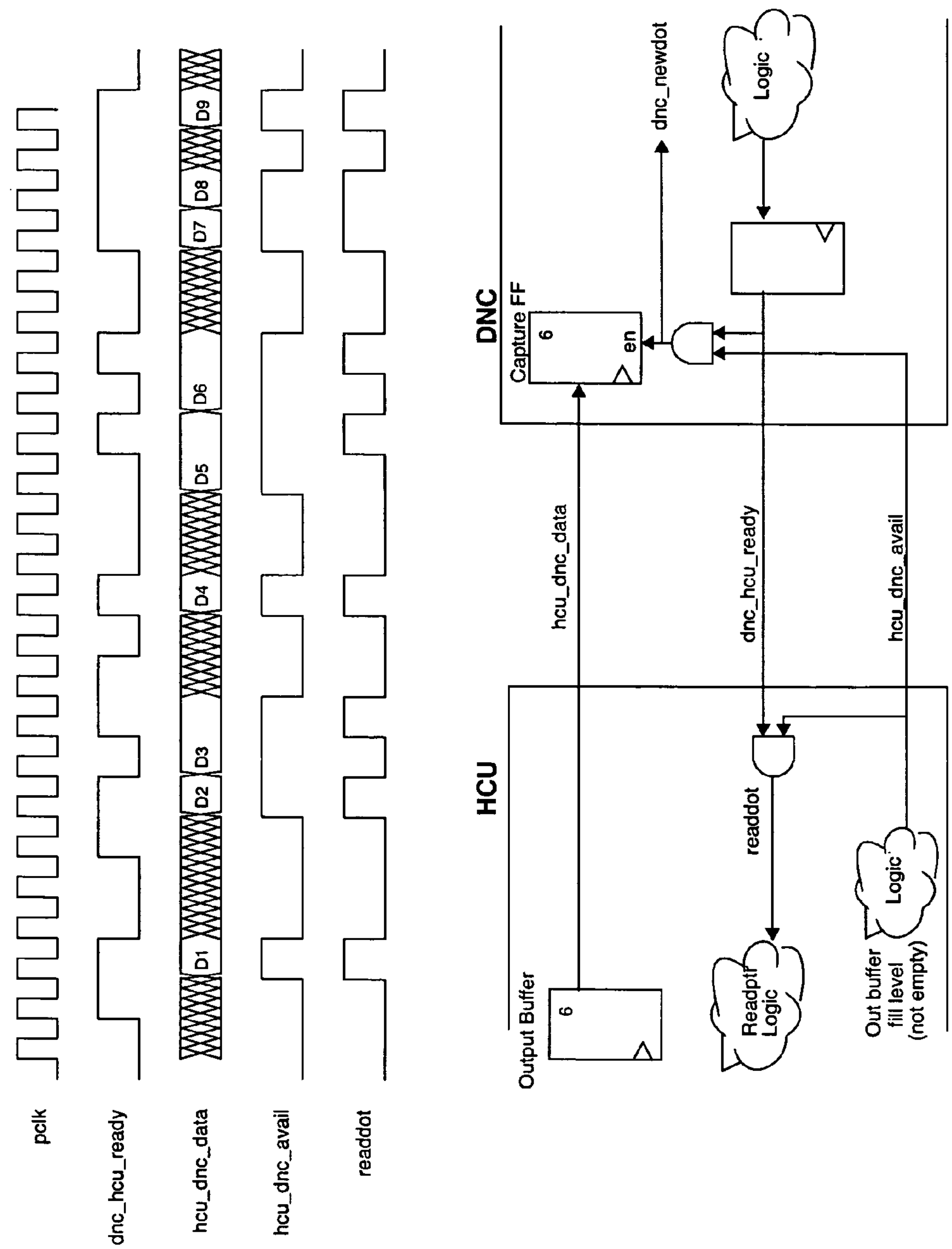
FIG. 241 shows an HCU to DNC interface (also used in DNC to DWU, LLU to PHI)

FIG. 241 shows the timing diagram and representative logic of the HCU to DNC interface. The hcu_dnc_avail signal indicate to the DNC that the HCU has data available. The dnc_hcu_ready signal indicates to the HCU that the DNC is ready to accept data. When both signals are high data is transferred from the HCU to the DNC. Once the HCU indicates it has data available (setting the hcu_dnc_avail signal high) it can only set the hcu_dnc_avail low again after a dot is accepted by the DNC.

28.4.9 Feeder to HCU Interfaces

Figure 242:
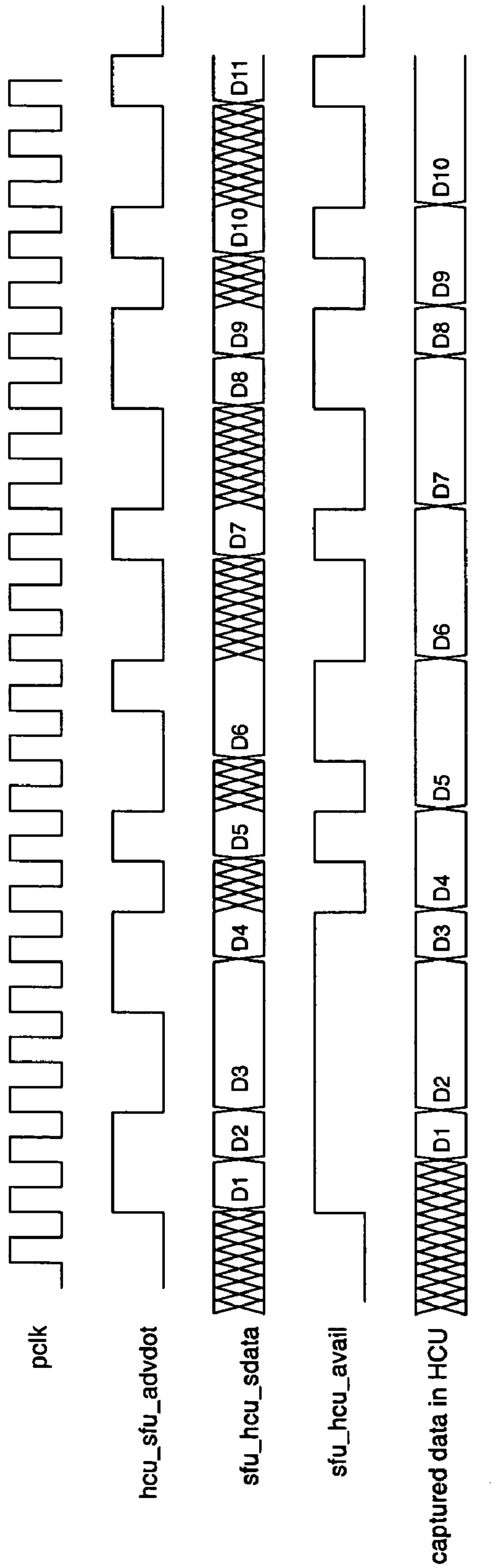
FIG. 242 shows SFU to HCU interface (all feeders to HCU)
Figure 243:
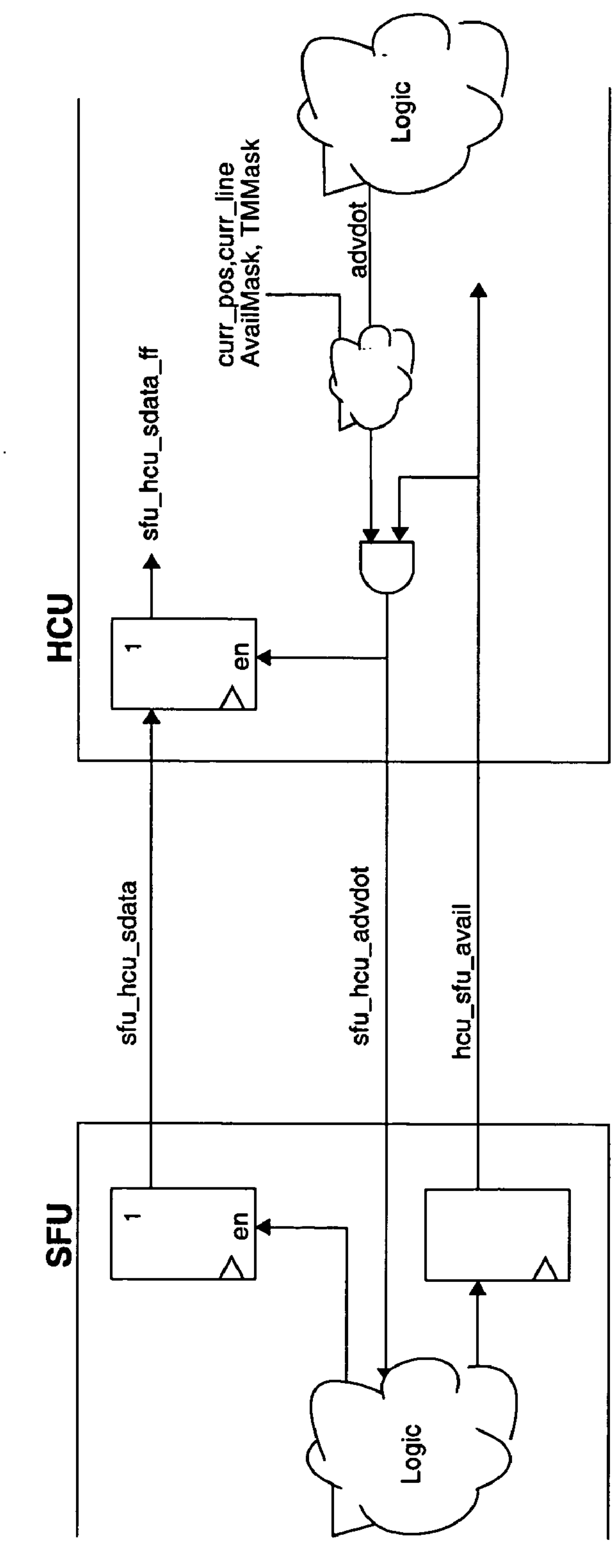
FIG. 243 shows representative logic of the SFU to HCU interface

FIG. 242 shows the feeder unit to HCU interface timing diagram, and FIG. 243 shows representative logic of the interface with the register positions. sfu_hcu_data and sfu_hcu_avail are always registered while the sfu_hcu_advdot is not. The hcu_sfu_avail signal indicates to the HCU that the feeder unit has data available, and sfu_hcu_advdot indicates to the feeder unit that the HCU has captured the last dot. The HCU can never produce an advance dot pulse while the avail is low. The diagrams show the example of the SFU to HCU interface, but the same interface is used for the other feeder units TFU and CFU.

29 Dead Nozzle Compensator (DNC)

29.1 Overview

Figure 244:
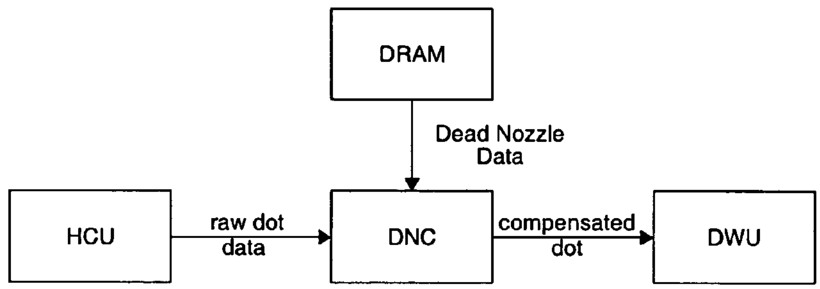
FIG. 244 shows a high-level block diagram of DNC

The Dead Nozzle Compensator (DNC) is responsible for adjusting Memjet dot data to take account of non-functioning nozzles in the Memjet printhead. Input dot data is supplied from the HCU, and the corrected dot data is passed out to the DWU. The high level data path is shown by the block diagram in FIG. 244.

The DNC compensates for a dead nozzles by performing the following operations:

Dead nozzle removal, i.e. turn the nozzle off

Ink replacement by direct substitution i.e. K->K

Ink replacement by indirect substitution i.e. K->CMY

Error diffusion to adjacent nozzles

Fixative corrections

The DNC is required to efficiently support up to 5% dead nozzles, under the expected DRAM bandwidth allocation, with no restriction on where dead nozzles are located and handle any fixative correction due to nozzle compensations. Performance must degrade gracefully after 5% dead nozzles.

29.2 Dead Nozzle Identification

Figure 245:
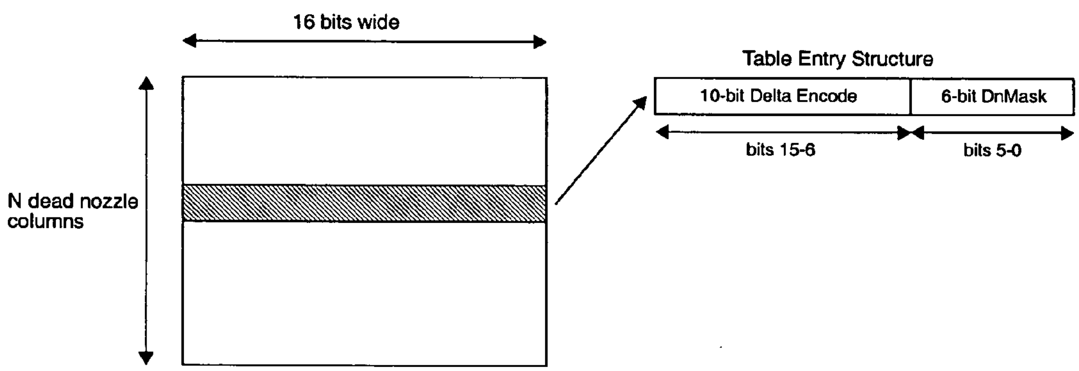
FIG. 245 shows a dead nozzle table format

Dead nozzles are identified by means of a position value and a mask value. Position information is represented by a 10-bit delta encoded format, where the 10-bit value defines the number of dots between dead nozzle columns[19]. With the delta information it also reads the 6-bit dead nozzle mask (dn_mask) for the defined dead nozzle position. Each bit in the dn_mask corresponds to an ink plane. A set bit indicates that the nozzle for the corresponding ink plane is dead. The dead nozzle table format is shown in FIG. 245. The DNC reads dead nozzle information from DRAM in single 256-bit accesses. A 10-bit delta encoding scheme is chosen so that each table entry is 16 bits wide, and 16 entries fit exactly in each 256-bit read. Using 10-bit delta encoding means that the maximum distance between dead nozzle columns is 1023 dots. It is possible that dead nozzles may be spaced further than 1023 dots from each other, so a null dead nozzle identifier is required. A null dead nozzle identifier is defined as a 6-bit dn_mask of all zeros. These null dead nozzle identifiers should also be used so that:

[19]for a 10-bit delta value of d, if the current column n is a dead nozzle column then the next dead nozzle column is given by n+(d+1).

- the dead nozzle table is a multiple of 16 entries (so that it is aligned to the 256-bit DRAM locations)
- the dead nozzle table spans the complete length of the line, i.e. the first entry dead nozzle table should have a delta from the first nozzle column in a line and the last entry in the dead nozzle table should correspond to the last nozzle column in a line.

Note that the DNC deals with the width of a page. This may or may not be the same as the width of the printhead (the PHI may introduce some margining to the page so that its dot output matches the width of the printhead). Care must be taken when programming the dead nozzle table so that dead nozzle positions are correctly specified with respect to the page and printhead.

29.3 Dram Storage and Bandwidth Requirement

The memory required is largely a factor of the number of dead nozzles present in the printhead (which in turn is a factor of the printhead size). The DNC is required to read a 16-bit entry from the dead nozzle table for every dead nozzle. Table 198 shows the DRAM storage and average[20] bandwidth requirements for the DNC for different percentages of dead nozzles and different page sizes.

[20]Average bandwidth assumes an even spread of dead nozzles. Clumps of dead nozzles may cause delays due to insufficient available DRAM bandwidth. These delays will occur every line causing an accumulative delay over a page.

TABLE 198

Dead Nozzle storage and average bandwidth requirements

| Page size | % Dead Nozzles | Dead nozzle table Memory (KBytes) | Dead nozzle table Bandwidth (bits/cycle) |
|---|---|---|---|
| A4[a] | 5% | 1.4[c] | 0.8[d] |
| | 10% | 2.7 | 1.6 |
| | 15% | 4.1 | 2.4 |
| A3[b] | 5% | 1.9 | 0.8 |
| | 10% | 3.8 | 1.6 |
| | 15% | 5.7 | 2.4 |

[a]Bi-lithic printhead has 13824 nozzles per color providing full bleed printing for A4/Letter

[b]Bi-lithic printhead has 19488 nozzles per color providing full bleed printing for A3

[c]16 bits × 13824 nozzles × 0.05 dead

[d](16 bits read/20 cycles) = 0.8 bits/cycle

29.4 Nozzle Compensation

DNC receives 6 bits of dot information every cycle from the HCU, 1 bit per color plane. When the dot position corresponds to a dead nozzle column, the associated 6-bit dn_mask indicates which ink plane(s) contains a dead nozzle(s). The DNC first deletes dots destined for the dead nozzle. It then replaces those dead dots, either by placing the data destined for the dead nozzle into an adjacent ink plane (direct substitution) or into a number of ink planes (indirect substitution). After ink replacement, if a dead nozzle is made active again then the DNC performs error diffusion. Finally, following the dead nozzle compensation mechanisms the fixative, if present, may need to be adjusted due to new nozzles being activated, or dead nozzles being removed.

29.4.1 Dead Nozzle Removal

If a nozzle is defined as dead, then the first action for the DNC is to turn off (zeroing) the dot data destined for that nozzle. This is done by a bit-wise ANDing of the inverse of the dn_mask with the dot value.

29.4.2 Ink Replacement

Ink replacement is a mechanism where data destined for the dead nozzle is placed into an adjacent ink plane of the same color (direct substitution, i.e. K->$K_{alternative}$), or placed into a number of ink planes, the combination of which produces the desired color (indirect substitution, i.e. K->CMY). Ink replacement is performed by filtering out ink belonging to nozzles that are dead and then adding back in an appropriately calculated pattern. This two step process allows the optional re-inclusion of the ink data into the original dead nozzle position to be subsequently error diffused. In the general case, fixative data destined for a dead nozzle should not be left active intending it to be later diffused.

The ink replacement mechanism has 6 ink replacement patterns, one per ink plane, programmable by the CPU. The dead nozzle mask is ANDed with the dot data to see if there are any planes where the dot is active but the corresponding nozzle is dead. The resultant value forms an enable, on a per ink basis, for the ink replacement process. If replacement is enabled for a particular ink, the values from the corresponding replacement pattern register are ORed into the dot data. The output of the ink replacement process is then filtered so that error diffusion is only allowed for the planes in which error diffusion is enabled. The output of the ink replacement logic is ORed with the resultant dot after dead nozzle removal. See Figure n page 565 on page Error! Bookmark not defined. for implementation details.

For example if we consider the printhead color configuration C,M,Y,$K_1$,$K_2$,IR and the input dot data from the HCU is b101100. Assuming that the $K_1$ ink plane and IR ink plane for this position are dead so the dead nozzle mask is b000101. The DNC first removes the dead nozzle by zeroing the $K_1$ plane to produce b101000. Then the dead nozzle mask is ANDed with the dot data to give b000100 which selects the ink replacement pattern for $K_1$ (in this case the ink replacement pattern for $K_1$ is configured as b000010, i.e. ink replacement into the $K_2$ plane). Providing error diffusion for $K_2$ is enabled, the output from the ink replacement process is b000010. This is ORed with the output of dead nozzle removal to produce the resultant dot b101010. As can be seen the dot data in the defective $K_1$ nozzle was removed and replaced by a dot in the adjacent $K_2$ nozzle in the same dot position, i.e. direct substitution.

In the example above the $K_1$ ink plane could be compensated for by indirect substitution, in which case ink replacement pattern for $K_1$ would be configured as b111000 (substitution into the CMY color planes), and this is ORed with the output of dead nozzle removal to produce the resultant dot b111000. Here the dot data in the defective K, ink plane was removed and placed into the CMY ink planes.

29.4.3 Error Diffusion

Based on the programming of the lookup table the dead nozzle may be left active after ink replacement. In such cases the DNC can compensate using error diffusion. Error diffusion is a mechanism where dead nozzle dot data is diffused to adjacent dots.

When a dot is active and its destined nozzle is dead, the DNC will attempt to place the data into an adjacent dot position, if one is inactive. If both dots are inactive then the choice is arbitrary, and is determined by a pseudo random bit generator. If both neighbor dots are already active then the bit cannot be compensated by diffusion.

Figure 246:
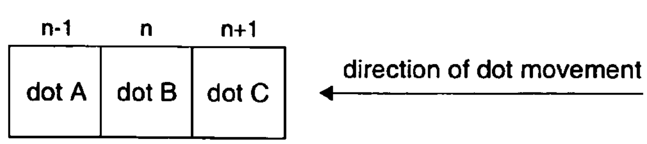
FIG. 246 shows set of dots operated on for error diffusion

Since the DNC needs to look at neighboring dots to determine where to place the new bit (if required), the DNC works on a set of 3 dots at a time. For any given set of 3 dots, the first dot received from the HCU is referred to as dot A, and the second as dot B, and the third as dot C. The relationship is shown in FIG. 246.

For any given set of dots ABC, only B can be compensated for by error diffusion if B is defined as dead. A 1 in dot B will be diffused into either dot A or dot C if possible. If there is already a 1 in dot A or dot C then a 1 in dot B cannot be diffused into that dot.

The DNC must support adjacent dead nozzles. Thus if dot A is defined as dead and has previously been compensated for by error diffusion, then the dot data from dot B should not be diffused into dot A. Similarly, if dot C is defined as dead, then dot data from dot B should not be diffused into dot C.

Error diffusion should not cross line boundaries. If dot B contains a dead nozzle and is the first dot in a line then dot A represents the last dot from the previous line. In this case an active bit on a dead nozzle of dot B should not be diffused into dot A. Similarly, if dot B contains a dead nozzle and is the last dot in a line then dot C represents the first dot of the next line. In this case an active bit on a dead nozzle of dot B should not be diffused into dot C.

Thus, as a rule, a 1 in dot B cannot be diffused into dot A if a 1 is already present in dot A, dot A is defined as dead, or dot A is the last dot in a line.

Similarly, a 1 in dot B cannot be diffused into dot C if a 1 is already present in dot C, dot C is defined as dead, or dot C is the first dot in a line.

If B is defined to be dead and the dot value for B is 0, then no compensation needs to be done and dots A and C do not need to be changed.

If B is defined to be dead and the dot value for B is 1, then B is changed to 0 and the DNC attempts to place the 1 from B into either A or C:

If the dot can be placed into both A and C, then the DNC must choose between them. The preference is given by the current output from the random bit generator, 0 for "prefer left" (dot A) or 1 for "prefer right" (dot C).

If dot can be placed into only one of A and C, then the 1 from B is placed into that position.

If dot cannot be placed into either one of A or C, then the DNC cannot place the dot in either position.

TABLE 199

Error-Diffusion Truth Table when dot B is dead

| Input | | | | Output | | |
|---|---|---|---|---|---|---|
| A OR A dead OR A last in line | B | C OR C dead OR C first in line | Rand[a] | A | B | C |
| 0 | 0 | 0 | X | A input | 0 | C input |
| 0 | 0 | 1 | X | A input | 0 | C input |
| 0 | 1 | 0 | 0 | 1[b] | 0 | C input |
| 0 | 1 | 0 | 1 | A input | 0 | 1 |
| 0 | 1 | 1 | X | 1 | 0 | C input |
| 1 | 0 | 0 | X | A input | 0 | C input |
| 1 | 0 | 1 | X | A input | 0 | C input |
| 1 | 1 | 0 | X | A input | 0 | 1 |
| 1 | 1 | 1 | X | A input | 0 | C input |

Table 199 shows the truth table for DNC error diffusion operation when dot B is defined as dead.

a. Output from random bit generator. Determines direction of error diffusion (0=left, 1=right)

b. Bold emphasis is used to show the DNC inserted a 1

The random bit value used to arbitrarily select the direction of diffusion is generated by a 32-bit maximum length random bit generator. The generator generates a new bit for each dot in a line regardless of whether the dot is dead or not. The random bit generator can be initialized with a 32-bit programmable seed value.

29.4.4 Fixative Correction

After the dead nozzle compensation methods have been applied to the dot data, the fixative, if present, may need to be adjusted due to new nozzles being activated, or dead nozzles being removed. For each output dot the DNC determines if fixative is required (using the FixativeRequiredMask register) for the new compensated dot data word and whether fixative is activated already for that dot. For the DNC to do so it needs to know the color plane that has fixative, this is specified by the FixativeMask1 configuration register. Table 200 indicates the actions to take based on these calculations.

TABLE 200

Truth table for fixative correction

| Fixative Present | Fixative required | Action |
|---|---|---|
| 1 | 1 | Output dot as is. |
| 1 | 0 | Clear fixative plane. |
| 0 | 1 | Attempt to add fixative. |
| 0 | 0 | Output dot as is. |

The DNC also allows the specification of another fixative plane, specified by the FixativeMask2 configuration register, with FixativeMask1 having the higher priority over FixativeMask2. When attempting to add fixative the DNC first tries to add it into the planes defined by FixativeMask1. However, if any of these planes is dead then it tries to add fixative by placing it into the planes defined by FixativeMask2.

Note that the fixative defined by FixativeMask1 and FixativeMask2 could possibly be multi-part fixative, i.e. 2 bits could be set in FixativeMask1 with the fixative being a combination of both inks.

29.5 Implementation

Figure 247:
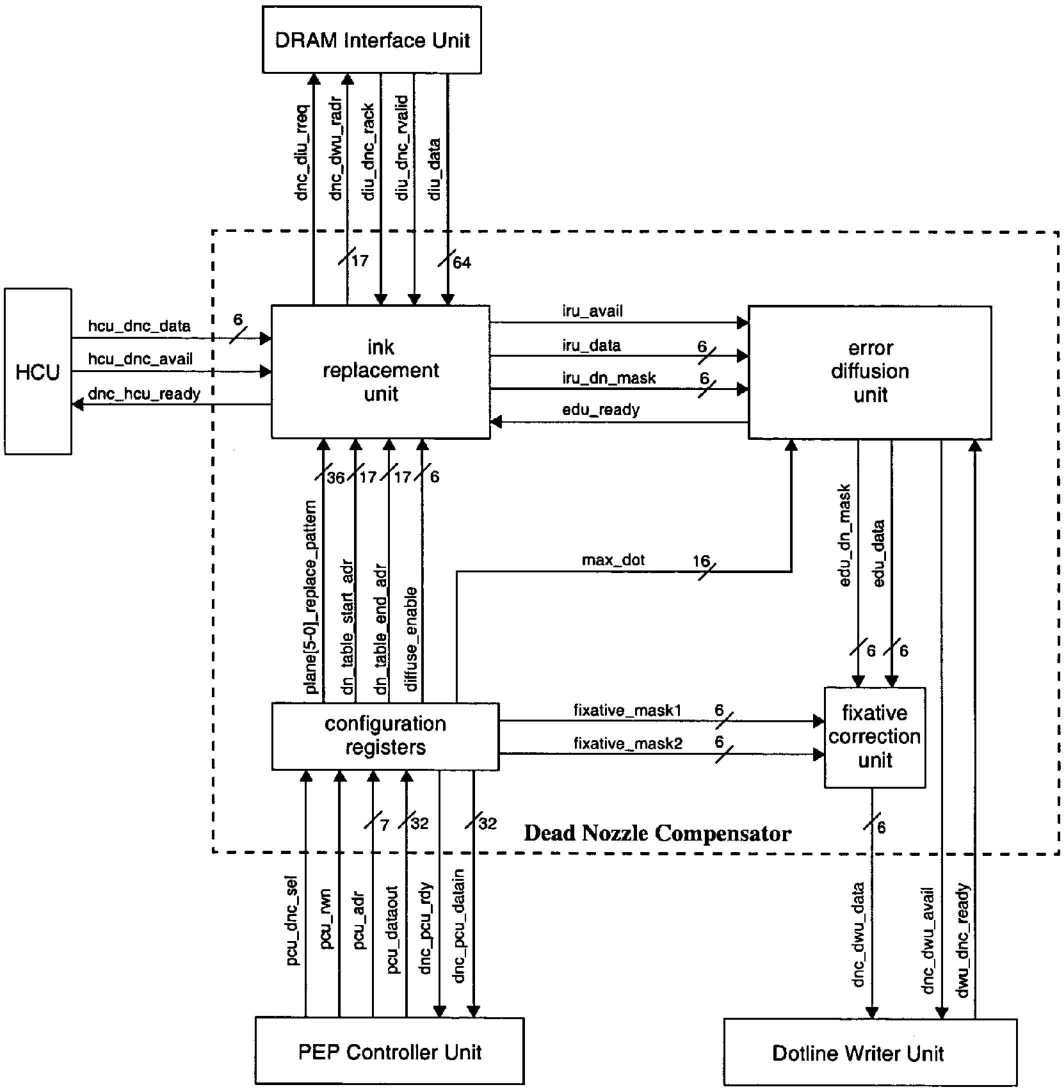
FIG. 247 shows a block diagram of DNC

A block diagram of the DNC is shown in FIG. 247.

29.5.1 Definitions of I/O

TABLE 201

DNC port list and description

| Port name | Pins | I/O | Description |
|---|---|---|---|
| Clocks and Resets | | | |
| Pclk | 1 | In | System Clock. |
| prst_n | 1 | In | System reset, synchronous active low. |
| PCU interface | | | |
| pcu_dnc_sel | 1 | In | Block select from the PCU. When pcu_dnc_sel is high both pcu_adr and pcu_dataout are valid. |
| pcu_rwn | 1 | In | Common read/not-write signal from the PCU. |
| pcu_adr[6:2] | 5 | In | PCU address bus. Only 5 bits are required to decode the address space for this block. |
| pcu_dataout[31:0] | 32 | In | Shared write data bus from the PCU. |
| dnc_pcu_rdy | 1 | Out | Ready signal to the PCU. When dnc_pcu_rdy is high it indicates the last cycle of the access. For a write cycle this means pcu_dataout has been registered by the block and for a read cycle this means the data on dnc_pcu_datain is valid. |
| dnc_pcu_datain[31:0] | 32 | Out | Read data bus to the PCU. |
| DIU interface | | | |
| dnc_diu_rreq | 1 | Out | DNC unit requests DRAM read. A read request must be accompanied by a valid read address. |
| dnc_diu_radr[21:5] | 17 | Out | Read address to DIU, 256-bit word aligned. |
| diu_dnc_rack | 1 | In | Acknowledge from DIU that read request has been accepted and new read address can be placed on dnc_diu_radr |
| diu_dnc_rvalid | 1 | In | Read data valid, active high. Indicates that valid read data is now on the read data bus, diu_data. |
| diu_data[63:0] | 64 | In | Read data from DIU. |
| HCU interface | | | |
| dnc_hcu_ready | 1 | Out | Indicates that DNC is ready to accept data from the HCU. |
| hcu_dnc_avail | 1 | In | Indicates valid data present on hcu_dnc_data. |
| hcu_dnc_data[5:0] | 6 | In | Output bi-level dot data in 6 ink planes. |
| DWU interface | | | |
| dwu_dnc_ready | 1 | In | Indicates that DWU is ready to accept data from the DNC. |
| dnc_dwu_avail | 1 | Out | Indicates valid data present on dnc_dwu_data. |
| dnc_dwu_data[5:0] | 6 | Out | Output bi-level dot data in 6 ink planes. |

29.5.2 Configuration Registers

The configuration registers in the DNC are programmed via the PCU interface. Refer to section 21.8.2 on page 321 for the description of the protocol and timing diagrams for reading and writing registers in the DNC. Note that since addresses in SoPEC are byte aligned and the PCU only supports 32-bit register reads and writes, the lower 2 bits of the PCU address bus are not required to decode the address space for the DNC. When reading a register that is less than 32 bits wide zeros should be returned on the upper unused bit(s) of dnc_pcu_datain. Table 202 lists the configuration registers in the DNC.

TABLE 202

DNC configuration registers

| Address (DNC_base +) | Register name | #bits | Value on reset | Description |
|---|---|---|---|---|
| Control registers | | | | |
| 0x00 | Reset | 1 | 0x1 | A write to this register causes a reset of the DNC. |
| 0x04 | Go | 1 | 0x0 | Writing 1 to this register starts the DNC. Writing 0 to this register halts the DNC. When Go is asserted all counters, flags etc. are cleared or given their initial value, but configuration registers keep their values. When Go is deasserted the state-machines go to their idle states but all counters and configuration registers keep their values. This register can be read to determine if the DNC is running (1 = running, 0 = stopped). |
| Setup registers (constant during processing) | | | | |
| 0x10 | MaxDot | 16 | 0x0000 | This is the maximum dot number − 1 present across a page. For example if a page contains 13824 dots, then MaxDot will be 13823. Note that this number may or may not be the same as the number of dots across the printhead as some margining may be introduced in the PHI. |
| 0x14 | LSFR | 32 | 0x0000_0000 | The current value of the LFSR register used as the 32-bit maximum length random bit generator. Users can write to this register to program a seed value for the 32-bit maximum length random bit generator. Must not be all 1s for taps implemented in XNOR form. (It is expected that writing a seed value will not occur during he operation of the LFSR). This LSFR value could also have a possible use as a random source in program code. |
| 0x20 | FixativeMask1 | 6 | 0x00 | Defines the higher priority fixative plane(s). Bit 0 represents the settings for plane 0, bit 1 for plane 1 etc. For each bit: 1 = the ink plane contains fixative. 0 = the ink plane does not contain fixative. |
| 0x24 | FixativeMask2 | 6 | 0x00 | Defines the lower priority fixative plane(s). Bit 0 represents the settings for plane 0, bit 1 for plane 1 etc. Used only when FixativeMask1 planes are dead. For each bit: 1 = the ink plane contains fixative. 0 = the ink plane does not contain fixative. |
| 0x28 | FixativeRequired Mask | 6 | 0x00 | Identifies the ink planes that require fixative. Bit 0 represents the settings for plane 0, bit 1 for plane 1 etc. For each bit: 1 = the ink plane requires fixative. 0 = the ink plane does not require fixative (e.g. ink is self-fixing) |
| 0x30 | DnTableStartAdr[21:5] | 17 | 0x0_0000 | Start address of Dead Nozzle Table in DRAM, specified in 256-bit words. |

TABLE 202-continued

DNC configuration registers

| Address (DNC_base +) | Register name | #bits | Value on reset | Description |
|---|---|---|---|---|
| 0x34 | DnTableEndAdr[21:5] | 17 | 0x0_0000 | End address of Dead Nozzle Table in DRAM, specified in 256-bit words, i.e. the location containing the last entry in the Dead Nozzle Table. The Dead Nozzle Table should be aligned to a 256-bit boundary, if necessary it can be padded with null entries. |
| 0x40–0x54 | PlaneReplacePattern[5:0] | 6 × 6 | 0x00 | Defines the ink replacement pattern for each of the 6 ink planes. PlaneReplacePattern[0] is the ink replacement pattern for plane 0, PlaneReplacePattern[1] is the ink replacement pattern for plane 1, etc. For each 6-bit replacement pattern for a plane, a 1 in any bit positions indicates the alternative ink planes to be used for this plane. |
| 0x58 | DiffuseEnable | 6 | 0x3F | Defines whether, after ink replacement, error diffusion is allowed to be performed on each plane. Bit 0 represents the settings for plane 0, bit 1 for plane 1 etc. For each bit:<br>1 = error diffusion is enabled<br>0 = error diffusion is disabled |
| Debug registers (read only) | | | | |
| 0x60 | DncOutputDebug | 8 | N/A | Bit 7 = dwu_dnc_ready<br>Bit 6 = dnc_dwu_avail<br>Bits 5–0 = dnc_dwu_data |
| 0x64 | DncReplaceDebug | 14 | N/A | Bit 13 = edu_ready<br>Bit 12 = iru_avail<br>Bits 11–6 = iru_dn_mask<br>Bits 5–0 = iru_data |
| 0x68 | DncDiffuseDebug | 14 | N/A | Bit 13 = dwu_dnc_ready<br>Bit 12 = dnc_dwu_avail<br>Bits 11–6 = edu_dn_mask<br>Bits 5–0 = edu_data |

29.5.3 Ink Replacement Unit

Figure 248:
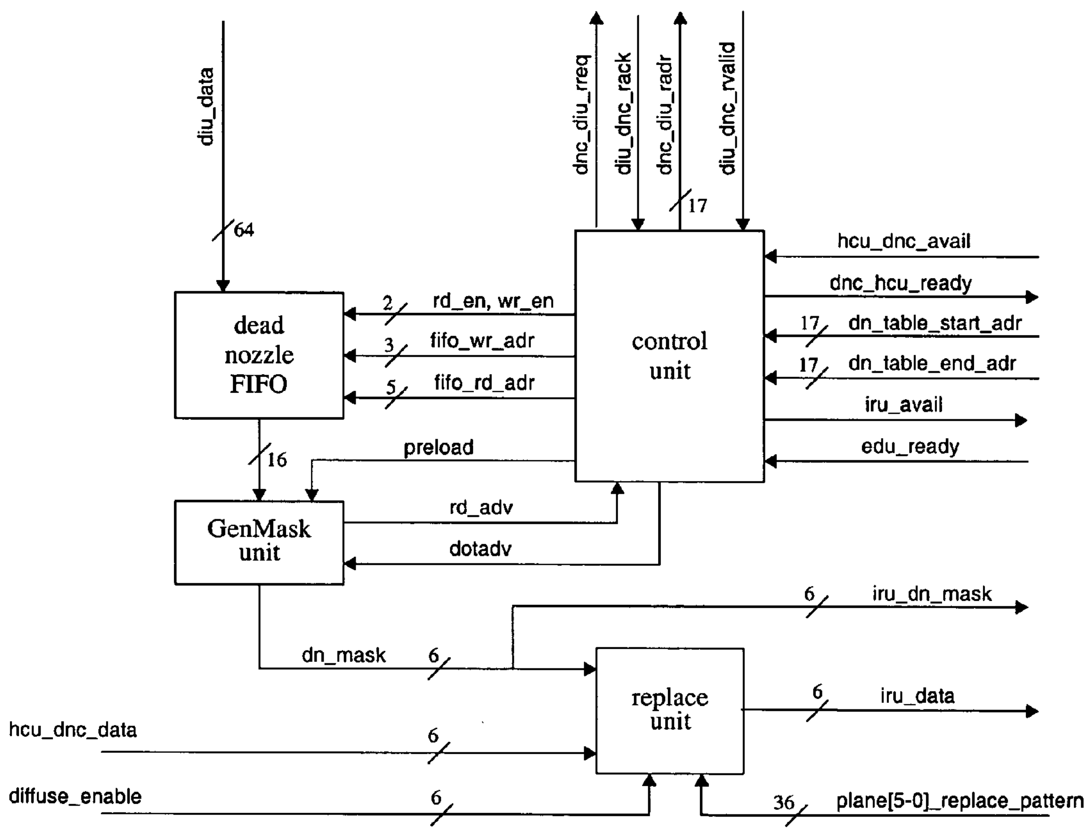
FIG. 248 shows a sub-block diagram of ink replacement unit

FIG. 248 shows a sub-block diagram for the ink replacement unit.

29.5.3.1 Control Unit

Figure 249:
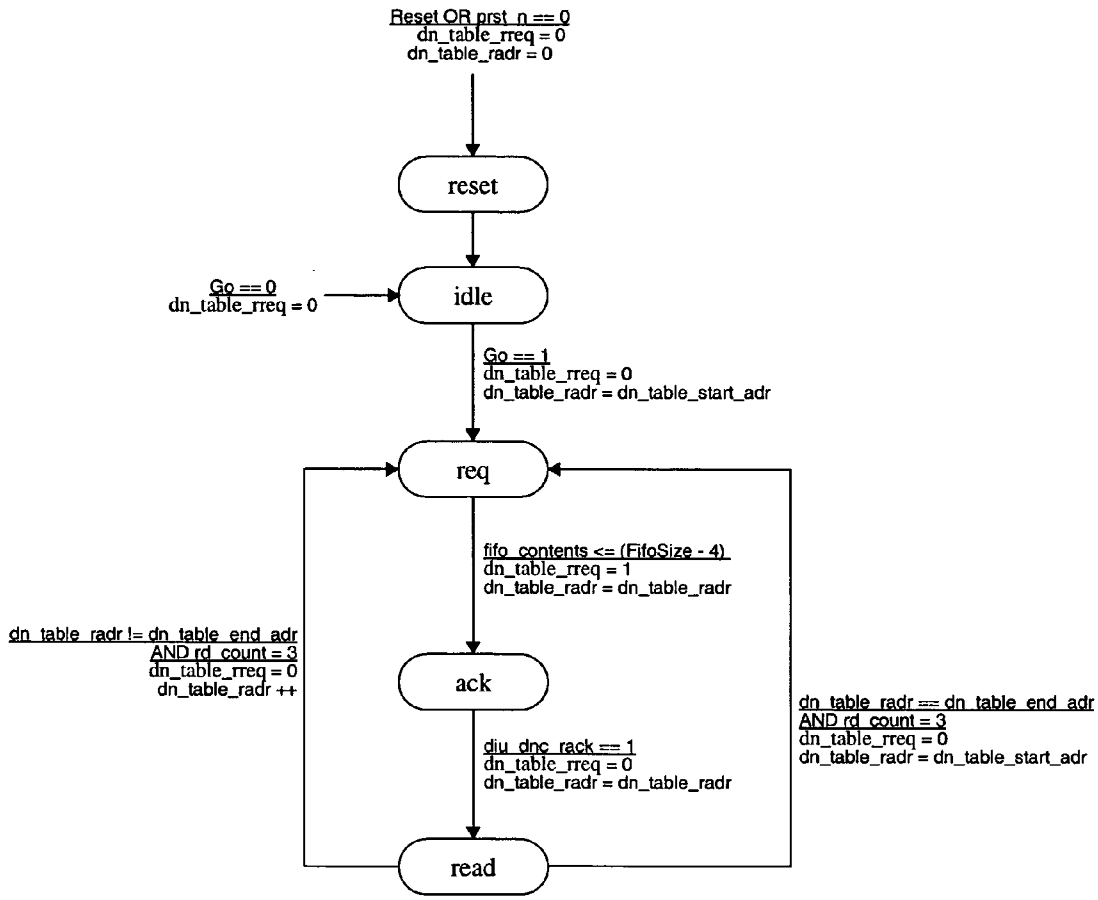
FIG. 249 shows a dead nozzle table state machine

The control unit is responsible for reading the dead nozzle table from DRAM and making it available to the DNC via the dead nozzle FIFO. The dead nozzle table is read from DRAM in single 256-bit accesses, receiving the data from the DIU over 4 clock cycles (64-bits per cycle). The protocol and timing for read accesses to DRAM is described in section 20.9.1 on page 240. Reading from DRAM is implemented by means of the state machine shown in FIG. 249. All counters and flags should be cleared after reset. When Go transitions from 0 to 1 all counters and flags should take their initial value. While the Go bit is 1, the state machine requests a read access from the dead nozzle table in DRAM provided there is enough space in its FIFO.

A modulo-4 counter, rd_count, is used to count each of the 64-bits received in a 256-bit read access. It is incremented whenever diu_dnc_rvalid is asserted. When Go is 1, dn_table_radr is set to dn_table_start_adr. As each 64-bit value is returned, indicated by diu_dnc_rvalid being asserted, dn_table_radr is compared to dn_table_end_adr.

If rd_count equals 3 and dn_table_radr equals dn_table_end_adr, then dn_table_radr is updated to dn_table_start_adr.

If rd_count equals 3 and dn_table_radr does not equal dn_table_end_adr, then dn_table_radr is incremented by 1.

A count is kept of the number of 64-bit values in the FIFO. When diu_dnc_rvalid is 1 data is written to the FIFO by asserting wr_en, and fifo_contents and fifo_wr_adr are both incremented.

When fifo_contents[3:0] is greater than 0 and edu_ready is 1, dnc_hcu_ready is asserted to indicate that the DNC is ready to accept dots from the HCU. If hcu_dnc_avail is also 1 then a dotadv pulse is sent to the GenMask unit, indicating the DNC has accepted a dot from the HCU, and iru_avail is also asserted. After Go is set, a single preload pulse is sent to the GenMask unit once the FIFO contains data.

When a rd_adv pulse is received from the GenMask unit, fifo_rd_adr[4:0] is then incremented to select the next 16-bit value. If fifo_rd_adr[1:0=11 then the next 64-bit value is read from the FIFO by asserting rd_en, and fifo_contents [3:0] is decremented.

29.5.3.2 Dead Nozzle FIFO

The dead nozzle FIFO conceptually is a 64-bit input, and 16-bit output FIFO to account for the 64-bit data transfers from the DIU, and the individual 16-bit entries in the dead nozzle table that are used in the GenMask unit. In reality, the FIFO is actually 8 entries deep and 64-bits wide (to accommodate two 256-bit accesses).

On the DRAM side of the FIFO the write address is 64-bit aligned while on the GenMask side the read address is 16-bit aligned, i.e. the upper 3 bits are input as the read address for the FIFO and the lower 2 bits are used to select 16 bits from the 64 bits (1st 16 bits read corresponds to bits 15–0, second 16 bits to bits 31–16 etc.).

29.5.3.3 GenMask Unit

The GenMask unit generates the 6-bit dn_mask that is sent to the replace unit. It consists of a 10-bit delta counter and a mask register.

After Go is set, the GenMask unit will receive a preload pulse from the control unit indicating the first dead nozzle table entry is available at the output of the dead nozzle FIFO and should be loaded into the delta counter and mask register. A rd_adv pulse is generated so that the next dead nozzle table entry is presented at the output of the dead nozzle FIFO. The delta counter is decremented every time a dotadv pulse is received. When the delta counter reaches 0, it gets loaded with the current delta value output from the dead nozzle FIFO, i.e. bits 15–6, and the mask register gets loaded with mask output from the dead nozzle FIFO, i.e. bits 5–0. A rd_adv pulse is then generated so that the next dead nozzle table entry is presented at the output of the dead nozzle FIFO.

When the delta counter is 0 the value in the mask register is output as the dn_mask, otherwise the dn_mask is all 0s.

The GenMask unit has no knowledge of the number of dots in a line, it simply loads a counter to count the delta from one dead nozzle column to the next. Thus as described in section 29.2 on page 472 the dead nozzle table should include null identifiers if necessary so that the dead nozzle table covers the first and last nozzle column in a line.

29.5.3.4 Replace Unit

Figure 250:
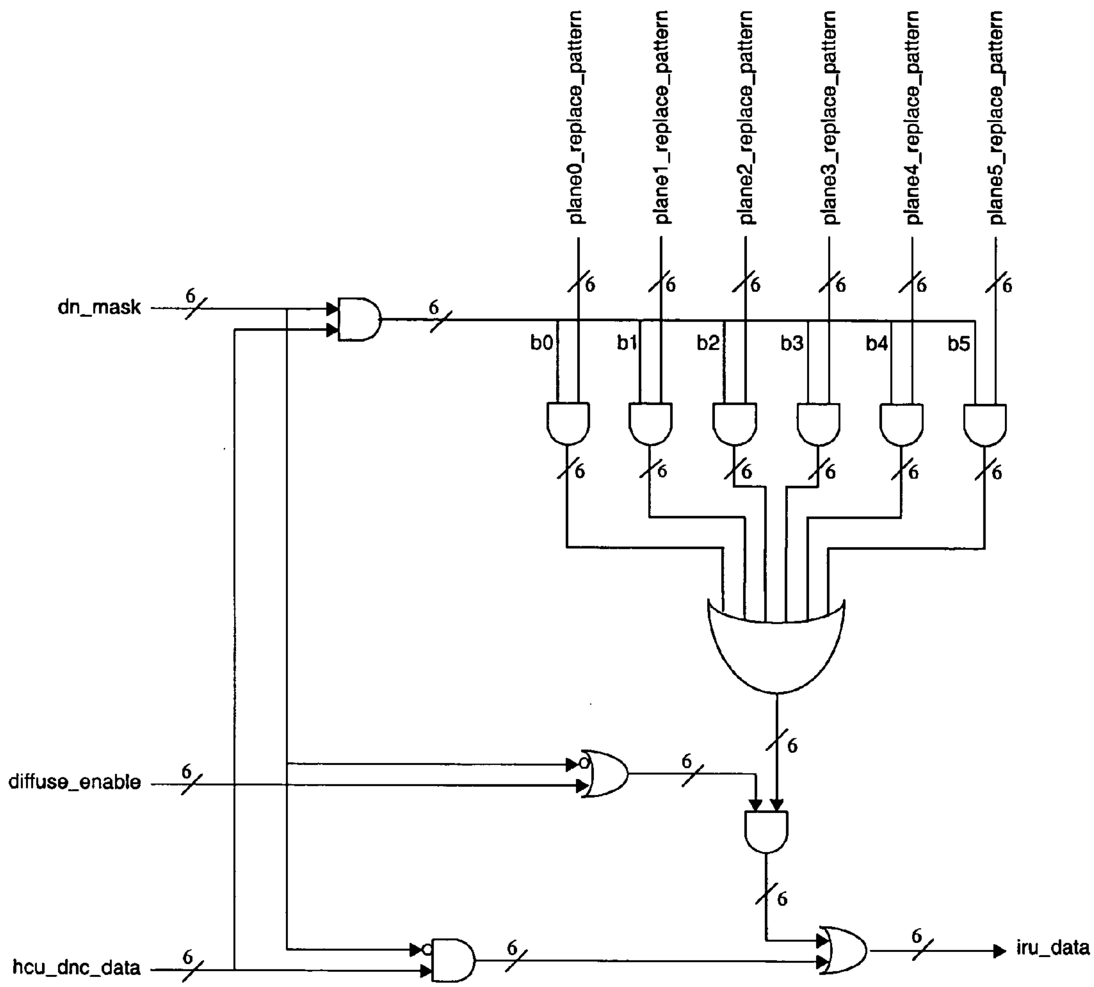
FIG. 250 shows logic for dead nozzle removal and ink replacement

Dead nozzle removal and ink replacement are implemented by the combinatorial logic shown in FIG. 250. Dead nozzle removal is performed by bit-wise ANDing of the inverse of the dn_mask with the dot value.

The ink replacement mechanism has 6 ink replacement patterns, one per ink plane, programmable by the CPU. The dead nozzle mask is ANDed with the dot data to see if there are any planes where the dot is active but the corresponding nozzle is dead. The resultant value forms an enable, on a per ink basis, for the ink replacement process. If replacement is enabled for a particular ink, the values from the corresponding replacement pattern register are ORed into the dot data. The output of the ink replacement process is then filtered so that error diffusion is only allowed for the planes in which error diffusion is enabled.

The output of the ink replacement process is ORed with the resultant dot after dead nozzle removal. If the dot position does not contain a dead nozzle then the dn_mask will be all 0s and the dot, hcu_dnc_data, will be passed through unchanged.

29.5.4 Error Diffusion Unit

Figure 251:
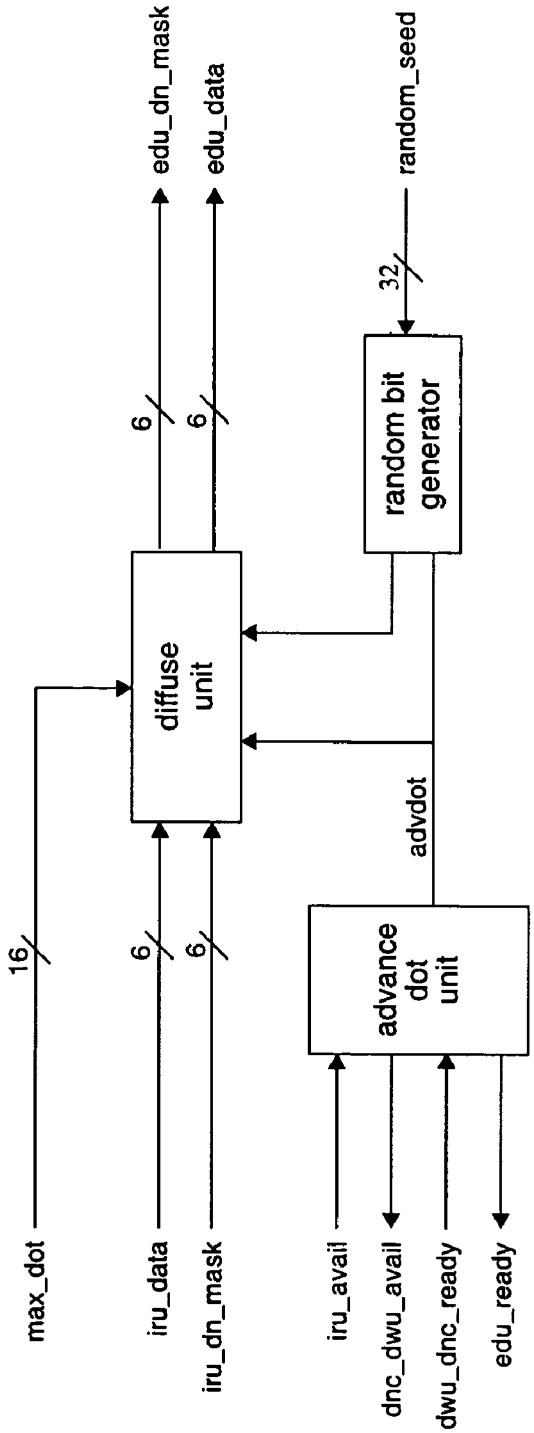
FIG. 251 shows a sub-block diagram of error diffusion unit

FIG. 251 shows a sub-block diagram for the error diffusion unit.

29.5.4.1 Random Bit Generator

Figure 252:
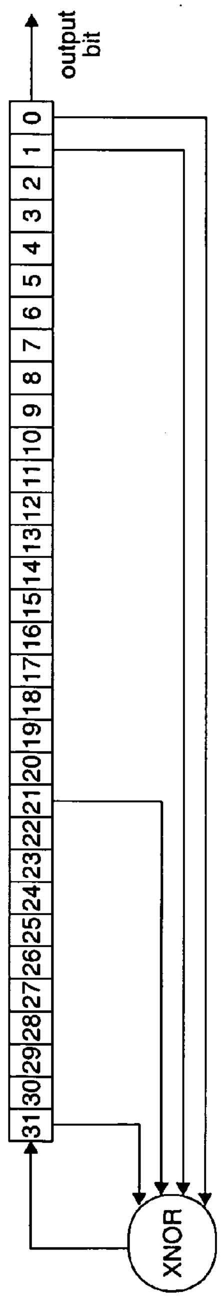
FIG. 252 shows a maximum length 32-bit LFSR used for random bit generation
Figure 253:
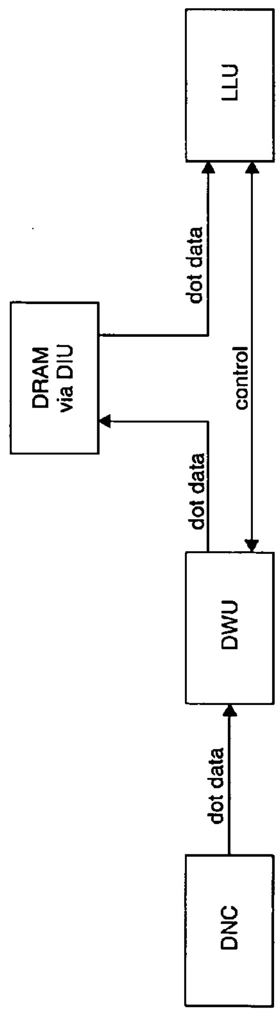
FIG. 253 shows a high-level data flow diagram of DWU in context

The random bit value used to arbitrarily select the direction of diffusion is generated by a maximum length 32-bit LFSR. The tap points and feedback generation are shown in FIG. 252. The LFSR generates a new bit for each dot in a line regardless of whether the dot is dead or not, i.e shifting of the LFSR is enabled when advdot equals 1. The LFSR can be initialised with a 32-bit programmable seed value, random_seed. This seed value is loaded into the LFSR whenever a write occurs to the RandomSeed register. Note that the seed value must not be all 1 s as this causes the LFSR to lock-up.

29.5.4.2 Advance Dot Unit

The advance dot unit is responsible for determining in a given cycle whether or not the error diffuse unit will accept a dot from the ink replacement unit or make a dot available to the fixative correct unit and on to the DWU. It therefore receives the dwu_dnc_ready control signal from the DWU, the iru_avail flag from the ink replacement unit, and generates dnc_dwu_avail and edu_ready control flags.

Only the dwu_dnc_ready signal needs to be checked to see if a dot can be accepted and asserts edu_ready to indicate this. If the error diffuse unit is ready to accept a dot and the ink replacement unit has a dot available, then a advdot pulse is given to shift the dot into the pipeline in the diffuse unit. Note that since the error diffusion operates on 3 dots, the advance dot unit ignores dwu_dnc_ready initially until 3 dots have been accepted by the diffuse unit. Similarly dnc_dwu_avail is not asserted until the diffuse unit contains 3 dots and the ink replacement unit has a dot available.

29.5.4.3 Diffuse Unit

The diffuse unit contains the combinatorial logic to implement the truth table from Table. The diffuse unit receives a dot consisting of 6 color planes (1 bit per plane) as well as an associated 6-bit dead nozzle mask value.

Error diffusion is applied to all 6 planes of the dot in parallel. Since error diffusion operates on 3 dots, the diffuse unit has a pipeline of 3 dots and their corresponding dead nozzle mask values.

The first dot received is referred to as dot A, and the second as dot B, and the third as dot C. Dots are shifted along the pipeline whenever advdot is 1. A count is also kept of the number of dots received. It is incremented whenever advdot is 1, and wraps to 0 when it reaches max_dot. When the dot count is 0 dot C corresponds to the first dot in a line. When the dot count is 1 dot A corresponds to the last dot in a line.

In any given set of 3 dots only dot B can be defined as containing a dead nozzle(s). Dead nozzles are identified by bits set in iru_dn_mask. If dot B contains a dead nozzle(s), the corresponding bit(s) in dot A, dot C, the dead nozzle mask value for A, the dead nozzle mask value for C, the dot count, as well as the random bit value are input to the truth table logic and the dots A, B and C assigned accordingly. If dot B does not contain a dead nozzle then the dots are shifted along the pipeline unchanged.

29.5.5 Fixative Correction Unit

The fixative correction unit consists of combinatorial logic to implement fixative correction as defined in Table 203. For each output dot the DNC determines if fixative is required for the new compensated dot data word and whether fixative is activated already for that dot.

```
FixativePresent=((FixativeMask1|FixativeMask2)
    &edu_data)!+0

FixativeRequired=(FixativeRequiredMask&edu_data)
    !=0
```

It then looks up the truth table to see what action, if any, needs to be taken.

TABLE 203

Truth table for fixative correction

| Fixative Present | Fixative required | Action | Output |
|---|---|---|---|
| 1 | 1 | Output dot as is. | dnc_dwu_data = edu_data |
| 1 | 0 | Clear fixative plane. | dnc_dwu_data = (edu_data) & ~(FixativeMask1 \| FixativeMask2) |
| 0 | 1 | Attempt to add fixative. | if (FixativeMask1 & DnMask) != 0 dnc_dwu_data = (edu_data) \| (FixativeMask2 & ~DnMask) else dnc_dwu_data = (edu_data) \| (FixativeMask1) |
| 0 | 0 | Output dot as is. | dnc_dwu_data = edu_data |

When attempting to add fixative the DNC first tries to add it into the plane defined by FixativeMask1. However, if this plane is dead then it tries to add fixative by placing it into the plane defined by FixativeMask2. Note that if both FixativeMask1 and FixativeMask2 are both all 0s then the dot data will not be changed.

30 Dotline Writer Unit (DWU)

30.1 Overview

The Dotline Writer Unit (DWU) receives 1 dot (6 bits) of color information per cycle from the DNC. Dot data received is bundled into 256-bit words and transferred to the DRAM. The DWU (in conjunction with the LLU) implements a dot line FIFO mechanism to compensate for the physical placement of nozzles in a printhead, and provides data rate smoothing to allow for local complexities in the dot data generate pipeline.

30.2 Physical Requirement Imposed by the Printhead

The physical placement of nozzles in the printhead means that in one firing sequence of all nozzles, dots will be produced over several print lines. The printhead consists of 12 rows of nozzles, one for each color of odd and even dots. Odd and even nozzles are separated by $D_2$ print lines and nozzles of different colors are separated by $D_1$ print lines. See FIG. 254 for reference. The first color to be printed is the first row of nozzles encountered by the incoming paper. In the example this is color 0 odd, although is dependent on the printhead type (see [10] for other printhead arrangments). Paper passes under printhead moving downwards.

Figure 255:
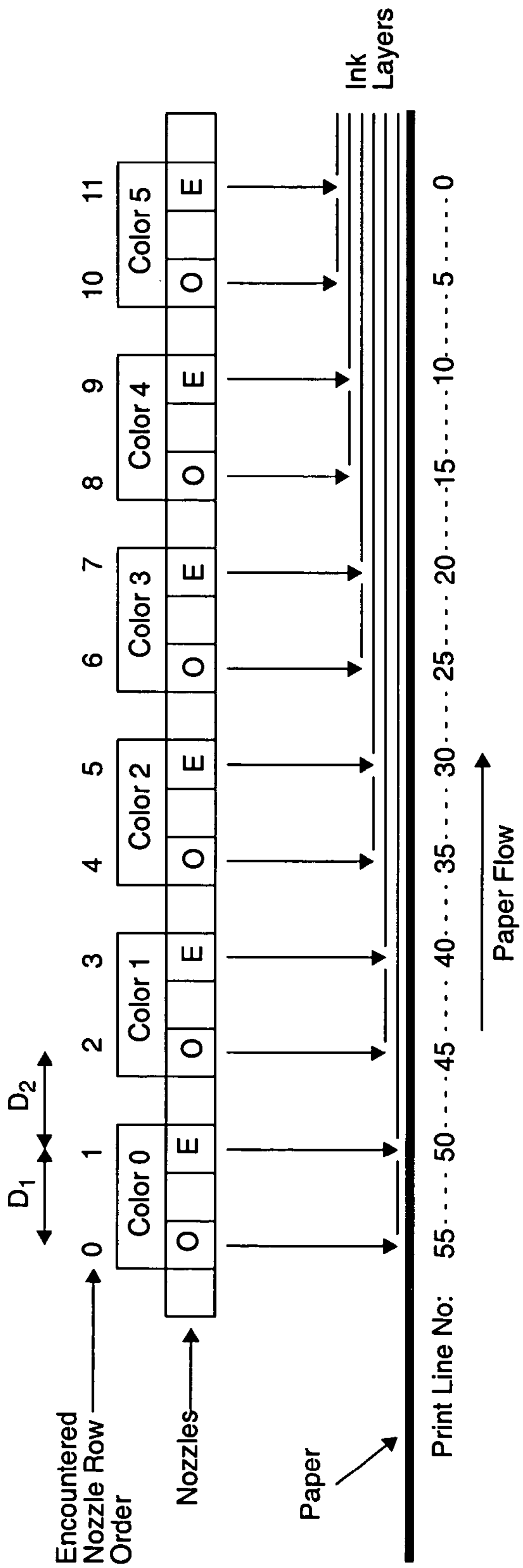
FIG. 255 shows a printhead nozzle layout for a 36-nozzle bi-lithic printhead

For example if the physical separation of each half row is 80 μm equating to $D_1=D_2=5$ print lines at 1600 dpi. This means that in one firing sequence, color 0 odd nozzles will fire on dotline L, color 0 even nozzles will fire on dotline L-$D_1$, color 1 odd nozzles will fire on dotline L-$D_1$–$D_2$ and so on over 6 color planes odd and even nozzles. The total number of lines fired over is given as 0+5+5 . . . +5=0+11×5=55. See FIG. 255 for example diagram.

It is expected that the physical spacing of the printhead nozzles will be 80 μm (or 5 dot lines), although there is no dependency on nozzle spacing. The DWU is configurable to allow other line nozzle spacings.

TABLE 204

Relationship between Nozzle color/sense and line firing

| | Even line encountered first | | Odd line encountered first | |
|---|---|---|---|---|
| Color | Sense | line | sense | line |
| Color 0 | Even | L | even | L-5 |
| | Odd | L-5 | odd | L |
| Color 1 | Even | L-10 | even | L-15 |
| | Odd | L-15 | odd | L-10 |
| Color 2 | Even | L-20 | even | L-25 |
| | Odd | L-25 | odd | L-20 |
| Color 3 | Even | L-30 | even | L-35 |
| | Odd | L-35 | odd | L-30 |
| Color 4 | Even | L-40 | even | L-45 |
| | Odd | L-45 | odd | L-40 |
| Color 5 | Even | L-50 | even | L-55 |
| | Odd | L-55 | odd | L-50 |

30.3 Line Rate De-Coupling

The DWU block is required to compensate for the physical spacing between lines of nozzles. It does this by storing dot lines in a FIFO (in DRAM) until such time as they are required by the LLU for dot data transfer to the printhead interface. Colors are stored separately because they are needed at different times by the LLU. The dot line store must store enough lines to compensate for the physical line separation of the printhead but can optionally store more lines to allow system level data rate variation between the read (printhead feed) and write sides (dot data generation pipeline) of the FIFOs.

Figure 256:
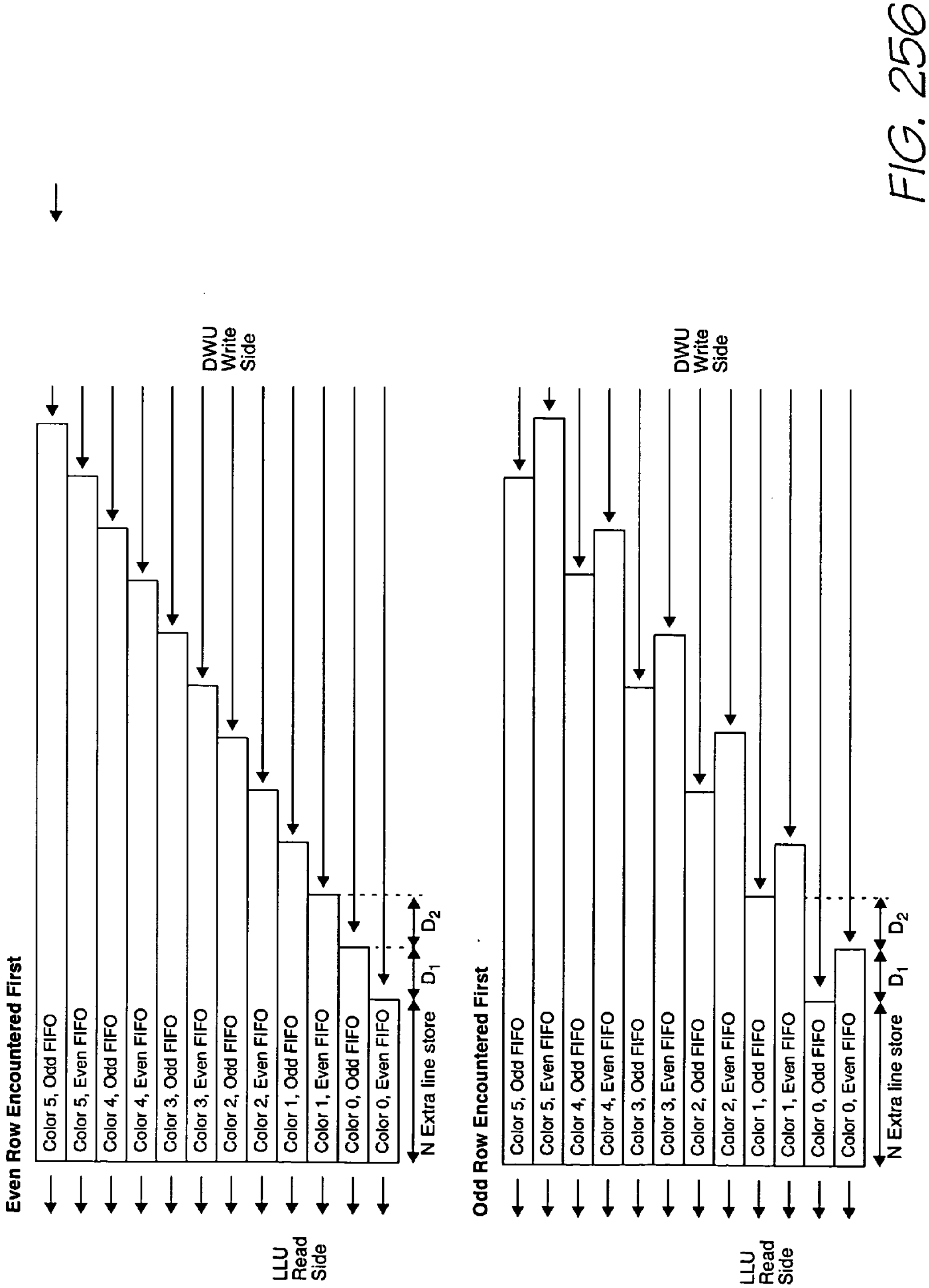
FIG. 256 shows a dot line store logical representation

A logical representation of the FIFOs is shown in FIG. 256, where N is defined as the optional number of extra half lines in the dot line store for data rate de-coupling.

30.4 Dot Line Store Storage Requirements

For an arbitrary page width of d dots (where d is even), the number of dots per half line is d/2.

For interline spacing of $D_2$ and inter-color spacing of $D_1$, with C colors of odd and even half lines, the number of half line storage is $(C-1)(D_2+D_1)+D1$.

For N extra half line stores for each color odd and even, the storage is given by (N*C*2).

The total storage requirement is $((C-1)(D_2+D_1)+D1+(N*C*2))*d/2$ in bits.

Note that when determining the storage requirements for the dot line store, the number of dots per line is the page width and not necessarily the printhead width. The page width is often the dot margin number of dots less than the printhead width. They can be the same size for full bleed printing.

For example in an A4 page a line consists of 13824 dots at 1600 dpi, or 6912 dots per half dot line. To store just enough dot lines to account for an inter-line nozzle spacing of 5 dot lines it would take 55 half dot lines for color 5 odd, 50 dot lines for color 5 even and so on, giving 55+50+45 . . . 10+5+0=330 half dot lines in total. If it is assumed that N=4 then the storage required to store 4 extra half lines per color is 4×12=48, in total giving 330+48=378 half dot lines. Each half dot line is 6912 dots, at 1 bit per dot give a total storage requirement of 6912 dots×378 half dot lines/8 bits=Approx 319 Kbytes. Similarly for an A3 size page with 19488 dots per line, 9744 dots per half line×378 half dot lines/8=Approx 899 Kbytes.

TABLE 205

Storage requirement for dot line store

| Page size | Nozzle Spacing | Lines required (N = 0) | Storage (N = 0) Kbytes | Lines required (N = 4) | Storage (N = 4) Kbytes |
|---|---|---|---|---|---|
| A4 | 4 | 264 | 223 | 312 | 263 |
| | 5 | 330 | 278 | 378 | 319 |
| A3 | 4 | 264 | 628 | 312 | 742 |
| | 5 | 330 | 785 | 378 | 899 |

The potential size of the dot line store makes it unfeasible to be implemented in on-chip SRAM, requiring the dot line store to be implemented in embedded DRAM. This allows a configurable dotline store where unused storage can be redistributed for use by other parts of the system.

30.5 Nozzle Row Skew

Due to construction limitations of the bi-lithic printhead it is possible that nozzle rows may be misaligned relative to each other. Odd and even rows, and adjacent color rows may be horizontally misaligned by up to 2 dot positions. Vertical misalignment can also occur but is compensated for in the LLU and not considered here. The DWU is required to compensate for the horizontal misalignment.

Figure 254:
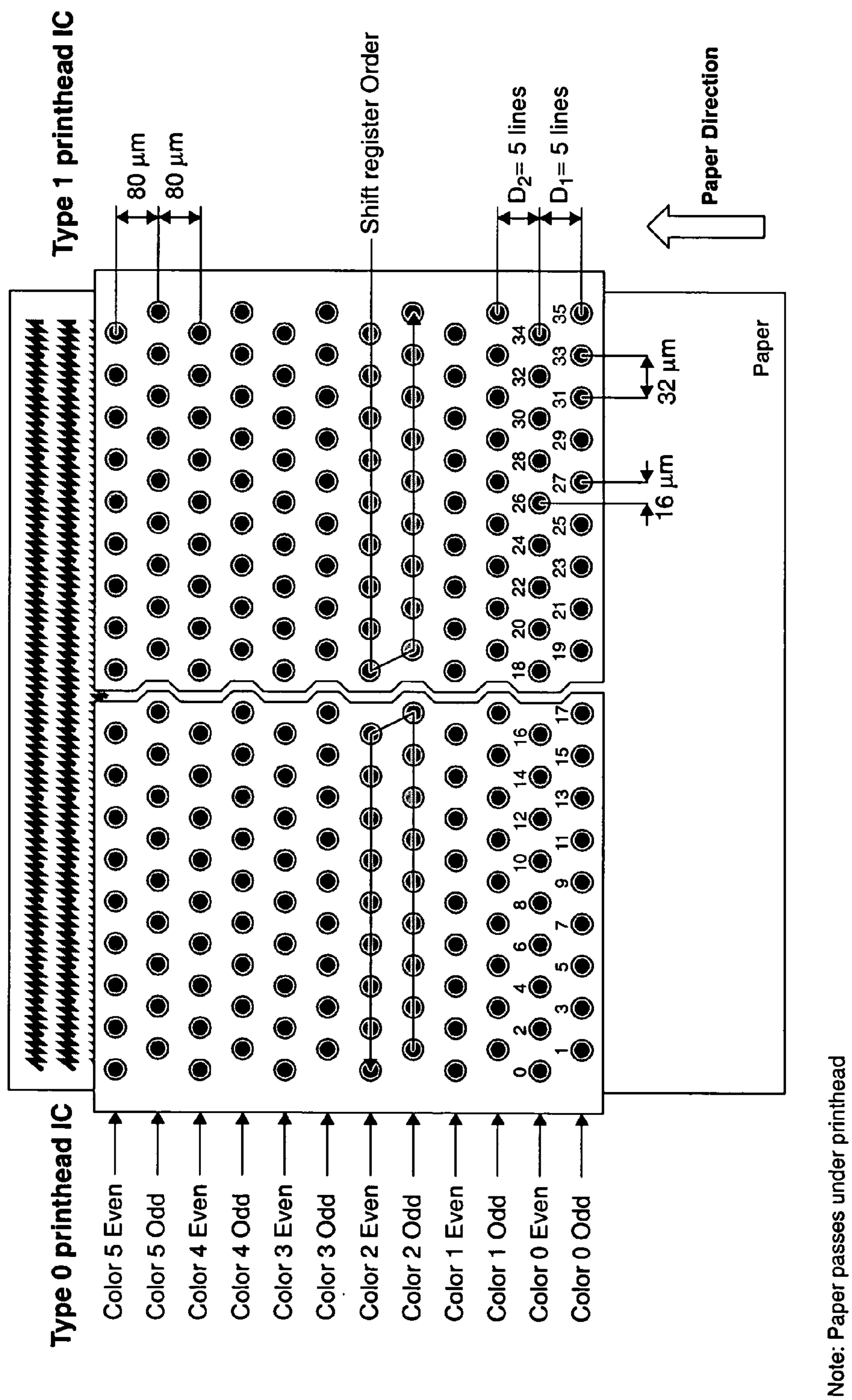
FIG. 254 shows a printhead nozzle layout for 36-nozzle bi-lithic printhead

Dot data from the HCU (through the DNC) produces a dot of 6 colors all destined for the same physical location on paper. If the nozzle rows in the printhead are aligned as shown in FIG. 254 then no adjustment of the dot data is needed.

Figure 257:
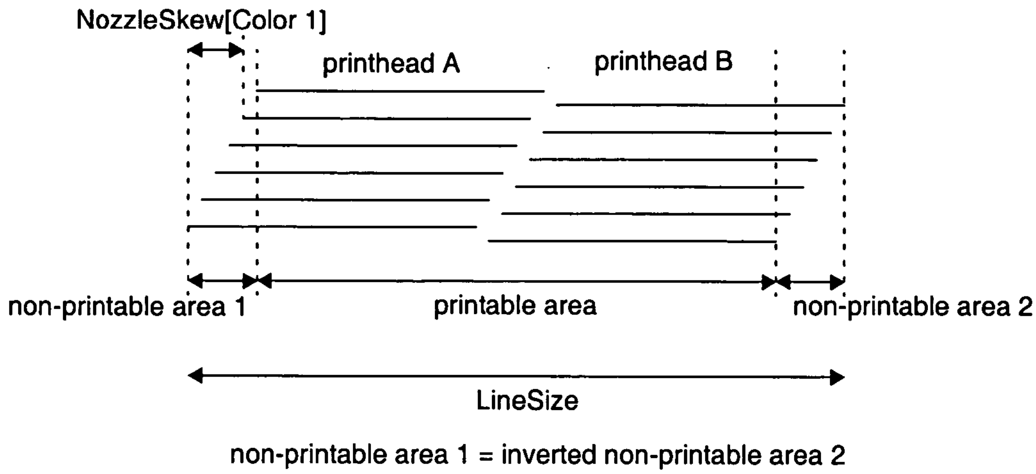
FIG. 257 shows a conceptual view of printhead row alignment
Figure 258:
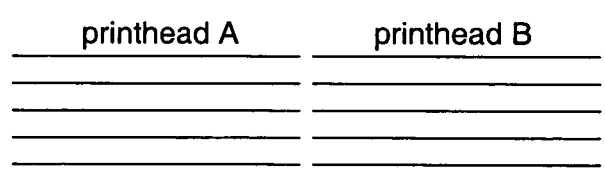
FIG. 258 shows a conceptual view of printhead rows (as seen by the LLU and PHI)
Figure 259:
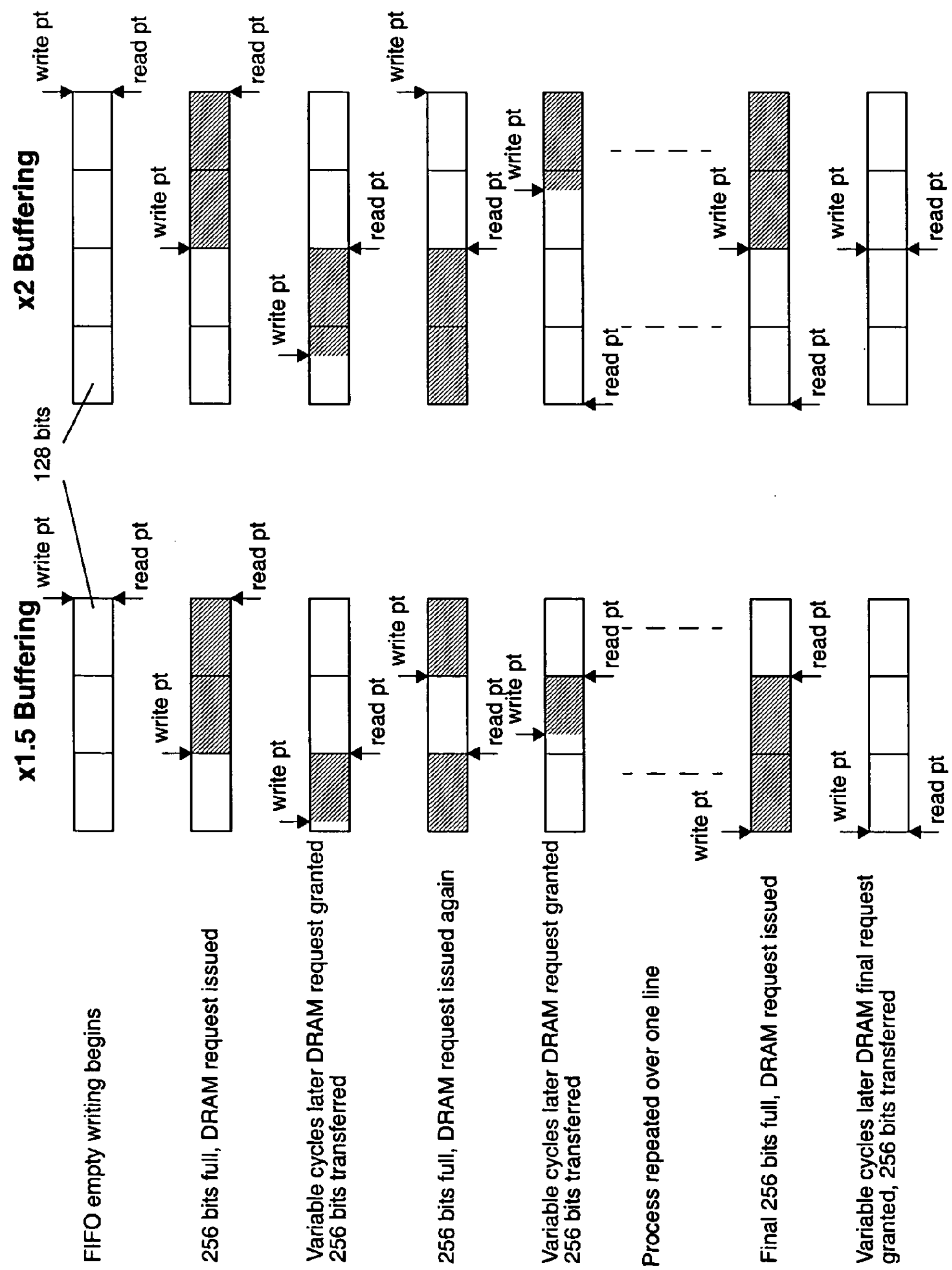
FIG. 259 shows a comparison of 1.5× v 2× buffering

A conceptual misaligned printhead is shown in FIG. 257. The exact shape of the row alignment is arbitrary, although is most likely to be sloping (if sloping, it could be sloping in either direction). The DWU is required to adjust the shape of the dot streams to take account of the join between printhead ICs. The introduction of the join shape before the data is written to the DRAM means that the PHI sees a single crossover point in the data since all lines are the same length and the crossover point (since all rows are of equal length) is a vertical line—i.e. the crossover is at the same time for all even rows, and at the same time for all odd rows as shown in FIG. 258.

To insert the shape of the join into the dot stream, for each line we must first insert the dots for non-printable area 1, then the printable area data (from the DNC), and then finally the dots for non-printable area 2. This can also be considered as: first produce the dots for non-printable area 1 for line n, and then a repetition of:

- produce the dots for the printable area for line n (from the DNC)
- produce the dots for the non-printable area 2 (for line n) followed by the dots of non-printable area 1 (for line n+1)

The reason for considering the problem this way is that regardless of the shape of the join, the shape of non-printable area 2 merged with the shape of non-printable area 1 will always be a rectangle since the widths of non-printable areas 1 and 2 are identical and the lengths of each row are identical. Hence step 2 can be accomplished by simply inserting a constant number (MaxNozzleSkew) of 0 dots into the stream.

For example, if the color n even row non-printable area 1 is of length X, then the length of color n even row non-printable area 2 will be of length MaxNozzleSkew−X. The split between non-printable areas 1 and 2 is defined by the NozzleSkew registers.

Data from the DNC is destined for the printable area only, the DWU must generate the data destined for the non-printable areas, and insert DNC dot data correctly into the dot data stream before writing dot data to the fifos. The DWU inserts the shape of the misalignment into the dot stream by delaying dot data destined to different nozzle rows by the relative misalignment skew amount.

30.6 Local Buffering

An embedded DRAM is expected to be of the order of 256 bits wide, which results in 27 words per half line of an A4 page, and 54 words per half line of A3. This requires 27 words×12 half colors (6 colors odd and even)=324×256-bit DRAM accesses over a dotline print time, equating to 6 bits per cycle (equal to DNC generate rate of 6 bits per cycle). Each half color is required to be double buffered, while filling one buffer the other buffer is being written to DRAM. This results in 256 bits×2 buffers×12 half colors i.e. 6144 bits in total.

The buffer requirement can be reduced, by using 1.5 buffering, where the DWU is filling 128 bits while the remaining 256 bits are being written to DRAM. While this reduces the required buffering locally it increases the peak bandwidth requirement to the DRAM. With 2× buffering the average and peak DRAM bandwidth requirement is the same and is 6 bits per cycle, alternatively with 1.5× buffering the average DRAM bandwidth requirement is 6 bits per cycle but the peak bandwidth requirement is 12 bits per cycle. The amount of buffering used will depend on the DRAM bandwidth available to the DWU unit.

Should the DWU fail to get the required DRAM access within the specified time, the DWU will stall the DNC data generation. The DWU will issue the stall in sufficient time for the DNC to respond and still not cause a FIFO overrun. Should the stall persist for a sufficiently long time, the PHI will be starved of data and be unable to deliver data to the printhead in time. The sizing of the dotline store FIFO and internal FIFOs should be chosen so as to prevent such a stall happening.

30.7 Dotline Data in Memory

The dot data shift register order in the printhead is shown in FIG. 254 (the transmit order is the opposite of the shift register order). In the example the type 0 printhead IC transmit order is increasing even color data followed by decreasing odd color data. The type 1 printhead IC transmit order is decreasing odd color data followed by increasing even color data. For both printhead ICs the even data is always increasing order and odd data is always decreasing. The PHI controls which printhead IC data gets shifted to.

From this it is beneficial to store even data in increasing order in DRAM and odd data in decreasing order. While this order suits the example printhead, other printheads exist where it would be beneficial to store even data in decreasing order, and odd data in increasing order, hence the order is configurable. The order that data is stored in memory is controlled by setting the ColorLineSense register.

Figure 260:
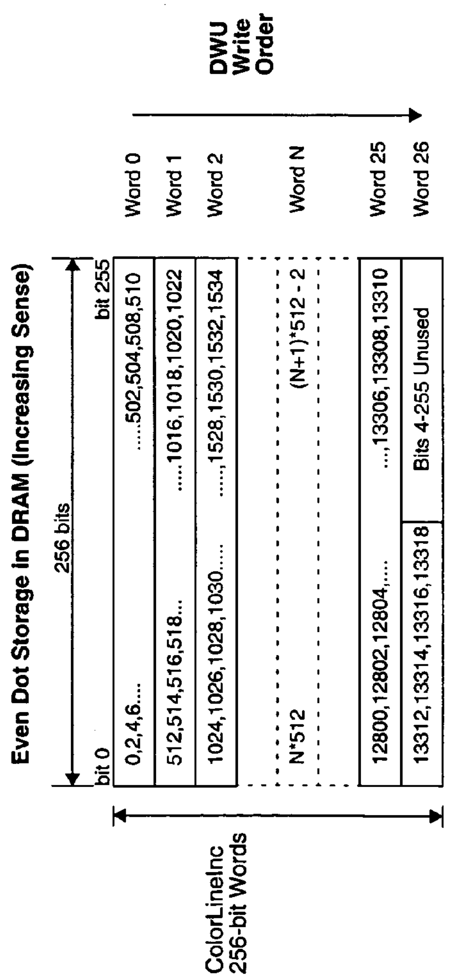
FIG. 260 shows an even dot order in DRAM (increasing sense, 13320 dot wide line)
Figure 261:
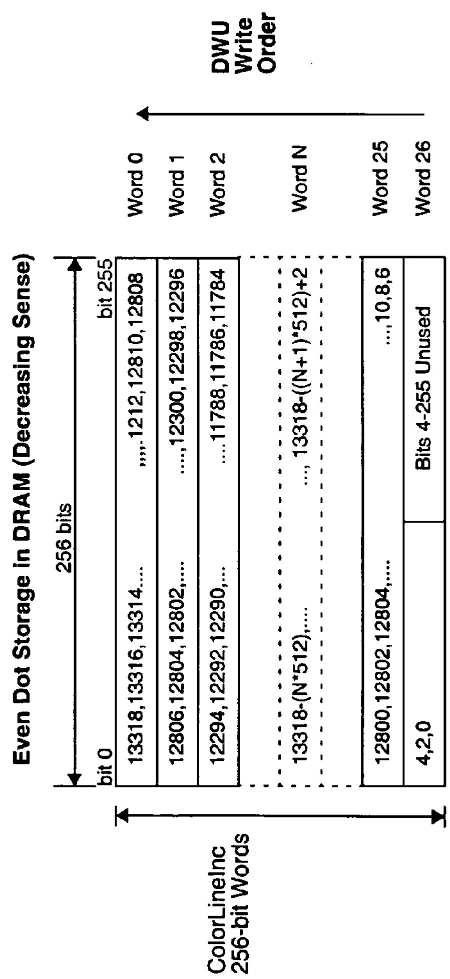
FIG. 261 shows an even dot order in DRAM (decreasing sense, 13320 dot wide line)
Figure 262:
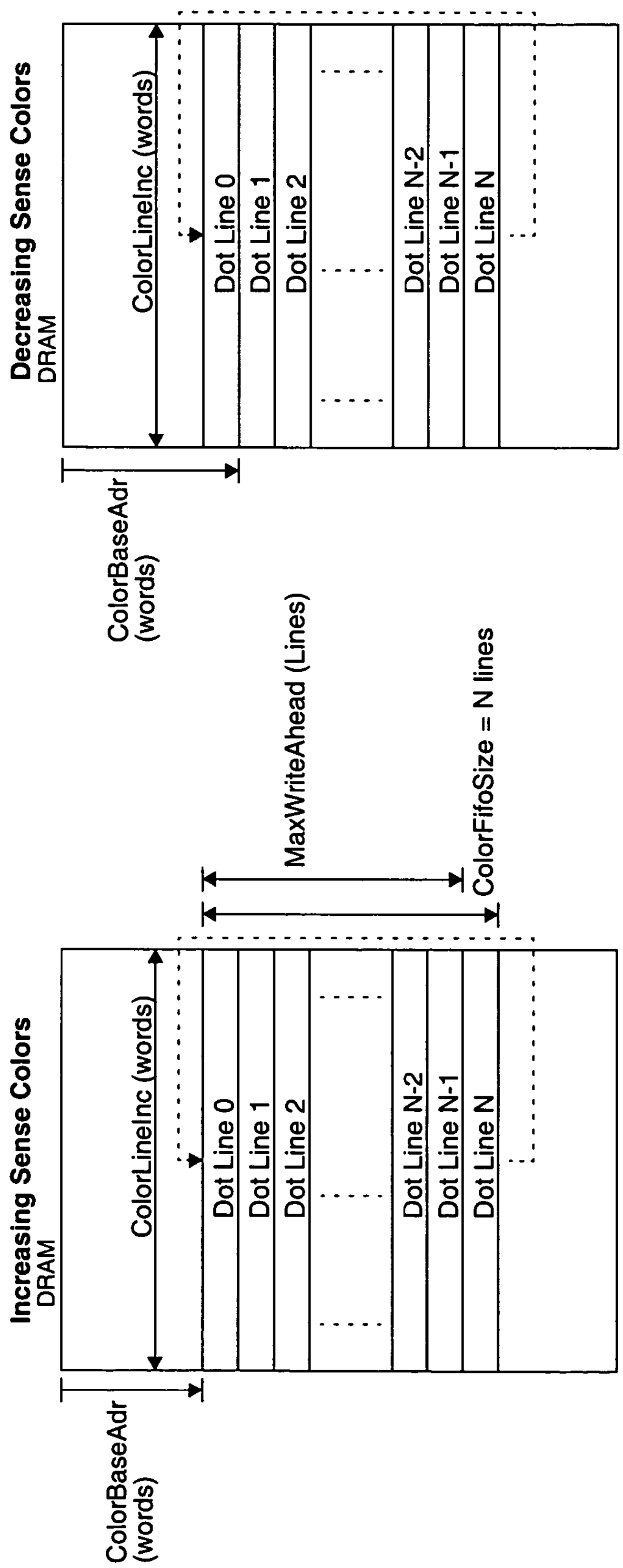
FIG. 262 shows a dotline FIFO data structure in DRAM
Figure 263:
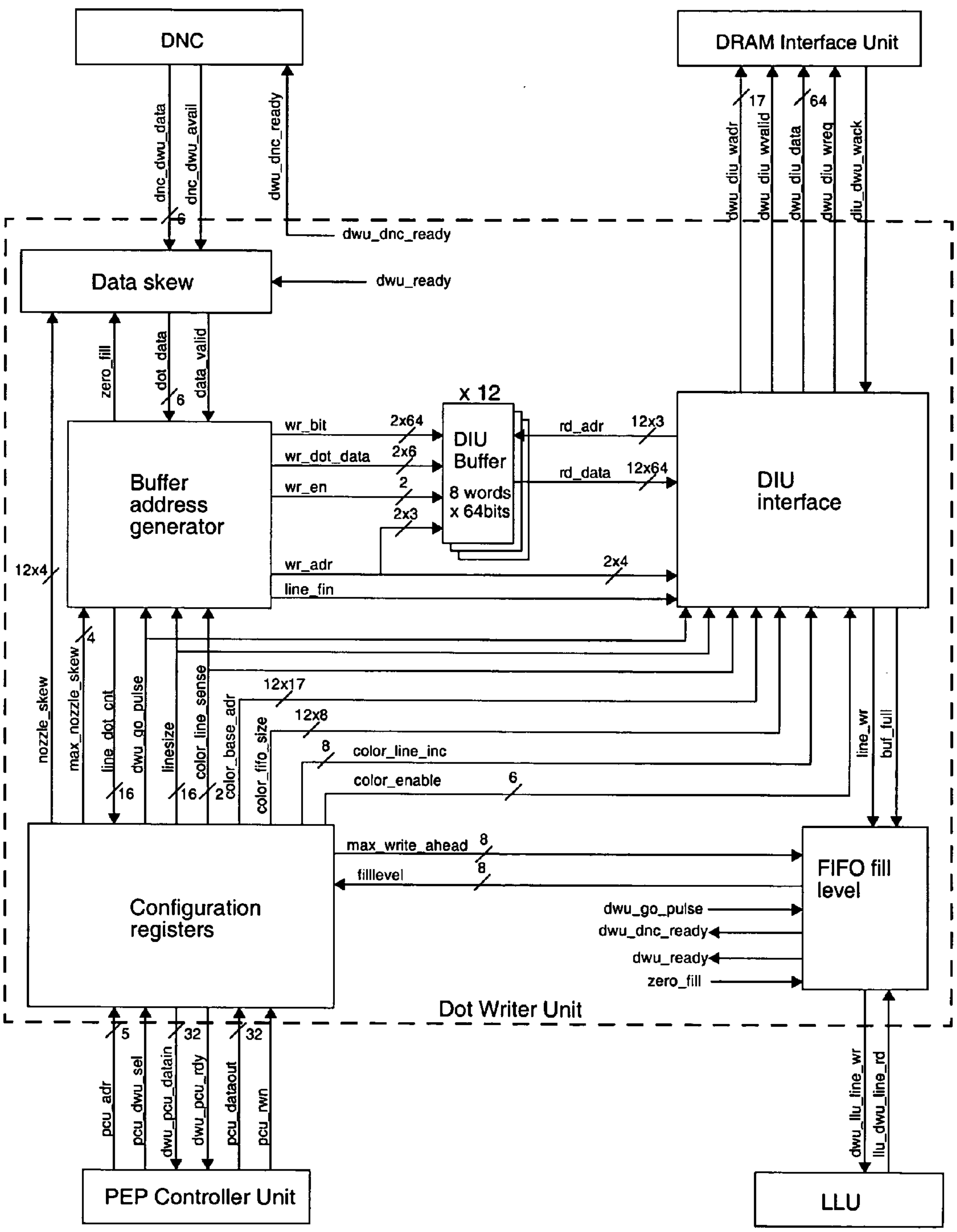
FIG. 263 shows a DWU partition
Figure 264:
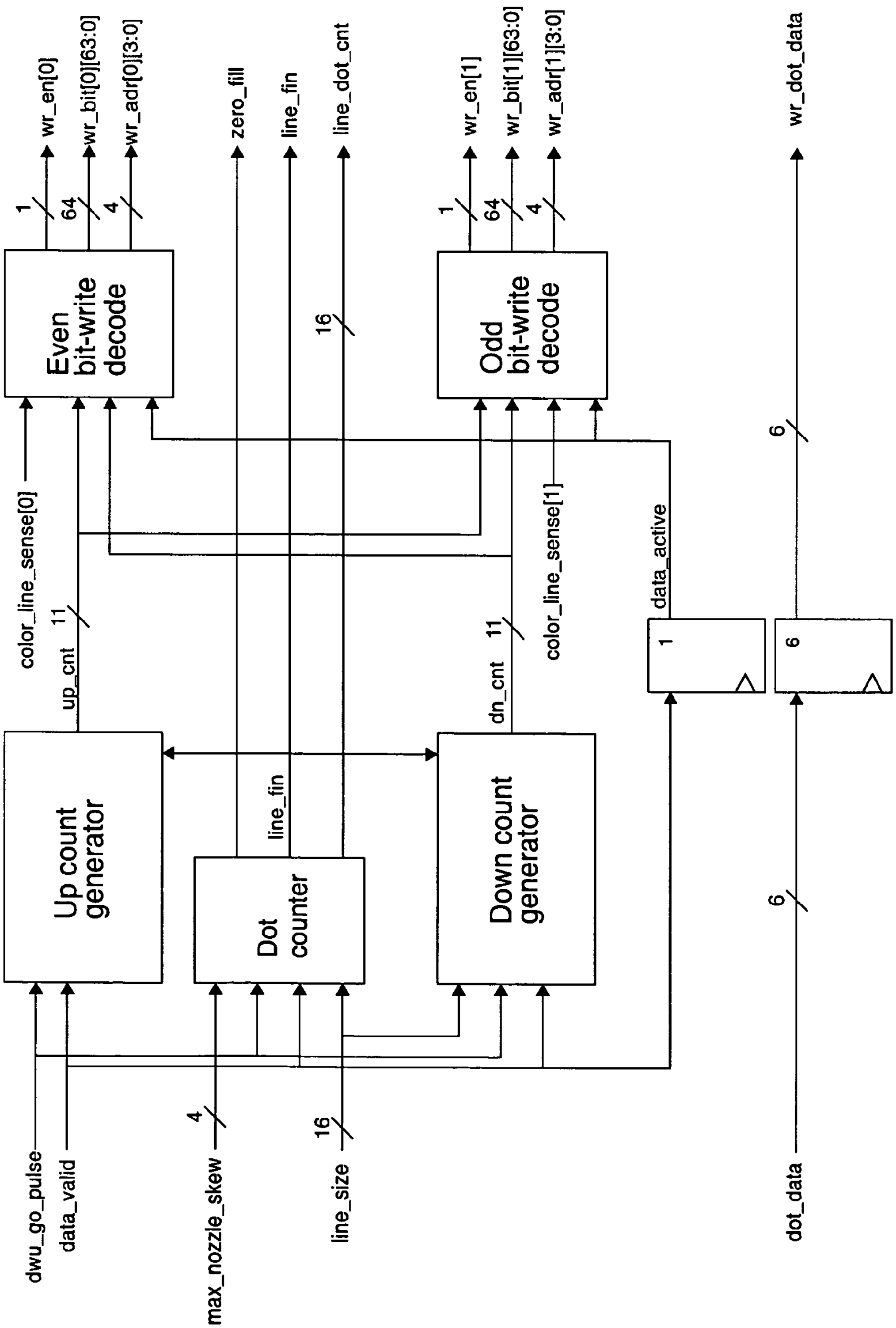
FIG. 264 shows a buffer address generator sub-block
Figure 265:
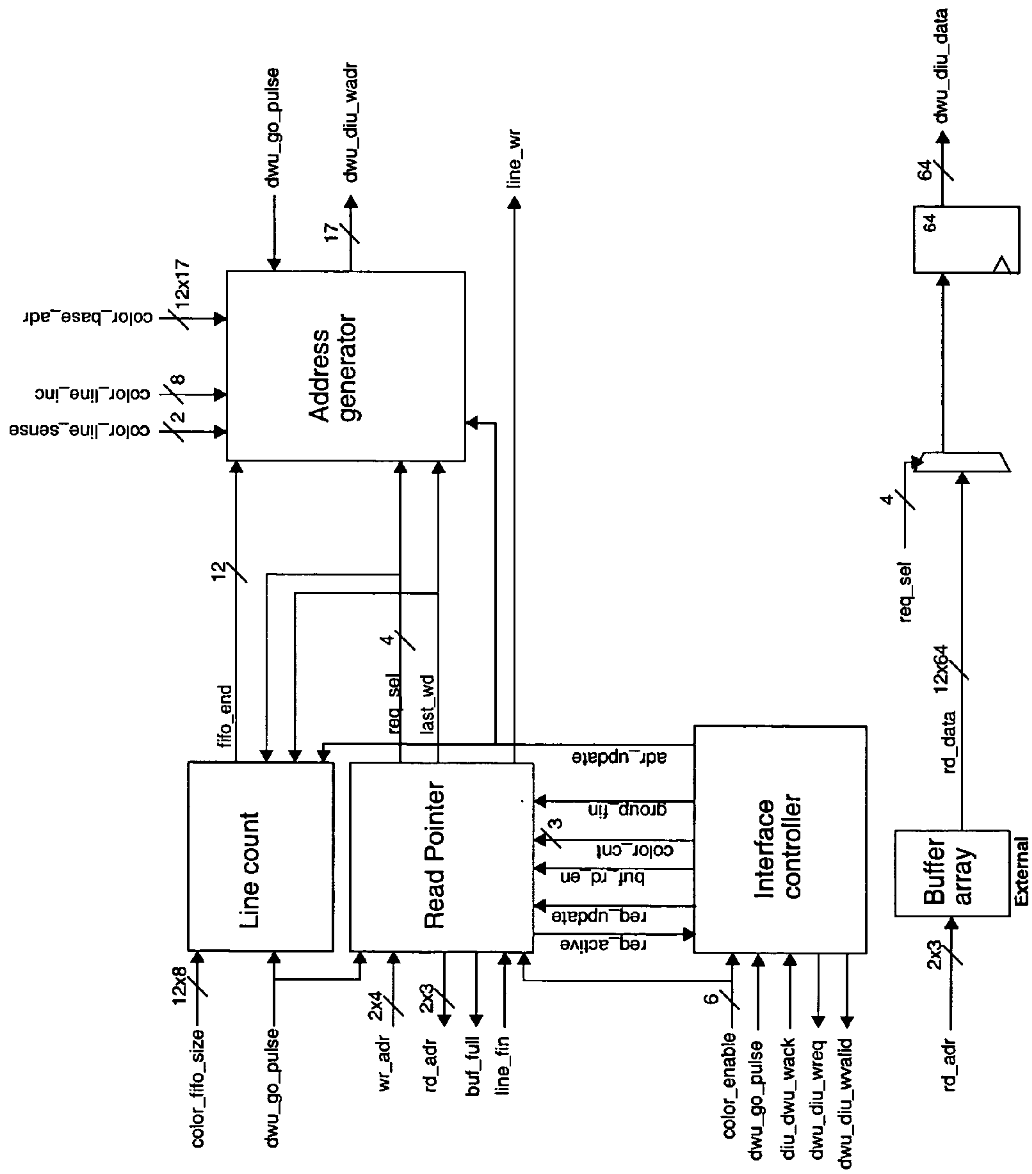
FIG. 265 shows a DIU Interface sub-block
Figure 266:
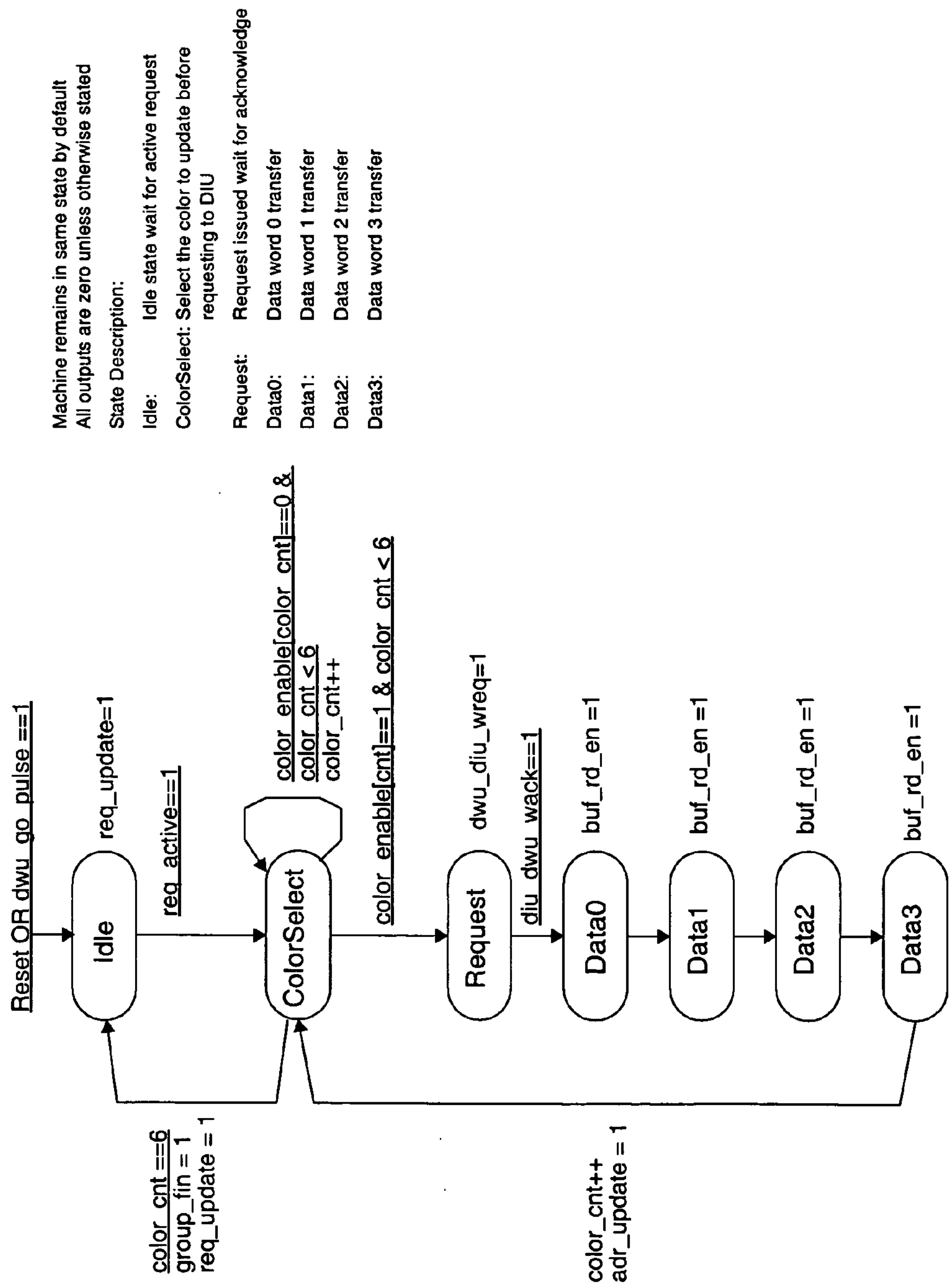
FIG. 266 shows an interface controller state diagram

The dot order in DRAM for increasing and decreasing sense is shown in FIG. 260 and FIG. 261 respectively. For each line in the dot store the order is the same (although for odd lines the numbering will be different the order will remain the same). Dot data from the DNC is always received in increasing dot number order. For increasing sense dot data is bundled into 256-bit words and written in increasing order in DRAM, word 0 first, then word 1, and so on to word N, where N is the number of words in a line.

For decreasing sense dot data is also bundled into 256-bit words, but is written to DRAM in decreasing order, i.e. word N is written first then word N−1 and so on to word 0. For both increasing and decreasing sense the data is aligned to bit 0 of a word, i.e. increasing sense always starts at bit 0, decreasing sense always finishes at bit 0.

Each half color is configured independently of any other color. The ColorBaseAdr register specifies the position where data for a particular dotline FIFO will begin writing to. Note that for increasing sense colors the ColorBaseAdr register specifies the address of the first word of first line of the fifo, whereas for decreasing sense colors the ColorBaseAdr register specifies the address of last word of the first line of the FIFO.

Dot data received from the DNC is bundled in 256-bit words and transferred to the DRAM. Each line of data is stored consecutively in DRAM, with each line separated by ColorLineInc number of words.

For each line stored in DRAM the DWU increments the line count and calculates the DRAM address for the next line to store.

This process continues until ColorFifoSize number of lines are stored, after which the DRAM address will wrap back to the ColorBaseAdr address.

As each line is written to the FIFO, the DWU increments the FifoFillLevel register, and as the LLU reads a line from the FIFO the FifoFillLevel register is decremented. The LLU indicates that it has completed reading a line by a high pulse on the llu_dwu_line_rd line.

When the number of lines stored in the FIFO is equal to the MaxWriteAhead value the DWU will indicate to the DNC that it is no longer able to receive data (i.e. a stall) by deasserting the dwu_dnc_ready signal.

The ColorEnable register determines which color planes should be processed, if a plane is turned off, data is ignored for that plane and no DRAM accesses for that plane are generated.

30.8 Specifying Dot FIFOs

The dot line FIFOs when accessed by the LLU are specified differently than when accessed by the DWU. The DWU uses a start address and number of lines value to specify a dot FIFO, the LLU uses a start and end address for each dot FIFO. The mechanisms differ to allow more efficient implementations in each block.

As a result of limitations in the LLU the dot FIFOs must be specified contiguously and increasing in DRAM. See section 31.6 on page 504 for further information.

30.9 Implementation 30.9.1 Definitions of I/O

TABLE 206

DWU I/O Definition

| Port name | Pins | I/O | Description |
|---|---|---|---|
| Clocks and Resets | | | |
| Pclk | 1 | In | System Clock |
| prst_n | 1 | In | System reset, synchronous active low |
| DNC Interface | | | |
| dwu_dnc_ready | 1 | Out | Indicates that DWU is ready to accept data from the DNC. |
| dnc_dwu_avail | 1 | In | Indicates valid data present on dnc_dwu_data. |
| dnc_dwu_data[5:0] | 6 | In | Input bi-level dot data in 6 ink planes. |
| LLU Interface | | | |
| dwu_llu_line_wr | 1 | Out | DWU line write. Indicates that the DWU has completed a full line write. Active high |
| llfu_dwu_line_rd | 1 | In | LLU line read. Indicates that the LLU has completed a line read. Active high. |
| PCU Interface | | | |
| pcu_dwu_sel | 1 | In | Block select from the PCU. When pcu_dwu_sel is high both pcu_adr and pcu_dataout are valid. |
| pcu_rwn | 1 | In | Common read/not-write signal from the PCU. |
| pcu_adr[7:2] | 6 | In | PCU address bus. Only 6 bits are required to decode the address space for this block. |
| pcu_dataout[31:0] | 32 | In | Shared write data bus from the PCU. |
| dwu_pcu_rdy | 1 | Out | Ready signal to the PCU. When dwu_pcu_rdy is high it indicates the last cycle of the access. For a write cycle this means pcu_dataout has been registered by the block and for a read cycle this means the data on dwu_pcu_datain is valid. |
| dwu_pcu_datain[31:0] | 32 | Out | Read data bus to the PCU. |

TABLE 206-continued

DWU I/O Definition

| Port name | Pins | I/O | Description |
|---|---|---|---|
| DIU Interface | | | |
| dwu_diu_wreq | 1 | Out | DWU requests DRAM write. A write request must be accompanied by a valid write address together with valid write data and a write valid. |
| dwu_diu_wadr[21:5] | 17 | Out | Write address to DIU<br>17 bits wide (256-bit aligned word) |
| diu_dwu_wack | 1 | In | Acknowledge from DIU that write request has been accepted and new write address can be placed on dwu_diu_wadr |
| dwu_diu_data[63:0] | 64 | Out | Data from DWU to DIU. 256-bit word transfer over 4 cycles<br>First 64-bits is bits 63:0 of 256 bit word<br>Second 64-bits is bits 127:64 of 256 bit word<br>Third 64-bits is bits 191:128 of 256 bit word<br>Fourth 64-bits is bits 255:192 of 256 bit word |
| dwu_diu_wvalid | 1 | Out | Signal from DWU indicating that data on dwu_diu_data is valid. |

30.9.2 DWU Partition 30.9.3 Configuration Registers

The configuration registers in the DWU are programmed via the PCU interface. Refer to section 21.8.2 on page 321 for a description of the protocol and timing diagrams for reading and writing registers in the DWU. Note that since addresses in SoPEC are byte aligned and the PCU only supports 32-bit register reads and writes, the lower 2 bits of the PCU address bus are not required to decode the address space for the DWU. When reading a register that is less than 32 bits wide zeros should be returned on the upper unused bit(s) of dwu_pcu_data. Table 207 lists the configuration registers in the DWU.

TABLE 207

DWU registers description

| Address DWU_base+ | Register | #bits | Reset | Description |
|---|---|---|---|---|
| Control Registers | | | | |
| 0x00 | Reset | 1 | 0x1 | Active low synchronous reset, self de-activating. A write to this register will cause a DWU block reset. |
| 0x04 | Go | 1 | 0x0 | Active high bit indicating the DWU is programmed and ready to use. A low to high transition will cause DWU block internal states to reset (configuration registers are not reset). |
| Dot Line Store Configuration | | | | |
| 0x08–0x34 | ColorBaseAdr [11:0][21:5] | 12 × 17 | 0x000 00 | Specifies the base address (in words) in memory where data from a particular half color (N) will be placed. For increasing sense colors the ColorBase-Adr register specifies the address of the first word of first line of the fifo, whereas for decreasing sense colors the ColorBaseAdr register specifies the address of last word of the first line of the fifo. |
| 0x38–0x64 | ColorFifoSize[11:0] | 12 × 8 | 0x00 | Indicates the number of lines in the FIFO before the line increment will wrap around in memory.<br>Bus 0,1 - Even, Odd line color 0<br>Bus 2,3 - Even, Odd line color 1<br>Bus 4,5 - Even, Odd line color 2<br>Bus 6,7 - Even, Odd line color 3<br>Bus 8,9 - Even, Odd line color 4<br>Bus 10,11 - Even, Odd line color 5 |
| 0x68 | ColorLineSense | 2 | 0x2 | Specifies whether data written to DRAM for this half color is increasing or decreasing sense<br>0 - Decreasing sense<br>1 - Increasing sense |

TABLE 207-continued

DWU registers description

| Address DWU_base+ | Register | #bits | Reset | Description |
|---|---|---|---|---|
| | | | | Bit 0 Defines even color sense, Bit 1 Defines odd color sense. |
| 0x6C | ColorEnable | 6 | 0x3F | Indicates whether a particular color is active or not. When inactive no data is written to DRAM for that color. 0 - Color off 1 - Color on One bit per color, bit 0 is Color 0 and so on. |
| 0x70 | MaxWriteAhead | 8 | 0x00 | Specifies the maximum number of lines that the DWU can be ahead of the LLU |
| 0x74 | LineSize | 16 | 0x000 0 | Indicates the number of dots per line produced by the DWU. |
| 0x78 | MaxNozzleSkew | 4 | 0x0 | Specifies the number of dot-pairs the DWU needs to generate to flush the data skew buffers. Corresponds to the non-printable area of the printhead. |
| 0x7C–0xA8 | NozzleSkew | 12 × 4 | 0x0 | Specifies the relative skew of dot data nozzle rows in the printhead. Valid range is 0 (no skew) through to 12. Units represent dot-pairs, a skew of 1 for a row represents two dots on the page.<br>Bus 0,1 - Even, Odd line color 0<br>Bus 2,3 - Even, Odd line color 1<br>Bus 4,5 - Even, Odd line color 2<br>Bus 6,7 - Even, Odd line color 3<br>Bus 8,9 - Even, Odd line color 4<br>Bus 10,11 - Even, Odd line color 5 |
| 0xAC | ColorLineInc | 8 | 0x00 | Specifies the number of words (256-bit words) per dot line - 1. |
| Working Registers | | | | |
| 0xB0 | LineDotCnt | 16 | 0x000 0 | Indicates the number of remaining dots in the current line. (Read Only) |
| 0xB4 | FifoFillLevel | 8 | 0x00 | Number of lines in the FIFO, written to but not read. (Read Only) |

A low to high transition of the Go register causes the internal states of the DWU to be reset. All configuration registers will remain the same. The block indicates the transition to other blocks via the dwu_go_pulse signal.

30.9.4 Data Skew

The data skew block inserts the shape of the printhead join into the dot data stream by delaying dot data by the relative nozzle skew amount (given by nozzle_skew). It generates zero fill data introduced introduced into the dot data stream to achieve the relative skew (and also to flush dot data from the delay registers).

The data skew block consists of 12 12-bit shift registers, one per color odd and even. The shift registers are in groups of 6, one group for even colors, and one for odd colors. Each time a valid data word is received from the DNC the dot data is shifted into either the odd or even group of shift registers. The odd_even_sel register determines which group of shift registers are valid for that cycle and alternates for each new valid data word. When a valid word is received for a group of shift registers, the shift register is shifted by one location with the new data word shifted into the registers (the top word in the register will be discarded).

When the dot counter determines that the data skew block should zero fill (zero_fill), the data skew block will shift zero dot data into the shift registers until the line has completed. During this time the DNC will be stalled by the de-assertion of the dwu_dnc_ready signal.

The data skew block selects dot data from the shift registers and is passed to the buffer address generator block. The data bits selected is determined by the configured index values in the NozzleSkew registers.

```
// determine when data is valid
data_valid = (((dnc_dwu_avail = = 1)OR(zero_fill = = 1)) AND
(dwu_ready = =1))
// implement the zero fill mux
if (zero_fill = = 1) then
    dot_data_in = 0
else
    dot_data_in = dnc_dwu_data
// the data delay buffers
if (dwu_go_pulse = =1) then
    data_delay[1:0] [11:0] [5:0]          = 0       // reset all
delay buffer odd=1,even=0
    odd_even_sel                          = 0
elsif (data_valid = = 1) then {
    odd_even_sel = ~odd_even_sel
    // update the odd/even buffers, with shift
    data_delay[odd_even_sel] [11:1] [5:0] =
data_delay[odd_even_sel] [10:0] [5:0] // shift data
    data delay[odd even sel] [0] [5:0]  =  dot data in [5:0]
// shift in new data
    // select the correct output data
    for (i=0;i<6; i++) {
        // skew selector
        skew  =  nozzle skew[  {i,odd even sel}  ]
```

-continued

```
// temporary variable
        // data select array, include data delay and input dot
data
        data_select[12:0]  =  {data_delay[odd_even_sel] [11:0],
dot_data_in}
        // mux output the data word to next block (13 to 1 mux)
        dot_data[i] = data_select [skew] [i]
        }
    }
```

30.9.5 Fifo Fill Level

The DWU keeps a running total of the number of lines in the dot store FIFO. Each time the DWU writes a line to DRAM (determined by the DIU interface subblock and signalled via line_wr) it increments the filllevel and signals the line increment to the LLU (pulse on dwu_llu_line_wr). Conversely if it receives an active llu_dwu_line_rd pulse from the LLU, the filllevel is decremented. If the filllevel increases to the programmed max level (max_write_ahead) then the DWU stalls and indicates back to the DNC by de-asserting the dwu_dnc_ready signal.

If one or more of the DIU buffers fill, the DIU interface signals the fill level logic via the buf_full signal which in turn causes the DWU to de-assert the dwu_dnc_ready signal to stall the DNC. The buf_full signals will remain active until the DIU services a pending request from the full buffer, reducing the buffer level.

When the dot counter block detects that it needs to insert zero fill dots (zero_fill equals 1) the DWU will stall the DNC while the zero dots are being generated (by de-asserting dwu_dnc_ready), but will allow the data skew block to generate zero fill data (the dwu_ready signal).

```
    dwu_dnc_ready  =  ~((buf_full= =  1)  OR  (filllevel  = =
    max_write_ahead ) OR (zero_fill = = 1))
    dwu_ready      =  ~((buf_full= =  1)  OR  (filllevel  = =
    max_write_ahead ))
```

The DWU does not increment the fill level until a complete line of dot data is in DRAM not just a complete line received from the DNC. This ensures that the LLU cannot start reading a partial line from DRAM before the DWU has finished writing the line.

The fill level is reset to zero each time a new page is started, on receiving a pulse via the dwu_go_pulse signal.

The line fifo fill level can be read by the CPU via the PCU at any time by accessing the FifoFillLevel register.

30.9.6 Buffer Address Generator 30.9.6.1 Buffer Address Generator Description

The buffer address generator subblock is responsible for accepting data from the data skew block and writing it to the DIU buffers in the correct order.

The buffer address and active bit-write for a particular dot data write is calculated by the buffer address generator based on the dot count of the current line, programmed sense of the color and the line size.

All configuration registers should be programmed while the Go bit is set to zero, once complete the block can be enabled by setting the Go bit to one. The transition from zero to one will cause the internal states to reset.

If the color_line_sense signal for a color is one (i.e. increasing) then the bit-write generation is straight forward as dot data is aligned with a 256-bit boundary. So for the first dot in that color, the bit 0 of the wr_bit bus will be active (in buffer word 0), for the second dot bit 1 is active and so on to the 255$^{th}$ dot where bit 63 is active (in buffer word 3). This is repeated for all 256-bit words until the final word where only a partial number of bits are written before the word is transferred to DRAM.

If color_line_sense signal for a color is zero (i.e. decreasing) the bit-write generation for that color is adjusted by an offset calculated from the pre-programmed line length (line_size). The offset adjusts the bit write to allow the line to finish on a 256-bit boundary. For example if the line length was 400, for the first dot received bit 7 (line length is halved because of odd/even lines of color) of the wr_bit is active (buffer word 3), the second bit 6 (buffer word 3), to the 200$^{th}$ dot of data with bit 0 of wr_bit active (buffer word 0).

30.9.6.2 Bit-Write Decode

The buffer address generator contains 2 instances of the bit-write decode, one configured for odd dot data the other for even. The counter (either up or down counter) used to generate the addresses is selected by the color_line_sense signal. Each block determines if it is active on this cycle by comparing its configured type with the current dot count address and the data_active signal.

The wr_bit bus is a direct decoding of the lower 6 count bits (count[6:1]), and the DIU buffer address is the remaining higher bits of the counter (count[10:7]).

The signal generation is given as follows:

```
// determine the counter to use
if (color_line_sense = = 1 )
    count = up_cnt[10:0]
else
    count = dn_cnt[10:0]
// determine if active, based on instance type
wr_en               = data_active & (count[0] ^ odd_even_type)
// odd =1, even =0
// determine the bit write value
wr_bit[63:0]        = decode(count[6:1])
// determine the buffer 64-bit address
wr_adr[3:0]         = count[10:7]
```

30.9.6.3 Up Counter Generator

The up counter increments for each new dot and is used to determine the write position of the dot in the DIU buffers for increasing sense data. At the end of each line of dot data (as indicated by line_fin), the counter is rounded up to the nearest 256-bit word boundary. This causes the DIU buffers to be flushed to DRAM including any partially filled 256-bit words. The counter is reset to zero if the dwu_go_pulse is one.

```
// Up-Counter Logic
if (dwu_go_pulse = = 1) then {
    up_cnt[10:0] = 0
elsif (line_fin = = 1 ) then
    // round up
    if (up_cnt[8:1] != 0)
        up_cnt[10:9]++
    else
        up_cnt[10:9]
    // bit-selector
    up_cnt[7:0]=0
elsif (data_valid = = 1) then
    up_cnt[7:0]++
```

30.9.6.4 Down Counter Generator

The down counter logic decrements for each new dot and is used to determine the write position of the dot in the DUI buffers for decreasing sense data. When the dwu_go_pulse bit is one the lower bits (i.e. 8 to 0) of the counter are reset to line size value (line_size), and the higher bits to zero. The bits used to determine the bit-write values and 64-bit word addresses in the DIU buffers begin at line size and count down to zero. The remaining higher bits are used to determine the DIU buffer 256-bit address and buffer fill level, begin at zero and count up. The counter is active when valid dot data is present, i.e. data_valid equals 1.

When the end of line is detected (line_fin equals 1) the counter is rounded to the next 256-bit word, and the lower bits are reset to the line size value.

```
//Down-Counter Logic
if (dwu_go_pulse = = 1) then
    dn_cnt[8:0] = line_size[8:0]
    dn_cnt[10:9] = 0
elsif (line_fin = = 1 ) then
    // perform rounding up
    if (dn_cnt[8:1] != 0)
        dn_cnt[10:9]++
    else
        dn_cnt[10:9]
    // bit-select is reset
    dn_cnt[8:0]=line_size[8:0]   // bit select bits
elsif (data_valid = = 1) then
    dn_cnt[8:0] – –
    dn_cnt[10:9]++
```

30.9.6.5 Dot Counter

The dot counter simply counts each active dot received from the data skew block. It sets the counter to line_size and decrements each time a valid dot is received. When the count equals zero the line_fin signal is pulsed and the counter is reset to line_size.

When the count is less than the max_nozzle_skew* 2 value the dot counter indicates to the data skew block to zero fill the remainder of the line (via the zero_fill signal). Note that the max_nozzle_skew units are dot-pairs as opposed to dots, hence the by 2 multiplication for comparison with the dot counter.

The counter is reset to line_size when dwu_go_pulse is 1.

30.9.7 DIU Buffer

The DIU buffer is a 64 bit×8 word dual port register array with bit write capability. The buffer could be implemented with flip-flops should it prove more efficient.

30.9.8 DIU Interface 30.9.8.1 DIU Interface General Description

The DIU interface determines when a buffer needs a data word to be transferred to DRAM. It generates the DRAM address based on the dot line position, the color base address and the other programmed parameters. A write request is made to DRAM and when acknowledged a 256-bit data word is transferred. The interface determines if further words need to be transferred and repeats the transfer process.

If the FIFO in DRAM has reached its maximum level, or one of the buffers has temporarily filled, the DWU will stall data generation from the DNC.

A similar process is repeated for each line until the end of page is reached. At the end of a page the CPU is required to reset the internal state of the block before the next page can be printed. A low to high transition of the Go register will cause the internal block reset, which causes all registers in the block to reset with the exception of the configuration registers. The transition is indicated to subblocks by a pulse on dwu_go_pulse signal.

30.9.8.2 Interface Controller

The interface controller state machine waits in Idle state until an active request is indicated by the read pointer (via the req_active signal). When an active request is received the machine proceeds to the ColorSelect state to determine which buffers need a data transfer. In the ColorSelect state it cycles through each color and determines if the color is enabled (and consequently the buffer needs servicing), if enabled it jumps to the Request state, otherwise the color_cnt is incremented and the next color is checked.

In the Request state the machine issues a write request to the DIU and waits in the Request state until the write request is acknowledged by the DIU (diu_dwu_wack). Once an acknowledge is received the state machine clocks through 4 cycles transferring 64-bit data words each cycle and incrementing the corresponding buffer read address. After transferring the data to the DIU the machine returns to the ColorSelect state to determine if further buffers need servicing. On the transition the controller indicates to the address generator (adr_update) to update the address for that selected color.

If all colors are transferred (color_cnt equal to 6) the state machine returns to Idle, updating the last word flags (group_fin) and request logic (req_update).

The dwu_diu_wvalid signal is a delayed version of the buf_rd_en signal to allow for pipeline delays between data leaving the buffer and being clocked through to the DIU block.

The state machine will return from any state to Idle if the reset or the dwu_go_pulse is 1.

30.9.8.3 Address Generator

The address generator block maintains 12 pointers (color adr[11:0]) to DRAM corresponding to current write address in the dot line store for each half color. When a DRAM transfer occurs the address pointer is used first and then updated for the next transfer for that color. The pointer used is selected by the req_sel bus, and the pointer update is initiated by the adr_update signal from the interface controller.

The pointer update is dependent on the sense of the color of that pointer, the pointer position in a line and the line position in the FIFO. The programming of the color_base_adr needs to be adjusted depending of the sense of the colors. For increasing sense colors the color_base_adr specifies the address of the first word of first line of the fifo, whereas for decreasing sense colors the color_base_adr specifies the address of last word of the first line of the FIFO.

For increasing colors, the initialization value (i.e. when dwu_go_pulse is 1) is the color_base_adr.

For each word that is written to DRAM the pointer is incremented. If the word is the last word in a line (as indicated by last_wd from that read pointers) the pointer is also incremented. If the word is the last word in a line, and the line is the last line in the FIFO (indicated by fifo_end from the line counter) the pointer is reset to color_base_adr.

In the case of decreasing sense colors, the initialization value (i.e. when dwu_go_pulse is 1) is the color_base_adr. For each line of decreasing sense color data the pointer starts at the line end and decrements to the line start. For each word that is written to DRAM the pointer is decremented. If the word is the last word in a line the pointer is incremented by color_line_inc*2+1. One line length to account for the line of data just written, and another line length for the next line to be written. If the word is the last word in a line, and the line is the last line in the FIFO the pointer is reset to the initialization value (i.e. color_base_adr).

The address is calculated as follows:

```
if (dwu_go_pulse = = 1) then
    color_adr[11:0] = color_base_adr[11:0] [21:5]
elsif (adr_update = = 1) then {
    // determine the color
    color = req_sel[3:0]
    // line end and fifo wrap
    if ((fifo_end[color] = = 1) AND (last_wd = = 1)) then {
        // line end and fifo wrap
        color_adr[color] = color_base_adr[color] [21:5]
        }
    elsif ( last_wd = = 1) then {
        // just a line end no fifo wrap
        if (color_line_sense[color % 2] = = 1) then // increasing sense
            color_adr[color] ++
        else                    // decreasing sense
            color_adr[color] = color_adr[color] + ( color_line_inc * 2) + 1
        }
    else {
        // regular word write
        if (color_line_sense[color % 2] = = 1) then // increasing sense
            color_adr[color]++
        else                    // decreasing sense
            color_adr[color]- -
        }
    }
// select the correct address, for this transfer
dwu_diu_wadr = color_adr[req_sel]
```

30.9.8.4 Line Count

The line counter logic counts the number of dot data lines stored in DRAM for each color. A separate pointer is maintained for each color. A line pointer is updated each time the final word of a line is transferred to DRAM. This is determined by a combination of adr_update and last_wd signals. The pointer to update is indicated by the req_sel bus.

When an update occurs to a pointer it is compared to zero, if it is non-zero the count is decremented, otherwise the counter is reset to color_fifo_size. If a counter is zero the fifo_end signals is set high to indicates to the address generator block that the line is the last line of this colors fifo.

If the dwu_go_pulse signal is one the counters are reset to color_fifo_size.

```
if (dwu_go_pulse = = 1) then
    line_cnt[11:0] = color_fifo_size[11:0]
elsif ((adr_update = = 1) AND (last_wd = = 1)) then {
    // determine the pointer to operate on
    color = req_sel[3:0]
    // update the pointer
    if (line_cnt[color] = = 0) then
        line_cnt[color] = color_fifo_size[color]
    else
        line_cnt[i] - -
    }
// count is zero its the last line of fifo
for(i=0 ;i <12;i++){
    fifo_end[i] = (line_cnt[i] = = 0)
    }
```

30.9.8.5 Read Pointer

The read pointer logic maintains the buffer read address pointers. The read pointer is used to determine which 64-bit words to read from the buffer for transfer to DRAM.

The read pointer logic compares the read and write pointers of each DIU buffer to determine which buffers require data to be transferred to DRAM, and which buffers are full (the buf_full signal).

Buffers are grouped into odd and even buffers groups. If an odd buffer requires DRAM access the odd_pend signals will be active, if an even buffer requires DRAM access the even_pend signals will be active. If both odd and even buffers require DRAM access at exactly the same time, the even buffers will get serviced first. If a group of odd buffers are being serviced and an even buffer becomes pending, the odd group of buffers will be completed before the starting the even group, and vice versa.

If any buffer requires a DRAM transfer, the logic will indicate to the interface controller via the req_active signal, with the odd_even_sel signal determining which group of buffers get serviced. The interface controller will check the color_enable signal and issue DRAM transfers for all enabled colors in a group. When the transfers are complete it tells the read pointer logic to update the requests pending via req update signal.

The req_sel[3:0] signal tells the address generator which buffer is being serviced, it is constructed from the odd_even_sel signal and the color_cnt[2:0] bus from the interface controller. When data is being transferred to DRAM the word pointer and read pointer for the corresponding buffer are updated. The req_sel determines which pointer should be incremented.

```
// determine if request is active even
if ( wr_adr[0] [3:2] != rd_adr[0] [3:2] )
    even_pend = 1
else
    even_pend = 0
// determine if request is active odd
if ( wr_adr[1] [3:2] != rd_adr[1] [3:2] )
    even_pend = 1
else
    even_pend = 0
// determine if any buffer is full
if ((wr_adr[0] [3:0] - rd_adr[0] [3:0]) > 7)OR((wr_adr[1] [3:0] - rd_adr[1] [3:0])> 7)) then
    buf_full = 1
//  fixed servicing order, only update when controller dictates so
if (req_update = = 1) then {
    if (even_pend = = 1) then              // even always first
        odd_even_sel    = 0
        req_active      = 1
    elsif (odd_pend = = 1 ) then           // then check odd
        odd_even_sel    = 0
        req_active      = 1
    else                                   // nothing active
        odd_even_sel    = 0
        req_active      = 0
    }
// selected requestor
req_sel[3:0] = {color_cnt[2:0] , odd_even_sel} // concatentation
```

The read address pointer logic consists of 2 2-bit counters and a word select pointer. The pointers are reset when dwu_go_pulse is one. The word pointer (word_ptr) is common to all buffers and is used to read out the 64-bit words from the DIU buffer. It is incremented when buf_rd_en is active. When a group of buffers are updated the state machine increments the read pointer (rd_ptr[odd_even_sel]) via the group_fin signal. A concatenation of the read pointer and the word pointer are use to construct the buffer read address. The read pointers are not reset at the end of each line.

```
// determine which pointer to update
if (dwu_go_pulse = = 1) then
    rd_ptr[1:0]    = 0
    word_ptr       = 0
elsif (buf_rd_en = = 1) then {
    word_ptr++                          // word pointer update
elsif (group_fin = = 1) then
    rd_ptr [odd_even_sel]++              // update the read
pointer
// create the address from the pointer, and word reader
rd_adr[odd_even_sel] = {rd_ptr[odd_even_sel],word_ptr}       //
concatenation
```

The read pointer block determines if the word being read from the DIU buffers is the last word of a line. The buffer address generator indicate the last dot is being written into the buffers via the line_fin signal. When received the logic marks the 256-bit word in the buffers as the last word. When the last word is read from the DIU buffer and transferred to DRAM, the flag for that word is reflected to the address generator.

```
    // line end set the flags
    if (dwu_go_pulse = = 1) then
        last_flag[1:0][1:0] = 0
    elsif (line_fin = = 1) then
        // determines the current 256-bit word even been written
to
        last_flag[0][wr_adr[0][2]] = 1          // even group flag
        // determines the current 256-bit word odd been written to
        last_flag[1][wr_adr[1][2]] = 1          // odd group flag
    // last word reflection to address generator
    last_wd = last_flag [odd_even_sel][rd_ptr[req_sel][0]]
    // clear the flag
    if (group_fin = = 1 ) then
        last_flag [odd_even_sel][rd_ptr[req_sel][0]] = 0
```

When a complete line has been written into the DIU buffers (but has not yet been transferred to DRAM), the buffer address generator block will pulse the line_fin signal. The DWU must wait until all enabled buffers are transferred to DRAM before signaling the LLU that a complete line is available in the dot line store (dwu_llu_line_wr signal). When the line_fin is received all buffers will require transfer to DRAM. Due to the arbitration, the even group will get serviced first then the odd. As a result the line finish pulse to the LLU is generated from the last_flag of the odd group.

//must be odd, odd group transfer complete and the last word dwu_llu_line_wr=odd_even_sel AND last_wd 31 Line Loader Unit (LLU)

31.1 Overview

Figure 267:
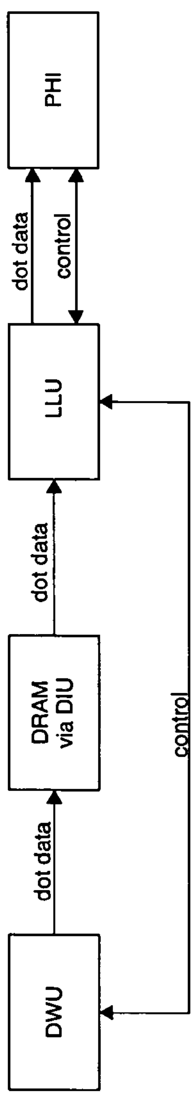
FIG. 267 shows a high level data flow diagram of LLU in context

The Line Loader Unit (LLU) reads dot data from the line buffers in DRAM and structures the data into even and odd dot channels destined for the same print time. The blocks of dot data are transferred to the PHI and then to the printhead. FIG. 267 shows a high level data flow diagram of the LLU in context.

31.2 Physical Requirement Imposed by the Printhead

Figure 268:
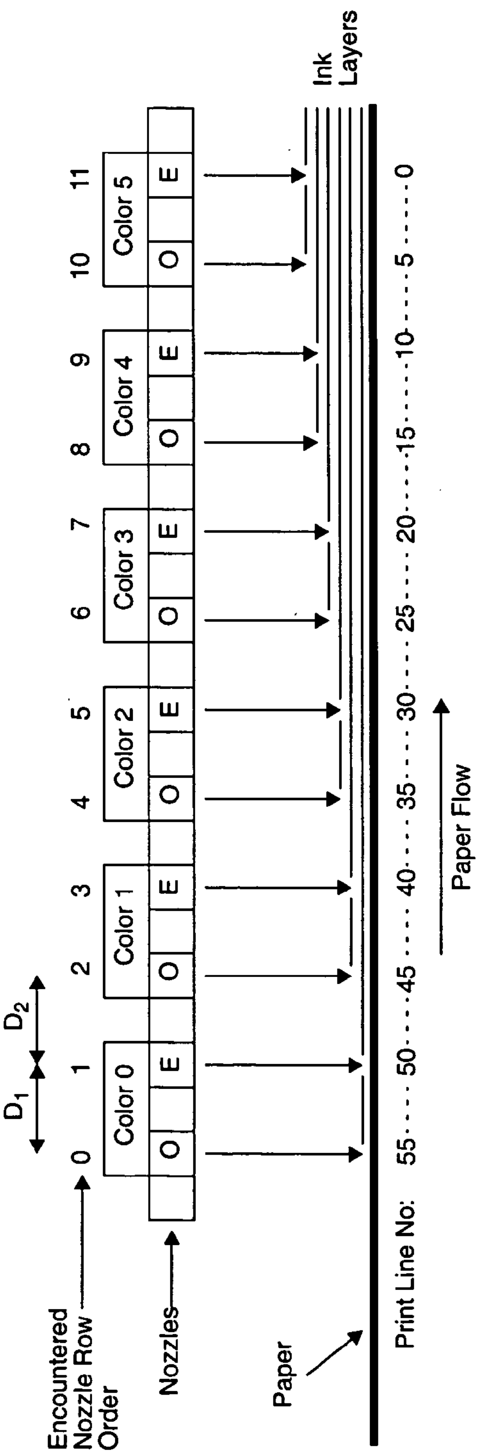
FIG. 268 shows paper and printhead nozzles relationship (example with $D_1=D_2=5$)

The DWU re-orders dot data into 12 separate dot data line FIFOs in the DRAM. Each FIFO corresponds to 6 colors of odd and even data. The LLU reads the dot data line FIFOs and sends the data to the printhead interface. The LLU decides when data should be read from the dot data line FIFOs to correspond with the time that the particular nozzle on the printhead is passing the current line. The interaction of the DWU and LLU with the dot line FIFOs compensates for the physical spread of nozzles firing over several lines at once. For further explanation see Section 30 Dotline Writer Unit (DWU) and Section 32 Printhead Interface (PHI). FIG. 268 shows the physical relationship of nozzle rows and the line time the LLU starts reading from the dot line store.

Figure 269:
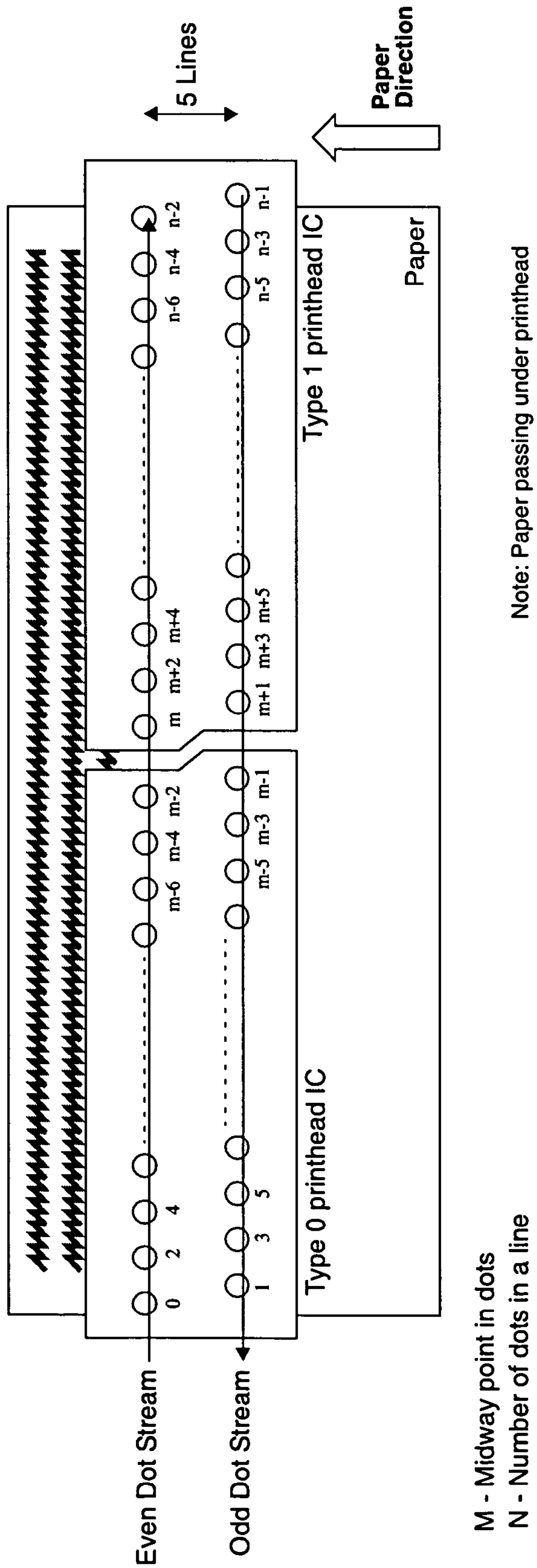
FIG. 269 shows printhead structure and dot generate order

Within each line of dot data the LLU is required to generate an even and odd dot data stream to the PHI block. FIG. 269 shows the even and dot streams as they would map to an example bi-lithic printhead. The PHI block determines which stream should be directed to which printhead IC.

31.3 Dot Generate and Transmit Order

The structure of the printhead ICs dictate the dot transmit order to each printhead IC. The LLU reads data from the dot line FIFO, generates an even and odd dot stream which is then re-ordered (in the PHI) into the transmit order for transfer to the printhead.

The DWU separates dot data into even and odd half lines for each color and stores them in DRAM. It can store odd or even dot data in increasing or decreasing order in DRAM. The order is programmable but for descriptive purposes assume even in increasing order and odd in decreasing order. The dot order structure in DRAM is shown in FIG. 261.

Figure 270:
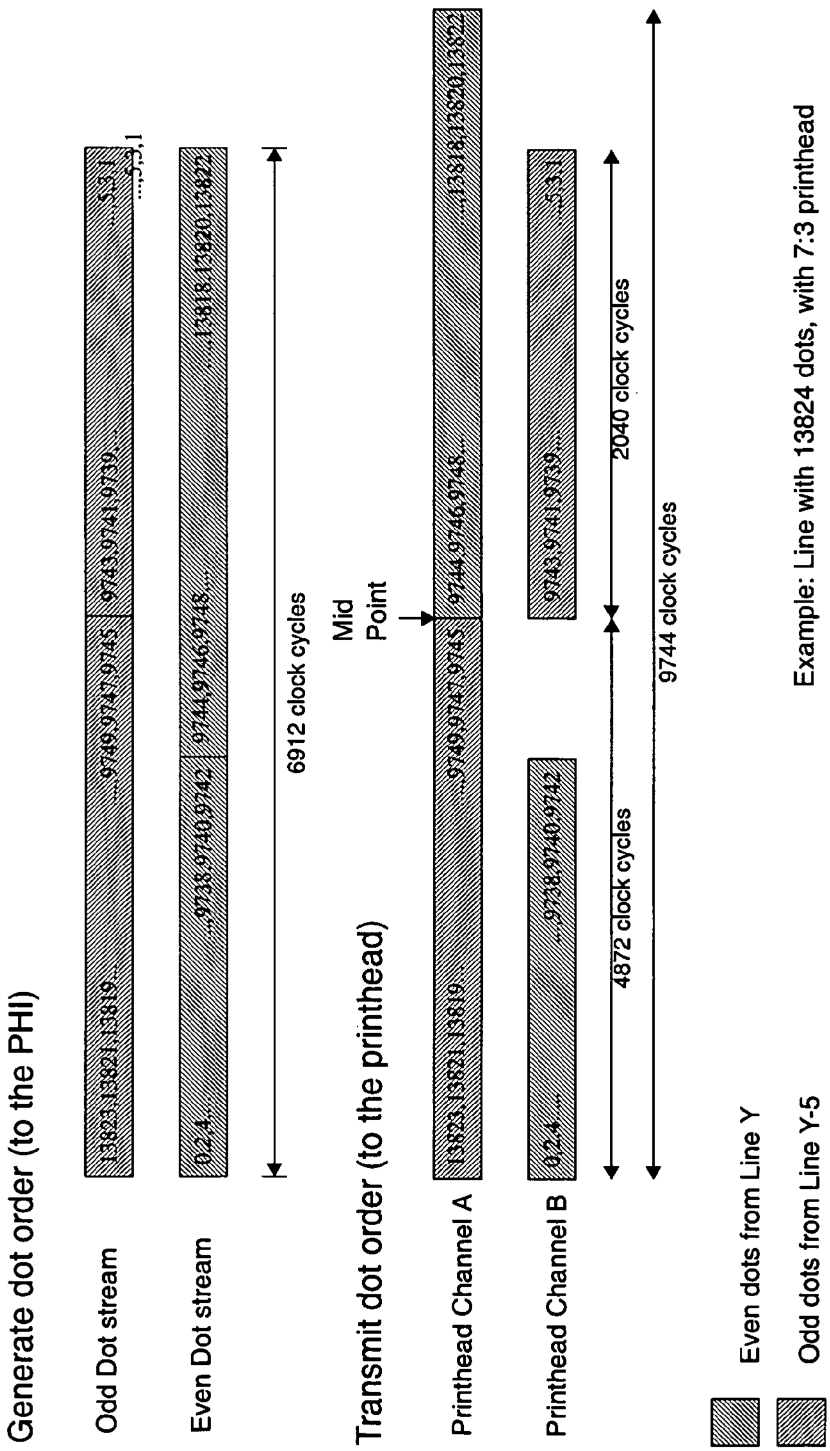
FIG. 270 shows an order of dot data generation and transmission
Figure 271:
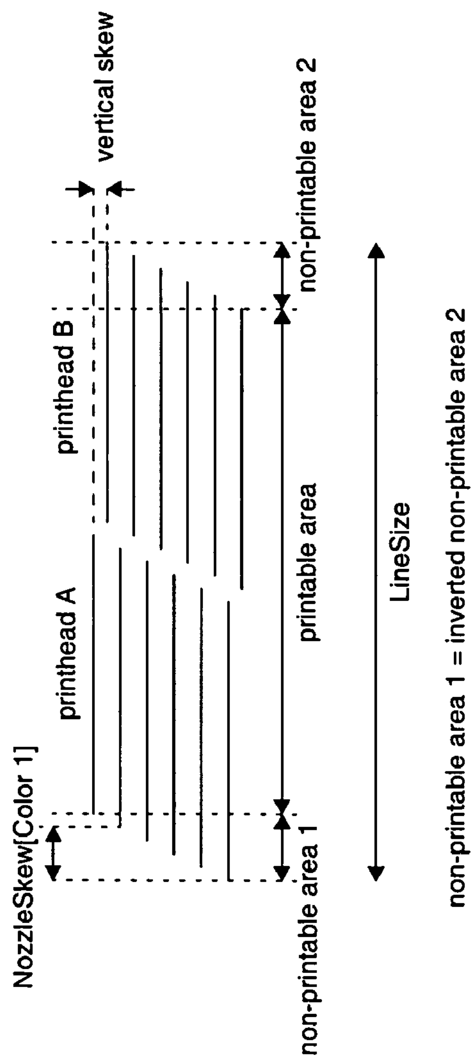
FIG. 271 shows a conceptual view of printhead rows
Figure 272:
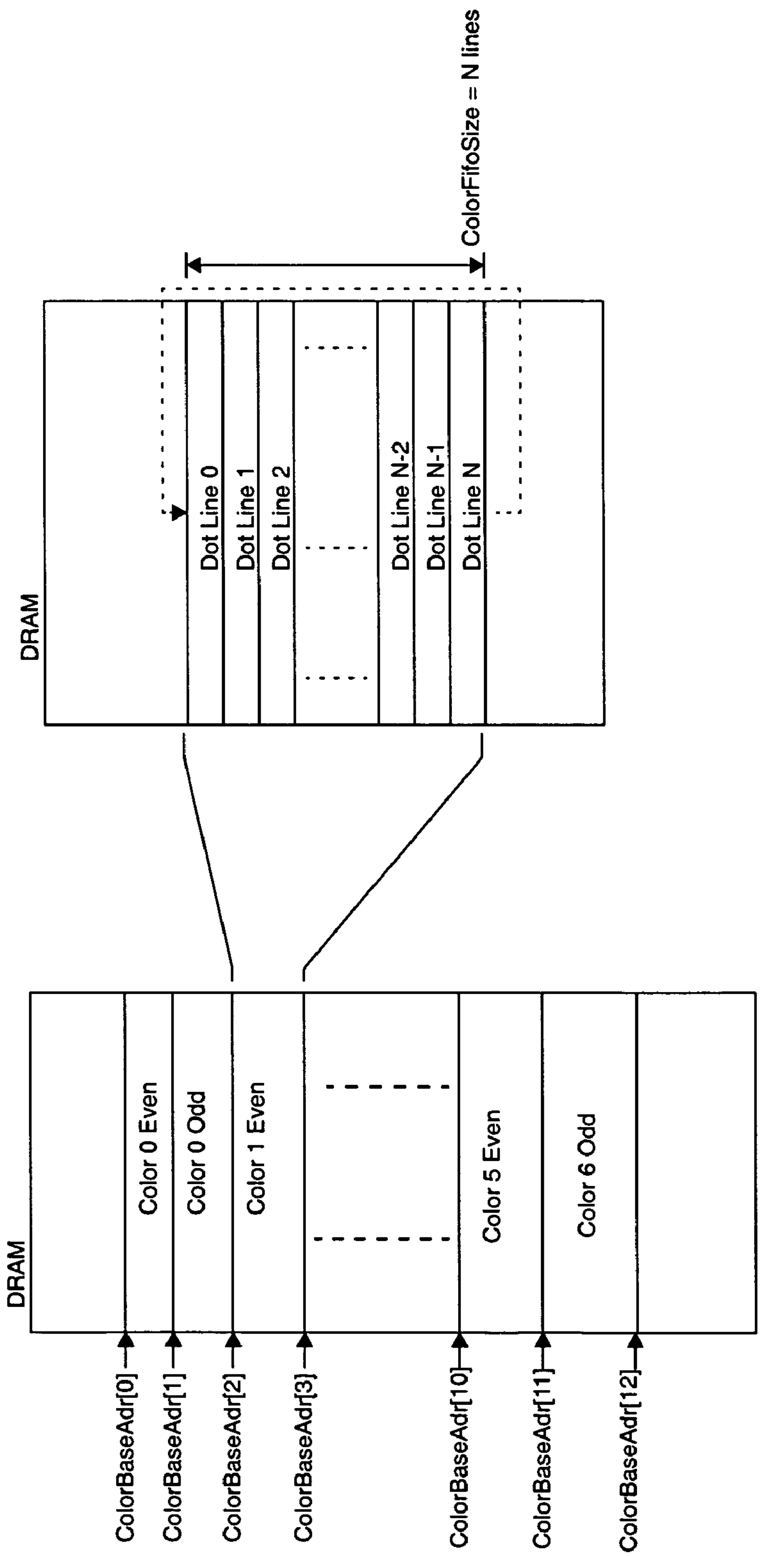
FIG. 272 shows a dotline FIFO data structure in DRAM (LLU specification)
Figure 273:
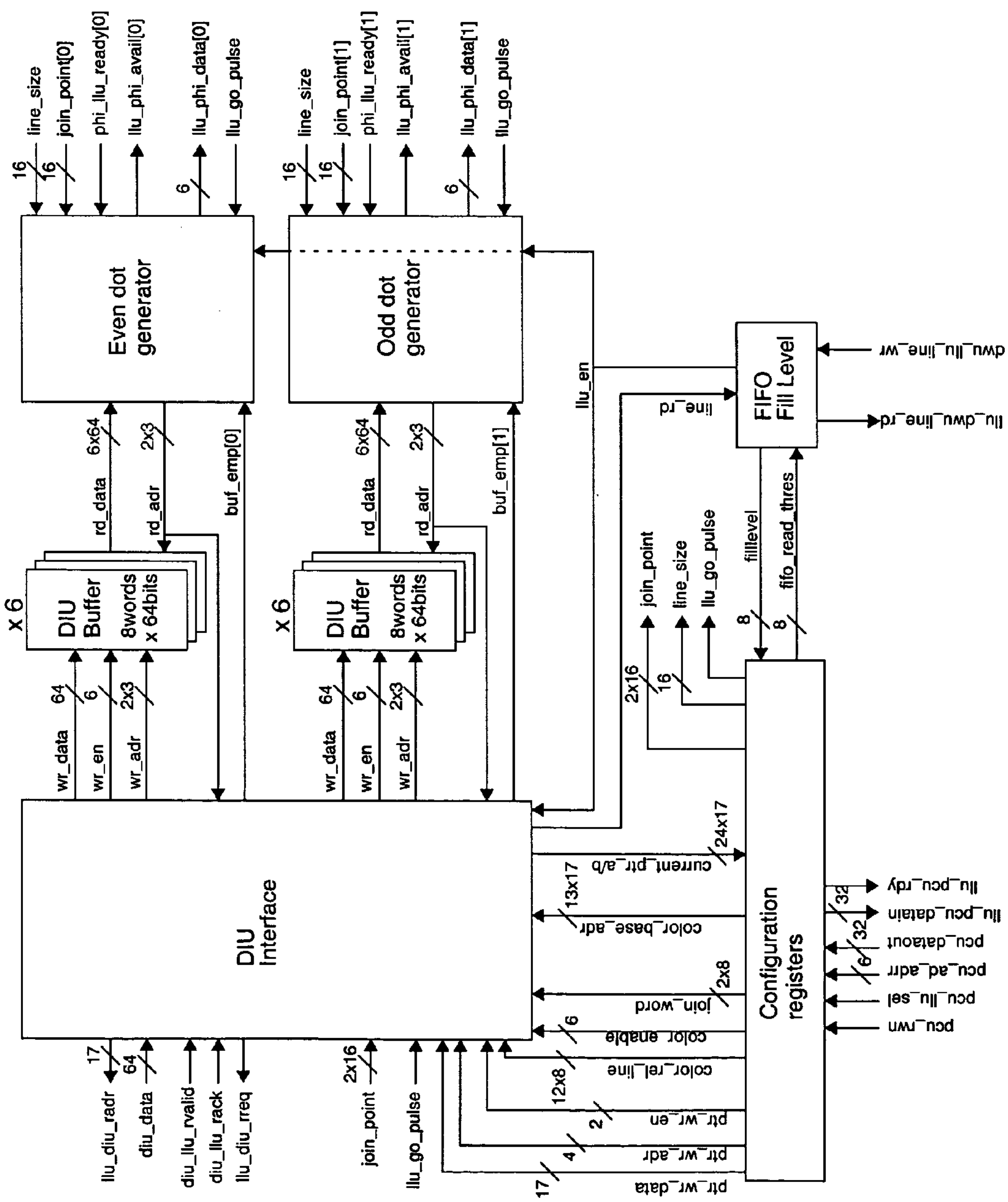
FIG. 273 shows an LLU partition
Figure 274:
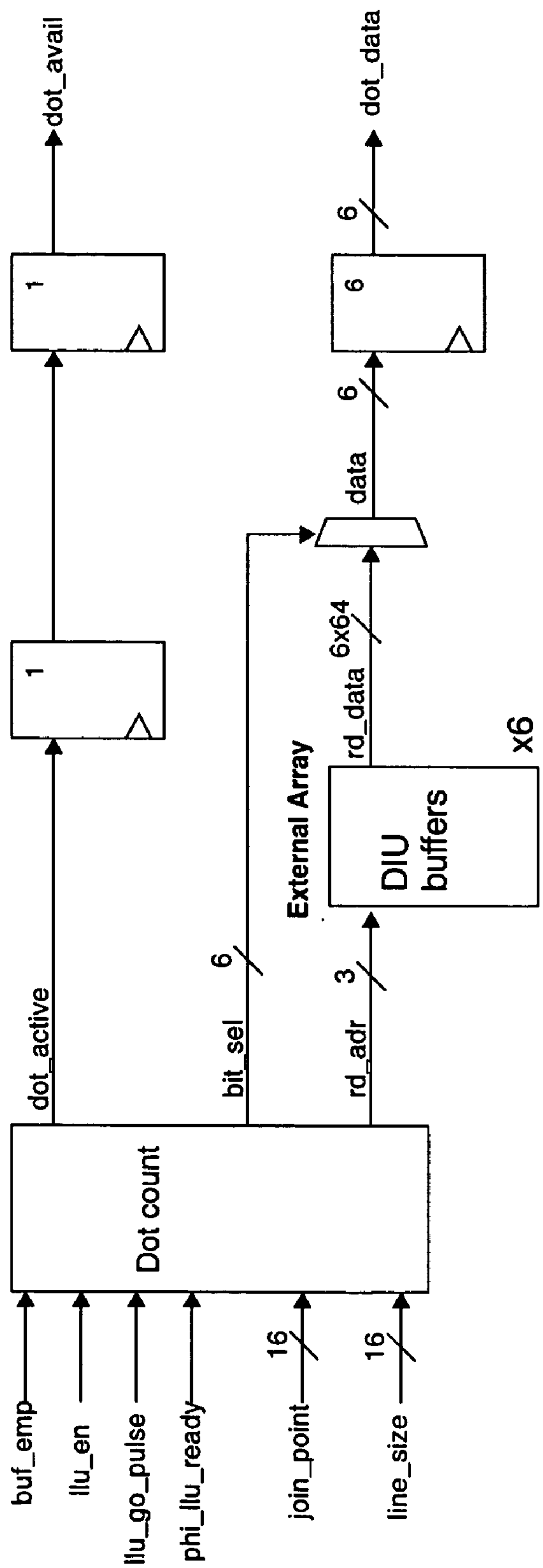
FIG. 274 shows a dot generator RTL diagram
Figure 275:
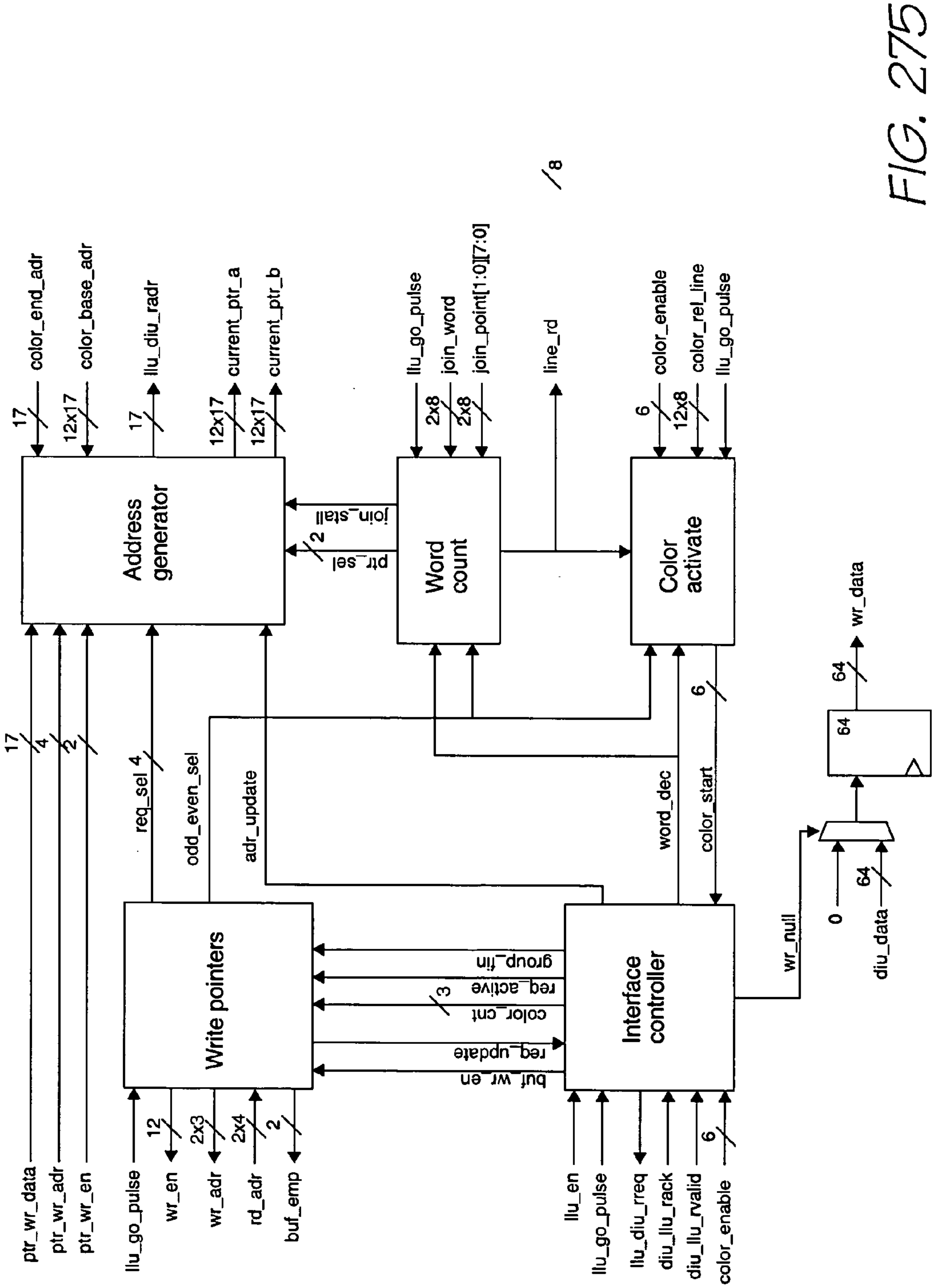
FIG. 275 shows a DIU interface
Figure 276:
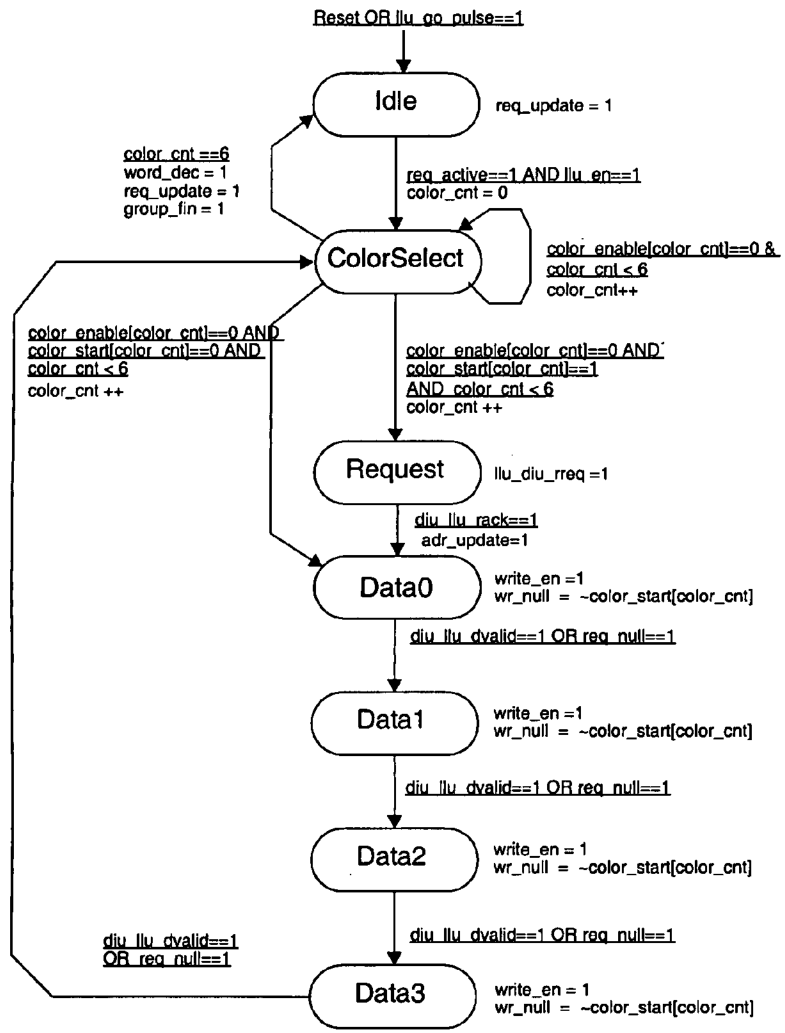
FIG. 276 shows an interface controller state diagram

The LLU contains 2 dot generator units. Each dot generator reads dot data from DRAM and generates a stream of odd or even dots. The dot order may be increasing or decreasing depending on how the DWU was programmed to write data to DRAM. An example of the even and odd dot data streams to DRAM is shown in FIG. 270. In the example the odd dot generator is configured to produce odd dot data in decreasing order and the even dot generator produces dot data_in increasing order.

The PHI block accepts the even and odd dot data streams and reconstructs the streams into transmit order to the printhead.

The LLU line size refers to the page width in dots and not necessarily the printhead width. The page width is often the dot margin number of dots less than the printhead width. They can be the same size for full bleed printing.

31.4 LLU Start-Up

At the start of a page the LLU must wait for the dot line store in DRAM to fill to a configured level (given by FifoReadThreshold) before starting to read dot data. Once the LLU starts processing dot data for a page it must continue until the end of a page, the DWU (and other PEP blocks in the pipeline) must ensure there is always data in the dot line store for the LLU to read, otherwise the LLU will stall, causing the PHI to stall and potentially generate a print error. The FifoReadThreshold should be chosen to allow for data rate mismatches between the DWU write side and the LLU read side of the dot line FIFO. The LLU will not generate any dot data until FifoReadThreshold level in the dot line FIFO is reached.

Once the FifoReadThreshold is reached the LLU begins page processing, the FifoReadThreshold is ignored from then on.

When the LLU begins page processing it produces dot data for all colors (although some dot data color may be null data). The LLU compares the line count of the current page, when the line count exceeds the ColorRelLine configured value for a particular color the LLU will start reading from that colors FIFO in DRAM. For colors that have not exceeded the ColorRelLine value the LLU will generate null data (zero data) and not read from DRAM for that color. ColorRelLine[N] specifies the number of lines separating the $N^{th}$ half color and the first half color to print on that page. For the example printhead shown in FIG. 268, color 0 odd will start at line 0, the remaining colors will all have null data. Color 0 odd will continue with real data until line 5, when color 0 odd and even will contain real data the remaining colors will contain null data. At line 10, color 0 odd and even and color 1 odd will contain real data, with remaining colors containing null data. Every 5 lines a new half color will contain real data and the remaining half colors null data until line 55, when all colors will contain real data. In the example ColorRelLine[0]=5, ColorRelLine[1]=0, ColorRelLine[2]=15, ColorRelLine[3]=10. . etc.

It is possible to turn off any one of the color planes of data (via the ColorEnable register), in such cases the LLU will generate zeroed dot data information to the PHI as normal but will not read data from the DRAM.

31.4.1 LLU Bandwidth Requirements

The LLU is required to generate data for feeding to the printhead interface, the rate required is dependent on the printhead construction and on the line rate configured. The maximum data rate the LLU can produce is 12 bits of dot data per cycle, but the PHI consumes at 12 bits every 2 pclk cycles out of 3, i.e. 8 bits per pclk cycle. Therefore the DRAM bandwidth requirement for a double buffered LLU is 8 bits per cycle on average. If 1.5 buffering is used then the peak bandwidth requirement is doubled to 16 bits per cycle but the average remains at 8 bits per cycle. Note that while the LLU and PHI could produce data at the 8 bits per cycle rate, the DWU can only produce data at 6 bits per cycle rate.

31.5 Vertical Row Skew

Due to construction limitations of the bi-lithic printhead it is possible that nozzle rows may be misaligned relative to each other. Odd and even rows, and adjacent color rows may be horizontally misaligned by up to 2 dot positions. Vertical misalignment can also occur between both printhead ICs used to construct the printhead. The DWU compensates for the horizontal misalignment (see Section 30.5), and the LLU compensates for the vertical misalignment. For each color odd and even the LLU maintains 2 pointers into DRAM, one for feeding printhead A (CurrentPtrA) and other for feeding printhead B (CurrentPtrB). Both pointers are updated and incremented in exactly the same way, but differ in their initial value programming. They differ by vertical skew number of lines, but point to the same relative position within a line.

At the start of a line the LLU reads from the FIFO using CurrentPtrA until the join point between the printhead ICs is reached (specified by JoinPoint), after which the LLU reads from DRAM using CurrentPtrB. If the JoinPoint coincides with a 256-bit word boundary, the swap over from pointer A to pointer B is straightforward. If the JoinPoint is not on a 256-bit word boundary, the LLU must read the 256-bit word of data from CurrentPtrA location, generate the dot data up to the join point and then read the 256-bit word of data from CurrentPtrB location and generate dot data from the join point to the word end. This means that if the JoinPoint is not on a 256-bit boundary then the LLU is required to perform an extra read from DRAM at the join point and not increment the address pointers.

31.5.1 Dot Line FIFO Initialization

For each dot line FIFO there are 2 pointers reading from it, each skewed by a number of dot lines in relation to the other (the skew amount could be positive or negative). Determining the exact number of valid lines in the dot line store is complicated by two pointers reading from different positions in the FIFO. It is convenient to remove the problem by pre-zeroing the dot line FIFOs effectively removing the need to determine exact data validity. The dot FIFOs can be initialized in a number of ways, including the CPU writing 0s, the LBD/SFU writing a set of 0 lines (16 bits per cycle), the HCU/DNC/DWU being programmed to produce 0 data 31.6 Specifying Dot FIFOS The dot line FIFOs when accessed by the LLU are specified differently than when accessed by the DWU. The DWU uses a start address and number of lines value to specify a dot FIFO, the LLU uses a start and end address for each dot FIFO. The mechanisms differ to allow more efficient implementations in each block.

The start address for each half color N is specified by the ColorBaseAdr[N] registers and the end address (actually the end address plus 1) is specified by the ColorBaseAdr[N+1]. Note there are 12 colors in total, 0 to 11, the ColorBaseAdr [12] register specifies the end of the color 11 dot FIFO and not the start of a new dot FIFO. As a result the dot FIFOs must be specified contiguously and increasing in DRAM.

31.7 Implementation 31.7.1 LLU Partition 31.7.2 Definitions of I/O

TABLE 208

LLU I/O definition

| Port name | Pins | I/O | Description |
|---|---|---|---|
| Clocks and Resets | | | |
| Pclk | 1 | In | System clock |
| prst_n | 1 | In | System reset, synchronous active low |
| PHI Interface | | | |
| llu_phi_data[1:0][5:0] | 2 × 6 | Out | Dot Data from LLU to the PHI, each bit is a color plane 5 downto 0.<br>Bus 0 - Even dot data stream<br>Bus 1 - Odd dot data stream<br>Data is active when corresponding bit is active in llu_phi_avail bus |
| phi_llu_ready[1:0] | 2 | In | Indicates that PHI is ready to accept data from the LLU<br>0 - Even dot data stream<br>1 - Odd dot data stream |
| llu_phi_avail[1:0] | 2 | Out | Indicates valid data present on corresponding llu_phi_data. |

TABLE 208-continued

LLU I/O definition

| Port name | Pins | I/O | Description |
|---|---|---|---|
| | | | 0 - Even dot data stream<br>1 - Odd dot data stream |
| DIU Interface | | | |
| llu_diu_rreq | 1 | Out | LLU requests DRAM read. A read request must be accompanied by a valid read address. |
| llu_diu_radr[21:5] | 17 | Out | Read address to DIU<br>17 bits wide (256-bit aligned word). |
| diu_llu_rack | 1 | In | Acknowledge from DIU that read request has been accepted and new read address can be placed on llu_diu_radr |
| diu_data[63:0] | 64 | In | Data from DIU to LLU. Each access is 256-bits received over 4 clock cycles<br>First 64-bits is bits 63:0 of 256 bit word<br>Second 64-bits is bits 127:64 of 256 bit word<br>Third 64-bits is bits 191:128 of 256 bit word<br>Fourth 64-bits is bits 255:192 of 256 bit word |
| diu_llu_rvalid | 1 | In | Signal from DIU telling LLU that valid read data is on the diu_data bus |
| DWU Interface | | | |
| dwu_llu_line_wr | 1 | In | DWU line write. Indicates that the DWU has completed a full line write. Active high |
| llu_dwu_line_rd | 1 | Out | LLU line read. Indicates that the LLU has completed a line read. Active high. |
| PCU Interface | | | |
| pcu_llu_sel | 1 | In | Block select from the PCU. When pcu_llu_sel is high both pcu_adr and pcu_dataout are valid. |
| pcu_rwn | 1 | In | Common read/not-write signal from the PCU. |
| pcu_adr[7:2] | 6 | In | PCU address bus. Only 6 bits are required to decode the address space for this block. |
| pcu_dataout[31:0] | 32 | In | Shared write data bus from the PCU. |
| llu_pcu_rdy | 1 | Out | Ready signal to the PCU. When llu_pcu_rdy is high it indicates the last cycle of the access. For a write cycle this means pcu_dataout has been registered by the block and for a read cycle this means the data on llu_pcu_datain is valid. |
| llu_pcu_datain[31:0] | 32 | Out | Read data bus to the PCU. |

31.7.3 Configuration Registers

The configuration registers in the LLU are programmed via the PCU interface. Refer to section 21.8.2 on page 321 for a description of the protocol and timing diagrams for reading and writing registers in the LLU. Note that since addresses in SoPEC are byte aligned and the PCU only supports 32-bit register reads and writes, the lower 2 bits of the PCU address bus are not required to decode the address space for the LLU. When reading a register that is less than 32 bits wide zeros should be returned on the upper unused bit(s) of llu_pcu_datain. Table 209 lists the configuration registers in the LLU.

TABLE 209

LLU registers description

| Address LLU_base + | Register | #bits | Reset | Description |
|---|---|---|---|---|
| Control Registers | | | | |
| 0x00 | Reset | 1 | 0x1 | Active low synchronous reset, self de-activating. A write to this register will cause a LLU block reset. |
| 0x04 | Go | 1 | 0x0 | Active high bit indicating the LLU is programmed and ready to use. A low to high transition will cause LLU block internal states to reset. |
| Configuration | | | | |
| 0x08–0x38 | ColorBaseAdr[12:0][21:5] | 13 × 17 | 0x000 00 | Specifies the base address (in words) in memory where data from a particular half color (N) will be placed.<br>Also specifies the end address + 1 (256-bit words) in memory where fifo data for |

TABLE 209-continued

LLU registers description

| Address LLU_base + | Register | #bits | Reset | Description |
|---|---|---|---|---|
| | | | | a particular half color ends. For color N the start address is ColorBaseAdr[N] and the end address +1 is ColorBase-Adr[N+1] |
| 0x3C | ColorEnable | 6 | 0x3F | Indicates whether a particular color is active or not.<br>When inactive no data is written to DRAM for that color.<br>0 - Color off<br>1 - Color on<br>One bit per color, bit 0 is Color 0 and so on. |
| 0x40 | LineSize | 16 | 0x000 0 | Indicates the number of dots per line. |
| 0x44 | FifoReadThreshold | 8 | 0x00 | Specifies the number of lines that should be in the FIFO before the LLU starts reading. |
| 0x48–0x74 | ColorRelLine[11:0] | 12 × 8 | 0x00 | Specifies the relative number of lines to wait from the first before starting to read dot data from the corresponding dot data FIFO<br>Bus 0,1 - Even, Odd line color 0<br>Bus 2,3 - Even, Odd line color 1<br>Bus 4,5 - Even, Odd line color 2<br>Bus 6,7 - Even, Odd line color 3<br>Bus 8,9 - Even, Odd line color 4<br>Bus 10,11 - Even, Odd line color 5 |
| 0x78–0x7C | JoinPoint | 2 × 16 | 0x000 0 | Specifies the join point in dots between both printhead ICs.<br>Bus 0 - Even dot generator join point<br>Bus 1 - Odd dot generator join point |
| 0x80–0x84 | JoinWord | 2 × 8 | 0x00 | Specifies the join point in words between both printhead ICs.<br>Bus 0 - Even dot generator join point<br>Bus 1 - Odd dot generator join point |
| 0x90–0xBC | CurrentAdrA[11:0][21:5] | 12 × 17 | 0x000 0 | Current Address pointers associated with printhead A<br>Bus 0,1 - Even, Odd line color 0<br>Bus 2,3 - Even, Odd line color 1<br>Bus 4,5 - Even, Odd line color 2<br>Bus 6,7 - Even, Odd line color 3<br>Bus 8,9 - Even, Odd line color 4<br>Bus 10,11 - Even, Odd line color 5<br>Working registers |
| 0xC0–0xEC | CurrentAdrB[11:0][21:5] | 12 × 17 | 0x000 0 | Current Address pointers associated with printhead B<br>Bus 0,1 - Even, Odd line color 0<br>Bus 2,3 - Even, Odd line color 1<br>Bus 4,5 - Even, Odd line color 2<br>Bus 6,7 - Even, Odd line color 3<br>Bus 8,9 - Even, Odd line color 4<br>Bus 10,11 - Even, Odd line color 5<br>Working registers |
| Working Registers | | | | |
| 0xF0 | FifoFillLevel | 8 | 0x00 | Number of lines in the dot line FIFO, line written in but not read out. (Read Only) |

A low to high transition of the Go register causes the internal states of the LLU to be reset. All configuration registers will remain the same. The block indicates the transition to other blocks via the llu_go_pulse signal.

31.7.4 Dot Generator

The dot generator block is responsible for reading dot data from the DIU buffers and sending the dot data in the correct order to the PHI block. The dot generator waits for llu_en signal from the fifo fill level block, once active it starts reading data from the 6 DIU buffers and generating dot data for feeding to the PHI.

In the LLU there are two instances of the dot generator, one generating odd data and the other generating even data.

At any time the ready bit from the PHI could be de-asserted, if this happens the dot generator will stop generating data, and wait for the ready bit to be re-asserted.

31.7.4.1 Dot Count

In normal operation the dot counter will wait for the llu_en and the ready to be active before starting to count. The dot count will produce data as long as the phi_llu_ready is active. If the phi_llu_ready signal goes low the count will be stalled.

The dot counter increments for each dot that is processed per line. It is used to determine the line finish position, and the bit select value for reading from the DIU buffers. The counter is reset after each line is processed (line_fin signal).

It determines when a line is finished by comparing the dot count with the configured line size divided by 2 (note that odd numbers of dots will be rounded down).

```
// define the line finish
if (dot_cnt [14:0] = = line_size[15:1] )then
      line_fin = 1
else
      line_fin = 0
// determine if word is valid
dot_active = ((llu_en = = 1) AND (phi_llu_ready = = 1) AND
(buf_emp = = 0))
// counter logic
if (llu_go_pulse = = 1) then
      dot_cnt = 0
elsif ((dot_active = = 1)AND (line_fin = = 1)) then
      dot_cnt       = 0
elsif (dot_active = = 1) then
      dot_cnt       = dot_cnt + 1
else
      dot_cnt       = dot_cnt
// calculate the word select bits
bit_sel[5:0]                  := dot_cnt[5:0]
```

The dot generator also maintains a read buffer pointer which is incremented each time a 64-bit word is processed. The pointer is used to address the correct 64-bit dot data word within the DIU buffers. The pointer is reset when llu_go_pulse is 1. Unlike the dot counter the read pointer is not reset each line but rounded up the nearest 256-bit word. This allows for more efficient use of the DIU buffers at line finish.

When the dot counter reaches the join point for the dot generator (join_point), it jumps to the next 256 bit word in the DIU buffer but continues to read from the next bit position within that word. If the join point coincides with a word boundary, no 256-bit increment is required.

```
// read pointer logic
if (llu_go_pulse = = 1) then
      read_adr = 0
elsif ((dot_active = = 1)AND((dot_cnt[7:0] = = 255)OR(line_fin
= = 1)))then
      // end of line round up
      read_adr[3:2] ++
      read_adr[1:0] = 0
elsif      ((dot_active      = =      1)AND(dot_cnt      = =
join_point)AND(dot_cnt[5:0] = = 63)) then
      // join point jump 256 bits
      read_adr[1:0] ++                              //
regular increment
      read_adr[3:2] ++                              // join
point 256 increment
elsif      ((dot_active      = =      1)AND(dot_cnt      = =
join_point)AND(dot_cnt[5:0] != 63)) then
      // join point jump 256 bits, bottom bits remain the same
      read_adr[3:2] ++                              // join
point 256 increment only
elsif ((dot_active = = 1)AND(dot_cnt[5:0] = = 63)) then
      read_adr[3:0] ++                              //
regular increment
```

31.7.5 Fifo Fill Level

The LLU keeps a running total of the number of lines in the dot line store FIFO. Every time the DWU signals a line end (dwu_llu_line_wr active pulse) it increments the filllevel. Conversely if the LLU detects a line end (line_rd pulse) the filllevel is decremented and the line read is signalled to the DWU via the llu_dwu_line_rd signal.

The LLU fill level block is used to determine when the dot line has enough data stored before the LLU should begin to start reading. The LLU at page start is disabled. It waits for the DWU to write lines to the dot line FIFO, and for the fill level to increase. The LLU remains disabled until the fill level has reached the programmed threshold (fifo_read_thres). When the threshold is reached it signals the LLU to start processing the page by setting llu_en high. Once the LLU has started processing dot data for a page it will not stop if the filllevel falls below the threshold, but will stall is filllevel falls to zero.

The line fifo filllevel can be read by the CPU via the PCU at any time by accessing the FifoFillLevel register. The CPU must toggle the Go register in the LLU for the block to be correctly initialized at page start and the fifo level reset to zero.

```
if (llu_go_pulse = = 1) then
      filllevel = 0
elsif ((line_rd = = 1) AND (dwu_llu_line_wr = = 1)) then
      // do nothing
elsif (line_rd = = 1) then
      filllevel --
elsif (dwu_llu_line_wr = = 1) then
      filllevel ++
// determine the threshold, and set the LLU going
if (llu_go_pulse = = 1) OR (filllevel = = 0 )) then
      llu_en = 0
elsif (filllevel = = fifo_read_threshold ) then
      llu_en = 1
```

31.7.6 DIU Interface 31.7.6.1 DIU Interface Description

The DIU interface block is responsible for determining when dot data needs to be read from DRAM, keeping the dot generators supplied with data and calculating the DRAM read address based on configured parameters, FIFO fill levels and position in a line.

The fill level block enables DIU requests by activating llu_en signal. The DIU interface controller then issues requests to the DIU for the LLU buffers to be filled with dot line data (or fill the LLU buffers with null data without requesting DRAM access, if required).

At page start the DIU interface determines which buffers should be filled with null data and which should request DRAM access. New requests are issued until the dot line is completely read from DRAM.

For each request to the DRAM the address generator calculates where in the DRAM the dot data should be read from. The color_enable bus determines which colors are enabled, the interface never issues DRAM requests for disabled colors.

31.7.6.2 Interface Controller

The interface controller co-ordinates and issues requests for data transfers from DRAM. The state machine waits in Idle state until it is enabled by the LLU controller (llu_en) and a request for data transfer is received from the write pointer block.

When an active request is received (req_active equals 1) the state machine jumps to the ColorSelect state to determine which colors (color_cnt) in the group need a data transfer. A group is defined as all odd colors or all even colors. If the color isn't enabled (color_enable) the count just increments, and no data is transferred. If the color is enabled, the state machine takes one of two options, either a null data transfer or an actual data transfer from DRAM. A null data transfer writes zero data to the DIU buffer and does not issue a request to DRAM.

The state machine determines if a null transfer is required by checking the color_start signal for that color.

If a null transfer is required the state machine doesn't need to issue a request to the DIU and so jumps directly to the data transfer states (Data0 to Data3). The machine clocks through the 4 states each time writing a null 64-bit data word to the buffer. Once complete the state machine returns to the ColorSelect state to determine if further transfers are required.

If the color_start is active then a data transfer is required. The state machine jumps to the Request state and issue a request to the DIU controller for DRAM access by setting llu_diu_rreq high. The DIU responds by acknowledging the request (diu_llu_rack equals 1) and then sending 4 64-bit words of data. The transition from Request to Data0 state signals the address generator to update the address pointer (adr_update). The state machine clocks through Data0 to Data3 states each time writing the 64-bit data into the buffer selected by the req_sel bus. Once complete the state machine returns to the ColorSelect state to determine if further transfers are required.

When in the ColorSelect state and all data transfers for colors in that group have been serviced (i.e. when color_cnt is 6) the state machine will return to the Idle state. On transition it will update the word counter logic (word_dec) and enabled the request logic (req_update).

A reset or llu_go_pulse set to 1 will cause the state machine to jump directly to Idle. The controller will remain in Idle state until it is enabled by the LLU controller via the llu_en signal. This prevents the DIU attempting the fill the DIU buffers before the dot line store FIFO has filled over its threshold level.

31.7.6.3 Color Activate

The color activate logic maintains an absolute line count indicating the line number currently being processed by the LLU. The counter is reset when the llu_go_pulse is 1 and incremented each time a line_rd pulse is received. The count value (line_cnt) is used to determine when to start reading data for a color.

The count is implemented as follows:

```
if ( llu_go_pulse = = 1) then
    line_cnt = 0
elsif ( line_rd = = 1) then
    line_cnt ++
```

The color activate logic compares line count with the relative line value to determine when the LLU should start reading data from DRAM for a particular half color. It signals the interface controller block which colors are active for this dot line in a page (via the color_start bus). It is used by the interface controller to determine which DIU buffers require null data.

Once the color_start bit for a color is set it cannot be cleared in the normal page processing process. The bits must be reset by the CPU at the end of a page by transitioning the Go bit and causing a pulse on the llu_go_pulse signal.

Any color not enabled by the color_enable bus will never have its color_start bit set.

```
for (i=0; i<12;i++){
    if ( llu_go_pulse = = 1) then
        col_on[i] = 0
```

-continued

```
    elsif ( color_enable [i % 6] = = 1 ) then
        col_on[i] = 0
    elsif ( line_cnt = = color_rel_line[i]) then
        col_on[i] = 1
    }
// select either odd or even colors
if ( odd_even_sel = = 1 ) then            // odd selected
    color_start [5:0]                                          =
{col_on[11],col_on[9],col_on[7],col_on[5],col_on[3],col_on[1
]}
else                                      // even selected
    color_start [5:0]                                          =
{col_on[10],col_on[8],col_on[6],col_on[4],col_on[2],col_on[0
]}
```

31.7.6.4 Address Generator

The address generator block maintains 24 pointers (current_adr_a[11:0] and current_adr_b[11:0]) to DRAM corresponding to 2 read addresses in the dot line FIFO for each half color. The current_adr_a group of pointers are used when the dot generator is feeding printhead channel A, and the current_adr_b group of pointers are used when the dot generator is feeding printhead channel B. For each DRAM access the 2 address pointers are updated but only one can be used for an access. The word counter block determines which pointer group should be used to access DRAM, via the pointer select signals (ptr_sel). In certain cases (e.g. the join point is not 256-bit aligned and the word is on the join point) the address pointers should not be updated for an access, the word counter block determines the exception cases and indicates to the address generator to skip the update via the join_stall signal.

When a DRAM transfer occurs the address pointer is used first and then updated for the next transfer for the color. The pointer used is selected by the req_sel and ptr_sel buses, and the pointer update is initiated by the adr_update signal from the interface controller.

The address update is calculated as follows (pointer group A logic is shown but the same logic is used to update the B pointer group a clock cycle later):

```
// update the A pointers
if (ptra_wr_en = = 1) then                    // write from the
configuration block
    current_adr_a[ptr_adr] = ptr_wr_data;
elsif ( adr_update_a = = 1) then {        // address update from
state machine
    if ((req_sel = = NULL )OR (join_stall = = 1)) then
                // do nothing
    else
                // temporary variable setup
                next_adr = current_adr_a [req_sel] + 1
    start_adr = color_base_adr[req_sel]
    end_adr = color_base_adr [req_sel + 1]
    // determine how to update the pointer
    if (next_adr = = end_adr) then
                current_adr_a[req_sel] = start_adr
    else
                current_adr_a[req_sel] = next_adr
}
```

The correct address to use for a transfer is selected by the ptr_sel signals from the word counter block. They indicate which set of address pointers should be used based on the current word being transferred from the DRAM and the configured join point values (join_word).

```
// select the address pointer to use for access
if (req_sel[0] = = 1) then                                    // odd pointer selector
     if (ptr_sel[1] = = 1) then
          llu_diu_radr = current_adr_b[req_sel]          // latter part of line
     else
          llu_diu_radr = current_adr_a[req_sel]          // former part of line
else                                                           // even pointer selector
     if (ptr_sel[0] = = 1) then
          llu_diu_radr = current_adr_b[req_sel]          // latter part of line
     else
          llu_diu_radr = current_adr_a[req_sel]          // former part of line
```

31.7.6.5 Write Pointer

The write pointer logic maintains the buffer write address pointers, determines when the DIU buffers need a data transfer and signals when the DIU buffers are empty. The write pointer determines the address in the DIU buffer that the data should be transferred to.

The write pointer logic compares the read and write pointers of each DIU buffer to determine which buffers require data to be transferred from DRAM, and which buffers are empty (the buf_emp signals).

Buffers are grouped into odd and even buffers, if an odd buffer requires DRAM access the odd_pend signals will be active, if an even buffer requires DRAM access the even_pend signals will be active. If both odd and even buffers require DRAM access at exactly the same time, the even buffers will get serviced first. If a group of odd buffers are being serviced and an even buffer becomes pending, the odd group of buffers will be completed before the starting the even group, and vice versa.

If any buffer requires a DRAM transfer, the logic will indicate to the interface controller via the req_active signal, with the odd_even_sel signal determining which group of buffers get serviced. The interface controller will check the color_enable signal and issue DRAM transfers for all enabled colors in a group. When the transfers are complete it tells the write pointer logic to update the request pending via req_update signal.

The req_sel[3:0] signal tells the address generator which buffer is being serviced, it is constructed from the odd_even_sel signal and the color_cnt[2:0] bus from the interface controller. When data is being transferred to DRAM the word pointer and write pointer for the corresponding buffer are updated. The req_sel determines which pointer should be incremented.

The write pointer logic operates the same way regardless of whether the transfer is null or not.

```
// determine which buffers need updates
buf_emp[1:0]    = 0
odd_pend        = 0
even_pend       = 0
if ( wr_adr[0][3:2] = = rd_adr[0][3:2] )
          even_pend = 1
if ( wr_adr[1][3:2] = = rd_adr[1][3:2] )
          odd_pend = 1
// determine if buffers are empty
if ((wr_adr[0][3:0] = = rd_adr[0][3:0])) then
          buf_emp[0] = 1
```

-continued

```
if ((wr_adr[1][3:0] = = rd_adr [1][3:0])) then
          buf_emp[1] = 1
// fixed servicing order, only update when controller dictates so
if (req_update = = 1) then {
     if (even_pend = = 1) then                    // even always first
          odd_even_sel   = 0
          req_active     = 1
     elsif (odd_pend = = 1 ) then                 // then check odd
          odd_even_sel   = 0
          req_active     = 1
     else                                         // nothing active
          odd_even_sel   = 0
          req_active     = 0
     }
// selected requestor
req_sel[3:0]     =     {color_cnt[2:0],odd_even_sel}         // concatentation
```

The write address pointer logic consists of 2 2-bit counters and a word select pointer. The counters are reset when llu_go_pulse is one. The word pointer (word_ptr) is common to all buffers and is used to write 64-bit words into the DIU buffer. It is incremented when buf_rd_en is active.

When a group of buffers are updated the state machine increments the write pointer (wr_ptr[odd_even_sel]) via the group_fin signal. A concatenation of the write pointer and the word pointer are use to construct the buffer write address. The write pointers are not reset at the end of each line.

```
// determine which pointer to update
if (llu_go_pulse = = 1) then
     wr_ptr[1:0]    = 0
     word_ptr       = 0
elsif (buf_rd_en = = 1) then
     word_ptr++
     wr_en[req_sel] = 1
elsif (group_fin = 1 ) then
     wr_ptr[odd_even_sel]++
// create the address from the write pointer and word pointer.
wr_adr[odd_even_sel] = {wr_ptr[odd_even_sel],word_ptr}          // concatenation
```

31.7.6.6 Word Count

The word count logic maintains 2 counters to track the number of words transferred from DRAM per line, one counter for odd data, and one counter for even. On receipt of a llu_go_pulse, the counters are initialized to a join_word value (number of words to the join point for that printhead channel) and the pointer select values to zero (ptr_sel). When a group of words are transferred to DRAM as indicated by the word_dec signal from the interface controller, the corresponding counter is decremented. The counter to decrement is indicated by the odd_even_sel signal from the write pointer block (even=0, odd=1).

When a counter is zero and the ptr_sel is zero, the counter is re-initialized to the second join_word value and ptr_sel is inverted. The counter continues to count down to zero each time a word_dec signal is received. When a counter is zero and the ptr_sel is one, it signals the end of a line (the last_wd signal) and initializes the counter to the first join_point value for the next line transfer.

The ptr_sel signal is used in the address generator to select the correct address pointer to use for that particular access.

```
// determine which counter to decrement
if (llu_go_pulse = = 1) then
      word_cnt[0]      = join_word[0]                         // even count
      ptr_sel[0]          = 0                                      // even
generator starts with pointer A
      word_cnt[1]      = join_word[1]                         // odd count
      ptr_sel[1]         = 0                                     // odd generator
starts with pointer A
elsif (word_dec = = 1) then {                                   // need to
decrement one word counter
      if (odd_even_sel = = 0) then                             // even counter
update
            if (word_cnt[0] = = 0) then
                  word_cnt [0] = join_word[ptr_sel[0]]         // re-initialize
pointer
                  ptr_sel[0]          = ~(ptr_sel[0])
                  if (ptr_sel[0]= = 1) then                     // determine if
this the last word
                        last_wd      = 1
            else
                  word_cnt [0]      - -                            // normal
decrement
      else                                                        // odd counter
update
            if (word_cnt[1] = = 0) then
                  word_cnt[1]       = join_word[ptr_sel[1]]       // re-initialize
pointer
                  ptr_sel[1]          = ~(ptr_sel[1])
                  if (ptr_sel[1] = = 1) then                    // determine if
this the last word
                        last_wd      = 1
            else
                  word_cnt [1]      - -                            // normal
decrement
      }
```

The word count logic also determines if the current word to be transferred is the join word, and if so it determines if it is aligned on a 256-bit boundary or not. If the join point is aligned to a boundary there is no need to prevent the address counter from incrementing, otherwise the address pointers are stalled for that word transfer (join_stall).

```
join_stall = (((ptr_sel[0] = = 0)AND (word_cnt[0] = = 0)AND
(join_point[0][7:0] != 0))
            AND ((ptr_sel[1] = = 0)AND (word_cnt[1] = = 0)AND
(join_point[1][7:0] != 0)))
```

The word count logic also determines when a complete line has been read from DRAM, it then signals the fifo fill level logic in both the LLU and DWU (via line_rd signal) that a complete line has been read by the LLU (llu_dwu_line_rd).

```
// line finish logic
if (llu_go_pulse = = 1) then
      line_fin = 0
      line_rd = 0
elsif ((last_wd = = 1) AND (line_fin = = 0)) then
      line_fin = 1                        // first group last_wd
finish pulse
      line_rd = 0
elsif ((last_wd = = 1) AND (line_fin = = 1)) then
      line_fin = 0                        // second group last_wd
finish pulse
      line_rd = 1
```

-continued

```
else
      line_fin = line_fin              // stay the same
      line_rd = 0
```

32 Printhead Interface (PHI)

32.1 Overview

The Printhead interface (PHI) accepts dot data from the LLU and transmits the dot data to the printhead, using the printhead interface mechanism. The PHI generates the control and timing signals necessary to load and drive the bi-lithic printhead. The CPU determines the line update rate to the printhead and adjusts the line sync frequency to produce the maximum print speed to account for the printhead IC's size ratio and inherent latencies in the syncing system across multiple SoPECs.

The PHI also needs to consider the order in which dot data is loaded in the printhead. This is dependent on the construction of the printhead and the relative sizes of printhead ICs used to create the printhead. See Bi-lithic Printhead Reference document for a complete description of printhead types [10].

The printing process is a real-time process. Once the printing process has started, the next printline's data must be transferred to the printhead before the next line sync pulse is received by the printhead. Otherwise the printing process will terminate with a buffer underrun error.

The PHI can be configured to drive a single printhead IC with or without synchronization to other SoPECs. For example the PHI could drive a single IC printhead (i.e. a printhead constucted with one IC only), or dual IC printhead with one SoPEC device driving each printhead IC.

Figure 277:
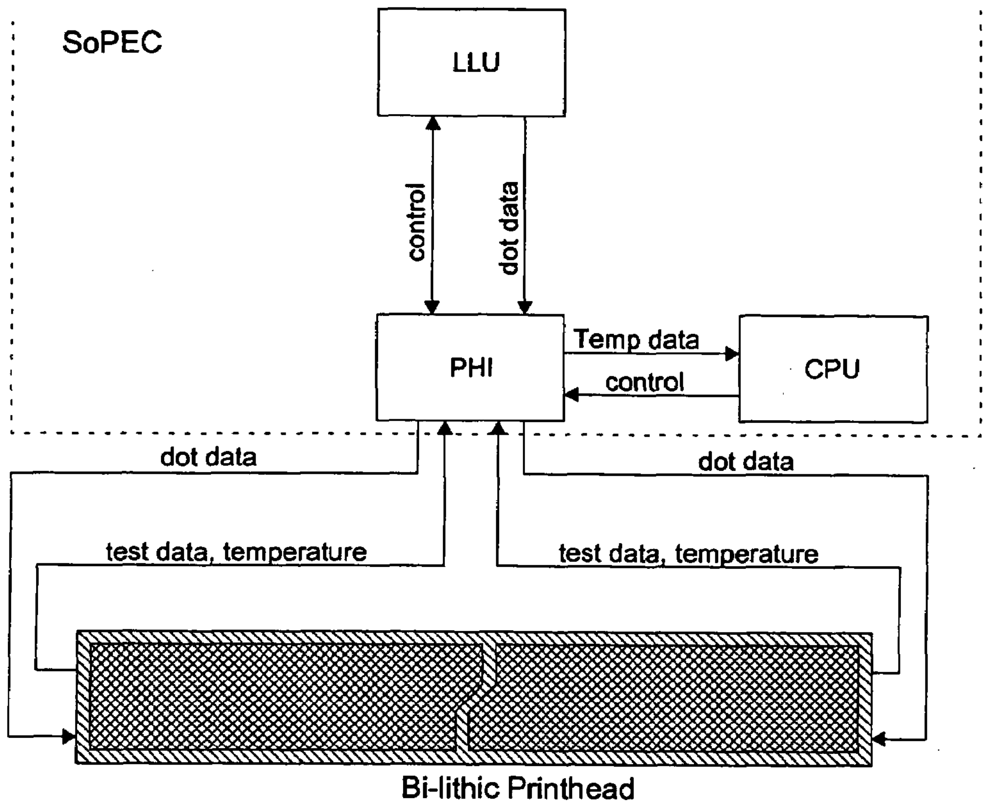
FIG. 277 shows high-level data flow diagram of PHI in context
Figure 278:
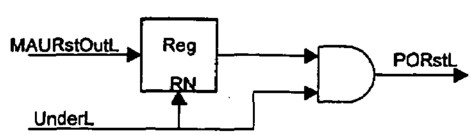
FIG. 278 shows power on reset
Figure 279:
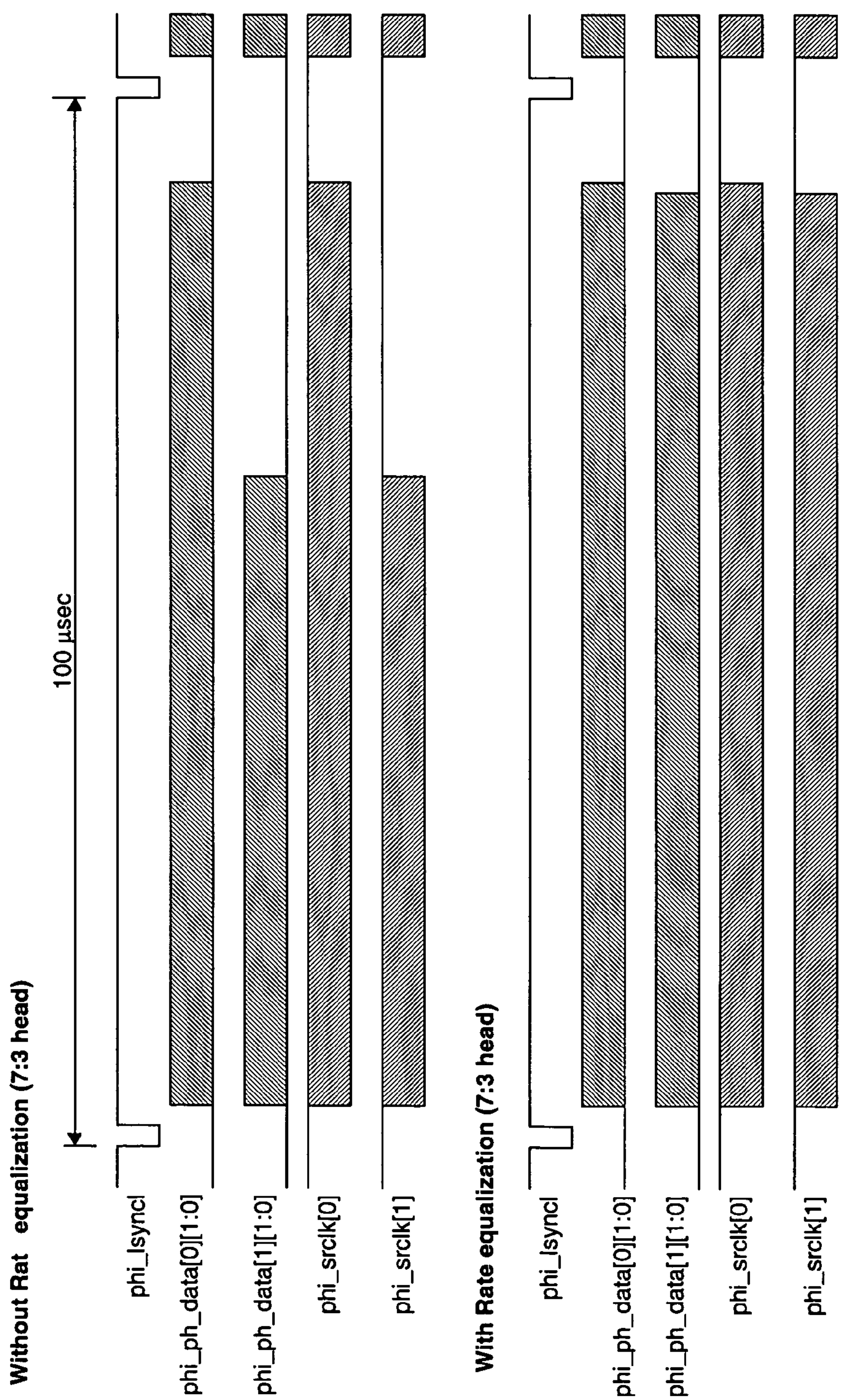
FIG. 279 shows printhead data rate equalization
Figure 280:
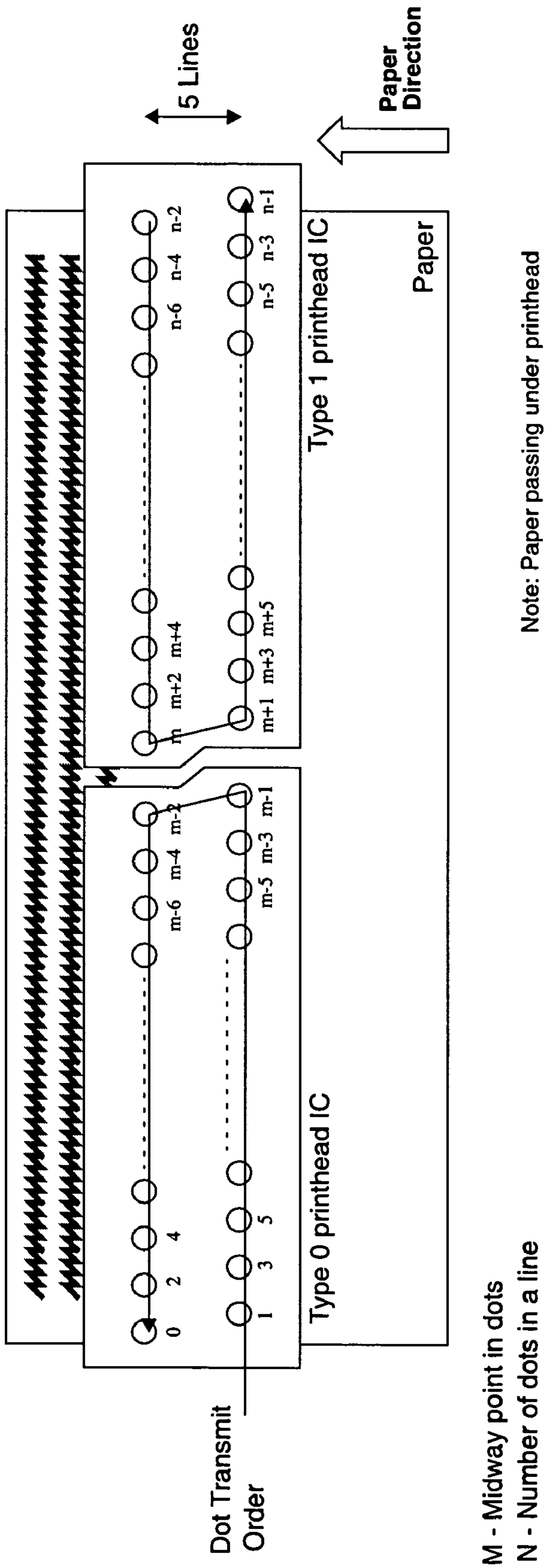
FIG. 280 shows a printhead structure and dot generate order

The PHI interface provides a mechanism for the CPU to directly control the PHI interface pins, allowing the CPU to access the bi-lithic printhead to:

determine printhead temperature test for and determine dead nozzles for each printhead IC initialize each printhead IC pre-heat each printhead IC FIG. 277 shows a high level data flow diagram of the PHI in context.

32.2 Printhead Modes of Operation

The printhead has 8 different modes of operations (although some modes are re-used). The mode of operation is defined by the state of the output pins phi_lsyncl and phi_readl and the internal printhead mode register. The modes of operation are defined in Table 210.

undesirable. To smooth the LLU DRAM access requirements over time the PHI transfers dot data to the printhead at a pre-programmed rate, proportional to the ratio of the shorter to longer printhead ICs.

The printhead data rate equalization is controlled by PrintheadRate[1:0] registers (one per printhead IC). The register is a 16 bit bitmap of active clock cycles in a 16 clock cycle window. For example if the register is set to 0xFFFF then the output rate to the printhead will be full rate, if it's set to 0xF0F0 then the output rate is 50% where there is 4 active cycles followed by 4 inactive cycles and so on. If the register was set to 0x0000 the rate would be 0%. The relative data transfer rate of the printhead can be varied from 0–100% with a granularity of 1/16 steps.

TABLE 210

Printhead modes of operation

| Name | Internal Mode | phi_readl | phi_lsyncl | State | Description |
|---|---|---|---|---|---|
| NORMAL | XXX | 1 | 1 | N/A | Normal print mode, dot data is clocked into the printhead shift register, on each falling edge of phi_srclk |
| DOT_LOAD/ FIRE_INIT | XXX | 1 | 0 | phi_frclk=0 | Dot Load Mode, data stored in the dot shift register is transferred into the dot latch on the falling edge of phi_lsyncl, and latched in on the rising edge of phi_lsyncl |
| | | | | phi_srclk=1 | Fire load mode. Parameter for generating fire pattern are loaded into generator, data on phi_ph_data[1:0][0] is clocked into the generator on each rising edge of phi_frclk |
| NOZZLE_RESET | 001 | 0 | 1 | N/A | Reset Nozzle Test mode. Reset the state on nozzle test. |
| CMOS_TEST | 111 | 0 | 1 | N/A | CMOS test mode. |
| FIRE_GEN | 000 | 0 | 1 | N/A | Fire Initialise mode. The initialised generator creates the fire pattern and shift select pattern. The pattern is clocked into the fire shift register and select shift register on the rising edge of phi_frclk |
| TEMP_TEST | 010 | 0 | 0 | N/A | Temperature test output. |
| NOZZLE_TEST | 001 | 0 | 0 | N/A | Nozzle test output. The result of a nozzle test is output on phi_frclk_i. |

32.3 Data Rate Equalization

The LLU can generate dot data at the rate of 12 bits per cycle, where a cycle is at the system clock frequency. In order to achieve the target print rate of 30 sheets per minute, the printhead needs to print a line every 100 μs (calculated from 300 mm @ 65.2 dots/mm divided by 2 seconds=~100 μsec). For a 7:3 constructed printhead this means that 9744 cycles at 320 Mhz is quick enough to transfer the 6-bit dot data (at 2 bits per cycle). The input FIFOs are used to de-couple the read and write clock domains as well as provide for differences between consume and fill rates of the PHI and LLU.

Nominally the system clock (pclk) is run at 160 Mhz and the printhead interface clock (doclk) is at 320 Mhz.

If the PHI was to transfer data at the full printhead interface rate, the transfer of data to the shorter printhead IC would be completed sooner than the longer printhead IC. While in itself this isn't an issue it requires that the LLU be able to supply data at the maximum rate for short duration, this requires uneven bursty access to DRAM which is

TABLE 211

Example rate equalization values for common printheads

| Printhead Ratio A:B | Printhead A rate (%) | Printhead B rate (%) |
|---|---|---|
| 8:2 | 0xFFFF (100%) | 0x1111 (25%) |
| 7:3 | 0xFFFF (100%) | 0x5551 (43.7%) |
| 6:4 | 0xFFFF (100%) | 0xF1F2 (68.7%) |
| 5:5 | 0xFFFF (100%) | 0xFFFF (100%) |

If both printhead ICs are the same size (e.g. a 5:5 printhead) it may be desirable to reduce the data rate to both printhead ICs, to reduce the read bandwidth from the DRAM.

32.4 Dot Generate and Transmit Order

Figure 281:
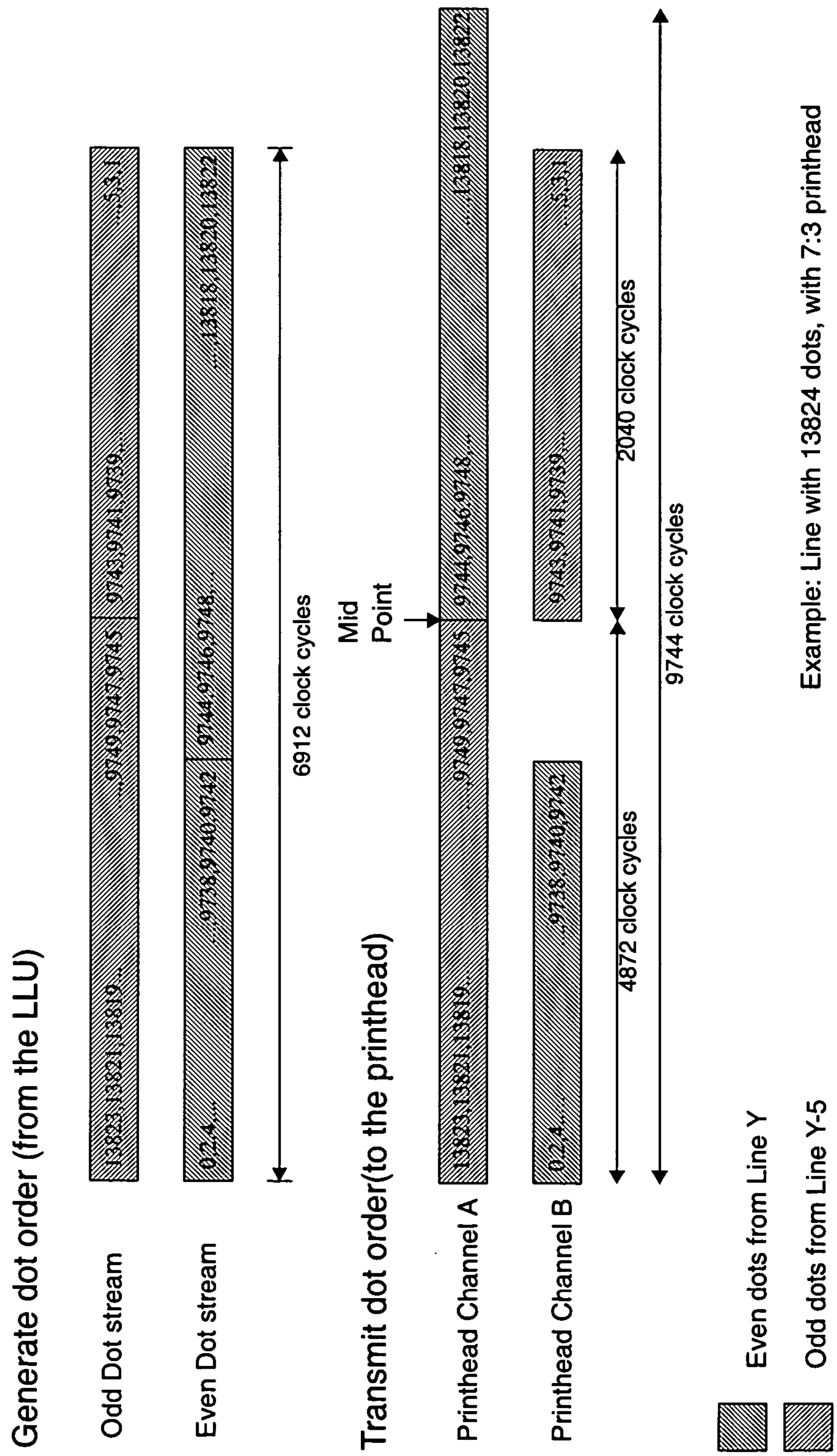
FIG. 281 shows an order of dot data generation and transmission

Several printhead types and arrangements exists (see [10] for other arrangements). The PHI is capable of driving all possible configurations, but for the purposes of simplicity only one arrangement (arrangement 1—see [10] for definition) is described in the following examples. The structure of the printhead ICs dictate the dot transmit order to each printhead IC. The PHI accepts two streams of dot data from the LLU, one even stream the other odd. The PHI constructs the dot transmit order streams from the dot generate order received from the LLU. Each stream of data has already been arranged in increasing or decreasing dot order sense by the DWU. The exact sense choice is dependent on the type of printhead ICs used to construct the printhead, but regardless of configuration the odd and even stream should be of opposing sense. The dot transmit order is shown in FIG. 281. Dot data is shifted into the printhead in the direction of the arrow, so from the diagram (taking the type 0 printhead IC) even dot data is transferred in increasing order to the mid point first (0, 2, 4, . . . , m-6, m-4, m-2), then odd dot data in decreasing order is transferred (m-1, m-3, m-5, . . . , 5, 3, 1). For the type 1 printhead IC the order is reversed, with odd dots in increasing order transmitted first, followed by even dot data in decreasing order. Note for any given color the odd and even dot data transferred to the printhead ICs are from different dot lines, in the example in the diagram they are separated by 5 dot lines. Table 212 shows the transmit dot order for some common A4 printheads. Different type printheads may have the sense reversed and may have an odd before even transmit order or vice versa.

printhead. This continues until both printheads have received half the number of dots they require (defined as the mid point). The mid point is calculated from the configured printhead size registers (PrintheadSize). Once both printheads have reached the mid point, the PHI switches the connections between the dot generators and the printhead, so now the odd dot generator feeds the type 0 printhead and the even dot generator feeds the type 1 printhead. This continues until the end of the line.

It is possible that both printheads will not be the same size and as a result one dot generator may reach the mid point before the other. In such cases the quicker dot generator is stalled until both dot generators reach the mid point, the connections are switched and both dot generators are restarted.

Note that in the example shown in FIG. 281 the dot generators could generate an A4 line of data in 6912 cycles, but because of the mismatch in the printhead IC sizes the transmit time takes 9744 cycles.

32.4.2 Single Printhead IC

Figure 282:
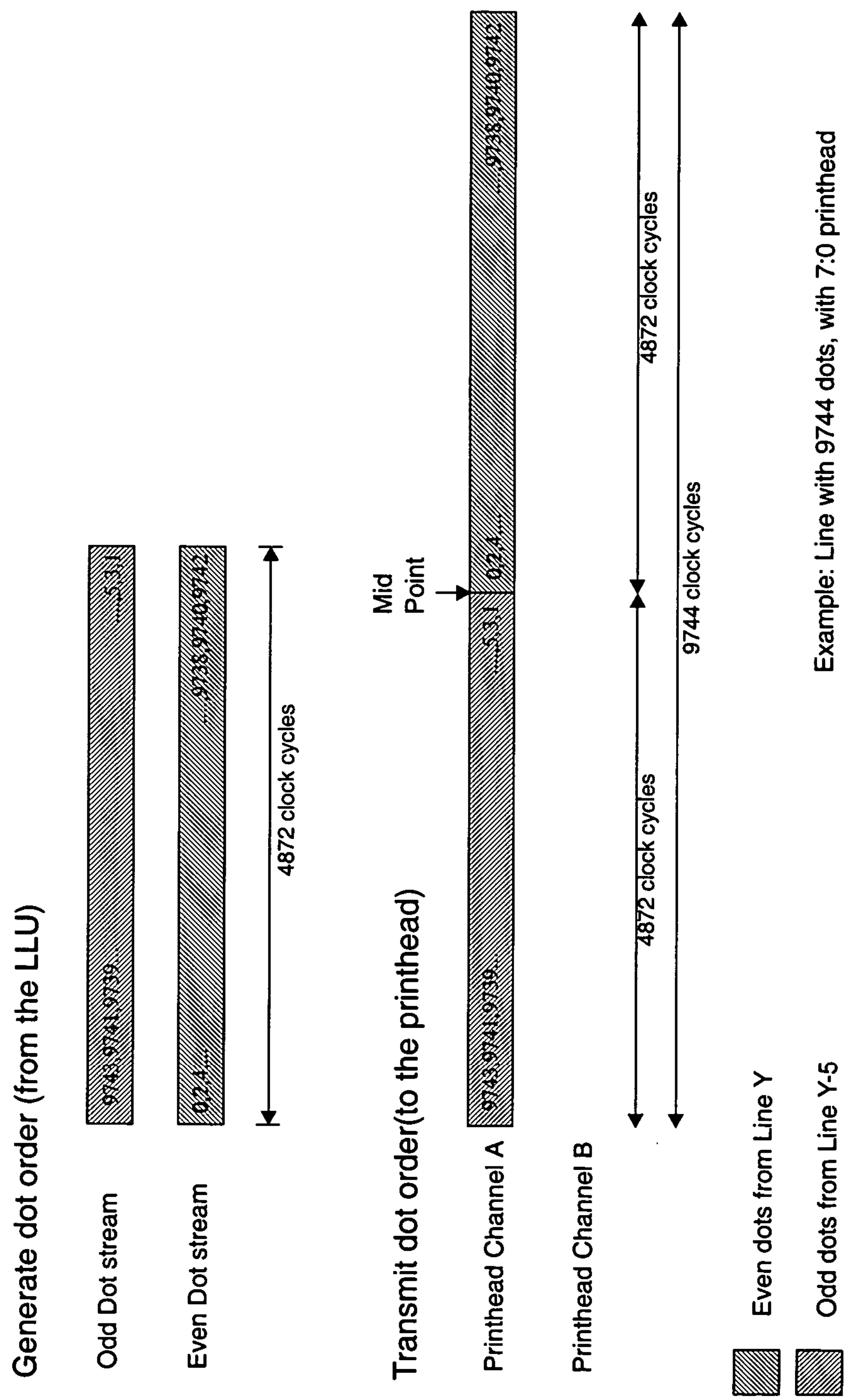
FIG. 282 shows an order of dot data generation and transmission (single printhead case)

In some cases only one printhead IC may be connected to the PHI. In FIG. 282 the dot generate and transmit order is shown for a single IC printhead of 9744 dots width. While the example shows the printhead IC connected to channel A, either channel could be used. The LLU generates odd and even dot streams as normal, it has no knowledge of the physical printhead configuration. The PHI is configured with the printhead size (PrintheadSize[1] register) for channel B set to zero and channel A is set to 9744.

Figure 283:
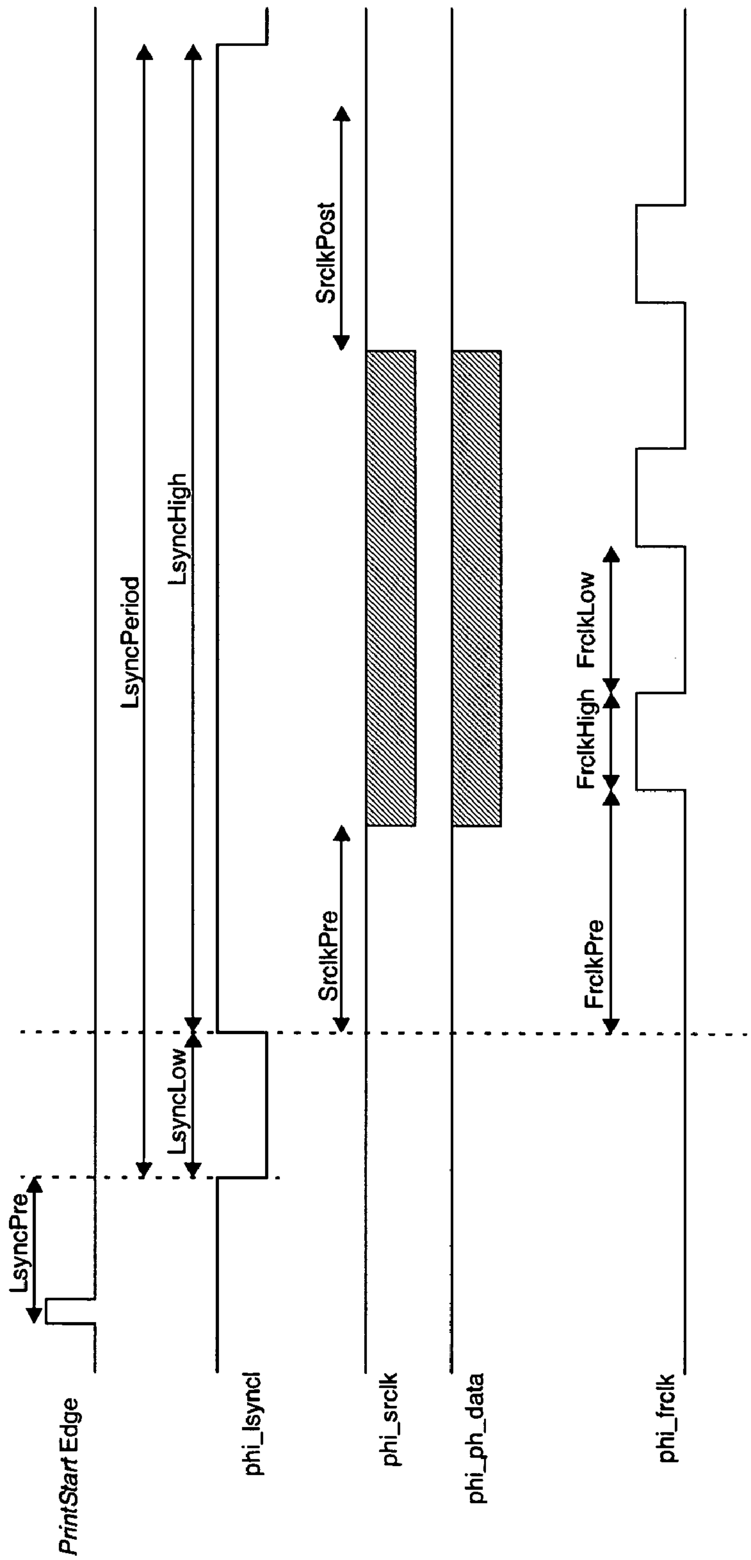
FIG. 283 shows printhead interface timing parameters

Note that in the example shown in FIG. 283 the dot generators could generate an 7 inch line of data in 4872 cycles, but because the printhead is using one IC, the transmit time takes 9744 cycles, the same speed as an A4 line with a 7:3 printhead.

32.4.3 Summary of Generate and Transmit Order Requirements

In order to support all the possible printhead arrangements, the PHI (in conjuction with the LLU/DWU) must be capable of re-ordering the bits according to the following criteria:

Be able to output the even or odd plane first.

Be able to output even and odd planes independently.

TABLE 212

Example printhead ICs, and dot data transmit order for A4 (13824 dots) page

| Size | Dots | Dot Order | |
|---|---|---|---|
| Type 0 Printhead IC | | | |
| 8 | 11160 | 0, 2, 4, 8 . . . , 5574, 5576, 5578 | 5579, 5577, 5575 . . . 7, 5, 3, 1 |
| 7 | 9744 | 0, 2, 4, 8 . . . , 4866, 4868, 4870 | 4871, 4869, 4867 . . . 7, 5, 3, 1 |
| 6 | 8328 | 0, 2, 4, 8 . . . , 4158, 4160, 4162 | 4163, 4161, 4159 . . . 7, 5, 3, 1 |
| 5 | 6912 | 0, 2, 4, 8 . . . , 3450, 3452, 3454 | 3455, 3453, 3451 . . . 7, 5, 3, 1 |
| 4 | 5496 | 0, 2, 4, 8 . . . , 2742, 2744, 2746 | 2847, 2845, 2843 . . . 7, 5, 3, 1 |
| 3 | 4080 | 0, 2, 4, 8 . . . , 2034, 2036, 2038 | 2039, 2037, 2035 . . . 7, 5, 3, 1 |
| 2 | 2664 | 0, 2, 4, 8 . . . , 1326, 1328, 1330 | 1331, 1329, 1327 . . . 7, 5, 3, 1 |
| Type 1 Printhead IC | | | |
| 8 | 11160 | 13823, 13821, 13819 . . . , 1337, 1335, 1333 | 1332, 1334, 1336 . . . 13818, 13820, 13822 |
| 7 | 9744 | 13823, 13821, 13819 . . . , 2045, 2043, 2041 | 2040, 2042, 2044 . . . 13818, 13820, 13822 |
| 6 | 8328 | 13823, 13821, 13819 . . . , 2853, 2851, 2849 | 2848, 2850, 2852 . . . 13818, 13820, 13822 |
| 5 | 6912 | 13823, 13821, 13819 . . . , 3461, 3459, 3457 | 3456, 3458, 3460 . . . 13818, 13820, 13822 |
| 4 | 5496 | 13823, 13821, 13819 . . . , 4169, 4167, 4165 | 4164, 4166, 4168 . . . 13818, 13820, 13822 |
| 3 | 4080 | 13823, 13821, 13819 . . . , 4877, 4875, 4873 | 4872, 4874, 4876 . . . 13818, 13820, 13822 |
| 2 | 2664 | 13823, 13821, 13819 . . . , 5585, 5583, 5581 | 5580, 5582, 5584 . . . 13818, 13820, 13822 |

32.4.1 Dual Printhead IC

The LLU contains 2 dot generator units. Each dot generator reads dot data from DRAM and generates a stream of dots in increasing or decreasing order. A dot generator can be configured to produce odd or even dot data streams, and the dot sense is also configurable. In FIG. 281 the odd dot generator is configured to produce odd dot data in decreasing order and the even dot generator produces dot data in increasing order. The LLU takes care of any vertical misalignment between the 2 printhead ICs, presenting the PHI with the appropriate data ready to be transmitted to the printhead.

In order to reconstruct the dot data streams from the generate order to the transmit order, the connection between the generators and transmitters needs to be switched at the mid point. At line start the odd dot generator feeds the type 1 printhead, and the even dot generator feeds the type 0 printhead.

Be able to reverse the sequence in which the color planes of a single dot are output to the printhead.

32.5 Print Sequence

The PHI is responsible for accepting dot data streams from the LLU, restructuring the dot data sequence and transferring the dot data to each printhead within a line time (i.e before the next line sync).

Before a page can be printed the printhead ICs must be initialized. The exact initialization sequence is configuration dependent, but will involve the fire pattern generation initialization and other optional steps. The initialization sequence is implemented in software.

Once the first line of data has been transferred to the printhead, the PHI will interrupt the CPU by asserting the phi_icu_print_rdy signal. The interrupt can be optionally masked in the ICU and the CPU can poll the signal via the PCU or the ICU. The CPU must wait for a print ready signal in all printing SoPECs before starting printing.

Once the CPU in the PrintMaster SoPEC is satisfied that printing should start, it triggers the LineSyncMaster SoPEC by writing to the PrintStart register of all printing SoPECs. The transition of the PrintStart register in the LineSyncMaster SoPEC will trigger the start of lsyncl pulse generation. The PrintMaster and LineSyncMaster SoPEC are not necessarily the same device, but often are the same. For a more in depth definition see section 12.1.1 Multi-SoPEC systems on page 105.

Writing a 1 to the PrintStart register enables the generation of the line sync in the LineSyncMaster which is in turn used to align all SoPECs in a multi-SoPEC system. All printhead signaling is aligned to the line sync. The PrintStart is only used to align the first line sync in a page.

When a SoPEC receives a line sync pulse it means that the line previously transferred to the printhead is now printing, so the PHI can begin to transfer the next line of data to the printhead. When the transfer is complete the PHI will wait for the next line sync pulse before repeating the cycle. If a line sync arrives before a complete line is transferred to the printhead (i.e. a buffer error) the PHI generates a buffer underrun interrupt, and halts the block.

For each line in a page the PHI must transfer a full line of data to the printhead before the next line sync is generated or received.

32.5.1 Sync Pulse Control

If the PHI is configured as the LineSyncMaster SoPEC it will start generating line sync signals LsyncPre number of pclk cycles after PrintStart register rising transition is detected. All other signals in the PHI interface are referenced from the rising edge of phi_lsyncl signal.

If the SoPEC is in line sync slave mode it will receive a line sync pulse from the LineSyncMaster SoPEC through the phi_lsyncl pin which will be programmed into input mode. The phi_lsyncl input pin is treated as an asynchronous input and is passed through a de-glitch circuit of programmable de-glitch duration (LsyncDeglitchCnt).

The phi_lsyncl will remain low for LsyncLow cycles, and then high for LsyncHigh cycles. The phi_lsyncl profile is repeated until the page is complete. The period of the phi_lsyncl is given by LsyncLow+LsyncHigh cycles. Note that the LsyncPre value is only used to vary the time between the generation of the first phi_lsyncl and the PageStart indication from the CPU. See FIG. 284 for reference diagram.

If the SoPEC device is in line sync slave mode, the LsyncHigh register specifies the minimum allowed phi_lsyncl period. Any phi_lsyncl pulses received before the LsyncHigh has expired will trigger a buffer underrun error.

32.5.2 Shift Register Signal Control

Once the PHI receives the line sync pulse, the sequence of data transfer to the printhead begins. All PHI control signals are specified from the rising edge of the line sync.

The phi_srclk (and consequently phi_ph_data) is controlled by the SrclkPre, SrclkPost registers. The SrclkPre specifies the number of pclk cycles to wait before beginning to transfer data to the printhead. Once data transfer has started, the profile of the phi_srclk is controlled by PrintheadRate register and the status of the PHI input FIFO. For example it is possible that the input FIFO could empty and no data would be transferred to the printhead while the PHI was waiting. After all the data for a printhead is transferred to the PHI, it counts SrclkPost number of pclk cycles. If a new phi_lsyncl falling edge arrives before the count is complete the PHI will generate a buffer underrun interrupt (phi_icu_underrun).

32.5.3 Firing Sequence Signal Control

Figure 284:
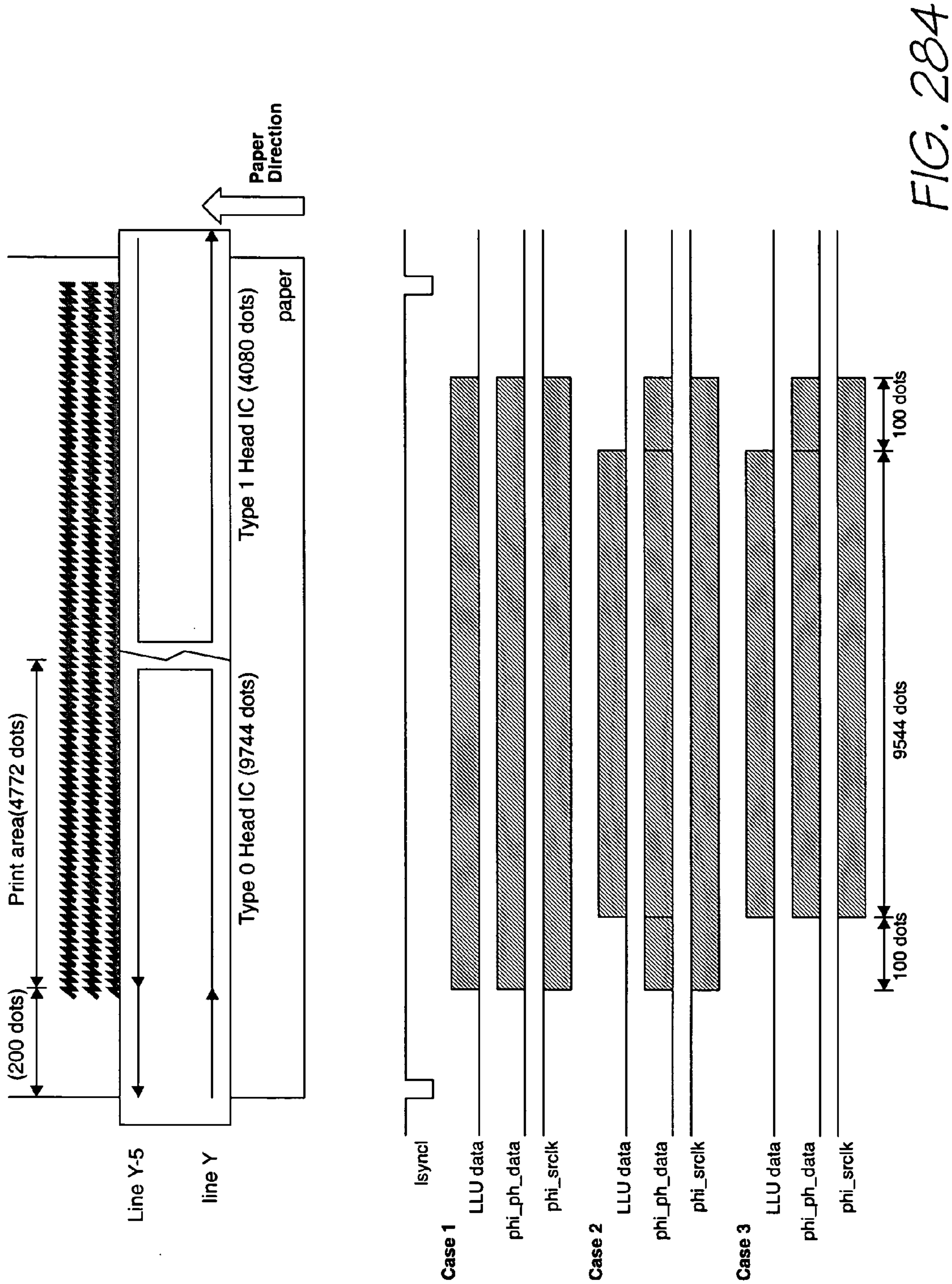
FIG. 284 shows printhead timing with margining
Figure 285:
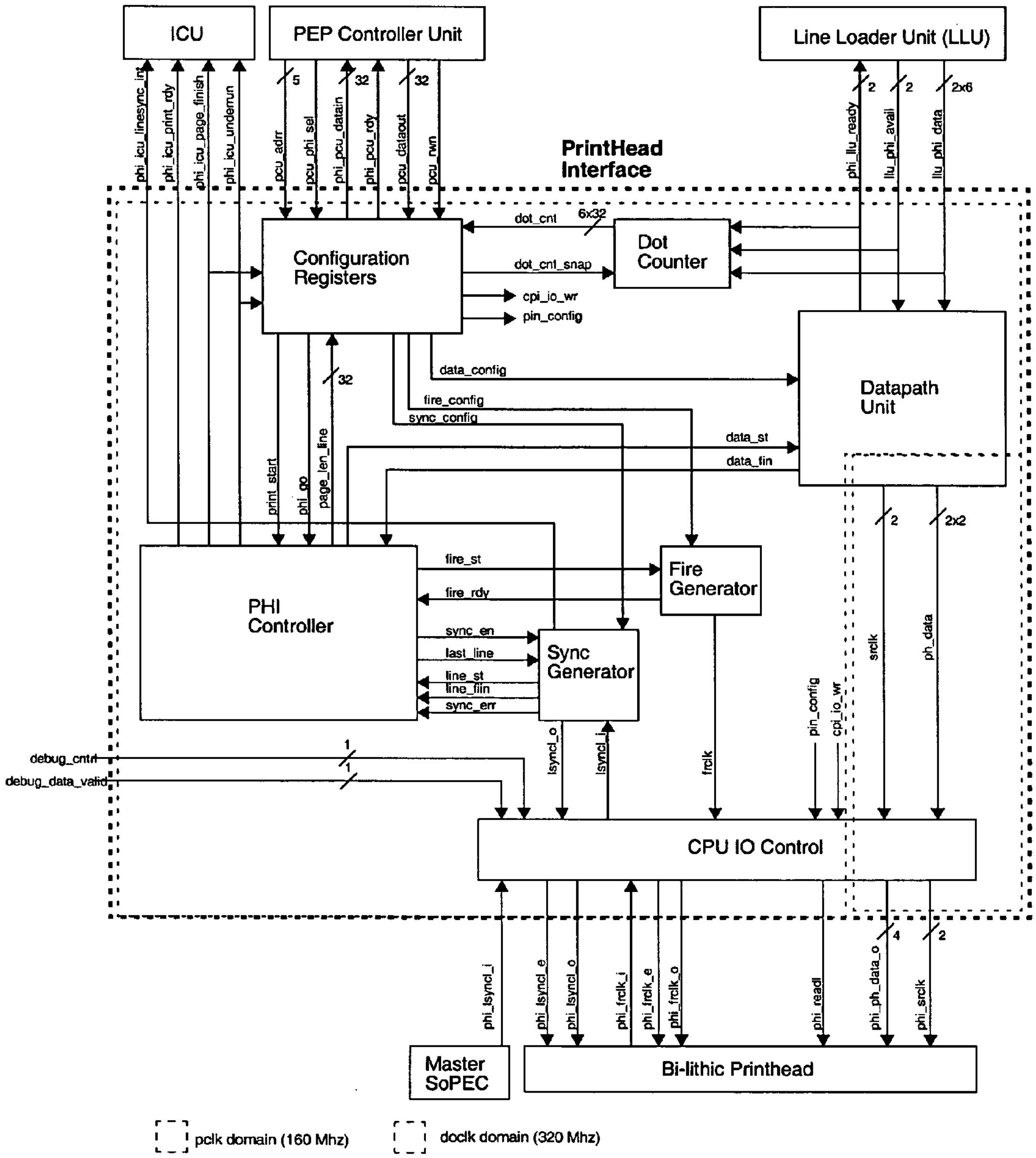
FIG. 285 shows a PHI block partition
Figure 287:
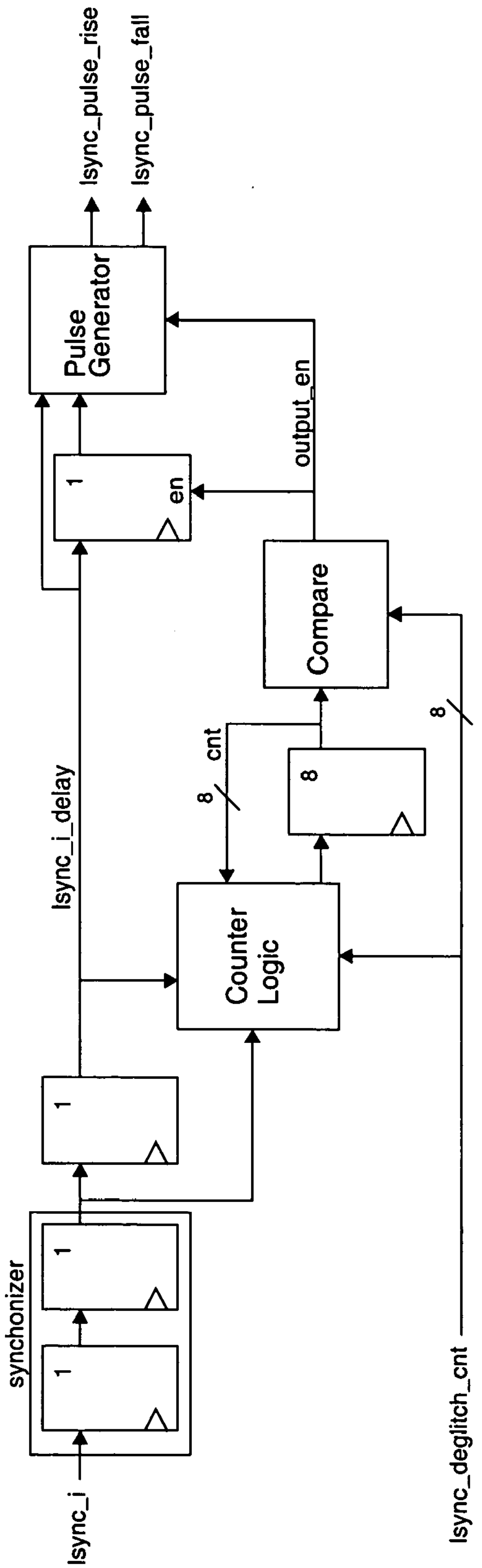
FIG. 287 shows a line sync de-glitch RTL diagram
Figure 288:
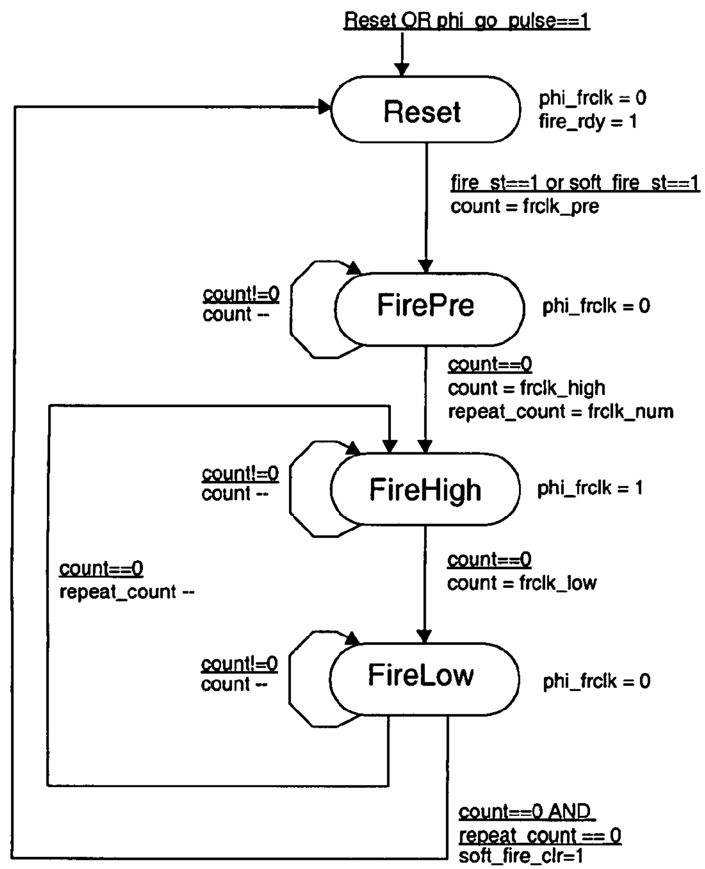
FIG. 288 shows a fire generator state diagram
Figure 289:
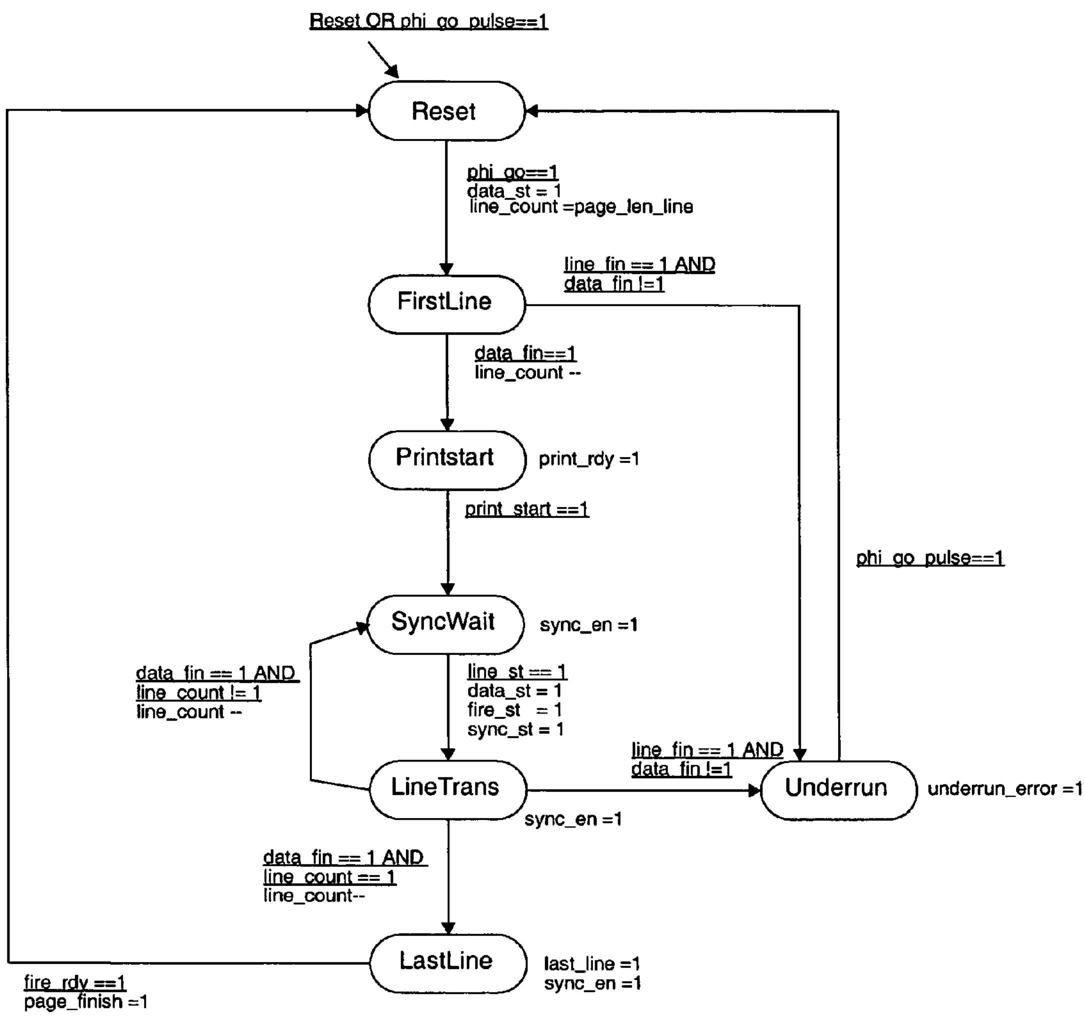
FIG. 289 shows a PHI controller state machine
Figure 290:
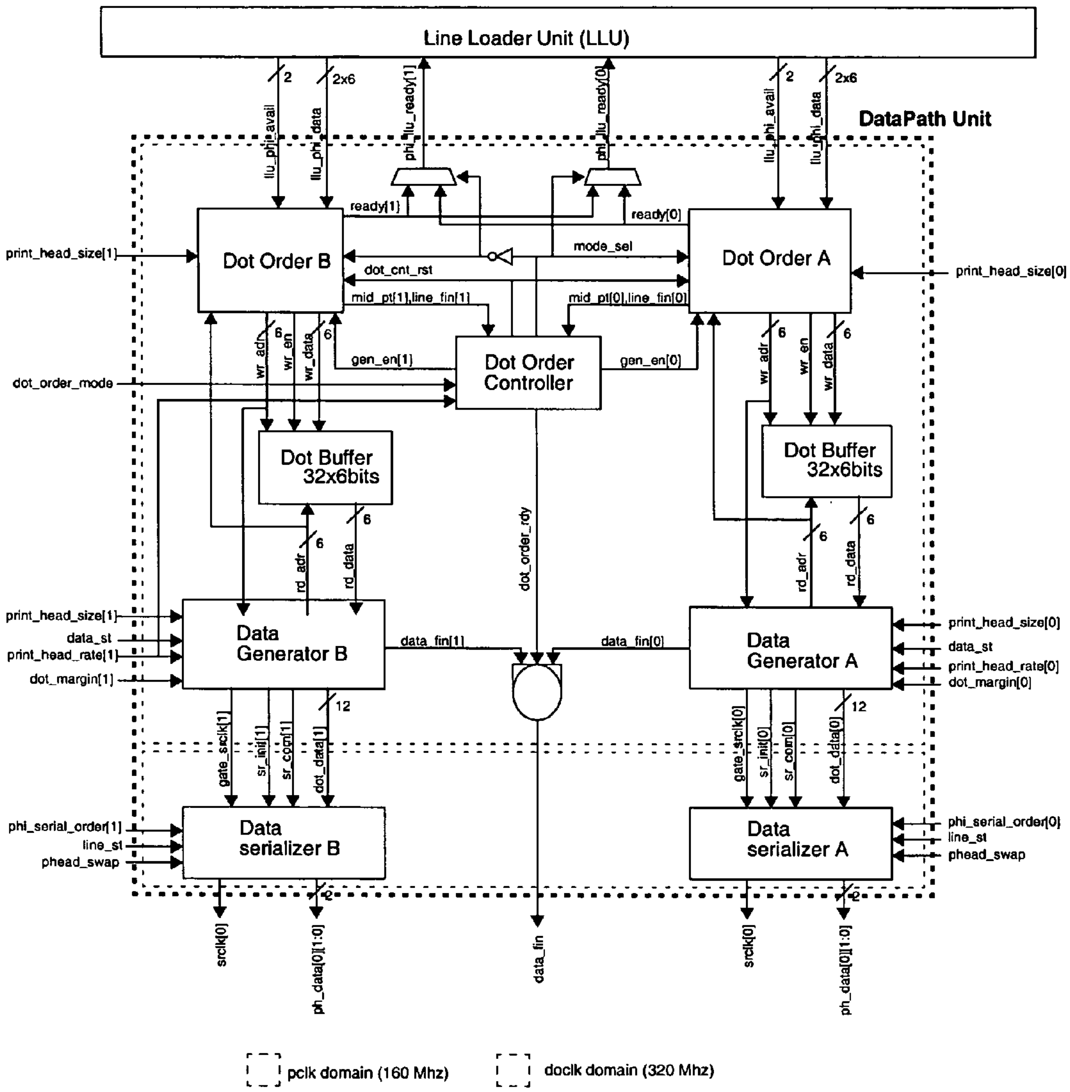
FIG. 290 shows a datapath unit partition
Figure 291:
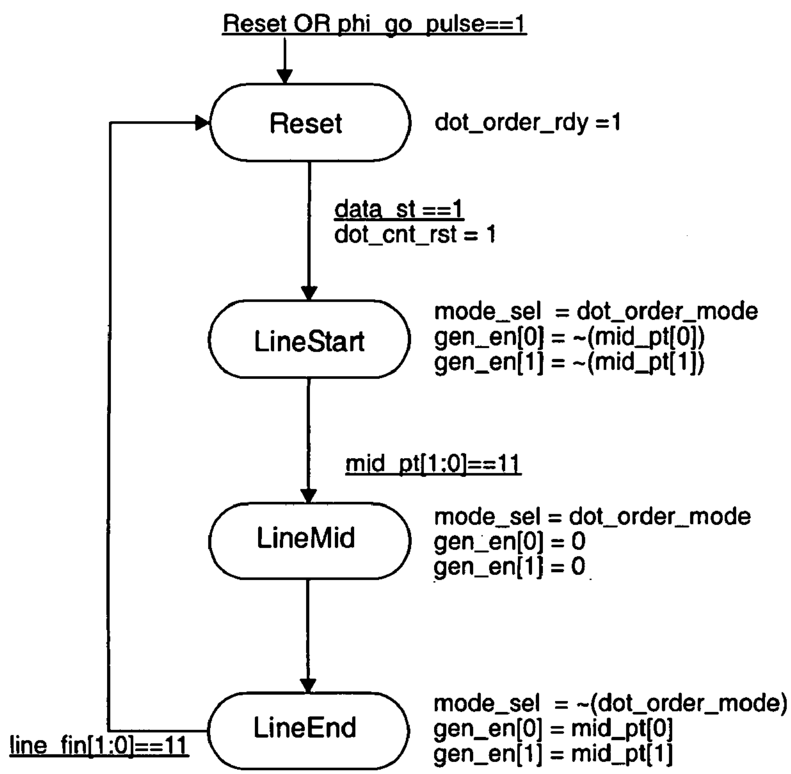
FIG. 291 shows a dot order controller state diagram
Figure 293:
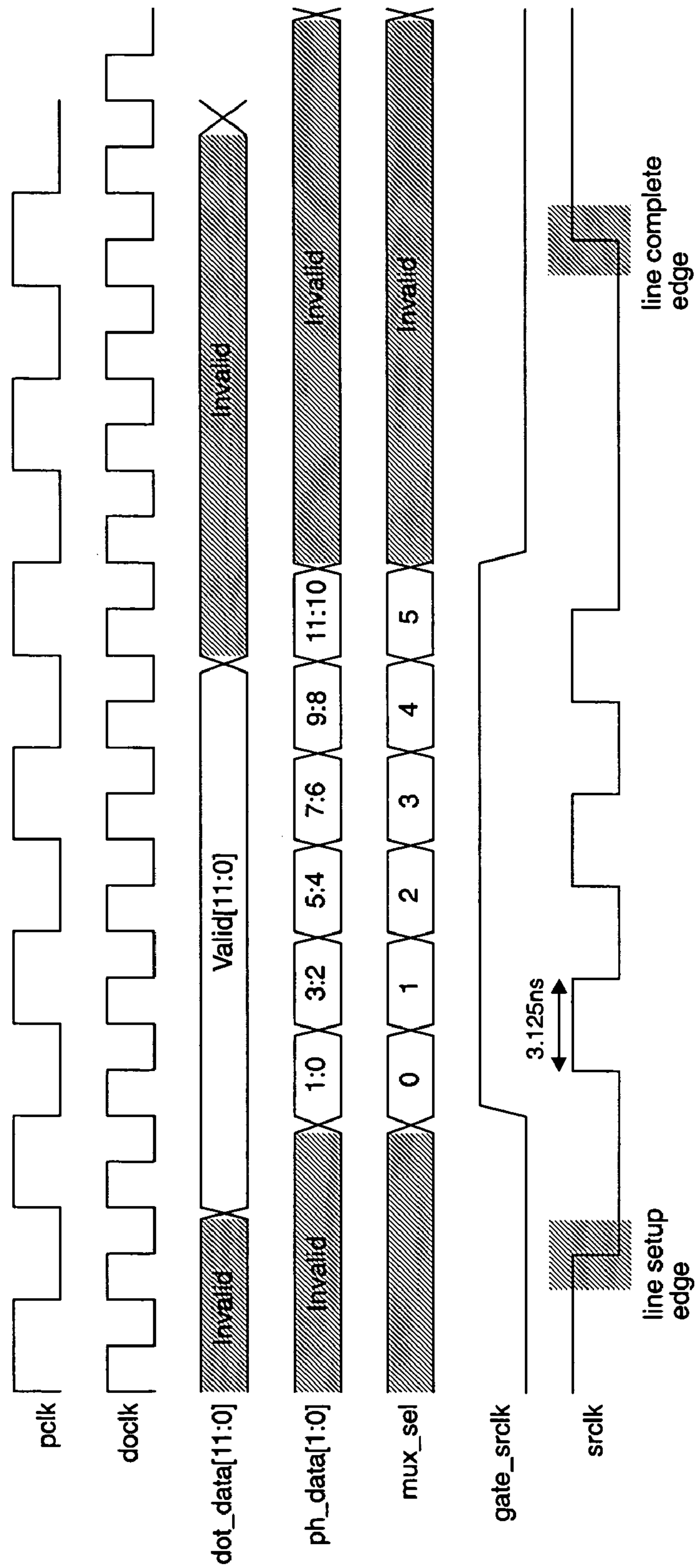
FIG. 293 shows data serializer timing
Figure 294:
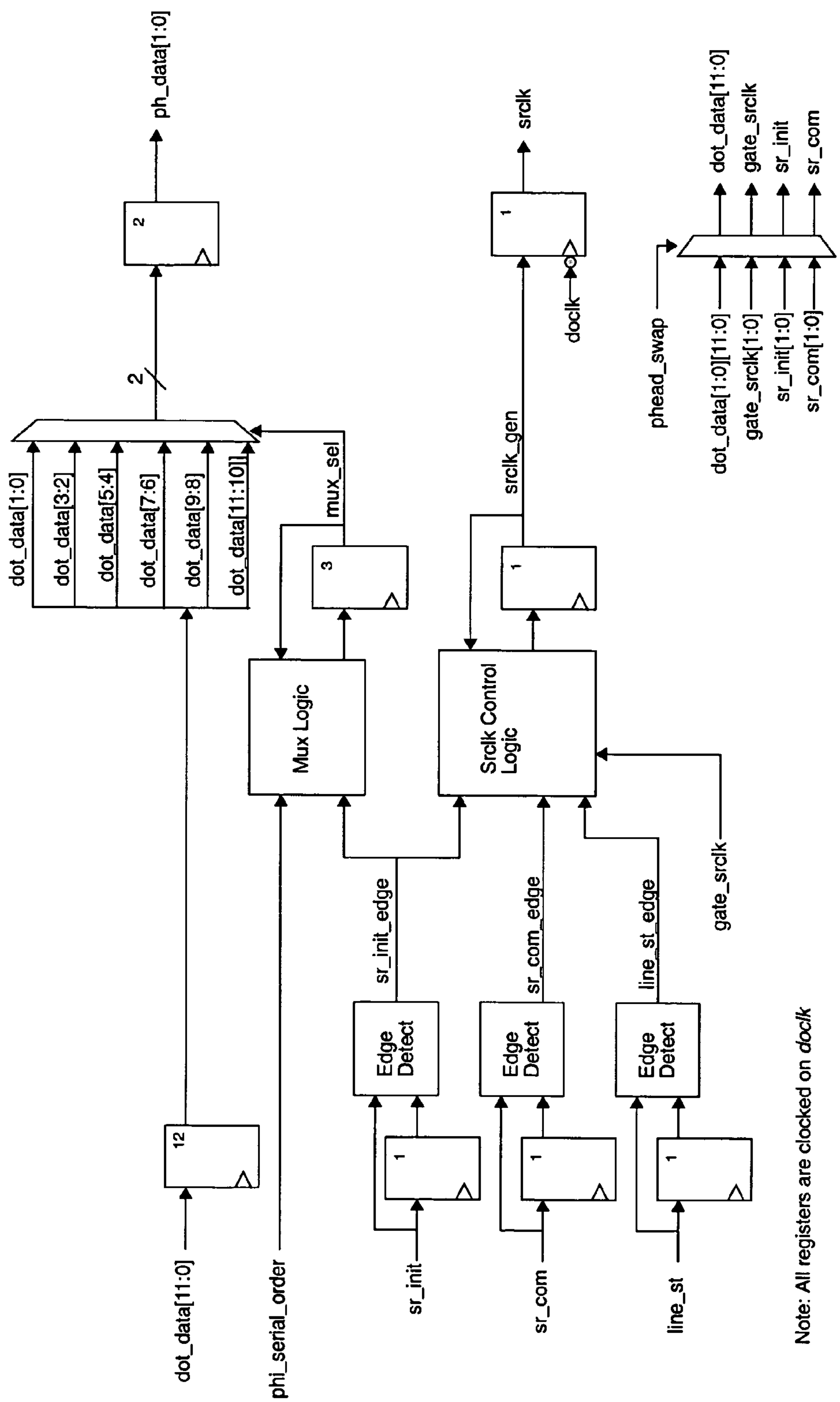
FIG. 294 shows a data serializer RTL Diagram

The profile of the phi_frclk pulses per line is determined by 4 registers FrclkPre, FrclkLow, FrclkHigh, FrclkNum. The FrclkPre register specifies the number of cycles between line sync rising edge and the phi_frclk pulse high. It remains high for FrclkHigh cycles and then low for FrclkLow cycles. The number of pulses generated per line is determined by FrclkNum register. The total number of cycles required to complete a firing sequence should be less than the phi_lsyncl period i.e. ((FrclkHigh+FrclkLow)*FrclkNum)+FrclkPre<(LsyncLow+LsyncHigh). Note that when in CPU direct control mode (PrintheadCpuCtrl=1) and PrintheadCpuCtrlMode[x]=1, the frclk generator is triggered by the transition of the FireGenSoftTrigger[0] bit from 0 to 1. FIG. 284 details the timing parameters controlling the PHI. All timing parameters are measured in number of pclk cycles.

32.5.4 Page Complete

The PHI counts the number of lines processed through the interface. The line count is initialised to the PageLenLine and decrements each time a line is processed. When the line count is zero it pulses the phi icu_page_finish signal. A pulse on the phi_icu_page_finish automatically resets the PHI Go register, and can optionally cause an interrupt to the CPU. Should the page terminate abnormally, i.e. a buffer underrun, the Go register will be reset and an interrupt generated.

32.5.5 Line Sync Interrupt

The PHI will generate an-interrupt to the CPU after a predefined number of line syncs have occured. The number of line syncs to count is configured by the LineSyncInterrupt register. The interrupt can be disabled by setting the register to zero.

32.6 Dot Line Margin

The PHI block allows the generation of margins either side of the received page from the LLU block. This allows the page width used within PEP blocks to differ from the physical printhead size.

This allows SoPEC to store data for a page minus the margins, resulting in less storage requirements in the shared DRAM and reduced memory bandwidth requirements. The difference between the dot data line size and the line length generated by the PHI is the dot line margin length. There are two margins specified for any sheet, a margin per printhead IC side.

The margin value is set by programming the DotMargin register per printhead IC. It should be noted that the DotMargin register represents half the width of the actual margin (either left or right margin depending on paper flow direction). For example, if the margin in dots is 1 inch (1600 dots), then DotMargin should be set to 800. The reason for this is that the PHI only supports margin creation cases 1 and 3 described below.

See example in FIG. 284.

In the example the margin for the type 0 printhead IC is set at 100 dots (DotMargin==100), implying an actual margin of 200 dots.

If case one is used the PHI takes a total of 9744 phi_srclk cycles to load the dot data into the type 0 printhead. It also requires 9744 dots of data from the LLU which in turn gets read from the DRAM. In this case the first 100 and last 100 dots would be zero but are processed though the SoPEC system consuming memory and DRAM bandwidth at each step.

In case 2 the LLU no longer generates the margin dots, the PHI generates the zeroed out dots for the margining. The phi_srclk still needs to toggle 9744 times per line, although the LLU only needs to generate 9544 dots giving the reduction in DRAM storage and associated bandwidth.

The case 2 senario is not supported by the PHI because the same effect can be supported by means of case 1 and case 3.

If case 3 is used the benefits of case 2 are achieved, but the phi_srclk no longer needs to toggle the full 9744 clock cycles. The phi_srclk cycles count can be reduced by the margin amount (in this case 9744−100=9644 dots), and due to the reduction in phi_srclk cycles the phi_lsyncl period could also be reduced, increasing the line processing rate and consequently increasing print speed. Case 3 works by shifting the odd (or even) dots of a margin from line Y to become the even (or odd) dots of the margin for line Y-4, (Y-5 adjusted due to being printed one line later). This works for all lines with the exception of the first line where there has been no previous line to generate the zeroed out margin. This situation is handled by adding the line reset sequence to the printhead initialization procedure, and is repeated between pages of a document.

32.7 Dot Counter

For each color the PHI keeps a dot usage count for each of the color planes (called AccumDotCount). If a dot is used in particular color plane the corresponding counter is incremented. Each counter is 32 bits wide and saturates if not reset. A write to the DotCountSnap register causes the AccumDotCount[N] values to be transferred to the DotCount[N] registers (where N is 5 to 0, one per color). The AccumDotCount registers are cleared on value transfer.

The DotCount[N] registers can be written to or read from by the CPU at any time. On reset the counters are reset to zero.

The dot counter only counts dots that are passed from the LLU through the PHI to the printhead.

Any dots generated by direct CPU control of the PHI pins will not be counted.

32.8 CPU IO Control

The PHI interface provides a mechanism for the CPU to directly control the PHI interface pins, allowing the CPU to access the bi-lithic printhead:

Determine printhead temperature

Test for and determine dead nozzles for each printhead IC

Printhead IC initialization

Printhead pre-heat function

The CPU can gain direct control of the printhead interface connections by setting the PrintheadCpuCtrl register to one. Once enabled the printhead bits are driven directly by the PrintheadCpuOut control register, where the values in the register are reflected directly on the printhead pins and the status of the printhead input pins can be read directly from the PrintheadCpuIn. The direction of pins is controlled by programming PrintheadCpuDir register.

The register to pin mapping is as follows:

TABLE 213

CPU control and status registers mapping to printhead interface

| Register Name | bits | Printhead pin |
|---|---|---|
| PrintHeadCpuOut | 0 | phi_lsyncl_o |
| | 1 | phi_frclk_o |
| | 2 | Reserved |
| | 4:3 | phi_ph_data_o[0][1:0] |
| | 6:5 | phi_ph_data_o[1][1:0] |
| | 8:7 | phi_srclk[1:0] |
| | 9 | phi_readl |
| PrintHeadCpuDir | 0 | phi_lsyncl_e direction control<br>1 - output mode<br>0 - input mode |
| | 1 | phi_frclk_e direction control<br>1 - output mode<br>0 - input mode |
| | 2 | Reserved |
| PrintHeadCpuIn | 0 | phi_lsyncl_i |
| | 1 | phi_frclk_i |
| | 2 | Reserved |

It is important to note that once in PrintheadCpuCtrl mode it is the responsibility of the CPU to drive the printhead correctly and not create situations where the printhead could be destroyed such as activating all nozzles together.

The phi_srclk is a double data rate clock (DDR) and as such will clock data on both edges in the printhead.

Note the following procedures are based on current printhead capabilities, and are subject to change.

32.9 Implementation 32.9.1 Definitions of I/O

TABLE 214

Printhead interface I/O definition

| Port name | Pins | I/O | Description |
|---|---|---|---|
| Clocks and Resets | | | |
| Pclk | 1 | In | System Clock |
| Doclk | 1 | In | Data out clock (2× pclk) used to transfer data to printhead |
| prst_n | 1 | In | System reset, synchronous active low. Synchronous to pclk |
| dorst_n | 1 | In | System reset, synchronous active low. Synchronous to doclk |

TABLE 214-continued

Printhead interface I/O definition

| Port name | Pins | I/O | Description |
|---|---|---|---|
| General | | | |
| phi__icu__print__rdy | 1 | Out | Indicates that the first line of data is transferred to the printhead Active high. |
| phi__icu__page__finish | 1 | Out | Indicates that data for a complete page has transferred. Active high |
| phi__icu__underrun | 1 | Out | Indicates the PHI has detected a buffer underrun. Active high |
| phi__icu__linesync__int | 1 | Out | Indicates the PHI has detected LineSyncInterrupt number of line syncs. |
| Debug | | | |
| debug__data__valid | 1 | In | Output debug data valid to be muxed on to the PHI pin |
| debug__cntrl | 1 | In | Control signal for the PHI to indicate whether or not the debug data valid (and pclk) should be selected by the pin mux. Active high. |
| LLU Interface | | | |
| llu__phi__data[1:0][5:0] | 2 × 6 | In | Dot Data from LLU to the PHI, each bit is a color plane 5 downto 0.<br>Bus 0 - Even dot data stream<br>Bus 1 - Odd dot data stream<br>Data is active when corresponding bit is active in llu__phi__avail bus |
| phi__llu__ready[1:0] | 2 | Out | Indicates that PHI is ready to accept data from the LLU<br>0 - Even dot data stream<br>1 - Odd dot data stream |
| llu__phi__avail[1:0] | 2 | In | Indicates valid data present on corresponding llu__phi__data.<br>0 - Even dot data stream<br>1 - Odd dot data stream |
| Printhead Interface | | | |
| phi__ph__data[1:0][1:0] | 2 × 2 | Out | Dot data output to printhead. Each bus to each printhead contains 2 bits of data<br>Bus 0 - Printhead channel A<br>Bus 1 - Printhead channel B |
| phi__srclk[1:0] | 2 | Out | Dot data shift clock used to clock in printhead data, data is shifted on both edges of clock(i.e. double data rate DDR).<br>Bus 0 - Printhead channel A<br>Bus 1 - Printhead channel B |
| phi__readl | 1 | Out | Common printhead mode control. Used in conjunction with phi__lsyncl to determine the printhead mode<br>0 - SoPEC receiving, printhead driving<br>1 - SoPEC driving, printhead receiving |
| phi__frclk__o | 1 | Out | Common Fire pattern clock needs to toggle once per fire cycle |
| phi__frclk__e | 1 | In | phi__frclk__o output enable, when high phi__frclk__o pin is driving |
| phi__frclk__l | 1 | In | phi__frclk__i input from printhead |
| phi__lsyncl__o | 1 | Out | Capture dot data for next print line, output mode |
| phi__lsyncl__e | 1 | In | phi__lsyncl output enable, when high phi__lsyncl pin is driving |
| phi__lsyncl__i | 1 | In | Line Sync Pulse from Master SoPEC |
| PCU Interface | | | |
| pcu__phi__sel | 1 | In | Block select from the PCU. When pcu__phi__sel is high both pcu__adr and pcu__dataout are valid. |
| pcu__rwn | 1 | In | Common read/not-write signal from the PCU. |
| pcu__adr[7:2] | 6 | In | PCU address bus. Only 6 bits are required to decode the address space for this block. |
| pcu__dataout[31:0] | 32 | In | Shared write data bus from the PCU. |
| phi__pcu__rdy | 1 | Out | Ready signal to the PCU. When phi__pcu__rdy is high it indicates the last cycle of the access. For a write cycle this means pcu__dataout has been registered by the block and for a read cycle this means the data on phi__pcu__datain is valid. |
| phi__pcu__datain[31:0] | 32 | Out | Read data bus to the PCU. |

32.9.2 PHI Sub-Block Partition 32.9.3 Configuration Registers

The configuration registers in the PHI are programmed via the PCU interface. Refer to section 21.8.2 on page 321 for a description of the protocol and timing diagrams for reading and writing registers in the PHI. Note that since addresses in SoPEC are byte aligned and the PCU only supports 32-bit register reads and writes, the lower 2 bits of the PCU address bus are not required to decode the address space for the PHI. When reading a register that is less than 32 bits wide zeros should be returned on the upper unused bit(s) of phi_pcu_datain. Table 215 lists the configuration registers in the PHI

TABLE 215

PHI registers description

| Address PHI_base+ | Register | #bits | Reset | Description |
|---|---|---|---|---|
| Control Registers | | | | |
| 0x00 | Reset | 1 | 0x1 | Active low synchronous reset, self deactivating. A write to this register will cause a PHI block reset. |
| 0x04 | Go | 1 | 0x0 | Active high bit indicating the PHI is programmed and ready to use. A low to high transition will cause PHI block internal state to reset. Will be automatically reset if a page finish or a buffer underrun is detected. |
| General Control | | | | |
| 0x08 | PageLenLine | 32 | 0x0000_0000 | Specifies the number of dot lines in a page.<br>Indicates the number of lines left to process in this page while the PHI is running (Working register) |
| 0x0c | PrintStart | 1 | 0x0 | A high level enables printing to start via the generation of line syncs in a master, and acceptance of line syncs in a slave. Can be set in advance of the print ready signal. |
| 0x10–0x14 | DotMargin[1:0] | 2 × 16 | 0x0000 | Specifies for each printhead IC, the width of the margin in dots divided by 2.<br>Value must be divisible by 2 (i.e. the low bit must be 0)<br>0 - Printhead IC Channel A<br>1 - Printhead IC Channel B |
| 0x18–0x2C | DotCount[5:0] | 6 × 32 | 0x0000_0000 | Indicates the number of Dots used for a particular color, where N specifies a color from 0 to 5. Value valid after a write access to DotCountSnap |
| 0x30 | DotCountSnap | 1 | 0x0 | Write access causes the AccumDotCount values to be transferred to the DotCount registers.<br>The AccumDotCount are reset afterwards. (Reads as zero) |
| 0x34 | PhiHeadSwap | 1 | 0x0 | Controls which signals are connected to printhead channels A and B<br>0 - Normal, specifies bit 0 is channel A, bit 1 is channel B<br>1 - Swapped, specifies bit 0 is channel B, bit 1 is channel A. |
| 0x38 | PhiMode | 1 | 0x0 | Indicates whether the PHI is operating in master or slave mode<br>0 - Slave Mode<br>1 - Master Mode |
| 0x3C–0x40 | PhiSerialOrder | 2 × 1 | 0x0 | Specifies the serialization order of dots before transfer to the printhead.<br>Bus 0 - Printhead Channel A<br>Bus 1 - Printhead Channel B<br>If set to zero the order is dot[1:0], then dot[3:2] then dot[5:4].<br>If set to one then the order is dot[5:4], dot[3:2], dot[1:0]. |
| 0x44–0x48 | PrintHeadSize | 2 × 16 | 0x0000 | Specifies the number of non-margin dots in the printhead ICs (must be even). If margining is to be used then the configured PrintHeadSize should be adjusted by the dot margin value i.e. PrintHeadSize = (Physical-PrintHeadSize − (DotMargin * 2)).<br>Value must be divisible by 2 (i.e. the low bit must be 0)<br>Bus 0 - Specifies printhead on Channel A<br>Bus 1 - Specifies printhead on Channel B |
| CPU Direct PHI Control (See Table 213.) | | | | |
| 0x4C | PrintHeadCpuIn | 3 | 0x0 | PHI interface pins input status. Only active in direct CPU mode (Read Only Register) |
| 0x50 | PrintHeadCpuDir | 3 | 0x0 | PHI interface pins direction control.<br>Only active in direct CPU mode |
| 0x54 | PrintHeadCpuOut | 10 | 0x000 | PHI interface pins output control. Only active in direct CPU mode |
| 0x58 | PrintHeadCpuCtrl | 1 | 0x1 | Control direct access CPU access to the PHI pins<br>0 - Normal Mode<br>1 - Direct CPU Control mode |
| 0x5C | Print-HeadCpuCtrlMode | 1 | 0x0 | Specifies if the pin is controlled by the PrintHeadCpuOut register or by the Fire generator logic. Only active when PrintHeadCpuCtrl is 1 and pin is in output mode.<br>Bit 0 - controls the frclk pin |

TABLE 215-continued

PHI registers description

| Address PHI_base+ | Register | #bits | Reset | Description |
|---|---|---|---|---|
| | | | | When the bit is<br>0 - Pin is controlled by PrintHeadCpuOut<br>1 - Pin is controlled by Fire Generator Logic |
| Line Sync Control | | | | |
| 0x60 | LsyncHigh | 24 | 0x00_0000 | In Master mode specifies the number of pclk cycles phi_lsyncl should remain high.<br>In Slave mode specifies the minimum number of pclk cycles between Lsync pulses. Lsync pulses of a shorter period will cause the PHI to halt due to buffer underrun. |
| 0x64 | LsyncLow | 16 | 0x0000 | Number of pclk cycles phi_lsyncl should remain low. |
| 0x68 | LsyncPre | 16 | 0x0000 | Number of pclk cycles between PrintStart rising transition and the generated phi_lsyncl falling edge |
| 0x6C | LsyncDeglitchCnt | 4 | 0x3 | Number of pclk cycles to filter the incoming Lsync pulse from the master. Only used in slave mode. |
| 0x70 | LineSyncInterrupt | 16 | 0x0000 | Number of line syncs to occur before generating an interrupt. When set to zero interrupt is disabled. |
| Shift Register Control | | | | |
| 0x74 | SrclkPre | 14 | 0x0000 | Number of pclk cycles between phi_lsyncl falling edge and phi_srclk pulse generation, or printhead data transfer |
| 0x78 | SrclkPost | 14 | 0x0000 | Number of pclk cycles allowed margin from last srclk pulse in a line to before next line sync |
| 0x7C–0x80 | PrintHeadRate[1:0] | 2 × 16 | 0xFFFF | Specifies the active to inactive ratio of phi_srclk for the printhead ICs. A 1 indicates Active.<br>Bus 0 - Printhead IC channel A<br>Bus 1 - Printhead IC channel B |
| 0x84 | DotOrderMode | 1 | 0x0 | Specifies the dot transmit order to the printhead Channel A. Printhead Channel B is always the opposing order.<br>0 - Even before Odd dots<br>1 - Odd before Even dots |
| Fire Control | | | | |
| 0x98 | FrclkPre | 14 | 0x0000 | Number of pclk cycles after lsyncl transitions from 0 to 1 to phi_frclk pulse generation |
| 0x9C | FrclkLow | 14 | 0x0000 | Number of pclk cycles phi_frclk should remain low. |
| 0xA0 | FrclkHigh | 14 | 0x0000 | Number of pclk cycles phi_frclk should remain high. |
| 0xA4 | FrclkNum | 16 | 0x0000 | Number of phi_frclk pulses per line time. |
| 0xA8 | FireGenSoftTrigger | 1 | 0x0 | Only active when<br>PrintHeadCpuCtrlMode is set to 1,<br>PrintHeadCpuCtrl is 1 and pin is in output mode.<br>Bit 0 controls frclk generator.<br>A 0 to 1 transition on a bit triggers the corresponding generator to create the programmed pulse profile (configured by FrclkNum, FrclkHigh, FrclkLow, FrclkPre registers) when complete the bit gets reset to 0. |
| Working Registers | | | | |
| 0xAC–0xB0 | LineDotCnt | 2 × 16 | 0x0000 | Indicates the number of dot processed in the current line<br>Bus 0 - Printhead Channel A<br>Bus 1 - Printhead Channel B<br>(Read Only Registers) |

The configuration registers in the PHI block are clocked at pclk rates but some blocks in the PHI are clocked by different and asynchronous clocks. Configuration values are not re-synchronized, it is therefore important that the Go register be set to zero while updating configuration values. This prevents logic from entering unknown states due to metastable clock domain transfers.

Some registers can be written to at any time such as the direct CPU control registers (PrintheadCpuIn, Printhead-CpuDir, PrintheadCpuOut and PrintheadCpuCtrl), the Go register and the PrintStart register. All registers can be read from at any time.

32.9.4 Dot Counter

The dot counter keeps a running count of the number of dots fired for each color plane. The counters are 32 bits wide and will saturate. When the CPU wants to read the dot count for a particular color plane it must write to the DotCount-Snap register. This causes all 6 running counter values to be transferred to the DotCount registers in the configuration registers block. The running counter values are reset.

```
// reset if being snapped
if (dot_cnt_snap = = 1) then{
    dot_count[5:0]          = accum_dot_count[5:0]
    accum_dot_count[5:0]    = 0
    }
// update the counts
for (color=0;color < 6;color++) {
    if (accum_dot_count[color] != 0xffff_ffff) {
        // data valid, first dot stream
        data_valid   =   ((phi_llu_ready[0]   = =  1)   AND
```

-continued

```
(llu_phi_avail[0] = = 1))
        if ((data_valid   = = 1)   AND (llu_phi_data[0][color] = =
1)) then
              accum_dot_count[color] ++
        // data valid, second dot stream
        data_valid   =   ((phi_llu_ready[1]   = =   1)   AND
(llu_phi_avail[1] = = 1))
        if ((data_valid = = 1) AND (llu_phi_data[1] [color] = =
1)) then
              accum_dot_count[color] ++
        }
    }
```

32.9.5 Sync Generator

The sync generator logic has two modes of operation, master and slave mode. In master mode (configured by the PhiMode register) it generates the lsyncl_o output based on configured values and control triggers from the PHI controller. In slave mode it de-glitches the incoming lsyncl_i signal, and filters the lsyncl signal with the minimum configured period.

After reset or a pulse on phi_go_pulse the machine returns to the Reset state, regardless of what state it's currently in.

The state machine waits until it's enabled (sync_en==1) by the PHI controller state machine. When enabled it can proceed to the SyncPre or SyncWait depending on whether the state machine is configured in master or slave mode. In master mode it generates the lsyncl pulses, in slave mode it receives and filters the lsyncl pulses from the master sync generator.

On transition to the SyncPre state a counter is loaded with the LsyncPre value, and while in the SyncPre the counter is decremented. When the count is zero the machine proceeds to the SyncLow state loading the counter with LsyncLow value.

The machine waits in the SyncLow state until the counter has decremented to zero. It proceeds to the SyncHigh state pulsing the line_st signal on transition and counts LsyncHigh number of cycles. This indicates to the PHI controller the line start aligned to the lsyncl positive edge. While in LsyncLow state the lsyncl_o output is set to 0 and in SyncHigh the lsyncl_o output is set to 1. When the count is zero and the current line is not the last (last_line==0), the machine returns to the SyncLow state to begin generating a new line sync pulse. The transition pulses the line_fin signal to the PHI controller.

The loop is repeated until the current line is the last (last_line==1), and the machine returns to the Reset state to wait for the next page start.

In slave mode the state machine proceeds to the SyncWait state when enabled. It waits in this state until a lsync_pulse_rise is received from the input de-glitch circuit. When a pulse is detected the machine jumps to the SyncPeriod state and begins counting down the LsyncHigh number of clock cycles before returning to the SyncWait state. Note in slave mode the LsyncHigh specifies the minimum number of pclk cycles between Lsync pulses. On transition from the SyncWait to the SyncPeriod state the line_st signal to the PHI controller is pulsed to indicate the line start. While in the SyncPeriod state if a lsync_pulse_fall is detected the state machine will signal a sync error (via sync_err) to the PHI controller and cause a buffer underrun interrupt.

32.9.5.1 Lsyncl Input De-Glitch

The lsync_i input is considered an asynchronous input to the PHI, and is passed through a synchronizer to reduce the possibility of metastable states occurring before being passed to the de-glitch logic.

The input de-glitch logic rejects input states of duration less than the configured number of clock cycles (lsync_deglitch_cnt), input states of greater duration are reflected on the output, and are negative and positive edge detected to produce the lsync_pulse_fall and lsync_pulse_rise signal to the main generator state machine. The counter logic is given by

```
if ( lsync_i != lsync_i_delay) then
     cnt          = lsync_deglitch_cnt
     output_en   = 0
elsif (cnt = = 0 ) then
     cnt          = cnt
     output_en   = 1
else
     cnt - -
     output_en   = 0
```

32.9.5.2 Line Sync Interrupt Logic

The line sync interrupt logic counts the number of line syncs that occur (either internally or externally generated line syncs) and determines whether to generate an interrupt or not. The number of line syncs it counts before an interrupt is generated is configured by the LineSyncInterrupt register. The interrupt is disabled if LineSyncInterrupt is set to zero.

```
// implement the interrupt counter
if (phi_go_pulse = =1) then
     line_count = 0
elsif (line_st = = 1) AND (line_count = = 0)) then
          line_count = linecount_int
elsif ((line_st = = 1) AND (line_count != 0)) then
          line_count - -
// determine when to pulse the interrupt
if (linesync_int = = 0 ) then // interrupt disabled
     phi_icu_linesync_int = 0;
elsif ((line_st = = 1) AND (line_count = = 1)) then
     phi_icu_linesync_int = 1
```

32.9.6 Fire Generator

The fire generator block creates the signal profile for the phi_frclk signal to the printhead. The frclk is based on configured values and is timed in relation to the fire_st pulse from the PHI controller block. Should the phi_frclk state machine receive a fire_st pulse before it has completed the sequence the machine will restart regardless of its current state.

Alternatively the frclk state machine can be triggered to generate their configured pulse profile by software. A low to high transition on the FireGenSoftTrigger register will cause a pulse on soft_frclk_st triggering the state machine to begin generating the pulse profile. When the state machine has completed its sequence it will clear the FireGenSoftTrigger register bit (via soft_fire_clr signal). The FireGenSoftTrigger register will only be active when the printhead interface is in CPU direct control mode (PrintheadCpuCtrl=1), the fire generator is in software trigger mode (PrintheadCpuCtrlMode[x]=1) and the pin is configured to be output mode (PrintheadCpuDir[x]=1).

The fire generator consists of a state machine for creating the phi_frclk signal. The phi_frclk signal is generated relative to the lsyncl signal.

The machine is reset to the Reset state when phi_go_pulse==1 or the reset is active, regardless of the current state.

The machine waits in the reset state until it receives a fire_st pulse from the PHI controller (or an soft_fire_st from the configuration registers). The controller will generate a fire_st pulse at the beginning of each dot line. On the state transition the cycle counter is loaded with the FrclkPre value and the repeat counter is loaded with the FrclkNum value.

The state machine waits in the FirePre state until the cycle counter is zero, after which it jumps to the FireHigh state and loads the cycle counter with FrclkHigh value. Again the state machine waits until the count is zero and then proceeds to the FireLow state. On transition the cycle counter is loaded with the FireLow value. The state machine waits in the FireLow state while the cycle counter is decremented.

When the cycle counter reaches zero and the repeat_count is non-zero, the repeat_count is decremented, the cycle counter is loaded with the FrclkHigh value and the state machine jumps to the FireHigh state to repeat the phi_frclk generation cycle. The loop is repeated until the repeat_count is zero. In such cases_the state machine goes to the reset state resetting FireGenSoftTrigger (via the soft_fire_clr signal) register on the transition and waits for the next fire_st pulse.

When in the Reset state the fire_rdy signal is active to indicate to the controller that the fire generator is ready.

32.9.7 PHI Controller

The PHI controller is responsible for controlling all functions of the PHI block on a line by line basis. It controls and synchronizes the sync generator, the fire generator, and datapath unit, as well as signalling back to the CPU the PHI status. It also contains a line counter to determine when a full page has completed printing.

The PHI controller state machine is reset to Reset state by a reset or phi_go_pulse==1.

It will remain in reset until the block is enabled by phi_go==1. Once enabled the state machine will jump to the FirstLine state, trigger the transfer of one line of data to the printhead (data_st==1) and the line counter will be initialized to the page length (PageLenLine). Once the line is transferred (data_fin from the datapath unit) the machine will go to PrintStart state and signal the CPU using an interrupt that the PHI is ready to begin printing (phi_icu_print_rdy). The line counter will also be decremented. It will then wait in the PrintStart state until the CPU acknowledges the print ready signal and enables printing by writing to the PrintStart register.

The state machine proceeds to the SyncWait state and waits for a line start condition (line_st==1). The line start condition is different depending on whether the PHI is configured as being in a master or slave SoPEC (the PhiMode register). In either case the sync generator determines the correct line start source and signals the PHI controller via the line_st signal. Once received the machine proceeds to the LineTrans state, with the transition triggering the fire generator to start (fire_st), the datapath unit to start (data_st) and the sync generator to start (sync_st).

While in the LineTrans state the fire, sync and datapath unit will be producing line data. When finished processing a line the datapath unit will assert the line finished (data_fin) signal. If the line counter is not equal to 1 (i.e. not the last line) the state machine will jump back to the SyncWait state and wait for the start condition for the next line. The line counter will be decremented. If the line counter is one then the machine will proceed to the LastLine state.

The LastLine state generates one more line of fire pulses to print the last line held in the shift registers of the printhead. Once complete (fire_fin==1) the state machine returns to the reset state and waits for the next page of data. On page completion the state machine generates a phi_icu_page_finish interrupt to signal to the CPU that the page has completed, the phi_icu_page_finish will also cause the Go register to reset automatically.

While the state machine is in the LineTrans state (or in FirstLine state and the PHI is in slave mode) and waiting for the datapath unit to complete line processing, it is possible (e.g. an excessive PEP stall) that a line finish condition occurs (line_fin==1) but the datapath unit is not ready. In this case an underrun error is generated. The state machine goes to the Underrun state and generates a phi_icu_underrun interrupt to the CPU. The PHI cannot recover from a buffer underrun error, the CPU must reset the PEP blocks and re-start printing. The phi_icu_underrun will also cause the Go register to reset automatically.

32.9.8 CPU IO Control

The CPU IO control block is responsible for providing direct CPU control of the IO pins via the configuration registers. It also accepts the input signals from the printhead and re-synchronizes them to the pclk domain, and debug signals from the RDU and muxes them to output pins. Table contains the direct mapping of configuration registers to printhead IO pins. Direct CPU control is enabled only when PrintheadCpuCtrl is set to one. In normal operation (i.e. PrintheadCpuCtrl==0) the printhead frclk pin is always in output mode (phi_frclk_e=1), the phi_lsyncl will be in output if the SoPEC is the master, i.e. phi_lsyncl_e=phi_mode, and readl will be set high.

The PrintheadCpuCtrlMode register determine whether the frclk pin should be driven by the fire generator logic or direct from the CPU PrintheadCpuOut register.

The pseudocode for the CPU IO control is:

```
if (printhead__cpu__ctrl = = 1) then   // CPU access enabled
     // outputs
     if (PrintHeadCpuCtrlMode[0] = = 1) then                 // fire
generator controlled
          phi__frclk__o            = frclk
     else                                                  // normal
direct CPU control
          phi__frclk__o            = printhead__cpu__out [1]
     phi__ph__data__o[0][1:0]      = printhead__cpu__out[4:3]
     phi__ph__data__o[1][1:0]      = printhead__cpu__out[6:5]
     phi__srclk[1:0]               = printhead__cpu__out[8:7]
     phi__readl                    = printhead__cpu__out [9]
     // direction control
     phi__lsyncl__e                = printhead__cpu__dir[0]
     phi__frclk__e                 = printhead__cpu__dir[1]
     // input assignments
     printhead__cpu__in[0]         = synchronize(phi__lsyncl__i)
     printhead__cpu__in[1]         = synchronize (phi__frclk__i)
else // normal connections
     // outputs
     phi__ph__data__o[0][1:0]       = ph__data[0][1:0]
     phi__ph__data__o[1][1:0]       = ph__data[1][1:0]
     phi__lsyncl__o                 = lsync__o
     phi__readl                     = 1
     phi__srclk[1:0]                = srclk[1:0]
     phi__frclk__o                  = frclk
     // direction control
     phi__frclk__e                  = 1
     phi__lsyncl__e                   = phi__mode      // depends
                                                       on Master
or Slave mode
     // inputs
     lsyncl__i                              = phi__lsync__i // connected
regardless
```

-continued

```
// debug overrides any other connections
if (debug_cntrl[0] = = 1) then
    phi_frclk_o          = debug_data_valid
    phi_frclk_e          = 1
    phi_readl            = pclk
```

The debug signalling is controlled by the RDU block (see Section 11.8 Realtime Debug Unit (RDU)), the 10 control in the PHI muxes debug data onto the PHI pins based on the control signals from the RDU.

32.9.9 Datapath Unit 32.9.10 Dot Order Controller

The dot order controller is responsible for controlling the dot order blocks. It monitors the status of each block and determines the switch over point, at which the connections from odd and even dot streams to printhead channels are swapped.

The machine is reset to the Reset state when phi_go_pulse==1 or the reset is active. The machine will wait until it receives a data_st pulse from the PHI controller before proceeding to the LineStart state. On the transition to the LineStart state it will reset the dot counter in each dot order block via the dot_cnt_rst signal.

While in the LineStart state both dot order blocks are enabled (gen_en==1). The dot order blocks process data until each of them reach their mid point. The mid point of a line is defined by the configured printhead size (i.e. print_head_size). When a dot order block reaches the mid point it immediately stops processing and waits for the remaining dot order block. When both dot order blocks are at the mid point (mid_pt==11) the controller clocks through the LineMid state to allow the pipeline to empty and immediately goes to LineEnd state.

In the LineEnd state the mode_sel is switched and the dot order blocks re-enabled, in this state the dot order blocks are reading data from the opposite LLU dot data stream as in LineStart state. The controller remains in the LineEnd state until both dot order blocks have processed a line i.e. line_fin==11.

On completion of both blocks the controller returns to the Reset state and again awaits the next data_st pulse from the PHI controller. When in Reset state the machine signals the PHI controller that it's ready to begin processing dot data via the dot_order_rdy signal.

The dot order controller selects which dot streams should feed which printhead channels. The order can be changed by configuring the DotOrderMode register. In all cases Channel A and Channel B must be in opposing dot order modes. Table 216 shows the possible modes of operation.

TABLE 216

Mode selection in Dot order controller.

| Channel | Mode_sel | DotOrderMode | Dot transmit order |
|---|---|---|---|
| A | 0 | 0 | Even before Odd (EBO mode), even dot stream feeds Channel A printhead, first half line. |
| | 0 | 1 | Odd before Even (OBE mode), odd dot stream feeds Channel A printhead, first half line. |
| | 1 | 0 | Even before Odd (EBO mode), even dot stream feeds Channel A printhead, second half line. |
| | 1 | 1 | Odd before Even (OBE mode), odd dot stream feeds Channel A printhead, second half line. |
| B | 0 | 0 | Odd before Even (OBE mode), odd dot stream feeds Channel B printhead, second half line |
| | 0 | 1 | Even before Odd (EBO mode), even dot stream feeds Channel B printhead, second half line. |
| | 1 | 0 | Odd before Even (OBE mode), odd dot stream feeds Channel B printhead, first half line. |
| | 1 | 1 | Even before Odd (EBO mode), even dot stream feeds Channel B printhead, first half line. |

32.9.10.1 Dot Order Unit

The dot order control accepts dot data from either dot stream from the LLU and writes the dot data into the dot buffer. It has two modes of operation, odd before even (OBE) and even before odd (EBO). In the OBE mode data from the odd stream dot data is accepted first then even, in EBO mode it's vice versa. The mode is configurable by the DotOrderMode register.

The dot order unit maintains a dot count that is decremented each time a new dot is received from the LLU. The dot order controller resets the dot counter to the print_head_size[15:0] at the start of a new line via the dot_cnt_rst signal. The dot count is compared with the printhead size (print_head_size[15:0] divided by 2) to determine the mid point (mid_Pt) and the line finish point (line_fin) when the dot counter is zero.

The mid point is defined as the half the number of dots in a particular printhead, and is derived from the the print_head_size bus by dividing by 2 and rounding down.

```
// define the mid point
if (dot_cnt[15:0] = = print_head_size[15:1] )then
    mid_pt = 1
else
    mid_pt = 0
```

The dot order unit logic maintains the dot data write pointer. Each time a new dot is written to the dot buffer the write pointer is incremented. The fill level of the dot buffer is determined by comparing the read and write pointers. The fill level is used to determine when to backpressure the LLU (ready signal) due to the dot buffer filling. A suitable threshold value is determined to allow for the full LLU pipeline to empty into the dot buffer.

The dot order stalling control is given by:

```
// determine the ready/avail signal to use, based on mode
select
if (mode_sel       = = 1) then
      dot_active     = llu_phi_avail[0] AND ready
      wr_data        = llu_phi_data[0]
else
      dot_active     = llu_phi_avail[1] AND ready
      wr_data        = llu_phi_data[1]
// update the counters
if (dot_active = = 1) then {
      wr_en = 1
      wr_adr ++
      if (dot_cnt = = 0) then
            dot_cnt = print_head_size
      else
            dot_cnt--
}
```

The dot writer needs to determine when to stall the LLU dot data stream. A number of factors could stall the dot stream in the LLU such as buffer filling, waiting for the mid point, waiting for the line finish or the dot order controller is waiting for the line start condition from the PHI controller.

The stall logic is given by:

```
// determine when to stall the LLU generator
fill_level = wr_adr - rd_adr
if (fill_level > (32 - THRESHOLD ))then   // THRESHOLD is
open value
      ready = 0                       // buffer is close
to full
elsif ( gen_en = = 0) then
      ready = 0                       // stalled by the
datapath controller
else
      ready = 1                       // everything good
no stall
```

32.9.10.2 Data Generator

The data generator block reads data from the dot buffer and feeds dot data to the printhead at a configured rate (set by the PrintheadRate). It also generates the margin zero data and aligns the dot data generation to the synchronization pulse from the PHI controller.

The data generator controller waits in Reset state until it receives a line start pulse from the PHI controller (data_st signal). Once a start pulse is received it proceeds to the SrclkPre state loading a counter with the SrclkPre value. While in this state it decrements the counter. No data is read or output at this stage. When the count is zero the machine proceeds to the DataGen1 state.

On transition it loads the counter with the printhead size (print_head_size). If margining is to be used then the configured print_head_size should be adjusted by the dot margin value i.e. print_head_size=(physical_print_head_size−(dot_margin*2)).

Dot data is transferred to the printhead serializer in dot-pairs, with one dot-pair transferred every 3 pclk cycles. To construct a dot data pair the state machine reads one dot in the DataGen1 state, one dot in the DataGen2 state and waits for one clock cycle in the DataGen3 while the data is transferred to the data serializer. The counter will decrement for every dot data word transferred. The exact data rate is dictated by the dot buffer fill levels and the configured printhead rate (PrintheadRate). When in DataGen3 state the machine determines if it should waits for 3 cycles or transfer another dot pair to the data serializer. The generator determines the rate by comparing the rate counter (rate_cnt) with the configured PrintheadRate value. If the bit selected by the rate_cnt in the print_head_rate bus is one data is transferred, otherwise the 3 cycles are skipped (Wait1, Wait2 and Wait3). If the PrintheadRate is set to all zeros then no data will ever get transferred. The rate counter is decremented (rate_cnt) while in the DataGen2 and Wait2 states. The rate counter is allowed to wrap normally.

The pseudo-code for the rate control DataGen3 (or Wait3) state is given by:

```
// decrement the rate count
rate_cnt --                  // happens in DataGen2, or
Wait2
// determine if data should be read
// first determine if data is available in buffer
if (rd_adr != wr_adr ) then
      if (print_head_rate[rate_cnt] = = 1 ) then
            dot_active = 1
            gate_srclk = 1
            count --
            next_state = DataGen1
            else
                  dot_active = 0
                  gate_srclk = 0
                  next_state = Wait1
      else
            dot_active = 0
            gate_srclk = 0
            next_state = Wait1
```

When the dot counter reaches zero the state machine will jump to the MarginGen1 state if the configured margin value is non-zero, otherwise it will jump directly to the SrclkPost state. On transition to MarginGen1 state it loads the cycle counter with the dot_margin value, and begins to count down. While in the MarginGen1, MarginGen2 and MarginGen3 state machine loop the data generator logic block writes dot data to the printhead but does not read from the dot buffers. It creates zero dot data words for the margin duration. As with normal dot data, it creates one dot in MarginGen1 and MarginGen2 states, then wait a clock cycle to allow the transfer to the data serializer to complete.

When the counter reaches zero the machine jumps to the SrclkPost state, loads the clock counter with the SrclkPost value and decrements. When the count is finished the state machine returns to the Reset and awaits the next start pulse. Should a line sync arrive before the data generators have completed (data_fin signal) the PHI controller will detect a print error and stall the PHI interface.

As a consequence of the data transfer mechanism of dot pair cycles followed by a wait state, the printhead size (print_head_size) and dot margin (dot_margin) must always be even dot values.

32.9.10.3 Data Serializer

The data serializer block converts 12-bit dot data at pclk rates (nominally 160 MHz) to 2-bit data at doclk rates (nominally 320 MHz).

The srclk is only active when data is available for transfer to the printhead, as enabled by the gate_srclk signal. The data rate mechanism in the data generator block will mean that data is not transferred to the printhead on every set of 3 pclk cycles. Both the dot_data and gate_srclk signals are controlled by the data generator block and can only change on a fixed 3 pclk cycle boundary. Data is transferred to the printhead on both edges of srclk (i.e double data rate DDR). Directly after a line sync pulse the mux control logic and the srclk generation logic are reset to a known state (the srclk is set high). Before data can begin transfer to the printhead it must generate a line setup edge on srclk, causing srclk to go low. The line setup edge happens SrclkPre number of pclk cycles after the line sync falling edge (indicated by the sr_init signal from the data generator block).

All data transfers to the printhead will be in groups of 6 2-bit data words, each word clocked on an edge of srclk. For each group srclk will start low and end low.

At the end of a full line of data transfer the srclk must generate a line complete edge to return the srclk to a high state before the next line sync pulse. The data generator block generates a sr_corn signal to indicate that the data transfer to the printhead has completed and that the line complete edge can be inserted. The sr_com signal is generated before the SrClkPost period.

The data serializer block allows easy separation of clock gating and clock to logic structures from the rest of the PHI interface.

The mux logic determines which data bits from the dot_data bus should be selected for output on the ph_data bus to the printhead. The mux selector is initialized by an edge detect on the sr_init signal from the data generator.

```
// determine wrap and init points
if (phi_serial_order = = 1) then
      mux_wrap = 5
      mux_init = 0
else
      mux_wrap = 0
      mux_init = 5
// the mux selector logic
if ((sr_init_edge = = 1)OR( mux_sel = = mux_wrap )) then
      mux_sel = mux_init
elsif ( phi_serial_order = = 1 ) then
      mux_sel--              // decrement order
else
      mux sel++              // increment order
```

The dot data serialization order can be configured by PhiSerialOrder register. If the PhiSerialOrder is zero the order is dot[1:0], then dot[3:2] then dot[5:4]. If the register is one then the order is dot[5:4], dot[3:2], dot[1:0].

The srclk control logic is initialized to 1 when a line_st positive edge is detected. If either sr_com_edge, sr_init_edge or gate_srclk are equal to one srclk is transitioned. srclk is always clocked out to the output pins on the negative edge of doclk to place the clock edge in the centre of the data.

The pseudo code for the control logic is:

```
if (line_st_edge = =1 ) then
      srclk_gen = 1
elsif  ((gate_srclk  = =1)  OR  (sr_init_edge= =1)  OR
(sr_com_edge= =1)) then
      srclk_gen = ~srclk_gen
else
      // hold
```

33 Package and Test

Test Units

33.1 JTAG Interface

A standard JTAG (Joint Test Action Group) Interface is included in SoPEC for Bonding and IO testing purposes. The JTAG port will provide access to all internal BIST (Built In Self Test) structures.

33.2 Scan Test I/O

The SoPEC device will require several test IO's for running scan tests. In general scan in and scan out pins will be multiplexed with functional pins.

33.3 Analog Test Units

33.3.1 USB PHY Testing

The USB phy analog macro, will contain built-in in test structure, which can be access by either the CPU or through the JTAG port.

33.3.2 Embedded PLL Testing

The embedded clock generator PLL will require test access from JTAG port.

34 SoPEC Pinning and Package

34.1 Overview

It is intended that the SoPEC package be a 100 pin LQFP. Any spare pins in the package may be used by increasing the number of available GPIO pins or adding extra power and ground pin. The pin list shows the minimum pin requirement for the SoPEC device.

TABLE 217

SoPEC Pin List (100 LQFP)

| Group | Pin Name | #pins | Dir | Type | Volt | I/O Rate (S/D) | Freq (Mhz) | Description | IO Cell Type | Test Function | Test Macro Function |
|---|---|---|---|---|---|---|---|---|---|---|---|
| Clocks and resets | | | | | | | | | | | |
| Group 1 | Xtalin | 1 | I | | N/A | N/A | 32 | Crystal Input pin | AINSA_PM_A | None | |
| | Xtalout | 1 | O | | N/A | N/A | 32 | Crystal output pin | ABNST_PM_A | None | |
| Group 2 | reset_n | 1 | I | LVTTL | 3.3 v | s | 10 | Asynchronous active low reset | IT33LTPUT_PM_A | LT (leakage test) | |
| PrintHead Interface | | | | | | | | | | | |
| Group 3 | phead_data | 8 | O | LVDS | 1.5 v | d | 160 | Print head data | OLVDS15_PM_A | None | |
| | Srclk | 4 | O | LVDS | 1.5 v | d | 160 | Print head clock | OLVDS15_PM_A | None | |

TABLE 217-continued

SoPEC Pin List (100 LQFP)

| Group | Pin Name | #pins | Dir | Type | Volt | I/O Rate (S/D) | Freq (Mhz) | Description | IO Cell Type | Test Function | Test Macro Function |
|---|---|---|---|---|---|---|---|---|---|---|---|
| Group 4 | Readl | 1 | O | LVTTL | 3.3 v | s | 160 | Common Print head mode control | BT3365T_PM_A | A_Clock | |
| | Frclk | 1 | I/O | LVTTL | 3.3 v | s | 160 | Common Fire pattern shift clock, needs to toggle once per fire cycle | BT3365T_PM_A | B_Clock | |
| | phi_spare | 1 | I/O | LVTTL | 3.3 v | s | 160 | PHI spare pin (old profile pin) | BT3365T_PM_A | C_Clock1 | |
| | Lsyncl | 1 | I/O | LVTTL | 3.3 v | s | 160 | Line Sync output from Master to Slaves | BT3365T_PM_A | C_Clock2 | |
| USB Connections | | | | | | | | | | | |
| Group 5 | Usb_hostd | 2 | I/O | Differ-ential | 3.3 v | s | 12 | USB differential data for host | BUSB2_PM_A | None | |
| | Usb_devd | 2 | I/O | Differ-ential | 3.3 v | s | 12 | USB differential data for device | BUSB2_PM_A | None | |
| Group 6 | usbd_vbus_sense | 1 | I | LVTTL | 3.3 v | s | 10 | USB device VBUS power sense | BT3365T_PM_C | 1 scan out | |
| | usbd_pull_up_en | 1 | O | LVTTL | 3.3 v | s | 10 | USB device termination enable | BT3365T_PM_C | 1 scan out | |
| JTAG | | | | | | | | | | | |
| Group 7 | Tdo | 1 | O | LVTTL | 3.3 v | s | 10 | JTAG Test data out port | BT3365T_PM_A | C_Clock3 | |
| | Tms | 1 | I | LVTTL | 3.3 v | s | 10 | JTAG Test mode select | IT33RIT_PM_A | RI | |
| | Tdi | 1 | I | LVTTL | 3.3 v | s | 10 | JTAG Test data in port | IT33D1PUT_PM_A | DI1 | |
| | Tck | 1 | I | LVTTL | 3.3 v | s | 10 | JTAG Test access port clock | IT33D2PUT_PM_A | DI2 | |
| General Purpose IO | | | | | | | | | | | |
| Group 8 | Gpio [3:0] | 4 | I/O | LVTTL | 3.3 v | s | 32 | ISI interface pins/GPIO | BT3335PUT_PM_B | 4 Scanin | |
| Group 9 | Gpio [7:4] | 4 | I/O | High Drive LVTTL | 3.3 v | s | 32 | LED driver pins/ general purpose Input/Output | BT3365T_PM_C | 4 Scanin | PCNT PROGSROM OSC |
| Group 10 | Gpio [19:8] | 12 | I/O | LVTTL | 3.3 v | s | 32 | General purpose Input/Output | BT3365PUT_PM_B | 2 Scanin 10 Scanout | DIAGOUT (aka MRSTR0) |
| Group 11 | Gpio [22:20] | 3 | I/O | LVTTL | 3.3 v | s | 32 | General purpose Input/Output | BT3365PUT_PM_B | CE0_Scan TESTM3 TSTN1 | |
| Group 12 | Gpio [31:23] | 10 | I/O | LVTTL | 3.3 v | s | 32 | Functional Spare IOs required for scan test | BT3365T_PM_C | 6 Scanin 4 scanout | |
| Analog Power IO | | | | | | | | | | | |
| Group 13 | agnd | 1 | I | Power | N/A | N/A | N/A | PLL analog gnd | AINSD3_PM_A | None | |
| | avdd | 1 | I | Power | N/A | N/A | N/A | PLL analog vdd | AINSD3_PM_A | None | |

TABLE 217-continued

SoPEC Pin List (100 LQFP)

| Group | Pin Name | #pins | Dir | Type | Volt | I/O Rate (S/D) | Freq (Mhz) | Description | IO Cell Type | Test Function | Test Macro Function |
|---|---|---|---|---|---|---|---|---|---|---|---|
| | agnd | 1 | I | Power | N/A | N/A | N/A | Oscillator analog gnd | AINSD_PM_A | None | |
| | avdd | 1 | I | Power | N/A | N/A | N/A | Oscillator analog vdd | AINSD_PM_A | None | |
| Test Only Pin | | | | | | | | | | | |
| Group 14 | TE | 1 | I | CMOS | 1.5 v | N/A | N/A | Test Enable | IC15TEPDT_PM_A | Test only | |
| | VPP | 1 | I | CMOS | 1.5 v | N/A | N/A | Fat Wire Analog Receiver/Driver for Embedded DRAM Analog Inputs | DRAMVPP_PM | Test only | |
| | VWP | 1 | I | CMOS | 1.5 v | N/A | N/A | Fat Wire Analog Receiver/Driver for Embedded DRAM Analog Inputs | DRAMVWP_PM | Test only | |
| | VREFX | 1 | I | CMOS | 1.5 v | N/A | N/A | Fat Wire Analog Receiver/Driver for Embedded DRAM Analog Inputs | DRAMVREFX_PM | Test only | |
| | DLT | 1 | I | CMOS | 1.5 v | N/A | N/A | DRAM Iddq Test | IC15DLTPUT_PM | Test only | |
| | MC | 1 | I | CMOS | 1.5 v | N/A | N/A | IO Mode Control | IC15MCT_PM_A | Test only | |
| | DRAM_EN | 1 | I | CMOS | 1.5 v | N/A | N/A | DRAM Enable(EN) | IC15LTPUT_PM_A | Test only | |
| Total Signal Pins | | 73 | Functional pin count is 62 | | | | | | Test IO count 51 | | |
| Power Only Pins | | | | | | | | | | | |
| Group 15 | Gnd | 8 | I | Power | N/A | N/A | N/A | gnd | GND_PM_A | None | |
| | Vdd | 4 | I | Power | N/A | N/A | N/A | vdd 1.5 v, core voltage | VDD150_PM_A | None | |
| | vdd330 | 4 | I | Power | N/A | N/A | N/A | vdd 3.3 v, IO voltage | VDD330_PM_A | None | |
| Group 15 | vdd/gnd | 11 | I | Power | N/A | N/A | N/A | Power pin fill, GND.Vdd1.5, Vdd3.3 as required | GND_PM_A/ VDD150_PM_A/ VDD330_PM_A | None | |
| Total Pins | | 100 | | | | | | | | | |

Please note that pages 549 to 554 are intentionally missing.

Bilithic Printheads

1 Background

Silverbrook's bilithic Memjet™ printheads are the target printheads for printing systems which will be controlled by SoPEC and MoPEC devices.

This document presents the format and structure of these printheads, and describes the their possible arrangements in the target systems. It also defines a set of terms used to differentiate between the types of printheads and the systems which use them.

Bilithic Printhead Configurations

2 Definitions

This document presents terminology and definitions used to describe the bilithic printhead systems. These terms and definitions are as follows:

Printhead Type—There are 3 parameters which define the type of printhead used in a system:

- Direction of the data flow through the printhead (clockwise or anti-clockwise, with the printhead shooting ink down onto the page).
- Location of the left-most dot (upper row or lower row, with respect to $V_+$,).
- Printhead footprint (type A or type B, characterized by the data pin being on the left or the right of $V_+$, where $V_+$ is at the top of the printhead).
- Printhead Arrangement—Even though there are 8 printhead types, each arrangement has to use a specific pairing of printheads, as discussed in Section 3. This gives 4 pairs of printheads. However, because the paper can flow in either direction with respect to the printheads, there are a total of eight possible arrangements, e.g. Arrangement 1 has a Type 0 printhead on the left with respect to the paper flow, and a Type 1 printhead on the right. Arrangement 2 uses the same printhead pair as Arrangement 1, but the paper flows in the opposite direction.
- Color 0 is always the first color plane encountered by the paper.
- Dot 0 is defined as the nozzle which can print a dot in the left-most side of the page.
- The Even Plane of a color corresponds to the row of nozzles that prints dot 0.

Note that in all of the relevant drawings, printheads should be interpreted as shooting ink down onto the page.

Figure 295:
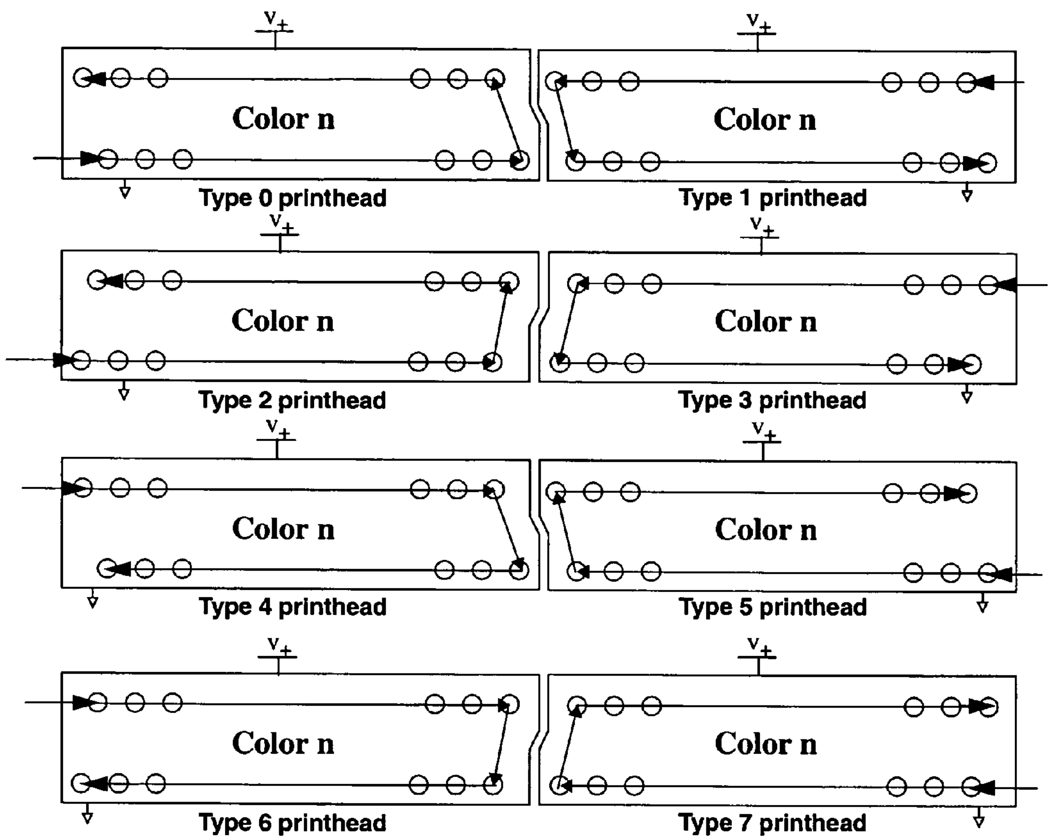
FIG. 295 shows printhead types 0 to 7

FIG. 295 shows the 8 different possible printhead types. Type 0 is identical to the Right Printhead presented in FIG. 297 in [1], and Type 1 is the same as the Left Printhead as defined in [1].

While the printheads shown in FIG. 295 look to be of equal width (having the same number of nozzles) it is important to remember that in a typical system, a pair of unequal sized printheads may be used.

2.1 Combining Bilithic Printheads

Figure 296:
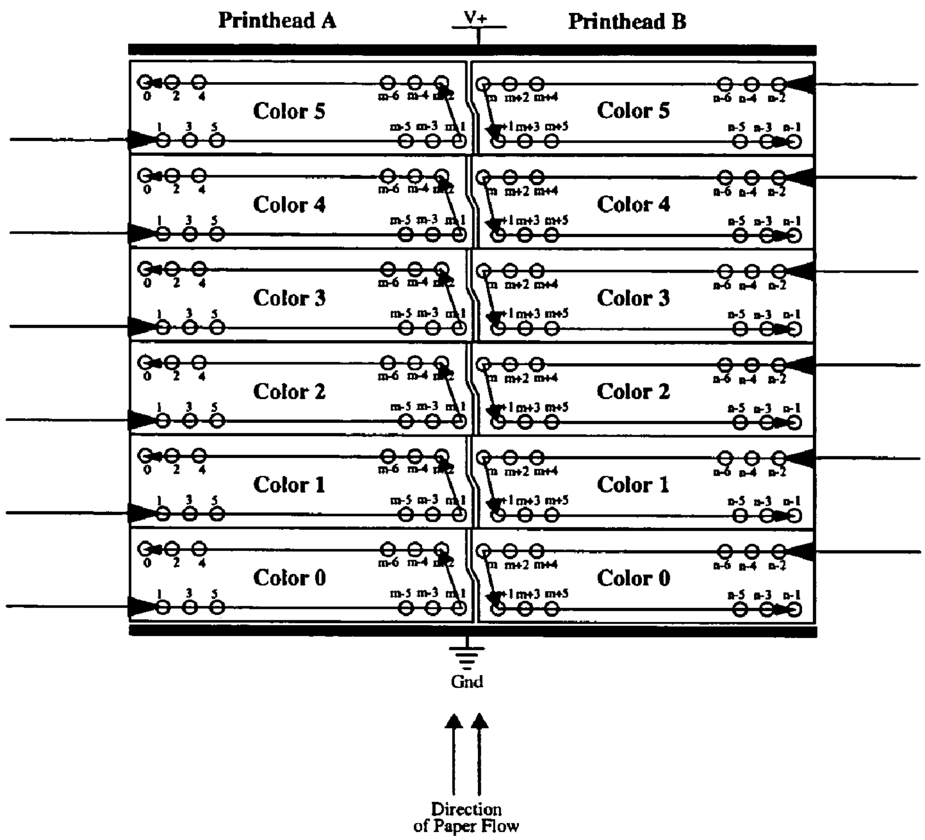
FIG. 296 shows an ideal join between two dilithic printhead segments
Figure 297:
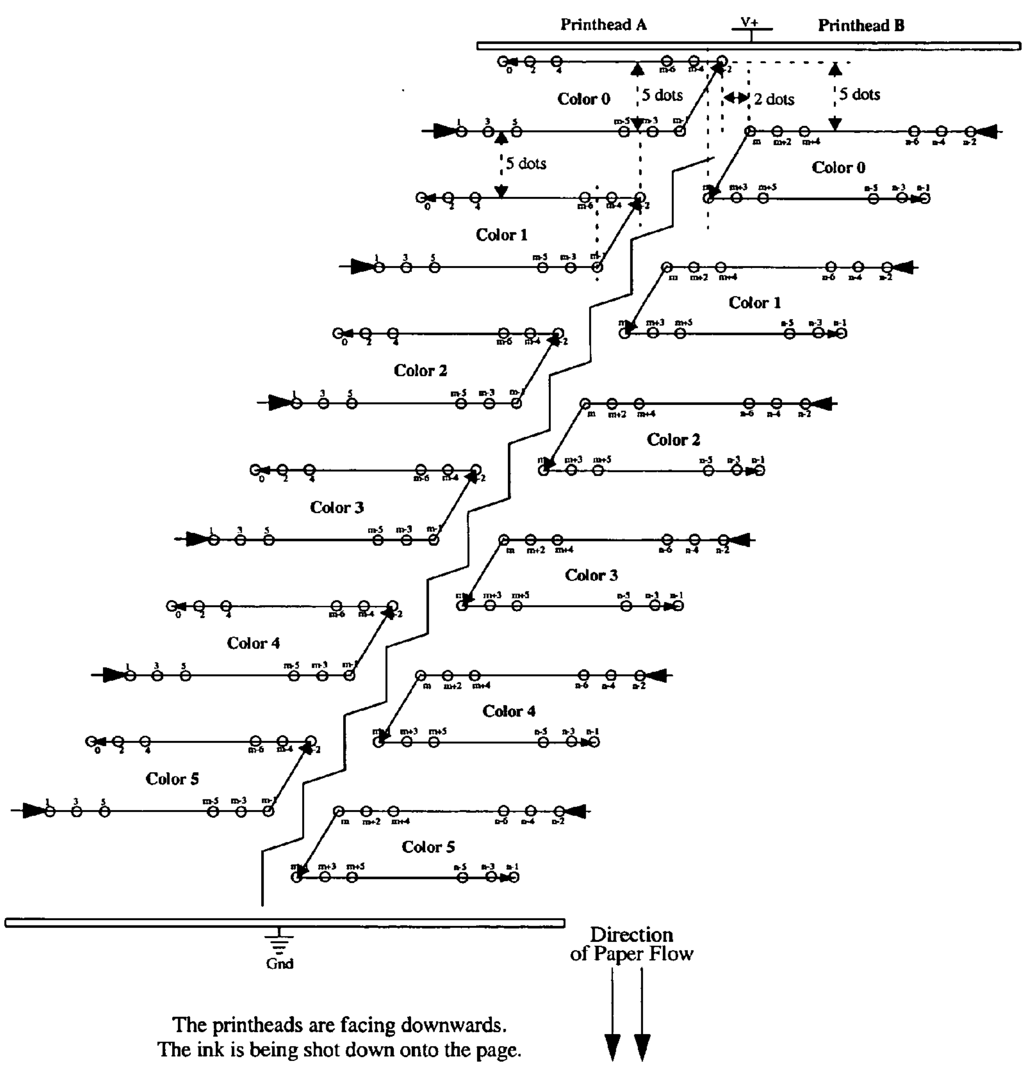
FIG. 297 shows an example of a join between two bilithic printhead segments

Although the printheads can be physically joined in the manner shown in FIG. 296, it is preferable to provide an arrangment that allows greater spacing between the 2 printheads will be required for two main reasons:

- inaccuracies in the backetch
- cheaper manufacturing cost due to decreasing the tolerance requirements in sealing the ink reservoirs behind the printhead Failing to account for these inaccuracies and tolerances can lead to misalignment of the nozzle rows both vertically and horizontally, as shown in FIG. 297.

An even row of color n on printhead A may be vertically misaligned from the even row of color n on printhead B by some number of dots e.g. in FIG. 297 this is shown to be 5 dots. And there can also be horizontal misalignment, in that the even row of color n printhead A is not necessarily aligned with the even row of color n+1 on printhead A, e.g. in FIG. 297 this horizontal misalignment is 6 dots.

The resultant conceptual printhead definition, shown in FIG. 297 has properties that are appropriately parameterized in SoPEC and MoPEC to cater for this class of printheads.

Figure 298:
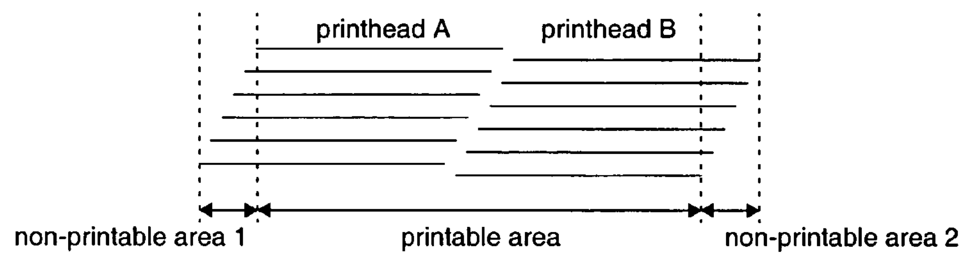
FIG. 298 shows printable vs non-printable area under new definition (looking at colors as if 1 row only)

The preferred printheads can be characterized by the following features:

- All nozzle rows are the same length (although may be horizontally displaced some number of dots even within a color on a single printhead)
- The nozzles for color n printhead A may not be printing on the same line of the page as the nozzles for color n printhead B. In the example shown in FIG. 297, there is a 5 dot displacement between adjacent rows of the printheads.
- The exact shape of the join is an arbitrary shape although is most likely to be sloping (if sloping, it could be sloping either direction)
- The maximum slope is 2 dots per row of nozzles
- Although shift registers are provided in the printhead at the 2 sides of the joined printhead, they do not drive nozzles—this means the printable area is less than the actual shift registers, as highlighted by FIG. 298.

2.2 Printhead Arrangements

| Printhead Arrangement | Printhead on left side, with respect to the flow of paper | Printhead on right side, with respect to the flow of paper |
|---|---|---|
| Arrangement 1 | Type 0 | Type 1 |
| Arrangement 2 | Type 1 | Type 0 |
| Arrangement 3 | Type 2 | Type 3 |
| Arrangement 4 | Type 3 | Type 2 |
| Arrangement 5 | Type 4 | Type 5 |
| Arrangement 6 | Type 5 | Type 4 |
| Arrangement 7 | Type 6 | Type 7 |
| Arrangement 8 | Type 7 | Type 6 |

3 Bilithic Printhead Systems

When using the bilithic printheads, the position of the power/gnd bars coupled with the physical footprint of the printheads mean that we must use a specific pairing of printheads together for printing on the same side of an A4 (or wider) page, e.g. we must always use a Type 0 printhead with a Type 1 printhead etc.

While a given printing system can use any one of the eight possible arrangements of printheads, this document only presents two of them, Arrangement 1 and Arrangement 2, for purposes of illustration. These two arrangements are discussed in subsequent sections of this document. However, the other 6 possibilities also need to be considered.

The main difference between the two printhead arrangements discussed in this document is the direction of the paper flow. Because of this, the dot data has to be loaded differently in Arrangement 1 compared to Arrangement 2, in order to render the page correctly.

3.1 EXAMPLE 1

Printhead Arrangement 1

Figure 299:
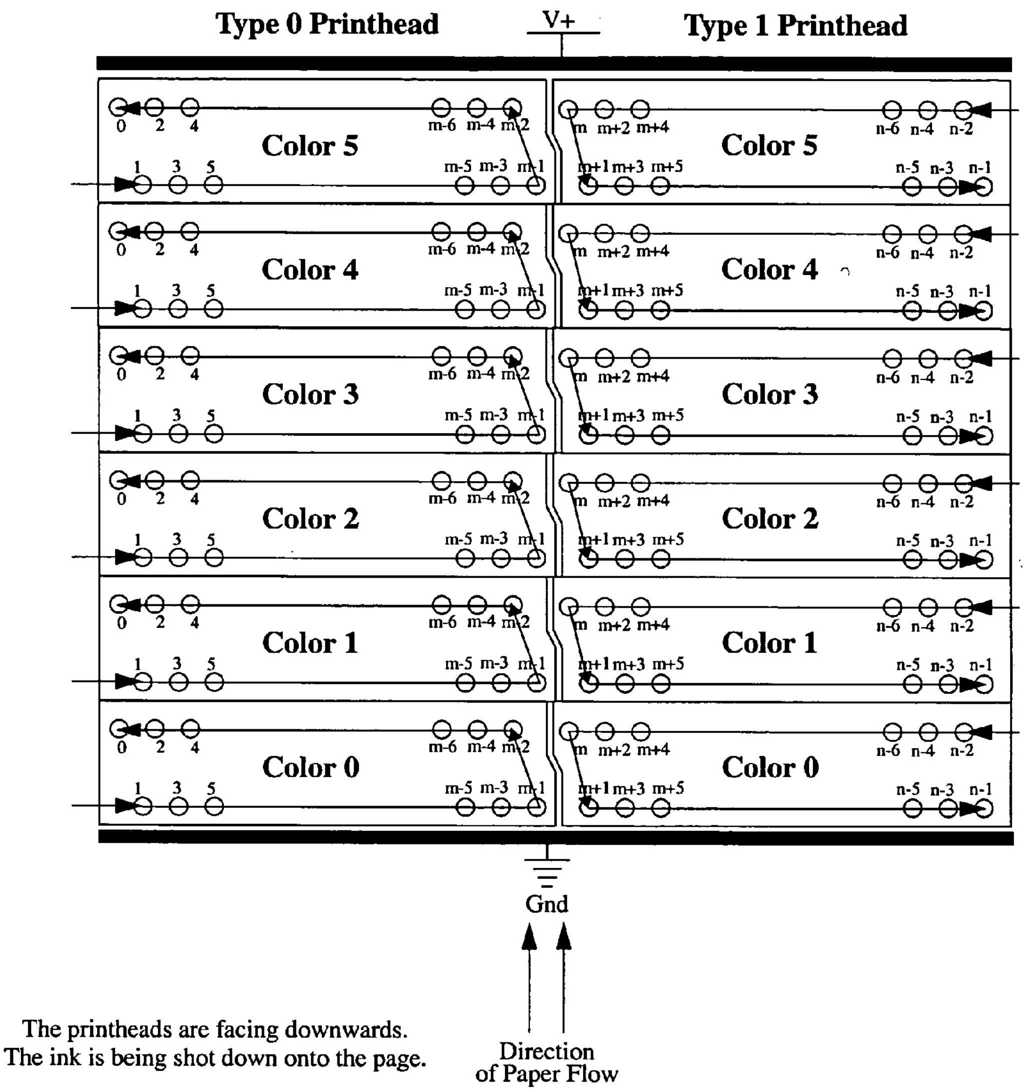
FIG. 299 shows identification of printhead nozzles and shift-register sequences for printheads in arrangement 1

FIG. 299 shows an Arrangement 1 printing setup, where the bilithic printheads are arranged as follows:

- The Type 0 printhead is on the left with respect to the direction of the paper flow.
- The Type 1 printhead is on the right.

Table 219 lists the order in which the dot data needs to be loaded into the above printhead system, to ensure color 0-dot 0 appears on the left side of the printed page.

TABLE 219

Order in which the even and odd dots are loaded for printhead Arrangement 1

| Dot Sense | Type 0 printhead when on the left | Type 1 printhead when on the right |
|---|---|---|
| Odd | Loaded second in descending order. | Loaded first in descending order. |
| Even | Loaded first in ascending order. | Loaded second in ascending order. |

Figure 300:
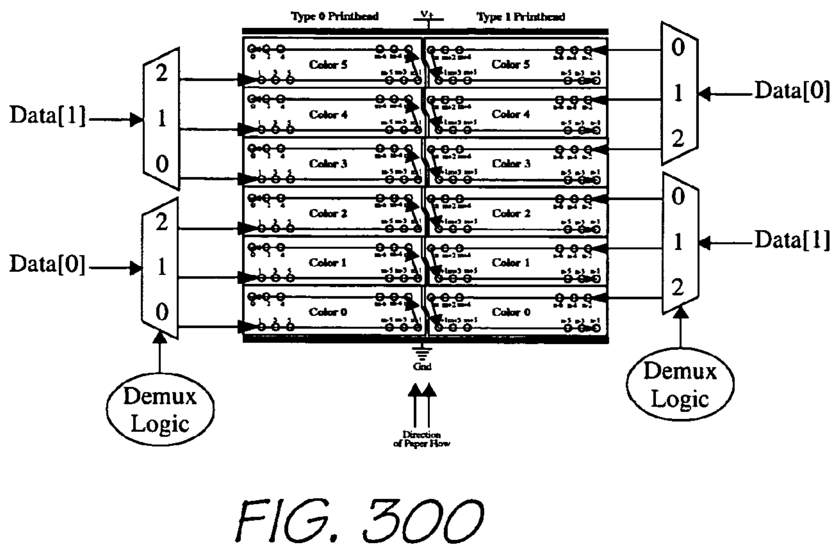
FIG. 300 shows demultiplexing of data within the printheads in arrangement 1

FIG. 300 shows how the dot data is demultiplexed within the printheads.

Figure 301:
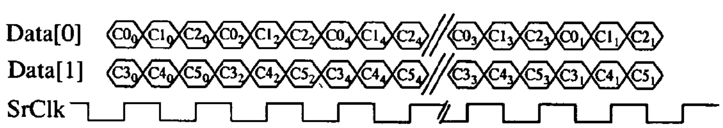
FIG. 301 shows double data rate signalling for a type 0 printhead in arrangement 1
Figure 302:
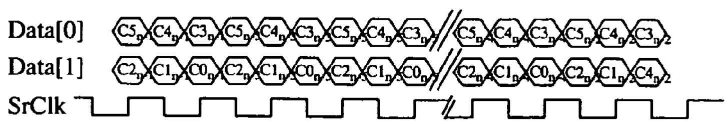
FIG. 302 shows double data rate signalling for a type 1 printhead in arrangement 1

FIG. 301 and FIG. 302 show the way in which the dot data needs to be loaded into the printheads in Arrangement 1, to ensure that color 0-dot 0 appears on the left side of the printed page. Note that no data is transferred to the printheads on the first and last edges of SrClk.

3.2 EXAMPLE 2

Printhead Arrangement 2

Figure 303:
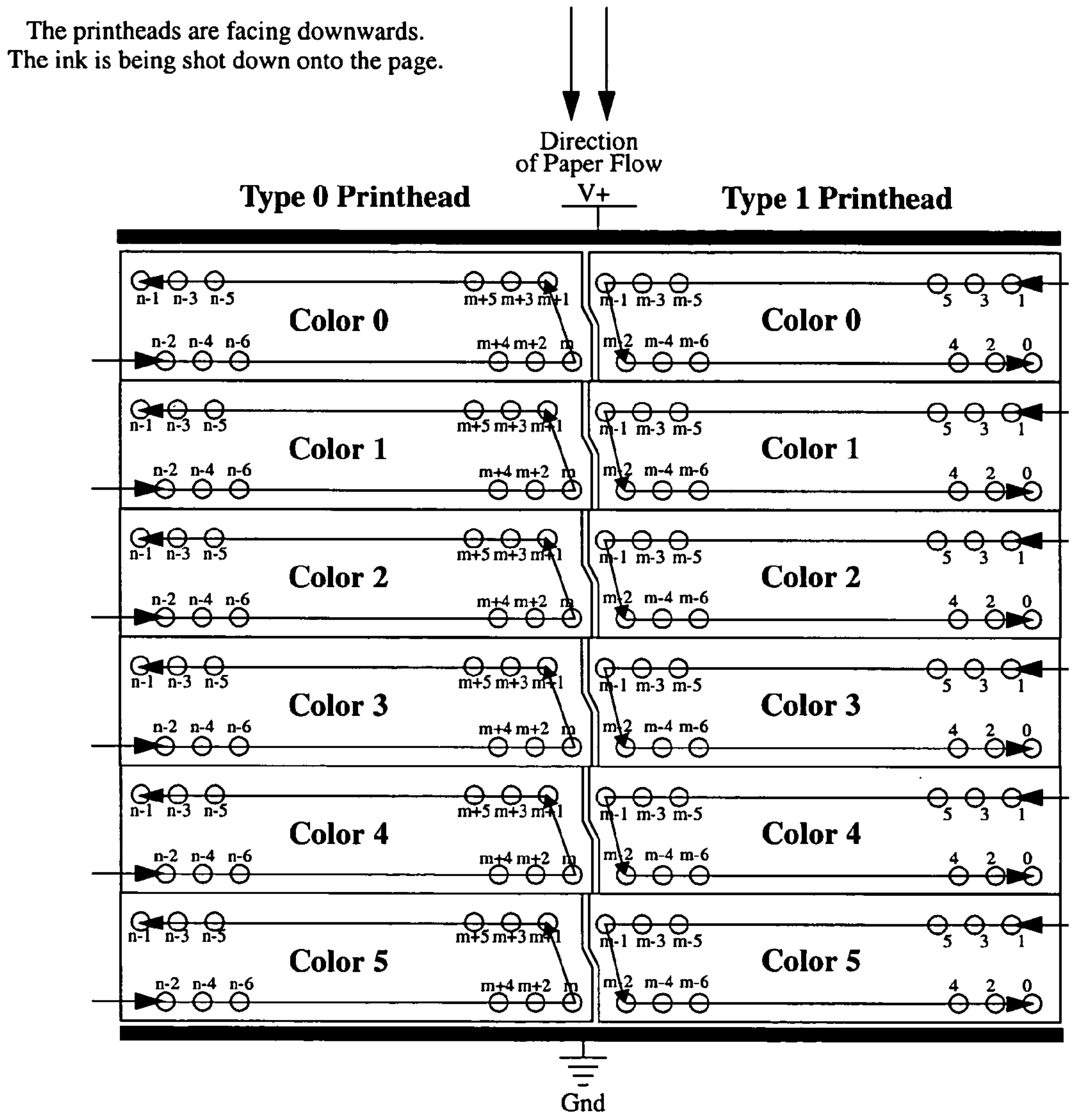
FIG. 303 shows identification of printheads nozzles and shift-register sequences for printheads in arrangement 2

FIG. 303 shows an Arrangement 2 printing setup, where the bilithic printheads are arranged as follows:

The Type 1 printhead is on the left with respect to the direction of the paper flow.

The Type 0 printhead is on the right.

Table 220 lists the order in which the dot data needs to be loaded into the above printhead system, to ensure color 0-dot 0 appears on the left side of the printed page.

TABLE 220

Order in which the even and odd dots are loaded for printhead Arrangement 2

| Dot Sense | Type 0 printhead when on the right | Type 1 printhead when on the left |
|---|---|---|
| Odd | Loaded first in descending order. | Loaded second in descending order. |
| Even | Loaded second in ascending order. | Loaded first in ascending order. |

Figure 304:
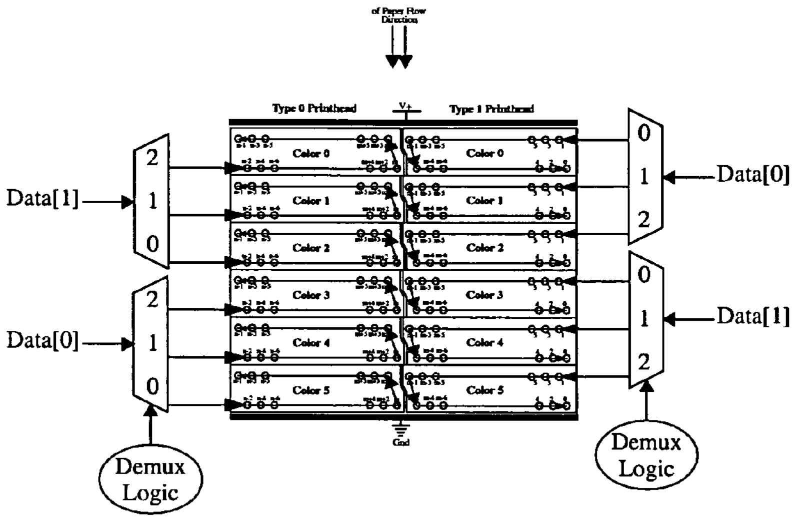
FIG. 304 shows demultiplexing of data within the printheads in arrangement 2

FIG. 304 shows how the dot data is demultiplexed within the printheads.

Figure 305:
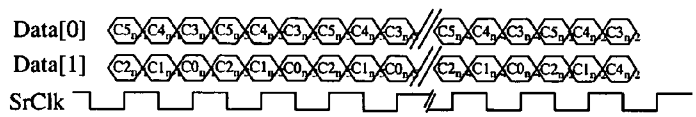
FIG. 305 shows double data rate signalling for a type 0 printhead in arrangement 2
Figure 306:
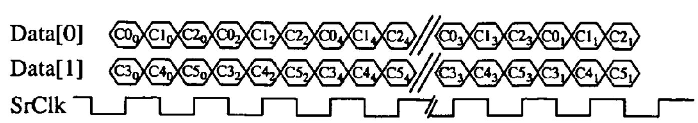
FIG. 306 shows double data rate signalling for a type 1 printhead in arrangement 2

FIG. 305 and FIG. 306 show the way in which the dot data needs to be loaded into the printheads in Arrangement 2, to ensure that color 0-dot 0 appears on the left side of the printed page.

Note that no data is transferred to the printheads on the first and last edges of SrClk.

4 Conclusions

Comparing the signalling diagrams for Arrangement 1 with those shown for Arrangement 2, it can be seen that the color/dot sequence output for a printhead type in Arrangement 1 is the reverse of the sequence for same printhead in Arrangement 2 in terms of the order in which the color plane data is output, as well as whether even or odd data is output first. However, the order within a color plane remains the same, i.e. odd descending, even ascending.

Figure 307:
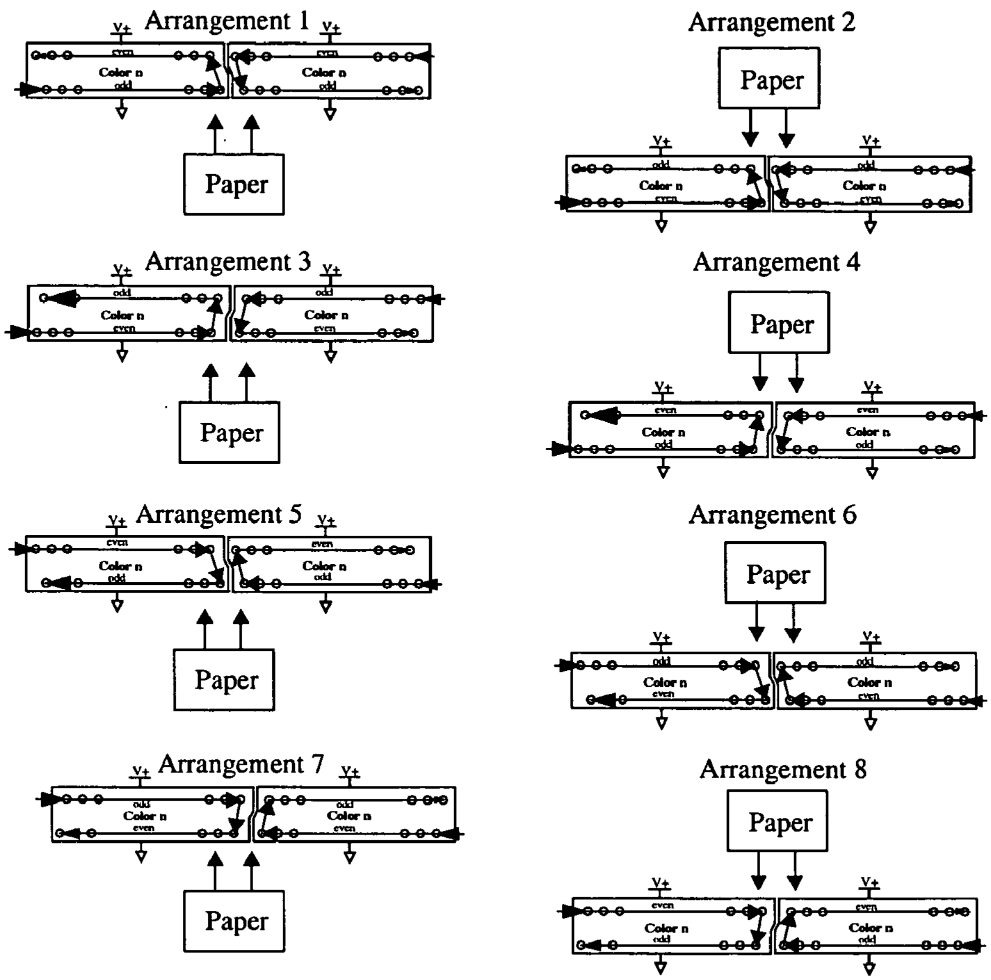
FIG. 307 shows all 8 printhead arrangements
Figure 308:
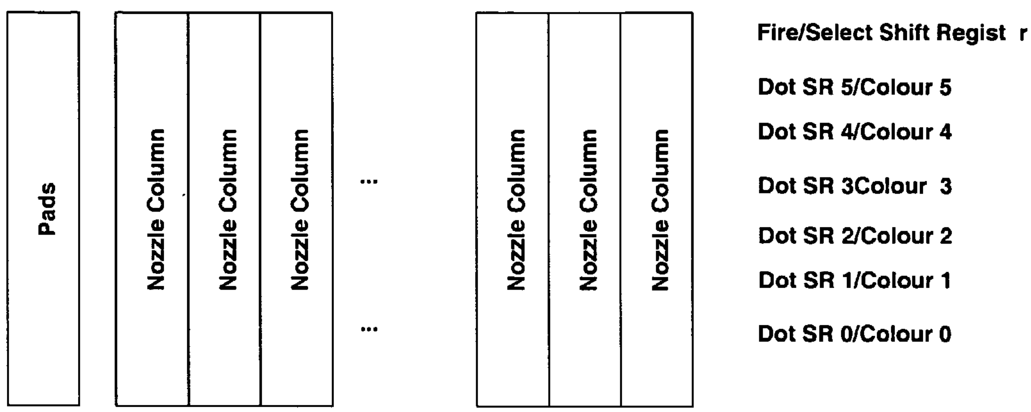
FIG. 308 shows a printhead structure
Figure 309:
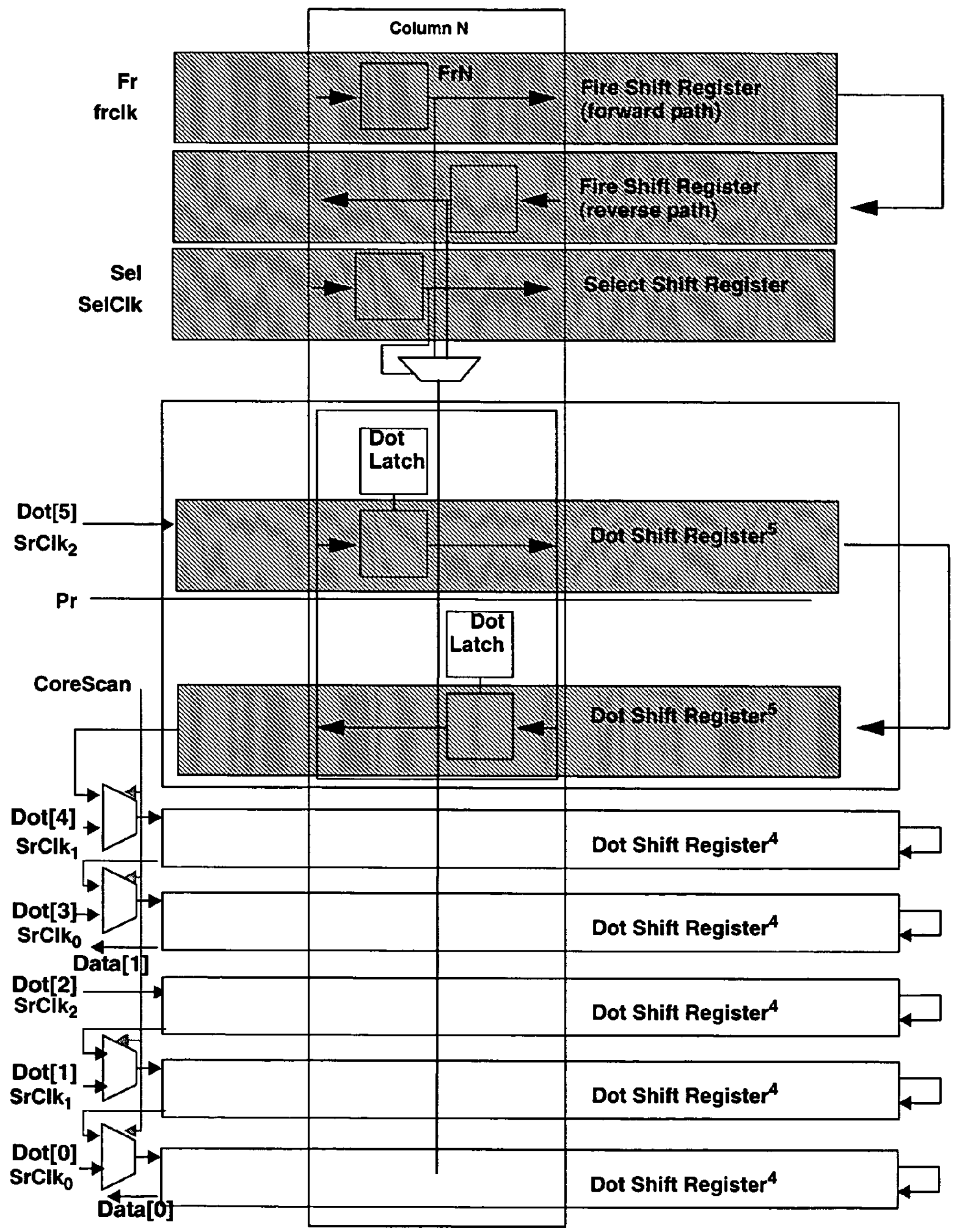
FIG. 309 shows a column Structure
Figure 310:
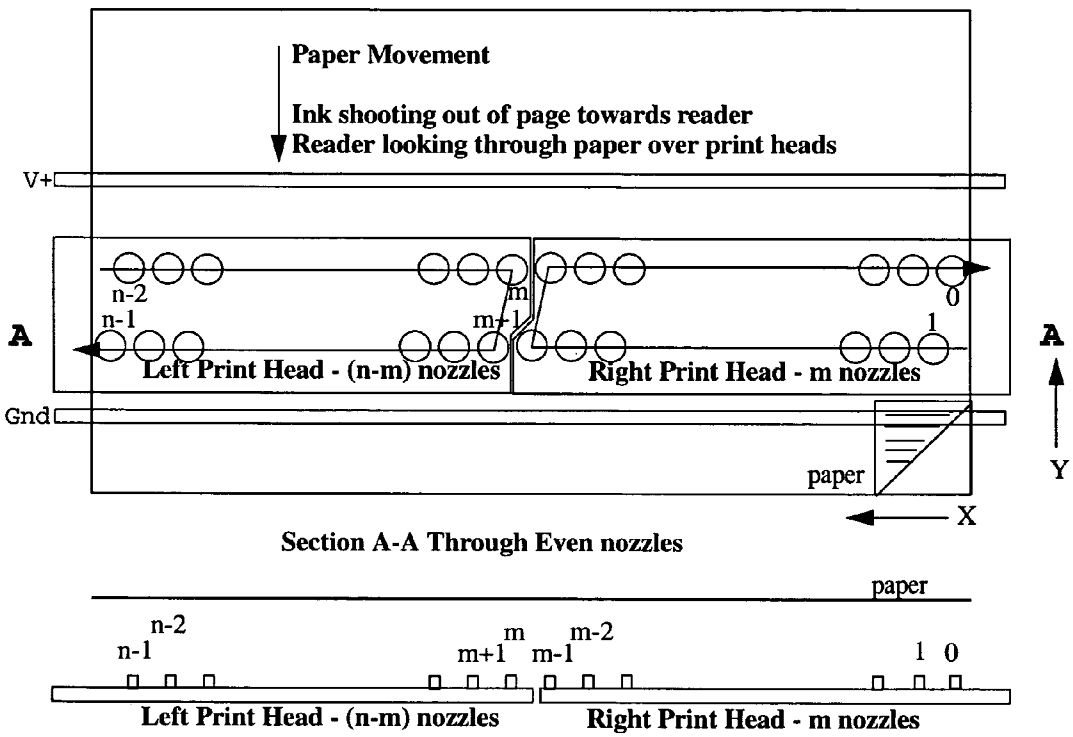
FIG. 310 shows a printhead dot shift register dot mapping to page

From FIG. 307 and Table 221, it can be seen that the plane which has to be loaded first (i.e. even or odd) depends on the arrangement. Also, the order in which the dots have to be loaded (e.g. even ascending or descending etc.) is dependent on the arrangement.

As well as having a mechanism to cope with the shape of the join between the printheads, as discussed in Section 2.1, if the device controlling the printheads can re-order the bits according to the following criteria, then it should be able to operate in all the possible printhead arrangements:

Be able to output the even or odd plane first.

Be able to output even and odd planes in either ascending or descending order, independently.

Be able to reverse the sequence in which the color planes of a single dot are output to the printhead.

TABLE 221

Order in which even and odd dots and planes are loaded into the various printhead arrangements

| Printhead Arrangement | Left side of printedpage | Right side of printed page |
|---|---|---|
| Arrangement 1 | Even ascending loaded first | Odd descending loaded first |
| | Odd descending loaded second | Even ascending loaded second |
| Arrangement 2 | Odd descending loaded first | Even ascending loaded first |
| | Even ascending loaded second | Odd descending loaded second |
| Arrangement 3 | Odd ascending loaded first | Even descending loaded first |
| | Even descending loaded second | Odd ascending loaded second |
| Arrangement 4 | Even descending loaded first | Odd ascending loaded first |
| | Odd ascending loaded second | Even descending loaded second |
| Arrangement 5 | Odd ascending loaded first | Even descending loaded first |
| | Even descending loaded second | Odd ascending loaded second |
| Arrangement 6 | Even descending loaded first | Odd ascending loaded first |
| | Odd ascending loaded second | Even descending loaded second |
| Arrangement 7 | Even ascending loaded first | Odd descending loaded first |
| | Odd descending loaded second | Even ascending loaded second |
| Arrangement 8 | Odd descending loaded first | Even ascending loaded first |
| | Even ascending loaded second | Odd descending loaded second |

CMOS Support on Bilithic Printhead

1 Basic Requirements

To create a two part printhead, of A4/Letter portrait width to print a page in 2 seconds. Matching Left/Right chips can be of different lengths to make up this length facilitating increased wafer usage. the left and right chips are to be imaged on an 8 inch wafer by "Stitching" reticle images.

The memjet nozzles have a horizontal pitch of 32 um, two rows of nozzles are used for a single colour. These rows have a horizontal offset of 16 um. This gives an effective dot pitch of 16 um, or 62.5 dots per mm, or 1587.5 dots per inch, close enough to market as 1600 dpi.

The first nozzle of the right chip should have a 32 um horizontal offset from the final nozzle of the left chip for the same color row. There is no ink nozzle overlap (of the same colour) scheme employed.

1.1 Power Supply

Vdd/Vpos and Ground supply is made through 30 um wide pads along the length of the chip using conductive adhesive to bus bar beside the chips. Vdd/Vpos is 3.3 Volts. (12V was considered for Vpos but routing of CMOS Vdd at 3.3V would be a problem over the length of the chips, but this will be revisited).

1.2 MEMS Cells

The preferred memjet device requires 180 nJ of energy to fire, with a pulse of current for 1 usec. Assuming 95% efficiency, this requires a 55 ohm actuator drawing 57.4 mA during this pulse.

1.2.1 Issue!!!

For 1 pages per 2 second, or ~300 mm*62.5 (dots/mm)/2 sec~=10 kHz or 100 usec per line. With 1 usec fire pulse cycle, every 100th nozzle needs to fire at the same time. We have 13824 nozzles across the page, so we fire 138 nozzles at a time.

1.2.2 64 um Unit Cell Height

This cell would have 4 line spacing between the odd and even dots, and 8 line spacing between adjacent colours.

1.2.3 80 um Unit Cell Height

This cell would have 5 line spacing between the odd and even dots, and 10 line spacing between adjacent colours.

1.3 Versions 1.3.1 6 Colour 1600 dpi with 64 um Unit Cell

Left and Right ChIP.

1.3.2 6 Colour 1600 dpi with 80 um Unit Cell

Left and Right ChIP.

1.3.3 4 Colour 800 dpi with 80 um Unit Cell

For camera application. Single nozzle row per colour.

1.4 Air Supply

Air must be supplied to the MEMS region through holes in the chip.

2 Head Sizes

The combined heads have 13824 nozzles per colour totalling 221.184 mm of print area. Enough to provide full breadth for A4 (210 mm) and Letter (8.5 inch or 215.9 mm).

TABLE 1

Head Combinations

| Left Head | | Right Head | |
|---|---|---|---|
| Stitch Parts | Nozzles per Colour | Stitch Parts | Nozzles per Colour |
| 8 | 11160 | 2 | 2664 |
| 7 | 9744 | 3 | 4080 |
| 6 | 8328 | 4 | 5496 |
| 5 | 6912 | 5 | 6912 |
| 4 | 5496 | 6 | 8328 |
| 3 | 4080 | 7 | 9744 |
| 2 | 2664 | 8 | 11160 |

Nozzles per Colour is calculated as ((“Stitch Parts” −1)*118+104)*12. Nozzles per row is half this value. Most likely the 8:2 head set will not be manufactured. The preferred wafer layout, manages to avoid this set, without any loses.

3 Interface

Each print head has the same I/O signals (but the Left and Right versions might have a different pin out).

TABLE 2

I/O pins

| Name | I/O | Function | Common | Max Speed (MHz) |
|---|---|---|---|---|
| Data[0–1] | I | Dot data for colours 0–5, using Differential Signalling (DataL the complementary signal), colours[0–2] on Data[0], colour[3–5] on Data[1] | No | 320 |
| DataL[0–1] | I | complementary signal of Data[0–1] | | |
| SrClk | I | Dot data shift clock using Differential Signalling (SrClkL the complementary signal) | No[1] | 320 |
| SrClkL | I | complementary signal of SrClk | | |
| ReadL | I | FrClk, Pr, LSyncL output mode if signal mode bit is set | Yes | 1 |
| FrClk | I | Fire pattern shift clock | Yes | 1 |
| | O | nozzle test result (mode = 0b001), LsyncL = 0 CMOS testing (mode = 0b111), LsyncL = 1 | Yes[2] | |
| Pr | I | Pulse Profile for all colours | Yes | 1[3] |
| | O | Temperature Output (mode = 0b010), LsyncL = 0 CMOS testing (mode = 0b111), LsyncL = 1 | Yes[b] | |
| LsyncL | I | 0 - Capture dot data for next print line | Yes | 0.1[4] |
| | O | CMOS testing (mode = 0b111), LsyncL = 1 | Yes[b] | |

Pins marked as common can be controlled by the same signal from the controller (SOPEC).

[1]Functionally could be common, but for timing/electrical reasons should run point to point.

[2]Can be shared if one side has mode = 0b000

[3]1 MHz cycle, but the resolution of the mark/space ratio may require 50 ns.

[4]10 kHz cycle, with minimum low pulse of 10 ns (no maximum).

3.1 Dot Firing

To fire a nozzle, three signals are needed. A dot data, a fire signal, and a profile signal. When all signals are high, the nozzle will fire.

The dot data is provide to the chip through a dot shift register with input Data[x], and clocked into the chip with SrClk. The dot data is multiplex on to the Data signals, as Dot[0-2] on Data[0], and Dot[3-5]on Data[2]. After the dots are shifted into the dot shift register, this data is transfer into the dot latch, with a low pulse in LsyncL. The value in the dot latch forms the dot data used to fire the nozzle. The use of the dot latch allows the next line of data to be loaded into the dot shift register, at the same time the dot pattern in the dot latch is been fired.

Across the top of a column of nozzles, containing 12 nozzles, 2 of each colour (odd and even dots, 4 or 5 lines apart), is two fire register bits and a select register bit. The fire registers forms the fire shift register that runs length of the chip and back again with one register bit in each direction flow. The select register forms the Select Shift Register that runs the length of the chip. The select register, selects which of the two fire registers is used to enables this column. A ‘0’ in this register selects the forward direction fire register, and a ‘1’ selects the reverse direction fire register. This output of this block provides the fire signal for the column.

The third signal needed, the profile, is provide for all colours with input Pr across the whole colour row at the same time (with a slight propagation delay per column).

3.2 Dot Shift Register Orientation

The left side print head (chip) and the right side print head that form complete bi-lithic print head, have different nozzle arrangement with respect to the dot order mapping of the dot shift register to the dot position on the page.

With this mapping, the following data streams will need to provided.

| | Left Head | | Right Head | |
|---|---|---|---|---|
| Size | n-m | dot order | m | |
| 7:3 | 97 44 | [13822, 13820, 13818, . . . , 4084, 4082, 4080,] line y + 5 [4081, 4083, 4085, . . . , 13819, 13821, 13823] line y | 40 80 | [1, 3, 5, . . . , 4075, 4077, 4079,] line y [4078, 4076, 4074, . . . , 4, 2, 0] line y + 5 |
| 6:4 | 83 28 | [13822, 13820, 13818, . . . , 5500, 5498, 5496,] line y + 5 [5497, 5499, 5501, . . . , 13819, 13821, 13823] line y | 54 96 | [1, 3, 5, . . . , 5491, 5493, 5495,] line y [5494, 5492, 5490, . . . , 4, 2, 0] line y + 5 |
| 5:5 | 69 12 | [13822, 13820, 13818, . . . , 6916, 6914, 6912,] line y + 5 [6913, 6915, 6917, . . . , 13819, 13821, 13823] line y | 69 12 | [1, 3, 5, . . . , 6907, 6909, 6911,] line y [6910, 6908, 6906, . . . , 4, 2, 0] line y + 5 |
| 4:6 | 54 96 | [13822, 13820, 13818, . . . , 8332, 8330, 8328,] line y + 5 [8329, 8331, 8333, . . . , 13819, 13821, 13823] line y | 83 28 | [1, 3, 5, . . . , 8323, 8325, 8327,] line y [8326, 8324, 8322, . . . , 4, 2, 0] line y + 5 |
| 3:7 | 40 80 | [13822, 13820, 13818, . . . , 9748, 9746, 9744,] line y + 5 [9745, 97447, 9749, . . . , 13819, 13821, 13823] line y | 97 44 | [1, 3, 5, . . . , 9739, 9741, 9743,] line y 9742, 9740, 9738, . . . , 4, 2, 0] line y + 5 |

The data needs to be multiplexed onto the data pins, such that Data[0] has {(C0, C1, C2), (C0, C1, C2) . . . } in the above order, and Data[1] has {(C3, C4, C5), (C3, C4, C5) . . . }.

Figure 311:
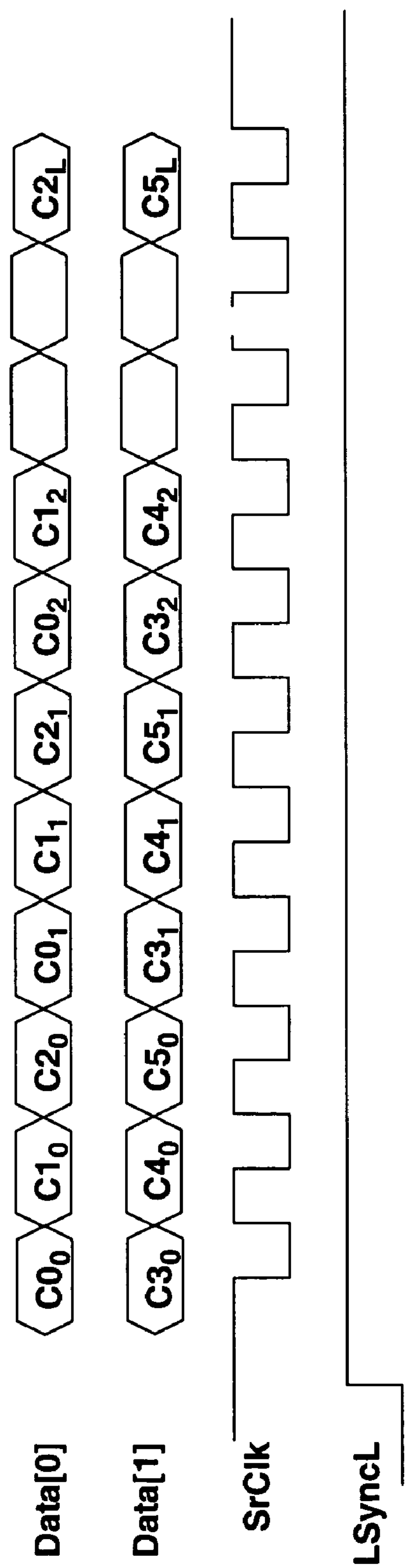
FIG. 311 shows data timing during printing

FIG. 311 shows the timing of data transfer during normal printing mode. Note SrClk has a default state of high and data is transferred on both edges of SrClk. If there are L nozzles per colour, SrClk would have L+2 edges, where the first and last edges do not transfer data.

Ideally, a '1' is shifted in to the fire shift register, in every $n^{th}$ position, and a '0' in all other position. In this manner, after n cycles of FrClk, the entire print head will be printed.

Figure 312:
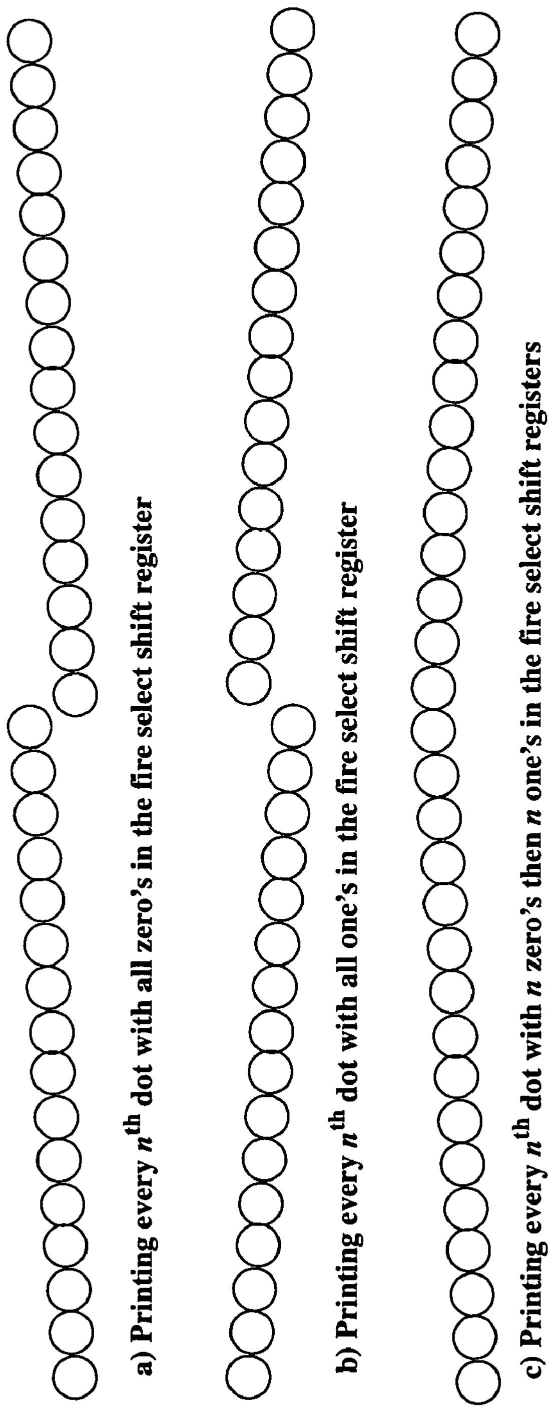
FIG. 312 shows print quality

The fire shift register and select shift registers allow the generation of a horizontal print line that on close inspection would not have a discontinuity of a "saw tooth" pattern, FIGS. 312*a*) & *b*) but a "sharks tooth" pattern of c).

This is done by firing 2 nozzles in every 2n group of nozzle at the same time starting from the outer 2 nozzles working towards the centre two (or the starting from the centre, and working towards the outer two) at the fire rate controlled by FrClk.

Figure 313:
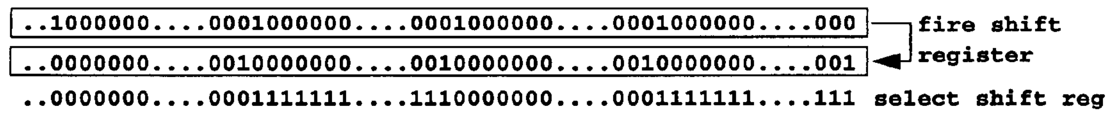
FIG. 313 shows fire and select shift register setup for printing
Figure 314:
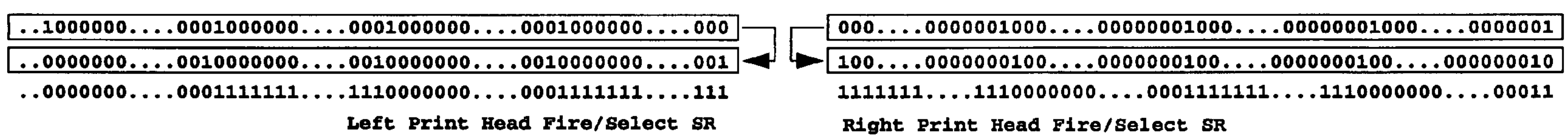
FIG. 314 shows a fire pattern across butt end of printhead chips
Figure 315:
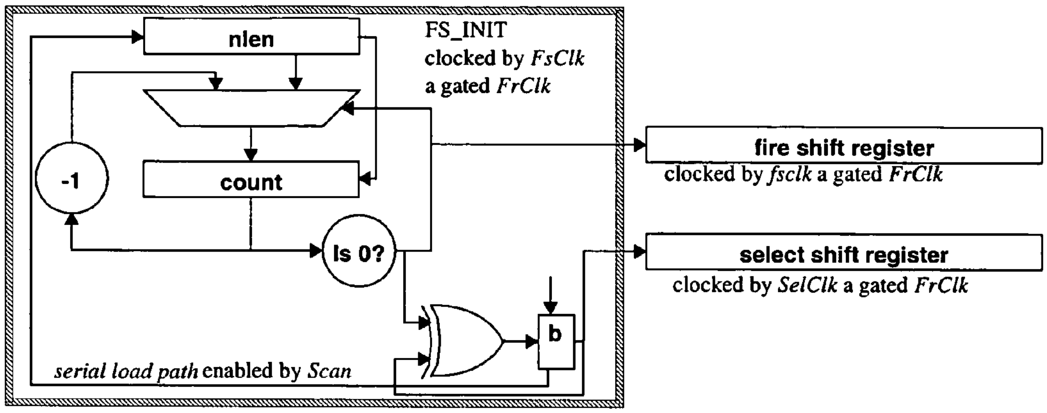
FIG. 315 shows fire pattern generation
Figure 316:
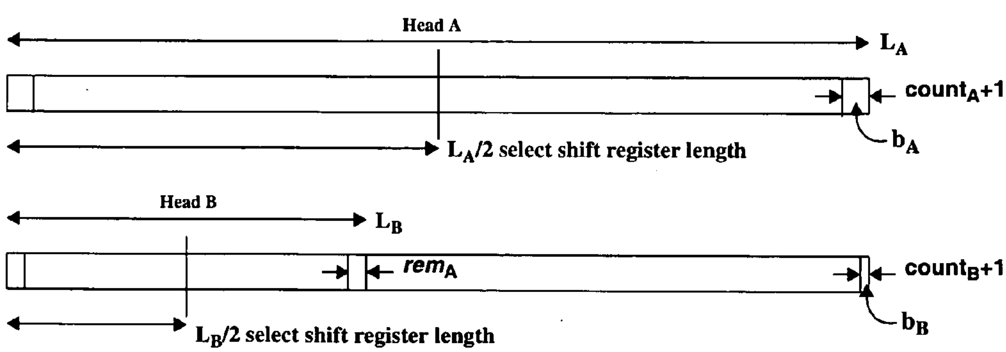
FIG. 316 shows determination of select shift register value
Figure 317:
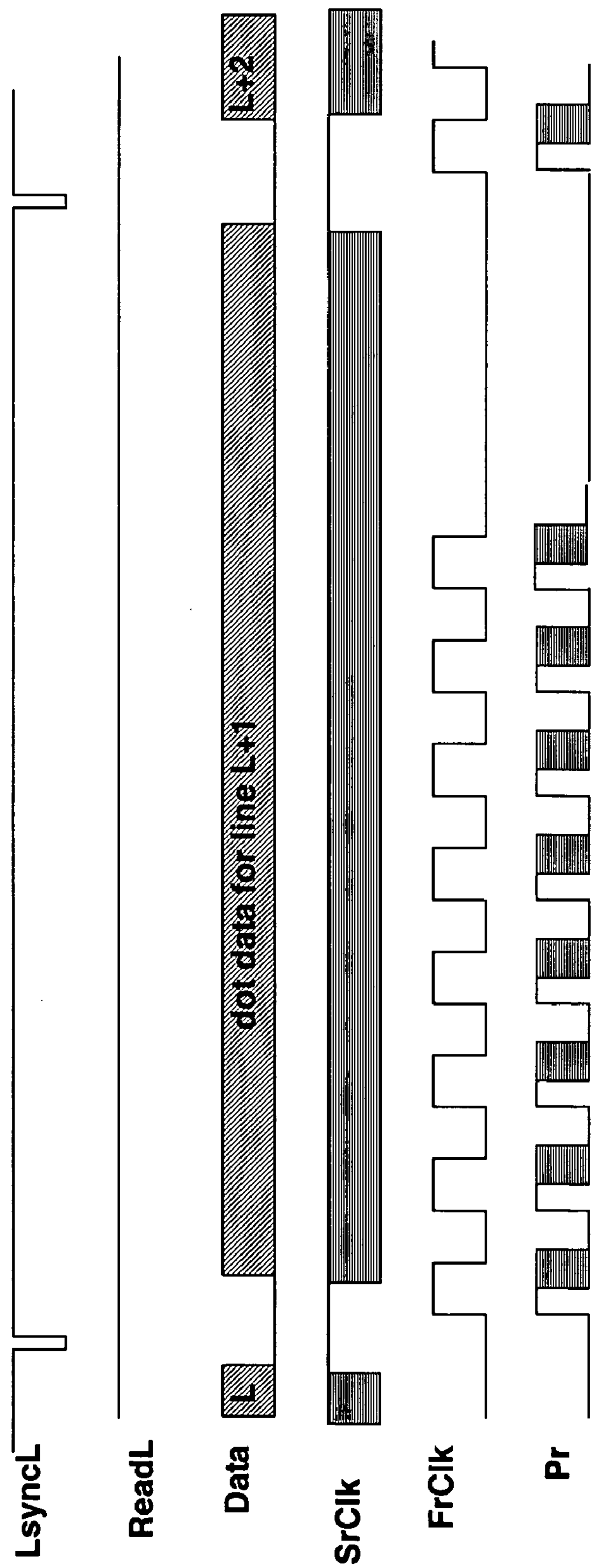
FIG. 317 shows timing for printing signals

To achieve this fire pattern the fire shift register and select shift register need to be set up as show in FIG. 313.

The pattern has shifted a '1' into the fire shift register every $n^{th}$ positions (where n is usually is a minimum of about 100) and n '1's, followed n '0's in the select shift register. At a start of a print cycle, these patterns need to be aligned as above, with the "1000 . . . " of a forward half of fire shift register, matching an n grouping of '1' or '0's in the select shift register. As well, with the "1000 . . . " of a reverse half of the fire shift register, matching an n grouping of '1' or '0's in the select shift register. And to continue this print pattern across the butt ends of the chips, the select shift register in each should end with a complete block of n '1's (or '0's).

Since the two chips can be of different lengths, initialisation of these patterns is an issue. This is solved by building initialisation circuitry into chips. This circuit is controlled by two registers, nlen(14) and count(14) and b(1). These registers are loaded serially through Data[0], while LSyncL is low, and ReadL is high with FrClk.

The scan order from input is b, n[13-0],c[0-13],color[5-0], mode[2-0] therefore b is shifted in last. The system color and mode registers are unrelated to the Fire Shift Register, but are loaded at the same time as this block. There function is described later.

TABLE 4

Head Combinations Initialisation for n = 100

| Nozzle s $L_B$ | Nozzle s $L_A$ | $nlen_{(A\&B)}$ = n − 1 | $count_A$ = $(L_A/2)$ mod n − 1 | $b_A$ | $b_B$ | rem = $(L_B/2)$ mod n | $count_B$ = $(L_A - L_B + rem)$ mod n − 1 |
|---|---|---|---|---|---|---|---|
| 4080 | 9744 | 99 | 71 | 0 | 0 | 40 | 3 |
| 5496 | 8328 | 99 | 63 | 0 | 0 | 48 | 79 |
| 6912 | 6912 | 99 | 55 | 0 | 0 | 56 | 55 |

Data requires a setup and hold about the both edges of SrClk. Data transfers starts on the first rising after LSyncL rising. SrClk default state is high and needs to return to high after the last data of the line. This means the first edge of SrClk (falling) after LSyncL rising, and the last edge of SrClk as it returns to the default state, no data is transferred to the print head. LSyncL rising requires setup to the first falling SrClk, and must stay high during the entire line data transfer until after last rising SrClk.

3.3 Fire Shift Register

The fire shift register controls the rate of nozzle fire. If the register is full of '1's then the you could print the entire print head in a single FrClk cycle, although electrical current limitations will prevent this happening in any reasonable implementation.

The following table shows the values to programme the bi-lithic head pairs using a fire pattern length of 100. The calculation assumes head 'A' is the longest head of the pair and once the registers are initialised with LA FrClk cycles (ReadL='0', LSyncL='1'). rem would be the correct value for $count_B$ if chip B was only clocked (FrClk) $L_B$ times. But this chip will be over clocked $L_A - L_B$ cycles. The values of $b_A$ and $b_B$ are either the same or inverse of each other. The actually value does not matter. They need to be different from each other if the select shift registers would end up with different values at the butt ends. If $(L_A/2n)$ is even (and $count_A$ is non zero), then the final run in 'A's select shift register will be $!b_A$. If $(L_A - L_B/2)$ mod n is even (and $count_b$ is non zero) then the final run in 'B's select shift register will be $!b_B$.

3.4 System Registers

As describe above, the Fire Shift Register generation block, also contains some system registers.

TABLE 5

System Registers

| Name | Size | Function |
| --- | --- | --- |
| Color | 6 | Each bit is an enable for the corresponding colour. If color[X] = 0, then $Pr_x$ is 0 and $SrClk_x$ is 0. If color[X] = 1, then $Pr_x$ follows the Pr signal and $SrClk_x$ is deserialised SrClk. |
| Mode | 3 | Mode[0] = 1, then FrClk pin is used as an output, internally the FrClk signal is set to 0<br>Mode[1] = 1, then Pr pin is used as an output, internally the Pr signal is set to 0<br>Mode[2] = 1, then LsyncL pin is used as an output, internally the LsyncL signal is set to 1 |

3.5 Profile Pattern

A profile pattern is repeated at FrClk rate. It is expected to be a single pulse about 1 us long. But it could be a more complicated series of pulse. The actual pattern depends on the ink type.

The following figure show the external timing to print a line of data. In this example the line is printed in 8 cycles of FrClk.

3.6 Interface Modes

Figure 318:
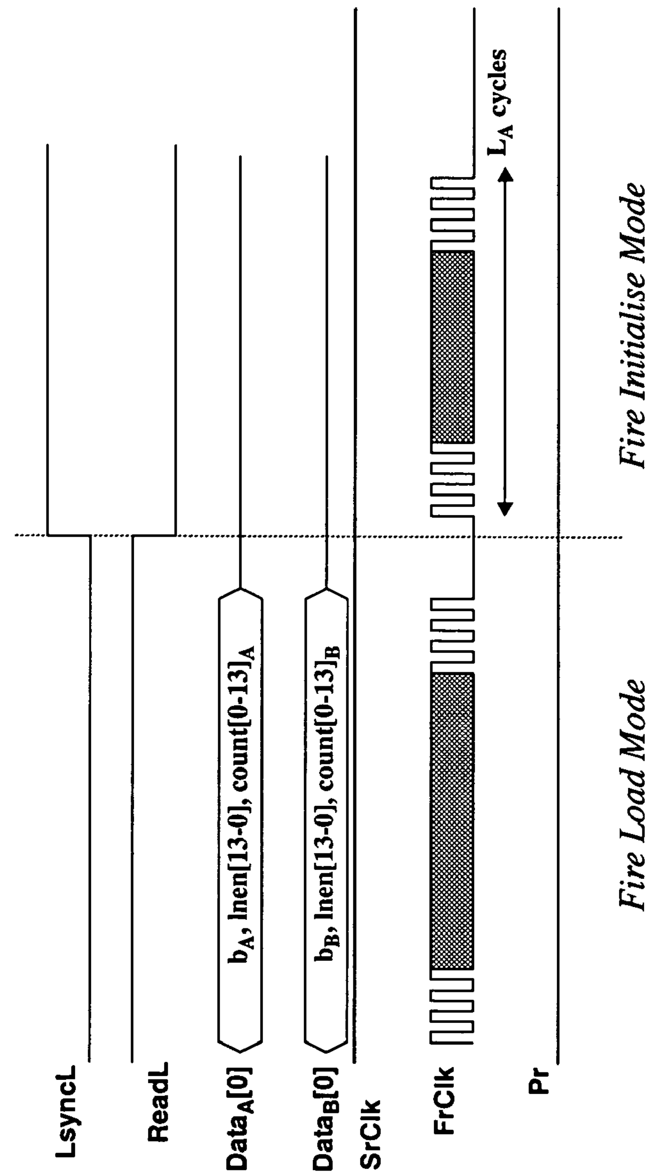
FIG. 318 shows initialisation of printheads
Figure 319:
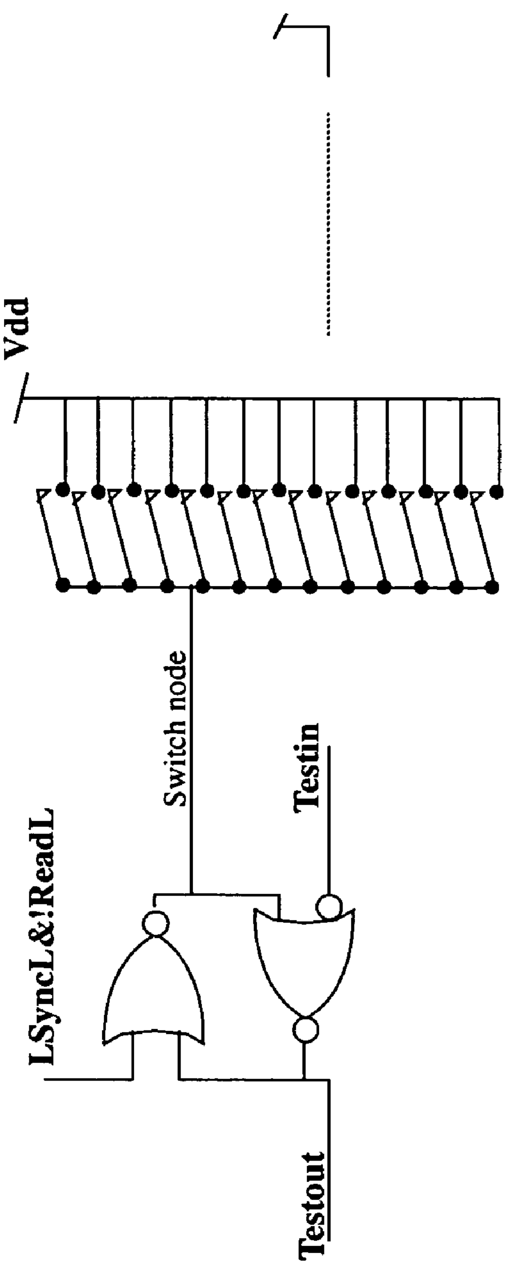
FIG. 319 shows a nozzle test latching circuit
Figure 320:
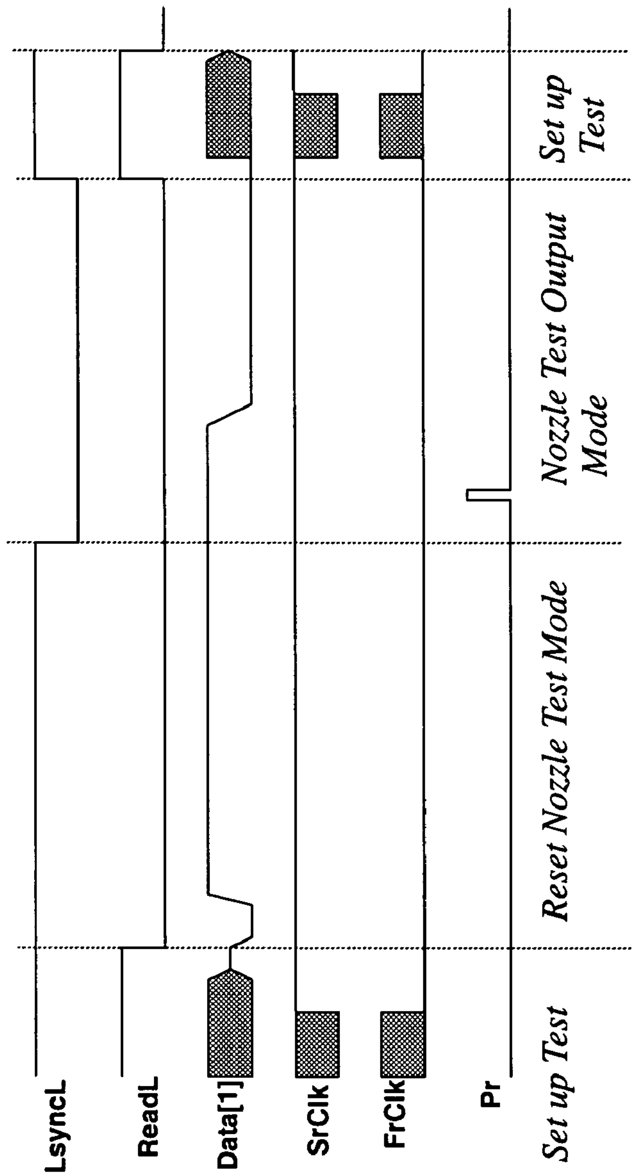
FIG. 320 shows nozzle testing
Figure 321:
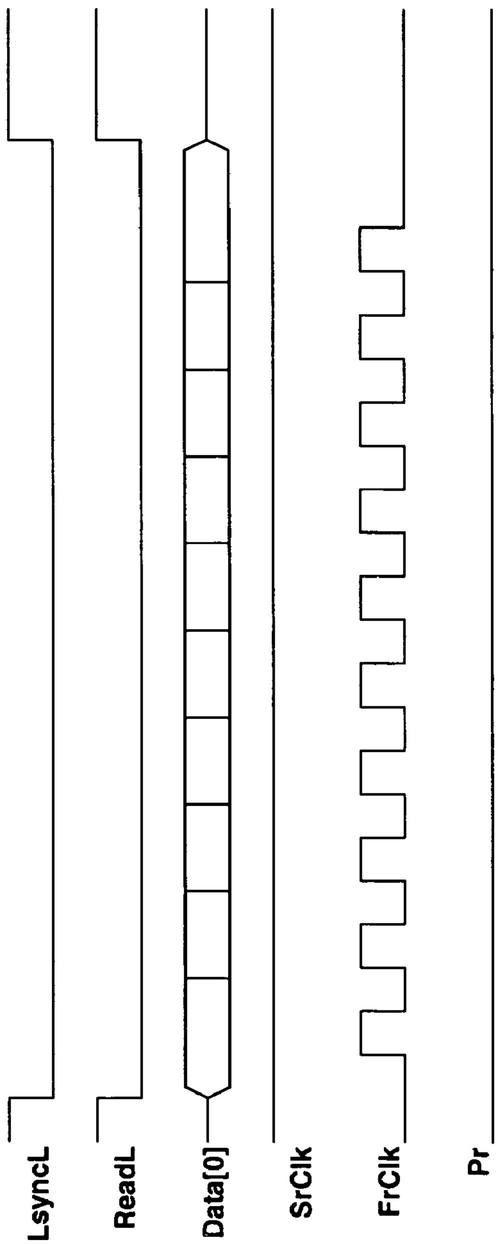
FIG. 321 shows a temperature reading
Figure 322:
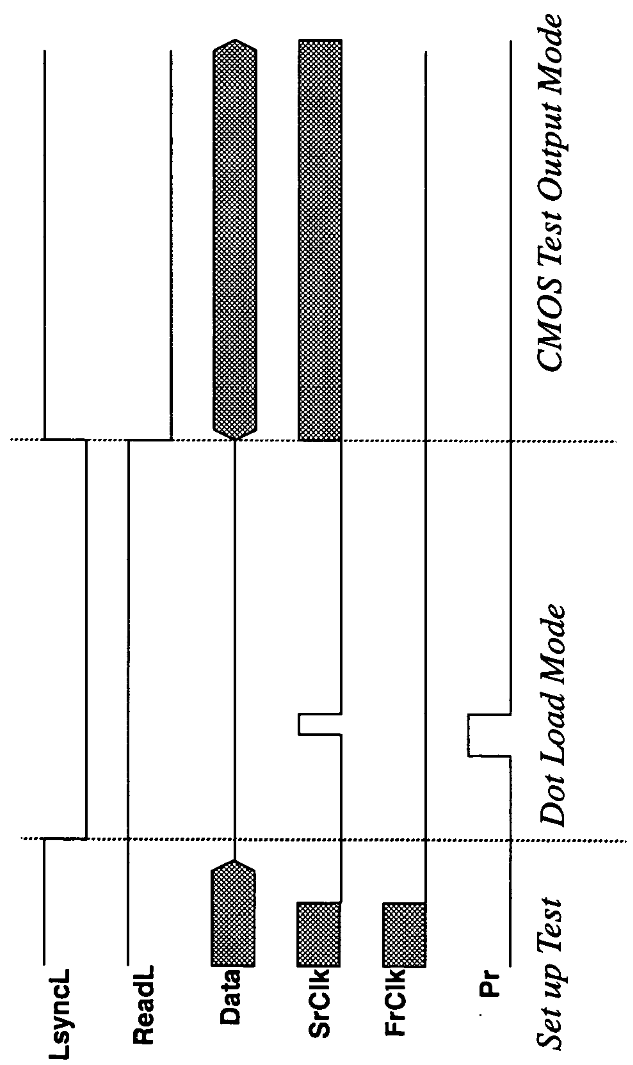
FIG. 322 shows CMOS testing
Figure 323:
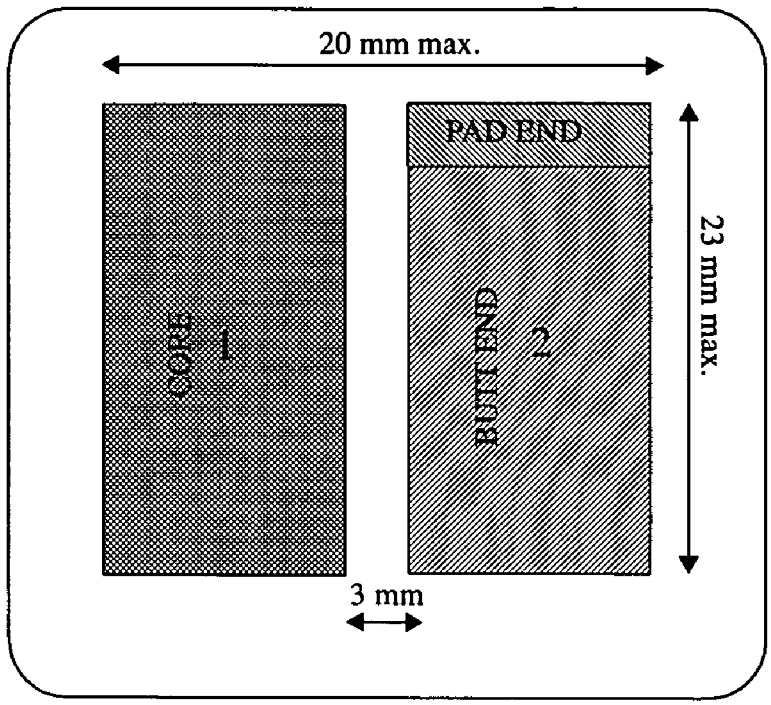
FIG. 323 shows a reticle layout
Figure 324:
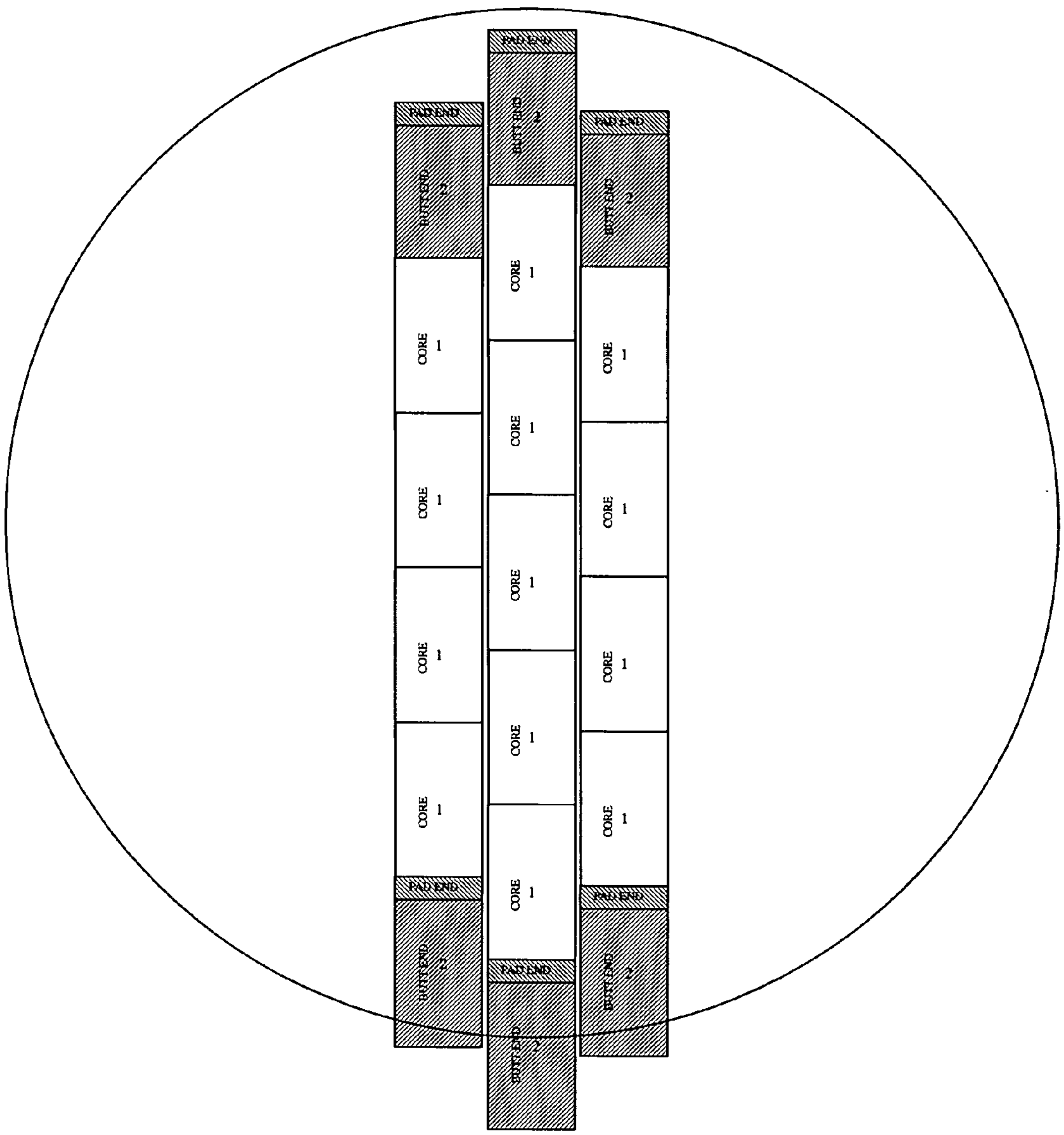
FIG. 324 shows a stepper pattern on Wafer

The print head has eight different modes controlled by signals ReadL and LSyncL and system mode register. As seen in FIG. 318 with both LSyncL and ReadL high, the chip in normal printing mode. Some of these modes can operate at the same time, but may interfere with the result of the other modes.

TABLE 6

Print Head Modes

| ReadL | LSyncL | Function | Mode Register | Internal Mapping |
| --- | --- | --- | --- | --- |
| 1 | 1 | Normal Print Mode | 000 (XXX) | SrClk = SrClk/3<br>frclk = FrClk<br>SelClk = 0<br>FsClk = FrClk<br>Scan = 0<br>CoreScan = 0 |
| X | 0 | Dot Load Mode<br>Dot latches are open, loaded with Dot shift registers, latch once LSyncL returns to 1 (this happens regardless of ReadL)<br>Enables Dot Shift register to capture fire result. | 000 (XXX) | |
| 1 | 0 | Fire Load Mode<br>Data[0] will shift through mode, color, nlen, count and b with FrClk | 000 (XXX) | SrClk = X<br>frclk = X<br>SelClk = X<br>FsClk = FrClk<br>Scan = 1<br>CoreScan = X |
| 0 | 1 | Reset Nozzle Test<br>Resets the state of nozzle test circuit | 001 | SrClk = SrClk<br>FrClk = FrClk<br>SelClk = FrClk<br>FsClk = FrClk<br>Scan = 0<br>CoreScan = 1 |
| 0 | 1 | CMOS testing mode<br>The contents of the dot shift registers are serial shifted out on LsyncL (colour0–1), FrClk (colour2–3), Pr (colour4–5) with SrClk | 111 | |
| 0 | 1 | Fire Initialise mode<br>The contents of the fire shift register and select shift register is generated with FrClk | 000 (XX0) | |
| 0 | 0 | Temperature Output<br>The series of Sigma Delta output are clocked out on Pr with FrClk. The sum of these bits represent the temperature of the chip. | 010 | SrClk = X<br>frclk = 0<br>SelClk = 0<br>FsClk = 0<br>Scan = 0<br>CoreScan = X |
| 0 | 0 | Nozzle Test Output<br>The result of a nozzle test is output on FrClk. | 001 | |

3.6.1 Printing

FIG. 318 shows show timing for normal printing. During this action, we drop out of Normal Print Mode, to Dot Load Mode between line transfers. For printing to perform correctly, all other signals should be stable.

3.6.2 Initialising for Printing

To initialise for printing the fire shift registers and select shift registers need to be setup into a state as shown in FIG. 318. To do this the chips are put into Fire Load Mode and the values for nlen, count and b are serially shifted from Data[0] clocked by FrClk. As the two chip have separate Data line, and common FrClk, this happens at the same time. Once this is done, mode is changed to Fire Initialise Mode, and further $L_A$ FrClk cycles are provided to both chips. During all these operation Pr should be low, to prevent unintentional firing for nozzles.

3.6.3 Nozzle Testing

Nozzle testing is done by firing a single nozzle at a time and monitoring the FrClk pin in the Nozzle Test Output mode.

Each nozzle has a test switch which closes when the nozzle is fired with an energy level greater than required for normal ink ejection. All 12 switches in a nozzle column are connect in parallel to the following circuit.

This circuit is initialised when ever LSyncL is high and ReadL is low (Reset Nozzle Test mode). This forces all "switch nodes" to low, and the feedback through lower NOR gate will latches this value. With LSyncL low and ReadL still low (Nozzle Test Output mode) the Testout of the first nozzle column is output on FrClk. If any switch is closed, the switch node of this column will be pulled up, and will ripple through to the output as transition from high to low.

Nozzle testing requires a setup phase in order to fire only one nozzle. There are many ways to achieve this. Simplest might be to load a single colour with 101010 through the even nozzles, and 010101 . . . for the odd nozzles (0's for all other colours), and set up a fire pattern with $n=L_A/2$. With this fire pattern only one nozzle will fire in each Pr pulse.

After firing in Nozzle Test Output mode, a single FrClk will advance to next nozzle, then Reset and Test. After $L_A/2$ cycles of this testing, a single SrClk will advance the dot shift registers to setup the untested nozzles of this colour, and another $L_A/2$ cycles of FrClk, Reset and Test will finished testing this colour. Then repeat test procedure for other colours.

3.6.4 Temperature Output

This mode is not well defined yet. In this mode, Pr will output a series of ones and zeros clocked by FrClk. After a (currently unknown) number of FrClk cycles the sum of this series will represent the temperature of the chip. Clocking frequency in this mode it expected to be in the range 10 kHz–1 MHz.

The Frequency of FrClk and the number of cycles need to be programmable. Since this mode cycles FrClk, the result of fire shift register and select shift register would be changed, but in this mode FrClk is disabled to these circuit. So printing can resume without reinitialising.

3.6.5 CMOS Testing

CMOS testing is a mode meant for chip testing before MEMS as added to the chip. This mode allows the dot shift register to be shifted out on the LsyncL, FrClk and Pr pins. Much like the nozzle test mode, the nozzles are fired while LSyncL is low, but during the firing SrClk will be pulsed, loading the dot shift register with the signal that would fire the nozzle. Once captured, the result can be shifted out.

The Dot Load Mode above violates normal printing procedure by firing the nozzles (Pr) and modify the dot shift register (SrClk).

4 Reticle Layout

To make long chips we need to stitch the CMOS (and MEMS) together by overlapping the reticle stepping field. The reticle will contain two areas:

The top edge of Area 2, PAD END contains the pads that stitch on bottom edge of Area 1, CORE. Area 1 contains the core array of nozzle logic. The top edge of Area 1 will stitch to the bottom edge of itself. Finally the bottom edge of Area 2, BUTT END will stitch to the top edge of Area 1. The BUTT END to used to complete a feedback wiring and seal the chip.

The above region will then be exposed across a wafer bottom to top. Area 2, Area 1, Area 1 . . . , Area 2. Only the PAD END of Area 2 needs to fit on the wafer. The final exposure of Area 2 only requires the BUTT END on the wafer.

4.1 TSMC U-Frame Requirements.

TSMC will be building us frames 10 mm×0.23 mm which will be placed either side of both Area 1 and Area 2.

TSMC requires 6 mm area for blading between the two exposure area. This translates to 3 mm on the reticle, as some reticules are 2× size, while most are 5×, the worst case must be used.

Security Overview

1 Introduction

A number of hardware, software and protocol solutions to security issues have been developed. These range from authorization and encryption protocols for enabling secure communication between hardware and software modules, to physical and electrical systems that protect the integrity of integrated circuits and other hardware.

It should be understood that in many cases, principles described with reference to hardware such as integrated circuits (ie, chips) can be implemented wholly or partly in software running on, for example, a computer. Mixed systems in which software and hardware (and combinations) embody various entities, modules and units can also be constructed using may of these principles, particularly in relation to authorization and authentication protocols. The particular extent to which the principles described below can be translated to or from hardware or software will be apparent to one skilled in the art, and so will not always explicitly be explained.

It should also be understood that many of the techniques disclosed below have application to many fields other than printing. Some specific examples are described towards the end of this description.

A "QA Chip" is a quality assurance chip can allows certain security functions and protocols to be implemented. The preferred QA Chip is described in some detail later in this specification.

1.5 QA Chip Terminology

The Authentication Protocols documents [5] and [6] refer to QA Chips by their function in particular protocols:

- For authenticated reads in [5], ChipR is the QA Chip being read from, and ChipT is the QA Chip that identifies whether the data read from ChipR can be trusted. ChipR and ChipT are referred to as Untrusted QA Device and Trusted QA Device respectively in [6].
- For replacement of keys in [5], ChipP is the QA Chip being programmed with the new key, and ChipF is the factory QA Chip that generates the message to program the new key. ChipF is referred to as the Key Programmer QA Device in [6].
- For upgrades of data in memory vectors in [5], ChipU is the QA Chip being upgraded, and ChipS is the QA Chip that signs the upgrade value. ChipS is referred to as the Value Upgrader QA Device and Parameter Upgrader QA Device in [6].

Any given physical QA Chip will contain functionality that allows it to operate as an entity in some number of these protocols.

Therefore, wherever the terms ChipR, ChipT, ChipP, ChipF, ChipU and ChipS are used in this document, they are referring to logical entities involved in an authentication protocol as defined in [5] and [6].

Physical QA Chips are referred to by their location. For example, each ink cartridge may contain a QA Chip referred to as an INK_QA, with all INK_QA chips being on the same physical bus. In the same way, the QA Chip inside the printer is referred to as PRINTER_QA, and will be on a separate bus to the INK_QA chips.

2 Requirements 2.1 Security

When applied to a printing environment, the functional security requirements for the preferred embodiment are:

- Code of QA chip owner or licensee co-existing safely with code of authorized OEMs
- Chip owner/licensee operating parameters authentication
- Parameters authentication for authorized OEMs
- Ink usage authentication Each of these is outlined in subsequent sections.

The authentication requirements imply that:

- OEMs and end-users must not be able to replace or tamper with QA chip manufacturer/owner's program code or data
- OEMs and end-users must not be able to perform unauthorized activities for example by calling chip manufacturer/owner's code
- End-users must not be able to replace or tamper with OEM program code or data

- End-users must not be able to call unauthorized functions within OEM program code
- Manufacturer/owner's development program code must not be capable of running on all SoPECs.
- OEMs must be able to test products at their highest upgradable status, yet not be able to ship them outside the terms of their license
- OEMs and end-users must not be able to directly access the print engine pipeline (PEP) hardware, the LSS Master (for QA Chip access) or any other peripheral block with the exception of operating system permitted GPIO pins and timers.

2.1.1 QA Manufacturer/Owner Code and OEM Program Code Co-Existing Safely

SoPEC includes a CPU that must run both manufacturer/owner program code and OEM program code. The execution model envisaged for SoPEC is one where Manufacturer/owner program code forms an operating system (O/S), providing services such as controlling the print engine pipeline, interfaces to communications channels etc. The OEM program code must run in a form of user mode, protected from harming the Manufacturer/owner program code. The OEM program code is permitted to obtain services by calling functions in the O/S, and the O/S may also call OEM code at specific times. For example, the OEM program code may request that the O/S call an OEM interrupt service routine when a particular GPIO pin is activated.

In addition, we may wish to permit the OEM code to directly call functions in Manufacturer/owner code with the same permissions as the OEM code. For example, the Manufacturer/owner code may provide SHA1 as a service, and the OEM could call the SHA1 function, but execute that function with OEM permissions and not Silverbook permissions.

A basic requirement then, for SoPEC, is a form of protection management, whereby Manufacturer/owner and OEM program code can co-exist without the OEM program code damaging operations or services provided by the Manufacturer/owner O/S. Since services rely on SoPEC peripherals (such as USB2 Host, LSS Master, Timers etc) access to these peripherals should also be restricted to Manufacturer/owner program code only.

2.1.2 Manufacturer/Owner Operating Parameters Authentication

A particular OEM will be licensed to run a Print Engine with a particular set of operating parameters (such as print speed or quality). The OEM and/or end-user can upgrade the operating license for a fee and thereby obtain an upgraded set of operating parameters.

Neither the OEM nor end-user should be able to upgrade the operating parameters without paying the appropriate fee to upgrade the license. Similarly, neither the OEM nor end-user should be able to bypass the authentication mechanism via any program code on SoPEC. This implies that OEMs and end-users must not be able to tamper with or replace Manufacturer/owner program code or data, nor be able to call unauthorized functions within Manufacturer/owner program code.

However, the OEM must be capable of assembly-line testing the Print Engine at the upgraded status before selling the Print Engine to the end-user.

2.1.3 OEM Operating Parameters Authentication

The OEM may provide operating parameters to the end-user independent of the Manufacturer/owner operating parameters. For example, the OEM may want to sell a franking machine[1].

[1]a franking machine print stamps

The end-user should not be able to upgrade the operating parameters without paying the appropriate fee to the OEM. Similarly, the end-user should not be able to bypass the authentication mechanism via any program code on SoPEC. This implies that end-users must not be able to tamper with or replace OEM program code or data, as well as not be able to tamper with the PEP blocks or service-related peripherals.

2.2 Acceptable Compromises

If an end user takes the time and energy to hack the print engine and thereby succeeds in upgrading the single print engine only, yet not be able to use the same keys etc on another print engine, that is an acceptable security compromise. However it doesn't mean we have to make it totally simple or cheap for the end-user to accomplish this.

Software-only attacks are the most dangerous, since they can be transmitted via the internet and have no perceived cost. Physical modification attacks are far less problematic, since most printer users are not likely to want their print engine to be physically modified. This is even more true if the cost of the physical modification is likely to exceed the price of a legitimate upgrade.

2.3 Implementation Constraints

Any solution to the requirements detailed in Section 2.1 should also meet certain preferred implementation constraints. These are:

- No flash memory inside SoPEC
- SoPEC must be simple to verify
- Manufacturer/owner program code must be updateable
- OEM program code must be updateable
- Must be bootable from activity on USB2
- Must be bootable from an external ROM to allow stand-alone printer operation
- No extra pins for assigning IDs to slave SoPECs
- Cannot trust the comms channel to the QA Chip in the printer (PRINTER_QA)
- Cannot trust the comms channel to the QA Chip in the ink cartridges (INK_QA)
- Cannot trust the USB comms channel These constraints are detailed below.

2.3.1 No Flash Memory Inside SoPEC

The preferred embodiment of SoPEC is intended to be implemented in 0.13 micron or smaller. Flash memory will not be available in any of the target processes being considered.

2.3.2 SoPEC Must be Simple to Verify

All combinatorial logic and embedded program code within SoPEC must be verified before manufacture. Every increase in complexity in either of these increases verification effort and increases risk.

2.3.3 Manufacturer/Owner Program Code Must be Updateable

It is neither possible nor desirable to write a single complete operating system that is:

- verified completely (see Section 2.3.1)
- correct for all possible future uses of SoPEC systems
- finished in time for SoPEC manufacture Therefore the complete Manufacturer/owner program code must not permanently reside on SoPEC. It must be possible to update the Manufacturer/owner program code as enhancements to functionality are made and bug fixes are applied.

In the worst case, only new printers would receive the new functionality or bug fixes. In the best case, existing SoPEC users can download new embedded code to enable functionality or bug fixes. Ideally, these same users would be obtaining these updates from the OEM website or equivalent, and not require any interaction with Manufacturer/owner.

2.3.4 OEM Program Code Must be Updateable

Given that each OEM will be writing specific program code for printers that have not yet been conceived, it is impossible for all OEM program code to be embedded in SoPEC at the ASIC manufacture stage.

Since flash memory is not available (see Section 2.3.1), OEMs cannot store their program code in on-chip flash. While it is theoretically possible to store OEM program code in ROM on SoPEC, this would entail OEM-specific ASICs which would be prohibitively expensive. Therefore OEM program code cannot permanently reside on SoPEC.

Since OEM program code must be downloadable for SoPEC to execute, it should therefore be possible to update the OEM program code as enhancements to functionality are made and bug fixes are applied.

In the worst case, only new printers would receive the new functionality or bug fixes. In the best case, existing SoPEC users can download new embedded code to enable functionality or bug fixes. Ideally, these same users would be obtaining these updates from the OEM website or equivalent, and not require any interaction with Manufacturer/owner.

2.3.5 Must be Bootable From Activity on USB2

SoPEC can be placed in sleep mode to save power when printing is not required. RAM is not preserved in sleep mode. Therefore any program code and data in RAM will be lost. However, SoPEC must be capable of being woken up by the host when it is time to print again.

In the case of a single SoPEC system, the host communicates with SoPEC via USB2. From SoPEC's point of view, it is activity on the USB2 device port that signals the time to wake up. In the case of a multi-SoPEC system, the host typically communicates with the Master SoPEC chip (as above), and then the Master relays messages to other Slave SoPECs by sending data out USB2 host port(s) and into the Slave SoPEC's device port. The net result is that the Slave SoPECs and the Master SoPEC all boot as a result of activity on the USB2 device port.

Therefore SoPEC must be capable of being woken up by activity on the USB2 device port.

2.3.6 Must be Bootable From an External ROM to Allow Stand-Alone Printer Operation SoPEC must also support the case where the printer is not connected to a PC (or the PC is currently turned off), and a digital camera or equivalent is plugged into the SoPEC-based printer. In this case, the entire printing application needs to be present within the hardware of the printer. Since the Manufacturer/owner program code and OEM program code will vary depending on the application (see Section 2.3.3 and Section 2.3.4), it is not possible to store the program in SoPEC's ROM.

Therefore SoPEC requires a means of booting from a non-PC host. It is possible that this could be accomplished by the OEM adding a USB2-host chip to the printer and simulating the effect of a PC, and thereby download the program code. This solution requires the boot operation to be based on USB2 activity (see Section 2.3.5). However this is an unattractive solution since it adds microprocessor complexity and component cost when only a ROM-equivalent was desired.

As a result SoPEC should ideally be able to boot from an external ROM of some kind. Note that booting from an external ROM means first booting from the internal ROM, and then downloading and authenticating the startup section of the program from the external ROM. This is not the same as simply running program code in-situ within an external ROM, since one of the security requirements was that OEMs and end-users must not be able to replace or tamper with Manufacturer/owner program code or data, i.e. we never want to blindly run code from an external ROM.

As an additional point, if SoPEC is in sleep mode, SoPEC must be capable of instigating the boot process due to activity on a programmable GPIO. e.g. a wake-up button. This would begin addition to the standard power-on booting.

2.3.7 No Extra Pins to Assign IDs to Slave SoPECs

In a single SoPEC system the host only sends data to the single SoPEC. However in a multi-SoPEC system, each of the slaves needs to be uniquely identifiable in order to be able for the host to send data to the correct slave.

Since there is no flash on board SoPEC (Section 2.3.1) we are unable to store a slave ID in each SoPEC. Moreover, any ROM in each SoPEC will be identical.

It is possible to assign n pins to allow $2^n$ combinations of IDs for slave SoPECs. However a design goal of SoPEC is to minimize pins for cost reasons, and this is particularly true of features only used in multi-SoPEC systems.

The design constraint requirement is therefore to allow slaves to be IDed via a method that does not require any extra pins. This implies that whatever boot mechanism that satisfies the security requirements of Section 2.1 must also be able to assign IDs to slave SoPECs.

2.3.8 Cannot Trust the Comms Channel to the QA Chip in the Printer (PRINTER_QA)

If the printer operating parameters are stored in the non-volatile memory of the Print Engine's on-board PRINTER_QA chip, both Manufacturer/owner and OEM program code cannot rely on the communication channel being secure. It is possible for an attacker to eavesdrop on communications to the PRINTER_QA chip, replace the PRINTER_QA chip and/or subvert the communications channel. It is also possible for this to be true during manufacture of the circuit board containing the SoPEC and the PRINTER_QA chip.

2.3.9 Cannot Trust the Comms Channel to the QA Chip in the Ink Cartridges (INK_QA)

The amount of ink remaining for a given ink cartridge is stored in the non-volatile memory of that ink cartridge's INK_QA chip. Both Manufacturer/owner and OEM program code cannot rely on the communication channel to the INK_QA being secure. It is possible for an attacker to eavesdrop on communications to the INK_QA chip, to replace the INK_QA chip and/or to subvert the communications channel. It is also possible for this to be true during manufacture of the consumable containing the INK_QA chip.

2.3.10 Cannot Trust the Inter-SoPEC Comms Channel (USB2)

In a multi-SoPEC system, or in a single-SoPEC system that has a non-USB2 connection to the host, a given SoPEC will receive its data over a USB2 host port. It is quite possible for an end-user to insert a chip that eavesdrops on and/or subverts the communications channel (for example performs man-in-the-middle attacks).

3 Proposed Solution

A proposed solution to the requirements of Section 2, can be summarised as:

Each SoPEC has a unique id

CPU with user/supervisor mode

Memory Management Unit

The unique id is not cached

Specific entry points in O/S

Boot procedure, including authentication of program code and operating parameters SoPEC physical identification 3.1 Each SoPEC Has a Unique ID Each SoPEC needs to contains a unique SoPEC_id of minimum size 64-bits. This SoPEC_id is used to form a symmetric key unique to each SoPEC: SoPEC_id_key. On SoPEC we make use of an additional 112-bit ECID[2] macro that has been programmed with a random number on a per-chip basis. Thus SoPEC_id is the 112-bit macro, and the SoPEC_id_key is a 160-bit result obtained by SHA1(SoPEC_ID).

[2]Electronic Chip Id

The verification of operating parameters and ink usage depends on SoPEC_id being difficult to determine. Difficult to determine means that someone should not be able to determine the id via software, or by viewing the communications between chips on the board. If the SoPEC_id is available through running a test procedure on specific test pins on the chip, then depending on the ease by which this can be done, it is likely to be acceptable.

It is important to note that in the proposed solution, compromise of the SoPEC_id leads only to compromise of the operating parameters and ink usage on this particular SoPEC. It does not compromise any other SoPEC or all inks or operating parameters in general.

It is ideal that the SoPEC_id be random, although this is unlikely to occur on standard manufacture processes for ASICs. If the id is within a small range however, it will be able to be broken by brute force. This is why 32-bits is not sufficient protection.

3.2 CPU with User/Supervisor Mode

SoPEC contains a CPU with direct hardware support for user and supervisor modes. At present, the intended CPU is the LEON (a 32-bit processor with an instruction set according to the IEEE-1754 standard. The IEEE1754 standard is compatible with the SPARC V8 instruction set).

Manufacturer/owner (operating system) program code will run in supervisor mode, and all OEM program code will run in user mode.

3.3 Memory Management Unit

SoPEC contains a Memory Management Unit (MMU) that limits access to regions of DRAM by defining read, write and execute access permissions for supervisor and user mode. Program code running in user mode is subject to user mode permission settings, and program code running in supervisor mode is subject to supervisor mode settings.

A setting of 1 for a permission bit means that type of access (e.g. read, write, execute) is permitted. A setting of 0 for a read permission bit means that that type of access is not permitted.

At reset and whenever SoPEC wakes up, the settings for all the permission bits are 1 for all supervisor mode accesses, and 0 for all user mode accesses. This means that supervisor mode program code must explicitly set user mode access to be permitted on a section of DRAM.

Access permission to all the non-valid address space should be trapped, regardless of user or supervisor mode, and regardless of the access being read, execute, or write.

Access permission to all of the valid non-DRAM address space (for example the PEP blocks) is supervisor read/write access only (no supervisor execute access, and user mode has no acccess at all) with the exception that certain GPIO and Timer registers can also be accessed by user code. These registers will require bitwise access permissions. Each peripheral block will determine how the access is restricted.

With respect to the DRAM and PEP subsystems of SoPEC, typically we would set user read/write/execute mode permissions to be 1/1/0 only in the region of memory that is used for OEM program data, 1/0/1 for regions of OEM program code, and 0/0/0 elsewhere (including the trap table). By contrast we would typically set supervisor mode read/write/execute permissions for this memory to be 1/1/0 (to avoid accidentally executing user code in supervisor mode).

The SoPEC_id parameter (see Section 3.1) should only be accessible in supervisor mode, and should only be stored and manipulated in a region of memory that has no user mode access.

3.4 Unique ID IS Not Cached

The unique SoPEC_id needs to be available to supervisor code and not available to user code. This is taken care of by the MMU (Section 3.3).

However the SoPEC_id must also not be accessable via the CPU's data cache or register windows. For example, if the user were to cause an interrupt to occur at a particular point in the program execution when the SoPEC_id was being manipulated, it must not be possible for the user program code to turn caching off and then access the SoPEC_id inside the data cache. This would bypass any MMU security.

The same must be true of register windows. It must not be possible for user mode program code to read or modify register settings in a supervisor program's register windows.

This means that at the least, the SoPEC_id itself must not be cacheable. Likewise, any processed form of the SoPEC_id such as the SoPEC_id key (e.g. read into registers or calculated expected results from a QA_ChIP) should not be accessable by user program code.

3.5 Specific Entry Points in O/S

Given that user mode program code cannot even call functions in supervisor code space, the question arises as how OEM programs can access functions, or request services. The implementation for this depends on the CPU.

On the LEON processor, the TRAP instruction allows programs to switch between user and supervisor mode in a controlled way. The TRAP switches between user and supervisor register sets, and calls a specific entry point in the supervisor code space in supervisor mode. The TRAP handler dispatches the service request, and then returns to the caller in user mode.

Use of a command dispatcher allows the O/S to provide services that filter access—e.g. a generalised print function will set PEP registers appropriately and ensure QA Chip ink updates occur.

The LEON also allows supervisor mode code to call user mode code in user mode. There are a number of ways that this functionality can be implemented. It is possible to call the user code without a trap, but to return to supervisor mode requires a trap (and associated latency).

3.6 Boot Procedure 3.6.1 Basic Premise

The intention is to load the Manufacturer/owner and OEM program code into SoPEC's RAM, where it can be subsequently executed. The basic SoPEC therefore, must be capable of downloading program code. However SoPEC must be able to guarantee that only authorized Manufacturer/owner boot programs can be loaded, otherwise anyone could modify the O/S to do anything, and then load that—thereby bypassing the licensed operating parameters.

We perform authentication of program code and data using asymmetric (public-key) digital signatures and without using a QA ChIP.

Assuming we have already downloaded some data and a 160-bit signature into eDRAM, the boot loader needs to perform the following tasks:

- perform SHA-1 on the downloaded data to calculate a digest localDigest
- perform asymmetric decryption on the downloaded signature (160-bits) using an asymmetric public key to obtain authorizedDigest
- If authorizedDigest is the PKCS#1 (patent free) form of localDigest, then the downloaded data is authorized (the signature must have been signed with the asymmetric private key) and control can then be passed to the downloaded data Asymmetric decryption is used instead of symmetric decryption because the decrypting key must be held in SoPEC's ROM. If symmetric private keys are used, the ROM can be probed and the security is compromised.

The procedure requires the following data item:

boot0key=an n-bit asymmetric public key

The procedure also requires the following two functions:

- SHA-1=a function that performs SHA-1 on a range of memory and returns a 160-bit digest
- decrypt=a function that performs asymmetric decryption of a message using the passed-in key
- PKCS#1 form of localDigest is 2048-bits formatted as follows: bits 2047–2040=0x00, bits 2039–2032=0x01, bits 2031–288=0xFF..0xFF, bits 287–160=0x003021300906052B0E03021A05000414, bits 159–0=localDigest. For more information, see PKCS#1 v2.1 section 9.2

Assuming that all of these are available (e.g. in the boot ROM), boot loader 0 can be defined as in the following pseudocode:

```
bootloader0(data, sig)
        localDigest ←SHA-1(data)
        authorizedDigest ←decrypt(sig, boot0key)
        expectedDigest      =       0x00|0x01|0xFF..0xFF|
                0x003021300906052B0E03021A05000414
                |localDigest)   //
"|" = concat
        If (authorizedDigest = = expectedDigest)
                jump to program code at data-start address//
                will never
return
        Else
                // program code is unauthorized
        EndIf
```

The length of the key will depend on the asymmetric algorithm chosen. The key must provide the equivalent protection of the entire QA Chip system—if the Manufacturer/owner O/S program code can be bypassed, then it is equivalent to the QA Chip keys being compromised. In fact it is worse because it would compromise Manufacturer/owner operating parameters, OEM operating parameters, and ink authentication by software downloaded off the net (e.g. from some hacker).

In the case of RSA, a 2048-bit key is required to match the 160-bit symmetric-key security of the QA ChIP. In the case of ECDSA, a key length of 132 bits is likely to suffice. RSA is convenient because the patent (U.S. Pat. No. 4,405,829) expired in September 2000.

There is no advantage to storing multiple keys in SoPEC and having the external message choose which key to validate against, because a compromise of any key allows the external user to always select that key.

There is also no particular advantage to having the boot mechanism select the key (e.g. one for USB-based booting and one for external ROM booting) a compromise of the external ROM booting key is enough to compromise all the SoPEC systems.

However, there are advantages in having multiple keys present in the boot ROM and having a wire-bonding option on the pads select which of the keys is to be used. Ideally, the pads would be connected within the package, and the selection is not available via external means once the die has ben packaged. This means we can have different keys for different application areas (e.g. different uses of the chip), and if any particular SoPEC key is compromised, the die could be kept constant and only the bonding changed. Note that in the worst case of all keys being compromised, it may be economically feasible to change the boot0key value in SoPEC's ROM, since this is only a single mask change, and would be easy to verify and characterize.

Therefore the entire security of SoPEC is based on keeping the asymmetric private key paired to boot0key secure. The entire security of SoPEC is also based on keeping the program that signs (i.e. authorizes) datasets using the asymmetric private key paired to boot0key secure.

It may therefore be reasonable to have multiple signatures (and hence multiple signature programs) to reduce the chance of a single point of weakness by a rogue employee. Note that the authentication time increases linearly with the number of signatures, and requires a 2048-bit public key in ROM for each signature.

3.6.2 Hierarchies of Authentication

Given that test programs, evaluation programs, and Manufacturer/owner O/S code needs to be written and tested, and OEM program code etc. also needs to be tested, it is not secure to have a single authentication of a monolithic dataset combining Manufacturer/owner O/S, non-O/S, and OEM program code—we certainly don't want OEMs signing Manufacturer/owner program code, and Manufacturer/owner shouldn't have to be involved with the signing of OEM program code.

Therefore we require differing levels of authentication and therefore a number of keys, although the procedure for authentication is identical to the first—a section of program code contains the key and procedure for authenticating the next.

This method allows for any hierarchy of authentication, based on a root key of boot0key. For example, assume that we have the following entities:

- QACo, Manufacturer/owner's QA/key company. Knows private version of boot0key, and owner of security concerns.
- SoPECCo, Manufacturer/owner's SoPEC hardware/software company. Supplies SoPEC ASICs and SoPEC O/S printing software to a ComCo.
- ComCo, a company that assembles Print Engines from SoPECs, Memjet printheads etc, customizing the Print Engine for a given OEM according to a license
- OEM, a company that uses a Print Engine to create a printer product to sell to the end-users. The OEM would supply the motor control logic, user interface, and casing.

The levels of authentication hierarchy are as follows:

- QACo writes the boot ROM, agenerates dataset1, consisting of a boot loader program that loads and validates dataset2 and QACo's asymmetric public boot1key. QACo signs dataset0 with the asymmetric private boot0key.

SoPECCo generates dataset1, consisting of the print engine security kernel O/S (which incorporates the security-based features of the print engine functionality) and the ComCo's asymmetric public key. Upon a special "formal release" request from SoPECCo, QACo signs dataset0 with QACo's asymmetric private boot0key key. The print engine program code expects to see an operating parameter block signed by the ComCo's asymmetric private key. Note that this is a special "formal release" request to by SoPECCo; the procedure for development versions of the program are described in Section 3.6.3.

The ComCo generates dataSet3, consisting of dataset1 plus dataset2, where dataset2 is an operating parameter block for a given OEM's print engine licence (according to the print engine license arrangement) signed with the ComCo's asymmetric private key. The operating parameter block (dataset2) would contain valid print speed ranges, a PrintEngineLicenseID, and the OEM's asymmetric public key. The ComCo can generate as many of these operating parameter blocks for any number of Print Engine Licenses, but cannot write or sign any supervisor O/S program code.

The OEM would generate dataset5, consisting of dataset3 plus dataset4, where dataset4 is the OEM program code signed with the OEM's asymmetric private key. The OEM can produce as many versions of dataset5 as it likes (e.g. for testing purposes or for updates to drivers etc) and need not involve Manufacturer/owner, QACo, or ComCo in any way.

Figure 325:
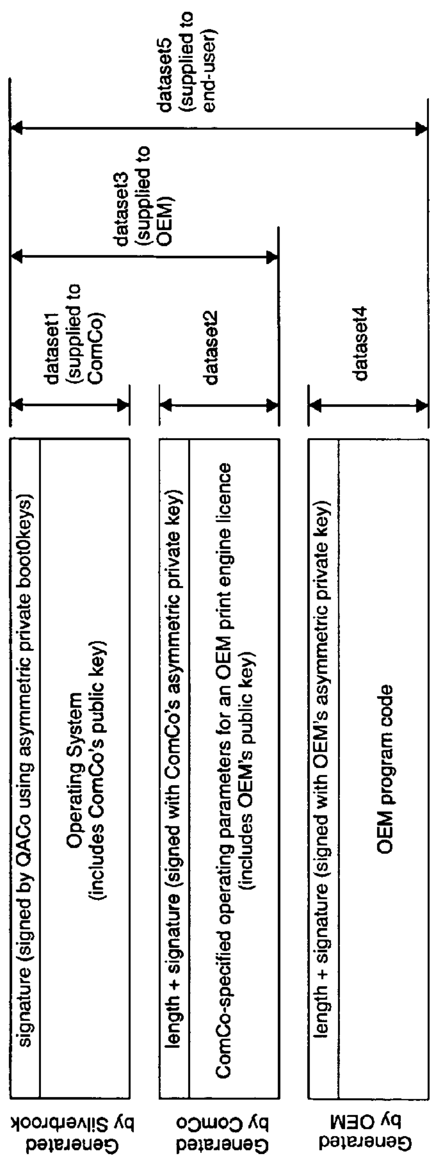
FIG. 325 shows relationship between datasets

The relationship is shown below in FIG. 325.

Figure 326:
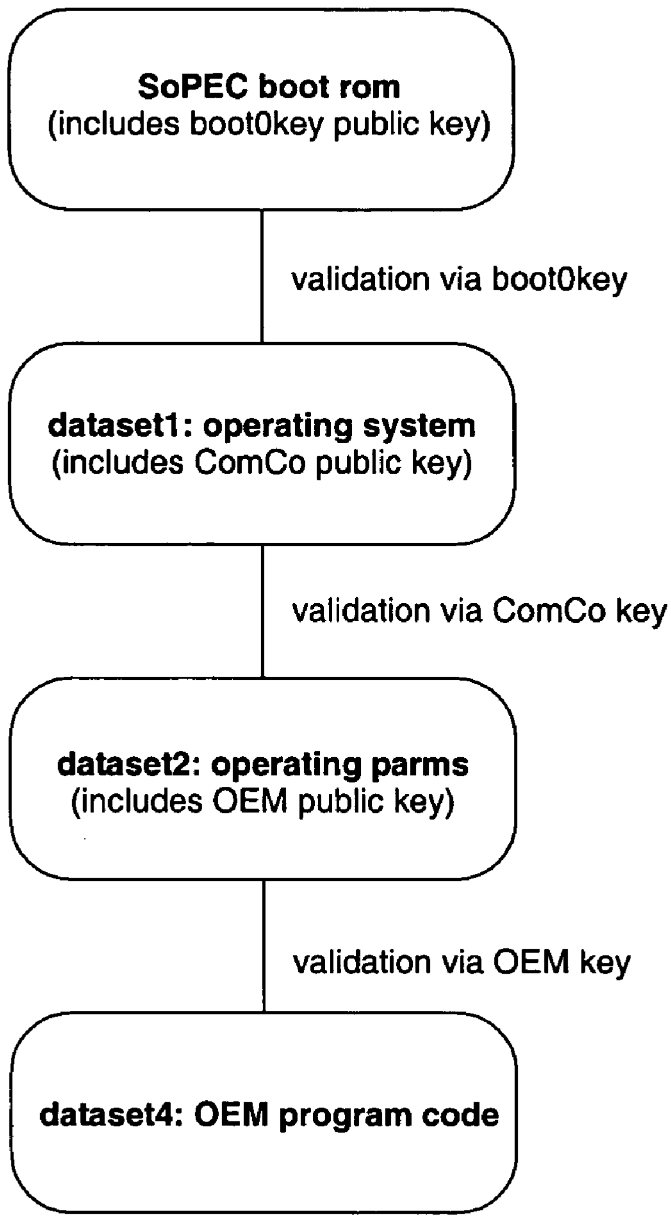
FIG. 326 shows a validation hierarchy

When the end-user uses dataset5, SoPEC itself validates dataset1 via the boot0key mechanism described in Section 3.6.1. Once dataset1 is executing, it validates dataset2, and uses dataset2 data to validate dataset4. The validation hierarchy is shown in FIG. 326.

If a key is compromised, it compromises all subsequent authorizations down the hierarchy. In the example from above (and as illustrated in FIG. 326) if the OEM's asymmetric private key is compromised, then O/S program code is not compromised since it is above OEM program code in the authentication hierarchy. However if the ComCo's asymmetric private key is compromised, then the OEM program code is also compromised. A compromise of boot0key compromises everything up to SoPEC itself, and would require a mask ROM change in SoPEC to fix.

It is worthwhile repeating that in any hierarchy the security of the entire hierarchy is based on keeping the asymmetric private key paired to boot0key secure. It is also a requirement that the program that signs (i.e. authorizes) datasets using the asymmetric private key paired to boot0key secure.

3.6.3 Developing Program Code at Manufacturer/Owner

The hierarchical boot procedure described in Section 3.6.1 and Section 3.6.2 gives a hierarchy of protection in a final shipped product.

It is also desirable to use a hierarchy of protection during software development within Manufacturer/owner.

For a program to be downloaded and run on SoPEC during development, it will need to be signed. In addition, we don't want to have to sign each and every Manufacturer/owner development code with the boot0key, as it creates the possibility of any developmental (including buggy or rogue) application being run on any SoPEC.

Therefore QACo needs to generate/create a special intermediate boot loader, signed with boot0key, that performs the exact same tasks as the normal boot loader, except that it checks the SoPECid to see if it is a specific SoPECid (or set of SoPECids). If the SoPEC_id is in the valid set, then the developmental boot loader validates dataset2 by means of its length and a SHA-1 digest of the developmental code[3], and not by a further digital signature. The QACo can give this boot loader to the software development team within Manufacturer/owner. The software team can now write and run any program code, and load the program code using the development boot loader. There is no requirement for the subsequent software program (i.e. the developmental program code) to be signed with any key since the programs can only be run on the particular SoPECs.

[3]The SHA-1 digest is to allow the total program load time to simulate the running time of the normal boot loader running on a non-developmental version of the program.

If the developmental boot loader (and/or signature generator) were compromised, or any of the developmental programs were compromised, the worst situation is that an attacker could run programs on that particular set of SoPECs, and on no others.

This should greatly reduce the possibility of erroneous programs signed with boot0key being available to an attacker (only official releases are signed by boot0key), and therefore reduces the possibility of a Manufacturer/owner employee intentionally or inadvertently creating a back door for attackers.

Figure 327:
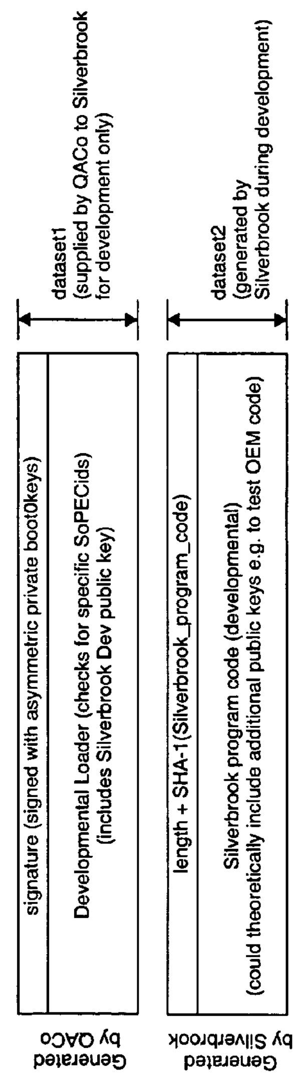
FIG. 327 shows development of operating system code

The relationship is shown below in FIG. 327.

Theoretically the same kind of hierarchy could also be used to allow OEMs to be assured that their program code will only work on specific SoPECs, but this is unlikely to be necessary, and is probably undesirable.

3.6.4 Date-Limited Loaders

It is possible that errors in supervisor program code (e.g. the operating system) could allow attackers to subvert the program in SoPEC and gain supervisor control.

To reduce the impact of this kind of attack, it is possible to allocate some bits of the SoPEC_id to form some kind of date. The granularity of the date could be as simple as a single bit that says the date is obtained from the regular IBM ECID, or it could be 6 bits that give 10 years worth of 3-month units.

The first step of the program loaded by boot loader 0 could check the SoPEC_id date, and run or refuse to run appropriately. The Manufacturer/owner driver or OS could therefore be limited to run on SoPECs that are manufactured up until a particular date.

This means that the OEM would require a new version of the OS for SoPECs after a particular date, but the new driver could be made to work on all previous versions of SoPEC.

The function simply requires a form of date, whose granularity for working can be determined by agreement with the OEM.

For example, suppose that SoPECs are supplied with 3-month granularity in their date components. Manufacturer/owner could ship a version of the OS that works for any SoPEC of the date (i.e. on any chip), or for all SoPECs manufactured during the year etc. The driver issued the next year could work with all SoPECs up until that years etc. In this way the drivers for a chip will be backwards compatible, but will be deliberately not forwards-compatible. It allows the downloading of a new driver with no problems, but it protects against bugs in one years's driver OS from being used against future SoPECs.

Note that the phasing in of a new OS doesn't have to be at the same time as the hardware. For example, the new OS can come in 3 months before the hardware that it supports. However once the new SoPECs are being delivered, the OEM must not ship the older driver with the newer SoPECs, for the old driver will not work on the newer SoPECs. Basically once the OEM has received the new driver, they should use that driver for all SoPEC systems from that point on (old SoPECs will work with the new driver).

This date-limiting feature would most likely be using a field in the ComCo specified operating parameters, so it allows the SoPEC to use date-checking in addition to additional QA Chip related parameter checking (such as the OEM's PrintEngineLicenseId etc).

A variant on this theme is a date-window, where a start-date and end-date are specified (as relating to SoPEC manufacture, not date of use).

3.6.5 Authenticating Operating Parameters

Operating parameters need to be considered in terms of Manufacturer/owner operating parameters and OEM operating parameters. Both sets of operating parameters are stored on the PRINTER_QA chip (physically located inside the printer). This allows the printer to maintain parameters regardless of being moved to different computers, or a loss/replacement of host O/S drivers etc.

On PRINTER_QA, memory vector $M_0$ contains the upgradable operating parameters, and memory vectors $M_{1+}$ contains any constant (non-upgradable) operating parameters.

Considering only Manufacturer/owner operating parameters for the moment, there are actually two problems:

a. setting and storing the Manufacturer/owner operating parameters, which should be authorized only by Manufacturer/owner b. reading the parameters into SoPEC, which is an issue of SoPEC authenticating the data on the PRINTER_QA chip since we don't trust PRINTER_QA.

The PRINTER_QA chip therefore contains the following symmetric keys:

$K_0$=PrintEngineLicense_key. This key is constant for all SoPECs supplied for a given print engine license agreement between an OEM and a Manufacturer/owner ComCo. $K_0$ has write permissions to the Manufacturer/owner upgradeable region of $M_0$ on PRINTER_QA.

$K_1$=SoPEC_id_key. This key is unique for each SoPEC (see Section 3.1), and is known only to the SoPEC and PRINTER_QA. K, does not have write permissions for anything.

$K_0$ is used to solve problem (a). It is only used to authenticate the actual upgrades of the operating parameters. Upgrades are performed using the standard upgrade protocol described in [5], with PRINTER_QA acting as the ChipU, and the external upgrader acting as the ChipS.

$K_1$ is used by SoPEC to solve problem (b). It is used to authenticate reads of data (i.e. the operating parameters) from PRINTER_QA. The procedure follows the standard authenticated read protocol described in [5], with PRINTER_QA acting as ChipR, and the embedded supervisor software on SoPEC acting as ChipT. The authenticated read protocol [5] requires the use of a 160-bit nonce, which is a pseudo-random number. This creates the problem of introducing pseudo-randomness into SoPEC that is not readily determinable by OEM programs, especially given that SoPEC boots into a known state. One possibility is to use the same random number generator as in the QA Chip (a 160-bit maximal-lengthed linear feedback shift register) with the seed taken from the value in the WatchDogTimer register in SoPEC's timer unit when the first page arrives.

Note that the procedure for verifying reads of data from PRINTER_QA does not rely on Manufacturer/owner's key $K_0$. This means that precisely the same mechanism can be used to read and authenticate the OEM data also stored in PRINTER_QA. Of course this must be done by Manufacturer/owner supervisor code so that SoPEC_id key is not revealed.

If the OEM also requires upgradable parameters, we can add an extra key to PRINTER_QA, where that key is an OEM_key and has write permissions to the OEM part of $M_0$.

In this way, $K_1$ never needs to be known by anyone except the SoPEC and PRINTER_QA.

Each printing SoPEC in a multi-SoPEC system need access to a PRINTER_QA chip that contains the appropriate SoPEC_id_key to validate ink useage and operating parameters. This can be accomplished by a separate PRINTER_QA for each SoPEC, or by adding extra keys (multiple SoPEC_id_keys) to a single PRINTER_QA.

However, if ink usage is not being validated (e.g. if print speed were the only Manufacturer/owner upgradable parameter) then not all SoPECs require access to a PRINTER_QA chip that contains the appropriate SoPEC_id_key. Assuming that OEM program code controls the physical motor speed (different motors per OEM), then the PHI within the first (or only) front-page SoPEC can be programmed to accept (or generate) line sync pulses no faster than a particular rate. If line syncs arrived faster than the particular rate, the PHI would simply print at the slower rate. If the motor speed was hacked to be fast, the print image will appear stretched.

3.6.5.1 Floating Operating Parameters and Dongles

As described in Section 2.1.2, Manufacturer/owner operating parameters include such items as print speed, print quality etc. and are tied to a license provided to an OEM. These parameters are under Manufacturer/owner control. The licensed Manufacturer/owner operating parameters are typically stored in the PRINTER_QA as described in Section 3.6.5.

However there are situations when it is desirable to have a floating upgrade to a license, for use on a printer of the user's choice. For example, OEMs may sell a speed-increase license upgrade that can be plugged into the printer of the user's choice. This form of upgrade can be considered a floating upgrade in that it upgrades whichever printer it is currently plugged into. This dongle is referred to as ADDITIONAL_PRINTER_QA. The software checks for the existence of an ADDITIONAL_PRINTER_QA, and if present the operating parameters are chosen from the values stored on both QA chips.

The basic problem of authenticating the additional operating parameters boils down to the problem that we don't trust ADDITIONAL_PRINTER_QA. Therefore we need a system whereby a given SoPEC can perform an authenticated read of the data in ADDITIONAL_PRINTER_QA.

We should not write the SoPEC_id_key to a key in the ADDITIONAL_PRINTER_QA because:

then it will be tied specifically to that SoPEC, and the primary intention of the ADDITIONAL_PRINTER_QA is that it be floatable;

the ink cartridge would then not work in another printer since the other printer would not know the old SoPEC_id_key (knowledge of the old key is required in order to change the old key to a new one).

updating keys is not power-safe (i.e. if at the user's site, power is removed mid-update, the ADDITIONAL_PRINTER_QA could be rendered useless)

The proposed solution is to let ADDITIONAL_PRINTER_QA have two keys:

$K_0$=FloatingPrintEngineLicense_key. This key has the same function as the PrintEngineLicense_key in the PRINTER_QA[4] in that $K_0$ has write permissions to the Manufacturer/owner upgradeable region of $M_0$ on ADDITIONAL_PRINTER_QA.

[4]This can be identical to PrintEngineLicense_key in the PRINTER_QA if it is desireable (unlikely) that upgraders can function on PRINTER_QAs as well as ADDITIONAL_PRINTER_QAs $K_1$=UseExtParmsLicense_key. This key is constant for all of the ADDITIONAL_PRINTER_QAs for a given license agreement between an OEM and a Manufacturer/owner ComCo (this is not the same key as PrintEngineLicense_key which is stored as $K_0$ in PRINTER_QA). $K_1$ has no write permissions to anything.

$K_0$ is used to allow writes to the various fields containing operating parameters in the ADDITIONAL_PRINTER_QA. These writes/upgrades are performed using the standard upgrade protocol described in [5], with ADDITIONAL_PRINTER_QA acting as the ChipU, and the external upgrader acting as the ChipS. The upgrader (ChipS) also needs to check the appropriate licensing parameters such as OEM_Id for validity.

$K_1$ is used to allow SoPEC to authenticate reads of the ink remaining and any other ink data. This is accomplished by having the same UseExtParmsLicense_key within PRINTER_QA (e.g. in $K_2$), also with no write permissions. i.e:

PRINTER_QA.$K_2$=UseExtParmsLicense_key. This key is constant for all of the PRINTER_QAs for a given license agreement between an OEM and a Manufacturer/owner ComCo. $K_2$ has no write permissions to anything.

This means there are two shared keys, with PRINTER_QA sharing both, and thereby acting as a bridge between INK_CA and SoPEC.

UseExtParmsLicense_key is shared between PRINTER_QA and ADDITIONAL_PRINTER_QA

SoPEC_id_key is shared between SoPEC and PRINTER_QA

All SoPEC has to do is do an authenticated read [6] from ADDITIONAL_PRINTER_QA, pass the data/signature to PRINTER_QA, let PRINTER_QA validate the data/signature, and get PRINTER_QA to produce a similar signature based on the shared SoPEC_id_key. It can do so using the Translate function [6]. SoPEC can then compare PRINTER_QA's signature with its own calculated signature (i.e. implement a Test function [6] in software on SoPEC), and if the signatures match, the data from ADDITIONAL_PRINTER_QA must be valid, and can therefore be trusted.

Once the data from ADDITIONAL_PRINTER_QA is known to be trusted, the various operating parameters such as OEM_Id can be checked for validity.

The actual steps of read authentication as performed by SoPEC are:

$R_{PRINTER}$ ←PRINTER__QA.random( )
$R_{DONGLE}$,$M_{DONGLE}$,$SIG_{DONGLE}$ ←DONGLE__QA.read(K1, $R_{PRINTER}$)
$R_{SOPEC}$ ←random( )
$R_{PRINTER}$, $SIG_{PRINTER}$ ←PRINTER__QA.translate(K2, $R_{DONGLE}$, $M_{DONGLE}$, $SIG_{DONGLE}$, K1, $R_{SOPEC}$)
$SIG_{SOPEC}$ ←HMAC__SHA__1(SoPEC__id__key, $M_{DONGLE}$ | $R_{PRINTER}$ | $R_{SOPEC}$)
If ($SIG_{PRINTER}$ = $SIG_{SOPEC}$)
// various parms inside $M_{DONGLE}$ (data read from ADDITIONAL__PRINTER__QA) is valid
Else
// the data read from ADDITIONAL__PRINTER__QA is not valid and cannot be trusted
EndIf 3.6.5.2 Dongles Tied to a Given SoPEC Section 3.6.5.1 describes floating dongles i.e. dongles that can be used on any SoPEC. Sometimes it is desirable to tie a dongle to a specific SoPEC.

Tying a QA_CHIP to be used only on a specific SoPEC can be easily accomplished by writing the PRINTER_QA's chipId (unique serial number) into an appropriate $M_0$ field on the ADDITIONAL_PRINTER_QA. The system software can detect the match and function appropriately. If there is no match, the software can ignore the data read from the ADDITIONAL_PRINTER_QA.

Although it is also possible to store the SoPEC_id_key in one of the keys within the dongle, this must be done in an environment where power will not be removed partway through the key update process (if power is removed during the key update there is a possibility that the dongle QA Chip may be rendered unusable, although this can be checked for after the power failure).

3.6.5.3 OEM Assembly-Line Test

Although an OEM should only be able sell the licensed operating parameters for a given Print Engine, they must be able to assembly-line test[5] or service/test the Print Engine with a different set of operating parameters e.g. a maximally upgraded Print Engine.

[5]This section is referring to assembly-line testing rather than development testing. An OEM can maximally upgrade a given Print Engine to allow developmental testing of their own OEM program code & mechanics.

Several different mechanisms can be employed to allow OEMs to test the upgraded capabilities of the Print Engine. At present it is unclear exactly what kind of assembly-line tests would be performed.

The simplest solution is to use an ADDITIONAL_PRINTER_QA (i.e. special dongle PRINTER_QA as described in Section 3.6.5.1). The ADDITIONAL_PRINTER_QA would contain the operating parameters that maximally upgrade the printer as long as the dongle is connected to the SoPEC. The exact connection may be directly electrical (e.g. via the standard QA Chip connections) or may be over the USB connection to the printer test host depending on the nature of the test. The exact preferred connection is yet to be determined.

In the testing environment, the ADDITIONAL_PRINTER_QA also requires a numberOfImpressions field inside $M_0$, which is writeable by $K_0$. Before the SoPEC prints a page at the higher speed, it decrements the numberOfImpressions counter, performs an authenticated read to ensure the count was decremented, and then prints the page. In this way, the total number of pages that can be printed at high speed is reduced in the event of someone stealing the ADDITIONAL_PRINTER_QA device. It also means that multiple test machines can make use of the same ADDITIONAL_PRINTER_QA.

3.6.6 Use of a PrintEngineLicense id

Manufacturer/owner O/S program code contains the OEM's asymmetric public key to ensure that the subsequent OEM program code is authentic—i.e. from the OEM. However given that SoPEC only contains a single root key, it is theoretically possible for different OEM's applications to be run identically physical Print Engines i.e. printer driver for OEM, run on an identically physical Print Engine from $OEM_2$.

To guard against this, the Manufacturer/owner O/S program code contains a PrintEngineLicense_id code (e.g. 16 bits) that matches the same named value stored as a fixed operating parameter in the PRINTER_QA (i.e. in $M_{1+}$). As with all other operating parameters, the value of PrintEngineLicense_id is stored in PRINTER_QA (and any ADDITIONAL_PRINTER_QA devices) at the same time as the other various PRINTER_QA customizations are being applied, before being shipped to the OEM site.

In this way, the OEMs can be sure of differentiating themselves through software functionality.

3.6.7 Authentication of Ink

The Manufacturer/owner O/S must perform ink authentication [6] during prints. Ink usage authentication makes use of counters in SoPEC that keep an accurate record of the exact number of dots printed for each ink.

The ink amount remaining in a given cartridge is stored in that cartridge's INK_QA chip. Other data stored on the INK_QA chip includes ink color, viscosity, Memjet firing pulse profile information, as well as licensing parameters such as OEM_ID, inkType, InkUsageLicense_ID, etc. This information is typically constant, and is therefore likely to be stored in $M_{1+}$ within INK_QA.

Just as the Print Engine operating parameters are validated by means of PRINTER_QA, a given Print Engine license may only be permitted to function with specifically licensed ink. Therefore the software on SoPEC could contain a valid set of ink types, colors, OEM_Ids, InkUsageLicense_Ids etc. for subsequent matching against the data in the INK_QA.

SoPEC must be able to authenticate reads from the INK_QA, both in terms of ink parameters as well as ink remaining.

To authenticate ink a number of steps must be taken:

restrict access to dot counts authenticate ink usage and ink parameters via INK_QA and PRINTER_QA broadcast ink dot usage to all SoPECs in a multi-SoPEC system 3.6.7.1 Restrict Access to Dot Counts Since the dot counts are accessed via the PHI in the PEP section of SoPEC, access to these registers (and more generally all PEP registers) must be only available from supervisor mode, and not by OEM code (running in user mode). Otherwise it might be possible for OEM program code to clear dot counts before authentication has occurred.

3.6.7.2 Authenticate Ink Usage and Ink Parameters via INK_QA and PRINTER_QA

The basic problem of authentication of ink remaining and other ink data boils down to the problem that we don't trust INK_QA. Therefore how can a SoPEC know the initial value of ink (or the ink parameters), and how can a SoPEC know that after a write to the INK_QA, the count has been correctly decremented.

Taking the first issue, which is determining the initial ink count or the ink parameters, we need a system whereby a given SoPEC can perform an authenticated read of the data in INK_QA.

We cannot write the SoPEC_id_key to the INK_QA for two reasons:

updating keys is not power-safe (i.e. if power is removed mid-update, the INK_QA could be rendered useless)

the ink cartridge would then not work in another printer since the other printer would not know the old SoPEC_id_key (knowledge of the old key is required in order to change the old key to a new one).

The proposed solution is to let INK_QA have two keys:

$K_0$=SupplyInkLicense_key. This key is constant for all ink cartridges for a given ink supply agreement between an OEM and a Manufacturer/owner ComCo (this is not the same key as PrintEngineLicense_key which is stored as $K_0$ in PRINTER_QA). $K_0$ has write permissions to the ink remaining regions of $M_0$ on INK_QA.

$K_1$=UseInkLicense_key. This key is constant for all ink cartridges for a given ink usage agreement between an OEM and a Manufacturer/owner ComCo (this is not the same key as PrintEngineLicense_key which is stored as $K_0$ in PRINTER_QA). $K_1$ has no write permissions to anything.

$K_0$ is used to authenticate the actual upgrades of the amount of ink remaining (e.g. to fill and refill the amount of ink). Upgrades are performed using the standard upgrade protocol described in [5], with INK_QA acting as the ChipU, and the external upgrader acting as the ChipS. The fill and refill upgrader (ChipS) also needs to check the appropriate ink licensing parameters such as OEM_Id, InkType and InkUsageLicense_Id for validity.

$K_1$ is used to allow SoPEC to authenticate reads of the ink remaining and any other ink data. This is accomplished by having the same UseInkLicense_key within PRINTER_QA (e.g. in $K_2$ or $K_3$), also with no write permissions.

This means there are two shared keys, with PRINTER_QA sharing both, and thereby acting as a bridge between INK_QA and SoPEC.

UseInkLicense_key is shared between INK_QA and PRINTER_QA

SoPEC_id_key is shared between SoPEC and PRINTER_QA

All SoPEC has to do is do an authenticated read [6] from INK_QA, pass the data/signature to PRINTER_QA, let PRINTER_QA validate the data/signature and get PRINTER_QA to produce a similar signature based on the shared SoPEC_id_key (i.e. the Translate function [6]). SoPEC can then compare PRINTER_QA's signature with its own calculated signature (i.e. implement a Test function [6] in software on the SoPEC), and if the signatures match, the data from INK_QA must be valid, and can therefore be trusted.

Once the data from INK_QA is known to be trusted, the amount of ink remaining can be checked, and the other ink licensing parameters such as OEM_ID, InkType, InkUsageLicense_Id can be checked for validity.

The actual steps of read authentication as performed by SoPEC are:

```
R_PRINTER ← PRINTER_QA.random( )
R_INK, M_INK, SIG_INK ← INK_QA.read(K1, R_PRINTER)   //   read
with  key1:
UseInkLicense_key
R_SOPEC ← random( )
R_PRINTER, SIG_PRINTER ← PRINTER_QA.translate (K2, R_INK,
M_INK, SIG_INK, K1,
R_SOPEC)
SIG_SOPEC ← HMAC_SHA_1(SoPEC_id_key, M_INK | R_PRINTER |
R_SOPEC)
If (SIG_PRINTER= SIG_SOPEC)
    // M_INK (data read from INK_QA) is valid
    // M_INK could be ink parameters, such as
    InkUsageLicense_Id, or
ink remaining
    If (M_INK.inkRemaining = expectedInkRemaining)
        // all is ok
    Else
        // the ink value is not what we wrote, so don't print
anything anymore
    EndIf
Else
    // the data read from INK_QA is not valid and cannot be
    trusted
EndIf
```

Strictly speaking, we don't need a nonce ($R_{SOPEC}$) all the time because $M_A$ (containing the ink remaining) should be decrementing between authentications. However we do need one to retrieve the initial amount of ink and the other ink parameters (at power up). This is why taking a random number from the WatchDogTimer at the receipt of the first page is acceptable.

In summary, the SoPEC performs the non-authenticated write [6] of ink remaining to the INK_QA chip, and then performs an authenticated read of the data via the PRINTER_QA as per the pseudocode above. If the value is authenticated, and the INK_QA ink-remaining value matches the expected value, the count was correctly decremented and the printing can continue.

3.6.7.3 Broadcast Ink Dot Usage to all SoPECs in a Multi-SoPEC System

In a multi-SoPEC system, each SoPEC attached to a printhead must broadcast its ink usage to all the SoPECs. In this way, each SoPEC will have its own version of the expected ink usage.

In the case of a man-in-the-middle attack, at worst the count in a given SoPEC is only its own count (i.e. all broadcasts are turned into 0 ink usage by the man-in-the-middle). We would also require the broadcast amount to be treated as an unsigned integer to prevent negative amounts from being substituted.

A single SoPEC performs the update of ink remaining to the INK_QA chip, and then all SoPECs perform an authenticated read of the data via the appropriate PRINTER_QA (the PRINTER_QA that contains their matching SoPEC_id_key—remember that multiple SoPEC_id_keys can be stored in a single PRINTER_QA). If the value is authenticated, and the INK_QA value matches the expected value, the count was correctly decremented and the printing can continue.

If any of the broadcasts are not received, or have been tampered with, the updated ink counts will not match. The only case this does not cater for is if each SoPEC is tricked (via a USB2 inter-SoPEC-comms man-in-the-middle attack) into a total that is the same, yet not the true total. Apart from the fact that this is not viable for general pages, at worst this is the maximum amount of ink printed by a single SoPEC. We don't care about protecting against this case.

Since a typical maximum is 4 printing SoPECs, it requires at most 4 authenticated reads. This should be completed within 0.5 seconds, well within the 1–2 seconds/page print time.

3.6.8 Example Hierarchy

Adding an extra bootloader step to the example from Section 3.6.2, we can break up the contents of program space into logical sections, as shown in Table 227. Note that the ComCo does not provide any program code, merely operating parameters that is used by the O/S.

TABLE 227

Sections of Program Space

| section | contents | verifies |
|---|---|---|
| 0 (ROM) | boot loader 0 SHA-1 function asymmetric decrypt function boot0key | section 1 via boot0key |
| 1 | boot loader 1 SoPEC_OS_public_key | section 2 via SoPEC_OS_public_key |
| 2 | Manufacturer/owner O/S program code function to generate SoPEC_id_key from SoPEC_id Basic Print Engine ComCo_public_key | section 3 via ComCo_public_key section 4 via OEM_public_key (supplied in section 3) PRINTER_QA data, which includes the PrintEngineLicense_id, Manufacturer/owner operating parameters, and OEM operating parameters (all authenticated via SoPEC_id_key) |
| 3 | ComCo license agreement operating parameter ranges, including PrintEngineLicense_id (gets loaded into supervisor mode section of memory) OEM_public_key (gets loaded into supervisor mode section of memory) Any ComCo written user-mode program code (gets loaded into mode mode section of memory) | Is used by section 2 to verify section 4 and range of parameters as found in PRINTER_QA |
| 4 | OEM specific program code | OEM operating parameters via calls to Manufacturer/owner O/S code |

The verification procedures will be required each time the CPU is woken up, since the RAM is not preserved.

3.6.9 What if the CPU is Not Fast Enough?

In the example of Section 3.6.8, every time the CPU is woken up to print a document it needs to perform:

SHA-1 on all program code and program data 4 sets of asymmetric decryption to load the program code and data 1 HMAC-SHA1 generation per 512-bits of Manufacturer/owner and OEM printer and ink operating parameters Although the SHA-1 and HMAC process will be fast enough on the embedded CPU (the program code will be executing from ROM), it may be that the asymmetric decryption will be slow. And this becomes more likely with each extra level of authentication. If this is the case (as is likely), hardware acceleration is required.

A cheap form of hardware acceleration takes advantage of the fact that in most cases the same program is loaded each time, with the first time likely to be at power-up. The hardware acceleration is simply data storage for the authorizedDigest which means that the boot procedure now is:

```
slowCPU_bootloader0(data, sig)
    localDigest ←SHA-1(data)
    If (localDigest = previouslyStoredAuthorizedDigest)
        jump to program code at data-start address// will never
return
    Else
        authorizedDigest ←decrypt(sig, boot0key)
        expectedDigest = 0x00|0x01|0xFF..0xFF|
            0x003021300906052B0E03021A05000414 |
            localDigest)
        If (authorizedDigest == expectedDigest)
        previouslyStoredAuthorizedDigest ←localDigest
            jump to program code at data-start address// will
```

-continued

```
never return
                Else
                // program code is unauthorized
        EndIf
```

This procedure means that a reboot of the same authorized program code will only require SHA-1 processing. At power-up, or if new program code is loaded (e.g. an upgrade of a driver over the internet), then the full authorization via asymmetric decryption takes place. This is because the stored digest will not match at power-up and whenever a new program is loaded.

The question is how much preserved space is required.

Each digest requires 160 bits (20 bytes), and this is constant regardless of the asymmetric encryption scheme or the key length. While it is possible to reduce this number of bits, thereby sacrificing security, the cost is small enough to warrant keeping the full digest.

However each level of boot loader requires its own digest to be preserved. This gives a maximum of 20 bytes per loader. Digests for operating parameters and ink levels may also be preserved in the same way, although these authentications should be fast enough not to require cached storage.

Assuming SoPEC provides for 12 digests (to be generous), this is a total of 240 bytes. These 240 bytes could easily be stored as 60×32-bit registers, or probably more conveniently as a small amount of RAM (eg 0.25–1 Kbyte). Providing something like 1 Kbyte of RAM has the advantage of allowing the CPU to store other useful data, although this is not a requirement.

In general, it is useful for the boot ROM to know whether it is being started up due to power-on reset, GPIO activity, or activity on the USB2. In the former case, it can ignore the previously stored values (either 0 for registers or garbage for RAM). In the latter cases, it can use the previously stored values. Even without this, a startup value of 0 (or garbage) means the digest won't match and therefore the authentication will occur implictly.

3.7 SoPEC Phsyical Identification

There must be a mapping of logical to physical since specific SoPECs are responsible for printing on particular physical parts of the page, and/or have particular devices attached to specific pins.

The identification process is mostly solved by general USB2 enumeration.

Each slave SoPEC will need to verify the boot broadcast messages received over USB2, and only execute the code if the signatures are valid. Several levels of authorization may occur. However, at some stage, this common program code (broadcast to all of the slave SoPECs and signed by the appropriate asymmetric private key) can, among other things, set the slave SoPEC's id relating to the physical location. If there is only 1 slave, the id is easy to determine, but if there is more than 1 slave, the id must be determined in some fashion. For example, physical location/id determination may be:

- given by the physical USB2 port on the master
- related to the physical wiring up of the USB2 interconnects
- based on GPIO wiring. On other systems, a particular physical arrangement of SoPECs may exist such that each slave SoPEC will have a different set of connections on GPIOs. For example, one SoPEC maybe in charge of motor control, while another may be driving the LEDs etc. The unused GPIO pins (not necessarily the same on each SoPEC) can be set as inputs and then tied to 0 or 1. As long as the connection settings are mutually exclusive, program code can determine which is which, and the id appropriately set.

This scheme of slave SoPEC identification does not introduce a security breach. If an attacker rewires the pinouts to confuse identification, at best it will simply cause strange printouts (e.g. swapping of printout data) to occur, while at worst the Print Engine will simply not function.

3.8 Setting Up QA Chip Keys

In use, each INK_QA chip needs the following keys:

$K_0$=SupplyInkLicense_key $K_1$=UseInkLicense_key

Each PRINTER_QA chip tied to a specific SoPEC requires the following keys:

$K_0$=PrintEngineLicense_key $K_1$=SoPEC_id_key $K_2$=UseExtParmsLicense_key $K_3$=UseInkLicense_key Note that there may be more than one $K_1$ depending on the number of PRINTER_QA chips and SoPECs in a system. These keys need to be appropriately set up in the QA Chips before they will function correctly together.

3.8.1 Original QA Chips as Received by a ComCo

When original QA Chips are shipped from QACo to a specific ComCo their keys are as follows:

$K_0$=QACo_ComCo_Key0

$K_1$=QACo_ComCo_Key1

$K_2$=QACo_ComCo_Key2

$K_3$=QACo_ComCo_Key3

All 4 keys are only known to QACo. Note that these keys are different for each QA ChIP.

3.8.2 Steps at the ComCo

The ComCo is responsible for making Print Engines out of Memjet printheads, QA Chips, PECs or SoPECs, PCBs etc.

In addition, the ComCo must customize the INK_QA chips and PRINTER_QA chip on-board the print engine before shipping to the OEM.

There are two stages:

- replacing the keys in QA Chips with specific keys for the application (i.e. INK_QA and PRINTER_QA)
- setting operating parameters as per the license with the OEM 3.8.2.1 Replacing Keys The ComCo is issued QID hardware [4] by QACo that allows programming of the various keys (except for $K_1$) in a given QA Chip to the final values, following the standard ChipF/ChipP replace key (indirect version) protocol [6]. The indirect version of the protocol allows each QACo_ComCo_Key to be different for each SoPEC.

In the case of programming of PRINTER_QA's $K_1$ to be SoPEC_id_key, there is the additional step of transferring an asymmetrically encrypted SoPEC_id_key (by the public-key) along with the nonce ($R_p$) used in the replace key protocol to the device that is functioning as a ChipF. The ChipF must decrypt the SoPEC_id_key so it can generate the standard replace key message for PRINTER_QA (functioning as a ChipP in the ChipF/ChipP protocol). The asymmetric key pair held in the ChipF equivalent should be unique to a ComCo (but still known only by QACo) to prevent damage in the case of a compromise.

Note that the various keys installed in the QA Chips (both INK_QA and PRINTER_QA) are only known to the QACo. The OEM only uses QIDs and QACo supplied ChipFs. The replace key protocol [6] allows the programming to occur without compromising the old or new key.

3.8.2.2 Setting Operating Parameters

There are two sets of operating parameters stored in PRINTER_QA and INK_QA:

fixed upgradable

The fixed operating parameters can be written to by means of a non-authenticated writes [6] to $M_{1+}$ via a QID [4], and permission bits set such that they are ReadOnly.

The upgradable operating parameters can only be written to after the QA Chips have been programmed with the correct keys as per Section 3.8.2.1. Once they contain the correct keys they can be programmed with appropriate operating parameters by means of a QID and an appropriate ChipS (containing matching keys).

Authentication Protocols

1 Introduction

The following describes authentication protocols for general authentication applications, but with specific reference to the QA ChIP.

The intention is to show the broad form of possible protocols for use in different authentication situations, and can be used as a reference when subsequently defining an implementation specification for a particular application. As mentioned earlier, although the protocols are described in relation to a printing environment, many of them have wider application such as, but not limited to, those described at the end of this specification.

2 Nomenclature

The following symbolic nomenclature is used throughout this document:

TABLE 228

Summary of symbolic nomenclature

| Symbol | Description |
|---|---|
| F[X] | Function F, taking a single parameter X |
| F[X, Y] | Function F, taking two parameters, X and Y |
| $X \mid Y$ | X concatenated with Y |
| $X \wedge Y$ | Bitwise X AND Y |
| $X \vee Y$ | Bitwise X OR Y (inclusive-OR) |
| $X \oplus Y$ | Bitwise X XOR Y (exclusive-OR) |
| $\neg X$ | Bitwise NOT X (complement) |
| $X \leftarrow Y$ | X is assigned the value Y |
| $X \leftarrow \{Y, Z\}$ | The domain of assignment inputs to X is Y and Z |
| X = Y | X is equal to Y |
| $X \neq Y$ | X is not equal to Y |
| $\Downarrow X$ | Decrement X by 1 (floor 0) |
| $\Uparrow X$ | Increment X by 1 (modulo register length) |
| Erase X | Erase Flash memory register X |
| SetBits[X, Y] | Set the bits of the Flash memory register X based on Y |
| $Z \leftarrow$ShiftRight[X, Y] | Shift register X right one bit position, taking input bit from Y and placing the output bit in Z |

3 Pseudocode 3.1 Asynchronous

The following pseudocode:

var=expression means the var signal or output is equal to the evaluation of the expression.

3.2 Synchronous

The following pseudocode:

var←expression means the var register is assigned the result of evaluating the expression during this cycle.

3.3 Expression

Expressions are defined using the nomenclature in Table 228 above. Therefore:

var=(a=b)

is interpreted as the var signal is 1 if a is equal to b, and 0 otherwise.

4. Intentionally Blank

5 Basic Protocols 5.1 Protocol Background

This protocol set is a restricted form of a more general case of a multiple key single memory vector protocol. It is a restricted form in that the memory vector M has been optimized for Flash memory utilization:

M is broken into multiple memory vectors (semi-fixed and variable components) for the purposes of optimizing flash memory utilization. Typically M contains some parts that are fixed at some stage of the manufacturing process (eg a batch number, serial number etc.), and once set, are not ever updated. This information does not contain the amount of consumable remaining, and therefore is not read or written to with any great frequency.

We therefore define $M_0$ to be the M that contains the frequently updated sections, and the remaining Ms to be rarely written to. Authenticated writes only write to $M_0$, and non-authenticated writes can be directed to a specific $M_n$. This reduces the size of permissions that are stored in the QA Chip (since key-based writes are not required for Ms other than $M_0$). It also means that $M_0$ and the remaining Ms can be manipulated in different ways, thereby increasing flash memory longevity.

5.2 Requirements of Protocol

Each QA Chip contains the following values:

N The maximum number of keys known to the chip.

T The number of vectors M is broken into.

$K_N$ Array of N secret keys used for calculating $F_{K_n}[X]$ where $K_n$ is the nth element of the array.

R Current random number used to ensure time varying messages. Each chip instance must be seeded with a different initial value. Changes for each signature generation.

$M_T$ Array of T memory vectors. Only $M_0$ can be written to with an authorized write, while all Ms can be written to in an unauthorized write. Writes to $M_0$ are optimized for Flash usage, while updates to any other $M_{1+}$ are expensive with regards to Flash utilization, and are expected to be only performed once per section of $M_n$. $M_1$ contains T, N and f in ReadOnly form so users of the chip can know these two values.

$P_{T+N}$ T+N element array of access permissions for each part of M. Entries n={0 . . . T−1} hold access permissions for non-authenticated writes to $M_n$ (no key required). Entries n={T to T+N−1}hold access permissions for authenticated writes to $M_0$ for $K_n$. Permission choices for each part of M are Read Only, Read/Write, and Decrement Only.

C 3 constants used for generating signatures. $C_1$, $C_2$, and $C_3$ are constants that pad out a sub-message to a hashing boundary, and all 3 must be different.

Each QA Chip contains the following private function:

$S_{Kn}$[N,X] Internal function only. Returns $S_{Kn}$[X], the result of applying a digital signature function S to X based upon the appropriate key $K_n$. The digital signature must be long enough to counter the chances of someone generating a random signature. The length depends on the signature scheme chosen, although the scheme chosen for the QA Chip is HMAC-SHA1, and therefore the length of the signature is 160 bits.

Additional functions are required in certain QA Chips, but these are described as required.

5.3 Read protocols

The set of read protocols describe the means by which a System reads a specific data vector $M_t$ from a QA Chip referred to as ChipR.

We assume that the communications link to ChipR (and therefore ChipR itself) is not trusted. If it were trusted, the System could simply read the data and there is no issue. Since the communications link to ChipR is not trusted and ChipR cannot be trusted, the System needs a way of authenticating the data as actually being from a real ChipR.

Since the read protocol must be capable of being implemented in physical QA Chips, we cannot use asymmetric cryptography (for example the ChipR signs the data with a private key, and System validates the signature using a public key).

This document describes two read protocols:

direct validation of reads indirect validation of reads.

5.3.1 Direct Validation of Reads

In a direct validation read protocol we require two QA Chips: ChipR is the QA Chip being read, and ChipT is the QA Chip we entrust to tell us whether or not the data read from ChipR is trustworthy. The basic idea is that system asks ChipR for data, and ChipR responds with the data and a signature based on a secret key. System then asks ChipT whether the signature supplied by ChipR is correct. If ChipT responds that it is, then System can trust that data just read from ChipR. Every time data is read from ChipR, the validation procedure must be carried out.

Direct validation requires the System to trust the communication line to ChipT. This could be because ChipT is in physical proximity to the System, and both System and ChipT are in a trusted (e.g. Silverbrook secure) environment. However, since we need to validate the read, ChipR by definition must be in a non-trusted environment.

Each QA Chip protects its signature generation or verification mechanism by the use of a nonce.

The protocol requires the following publicly available functions in ChipT:

Random[] Returns R (does not advance R).

Test[n,X, Y, Z] Advances R and returns 1 if $S_{Kn}$[R|X|$C_1$|Y]=Z. Otherwise returns 0. The time taken to calculate and compare signatures must be independent of data content.

The protocol requires the following publicly available functions in ChipR:

Read[n, t, X] Advances R, and returns R, $M_t$, $S_{Kn}$[X|R|$C_1$|$M_t$]. The time taken to calculate the signature must not be based on the contents of X, R, $M_t$, or K. If t is invalid, the function assumes t=0.

To read ChipR's memory $M_t$ in a validated way, System performs the following tasks:

a. System calls ChipT's Random function;

b. ChipT returns $R_T$ to System;

c. System calls ChipR's Read function, passing in some key number n1, the desired data vector number t, and $R_T$ (from b);

d. ChipR updates $R_R$, then calculates and returns $R_R$, $M_{Rt}$, $S_{Kn1}$[$R_T$|$R_R$|$C_1$|$M_{Rt}$];

e. System calls ChipT's Test function, passing in the key to use for signature verification n2, and the results from d (i.e. $R_R$, $M_{Rt}$, $S_{Kn1}$[$R_T$|$R_R$|$C_1$|$M_{Rt}$]);

f. System checks response from ChipT. If the response is 1, then the $M_t$ read from ChipR is considered to be valid. If 0, then the $M_t$ read from ChipR is considered to be invalid.

The choice of n1 and n2 must be such that ChipR's $K_{n1}$=ChipT's $K_{n2}$.

Figure 328:
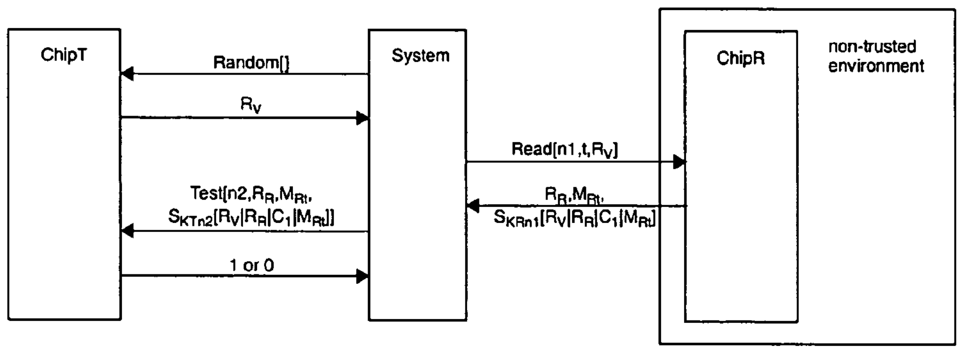
FIG. 328 shows protocol for directly verifying reads from ChipR

The data flow for this read protocol is shown in FIG. 328.

From the System's perspective, the protocol would take on a form like the following pseudocode:

```
R_T ←ChipT.Random( )
R_R, M_R, SIG_R ←ChipR.Read(keyNumOnChipR,desiredM, R_T)
ok ←ChipT.Test(keyNumOnChipT, R_R, M_R, SIG_R)
If (ok = 1)
// M_R is to be trusted
Else
// M_R is not to be trusted
EndIf
```

With regards to security, if an attacker finds out ChipR's $K_{n1}$, they can replace the ChipR by a fake ChipR because they can create signatures. Likewise, if an attacker finds out ChipT's $K_{n2}$, they can replace the ChipR by a fake ChipR because ChipR's $K_{n1}$=ChipT's $K_{n2}$. Moreover, they can use the ChipRs on any system that shares the same key.

The only way of restricting exposure due to key reveals is to restrict the number of systems that match ChipR and ChipT. i.e. vary the key as much as possible. The degree to which this can be done will depend on the application. In the case of a PRINTER_QA acting as a ChipT, and an INK_QA acting as a ChipR, the same key must be used on all systems where the particular INK_QA data must be validated.

In all cases, ChipR must contain sufficient information to produce a signature. Knowing (or finding out) this information, whatever form it is in, allows clone ChipRs to be built.

5.3.2 Indirect Validation of Reads

In a direct validation protocol (see Section 5.3.1), the System validates the correctness of data read from ChipR by means of a trusted chip ChipT. This is possible because ChipR and ChipT share some secret information.

However, it is possible to extend trust via indirect validation. This is required when we trust ChipT, but ChipT doesn't know how to validate data from ChipR. Instead, ChipT knows how to validate data from ChipI (some intermediate chip) which in turn knows how to validate data from either another ChipI (and so on up a chain) or ChipR. Thus we have a chain of validation.

The means of validation chains is translation of signatures. $ChipI_n$ translates signatures from higher up the chain (either $ChipI_{n-1}$ or from ChipR at the start of the chain) into signatures capable of being passed to the next stage in the chain (either $ChipI_{n+1}$ or to ChipT at the end of the chain). A given ChipI can only translate signatures if it knows the key of the previous stage in the chain as well as the key of the next stage in the chain.

The protocol requires the following publicly available functions in ChipI:

Random[ ] Returns R (does not advance R).

Translate[n1,X, Y, Z,n2,A] Returns 1, $S_{Kn2}$[A|R|$C_1$|Y] and advances R if Z=$S_{Kn1}$[R|X|$C_1$|Y].

Otherwise returns 0, 0. The time taken to calculate and compare signatures must be independent of data content.

Figure 329:
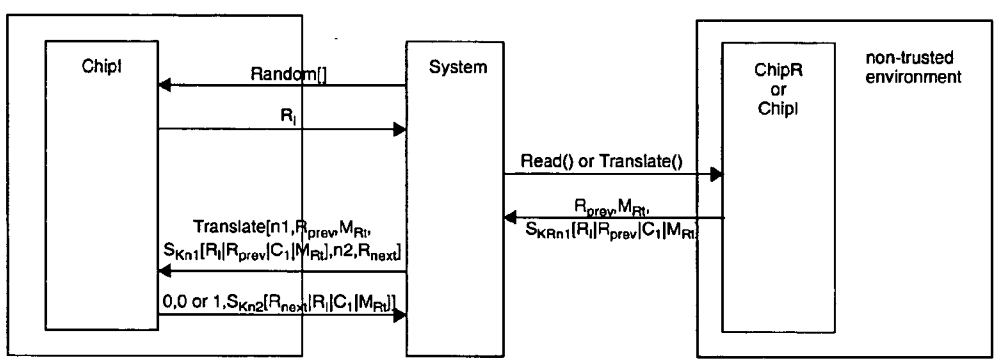
FIG. 329 shows a protocol for signature translation protocol

The data flow for this signature translation protocol is shown in FIG. 329:

Note that $R_{prev}$ is eventually $R_R$, and $R_{next}$ is eventually $R_T$. In the multiple ChipI case, $R_{prev}$ is the $R_I$ of $ChipI_{n-1}$ and $R_{next}$ is $R_I$ of $ChipI_{n+1}$. The $R_{prev}$ of the first ChipI in the chain is $R_R$, and the $R_{next}$ of the last ChipI in the chain is $R_T$.

Assuming at least 1 ChipT, the System would need to perform the following tasks in order to read ChipR's memory $M_t$ in an indirectly validated way:

a. System calls $ChipI_n$'s Random function;

b. $ChipI_0$ returns $R_{I0}$ to System;

c. System calls ChipR's Read function, passing in some key number n0, the desired data vector number t, and $R_{I0}$ (from b);

d. ChipR updates $R_R$, then calculates and returns $R_R$, $M_{Rt}$, $S_{Kn0}$[$R_{In}$|$R_R$|$C_1$|$M_{Rt}$];

e. System assigns $R_R$ to $R_{prev}$ and $S_{Kn0}$[$R_{In}$|$R_R$|$C_1$|$M_{Rt}$] to $SIG_{prev}$ f. System calls the next-chip-in-the-chain's Random function (either $ChipI_{n+}$, or ChipT)

g. The next-chip-in-the-chain will return $R_{next}$ to System h. System calls $ChipI_n$'s Translate function, passing in n1$_n$ (translation input key number), $R_{prev}$, $M_{Rt}$, $SIG_{prev}$), n2$_n$ (translation output key number) and the results from g ($R_{next}$);

i. ChipI returns testResult and $SIG_1$ to System j. If testResult=0, then the validation has failed, and the $M_t$ read from ChipR is considered to be invalid. Exit with failure.

k. If the next chip in the chain is a ChipI, assign $SIG_1$ to $SIG_{prev}$ and go to step f l. System calls ChipT's Test function, passing in $n_t$, $R_{prev}$, $M_{Rt}$, and $SIG_{prev}$;

m. System calls System checks response from ChipT. If the response is 1, then the $M_t$ read from ChipR is considered to be valid. If 0, then the $M_t$ read from ChipR is considered to be invalid.

For the Translate function to work, $ChipI_n$ and $ChipI_{n+1}$ must share a key. The choice of n1 and n2 in the protocol described must be such that $ChipI_n$'s $K_{n2}$=$ChipI_{n+1}$'s $K_{n1}$.

Note that Translate is essentially a "Test plus resign" function. From an implementation point of view the first part of Translate is identical to Test.

Note that the use of ChipIs and the translate function merely allows signatures to be transformed. At the end of the translation chain (if present) will be a ChipT requiring the use of a Test function.

There can be any number of ChipIs in the chain to ChipT as long as the Translate function is used to map signatures between $ChipI_n$ and $ChipI_{n+1}$ and so on until arrival at the final destination (ChipT).

From the System's perspective, a read protocol using at least 1 ChipI would take on a form like the following pseudocode:

```
Rnext ←ChipI[0].Random( )
Rprev, MR, SIGprev ←ChipR.Read(keyNumOnChipR, desiredM,
Rnext)
ok = 1
```

-continued

```
i = 0
while ((i < iMax) AND ok)
For i ←0 to iMax
If (i = iMax)
    Rnext ←ChipT.Random( )
Else
    Rnext ←ChipI[i+1].Random( )
EndIf
ok, SIGprev ←ChipI[i].Translate(iKey[i], Rprev, MR,
SIGprev, oKey[i], Rnext)
Rprev = Rnext
If (ok = 0)
    // MR is not to be trusted
EndIf
EndFor
ok ←ChipT.Test(keyNumOnChipT, Rprev, MR, SIGprev)
If (ok = 1)
// MR is to be trusted
Else
// MR is not to be trusted
EndIf
```

5.3.3 Additional Comments on Reads

In the Memjet printing environment, certain implementations will exist where the operating parameters are stored in QA Chips. In this case, the system must read the data from the QA Chip using an appropriate read protocol.

If the connection is trusted (e.g. to a virtual QA Chip in software), a generic Read is sufficient. If the connection is not trusted, it is ideal that the System have a trusted ChipT in the form of software (if possible) or hardware (e.g. a QA Chip on board the same silicon package as the microcontroller and firmware). Whether implemented in software or hardware, the QA Chip should contain an appropriate key that is unique per print engine. Such a key setup would allow reads of print engine parameters and also allow indirect reads of consumables (from a consumable QA ChIP).

If the ChipT is physically separate from System (e.g. ChipT is on a board connected to System) System must also occasionally (based on system clock for example) call ChipT's Test function with bad data, expecting a 0 response. This is to reduce the possibility of someone inserting a fake ChipT into the system that always returns 1 for the Test function.

5.4 Upgrade Protocols

This set of protocols describe the means by which a System upgrades a specific data vector $M_t$ within a QA Chip (ChipU). The data vector may contain information about the functioning of the device (e.g. the current maximum operating speed) or the amount of a consumable remaining.

The updating of $M_t$ in ChipU falls into two categories:

non-authenticated writes, where anyone is able to update the data vector authenticated writes, where only authorized entities are able to upgrades data vectors 5.4.1 Non-Authenticated Writes This is the most frequent type of write, and takes place between the System/consumable during normal everyday operation for $M_0$, and during the manufacturing process for $M_{1+}$.

In this kind of write, the System wants to change $M_t$ within ChipU subject to P. For example, the System could be decrementing the amount of consumable remaining. Although System does not need to know and of the $K_s$ or even have access to a trusted chip to perform the write, the System must follow a non-authenticated write by an authenticated read if it needs to know that the write was successful.

The protocol requires ChipU to contain the following publicly available function:

Write[t, X] Writes X over those parts of $M_t$ subject to $P_t$ and the existing value for M.

To authenticate a write of $M_{new}$ to ChipA's memory $M_{new}$:

a. System calls ChipU's Write function, passing in $M_{new}$;

b. The authentication procedure for a Read is carried out (see Section 5.3 on page 604);

c. If the read succeeds in such a way that $M_{new}$=M returned in b, the write succeeded. If not, it failed.

Note that if these parameters are transmitted over an error-prone communications line (as opposed to internally or using an additional error-free transport layer), then an additional checksum would be required to prevent the wrong M from being updated or to prevent the correct M from being updated to the wrong value. For example, SHA-1 [t,X] should be additionally transferred across the communications line and checked (either by a wrapper function around Write or in a variant of Write that takes a hash as an extra parameter).

This is the most frequent type of write, and takes place between the System/consumable during normal everyday operation for $M_0$, and during the manufacturing process for $M_{1+}$.

5.4.2 Authenticated Writes

In the QA Chip protocols, $M_0$ is defined to be the only data vector that can be upgraded in an authenticated way. This decision was made primarily to simplify flash management, although it also helps to reduce the permissions storage requirements.

In this kind of write, System wants to change Chip U's $M_0$ in an authorized way, without being subject to the permissions that apply during normal operation. For example, a consumable may be at a refilling station and the normally Decrement Only section of $M_0$ should be updated to include the new valid consumable. In this case, the chip whose $M_0$ is being updated must authenticate the writes being generated by the external System and in addition, apply the appropriate permission for the key to ensure that only the correct parts of $M_0$ are updated. Having a different permission for each key is required as when multiple keys are involved, all keys should not necessarily be given open access to $M_0$. For example, suppose $M_0$ contains printer speed and a counter of money available for franking. A ChipS that updates printer speed should not be capable of updating the amount of money. Since $P_{0 \ldots T-1}$ is used for non-authenticated writes, each $K_n$ has a corresponding permission $P_{T+n}$ that determines what can be updated in an authenticated write.

The basic principle of the authenticated write (or upgrade) protocol is that the new value for the $M_t$ must be signed before ChipU accepts it. The QA Chip responsible for generating the signature (ChipS) must first validate that the ChipU is valid by reading the old value for $M_t$. Once the old value is seen as valid, a new value can be signed by ChipS and the resultant data plus signature passed to ChipU. Note that both chips distrust each other.

There are two forms of authenticated writes. The first form is when both ChipU and ChipS directly store the same key. The second is when both ChipU and ChipS store different versions of the key and a transforming procedure is used on the stored key to generate the required key—i.e. the key is indirectly stored. The second form is slightly more complicated, and only has value when the ChipS is not readily available to an attacker.

5.4.2.1 Direct Authenticated Writes

The direct form of the authenticated write protocol is used when the ChipS and ChipU are equally available to an attacker. For example, suppose that ChipU contains a printer's operating speed. Suppose that the speed can be increased by purchasing a ChipS and inserting it into the printer system. In this case, the ChipS and ChipU are equally available to an attacker. This is different from upgrading the printer over the internet where the effective ChipS is in a remote location, and thereby not as readily available to an attacker.

The direct authenticated write protocol requires ChipU to contain the following publicly available functions:

Read[n, t, X] Advances R, and returns R, $M_t$, $S_{Kn}[X|R|C_1|M_t]$. The time taken to calculate the signature must not be based on the contents of X, R, $M_t$, or K.

WriteA[n, X, Y, Z] Advances R, replaces $M_0$ by Y subject to $P_{T+n}$, and returns 1 only if $SK_n[R|X|C_1|Y]$=Z. Otherwise returns 0. The time taken to calculate and compare signatures must be independent of data content. This function is identical to ChipT's Test function except that it additionally writes Y subject to $P_{T+n}$ to its M when the signature matches.

Authenticated writes require that the System has access to a ChipS that is capable of generating appropriate signatures.

In its basic form, ChipS requires the following variables and function:

SignM[n,V,W,X,Y,Z] Advances R, and returns R, $S_{Kn}[W|R|C_1|Z]$ only if $Y=S_{Kn}[V|W|C_1|X]$.

Otherwise returns all 0s. The time taken to calculate and compare signatures must be independent of data content.

To update ChipU's M vector:

a. System calls ChipU's Read function, passing in n1, 0 (desired vector number) and 0 (the random value, but is a don't-care value) as the input parameters;

b. ChipU produces $R_U$, $M_{U0}$, $S_{Kn1}[0|R_U|C_1|M_{U0}]$ and returns these to System;

c. System calls ChipS's SignM function, passing in n2 (the key to be used in ChipS), 0 (the random value as used in a), $R_U$, $M_{U0}$, $S_{Kn1}[0|R_U|C_1|M_{U0}]$, and $M_D$ (the desired vector to be written to ChipU);

d. ChipS produces $R_S$ and $S_{Kn2}[R_U|R_S|C_1|M_D]$ if the inputs were valid, and 0 for all outputs if the inputs were not valid.

e. If values returned in d are non zero, then ChipU is considered authentic. System can then call ChipU's WriteA function with these values from d.

f. ChipU should return a 1 to indicate success. A 0 should only be returned if the data generated by ChipS is incorrect (e.g. a transmission error).

The choice of n1 and n2 must be such that ChipU's $K_{n1}$=ChipS's $K_{n2}$.

Figure 330:
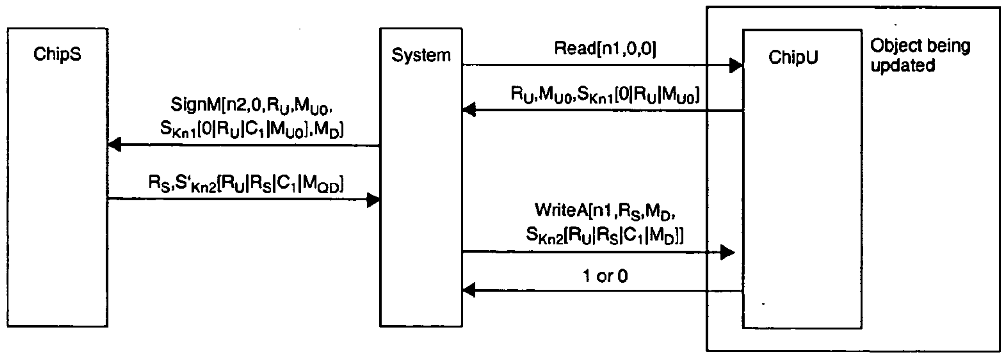
FIG. 330 shows a protocol for a direct authenticated write

The data flow for authenticated writes is shown in FIG. 330.

Note that this protocol allows ChipS to generate a signature for any desired memory vector MD, and therefore a stolen ChipS has the ability to effectively render the particular keys for those parts of $M_0$ in ChipU irrelevant.

It is therefore not recommended that the basic form of ChipS be ever implemented except in specifically controlled circumstances.

It is much more secure to limit the powers of ChipS. The following list covers some of the variants of limiting the power of ChipS:

a. the ability to upgrade a limited number of times
b. the ability to upgrade based on a credit value—i.e. the upgrade amount is decremented from the local value, and effectively transferred to the upgraded device
c. the ability to upgrade to a fixed value or from a limited list
d. the ability to upgrade to any value
e. the ability to only upgrade certain data fields within M In many of these variants, the ability to refresh the ChipS in some way (e.g. with a new count or credit value) would be a useful feature.

In certain cases, the variant is in ChipS, while ChipU remains the same. It may also be desirable to create a ChipU variant, for example only allowing ChipU to only be upgraded a specific number of times.

5.4.2.1.1 Variant Example

This section details the variant for the ability to upgrade a memory vector to any value a specific number of times, but the upgrade is only allowed to affect certain fields within the memory vector i.e. a combination of (a), (d), and (e) above.

In this example, ChipS requires the following variables and function:

CountRemaining Part of ChipS's $M_0$ that contains the number of signatures that ChipS is allowed to generate. Decrements with each successful call to SignM and SignP. Permissions in ChipS's $P_{0..T-1}$ for this part of $M_0$ needs to be ReadOnly once ChipS has been setup. Therefore CountRemaining can only be updated by another ChipS that will perform updates to that part of $M_0$ (assuming ChipS's Ps allows that part of $M_0$ to be updated).

Q Part of M that contains the write permissions for updating ChipU's M. By adding Q to ChipS we allow different ChipSs that can update different parts of $M_U$. Permissions in ChipS's $P_{0..T-1}$ for this part of M needs to be ReadOnly once ChipS has been setup. Therefore Q can only be updated by another ChipS that will perform updates to that part of M.

SignM[n,V,W,X,Y,Z] Advances R, decrements CountRemaining and returns R, $Z_{QX}$ (Z applied to X with permissions Q), $S_{Kn}[W|R|C_1|Z_{QX}]$ only if $Y=S_{Kn}[V|W|C_1|X]$ and CountRemaining>0. Otherwise returns all 0s. The time taken to calculate and compare signatures must be independent of data content.

To update ChipU's M vector:

a. System calls ChipU's Read function, passing in n1, 0 (desired vector number) and 0 (the random value, but is a don't-care value) as the input parameters;
b. ChipU produces $R_U$, $M_{U0}$, $S_{Kn1}[0|R_U|C_1|M_{U0}]$ and returns these to System;
c. System calls ChipS's SignM function, passing in n2 (the key to be used in ChipS), 0 (as used in a), $R_U$, $M_{U0}$, $S_{Kn1}[0|R_U|C_1|M_{U0}]$, and $M_D$ (the desired vector to be written to ChipU);
d. ChipS produces $R_S$, $M_{QD}$ (processed by running $M_D$ against $M_{U0}$ using Q) and $S_{Kn2}[R_U|R_S|C_1|M_{QD}]$ if the inputs were valid, and 0 for all outputs if the inputs were not valid.
e. If values returned in d are non zero, then ChipU is considered authentic. System can then call ChipU's WriteA function with these values from d.
f. ChipU should return a 1 to indicate success. A 0 should only be returned if the data generated by ChipS is incorrect (e.g. a transmission error).

The choice of n1 and n2 must be such that ChipU's $K_{n1}$=ChipS's $K_{n2}$.

Figure 331:
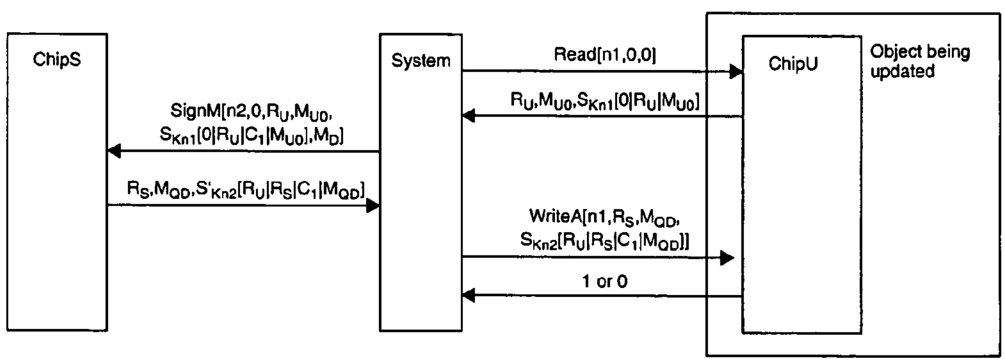
FIG. 331 shows an alternative protocol for a direct authenticated write

The data flow for this variant of authenticated writes is shown in FIG. 331.

Note that Q in ChipS is part of ChipS's M. This allows a user to set up ChipS with a permission set for upgrades. This should be done to ChipS and that part of M designated by $P_{0..T-1}$ set to ReadOnly before ChipS is programmed with $K_U$. If $K_S$ is programmed with $K_U$ first, there is a risk of someone obtaining a half-setup ChipS and changing all of $M_U$ instead of only the sections specified by Q.

In addition, CountRemaining in ChipS needs to be setup (including making it ReadOnly in $P_S$) before ChipS is programmed with $K_U$. ChipS should therefore be programmed to only perform a limited number of SignM operations (thereby limiting compromise exposure if a ChipS is stolen). Thus ChipS would itself need to be upgraded with a new CountRemaining every so often.

5.4.2.2 Indirect Authenticated Writes

This section describes an alternative authenticated write protocol when ChipU is more readily available to an attacker and ChipS is less available to an attacker. We can store different keys on ChipU and ChipS, and implement a mapping between them in such a way that if the attacker is able to obtain a key from a given ChipU, they cannot upgrade all ChipUs.

In the general case, this is accomplished by storing key $K_S$ on ChipS, and $K_U$ and f on ChipU. The relationship is $f(K_S)=K_U$ such that knowledge of $K_U$ and f does not make it easy to determine $K_S$. This implies that a one-way function is desirable for f.

In the QA Chip domain, we define f as a number (e.g. 32-bits) such that $SHA1(K_S|f)=K_U$. The value of f (random between chips) can be stored in a known location within $M_1$ as a constant for the life of the QA ChIP. It is possible to use the same f for multiple relationships if desired, since f is public and the protection lies in the fact that f varies between QA Chips (preferably in a non-predictable way).

The indirect protocol is the same as the direct protocol with the exception that f is additionally passed in to the SignM function so that ChipS is able to generate the correct key. The System obtains f by performing a Read of $M_1$. Note that all other functions, including the WriteA function in ChipU, are identical to their direct authentication counterparts.

SignM[f,n,V,W,X,Y,Z] Advances R, and returns R, $S_{f(Kn)}[W|R|C_1|Z]$ only if $Y=S_{f(Kn)}[V|W|C_1|X]$ and CountRemaining>0. Otherwise returns all 0s. The time taken to calculate and compare signatures must be independent of data content.

Before reading ChipU's memory $M_0$ (the pre-upgrade value), the System must extract f from ChipU by performing the following tasks:

a. System calls ChipU's Read function, passing in (dontCare, 1, dontCare)
b. ChipU returns $M_1$, from which System can extract $f_U$
c. System stores $f_U$ for future use To update ChipU's M vector, the protocol is identical to that described in the basic authenticated write protocol with the exception of steps c and d:

c. System calls ChipS's SignM function, passing in $f_U$, n2 (the key to be used in ChipS), 0 (as used in a), $R_U$, $M_{U0}$, $S_{Kn1}[0|R_U|C_1|M_{U0}]$, and $M_D$ (the desired vector to be written to ChipU);
d. ChipS produces $R_S$ and $S_{fU(Kn2)}[R_U|R_S|C_1|M_D]$ if the inputs were valid, and 0 for all outputs if the inputs were not valid.

In addition, the choice of n1 and n2 must be such that ChipU's $K_{n1}$=ChipS's $f_U(K_{n2})$.

Note that $f_U$ is obtained from $M_1$ without validation. This is because there is nothing to be gained by subverting the value of $f_U$, (because then the signatures won't match).

From the System's perspective, the protocol would take on a form like the following pseudocode:

```
dontCare, M_R, dontCare ←ChipR.Read(dontCare,1, dontCare)
f_R = extract from M_R
...
R_U, M_U, SIG_U ←ChipU.Read(keyNumOnChipU,0, 0)
R_S, SIG_S = ChipS.SignM2(f_R, keyNumOnChipS, 0, R_U, M_U, SIG_U, M_D)
If (R_S = SIG_S = 0)
    // ChipU and therefore M_U is not to be trusted
Else
    // ChipU and therefore M_U can be trusted
    ok = ChipU.WriteA(keyNumOnChipU, R_S, M_D, SIG_S)
    If (ok)
        // updating of data in ChipU was successful
    Else
        // transmission error during WriteA
    EndIf
EndIf
```

5.4.2.2.1 Variant Example

The indirect form of the example from Section 5.4.2.1.1 is shown here.

SignM[f,n,V,W,X,Y,Z] Advances R, decrements CountRemaining and returns R, $Z_{QX}$ (Z applied to X with permissions Q), $S_{f(Kn)}[W|R|C_1|Z_{QX}]$ only if $Y=S_{f(Kn)}[V|W|C_1X]$ and CountRemaining>0. Otherwise returns all 0s. The time taken to calculate and compare signatures must be independent of data content.

Before reading ChipU's memory $M_0$ (the pre-upgrade value), the System must extract f from ChipU by performing the following tasks:

a. System calls ChipU's Read function, passing in (dontCare, 1, dontCare)
b. ChipU returns $M_1$, from which System can extract $f_U$
c. System stores $f_U$ for future use To update ChipU's M vector, the protocol is identical to that described in the basic authenticated write protocol with the exception of steps c and d:

c. System calls ChipS's SignM function, passing in $f_U$, n2 (the key to be used in ChipS), 0 (as used in a), $R_U$, $M_{U0}$, $S_{Kn1}[0|R_U|C_1|M_{U0}]$, and $M_D$ (the desired vector to be written to ChipU);
d. ChipS produces $R_S$, $M_{QD}$ (processed by running $M_D$ against $M_{U0}$ using Q) and $S_{fU(Kn2)}[R_U|R_S|C_1|M_{QD}]$ if the inputs were valid, and 0 for all outputs if the inputs were not valid.

In addition, the choice of n1 and n2 must be such that ChipU's $K_{n1}$=ChipS's $f_U(K_{n2})$.

Note that $f_U$ is obtained from $M_1$ without validation. This is because there is nothing to be gained by subverting the value of $f_U$, (because then the signatures won't match).

From the System's perspective, the protocol would take on a form like the following pseudocode:

```
    dontCare, M_R, dontCare ←ChipR.Read(dontCare,1, dontCare)
    f_R = extract from M_R
    ...
    R_U, M_U, SIG_U ←ChipU.Read(keyNumOnChipU,0, 0)
    R_S, M_QD, SIG_S = ChipS.SignM2(f_R, keyNumOnChipS, 0, R_U, M_U,
    SIG_U, M_D)
    If (R_S = M_QD = SIG_S = 0)
        // ChipU and therefore M_U is not to be trusted
    Else
```

-continued

```
        // ChipU and therefore M_U can be trusted
        ok = ChipU.WriteA(keyNumOnChipU, R_S, M_QD, SIG_S)
        If (ok)
            // updating of data in ChipU was successful
        Else
            // transmission error during WriteA
        EndIf
    EndIf
```

5.4.3 Updating Permissions for Future Writes

In order to reduce exposure to accidental and malicious attacks on P (and certain parts of M), only authorized users are allowed to update P. Writes to P are the same as authorized writes to M, except that they update $P_n$ instead of M. Initially (at manufacture), P is set to be Read/Write for all M. As different processes fill up different parts of M, they can be sealed against future change by updating the permissions. Updating a chip's $P_{0..T-1}$ changes permissions for unauthorized writes to $M_n$, and updating $P_{T..T+N-1}$ changes permissions for authorized writes with key $K_n$.

$P_n$ is only allowed to change to be a more restrictive form of itself. For example, initially all parts of M have permissions of Read/Write. A permission of Read/Write can be updated to Decrement Only or Read Only. A permission of Decrement Only can be updated to become Read Only. A Read Only permission cannot be further restricted.

In this transaction protocol, the System's chip is referred to as ChipS, and the chip being updated is referred to as ChipU. Each chip distrusts the other.

The protocol requires the following publicly available functions in ChipU:

Random¬ Returns R (does not advance R).

SetPermission[n,p,X,Y,Z] Advances R, and updates $P_p$ according to Y and returns 1 followed by the resultant $P_p$ only if $S_{Kn1}[R|X|Y|C_2]$=Z. Otherwise returns 0. $P_p$ can only become more restricted. Passing in 0 for any permission leaves it unchanged (passing in Y=0 returns the current $P_p$).

Authenticated writes of permissions require that the System has access to a ChipS that is capable of generating appropriate signatures. ChipS requires the following variable:

CountRemaining Part of ChipS's $M_0$ that contains the number of signatures that ChipS is allowed to generate. Decrements with each successful call to SignM and SignP. Permissions in ChipS's $P_{0..T'1}$ for this part of $M_0$ needs to be ReadOnly once ChipS has been setup. Therefore CountRemaining can only be updated by another ChipS that will perform updates to that part of $M_0$ (assuming ChipS's $P_n$ allows that part of $M_0$ to be updated).

In addition, ChipS requires either of the following two SignP functions depending on whether direct or indirect key storage is used (see direct vs indirect authenticated write protocols in Section 5.4.2):

SignP[n,X,Y] Used when the same key is directly stored in both ChipS and ChipU. Advances R, decrements CountRemaining and returns R and $S_{Kn}[X|R|Y|C_2]$ only if CountRemaining>0. Otherwise returns all 0s. The time taken to calculate and compare signatures must be independent of data content.

SignP[f,n,X,Y] Used when the same key is not directly stored in both ChipS and ChipU. In this case ChipU's $K_{n1}$=ChipS's $f(K_{n2})$. The function is identical to the direct form of SignP, except that it additionally accepts f and returns $S_{(fKn)}[X|R|Y|C_2]$ instead of $S_{Kn}[X|R|Y|C_2]$.

5.4.3.1 Direct Form of SignP

When the direct form of SignP is used, ChipU's $P_n$ is updated as follows:

a. System calls ChipU's Random function;

b. ChipU returns $R_U$ to System;

c. System calls ChipS's SignP function, passing in n2, $R_U$ and $P_D$ (the desired P to be written to ChipU);

d. ChipS produces $R_S$ and $S_{Kn2}[R_U|R_S|P_D|C_2]$ if it is still permitted to produce signatures.

e. If values returned in d are non zero, then System can then call ChipU's SetPermission function with n1, the desired permission entry p, $R_S$, $P_D$ and $S_{Kn2}[R_U|R_S|P_D|C_2]$.

f. ChipU verifies the received signature against its own generated signature $S_{Kn1}[R_U|R_S|P_D|C_2]$ and applies $P_D$ to $P_n$ if the signature matches g. System checks 1st output parameter. 1=success, 0=failure.

The choice of n1 and n2 must be such that ChipU's $K_{n1}$=ChipS's $K_{n2}$.

Figure 332:
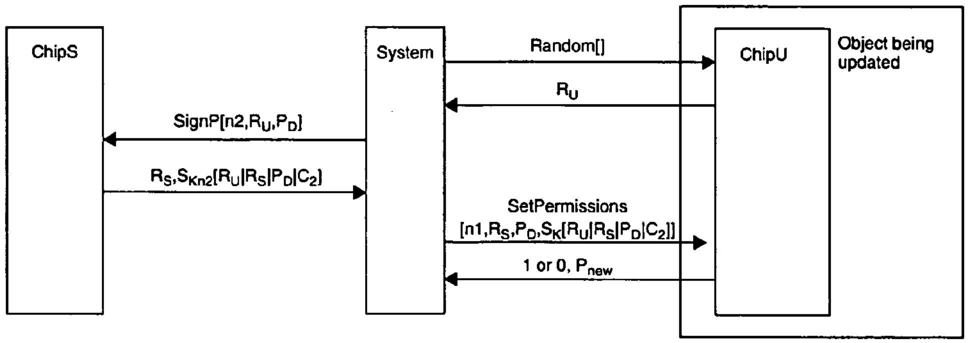
FIG. 332 shows a protocol for basic update of permissions

The data flow for basic authenticated writes to permissions is shown in FIG. 332.

5.4.3.2 Indirect Form of SignP

When the indirect form of SignP is used in ChipS, the System must extract f from ChipU (so it knows how to generate the correct key) by performing the following tasks:

a. System calls ChipU's Read function, passing in (dontCare, 1, dontCare)

b. ChipU returns $M_1$, from which System can extract $f_U$ c. System stores $f_U$ for future use ChipU's $P_n$ is updated as follows:

a. System calls ChipU's Random function;

b. ChipU returns $R_U$ to System;

c. System calls ChipS's SignP function, passing in $f_U$, n2, $R_U$ and $P_D$ (the desired P to be written to ChipU);

d. ChipS produces $R_S$ and $S_{fU(Kn2)}[R_U|R_S|P_D|C_2]$ if it is still permitted to produce signatures.

e. If values returned in d are non zero, then System can then call ChipU's SetPermission function with n1, the desired permission entry p, $R_S$, $P_D$ and $S_{fU(Kn2)}[R_U|R_S|P_D|C_2]$.

f. ChipU verifies the received signature against $S_{Kn1}[R_U|R_S|P_D|C_2]$ and applies $P_D$ to $P_n$ if the signature matches g. System checks 1st output parameter. 1=success, 0=failure.

In addition, the choice of n1 and n2 must be such that ChipU's $K_{n1}$=ChipS's $f_U(K_{n2})$.

5.4.4 Protecting Memory Vectors

To protect the appropriate part of $M_n$ against unauthorized writes, call SetPermissions[n] for n=0 to T−1. To protect the appropriate part of $M_0$ against authorized writes with key n, call SetPermissions[T+n] for n=0 to N−1.

Note that only $M_0$ can be written in an authenticated fashion.

Note that the SetPermission function must be called after the part of M has been set to the desired value.

For example, if adding a serial number to an area of $M_1$ that is currently ReadWrite so that noone is permitted to update the number again:

the Write function is called to write the serial number to $M_1$

SetPermission(1) is called for to set that part of M to be ReadOnly for non-authorized writes.

If adding a consumable value to $M_0$ such that only keys 1–2 can update it, and keys 0, and 3-N cannot:

the Write function is called to write the amount of consumable to M

SetPermission is called for 0 to set that part of $M_0$ to be DecrementOnly for non-authorized writes. This allows the amount of consumable to decrement.

SetPermissions is called for n={T, T+3, T4 . . . , T+N−1} to set that part of $M_0$to be ReadOnly for authorized writes using all but keys 1 and 2. This leaves keys 1 and 2 with ReadWrite permissions to $M_0$.

It is possible for someone who knows a key to further restrict other keys, but it is not in anyone's interest to do so.

5.5 Programming K

In this case, we have a factory chip (ChipF) connected to a System. The System wants to program the key in another chip (ChipP). System wants to avoid passing the new key to ChipP in the clear, and also wants to avoid the possibility of the key-upgrade message being replayed on another ChipP (even if the user doesn't know the key).

The protocol assumes that ChipF and ChipP already share (directly or indirectly) a secret key $K_{old}$. This key is used to ensure that only a chip that knows $K_{old}$ can set $K_{new}$.

Although the example shows a ChipF that is only allowed to program a specific number of ChipPs, the key-upgrade protocol can be easily altered (similar to the way the write protocols have variants) to provide other means of limiting the ability to update ChipPs.

The protocol requires the following publicly available functions in ChipP:

Random¬Returns R (does not advance R).

ReplaceKey[n, X, Y, Z] Replaces $K_n$ by $S_{Kn}[R|X|C_3]\oplus Y$, advances R, and returns 1 only if $S_{Kn}[X|Y|C_3]=Z$. Otherwise returns 0. The time taken to calculate signatures and compare values must be identical for all inputs.

And the following data and functions in ChipF:

CountRemaining Part of $M_0$ with contains the number of signatures that ChipF is allowed to generate. Decrements with each successful call to GetProgramKey. Permissions in P for this part of $M_0$ needs to be ReadOnly once ChipF has been setup. Therefore can only be updated by a ChipS that has authority to perform updates to that part of $M_0$.

$K_{new}$ The new key to be transferred from ChipF to ChipP. Must not be visible. After manufacture, $K_{new}$ is 0.

SetPartialKey[X] Updates $K_{new}$ to be $K_{new}\oplus X$. This function allows $K_{new}$ to be programmed in any number of steps, thereby allowing different people or systems to know different parts of the key (but not the whole $K_{new}$). $K_{new}$ is stored in ChipF's flash memory.

In addition, ChipF requires either of the following GetProgramKey functions depending on whether direct or indirect key storage is used on the input key and/or output key (see direct vs indirect authenticated write protocols in Section 5.4.2):

GetProgramKey1[n, X] Direct to direct. Used when the same key ($K_n$) is directly stored in both ChipF and ChipP and we want to store $K_{new}$ in ChipP. Advances $R_F$, decrements CountRemaining, outputs $R_F$, the encrypted key $S_{Kn}[X|R_F|C_3]\oplus K_{new}$ and a signature of the first two outputs plus $C_3$ if CountRemaining>0. Otherwise outputs 0. The time to calculate the encrypted key & signature must be identical for all inputs.

GetProgramKey2[f, n, X] Direct to indirect. Used when the same key ($K_n$) is directly stored in both ChipF and ChipP but we want to store $f_p(K_{new})$ in ChipP instead of simply $K_{new}$ (i.e. we want to keep the key in ChipP to be different in all ChipPs). In this case ChipP's $K_{n1}$=ChipF's $f_P(K_{n2})$. The function is identical to Get- ProgramKey1, except that it additionally accepts $f_P$, and returns $S_{Kn}[X|R_F|C_3] \oplus f_P(K_{new})$ instead of $S_{Kn}[X|R_F|C_3] \oplus K_{new}$. Note that the produced signature is produced using $K_n$ since that is what is already stored in ChipP.

GetProgramKey3[f, n, X] Indirect to direct. Used when the same key is not directly stored in both ChipF and ChipP but we want to store $K_{new}$ in ChipP. In this case ChipP's $Kn_{n1}$=ChipF's $f_P(K_{n2})$. The function is identical to GetProgramKey1, except that it additionally accepts $f_P$, and returns $S_{fP(Kn)}[X|R_F|C_3] \oplus K_{new}$ instead of $S_{Kn}[X|R_F|C_3] \oplus K_{new}$. The produced signature is produced using $f_P$(Kn) instead of $K_n$ since that is what is already stored in ChipP.

GetProgramKey4[f, n, X] Indirect to indirect. Used when the same key is not directly stored in both ChipF and ChipP but we want to store $f_P(K_{new})$ in ChipP instead of simply $K_{new}$ (i.e. we want to keep the key in ChipP to be different in all ChipPs). In this case ChipP's $K_{n1}$=ChipF's $f_P(K_{n2})$. The function is identical to GetProgramKey3, except that it returns $S_{fP(Kn)}[X|R_F|C_3] \oplus f_P(K_{new})$ instead of $S_{fP(Kn)}[X|R_F|C_3] \oplus K_{new}$. The produced signature is produced using $f_P(K_n)$ since that is what is already stored in ChipP.

Since there are likely to be few ChipFs, and many ChipPs, the indirect forms of GetProgramKey can be usefully employed.

5.5.1 GetProgramKey1—direct to direct

With the "old key=direct, new key=direct" form of GetProgramKey, to update P's key:

a. System calls ChipP's Random function;
b. ChipP returns $R_P$ to System;
c. System calls ChipF's GetProgramKey function, passing in n2 (the desired key to use) and the result from b;
d. ChipF updates $R_F$, then calculates and returns $R_F$, $S_{Kn2}[R_P|R_F|C_3] \oplus K_{new}$, and $S_{Kn2}[R_F|S_{Kn2}[R_P|R_F|C_3|\oplus K_{new} \oplus C_3]$;
e. If the response from d is not 0, System calls ChipP's ReplaceKey function, passing in n1 (the key to use in ChipP) and the response from d;
f. System checks response from ChipP. If the response is 1, then ChipP's $K_{n1}$ has been correctly updated to $K_{new}$. If the response is 0, ChipP's $K_{n1}$ has not been updated.

The choice of n1 and n2 must be such that ChipP's $K_{n1}$=ChipF's $K_{n2}$.

Figure 333:
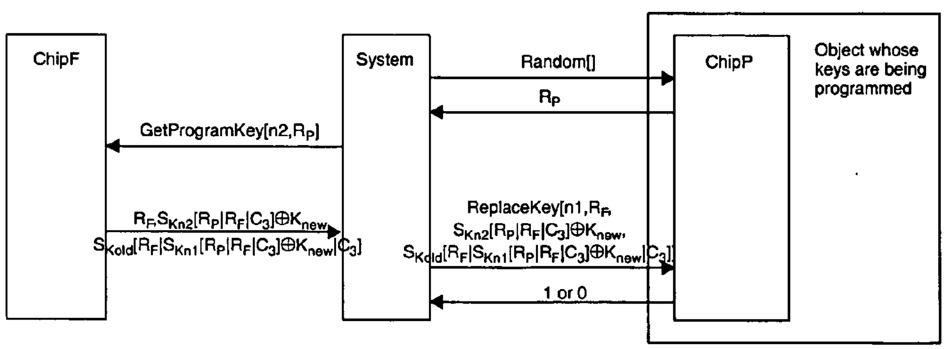
FIG. 333 shows a protocol for a multiple-key update

The data flow for key updates is shown in FIG. 333:

Note that $K_{new}$ is never passed in the open. An attacker could send its own $R_P$, but cannot produce $S_{Kn2}[R_P|R_F|C_3]$ without $K_{n2}$. The signature based on $K_{new}$ is sent to ensure that ChipP will be able to determine if either of the first two parameters have been changed en route.

CountRemaining needs to be setup in $M_{F0}$ (including making it ReadOnly in P) before ChipF is programmed with $K_P$. ChipF should therefore be programmed to only perform a limited number of GetProgramKey operations (thereby limiting compromise exposure if a ChipF is stolen). An authorized ChipS can be used to update this counter if necessary (see Section 5.4.2 on page 610).

5.5.2 GetProgramKey2—Direct to Indirect

With the "old key=direct, new key=indirect" form of GetProgramKey, to update P's key, the System must extract f from ChipP (so it can tell ChipF how to generate the correct key) by performing the following tasks:

a. System calls ChipP's Read function, passing in (dontCare, 1, dontCare)
b. ChipP returns $M_1$, from which System can extract $f_P$
c. System stores $f_P$ for future use ChipP's key is updated as follows:

a. System calls ChipP's Random function;
b. ChipP returns $R_P$ to System;
c. System calls ChipF's GetProgramKey function, passing in $f_P$, n2 (the desired key to use) and the result from b;
d. ChipF updates $R_F$, then calculates and returns $R_F$, $S_{Kn2}[R_P|R_F|C_3] \oplus f_P(K_{new})$, and $S_{Kn2}[R_F|S_{Kn2}[R_P|R_F|C_3] \oplus f_P(K_{new})|C_3]$;
e. If the response from d is not 0, System calls ChipP's ReplaceKey function, passing in n1 (the key to use in ChipP) and the response from d;
f. System checks response from ChipP. If the response is 1, then ChipP's $K_{n1}$ has been correctly updated to $f_P(K_{new})$. If the response is 0, ChipP's $K_{n1}$ has not been updated.

The choice of n1 and n2 must be such that ChipP's $K_{n1}$=ChipF's $K_{n2}$.

5.5.3 GetProgramKey3—Indirect to Direct

With the "old key=indirect, new key=direct" form of GetProgramKey, to update P's key, the System must extract f from ChipP (so it can tell ChipF how to generate the correct key) by performing the following tasks:

a. System calls ChipP's Read function, passing in (dontCare, 1, dontCare)
b. ChipP returns $M_1$, from which System can extract $f_P$
c. System stores $f_P$ for future use ChipP's key is updated as follows:

a. System calls ChipP's Random function;
b. ChipP returns $R_P$ to System;
c. System calls ChipF's GetProgramKey function, passing in $f_P$, n2 (the desired key to use) and the result from b;
d. ChipF updates $R_F$, then calculates and returns $R_F$, $S_{fP(Kn2)}[R_P|R_F|C_3] \oplus K_{new}$, and $S_{fP(Kn2)}[R_F|S_{fP(Kn2)}[R_P|R_F|C_3] \oplus K_{new}|C_3]$;
e. If the response from d is not 0, System calls ChipP's ReplaceKey function, passing in n1 (the key to use in ChipP) and the response from d;
f. System checks response from ChipP. If the response is 1, then ChipP's $K_{n1}$ has been correctly updated to $K_{new}$. If the response is 0, ChipP's $K_{n1}$ has not been updated.

The choice of n1 and n2 must be such that ChipP's $K_{n1}$=ChipF's $f_P(K_{n2})$.

5.5.4 GetProgramKey4—Indirect to Indirect

With the "old key=indirect, new key=indirect" form of GetProgramKey, to update P's key, the System must extract f from ChipP (so it can tell ChipF how to generate the correct key) by performing the following tasks:

a. System calls ChipP's Read function, passing in (dontCare, 1, dontCare)
b. ChipP returns $M_1$, from which System can extract $f_P$
c. System stores $f_P$ for future use ChipP's key is updated as follows:

a. System calls ChipP's Random function;
b. ChipP returns $R_P$ to System;
c. System calls ChipF's GetProgramKey function, passing in $f_P$, n2 (the desired key to use) and the result from b;
d. ChipF updates $R_F$, then calculates and returns $R_F$, $S_{fP(Kn2)}[R_P|R_F|C_3] \oplus f_P(K_{new})$, and $S_{fP(Kn2)}[R_F|S_{fP(Kn2)}[R_P|R_F|C_3] \oplus f_P(K_{new})|C_3]$;
e. If the response from d is not 0, System calls ChipP's ReplaceKey function, passing in n1 (the key to use in ChipP) and the response from d;
f. System checks response from ChipP. If the response is 1, then ChipP's $K_{n1}$ has been correctly updated to $f_P(K_{new})$. If the response is 0, ChipP's $K_{n1}$ has not been updated.

The choice of n1 and n2 must be such that ChipP's $K_{n1}$=ChipF's $f_P(K_{n2})$.

5.5.5 Chicken and Egg

The Program Key protocol requires both ChipF and ChipP to know $K_{old}$ (either directly or indirectly). Obviously both chips had to be programmed in some way with $K_{old}$, and thus $K_{old}$ can be thought of as an older $K_{new}$: $K_{old}$ can be placed in chips if another ChipF knows $K_{older}$, and so on.

Although this process allows a chain of reprogramming of keys, with each stage secure, at some stage the very first key ($K_{first}$) must be placed in the chips. $K_{first}$ is in fact programmed with the chip's microcode at the manufacturing test station as the last step in manufacturing test. $K_{first}$ can be a manufacturing batch key, changed for each batch or for each customer etc., and can have as short a life as desired. Compromising $K_{first}$ need not result in a complete compromise of the chain of Ks. This is especially true if $K_{first}$ is indirectly stored in ChipPs (i.e. each ChipP holds an f and $f(K_{first})$ instead of $K_{first}$ directly). One example is where $K_{first}$ (the key stored in each chip after manufacture/test) is a batch key, and can be different per chip. $K_{first}$ may advance to a ComCo specific $K_{second}$ etc. but still remain indirect. A direct form (e.g. $K_{final}$) only needs to go in if it is actually required at the end of the programming chain.

Depending on reprogramming requirements, $K_{first}$ can be the same or different for all $K_n$.

6 Memjet Forms of Protocols

Physical QA Chips are used in Memjet printer systems to store printer operating parameters as well as consumable parameters.

6.1 PRINTER_QA

A PRINTER_QA is stored within each print engine to perform two primary tasks:

- storage and protection of operating parameters
- a means of indirect read validation of other QA Chip data vectors Each PRINTER_QA contains the following keys:

TABLE 229

Keys in PrinterQA

| Key | Contents | Comments |
|---|---|---|
| 0 | Upgrade Key | Used to upgrade the operating parameters. Should be indirect form of key (i.e. a different key for each PRINTER_QA) so that an indirect form of the write is required. |
| 1 | Consumable Read Validation Key | Used to indirectly read the data from an CONSUMABLE_QA chip using indirect authenticated read protocol (Section 5.3.2 on page 606). |
| 2 | PrintEngineController Read Validation Key | When reading data from the PRINTER_QA, the system can either trust the data, or must use this key to perform the authenticated read protocol (see Section 5.3 on page 604). |
| 3–n | (reserved) | Currently unused. Could be used to provide a means to indirectly read additional print engine operating parameters ala K1, or provide additional Print Engine validation ala K2. |

Note that if multiple Print Engine Controllers are used (e.g. a multiple SoPEC system), then multiple PrintEngineController Read Validation Keys are required. These keys can be stored within a single PRINTER_QA (e.g. in $K_3$ and beyond), or can be stored in separate PRINTER_QAs (for example each SoPEC (or group of SoPECs) has an individual PRINTER_QA).

The functions required in the PRINTER_QA are:

- Random, ReplaceKey, to allow key programming & substitution
- Read, to allow reads of data
- Write, to allow updates of $M_{1+}$ during manufacture
- WriteAuth, to provide a means of updating the $M_0$ data (operating parameters)
- SetPermissions, to provide a means of updating write permissions
- Test, to provide a means of checking if consumable reads are valid
- Translate, to provide a means of indirect reading of consumable data 6.2 CONSUMABLE_QA A CONSUMABLE_QA is stored with each consumable (e.g. ink cartridge) to perform two primary tasks:

- storage of consumable related data
- protection of consumable amount remaining Each CONSUMABLE_QA contains the following keys:

TABLE 230

Keys in CONSUMABLE_QA

| Key | Contents | Comments |
|---|---|---|
| 0 | Upgrade Key | Used to upgrade the consumable parameters. Should be stored as the indirect form of the key (i.e. a different key for each CONSUMABLE_QA) so that an indirect form of the write is required. |
| 1 | Consumable Read Validation Key | When reading data from the CONSUMABLE_QA, the system can either trust the data, or must use this key to perform either the direct or indirect authenticated read protocol (see Section 5.3 on page 604). |
| 2 | (reserved) | Currently unused. |
| 3–n | (reserved) | Currently unused. |

The functions required in the CONSUMABLE_QA are:

- Random, ReplaceKey, to allow key programming & substitution
- Read, to allow reads of data.
- Write, to allow updates of $M_{1+}$ during manufacture
- WriteAuth, to provide a means of updating the $M_0$ data (consumable remaining)
- SetPermissions, to provide a means of updating write permissions Authentication of Consumables 1 Introduction Manufacturers of systems that require consumables (such as a laser printer that requires toner cartridges) have struggled with the problem of authenticating consumables, to varying levels of success. Most have resorted to specialized packaging that involves a patent. However this does not stop home refill operations or clone manufacture in countries with weak industrial property protection. The prevention of copying is important to prevent poorly manufactured substitute consumables from damaging the base system. For example, poorly filtered ink may clog print nozzles in an ink jet printer, causing the consumer to blame the system manufacturer and not admit the use of non-authorized consumables.

To solve the authentication problem, this document describes an QA Chip that contains authentication keys and circuitry specially designed to prevent copying. The chip is manufactured using the standard Flash memory manufacturing process, and is low cost enough to be included in consumables such as ink and toner cartridges. The implementation is approximately 1 $mm^2$ in a 0.25 micron flash process, and has an expected manufacturing cost of approximately 10 cents in 2003.

2 NSA

Once programmed, the QA Chips as described here are compliant with the NSA export guidelines since they do not constitute a strong encryption device. They can therefore be practically manufactured in the USA (and exported) or anywhere else in the world.

3 Nomenclature

The following symbolic nomenclature is used throughout this document:

TABLE 231

Summary of symbolic nomenclature

| Symbol | Description |
|---|---|
| F[X] | Function F, taking a single parameter X |
| F[X, Y] | Function F, taking two parameters, X and Y |
| X \| Y | X concatenated with Y |
| X ∧Y | Bitwise X AND Y |
| X ∨Y | Bitwise X OR Y (inclusive-OR) |
| X ⊕ Y | Bitwise X XOR Y (exclusive-OR) |
| ¬X | Bitwise NOT X (complement) |
| X ←Y | X is assigned the value Y |
| X ←{Y, Z} | The domain of assignment inputs to X is Y and Z |
| X = Y | X is equal to Y |
| X ≠ Y | X is not equal to Y |
| ⇓X | Decrement X by 1 (floor 0) |
| ⇑X | Increment X by 1 (modulo register length) |
| Erase X | Erase Flash memory register X |
| SetBits[X, Y] | Set the bits of the Flash memory register X based on Y |
| Z ←ShiftRight[X, Y] | Shift register X right one bit position, taking input bit from Y and placing the output bit in Z |

4 Pseudocode 4.1.1 Asynchronous

The following pseudocode:

var=expression means the var signal or output is equal to the evaluation of the expression.

4.1.2 Synchronous

The following pseudocode:

var←expression means the var register is assigned the result of evaluating the expression during this cycle.

4.1.3 Expression

Expressions are defined using the nomenclature in Table 231 above. Therefore:

var=(a=b)

is interpreted as the var signal is 1 if a is equal to b, and 0 otherwise.

4.2 Diagrams

Black is used to denote data, and red to denote 1-bit control-signal lines.

4.3 QA Chip Terminology

This document refers to QA Chips by their function in particular protocols:

For authenticated reads, ChipA is the QA Chip being authenticated, and ChipT is the QA Chip that is trusted.

For replacement of keys, ChipP is the QA Chip being programmed with the new key, and ChipF is the factory QA Chip that generates the message to program the new key.

For upgrades of data in a QA Chip, ChipU is the QA Chip being upgraded, and ChipS is the QA Chip that signs the upgrade value.

Any given physical QA Chip will contain functionality that allows it to operate as an entity in some number of these protocols.

Therefore, wherever the terms ChipA, ChipT, ChipP, ChipF, ChipU and ChipS are used in this document, they are referring to logical entities involved in an authentication protocol as defined in subsequent sections.

Physical QA Chips are referred to by their location. For example, each ink cartridge may contain a QA Chip referred to as an INK_QA, with all INK_QA chips being on the same physical bus. In the same way, the QA Chip inside a printer is referred to as PRINTER_QA, and will be on a separate bus to the INK_QA chips.

5 Concepts and Terms

This chapter provides a background to the problem of authenticating consumables. For more in-depth introductory texts, see [12], [78], and [56].

5.1 Basic Terms

A message, denoted by M, is plaintext. The process of transforming M into ciphertext C, where the substance of M is hidden, is called encryption. The process of transforming C back into M is called decryption. Referring to the encryption function as E, and the decryption function as D, we have the following identities:

$$E[M]=C$$

$$D[C]=M$$

Therefore the following identity is true:

$$D[E[M]]=M$$

5.2 Symmetric Cryptography

A symmetric encryption algorithm is one where:

the encryption function E relies on key $K_1$, the decryption function D relies on key $K_2$, $K_2$ can be derived from $K_1$, and $K_1$ can be derived from $K_2$.

In most symmetric algorithms, $K_1$ equals $K_2$. However, even if $K_1$ does not equal $K_2$, given that one key can be derived from the other, a single key K can suffice for the mathematical definition. Thus:

$$E_K[M]=C$$

$$D_K[C]=M$$

The security of these algorithms rests very much in the key K. Knowledge of K allows anyone to encrypt or decrypt. Consequently K must remain a secret for the duration of the value of M. For example, M may be a wartime message "My current position is grid position 123–456". Once the war is over the value of M is greatly reduced, and if K is made public, the knowledge of the combat unit's position may be of no relevance whatsoever. Of course if it is politically sensitive for the combat unit's position to be known even after the war, K may have to remain secret for a very long time.

An enormous variety of symmetric algorithms exist, from the textbooks of ancient history through to sophisticated modern algorithms. Many of these are insecure, in that modern cryptanalysis techniques (see Section 5.7 on page 646) can successfully attack the algorithm to the extent that K can be derived.

The security of the particular symmetric algorithm is a function of two things: the strength of the algorithm and the length of the key [78].

The strength of an algorithm is difficult to quantify, relying on its resistance to cryptographic attacks (see Section 5.7 on page 646). In addition, the longer that an algorithm has remained in the public eye, and yet remained unbroken in the midst of intense scrutiny, the more secure the algorithm is likely to be. By contrast, a secret algorithm that has not been scrutinized by cryptographic experts is unlikely to be secure.

Even if the algorithm is "perfectly" strong (the only way to break it is to try every key—see Section 5.7.1.5 on page 647), eventually the right key will be found. However, the more keys there are, the more keys have to be tried. If there are N keys, it will take a maximum of N tries. If the key is N bits long, it will take a maximum of $2^N$ tries, with a 50% chance of finding the key after only half the attempts ($2^{N-1}$). The longer N becomes, the longer it will take to find the key, and hence the more secure it is. What makes a good key length depends on the value of the secret and the time for which the secret must remain secret as well as available computing resources.

In 1996, an ad hoc group of world-renowned cryptographers and computer scientists released a report [9] describing minimal key lengths for symmetric ciphers to provide adequate commercial security. They suggest an absolute minimum key length of 90 bits in order to protect data for 20 years, and stress that increasingly, as cryptosystems succumb to smarter attacks than brute-force key search, even more bits may be required to account for future surprises in cryptanalysis techniques.

We will ignore most historical symmetric algorithms on the grounds that they are insecure, especially given modern computing technology. Instead, we will discuss the following algorithms:

DES

Blowfish

RC5

IDEA 5.2.1 DES

DES (Data Encryption Standard) [26] is a US and international standard, where the same key is used to encrypt and decrypt. The key length is 56 bits. It has been implemented in hardware and software, although the original design was for hardware only. The original algorithm used in DES was patented in 1976 (U.S. Pat. No. 3,962,539) and has since expired.

During the design of DES, the NSA (National Security Agency) provided secret S-boxes to perform the key-dependent nonlinear transformations of the data block. After differential cryptanalysis was discovered outside the NSA, it was revealed that the DES S-boxes were specifically designed to be resistant to differential cryptanalysis.

As described in [95], using 1993 technology, a 56-bit DES key can be recovered by a custom-designed $1 million machine performing a brute force attack in only 35 minutes. For $10 million, the key can be recovered in only 3.5 minutes. DES is clearly not secure now, and will become less so in the future.

A variant of DES, called triple-DES is more secure, but requires 3 keys: $K_1$, $K_2$, and $K_3$. The keys are used in the following manner:

$$E_{K3}[D_{K2}[E_{K1}[M]]]=C$$

$$D_{K3}[E_{K2}[D_{K1}[C]]]=M$$

The main advantage of triple-DES is that existing DES implementations can be used to give more security than single key DES. Specifically, triple-DES gives protection of equivalent key length of 112 bits [78]. Triple-DES does not give the equivalent protection of a 168-bit key (3×56) as one might naively expect.

Equipment that performs triple-DES decoding and/or encoding cannot be exported from the United States.

5.2.2 Blowfish

Blowfish is a symmetric block cipher first presented by Schneier in 1994 [76]. It takes a variable length key, from 32 bits to 448 bits, is unpatented, and is both license and royalty free. In addition, it is much faster than DES.

The Blowfish algorithm consists of two parts: a key-expansion part and a data-encryption part. Key expansion converts a key of at most 448 bits into several subkey arrays totaling 4168 bytes. Data encryption occurs via a 16-round Feistel network. All operations are XORs and additions on 32-bit words, with four index array lookups per round.

It should be noted that decryption is the same as encryption except that the subkey arrays are used in the reverse order. Complexity of implementation is therefore reduced compared to other algorithms that do not have such symmetry.

[77] describes the published attacks which have been mounted on Blowfish, although the algorithm remains secure as of February 1998 [79]. The major finding with these attacks has been the discovery of certain weak keys. These weak keys can be tested for during key generation. For more information, refer to [77] and [79].

5.2.3 RC5

Designed by Ron Rivest in 1995, RC5 [74] has a variable block size, key size, and number of rounds. Typically, however, it uses a 64-bit block size and a 128-bit key.

The RC5 algorithm consists of two parts: a key-expansion part and a data-encryption part. Key expansion converts a key into 2r+2 subkeys (where r=the number of rounds), each subkey being w bits. For a 64-bit blocksize with 16 rounds (w=32, r=16), the subkey arrays total 136 bytes. Data encryption uses addition mod $2^W$, XOR and bitwise rotation.

An initial examination by Kaliski and Yin [43] suggested that standard linear and differential cryptanalysis appeared impractical for the 64-bit blocksize version of the algorithm. Their differential attacks on 9 and 12 round RC5 require $2^{45}$ and $2^{62}$ chosen plaintexts respectively, while the linear attacks on 4, 5, and 6 round RC5 requires $2^{37}$, $2^{47}$ and $2^{57}$ known plaintexts). These two attacks are independent of key size.

More recently however, Knudsen and Meier [47] described a new type of differential attack on RC5 that improved the earlier results by a factor of 128, showing that RC5 has certain weak keys. RC5 is protected by multiple patents owned by RSA Laboratories. A license must be obtained to use it.

5.2.4 IDEA

Developed in 1990 by Lai and Massey [53], the first incarnation of the IDEA cipher was called PES. After differential cryptanalysis was discovered by Biham and Shamir in 1991, the algorithm was strengthened, with the result being published in 1992 as IDEA [52].

IDEA uses 128-bit keys to operate on 64-bit plaintext blocks. The same algorithm is used for encryption and decryption. It is generally regarded as the most secure block algorithm available today [78][78].

The biggest drawback of IDEA is the fact that it is patented (U.S. Pat. No. 5,214,703, issued in 1993), and a license must be obtained from Ascom Tech AG (Bern) to use it.

5.3 Asymmetric Cryptography

An asymmetric encryption algorithm is one where:

the encryption function E relies on key $K_1$, the decryption function D relies on key $K_2$, $K_2$ cannot be derived from $K_1$ in a reasonable amount of time, and $K_1$ cannot be derived from $K_2$ in a reasonable amount of time.

Thus:

$$E_{K1}[M]=C$$

$$D_{K2}[C]=M$$

These algorithms are also called public-key because one key $K_1$ can be made public. Thus anyone can encrypt a message (using $K_1$) but only the person with the corresponding decryption key ($K_2$) can decrypt and thus read the message.

In most cases, the following identity also holds:

$$E_{K2}[M]=C$$

$$D_{K1}[C]=M$$

This identity is very important because it implies that anyone with the public key $K_1$ can see M and know that it came from the owner of $K_2$. No-one else could have generated C because to do so would imply knowledge of $K_2$. This gives rise to a different application, unrelated to encryption—digital signatures.

The property of not being able to derive $K_1$ from $K_2$ and vice versa in a reasonable time is of course clouded by the concept of reasonable time. What has been demonstrated time after time, is that a calculation that was thought to require a long time has been made possible by the introduction of faster computers, new algorithms etc. The security of asymmetric algorithms is based on the difficulty of one of two problems: factoring large numbers (more specifically large numbers that are the product of two large primes), and the difficulty of calculating discrete logarithms in a finite field. Factoring large numbers is conjectured to be a hard problem given today's understanding of mathematics. The problem however, is that factoring is getting easier much faster than anticipated. Ron Rivest in 1977 said that factoring a 125-digit number would take 40 quadrillion years [30]. In 1994 a 129-digit number was factored [3]. According to Schneier, you need a 1024-bit number to get the level of security today that you got from a 512-bit number in the 1980s [78]. If the key is to last for some years then 1024 bits may not even be enough. Rivest revised his key length estimates in 1990: he suggests 1628 bits for high security lasting until 2005, and 1884 bits for high security lasting until 2015 [69]. Schneier suggests 2048 bits are required in order to protect against corporations and governments until 2015 [80].

Public key cryptography was invented in 1976 by Diffie and Hellman [15][15], and independently by Merkle [57]. Although Diffie, Hellman and Merkle patented the concepts (U.S. Pat. Nos. 4,200,770 and 4,218,582), these patents expired in 1997.

A number of public key cryptographic algorithms exist. Most are impractical to implement, and many generate a very large C for a given M or require enormous keys. Still others, while secure, are far too slow to be practical for several years. Because of this, many public key systems are hybrid—a public key mechanism is used to transmit a symmetric session key, and then the session key is used for the actual messages.

All of the algorithms have a problem in terms of key selection. A random number is simply not secure enough. The two large primes p and q must be chosen carefully—there are certain weak combinations that can be factored more easily (some of the weak keys can be tested for). But nonetheless, key selection is not a simple matter of randomly selecting 1024 bits for example. Consequently the key selection process must also be secure.

Of the practical algorithms in use under public scrutiny, the following are discussed:

RSA

DSA

EIGamal 5.3.1 RSA

The RSA cryptosystem [75], named after Rivest, Shamir, and Adleman, is the most widely used public key cryptosystem, and is a de facto standard in much of the world [78].

The security of RSA depends on the conjectured difficulty of factoring large numbers that are the product of two primes (p and q). There are a number of restrictions on the generation of p and q. They should both be large, with a similar number of bits, yet not be close to one another (otherwise $p \equiv q \equiv \sqrt{pq}$). In addition, many authors have suggested that p and q should be strong primes [56]. The Hellman-Bach patent (U.S. Pat. No. 4,633,036) covers a method for generating strong RSA primes p and q such that n=pq and factoring n is believed to be computationally infeasible. The RSA algorithm patent was issued in 1983 (U.S. Pat. No. 4,405,829). The patent expires on Sep. 20, 2000.

5.3.2 DSA

DSA (Digital Signature Algorithm) is an algorithm designed as part of the Digital Signature Standard (DSS) [29]. As defined, it cannot be used for generalized encryption. In addition, compared to RSA, DSA is 10 to 40 times slower for signature verification [40]. DSA explicitly uses the SHA-1 hashing algorithm (see Section 5.5.3.3 on page 640).

DSA key generation relies on finding two primes p and q such that q divides p−1. According to Schneier [78], a 1024-bit p value is required for long term DSA security. However the DSA standard [29] does not permit values of p larger than 1024 bits (p must also be a multiple of 64 bits).

The US Government owns the DSA algorithm and has at least one relevant patent (U.S. Pat. No. 5,231,688 granted in 1993). However, according to NIST [61]:

"The DSA patent and any foreign counterparts that may issue are available for use without any written permission from or any payment of royalties to the U.S. government."

In a much stronger declaration, NIST states in the same document [61] that DSA does not infringe third party's rights:

"NIST reviewed all of the asserted patents and concluded that none of them would be infringed by DSS. Extra protection will be written into the PK1 pilot project that will prevent an organization or individual from suing anyone except the government for patent infringement during the course of the project."

It must however, be noted that the Schnorr authentication algorithm [81] (U.S. Pat. No. 4,995,082) patent holder claims that DSA infringes his patent. The Schnorr patent is not due to expire until 2008.

5.3.3 EIGamal

The EIGamal scheme [22][22] is used for both encryption and digital signatures. The security is based on the conjectured difficulty of calculating discrete logarithms in a finite field.

Key selection involves the selection of a prime p, and two random numbers g and x such that both g and x are less than p. Then calculate y=gx mod p. The public key is y, g, and p. The private key is x.

EIGamal is unpatented. Although it uses the patented Diffie-Hellman public key algorithm [15][15], those patents expired in 1997. EIGamal public key encryption and digital signatures can now be safely used without infringing third party patents.

5.4 Cryptographic Challenge-Response Protocols and Zero Knowledge Proofs

The general principle of a challenge-response protocol is to provide identity authentication. The simplest form of challenge-response takes the form of a secret password. A asks B for the secret password, and if B responds with the correct password, A declares B authentic.

There are three main problems with this kind of simplistic protocol. Firstly, once B has responded with the password, any observer C will know what the password is. Secondly, A must know the password in order to verify it. Thirdly, if C impersonates A, then B will give the password to C (thinking C was A), thus compromising the password.

Using a copyright text (such as a haiku) as the password is not sufficient, because we are assuming that anyone is able to copy the password (for example in a country where intellectual property is not respected).

The idea of cryptographic challenge-response protocols is that one entity (the claimant) proves its identity to another (the verifier) by demonstrating knowledge of a secret known to be associated with that entity, without revealing the secret itself to the verifier during the protocol [56]. In the generalized case of cryptographic challenge-response protocols, with some schemes the verifier knows the secret, while in others the secret is not even known by the verifier. A good overview of these protocols can be found in [25], [78], and [56].

Since this documentation specifically concerns Authentication, the actual cryptographic challenge-response protocols used for authentication are detailed in the appropriate sections. However the concept of Zero Knowledge Proofs bears mentioning here.

The Zero Knowledge Proof protocol, first described by Feige, Fiat and Shamir in [24] is extensively used in Smart Cards for the purpose of authentication [34][34][34]. The protocol's effectiveness is based on the assumption that it is computationally infeasible to compute square roots modulo a large composite integer with unknown factorization. This is provably equivalent to the assumption that factoring large integers is difficult.

It should be noted that there is no need for the claimant to have significant computing power. Smart cards implement this kind of authentication using only a few modulo multiplications [34][34].

Finally, it should be noted that the Zero Knowledge Proof protocol is patented [82] (U.S. Pat. No. 4,748,668, issued May 31, 1988).

5.5 One-Way Functions

A one-way function F operates on an input X, and returns F[X] such that X cannot be determined from F[X]. When there is no restriction on the format of X, and F[X] contains fewer bits than X, then collisions must exist. A collision is defined as two different X input values producing the same F[X] value—i.e. $X_1$ and $X_2$ exist such that $X_1 \neq X_2$ yet $F[X_1]=F[X_2]$.

When X contains more bits than F[X], the input must be compressed in some way to create the output. In many cases, X is broken into blocks of a particular size, and compressed over a number of rounds, with the output of one round being the input to the next. The output of the hash function is the last output once X has been consumed. A pseudo-collision of the compression function CF is defined as two different initial values $V_1$ and $V_2$ and two inputs $X_1$ and $X_2$ (possibly identical) are given such that $CF(V_1, X_1)=CF(V_2, X_2)$. Note that the existence of a pseudo-collision does not mean that it is easy to compute an $X_2$ for a given $X_1$.

We are only interested in one-way functions that are fast to compute. In addition, we are only interested in deterministic one-way functions that are repeatable in different implementations.

Consider an example F where F[X] is the time between calls to F. For a given F(X] X cannot be determined because X is not even used by F. However the output from F will be different for different implementations. This kind of F is therefore not of interest.

In the scope of this document, we are interested in the following forms of one-way functions:

Encryption using an unknown key

Random number sequences

Hash Functions

Message Authentication Codes 5.5.1 Encryption Using an Unknown Key

When a message is encrypted using an unknown key K, the encryption function E is effectively one-way. Without the key, it is computationally infeasible to obtain M from EK[M] without K. An encryption function is only one-way for as long as the key remains hidden.

An encryption algorithm does not create collisions, since E creates EK[M] such that it is possible to reconstruct M using function D. Consequently F[X] contains at least as many bits as X (no information is lost) if the one-way function F is E.

Symmetric encryption algorithms (see Section 5.2 on page 629) have the advantage over asymmetric algorithms (see Section 5.3 on page 632) for producing one-way functions based on encryption for the following reasons:

The key for a given strength encryption algorithm is shorter for a symmetric algorithm than an asymmetric algorithm Symmetric algorithms are faster to compute and require less software or silicon Note however, that the selection of a good key depends on the encryption algorithm chosen. Certain keys are not strong for particular encryption algorithms, so any key needs to be tested for strength. The more tests that need to be performed for key selection, the less likely the key will remain hidden.

5.5.2 Random Number Sequences

Consider a random number sequence $R_0, R_1, \ldots, R_i, R_{i+1}$. We define the one-way function F such F[X] is repeatable for a given X on different implementations. The random number sequence therefore cannot be truly random. Instead, it must be pseudo-random, with the generator making use of a specific seed.

There are a large number of issues concerned with defining good random number generators. Knuth, in [48] describes what makes a generator "good" (including statistical tests), and the general problems associated with constructing them. Moreau gives a high level survey of the current state of the field in [60].

The majority of random number generators produce the $i^{th}$ random number from the $i-1^{th}$ state—the only way to determine the $i^{th}$ number is to iterate from the $0^{th}$ number to the $i^{th}$. If i is large, it may not be practical to wait for i iterations.

However there is a type of random number generator that does allow random access. In [10], Blum, Blum and Shub define the ideal generator as follows: " . . . we would like a pseudo-random sequence generator to quickly produce, from short seeds, long sequences (of bits) that appear in every way to be generated by successive flips of a fair coin". They defined the $x^2$ mod n generator [10], more commonly referred to as the BBS generator. They showed that given certain assumptions upon which modern cryptography relies, a BBS generator passes extremely stringent statistical tests.

The BBS generator relies on selecting n which is a Blum integer (n=pq where p and q are large prime numbers, p≠q, p mod 4=3, and q mod 4=3). The initial state of the generator is given by $x_0$ where $x_0=x^2$ mod n, and x is a random integer relatively prime to n. The $i^{th}$ pseudo-random bit is the least significant bit of $x_i$ where:

$$x_i=x_{i-1}^2 \bmod n$$

As an extra property, knowledge of p and q allows a direct calculation of the $i^{th}$ number in the sequence as follows:

$$x_i=x_0^y \bmod n \text{ where } y=2^i \bmod((p-1)(q-1))$$

Without knowledge of p and q, the generator must iterate (the security of calculation relies on the conjectured difficulty of factoring large numbers).

When first defined, the primary problem with the BBS generator was the amount of work required for a single output bit. The algorithm was considered too slow for most applications. However the advent of Montgomery reduction arithmetic [58] has given rise to more practical implementations, such as [59]. In addition, Vazirani and Vazirani have shown in [93] that depending on the size of n, more bits can safely be taken from $x_i$ without compromising the security of the generator.

Assuming we only take 1 bit per $x_i$, N bits (and hence N iterations of the bit generator function) are needed in order to generate an N-bit random number. To the outside observer, given a particular set of bits, there is no way to determine the next bit other than a 50/50 probability. If the x, p and q are hidden, they act as a key, and it is computationally infeasible to take an output bit stream and compute x, p, and q. It is also computationally infeasible to determine the value of i used to generate a given set of pseudo-random bits. This last feature makes the generator one-way. Different values of i can produce identical bit sequences of a given length (e.g. 32 bits of random bits). Even if x, p and q are known, for a given F[i], i can only be derived as a set of possibilities, not as a certain value (of course if the domain of i is known, then the set of possibilities is reduced further).

However, there are problems in selecting a good p and q, and a good seed x. In particular, Ritter in [68] describes a problem in selecting x. The nature of the problem is that a BBS generator does not create a single cycle of known length. Instead, it creates cycles of various lengths, including degenerate (zero-length) cycles. Thus a BBS generator cannot be initialized with a random state—it might be on a short cycle. Specific algorithms exist in section 9 of [10] to determine the length of the period for a given seed given certain strenuous conditions for n.

5.5.3 Hash Functions

Special one-way functions, known as Hash functions, map arbitrary length messages to fixed-length hash values. Hash functions are referred to as H[M]. Since the input is of arbitrary length, a hash function has a compression component in order to produce a fixed length output. Hash functions also have an obfuscation component in order to make it difficult to find collisions and to determine information about M from H[M].

Because collisions do exist, most applications require that the hash algorithm is preimage resistant, in that for a given $X_1$ it is difficult to find $X_2$ such that $H[X_1]=H[X_2]$. In addition, most applications also require the hash algorithm to be collision resistant (i.e. it should be hard to find two messages $X_1$ and $X_2$ such that $H[X_1]=H[X_2]$). However, as described in [20], it is an open problem whether a collision-resistant hash function, in the ideal sense, can exist at all.

The primary application for hash functions is in the reduction of an input message into a digital "fingerprint" before the application of a digital signature algorithm. One problem of collisions with digital signatures can be seen in the following example.

> A has a long message $M_1$ that says "I owe B $10". A signs $H[M_1]$ using his private key. B, being greedy, then searches for a collision message $M_2$ where $H[M_2]=H[M_1]$ but where $M_2$ is favorable to B, for example "I owe B $1 million". Clearly it is in A's interest to ensure that it is difficult to find such an $M_2$.

Examples of collision resistant one-way hash functions are SHA-1 [28], MD5 [73] and RIPEMD-160 [66], all derived from MD4 [70][70].

5.5.3.1 MD4

Ron Rivest introduced MD4 [70][70] in 1990. It is only mentioned here because all other one-way hash functions are derived in some way from MD4.

MD4 is now considered completely broken [18][18] in that collisions can be calculated instead of searched for. In the example above, B could trivially generate a substitute message $M_2$ with the same hash value as the original message $M_1$.

5.5.3.2 MD5

Ron Rivest introduced MD5 [73] in 1991 as a more secure MD4. Like MD4, MD5 produces a 128-bit hash value. MD5 is not patented [80].

Dobbertin describes the status of MD5 after recent attacks [20]. He describes how pseudo-collisions have been found in MD5, indicating a weakness in the compression function, and more recently, collisions have been found. This means that MD5 should not be used for compression in digital signature schemes where the existence of collisions may have dire consequences. However MD5 can still be used as a one-way function. In addition, the HMAC-MD5 construct (see Section 5.5.4.1 on page 643) is not affected by these recent attacks.

5.5.3.3 SHA-1

SHA-1 [28] is very similar to MD5, but has a 160-bit hash value (MD5 only has 128 bits of hash value). SHA-1 was designed and introduced by the NIST and NSA for use in the Digital Signature Standard (DSS). The original published description was called SHA [27], but very soon afterwards, was revised to become SHA-1 [28], supposedly to correct a security flaw in SHA (although the NSA has not released the mathematical reasoning behind the change).

There are no known cryptographic attacks against SHA-1 [78]. It is also more resistant to brute force attacks than MD4 or MD5 simply because of the longer hash result.

The US Government owns the SHA-1 and DSA algorithms (a digital signature authentication algorithm defined as part of DSS [29]) and has at least one relevant patent (U.S. Pat. No. 5,231,688 granted in 1993). However, according to NIST [61]:

"The DSA patent and any foreign counterparts that may issue are available for use without any written permission from or any payment of royalties to the U.S. government."

In a much stronger declaration, NIST states in the same document [61] that DSA and SHA-1 do not infringe third party's rights:

"NIST reviewed all of the asserted patents and concluded that none of them would be infringed by DSS. Extra protection will be written into the PK1 pilot project that will prevent an organization or individual from suing anyone except the government for patent infringement during the course of the project."

It must however, be noted that the Schnorr authentication algorithm [81] (U.S. Pat. No. 4,995,082) patent holder claims that DSA infringes his patent. The Schnorr patent is not due to expire until 2008. Fortunately this does not affect SHA-1.

5.5.3.4 RIPEMD-160

RIPEMD-160 [66] is a hash function derived from its predecessor RIPEMD [11] (developed for the European Community's RIPE project in 1992). As its name suggests, RIPEMD-160 produces a 160-bit hash result. Tuned for software implementations on 32-bit architectures, RIPEMD-160 is intended to provide a high level of security for 10 years or more.

Although there have been no successful attacks on RIPEMD-160, it is comparatively new and has not been extensively cryptanalyzed. The original RIPEMD algorithm [11] was specifically designed to resist known cryptographic attacks on MD4. The recent attacks on MD5 (detailed in [20]) showed similar weaknesses in the RIPEMD 128-bit hash function. Although the attacks showed only theoretical weaknesses, Dobbertin, Preneel and Bosselaers further strengthened RIPEMD into a new algorithm RIPEMD-160.

RIPEMD-160 is in the public domain, and requires no licensing or royalty payments.

5.5.4 Message Authentication Codes

The problem of message authentication can be summed up as follows:

How can A be sure that a message supposedly from B is in fact from B?

Message authentication is different from entity authentication (described in the section on cryptographic challenge-response protocols). With entity authentication, one entity (the claimant) proves its identity to another (the verifier). With message authentication, we are concerned with making sure that a given message is from who we think it is from i.e. it has not been tampered with en route from the source to its destination. While this section has a brief overview of message authentication, a more detailed survey can be found in [88].

A one-way hash function is not sufficient protection for a message. Hash functions such as MD5 rely on generating a hash value that is representative of the original input, and the original input cannot be derived from the hash value. A simple attack by E, who is in-between A and B, is to intercept the message from B, and substitute his own. Even if A also sends a hash of the original message, E can simply substitute the hash of his new message. Using a one-way hash function alone, A has no way of knowing that B's message has been changed.

One solution to the problem of message authentication is the Message Authentication Code, or MAC.

When B sends message M, it also sends MAC(M] so that the receiver will know that M is actually from B. For this to be possible, only B must be able to produce a MAC of M, and in addition, A should be able to verify M against MAC[M]. Notice that this is different from encryption of M–MACs are useful when M does not have to be secret.

The simplest method of constructing a MAC from a hash function is to encrypt the hash value with a symmetric algorithm:

1. Hash the input message H[M]
2. Encrypt the hash $E_K$[H[M]]

This is more secure than first encrypting the message and then hashing the encrypted message. Any symmetric or asymmetric cryptographic function can be used, with the appropriate advantages and disadvantage of each type described in Section 5.2 on page 629 and Section 5.3 on page 632.

However, there are advantages to using a key-dependent one-way hash function instead of techniques that use encryption (such as that shown above):

- Speed, because one-way hash functions in general work much faster than encryption;
- Message size, because $E_K$[M] is at least the same size as M, while H[M] is a fixed size (usually considerably smaller than M);
- Hardware/software requirements—keyed one-way hash functions are typically far less complex than their encryption-based counterparts; and
- One-way hash function implementations are not considered to be encryption or decryption devices and therefore are not subject to US export controls.

It should be noted that hash functions were never originally designed to contain a key or to support message authentication. As a result, some ad hoc methods of using hash functions to perform message authentication, including various functions that concatenate messages with secret prefixes, suffixes, or both have been proposed [56][56]. Most of these ad hoc methods have been successfully attacked by sophisticated means [42][42][42]. Additional MACs have been suggested based on XOR schemes [8] and Toeplitz matrices [49] (including the special case of LFSR-based (Linear Feed Shift Register) constructions).

5.5.4.1 HMAC

The HMAC construction [6][6] in particular is gaining acceptance as a solution for Internet message authentication security protocols. The HMAC construction acts as a wrapper, using the underlying hash function in a black-box way. Replacement of the hash function is straightforward if desired due to security or performance reasons. However, the major advantage of the HMAC construct is that it can be proven secure provided the underlying hash function has some reasonable cryptographic strengths—that is, HMAC's strengths are directly connected to the strength of the hash function [6].

Since the HMAC construct is a wrapper, any iterative hash function can be used in an HMAC. Examples include HMAC-MD5, HMAC-SHA1, HMAC-RIPEMD160 etc.

Given the following definitions:

H=the hash function (e.g. MD5 or SHA-1)

n=number of bits output from H (e.g. 160 for SHA-1, 128 bits for MD5)

M=the data to which the MAC function is to be applied

K=the secret key shared by the two parties
ipad=0x36 repeated 64 times
opad=0x5C repeated 64 times The HMAC algorithm is as follows:

1. Extend K to 64 bytes by appending 0x00 bytes to the end of K
2. XOR the 64 byte string created in (1) with ipad
3. append data stream M to the 64 byte string created in (2)
4. Apply H to the stream generated in (3)
5. XOR the 64 byte string created in (1) with opad
6. Append the H result from (4) to the 64 byte string resulting from (5)
7. Apply H to the output of (6) and output the result Thus:

$$HMAC[M]=H[(K\oplus \text{opad})|H[(K\oplus \text{ipad})|M]]$$

The recommended key length is at least n bits, although it should not be longer than 64 bytes (the length of the hashing block). A key longer than n bits does not add to the security of the function.

HMAC optionally allows truncation of the final output e.g. truncation to 128 bits from 160 bits.

The HMAC designers' Request for Comments [51] was issued in 1997, one year after the algorithm was first introduced. The designers claimed that the strongest known attack against HMAC is based on the frequency of collisions for the hash function H (see Section 14.10 on page 700), and is totally impractical for minimally reasonable hash functions:

As an example, if we consider a hash function like MD5 where the output length is 128 bits, the attacker needs to acquire the correct message authentication tags computed (with the same secret key K) on about $2^{64}$ known plaintexts. This would require the processing of at least $2^{64}$ blocks under H, an impossible task in any realistic scenario (for a block length of 64 bytes this would take 250,000 years in a continuous 1 Gbps link, and without changing the secret key K all this time). This attack could become realistic only if serious flaws in the collision behavior of the function H are discovered (e.g. Collisions found after $2^{30}$ messages). Such a discovery would determine the immediate replacement of function H (the effects of such a failure would be far more severe for the traditional uses of H in the context of digital signatures, public key certificates etc).

Of course, if a 160-bit hash function is used, then $2^{64}$ should be replaced with $2^{80}$.

This should be contrasted with a regular collision attack on cryptographic hash functions where no secret key is involved and $2^{64}$ off-line parallelizable operations suffice to find collisions.

More recently, HMAC protocols with replay prevention components [62] have been defined in order to prevent the capture and replay of any M, HMAC[M] combination within a given time period.

Finally, it should be noted that HMAC is in the public domain [50], and incurs no licensing fees. There are no known patents infringed by HMAC.

5.6 Random Numbers and Time Varying Messages

The use of a random number generator as a one-way function has already been examined. However, random number generator theory is very much intertwined with cryptography, security, and authentication.

There are a large number of issues concerned with defining good random number generators. Knuth, in [48] describes what makes a generator good (including statistical tests), and the general problems associated with constructing them. Moreau gives a high level survey of the current state of the field in [60].

One of the uses for random numbers is to ensure that messages vary over time. Consider a system where A encrypts commands and sends them to B. If the encryption algorithm produces the same output for a given input, an attacker could simply record the messages and play them back to fool B. There is no need for the attacker to crack the encryption mechanism other than to know which message to play to B (while pretending to be A). Consequently messages often include a random number and a time stamp to ensure that the message (and hence its encrypted counterpart) varies each time.

Random number generators are also often used to generate keys. Although Klapper has recently shown [45] that a family of secure feedback registers for the purposes of building key-streams does exist, he does not give any practical construction. It is therefore best to say at the moment that all generators are insecure for this purpose. For example, the Berlekamp-Massey algorithm [54], is a classic attack on an LFSR random number generator. If the LFSR is of length n, then only 2n bits of the sequence suffice to determine the LFSR, compromising the key generator.

If, however, the only role of the random number generator is to make sure that messages vary over time, the security of the generator and seed is not as important as it is for session key generation. If however, the random number seed generator is compromised, and an attacker is able to calculate future "random" numbers, it can leave some protocols open to attack. Any new protocol should be examined with respect to this situation.

The actual type of random number generator required will depend upon the implementation and the purposes for which the generator is used. Generators include Blum, Blum, and Shub [10], stream ciphers such as RC4 by Ron Rivest [71], hash functions such as SHA-1 [28] and RIPEMD-160 [66], and traditional generators such LFSRs (Linear Feedback Shift Registers) [48] and their more recent counterpart FCSRs (Feedback with Carry Shift Registers) [44].

5.7 Attacks

This section describes the various types of attacks that can be undertaken to break an authentication cryptosystem. The attacks are grouped into physical and logical attacks.

Logical attacks work on the protocols or algorithms rather than their physical implementation, and attempt to do one of three things:

Bypass the authentication process altogether

Obtain the secret key by force or deduction, so that any question can be answered Find enough about the nature of the authenticating questions and answers in order to, without the key, give the right answer to each question.

Regardless of the algorithms and protocol used by a security chip, the circuitry of the authentication part of the chip can come under physical attack. Physical attacks come in four main ways, although the form of the attack can vary:

Bypassing the security chip altogether

Physical examination of the chip while in operation (destructive and non-destructive)

Physical decomposition of chip

Physical alteration of chip

The attack styles and the forms they take are detailed below.

This section does not suggest solutions to these attacks. It merely describes each attack type. The examination is restricted to the context of an authentication chip (as opposed to some other kind of system, such as Internet authentication) attached to some System.

5.7.1 Logical Attacks

These attacks are those which do not depend on the physical implementation of the cryptosystem. They work against the protocols and the security of the algorithms and random number generators.

5.7.1.1 Ciphertext only Attack

This is where an attacker has one or more encrypted messages, all encrypted using the same algorithm. The aim of the attacker is to obtain the plaintext messages from the encrypted messages. Ideally, the key can be recovered so that all messages in the future can also be recovered.

5.7.1.2 Known Plaintext Attack

This is where an attacker has both the plaintext and the encrypted form of the plaintext. In the case of an authentication chip, a known-plaintext attack is one where the attacker can see the data flow between the system and the authentication chip. The inputs and outputs are observed (not chosen by the attacker), and can be analyzed for weaknesses (such as birthday attacks or by a search for differentially interesting input/output pairs).

A known plaintext attack can be carried out by connecting a logic analyzer to the connection between the system and the authentication chip.

5.7.1.3 Chosen Plaintext Attacks

A chosen plaintext attack describes one where a cryptanalyst has the ability to send any chosen message to the cryptosystem, and observe the response. If the cryptanalyst knows the algorithm, there may be a relationship between inputs and outputs that can be exploited by feeding a specific output to the input of another function.

The chosen plaintext attack is much stronger than the known plaintext attack since the attacker can choose the messages rather than simply observe the data flow.

On a system using an embedded authentication chip, it is generally very difficult to prevent chosen plaintext attacks since the cryptanalyst can logically pretend he/she is the system, and thus send any chosen bit-pattern streams to the authentication chip.

5.7.1.4 Adaptive Chosen Plaintext Attacks

This type of attack is similar to the chosen plaintext attacks except that the attacker has the added ability to modify subsequent chosen plaintexts based upon the results of previous experiments. This is certainly the case with any system/authentication chip scenario described for consumables such as photocopiers and toner cartridges, especially since both systems and consumables are made available to the public.

5.7.1.5 Brute Force Attack

A guaranteed way to break any key-based cryptosystem algorithm is simply to try every key.

Eventually the right one will be found. This is known as a brute force attack. However, the more key possibilities there are, the more keys must be tried, and hence the longer it takes (on average) to find the right one. If there are N keys, it will take a maximum of N tries. If the key is N bits long, it will take a maximum of $2^N$ tries, with a 50% chance of finding the key after only half the attempts ($2^{N-1}$). The longer N becomes, the longer it will take to find the key, and hence the more secure the key is. Of course, an attack may guess the key on the first try, but this is more unlikely the longer the key is.

Consider a key length of 56 bits. In the worst case, all $2^{56}$ tests ($7.2\times10^{16}$ tests) must be made to find the key. In 1977, Diffie and Hellman described a specialized machine for cracking DES, consisting of one million processors, each capable of running one million tests per second [17]. Such a machine would take 20 hours to break any DES code.

Consider a key length of 128 bits. In the worst case, all $2^{128}$ tests ($3.4\times10^{38}$ tests) must be made to find the key. This would take ten billion years on an array of a trillion processors each running 1 billion tests per second.

With a long enough key length, a brute force attack takes too long to be worth the attacker's efforts.

5.7.1.6 Guessing Attack

This type of attack is where an attacker attempts to simply "guess" the key. As an attack it is identical to the brute force attack (see Section 5.7.1.5 on page 647) where the odds of success depend on the length of the key.

5.7.1.7 Quantum Computer Attack

To break an n-bit key, a quantum computer [83] (NMR, Optical, or Caged Atom) containing n qubits embedded in an appropriate algorithm must be built. The quantum computer effectively exists in $2^n$ simultaneous coherent states. The trick is to extract the right coherent state without causing any decoherence. To date this has been achieved with a 2 qubit system (which exists in 4 coherent states). It is thought possible to extend this to 6 qubits (with 64 simultaneous coherent states) within a few years.

Unfortunately, every additional qubit halves the relative strength of the signal representing the key. This rapidly becomes a serious impediment to key retrieval, especially with the long keys. used in cryptographically secure systems.

As a result, attacks on a cryptographically secure key (e.g. 160 bits) using a Quantum Computer are likely not to be feasible and it is extremely unlikely that quantum computers will have achieved more than 50 or so qubits within the commercial lifetime of the authentication chips. Even using a 50 qubit quantum computer, $2^{110}$ tests are required to crack a 160 bit key.

5.7.1.8 Purposeful Error Attack

With certain algorithms, attackers can gather valuable information from the results of a bad input. This can range from the error message text to the time taken for the error to be generated.

A simple example is that of a userid/password scheme. If the error message usually says "Bad userid", then when an attacker gets a message saying "Bad password" instead, then they know that the userid is correct. If the message always says "Bad userid/password" then much less information is given to the attacker. A more complex example is that of the recent published method of cracking encryption codes from secure web sites [41]. The attack involves sending particular messages to a server and observing the error message responses. The responses give enough information to learn the keys—even the lack of a response gives some information.

An example of algorithmic time can be seen with an algorithm that returns an error as soon as an erroneous bit is detected in the input message. Depending on hardware implementation, it may be a simple method for the attacker to time the response and alter each bit one by one depending on the time taken for the error response, and thus obtain the key. Certainly in a chip implementation the time taken can be observed with far greater accuracy than over the Internet.

5.7.1.9 Birthday Attack

This attack is named after the famous "birthday paradox" (which is not actually a paradox at all). The odds of one person sharing a birthday with another, is 1 in 365 (not counting leap years). Therefore there must be 183 people in a room for the odds to be more than 50% that one of them shares your birthday. However, there only needs to be 23 people in a room for there to be more than a 50% chance that any two share a birthday, as shown in the following relation:

$$Prob = 1 - \frac{nPr}{n^r} = 1 - \frac{365P23}{365^{23}} \approx 0.507$$

Birthday attacks are common attacks against hashing algorithms, especially those algorithms that combine hashing with digital signatures.

If a message has been generated and already signed, an attacker must search for a collision message that hashes to the same value (analogous to finding one person who shares your birthday). However, if the attacker can generate the message, the birthday attack comes into play. The attacker searches for two messages that share the same hash value (analogous to any two people sharing a birthday), only one message is acceptable to the person signing it, and the other is beneficial for the attacker. Once the person has signed the original message the attacker simply claims now that the person signed the alternative message—mathematically there is no way to tell which message was the original, since they both hash to the same value.

Assuming a brute force attack is the only way to determine a match, the weakening of an n-bit key by the birthday attack is $2^{n/2}$. A key length of 128 bits that is susceptible to the birthday attack has an effective length of only 64 bits.

5.7.1.10 Chaining Attack

These are attacks made against the chaining nature of hash functions. They focus on the compression function of a hash function. The idea is based on the fact that a hash function generally takes arbitrary length input and produces a constant length output by processing the input n bits at a time. The output from one block is used as the chaining variable set into the next block. Rather than finding a collision against an entire input, the idea is that given an input chaining variable set, to find a substitute block that will result in the same output chaining variables as the proper message.

The number of choices for a particular block is based on the length of the block. If the chaining variable is c bits, the hashing function behaves like a random mapping, and the block length is b bits, the number of such b-bit blocks is approximately $2^b/2^c$. The challenge for finding a substitution block is that such blocks are a sparse subset of all possible blocks.

For SHA-1, the number of 512 bit blocks is approximately $2^{512}/2^{160}$, or $2^{352}$. The chance of finding a block by brute force search is about 1 in $2^{160}$.

5.7.1.11 Substitution with a Complete Lookup Table

If the number of potential messages sent to the chip is small, then there is no need for a clone manufacturer to crack the key. Instead, the clone manufacturer could incorporate a ROM in their chip that had a record of all of the responses from a genuine chip to the codes sent by the system. The larger the key, and the larger the response, the more space is required for such a lookup table.

5.7.1.12 Substitution with a Sparse Lookup Table

If the messages sent to the chip are somehow predictable, rather than effectively random, then the clone manufacturer need not provide a complete lookup table. For example:

- If the message is simply a serial number, the clone manufacturer need simply provide a lookup table that contains values for past and predicted future serial numbers. There are unlikely to be more than $10^9$ of these.
- If the test code is simply the date, then the clone manufacturer can produce a lookup table using the date as the address.
- If the test code is a pseudo-random number using either the serial number or the date as a seed, then the clone manufacturer just needs to crack the pseudo-random number generator in the system. This is probably not difficult, as they have access to the object code of the system. The clone manufacturer would then produce a content addressable memory (or other sparse array lookup) using these codes to access stored authentication codes.

5.7.1.13 Differential Cryptanalysis

Differential cryptanalysis describes an attack where pairs of input streams are generated with known differences, and the differences in the encoded streams are analyzed.

Existing differential attacks are heavily dependent on the structure of S boxes, as used in DES and other similar algorithms. Although other algorithms such as HMAC-SHA1 have no S boxes, an attacker can undertake a differential-like attack by undertaking statistical analysis of:

- Minimal-difference inputs, and their corresponding outputs
- Minimal-difference outputs, and their corresponding inputs Most algorithms were strengthened against differential cryptanalysis once the process was described. This is covered in the specific sections devoted to each cryptographic algorithm. However some recent algorithms developed in secret have been broken because the developers had not considered certain styles of differential attacks [94] and did not subject their algorithms to public scrutiny.

5.7.1.14 Message Substitution Attacks

In certain protocols, a man-in-the-middle can substitute part or all of a message. This is where a real authentication chip is plugged into a reusable clone chip within the consumable. The clone chip intercepts all messages between the system and the authentication chip, and can perform a number of substitution attacks.

Consider a message containing a header followed by content. An attacker may not be able to generate a valid header, but may be able to substitute their own content, especially if the valid response is something along the lines of "Yes, I received your message". Even if the return message is "Yes, I received the following message . . . ", the attacker may be able to substitute the original message before sending the acknowledgment back to the original sender.

Message Authentication Codes were developed to combat message substitution attacks.

5.7.1.15 Reverse Engineering the Key Generator

If a pseudo-random number generator is used to generate keys, there is the potential for a clone manufacture to obtain the generator program or to deduce the random seed used. This was the way in which the security layer of the Netscape browser program was initially broken [33].

5.7.1.16 Bypassing the Authentication Process

It may be that there are problems in the authentication protocols that can allow a bypass of the authentication process altogether. With these kinds of attacks the key is completely irrelevant, and the attacker has no need to recover it or deduce it.

Consider an example of a system that authenticates at power-up, but does not authenticate at any other time. A reusable consumable with a clone authentication chip may make use of a real authentication chip. The clone authentication chip uses the real chip for the authentication call, and then simulates the real authentication chip's state data after that.

Another example of bypassing authentication is if the system authenticates only after the consumable has been used. A clone authentication chip can accomplish a simple authentication bypass by simulating a loss of connection after the use of the consumable but before the authentication protocol has completed (or even started).

One infamous attack known as the "Kentucky Fried Chip" hack [2] involved replacing a microcontroller chip for a satellite TV system. When a subscriber stopped paying the subscription fee, the system would send out a "disable" message. However the new micro-controller would simply detect this message and not pass it on to the consumer's satellite TV system.

5.7.1.17 Garrote/Bribe Attack

If people know the key, there is the possibility that they could tell someone else. The telling may be due to coercion (bribe, garrote etc.), revenge (e.g. a disgruntled employee), or simply for principle. These attacks are usually cheaper and easier than other efforts at deducing the key. As an example, a number of people claiming to be involved with the development of the (now defunct) Divx standard for DVD claimed (before the standard was rejected by consumers) that they would like to help develop Divx specific cracking devices—out of principle.

5.7.2 Physical Attacks

The following attacks assume implementation of an authentication mechanism in a silicon chip that the attacker has physical access to. The first attack, Reading ROM, describes an attack when keys are stored in ROM, while the remaining attacks assume that a secret key is stored in Flash memory.

5.7.2.1 Reading ROM

If a key is stored in ROM it can be read directly. A ROM can thus be safely used to hold a public key (for use in asymmetric cryptography), but not to hold a private key. In symmetric cryptography, a ROM is completely insecure. Using a copyright text (such as a haiku) as the key is not sufficient, because we are assuming that the cloning of the chip is occurring in a country where intellectual property is not respected.

5.7.2.2 Reverse Engineering of Chip

Reverse engineering of the chip is where an attacker opens the chip and analyzes the circuitry. Once the circuitry has been analyzed the inner workings of the chip's algorithm can be recovered. Lucent Technologies have developed an active method [4] known as TOBIC (Two photon OBIC, where OBIC stands for Optical Beam Induced Current), to image circuits. Developed primarily for static RAM analysis, the process involves removing any back materials, polishing the back surface to a mirror finish, and then focusing light on the surface. The excitation wavelength is specifically chosen not to induce a current in the IC.

A Kerckhoffs in the nineteenth century made a fundamental assumption about cryptanalysis: if the algorithm's inner workings are the sole secret of the scheme, the scheme is as good as broken [39]. He stipulated that the secrecy must reside entirely in the key. As a result, the best way to protect against reverse engineering of the chip is to make the inner workings irrelevant.

5.7.2.3 Usurping the Authentication Process

It must be assumed that any clone manufacturer has access to both the system and consumable designs.

If the same channel is used for communication between the system and a trusted system authentication chip, and a non-trusted consumable authentication chip, it may be possible for the non-trusted chip to interrogate a trusted authentication chip in order to obtain the "correct answer". If this is so, a clone manufacturer would not have to determine the key. They would only have to trick the system into using the responses from the system authentication chip.

The alternative method of usurping the authentication process follows the same method as the logical attack described in Section 5.7.1.16 on page 652, involving simulated loss of contact with the system whenever authentication processes take place, simulating power-down etc.

5.7.2.4 Modification of System

This kind of attack is where the system itself is modified to accept clone consumables. The attack may be a change of system ROM, a rewiring of the consumable, or, taken to the extreme case, a completely clone system.

Note that this kind of attack requires each individual system to be modified, and would most likely require the owner's consent. There would usually have to be a clear advantage for the consumer to undertake such a modification, since it would typically void warranty and would most likely be costly. An example of such a modification with a clear advantage to the consumer is a software patch to change fixed-region DVD players into region-free DVD players (although it should be noted that this is not to use clone consumables, but rather originals from the same companies simply targeted for sale in other countries).

5.7.2.5 Direct Viewing of Chip Operation by Conventional Probing

If chip operation could be directly viewed using an STM (Scanning Tunnelling Microscope) or an electron beam, the keys could be recorded as they are read from the internal non-volatile memory and loaded into work registers.

These forms of conventional probing require direct access to the top or front sides of the IC while it is powered.

5.7.2.6 Direct Viewing of the Non-Volatile Memory

If the chip were sliced so that the floating gates of the Flash memory were exposed, without discharging them, then the key could probably be viewed directly using an STM or SKM (Scanning Kelvin Microscope).

However, slicing the chip to this level without discharging the gates is probably impossible. Using wet etching, plasma etching, ion milling (focused ion beam etching), or chemical mechanical polishing will almost certainly discharge the small charges present on the floating gates.

5.7.2.7 Viewing the Light Bursts Caused by State Changes

Whenever a gate changes state, a small amount of infrared energy is emitted. Since silicon is transparent to infrared, these changes can be observed by looking at the circuitry from the underside of a chip. While the emission process is weak, it is bright enough to be detected by highly sensitive equipment developed for use in astronomy. The technique [92], developed by IBM, is called PICA (Picosecond Imaging Circuit Analyzer). If the state of a register is known at time t, then watching that register change over time will reveal the exact value at time t+n, and if the data is part of the key, then that part is compromised.

5.7.2.8 Viewing the Keys Using an SEPM

A non-invasive testing device, known as a Scanning Electric Potential Microscope (SEPM), allows the direct viewing of charges within a chip [37]. The SEPM has a tungsten probe that is placed a few micrometers above the chip, with the probe and circuit forming a capacitor. Any AC signal flowing beneath the probe causes displacement current to flow through this capacitor. Since the value of the current change depends on the amplitude and phase of the AC signal, the signal can be imaged. If the signal is part of the key, then that part is compromised.

5.7.2.9 Monitoring EMI

Whenever electronic circuitry operates, faint electromagnetic signals are given off. Relatively inexpensive equipment can monitor these signals and could give enough information to allow an attacker to deduce the keys.

5.7.2.10 Viewing $I_{dd}$ Fluctuations

Even if keys cannot be viewed, there is a fluctuation in current whenever registers change state. If there is a high enough signal to noise ratio, an attacker can monitor the difference in $I_{dd}$ that may occur when programming over either a high or a low bit. The change in $I_{dd}$ can reveal information about the key. Attacks such as these have already been used to break smart cards [46].

5.7.2.11 Differential Fault Analysis

This attack assumes introduction of a bit error by ionization, microwave radiation, or environmental stress. In most cases such an error is more likely to adversely affect the chip (e.g. cause the program code to crash) rather than cause beneficial changes which would reveal the key. Targeted faults such as ROM overwrite, gate destruction etc. are far more likely to produce useful results.

5.7.2.12 Clock Glitch Attacks

Chips are typically designed to properly operate within a certain clock speed range. Some attackers attempt to introduce faults in logic by running the chip at extremely high clock speeds or introduce a clock glitch at a particular time for a particular duration [1]. The idea is to create race conditions where the circuitry does not function properly. An example could be an AND gate that (because of race conditions) gates through $Input_1$ all the time instead of the AND of $Input_1$ and $Input_2$.

If an attacker knows the internal structure of the chip, they can attempt to introduce race conditions at the correct moment in the algorithm execution, thereby revealing information about the key (or in the worst case, the key itself).

5.7.2.13 Power Supply Attacks

Instead of creating a glitch in the clock signal, attackers can also produce glitches in the power supply where the power is increased or decreased to be outside the working operating voltage range. The net effect is the same as a clock glitch—introduction of error in the execution of a particular instruction. The idea is to stop the CPU from XORing the key, or from shifting the data one bit-position etc. Specific instructions are targeted so that information about the key is revealed.

5.7.2.14 Overwriting ROM

Single bits in a ROM can be overwritten using a laser cutter microscope [1], to either 1 or 0 depending on the sense of the logic. If the ROM contains instructions, it may be a simple matter for an attacker to change a conditional jump to a non-conditional jump, or perhaps change the destination of a register transfer. If the target instruction is chosen carefully, it may result in the key being revealed.

5.7.2.15 Modifying EEPROM/Flash

These attacks fall into two categories:

- those similar to the ROM attacks except that the laser cutter microscope technique can be used to both set and reset individual bits. This gives much greater scope in terms of modification of algorithms.
- Electron beam programming of floating gates. As described in [89] and [32], a focused electron beam can change a gate by depositing electrons onto it. Damage to the rest of the circuit can be avoided, as described in [31].

5.7.2.16 Gate Destruction

Anderson and Kuhn described the rump session of the 1997 workshop on Fast Software Encryption (1], where Biham and Shamir presented an attack on DES. The attack was to use a laser cutter to destroy an individual gate in the hardware implementation of a known block cipher (DES). The net effect of the attack was to force a particular bit of a register to be "stuck". Biham and Shamir described the effect of forcing a particular register to be affected in this way—the least significant bit of the output from the round function is set to 0. Comparing the 6 least significant bits of the left half and the right half can recover several bits of the key. Damaging a number of chips in this way can reveal enough information about the key to make complete key recovery easy.

An encryption chip modified in this way will have the property that encryption and decryption will no longer be inverses.

5.7.2.17 Overwrite Attacks

Instead of trying to read the Flash memory, an attacker may simply set a single bit by use of a laser cutter microscope. Although the attacker doesn't know the previous value, they know the new value. If the chip still works, the bit's original state must be the same as the new state. If the chip doesn't work any longer, the bit's original state must be the logical NOT of the current state. An attacker can perform this attack on each bit of the key and obtain the n-bit key using at most n chips (if the new bit matched the old bit, a new chip is not required for determining the next bit).

5.7.2.18 Test Circuitry Attack

Most chips contain test circuitry specifically designed to check for manufacturing defects. This includes BIST (Built In Self Test) and scan paths. Quite often the scan paths and test circuitry includes access and readout mechanisms for all the embedded latches. In some cases the test circuitry could potentially be used to give information about the contents of particular registers.

Test circuitry is often disabled once the chip has passed all manufacturing tests, in some cases by blowing a specific connection within the chip. A determined attacker, however, can reconnect the test circuitry and hence enable it.

5.7.2.19 Memory Remnants

Values remain in RAM long after the power has been removed [35], although they do not remain long enough to be considered non-volatile. An attacker can remove power once sensitive information has been moved into RAM (for example working registers), and then attempt to read the value from RAM. This attack is most useful against security systems that have regular RAM chips. A classic example is cited by [1], where a security system was designed with an automatic power-shut-off that is triggered when the computer case is opened. The attacker was able to simply open the case, remove the RAM chips, and retrieve the key because the values persisted.

5.7.2.20 Chip Theft Attack

If there are a number of stages in the lifetime of an authentication chip, each of these stages must be examined in terms of ramifications for security should chips be stolen. For example, if information is programmed into the chip in stages, theft of a chip between stages may allow an attacker to have access to key information or reduced efforts for attack. Similarly, if a chip is stolen directly after manufacture but before programming, does it give an attacker any logical or physical advantage?

5.7.2.21 Trojan Horse Attack

At some stage the authentication chips must be programmed with a secret key. Suppose an attacker builds a clone authentication chip and adds it to the pile of chips to be programmed. The attacker has especially built the clone chip so that it looks and behaves just like a real authentication chip, but will give the key out to the attacker when a special attacker-known command is issued to the chip. Of course the attacker must have access to the chip after the programming has taken place, as well as physical access to add the Trojan horse authentication chip to the genuine chips.

6 Requirements

Existing solutions to the problem of authenticating consumables have typically relied on patents covering physical packaging. However this does not stop home refill operations or clone manufacture in countries with weak industrial property protection. Consequently a much higher level of protection is required.

The authentication mechanism is therefore built into an authentication chip that is embedded in the consumable and allows a system to authenticate that consumable securely and easily. Limiting ourselves to the system authenticating consumables (we don't consider the consumable authenticating the system), two levels of protection can be considered:

Presence Only Authentication:

This is where only the presence of an authentication chip is tested. The authentication chip can be removed and used in other consumables as long as be used indefinitely.

Consumable Lifetime Authentication:

This is where not only is the presence of the authentication chip tested for, but also the authentication chip must only last the lifetime of the consumable. For the chip to be re-used it must be completely erased and reprogrammed.

The two levels of protection address different requirements. We are primarily concerned with Consumable Lifetime authentication in order to prevent cloned versions of high volume consumables. In this case, each chip should hold secure state information about the consumable being authenticated. It should be noted that a Consumable Lifetime authentication chip could be used in any situation requiring a Presence Only authentication chip.

Requirements for authentication, data storage integrity and manufacture are considered separately. The following sections summarize requirements of each.

6.1 Authentication

The authentication requirements for both Presence Only and Consumable Lifetime authentication are restricted to the case of a system authenticating a consumable. We do not consider bi-directional authentication where the consumable also authenticates the system. For example, it is not necessary for a valid toner cartridge to ensure it is being used in a valid photocopier.

For Presence Only authentication, we must be assured that an authentication chip is physically present. For Consumable Lifetime authentication we also need to be assured that state data actually came from the authentication chip, and that it has not been altered en route. These issues cannot be separated—data that has been altered has a new source, and if the source cannot be determined, the question of alteration cannot be settled.

It is not enough to provide an authentication method that is secret, relying on a home-brew security method that has not been scrutinized by security experts. The primary requirement therefore is to provide authentication by means that have withstood the scrutiny of experts.

The authentication scheme used by the authentication chip should be resistant to defeat by logical means. Logical types of attack are extensive, and attempt to do one of three things:

- Bypass the authentication process altogether
- Obtain the secret key by force or deduction, so that any question can be answered
- Find enough about the nature of the authenticating questions and answers in order to, without the key, give the right answer to each question.

The logical attack styles and the forms they take are detailed in Section 5.7.1 on page 646.

The algorithm should have a flat keyspace, allowing any random bit string of the required length to be a possible key. There should be no weak keys.

6.2 Data Storage Integrity

Although authentication protocols take care of ensuring data integrity in communicated messages, data storage integrity is also required. Two kinds of data must be stored within the authentication chip:

- Authentication data, such as secret keys
- Consumable state data, such as serial numbers, and media remaining etc.

The access requirements of these two data types differ greatly. The authentication chip therefore requires a storage/access control mechanism that allows for the integrity requirements of each type.

6.2.1 Authentication Data

Authentication data must remain confidential. It needs to be stored in the chip during a manufacturing/programming stage of the chip's life, but from then on must not be permitted to leave the chip. It must be resistant to being read from non-volatile memory. The authentication scheme is responsible for ensuring the key cannot be obtained by deduction, and the manufacturing process is responsible for ensuring that the key cannot be obtained by physical means.

The size of the authentication data memory area must be large enough to hold the necessary keys and secret information as mandated by the authentication protocols.

6.2.2 Consumable State Data

Consumable state data can be divided into the following types. Depending on the application, there will be different numbers of each of these types of data items.

- Read Only
- ReadWrite
- Decrement Only
- Read Only data needs to be stored in the chip during a manufacturing/programming stage of the chip's life, but from then on should not be allowed to change. Examples of Read Only data items are consumable batch numbers and serial numbers.
- ReadWrite data is changeable state information, for example, the last time the particular consumable was used. ReadWrite data items can be read and written an unlimited number of times during the lifetime of the consumable. They can be used to store any state information about the consumable. The only requirement for this data is that it needs to be kept in non-volatile memory. Since an attacker can obtain access to a system (which can write to ReadWrite data), any attacker can potentially change data fields of this type. This data type should not be used for secret information, and must be considered insecure.
- Decrement Only data is used to count down the availability of consumable resources. A photocopier's toner cartridge, for example, may store the amount of toner remaining as a Decrement Only data item. An ink cartridge for a color printer may store the amount of each ink color as a Decrement Only data item, requiring 3 (one for each of Cyan, Magenta, and Yellow), or even as many as 5 or 6 Decrement Only data items. The requirement for this kind of data item is that once programmed with an initial value at the manufacturing/programming stage, it can only reduce in value. Once it reaches the minimum value, it cannot decrement any further. The Decrement Only data item is only required by Consumable Lifetime authentication.

Note that the size of the consumable state data storage required is only for that information required to be authenticated. Information which would be of no use to an attacker, such as ink color-curve characteristics or ink viscosity do not have to be stored in the secure state data memory area of the authentication chip.

6.3 Manufacture

The authentication chip must have a low manufacturing cost in order to be included as the authentication mechanism for low cost consumables.

The authentication chip should use a standard manufacturing process, such as Flash. This is necessary to:

Allow a great range of manufacturing location options

Use well-defined and well-behaved technology

Reduce cost

Regardless of the authentication scheme used, the circuitry of the authentication part of the chip must be resistant to physical attack. Physical attack comes in four main ways, although the form of the attack can vary:

Bypassing the authentication chip altogether

Physical examination of chip while in operation (destructive and non-destructive)

Physical decomposition of chip

Physical alteration of chip

The physical attack styles and the forms they take are detailed in Section 5.7.2 on page 652. Ideally, the chip should be exportable from the USA, so it should not be possible to use an authentication chip as a secure encryption device. This is low priority requirement since there are many companies in other countries able to manufacture the authentication chips. In any case, the export restrictions from the USA may change.

Authentication

7 Introduction

Existing solutions to the problem of authenticating consumables have typically relied on physical patents on packaging. However this does not stop home refill operations or clone manufacture in countries with weak industrial property protection. Consequently a much higher level of protection is required.

It is not enough to provide an authentication method that is secret, relying on a home-brew security method that has not been scrutinized by security experts. Security systems such as Netscape's original proprietary system and the GSM Fraud Prevention Network used by cellular phones are examples where design secrecy caused the vulnerability of the security [33][33]. Both security systems were broken by conventional means that would have been detected if the companies had followed an open design process. The solution is to provide authentication by means that have withstood the scrutiny of experts.

In this section, we examine a number of protocols that can be used for consumables authentication. We only use security methods that are publicly described, using known behaviors in this new way. Readers should be familiar with the concepts and terms described in Section 5 on page 629. We avoid the Zero Knowledge Proof protocol since it is patented.

For all protocols, the security of the scheme relies on a secret key, not a secret algorithm. In the nineteenth century, A Kerckhoffs made a fundamental assumption about cryptanalysis: if the algorithm's inner workings are the sole secret of the scheme, the scheme is as good as broken [39]. He stipulated that the secrecy must reside entirely in the key. As a result, the best way to protect against reverse engineering of any authentication chip is to make the algorithmic inner workings irrelevant (the algorithm of the inner workings must still be must be valid, but not the actual secret).

The QA Chip is a programmable device, and can therefore be setup with an application-specific program together with an application-specific set of protocols. This section describes the following sets of protocols:

single key single memory vector multiple key single memory vector multiple key multiple memory vector These protocols refer to the number of valid keys that an QA Chip knows about, and the size of data required to be stored in the chip.

From these protocols it is straightforward to construct protocol sets for the single key multiple memory vector case (of course the multiple memory vector can be considered to be and multiple key single memory vector. Other protocol sets can also be defined as necessary. Of course multiple memory vector can be conveniently All the protocols rely on a time-variant challenge (i.e. the challenge is different each time), where the response depends on the challenge and the secret. The challenge involves a random number so that any observer will not be able to gather useful information about a subsequent identification.

8 Single Key Single Memory Vector 8.1 Protocol Background

This protocol set is provided for two reasons:

the other protocol sets defined in this document are simply extensions of this one; and it is useful in its own right The single key protocol set is useful for applications where only a single key is required. Note that there can be many consumables and systems, but there is only a single key that connects them all. Examples include:

car and keys. A car and the car-key share a single key. There can be multiple sets of car-keys, each effectively cut to the same key. A company could have a set of cars, each with the same key. Any of the car-keys could then be used to drive any of the cars.

printer and ink cartridge. All printers of a certain model use the same ink cartridge, with printer and cartridge sharing only a single key. Note that to introduce a new printer model that accepts the old ink cartridge the new model would need the same key as the old model. See the multiple-key protocols for alternative solutions to this problem.

8.2 Requirements of Protocol

Each QA Chip contains the following values:

K The secret key for calculating $F_K[X]$. K must not be stored directly in the QA Chip. Instead, each chip needs to store a random number $R_K$ (different for each chip), $K \oplus R_K$, and $\neg K \oplus R_K$. The stored $K \oplus R_K$ can be XORed with $R_K$ to obtain the real K. Although □K⊕$R_K$ must be stored to protect against differential attacks, it is not used.

R Current random number used to ensure time varying messages. Each chip instance must be seeded with a different initial value. Changes for each signature generation.

M Memory vector of QA Chip.

P 2 element array of access permissions for each part of M. Entry 0 holds access permissions for non-authenticated writes to M (no key required). Entry 1 holds access permissions for authenticated writes to M (key required). Permission choices for each part of M are Read Only, Read/Write, and Decrement Only.

C 3 constants used for generating signatures. $C_1$, $C_2$, and $C_3$ are constants that pad out a submessage to a hashing boundary, and all 3 must be different. Each QA Chip contains the following private function:

$S_K[X]$ Internal function only. Returns $S_K[X]$, the result of applying a digital signature function S to X based upon key K. The digital signature must be long enough to counter the chances of someone generating a random signature. The length depends on the signature scheme chosen, although the scheme chosen for the QA Chip is HMAC-SHA1 (see Section 13 on page 691), and therefore the length of the signature is 160 bits.

Additional functions are required in certain QA Chips, but these are described as required.

8.3 Reads of M

In this case, we have a trusted chip (ChipT) connected to a System. The System wants to authenticate an object that contains a non-trusted chip (ChipA). In effect, the System wants to know that it can securely read a memory vector (M) from ChipA: to be sure that ChipA is valid and that M has not been altered.

The protocol requires the following publicly available function in ChipA:

Read[X] Advances R, and returns R, M, $S_K[X|R|C_1|M]$. The time taken to calculate the signature must not be based on the contents of X, R, M, or The protocol requires the following publicly available functions in ChipT:

Random¬ Returns R (does not advance R).

Test[X, Y, Z] Advances R and returns 1 if $S_K[R|X|C_1|Y]$ =Z. Otherwise returns 0. The time taken to calculate and compare signatures must be independent of data content.

To authenticate ChipA and read ChipA's memory M:

a. System calls ChipT's Random function;

b. ChipT returns $R_T$ to System;

c. System calls ChipA's Read function, passing in the result from b;

d. ChipA updates $R_A$, then calculates and returns $R_A$, $M_A$, $S_K[R_T|R_A|C_1|M_A]$;

e. System calls ChipT's Test function, passing in $R_A$, $M_A$, $S_K[R_T|R_A|C_1|M_A]$;

f. System checks response from ChipT. If the response is 1, then ChipA is considered authentic. If 0, ChipA is considered invalid.

Figure 334:
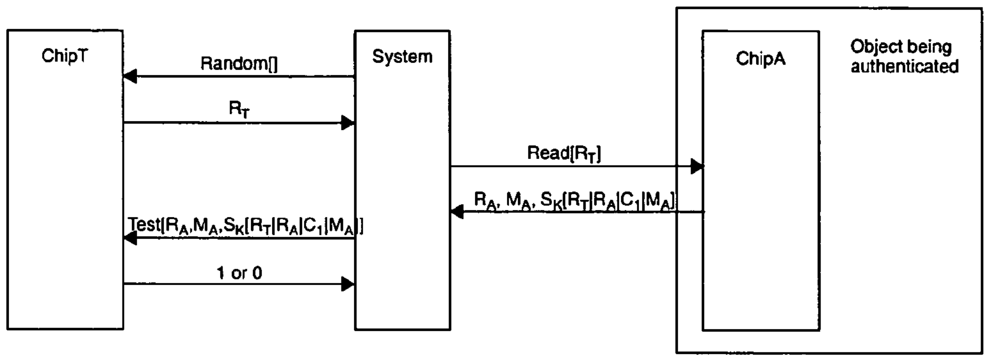
FIG. 334 shows a protocol for a single-key authenticated read

The data flow for read authentication is shown in FIG. 334.

The protocol allows System to simply pass data from one chip to another, with no special processing. The protection relies on ChipT being trusted, even though System does not know K.

When ChipT is physically separate from System (eg is chip on a board connected to System) System must also occassionally (based on system clock for example) call ChipT's Test function with bad data, expecting a 0 response. This is to prevent someone from inserting a fake ChipT into the system that always returns 1 for the Test function.

8.4 Writes

In this case, the System wants to update M in some chip referred to as ChipU. This can be non-authenticated (for example, anyone is allowed to count down the amount of consumable remaining), or authenticated (for example, replenishing the amount of consumable remaining).

8.4.1 Non-Authenticated Writes

This is the most frequent type of write, and takes place between the System/consumable during normal everyday operation. In this kind of write, System wants to change M in a way that doesn't require special authorization. For example, the System could be decrementing the amount of consumable remaining. Although System does not need to know K or even have access to a trusted chip, System must follow a non-authenticated write by an authenticated read if it needs to know that the write was successful.

The protocol requires the following publicly available function:

Write[X] Writes X over those parts of M subject to $P_0$ and the existing value for M.

To authenticate a write of $M_{new}$ to ChipA's memory M:

a. System calls ChipU's Write function, passing in $M_{new}$;

b. The authentication procedure for a Read is carried out (see Section 8.3 on page 664);

c. If ChipU is authentic and $M_{new}$=M returned in b, the write succeeded. If not, it failed.

8.4.2 Authenticated Writes

In this kind of write, System wants to change Chip U's M in an authorized way, without being subject to the permissions that apply during normal operation ($P_0$). For example, the consumable may be at a refilling station and the normally Decrement Only section of M should be updated to include the new valid consumable. In this case, the chip whose M is being updated must authenticate the writes being generated by the external System and in addition, apply permissions $P_1$ to ensure that only the correct parts of M are updated.

In this transaction protocol, the System's chip is referred to as ChipS, and the chip being updated is referred to as ChipU. Each chip distrusts the other.

The protocol requires the following publicly available functions in ChipU:

Read[X] Advances R, and returns R, M, $S_K[X|R|C_1|M]$. The time taken to calculate the signature must be identical for all inputs.

WriteA[X, Y, Z]Returns 1, advances R, and replaces M by Y subject to $P_1$ only if $S_K[R|X|C_1|Y]$=Z. Otherwise returns 0. The time taken to calculate and compare signatures must be independent of data content. This function is identical to ChipT's Test function except that it additionally writes Y over those parts of M subject to $P_1$ when the signature matches.

Authenticated writes require that the System has access to a ChipS that is capable of generating appropriate signatures. ChipS requires the following variables and function:

CountRemaining Part of M that contains the number of signatures that ChipS is allowed to generate. Decrements with each successful call to SignM and SignP. Permissions in ChipS's $P_0$ for this part of M needs to be ReadOnly once ChipS has been setup. Therefore CountRemaining can only be updated by another ChipS that will perform updates to that part of M (assuming ChipS's $P_1$ allows that part of M to be updated).

Q Part of M that contains the write permissions for updating ChipU's M. By adding Q to ChipS we allow different ChipSs that can update different parts of $M_U$. Permissions in ChipS's $P_0$ for this part of M needs to be ReadOnly once ChipS has been setup. Therefore Q can only be updated by another ChipS that will perform updates to that part of M.

SignM[V,W,X,Y,Z] Advances R, decrements CountRemaining and returns R, $Z_{QX}$ (Z applied to X with permissions Q), followed by $S_K[W|R|C_1|Z_{QX}]$ only if $S_K[V|W|C_1|X]$=Y and CountRemaining>0. Otherwise returns all 0s. The time taken to calculate and compare signatures must be independent of data content.

To update ChipU's M vector:

a. System calls ChipU's Read function, passing in 0 as the input parameter;
b. ChipU produces $R_U$, $M_U$, $S_K[0|R_U|C_1|M_U]$ and returns these to System;
c. System calls ChipS's SignM function, passing in 0 (as used in a), $R_U$, $M_U$, $S_K[0|R_U|C_1|M_U]$, and $M_D$ (the desired vector to be written to ChipU);
d. ChipS produces $R_S$, $M_{QD}$ (processed by running $M_D$ against $M_U$ using Q) and $S_K[R_U|R_S|C_1|M_{QD}]$ if the inputs were valid, and 0 for all outputs if the inputs were not valid.
e. If values returned in d are non zero, then ChipU is considered authentic. System can then call ChipU's WriteA function with these values.
f. ChipU should return a 1 to indicate success. A 0 should only be returned if the data generated by ChipS is incorrect (e.g. a transmission error).

Figure 335:
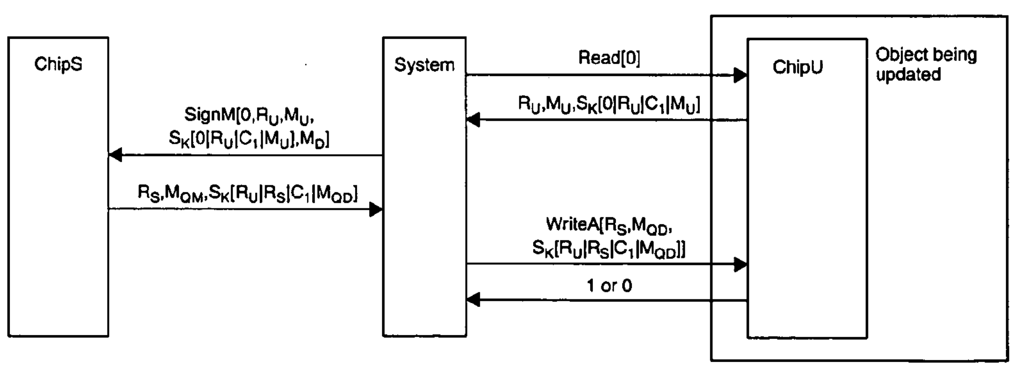
FIG. 335 shows a protocol for a single-key authenticated write

The data flow for authenticated writes is shown in FIG. 335.

Note that Q in ChipS is part of ChipS's M. This allows a user to set up ChipS with a permission set for upgrades. This should be done to ChipS and that part of M designated by $P_0$ set to ReadOnly before ChipS is programmed with $K_U$. If $K_S$ is programmed with $K_U$ first, there is a risk of someone obtaining a half-setup ChipS and changing all of $M_U$ instead of only the sections specified by Q.

The same is true of CountRemaining. The CountRemaining value needs to be setup (including making it ReadOnly in $P_0$) before ChipS is programmed with $K_U$. ChipS is therefore programmed to only perform a limited number of SignM operations (thereby limiting compromise exposure if a ChipS is stolen). Thus ChipS would itself need to be upgraded with a new CountRemaining every so often.

8.4.3 Updating Permissions for Future Writes

In order to reduce exposure to accidental and malicious attacks on P and certain parts of M, only authorized users are allowed to update P. Writes to P are the same as authorized writes to M, except that they update $P_n$ instead of M. Initially (at manufacture), P is set to be Read/Write for all parts of M. As different processes fill up different parts of M, they can be sealed against future change by updating the permissions. Updating a chip's $P_0$ changes permissions for unauthorized writes, and updating $P_1$ changes permissions for authorized writes.

$P_n$ is only allowed to change to be a more restrictive form of itself. For example, initially all parts of M have permissions of Read/Write. A permission of Read/Write can be updated to Decrement Only or Read Only. A permission of Decrement Only can be updated to become Read Only. A Read Only permission cannot be further restricted.

In this transaction protocol, the System's chip is referred to as ChipS, and the chip being updated is referred to as ChipU. Each chip distrusts the other.

The protocol requires the following publicly available functions in ChipU:

Random¬ Returns R (does not advance R).

SetPermission[n,X,Y,Z] Advances R, and updates $P_n$ according to Y and returns 1 followed by the resultant $P_n$ only if $S_K[R|X|Y|C_2]$=Z. Otherwise returns 0. $P_n$ can only become more restricted. Passing in 0 for any permission leaves it unchanged (passing in Y=0 returns the current $P_n$).

Authenticated writes of permissions require that the System has access to a ChipS that is capable of generating appropriate signatures. ChipS requires the following variables and function:

CountRemaining Part of M that contains the number of signatures that ChipS is allowed to generate. Decrements with each successful call to SignM and SignP. Permissions in ChipS's $P_0$ for this part of M needs to be ReadOnly once ChipS has been setup. Therefore CountRemaining can only be updated by another ChipS that will perform updates to that part of M (assuming ChipS's $P_1$ allows that part of M to be updated).

SignP[X,Y] Advances R, decrements CountRemaining and returns R and $S_K[X|R|Y|C_2]$ only if CountRemaining >0. Otherwise returns all 0s. The time taken to calculate and compare signatures must be independent of data content.

To update ChipU's $P_n$:

a. System calls ChipU's Random function;
b. ChipU returns $R_U$ to System;
c. System calls ChipS's SignP function, passing in $R_U$ and $P_D$ (the desired P to be written to ChipU);
d. ChipS produces $R_S$ and $S_K[R_U|R_S|P_D|C_2]$ if it is still permitted to produce signatures.
e. If values returned in d are non zero, then System can then call ChipU's SetPermission function with the desired n, $R_S$, $P_D$ and $S_K[R_U|R_S|P_D|C_2]$.
f. ChipU verifies the received signature against $S_K[R_U|R_S|P_D|C_2]$ and applies $P_D$ to $P_n$ if the signature matches
g. System checks 1st output parameter. 1=success, 0=failure.

Figure 336:
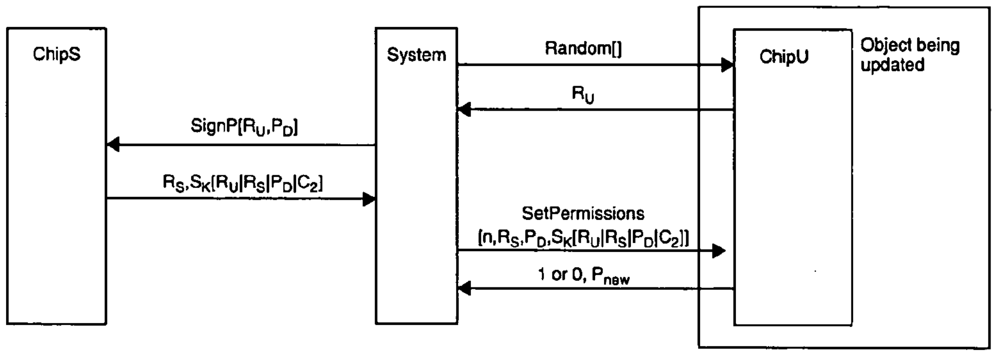
FIG. 336 shows a protocol for a single-key update of permissions

The data flow for authenticated writes to permissions is shown in FIG. 336 below.

8.5 Programming K

In this case, we have a factory chip (ChipF) connected to a System. The System wants to program the key in another chip (ChipP). System wants to avoid passing the new key to ChipP in the clear, and also wants to avoid the possibility of the key-upgrade message being replayed on another ChipP (even if the user doesn't know the key).

The protocol assumes that ChipF and ChipP already share a secret key $K_{old}$. This key is used to ensure that only a chip that knows $K_{old}$ can set $K_{new}$.

The protocol requires the following publicly available functions in ChipP:

Random¬ Returns R (does not advance R).

ReplaceKey[X, Y, Z] Replaces K by $S_{Kold}[R|X|C_3] \oplus Y$, advances R, and returns 1 only if $S_{Kold}[X|Y|C_3]$=Z. Otherwise returns 0. The time taken to calculate signatures and compare values must be identical for all inputs And the following data and function in ChipF:

CountRemaining Part of M with contains the number of signatures that ChipF is allowed to generate. Decrements with each successful call to GetProgramKey.

Permissions in P for this part of M needs to be ReadOnly once ChipF has been setup. Therefore can only be updated by a ChipS that has authority to perform updates to that part of M.

$K_{new}$ The new key to be transferred from ChipF to ChipP. Must not be visible.

SetPartialKey[X,Y] If word X of $K_{new}$ has not yet been set, set word X of $K_{new}$ to Y and return 1. Otherwise return 0. This function allows $K_{new}$ to be programmed in multiple steps, thereby allowing different people or systems to know different parts of the key (but not the whole $K_{new}$). $K_{new}$ is stored in ChipF's flash memory. Since there is a small number of ChipFs, it is theoretically not necessary to store the inverse of $K_{new}$, but it is stronger protection to do so.

GetProgramKey[X] Advances $R_F$, decrements CountRemaining, outputs $R_F$, the encrypted key $S_{Kold}[X|R_F|C_3] \oplus K_{new}$ and a signature of the first two outputs plus $C_3$ if CountRemaining>0. Otherwise outputs 0. The time to calculate the encrypted key & signature must be identical for all inputs.

To update P's key:

a. System calls ChipP's Random function;

b. ChipP returns $R_P$ to System;

c. System calls ChipF's GetProgramKey function, passing in the result from b;

d. ChipF updates $R_F$, then calculates and returns $R_F$, $S_{Kold}[R_P|R_F|C_3] \oplus K_{new}$, and $S_{Kold}[R_F|S_{Kold}[R_P|R_F|C_3] \oplus K_{new}|C_3]$;

e. If the response from d is not 0, System calls ChipP's ReplaceKey function, passing in the response from d;

f. System checks response from ChipP. If the response is 1, then $K_P$ has been correctly updated to $K_{new}$. If the response is 0, $K_P$ has not been updated.

Figure 337:
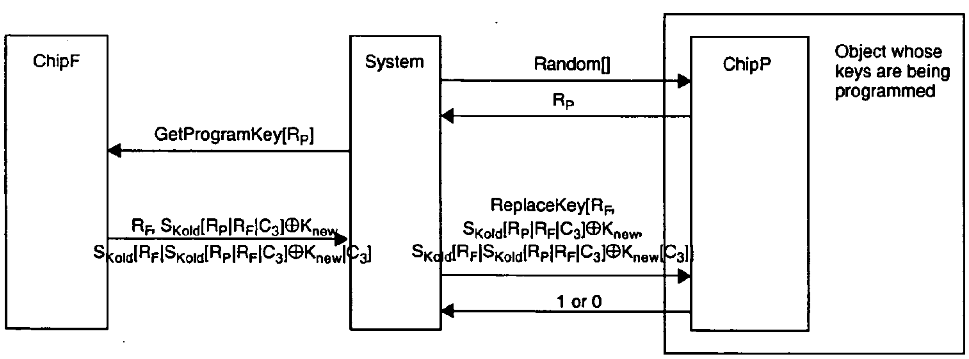
FIG. 337 shows a protocol for a single-key update

The data flow for key updates is shown in FIG. 337.

Note that $K_{new}$ is never passed in the open. An attacker could send its own $R_P$, but cannot produce $S_{Kold}[R_P|R_F|C_3]$ without $K_{old}$. The third parameter, a signature, is sent to ensure that ChipP can determine if either of the first two parameters have been changed en route.

CountRemaining needs to be setup in $M_F$ (including making it ReadOnly in P) before ChipF is programmed with $K_P$. ChipF should therefore be programmed to only perform a limited number of GetProgramKey operations (thereby limiting compromise exposure if a ChipF is stolen). An authorized ChipS can be used to update this counter if neccesary (see Section 8.4 on page 665).

8.5.1 Chicken and Egg

Of course, for the Program Key protocol to work, both ChipF and ChipP must both know $K_{old}$. Obviously both chips had to be programmed with $K_{old}$, and thus $K_{old}$ can be thought of as an older $K_{new}$:$K_{old}$ can be placed in chips if another ChipF knows $K_{older}$, and so on.

Although this process allows a chain of reprogramming of keys, with each stage secure, at some stage the very first key ($K_{first}$) must be placed in the chips. $K_{first}$ is in fact programmed with the chip's microcode at the manufacturing test station as the last step in manufacturing test. $K_{first}$ can be a manufacturing batch key, changed for each batch or for each customer etc, and can have as short a life as desired. Compromising $K_{first}$ need not result in a complete compromise of the chain of $K_S$.

9 Multiple Key Single Memory Vector 9.1 Protocol Background

This protocol set is an extension to the single key single memory vector protocol set, and is provided for two reasons:

the multiple key multiple memory vector protocol set defined in this document is simply extensions of this one; and it is useful in its own right The multiple key protocol set is typically useful for applications where there are multiple types of systems and consumables, and they need to work with each other in various ways. This is typically in the following situations:

when different systems want to share some consumables, but not others. For example printer models may share some ink cartridges and not share others.

when there are different owners of data in M. Part of the memory vector may be owned by one company (eg the speed of the printer) and another may be owned by another (eg the serial number of the chip). In this case a given key $K_n$ needs to be able to write to a given part of M, and other keys $K_n$ need to be disallowed from writing to these same areas.

9.2 Requirements of Protocol

Each QA Chip contains the following values:

N The maximum number of keys known to the chip.

$K_N$ Array of N secret keys used for calculating $F_{Kn}[X]$ where $K_n$ is the nth element of the array. Each $K_n$ must not be stored directly in the QA Chip . Instead, each chip needs to store a single random number $R_K$ (different for each chip), $K_n \oplus R_K$, and $\neg K_n \oplus R_K$. The stored $K_n \oplus R_K$ can be XORed with $R_K$ to obtain the real $K_n$. Although $\neg K_n \oplus R_K$ must be stored to protect against differential attacks, it is not used.

R Current random number used to ensure time varying messages. Each chip instance must be seeded with a different initial value. Changes for each signature generation.

M Memory vector of QA Chip. A fixed part of M contains N in ReadOnly form so users of the chip can know the number of keys known by the chip.

P N+1 element array of access permissions for each part of M. Entry 0 holds access permissions for non-authenticated writes to M (no key required). Entries 1 to N+1 hold access permissions for authenticated writes to M, one for each K. Permission choices for each part of M are Read Only, Read/Write, and Decrement Only.

C 3 constants used for generating signatures. $C_1$, $C_2$, and $C_3$ are constants that pad out a submessage to a hashing boundary, and all 3 must be different.

Each QA Chip contains the following private function:

$S_{Kn}[N,X]$ Internal function only. Returns $S_{Kn}[X]$, the result of applying a digital signature function S to X based upon the appropriate key $K_n$. The digital signature must be long enough to counter the chances of someone generating a random signature. The length depends on the signature scheme chosen, although the scheme chosen for the QA Chip is HMAC-SHA1 (see Section 13 on page 691), and therefore the length of the signature is 160 bits.

Additional functions are required in certain QA Chips, but these are described as required.

9.3 Reads

As with the single key scenario, we have a trusted chip (ChipT) connected to a System. The System wants to authenticate an object that contains a non-trusted chip (ChipA). In effect, the System wants to know that it can securely read a memory vector (M) from ChipA: to be sure that ChipA is valid and that M has not been altered.

The protocol requires the following publicly available functions:

Random— Returns R (does not advance R).

Read[n, X] Advances R, and returns R, M, $S_{Kn}$[X|R|$C_1$|M]. The time taken to calculate the signature must not be based on the contents of X, R, M, or K.

Test[n,X, Y, Z] Advances R and returns 1 if $S_{Kn}$[R|X|$C_1$|Y]=Z. Otherwise returns 0. The time taken to calculate and compare signatures must be independent of data content.

To authenticate ChipA and read ChipA's memory M:

a. System calls ChipT's Random function;
b. ChipT returns $R_T$ to System;
c. System calls ChipA's Read function, passing in some key number n1 and the result from b;
d. ChipA updates $R_A$, then calculates and returns $R_A$, $M_A$, $S_{KAn1}$[$R_T$|$R_A$|$C_1$|$M_A$];
e. System calls ChipT's Test function, passing in n2, $R_A$, $M_A$, $S_{KAn1}$[$R_T$|$R_A$|$C_1$|$M_A$];
f. System checks response from ChipT. If the response is 1, then ChipA is considered authentic. If 0, ChipA is considered invalid.

The choice of n1 and n2 must be such that ChipA's $K_{n1}$=ChipT's $K_{n2}$.

Figure 338:
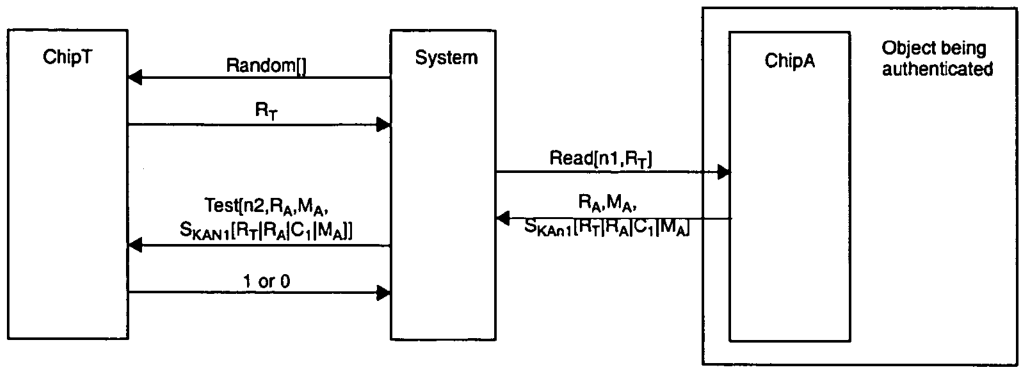
FIG. 338 shows a protocol for a multiple-key single-M authenticated read

The data flow for read authentication is shown in FIG. 338.

The protocol allows System to simply pass data from one chip to another, with no special processing. The protection relies on ChipT being trusted, even though System does not know K.

When ChipT is physically separate from System (eg is chip on a board connected to System) System must also occassionally (based on system clock for example) call ChipT's Test function with bad data, expecting a 0 response. This is to prevent someone from inserting a fake ChipT into the system that always returns 1 for the Test function.

It is important that n1 is chosen by System. Otherwise ChipA would need to return $N_A$ sets of signatures for each read, since ChipA does not know which of the keys will satisfy ChipT. Similarly, system must also choose n2, so it can potentially restrict the number of keys in ChipT that are matched against (otherwise ChipT would have to match against all its keys). This is important in order to restrict how different keys are used. For example, say that ChipT contains 6 keys, keys 0–2 are for various printer-related upgrades, and keys 3–6 are for inks. ChipA contains say 4 keys, one key for each printer model. At power-up, System goes through each of chipA's keys 0–3, trying each out against ChipT's keys 3–6. System doesn't try to match against ChipT's keys 0–2. Otherwise knowledge of a speed-upgrade key could be used to provide ink QA Chip chips. This matching needs to be done only once (eg at power up). Once matching keys are found, System can continue to use those key numbers.

Since System needs to know $N_T$ and $N_A$, part of M is used to hold N (eg in Read Only form), and the system can obtain it by calling the Read function, passing in key 0.

9.4 Writes

As with the single key scenario, the System wants to update M in ChipU. As before, this can be done in a non-authenticated and authenticated way.

9.4.1 Non-Authenticated Writes

This is the most frequent type of write, and takes place between the System/consumable during normal everyday operation. In this kind of write, System wants to change M subject to P. For example, the System could be decrementing the amount of consumable remaining. Although System does not need to know any of the Ks or even have access to a trusted chip to perform the write, System must follow a non-authenticated write by an authenticated read if it needs to know that the write was successful.

The protocol requires the following publicly available function:

Write[X] Writes X over those parts of M subject to $P_0$ and the existing value for M.

To authenticate a write of $M_{new}$ to ChipA's memory M:

a. System calls ChipU's Write function, passing in $M_{new}$;
b. The authentication procedure for a Read is carried out (see Section 9.3 on page 671);
c. If ChipU is authentic and $M_{new}$=M returned in b, the write succeeded. If not, it failed.

9.4.2 Authenticated Writes

In this kind of write, System wants to change Chip U's M in an authorized way, without being subject to the permissions that apply during normal operation ($P_0$). For example, the consumable may be at a refilling station and the normally Decrement Only section of M should be updated to include the new valid consumable. In this case, the chip whose M is being updated must authenticate the writes being generated by the external System and in addition, apply the appropriate permission for the key to ensure that only the correct parts of M are updated. Having a different permission for each key is required as when multiple keys are involved, all keys should not necessarily be given open access to M. For example, suppose M contains printer speed and a counter of money available for franking. A ChipS that updates printer speed should not be capable of updating the amount of money. Since $P_0$ is used for non-authenticated writes, each $K_n$ has a corresponding permission $P_{n+1}$ that determines what can be updated in an authenticated write.

In this transaction protocol, the System's chip is referred to as ChipS, and the chip being updated is referred to as ChipU. Each chip distrusts the other.

The protocol requires the following publicly available functions in ChipU:

Read[n, X] Advances R, and returns R, M, $S_{Kn}$[X|R|$C_1$|M]. The time taken to calculate the signature must not be based on the contents of X, R, M, or K.

WriteA[n, X, Y, Z] Advances R, replaces M by Y subject to $P_{n+1}$, and returns 1 only if $S_{Kn}$[R|X|$C_1$|Y]=Z. Otherwise returns 0. The time taken to calculate and compare signatures must be independent of data content. This function is identical to ChipT's Test function except that it additionally writes Y subject to $P_{n+1}$ to its M when the signature matches.

Authenticated writes require that the System has access to a ChipS that is capable of generating appropriate signatures. ChipS requires the following variables and function:

CountRemaining Part of M that contains the number of signatures that ChipS is allowed to generate. Decrements with each successful call to SignM and SignP. Permissions in ChipS's $P_0$ for this part of M needs to be ReadOnly once ChipS has been setup. Therefore CountRemaining can only be updated by another ChipS that will perform updates to that part of M (assuming ChipS's P allows that part of M to be updated).

Q Part of M that contains the write permissions for updating ChipU's M. By adding Q to ChipS we allow different ChipSs that can update different parts of $M_U$. Permissions in ChipS's $P_0$ for this part of M needs to be ReadOnly once ChipS has been setup. Therefore Q can only be updated by another ChipS that will perform updates to that part of M.

SignM[n,V,W,X,Y,Z] Advances R, decrements CountRemaining and returns R, $Z_{QX}$ (Z applied to X with permissions Q), $S_{Kn}[W|R|C_1|Z_{QX}]$ only if $Y=S_{Kn}[V|W|C_1|X]$ and CountRemaining>0. Otherwise returns all 0s. The time taken to calculate and compare signatures must be independent of data content.

To update ChipU's M vector:

a. System calls ChipU's Read function, passing in n1 and 0 as the input parameters;
b. ChipU produces $R_U$, $M_U$, $S_{Kn1}[0|R_U|C_1|M_U]$ and returns these to System;
c. System calls ChipS's SignM function, passing in n2 (the key to be used in ChipS), 0 (as used in a), $R_U$, $M_U$, $S_{Kn1}[0|R_U|C_1|M_U]$, and $M_D$ (the desired vector to be written to ChipU);
d. ChipS produces $R_S$, $M_{QD}$ (processed by running $M_D$ against $M_U$ using Q) and $S_{Kn2}[R_U|R_S|C_1|M_{QD}]$ if the inputs were valid, and 0 for all outputs if the inputs were not valid.
e. If values returned in d are non zero, then ChipU is considered authentic. System can then call ChipU's WriteA function with these values from d.
f. ChipU should return a 1 to indicate success. A 0 should only be returned if the data generated by ChipS is incorrect (e.g. a transmission error).

The choice of n1 and n2 must be such that ChipU's $K_{n1}$=ChipS's $K_{n2}$.

Figure 339:
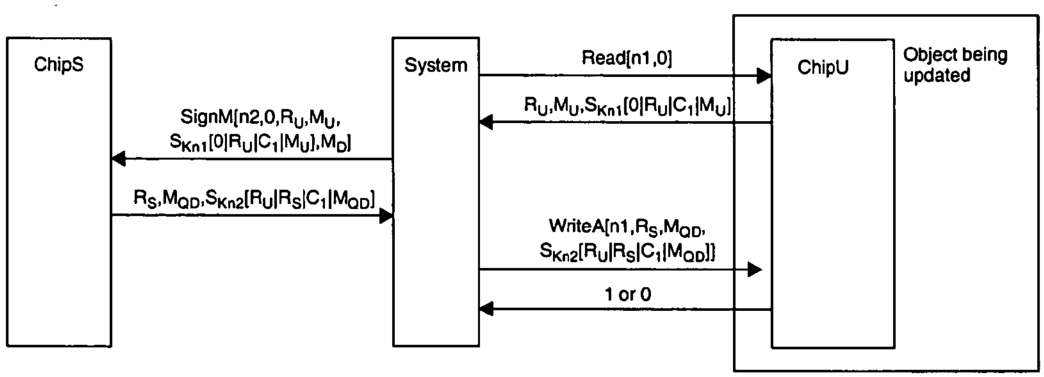
FIG. 339 shows a protocol for a multiple-key authenticated write

The data flow for authenticated writes is shown in FIG. 339 below.

Note that Q in ChipS is part of ChipS's M. This allows a user to set up ChipS with a permission set for upgrades. This should be done to ChipS and that part of M designated by $P_0$ set to ReadOnly before ChipS is programmed with $K_U$. If $K_S$ is programmed with $K_U$ first, there is a risk of someone obtaining a half-setup ChipS and changing all of $M_U$ instead of only the sections specified by Q.

In addition, CountRemaining in ChipS needs to be setup (including making it ReadOnly in $P_S$) before ChipS is programmed with $K_U$. ChipS should therefore be programmed to only perform a limited number of SignM operations (thereby limiting compromise exposure if a ChipS is stolen). Thus ChipS would itself need to be upgraded with a new CountRemaining every so often.

9.4.3 Updating Permissions for Future Writes

In order to reduce exposure to accidental and malicious attacks on P (and certain parts of M), only authorized users are allowed to update P. Writes to P are the same as authorized writes to M, except that they update $P_n$ instead of M. Initially (at manufacture), P is set to be Read/Write for all parts of M. As different processes fill up different parts of M, they can be sealed against future change by updating the permissions. Updating a chip's $P_0$ changes permissions for unauthorized writes, and updating $P_{n+1}$ changes permissions for authorized writes with key $K_n$.

$P_n$ is only allowed to change to be a more restrictive form of itself. For example, initially all parts of M have permissions of Read/Write. A permission of Read/Write can be updated to Decrement Only or Read Only. A permission of Decrement Only can be updated to become Read Only. A Read Only permission cannot be further restricted.

In this transaction protocol, the System's chip is referred to as ChipS, and the chip being updated is referred to as ChipU. Each chip distrusts the other.

The protocol requires the following publicly available functions in ChipU:

Random¬ Returns R (does not advance R).

SetPermission[n,p,X,Y,Z] Advances R, and updates $P_p$ according to Y and returns 1 followed by the resultant $P_p$ only if $S_{Kn}[R|X|Y|C_2]$=Z. Otherwise returns 0. $P_P$ can only become more restricted. Passing in 0 for any permission leaves it unchanged (passing in Y=0 returns the current $P_p$).

Authenticated writes of permissions require that the System has access to a ChipS that is capable of generating appropriate signatures. ChipS requires th following variables and function:

CountRemaining Part of M that contains the number of signatures that ChipS is allowed to generate. Decrements with each successful call to SignM and SignP. Permissions in ChipS's $P_0$ for this part of M needs to be ReadOnly once ChipS has been setup. Therefore CountRemaining can only be updated by another ChipS that will perform updates to that part of M (assuming ChipS's $P_n$ allows that part of M to be updated).

SignP[n,X,Y] Advances R, decrements CountRemaining and returns R and $S_{Kn}[X|R|Y|C_2]$ only if CountRemaining>0. Otherwise returns all 0s. The time taken to calculate and compare signatures must be independent of data content.

To update ChipU's $P_n$:

a. System calls ChipU's Random function;
b. ChipU returns $R_U$ to System;
c. System calls ChipS's SignP function, passing in n1, $R_U$ and $P_D$ (the desired P to be written to ChipU);
d. ChipS produces $R_S$ and $S_{Kn1}[R_U|R_S|P_D|C_2]$ if it is still permitted to produce signatures.
e. If values returned in d are non zero, then System can then call ChipU's SetPermission function with n2, the desired permission entry p, $R_S$, $P_D$ and $S_{Kn1}[R_U|R_S|P_D|C_2]$.
f. ChipU verifies the received signature against $S_{Kn2}[R_U|R_S|P_D|C_2]$ and applies $P_D$ to $P_n$ if the signature matches
g. System checks 1st output parameter. 1=success, 0=failure.

The choice of n1 and n2 must be such that ChipU's $K_{n1}$=ChipS's $K_{n2}$.

Figure 340:
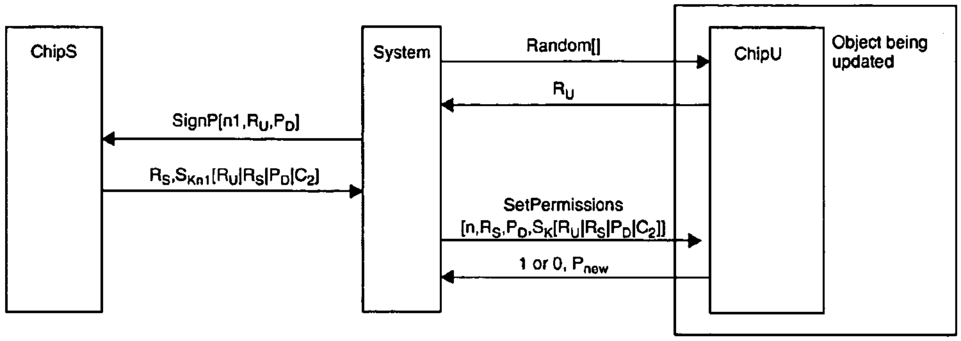
FIG. 340 shows a protocol for a multiple-key update of permissions

The data flow for authenticated writes to permissions is shown in FIG. 340 below.

9.4.4 Protecting M in a Multiple Key System

To protect the appropriate part of M, the SetPermission function must be called after the part of M has been set to the desired value.

For example, if adding a serial number to an area of M that is currently ReadWrite so that noone is permitted to update the number again:

- the Write function is called to write the serial number to M
- SetPermission is called for n={1, . . . , N} to set that part of M to be ReadOnly for authorized writes using key n−1.
- SetPermission is called for 0 to set that part of M to be ReadOnly for non-authorized writes For example, adding a consumable value to M such that only keys 1–2 can update it, and keys 0, and 3-N cannot:

- the Write function is called to write the amount of consumable to M
- SetPermission is called for n={1, 4, 5, . . . , N−1} to set that part of M to be ReadOnly for authorized writes using key n−1. This leaves keys 1 and 2 with ReadWrite permissions.
- SetPermission is called for 0 to set that part of M to be DecrementOnly for non-authorized writes. This allows the amount of consumable to decrement.

It is possible for someone who knows a key to further restrict other keys, but it is not in anyone's interest to do so.

9.5 Programming K

In this case, we have a factory chip (ChipF) connected to a System. The System wants to program the key in another chip (ChipP). System wants to avoid passing the new key to ChipP in the clear, and also wants to avoid the possibility of the key-upgrade message being replayed on another ChipP (even if the user doesn't know the key).

The protocol is a simple extension of the single key protocol in that it assumes that ChipF and ChipP already share a secret key $K_{old}$. This key is used to ensure that only a chip that knows $K_{old}$ can set $K_{new}$.

The protocol requires the following publicly available functions in ChipP:

Random¬ Returns R (does not advance R).

ReplaceKey[n, X, Y, Z] Replaces $K_n$ by $S_{Kn}[R|X|C_3] \oplus Y$, advances R, and returns 1 only if $S_{Kn}[X|Y|C_3]=Z$. Otherwise returns 0. The time taken to calculate signatures and compare values must be identical for all inputs.

And the following data and functions in ChipF:

CountRemaining Part of M with contains the number of signatures that ChipF is allowed to generate. Decrements with each successful call to GetProgramKey. Permissions in P for this part of M needs to be ReadOnly once ChipF has been setup. Therefore can only be updated by a ChipS that has authority to perform updates to that part of M.

$K_{new}$ The new key to be transferred from ChipF to ChipP. Must not be visible.

SetPartialKey[X,Y] If word X of $K_{new}$ has not yet been set, set word X of $K_{new}$ to Y and return 1. Otherwise return 0. This function allows $K_{new}$ to be programmed in multiple steps, thereby allowing different people or systems to know different parts of the key (but not the whole $K_{new}$). $K_{new}$ is stored in ChipF's flash memory. Since there is a small number of ChipFs, it is theoretically not necessary to store the inverse of $K_{new}$, but it is stronger protection to do so.

GetProgramKey[n, X] Advances $R_F$, decrements CountRemaining, outputs $R_F$, the encrypted key $S_{Kn}[X|R_F|C_3] \oplus K_{new}$ and a signature of the first two outputs plus $C_3$ if CountRemaining>0. Otherwise outputs 0. The time to calculate the encrypted key & signature must be identical for all inputs.

To update P's key:

a. System calls ChipP's Random function;
b. ChipP returns $R_P$ to System;
c. System calls ChipF's GetProgramKey function, passing in n1 (the desired key to use) and the result from b;
d. ChipF updates $R_F$, then calculates and returns $R_F$, $S_{Kn1}[R_P|R_F|C_3] \oplus K_{new}$, and $S_{Kn1}[R_F|S_{Kn1}[R_P|R_F|C_3] \oplus K_{new}|C_3]$;
e. If the response from d is not 0, System calls ChipP's ReplaceKey function, passing in n2 (the key to use in ChipP) and the response from d;
f. System checks response from ChipP. If the response is 1, then $K_{Pn2}$ has been correctly updated to $K_{new}$. If the response is 0, $K_{Pn2}$ has not been updated.

The choice of n1 and n2 must be such that ChipF's $K_{n1}$=ChipP's $K_{n2}$.

Figure 341:
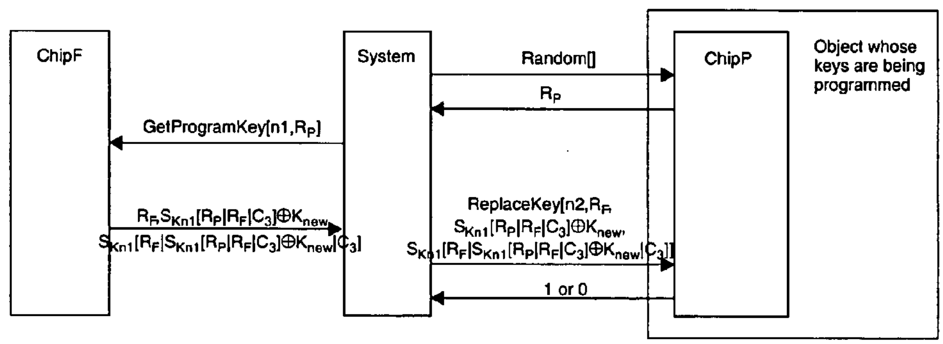
FIG. 341 shows a protocol for a multiple-key update

The data flow for key updates is shown in FIG. 341 below.

Note that $K_{new}$ is never passed in the open. An attacker could send its own $R_P$, but cannot produce $S_{Kn1}[R_P|R_F|C_3]$ without $K_{n1}$. The signature based on $K_{new}$ is sent to ensure that ChipP will be able to determine if either of the first two parameters have been changed en route.

CountRemaining needs to be setup in $M_F$ (including making it ReadOnly in P) before ChipF is programmed with $K_P$. ChipF should therefore be programmed to only perform a limited number of GetProgramKey operations (thereby limiting compromise exposure if a ChipF is stolen). An authorized ChipS can be used to update this counter if neccesary (see Section 9.4 on page 673).

9.5.1 Chicken and Egg

As with the single key protocol, for the Program Key protocol to work, both ChipF and ChipP must both know $K_{old}$. Obviously both chips had to be programmed with $K_{old}$, and thus $K_{old}$ can be thought of as an older $K_{new}$: $K_{old}$ can be placed in chips if another ChipF knows $K_{older}$, and so on.

Although this process allows a chain of reprogramming of keys, with each stage secure, at some stage the very first key ($K_{first}$) must be placed in the chips. $K_{first}$ is in fact programmed with the chip's microcode at the manufacturing test station as the last step in manufacturing test. $K_{first}$ can be a manufacturing batch key, changed for each batch or for each customer etc, and can have as short a life as desired. Compromising $K_{first}$ need not result in a complete compromise of the chain of Ks.

Depending on the reprogramming requirements, $K_{first}$ can be the same or different for all $K_n$.

10 Multiple Keys Multiple Memory Vectors 10.1 Protocol Background

This protocol set is a slight restriction of the multiple key single memory vector protocol set, and is the expected protocol. It is a restriction in that M has been optimized for Flash memory utilization.

M is broken into multiple memory vectors (semi-fixed and variable components) for the purposes of optimizing flash memory utilization. Typically M contains some parts that are fixed at some stage of the manufacturing process (eg a batch number, serial number etc), and once set, are not ever updated. This information does not contain the amount of consumable remaining, and therefore is not read or written to with any great frequency.

We therefore define $M_0$ to be the M that contains the frequently updated sections, and the remaining Ms to be rarely written to. Authenticated writes only write to $M_0$, and non-authenticated writes can be directed to a specific $M_n$. This reduces the size of permissions that are stored in the QA Chip (since key-based writes are not required for Ms other than $M_0$). It also means that $M_0$ and the remaining Ms can be manipulated in different ways, thereby increasing flash memory longevity.

10.2 Requirements of Protocol

Each QA Chip contains the following values:

N The maximum number of keys known to the chip.

T The number of vectors M is broken into.

$K_N$ Array of N secret keys used for calculating $F_{Kn}[X]$ where $K_n$ is the nth element of the array.

Each $K_n$ must not be stored directly in the QA Chip . Instead, each chip needs to store a single random number $R_K$ (different for each chip), $K_n \oplus R_K$, and □$K_n \oplus R_K$. The stored $K_n \oplus R_K$ can be XORed with $R_K$ to obtain the real $K_n$. Although □$K_n \oplus R_K$ must be stored to protect against differential attacks, it is not used.

R Current random number used to ensure time varying messages. Each chip instance must be seeded with a different initial value. Changes for each signature generation.

$M_T$ Array of T memory vectors. Only $M_0$ can be written to with an authorized write, while all Ms can be written to in an unauthorized write. Writes to $M_0$ are optimized for Flash usage, while updates to any other $M_n$ are expensive with regards to Flash utilization, and are expected to be only performed once per section of $M_n$.

$M_1$ contains T and N in ReadOnly form so users of the chip can know these two values.

$P_{T+N}$ T+N element array of access permissions for each part of M. Entries n={0 . . . T−1} hold access permissions for non-authenticated writes to $M_n$ (no key required). Entries n={T to T+N−1}hold access permissions for authenticated writes to $M_0$ for $K_n$. Permission choices for each part of M are Read Only, Read/Write, and Decrement Only.

C 3 constants used for generating signatures. $C_1$, $C_2$, and $C_3$ are constants that pad out a submessage to a hashing boundary, and all 3 must be different.

Each QA Chip contains the following private function:

$S_{Kn}$[N,X] Internal function only. Returns $S_{Kn}$[X], the result of applying a digital signature function S to X based upon the appropriate key $K_n$. The digital signature must be long enough to counter the chances of someone generating a random signature. The length depends on the signature scheme chosen, although the scheme chosen for the QA Chip is HMAC-SHA1, and therefore the length of the signature is 160 bits.

Additional functions are required in certain QA Chips, but these are described as required.

10.3 Reads

As with the previous scenarios, we have a trusted chip (ChipT) connected to a System. The System wants to authenticate an object that contains a non-trusted chip (ChipA). In effect, the System wants to know that it can securely read a memory vector ($M_t$) from ChipA: to be sure that ChipA is valid and that M has not been altered.

The protocol requires the following publicly available functions:

Random¬ Returns R (does not advance R).

Read[n, t, X] Advances R, and returns R, $M_t$, $S_{Kn}$[X|R|$C_1$|$M_t$]. The time taken to calculate the signature must not be based on the contents of X, R, $M_t$, or K. If t is invalid, the function assumes t=0.

Test[n,X, Y, Z] Advances R and returns 1 if $S_{Kn}$[R|X|$C_1$|Y] =Z. Otherwise returns 0. The time taken to calculate and compare signatures must be independent of data content.

To authenticate ChipA and read ChipA's memory M:

a. System calls ChipT's Random function;
b. ChipT returns $R_T$ to System;
c. System calls ChipA's Read function, passing in some key number n1, the desired M number t, and the result from b;
d. ChipA updates $R_A$, then calculates and returns $R_A$, $M_{At}$, $S_{KAn1}$[$R_T$|$R_A$|$C_1$|$M_{At}$];
e. System calls ChipT's Test function, passing in n2, $R_A$, $M_{At}$, $S_{KAn1}$[$R_T$|$R_A$|$C_1$|$M_{At}$];
f. System checks response from ChipT. If the response is 1, then ChipA is considered authentic. If 0, ChipA is considered invalid.

The choice of n1 and n2 must be such that ChipA's $K_{n1}$=ChipT's $K_{n2}$.

Figure 342:
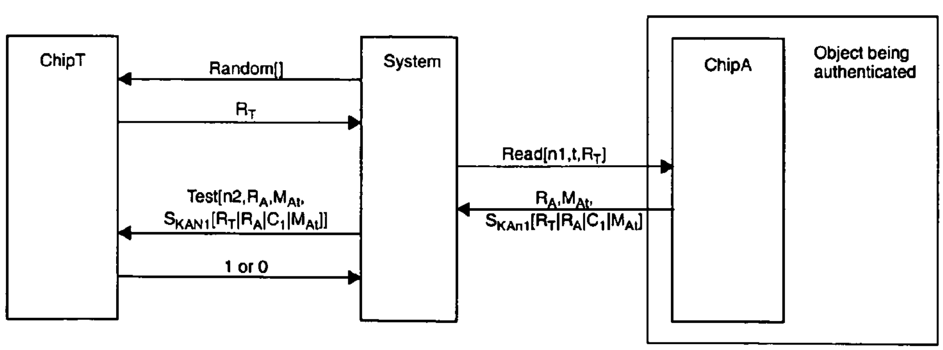
FIG. 342 shows a protocol for a multiple-key multiple-M authenticated read

The data flow for read authentication is shown in FIG. 342 below.

The protocol allows System to simply pass data from one chip to another, with no special processing. The protection relies on ChipT being trusted, even though System does not know K.

When ChipT is physically separate from System (eg is chip on a board connected to System) System must also occassionally (based on system clock for example) call ChipT's Test function with bad data, expecting a 0 response. This is to prevent someone from inserting a fake ChipT into the system that always returns 1 for the Test function.

It is important that n1 is chosen by System. Otherwise ChipA would need to return NA sets of signatures for each read, since ChipA does not know which of the keys will satisfy ChipT. Similarly, system must also choose n2, so it can potentially restrict the number of keys in ChipT that are matched against (otherwise ChipT would have to match against all its keys). This is important in order to restrict how different keys are used. For example, say that ChipT contains 6 keys, keys 0–2 are for various printer-related upgrades, and keys 3–6 are for inks. ChipA contains say 4 keys, one key for each printer model. At power-up, System goes through each of chipA's keys 0–3, trying each out against ChipT's keys 3–6. System doesn't try to match against ChipT's keys 0–2. Otherwise knowledge of a speed-upgrade key could be used to provide ink QA Chip chips. This matching needs to be done only once (eg at power up). Once matching keys are found, System can continue to use those key numbers.

Since System needs to know $N_T$, $N_A$, and $T_A$, part of $M_1$ is used to hold N (eg in Read Only form), and the system can obtain it by calling the Read function, passing in key 0 and t=1.

10.4 Writes

As with the previous scenarios, the System wants to update $M_t$ in ChipU. As before, this can be done in a non-authenticated and authenticated way.

10.4.1 Non-Authenticated Writes

This is the most frequent type of write, and takes place between the System/consumable during normal everyday operation for $M_0$, and during the manufacturing process for $M_t$.

In this kind of write, System wants to change M subject to P. For example, the System could be decrementing the amount of consumable remaining. Although System does not need to know and of the $K_S$ or even have access to a trusted chip to perform the write, System must follow a non-authenticated write by an authenticated read if it needs to know that the write was successful.

The protocol requires the following publicly available function:

Write[t, X] Writes X over those parts of $M_t$ subject to $P_t$ and the existing value for M.

To authenticate a write of $M_{new}$ to ChipA's memory M:

a. System calls ChipU's Write function, passing in $M_{new}$;
b. The authentication procedure for a Read is carried out (see Section 9.3 on page 671);
c. If ChipU is authentic and $M_{new}$=M returned in b, the write succeeded. If not, it failed.

10.4.2 Authenticated Writes

In the multiple memory vectors protocol, only $M_0$ can be written to an an authenticated way. This is because only $M_0$ is considered to have components that need to be upgraded.

In this kind of write, System wants to change Chip U's $M_0$ in an authorized way, without being subject to the permissions that apply during normal operation. For example, the consumable may be at a refilling-station and the normally Decrement Only section of $M_0$ should be updated to include the new valid consumable. In this case, the chip whose $M_0$ is being updated must authenticate the writes being generated by the external System and in addition, apply the appropriate permission for the key to ensure that only the correct parts of $M_0$ are updated. Having a different permission for each key is required as when multiple keys are involved, all keys should not necessarily be given open access to $M_0$. For example, suppose $M_0$ contains printer speed and a counter of money available for franking. A ChipS that updates printer speed should not be capable of updating the amount of money. Since $P_{0 \ldots T-1}$ is used for non-authenticated writes, each $K_n$ has a corresponding permission $P_{T+n}$ that determines what can be updated in an authenticated write.

In this transaction protocol, the System's chip is referred to as ChipS, and the chip being updated is referred to as ChipU. Each chip distrusts the other.

The protocol requires the following publicly available functions in ChipU:

Read[n, t, X] Advances R, and returns R, $M_t$, $S_{Kn}[X|R|C_1|M_t]$. The time taken to calculate the signature must not be based on the contents of X, R, $M_t$, or K.

WriteA[n, X, Y, Z] Advances R, replaces $M_0$ by Y subject to $P_{T+n}$, and returns 1 only if $S_{Kn}[R|X|C_1|Y]$=Z. Otherwise returns 0. The time taken to calculate and compare signatures must be independent of data content. This function is identical to ChipT's Test function except that it additionally writes Y subject to $P_{T+n}$ to its M when the signature matches.

Authenticated writes require that the System has access to a ChipS that is capable of generating appropriate signatures. ChipS requires the following variables and function:

CountRemaining Part of M that contains the number of signatures that ChipS is allowed to generate. Decrements with each successful call to SignM and SignP. Permissions in ChipS's $P_{0..T-1}$ for this part of M needs to be ReadOnly once ChipS has been setup. Therefore CountRemaining can only be updated by another ChipS that will perform updates to that part of M (assuming ChipS's P allows that part of M to be updated).

Q Part of M that contains the write permissions for updating ChipU's M. By adding Q to ChipS we allow different ChipSs that can update different parts of $M_U$. Permissions in ChipS's $P_{0..T-1}$ for this part of M needs to be ReadOnly once ChipS has been setup. Therefore Q can only be updated by another ChipS that will perform updates to that part of M.

SignM[n,V,W,X,Y,Z] Advances R, decrements CountRemaining and returns R, $Z_{QX}$ (Z applied to X with permissions Q), $S_{Kn}[W|R|C_1|Z_{QX}]$ only if Y=$S_{Kn}[V|W|C_1|X]$ and CountRemaining>0. Otherwise returns all 0s. The time taken to calculate and compare signatures must be independent of data content.

To update ChipU's M vector:

a. System calls ChipU's Read function, passing in n1, 0 and 0 as the input parameters;
b. ChipU produces $R_U$, $M_{U0}$, $S_{Kn1}[0|R_U|C_1|M_{U0}]$ and returns these to System;
c. System calls ChipS's SignM function, passing in n2 (the key to be used in ChipS), 0 (as used in a), $R_U$, $M_{U0}$, $S_{Kn1}[0|R_U|C_1|M_{U0}]$, and $M_D$ (the desired vector to be written to ChipU);
d. ChipS produces $R_S$, $M_{QD}$ (processed by running $M_D$ against $M_{U0}$ using Q) and $S_{Kn2}[R_U|R_S|C_1|M_{QD}]$ if the inputs were valid, and 0 for all outputs if the inputs were not valid.
e. If values returned in d are non zero, then ChipU is considered authentic. System can then call ChipU's WriteA function with these values from d.
f. ChipU should return a 1 to indicate success. A 0 should only be returned if the data generated by ChipS is incorrect (e.g. a transmission error).

The choice of n1 and n2 must be such that ChipU's $K_{n1}$=ChipS's $K_{n2}$.

Figure 343:
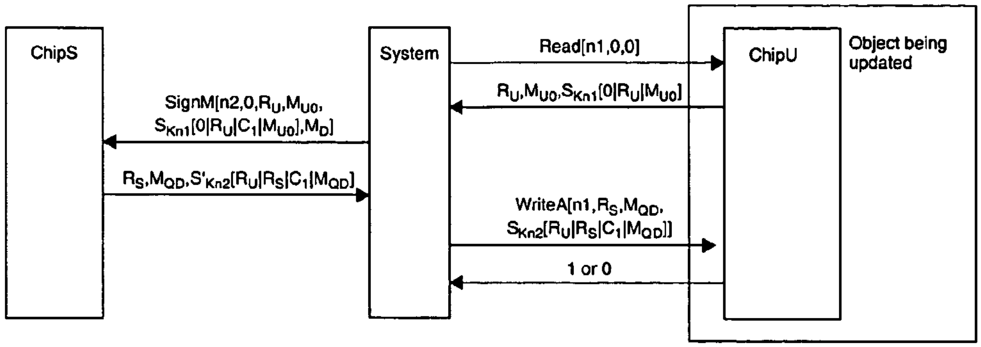
FIG. 343 shows a protocol for a multiple-key authenticated write

The data flow for authenticated writes is shown in FIG. 343 below.

Note that Q in ChipS is part of ChipS's M. This allows a user to set up ChipS with a permission set for upgrades. This should be done to ChipS and that part of M designated by $P_{0..T-1}$ set to ReadOnly before ChipS is programmed with $K_U$. If $K_S$ is programmed with $K_U$ first, there is a risk of someone obtaining a half-setup ChipS and changing all of $M_U$ instead of only the sections specified by Q.

In addition, CountRemaining in ChipS needs to be setup (including making it ReadOnly in $P_S$) before ChipS is programmed with $K_U$. ChipS should therefore be programmed to only perform a limited number of SignM operations (thereby limiting compromise exposure if a ChipS is stolen). Thus ChipS would itself need to be upgraded with a new CountRemaining every so often.

10.4.3 Updating Permissions for Future Writes

In order to reduce exposure to accidental and malicious attacks on P (and certain parts of M), only authorized users are allowed to update P. Writes to P are the same as authorized writes to M, except that they update $P_n$ instead of M. Initially (at manufacture), P is set to be Read/Write for all M. As different processes fill up different parts of M, they can be sealed against future change by updating the permissions. Updating a chip's $P_{0..T-1}$ changes permissions for unauthorized writes to $M_n$, and updating $P_{T..T+N-1}$ changes permissions for authorized writes with key $K_n$.

$P_n$ is only allowed to change to be a more restrictive form of itself. For example, initially all parts of M have permissions of Read/Write. A permission of Read/Write can be updated to Decrement Only or Read Only. A permission of Decrement Only can be updated to become Read Only. A Read Only permission cannot be further restricted.

In this transaction protocol, the System's chip is referred to as ChipS, and the chip being updated is referred to as ChipU. Each chip distrusts the other.

The protocol requires the following publicly available functions in ChipU:

Random□Returns R (does not advance R).

SetPermission[n,p,X,Y,Z] Advances R, and updates $P_p$ according to Y and returns 1 followed by the resultant $P_p$ only if $S_{Kn}[R|X|Y|C_2]$=Z. Otherwise returns 0. $P_p$ can only become more restricted. Passing in 0 for any permission leaves it unchanged (passing in Y=0 returns the current $P_p$).

Authenticated writes of permissions require that the System has access to a ChipS that is capable of generating appropriate signatures. ChipS requires the following variables and function:

CountRemaining Part of ChipS's $M_0$ that contains the number of signatures that ChipS is allowed to generate. Decrements with each successful call to SignM and SignP. Permissions in ChipS's $P_{0..T-1}$ for this part of $M_0$ needs to be ReadOnly once ChipS has been setup. Therefore CountRemaining can only be updated by another ChipS that will perform updates to that part of $M_0$ (assuming ChipS's $P_n$, allows that part of $M_0$ to be updated).

SignP[n,X,Y] Advances R, decrements CountRemaining and returns R and $S_{Kn}[X|R|Y|C_2]$ only if CountRemaining >0. Otherwise returns all 0s. The time taken to calculate and compare signatures must be independent of data content.

To update ChipU's $P_n$:

a. System calls ChipU's Random function;
b. ChipU returns $R_U$ to System;

c. System calls ChipS's SignP function, passing in n1, $R_U$ and $P_D$ (the desired P to be written to ChipU);
d. ChipS produces $R_S$ and $S_{Kn1}[R_U|R_S|P_D|C_2]$ if it is still permitted to produce signatures.
e. If values returned in d are non zero, then System can then call ChipU's SetPermission function with n2, the desired permission entry p, $R_S$, $P_D$ and $S_{Kn1}[R_U|R_S|P_D|C_2]$.
f. ChipU verifies the received signature against $S_{Kn2}[R_U|R_S|P_D|C_2]$ and applies $P_D$ to $P_n$ if the signature matches
g. System checks 1st output parameter. 1=success, 0=failure.

The choice of n1 and n2 must be such that ChipU's $K_{n1}$=ChipS's $K_{n2}$.

Figure 344:
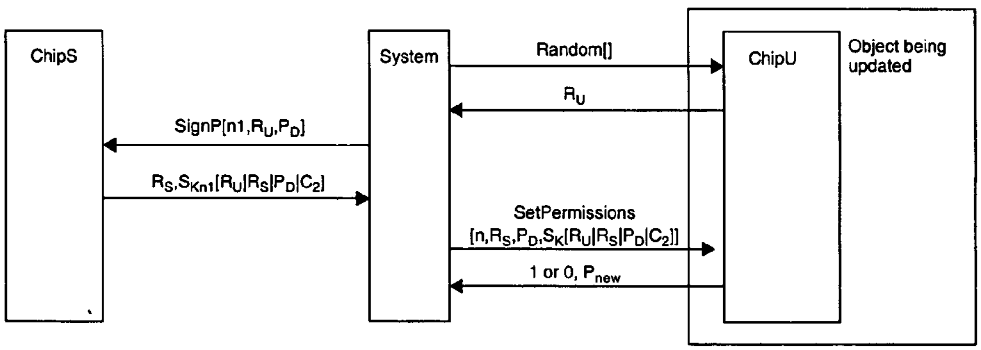
FIG. 344 shows a protocol for a multiple-key update of permissions

The data flow for authenticated writes to permissions is shown in FIG. 344 below.

10.4.4 Protecting M in a Multiple Key Multiple M System

To protect the appropriate part of $M_n$ against unauthorized writes, call SetPermissions[n] for n=0 to T−1. To protect the appropriate part of $M_0$ against authorized writes with key n, call SetPermissions[T+n] for n=0 to N−1.

Note that only $M_0$ can be written in an authenticated fashion.

Note that the SetPermission function must be called after the part of M has been set to the desired value.

For example, if adding a serial number to an area of $M_1$ that is currently ReadWrite so that noone is permitted to update the number again:

the Write function is called to write the serial number to $M_1$

SetPermission(1) is called for to set that part of M to be ReadOnly for non-authorized writes.

If adding a consumable value to $M_0$ such that only keys 1–2 can update it, and keys 0, and 3-N cannot:

the Write function is called to write the amount of consumable to M

SetPermission is called for 0 to set that part of $M_0$ to be DecrementOnly for non-authorized writes. This allows the amount of consumable to decrement.

SetPermission is called for n={T, T+3, T+4 . . . , T+N−1} to set that part of $M_0$ to be ReadOnly for authorized writes using all but keys 1 and 2. This leaves keys 1 and 2 with ReadWrite permissions to $M_0$.

It is possible for someone who knows a key to further restrict other keys, but it is not in anyone's interest to do so.

10.5 Programming K

This section is identical to the multiple key single memory vector (Section 9.5 on page 677). It is repeated here with mention to $M_0$ instead of M for CountRemaining.

In this case, we have a factory chip (ChipF) connected to a System. The System wants to program the key in another chip (ChipP). System wants to avoid passing the new key to ChipP in the clear, and also wants to avoid the possibility of the key-upgrade message being replayed on another ChipP (even if the user doesn't know the key).

The protocol is a simple extension of the single key protocol in that it assumes that ChipF and ChipP already share a secret key $K_{old}$. This key is used to ensure that only a chip that knows $K_{old}$ can set $K_{new}$.

The protocol requires the following publicly available functions in ChipP:

Random□Returns R (does not advance R).

ReplaceKey[n, X, Y, Z] Replaces $K_n$ by $S_{Kn}[R|X|C_3]\oplus Y$, advances R, and returns 1 only if $S_{Kn}[X|Y|C_3]$=Z. Otherwise returns 0. The time taken to calculate signatures and compare values must be identical for all inputs.

And the following data and functions in ChipF:

Random¬ Returns R (does not advance R).

ReplaceKey[n, X, Y, Z] Replaces $K_n$ by $S_{Kn}[R|X|C_3]\oplus Y$, advances R, and returns 1 only if $S_{Kn}[X|Y|C_3]$=Z. Otherwise returns 0. The time taken to calculate signatures and compare values must be identical for all inputs.

And the following data and functions in ChipF:

CountRemaining Part of $M_0$ with contains the number of signatures that ChipF is allowed to generate. Decrements with each successful call to GetProgramKey. Permissions in P for this part of $M_0$ needs to be ReadOnly once ChipF has been setup. Therefore can only be updated by a ChipS that has authority to perform updates to that part of $M_0$.

$K_{new}$ The new key to be transferred from ChipF to ChipP. Must not be visible.

SetPartialKey[X,Y] If word X of $K_{new}$ has not yet been set, set word X of $K_{new}$ to Y and return 1. Otherwise return 0. This function allows $K_{new}$ to be programmed in multiple steps, thereby allowing different people or systems to know different parts of the key (but not the whole $K_{new}$). $K_{new}$ is stored in ChipF's flash memory. Since there is a small number of ChipFs, it is theoretically not necessary to store the inverse of $K_{new}$, but it is stronger protection to do so.

GetProgramKey[n,X] Advances $R_F$, decrements CountRemaining, outputs $R_F$, the encrypted key $S_{Kn}[X|R_F|C_3]\oplus K_{new}$ and a signature of the first two outputs plus $C_3$ if CountRemaining>0. Otherwise outputs 0. The time to calculate the encrypted key & signature must be identical for all inputs.

To update P's key:

a. System calls ChipP's Random function;
b. ChipP returns $R_P$ to System;
c. System calls ChipF's GetProgramKey function, passing in n1 (the desired key to use) and the result from b;
d. ChipF updates $R_F$, then calculates and returns $R_F$, $S_{Kn1}[R_P|R_F|C_3]\oplus K_{new}$, and $S_{Kn1}[R_F|S_{Kn1}[R_P|R_F|C_3]\oplus K_{new}|C_3]$;
e. If the response from d is not 0, System calls ChipP's ReplaceKey function, passing in n2 (the key to use in ChipP) and the response from d;
f. System checks response from ChipP. If the response is 1, then $K_{Pn2}$ has been correctly updated to $K_{new}$. If the response is 0, $K_{Pn2}$ has not been updated.

The choice of n1 and n2 must be such that ChipF's $K_{n1}$=ChipP's $K_{n2}$.

Figure 345:
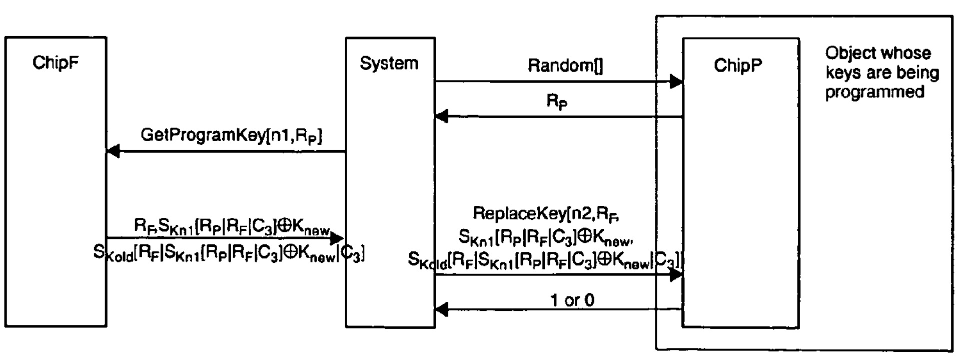
FIG. 345 shows a protocol for a multiple-key update
Figure 346:
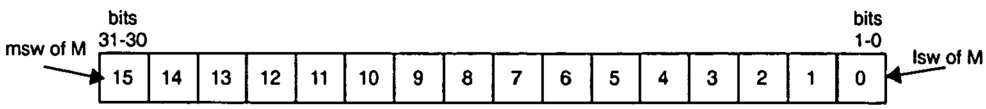
FIG. 346 shows relationship of permissions bits to M[n] access bits

The data flow for key updates is shown in FIG. 345 below.

Note that $K_{new}$ is never passed in the open. An attacker could send its own $R_P$, but cannot produce $S_{Kn1}[R_P|R_F|C_3]$ without $K_{n1}$. The signature based on $K_{new}$ is sent to ensure that ChipP will be able to determine if either of the first two parameters have been changed en route.

CountRemaining needs to be setup in $M_{F0}$ (including making it ReadOnly in P) before ChipF is programmed with $K_P$. ChipF should therefore be programmed to only perform a limited number of GetProgramKey operations (thereby limiting compromise exposure if a ChipF is stolen). An authorized ChipS can be used to update this counter if neccesary (see Section 9.4 on page 673).

10.5.1 Chicken and Egg

As with the single key protocol, for the Program Key protocol to work, both ChipF and ChipP must both know $K_{old}$. Obviously both chips had to be programmed with $K_{old}$, and thus $K_{old}$ can be thought of as an older $K_{new}$: $K_{old}$ can be placed in chips if another ChipF knows $K_{older}$, and so on.

Although this process allows a chain of reprogramming of keys, with each stage secure, at some stage the very first key ($K_{first}$) must be placed in the chips. $K_{first}$ is in fact programmed with the chip's microcode at the manufacturing test station as the last step in manufacturing test. $K_{first}$ can be a manufacturing batch key, changed for each batch or for each customer etc, and can have as short a life as desired. Compromising $K_{first}$ need not result in a complete compromise of the chain of Ks. Depending on reprogramming requirements, $K_{first}$ can be the same or different for all $K_n$.

10.5.2 Security Note

Different ChipFs should have different $R_F$ values to prevent $K_{new}$ from being determined as follows: The attacker needs 2 ChipFs, both with the same $R_F$ and $K_n$ but different values for $K_{new}$. By knowing $K_{new1}$ the attacker can determine $K_{new2}$. The size of $R_F$ is $2^{160}$, and assuming a lifespan of approximately $2^{32}$ $R_S$, an attacker needs about $2^{60}$ ChipFs with the same $K_n$ to locate the correct chip. Given that there are likely to be only hundreds of ChipFs with the same $K_n$, this is not a likely attack. The attack can be eliminated completely by making $C_3$ different per chip and transmitting it with the new signature.

11 Summary of Functions for All Protocols

All protocol sets, whether single key, multiple key, single M or multiple M, all rely on the same set of functions. The function set is listed here:

11.1 All Chips

Since every chip must act as ChipP, ChipA and potentially ChipU, all chips require the following functions:

Random
ReplaceKey
Read
Write
WriteA
SetPermissions 11.2 ChipT

Chips that are to be used as ChipT also require:

Test 11.3 ChipS

Chips that are to be used as ChipS also require either or both of:

SignM
SignP 11.4 ChipF

Chips that are to be used as ChipF also require:

SetPartialKey
GetProgramKey

12 Remote Upgrades 12.1 Basic Remote Upgrades

Regardless of the number of keys and the number of memory vectors, the use of authenticated reads and writes, and of replacing a new key without revealing $K_{new}$ or $K_{old}$ allows the possibility of remote upgrades of ChipU and ChipP. The upgrade typically involves a remote server and follows two basic steps:

a. During the first stage of the upgrade, the remote system authenticates the user's system to ensure the user's system has the setup that it claims to have.
b. During the second stage of the upgrade, the user's system authenticates the remote system to ensure that the upgrade is from a trusted source.

12.1.1 User Requests Upgrade

The user requests that he wants to upgrade. This can be done by running a specific upgrade application on the user's computer, or by visiting a specific website.

12.1.2 Remote System Gathers Info Securely about User's Current Setup

In this step, the remote system determines the current setup for the user. The current setup must be authenticated, to ensure that the user truly has the setup that is claimed. Traditionally, this has been by checking the existence of files, generating checksums from those files, or by getting a serial number from a hardware dongle, although these traditional methods have difficulties since they can be generated locally by "hacked" software.

The authenticated read protocol described in Section 8.3 on page 664 can be used to accomplish this step. The use of random numbers has the advantage that the local user cannot capture a successful transaction and play it back on another computer system to fool the remote system.

12.1.3 Remote System Gives User Choice of Upgrade Possibilities & User Chooses

If there is more than one upgrade possibility, the various upgrade options are now presented to the user. The upgrade options could vary based on a number of factors, including, but not limited to:

current user setup
user's preference for payment schemes (e.g. single payment vs. multiple payment)
number of other products owned by user The user selects an appropriate upgrade and pays if necessary (by some scheme such as via a secure web site). What is important to note here is that the user chooses a specific upgrade and commences the upgrade operation.

12.1.4 Remote System Sends Upgrade Request to Local System

The remote system now instructs the local system to perform the upgrade. However, the local system can only accept an upgrade from the remote system if the remote system is also authenticated. This is effectively an authenticated write. The use of $R_U$ in the signature prevents the upgrade message from being replayed on another ChipU.

If multiple keys are used, and each chip has a unique key, the remote system can use a serial number obtained from the current setup (authenticated by a common key) to lookup the unique key for use in the upgrade. Although the random number provides time varying messages, use of an unknown K that is different for each chip means that collection and examination of messages and their signatures is made even more difficult.

12.2 OEM Upgrades

OEM upgrades are effectively the same as remote upgrades, except that the user interacts with an OEM server for upgrade selection. The OEM server may send subrequests to the manufacturer's remote server to provide authentication, upgrade availability lists, and base-level pricing information.

An additional level of authentication may be incorporated into the protocol to ensure that upgrade requests are coming from the OEM server, and not from a 3rd party. This can readily be incorporated into both authentication steps.

13 Choice of Signature Function

Given that all protocols make use of keyed signature functions, the choice of function is examined here.

Table 232 outlines the attributes of the applicable choices (see Section 5.2 on page 629 and Section 5.5 on page 636 for more information). The attributes are phrased so that the attribute is seen as an advantage.

TABLE 232

Attributes of Applicable Signature Functions

| | Triple DES | Blowfish | RC5 | IDEA | Random Sequences | HMAC-MD5 | HMAC-SHA1 | HMAC-RIPEMD160 |
|---|---|---|---|---|---|---|---|---|
| Free of patents | • | • | | | • | • | • | • |
| Random key generation | | | | | | • | • | • |
| Can be exported from the USA | | | | | • | • | • | • |
| Fast | | • | | | | • | • | • |
| Preferred Key Size (bits) or use in this application | 168[1] | 128 | 128 | 128 | 512 | 128 | 160 | 160 |
| Block size (bits) | 64 | 64 | 64 | 64 | 256 | 512 | 512 | 512 |
| Cryptanalysis Attack-Free (apart from weak keys) | • | • | | | • | | • | • |
| Output size given input size N | ≧N | ≧N | ≧N | ≧N | 128 | 128 | 160 | 160 |
| Low storage requirements | | | | | • | • | • | • |
| Low silicon complexity | | | | | • | • | • | • |
| NSA designed | • | | | | | | • | |

[1]Only gives protection equivalent to 112-bit DES

An examination of Table 232 shows that the choice is effectively between the 3 HMAC constructs and the Random Sequence. The problem of key size and key generation eliminates the Random Sequence. Given that a number of attacks have already been carried out on MD5 and since the hash result is only 128 bits, HMAC-MD5 is also eliminated. The choice is therefore between HMAC-SHA1 and HMAC-RIPEMD160. Of these, SHA-1 is the preferred function, since:

SHA-1 has been more extensively cryptanalyzed without being broken;

SHA-1 requires slightly less intermediate storage than RIPE-MD-160;

SHA-1 is algorithmically less complex than RIPE-MD-160;

Although SHA-1 is slightly faster than RIPE-MD-160, this was not a reason for choosing SHA-1.

13.1 HMAC-SHA1

The mechanism for authentication is the HMAC-SHA1 algorithm. This section examines the HMAC-SHA1 algorithm in greater detail than covered so far, and describes an optimization of the algorithm that requires fewer memory resources than the original definition.

13.1.1 HMAC

Given the following definitions:

H=the hash function (e.g. MD5 or SHA-1)

n=number of bits output from H (e.g. 160 for SHA-1, 128 bits for MD5)

M=the data to which the MAC function is to be applied

K=the secret key shared by the two parties ipad=0x36 repeated 64 times opad=0x5C repeated 64 times The HMAC algorithm is as follows:

a. Extend K to 64 bytes by appending 0x00 bytes to the end of K b. XOR the 64 byte string created in (1) with ipad c. append data stream M to the 64 byte string created in (2)

d. Apply H to the stream generated in (3)

e. XOR the 64 byte string created in (1) with opad f. Append the H result from (4) to the 64 byte string resulting from (5)

g. Apply H to the output of (6) and output the result

Thus:

$$HMAC[M]=H[(K\oplus \text{opad})|H[(K\oplus \text{ipad})|M]]$$

The HMAC-SHA1 algorithm is simply HMAC with H=SHA-1.

13.1.2 SHA-1

The SHA1 hashing algorithm is described in the context of other hashing algorithms in Section 5.5.3.3 on page 640, and completely defined in [28]. The algorithm is summarized here. Nine 32-bit constants are defined in Table 233. There are 5 constants used to initialize the chaining variables, and there are 4 additive constants.

TABLE 233

Constants used in SHA-1

| Initial Chaining Values | | Additive Constants | |
|---|---|---|---|
| $h_1$ | 0x67452301 | $y_1$ | 0x5A827999 |
| $h_2$ | 0xEFCDAB89 | $y_2$ | 0x6ED9EBA1 |
| $h_3$ | 0x98BADCFE | $y_3$ | 0x8F1BBCDC |
| $h_4$ | 0x10325476 | $y_4$ | 0xCA62C1D6 |
| $h_5$ | 0xC3D2E1F0 | | |

Non-optimized SHA-1 requires a total of 2912 bits of data storage:

Five 32-bit chaining variables are defined: $H_1$, $H_2$, $H_3$, $H_4$ and $H_5$.

Five 32-bit working variables are defined: A, B, C, D, and E.

One 32-bit temporary variable is defined: t.

Eighty 32-bit temporary registers are defined: $X_{0-79}$.

The following functions are defined for SHA-1:

TABLE 234

| Functions used in SHA-1 | |
|---|---|
| Symbolic Nomenclature | Description |
| + | Addition modulo $2^{32}$ |
| $X \ll Y$ | Result of rotating X left through Y bit positions |
| f(X, Y, Z) | $(X \wedge Y) \vee (\neg X \wedge Z)$ |
| g(X, Y, Z) | $(X \wedge Y) \vee (X \wedge Z) \vee (Y \wedge Z)$ |
| h(X, Y, Z) | $X \oplus Y \oplus Z$ |

The hashing algorithm consists of firstly padding the input message to be a multiple of 512 bits and initializing the chaining variables $H_{1-5}$ with $h_{1-5}$. The padded message is then processed in 512-bit chunks, with the output hash value being the final 160-bit value given by the concatenation of the chaining variables: $H_1|H_2|H_3|H_4|H_5$.

The steps of the SHA-1 algorithm are now examined in greater detail.

13.1.2.1 Step 1. Preprocessing

The first step of SHA-1 is to pad the input message to be a multiple of 512 bits as follows and to initialize the chaining variables.

TABLE 235

| Steps to follow to preprocess the input message | |
|---|---|
| Pad the input message | Append a 1 bit to the message |
| | Append 0 bits such that the length of the padded message is 64-bits short of a multiple of 512 bits. |
| | Append a 64-bit value containing the length in bits of the original input message. Store the length as most significant bit through to least significant bit. |
| Initialize the chaining variables | $H_1 \leftarrow h_1$, $H_2 \leftarrow h_2$, $H_3 \leftarrow h_3$, $H_4 \leftarrow h_4$, $H_5 \leftarrow h_5$ |

13.1.2.2 Step 2. Processing

The padded input message is processed in 512-bit blocks. Each 512-bit block is in the form of 16×32-bit words, referred to as $\text{InputWord}_{0-15}$.

TABLE 236

| Steps to follow for each 512 bit block ($\text{InputWord}_{0-15}$) | |
|---|---|
| Copy the 512 input bits into $X_{0-15}$ | For j = 0 to 15<br>$X_j = \text{InputWord}_j$ |
| Expand $X_{0-15}$ into $X_{16-79}$ | For j = 16 to 79<br>$Xj \leftarrow ((X_{j-3} \oplus X_{j-8} \oplus X_{j-14} \oplus X_{j-16}) \ll 1)$ |
| Initialize working variables | $A \leftarrow H_1$, $B \leftarrow H_2$, $C \leftarrow H_3$, $D \leftarrow H_4$,<br>$E \leftarrow H_5$ |
| Round 1 | For j = 0 to 19<br>$t \leftarrow ((A \ll 5) + f(B, C, D) + E + Xj + y_1)$<br>$E \leftarrow D$, $D \leftarrow C$, $C \leftarrow (B \ll 30)$, $B \leftarrow A$,<br>$A \leftarrow t$ |
| Round 2 | For j = 20 to 39<br>$t \leftarrow ((A \ll 5) + h(B, C, D) + E + Xj + y_2)$<br>$E \leftarrow D$, $D \leftarrow C$, $C \leftarrow (B \ll 30)$, $B \leftarrow A$,<br>$A \leftarrow t$ |
| Round 3 | For j = 40 to 59<br>$t \leftarrow ((A \ll 5) + g(B, C, D) + E + Xj + y_3)$<br>$E \leftarrow D$, $D \leftarrow C$, $C \leftarrow (B \ll 30)$, $B \leftarrow A$,<br>$A \leftarrow t$ |

TABLE 236-continued

| Steps to follow for each 512 bit block ($\text{InputWord}_{0-15}$) | |
|---|---|
| Round 4 | For j = 60 to 79<br>$t \leftarrow ((A \ll 5) + h(B, C, D) + E + Xj + y_4)$<br>$E \leftarrow D$, $D \leftarrow C$, $C \leftarrow (B \ll 30)$, $B \leftarrow A$,<br>$A \leftarrow t$ |
| Update chaining variables | $H_1 \leftarrow H_1 + A$, $H_2 \leftarrow H_2 + B$,<br>$H_3 \leftarrow H_3 + C$, $H_4 \leftarrow H_4 + D$,<br>$H_5 \leftarrow H_5 + E$ |

The bold text is to emphasize the differences between each round.

13.1.2.3 Step 3. Completion

After all the 512-bit blocks of the padded input message have been processed, the output hash value is the final 160-bit value given by: $H_1|H_2|H_3|H_4|H_5$.

13.1.2.4 Optimization for Hardware Implementation

The SHA-1 Step 2 procedure is not optimized for hardware. In particular, the 80 temporary 32-bit registers use up valuable silicon on a hardware implementation. This section describes an optimization to the SHA-1 algorithm that only uses 16 temporary registers. The reduction in silicon is from 2560 bits down to 512 bits, a saving of over 2000 bits. It may not be important in some applications, but in the QA Chip storage space must be reduced where possible.

The optimization is based on the fact that although the original 16-word message block is expanded into an 80-word message block, the 80 words are not updated during the algorithm. In addition, the words rely on the previous 16 words only, and hence the expanded words can be calculated on-the-fly during processing, as long as we keep 16 words for the backward references. We require rotating counters to keep track of which register we are up to using, but the effect is to save a large amount of storage.

Rather than index X by a single value j, we use a 5 bit counter to count through the iterations. This can be achieved by initializing a 5-bit register with either 16 or 20, and decrementing it until it reaches 0. In order to update the 16 temporary variables as if they were 80, we require 4 indexes, each a 4-bit register. All 4 indexes increment (with wrap-around) during the course of the algorithm.

TABLE 237

| Optimised Steps to follow for each 512 bit block ($\text{InputWord}_{0-15}$) | |
|---|---|
| Initialize working variables | $A \leftarrow H_1$, $B \leftarrow H_2$, $C \leftarrow H_3$, $D \leftarrow H_4$,<br>$E \leftarrow H_5$<br>$N_1 \leftarrow 13$, $N_2 \leftarrow 8$, $N_3 \leftarrow 2$, $N_4 \leftarrow 0$ |
| Round 0 Copy the 512 input bits into $X_{0-15}$ | Do 16 times<br>$X_{N4} = \text{InputWord}_{N4}$<br>$[\Uparrow N_1, \Uparrow N_2, \Uparrow N_3]_{optional}$ $\Uparrow N_4$ |
| Round 1A | Do 16 times<br>$t \leftarrow ((A \ll 5) + f(B, C, D) + E + X_{N4} + y_1)$<br>$[\Uparrow N_1, \Uparrow N_2, \Uparrow N_3]_{optional}$ $\Uparrow N_4$<br>$E \leftarrow D$, $D \leftarrow C$, $C \leftarrow (B \ll 30)$, $B \leftarrow A$,<br>$A \leftarrow t$ |
| Round 1B | Do 4 times<br>$X_{N4} \leftarrow ((X_{N1} \oplus X_{N2} \oplus X_{N3} \oplus X_{N4}) \ll 1)$<br>$t \leftarrow ((A \ll 5) + f(B, C, D) + E + X_{N4} + y_1)$<br>$\Uparrow N_1$, $\Uparrow N_2$, $\Uparrow N_3$, $\Uparrow N_4$<br>$E \leftarrow D$, $D \leftarrow C$, $C \leftarrow (B \ll 30)$, $B \leftarrow A$,<br>$A \leftarrow t$ |
| Round 2 | Do 20 times<br>$X_{N4} \leftarrow ((X_{N1} \oplus X_{N2} \oplus X_{N3} \oplus X_{N4}) \ll 1)$<br>$t \leftarrow ((A \ll 5) + h(B, C, D) + E + X_{N4} + y_2)$<br>$\Uparrow N_1$, $\Uparrow N_2$, $\Uparrow N_3$, $\Uparrow N_4$ |

TABLE 237-continued

| Optimised Steps to follow for each 512 bit block ($InputWord_{0-15}$) | |
|---|---|
| | $E \leftarrow D$, $D \leftarrow C$, $C \leftarrow (B \ll 30)$, $B \leftarrow A$, $A \leftarrow t$ |
| Round 3 | Do 20 times<br>$X_{N4} \leftarrow ((X_{N1} \oplus X_{N2} \oplus X_{N3} \oplus X_{N4}) \ll 1)$<br>$t \leftarrow ((A \ll 5) + g(B, C, D) + E + X_{N4} + y_3)$<br>$\Uparrow N_1$, $\Uparrow N_2$, $\Uparrow N_3$, $\Uparrow N_4$<br>$E \leftarrow D$, $D \leftarrow C$, $C \leftarrow (B \ll 30)$, $B \leftarrow A$, $A \leftarrow t$ |
| Round 4 | Do 20 times<br>$X_{N4} \leftarrow ((X_{N1} \oplus X_{N2} \oplus X_{N3} \oplus X_{N4}) \ll 1)$<br>$t \leftarrow ((A \ll 5) + h(B, C, D) + E + X_{N4} + y_4)$<br>$\Uparrow N_1$, $\Uparrow N_2$, $\Uparrow N_3$, $\Uparrow N_4$<br>$E \leftarrow D$, $D \leftarrow C$, $C \leftarrow (B \ll 30)$, $B \leftarrow A$, $A \leftarrow t$ |
| Update chaining variables | $H_1 \leftarrow H_1 + A$, $H_2 \leftarrow H_2 + B$,<br>$H_3 \leftarrow H_3 + C$, $H_4 \leftarrow H_4 + D$,<br>$H_5 \leftarrow H_5 + E$ |

The bold text is to emphasize the differences between each round.

The incrementing of $N_1$, $N_2$, and $N_3$ during Rounds 0 and 1A is optional. A software implementation would not increment them, since it takes time, and at the end of the 16 times through the loop, all 4 counters will be their original values. Designers of hardware may wish to increment all 4 counters together to save on control logic.

Round 0 can be completely omitted if the caller loads the 512 bits of $X_{0-15}$.

14 Holding Out Against Attacks

The authentication protocols described in Section 7 on page 661 onward should be resistant to defeat by logical means. This section details each type of attack in turn with reference to the Read Authentication protocol.

14.1 Brute Force Attack

A brute force attack is guaranteed to break any protocol. However the length of the key means that the time for an attacker to perform a brute force attack is too long to be worth the effort.

An attacker only needs to break K to build a clone authentication chip. A brute force attack on K must therefore break a 160-bit key.

An attack against K requires a maximum of $2^{160}$ attempts, with a 50% chance of finding the key after only $2^{159}$ attempts. Assuming an array of a trillion processors, each running one million tests per second, $2^{159}$ ($7.3\times10^{47}$) tests takes $2.3\times10^{22}$ years, which is longer than the total lifetime of the universe. There are around 100 million personal computers in the world. Even if these were all connected in an attack (e.g. via the Internet), this number is still 10,000 times smaller than the trillion-processor attack described. Further, if the manufacture of one trillion processors becomes a possibility in the age of nanocomputers, the time taken to obtain the key is still longer than the total lifetime of the universe.

14.2 Guessing the Key Attack

It is theoretically possible that an attacker can simply "guess the key". In fact, given enough time, and trying every possible number, an attacker will obtain the key. This is identical to the brute force attack described above, where $2^{159}$ attempts must be made before a 50% chance of success is obtained.

The chances of someone simply guessing the key on the first try is $2^{160}$. For comparison, the chance of someone winning the top prize in a U.S. state lottery and being killed by lightning in the same day is only 1 in $2^{61}$ [78]. The chance of someone guessing the authentication chip key on the first go is 1 in $2^{160}$, which is comparable to two people choosing exactly the same atoms from a choice of all the atoms in the Earth i.e. extremely unlikely.

14.3 Quantum Computer Attack

To break K, a quantum computer containing 160 qubits embedded in an appropriate algorithm must be built. As described in Section 5.7.1.7 on page 648, an attack against a 160-bit key is not feasible. An outside estimate of the possibility of quantum computers is that 50 qubits may be achievable within 50 years. Even using a 50 qubit quantum computer, $2^{110}$ tests are required to crack a 160 bit key. Assuming an array of 1 billion 50 qubit quantum computers, each able to try $2^{50}$ keys in 1 microsecond (beyond the current wildest estimates) finding the key would take an average of 18 billion years.

14.4 Ciphertext Only Attack

An attacker can launch a ciphertext only attack on K by monitoring calls to Random and Read.

However, given that all these calls also reveal the plaintext as well as the hashed form of the plaintext, the attack would be transformed into a stronger form of attack—a known plaintext attack.

14.5 Known Plaintext Attack

It is easy to connect a logic analyzer to the connection between the System and the authentication chip, and thereby monitor the flow of data. This flow of data results in known plaintext and the hashed form of the plaintext, which can therefore be used to launch a known plaintext attack against K.

To launch an attack against K, multiple calls to Random and Test must be made (with the call to Test being successful, and therefore requiring a call to Read on a valid chip). This is straightforward, requiring the attacker to have both a system authentication chip and a consumable authentication chip. For each set of calls, an X, $S_K[X]$ pair is revealed. The attacker must collect these pairs for further analysis.

The question arises of how many pairs must be collected for a meaningful attack to be launched with this data. An example of an attack that requires collection of data for statistical analysis is differential cryptanalysis (see Section 14.13 on page 703). However, there are no known attacks against SHA-1 or HMAC-SHA1 [7][7][7], so there is no use for the collected data at this time.

14.6 Chosen Plaintext Attacks

The golden rule for the QA Chip is that it never signs something that is simply given to it—i.e. it never lets the user choose the message that is signed.

Although the attacker can choose both $R_T$ and possibly M, ChipA advances its random number $R_A$ with each call to Read. The resultant message X therefore contains 160 bits of changing data each call that are not chosen by the attacker.

To launch a chosen text attack the attacker would need to locate a chip whose R was the desired R. This makes the search effectively impossible.

14.7 Adaptive Chosen Plaintext Attacks

The HMAC construct provides security against all forms of chosen plaintext attacks [7]. This is primarily because the HMAC construct has 2 secret input variables (the result of the original hash, and the secret key). Thus finding collisions in the hash function itself when the input variable is secret is even harder than finding collisions in the plain hash function. This is because the former requires direct access to SHA-1 in order to generate pairs of input/output from SHA-1.

Since R changes with each call to Read, the user cannot choose the complete message. The only value that can be collected by an attacker is HMAC[$R_1$|$R_2$|$M_2$]. These are not attacks against the SHA-1 hash function itself, and reduce the attack to a differential cryptanalysis attack (see Section 14.13 on page 703), examining statistical differences between collected data. Given that there is no differential cryptanalysis attack known against SHA-1 or HMAC, the protocols are resistant to the adaptive chosen plaintext attacks.

14.8 Purposeful Error Attack

An attacker can only launch a purposeful error attack on the Test function, since this is the only function in the Read protocol that validates input against the keys.

With the Test function, a 0 value is produced if an error is found in the input—no further information is given. In addition, the time taken to produce the 0 result is independent of the input, giving the attacker no information about which bit(s) were wrong.

A purposeful error attack is therefore fruitless.

14.9 Chaining Attack

Any form of chaining attack assumes that the message to be hashed is over several blocks, or the input variables can somehow be set. The HMAC-SHA1 algorithm used by Protocol C1 only ever hashes one or two 512-bit blocks. Chaining attacks are not possible when only one block is used, and are extremely limited when two blocks are used.

14.10 Birthday Attack

The strongest attack known against HMAC is the birthday attack, based on the frequency of collisions for the hash function [7][7]. However this is totally impractical for minimally reasonable hash functions such as SHA-1. And the birthday attack is only possible when the attacker has control over the message that is hashed.

Since in the protocols described for the QA Chip, the message to be signed is never chosen by the attacker (at least one 160-bit R value is chosen by the chip doing the signing), the attacker has no control over the message that is hashed. An attacker must instead search for a collision message that hashes to the same value (analogous to finding one person who shares your birthday).

The clone chip must therefore attempt to find a new value $R_2$ such that the hash of $R_1$, $R_2$ and a chosen $M_2$ yields the same hash value as H[$R_1$|$R_2$|M]. However ChipT does not reveal the correct hash value (the Test function only returns 1 or 0 depending on whether the hash value is correct).

Therefore the only way of finding out the correct hash value (in order to find a collision) is to interrogate a real ChipA. But to find the correct value means to update M, and since the decrement-only parts of M are one-way, and the read-only parts of M cannot be changed, a clone consumable would have to update a real consumable before attempting to find a collision. The alternative is a brute force attack search on the Test function to find a success (requiring each clone consumable to have access to a System consumable). A brute force search, as described above, takes longer than the lifetime of the universe, in this case, per authentication.

There is no point for a clone consumable to launch this kind of attack.

14.11 Substitution with a Complete Lookup Table

The random number seed in each System is 160 bits. The best case situation for an attacker is that no state data has been changed. Assuming also that the clone consumable does not advance its R, there is a constant value returned as M. A clone chip must therefore return $S_K$[R|c] (where c is a constant), which is a 160 bit value.

Assuming a 160-bit lookup of a 160-bit result, this requires $2.9\times10^{49}$ bytes, or $2.6\times10^{37}$ terabytes, certainly more space than is feasible for the near future. This of course does not even take into account the method of collecting the values for the ROM. A complete lookup table is therefore completely impossible.

14.12 Substitution with a Sparse Lookup Table

A sparse lookup table is only feasible if the messages sent to the authentication chip are somehow predictable, rather than effectively random.

The random number R is seeded with an unknown random number, gathered from a naturally System authentication chip's Random function, and iterating some random event. There is no possibility for a clone manufacturer to know what the possible range of R is for all Systems, since each bit has an unrelated chance of being 1 or 0.

Since the range of R in all systems is unknown, it is not possible to build a sparse lookup table that can be used in all systems. The general sparse lookup table is therefore not a possible attack.

However, it is possible for a clone manufacturer to know what the range of R is for a given System. This can be accomplished by loading a LFSR with the current result from a call to a specific number of times into the future. If this is done, a special ROM can be built which will only contain the responses for that particular range of R, i.e. a ROM specifically for the consumables of that particular System. But the attacker still needs to place correct information in the ROM. The attacker will therefore need to find a valid authentication chip and call it for each of the values in R. Suppose the clone authentication chip reports a full consumable, and then allows a single use before simulating loss of connection and insertion of a new full consumable. The clone consumable would therefore need to contain responses for authentication of a full consumable and authentication of a partially used consumable. The worst case ROM contains entries for full and partially used consumables for R over the lifetime of System. However, a valid authentication chip must be used to generate the information, and be partially used in the process. If a given System only produces n R-values, the sparse lookup-ROM required is 20n bytes (20=160/8) multiplied by the number of different values for M. The time taken to build the ROM depends on the amount of time enforced between calls to Read.

After all this, the clone manufacturer must rely on the consumer returning for a refill, since the cost of building the ROM in the first place consumes a single consumable. The clone manufacturer's business in such a situation is consequently in the refills.

The time and cost then, depends on the size of R and the number of different values for M that must be incorporated in the lookup. In addition, a custom clone consumable ROM must be built to match each and every System, and a different valid authentication chip must be used for each System (in order to provide the full and partially used data). The use of an authentication chip in a System must therefore be examined to determine whether or not this kind of attack is worthwhile for a clone manufacturer.

As an example, of a camera system that has about 10,000 prints in its lifetime. Assume it has a single Decrement Only value (number of prints remaining), and a delay of 1 second between calls to Read. In such a system, the sparse table will take about 3 hours to build, and consumes 100K. Remember that the construction of the ROM requires the consumption of a valid authentication chip, so any money charged must be worth more than a single consumable and the clone consumable combined. Thus it is not cost effective to perform this function for a single consumable (unless the clone consumable somehow contained the equivalent of multiple authentic consumables).

If a clone manufacturer is going to go to the trouble of building a custom ROM for each owner of a System, an easier approach would be to update System to completely ignore the authentication chip.

Consequently, this attack is possible as a per-System attack, and a decision must be made about the chance of this occurring for a given System/Consumable combination. The chance will depend on the cost of the consumable and authentication chips, the longevity of the consumable, the profit margin on the consumable, the time taken to generate the ROM, the size of the resultant ROM, and whether customers will come back to the clone manufacturer for refills that use the same clone chip etc.

14.13 Differential Cryptanalysis

Existing differential attacks are heavily dependent on the structure of S boxes, as used in DES and other similar algorithms. Although HMAC-SHA1 has no S boxes, an attacker can undertake a differential-like attack by undertaking statistical analysis of:

- Minimal-difference inputs, and their corresponding outputs
- Minimal-difference outputs, and their corresponding inputs To launch an attack of this nature, sets of input/output pairs must be collected. The collection can be via known plaintext, or from a partially adaptive chosen plaintext attack. Obviously the latter, being chosen, will be more useful.

Hashing algorithms in general are designed to be resistant to differential analysis. SHA-1 in particular has been specifically strengthened, especially by the 80 word expansion so that minimal differences in input will still produce outputs that vary in a larger number of bit positions (compared to 128 bit hash functions). In addition, the information collected is not a direct SHA-1 input/output set, due to the nature of the HMAC algorithm. The HMAC algorithm hashes a known value with an unknown value (the key), and the result of this hash is then rehashed with a separate unknown value. Since the attacker does not know the secret value, nor the result of the first hash, the inputs and outputs from SHA-1 are not known, making any differential attack extremely difficult.

There are no known differential attacks against SHA-1 or HMAC-SHA-1 [56][56].

The following is a more detailed discussion of minimally different inputs and outputs from the QA Chip.

14.13.1 Minimal Difference Inputs

This is where an attacker takes a set of X, $S_K[X]$ values where the X values are minimally different, and examines the statistical differences between the outputs $S_K[X]$. The attack relies on X values that only differ by a minimal number of bits. The question then arises as to how to obtain minimally different X values in order to compare the $S_K[X]$ values.

Although the attacker can choose both $R_T$ and possibly M, ChipA advances its random number $R_A$ with each call to Read. The resultant X therefore contains 160 bits of changing data each call, and is therefore not minimally different.

14.13.2 Minimal Difference Outputs

This is where an attacker takes a set of X, $S_K[X]$ values where the $S_K[X]$ values are minimally different, and examines the statistical differences between the X values. The attack relies on $S_K[X]$ values that only differ by a minimal number of bits.

There is no way for an attacker to generate an X value for a given $S_K[X]$. To do so would violate the fact that S is a one-way function (HMAC-SHA1). Consequently the only way for an attacker to mount an attack of this nature is to record all observed X, $S_K[X]$ pairs in a table. A search must then be made through the observed values for enough minimally different $S_K[X]$ values to undertake a statistical analysis of the X values.

14.14 Message Substitution Attacks

In order for this kind of attack to be carried out, a clone consumable must contain a real authentication chip, but one that is effectively reusable since it never gets decremented. The clone authentication chip would intercept messages, and substitute its own. However this attack does not give success to the attacker.

A clone authentication chip may choose not to pass on a Write command to the real authentication chip. However the subsequent Read command must return the correct response (as if the Write had succeeded). To return the correct response, the hash value must be known for the specific R and M. An attacker can only determine the hash value by actually updating M in a real Chip, which the attacker does not want to do. Even changing the R sent by System does not help since the System authentication chip must match the R during a subsequent Test.

A message substitution attack would therefore be unsuccessful. This is only true if System updates the amount of consumable remaining before it is used.

14.15 Reverse Engineering the Key Generator

If a pseudo-random number generator is used to generate keys, there is the potential for a clone manufacture to obtain the generator program or to deduce the random seed used. This was the way in which the security layer of the Netscape browser was initially broken [33].

14.16 Bypassing the Authentication Process

The System should ideally update the consumable state data before the consumable is used, and follow every write by a read (to authenticate the write). Thus each use of the consumable requires an authentication. If the System adheres to these two simple rules, a clone manufacturer will have to simulate authentication via a method above (such as sparse ROM lookup).

14.17 Reuse of Authentication Chips

Each use of the consumable requires an authentication. If a consumable has been used up, then its authentication chip will have had the appropriate state-data values decremented to 0. The chip can therefore not be used in another consumable.

Note that this only holds true for authentication chips that hold Decrement-Only data items. If there is no state data decremented with each usage, there is nothing stopping the reuse of the chip. This is the basic difference between Presence-Only authentication and Consumable Lifetime authentication. All described protocols allow both.

The bottom line is that if a consumable has Decrement Only data items that are used by the System, the authentication chip cannot be reused without being completely reprogrammed by a valid programming station that has knowledge of the secret key (e.g. an authorized refill station).

14.18 Management Decision to Omit Authentication to Save Costs

Although not strictly an external attack, a decision to omit authentication in future Systems in order to save costs will have widely varying effects on different markets.

In the case of high volume consumables, it is essential to remember that it is very difficult to introduce authentication after the market has started, as systems requiring authenticated consumables will not work with older consumables still in circulation. Likewise, it is impractical to discontinue authentication at any stage, as older Systems will not work with the new, unauthenticated, consumables. In the second case, older Systems can be individually altered by replacing the System program code.

Without any form of protection, illegal cloning of high volume consumables is almost certain. However, with the patent and copyright protection, the probability of illegal cloning may be, say 50%. However, this is not the only loss possible. If a clone manufacturer were to introduce clone consumables which caused damage to the System (e.g. clogged nozzles in a printer due to poor quality ink), then the loss in market acceptance, and the expense of warranty repairs, may be significant.

In the case of a specialized pairing, such as a car/car-keys, or door/door-key, or some other similar situation, the omission of authentication in future systems is trivial and without repercussions. This is because the consumer is sold the entire set of System and Consumable authentication chips at the one time.

14.19 Garrote/Bribe Attack

If humans do not know the key, there is no amount of force or bribery that can reveal them. The use of ChipF and the ReplaceKey protocol is specifically designed to avoid the requirement of the programming station having to know the new key. However ChipF must be told the new key at some stage, and therefore it is the person(s) who enter the new key into ChipF that are at risk.

The level of security against this kind of attack is ultimately a decision for the System/Consumable owner, to be made according to the desired level of service.

For example, a car company may wish to keep a record of all keys manufactured, so that a person can request a new key to be made for their car. However this allows the potential compromise of the entire key database, allowing an attacker to make keys for any of the manufacturer's existing cars. It does not allow an attacker to make keys for any new cars. Of course, the key database itself may also be encrypted with a further key that requires a certain number of people to combine their key portions together for access. If no record is kept of which key is used in a particular car, there is no way to make additional keys should one become lost. Thus an owner will have to replace his car's authentication chip and all his car-keys. This is not necessarily a bad situation.

By contrast, in a consumable such as a printer ink cartridge, the one key combination is used for all Systems and all consumables. Certainly if no backup of the keys is kept, there is no human with knowledge of the key, and therefore no attack is possible. However, a no-backup situation is not desirable for a consumable such as ink cartridges, since if the key is lost no more consumables can be made. The manufacturer should therefore keep a backup of the key information in several parts, where a certain number of people must together combine their portions to reveal the full key information. This may be required if case the chip programming station needs to be reloaded.

In any case, none of these attacks are against the authenticated read protocol, since no humans are involved in the authentication process.

Logical Interface

15 Introduction

The QA Chip has a physical and a logical external interface. The physical interface defines how the QA Chip can be connected to a physical System, while the logical interface determines how that System can communicate with the QA ChIP. This section deals with the logical interface.

15.1 Operating Modes

The QA Chip has four operating modes—Idle Mode, Program Mode, Trim Mode and Active Mode.

- Idle Mode is used to allow the chip to wait for the next instruction from the System.
- Trim Mode is used to determine the clock speed of the chip and to trim the frequency during the initial programming stage of the chip (when Flash memory is garbage). The clock frequency must be trimmed via Trim Mode before Program Mode is used to store the program code.
- Program Mode is used to load up the operating program code, and is required because the operating program code is stored in Flash memory instead of ROM (for security reasons).
- Active Mode is used to execute the specific authentication command specified by the System. Program code is executed in Active Mode. When the results of the command have been returned to the System, the chip enters Idle Mode to wait for the next instruction.

15.1.1 Idle Mode

The QA Chip starts up in Idle Mode. When the Chip is in Idle Mode, it waits for a command from the master by watching the primary id on the serial line.

- If the primary id matches the global id (0x00, common to all QA Chips), and the following byte from the master is the Trim Mode id byte, the QA Chip enters Trim Mode and starts counting the number of internal clock cycles until the next byte is received.
- If the primary id matches the global id (0x00, common to all QA Chips), and the following byte from the master is the Program Mode id byte, the QA Chip enters Program Mode.
- If the primary id matches the global id (0x00, common to all QA Chips), and the following byte from the master is the Active Mode id byte, the QA Chip enters Active Mode and executes startup code, allowing the chip to set itself into a state to receive authentication commands (includes setting a local ID).
- If the primary id matches the chip's local ID, and the following byte is a valid command code, the QA Chip enters Active Mode, allowing the command to be executed.

The valid 8-bit serial mode values sent after a global id are as shown in Table 238. They are specified to minimize the chances of them occurring by error after a global id (e.g. 0xFF and 0x00 are not used):

TABLE 238

Id byte values to place chip in specific mode

| Value | Interpretation |
|---|---|
| 10100101 (0xA5) | Trim Mode |
| 10001110 (0x8E) | Program Mode |
| 01111000 (0x78) | Active Mode |

15.1.2 Trim Mode

Trim Mode is enabled by sending a global id byte (0x00) followed by the Trim Mode command byte. The purpose of Trim Mode is to set the trim value (an internal register setting) of the internal ring oscillator so that Flash erasures and writes are of the correct duration. This is necessary due to the variation of the clock speed due to process variations.

If writes an erasures are too long, the Flash memory will wear out faster than desired, and in some cases can even be damaged.

Trim Mode works by measuring the number of system clock cycles that occur inside the chip from the receipt of the Trim Mode command byte until the receipt of a data byte. When the data byte is received, the data byte is copied to the trim register and the current value of the count is transmitted to the outside world.

Once the count has been transmitted, the QA Chip returns to Idle Mode.

At reset, the internal trim register setting is set to a known value r. The external user can now perform the following operations:

send the global id+write followed by the Trim Mode command byte send the 8-bit value v over a specified time t send a stop bit to signify no more data send the global id+read followed by the Trim Mode command byte receive the count c send a stop bit to signify no more data At the end of this procedure, the trim register will be v, and the external user will know the relationship between external time t and internal time c. Therefore a new value for v can be calculated.

The Trim Mode procedure can be repeated a number of times, varying both t and v in known ways, measuring the resultant c. At the end of the process, the final value for v is established (and stored in the trim register for subsequent use in Program Mode). This value v must also be written to the flash for later use (every time the chip is placed in Active Mode for the first time after power-up).

15.1.3 Program Mode

Program Mode is enabled by sending a global id byte (0x00) followed by the Program Mode command byte.

The QA Chip determines whether or not the internal fuse has been blown (by reading 32-bit word 0 of the information block of flash memory).

If the fuse has been blown the Program Mode command is ignored, and the QA Chip returns to Idle Mode.

If the fuse is still intact, the chip enters Program Mode and erases the entire contents of Flash memory. The QA Chip then validates the erasure. If the erasure was successful, the QA Chip receives up to 4096 bytes of data corresponding to the new program code and variable data. The bytes are transferred in order $byte_0$ to $byte_{4095}$.

Once all bytes of data have been loaded into Flash, the QA Chip returns to Idle Mode.

Note that Trim Mode functionality must be performed before a chip enters Program Mode for the first time.

Once the desired number of bytes have been downloaded in Program Mode, the LSS Master must wait for 80 µs (the time taken to write two bytes to flash at nybble rates) before sending the new transaction (eg Active Mode). Otherwise the last nybbles may not be written to flash.

15.1.4 Active Mode

Active Mode is entered either by receiving a global id byte (0x00) followed by the Active Mode command byte, or by sending a local id byte followed by a command opcode byte and an appropriate number of data bytes representing the required input parameters for that opcode.

In both cases, Active Mode causes execution of program code previously stored in the flash memory via Program Mode. As a result, we never enter Active Mode after Trim Mode, without a Program Mode in between. However once programmed via Program Mode, a chip is allowed to enter Active Mode after power-up, since valid data will be in flash.

If Active Mode is entered by the global id mechanism, the QA Chip executes specific reset startup code, typically setting up the local id and other IO specific data.

If Active Mode is entered by the local id mechanism, the QA Chip executes specific code depending on the following byte, which functions as an opcode. The opcode command byte format is shown in Table 239:

TABLE 239

Command byte

| bits | Description |
|---|---|
| 2–0 | Opcode |
| 5–3 | ¬opcode |
| 7–6 | count of number of bits set in opcode (0 to 3) |

The interpretation of the 3-bit opcode is shown in Table 240:

TABLE 240

QA Chip opcodes

| Op[2] | Mn[3] | Description |
|---|---|---|
| 000 | RST | Reset |
| 001 | RND | Random |
| 010 | RDM | Read M |
| 011 | TST | Test |
| 100 | WRM | Write M with no authentication |
| 101 | WRA | Write with Authentication (to M, P, or K) |
| 110 | chip specific - reserved for ChipF, ChipS etc | |
| 111 | chip specific - reserved for ChipF, ChipS etc | |

[2]Opcode
[3]Mnemonic

The command byte is designed to ensure that errors in transmission are detected. Regular QA Chip commands are therefore comprised of an opcode plus any associated parameters. The commands are listed in Table 241:

TABLE 241

QA Chip commands

| | Input | | Output |
|---|---|---|---|
| Command | opcode | Additional parms | Return value |
| Reset | RST | — | — |
| Random | RND | — | [20] |
| Read | RDM | [1, 1, 20] | [20, 64, 20][4] |
| Test | TST | [1, 20, 64, 20] | 89[5] if successful, 76 if not |
| Write | WRM | [1, 64, 20] | 89 if successful, 76 if not |
| WriteAuth | WRA | 76 [20, 64, 20] | 89 if successful, 76 if not |
| ReplaceKey | WRA | 89 76 [1, 20, 20, 20] | 89 if successful, 76 if not |
| SetPermissions | WRA | 89 89 [1, 1, 20, 4, 20] | [4] |
| SignM[6] | ChipS only | [1, 20, 20, 64, 20, 64] | [20, 64, 20] |
| SignP[7] | ChipS only | [1, 20, 20, 4, 20, 4] | [20, 64, 20] |

TABLE 241-continued

QA Chip commands

| | Input | | Output |
|---|---|---|---|
| Command | opcode | Additional parms | Return value |
| GetProgKey | ChipF only | [1, 20] | [20, 20, 20] |
| SetPartialKey | ChipF only | [1, 4] | 89 if successful, 76 if not |

[4][n, m] = list of parameters where n bytes for first parameter, and m bytes for the second etc.
[5]n = actual byte pattern required (in hex). The bytes 0x76 and 0x89 were chosen as the boolean values 0 and 1 as they are inverses of each other, and should not be generated accidentally.
[6]It is expected that most QA Chips will implement SignM as a function that returns 0x00. Only a limited number of chips will be programmed to allow SignM functionality. It is included here as an example of how signatures can be generated for authenticated writes.
[7]It is expected that most QA Chips will implement SignP as a function that returns 0x00. Only a limited number of chips will be programmed to allow SignP functionality. It is included here as an example of how signatures can be generated for authenticated writes.

Apart from the Reset command, the next four commands are the commands most likely to be used during regular operation. The next three commands are used to provide authenticated writes (which are expected to be uncommon). The final set of commands (including SignM), are expected to be specially implemented on ChipS and ChipF QA Chips only.

The input parameters are sent in the specified order, with each parameter being sent least significant byte first and most significant byte last.

Return (output) values are read in the same way—least significant byte first and most significant byte last. The client must know how many bytes to retrieve. The QA Chip will time out and return to Idle Mode if an incorrect number of bytes is provided or read.

In most cases, the output bytes from one chip's command (the return values) can be fed directly as the input bytes to another chip's command. An example of this is the RND and RD commands. The output data from a call to RND on a trusted QA Chip does not have to be kept by the System. Instead, the System can transfer the output bytes directly to the input of the non-trusted QA Chip's RD command. The description of each command points out where this is so.

Each of the commands is examined in detail in the subsequent sections. Note that some algorithms are specifically designed because flash memory is assumed for the implementation of non-volatile variables.

15.1.5 Non Volatile Variables

The memory within the QA Chip contains some non-volatile (Flash) memory to store the variables required by the authentication protocol. Table 242 summarizes the variables.

TABLE 242

Non volatile variables required by the authentication protocol

| Name | Size (bits) | Description |
|---|---|---|
| N | 8 | Number of keys known to the chip |
| T | 8 | Number of vectors M is broken into |
| $K_n$<br>$R_K$ | 160 per key,<br>160 for $R_K$ | Array of N secret keys used for calculating $F_{K_n}[X]$ where $K_n$ is the nth element of the array. Each $K_n$ must not be stored directly in the QA Chip. Instead, each chip needs to store a single random number $R_K$ (different for each chip), $K_n \oplus R_K$, and $\neg K_n \oplus R_K$. The stored $K_n \oplus R_K$ can be XORed with $R_K$ to obtain the real $K_n$. Although $\neg K_n \oplus R_K$ must be stored to protect against differential attacks, it is not used. |
| R | 160 | Current random number used to ensure time varying messages. Each chip instance must be seeded with a different initial value. Changes for each signature generation. |
| $M_T$ | 512 per M | Array of T memory vectors. Only $M_0$ can be written to with an authorized write, while all Ms can be written to in an unauthorized write. Writes to $M_0$ are optimized for Flash usage, while updates to any other $M_n$ are expensive with regards to Flash utilization, and are expected to be only performed once per section of $M_n$. $M_1$ contains T and N in ReadOnly form so users of the chip can know these two values. |
| $P_{T+N}$ | 32 per P | T + N element array of access permissions for each part of M. Entries n = {0 . . . T − 1} hold access permissions for non-authenticated writes to $M_n$ (no key required). Entries n = {T to T + N − 1} hold access permissions for authenticated writes to $M_0$ for $K_n$. Permission choices for each part of M are Read Only, Read/Write, and Decrement Only |
| MinTicks | 32 | The minimum number of clock ticks between calls to key-based functions. |

Note that since these variables are in Flash memory, writes should be minimized. The it is not a simple matter to write a new value to replace the old. Care must be taken with flash endurance, and speed of access. This has an effect on the algorithms used to change Flash memory based registers. For example, Flash memory should not be used as a shift register.

A reset of the QA Chip has no effect on the non-volatile variables.

15.1.5.1 M and P $M_n$ contains application specific state data, such as serial numbers, batch numbers, and amount of consumable remaining. $M_n$ can be read using the Read command and written to via the Write and WriteA commands.

$M_0$ is expected to be updated frequently, while each part of $M_{1-n}$ should only be written to once. Only $M_0$ can be written to via the WriteA command.

$M_1$ contains the operating parameters of the chip as shown in Table 243, and $M_{2-n}$, are application specific.

TABLE 243

Interpretation of $M_1$

| Length | Bits | interpretation |
|---|---|---|
| 8 | 7–0 | Number of available keys |
| 8 | 15–8 | Number of available M vectors |
| 16 | 31–16 | Revision of chip |
| 96 | 127–32 | Manufacture id information |

TABLE 243-continued

| Interpretation of $M_1$ | | |
|---|---|---|
| Length | Bits | interpretation |
| 128 | 255–128 | Serial number |
| 8 | 263–256 | Local id of chip |
| 248 | 511–264 | reserved |

Each $M_n$ is 512 bits in length, and is interpreted as a set of 16×32-bit words. Although $M_n$ may contain a number of different elements, each 32-bit word differs only in write permissions. Each 32-bit word can always be read. Once in client memory, the 512 bits can be interpreted in any way chosen by the client. The different write permissions for each P are outlined in Table 244:

TABLE 244

| Write permissions | |
|---|---|
| Data type | permission description |
| Read Only | Can never be written to |
| ReadWrite | Can always be written to |
| Decrement Only | Can only be written to if the new value is less than the old value. Decrement Only values can be any multiple of 32 bits. |

To accomplish the protection required for writing, a 2-bit permission value P is defined for each of the 32-bit words. Table 245 defines the interpretation of the 2-bit permission bit-pattern:

TABLE 245

| Permission bit interpretation | | | |
|---|---|---|---|
| Bits | Op | Interpretation | Action taken during Write command |
| 00 | RW | ReadWrite | The new 32-bit value is always written to M[n]. |
| 01 | MSR | Decrement Only (Most Significant Region) | The new 32-bit value is only written to M[n] if it is less than the value currently in M[n]. This is used for access to the Most Significant 16 bits of a Decrement Only number. |
| 10 | NMSR | Decrement Only (Not the Most Significant Region) | The new 32-bit value is only written to M[n] if M[n − 1] could also be written. The NMSR access mode allows multiple precision values of 32 bits and more (multiples of 32 bits) to decrement. |
| 11 | RO | Read Only | The new 32-bit value is ignored. M[n] is left unchanged. |

The 16 sets of permission bits for each 512 bits of M are gathered together in a single 32-bit variable P, where bits 2n and 2n+1 of P correspond to word n of M as follows:

Each 2-bit value is stored as a pair with the msb in bit 1, and the lsb in bit 0. Consequently, if words 0 to 5 of M had permission MSR, with words 6–15 of M permission RO, the 32-bit P variable would be 0xFFFFF555:

11-11-11-11-11-11-11-11-11-11-01-01-01-01-01-01

During execution of a Write and WriteA command, the appropriate Permissions[n] is examined for each M[n] starting from n=15 (msw of M) to n=0 (lsw of M), and a decision made as to whether the ne M[n] value will replace the old. Note that it is important to process the M[n] from msw to lsw to correctly interpret the access permissions.

Permissions are set and read using the QA Chip's SetPermissions command. The default for P is all 0s (RW) with the exception of certain parts of $M_1$.

Note that the Decrement Only comparison is unsigned, so any Decrement Only values that require negative ranges must be shifted into a positive range. For example, a consumable with a Decrement Only data item range of −50 to 50 must have the range shifted to be 0 to 100. The System must then interpret the range 0 to 100 as being −50 to 50. Note that most instances of Decrement Only ranges are N to 0, so there is no range shift required.

For Decrement Only data items, arrange the data in order from most significant to least significant 32-bit quantities from M[n] onward. The access mode for the most significant 32 bits (stored in M[n]) should be set to MSR. The remaining 32-bit entries for the data should have their permissions set to NMSR.

If erroneously set to NMSR, with no associated MSR region, each NMSR region will be considered independently instead of being a multi-precision comparison.

Examples of allocating M and Permission bits can be found in [86].

15.1.5.2 K and $R_K$

K is the 160-bit secret key used to protect M and to ensure that the contents of M are valid (when M is read from a non trusted chIP). K is initially programmed after manufacture, and from that point on, K can only be updated to a new value if the old K is known. Since K must be kept secret, there is no command to directly read it.

K is used in the keyed one-way hash function HMAC-SHA1. As such it should be programmed with a physically generated random number, gathered from a physically random phenomenon. K must NOT be generated with a computer-run random number generator. The security of the QA Chips depends on K being generated in a way that is not deterministic.

Each $K_n$ must not be stored directly in the QA ChIP. Instead, each chip needs to store a single random number $R_K$ (different for each chIP), $K_n \oplus R_K$, and $\neg K_n \oplus R_K$. The stored $K_n \oplus R_K$ can be XORed with $R_K$ to obtain the real $K_n$. Although $\neg K_n \oplus R_K$ must be stored to protect against differential attacks, it is not used.

15.1.5.3 R

R is a 160-bit random number seed that is set up after manufacture (when the chip is programmed) and from that point on, cannot be changed. R is used to ensure that each signed item contains time varying information (not chosen by an attacker), and each chip's R is unrelated from one chip to the next.

R is used during the Test command to ensure that the R from the previous call to Random was used as the session key in generating the signature during Read. Likewise, R is used during the WriteAuth command to ensure that the R from the previous call to Read was used as the session key during generation of the signature in the remote Authenticated chIP.

The only invalid value for R is 0. This is because R is changed via a 160-bit maximal period LFSR (Linear Feedback Shift Register) with taps on bits 0, 2, 3, and 5, and is changed only by a successful call to a signature generating function (e.g. Test, WriteAuth).

The logical security of the QA Chip relies not only upon the randomness of K and the strength of the HMAC-SHA1 algorithm. To prevent an attacker from building a sparse lookup table, the security of the QA Chip also depends on the range of R over the lifetime of all Systems. What this means is that an attacker must not be able to deduce what values of R there are in produced and future Systems. Ideally, R should be programmed with a physically generated random number, gathered from a physically random phenomenon (must not be deterministic). R must NOT be generated with a computer-run random number generator.

15.1.5.4 MinTicks

There are two mechanisms for preventing an attacker from generating multiple calls to key-based functions in a short period of time. The first is an internal ring oscillator that is temperature-filtered. The second mechanism is the 32-bit MinTicks variable, which is used to specify the minimum number of QA Chip clock ticks that must elapse between calls to key-based functions.

The MinTicks variable is set to a fixed value when the QA Chip is programmed. It could possibly be stored in $M_1$.

The effective value of MinTicks depends on the operating clock speed and the notion of what constitutes a reasonable time between key-based function calls (application specific). The duration of a single tick depends on the operating clock speed. This is the fastest speed of the ring oscillator generated clock (i.e. at the lowest valid operating temperature).

Once the duration of a tick is known, the MinTicks value can to be set. The value for MinTicks will be the minimum number of ticks required to pass between calls to the key-based functions (there is no need to protect Random as this produces the same output each time it is called multiple times in a row). The value is a real-time number, and divided by the length of an operating tick.

It should be noted that the MinTicks variable only slows down an attacker and causes the attack to cost more since it does not stop an attacker using multiple System chips in parallel.

15.1.6 GetProgramKey

Input: n, $R_E$=[1 byte, 20 bytes]

Output: $R_L$, $E_{Kx}[S_{Kn}[R_E|R_L|C_3]]$, $S_{Kx}[R_L|E_{Kx}[S_{Kn}[R_E|R_L|C_3]]|C_3]$=[20, 20, 20]

Changes: $R_L$

Note: The GetProgramKey command is only implemented in ChipF, and not in all QA Chips. The GetProgramKey command is used to produce the bytestream required for updating a specified key in ChipP. Only an QA Chip programmed with the correct values of the old $K_n$ can respond correctly to the GetProgramKey request. The output bytestream from the Random command can be fed as the input bytestream to the ReplaceKey command on the QA Chip being programmed (ChipP).

The input bytestream consists of the appropriate opcode followed by the desired key to generate the signature, followed by 20 bytes of $R_E$ (representing the random number read in from ChipP).

The local random number $R_L$ is advanced, and signed in combination with $R_E$ and $C_3$ by the chosen key to generate a time varying secret number known to both ChipF and ChipP. This signature is then XORed with the new key $K_x$ (this encrypts the new key). The first two output parameters are signed with the old key to ensure that ChipP knows it decoded $K_x$ correctly.

This whole procedure should only be allowed a given number of times. The actual number can conveniently be stored in the local $M_0$[0] (eg word 0 of $M_0$) with ReadOnly permission. Of course another chip could perform an Authorised write to update the number (via a ChipS) should it be desired.

The GetProgramKey command is implemented by the following steps:

```
Loop through all of Flash, reading each word (will trigger checks)
Accept n
Restrict n to N
Accept R_E
If (M_0[0] = 0)
    Output 60 bytes of 0x00 # no more keys allowed to be generated from this chipF
    Done
EndIf
Advance R_L
SIG ←S_Kn[R_L|R_E|C_3] # calculation must take constant time
Tmp ←SIG ⊕ K_X
Output R_L
Output Tmp
Decrement M_0[0]     #  reduce the number of allowable key generations by 1
SIG ←S_KX[R_L|Tmp|C_3]    # calculation must take constant time
Output SIG
```

15.1.7 Random

Input: None

Output: $R_L$=[20 bytes]

Changes: None

The Random command is used by a client to obtain an input for use in a subsequent authentication procedure. Since the Random command requires no input parameters, it is therefore simply 1 byte containing the RND opcode.

The output of the Random command from a trusted QA Chip can be fed straight into the non-trusted chip's Read command as part of the input parameters. There is no need for the client to store them at all, since they are not required again. However the Test command will only succeed if the data passed to the Read command was obtained first from the Random command.

If a caller only calls the Random function multiple times, the same output will be returned each time. R will only advance to the next random number in the sequence after a successful call to a function that returns or tests a signature (e.g. Test, see Section 15.1.13 on page 725 for more information).

The Random command is implemented by the following steps:

Loop through all of Flash, reading each word (will trigger checks)

Output $R_L$ 15.1.8 Read

Input: n, t, $R_E$=[1 byte, 1 byte, 20 bytes]

Output: $R_L$, $M_{Lt}$, $S_{Kn}[R_E|R_L|C_1M_{Lt}]$=[20 bytes, 64 bytes, 20 bytes]

Changes: $R_L$

The Read command is used to read the entire state data ($M_t$) from an QA ChIP. Only an QA Chip programmed with the correct value of $K_n$ can respond correctly to the Read request. The output bytestream from the Read command can be fed as the input bytestream to the Test command on a trusted QA Chip for verification, with $M_t$ stored for later use if Test returns success.

The input bytestream consists of the RD opcode followed by the key number to use for the signature, which M to read, and the bytes 0–19 of $R_E$. 23 bytes are transferred in total. $R_E$ is obtained by calling the trusted QA Chip's Random command. The 20 bytes output by the trusted chip's Random command can therefore be fed directly into the non-trusted chip's Read command, with no need for these bits to be stored by System.

Calls to Read must wait for MinTicksRemaining to reach 0 to ensure that a minimum time will elapse between calls to Read.

The output values are calculated, MinTicksRemaining is updated, and the signature is returned. The contents of $M_{Lt}$ are transferred least significant byte to most significant byte. The signature $S_{Kn}[R_E|R_L|C_1|M_{Lt}]$ must be calculated in constant time.

Figure 347:
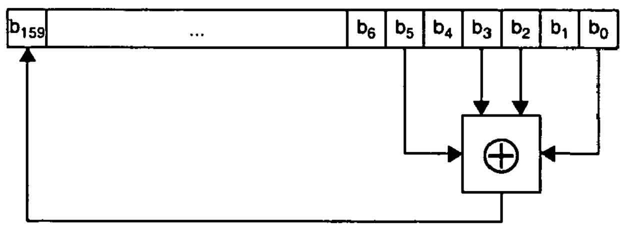
FIG. 347 shows 160-bit maximal period LFSR

The next random number is generated from R using a 160-bit maximal period LFSR (tap selections on bits 5, 3, 2, and 0). The initial 160-bit value for R is set up when the chip is programmed, and can be any random number except 0 (an LFSR filled with 0s will produce a never-ending stream of 0s). R is transformed by XORing bits 0, 2, 3, and 5 together, and shifting all 160 bits right 1 bit using the XOR result as the input bit to $b_{159}$. The process is shown in FIG. 347 below.

Care should be taken when updating R since it lives in Flash. Program code must assume power could be removed at any time.

The Read command is implemented with the following steps:

Wait for MinTicksRemaining to become 0
Loop through all of Flash, reading each word (will trigger checks)
Accept n
Accept t
Restrict n to N
Restrict t to T
Accept $R_E$
Advace $R_L$
Output $R_L$
Output $M_{Lt}$
Sig←$_{Kn}[R_E|R_L|C_1|M_{Lt}]$ # calculation must take constant time
MinTicksRemaining←MinTicks
Output Sig
Wait for MinTicksRemaining to become 0

15.1.9 Set Permissions

Input: n, p, $R_E$, $P_E$, $SIG_E$=[1 byte, 1 byte, 20 bytes, 4 bytes, 20 bytes]

Output: $P_p$

Changes: $P_p$, $R_L$

The SetPermissions command is used to securely update the contents of $P_p$ (containing QA Chip permissions). The WriteAuth command only attempts to replace $P_p$ if the new value is signed combined with our local R.

It is only possible to sign messages by knowing $K_n$. This can be achieved by a call to the SignP command (because only a ChipS can know $K_n$). It means that without a chip that can be used to produce the required signature, a write of any value to $P_p$ is not possible.

The process is very similar to Test, except that if the validation succeeds, the $P_E$ input parameter is additionally ORed with the current value for $P_p$. Note that this is an OR, and not a replace. Since the SetParms command only sets bits in $P_p$, the effect is to allow the permission bits corresponding to M[n] to progress from RW to either MSR, NMSR, or RO.

The SetPermissions command is implemented with the following steps:

```
Wait for MinTicksRemaining to become 0
Loop through all of Flash, reading each word (will trigger checks)
```

-continued

```
Accept n
Restrict n to N
Accept p
Restrict p to T+N
Accept R_E
Accept P_E
SIG_L ←S_Kn[R_L|R_E|P_E|C_2] # calculation must take constant time
Accept SIG_E
If (SIG_E = SIG_L)
     Update R_L
P_P ←P_P ∨P_E
EndIf
Output P_P # success or failure will be determined by receiver
MinTicksRemaining ←MinTicks
```

15.1.10 ReplaceKey

Input: n, $R_E$, V, $SIG_E$=[1byte, 20 bytes, 20 bytes, 20 bytes]

Output: Boolean (0x76=failure, 0x89=success)

Changes: $K_n$, $M_L$, $R_L$

The ReplaceKey command is used to replace the specified key in the QA Chip flash memory. However $K_n$ can only be replaced if the previous value is known. A return byte of 0x89 is produced if the key was successfully updated, while 0x76 is returned for failure.

A ReplaceKey command consists of the WRA command opcode followed by 0x89, 0x76, and then the appropriate parameters. Note that the new key is not sent in the clear, it is sent encrypted with the signature of $R_L$, $R_E$ and $C_3$ (signed with the old key). The first two input parameters must be verified by generating a signature using the old key.

The ReplaceKey command is implemented with the following steps:

```
Loop through all of Flash, reading each word (will trigger checks)
Accept n
Restrict n to N
Accept R_E # session key from ChipF
Accept V # encrypted key
SIG_L ←S_Kn[R_E|V|C_3] # calculation must take constant time
Accept SIG_E
If (SIG_L = SIG_E2) # comparison must take constant time
     SIG_L ←S_Kn[R_L|R_E|C_3] # calculation must take constant time
     Advance R_L
     K_E ←SIG_L ⊕ V
     K_n ←K_E           # involves storing (K_E ⊕ R_K) and (¬K_E ⊕
R_K)
     Output 0x89 # success
Else
     Output 0x76 # failure
EndIf
```

15.1.11 SignM

Input: n,$R_x$,$R_E$,$M_E$,$SIG_E$,$M_{desired}$=[1 byte, 20 bytes, 20 bytes, 64 bytes, 32 bytes]

Output: $R_L$, $M_{new}$, $S_{Kn}[R_E|R_L|C_1M_{new}]$=[20 bytes, 64 bytes, 20 bytes]

Changes: $R_L$

Note: The SignM command is only implemented in ChipS, and not in all QA Chips. The SignM command is used to produce a valid signed M for use in an authenticated write transaction. Only an QA Chip programmed with correct value of $K_n$ can respond correctly to the SignM request. The output bytestream from the SignM command can be fed as the input bytestream to the WriteA command on a different QA ChIP.

The input bytestream consists of the SMR opcode followed by 1 byte containing the key number to use for generating the signature, 20 bytes of $R_X$ (representing the number passed in as R to ChipU's READ command, i.e. typically 0), the output from the READ command (namely $R_E$, $M_E$, and $SIG_E$), and finally the desired M to write to ChipU.

The SignM command only succeeds when $SIG_E = S_K[R_X|R_E|C_1|M_E]$, indicating that the request was generated from a chip that knows K. This generation and comparison must take the same amount of time regardless of whether the input parameters are correct or not. If the times are not the same, an attacker can gain information about which bits of the supplied signature are incorrect. If the signatures match, then $R_L$ is updated to be the next random number in the sequence.

Since the SignM function generates signatures, the function must wait for the MinTicksRemaining register to reach 0 before processing takes place.

Once all the inputs have been verified, a new memory vector is produced by applying a specially stored P value (eg word 1 of $M_0$) and $M_{desired}$ against $M_E$. Effectively, it is performing a regular Write, but with separate P against someone else's M. The $M_{new}$ is signed with an updated $R_L$ (and the passed in $R_E$), and all three values are output (the random number $R_L$, $M_{new}$, and the signature). The time taken to generate this signature must be the same regardless of the inputs.

Typically, the SignM command will be acting as a form of consumable command, so that a given ChipS can only generate a given number of signatures. The actual number can conveniently be stored in $M_0$ (eg word 0 of $M_0$) with ReadOnly permissions. Of course another chip could perform an Authorised write to update the number (using another ChipS) should it be desired.

The SignM command is implemented with the following steps:

```
Wait for MinTicksRemaining to become 0
Loop through all of Flash, reading each word (will trigger checks)
Accept n
Restrict n to N
Accept R_X                # don't care what this number is
Accept R_E
Accept M_E
SIG_L ←S_Kn[R_X|R_E|C_1|M_E] # calculation must take constant time
Accept SIG_E
Accept M_desired
If ((SIG_E ≠ SIG_L) OR (M_L[0] = 0)) # fail if bad signature or if
allowed sigs = 0
    Output appropriate number of 0        # report failure
    Done
EndIf
Update R_L
# Create the new version of M in ram from W and Permissions
# This is the same as the core process of Write function
# except that we don't write the results back to M
DecEncountered ←0
EqEncountered ←0
Permissions = M_L[1]                  # assuming M_0
contains appropriate permissions
For n ←msw to lsw #(word 15 to 0)
    AM ←Permissions[n]
    LT ←(M_desired[n] < M_E[n]) # comparison is unsigned
    EQ ←(M_desired[n] = M_E[n])
    WE ←(AM = RW) ∨((AM = MSR) ∧LT) ∨((AM = NMSR)∧
(DecEncountered ∨LT))
    DecEncountered ←((AM = MSR) ∧LT)
            ∨((AM = NMSR) ∧DecEncountered)
            ∨((AM = NMSR) ∧EqEncountered ∧LT)
    EqEncountered ← ((AM = MSR) ∧ EQ) ∨ ((AM =
NMSR) ∧
    EqEncountered ∧EQ)
    If (¬WE) ∧(M_E[n] ≠ M_desired[n])
        Output appropriate number of 0        # report failure
```

-continued

```
    EndIf
EndFor
# At this point, M_desired is correct
Output R_L
Output M_desired                          # M_desired is now
                                          effectively M_new
Sig ←S_Kn[R_E|R_L|C_1|M_desired]          # calculation must
                                          take constant time
MinTicksRemaining ←MinTicks
Decrement M_L[0]        # reduce the number of allowable signatures
by
1
Output Sig
```

15.1.12 SignP

Input: n,$R_E$,$P_{desired}$=[1 byte, 20 bytes, 4 bytes]

Output: $R_L$, $S_{Kn}[R_E|R_L|P_{desired}|C_2]$=[20 bytes, 20 bytes]

Changes: $R_L$

Note: The SignP command is only implemented in ChipS, and not in all QA Chips.

The SignP command is used to produce a valid signed P for use in a SetPermissions transaction.

Only an QA Chip programmed with correct value of $K_n$ can respond correctly to the SignP request. The output bytestream from the SignP command can be fed as the input bytestream to the SetPermissions command on a different QA ChIP.

The input bytestream consists of the SMP opcode followed by 1 byte containing the key number to use for generating the signature, 20 bytes of $R_E$ (representing the number obtained from ChipU's RND command, and finally the desired P to write to ChipU.

Since the SignP function generates signatures, the function must wait for the MinTicksRemaining register to reach 0 before processing takes place.

Once all the inputs have been verified, the $P_{desired}$ is signed with an updated $R_L$ (and the passed in $R_E$), and both values are output (the random number $R_L$ and the signature). The time taken to generate this signature must be the same regardless of the inputs.

Typically, the SignP command will be acting as a form of consumable command, so that a given ChipS can only generate a given number of signatures. The actual number can conveniently be stored in $M_0$ (eg word 0 of $M_0$) with ReadOnly permissions. Of course another chip could perform an Authorised write to update the number (using another ChipS) should it be desired.

The SignM command is implemented with the following steps:

```
Wait for MinTicksRemaining to become 0
Loop through all of Flash, reading each word (will trigger checks)
Accept n
Restrict n to N
Accept R_E
Accept P_desired
If (M_L[0] = 0) # fail if allowed sigs = 0
    Output appropriate number of 0        # report failure
    Done
EndIf
Update R_L
Output R_L
Sig ←S_Kn[R_E|R_L|P_desired|C_2]   # calculation must take constant time
MinTicksRemaining ←MinTicks
Decrement M_L[0]        # reduce the number of allowable signatures by
1
Output Sig
```

15.1.13 Test

Input: n, $R_E$, $M_E$, $SIG_E$=[1 byte, 20 bytes, 64 bytes, 20 bytes]

Output: Boolean (0x76=failure, 0x89=success)

Changes:$R_L$

The Test command is used to authenticate a read of an M from a non-trusted QA ChIP.

The Test command consists of the TST command opcode followed by input parameters: n, $R_E$, $M_E$, and $SIG_E$. The byte order is least significant byte to most significant byte for each command component. All but the first input parameter bytes are obtained as the output bytes from a Read command to a non-trusted QA ChIP. The entire data does not have to be stored by the client. Instead, the bytes can be passed directly to the trusted QA Chip's Test command, and only M should be kept from the Read.

Calls to Test must wait for the MinTicksRemaining register to reach 0.

$S_{Kn}[R_L|R_E|C_1|M_E]$ is then calculated, and compared against the input signature $SIG_E$. If they are different, $R_L$ is not changed, and 0x76 is returned to indicate failure. If they are the same, then $R_L$ is updated to be the next random number in the sequence and 0x89 is returned to indicate success. Updating $R_L$ only after success forces the caller to use a new random number (via the Random command) each time a successful authentication is performed.

The calculation of $S_{Kn}[R_L|R_E|C_1|M_E]$ and the comparison against $SIG_E$ must take identical time so that the time to evaluate the comparison in the TST function is always the same. Thus no attacker can compare execution times or number of bits processed before an output is given.

The Test command is implemented with the following steps:

```
Wait for MinTicksRemaining to become 0
Loop through all of Flash, reading each word (will trigger checks)
Accept n
Restrict n to N
Accept R_E
Accept M_E
SIG_L ←S_Kn[R_L|R_E|C_1|M_E] # calculation must take constant time
Accept SIG_E
If (SIG_E = SIG_L)
    Update R_L
    Output 0x89 # success
Else
    Output 0x76            # report failure
EndIf
MinTicksRemaining ←MinTicks
```

15.1.14 Write

Input: t, $M_{new}$ $SIG_E$=[1 byte, 64 bytes, 20 bytes]

Output: Boolean (0x76=failure, 0x89=success)

Changes: $M_t$

The Write command is used to update $M_t$ according to the permissions in $P_t$. The WR command by itself is not secure, since a clone QA Chip may simply return success every time. Therefore a Write command should be followed by an authenticated read of $M_t$ (e.g. via a Read command) to ensure that the change was actually made.

The Write command is called by passing the WR command opcode followed by which M to be updated, the new data to be written to M, and a digital signature of M. The data is sent least significant byte to most significant byte.

The ability to write to a specific 32-bit word within $M_t$ is governed by the corresponding Permissions bits as stored in $P_t$. $P_t$ can be set using the SetPermissions command.

The fact that $M_t$ is Flash memory must be taken into account when writing the new value to M. It is possible for an attacker to remove power at any time. In addition, only the changes to M should be stored for maximum utilization. In addition, the longevity of M will need to be taken into account.

This may result in the location of M being updated.

The signature is not keyed, since it must be generated by the consumable user.

The Write command is implemented with the following steps:

```
Loop through all of Flash, reading each word (will trigger
checks)
Accept t
Restrict t to T
Accept M_E          # new M
Accept SIG_E
SIG_L = Generate SHA1 [M_E]
If (SIG_L = SIG_E)
    output 0x76 # failure due to invalid signature
    exit
EndIf
DecEncountered ←0
EqEncountered ←0
For i ←msw to lsw #(word 15 to 0)
    P ←P_t[i]
    LT ←(M_E[i] < M_t[i]) # comparison is unsigned
    EQ ←(M_E[i] = M_t[i])
    WE ←(P = RW) ∨((P = MSR) ∧LT)∨
    ((P = NMSR)∧
(DecEncountered ∨LT))
    DecEncountered ←((P = MSR) ∧LT)
            ∨((P = NMSR) ∧DecEncountered)
            ∨((P = NMSR) ∧EqEncountered ∧LT)
    EqEncountered ←((P = MSR) ∧EQ) ∨((P = NMSR)∧
    EqEncountered
∧EQ)
    If (¬WE) ∧(M_E[i] ≠ M_t[i])
        output 0x76 # failure due to wanting a change but
        not allowed
it
    EndIf
EndFor
# At this point, M_E (desired) is correct to be written to the
flash
M_t ←M_E        # update flash
output 0x89       # success
```

15.1.15 WriteAuth

Input: n, $R_E$, $M_E$, $SIG_E$=[1 byte, 20 bytes, 64 bytes, 20 bytes]

Output: Boolean (0x76=failure, 0x89=success)

Changes:$M_0$, $R_L$

The WriteAuth command is used to securely replace the entire contents of $M_0$ (containing QA Chip application specific data) according to the $P_{T+n}$. The WriteAuth command only attempts to replace $M_0$ if the new value is signed combined with our local R.

It is only possible to sign messages by knowing $K_n$. This can be achieved by a call to the SignM command (because only a ChipS can know $K_n$). It means that without a chip that can be used to produce the required signature, a write of any value to $M_0$ is not possible.

The process is very similar to Write, except that if the validation succeeds, the $M_E$ input parameter is processed against $M_0$ using permissions $P_{T+n}$.

The WriteAuth command is implemented with the following steps:

```
Wait for MinTicksRemaining to become 0
Loop through all of Flash, reading each word (will trigger checks)
Accept n
Restrict n to N
Accept R_E
Accept M_E
SIG_L ← S_Kn[R_L|R_E|C_1|M_E] # calculation must take constant time
Accept SIG_E
If (SIG_E = SIG_L)
    Update R_L
    DecEncountered ← 0
    EqEncountered ← 0
    For i ← msw to lsw #(word 15 to 0)
        P ← P_T+n[i]
        LT ← (M_E[i] < M_0[i]) # comparison is unsigned
        EQ ← (M_E[i] = M_0[i])
        WE ← (P = RW) ∨((P = MSR)∧ LT)∨
        ((P = NMSR)∧
    (DecEncountered ∨LT))
        DecEncountered ← ((P = MSR) ∧LT)
                        ∨((P = NMSR) ∧DecEncountered)
                        ∨((P = NMSR) ∧EqEncountered ∧LT)
        EqEncountered ← ((P = MSR) ∧EQ)∨
        ((P = NMSR)∧
    EqEncountered ∧EQ)
        If ((¬WE) ∧(M_E[i] ≠ M_0[i]))
            output 0x76 # failure due to wanting a change but not
allowed it
        EndIf
    EndFor
    # At this point, M_E(desired) is correct to be written to the
flash
    M_0 ← M_E              # update flash
    output 0x89               # success
EndIf
MinTicksRemaining ← MinTicks
```

16 Manufacture

This chapter makes some general comments about the manufacture and implementation of authentication chips. While the comments presented here are general, see [84] for a detailed description of an implementation of an authentication chIP.

The authentication chip algorithms do not constitute a strong encryption device. The net effect is that they can be safely manufactured in any country (including the USA) and exported to anywhere in the world.

The circuitry of the authentication chip must be resistant to physical attack. A summary of manufacturing implementation guidelines is presented, followed by specification of the chip's physical defenses (ordered by attack).

Note that manufacturing comments are in addition to any legal protection undertaken, such as patents, copyright, and license agreements (for example, penalties if caught reverse engineering the authentication chIP).

16.1 Guidelines for Manufacturing

The following are general guidelines for implementation of an authentication chip in terms of manufacture (see [84] for a detailed description of an authentication chIP). No special security is required during the manufacturing process.

- Standard process
- Minimum size (if possible)
- Clock Filter
- Noise Generator
- Tamper Prevention and Detection circuitry
- Protected memory with tamper detection
- Boot circuitry for loading program code
- Special implementation of FETs for key data paths
- Data connections in polysilicon layers where possible
- OverUnderPower Detection Unit
- No test circuitry
- Transparent epoxy packaging Finally, as a general note to manufacturers of Systems, the data line to the System authentication chip and the data line to the Consumable authentication chip must not be the same line. See Section 16.2.3 on page 736.

16.1.1 Standard Process

The authentication chip should be implemented with a standard manufacturing process (such as Flash). This is necessary to:

- allow a great range of manufacturing location options
- take advantage of well-defined and well-behaved technology
- reduce cost Note that the standard process still allows physical protection mechanisms.

16.1.2 Minimum Size

The authentication chip must have a low manufacturing cost in order to be included as the authentication mechanism for low cost consumables. It is therefore desirable to keep the chip size as low as reasonably possible.

Each authentication chip requires 962 bits of non-volatile memory. In addition, the storage required for optimized HMAC-SHA1 is 1024 bits. The remainder of the chip (state machine, processor, CPU or whatever is chosen to implement Protocol C1) must be kept to a minimum in order that the number of transistors is minimized and thus the cost per chip is minimized. The circuit areas that process the secret key information or could reveal information about the key should also be minimized (see Section 16.1.8 on page 734 for special data paths).

16.1.3 Clock Filter

The authentication chip circuitry is designed to operate within a specific clock speed range. Since the user directly supplies the clock signal, it is possible for an attacker to attempt to introduce race-conditions in the circuitry at specific times during processing. An example of this is where a high clock speed (higher than the circuitry is designed for) may prevent an XOR from working properly, and of the two inputs, the first may always be returned. These styles of transient fault attacks can be very efficient at recovering secret key information, and have been documented in [5] and [1]. The lesson to be learned from this is that the input clock signal cannot be trusted.

Since the input clock signal cannot be trusted, it must be limited to operate up to a maximum frequency. This can be achieved a number of ways.

One way to filter the clock signal is to use an edge detect unit passing the edge on to a delay, which in turn enables the input clock signal to pass through.

Figure 348:
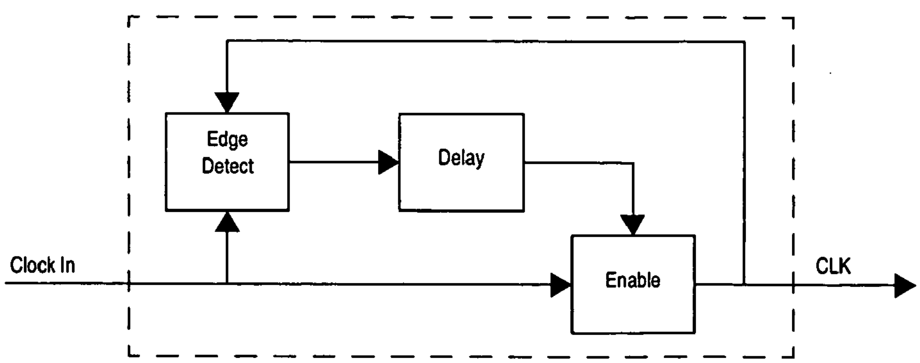
FIG. 348 shows clock filter

FIG. 348 shows clock signal flow within the Clock Filter.

The delay should be set so that the maximum clock speed is a particular frequency (e.g. about 4 MHz). Note that this delay is not programmable—it is fixed.

The filtered clock signal would be further divided internally as required.

16.1.4 Noise Generator

Each authentication chip should contain a noise generator that generates continuous circuit noise. The noise will interfere with other electromagnetic emissions from the chip's regular activities and add noise to the $I_{dd}$ signal. Placement of the noise generator is not an issue on an authentication chip due to the length of the emission wavelengths.

The noise generator is used to generate electronic noise, multiple state changes each clock cycle, and as a source of pseudo-random bits for the Tamper Prevention and Detection circuitry (see Section 16.1.5 on page 731).

A simple implementation of a noise generator is a 64-bit maximal period LFSR seeded with a non-zero number. The clock used for the noise generator should be running at the maximum clock rate for the chip in order to generate as much noise as possible.

16.1.5 Tamper Prevention and Detection Circuitry

A set of circuits is required to test for and prevent physical attacks on the authentication chIP. However what is actually detected as an attack may not be an intentional physical attack. It is therefore important to distinguish between these two types of attacks in an authentication chip:

where you can be certain that a physical attack has occurred.

where you cannot be certain that a physical attack has occurred.

The two types of detection differ in what is performed as a result of the detection. In the first case, where the circuitry can be certain that a true physical attack has occurred, erasure of Flash memory key information is a sensible action. In the second case, where the circuitry cannot be sure if an attack has occurred, there is still certainly something wrong. Action must be taken, but the action should not be the erasure of secret key information. A suitable action to take in the second case is a chip RESET. If what was detected was an attack that has permanently damaged the chip, the same conditions will occur next time and the chip will RESET again. If, on the other hand, what was detected was part of the normal operating environment of the chip, a RESET will not harm the key. A good example of an event that circuitry cannot have knowledge about, is a power glitch. The glitch may be an intentional attack, attempting to reveal information about the key. It may, however, be the result of a faulty connection, or simply the start of a power-down sequence. It is therefore best to only RESET the chip, and not erase the key. If the chip was powering down, nothing is lost. If the System is faulty, repeated RESETs will cause the consumer to get the System repaired. In both cases the consumable is still intact.

A good example of an event that circuitry can have knowledge about, is the cutting of a data line within the chIP. If this attack is somehow detected, it could only be a result of a faulty chip (manufacturing defect) or an attack. In either case, the erasure of the secret information is a sensible step to take.

Consequently each authentication chip should have 2 Tamper Detection Lines—one for definite attacks, and one for possible attacks. Connected to these Tamper Detection Lines would be a number of Tamper Detection test units, each testing for different forms of tampering. In addition, we want to ensure that the Tamper Detection Lines and Circuits themselves cannot also be tampered with.

At one end of the Tamper Detection Line is a source of pseudo-random bits (clocking at high speed compared to the general operating circuitry). The Noise Generator circuit described above is an adequate source. The generated bits pass through two different paths—one carries the original data, and the other carries the inverse of the data. The wires carrying these bits are in the layer above the general chip circuitry (for example, the memory, the key manipulation circuitry etc.). The wires must also cover the random bit generator. The bits are recombined at a number of places via an XOR gate. If the bits are different (they should be), a 1 is output, and used by the particular unit (for example, each output bit from a memory read should be ANDed with this bit value). The lines finally come together at the Flash memory Erase circuit, where a complete erasure is triggered by a 0 from the XOR. Attached to the line is a number of triggers, each detecting a physical attack on the chIP. Each trigger has an oversize nMOS transistor attached to GND. The Tamper Detection Line physically goes through this nMOS transistor. If the test fails, the trigger causes the Tamper Detect Line to become 0. The XOR test will therefore fail on either this clock cycle or the next one (on average), thus RESETing or erasing the chIP.

Figure 349:
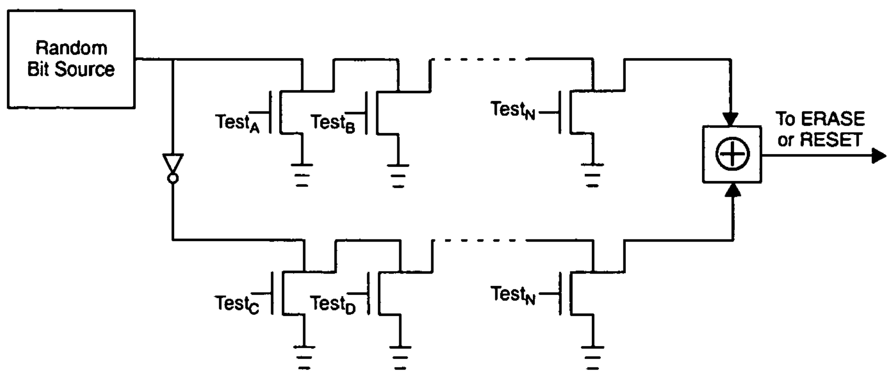
FIG. 349 shows tamper detection line

FIG. 349 illustrates the basic principle of a Tamper Detection Line in terms of tests and the XOR connected to either the Erase or RESET circuitry.

Figure 350:
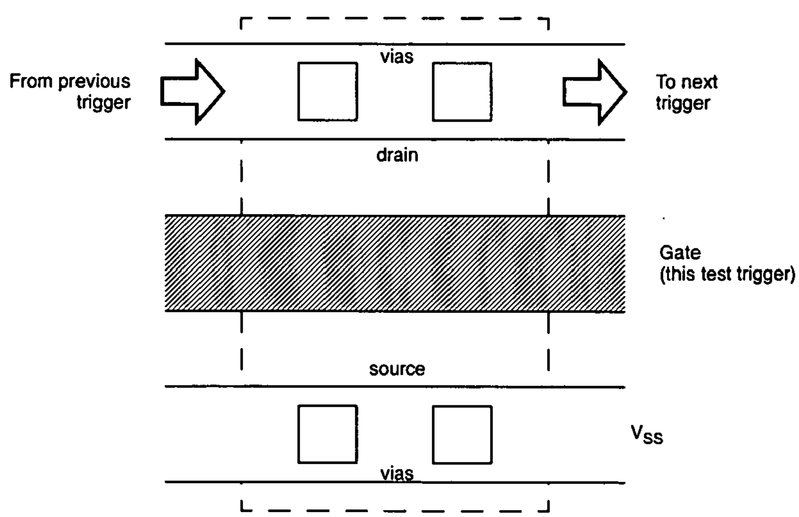
FIG. 350 shows an oversize nMOS transistor layout of Tamper Detection Line

The Tamper Detection Line must go through the drain of an output transistor for each test, as illustrated by FIG. 350:

It is not possible to break the Tamper Detect Line since this would stop the flow of 1 s and 0s from the random source. The XOR tests would therefore fail. As the Tamper Detect Line physically passes through each test, it is not possible to eliminate any particular test without breaking the Tamper Detect Line.

Figure 351:
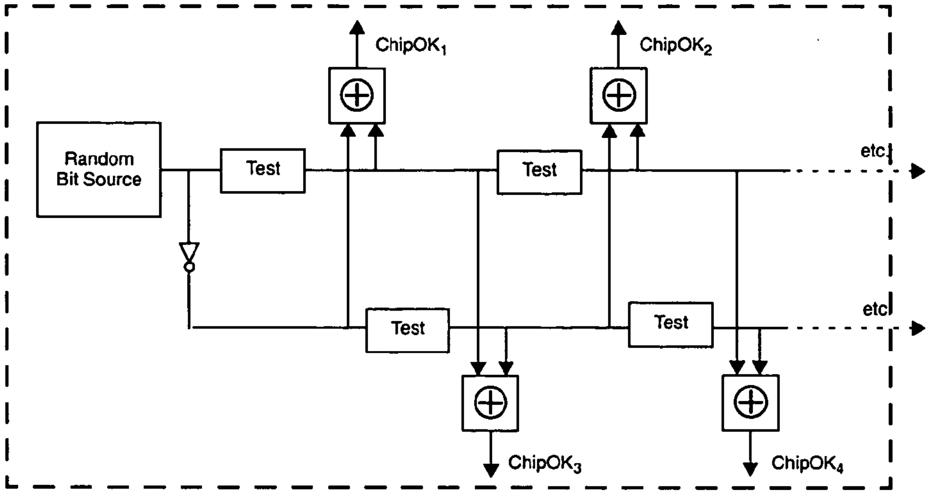
FIG. 351 shows a Tamper Detection Line

It is important that the XORs take values from a variety of places along the Tamper Detect Lines in order to reduce the chances of an attack. FIG. 351 illustrates the taking of multiple XORs from the Tamper Detect Line to be used in the different parts of the chIP. Each of these XORs can be considered to be generating a ChipOK bit that can be used within each unit or sub-unit.

A sample usage would be to have an OK bit in each unit that is ANDed with a given ChipOK bit each cycle. The OK bit is loaded with 1 on a RESET. If OK is 0, that unit will fail until the next RESET. If the Tamper Detect Line is functioning correctly, the chip will either RESET or erase all key information. If the RESET or erase circuitry has been destroyed, then this unit will not function, thus thwarting an attacker.

The destination of the RESET and Erase line and associated circuitry is very context sensitive. It needs to be protected in much the same way as the individual tamper tests. There is no point generating a RESET pulse if the attacker can simply cut the wire leading to the RESET circuitry. The actual implementation will depend very much on what is to be cleared at RESET, and how those items are cleared.

Figure 352:
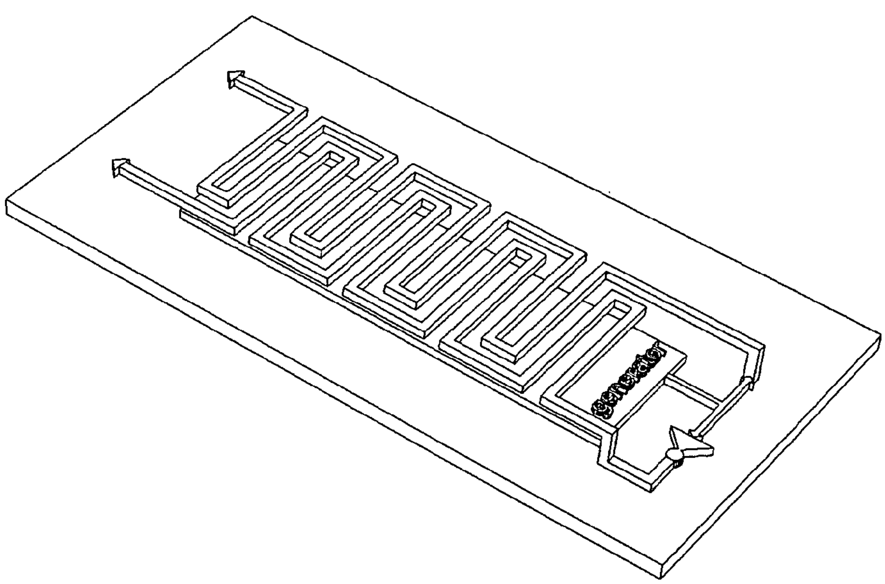
FIG. 352 shows how Tamper Detection Lines cover the Noise Generator

Finally, FIG. 352 shows how the Tamper Lines cover the noise generator circuitry of the chIP. The generator and NOT gate are on one level, while the Tamper Detect Lines run on a level above the generator.

16.1.6 Protected Memory with Tamper Detection

It is not enough to simply store secret information or program code in Flash memory. The Flash memory and RAM must be protected from an attacker who would attempt to modify (or set) a particular bit of program code or key information. The mechanism used must conform to being used in the Tamper Detection Circuitry (described above).

The first part of the solution is to ensure that the Tamper Detection Line passes directly above each Flash or RAM bit. This ensures that an attacker cannot probe the contents of Flash or RAM. A breach of the covering wire is a break in the Tamper Detection Line. The breach causes the Erase signal to be set, thus deleting any contents of the memory. The high frequency noise on the Tamper Detection Line also obscures passive observation.

The second part of the solution for Flash is to use multi-level data storage, but only to use a subset of those multiple levels for valid bit representations. Normally, when multi-level Flash storage is used, a single floating gate holds more than one bit. For example, a 4-voltage-state transistor can represent two bits. Assuming a minimum and maximum voltage representing 00 and 11 respectively, the two middle voltages represent 01 and 10. In the authentication chip, we can use the two middle voltages to represent a single bit, and consider the two extremes to be invalid states. If an attacker attempts to force the state of a bit one way or the other by closing or cutting the gate's circuit, an invalid voltage (and hence invalid state) results.

The second part of the solution for RAM is to use a parity bit. The data part of the register can be checked against the parity bit (which will not match after an attack).

The bits coming from Flash and RAM can therefore be validated by a number of test units (one per bit) connected to the common Tamper Detection Line. The Tamper Detection circuitry would be the first circuitry the data passes through (thus stopping an attacker from cutting the data lines). While the multi-level Flash protection is enough for non-secret information, such as program code, R, and MinTicks, it is not sufficient for protecting $K_1$ and $K_2$. If an attacker adds electrons to a gate (see Section 5.7.2.15 on page 656) representing a single bit of $K_1$, and the chip boots up yet doesn't activate the Tamper Detection Line, the key bit must have been a 0. If it does activate the Tamper Detection Line, it must have been a 1. For this reason, all other non-volatile memory can activate the Tamper Detection Line, but $K_1$ and $K_2$ must not. Consequently Checksum is used to check for tampering of $K_1$ and $K_2$. A signature of the expanded form of $K_1$ and $K_2$ (i.e. 320 bits instead of 160 bits for each of $K_1$ and $K_2$) is produced, and the result compared against the Checksum. Any non-match causes a clear of all key information.

16.1.7 Boot Circuitry for Loading Program Code

Program code should be kept in multi-level Flash instead of ROM, since ROM is subject to being altered in a non-testable way. A boot mechanism is therefore required to load the program code into Flash memory (Flash memory is in an indeterminate state after manufacture).

The boot circuitry must not be in ROM—a small state-machine would suffice. Otherwise the boot code could be modified in an undetectable way.

The boot circuitry must erase all Flash memory, check to ensure the erasure worked, and then load the program code. Flash memory must be erased before loading the program code. Otherwise an attacker could put the chip into the boot state, and then load program code that simply extracted the existing keys. The state machine must also check to ensure that all Flash memory has been cleared (to ensure that an attacker has not cut the Erase line) before loading the new program code.

The loading of program code must be undertaken by the secure Programming Station before secret information (such as keys) can be loaded. This step must be undertaken as the first part of the programming process.

16.1.8 Special Implementation of FETs for Key Data Paths

Figure 353:
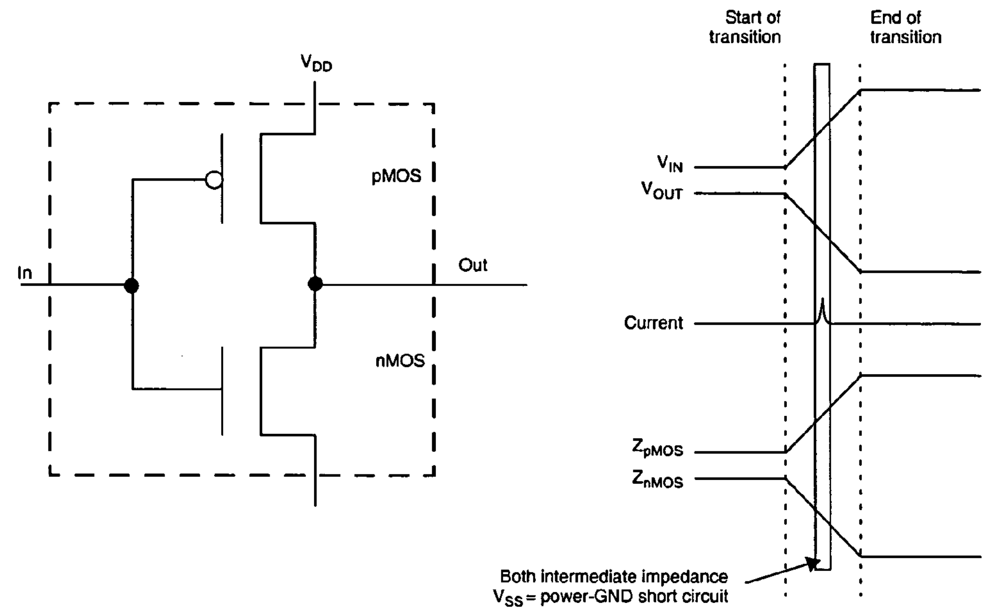
FIG. 353 shows a prior art FET Implementation of CMOS inverter

The normal situation for FET implementation for the case of a CMOS Inverter (which involves a pMOS transistor combined with an nMOS transistor) as shown in FIG. 353:

During the transition, there is a small period of time where both the nMOS transistor and the pMOS transistor have an intermediate resistance. The resultant power-ground short circuit causes a temporary increase in the current, and in fact accounts for the majority of current consumed by a CMOS device. A small amount of infrared light is emitted during the short circuit, and can be viewed through the silicon substrate (silicon is transparent to infrared light). A small amount of light is also emitted during the charging and discharging of the transistor gate capacitance and transmission line capacitance.

For circuitry that manipulates secret key information, such information must be kept hidden. An alternative non-flashing CMOS implementation should therefore be used for all data paths that manipulate the key or a partially calculated value that is based on the key.

Figure 354:
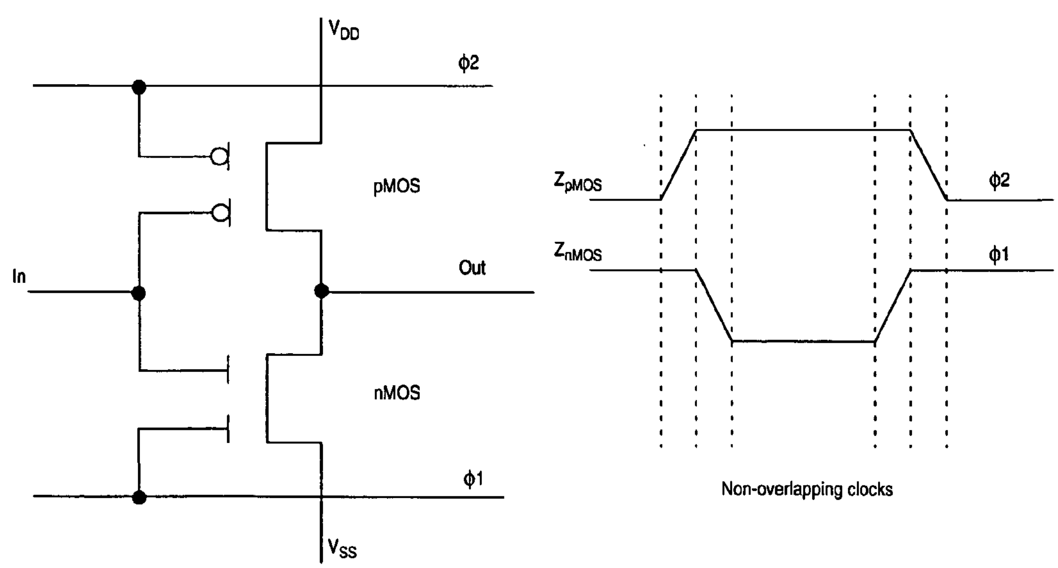
FIG. 354 shows non-flashing CMOS

The use of two non-overlapping clocks $\phi 1$ and $\phi 2$ can provide a non-flashing mechanism. $\phi 1$ is connected to a second gate of all nMOS transistors, and $\phi 2$ is connected to a second gate of all pMOS transistors. The transition can only take place in combination with the clock. Since $\phi 1$ and $\phi 2$ are non-overlapping, the pMOS and nMOS transistors will not have a simultaneous intermediate resistance. The setup is shown in FIG. 354:

Finally, regular CMOS inverters can be positioned near critical non-Flashing CMOS components. These inverters should take their input signal from the Tamper Detection Line above. Since the Tamper Detection Line operates multiple times faster than the regular operating circuitry, the net effect will be a high rate of light-bursts next to each non-Flashing CMOS component. Since a bright light overwhelms observation of a nearby faint light, an observer will not be able to detect what switching operations are occurring in the chip proper. These regular CMOS inverters will also effectively increase the amount of circuit noise, reducing the SNR and obscuring useful EMI.

There are a number of side effects due to the use of non-Flashing CMOS:

- The effective speed of the chip is reduced by twice the rise time of the clock per clock cycle. This is not a problem for an authentication chIP.
- The amount of current drawn by the non-Flashing CMOS is reduced (since the short circuits do not occur). However, this is offset by the use of regular CMOS inverters.
- Routing of the clocks increases chip area, especially since multiple versions of $\phi 1$ and $\phi 2$ are required to cater for different levels of propagation. The estimation of chip area is double that of a regular implementation.
- Design of the non-Flashing areas of the authentication chip are slightly more complex than to do the same with a with a regular CMOS design. In particular, standard cell components cannot be used, making these areas full custom. This is not a problem for something as small as an authentication chip, particularly when the entire chip does not have to be protected in this manner.

16.1.9 Connections in Polysilicon Layers where Possible

Wherever possible, the connections along which the key or secret data flows, should be made in the polysilicon layers. Where necessary, they can be in metal 1, but must never be in the top metal layer (containing the Tamper Detection Lines).

16.1.10 OverUnderPower Detection Unit

Each authentication chip requires an OverUnderPower Detection Unit to prevent Power Supply Attacks. An OverUnderPower Detection Unit detects power glitches and tests the power level against a Voltage Reference to ensure it is within a certain tolerance. The Unit contains a single Voltage Reference and two comparators. The OverUnderPower Detection Unit would be connected into the RESET Tamper Detection Line, thus causing a RESET when triggered.

A side effect of the OverUnderPower Detection Unit is that as the voltage drops during a power-down, a RESET is triggered, thus erasing any work registers.

16.1.11 No Test Circuitry

Test hardware on an authentication chip could very easily introduce vulnerabilities. As a result, the authentication chip should not contain any BIST or scan paths.

The authentication chip must therefore be testable with external test vectors. This should be possible since the authentication chip is not complex.

16.1.12 Transparent Epoxy Packaging

The authentication chip needs to be packaged in transparent epoxy so it can be photo-imaged by the programming station to prevent Trojan horse attacks. The transparent packaging does not compromise the security of the authentication chip since an attacker can fairly easily remove a chip from its packaging. For more information see Section 16.2.20 on page 743 and [86].

16.2 Resistance to Physical Attacks

While this chapter only describes manufacture in general terms (since this document does not cover a specific implementation of a Protocol C1 authentication chIP), we can still make some observations about such a chip's resistance to physical attack. A description of the general form of each physical attack can be found in Section 5.7.2 on page 652.

16.2.1 Reading ROM

This attack depends on the key being stored in an addressable ROM. Since each authentication chip stores its authentication keys in internal Flash memory and not in an addressable ROM, this attack is irrelevant.

16.2.2 Reverse Engineering the Chip

Reverse engineering a chip is only useful when the security of authentication lies in the algorithm alone. However our authentication chips rely on a secret key, and not in the secrecy of the algorithm. Our authentication algorithm is, by contrast, public, and in any case, an attacker of a high volume consumable is assumed to have been able to obtain detailed plans of the internals of the chIP.

In light of these factors, reverse engineering the chip itself, as opposed to the stored data, poses no threat.

16.2.3 Usurping the Authentication Process

There are several forms this attack can take, each with varying degrees of success. In all cases, it is assumed that a clone manufacturer will have access to both the System and the consumable designs.

An attacker may attempt to build a chip that tricks the System into returning a valid code instead of generating an authentication code. This attack is not possible for two reasons. The first reason is that System authentication chips and Consumable authentication chips, although physically identical, are programmed differently. In particular, the RD opcode and the RND opcode are the same, as are the WR and TST opcodes. A System authentication Chip cannot perform a RD command since every call is interpreted as a call to RND instead. The second reason this attack would fail is that separate serial data lines are provided from the System to the System and Consumable authentication chips. Consequently neither chip can see what is being transmitted to or received from the other.

If the attacker builds a clone chip that ignores WR commands (which decrement the consumable remaining), Protocol C1 ensures that the subsequent RD will detect that the WR did not occur. The System will therefore not go ahead with the use of the consumable, thus thwarting the attacker. The same is true if an attacker simulates loss of contact before authentication—since the authentication does not take place, the use of the consumable doesn't occur.

An attacker is therefore limited to modifying each System in order for clone consumables to be accepted (see Section 16.2.4 on page 737 for details of resistance this attack).

16.2.4 Modification of System

The simplest method of modification is to replace the System's authentication chip with one that simply reports success for each call to TST. This can be thwarted by System calling TST several times for each authentication, with the first few times providing false values, and expecting a fail from TST. The final call to TST would be expected to succeed. The number of false calls to TST could be determined by some part of the returned result from RD or from the system clock. Unfortunately an attacker could simply rewire System so that the new System clone authentication chip can monitor the returned result from the consumable chip or clock. The clone System authentication chip would only return success when that monitored value is presented to its TST function. Clone consumables could then return any value as the hash result for RD, as the clone System chip would declare that value valid. There is therefore no point for the System to call the System authentication chip multiple times, since a rewiring attack will only work for the System that has been rewired, and not for all Systems.

A similar form of attack on a System is a replacement of the System ROM. The ROM program code can be altered so that the Authentication never occurs. There is nothing that can be done about this, since the System remains in the hands of a consumer. Of course this would void any warranty, but the consumer may consider the alteration worthwhile if the clone consumable were extremely cheap and more readily available than the original item.

The System/consumable manufacturer must therefore determine how likely an attack of this nature is. Such a study must include given the pricing structure of Systems and Consumables, frequency of System service, advantage to the consumer of having a physical modification performed, and where consumers would go to get the modification performed.

The likelihood of physical alteration increases with the perceived artificiality of the consumable marketing scheme. It is one thing for a consumable to be protected against clone manufacturers. It is quite another for a consumable's market to be protected by a form of exclusive licensing arrangement that creates what is viewed by consumers as artificial markets. In the former case, owners are not so likely to go to the trouble of modifying their system to allow a clone manufacturer's goods. In the latter case, consumers are far more likely to modify their System. A case in point is DVD. Each DVD is marked with a region code, and will only play in a DVD player from that region. Thus a DVD from the USA will not play in an Australian player, and a DVD from Japan, Europe or Australia will not play in a USA DVD player. Given that certain DVD titles are not available in all regions, or because of quality differences, pricing differences or timing of releases, many consumers have had their DVD players modified to accept DVDs from any region. The modification is usually simple (it often involves soldering a single wire), voids the owner's warranty, and often costs the owner some money. But the interesting thing to note is that the change is not made so the consumer can use clone consumables—the consumer will still only buy real consumables, but from different regions. The modification is performed to remove what is viewed as an artificial barrier, placed on the consumer by the movie companies. In the same way, a System/Consumable scheme that is viewed as unfair will result in people making modifications to their Systems.

The limit case of modifying a system is for a clone manufacturer to provide a completely clone System which takes clone consumables. This may be simple competition or violation of patents. Either way, it is beyond the scope of the authentication chip and depends on the technology or service being cloned.

16.2.5 Direct Viewing of Chip Operation by Conventional Probing

In order to view the chip operation, the chip must be operating. However, the Tamper Prevention and Detection circuitry covers those sections of the chip that process or hold the key. It is not possible to view those sections through the Tamper Prevention lines.

An attacker cannot simply slice the chip past the Tamper Prevention layer, for this will break the Tamper Detection Lines and cause an erasure of all keys at power-up. Simply destroying the erasure circuitry is not sufficient, since the multiple ChipOK bits (now all 0) feeding into multiple units within the authentication chip will cause the chip's regular operating circuitry to stop functioning.

To set up the chip for an attack, then, requires the attacker to delete the Tamper Detection lines, stop the Erasure of Flash memory, and somehow rewire the components that relied on the ChipOK lines. Even if all this could be done, the act of slicing the chip to this level will most likely destroy the charge patterns in the non-volatile memory that holds the keys, making the process fruitless.

16.2.6 Direct Viewing of the Non-Volatile Memory

If the authentication chip were sliced so that the floating gates of the Flash memory were exposed, without discharging them, then the keys could probably be viewed directly using an STM or SKM. However, slicing the chip to this level without discharging the gates is probably impossible. Using wet etching, plasma etching, ion milling, or chemical mechanical polishing will almost certainly discharge the small charges present on the floating gates. This is true of regular Flash memory, but even more so of multi-level Flash memory.

16.2.7 Viewing the Light Bursts Caused by State Changes

All sections of circuitry that manipulate secret key information are implemented in the non-Flashing CMOS described above. This prevents the emission of the majority of light bursts. Regular CMOS inverters placed in close proximity to the non-Flashing CMOS will hide any faint emissions caused by capacitor charge and discharge. The inverters are connected to the Tamper Detection circuitry, so they change state many times (at the high clock rate) for each non-Flashing CMOS state change.

16.2.8 Viewing the Keys Using an SEPM

An SEPM attack can be simply thwarted by adding a metal layer to cover the circuitry. However an attacker could etch a hole in the layer, so this is not an appropriate defense.

The Tamper Detection circuitry described above will shield the signal as well as cause circuit noise. The noise will actually be a greater signal than the one that the attacker is looking for. If the attacker attempts to etch a hole in the noise circuitry covering the protected areas, the chip will not function, and the SEPM will not be able to read any data.

An SEPM attack is therefore fruitless.

16.2.9 Monitoring EMI

The Noise Generator described above will cause circuit noise. The noise will interfere with other electromagnetic emissions from the chip's regular activities and thus obscure any meaningful reading of internal data transfers.

16.2.10 Viewing $I_{dd}$ Fluctuations

The solution against this kind of attack is to decrease the SNR in the $I_{dd}$ signal. This is accomplished by increasing the amount of circuit noise and decreasing the amount of signal. The Noise Generator circuit (which also acts as a defense against EMI attacks) will also cause enough state changes each cycle to obscure any meaningful information in the $I_{dd}$ signal.

In addition, the special Non-Flashing CMOS implementation of the key-carrying data paths of the chip prevents current from flowing when state changes occur. This has the benefit of reducing the amount of signal.

16.2.11 Differential Fault Analysis

Differential fault bit errors are introduced in a non-targeted fashion by ionization, microwave radiation, and environmental stress. The most likely effect of an attack of this nature is a change in Flash memory (causing an invalid state) or RAM (bad parity). Invalid states and bad parity are detected by the Tamper Detection Circuitry, and cause an erasure of the key.

Since the Tamper Detection Lines cover the key manipulation circuitry, any error introduced in the key manipulation circuitry will be mirrored by an error in a Tamper Detection Line. If the Tamper Detection Line is affected, the chip will either continually RESET or simply erase the key upon a power-up, rendering the attack fruitless.

Rather than relying on a non-targeted attack and hoping that "just the right part of the chip is affected in just the right way", an attacker is better off trying to introduce a targeted fault (such as overwrite attacks, gate destruction etc.). For information on these targeted fault attacks, see the relevant sections below.

16.2.12 Clock Glitch Attacks

The Clock Filter (described above) eliminates the possibility of clock glitch attacks.

16.2.13 Power Supply Attacks

The OverUnderPower Detection Unit (described above) eliminates the possibility of power supply attacks.

16.2.14 Overwriting ROM

Authentication chips store program code, keys and secret information in Flash memory, and not in ROM. This attack is therefore not possible.

16.2.15 Modifying EEPROM/Flash

Authentication chips store program code, keys and secret information in multi-level Flash memory. However the Flash memory is covered by two Tamper Prevention and Detection Lines. If either of these lines is broken (in the process of destroying a gate via a laser-cutter) the attack will be detected on power-up, and the chip will either RESET (continually) or erase the keys from Flash memory. This process is described in Section 16.1.6 on page 733.

Even if an attacker is able to somehow access the bits of Flash and destroy or short out the gate holding a particular bit, this will force the bit to have no charge or a full charge. These are both invalid states for the authentication chip's usage of the multi-level Flash memory (only the two middle states are valid). When that data value is transferred from Flash, detection circuitry will cause the Erasure Tamper Detection Line to be triggered—thereby erasing the remainder of Flash memory and RESETing the chIP. This is true for program code, and non-secret information. As key data is read from multi-level flash memory, it is not imediately checked for validity (otherwise information about the key is given away). Instead, a specific key validation mechanism is used to protect the secret key information.

An attacker could theoretically etch off the upper levels of the chip, and deposit enough electrons to change the state of the multi-level Flash memory by ⅓. If the beam is high enough energy it might be possible to focus the electron beam through the Tamper Prevention and Detection Lines. As a result, the authentication chip must perform a validation of the keys before replying to the Random, Test or Random commands. The SHA-1 algorithm must be run on the keys, and the results compared against an internal checksum value. This gives an attacker a 1 in $2^{160}$ chance of tricking the chip, which is the same chance as guessing either of the keys.

A Modify EEPROM/Flash attack is therefore fruitless.

16.2.16 Gate Destruction Attacks

Gate Destruction Attacks rely on the ability of an attacker to modify a single gate to cause the chip to reveal information during operation. However any circuitry that manipulates secret information is covered by one of the two Tamper Prevention and Detection lines. If either of these lines is broken (in the process of destroying a gate) the attack will be detected on power-up, and the chip will either RESET (continually) or erase the keys from Flash memory.

To launch this kind of attack, an attacker must first reverse-engineer the chip to determine which gate(s) should be targeted. Once the location of the target gates has been determined, the attacker must break the covering Tamper Detection line, stop the Erasure of Flash memory, and somehow rewire the components that rely on the ChipOK lines. Rewiring the circuitry cannot be done without slicing the chip, and even if it could be done, the act of slicing the chip to this level will most likely destroy the charge patterns in the non-volatile memory that holds the keys, making the process fruitless.

16.2.17 Overwrite Attack

An overwrite attack relies on being able to set individual bits of the key without knowing the previous value. It relies on probing the chip, as in the conventional probing attack and destroying gates as in the gate destruction attack. Both of these attacks (as explained in their respective sections), will not succeed due to the use of the Tamper Prevention and Detection Circuitry and ChipOK lines.

However, even if the attacker is able to somehow access the bits of Flash and destroy or short out the gate holding a particular bit, this will force the bit to have no charge or a full charge. These are both invalid states for the authentication chip's usage of the multi-level Flash memory (only the two middle states are valid). When that data value is transferred from Flash detection circuitry will cause the Erasure Tamper Detection Line to be triggered—thereby erasing the remainder of Flash memory and RESETing the chIP. In the same way, a parity check on tampered values read from RAM will cause the Erasure Tamper Detection Line to be triggered.

An overwrite attack is therefore fruitless.

16.2.18 Memory Remanence Attack

Any working registers or RAM within the authentication chip may be holding part of the authentication keys when power is removed. The working registers and RAM would continue to hold the information for some time after the removal of power. If the chip were sliced so that the gates of the registers/RAM were exposed, without discharging them, then the data could probably be viewed directly using an STM.

The first defense can be found above, in the description of defense against power glitch attacks. When power is removed, all registers and RAM are cleared, just as the RESET condition causes a clearing of memory.

The chances then, are less for this attack to succeed than for a reading of the Flash memory. RAM charges (by nature) are more easily lost than Flash memory. The slicing of the chip to reveal the RAM will certainly cause the charges to be lost (if they haven't been lost simply due to the memory not being refreshed and the time taken to perform the slicing).

This attack is therefore fruitless.

16.2.19 Chip Theft Attack

There are distinct phases in the lifetime of an authentication chIP. Chips can be stolen when at any of these stages:

After manufacture, but before programming of key

After programming of key, but before programming of state data

After programming of state data, but before insertion into the consumable or system After insertion into the system or consumable A theft in between the chip manufacturer and programming station would only provide the clone manufacturer with blank chips. This merely compromises the sale of authentication chips, not anything authenticated by the authentication chips. Since the programming station is the only mechanism with consumable and system product keys, a clone manufacturer would not be able to program the chips with the correct key. Clone manufacturers would be able to program the blank chips for their own Systems and Consumables, but it would be difficult to place these items on the market without detection.

The second form of theft can only happen in a situation where an authentication chip passes through two or more distinct programming phases. This is possible, but unlikely. In any case, the worst situation is where no state data has been programmed, so all of M is read/write. If this were the case, an attacker could attempt to launch an adaptive chosen text attack on the chIP. The HMAC-SHA1 algorithm is resistant to such attacks. For more information see Section 14.7 on page 699.

The third form of theft would have to take place in between the programming station and the installation factory. The authentication chips would already be programmed for use in a particular system or for use in a particular consumable. The only use these chips have to a thief is to place them into a clone System or clone Consumable. Clone systems are irrelevant—a cloned System would not even require an authentication chIP. For clone Consumables, such a theft would limit the number of cloned products to the number of chips stolen. A single theft should not create a supply constant enough to provide clone manufacturers with a cost-effective business.

The final form of theft is where the System or Consumable itself is stolen. When the theft occurs at the manufacturer, physical security protocols must be enhanced. If the theft occurs anywhere else, it is a matter of concern only for the owner of the item and the police or insurance company. The security mechanisms that the authentication chip uses assume that the consumables and systems are in the hands of the public. Consequently, having them stolen makes no difference to the security of the keys.

16.2.20 Trojan Horse Attack

A Trojan horse attack involves an attacker inserting a fake authentication chip into the programming station and retrieving the same chip after it has been programmed with the secret key information. The difficulty of these two tasks depends on both logical and physical security, but is an expensive attack—the attacker has to manufacture a false authentication chip, and it will only be useful where the effort is worth the gain. For example, obtaining the secret key for a specific car's authentication chip is most likely not worth an attacker's efforts, while the key for a printer's ink cartridge may be very valuable.

The problem arises if the programming station is unable to tell a Trojan horse authentication chip from a real one—which is the problem of authenticating the authentication chIP.

One solution to the authentication problem is for the manufacturer to have a programming station attached to the end of the production line. Chips passing the manufacture QA tests are programmed with the manufacturer's secret key information. The chip can therefore be verified by the C1 authentication protocol, and give information such as the expected batch number, serial number etc. The information can be verified and recorded, and the valid chip can then be reprogrammed with the System or Consumable key and state data. An attacker would have to substitute an authentication chip with a Trojan horse programmed with the manufacturer's secret key information and copied batch number data from the removed authentication chIP. This is only possible if the manufacturer's secret key is compromised (the key is changed regularly and not known by a human) or if the physical security at the manufacturing plant is compromised at the end of the manufacturing chain.

Even if the solution described were to be undertaken, the possibility of a Trojan horse attack does not go away—it merely is removed to the manufacturer's physical location. A better solution requires no physical security at the manufacturing location.

The preferred solution then, is to use transparent epoxy on the chip's packaging and to image the chip before programming it. Once the chip has been mounted for programming it is in a known fixed orientation. It can therefore be high resolution photo-imaged and X-rayed from multiple directions, and the images compared against "signature" images. Any chip not matching the image signature is treated as a Trojan horse and rejected.

1 Refill of Ink in Printers—Printer Based Refill Device 1.1 Functional Purpose

The functional purpose of the printer based refill device is as follows:

To refill ink into printers by physically connecting the refill device to the printer.

To ensure that the correct ink is used for the correct operation of the printer (i.e. will not damage the printhead).

To ensure accurate measure of ink is transferred from the refilling device to the printer during refills.

The refill device is controlled by the printer. Apart from the QA Chip[1] the refill device has no other processing power.

[1]General Note: Througout this document, if secure refilling is required then a physical QA Chip or any other virtual device performing the QA Chip protocol can be used. Refer to [1].

1.2 Basic Components of the Refill Device

Figure 355:
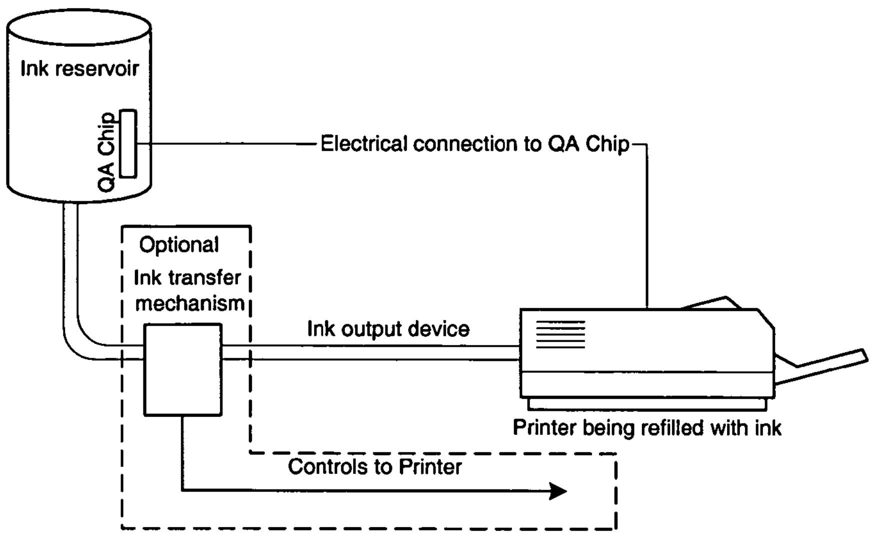
FIG. 355 shows components of a printer-based refill device

FIG. 355 shows the components of the printer based refill device.

The printer based refill device will consist of following components:

An ink reservoir—which stores the ink. Each refill device will allow ink reservoirs of various capacities. When the ink reservoir empties out, it is replaced by another reservoir containing more ink of the same type or different type or refilled (for example through a refill station as described in Section 2 and Section 3).

An ink output device—which dispenses ink to the printer being refilled when physically connected to the printer.

A QA Chip and associated circuitry—which stores the amount of ink in the reservoir along with the attributes of the ink in a digital format.

The electrical connections to the QA ChIP.

NB—No additional microprocessors are required to be present in the refill device. Hence the refill device uses the processing power of the printer to oversee the refilling process.

An ink transfer mechanism (optional) which controls the flow ink from the refill device to the printer and is controlled by the printer. Therefore the control connections for the ink transfer mechanism will be connected to the printer.

Alternatively, the ink transfer mechanism could be in the printer. Refer to Section 1.3.

1.3 Printer Description and Functions

Printers which will be refilled by these refilling devices must have the following components:

Microprocessor assembly which will control the refill procedure as described Section 1.4. The microprocessor assembly will access the QA Chip and ink transfer mechanism of the refill device.

A QA Chip storing the ink amount remaining in the printer.

An optional ink transfer mechanism to control the flow of ink from the refill device to the printer. This ink transfer mechanism must be present in the printer if the refill device doesn't have one of its own.

1.4 Operational Procedure

The operational procedure can be divided into two parts:

Refilling printers using the refill device.

Refilling of the ink reservoir in the refill device. See Section 2 and Section 3.

1.4.1 Refilling of Printers

Figure 356:
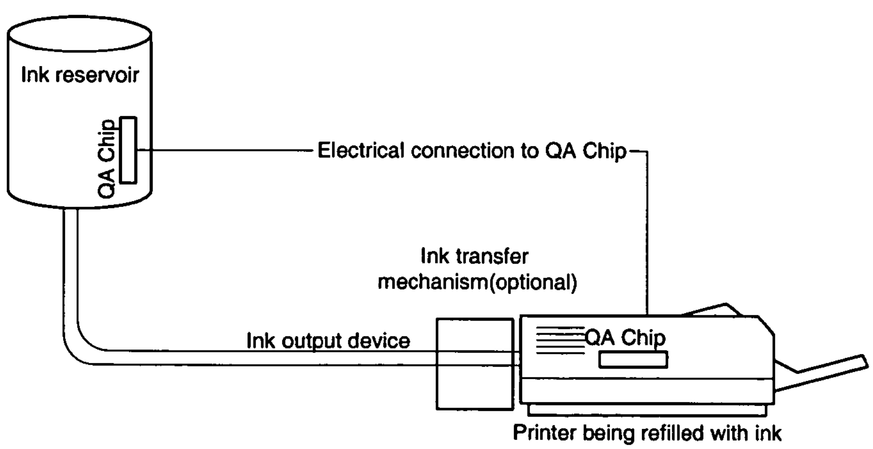
FIG. 356 shows refilling of printers by printer-based refill device

FIG. 356 shows a printer being refilled by a printer based refill device. The ink transfer mechanism is located in the printer in this case. The ink transfer mechanism could be also located in the refill device as described in Section 1.2.

The following is a description for refilling of printers using the printer based refill device:

Ink output device from the refilling device is connected to the printer.

The QA Chip electrical connection is connected to the printer.

The refill option is selected on the user interface of the printer. The microprocessor assembly in the printer will then do the following:

a. Read ink attributes (for example ink type, ink characteristics, ink colour, ink manufacturer etc) stored in the QA Chip of the ink reservoir unit. Refer to [1].

b. Compare the ink attributes as required by the printer for correct operation. This may require reading of data from the QA Chip in the printer.

c. Only if Step b is successful, then do the following:

i. Determine the amount of ink to be transferred by any or all of the following means, ensuring that the reservoir has enough ink for the transfer:

Fixed amount (e.g. based on a pre-programmed value or printer model).

User-selectable amount.

ii. Decrement the amount of ink transferred from the QA Chip in the refill station and increment the QA Chip in the printer (which stores the amount of ink in the printer) with corresponding ink amount.

iii. Command the ink transfer mechanism to release the ink to the printer through the output device.

2 Home Use Refill Station 2.1 Functional Purpose

The functional purpose of the commercial refill station is as follows:

To refill ink into ink cartridges at home or in a small office. Single ink cartridge is filled at a time.

To ensure that the correct ink present in the refill station is transferred to the correct ink cartridge.

To ensure accurate measure of ink is transferred from the refilling station to the ink cartridge during refills.

The refilling station provides the processing power required to perform refills of ink cartridges.

2.2 Basic Components

Figure 357:
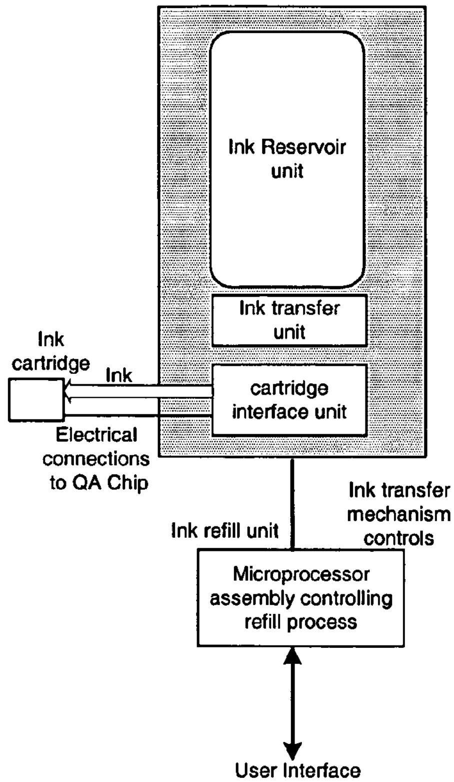
FIG. 357 shows components of a home refill station

FIG. 357 shows the components of a home refill station.

A home refill station will consist of one of the following ink refill units:

A single reservoir ink refill unit suitable for black ink (or any other single colour).

A multi reservoir ink refill unit suitable for coloured ink for example CMY (Cyan, Magenta, Yellow).

2.2.1 Ink Reservoir Unit

Figure 358:
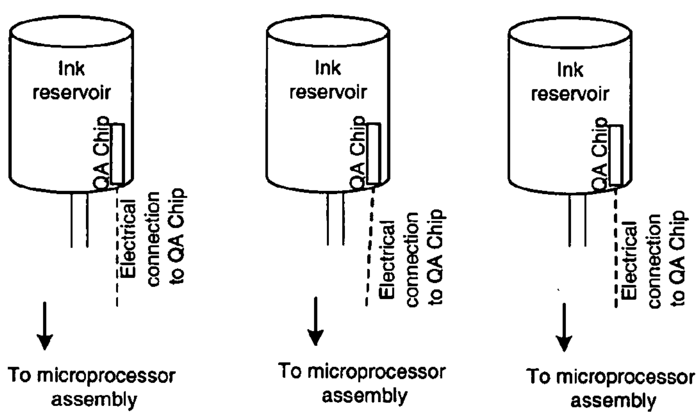
FIG. 358 shows a three-ink reservoir unit

FIG. 358 shows the components of a three-ink reservoir unit.

The ink reservoir unit will consist of the following:

Multiple ink reservoirs or a single ink reservoir which stores ink. Each refill station will allow ink reservoirs of various capacities. When the ink reservoir empties out, it is replaced by another reservoir containing more ink of the same or different type or refilled (for example through a refill station as described in Section 3).

A QA Chip and associated circuitry in each of the ink reservoirs—which stores the amount of ink in the reservoir along with the attributes of the ink.

The electrical connections to each of the QA Chips.

2.2.2 Ink Transfer Unit

The ink reservoir unit will consist of the following:

Ink output device from each ink reservoir.

The output ink transfer mechanism controls the flow ink from the ink refill unit to the ink cartridge and is controlled by the microprocessor assembly.

Final ink output devices to the cartridge interface assembly 2.2.3 Cartridge Interface Unit This unit will provide the physical interface to the ink cartridges. Each ink cartridge interface unit will hold a single or multiple cartridges of particular physical dimension.

The cartridge interface unit can removed from the ink refill unit and replaced with another interface unit to cater for other physically different cartridges.

2.2.4 Microprocessor Assembly

The controls connections for the ink transfer mechanism and the electrical connections of the QA Chip are connected to the microprocessor assembly. The microprocessor assembly oversees and controls the refill process.

The microprocessor assembly will communicate with a user interface to accept commands and provide responses for various refill operations.

2.3 Ink Cartridge Description

Ink cartridges which will be refilled in a home refill station must have a QA Chip storing the following components:

Ink amount remaining.

Ink attributes (for example—ink type, ink characteristics, ink colour, ink manufacturer).

2.4 Operational Procedure

The operational procedure can be divided into two parts:

Refilling of ink cartridges using the home refill station.

Refilling the ink reservoirs used in the refill station is discussed in Section 3.

2.5 Refilling of Ink Cartridges Using the Home Refill Station

Figure 359:
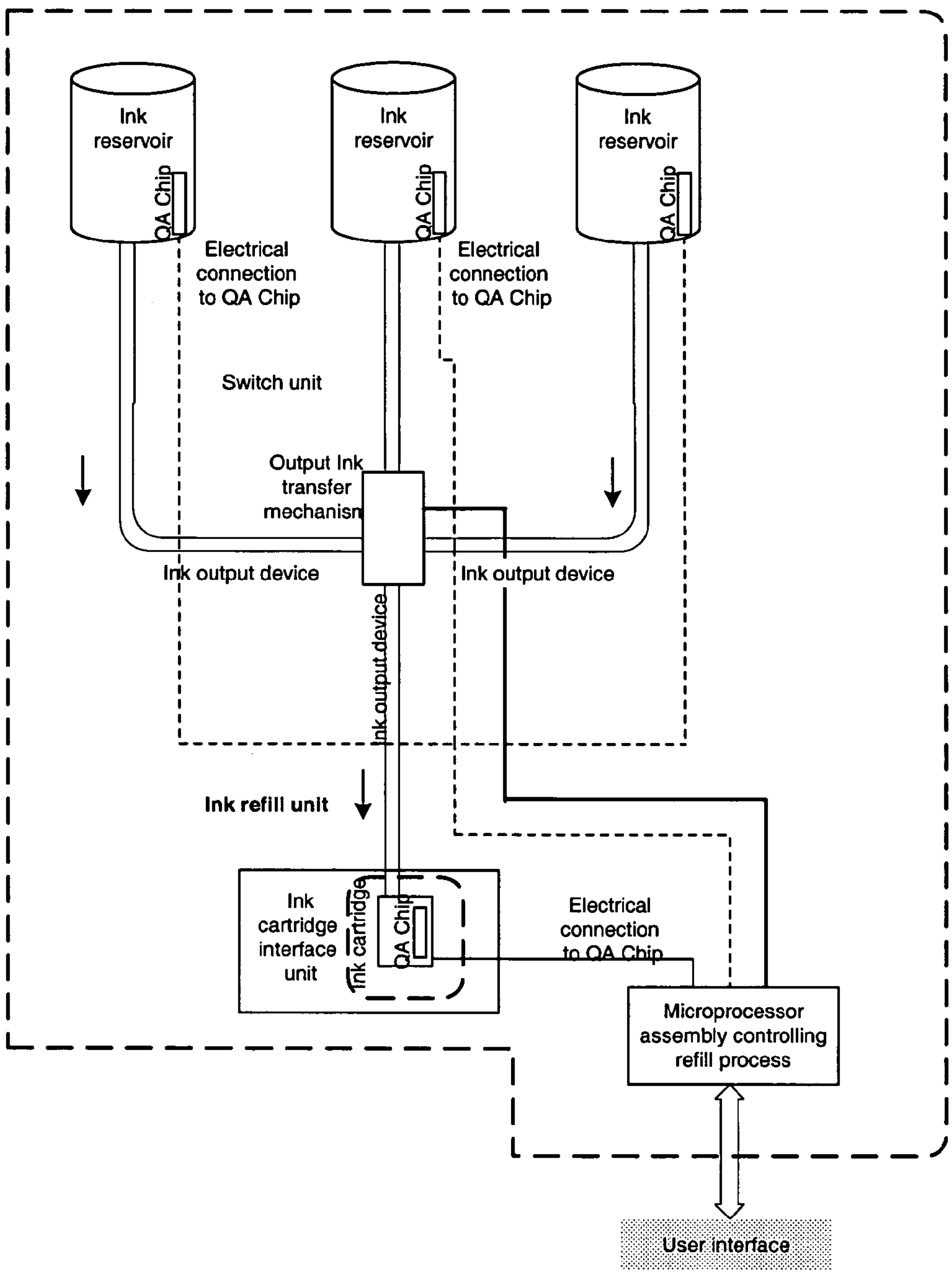
FIG. 359 shows refill of ink cartridges in a home refill station

FIG. 359 shows the refill of ink cartridges in a home refill station.

The following is a description for refilling of ink cartridges in the home refill station:

Load the ink cartridge into the cartridge interface unit of the ink refill unit. This will connect the QA Chip of the ink cartridge to the microprocessor assembly. It will also connect the ink output device of the ink refill unit to the ink cartridge.

The model number of the ink cartridge is read from the QA Chip by the microprocessor assembly controlling the ink refill units.

The microprocessor assembly will determine whether the ink refill unit is suitable for the ink cartridge model.

The refill option is selected on the microprocessor assembly through the user interface. The microprocessor assembly will then do the following:

a. Read ink attributes (for example ink type, ink characteristics, ink colour, ink manufacturer etc) stored in the QA Chip of the ink cartridge. Refer to [1].

b. Compare the read ink attributes to the ink attribute list in the refill station. This may also require reading of the ink attributes stored in the QA Chip of the ink reservoirs in the refill unit.

c. Only if Step b is successful, then do the following:

i. Determine the amount of ink to be transferred by any or all of the following means, ensuring that the reservoir has enough ink for the transfer:

Fixed amount (e.g. based on a pre-programmed value cartridge model or reservoir type).

User-selectable amount.

ii. Check the ink reservoir in the ink refill unit has adequate amount of ink to refill the ink cartridge iii. Decrement the amount of ink transferred from the QA Chip in the ink refill unit and increment the QA Chip in the ink cartridge with corresponding ink amount.

iv. If incrementing of the QA Chip with ink amount is successful then a command is sent to the ink transfer mechanism to release the ink to the ink cartridge through the output device.

3 Commercial Refill Station 3.1 Functional Purpose

The functional purpose of the commercial refill station is as follows:

To refill ink into ink cartridges that are taken to the refill station for refilling.

Multiple ink cartridges of different models can be refilled.

To ensure that the correct ink present in the refill station is transferred to the ink cartridge.

To ensure accurate measure of ink is transferred from the refilling station to the ink cartridge during refills.

The refilling station provides all processing power required to perform refills of ink cartridges.

3.2 Basic Components of the Refill Station

Figure 360:
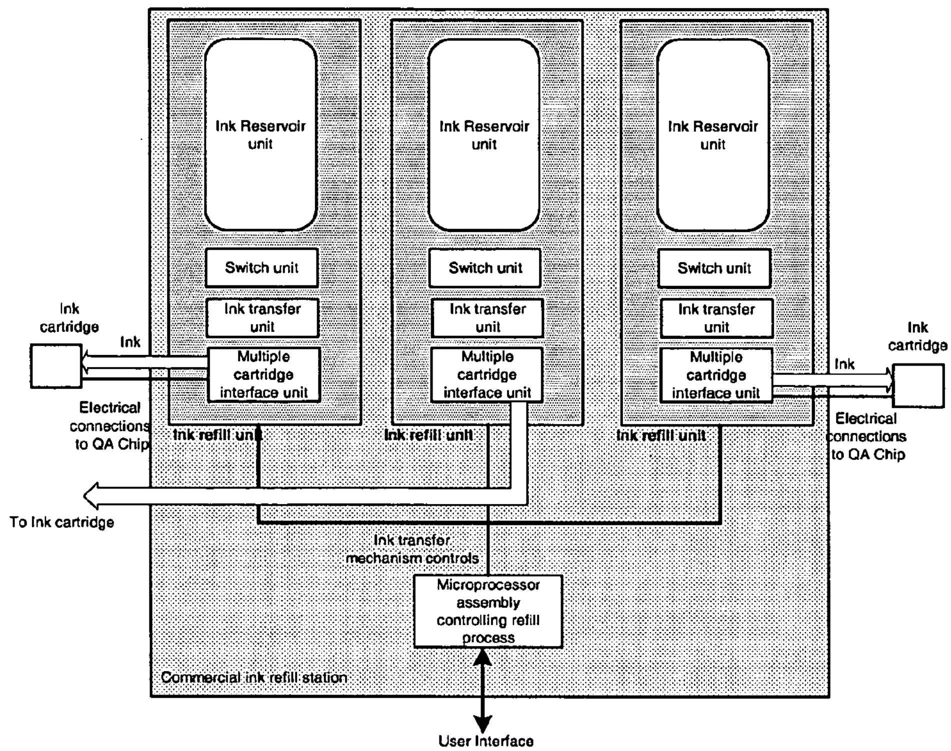
FIG. 360 shows components of a commercial refill station

FIG. 360 shows the components of a commercial refill station.

A commercial refill station will consist of multiple ink refill units controlled by a single microprocessor assembly. Each ink refill unit can refill a single ink cartridge at a time.

Each ink refill unit will consist of the following sub units:

Ink reservoir unit

Switch unit

Ink transfer unit

Multiple cartridge interface unit 3.2.1 Ink Reservoir Unit

Figure 361:
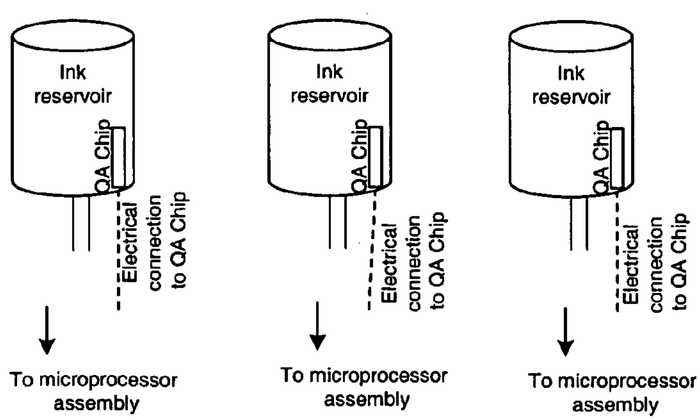
FIG. 361 shows an ink reservoir unit

FIG. 361 shows the components of a ink reservoir unit.

The ink reservoir unit will consist of the following:

Multiple ink reservoirs—which stores ink. Each refill device will allow ink reservoirs of various capacities. When the ink reservoir empties out, it is replaced by another reservoir containing more ink of the same or different type or refilled. Refer to Section 3.5.

A QA Chip and associated circuitry in each of the ink reservoirs—which stores the amount of ink in the reservoir along with the attributes of the ink in digital format.

The electrical connections of each of the QA Chips are connected to the microprocessor assembly.

3.2.2 Switch Unit

This unit will switch the inks selected from different ink reservoirs to the ink transfer unit to be dispensed into ink cartridges.

The switch unit will prevent mixing of any residual ink left in dispensing devices after each ink cartridge is refilled.

3.2.3 Ink Transfer Unit

The ink reservoir unit will consist of the following:

Ink output device from each ink reservoir.

An output ink transfer mechanism which controls the flow ink from the ink refill unit to the ink cartridge and is controlled by the microprocessor assembly.

Final ink output devices to the multiple cartridge interface assembly 3.2.4 Multiple Cartridge Interface Unit This unit will provide the physical interface to the ink cartridges. Each ink cartridge interface will hold cartridges of different physical dimensions.

Each cartridge interface unit can provide an interface for about 20 physically different cartridges.

The cartridge interface unit can removed from the ink refill unit and replaced with another interface unit to cater for other physically different cartridges.

3.2.5 Microprocessor Assembly with a User Interface

The controls connections for the ink transfer mechanism and the electrical connections of the QA Chip are connected to the microprocessor assembly. The microprocessor assembly will oversee and control the refill process.

The microprocessor assembly will communicate with a user interface to accept commands and provide responses for various refill operations.

3.3 Ink Cartridge Description

Ink cartridges which will be refilled in a commercial refill station must have a QA Chip storing the following components:

Ink amount remaining.

Ink attributes (for example—ink type, ink characteristics, ink colour, ink manufacturer).

3.4 Operational Procedure

The operational procedure can be divided into two parts:

Refilling of ink cartridges using the commercial refill station.

Refilling the ink reservoirs used in the refill station is covered in Section 3.5.

3.4.1 Refilling Ink Cartridges Using the Commercial Refill Station

Figure 362:
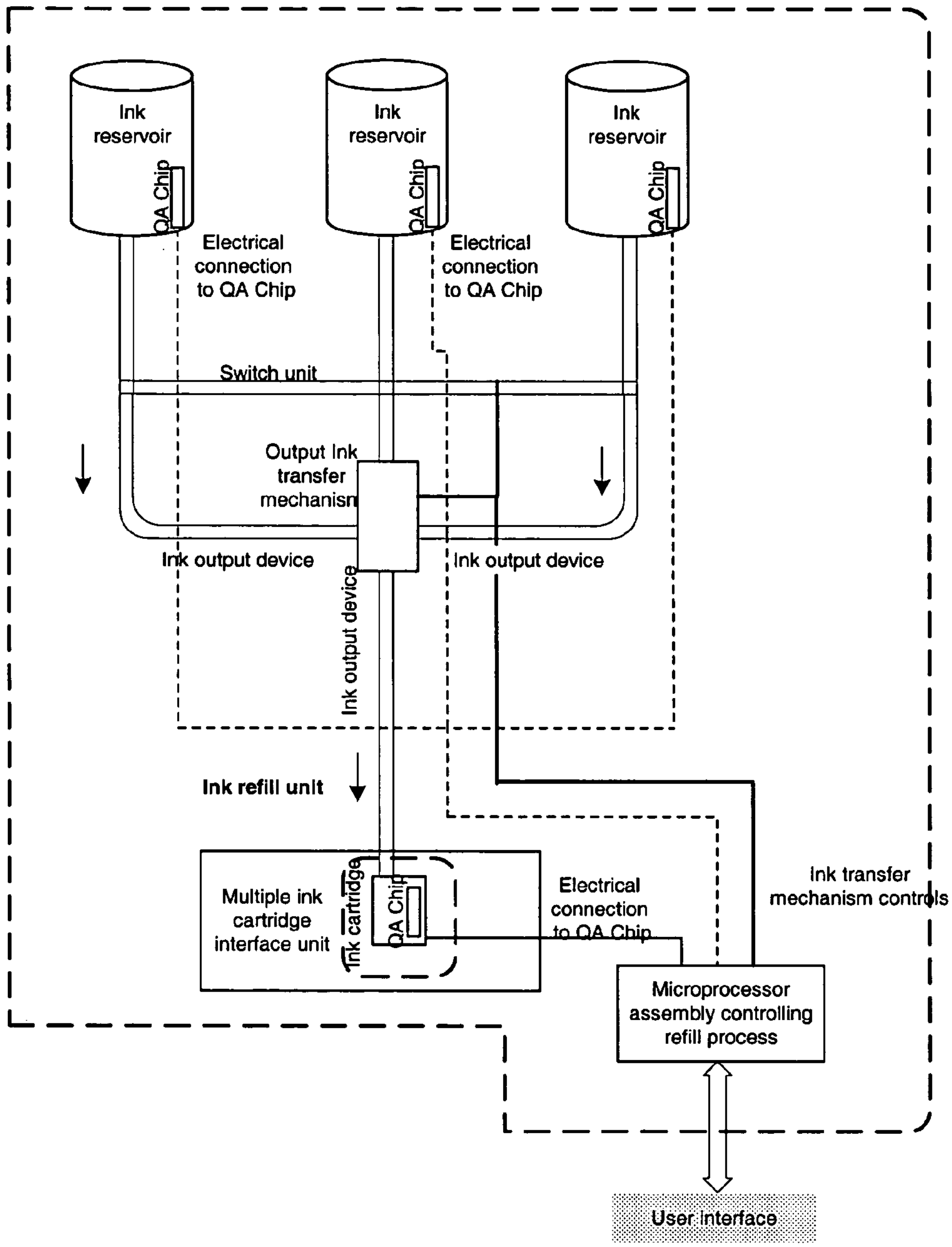
FIG. 362 shows refill of ink cartridges in a commercial refill station (showing a single refill unit)

FIG. 362 shows the refill of ink cartridges in a commercial refill station.

The following is a description for refilling of ink cartridges in the commercial refill station:

Load the ink cartridge into the multiple cartridge interface unit of the ink refill unit. This will connect the QA Chip of the ink cartridge to the microprocessor assembly. It will also connect the ink output device of the ink refill unit to the ink cartridge.

The model number of the ink cartridge automatically is read from the QA Chip by the microprocessor assembly controlling the ink refill units.

The microprocessor assembly will determine whether the ink refill unit is suitable for the ink cartridge model.

The refill option is selected on the microprocessor assembly through the user interface. The microprocessor assembly will then do the following:

a. Read ink attributes (for example ink type, ink characteristics, ink colour, ink manufacturer etc) stored in the QA Chip of the ink cartridge. Refer to [1].

b. Compare the read ink attributes to the ink attribute list in the refill station. This may also require reading of the ink attributes stored in the QA Chip of the ink reservoirs in the refill unit.

c. Only if Step b is successful, then do the following:

i. Determine the amount of ink to be transferred by any or all of the following means, ensuring that the reservoir has enough ink for the transfer:

Fixed amount (e.g. based on a pre-programmed value, cartridge model or reservoir type).

User-selectable amount.

ii. The microprocessor assembly will calculate the cost of ink amount and interrogate the user for a payment method—credit card or cash. If credit card option is selected it will request a credit card number to be selected and interface to a payment system to complete the transaction before proceeding further.

iii. Decrement the amount of ink transferred from the QA Chip in the ink refill unit and increment the QA Chip in the ink cartridge with corresponding ink amount.

iv. If incrementing of the QA Chip with ink amount is successful then a command is sent to the ink transfer mechanism to release the ink to the ink cartridge through the output device.

3.5 Refilling the Ink Reservoirs

The ink reservoirs of any ink refill device can be refilled recursively by the procedure described in Section 3.4.1, the only exception being the ink cartridge replaced by the ink reservoir.

3.6 Commercial Refill Station for a Production Environment

This refill station resembles a commercial refill station but fills multiple ink cartridges of the same type at the same time. This will serve as a filling station for new cartridges in a production environment.

Logical Interface Specification for Preferred Form of QA Chip

1 Introduction

This document defines the QA Chip Logical Interface, which provides authenticated manipulation of specific printer and consumable parameters. The interface is described in terms of data structures and the functions that manipulate them, together with examples of use. While the descriptions and examples are targetted towards the printer application, they are equally applicable in other domains.

2 Scope

The document describes the QA Chip Logical Interface as follows:

data structures and their uses (Section 5 to Section 9).

functions, including inputs, outputs, signature formats, and a logical implementation sequence (Section 10 to Section 30).

typical functional sequences of printers and consumables, using the functions and data structures of the interface (Section 31 to Section 32).

The QA Chip Logical Interface is a logical interface, and is therefore implementation independent.

Although this document does not cover implementation details on particular platforms, expected implementations include:

Software only

Off-the-shelf cryptographic hardware.

ASICs, such as SBR4320 [2] and SOPEC[3] for physical insertion into printers and ink cartridges Smart cards.

3 Nomenclature 3.1 Symbols

The following symbolic nomenclature is used throughout this document:

TABLE 246

Summary of symbolic nomenclature

| Symbol | Description |
|---|---|
| F[X] | Function F, taking a single parameter X |
| F[X, Y] | Function F, taking two parameters, X and Y |
| $X \mid Y$ | X concatenated with Y |
| $X \wedge Y$ | Bitwise X AND Y |
| $X \vee Y$ | Bitwise X OR Y (inclusive-OR) |
| $X \oplus Y$ | Bitwise X XOR Y (exclusive-OR) |
| $\neg X$ | Bitwise NOT X (complement) |
| $X \leftarrow Y$ | X is assigned the value Y |
| $X \leftarrow \{Y, Z\}$ | The domain of assignment inputs to X is Y and Z |
| $X = Y$ | X is equal to Y |
| $X \neq Y$ | X is not equal to Y |
| $\Downarrow X$ | Decrement X by 1 (floor 0) |
| $\Uparrow X$ | Increment X by 1 (modulo register length) |
| Erase X | Erase Flash memory register X |
| SetBits[X, Y] | Set the bits of the Flash memory register X based on Y |
| $Z \leftarrow$ShiftRight[X, Y] | Shift register X right one bit position, taking input bit from Y and placing the output bit in Z |
| a.b | Data field or member function 'b' in object a. |

3.2 Pseudocode 3.2.1 Asynchronous

The following pseudocode:

```
var=expression
```

means the var signal or output is equal to the evaluation of the expression.

3.2.2 Synchronous

The following pseudocode:

```
var←expression
```

means the var register is assigned the result of evaluating the expression during this cycle.

3.2.3 Expression

Expressions are defined using the nomenclature in Table 246 above. Therefore:

```
var=(a=b)
```

is interpreted as the var signal is 1 if a is equal to b, and 0 otherwise.

4 Terms 4.1 QA Device and System

An instance of a QA Chip Logical Interface (on any platform) is a QA Device.

QA Devices cannot talk directly to each other. A System is a logical entity which has one or more QA Devices connected logically (or physically) to it, and calls the functions on the QA Devices. The system is considered secure and the program running on the system is considered to be trusted.

4.2 Types of QA Devices 4.2.1 Trusted QA Device

The Trusted QA Device forms an integral part of the system itself and resides within the trusted environment of the system. It enables the system to extend trust to external QA Device s. The Trusted QA Device is only trusted because the system itself is trusted.

4.2.2 External Untrusted QA Device

The External untrusted QA Device is a QA Device that resides external to the trusted environment of the system and is therefore untrusted. The purpose of the QA Chip Logical Interface is to allow the external untrusted QA Devices to become effectively trusted. This is accomplished when a Trusted QA Device shares a secret key with the external untrusted QA Device, or with a Translation QA Device (see below).

In a printing application external untrusted QA Devices would typically be instances of SBR4320 implementations located in a consumable or the printer.

4.2.3 Translation QA Device

A Translation QA Device is used to translate signatures between QA Devices and extend effective trust when secret keys are not directly shared between QA Devices.

The Translation QA Device must share a secret key with the Trusted QA Device that allows the Translation QA Device to effectively become trusted by the Trusted QA Device and hence trusted by the system. The Translation QA Device shares a different secret key with another external untrusted QA Device (which may in fact be a Translation QA Device etc). Although the Trusted QA Device doesn't share (know) the key of the external untrusted QA Device, signatures generated by that untrusted device can be translated by the Translation QA Device into signatures based on the key that the Trusted QA Device does know, and thus extend trust to the otherwise untrusted external QA Device.

In a SoPEC-based printing application, the Printer QA Device acts as a Translation QA Device since it shares a secret key with the SoPEC, and a different secret key with the ink carridges.

4.2.4 Consumable QA Device

A Consumable QA Device is an external untrusted QA Device located in a consumable. It typically contains details about the consumable, including how much of the consumable remains.

In a printing application the consumable QA Device is typically found in an ink cartridge and is referred to as an Ink QA Device, or simply Ink QA since ink is the most common consumable for printing applications. However, other consumables in printing applications include media and impression counts, so consumable QA Device is more generic.

4.2.5 Printer QA Device

A Printer QA Device is an external untrusted device located in the printer. It contains details about the operating parameters for the printer, and is often referred to as a Printer QA.

4.2.6 Value Upgrader QA Device

A Value Upgrader QA Device contains the necessary functions to allow a system to write an initial value (e.g. an ink amount) into another QA Device, typically a consumable QA Device. It also allows a system to refill/replenish a value in a consumable QA Device after use.

Whenever a value upgrader QA Device increases the amount of value in another QA Device, the value in the value upgrader QA Device is correspondingly decreased. This means the value upgrader QA Device cannot create value—it can only pass on whatever value it itself has been issued with. Thus a value upgrader QA Device can itself be replenished or topped up by another value upgrader QA Device.

An example of a value upgrader is an Ink Refill QA Device, which is used to fill/refill ink amount in an Ink QA Device.

4.2.7 Parameter Upgrader QA Device

A Parameter Upgrader QA Device contains the necessary functions to allow a system to write an initial parameter value (e.g. a print speed) into another QA Device, typically a printer QA Device. It also allows a system to change that parameter value at some later date.

A parameter upgrader QA Device is able to perform a fixed number of upgrades, and this number is effectively a consumable value. Thus the number of available upgrades decreases by 1 with each upgrade, and can be replenished by a value upgrader QA Device.

4.2.8 Key Programmer QA Device

Secret batch keys are inserted into QA Devices during instantiation (e.g. manufacture). These keys must be replaced by the final secret keys when the purpose of the QA Device is known. The Key Programmer QA Device implements all necessary functions for replacing keys in other QA Devices.

4.3 Signature

Digital signatures are used throughout the authentication protocols of the QA Chip Logical Interface.

A signature is produced by passing data plus a secret key through a keyed hash function. The signature proves that the data was signed by someone who knew the secret key.

The signature function used throughout the QA Chip Logical Interface is HMAC-SHA1 [1].

4.3.4 Authenticated Read

This is a read of data from a non-trusted QA Device that also includes a check of the signature (see Section 4.3.3). When the System determines that the signature is correct for the returned data (e.g. by asking a trusted QA Device to test the signature) then the System is able to trust that the data has not been tampered en route from the read, and was actually stored on the non-trusted QA Device.

4.3.5 Authenticated Write

An authenticated write is a write to the data storage area in a QA Device where the write request includes both the new data and a signature. The signature is based on a key that has write access permissions to the region of data in the QA Device, and proves to the receiving QA Device that the writer has the authority to perform the write. For example, a Value Upgrader Refilling Device is able to authorize a system to perform an authenticated write to upgrade a Consumable QA Device (e.g. to increase the amount of ink in an Ink QA Device).

The QA Device that receives the write request checks that the signature matches the data (so that it hasn't been tampered with en route) and also that the signature is based on the correct authorization key.

An authenticated write can be followed by an authenticated read to ensure (from the system's point of view) that the write was successful.

4.3.6 Non-Authenticated Write

A non-authenticated write is a write to the data storage area in a QA Device where the write request includes only the new data (and no signature). This kind of write is used when the system wants to update areas of the QA Device that have no access-protection.

The QA Device verifies that the destination of the write request has access permissions that permit anyone to write to it. If access is permitted, the QA Device simply performs the write as requested. A non-authenticated write can be followed by an authenticated read to ensure (from the system's point of view) that the write was successful.

4.3.7 Authorized Modification of Data

Authorized modification of data refers to modification of data via authenticated writes (see Section 4.3.5).

TABLE 2

List of data structures

| Group description | Name | Represented by | Size | Description |
|---|---|---|---|---|
| QA Device instance identifier | Chip Identifier | ChipId | 48 bits | Unique identifier for this QA Device. |
| Key and key related data | Number of Keys | NumKeys | 8 | Number of key slots available in this QA Device. |
| | Key | K | 160 bits per key | K is the secret key used for calculating signatures. $K^n$ is the key stored in the nth key slot. |
| | Key Identifier | KeyId | 31 bits per key | Unique identifier for each key $KeyId^n$ is the key identifier for the key stored in slot n. |
| | KeyLock | KeyLock | 1 bit per key | Flag indicates whether the key is locked in the corresponding slot or not. $KeyLock^n$ is the key lock flag for slot n. |
| Operating and state data | Number of Memory Vectors | NumVectors | 4 | Number of 512 bit memory vectors in this QA Device. |
| | Memory Vector | M | 512 bits per M | M is a 512 bit memory vector. The 512-bit vector is divided into 16 × 32 bit words. |
| | | $M^0$ | | $M^0$ stores application specific data that is protected by access permissions for key-based and |

TABLE 2-continued

List of data structures

| Group description | Name | Represented by | Size | Description |
|---|---|---|---|---|
| | | | | non-key based writes. |
| | | $M^1$ | | $M^1$ stores the attributes for $M^0$, and is write-once-only. |
| | | $M^{2+}$ | | $M^{2+}$ stores application specific data that is protected only by non key-based access permissions. |
| | Permissions | $P^n$ | 16 bits per P | Access permissions for each word of$M^{1+}$. n = number of $M^{1+}$ vectors |
| Session data | Random Number | R | 160 bits | Current random number used to ensure time varying messages. Changes after each successful authentication or signature generation. |

6 Instance/Device Identifier

Each QA Device requires an identifier that allows unique identification of that QA Device by external systems, ensures that messages are received by the correct QA Device, and ensures that the same device can be used across multiple transactions.

Strictly speaking, the identifier only needs to be unique within the context of a key, since QA Devices only accept messages that are appropriately signed. However it is more convenient to have the instance identifier completely unique, as is the case with this design.

The identifier functionality is provided by ChipId.

6.1 ChipId

ChipId is the unique 64-bit QA Device identifier. The ChipId is set when the QA Device is instantiated, and cannot be changed during the lifetime of the QA Device.

A 64-bit ChipId gives a maximum of 1844674 trillion unique QA Devices.

7 Key and Key Related Data 7.1 NumKeys, K, keyID, and KeyLock

Each QA Device contains a number of secret keys that are used for signature generation and verification. These keys serve two basic functions:

- For reading, where they are used to verify that the read data came from the particular QA Device and was not altered en route.
- For writing, where they are used to ensure only authorised modification of data.

Both of these functions are achieved by signature generation; a key is used to generate a signature for subsequent transmission from the device, and to generate a signature to compare against a received signature.

The number of secret keys in a QA Device is given by NumKeys. For this version of the QA Chip Logical Interface, NumKeys has a maximum value of 8.

Each key is referred to as K, and the subscripted form $K_n$ refers to the nth key where n has the range 0 to NumKeys-1 (i.e. 0 to 7). For convenience we also refer to the nth key as being the key in the nth keyslot.

The length of each key is 160-bits. 160-bits was chosen because the output signature length from the signature generation function (HMAC-SHA1) is 160 bits, and a key longer than 160-bits does not add to the security of the function.

The security of the digital signatures relies upon keys being kept secret. To safeguard the security of each key, keys should be generated in a way that is not deterministic. Ideally each key should be programmed with a physically generated random number, gathered from a physically random phenomenon. Each key is initially programmed during QA Device instantiation.

Since all keys must be kept secret and must never leave the QA Device, each key has a corresponding 31-bit KeyId which can be read to determine the identity or label of the key without revealing the value of the key itself. Since the relationship between keys and KeyIds is 1:1, a system can read all the KeyIds from a QA Device and know which keys are stored in each of the keyslots.

Finally, each keyslot has a corresponding 1-bit KeyLock status indicating whether the key in that slot/position is allowed to be replaced (securely replaced, and only if the old key is known). Once a key has been locked into a slot, it cannot be unlocked i.e. it is the final key for that slot. A key can only be used to perform authenticated writes of data when it has been locked into its keyslot (i.e. its KeyLock status=1). Refer to Section 8.1.1.5 for further details.

Thus each of the NumKeys keyslots contains a 160-bit key, a 31-bit KeyId, and a 1-bit KeyLock.

7.2 Common and Variant Signature Generation

To create a digital signature, we pass the data to be signed together with a secret key through a key dependent one-way hash function. The key dependent one-way hash function used throughout the QA Chip Logical Interface is HMAC-SHA1[1].

Signatures are only of use if they can be validated i.e. QA Device A produces a signature for data and QA Device B can check if the signature was valid for that particular data. This implies that A and B must share some secret information so that they can generate equivalent signatures.

Common key signature generation is when QA Device A and QA Device B share the exact same key i.e. key $K_A$=key $K_B$. Thus the signature for a message produced by A using $K_A$ can be equivalently produced by B using $K_B$. In other words $SIG_{KA}$(message)=$SIG_{KB}$(message) because key $K_A$=key $K_B$.

Variant key signature generation is when QA Device B holds a base key, and QA Device A holds a variant of that key such that $K_A$=owf($K_B$,$U_A$) where owf is a one-way function based upon the base key ($K_B$) and a unique number in A ($U_A$). Thus A can produce $SIG_{KA}$(message), but for B to produce an equivalent signature it must produce $K_A$ by reading $U_A$ from A and using its base key $K_B$. $K_A$ is referred to as a variant key and $K_B$ is referred to as the base/common key. Therefore, B can produce equivalent signatures from many QA Devices, each of which has its own unique variant of $K_B$. Since ChipId is unique to a given QA Device, we use that as $U_A$. A one-way function is required to create $K_A$ from $K_B$ or it would be possible to derive $K_B$ if $K_A$ were exposed.

Common key signature generation is used when A and B are equally available[1] to an attacker. For example, Printer QA Devices and Ink QA Devices are equally available to attackers (both are commonly available to an attacker), so shared keys between these two devices should be common keys.

[1]The term "equally available" is relative. It typically means that the ease of availability of both are the effectively the same, regardless of price (e.g. both A and B are commercially available and effectively equally easy to come by).

Variant key signature generation is used when B is not readily available to an attacker, and A is readily available to an attacker. If an attacker is able to determine $K_A$, they will not know $K_A$ for any other QA Device of class A, and they will not be able to determine $K_B$.

The QA Device producing or testing a signature needs to know if it must use the common or variant means of signature generation. Likewise, when a key is stored in a QA Device, the status of the key (whether it is a base or variant key) must be stored along with it for future reference. Both of these requirements are met using the KeyId as follows:

The 31-bit KeyId is broken into two parts:

A 30-bit unique identifier for the key. Bits 30-1 represents the Id.

A 1-bit Variant Flag, which represents whether the key is a base key or a variant key. Bit 0. represents the Variant Flag.

Table 247 describes the relationship of the Variant Flag with the key.

TABLE 247

Variant Flag representation

| value | Key represented |
|---|---|
| 0 | Base key |
| 1 | Variant key |

7.2.1 Equivalent Signature Generation Between QA Devices

Figure 363:
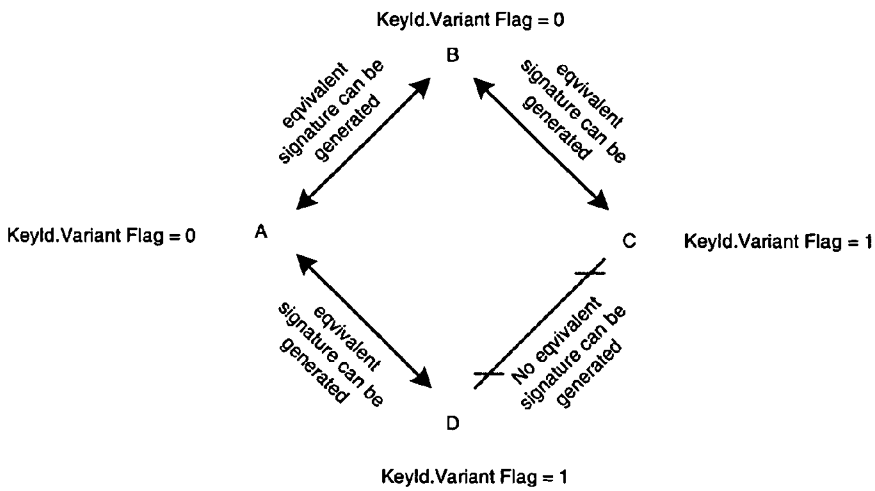
FIG. 363 shows equivalent signature generation
Figure 364:
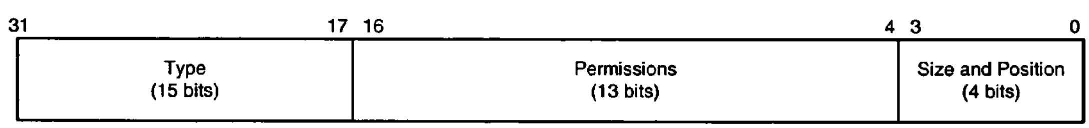
FIG. 364 shows a basic field definition

Equivalent signature generation between 4 QA Devices A, B, C and D is shown in FIG. 363. Each device has a single key. KeyId.Id of all four keys are the same i.e $KeyId_A.Id=KeyId_B.Id=KeyId_C.Id=KeyId_D.Id$.

If $KeyId_A$. VariantFlag=0 and $KeyId_B$. VariantFlag=0, then a signature produced by A, can be equivalently produced by B because $K_A=K_B$.

If $KeyId_B$. VariantFlag=0 and $KeyId_C$. VariantFlag=1, then a signature produced by C, is equivalently produced by B because $K_C=f(K_B, ChipId_C)$.

If $KeyId_C$. VariantFlag=1 and $KeyId_D$. VariantFlag=1, then a signature produced by C, cannot be equivalently produced by D because there is no common base key between the two devices.

If $KeyId_D$. VariantFlag=1 and $KeyId_A$. VariantFlag=0, then a signature produced by D, can be equivalently produced by A because $K_D=f(K_A, ChipId_D)$.

8 Operating and State Data

The primary purpose of a QA Device is to securely hold application-specific data. For example if the QA Device is an Ink QA Device it may store ink characteristics and the amount of ink-remaining. If the QA Device is a Printer QA Device it may store the maximum speed and width of printing.

For secure manipulation of data:

Data must be clearly identified (includes typing of data).

Data must have clearly defined access criteria and permissions.

The QA Chip Logical Interface contains structures to permit these activities.

The QA Device contains a number of kinds of data with differing access requirements:

Data that can be decremented by anyone, but only increased in an authorised fashion e.g. the amount of ink-remaining in an ink cartridge.

Data that can only be decremented in an authorised fashion e.g. the number of times a Parameter Upgrader QA Device has upgraded another QA Device.

Data that is normally read-only, but can be written to (changed) in an authorised fashion e.g. the operating parameters of a printer.

Data that is always read-only and doesn't ever need to be changed e.g. ink attributes or the serial number of an ink cartridge or printer.

Data that is written by QACo/Silverbrook, and must not be changed by the OEM or end user e.g. a licence number containing the OEM's identification that must match the software in the printer.

Data that is written by the OEM and must not be changed by the end-user e.g. the machine number that filled the ink cartridge with ink (for problem tracking).

8.1 M

M is the general term for all of the memory (or data) in a QA Device. M is further subscripted to refer to those different parts of M that have different access requirements as follows:

$M_0$ contains all of the data that is protected by access permissions for key-based (authenticated) and non-key-based (non-authenticated) writes.

$M_1$ contains the type information and access permissions for the $M_0$ data, and has write-once permissions (each sub-part of $M_1$ can only be written to once) to avoid the possibility of changing the type or access permissions of something after it has been defined.

$M_2$, $M_3$ etc., referred to as $M_{2+}$, contains all the data that can be updated by anyone until the permissions for those sub-parts of $M_{2+}$ have changed from read/write to read-only.

While all QA Devices must have at least $M_0$ and $M_1$, the exact number of memory vectors ($M_n$s) available in a particular QA Device is given by NumVectors. In this version of the QA Chip Logical Interface there are exactly 4 memory vectors, so NumVectors=4.

Each $M_n$ is 512 bits in length, and is further broken into 16×32 bit words. The ith word of $M_n$ is referred to as $M_n[i]$. $M_n$[0] is the least significant word of $M_n$, and $M_n$[15] is the most significant word of $M_n$.

8.1.1 $M_0$ and $M_1$

In the general case of data storage, it is up to the external accessor to interpret the bits in any way it wants. Data structures can be arbitrarily arranged as long as the various pieces of software and hardware that interpret those bits do so consistently. However if those bits have value, as in the case of a consumable, it is vital that the value cannot be increased without appropriate authorisation, or one type of value cannot be added to another incompatible kind e.g. dollars should never be added to yen.

Therefore $M_0$ is divided into a number of fields, where each field has a size, a position, a type and a set of permissions. $M_0$ contains all of the data that requires authenticated write access (one data element per field), and $M_1$ contains the field information i.e. the size, type and access permissions for the data stored in $M_0$.

Each 32-bit word of $M_1$ defines a field. Therefore there is a maximum of 16 defined fields. $M_1$[0] defines field 0, $M_1$[1] defines field 1 and so on. Each field is defined in terms of:

size and position, to permit external accessors determine where a data item is type, to permit external accessors determine what the data represents permissions, to ensure approriate access to the field by external accessors.

The 32-bit value $M_1$[n] defines the conceptual field attributes for field n as follows: With regards to consistency of interpretation, the type, size and position information stored in the various words of $M_1$ allows a system to determine the contents of the corresponding fields (in $M_0$) held in the QA Device. For example, a 3-color ink cartridge may have an Ink QA Device that holds the amount of cyan ink in field 0, the amount of magenta ink in field 1, and the amount of yellow ink in field 2, while another single-color Ink QA Device may hold the amount of yellow ink in field 0, where the size of the fields in the two Ink QA Devices are different.

A field must be defined (in $M_1$) before it can be written to (in $M_0$). At QA Device instantiation, the whole of $M_0$ is 0 and no fields are defined (all of $M_1$ is 0). The first field (field 0) can only be created by writing an appropriate value to $M_1$[0]. Once field 0 has been defined, the words of $M_0$ corresponding to field 0 can be written to (via the appropriate permissions within the field definition $M_1$[0]).

Once a field has been defined (i.e. $M_1$[n] has been written to), the size, type and permissions for that field cannot be changed i.e. $M_1$ is write-once. Otherwise, for example, a field could be defined to be lira and given an initial value, then the type changed to dollars.

The size of a field is measured in terms of the number of consecutive 32-bit words it occupies.

Since there are only 16×32-bit words in $M_0$, there can only be 16 fields when all 16 fields are defined to be 1 word sized each. Likewise, the maximum size of a field is 512 bits when only a single field is defined, and it is possible to define two fields of 256-bits each.

Once field 0 has been created, field 1 can be created, and so on. When enough fields have been created to allocate all of $M_0$, the remaining words in $M_1$ are available for write-once general data storage purposes.

It must be emphasised that when a field is created the permissions for that field are final and cannot be changed. This also means that any keys referred to by the field permissions must be already locked into their keyslots. Otherwise someone could set up a field's permissions that the key in a particular keyslot has write access to that field without any guarantee that the desired key will be ever stored in that slot (thus allowing potential mis-use of the field's value).

8.1.1.1 Field Size and Position

A field's size and position are defined by means of 4 bits (referred to as EndPos) that point to the least significant word of the field, with an implied position of the field's most significant word. The implied position of field 0's most significant word is $M_0$[15]. The positions and sizes of all fields can therefore be calculated by starting from field 0 and working upwards until all the words of $M_0$ have been accounted for.

The default value of $M_1$[0] is 0, which means field0.endPos=0. Since field0.startPos=15, field 0 is the only field and is 16 words long.

8.1.1.1.1 EXAMPLE

Suppose for example, we want to allocate 4 fields as follows:

field 0: 128 bits (4×32-bit words)

field 1: 32 bits (1×32-bit word)

field 2: 160 bits (5×32-bit words)

field 3: 192 bits (6×32-bit words)

Field 0's position and size is defined by $M_1$[0], and has an assumed start position of 15, which means the most significant word of field 0 must be in $M_0$[15]. Field 0 therefore occupies $M_0$[12] through to $M_0$[15], and has an endPos value of 12.

Field 1's position and size is defined by $M_1$[1], and has an assumed start position of 11 (i.e. $M_1$[0].endPos-1). Since it has a length of 1 word, field 1 therefore occupies only $M_0$[11] and its end position is the same as its start position i.e. its endPos value is 11.

Likewise field 2's position and size is defined by $M_1$[2], and has an assumed start position of 10 (i.e. $M_1$[1].endPos-1). Since it has a length of 5 words, field 2 therefore occupies $M_0$[6] through to $M_0$[10] and and has an endPos value of 6.

Finally, field 3's position and size is defined by $M_1$[3], and has an assumed start position of 5 (i.e. $M_1$[2].endPos-1). Since it has a length of 6 words, field 3 therefore occupies $M_0$[5] through to $M_0$[0] and and has an endPos value of 0.

Since all 16 words of $M_0$ are now accounted for in the 4 fields, the remaining words of $M_1$ (i.e. $M_1$[4] though to $M_1$[15]) are ignored, and can be used for any write-once (and thence read-only) data.

Figure 365:
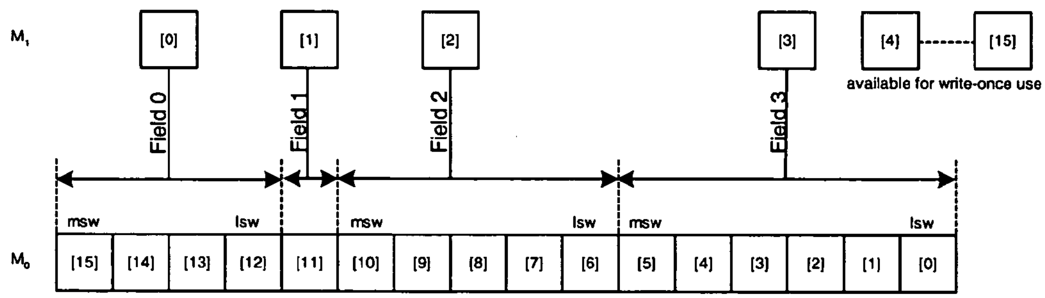
FIG. 365 shows an example of defining field sizes and positions
Figure 366:
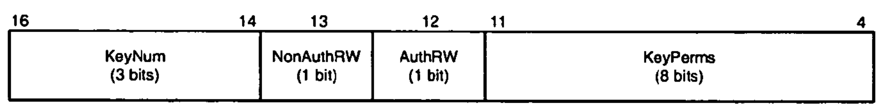
FIG. 366 shows permissions

FIG. 365 shows the same example in diagramatic format.

8.1.1.1.2 Determining the Number of Fields

The following pseudocode illustrates a means of determining the number of fields:

```
fieldNum FindNumFields(M1)
startPos ←15
fieldNum ←0
While (fieldNum < 16)
    endPos ←M1[fieldNum] .endPos
    If (endPos > startPos)
        # error in this field... so must be an attack
        attackDetected( ) # most likely clears all keys and data
    EndIf
    fieldNum++
    If (endPos = 0)
        return fieldNum # is already incremented
    Else
        startPos ←endPos − 1 # endpos must be > 0
    EndIf
EndWhile
# error if get here since 16 fields are consumed in 16 words at
most
attackDetected( ) # most likely clears all keys and data
```

8.1.1.1.3 Determining the Sizes of All Fields

The following pseudocode illustrates a means of determing the sizes of all valid fields:

```
FindFieldSizes(M1, fieldSize[ ])
numFields ←FindNumFields (M1) # assumes that FindNumFields does
all checking
ntartPos ←15
fieldNum ←0
While (fieldNum < numFields)
    EndPos ←M1[fieldNum].endPos
    fieldSize[fieldNum] = startPos − endPos + 1
```

-continued

```
    startPos ←endPos – 1   # endpos must be > 0
    fieldNum++
EndWhile
While (fieldNum < 16)
    fieldSize[fieldNum] ←0
    fieldNum++
EndWhile
```

8.1.1.2 Field Type

The system must be able to identify the type of data stored in a field so that it can perform operations using the correct data. For example, a printer system must be able identify which of a consumable's fields are ink fields (and which field is which ink) so that the ink usage can be correctly applied during printing.

A field's type is defined by 15 bits. Table 332 in Appendix A lists the field types that are specifically required by the QA Chip Logical Interface and therefore apply across all applications.

The default value of $M_1$[0] is 0, which means field0.type=0 (i.e. non-initialised).

Strictly speaking, the type need only be interpreted by all who can securely read and write to that field i.e. within the context of one or more keys. However it is convenient if possible to keep all types unique for simplistic identification of data across all applications.

In the general case, an external system communicating with a QA Device can identify the data stored in M0 in the following way:

Read the KeyId of the key that has permission to write to the field. This will a give broad identification of the data type, which may be sufficient for certain applications.

Read the type attribute for the field to narrow down the identity within the broader context of the KeyId.

For example, the printer system can read the KeyId to deduce that the data stored in a field can be written to via the HP_Network_InkRefill key, which means that any data is of the general ink category known to HP Network printers. By further reading the type attribute for the field the system can determine that the ink is Black ink.

8.1.1.3 Field Permissions

All fields can be ready by everyone. However writes to fields are governed by 13-bits of permissions that are present in each field's attribute definition. The permissions describe who can do what to a specific field.

Writes to fields can either be authenticated (i.e. the data to be written is signed by a key and this signature must be checked by the receiving device before write access is given) or non-authenticated (i.e. the data is not signed by a key). Therefore we define a single bit (AuthRW) that specifies whether authenticated writes are permitted, and a single bit (NonAuthRW) specifying whether non-authenticated writes are permitted. Since it is pointless to permit both authenticated and non-authenticated writes to write any value (the authentciated writes are pointless), we further define the case when both bits are set to be interpreted as authenticated writes are permitted, but non-authenticated writes only succeed when the new value is less than the previous value i.e. the permission is decrement-only. The interpretation of these two bits is shown in Table 249.

TABLE 249

Interpretation of AuthRW and NonAuthRW

| NonAuthRW | AuthRW | Interpretation |
|---|---|---|
| 0 | 0 | Read-only access (no-one can write to this field). This is the initial state for each field. At instantiation all of $M_1$ is 0 which means AuthRW and NonAuthRW are 0 for each field, and hence none of $M_0$ can be written to until a field is defined. |
| 0 | 1 | Authenticated write access is permitted<br>Non-authenticated write acecss is not permitted |
| 1 | 0 | Authenticated write access is not permitted<br>Non-authenticated write access is permitted (i.e. anyone can write to this field) |
| 1 | 1 | Authenticated write access is permitted<br>Non-authenticated write access is decrement-only. |

If authenticated write access is permitted, there are 11 additional bits (bringing the total number of permission bits to 13) to more fully describe the kind of write access for each key. We only permit a single key to have the ability to write any value to the field, and the remaining keys are defined as being either not permitted to write, or as having decrement-only write access. A 3-bit KeyNum represents the slot number of the key that has the ability to write any value to the field (as long as the key is locked into its key slot), and an 8-bit KeyPerms defines the write permissions for the (maximum of) 8 keys as follows:

KeyPerms[n]=0: The key in slot n (i.e. $K_n$) has no write access to this field (except when n=KeyNum). Setting KeyPerms to 0 prohibits a key from transferring value (when an amount is deducted from field in one QA Device and transferred to another field in a different QA Device)

KeyPerms[n]=1: The key in slot n (i.e. $K_n$) is permitted to perform decrement-only writes to this field (as long as $K_n$ is locked in its key slot). Setting KeyPerms to 1 allows a key to transfer value (when an amount is deducted from field in one QA Device and transferred to another field in a different QA Device).

The 13-bits of permissions (within bits 4–16 of $M_1$[n]) are allocated as follows:

8.1.1.3.1 Example 1

Figure 367:
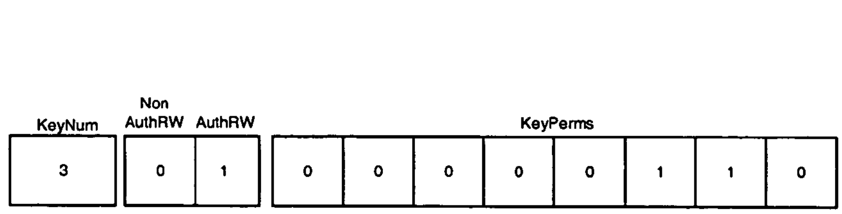
FIG. 367 shows a first example of permissions for a field

FIG. 367 shows an example of permission bits for a field. In this example we can see:

NonAuthRW=0 and AuthRW=1, which means that only authenticated writes are allowed i.e. writes to the field without an appropriate signature are not permitted.

KeyNum=3, so the only key permitted to write any value to the field is key 3 (i.e. $K_3$).

KeyPerms[3]=0, which means that although key 3 is permitted to write to this field, key 3 can't be used to transfer value from this field to other QA Devices.

KeyPerms[0,4,5,6,7]=0, which means that these respective keys cannot write to this field.

KeyPerms[1,2]=1, which means that keys 1 and 2 have decrement-only access to this field i.e. they are permitted to write a new value to the field only when the new value is less than the current value.

8.1.1.3.2 Example 2

Figure 368:
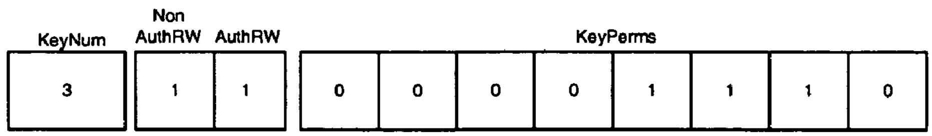
FIG. 368 shows a second example of permissions for a field

FIG. 368 shows a second example of permission bits for a field.

In this example we can see:

NonAuthRW and AuthRW=1, which means that authenticated writes are allowed and writes to the field without a signature are only permitted when the new value is less than the current value (i.e. non-authenticated writes have decrement-only permission).

KeyNum=3, so the only key permitted to write any value to the field is key 3 (i.e. $K_3$).

KeyPerms[3]=1, which means that key 3 is permitted to write to this field, and can be used to transfer value from this field to other QA Devices.

KeyPerms[0,4,5,6,7]=0, which means that these respective keys cannot write to this field.

KeyPerms[1,2]=1, which means that keys 1 and 2 have decrement-only access to this field i.e. they are permitted to write a new value to the field only when the new value is less than the current value.

8.1.1.4 Summary of Field Attributes

Figure 369:
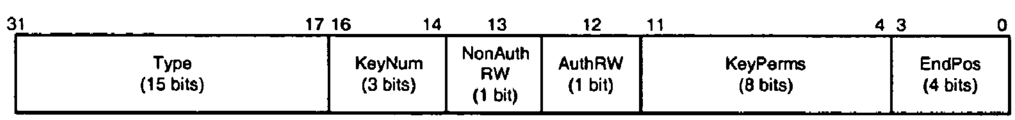
FIG. 369 shows field attributes

FIG. 369 shows the breakdown of bits within the 32-bit field attribute value $M_1[n]$. Table 250 summarises each attribute.

TABLE 250

Attributes for a field

| Attribute | Sub-attribute name | Size in bits | Interpretation |
|---|---|---|---|
| Type | Type | 15 | Gives additional identification of the data stored in the field within the context of the accessors of that field. |
| Permissions | KeyNum | 3 | The slot number of the key that has authenticated write access to the field. |
| | NonAuthRW | 1 | 0 = non-authenticated writes are not permitted to this field. 1 = non-authenticated writes are permitted to this field (see Table 249). |
| | AuthRW | 1 | 0 = authenticated writes are not permitted to this field. 1 = authenticated writes are permitted to this field. |
| | KeyPerms | 8 | Bitmap representing the write permissions for each of the keys when AuthRW = 1. For each bit: 0 = no write access for this key (except for key KeyNum) 1 = decrement-only access is permitted for this key. |
| Size and Position | EndPos | 4 | The word number in $M_0$ that holds the lsw of the field. The msw is held in M1[fieldNum − 1], where msw of field 0 is 15. |

8.1.1.5 Permissions of $M_1$ $M_1$ holds the field attributes for data stored in $M_0$, and each word of $M_1$ can be written to once only.

It is important that a system can determine which words are available for writing. While this can be determined by reading $M_1$ and determining which of the words is non-zero, a 16-bit permissions value $P_1$ is available, with each bit indicating whether or not a given word in $M_1$ has been written to. Bit n of $P_1$ represents the permissions for $M_1[n]$ as follows:

TABLE 251

Interpretation of $P_1[n]$ i.e. bit n of $M_1$'s permission

| | Description |
|---|---|
| 0 | writes to $M_1[n]$ are not permitted i.e. this word is now read-only |
| 1 | writes to $M_1[n]$ are permitted |

Since $M_1$ is write-once, whenever a word is written to in $M_1$, the corresponding bit of $P_1$ is also cleared, i.e. writing to $M_1[n]$ clears $P_1[n]$.

Writes to $M_1[n]$ only succeed when all of $M_1[\mathbf{0} \ldots n-1]$ have already written to (i.e. previous fields are defined) i.e.

$M_1[\mathbf{0} \ldots n-1]$ must have already been written to (i.e. $P_1[0 \ldots n-1]$ are 0)

$P_1[n]=1$ (i.e. it has not yet been written to)

In addition, if $M_1[n-1].endPos \neq 0$, the new $M_1[n]$ word will define the attributes of field n, so must be further checked as follows:

The new $M_1[n]$.endPos must be valid (i.e. must be less than $M_1[n-1]$.endPos)

If the new $M_1[n]$.authRW is set, $K_{keyNum}$ must be locked, and all keys referred to by the new $M_1[n]$.keyPerms must also be locked.

However if $M_1[n-1].endPos=0$, then all of $M_0$ has been defined in terms of fields. Since enough fields have been created to allocate all of $M_0$, any remaining words in $M_1$ are available for write-once general data storage purposes, and are not checked any further.

8.1.2 M2+

$M_2$, $M_3$ etc., referred to as $M_{2+}$, contains all the data that can be updated by anyone (i.e. no authenticated write is required) until the permissions for those sub-parts of $M_{2+}$ have changed from read/write to read-only.

The same permissions representation as used for $M_1$ is also used for $M_{2+}$. Consequently $P_n$ is a 16-bit value that contains the permissions for $M_n$ (where n>0). The permissions for word w of $M_n$ is given by a single bit $P_n[w]$. However, unlike writes to $M_1$, writes to $M_{2+}$ do not automatically clear bits in P. Only when the bits in $P_{2+}$ are explictly cleared (by anyone) do those corresponding words become read-only and final.

9 Session Data

Data that is valid only for the duration of a particular communication session is referred to as session data. Session data ensures that every signature contains different data (sometimes referred to as a nonce) and this prevents replay attacks.

9.1 R

R is a 160-bit random number seed that is set up (when the QA Device is instantiated) and from that point on it is internally managed and updated by the QA Device. R is used to ensure that each signed item contains time varying information (not chosen by an attacker), and each QA Device's R is unrelated from one QA Device to the next.

This R is used in the generation and testing of signatures.

An attacker must not be able to deduce the values of R in present and future devices. Therefore, R should be programmed with a cryptographically strong random number, gathered from a physically random phenomenon (must not be deterministic).

9.2 Advancing R

The session component of the message must only last for a single session (challenge and response).

The rules for updating R are as follows:

Reads of R do not advance R.

Everytime a signature is produced with R, R is advanced to a new random number.

Everytime a signature including R is tested and is found to be correct, R is advanced to a new random number.

9.3 $R_L$ and $R_E$

Each signature contains 2 pieces of session data i.e. 2 Rs:

One R comes from the QA Device issuing the challenge i.e. the challenger. This is so the challenger can ensure that the challenged QA Device isn't simply replaying an old signature i.e. the challenger is protecting itself against the challenged.

One R comes from the device responding to the challenge i.e. the challenged. This is so the challenged never signs anything that is given to it without inserting some time varying change i.e. protects the challenged from the challenger in case the challenger is actually an attacker performing a chosen text attack Since there are two Rs, we need to distinguish between them. We do so by defining each R as external ($R_E$) or local ($R_L$) depending on its use in a given function. For example, the challenger sends out its local R, referred to as $R_L$. The device being challenged receives the challenger's R as an external R, i.e $R_E$. It then generates a signature using its $R_L$ and the challenger's $R_E$. The resultant signature and $R_L$ are sent to the challenger as the response. The challenger receives the signature and $R_E$ (signature and $R_L$ produced by the device being challenged), produces its own signature using $R_L$ (sent to the device being challenged earlier) and $R_E$ received, and compares that signature to the signature received as response.

Signature Functions

10 Objects 10.1 KeyRef 10.1.1 Object Description

Instead of passing keys directly into a function, a KeyRef (i.e. key reference) object is passed instead. A KeyRef object encapsulates the process by which a key is formed for common and variant forms of signature generation (based on the setting of the variables within the object). A KeyRef defines which key to use, whether it is a common or variant form of that key, and, if it is a variant form, the ChipId to use to create the variant. For more information about common and variant forms of keys, see Section 7.2.

Users pass KeyRef objects in as input parameters to public functions of the QA Chip Logical Interface, and these KeyRefs are subsequently passed to the signature function (called within the interface function). Note, however, that the method functions for KeyRef objects are not available outside the QA Chip Logical Interface.

10.1.2 Object Variables

Table 252 describes each of the variables within a KeyRef object.

TABLE 252

Description of object variables for KeyRef object

| Parameter | Description |
|---|---|
| keyNum | Slot number of the key to use as the basis for key formation |

TABLE 252-continued

Description of object variables for KeyRef object

| Parameter | Description |
|---|---|
| useChipId | 0 = the key to be formed is a common key (i.e. is the same as $K_{keyNum}$)<br>1 = the key to be formed is a variant key based on $K_{keyNum}$ |
| ChipId | When useChipId = 1, this is the ChipId to be used to form the variant key (this will be the ChipId of the QA Device which stores the variant of $K_{keyNum}$)<br>When useChipId = 0, chipId is not used |

10.1.3 Object Methods 10.1.3.1 getKey public key getKey(void)

10.1.3.1.1 Method Description

This method is a public method (public in object oriented terms, not public to users of the QA Chip Logical Interface) and is called by the GenerateSignature function to return the key for use in signature generation.

If useChipId is true, the formKeyVariant method is called to form the key using chipid and then return the variant key. If useChipId is false, the key stored in slot keyNum is returned.

10.1.3.1.2 Method Sequence

The getKey method is illustrated by the following pseudocode:

```
If (useChipId = 0)
    key ←K_keyNum
Else
    key ←formKeyVariant( )
EndIf
Return key
```

10.1.3.2 formKeyVariant private key formKeyVariant (voID)

10.1.3.2.1 Method Description

This method produces the variant form of a key, based on the $K_{keyNum}$ and chipId. As described in Section 7.2, the variant form of key $K_{keyNum}$ is generated by owf ($K_{keyNum}$, chipID) where owf is a one-way function.

In addition, the time taken by owf must not depend on the value of the key i.e. the timing should be effectively constant. This prevents timing attacks on the key.

At present, owf is SHA1, although this still needs to be verified. Thus the variant key is defined to be SHA1 ($K_{keyNum}$|chipID).

10.1.3.2.2 Method Sequence

The formKeyVariant method is illustrated by the following pseudocode:

```
key←SHA1(K_keyNum|chipId) # Calculation must take
    cinstant time Return key
```

11 Functions

Digital signatures form the basis of all authentication protocols within the QA Chip Logical Interface. The signature functions are not directly available to users of the QA Chip Logical Interface, since a golden rule of digital signatures is never to sign anything exactly as it has been given to you.

Instead, these signature functions are internally available to the functions that comprise the public interface, and are used by those functions for the formation of keys and the generation of signatures.

11.1 GenerateSignature

| | |
|---|---|
| Input: | KeyRef, Data, Random1, Random2 |
| Output: | SIG |
| Changes: | None |
| Availability: | All devices |

11.1.1 Function Description

This function uses KeyRef to obtain the actual key required for signature generation, appends Random1 and Random2 to Data, and performs HMAC_SHA1[key, Data] to output a signature. HMAC_SHA1 is described in [1]. In addition, this operation must take constant time irrespective of the value of the key (see Section 10.1.3.2 for more details).

11.1.2 Input Parameter Description

Table 253 describes each of the input parameters:

TABLE 253

Description of input parameters for GenerateSignature

| Parameter | Description |
|---|---|
| KeyRef | This is an instance of the KeyRef object for use by the GenerateSignature function. For common key signature generation: KeyRef.keyNum = Slot number of the key to be used to produce the signature. KeyRef.useChipId = 0 For variant key signature generation: KeyRef.keyNum = Slot number of the key to be used for generating the variant key, where the var iant key is to be used to produce the signature KeyRef.useChipId = 1 KeyRef.chipId = ChipId of the QA Device which stores the variant of $K_{KeyRef.keyNum}$, and uses the variant key for signature generation. |
| Data | Preformatted data to be signed. Random1 and Random2 are appended to Data before the signature is generated to ensure that the signature is session based (applicable only to a single session). |
| Random1 | This is the session component from the QA Device that is responding to the challenge. |
| Random2 | This is the session component from the QA Device that issued the challenge. |

11.1.3 Output Parameter Description

Table 254 describes each of the output parameters.

TABLE 254

Description of output parameters for GenerateSignature

| Parameter | Description |
|---|---|
| SIG | SIG = $SIG_{key}$(Data \| Random1 \| Random2) where key = KeyRef.getKey( ) |

11.1.4 Function Sequence

The GenerateSignature function is illustrated by the following pseudocode:

```
key←KeyRef.getKey ( )
    dataToBeSigned←Data|Random1|Random2
    SIG←HMAC_SHA1(key, dataToBeSigned) #
    Calculation must take constant time Output SIG
    Return
```

Basic Functions

12 Definitions

This section defines return codes and constants referred to by functions and pseudocode.

12.1 ResultFlag

The ResultFlag is a byte that indicates the return status from a function. Callers can use the value of ResultFlag to determine whether a call to a function succeeded or failed, and if the call failed, the specific error condition.

Table 255 describes the ResultFlag values and the mnemonics used in the pseudocode.

TABLE 255

ResultFlag value description

| Mnemonic | Description | Possible causes |
|---|---|---|
| Pass | Function completed sucessfully | Function successfully completed requested task. |
| Fail | General Failure | An error occurred during function processing. |
| BadSig | Signature mismatch | Input signature didn't match the generated signature. |
| InvalidKey | KeyRef incorrect | Input KeyRef.keyNum > 3. |
| InvalidVector | VectNum incorrect | Input $M_{VectNum}$ > 3. |
| InvalidPermission | Permission not adqeuate to per form operation. | Trying to perform a Write or WriteAuth with incorrect permissions. |
| KeyAlreadyLocked | Key already locked. | Key cannot be changed because it has already been locked. |

12.2 Constants

Table 256 describes the constants referred to by functions and pseudocode.

TABLE 256

Constants

| Definition | Value |
|---|---|
| MaxKey | NumKeys − 1 (typically 7) |
| MaxM | NumVectors − 1 (typically 3) |
| MaxWordInM | 16 − 1 = 15 |

13 GetInfo

Input: None

Output: ResultFlag, SoftwareReleaseIdMajor, SoftwareReleaseIdMinor, NumVec tors, NumKeys,ChipId DepthOfRollBackCache (for an upgrade device only)

Changes : None 13.1 Function Description

Users of QA Devices must call the GetInfo function on each QA Device before calling any other functions on that device.

The GetInfo function tells the caller what kind of QA Device this is, what functions are available and what properties this QA Device has. The caller can use this information to correctly call functions with appropriately formatted parameters.

The first value returned, SoftwareReleaseIdMajor, effectively identifies what kind of QA Device this is, and therefore what functions are available to callers. SoftwareReleaseIdMinor tells the caller which version of the specific type of QA Device this is. The mapping between the SoftwareReleaseIdMajor and type of device and their different functions is described in Table 258 Every QA Device also returns NumVectors, NumKeys and ChipId which are required to set input parameter values for commands to the device.

Additional information may be returned depending on the type of QA Device. The VarDataLen and VarData fields of the output hold this additional information.

13.2 Output parameters

Table 257 describes each of the output parameters.

TABLE 257

Description of output parameters for GetInfo function

| Parameter | # bytes | Description |
|---|---|---|
| ResultFlag | | Indicates whether the function completed successfully or not. If it did not complete successfully, the reason for the failure is returned here. See Section 12.1. |
| SoftwareReleaseIdMajor | 1 | This defines the function set that is available on this QA Device. |
| SoftwareReleaseIdMinor | 1 | This defines minor software releases within a major release, and are incremental changes to the software mainly to deal with bug fixes. |
| NumVectors | 1 | Total number of memory vectors in this QA Device. |
| NumKeys | 1 | Total number of keys in this QA Device. |
| ChipId | 6 | This QA Device's ChipId |
| VarDataLen | 1 | Length of bytes to follow. |
| VarData | (VarDataLen bytes) | This is additional application specific data, and will be of length VarDataLen (i.e. may be 0). |

Table 258 shows the mapping between the SoftwareReleaseIdMajor, the type of QA Device and the available device functions.

TABLE 258

Mapping between SoftwareReleaseIdMajor and available device functions

| Software ReleaseId Major | Device description | Functions available |
|---|---|---|
| 1 | Ink or Printer QA Device | GetInfo<br>Random<br>Read<br>Test<br>Translate<br>WriteM1+<br>WriteFields<br>WriteFieldsAuth<br>SetPerm<br>ReplaceKey |
| 2 | Value Upgrader QA Device (e.g. Ink Refill QA Device) | All functions in the Ink or Printer Device, plus:<br>StartXfer<br>XferAmount<br>StartRollBack<br>RollBackAmount |
| 3 | Parameter Upgrader QA Device | All functions in the Ink or Printer device, plus:<br>StartXfer<br>XferField<br>StartRollBack<br>RollBackField |
| 4 | Key Replacement device | All functions in the Ink or Printer Device, plus:<br>GetProgramKey<br>ReplaceKey - is different from the Ink or Printer device |
| 5 | Trusted device | All functions in the Ink or Printer Device, plus:<br>SignM |

Table 259 shows the VarData components for Value Upgrader and Parameter Upgrader QA Devices.

TABLE 259

VarData for Value and Parameter Upgrader QA Devices

| VarData Components | Length in bytes | Description |
|---|---|---|
| DepthOfRollBackCache | 1 | The number of datasets that can be accommodated in the Xfer Entry cache of the device. |

13.3 Function Sequence

The GetInfo command is illustrated by the following pseudocode:

```
Output SoftwareReleaseIdMajor
Output SoftwareReleaseIdMinor
Output NumVectors
Output NumKeys
Output ChipId
VarDataLen←1 # In case of an upgrade device
Output DepthOfRollBackCache
Return
```

14 Random

Input: None

Output: $R_L$

Changes: None

Availability: All devices

The Random command is used by the caller to obtain a session component (challenge) for use in subsequent signature generation.

If a caller calls the Random function multiple times, the same output will be returned each time. $R_L$ (i.e. this QA Device's R) will only advance to the next random number in the sequence after a successful test of a signature or after producing a new signature. The same $R_L$ can never be used to produce two signatures from the same QA Device.

The Random command is illustrated by the following pseudocode:

```
Output R_L
Return
```

15 Read

Input: KeyRef, SigOnly, MSelect, KeyIdSelect, WordSelect, $R_E$

Output: ResultFlag, SelectedWordsOfSelectedMs, SelectedKeyIds, $R_L$, $SIG_{out}$ Changes: $R_L$ Availability: All devices 15.1 Function Description The Read command is used to read data and keyIds from a QA Device. The caller can specify which words from M and which KeyIds are read.

The Read command can return both data and signature, or just the signature of the requested data.

Since the return of data is based on the caller's input request, it prevents unnecessary information from being sent back to the caller. Callers typically request only the signature in order to confirm that locally cached values match the values on the QA Device.

The data read from an untrusted QA Device (A) using a Read command is validated by a trusted QA Device (B) using the Test command. The $R_L$ and $SIG_{out}$ produced as output from the Read command are input (along with correctly formatted data) to the Test command on a trusted QA Device for validation of the signature and hence the data. $SIG_{out}$ can also optionally be passed through the Translate command on a number of QA Devices between Read and Test if the QA Devices A and B do not share keys.

15.2 Input Parameters

TABLE 260

Description of input parameters for Read

| Parameter | Description |
|---|---|
| KeyRef | For common key signature generation: KeyRef.keyNum = Slot number of the key to be used for producing the output signature. KeyRef.useChipId = 0 No variant key signature generation required |
| SigOnly | Flag indicating return of signature and data. 0- indicates both the signature and data are to be returned. 1- indicates only the signature is to be returned. |
| Mselect | Selection of memory vectors to be read - each bit corresponding to a given memory vec tor (a maximum of NumVector bits) 0- indicates the memory vector must not be read. 1- indicates memory vector must be read. |
| KeyIdSelect | Selection of KeyIds to be read - each bit corresponds to a given KeyId (a maximum of NumKey bits). 0- indicates KeyId must not be read. 1- indicates KeyId must be read. |
| WordSelect | Selection of words read from a desired M as requested in MSelect. Each WordSelect is 16 bits corresponding to each bit in MSelect. Each bit in the WordSelect indicates whether or not to read the corresponding word for the particular M. 0- indicates word must not be read. 1- indicates word must be read. |
| $R_E$ | External random value required for output signature generation (i.e the challenge). $R_E$ is obtained by calling the Random function on the device which will receive the $SIG_{out}$ from the Read function. |

15.3 Output Parameters

Figure 370:
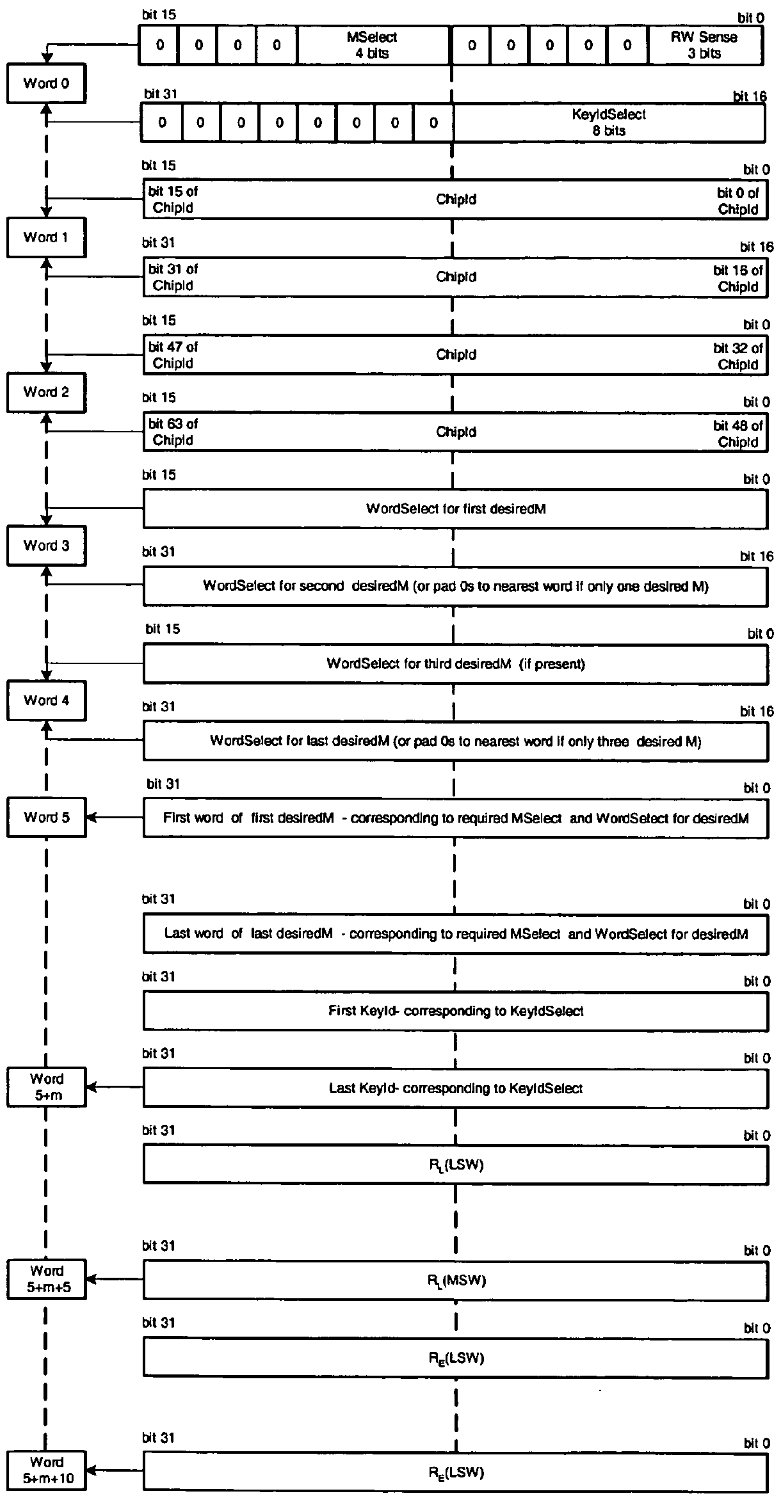
FIG. 370 shows an output signature generation data format for Read

| Parameter | Description |
|---|---|
| ResultFlag | Indicates whether the function completed successfully or not. If it did not complete successfully, the reason for the failure is returned here. See Section 12.1. |
| SelectedWordsOfSelectedMs | Selected words from selected memory vectors as requested by MSelect and WordSelect. |
| SelectedKeyIds | Selected KeyIds as requested by KeyIdSelect. |
| $R_L$ | Local random value added to the output signature (i.e $SIG_{out}$). Refer to FIG. 370. |
| $SIG_{out}$ | $SIG_{out} = SIG_{KeyRef}(data \mid R_L \mid R_E)$ as shown in FIG. 8. Refer to Section 10.1.3.1 for details. |

15.3.1 $SIG_{out}$

FIG. 370 shows the formatting of data for output signature generation.

| Parameter | Length in bits | Value set internally | Value set from Input |
|---|---|---|---|
| RWSense | 3 | read constant = 000 Refer to Section 15.3.1.1 | |
| MSelect | 4 | | ● |
| KeyIdSelect | 8 | | ● |
| ChipId | 48 | This QA Device's ChipId | |
| WordSelect | 16 per M | | ● |
| Selected WordsOf SelectedMs | 32 per word | The appropriate words from the various Ms as selected by the caller | ● |
| $R_L$ | 160 | This QA Device's current R | |
| $R_E$ | 160 | | ● |

15.3.1.1 RWSense

An RWSense value is present in the signed data to distinguish whether a signature was produced from a Read or produced for a WriteAuth.

The RWSense is set to a read constant (000) for producing a signature from a read function. The RWSense is set to a write constant (001) for producing a signature for a write function.

The RWSense prevents signatures produced by Read to be subsequently sent into a WriteAuth function. Only signatures produced with RWSense set to write (001), are accepted by a write function.

15.4 Function sequence

The Read command is illustrated by the following pseudocode:

```
Accept input parameters- KeyRef, SigOnly, MSelect, KeyIdSelect
# Accept input parameter WordSelect based on MSelect
For i ←0 to MaxM
    If(MSelect[i] = 1)
        Accept next WordSelect
        WordSelectTemp[i] ←WordSelect
    EndIf
EndFor
Accept RE
Check range of KeyRef.keyNum
If invalid
    ResultFlag ←InvalidKey
    Output ResultFlag
```

-continued

```
    Return
EndIf
#Build SelectedWordsOfSelectedMs
k ←0 # k stores the word count for SelectedWordsOfSelectedMs
SelectedWordsOfSelectedMs[k] ←0
For i← 0 to 3
    If(MSelect[i] = 1)
        For j ←0 to MaxWordInM
            If(WordSelectTemp[i][j] = 1)
                SelectedWordsOfSelectedMs[k] ←(Mi[j])
                k++
            EndIf
        EndFor
    EndIf
EndFor
#Build SelectedKeyIds
l ←0 # l stores the word count for SelectedKeyIds
SelectedKeyIds[l] ←0
For i ←0 to MaxKey
    If(KeyIdSelect[i] = 1)
        SelectedKeyIds[l] ←KeyId[i]
        l++
    EndIf
EndFor
#Generate message for passing into the GenerateSignature function
data ←(RWSense|MSelect|KeyIdSelect|ChipId|WordSelect
            |SelectWordsOfSelectedMs|SelectedKeyIds)
            # Refer to
FIG. 370.
#Generate Signature function
SIGL ←GenerateSignature(KeyRef,data,RL,RE) # See Section 11.1
Update RL to RL2
ResultFlag ←Pass
Output ResultFlag
If(SigOnly = 0)
    Output SelectedWordsOfSelectedMs, SelectedKeyIds
EndIf
Output RL, SIGL
Return
```

16 Test

Input: KeyRef, DataLength, Data, $R_E$,$SIG_E$

Output: ResultFlag

Changes: $R_L$

Availability: All devices except ink device

16.1 Function Description

The Test command is used to validate data that has been read from an untrusted QA Device according to a digital signature $SIG_E$. The data will typically be memory vector and KeyId data. $SIG_E$ (and its related $R_E$) is the most recent signature—this will be the signature produced by Read if Translate was not used, or will be the output from the most recent Translate if Translate was used. The Test function produces a local signature ($SIG_L=SIG_{key}(Data|R_E|R_L)$ and compares it to the input signature ($SIG_E$). If the two signatures match the function returns 'Pass', and the caller knows that the data read can be trusted.

The key used to produce $SIG_L$ depends on whether $SIG_E$ was produced by a QA Device sharing a common key or a variant key. The KeyRef object passed into the interface must be set appropriately to reflect this.

Figure 371:
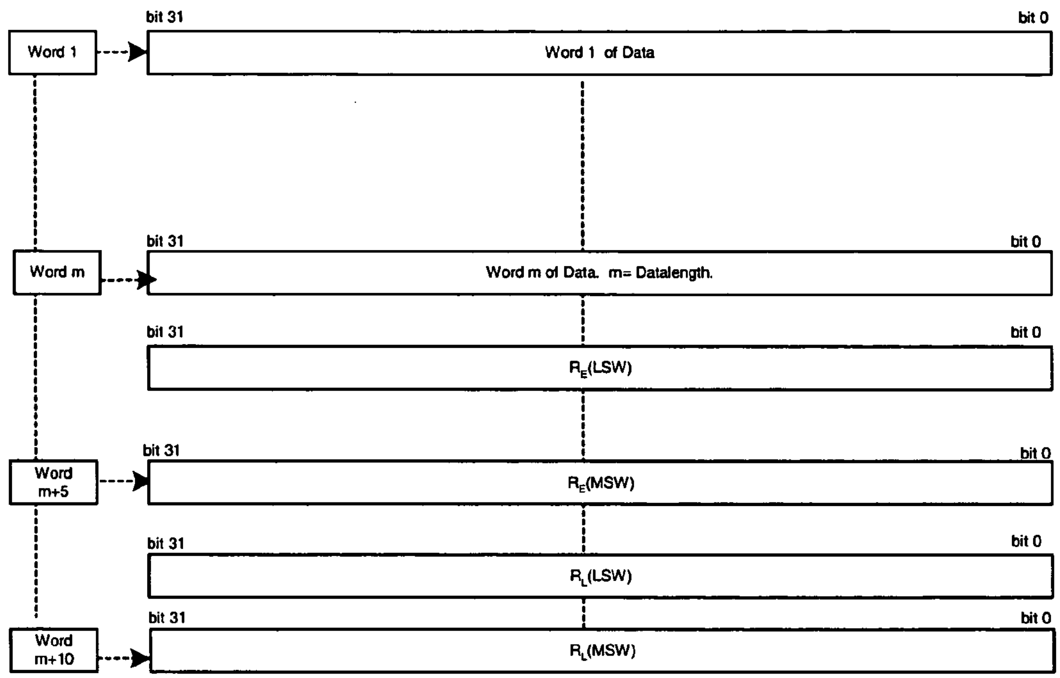
FIG. 371 shows an input signature verification data format for Test

The Test function accepts preformatted data (as DataLength number of words), and appends the external $R_E$ and local $R_L$ to the preformatted data to generate the signature as shown in FIG. 371.

16.2 Input Parameters

Table 263 describes each of the input parameters.

TABLE 263

Description of input parameters for Test

| Parameter | Description |
| --- | --- |
| KeyRef | For testing common key signature: KeyRef.keyNum = Slot number of the key to be used for testing the signature. $SIG_E$ produced using $K_{KeyRef.keyNum}$ by the external device. KeyRef.useChipId = 0<br>For testing variant key signature: KeyRef.keyNum = Slot number of the key to be used for generating the variant key. $SIG_E$ produced using a variant of $K_{KeyRef.keyNum}$ by the external device.<br>KeyRef.useChipId = 1 KeyRef.chipId = ChipId of the device which generated $SIG_E$ using a variant of $K_{KeyRef.keyNum}$. |
| DataLength | Length of preformatted data in words. Must be non zero. |
| Data | Preformatted data to be used for producing the signature. |
| $R_E$ | External random value required for verifying the input signature. This will be the R from the input signature generator (i.e the device generating $SIG_E$). |
| $SIG_E$ | External signature required for authenticating input data as shown in FIG. 371.<br>The external signature is generated either by a Read function or a Translate function. A correct $SIG_E = SIG_{KeyRef}(Data \| R_E \| R_L)$. |

16.2.1 Input Signature Verification Data Format

FIG. 371 shows the formatting of data for input signature verification.

The data in FIG. 371 (i.e. not $R_E$ or $R_L$) is typically output from a Read function (formatted as per FIG. 370). The data may also be generated in the same format by the system from its cache as will be the case when it performs a Read using SigOnly=1.

16.3 Output Parameters

Table 264 describes each of the output parameters.

TABLE 264

Description of output parameters for Test

| Parameter | Description |
| --- | --- |
| ResultFlag | Indicates whether the function completed successfully or not. If it did not complete successfully, the reason for the failure is returned here.<br>See Section 12.1. |

16.4 Function Sequence

The Test command is illustrated by the following pseudocode:

```
Accept input parameters-KeyRef, DataLength
# Accept input parameter- Data based on DataLength
For i ←0 to (DataLength − 1)
    Accept next word of Data
EndFor
Accept input parameters - RE, SIGE
Check range of KeyRef.keyNum
If invalid
    ResultFlag ←InvalidKey
    Output ResultFlag
    Return
EndIf
#Generate signature
SIGL ←GenerateSignature(KeyRef,Data,RE,RL) # Refer to FIG. 371.
```

-continued

```
#Check signature
If(SIG_L = SIG_E)
    Update R_L to R_L2
    ResultFlag ←Pass
Else
    ResultFlag ←BadSig
EndIf
Output ResultFlag
Return
```

17 Translate

Input: InputKeyRef, DataLength, Data, $R_E$, $SIG_E$, OutputKeyRef, $R_{E2}$

Output: ResultFlag, $R_{L2}$, $SIG_{out}$

Changes: $R_L$

Availability: Printer device, and possibly on other devices 17.1 Function Description It is possible for a system to call the Read function on QA Device A to obtain data and signature, and then call the Test function on QA Device B to validate the data and signature. In the same way it is possible for a system to call the SignM function on a trusted QA Device B and then call the WriteAuth function on QA Device B to actually store data on B. Both of these actions are only possible when QA Devices A and B share secret key information.

If however, A and B do not share secret keys, we can create a validation chain (and hence extension of trust) by means of translation of signatures. A given QA Device can only translate signatures if it knows the key of the previous stage in the chain as well as the key of the next stage in the chain. The Translate function provides this functionality.

The Translate function translates a signature from one based on one key to one based another key. The Translate function first performs a test of the input signature using the InputKeyRef, and if the test succeeds produces an output signature using the OutputKeyRef. The Translate function can therefore in some ways be considered to be a combination of the Test and Read function, except that the data is input into the QA Device instead of being read from it.

The InputKeyRef object passed into Translate must be set appropriately to reflect whether $SIG_E$ was produced by a QA Device sharing a common key or a variant key.

The key used to produce output signature $SIG_{out}$ depends on whether the translating device shares a common key or a variant key with the QA Device receiving the signature. The OutputKeyRef object passed into Translate must be set appropriately to reflect this.

Since the Translate function does not interpret or generate the data in any way, only preformatted data can be passed in. The Translate function does however append the external $R_E$ and local $R_L$ to the preformatted data for verifying the input signature, then advances $R_L$ to $R_{L2}$, and appends $R_{L2}$ and $R_{E2}$ to the preformatted data to produce the output signature. This is done to protect the keys and prevent replay attacks.

The Translate Functions Translates:

- signatures for subsequent use in Test, typically originating from Read
- signatures for subsequent use in WriteAuth, typically originating from SignM In both cases, preformatted data is passed into the Translate function by the system. For translation of data destined for Test, the data should be preformatted as per FIG. 370 (all words except the Rs). For translation of signatures for use in WriteAuth, the data should be preformatted as per FIG. 373 (all words except the Rs).

17.2 Input Parameters

Table 265 describes each of the input parameters.

TABLE 265

Description of input parameters for Translate

| Parameter | Description |
|---|---|
| InputKeyRef | For translating common key input signature: InputKeyRef.keyNum = Slot number of the key to be used for testing the signature. $SIG_E$ produced using $K_{InputKeyRef.keyNum}$ by the external device. InputKeyRef.useChipId = 0<br>For translating variant key input signatures: InputKeyRef.keyNum = Slot number of the key to be used for generating the variant key. $SIG_E$ produced using a variant of $K_{InputKeyRef.keyNum}$ by the external device. InputKeyRef.useChipId = 1<br>InputKeyRef.chipId = ChipId of the device which generated $SIG_E$ using a variant of $K_{InputKeyRef.keyNum}$. |
| DataLength: | Length of data in words. |
| Data | Data used for testing the input signature and for producing the output signature. |
| $R_E$ | External random value required for verifying input signature. This will be the R from the input signature generator (i.e device generating $SIG_E$). |
| $SIG_E$ | External signature required for authenticating input data. The external signature is either generated by a Read function, a Xfer/Rollback function or a Translate function. A correct $SIG_E$ = $SIG_{KeyRef}(Data \mid R_E \mid R_L)$. |
| OutputKeyRef | For generating common key output signature: OutputKeyRef.keyNum = Slot number of the key for producing the output signature. SIGout produced using $K_{OutputKeyRef.keyNum}$ because the device receiving SIGout shares $K_{OutputKeyRef.keyNum}$ with the translating device. OutputKeyRef.useChipId = 0<br>For generating variant key output signature: OutputKeyRef.keyNum = Slot number of the key to be used for generating the variant key. SIGout produced using a variant of $K_{OutputKeyRef.keyNum}$ because the device receiving SIGout shares a variant of $K_{OutputKeyRef.keyNum}$ with the translating device. OutputKeyRef.useChipId = 1<br>OutputKeyRef.chipId = ChipId of the device which receives $SIG_{out}$ produced by a variant of $K_{OutputKeyRef.keyNum}$. |
| $R_{E2}$ | External random value required for output signature generation. This will be the R from the destination of $SIG_{out}$. $R_{E2}$ is obtained by calling the Random function on the device which will receive the $SIG_{out}$ from the Translate function. |

17.2.1 Input Signature Verification Data Format

This is the same format as used in the Test function. Refer to Section 16.2.1.

17.3 Output parameters

Table 266 describes each of the output parameters.

TABLE 266

Description of output parameters for Translate

| Parameter | Description |
|---|---|
| ResultFlag | Indicates whether the function completed successfully or not. If it did not complete successfully, the reason for the failure is returned here. See Section 12.1. |
| $R_{L2}$ | Local random value used in output signature (i.e $SIG_{Out}$). |
| $SIG_{Out}$ | Output signature produced using OutputKeyRef.keyNum using the data format described in FIG. 372. $SIG_{Out}$ = $SIG_{OutKeyRef}(Data \mid R_{L2} \mid R_{E2})$. Refer to Section 10.1.3.1 for details. |

17.3.1 $SIG_{out}$

Figure 372:
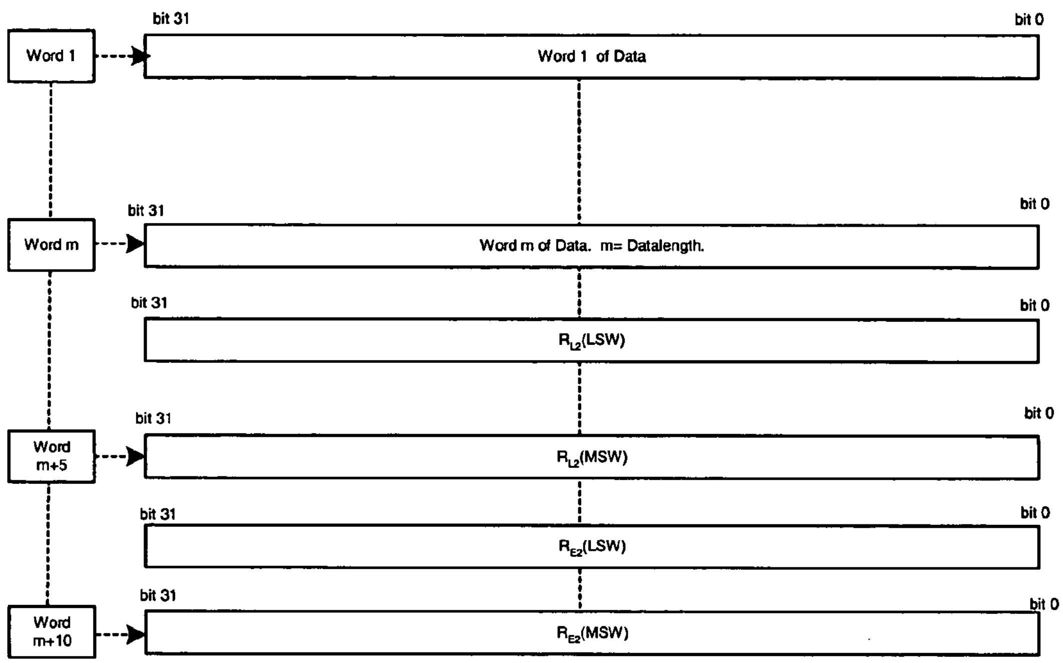
FIG. 372 shows an output signature generation data format for Translate

FIG. 372 shows the data format for output signature generation from the Translate function.

17.4 Function Sequence

The Translate command is illustrated by the following pseudocode:

```
Accept input parameters-InputKeyRef, DataLength
# Accept input parameter- Data based on DataLength
For i ←0 to (DataLength − 1)
    Accept next Data
EndFor
Accept input parameters - R_E, SIG_E,OutputKeyRef, R_E2
Check range of InputKeyref.keyNum and OutputKeyRef.keyNum
If invalid
    ResultFlag ←Invalidkey
    Output ResultFlag
    Return
EndIf
#Generate Signature
SIG_L ←GenerateSignature(InputKeyRef,Data,R_E,R_L) # Refer to FIG.
371.
#Validate input signature
If(SIG_L = SIG_E)
    Update R_L to R_L2
Else
    ResultFlag ←BadSig
    Output ResultFlag
    Return
EndIf
#Generate output signature
SIG_Out ←GenerateSignature(OutputKeyRef,Data,R_E,R_L) # Refer to
FIG. 372.
Update R_L2 R_L3
ResultFlag ←Pass
Output ResultFlag, R_L2, SIG_Out
Return
```

18 WriteM1+

Input: VectNum, WordSelect, MVal

Output ResultFlag

Changes: $M_{VectNum}$

Availability: All devices 18.1 Function description

The WriteM1+ function is used to update selected words of M1+, subject to the permissions corresponding to those words stored in $P_{VectNum}$.

Note: Unlike WriteAuth, a signature is not required as an input to this function.

18.2 Input Parameters

Table 267 describes each of the input parameters.

TABLE 267

Description of input parameters for WriteM1+

| Parameter | Description |
|---|---|
| VectNum | Number of the memory vector to be written. Must be in range 1 to (NumVectors −1) |
| WordSelect | Selection of words to be written. 0- indicates corresponding word is not written. 1- indicates corresponding word is to be written as per input. If WordSelect[N bit] is set, then write to $M_{VectNum}$ word N. |
| MVal | Multiple of words corresponding to the number of words selected for write. Starts with LSW of $M_{VectNum}$. |

Note: Since this function has no accompanying signatures, additional input parameter error checking is required.

18.3 Output Parameters

Table 268 describes each of the output parameters.

TABLE 268

Description of output parameters for WriteM1+

| Parameter | Description |
|---|---|
| ResultFlag | Indicates whether the function completed successfully or not. If it did not complete successfully, the reason for the failure is returned here. See Section 12.1. |

18.4 Function Sequence

The WriteM1+ command is illustrated by the following pseudocode:

```
Accept input parameters VectNum, WordSelect
#Accept MVal as per WordSelect
MValTemp[16] ←0 # Temporary buffer to hold MVal after being read
For i ←0 to MaxWordInM # word 0 to word 15
    If(WordSelect[i] = 1)
        Accept next MVal
        MValTemp [i] ←MVal # Store MVal in temporary buffer
    EndIf
EndFor
Check range of VectNum
If invalid
    ResultFlag ←InvalidVector
    Output ResultFlag
    Return
EndIf
#Checking non authenticated write permission for M1+
PermOK ←CheckM1+Perm(VectNum,WordSelect)
Writing M with MVal
If(PermOK =1)
    WriteM(VectNum,MValTemp[ ])
    ResultFlag ←Pass
Else
    ResultFlag ←InvalidPermission
EndIf
Output ResultFlag
Return
```

18.4.1 PermOK CheckM1+Perm (VectNum, WordSelect)

This function checks WordSelect against permission $P_{VectNum}$ for the selected word

```
    For i ←0 to MaxWordInM # word 0 to word 15
        If(WordSelect[i] = 1) ∧(P_VectNum[i] = 0) # Trying to write a
    ReadOnly word
            Return PermOK← 0
        EndIf
    EndFor
    Return PermOK← 1
```

18.4.2 WriteM(VectNum, MValTemp[])

This function copies MvalTemp to $M_{VectNum}$.

```
For i ←0 to MaxWordInM # Copying word from temp buff to M
        If(VectNum = 1) # If M1
            P_VectNum[i]← 0 # Set permission to ReadOnly before writ-
            ing
        EndIf
        M_VectNum[i] ← MValTemp[i]              # copy word
buffer to M word
    EndIf
EndFor
```

19 WriteFields

Input FieldSelect, FieldVal

Output: ResultFlag

Changes: $M_{VectNum}$

Availability: All devices 19.1 Function Description

The WriteFields function is used to write new data to selected fields (stored in M0). The write is carried out subject to the non-authenticated write access permissions of the fields as stored in the appropriate words of M1 (see Section 8.1.1.3).

The WriteFields function is used whenever authorization for a write (i.e. a valid signature) is not required. The WriteFieldsAuth function is used to perform authenticated writes to fields. For example, decrementing the amount of ink in an ink cartridge field is permitted by anyone via the WriteFields, but incrementing it during a refill operation is only permitted using WriteFieldsAuth. Therefore WriteFields does not require a signature as one of its inputs.

19.2 Input Parameters

Table 269 describes each of the input parameters.

TABLE 269

Description of input parameters for WriteFields

| Parameter | Description |
|---|---|
| FieldSelect | Selection of fields to be written.<br>0- indicates corresponding field is not written.<br>1- indicates corresponding field is to be written as per input.<br>If FieldSelect [N bit] is set, then write to Field N of M0. |
| FieldVal | Multiple of words corresponding to the words for all selected fields. Since Field0 starts at M0[15], FieldVal words starts with MSW of lower field. |

19.3 Output Parameters

Table 270 describes each of the output parameters.

TABLE 270

Description of output parameters for WriteFields

| Parameter | Description |
|---|---|
| ResultFlag | Indicates whether the function completed successfully or not. If it did not complete successfully, the reason for the failure is returned here. See Section 12.1. |

19.4 Function Sequence

The WriteFields command is illustrated by the following pseudocode:

```
Accept input parameters FieldSelect
#Accept FieldVal as per FieldSelect into a temporary buffer
MValTemp
#Find the size of each FieldNum to accept FieldData
FieldSize[16] ←0 # Array to hold FieldSize assuming there are 16
fields
NumFields← FindNumberOfFieldsInM0 (M1,FieldSize)
MValTemp[16] ←0 # Temporary buffer to hold FieldVal after being
read
For i ←0 to NumFields
    If FieldSelect[i] = 1
        If i = 0 # Check if field number is 0
            PreviousFieldEndPos ←MaxWordInM
        Else
            PreviousFieldEndPos ←M1[i−1].EndPos # position of the
            last
word for the
```

-continued

```
                          # previous
field
        EndIf
        For j ←(PreviousFieldEndPos −1) to M1[FieldNum].EndPos ( )
            MValTemp[j] = Next FieldVal word #Store FieldVal in
MValTemp.
        EndFor
    EndIf
EndFor
#Check non-authenticated write permissions for all fields in
FieldSelect
PermOK ←CheckM0NonAuthPerm(FieldSelect,MValTemp,M0,M1)
#Writing M0 with MValTemp if permissions allow writing
If(PermOK =1)
    WriteM(0,MValTemp)
    ResultFlag ←Pass
Else
    ResultFlag ←InvalidPermission
EndIf
Output ResultFlag
Return
```

19.4.1 NumFields FindNumOfFieldsInM0 (M1,FieldSize[ ])

This function returns the number of fields in M0 and an array FieldSize which stores the size of each field.

```
CurrPos ←0
NumFields ←0
FieldSize[16] ←0 # Array storing field sizes
For FieldNum ←0 to MaxWordInM
    If(CurrPos = 0) # check if last field has reached
        Return FieldNum #FieldNum indicates number of fields in M0
    EndIf
    FieldSizeFieldNum]← CurrPos − M1[FieldNum].EndPos
    If(FieldSize[FieldNum] < 0)
        Error # Integrity problem with field attributes
        Return FieldNum # Lower M0 fields are still valid but higher
M0 fields are
                    # ignored
    Else
        CurrPos← M1 [FieldNum].EndPos
    EndIf
EndFor
```

19.4.2 Word BitMapForField GetWordMapForField (FieldNum,M1)

This function returns the word bitmap corresponding to a field i.e the field consists of which consecutive words.

```
WordBitMapForField← 0
WordMapTemp ←0
PreviousFieldEndPos ←M1[FieldNum −1].EndPos # position of the
last word for the
                          # previous
field
For j ←(PreviousFieldEndPos +1) to M1[FieldNum].EndPos( )
    # Set bit corresponding to the word position
    WordMapTemp ←SHIFTLEFT (1,j)
    WordBitMapForField ←WordMapTemp ∨WordBitMapForField
EndFor
Return WordBitMapForField
```

19.4.3 PermOK CheckM0 NonAuthPerm(FieldSelect,MValTemp[ ],M0,M1)

This functions checks non-authenticated write permissions for all fields in FieldSelect.

```
PermOK CheckM0NonAuthPerm( )
FieldSize[16] ←0
NumFields ←FindNumOfFieldsInM0(FieldSize)
# Loop through all fields in FieldSelect and check their
# non-authenticated permission
For i ←0 to NumFields
    If FieldSelect[i] = 1 # check selected
        WordBitMapForField← GetWordMapForField(i,M1) #get word
bitmap for field
        PermOK
←CheckFieldNonAuthPerm(i,WordBitMapForField,MValTemp,M0,)
                    # Check permission for field i in
FieldSelect
        If(PermOK = 0)        #Writing is not allowed, return if
permissions for field
                # doesn't allow writing
            Return PermOK
        EndIf
    EndIf
EndFor
Return PermOK
```

19.4.4 PermOK CheckFieldNonAuthPerm(FieldNum,WordBitMapForField, MValTemp[ ], M0)

This function checks non authenticated write permissions for the field.

```
DecrementOnly ←0
AuthRW ←M1[FieldNum].AuthRW
NonAuthRW ←M1[FieldNum].AuthRW
If(NonAuthRW = 0) # No NonAuth write allowed
    Return PermOK← 0
EndIf
If((AuthRW = 0) ∧(NonAuthRW = 1))# NonAuthRW allowed
    Return PermOK←1
ElseIf(AuthRW = 1) ∧(NonAuthRW = 1)# NonAuth
DecrementOnly
allowed
    PermOK
←CheckInputDataForDecrementOnly(M0,MValTemp,WordBitMapForField)
    Return PermOK
EndIf
```

19.4.5 PermOK CheckInputDataForDecrementOnly(M0, MValTemp[ ],WordBitMapForField)

This function checks the data to be written to the field is less than the current value.

```
DecEncountered ←0
LessThanFlag ←0
EqualToFlag ←0
For i = MaxWordInM to 0
    If(WordBitMapForField[i] = 1) # starting word of
    the field -
starting at MSW
    # comparing the word of temp buffer with M0 current
    value
    LessThanFlag ←M0[i] < MValTemp[i]
    EqualToFlag← M0[i] = MValTemp[i]
    # current value is less or previous value has been
    decremented
    If(LessThanFlag =1) ∨(DecEncountered = 1)
        DecEncountered ←1
        PermOK← 1
        Return PermOK
    ElseIf(EqualToFlag≠1)  # Only if the value is greater than
current and decrement not encountered in previous words
```

-continued

```
            PermOK← 0
            Return PermOK
        EndIf
    EndIf
EndFor
```

19.4.6 WriteM(VectNum, MValTemp[ ])

Refer to Section 18.4.2 for details.

20 WriteFieldsAuth

Input: KeyRef, FieldSelect, FieldVal, $R_E$, $SIG_E$

Output: ResultFlag

Changes: $_{M0}$ and $R_L$

Availability: All devices

20.1 Function Description

The WriteFieldsAuth command is used to securely update a number of fields (in $_{M0}$). The write is carried out subject to the authenticated write access permissions of the fields as stored in the appropriate words of M1 (see Section 8.1.1.3). WriteFieldsAuth will either update all of the requested fields or none of them; the write only succeeds when all of the requested fields can be written to.

The WriteFieldsAuth function requires the data to be accompanied by an appropriate signature based on a key that has appropriate write permissions to the field, and the signature must also include the local R (i.e. nonce/challenge) as previously read from this QA Device via the Random function.

The appropriate signature can only be produced by knowing $K_{KeyRef}$. This can be achieved by a call to an appropriate command on a QA Device that holds a key matching $K_{KeyRef}$. Appropriate commands include SignM, XferAmount, XferField, StartXfer, and StartRollBack.

20.2 Input Parameters

Table 271 describes each of the input parameters for WriteAuth.

| Parameter | Description |
|---|---|
| KeyRef | For common key signature generation:<br>KeyRef.keyNum = Slot number of the key to be used for testing the input signature.<br>KeyRef.useChipId = 0<br>No variant key signature generation required |
| FieldSelect | Selection of fields to be written.<br>0- indicates corresponding field is not written. |

-continued

| Parameter | Description |
|---|---|
| | 1- indicates corresponding field is to be written as per input. If FieldSelect [N bit] is set, then write to Field N of M0. |
| FieldVal | Multiple of words corresponding to the total number of words for all selected fields. Since Field0 starts at M0[15], FieldVal words starts with MSW of lower field. |
| RE | External random value used to verify input signature. This will be the R from the input signature generator (i.e device generating $SIG_E$). |
| SIGE | External signature required for authenticating input data. The external signature is either generated by a Translate or one of the Xfer functions. A correct $SIG_E$ = $SIG_{KeyRef}(data \mid R_E \mid R_L)$. |

20.2.1 Input Signature Verification Data Format

Figure 373:
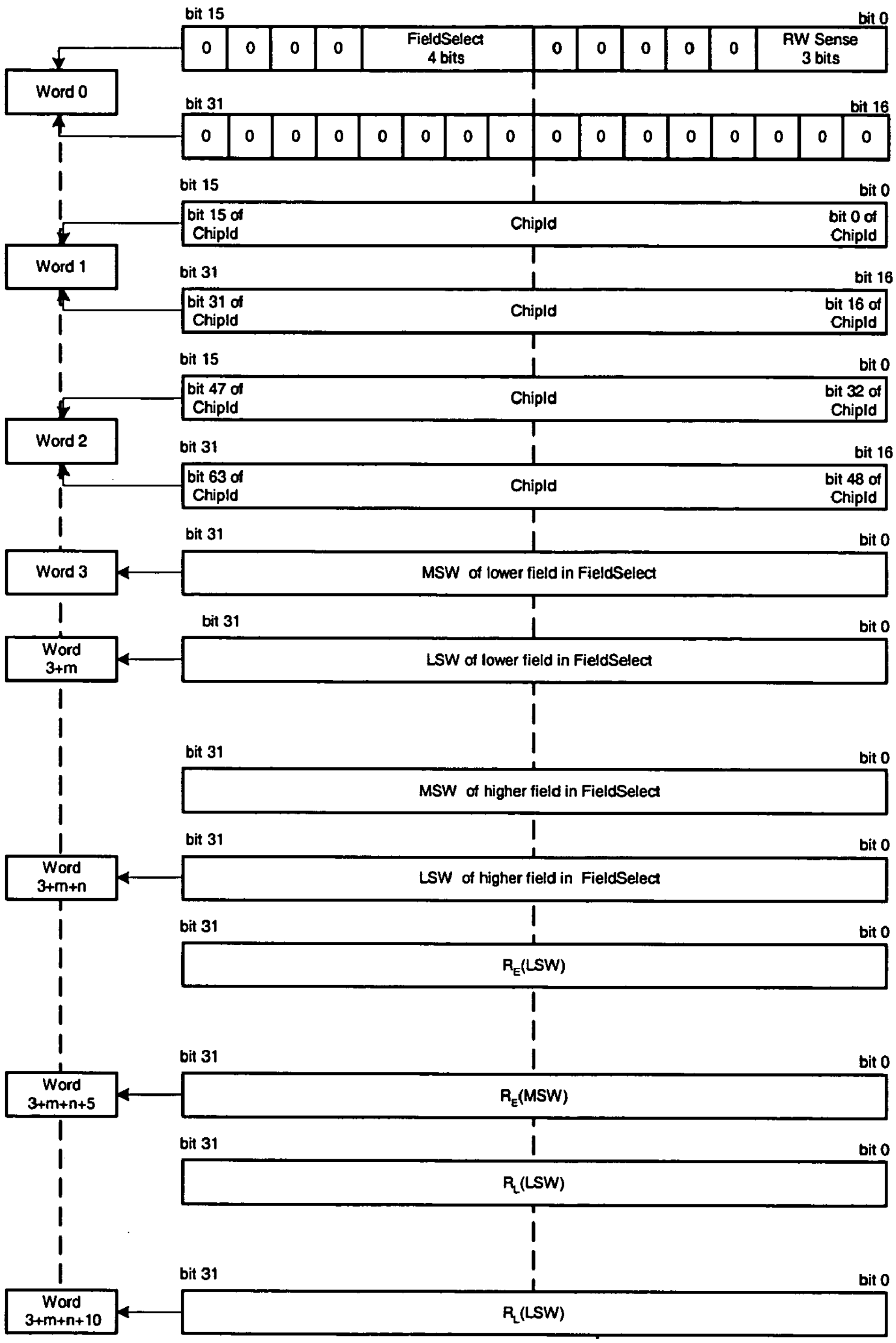
FIG. 373 shows an input signature verification data format for WriteAuth

FIG. 373 shows the input signature verification data format for the WriteAuth function.

| Parameter | Length in bits | Value set internally | Value set from Input |
|---|---|---|---|
| RWSense | 3 | write constant = 001 Refer to Section 15.3.1.1 | |
| FieldNum | 4 | | ● |
| ChipID | 48 | This QA Device's ChipId | |
| FieldData | 32 per word | | ● |
| $R_E$ | 160 | | ● |
| $R_L$ | 160 | random value from device | |

20.3 Output Parameters

Table 273 describes each of the output parameters.

TABLE 273

Description of output parameters for WriteAuth

| Parameter | Description |
|---|---|
| ResultFlag | Indicates whether the function completed successfully or not. If it did not complete successfully, the reason for the failure is returned here. See Section 12.1. |

20.4 Function Sequence

The WriteAuth command is illustrated by the following pseudocode:

```
Accept input parameters-KeyRef, FieldSelect,
#Accept FieldVal as per FieldSelect into a temporary buffer
MValTemp
#Find the size of each FieldNum to accept FieldData
FieldSize[16] ←0 # Array to hold FieldSize assuming there are 16
fields
NumFields← FindNumberOfFieldsInM0 (M1,FieldSize)
MValTemp[16] ←0 # Temporary buffer to hold FieldVal after being
read
For i ←0 to NumFields
     If i = 0 # Check if field number is 0
          PreviousFieldEndPos ←MaxWordInM
     Else
          PreviousFieldEndPos ←M1[i−1].EndPos # position of the last
word for the previous field
     EndIf
     For j ←(PreviousFieldEndPos −1) to M1[FieldNum].EndPos ( )
          MValTemp[j] = Next FieldVal word #Store FieldVal
          in MValTemp.
     EndFor
     EndIf
EndFor
Accept RE, SIGE
Check range of KeyRef.keyNum
If invalid range
     ResultFlag ←InvalidKey
     Output ResultFlag
     Return
EndIf
#Generate message for passing to GenerateSignature function
data ←(RWSense|FieldSelect|ChipId|FieldVal
#Generate Signature
SIGL ←GenerateSignature(KeyRef,data,RE,RL) # Refer to Figure 373.
#Check signature
If(SIGL = SIGE)
     Update RL to RL2
Else
     ResultFlag ←BadSig
     Output ResultFlag
     Return
EndIf
#Check authenticated write permission for all fields in
FieldSelect using KeyRef
PermOK← CheckM0AuthPerm(FieldSelect,MValTemp,M0,M1,KeyRef)
If(PermOK = 1)
     WriteM(0,MValTemp[ ])# Copy temp buffer to M0
     ResultFlag ←Pass
Else
     ResultFlag ←InvalidPermission
EndIf
Output ResultFlag
Return
```

20.4.1 PermOK CheckM0AuthPerm(FieldSelect, MValTemp[ ],M0, M1, KeyRef)

This functions checks non-authenticated write permissions for all fields in FieldSelect using KeyRef.

```
PermOK CheckM0NonAuthPerm( )
FieldSize[16] ←0
NumFields ←FindNumOfFieldsInM0(FieldSize)
# Loop through fields
For i ←0 to NumFields
     If FieldSelect[i] = 1 # check selected
          WordBitMapForField← GetWordMapForField(i,M1) #get word
bitmap for field
          PermOK ←CheckAuthFieldPerm(i,WordBitMapForField,MValTemp,M0,
KeyRef)
                    # Check permission for field i in FieldSelect
```

-continued

```
        If(PermOK = 0)          #Writing is not allowed, return if
                #permissions for field doesn't allow writing
            Return PermOK
        EndIf
    EndIf
EndFor
Return PermOK
```

20.4.2 PermOK CheckAuthFieldPerm(FieldNum, WordMapForField,MValTemp[ ], M0,KeyRef)

This function checks authenticated permissions for an M0 field using KeyRef (whether KeyRef has write permissions to the field).

```
AuthRW ← M1[FieldNum].AuthRW
KeyNumAtt ← M1[FieldNum].KeyNum
If (AuthRW = 0) # Check whether any key has write permissions
    Return PermOK←0 # No authenticated write permissions
EndIf
# Check KeyRef has ReadWrite Permission to the field and it is
locked
If(KeyLock_KeyNum = locked) ∧ (KeyNumAtt = KeyRef.keyNum)
    Return PermOK← 1
Else # KeyNum is not a ReadWrite Key
    KeyPerms ← M1[FieldNum].DOForKeys # Isolate KeyPerms for
FieldNum
    # Check Decrement Only Permission for Key
    If(KeyPerms[KeyRef.keyNum] = 1) # Key is allowed to Decrement
field
            PermOK
← CheckInputDataForDecrementOnly(M0,MValTemp,WordMapForField)
        Else                    # Key is a ReadOnly key
            PermOK←0
    EndIf
EndIf
Return PermOK
```

20.4.3 WordBitMapField GetWordMapForField(FieldNum,M1)

Refer to Section 19.4.2 for details.

20.4.4 PermOK CheckInputDataForDecrementOnly(M0, MValTemp[ ],WordMapForField)

Refer to Section 19.4.5 for details.

20.4.5 WriteM(VectNum, MValTemp[ ])

Refer to Section 18.4.2 for details.

21 SetPerm

Input: VectNum, PermVal

Output: ResultFlag, NewPerm

Changes: $P_n$

Availability: All devices

21.1 Function Description

The SetPerm command is used to update the contents of $P_{VectNum}$ (which stores the permission for $M_{VectNum}$).

The new value for $P_{VectNum}$ is a combination of the old and new permissions in such a way that the more restrictive permission for each part of $P_{VectNum}$ is kept.

M0's permissions are set by M1 therefore they can't be changed.

M1's permissions cannot be changed by SetPerm. M1 is a write-once memory vector and its permissions are set by writing to it.

See Section 8.1.1.3 and Section 8.1.1.5 for more information about permissions.

21.2 Input Parameters

Table 274 describes each of the input parameters for SetPerm.

| Parameter | Description |
|---|---|
| VectNum | Number of the memory vector whose permission is being changed. |
| PermVal | Bitmap of permission for the corresponding Memory Vector. |

Note: Since this function has no accompanying signatures, additional input parameter error checking is required.

21.3 Output Parameters

Table 275 describes each of the input parameters for SetPerm.

| Parameter | Description |
|---|---|
| ResultFlag | Indicates whether the function completed successfully or not. If it did not complete successfully, the reason for the failure is returned here. See Section 12.1. |
| Perm | If VectNum = 0, then no Perm is returned. If VectNum = 1, then old Perm is returned. If VectNum > 1, then new Perm is returned after $P_{VectNum}$ has been changed based on PermVal. |

21.4 Function Sequence

The SetPerm command is illustrated by the following pseudocode:

```
Accept input parameters- VectNum, PermVal
Check range of VectNum
If invalid
    ResultFlag ← InvalidVector
    Output ResultFlag
    Return
End If
If(VectNum = 0) # No permssions for M0
    ResultFlag ← Pass
    Output ResultFlag
    Return
ElseIf(VectNum = 1)
    ResultFlag ← Pass
    Output ResultFlag
    Output P1
    Return
ElseIf(VectNum >1)
    # Check that only 'RW' parts are being changed
    # RW(1) → RO(0), RO(0) → RO(0), RW(1) → RW(1) -
    valid change
    # RO(0) → RW(1) - Invalid change
    # checking for change from ReadOnly to ReadWrite
    temp← ~P_VectNum ∧PermVal
    If(temp = 1 ) # If invalid change is 1
        ResultFlag ←InvalidPermission
        Output ResultFlag
    Else
        P_VectNum ← PermVal
        ResultFlag ←Pass
```

-continued

```
        Output ResultFlag
        Output P_VectNum
    EndIf
    Return
EndIf
```

22 ReplaceKey

Input: KeyRef, KeyId, KeyLock, EncryptedKey,$R_E$, $SIG_E$

Output: ResultFlag

Changes: $K_{KeyRef.keyNum}$ and $R_L$

Availability: All devices 22.1 Function Description

The ReplaceKey command is used to replace the contents of a non-locked keyslot, which means replacing the key, its associated keyID, and the lock status bit for the keyslot. A key can only be replaced if the slot has not been locked i.e. the KeyLock for the slot is 0. The procedure for replacing a key also requires knowledge of the value of the current key in the keyslot i.e. you can only replace a key if you know the current key.

Whenever the ReplaceKey function is called, the caller has the ability to make this new key the final key for the slot. This is accomplished by passing in a new value for the KeyLock flag. A new KeyLock flag of 0 keeps the slot unlocked, and permits further replacements. A new KeyLock flag of 1 means the slot is now locked, with the new key as the final key for the slot i.e. no further key replacement is permitted for that slot.

22.2 Input Parameters

| Parameter | Description |
|---|---|
| KeyRef | For common key signature generation: KeyRef.keyNum = Slot number of the key to be used for testing the input signature, and will be replaced by the new key. KeyRef.useChipId = 0 No variant key signature generation required |
| KeyId | KeyId of the new key. The LSB represents whether the new key is a variant or a common key. |
| KeyLock | Flag indicating whether the new key should be the final key for the slot or not. (1 = final key, 0 = not final key) |
| EncryptedKey | $SIG_{Kold}(R_E \| R_L) \oplus K_{new}$ where $K_{old}$ = KeyRef.getkey( ). Refer to Section 10.1.3.1 |
| RE | External random value required for verifying input signature. This will be the R from the input signature generator (device generating $SIG_E$). In this case the input signature is a generated by calling the GetProgramKey function on a Key Programming device. |
| SIGE | External signature required for authenticating input data and determining the new key from the EncryptedKey. |

22.2.1 Input Signature Generation Data Format

Figure 374:
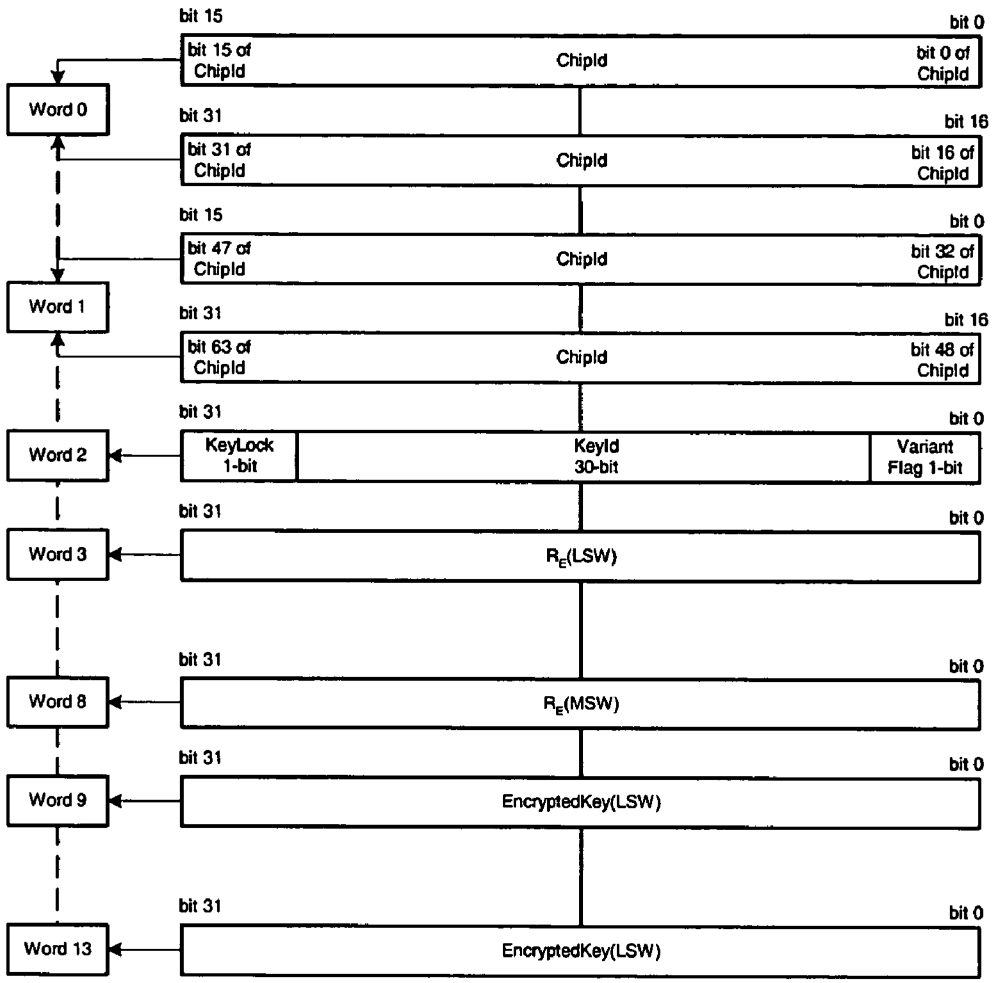

FIG. 374 shows the input signature generation data format for the ReplaceKey function.

Table 277 gives the parameters included in $SIG_E$ for ReplaceKey.

| Parameter | Length in bits | Value set internally | Value set from Input |
|---|---|---|---|
| ChipId | 48 | This QA Device's ChipId | |
| KeyId | 32 | | ● |
| $R_E$ | 160 | | ● |
| EncryptedKey | 160 | | ● |

22.3 Output Parameters

Table 278 describes each of the output parameters for ReplaceKey.

| Parameter | Description |
|---|---|
| ResultFlag | Indicates whether the function completed successfully or not. If it did not complete successfully, the reason for the failure is returned here. See Section 12.1. |

22.4 Function Sequence

The ReplaceKey command is illustrated by the following pseudocode:

```
Accept input parameters - KeyRef, KeyId, KeyLock, EncryptedKey,R_E,
SIG_E
Check KeyRef.keyNum range
If invalid
    ResultFlag ←InvalidKey
    Output ResultFlag
    Return
EndIf
#Generate message for passing to GenerateSignature function
data ←(ChipId|KeyId|KeyLock|R_E|EncryptedKey)
#Generate Signature
SIG_L ←GenerateSignature(KeyRef,data,Null,Null) # Refer to Figure
374.
# Check if the key slot is unlocked
If (KeyLock # unlock)
    ResultFlag ←KeyAlreadyLocked
    Output ResultFlag
    Return
EndIf
#Test SIG_E
If (SIG_L # SIG_E)
    ResultFlag ←BadSig
    Output ResultFlag
    Return
EndIf
SIG_L ←GenerateSignature (Key,null,R_E,R_L)
    Advance R_L
    # Must be atomic - must not be possible to remove power and have
KeyId and KeyNum mismatched. Also preferable for KeyLock, although
not strictly required.
    K_KeyNum ←SIG_L ⊕ EncryptedKey
    KeyId_KeyNum ←KeyId
    KeyLock_KeyNum ←KeyLock
    ResultFlag ←Pass
    Output ResultFlag
Return
```

23 SignM

Input: KeyRef, FieldSelect, FieldValLength, FieldVal, ChipId, $R_E$

Output: ResultFlag, $R_L$, $SIG_{out}$

Changes: $R_L$

Availability: Trusted device only 23.1 Function Description

The SignM function is used to generate the appropriate digital signature required for the authenticated write function WriteFieldsAuth. The SignM function is used whenever the caller wants to write a new value to a field that requires key-based write access.

The caller typically passes the new field value as input to the SignM function, together with the nonce ($R_E$) from the QA Device who will receive the generated signature. The SignM function then produces the appropriate signature $SIG_{out}$. Note that $SIG_{out}$ may need to be translated via the Translate function on its way to the final WriteFieldsAuth QA Device.

The SignM function is typically used by the system to update preauthorisation fields (Section 31.4.3).

The key used to produce output signature $SIG_{out}$ depends on whether the trusted device shares a common key or a variant key with the QA Device directly receiving the signature. The KeyRef object passed into the interface must be set appropriately to reflect this.

23.2 Input Parameters

| Parameter | Description |
| --- | --- |
| KeyRef | For generating common key output signature: Ref.keyNum = Slot number of the key for producing the output signature. $SIG_{out}$ produced using $K_{KeyRef.keyNum}$ because the device receiving $SIG_{out}$ shares $K_{KeyRef.keyNum}$ with the trusted device. KeyRef.useChipId = 0<br>For generating variant key output signature: KeyRef.keyNum = Slot number of the key to be used for generating the variant key. $SIG_{out}$ produced using a variant of $K_{KeyRef.keyNum}$ because the device receiving $SIG_{out}$ shares a variant of $K_{KeyRef.keyNum}$ with the trusted device. KeyRef.useChipId = 1 KeyRef.chipId = ChipId of the device which receives $SIG_{out}$. |
| FieldNum | Field number of the field that will be written to. |
| FieldData Length | The length of the FieldData in words. |
| FieldData | The value that will be written to the field selected by FieldNum. |
| $R_E$ | External random value used in the output signature generation. $R_E$ is obtained by calling the Random function on the device, which will receive the $SIG_{out}$ from the SignM function, which in this case is the WriteAuth function or the Translate function. |
| ChipId | Chip identifier of the device whose WriteAuth function will be called subsequently to perform an authenticated write to its FieldNum of M0. |

23.3 Output Parameters

Table 280 describes each of the output parameters.

TABLE 280

Description of output parameters for SignM

| Parameter | Description |
| --- | --- |
| ResultFlag | Indicates whether the function completed successfully or not. If it did not complete successfully, the reason for the failure is returned here. See Section 12.1. |
| $R_L$ | Internal random value used in the output signature. |
| $SIG_{out}$ | $SIG_{Out} = SIG_{KeyRef}(data \mid R_L \mid R_E)$ as shown in FIG. 373. As per FIG. 373, $R_E$ is actually $R_L$ and $R_L$ is $R_E$ with respect to device producing $SIG_{out}$ to be applied to WriteAuth function. |

23.3.1 $SIG_{out}$

Refer to Section 20.2.1.

23.4 Function Sequence

The SignM command is illustrated by the following pseudocode:

```
Accept input parameters - KeyRef, FieldNum, FieldDataLength
# Accept FieldData words
For i = 0 to FieldValLength
    Accept next FieldData
EndFor
Accept ChipId, R_E
Check KeyRef.keyNum range
If invalid
    ResultFlag ←InvalidKey
    Output ResultFlag
    Return
EndIf
#Generate message for passing into the GenerateSignature function
data ←(RWSense|FieldSelect|ChipId|FieldVal)
#Generate Signature
SIG_out ←GenerateSignature(KeyRef,data,R_L,R_E) # Refer to Section
20.2.1.
Advance R_L to R_L2
ResultFlag ←Pass
Output parameters ResultFlag, R_L,SIG_out
Return
```

Functions on a Key Programming QA Device

24 Concepts

The key programming device is used to replace keys in other devices.

The key programming device stores both the old key which will be replaced in the device being programmed, and the new key which will replace the old key in the device being programmed. The keys reside in normal key slots of the key programming device.

Any key stored in the key programming device can be used as an old key or a new key for the device being programmed, provided it is permitted by the key replacement map stored within the key programming device.

Figure 375:
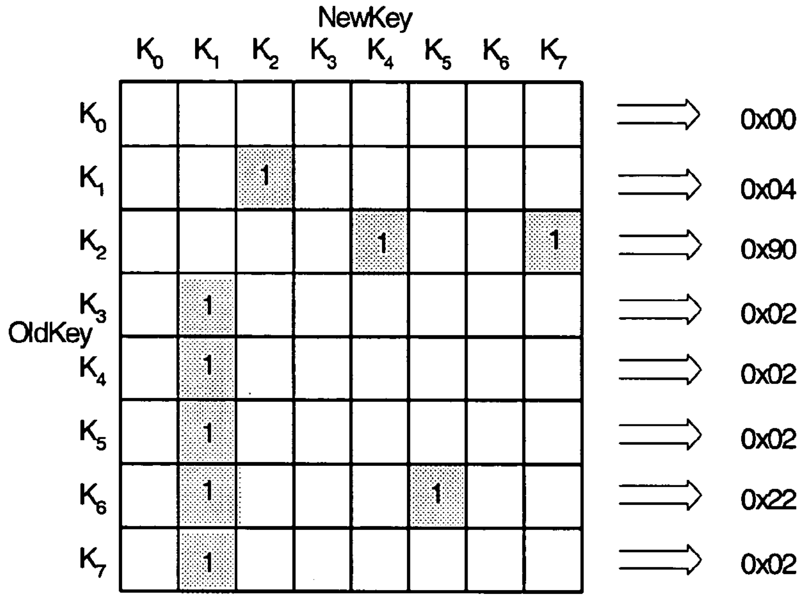

FIG. 375 is representation of a key replacement map. The 1 s indicates that the new key is permitted to replace the old key. The 0s indicates that key replacement is not permitted for those positions. The positions in FIG. 13 which are blank indicate a 0.

According to the key replacement map in FIG. 13, $K_5$ can replace $K_1$, $K_6$ can replace $K_3$, $K_4$, $K_5$, $K_7$, $K_3$ can replace $K_2$, $K_0$ can replace $K_2$, and $K_2$ can replace $K_6$. No key can replace itself.

FIG. 375._Key Replacement Map

The key replacement map must be readable from an external system and must be updateable by an authenticated write. Therefore, the key replacement map must be stored in an M0 field. This requires one of the keys residing in the key programming device to be have ReadWrite access to the key replacement map. This key is referred to as the key replacement map key and is used to update the key replacement map.

There will one key replacement map field in a key programming device.

No key replacement mappings are allowed to the key replacement map key because it should not be used in another device being programmed. To prevent the key replacement map key from being used in key replacement, in case the mapping has been accidentally changed, the key replacement map key is allocated a fixed key slot of 0 in all key programming devices. If a GetProgram function is invoked on the key programming device with the key replacement map key slot number 0 it immediately returns an error, even before the key replacement map is checked.

Figure 376:
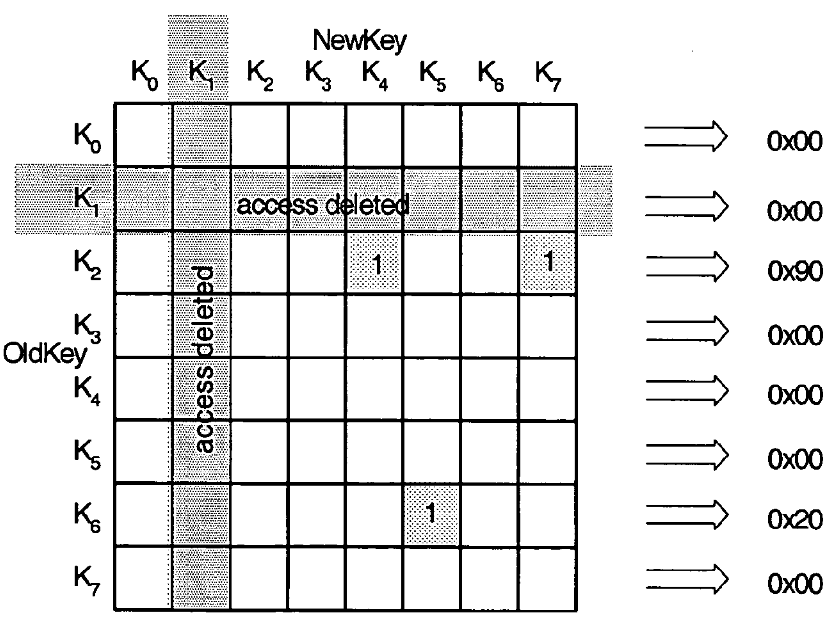

The keys $K_0$ to $K_7$ in the key programming device are initially set during the instantiation of the key programming device. Thereafter, any key can be replaced on the key programming device by another key programming device If a key in a key slot of the key programming device is being replaced, the key replacement map for the old key must be invalidated automatically. This is done by setting the row and column for the corresponding key slot to 0 For example, if $K_1$ is replaced, then column 1 and row 1 are set to 0, as indicated in FIG. 376.

The new mapping information for $K_1$ is then entered by performing an authenticated write of the key replacement map field using the key replacement map key.

24.1 Key Replacement Map Data Structure

As mentioned in Section 24, the key replacement map must be readable by external systems and must be updateable using an authenticated write by the key replacement map key. Therefore, the key replacement map is stored in an M0 field of the key programming device. The map is 8×8 bits in size and therefore can be stored in a two word field. The LSW of key replacement map stores the mappings for $K_0$–$K_3$. The MSW of key replacement map stores the mappings for $K_4$–$K_7$. Referring to FIG. 375, key replacement map LSW is 0x40092000 and MSW is 0x40224040. Referring to FIG. 376, after $K_1$ is replaced in the key programming device, the value of the key replacement map LSW is 0x40090000 and MSW is 0x40224040.

The key replacement map field has an M1 word representing its attributes. The attribute setting for this field is specified in Table 281.

TABLE 281

Key replacement map attribute setting

| Attribute name | Value | Explanation |
|---|---|---|
| Type | TYPE_KEY_MAP Refer to Appendix A. | Indicates that the field value represents a key replacement map. Only one such field per key programming QA Device. |
| KeyNum | 0 | Slot number of the key replacement map key. |
| NonAuthRW | 0 | No non authenticated writes is permitted. |
| AuthRW | 1 | Authenticated write is permitted. |
| KeyPerms | 0 | No Decrement Only permission for any key. |
| EndPos | Value such that field size is 2 words | |

24.2 Basic Scheme

Figure 377:
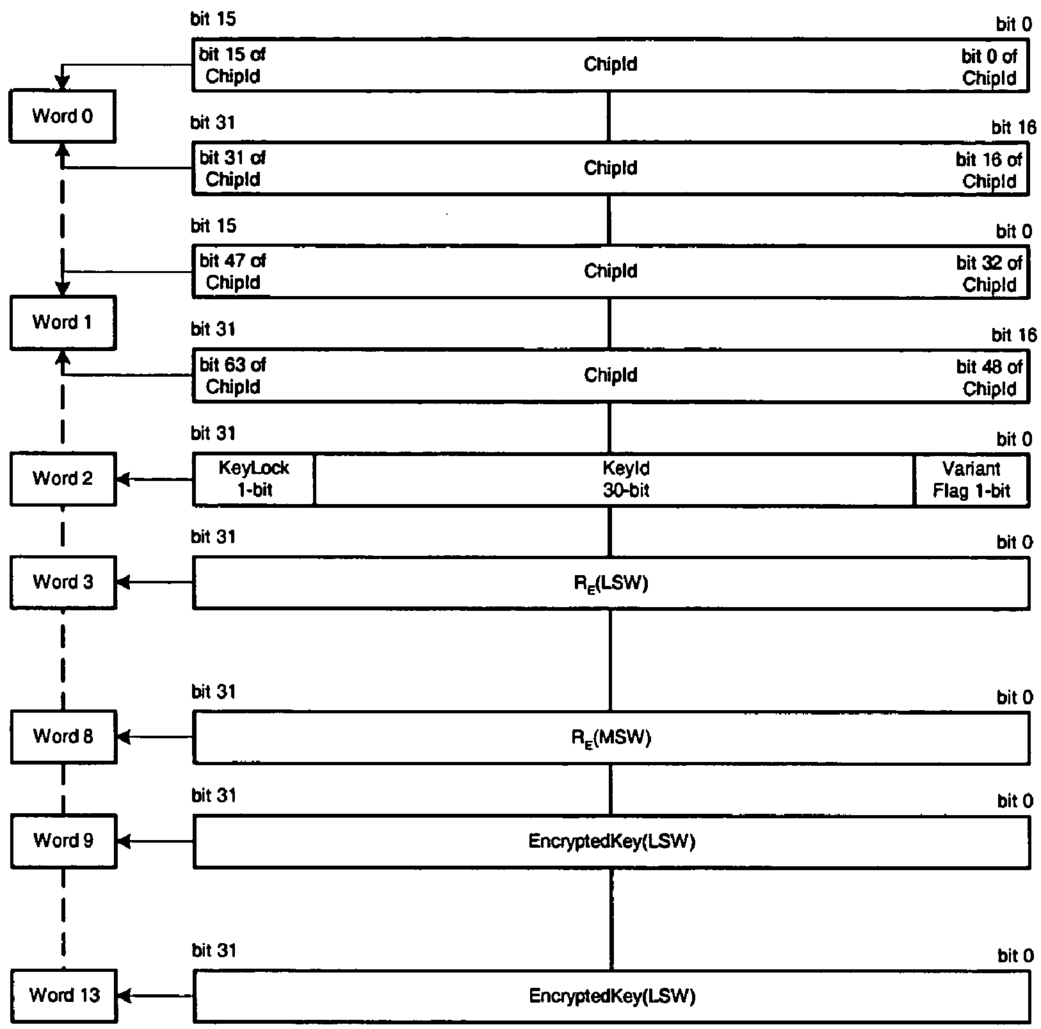

The Key Replacement sequence is shown FIG. 377.

Following is a sequential description of the transfer and rollback process:

1. The System gets a Random number from the QA Device whose keys are going to be replaced.
2. The System makes a GetProgramKey Request to the Key Programming QA Device. The Key Programming QA Device must contain both keys for QA Device whose keys are being replaced—Old Keys which are the keys that exist currently (before key replacement), and the New Keys which are the keys which the QA Device will have after a successful processing of the ReaplceKey Request. The GetProgramKey Request is called with the Key number of the Old Key (in the Key Programming QA Device) and the Key Number of the New Key (in the Key Programming QA Device), and the Random number from (1). The Key Programming QA Device validates the GetProgramKey Request based on the KeyReplacement map, and then produces the necessary GetProgramKey Output. The GetProgramKey Output consists of the encrypted New Key (encryption done using the Old Key), along with a signature using the Old Key.
3. The System then applies GetProgramKey Output to the QA Device whose key is being replaced, by calling the ReplaceKey function on it, passing in the GetProgramKey Output. The ReplaceKey function will decrypt the encrypted New Key using the Old Key, and then replace its Old Key with the decrypted New Key.

25 Functions 25.1 GetProgamKey

Input: OldKeyRef, ChipId, $R_E$, KeyLock, NewKeyRef

Output: ResultFlag, $R_L$, EncryptedKey, KeyIdOfNewKey, $SIG_{out}$

Changes: $R_L$

Availability: Key programming device 25.1.1 Function Description

The GetProgramKey works in conjunction with the ReplaceKey command, and is used to replace the specified key and its KeyId. This function is available on a key programming device and produces the necessary inputs for the ReplaceKey function. The ReplaceKey command is then run on the device whose key is being replaced.

The key programming device must have both the old key and the new key programmed as its keys, and the key replacement map stored in one of its M0 field, before GetProgramKey can be called on the device.

Depending on the OldKeyRef object and the NewKeyRef object passed in, the GetProgramKey will produce a signature to replace a common key by a common key, a variant key by a common key, a common key by a variant key or a variant key by a variant key.

25.1.2 Input Parameters

| Parameter | Description |
|---|---|
| OldKeyRef | Old key is a common key: OldKeyRef.keyNum = Slot number of the old key in the Key Programming QA Device. The device whose key is being replaced, shares a common key $K_{OldKeyRef.keyNum}$ with the key programming device. OldKeyRef.useChipId = 0<br>Old key is a variant key KeyRef.keyNum = Slot number of the old keyin the Key Programming QA Device. that will be used to generate the variant key. The device whose key is being replaced, shares a variant of $K_{OldKeyRef.keyNum}$ with the key programming device. OldKeyRef.useChipId = 1 OldKeyRef.chipId = ChipId of the device whose variant of $K_{OldKeyRef.keyNum}$ key is being replaced. |
| ChipId | Chip identifier of the device whose key is being replaced. |
| RE | External random value which will be used in output signature generation. $R_E$ is obtained by calling the Random function on the device being programmed. This will also receive the SIGout from the GetProgramKey function. SIGout is passed in to ReplaceKeyfunction. |
| KeyLock | Flag indicating whether the new key should be unlocked/locked into its slot. |
| NewKeyRef | New key is a common key: NewKeyRef.keyNum = Slot number of the new keyin the Key Programming QA Device. The device whose key is being replaced, |

-continued

| Parameter | Description |
|---|---|
| | will receive a common key $K_{NewKeyRef.keyNum}$ from the key pro gramming device. NewKeyRef.useChipId = 0 NewKey is a variant key: NewKeyRef.keyNum = Slot number of the new key in the Key Programming QA Device. that will be used to generate the new variant key. The device whose key is being replaced, will receive a new key which is a variant of $K_{NewKeyRef.keyNum}$ from the key programming device. NewKeyRef.useChipId = 1 NewKeyRef.chipId = ChipId of the device receiving a new key, the new key is a variant of the $K_{NewKeyRef.keyNum}$. |

25.1.3 Output Parameters

Table 283 describes each of the output parameters for GetProgramKey.

| Parameter | Description |
|---|---|
| ResultFlag | Indicates whether the function completed successfully or not. If it did not complete successfully, the reason for the failure is returned here. See Section 12.1 and Table 284 |
| $R_L$ | Internal random value used in the output signature. |
| EncryptedKey | $SIG_{Kold}(R_L\|R_E) \oplus K_{new}$ |
| KeyIdOfNewKey | KeyId of the new key. The LSB represents whether the new key is a variant or a common key. |
| $SIG_{out}$ | $SIG_{out} = SIG_{Kold}(data \mid R_L \mid R_E)$ |

TABLE 284

ResultFlag definitions for GetProgramKey

| Result Flag | Description |
|---|---|
| InvalidKeyReplacementMap | Key replacement map field invalid or doesn't exist. |
| KeyReplacementNotAllowed | Key replacement not allowed as per key replacement map. |

25.1.3.1 $SIG_{out}$

Figure 378:
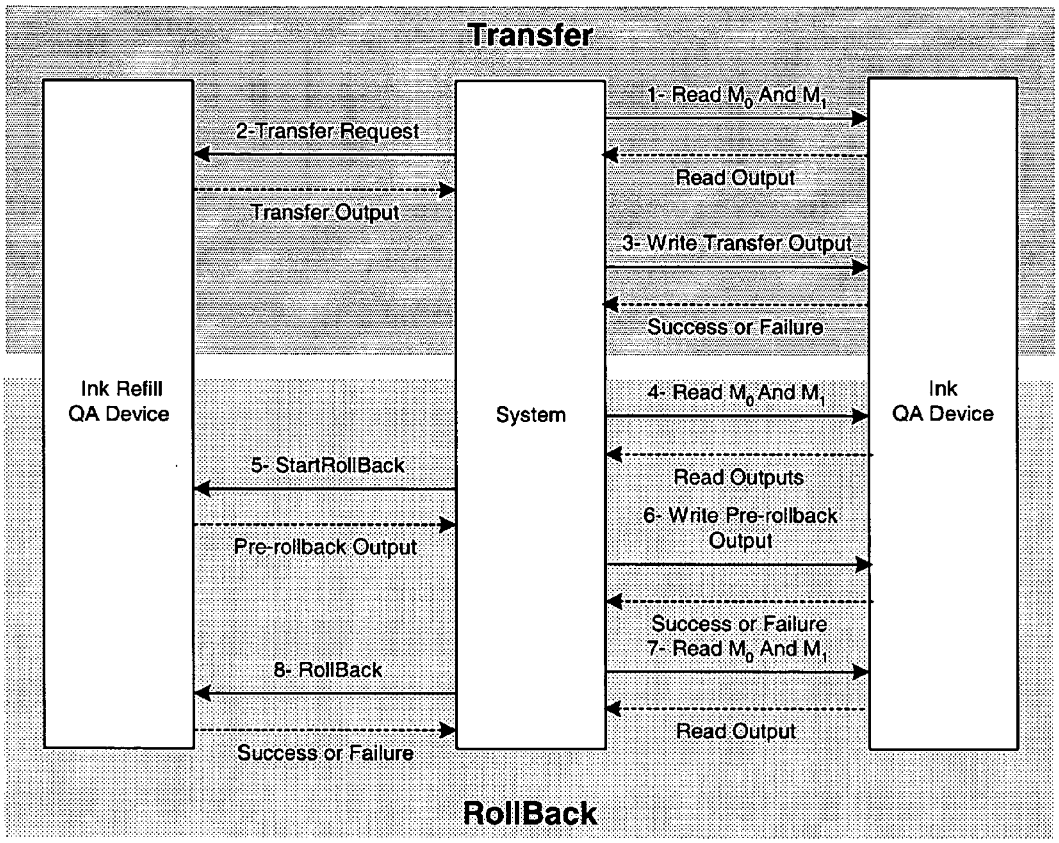

FIG. 378 shows the output signature generation data format for the GetProgramKey function.

25.1.4 Function Sequence

The GetProgramKey command is illustrated by the following pseudocode:

```
Accept input parameters - OldKeyRef, ChipId, R_E, KeyLock,
NewKeyRef
--------------------------------------------------------------
# key replacement map key stored in K0, must not be used for key
replacement
If(OldKeyRef.keyNum = 0) ∨(NewKeyRef.keyNum = 0)
    ResultFlag ← Fail
    Output ResultFlag
    Return
EndIf
--------------------------------------------------------------
CheckRange(OldKeyRef.keyNum)
If invalid
    ResultFlag ← InvalidKey
    Output ResultFlag
    Return
EndIf
--------------------------------------------------------------
```

-continued

```
CheckRange (NewKeyRef.keyNum)
If invalid
    ResultFlag ← InvalidKey
    Output ResultFlag
    Return
EndIf
--------------------------------------------------------------
# Find M0 words that represent the key replacement map
WordSelectForKeyMapField ←GetWordSelectForKeyMapField(M1)
If(WordSelectForKeyMapField = 0)
    ResultFlag ← InvalidKeyReplacementMap
    Output ResultFlag
    Return
EndIf
--------------------------------------------------------------
#CheckMapPermits key replacement
ReplaceOK
←CheckMapPermits(WordSelectForKeyMapField,OldKeyNum,
NewKeyNum)
If(ReplaceOK = 0)
    ResultFlag ← KeyReplacementNotAllowed
    Output ResultFlag
    Return
EndIf
--------------------------------------------------------------
#All checks are OK, now generate Signature with OldKey
SIG_L ← GenerateSignature(OldKeyRef,null,R_L,R_E)
#Get new key
K_NewKey← NewKeyRef.getKey( )
#Generate Encrypted Key
EncryptedKey ←SIG_L ⊕ K_NewKey
#Set base key or variant key - bit 0 of KeyId
If(NewKeyRef.useChipId = 1)
    KeyId←0x0001 ∧0x0001
Else
    KeyId ←0x0001 ∧0x0000
EndIf
#Set the new key KeyId to the KeyId - bits 1–30 of KeyId
KeyIdOfNewKey←SHIFTLEFT(KeyIdOfNewKey,1)
KeyId← KeyId ∨ KeyIdOfNewKey
#Set the KeyLock as per input - bit 31 of KeyId
KeyLock← SHIFTLEFT(KeyLock,31)
#KeyId← KeyId ∨KeyLock
#Generate message for passing in to the GenerateSignature function
data ← ChipId|KeyId|R_L|EncryptedKey
#Generate output signature
SIG_out ← GenerateSignature(OldKeyRef,data,null,null)
# Refer to Figure 378
Advance R_L to R_L2
ResultFlag ← Pass
Output ResultFlag, R_L,SIG_out,KeyId, EncryptedKey
Return
```

25.1.4.1 WordSelectForField GetWordSelectForKeyMapField(M1)

This function gets the words corresponding to the key replacement map in M0.

```
    FieldSize[16] ←0 # Array to hold FieldSize assuming there are 16
    fields
    NumFields ←FindNumberOfFieldsInM0(M1,FieldSize)
    #Find the key replacement map field
    For i ←0 to NumFields
        If(TYPE_KEY_MAP = M1[i].Type) # Field is key map field
            MapFieldNum ←i
            Return
        Endif
    EndFor
    #Get the words corresponding to the key replacement map
    WordMapForField← GetWordMapForField(MapFieldNum,M1)
    Return WordSelectForField
```

25.1.4.2 NumFields FindNumOfFieldsInM0(M1, FieldSize[ ])

Refer to FIG. 19.4.1 for details 25.1.4.3 WordMapForField GetWordMapForField(FieldNum,M1)

Refer to Section 19.4.2 for details.

25.1.4.4 ReplaceOK CheckMapPermits(WordSelectForKeyMapField, OldKeyNum, NewKeyNum,M0)

This function checks whether key replacement map permits key replacement.

Isolate KeyReplacementMap based on WorldSelectForKeyMapField and M0 KeyReplacementMap [64 bit]

Isolate permission bit corresponding for NewKeyNum in the map for OldKeyum

ReplaceOK←KeyReplacementMap [(OldKeyNum×8+NewKeyNum) bit]

Return ReplaceOK 25.2 ReplaceKey

Input: KeyRef, KeyId, KeyLock, EncryptedKey,$R_E$, $SIG_E$

Output: ResultFlag

Changes: $K_{KeyNum}$ and $R_L$

Availability: Key programming device 25.2.1 Function Description

This function is used for replacing a key in a key programming device and is similar to the generic ReplaceKey function(Refer to Section 24), with an additional step of setting the KeyRef.keyNum column and KeyRef.keyNum row key replacement map to 0.

25.2.2 Input Parameters

Refer to Section 22.

25.2.3 Output Parameters

Refer to Section 22.

25.2.4 Function Sequence

The ReplaceKey command is illustrated by the following pseudocode:

```
Accept input parameters - KeyRef, KeyId, EncryptedKey,R_E, SIG_E
#Generate message for passing into GenerateSignature function
data ←(ChipId|KeyId|R_E|EncryptedKey)# Refer to Figure 374.
----------------------------------------------------------------
# Validate KeyRef, and then verify signature
ResultFlag = ValidateKeyRefAndSignature(KeyRef,data,R_E,R_L)
If (ResultFlag ≠ Pass)
    Output ResultFlag
    Return
EndIf
----------------------------------------------------------------
# Check if the key slot is unlocked
Isolate KeyLock for KeyRef
If(KeyLock = lock)
    ResultFlag ←KeyAlreadyLocked
    Output ResultFlag
    Return
EndIf
SIG_L ←GenerateSignature(Key,Null,R_E,R_L)
Advance R_L
# Find M0 words that represent the key replacement map
WordSelectForKeyMapField ←GetWordSelectForKeyMapField(M1)
# Set the bits corresponding to the KeyRef.keyNum row and column
to 0
# i.e invalidate the key replacement map for KeyRef.keyNum.
#Must be done before the key is replaced and must be atomic with
key replacement.
SetFlag
←SetKeyMapForKeyNum(WordSelectForKeyMapField,
KeyRef.keyNum, M0)
If(SetFlag = 1)
    # Must be atomic - must not be possible to remove power and have
KeyId and
    KeyNum mismatched
    K_KeyNum ←SIG_L ⊕ EncryptedKey
```

-continued

```
    KeyId_KeyNum ←KeyId
    KeyLock_KeyNum ←KeyLock
    ResultFlag ←Pass
Else
    ResultFlag ←Fail
EndIf
Output ResultFlag
Return
```

25.2.4.1 WordSelectForField GetWordSelectForKeyMapField(M1)

Refer to FIG. 25.1.4.1 for details.

25.2.4.2 SetFlag SetKeyMapForKeyNum(WordSelectForKeyMapField,KeyNum, M0)

This function invalidates the key replacement map for KeyNum.

```
#Isolate KeyReplacementMap based on WordSelectForKeyMapField and
M0
KeyReplacementMap[64 bit]
# Set KeyNum row (all bits) to 0 in the KeyReplacementMap
For i = 0 to 7
    KeyReplacementMap[(KeyNum × 8 + i)bit] ←0
EndFor
# Set KeyNum column to 0 in the KeyReplacementMap
For i = 0 to 7
    KeyReplacementMap[(i×8 + KeyNum)bit] ←0
EndFor
SetFlag ←1
Return SetFlag
```

Functions

Upgrade Device (Ink Re/fill)

26 Concepts 26.1 Purpose

In a printing application, an ink cartridge contains an Ink QA Device storing the ink-remaining values for that ink cartridge. The ink-remaining values decrement as the ink cartridge is used to print.

When an ink cartridge is physically re/filled, the Ink QA Device needs to be logically re/filled as well. Therefore, the main purpose of an upgrade is to re/fill the ink-remaining values of an Ink QA Device in an authorised manner.

The authorisation for a re/fill is achieved by using a Value Upgrader QA Device which contains all the necessary functions to re/write to the Ink QA Device. In this case, the value upgrader is called an Ink Refill QA Device, which is used to fill/refill ink amount in an Ink QA Device.

When an Ink Refill QA Device increases (additive) the amount of ink-remaining in an Ink QA Device, the amount of ink-remaining in the Ink Refill QA Device is correspondingly decreased. This means that the Ink Refill QA Device can only pass on whatever ink-remaining value it itself has been issued with. Thus an Ink Refill QA Device can itself be replenished or topped up by another Ink Refill QA Device.

The Ink Refill QA Device can also be referred to as the Upgrading QA Device, and the Ink QA Device can also be referred to as the QA Device being upgraded.

The refill of ink can also be referred to as a transfer of ink, or transfer of amount/valu, or an upgrade.

Typically, the logical transfer of ink is done only after a physical transfer of ink is successful.

26.2 Requirements

The transfer process has two basic requirements:

The transfer can only be performed if the transfer request is valid. The validity of the transfer request must be completely checked by the Ink Refill QA Device, before it produces the required output for the transfer. It must not be possible to apply the transfer output to the Ink QA Device, if the Ink Refill QA Device has been already been rolled back for that particular transfer.

A process of rollback is available if the transfer was not received by the Ink QA Device. A rollback is performed only if the rollback request is valid. The validity of the rollback request must be completely checked by the Ink Refill QA Device, before it adjusts its value to a previous value before the transfer request was issued. It must not be possible to rollback an Ink Refill QA Device for a transfer which has already been applied to the Ink QA Device i.e the Ink Refill QA Device must only be rolled back for transfers that have actually failed.

26.3 Basic Scheme

Figure 379:
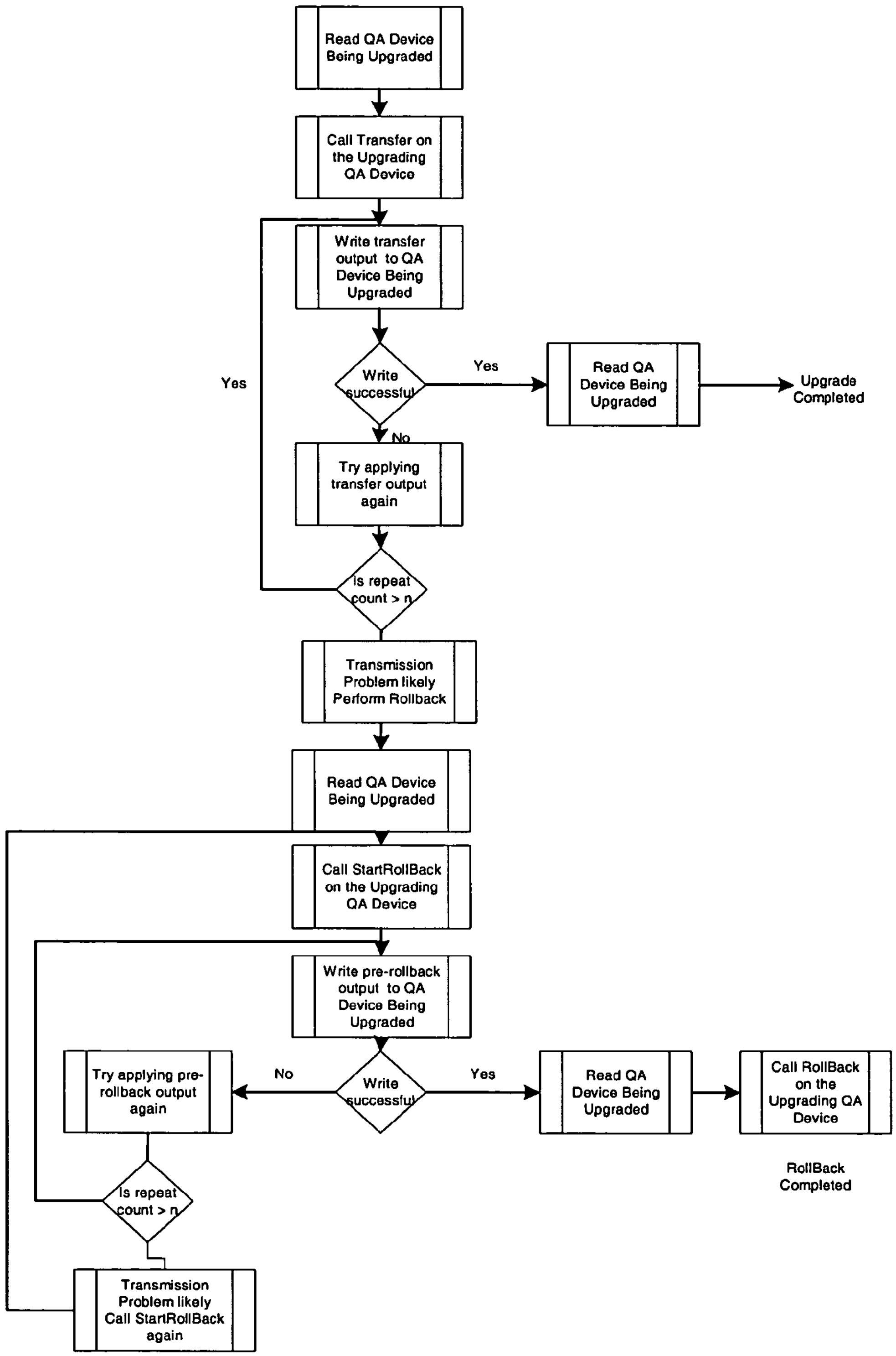

The transfer and rollback process is shown in FIG. 379.

Following is a sequential description of the transfer and rollback process:

1. The System Reads the memory vectors M0 and M1 of the Ink QA Device. The output from the read which includes the M0 and M1 words of the Ink QA Device, and a signature, is passed as an input to the Transfer Request. It is essential that M0 and M1 are read together. This ensures that the field information for M0 fields are correct, and have not been modified, or substituted from another device. Entire M0 and M1 must be read to verify the correctness of the subsequent Transfer Request by the Ink Refill QA Device.
2. The System makes a Transfer Request to the Ink Refill QA Device with the amount that must be transferred, the field in the Ink Refill QA Device the amount must be transferred from, and the field in Ink QA Device the amount must be transferred to. The Transfer Request also includes the output from Read of the Ink QA Device. The Ink Refill QA Device validates the Transfer Request based on the Read output, checks that it has enough value for a successful transfer, and then produces the necessary Transfer Output. The Transfer Output typically consists of new field data for the field being refilled or upgraded, additional field data required to ensure the correctness of the transfer/rollback, along with a signature.
3. The System then applies the Transfer Output to the Ink QA Device, by calling an authenticated Write function on it, passing in the Transfer Output. The Write is either successful or not. If the Write is not successful, then the System will repeat calling the Write function using the same transfer output, which may be successful or not. If unsuccesful the System will initiate a rollback of the transfer. The rollback must be performed on the Ink Refill QA Device, so that it can adjust its value to a previous value before the current Transfer Request was initiated. It is not necessary to perform a rollback immediately after a failed Transfer. The Ink QA Device can still be used to print, if there is any ink remaining in it.
4. The System starts a rollback by Reading the memory vectors M0 and M1 of the Ink QA Device.
5. The System makes a StartRollBack Request to the Ink Refill QA Device with same input parameters as the Transfer Request, and the output from Read in (4). The Ink Refill QA Device validates the StartRollBack Request based on the Read output, and then produces the necessary Pre-rollback output. The Pre-rollback output consists only of additional field data along with a signature.
6. The System then applies the Pre-rollback Output to the Ink QA Device, by calling an authenticated Write function on it, passing in the Pre-rollback output. The Write is either successful or not. If the Write is not successful, then either (6), or (5) and (6) must be repeated.
7. The System then Reads the memory vectors M0 and M1 of the Ink QA Device.
8. The System makes a RollBack Request to the Ink Refill QA Device with same input parameters as the Transfer Request, and the output from Read (7). The Ink Refill QA Device validates the RollBack Request based on the Read output, and then rolls back its field corresponding to the transfer.

26.3.1 Transfer

As we mentioned, the Ink QA Device stores ink-remaining values in its M0 fields, and its corresponding $M_1$ words contains field information for its ink-remaining fields. The field information consists of the size of the field, the type of data stored in field and the access permission to the field. See Section 8.1.1 for details.

The Ink Refill QA Device also stores its ink-remaining values in its M0 fields, and its coressponding $M_1$ words contains field information for its ink-remaining fields.

26.3.1.1 Authorisation

The basic authorisation for a transfer comes from a key, which has authenticated ReadWrite permission (stored in field information as KeyNum) to the ink-remaining field (to which ink will be transferrred) in the Ink QA Device. We will refer to this key as the refill key. The refill key must also have authenticated decrement-only permission for the ink-remaining field (from which ink will be transferred) in the Ink Refill QA Device.

After validating the input transfer request, the Ink Refill QA Device will decrement the amount to be transferred from its ink-remaining field, and produce a transfer amount (previous ink-remaining amount in the Ink QA Device+transfer amount), additional field data, and a signature using the refill key. Note that the Ink Refill QA Device can decrement its ink-remaining field only if the refill key has the permission to decrement it.

The signature produced by the Ink Refill QA Device is subsequently applied to the Ink QA Device. The Ink QA Device will accept the transfer amount only if the signature is valid. Note that the signature will only be valid if it was produced using the refill key which has write permission to the ink-remaining field being written.

26.3.1.2 Data Type Matching

The Ink Refill QA Device validates the transfer request by matching the Type of the data in ink-remaining information field of Ink QA Device to the Type of data in ink-remaining information field of the Ink Refill QA Device. This ensures that equivalent data Types are transferred i.e Network_OEM1_infrared ink is not transferred to Network_OEM1_cyan ink.

26.3.1.3 Addition Validation

Additional validation of the transfer request must also be performed before a transfer output is generated by the Ink Refill QA Device. These are as follows:

For the Ink Refill QA Device:

1. Whether the field being upgraded is actually present.
2. Whether the field being upgraded can hold the upgraded amount.

For the Ink QA Device:

1. Whether the field from which the amount is transferred is actually present.
2. Whether the field has sufficient amount required for the transfer.

26.3.1.4 Rollback Facilitation

To facilitate a rollback, the Ink Refill QA Device will store a list of transfer requests processed by it. This list is referred to as the Xfer Entry cache. Each record in the list consists of the transfer parameters corresponding to the transfer request.

26.3.2 Rollback

A rollback request is validated by looking through the Xfer Entry of the Ink Refill QA Device and finding the request that should be rolled back. After the right transfer request is found the Ink Refill QA Device checks that the output from the transfer request was not applied to the Ink QA Device by comparing the current Read of the Ink QA Device to the values in the Xfer Entry cache, and finally rolls back its ink-remaining field (from which the ink was transferred) to a previous value before the transfer request was issued.

The Ink Refill QA Device must be absolutely sure that the Ink QA Device didn't receive the transfer. This factor determines the additional fields that must be written along with transfer amount, and also the parameters of the transfer request that must be stored in the Xfer Entry cache to facilitate a rollback, to prove that the Printer QA Device didn't actually receive the transfer.

26.3.2.1 Sequence Fields

The rollback process must ensure that the transfer output (which was previously produced) for which the rollback is being performed, cannot be applied after the rollback has been performed. How do we achieve this? There are two separate decrement-only sequence fields (SEQ_1 and SEQ_2) in the Ink QA Device which can only be decremented by the Ink Refill QA Device using the refill key. The nature of data to be written to the sequence fields is such that either the transfer output or the pre-rollback output can be applied to the Ink QA Device, but not both i.e they must be mutually exclusive.Refer to Table 285 for details.

The two sequence fields are initialised to 0xFFFFFFFF using sequence key. The sequence key is different to the refill key, and has authenticated ReadWrite permission to both the sequence fields. The transfer output consists of the new data for the field being upgraded, field data of the two sequence fields, and a signature using the refill key. The field data for SEQ_1 is decremented by 2 from the original value that was passed in with the transfer request. The field data for SEQ_2 is decremented by 1 from the original value that was passed in with the transfer request.

The pre-rollback output consists only of the field data of the two sequence fields, and a signature using the refill key. The field data for SEQ_1 is decremented by 1 from the original value that was passed in with the transfer request. The field data for SEQ_2 is decremented by 2 from the original value that was passed in with the transfer request.

Since the two sequence fields are decrement-only fields, the writing of the transfer output to QA Device being upgraded will prevent the writing of the pre-rollback output to QA Device being upgraded. If the writing of the transfer output fails, then pre-rollback can be written. However, the transfer output cannot be written after the pre-rollback has been written.

Before a rollback is performed, the Ink Refill QA Device must confirm that the sequence fields was successfully written to the pre-rollback values in the Ink QA Device. Because the sequence fields are Decrement-Only fields, the Ink QA Device will allow pre-rollback output to be written only if the upgrade output has not been written. It also means that the transfer output cannot be written after the pre-rollback values have been written.

26.3.2.1.1 Field Information of the Sequence Data Field

For a device to be upgradeable the device must have two sequence fields SEQ_1 and SEQ_2 which are written with sequence data during the transfer sequence. Thus all upgrading QA devices, ink QA Devices and printer QA Devices must have two sequence fields. The upgrading QA Devices must also have these fields because they can be upgraded as well.

The sequence field information is defined in Table 286.

TABLE 285

Sequence field data for Transfer and Pre-rollback

| Function | Sequence Field data written to Ink QA Device: SEQ_1 | SEQ_2 | Explanation |
|---|---|---|---|
| Initialised | 0xFFFFFFFF | 0xFFFFFFFF | Written using the sequence key which is different from the refill key |
| Write using Transfer Output | (Previous Value − 2) If Previous Value = intialised value then 0xFFFFFFFD | (Previous Value − 1) If Previous Value = intialised value then 0xFFFFFFFE | Written using the refill key using the refill key which has decrement-only permission on the fields. Value cannot be written if pre-rollback output is already written. |
| Write usiing Pre-rollback | (Previous Value − 1) If Previous Value = intialised value then 0xFFFFFFFE | (Previous Value − 2) If Previous Value = initialised value then 0xFFFFFFFD | Written using the refill key using the refill key which has decrement-only permissionon the fields. Value can be written only if Transfer Output has not been written. |

TABLE 286

Sequence field information

| Attribute Name | Value | Explanation |
|---|---|---|
| Type | TYPE_SEQ_1 or TYPE_SEQ_2. | See Appendix A for exact value. |
| KeyNum | Slot number of the sequence key. | Only the sequence key has authenticated ReadWrite access to this field. |
| Non Auth RW Perm | 0 | Non authenticated ReadWrite is not allowed to the field. |
| Auth RW Perm | 1 | Authenticated (key based) ReadWrite access is allowed to the field. |
| KeyPerm | KeyPerms [KeyNum] = 0 | KeyNum is the slot number of the sequence key, which has ReadWrite permission to the field. |
| | KeyPerms [Slot number of the refill key] = 1 | Refill key can decrement the sequence field. |
| | KeyPerms[others = 0 . . . 7(except refill key)] = 0 | All other keys have ReadOnly access. |
| End Pos | | Set as required. Size is typically 1 word. |

26.3.3 Upgrade States

There are three states in an transfer sequence, the first state is initiated for every transfer, while the next two states are initiated only when the transfer fails. The states are—Xfer, StartRollback, and Rollback.

26.3.3.1 Upgrade Flow

Figure 380:
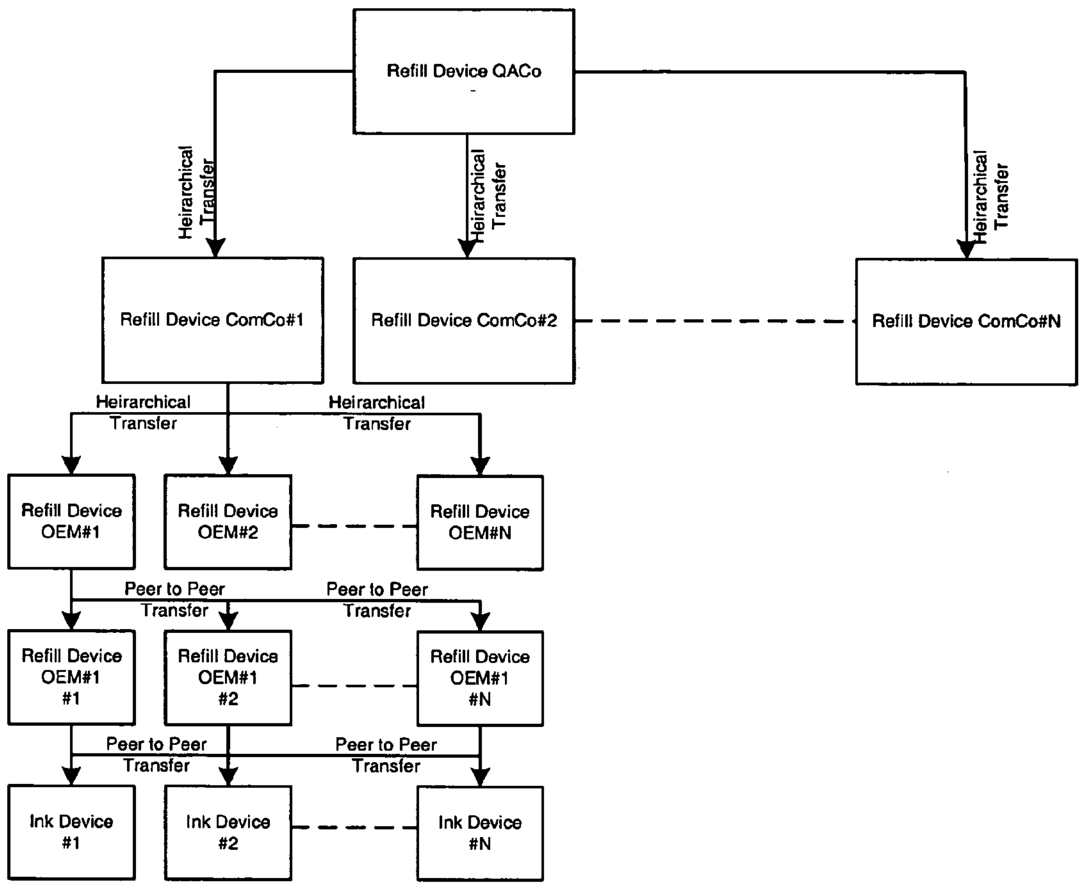

FIG. 380 shows a typical upgrade flow.

26.3.3.2 Xfer

This state indicates the start of the transfer process, and is the only state required if the transfer is successful. During this state, the Ink Refill QA Device adds a new record to its Xfer Entry cache, decrements its amount, produces new amount, new sequence data (as described in Section 26.3.2.1) and a signature based on the refill key.

The Ink QA Device will subsequently write the new amount and new sequence data, after verifying the signature. If the new amount can be successfully written to the Ink QA Device, then this will finish a successful transfer.

If the writing of the new amount is unsuccessful (result returned is BAD SIG), the System will re-transmit the transfer output to the Ink QA Device, by calling the authenticated Write function on it again, using the same transfer output.

If retrying to write the same transfer output fails repeatedly, the System will start the rollback process on Ink Refill QA Device, by calling the Read function on the Ink QA Device, and subsequently calling the StartRollBack function on the Ink Refill QA Device. After a successful rollback is performed, the System will invoke the transfer sequence again.

26.3.3.3 StartRollBack

This state indicates the start of the rollback process. During this state, the Ink Refill QA Device produces the next sequence data and a signature based on the refill key. This is also called a pre-rollback, as described in Section 26.3.2.

The pre-rollback output can only be written to the Ink QA Device, if the previous transfer output has not been written. The writing of the pre-rollback sequence data also ensures, that if the previous transfer output was captured and not applied, then it cannot be applied to the Ink QA Device in the future.

If the writing of the pre-rollback output is unsuccessful (result returned is BAD SIG), the System will re-transmit the pre-rollback output to the Ink QA Device, by calling the authenticated Write function on it again, using the same pre-rollback output.

If retrying to write the same pre-rollback output fails repeatedly, the System will call the StartRollback on the Ink Refill QA Device again, and subsequently calling the authenticated Write function on the Ink QA Device using this output.

26.3.3.4 Rollback

This state indicates a successful deletion (completion) of a transfer sequence. During this state, the Ink Refill QA Device verifies the sequence data produced from StartRollBack has been correctly written to Ink Refill QA Device, then rolls its ink-remaining field to a previous value before the transfer request was issued.

26.3.4 Xfer Entry Cache

The Xfer Entry data structure must allow for the following:

Stores the transfer state and sequence data for a given transfer sequence.

Store all data corresponding to a given transfer, to facilitate a rollback to the previous value before the transfer output was generated.

The Xfer Entry cache depth will depend on the QA Chip Logical Interface implementation. For some implementations a single Xfer Entry value will be saved. If the Ink Refill QA Device has no powersafe storage of Xfer Entry cache, a power down will cause the erasure of the Xfer Entry cache and the Ink Refill QA Device will not be able to rollback to a pre-power-down value.

A dataset in the Xfer Entry cache will consist of the following:

Information about the QA Device being upgraded:

a. ChipId of the device.

b. FieldNum of the M0 field (i.e what was being upgraded).

Information about the upgrading QA Device:

a. FieldNum of the M0 field used to transfer the amount from.

XferVal—the transfer amount.

Xfer State—indicating at which state the transfer sequence is. This will consist of:

a. State definition which could be one of the following: —Xfer, StartRollBack and complete/deleted.

b. The value of sequence data fields SEQ_1 and SEQ_2.

26.3.4.1 Adding New Dataset

A new dataset is added to Xfer Entry cache by the Xfer function.

There are three methods which can be used to add new dataset to the Xfer Entry cache. The methods have been listed below in the order of their priority:

1. Replacing existing dataset in Xfer Entry cache with new dataset based on ChipId and FieldNum of the Ink QA Device in the new dataset. A matching ChipId and FieldNum could be found because a previous transfer output corresponding to the dataset stored in the Xfer Entry cache has been correctly received and processed by the Ink Refill QA Device, and a new transfer request for the same Ink QA Device, same field, has come through to the Ink Refill QA Device.
2. Replace existing dataset cache with new dataset based on the Xfer State. If the Xfer State for a dataset indicates deleted (complete), then such a dataset will not be used for any further functions, and can be overwritten by a new dataset.

3. Add new dataset to the end of the cache. This will automatically delete the oldest dataset from the cache regardless of the Xfer State.

26.4 Different Types of Transfer

There can be three types of transfer:

Peer to Peer Transfer—This transfer could be one of the 2 types described below:

a. From an Ink Refill QA Device to a Ink QA Device. This is performed when the Ink QA Device is refilled by the Ink Refill QA Device.

b. From one Ink Refill QA Device to another Ink Refill QA Device, where both QA Devices belong to the same OEM. This is typically performed when OEM divides ink from one Ink Refill QA Device to another Ink Refill QA Device, where both devices belong to the same OEM Heirachical Transfer—This is a transfer from one Ink Refill QA Device to another Ink Refill QA Device, where the QA Devices belong to different organisation, say ComCo and OEM. This is typically performed when ComCo divides ink from its refill device to several refill devices belonging to several OEMs.

Figure 381:
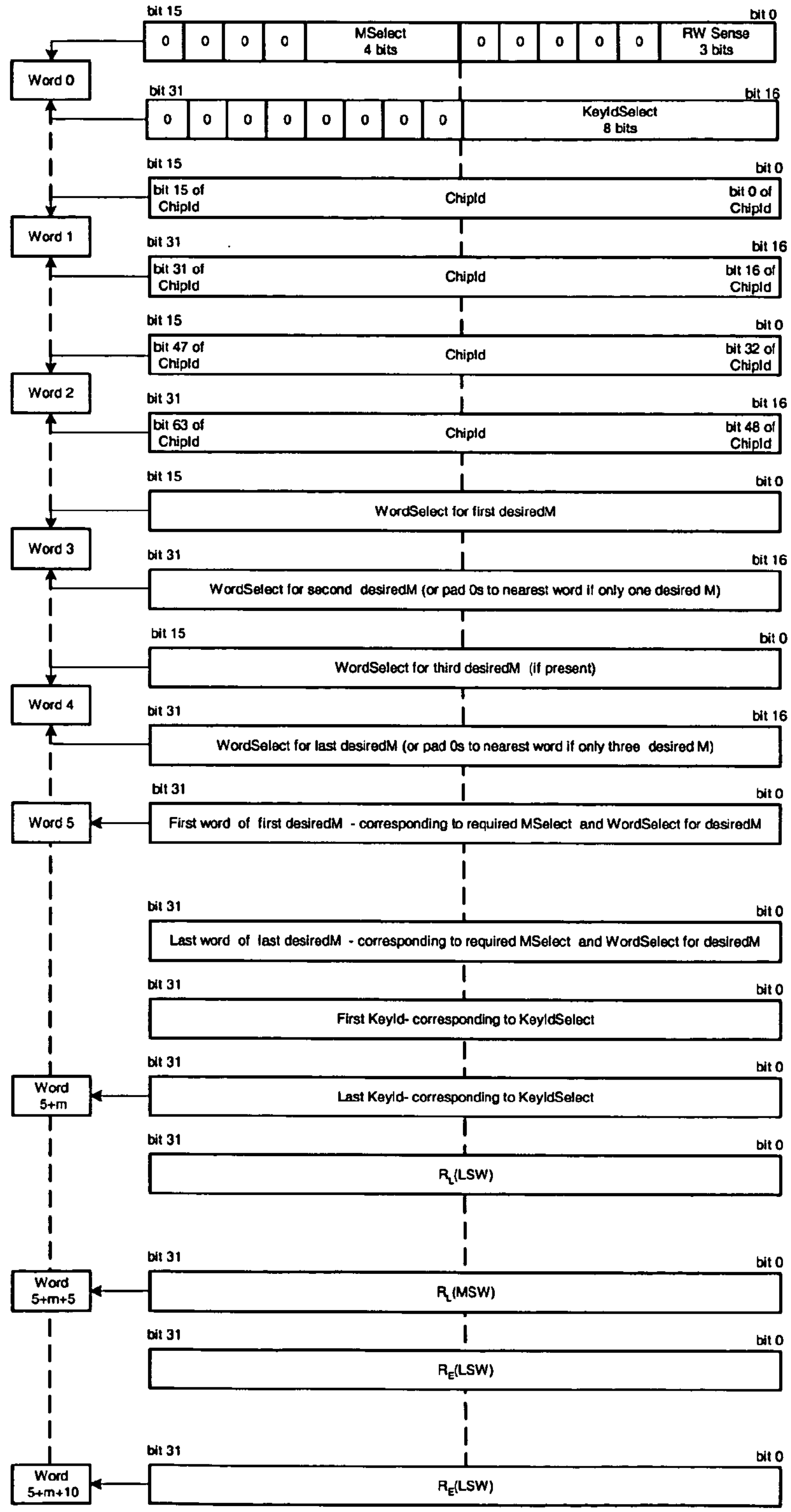

FIG. 381 is a representation of various authorised ink refill paths in the printing system.

26.4.1 Hierarchical Transfer

Referring to FIG. 381, this transfer is typically performed when ink is transferred from ComCo's Ink Refill QA Device to OEM's Ink Refill QA Device, or from QACo's Ink Refill QA Device to ComCo's Ink Refill QA Device.

26.4.1.1 Keys and Access Permission

We will explain this using a transfer from ComCo to OEM.

There is an ink-remaining field associated with the ComCo's Ink Refill QA Device. This ink-remaining field has two keys associated with:

The first key transfers ink to the device from another refill device (which is higher in the heirachy), fills/refills (upgrades) the device itself. This key has authenticated ReadWrite permission to the field.

The second key transfers ink from it to other devices (which are lower in the heirachy), fills/refills (upgrades) other devices from it. This key has authenticated decrement-only permission to the field.

There is an ink-remaining field associated with the OEM's Ink refill device. This ink-remaining field has a single key associated with:

This key transfers ink to the device from another refill device (which is higher or at the same level in the hierarchy), fills/refills (upgrades) the device itself, and additionally transfers ink from it to other devices (which are lower in the heirachy), fills/refills (upgrades) other devices from it. Therefore, this key has both authenticated ReadWrite and decrement-only permission to the field. For a successful transfer ink from ComCo's refill device to an OEM's refill device, the ComCo's refill device and the OEM's refill device must share a common key or a variant key. This key is fill/refill key with respect to the OEM's refill device and it is the transfer key with respect to the ComCo's refill device.

For a ComCo to successfully fill/refill its refill device from another refill device (which is higher in the heirachy possibly belonging to the QACo), the ComCo's refill device and the QACo's refill device must share a common key or a variant key. This key is fill/refill key with respect to the ComCo's refill device and it is the transfer key with respect to the QACo's refill device.

26.4.1.1.1 Ink—Remaining Field Information

Table 287 shows the field information for an $_{M0}$ field storing logical ink-remaining amounts in the refill device and which has the ability to transfer down the heirachy.

| Attribute Name | Value | Explanation |
|---|---|---|
| Type | For e.g - TYPE_HIGHQUALITY_BLACK_INK[a] | Type describing the logical ink stored in the ink-remaining field in the refill device. |
| KeyNum | Slot number of the refill key. | Only the refill key has authenticated ReadWrite access to this field. |
| Non Auth RW Perm[b] | 0 | Non authenticated ReadWrite is not allowed to the field. |
| Auth RW Perm[c] | 1 | Authenticated (key based) ReadWrite access is allowed to the field. |
| KeyPerm | KeyPerms[KeyNum] = 0 | KeyNum is the slot number of the refill key, which has ReadWrite permission to the field. |
| | KeyPerms [Slot Num of transfer key] = 1 | Transfer key can decrement the field. |
| | KeyPerms[others = 0 . . . 7(except transfer key)] = 0 | All other keys have ReadOnly access. |
| End Pos | Set as required. | Depends on the amount of logical ink the device can |

-continued

| Attribute Name | Value | Explanation |
|---|---|---|
| | | store and storage resolution - i.e in picolitres or in microlitres. |

[a]This is a sample type only and is not included in the Type Map in Appendix A.
[b]Non authenticated Read Write permission.
[c]Authenticated Read Write permission.

26.4.2 Peer to Peer Transfer

Referring to FIG. 381, this transfer is typically performed when ink is transferred from OEM's Ink Refill Device to another Ink Refill Device belonging to the same OEM, or OEM's Ink Refill Device to Ink Device belonging to the same OEM.

26.4.2.1 Keys and Access Permission

There is an ink-remaining field associated with the refill device which transfers ink amounts to other refill devices (peer devices), or to other ink devices. This ink-remaining field has a single key associated with:

This key transfers ink to the device from another refill device (which is higher or at the same level in the heirachy), fills/refills (upgrades) the device itself, and additionally transfers ink from it to other devices (which are lower in the heirachy), fills/refills (upgrades) other devices from it.

This key is referred to as the fill/refill key and is used for both fill/refill and transfer. Hence, this key has both Read-Write and Decrement-Only permission to the ink-remaining field in the refill device.

26.4.2.1.1 Ink-Remaining Field Information

Table 288 shows the field infromation for an $_{M0}$ field logical ink-reamaining amounts in the refill device with the ability to transfer between peers.

27 Functions 27.1 XferAmount

Input: KeyRef, $_{M0}$OfExternal, $_{M1}$OfExternal, ChipId, FieldNumL, FieldNumE, XferValLength, XferVal, InputParameterCheck (optional), $R_E$, $SIG_E$, $R_{E2}$ Output: ResultFlag, FieldSelect, FieldVal, $R_{L2}$, $SIG_{out}$ Changes: $_{M0}$ and $R_L$ Availability Ink refill QA Device 27.1.1 Function Description The XferAmount function produces data and signature for updating a given $_{M0}$ field. This data and signature when applied to the appropriate device through the WriteFields-Auth function, will update the $_{M0}$ field of the device.

The system calls the XferAmount function on the upgrade device with a certain XferVal, this XferVal is validated by the XferAmount function for various rules as described in Section 27.1.4, the function then produces the data and signature for the passing into the WriteFieldsAuth function for the device being upgraded.

The transfer amount output consists of the new data for the field being upgraded, field data of the two sequence fields, and a signature using the refill key. When a transfer output is produced, the sequence field data in SEQ_1 is decremented by 2 from the previous value (as passed in with

| Attribute Name | Value | Explanation |
|---|---|---|
| Type | For e.g - TYPE_HIGHQUALITY_BLACK_INK[a] | Type describing the logical ink stored in the ink-remaining field in the refill device. |
| KeyNum | Slot number of the refill key. | Only the refill key has authenticated ReadWrite access to this field. |
| Non Auth RW Perm[b] | 0 | Non authenticated ReadWrite is not allowed to the field. |
| Auth RW Perm[c] | 1 | Authenticated (key based) ReadWrite access is allowed to the field. |
| KeyPerm | KeyPerms[KeyNum] = 1 | KeyNum is the slot number of the refill key, which has ReadWrite and Decrement permission to the field. |
| | KeyPerms[others = 0 . . . 7(except KeyNum)] = 0 | All other keys have ReadOnly access. |
| End Pos | Set as required. | Depends on the amount of logical ink the device can store and storage resolution - i.e in picolitres or in microlitres. |

[a]This is a sample type only and is not included in the Type Map in Appendix A.
[b]Non authenticated Read Write permission.
[c]Authenticated Read Write permission.

the input), and the sequence field data in SEQ_2 is decremented by 1 from the previous value (as passed in with the input).

Additional InputParameterCheck value must be provided for the parameters not included in the $SIG_E$, if the transmission between the System and Ink Refill QA Device is error prone, and these errors are not corrected by the transimission protocol itself. InputParameterCheck is SHA-1 [FieldNumL|FieldNumE|XferValLength|XferVal], and is required to ensure the integrity of these parameters, when these inputs are received by the Ink Refill QA Device. This will prevent an incorrect transfer amount being deducted.

The XferAmount function must first calculate the SHA-1[FieldNumL|FieldNumE|XferValLength|XferVal], compare the calculated value to the value received (InputParameterCheck) and only if the values match act upon the inputs.

27.1.2 Input Parameters

Table 289 describes each of the input parameters for XferAmount function.

| Parameter | Description |
|---|---|
| KeyRef | For comsmon key input and output signature: KeyRef.keyNum = Slot number of the key to be used for testing input signature and producing the output signature. $SIG_E$ produced using $K_{KeyRef.keyNum}$ by the QA Device being upgraded. SIGout produced using $K_{KeyRef.keyNum}$ for delivery to the QA Device being upgraded. KeyRef.useChipId = 0<br>For variant key input and output signatures: KeyRef.keyNum = Slot number of the key to be used for generating the variant key. $SIG_E$ produced using a variant of $K_{KeyRef.keyNum}$ by the QA Device being upgraded. SIGout produced using a variant of $K_{KeyRef.keyNum}$ for delivery to the QA Device being upgraded.<br>KeyRef.useChipId = 1 KeyRef.chipId = ChipId of the device which generated $SIG_E$ and will receive SIGout. |
| $_{M0}$OfExternal | All 16 words of $_{M0}$ of the QA Device being upgraded. |
| $_{M1}$OfExternal | All 16 words of $_{M1}$ of the QA Device being upgraded. |
| ChipId | ChipId of the QA Device being upgraded. |
| FieldNumL | $_{M0}$ field number of the local (refill) device from which the value will be transferred. |
| FieldNumE | $_{M0}$ field number of the QA Device being upgraded to which the value will be transferred. |
| XferValLength | XferVal length in words. Non zero length required. |
| XferVal | The logical amount that will be transferred from the local device to the external device. |
| $R_E$ | External random value used to verify input signature. This will be the R from the input signature generator (i.e device generating $SIG_E$). The input signal generator in this case, is the device being upgraded or a translation device. |
| $R_{E2}$ | External random value used to produce output signature. This will be R obtained by calling the Random function on the device which will receive the $SIG_{out}$ from the XferAmount function. The device receiving the $SIG_{out}$ in this case, is the device being upgraded or a translation device. |
| $SIG_E$ | External signature required for authenticating input data. The input data in this case, is the output from the Read function performed on the device being upgraded.<br>A correct $SIG_E = SIG_{KeyRef}(Data \mid R_E \mid R_L)$. |

27.1.2.1 Input Signature Verification Data Format

The input signature passed in to the XferAmount function is the output signature from the Read function of the Ink QA Device.

Figure 382:
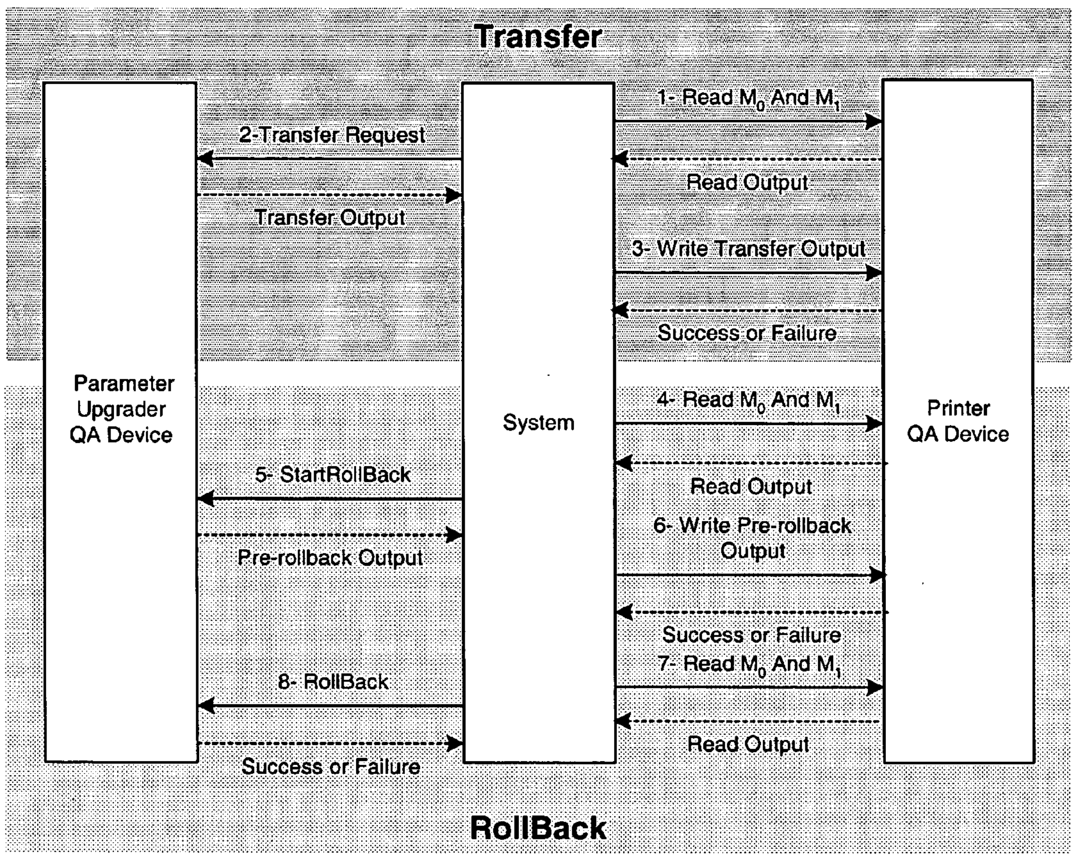

FIG. 382 shows the input signature verification data format for the XferAmount function.

Table 290 gives the parameters included in $SIG_E$ for XferAmount.

| Parameter | Length in bits | Value set internally | Value set from Input |
|---|---|---|---|
| RWSense | 3 | 000 Refer to Section 15.3.1.1 | |
| MSelect | 4 | 0011 | |
| KeyIdSelect | 8 | 00000000 | |
| ChipId | 48 | | ChipId of the QA Device being upgraded |
| WordSelect for $M_0$ | 16 | All bits set to 1 | |
| WordSelect for $M_1$ | 16 | All bits set to 1 | |
| M0 | 512 | | ● |
| M1 | 512 | | ● |
| $R_E$ | 160 | | ● |
| $R_L$ | 160 | Based on the internal R | ● |

The XferAmount function is not passed all the parameters required to generate $SIG_E$. For producing $SIG_L$ which is used to test $SIG_E$, the function uses the expected values of some the parameters.

27.1.3 Output Parameters

Table 291 describes each of the output parameters for XferAmount.

| Parameter | Description |
|---|---|
| ResultFlag | Indicates whether the function completed successfully or not. If it did not complete successfully, the reason for the failure is returned here. See Table 47. |
| FieldSelect | Selection of fields to be written<br>In this case the bit corresponding to SEQ_1 , SEQ_2 and to FieldNumE are set to 1.<br>All other bits are set to 0. |
| FieldVal | Updated data words for Sequence data field and FieldNumE for QA Device being upgraded. Starts with LSW of lower field.<br>This must be passed as input to the WriteFieldsAuth function of the QA Device being upgraded. |
| $R_{L2}$ | Internal random value required to generate output signature. This must be passed as input to the WriteFieldsAuth function or Translate function of the QA Device being upgraded. |
| $SIG_{out}$ | Output signature which must be passed as an input to the WriteFieldsAuth function of the QA Device being upgraded.<br>$SIG_{out} = SIG_{KeyRef}(data \mid R_{L2} \mid R_{E2})$ as per FIG. 373. |

TABLE 292

Result Flag definitions for XferAmount

| ResultFlag Definition | Description |
|---|---|
| FieldNumEInvalid | FieldNum to which the amount is being transferred, or which is being upgraded in the QA Device being upgraded is invalid. |
| SeqFieldInvalid | The sequence field for the QA Device being upgraded is invalid. |
| FieldNumEWritePermInvalid | FieldNum to which the amount is being transferred, or which is |

TABLE 292-continued

Result Flag definitions for XferAmount

| ResultFlag Definition | Description |
| --- | --- |
| | being upgraded in the QA Device being upgraded has no authenticated write permission. |
| FieldNumLInvalid | FieldNum from which the amount is being transferred, or from which the value is being copied in the Upgrading QA Device is invalid. |
| FieldNumLWritePermInvalid | FieldNum from which the amount is being transferred in the Upgrading QA Device has no authenticated permission, or no authenticated permission with the KeyRef. |
| TypeMismatch | Type of the data from which the amount is being transferred in the Upgrading QA Device, doesn't match the Type of data to which the amount in being transferred in the Device being upgraded. |
| UpgradeFieldEInvalid | Only applicable for transferring count-remaining values. The upgrade field associated with the count-remaining field in the QA Device being upgraded is invalid. |
| UpgradeFieldLInvalid | Only applicable for transferring count-remaining values. The upgrade field associated with the count-remaining field in the Upgrading QA Device is invalid. |
| UpgradeFieldMismatch | Only applicable for transferring count-remaining values. Type of the data in the upgrade field in the Upgrading QA Device, doesn't match the Type of data in the upgrade field in the Device being upgraded. |
| FieldNumESizeInsufficient | FieldNum to which the amount is being transferred, or which is being upgraded in the QA Device is not big enough to store the transferred data. |
| FieldNumLAmountInsufficient | FieldNum in the Upgrading QA Device from which the amount is being transferred doesn't have the amount required for the transfer. |

27.1.3.1 $SIG_{out}$

Refer to Section 20.2.1 for details.

27.1.4 Function Sequence

The XferAmount command is illustrated by the following pseudocode:

```
Accept input parameters-KeyRef, M0OfExternal, M1OfExternal,
ChipId, FieldNumL, FieldNumE, XferValLength
# Accept XferVal words
For i ←0 to XferValLength
    Accept next XferVal
EndFor
Accept R_E, SIG_E, R_E2
#Generate message for passing into ValidateKeyRefAndSignature
function
data ←(RWSense|MSelect|KeyIdSelect|ChipId|WordSelect|M0|M1)
        # Refer to Figure 382.
----------------------------------------------------------------
# Validate KeyRef, and then verify signature
ResultFlag = ValidateKeyRefAndSignature(KeyRef,data,R_E,R_L)
If (ResultFlag ≠ Pass)
    Output ResultFlag
    Return
```

-continued

```
EndIf
----------------------------------------------------------------
#Validate FieldNumE
# FieldNumE is present in the device being upgraded
PresentFlagFieldNumE ←GetFieldPresent(M1OfExternal, Field-
NumE)
# Check FieldNumE present flag
If(PresentFlagFieldNumE ≠ 1)
    ResultFlag ←FieldNumEInvalid
    Output ResultFlag
    Return
EndIf
----------------------------------------------------------------
---------------
# Check Seq Fields Exist and get their Field Num
# Get Seqdata field SEQ_1 num for the device being upgraded
XferSEQ_1FieldNum←GetFieldNum(M1OfExternal, SEQ_1)
# Check if the Seqdata field SEQ_1 is valid
If(XferSEQ_1FieldNum invalid)
    ResultFlag ←SeqFieldInvalid
    Output ResultFlag
    Return
EndIf
# Get Seqdata field SEQ_2 num for the device being upgraded
XferSEQ_2FieldNum←GetFieldNum(M1OfExternal, SEQ_2)
# Check if the Seqdata field SEQ_2 is valid
If(XferSEQ_2FieldNum invalid)
    ResultFlag ←SeqFieldInvalid
    Output ResultFlag
    Return
EndIf
----------------------------------------------------------------
#Check write permission for FieldNumE
PermOKFieldNumE ←CheckFieldNumEPerm(M1OfExternal,
FieldNumE)
If(PermOKFieldNumE ≠1)
    ResultFlag ←FieldNumEWritePermInvalid
    Output ResultFlag
    Return
EndIf
----------------------------------------------------------------
#Check that both SeqData fields have Decrement-Only
permission with the same key
#that has write permission on FieldNumE
PermOKXferSeqData ←CheckSeqDataFieldPerms(M1OfExternal,
                XferSEQ_1FieldNum,
XferSEQ_2FieldNum, FieldNumE)
If(PermOKXferSeqData ≠1)
    ResultFlag ←SeqWritePermInvalid
    Output ResultFlag
    Return
EndIf
----------------------------------------------------------------
# Get SegData SEQ_1 data from device being upgraded
GetFieldDataWords(XferSEQ_1FieldNum,
    XferSEQ_1DataFromDevice,M0OfExternal, M1OfExternal)
# Get SeqData SEQ_2 data from device being upgraded
GetFieldDataWords(XferSEQ_2FieldNum,
                XferSEQ_2DataFromDevice,
M0OfExternal,M1OfExternal)
----------------------------------------------------------------
# FieldNumL is a present in the refill device
PresentFlagFieldNumL ←GetFieldPresent(M1,FieldNumL)
If(PresentFlagFieldNumL ≠ 1)
    ResultFlag ←FieldNumLInvalid
    Output ResultFlag
    Return
EndIf
#Check permission for FieldNumL
PermOKFieldNumL ←CheckFieldNumLPerm(M1,
FieldNumL,KeyRef)
If(PermOKFieldNumL ≠ 1)
    ResultFlag ←FieldNumLWritePermInvalid
    Output ResultFlag
    Return
EndIf
----------------------------------------------------------------
#Find the type attribute for FieldNumE
TypeFieldNumE ←FindFieldNumType(M1OfExternal,FieldNumE)
```

-continued

```
    #Find the type attribute for FieldNumL
    TypeFieldNumE ←FindFieldNumType(M1,FieldNumL)
    # Check type attribute for both fields match
    If(TypeFieldNumE ≠TypeFieldNumL)
        ResultFlag ←TypeMismatch
        Output ResultFlag
        Return
EndIf
```

Do this if the Refill Device is tranferring Count-remaining for Printer upgrades

```
# If the Type is count remaining, check that upgrade values
associated with
# the count remaining are valid. Refer to Section 28. for further
details on
# count remaining and upgrade value.
If(TypeFieldNumL = TYPE_COUNT_REMAINING)∧(TypeFieldNumE
=TYPE_COUNT_REMAINING)
    #Upgrade value field is lower adjoining field
    UpgradeValueFieldNumE = FieldNumE −1
    If(UpgradeValueFieldNumE < 0) # upgrade field doesn't exist for
QA Device being upgraded
        ResultFlag ←UpgradeFieldEInvalid
        Output ResultFlag
        Return
    EndIf
    UpgradeValueFieldNumL = FieldNumL − 1
    If(UpgradeValueFieldNumL < 0) # upgrade field doesn't existfor
local device
        ResultFlag ←UpgradeFieldLInvalid
        Output ResultFlag
        Return
    EndIf
    UpgradeValueCheckOK←
UpgradeValCheck(UpgradeValueFieldNumL,M0,M1,
    UpgradeValueFieldNumL,M0OfExternal,M1OfExternal,KeyRef)
    If(UpgradeValueCheckOK = 0)
        ResultFlag ←UpgradeFieldMismatch
        Output ResultFlag
        Return
    EndIf
EndIf
# Do this if Field Type is Count Remaining........end
----------------------------------------------------------------
#Check whether the device being upgraded can hold the transfer
amount
#(XferVal + AmountLeft
OverFlow←CanHold(FieldNumE,M0OfExternal,XferVal)
If OverFlow error
    ResultFlag ←FieldNumESizeInsufficient
    Output ResultFlag
    Return
EndIf
----------------------------------------------------------------
#Check the refill device has the desired amount (XferVal < =
AmountLeft)
UnderFlow ←HasAmount(FieldNumL,M0,XferVal)
If UnderFlow error
    ResultFlag ←FieldNumLAmountInsufficient
    Output ResultFlag
    Return
EndIf
----------------------------------------------------------------
# All checks complete .....
# Generate Seqdata for SEQ_1 and SEQ_2 fields
XferSEQ_1DataToDevice = XferSEQ_1DataFromDevice − 2
XferSEQ_2DataToDevice = XferSEQ_2DataFromDevice − 1
# Add DataSet to Xfer Entry Cache
AddDataSetToXferEntryCache(ChipId,FieldNumE, FieldNumL,
XferLength, XferVal, XferSEQ_1DataFromDevice,
XferSEQ_2DataFromDevice)
# Get current FieldDataE field data words to write to Xfer Entry
cache
GetFieldDataWords(FieldNumE,FieldDataE M0OfExternal,
```

-continued

```
M1OfExternal)
#Deduct XferVal from FieldNumL and Write new value
DeductAndWriteValToFieldNumL(XferVal,FieldNumL,M0)
#Generate new field data words for FieldNumE. The current
FieldDataE is added to
# XferVal to generate new FieldDataE
GenerateNewFieldData(FieldNumE,XferVal,FieldDataE)
# Generate FieldSelect and FieldVal for SeqData field SEQ_1, SEQ_2
and
# FieldDataE...
CurrentFieldSelect← 0
FieldVal ←0
GenerateFieldSelectAndFieldVal(FieldNumE, FieldDataE,
XferSEQ_1FieldNum, XferSEQ_1DataToDevice,XferSEQ_2FieldNum,
XferSEQ_2DataToDevice,
FieldSelect,FieldVal)
#Generate message for passing into GenerateSignature function
data ←(RWSense|FieldSelect|ChipId|FieldVal)# Refer to Figure 373.
#Create output signature for FieldNumE
SIG_out←GenerateSignature(KeyRef,data,R_L2,R_E2)
Update R_L2 to R_L3
ResultFlag ←Pass
Output ResultFlag, FieldData, R_L2,SIG_out
Return
EndIf
```

27.1.4.1 ResultFlag ValidateKeyRefAndSignature(KeyRef,data,$R_E$,$R_L$)

This function checks KeyRef is valid, and if KeyRef is valid, then input signature is verified using KeyRef.

```
    CheckRange(KeyRef.keyNum)
    If invalid
        ResultFlag ←InValidKey
        Output ResultFlag
        Return
    EndIf
    #Generate message for passing into GenerateSignature function
    data ←(RWSense|MSelect|KeyIdSelect|ChipId|WordSelect|M0|M1)
            # Refer to Figure 382.
    #Generate Signature
    SIG_L ←GenerateSignature(KeyRef,data,R_E,R_L)
    # Check input signature SIG_E
    If(SIG_L = SIG_E)
        Update R_L to R_L2
    Else
        ResultFlag ←Bad Signature
        Output ResultFlag
        Return
    EndIf
```

27.1.4.2 GenerateFieldSelectAndFieldVal (FieldNumE, FieldDataE, XferSEQ_1FieldNum, XferSEQ_1DataToDevice, XferSEQ_2FieldNum, XferSEQ_2DataToDevice, FieldSelect, FieldVal)

This functions generates the FieldSelect and FieldVal for output from FieldNumE and its final data, and data to be written to Seq fields SEQ_1 and SEQ_2.

27.1.4.3 PresentFlag GetFieldPresent(M1,FieldNum)

This function checks whether FieldNum is a valid.

```
FieldSize[16] ←0 # Array to hold FieldSize assuming there are 16
fields
NumFields← FindNumberOfFieldsInM0(M1,FieldSize) #Refer to Section
19.4.1
If(FieldNum< NumFields)
    PresentFlag← 1
```

-continued

```
Else
    PresentFlag← 0
EndIf
Return PresentFlag
```

27.1.4.4 NumFields FindNumOfFieldsInM0(M1,FieldSize[ ])

Refer to FIG. 19.4.1 for details.

27.1.4.5 FieldNum GetFieldNum(M1, Type)

This function returns the field number based on the Type.

```
FieldSize[16] ←0 # Array to hold FieldSize assuming there are 16
fields
NumFields← FindNumberOfFieldsInM0(M1,FieldSize) #Refer to Section
19.4.1
For i = 0 to NumFields
    If(M1[i].Type = Type)
        Return i # This is field Num for matching field
EndFor
i = 255 # If XferSession field was not found then return an
invalid value
Return i
```

27.1.4.6 PermOK CheckFieldNumEPerm(M1,FieldNumE)

This function checks authenticated write permission for FieldNum which holds the upgraded value.

```
AuthRW ←M1[FieldNum].AuthRW
NonAuthRW ←M1[FieldNum].NonAuthRW
If(AuthRW = 1) ∧(NonAuthRW = 0)
    PermOK ←1
Else
```

-continued

```
        PermOK ←0
    EndIf
    Return PermOK
```

27.1.4.7 PermOK CheckSeqDataFieldPerms(M1, XferSEQ_1FieldNum, XferSEQ_2FieldNum, FieldNumE)

This function checks that both SeqData fields have Decrement-Only permission with the same key that has write permission on FieldNumE.

```
KeyNumForFieldNumE ←M1[FieldNumE].KeyNum # Isolate KeyNum for the
field that will
                                          # be upgraded
# Isolate KeyNum for both SeqData fields and check that they can
be written using the same key
KeyNumForSEQ_1 ←M1[XferSEQ_1FieldNum].KeyNum
KeyNumForSEQ_2 ←M1[XferSEQ_2FieldNum].KeyNum
If(KeyNumForSEQ_1 ≠KeyNumForSEQ_2)
    PermOK ←0
    Return PermOK
EndIf
# Check that the write key for FieldNumE and SeqData field is not
the same
If (KeyNumForSEQ_1 = KeyNumForFieldNumE)
    PermOK ←0
    Return PermOK
EndIf
#Isolate Decrement-Only permissions with the write key of
FieldNumE
KeyPermsSEQ_1 ←M1[XferSEQ_1FieldNum].KeyPerms[KeyNumForFieldNumE]
KeyPermsSEQ_2 ←M1[XferSEQ_2FieldNum].KeyPerms[KeyNumForFieldNumE]
# Check that both sequence fields have Decrement-Only permission
for this key
If(KeyPermsSEQ_1 =0) ∨(KeyPermsSEQ_2 = 0)
    PermOK ←0
    Return PermOK
EndIf
PermOK ←1
Return PermOK
```

27.1.4.8 AddDataSetToXferEntryCache (ChipId, FieldNumE, FieldNumL, XferVal, SEQ_1Data, SEQ_2Data)

This function adds a new dataset to the Xfer Entry cache. Dataset is a single record in the Xfer Entrycache. Refer to Section 27 for details.

```
# Search for matching ChipId FieldNumE is Cache
DataSet ←SearchDataSetInCache (ChipId, FieldNumE)
# If found
If(DataSet is valid)
    DeleteDataSetInCache(DataSet) # This creates a vacant dataset
    AddRecordToCache(ChipId, FieldNumE,FieldDataL, XferVal,
    SEQ_1Data,
SEQ_2Data)
EndIf
# Searches the cache for XferState complete/deleted
Found←SearchRecordsInCache(complete/deleted)
If (Found =1)
    AddRecordToCache(ChipId, FieldNumE,FieldDataL, XferVal,
    SEQ_1Data,
SEQ_2Data)
Else
    # This will overwrite the oldest DataSet in cache
    AddRecordToCache(ChipId, FieldNumE,FieldDataL, XferVal,
    SEQ_1Data,
SEQ_2Data)
```

-continued

```
    Return
Endif
Set XferState in record to Xfer
Return
```

27.1.4.9 FieldType FindFieldNumType(M1,FieldNum)

This function gets the Type attribute for a given field.

FieldType←M1[FieldNum].Type

Return FieldType 27.1.4.10 PermOK CheckFieldNumLPerm(M1, FieldNumL, KeyRef)

This function checks authenticated write permissions using KeyRef for FieldNumL in the refill device.

```
AuthRW ←M1[FieldNumL].AuthRW
KeyNumAtt ←M1[FieldNumL].KeyNum
DOForKeys ←M1[FieldNumL].DOForKeys[KeyNum]
# Authenticated write allowed
# ReadWrite key for field is the same as Input KeyRef.keyNum
# Key has both ReadWrite and DecrementOnly Permission
If(AuthRW = 1) ∧(KeyRef.keyNum = KeyNumAtt) ∧(DOForKeys = 1
    PermOK← 1
Else
    PermOK← 0
EndIf
Return PermOK
```

27.1.4.11 CheckOK UpgradeValCheck(FieldNum1, M0OfFieldNum1, M1OfFieldNum1, FieldNum2, M0OfFieldNum2, M1OfFieldNum2,KeyRef)

This function checks the upgrade value corresponding to the count remaining. The upgrade value corresponding to the count remaining field is stored in the lower adjoining field. To upgrade the count remaining field, the upgrade value in refill device and the device being upgraded must match.

```
#Check authenticated write permissions is allowed to the field
#Check that only one key has ReadWrite access,
#and all other keys are ReadOnly access
PermCheckOKFieldNum1
←CheckUpgradeKeyForField(FieldNum1,M1OfFieldNum1,KeyRef)
If(PermCheckOKFieldNum1 ≠ 1)
    CheckOK ←0
    Return CheckOK
EndIf
PermCheckOKFieldNum2
←CheckUpgradeKeyForField(FieldNum2,M1OfFieldNum2,KeyRef)
If(PermCheckOKFieldNum2 ≠ 1)
    CheckOK ←0
    Return CheckOK
EndIf
#Get the upgrade value associated with field
GetFieldDataWords(FieldNum1,UpgradeValueFieldNum1,
M0OfFieldNum1, M1OfFieldNum1)
#Get the upgrade value associated with field
GetFieldDataWords(FieldNum2,UpgradeValueFieldNum2,
M0OfFieldNum2, M1OfFieldNum2)
If(UpgradeValueFieldNuml ≠ UpgradeValueFieldNum2)
    CheckOK ←0
    Return CheckOK
EndIf
# Get the type attribute for the field
UpgradeTypeFieldNum1←GetUpgradeType(FieldNum1,M1OfFieldNum1)
UpgradeTypeFieldNum2←GetUpgradeType(FieldNum2,M1OfFieldNum2)
If(UpgradeTypeFieldNum1 ≠ UpgradeTypeFieldNum2)
    CheckOK ←0
    Return CheckOK
EndIf
```

-continued

```
CheckOK ←1
Return CheckOK
```

27.1.4.12 CheckOK CheckUpgradeKeyForField(FieldNum,M1,KeyRef)

This function checks that authenticated write permissions is allowed to the field. It also checks that only one key has ReadWrite access and all other keys have ReadOnly access. KeyRef which updates count remaining must not have write access to the upgarde value field.

```
KeyNum ←M1[FieldNum].KeyNum
AuthRW ←M1[FieldNum].AuthRW
NonAuthRW ←M1[FieldNum].NonAuthRW
DOForKeys←M1[FieldNum].DOForKeys
#Check that KeyRef doesn't have write permissions to the field
If(KeyRef.keyNum = KeyNum)
    CheckOK ←0
    Return CheckOK
EndIf
#AuthRW access allowed or NonAuthRW not allowed
If(AuthRW = 0) ∨(NonAuthRW =1)
    CheckOK ←0
    Return CheckOK
EndIf
For i ←0 to 7
    # Keys other than KeyNum are allowed ReadOnly access,
    # DecrementOnly access not allowed for other keys (not KeyNum)
    If (i ≠KeyNum) ∧(DOForKeys[i] = 1)
        CheckOK ←0
        Return CheckOK
    EndIf
    #ReadWrite access allowed for KeyNum,
    #ReadWrite and DecrementOnly access not allowed for KeyNum.
    If (i = KeyNum) ∧(DOForKeys[i] = 1)
        CheckOK ←0
        Return CheckOK
    EndIf
EndFor
CheckOK ←1
Return CheckOK
```

27.1.4.13 Upgrade Type GetUpgrade Type(FieldNum, M1)

This function gets the type attribute for the upgrade field.

UpgradeType GetUpgradeType(FieldNum)

UpgradeType←M1[FieldNum].Type

Return UpgradeType 27.1.4.14 GetFieldDataWords(FieldNum,FieldData[ ], M0, M1)

This function gets the words corresponding to a given field.

```
CurrPos ←MaxWordInM
If FieldNum = 0
    CurrPos ←MaxWordInM
Else
    CurrPos ←(M1[FieldNum −1].EndPos) −1 # Next lower word after
last word of the
                                # previous
field
EndIf
EndPos ←(M1[FieldNum].EndPos)
For i ←EndPos to CurrPos j ←0
    FieldData[j] ←M0[i]   #Copy M0 word to FieldData array
EndFor
```

27.2 StartRollBack

Input: KeyRef, $_{M0}$OfExternal, $_{M1}$OfExternal, ChipId, FieldNumL, FieldNumE, InputParameterCheck (optional), $R_E$, $SIG_E$, $R_{E2}$ Output: ResultFlag, FieldSelect, FieldVal, $R_{L2}$, $SIG_{out}$ Changes: $_{M0}$ and $R_L$ Availability Ink refill QA Device and Parameter Upgrader QA Device 27.2.1 Function Description StartRollBack function is used to start a rollback sequence if the QA Device being upgraded didn't receive the transfer message correctly and hence didn't receive the transfer.

The system calls the function on the upgrading QA Device, passing in FieldNumE and ChipId of the QA Device being upgraded, and FieldNumL of the upgrading QA Device. The upgrading QA Device checks that the QA Device being upgraded didn't actually receive the message correctly, by comparing the values read from the device with the values stored in the Xfer Entry cache. The values compared is the value of the sequence fields. After all checks are fulfilled, the upgrading QA Device produces the new data for the sequence fields and a signature. This is subsequently applied to the QA Device being upgraded (using the WriteFieldAuth function), which updates the sequence fields SEQ_1 and SEQ_2 to the pre-rollback values. However, the new data for the sequence fields and signature can only be applied if the previous data for the sequence fields produced by Xfer function has not been written.

The output from the StartRollBack function consists only of the field data of the two sequence fields, and a signature using the refill key. When a pre-rollback output is produced, then sequence field data in SEQ_1 (as stored in the Xfer Entry cache, which is what is passed in to the XferAmount function) is decremented by 1 and the sequence field data in SEQ_2 (as stored in the Xfer Entry cache, which is what is passed in to the XferAmount function) is decremented by 2.

Additional InputParameterCheck value must be provided for the parameters not included in the $SIG_E$, if the transmission between the System and Ink Refill QA Device is error prone, and these errors are not corrected by the transimission protocol itself. InputParameterCheck is SHA-1[FieldNumL|FieldNumE], and is required to ensure the integrity of these parameters, when these inputs are received by the Ink Refill QA Device.

The StartRollBack function must first calculate the SHA-1[FieldNumL|FieldNumE], compare the calculated value to the value received (InputParameterCheck) and only if the values match act upon the inputs.

27.2.2 Input Parameters

Table 293 describes each of the input parameters for StartRollback function.

| Parameter | Description |
|---|---|
| KeyRef | For common key input signature: KeyRef.keyNum = Slot number of the key to be used for testing input signature. $SIG_E$ produced using $K_{KeyRef.keyNum}$ by the QA Device being upgraded. KeyRef.useChipId = 0<br>For variant key input signature: KeyRef.keyNum = Slot number of the key to be used for generating the variant key for testing input signature. $SIG_E$ produced using a variant of $K_{KeyRef.keyNum}$ by the QA Device being upgraded.<br>KeyRef.useChipId = 1 KeyRef.chipId = ChipId of the device which generated $SIG_E$. |
| $_{M0}$OfExternal | All 16 words of $_{M0}$ of the QA Device being upgraded which failed to upgrade. |
| $_{M1}$OfExternal | All 16 words of $_{M1}$ of the QA Device being upgraded which failed to upgrade. |
| ChipId | ChipId of the QA Device being upgraded which failed to upgrade. |
| FieldNumL | $_{M0}$ field number of the local (refill) device from which the value was supposed to transferred. |
| FieldNumE | $_{M0}$ field number of the QA Device being upgraded to which the value couldn't be transferred. |
| $R_E$ | External random value used to verify input signature. This will be the R from the input signature generator (i.e device generating $SIG_E$). The input signal generator in this case, is the device which failed to upgrade or a translation device. |
| $SIG_E$ | External signature required for authenticating input data. The input data in this case, is the output from the Read function performed on the device which failed to upgrade. A correct $SIG_E = SIG_{KeyRef}(Data \mid R_E \mid R_L)$. |

27.2.2.1 Input Signature Verification Data Format

Refer to Section 27.1.2.1.

27.2.3 Output Parameters

Table 294 describes each of the output parameters for StartRollback function.

| Parameter | Description |
|---|---|
| ResultFlag | Indicates whether the function completed successfully or not. If it did not complete successfully, the reason for the failure is returned here. See Section 12.1, Table 292 and Table 295. |
| FieldSelect | Selection of fields to be written<br>In this case the bits corresponding to SEQ_1 and SEQ_2 are set to 1.<br>All other bits are set to 0. |
| FieldVal | Updated data for sequence datat field for QA Device being upgraded. This must be passed as input to the WriteFieldsAuth function of the QA Device being upgraded. |
| $R_{L2}$ | Internal random value required to generate output signature. This must be passed as input to the WriteFieldsAuth function or Translate function of the QA Device being upgraded. |
| $SIG_{out}$ | Output signature which must be passed as an input to the WriteFieldsAuth function of the QA Device being upgraded.<br>$SIG_{out} = SIG_{KeyRef}(data \mid R_{L2} \mid R_{E2})$ as per FIG. 373. |

TABLE 295

Result definition for StartRollBack

| ResultFlag Definition | Description |
|---|---|
| RollBackInvalid | RollBack cannot be performed on the request because parameters for rollback is incorrect. |

27.2.3.1 $SIG_{out}$

Refer to Section 20.2.1 for details.

27.2.4 Function Sequence

The StartRollBack command is illustrated by the following pseudocode:

```
Accept input parameters-KeyRef, M0OfExternal, M1OfExternal, ChipId, FieldNumL,
FieldNumE, R_E, SIG_E, R_E2
Accept R_E, SIG_E, R_E2
#Generate message for passing into ValidateKeyRefAndSignature
function
data ←(RWSense|MSelect|KeyIdSelect|ChipId|WordSelect|M0|M1)
        # Refer to Figure 382.
---------------------------------------------------------------
# Validate KeyRef, and then verify signature
ResultFlag = ValidateKeyRefAndSignature(KeyRef,data,R_E,R_L)
If (ResultFlag ≠ Pass)
    Output ResultFlag
    Return
EndIf
---------------------------------------------------------------#
Check Seq Fields Exist and get their Field Num
# Get Seqdata field SEQ_1 num for the device being upgraded
XferSEQ_1FieldNum←GetFieldNum(M1OfExternal, SEQ_1)
# Check if the Seqdata field SEQ_1 is valid
If(XferSEQ_1FieldNum invalid)
    ResultFlag ←SeqFieldInvalid
    Output ResultFlag
    Return
EndIf
# Get Seqdata field SEQ_2 num for the device being upgraded
XferSEQ_2FieldNum←GetFieldNum(M1OfExternal, SEQ_2)
# Check if the Seqdata field SEQ_2 is valid
If(XferSEQ_2FieldNum invalid)
    ResultFlag ←SeqFieldInvalid
    Output ResultFlag
    Return
EndIf
---------------------------------------------------------------
# Get SeqData SEQ_1 data from device being upgraded
GetFieldDataWords(XferSEQ_1FieldNum,
    XferSEQ_1DataFromDevice,M0OfExternal,M1OfExternal)
# Get SeqData SEQ_2 data from device being upgraded
GetFieldDataWords(XferSEQ_2FieldNum,
                    XferSEQ_2DataFromDevice,
M0OfExternal,M1OfExternal)
---------------------------------------------------------------
# Check Xfer Entry in cache is correct - dataset exists, Field
data
# and sequence field data matches and Xfer State is correct
XferEntryOK ←CheckEntry(ChipId, FieldNumE, FieldNumL,
                XferSEQ_1DataFromDevice, XferSEQ_2DataFromDevice)
If( XferEntryOK= 0)
    ResultFlag ←RollBackInvalid
    Output ResultFlag
    Return
EndIf
# Generate Seqdata for SEQ_1 and SEQ_2 fields
XferSEQ_1DataToDevice = XferSEQ_1DataFromDevice - 1
XferSEQ_2DataToDevice = XferSEQ_2DataFromDevice - 2
# Generate FieldSelect and FieldVal for sequence fields SEQ_1 and
SEQ_2
CurrentFieldSelect← 0
FieldVal ←0
GenerateFieldSelectAndFieldVal(XferSEQ_1FieldNum,
XferSEQ_1DataToDevice, XferSEQ_2FieldNum, XferSEQ_2DataToDevice,
FieldSelect, FieldVal)
#Generate message for passing into GenerateSignature function
data ←(RWSense|FieldSelect|ChipId|FieldVal)# Refer to Figure 373.
#Create output signature for FieldNumE
SIG_out← GenerateSignature(KeyRef,data,R_L2,R_E2)
Update R_L2 to R_L3
ResultFlag ←Pass
Output ResultFlag, FieldData, R_L2 ,SIG_out
Return
EndIf
```

27.3 RollBackAmount

Input: KeyRef, $_{M0}$OfExternal, $_{M1}$OfExternal, ChipId, FieldNumL, FieldNumE, InputParameterCheck (optional), $R_E$, $SIG_E$ Output: ResultFlag Changes: $_{M0}$ and $R_L$ Availablity: Ink refill QA Device 27.3.1 Function Description RollBackAmount function finally adjusts the value of the FieldNumL of the upgarding QA Device to a previous value before the transfer request, if the QA Device being upgraded didn't receive the transfer message correctly (and hence was not upgraded).

The upgrading QA Device checks that the QA Device being upgraded didn't actually receive the transfer message correctly, by comparing the sequence data field values read from the device with the values stored in the Xfer Entry cache. The sequence data field values read must match what was previously written using the StartRollBack function. After all checks are fulfilled, the upgrading QA Device adjusts its FieldNumL.

Additional InputParameterCheck value must be provided for the parameters not included in the $SIG_E$, if the transmission between the System and Ink Refill QA Device is error prone, and these errors are not corrected by the transimission protocol itself. InputParameterCheck is SHA-1[FieldNumL|FieldNumE], and is required to ensure the integrity of these parameters, when these inputs are received by the Ink Refill QA Device.

The RollBackAmount function must first calculate the SHA-1[FieldNumL|FieldNumE], compare the calculated value to the value received (InputParameterCheck) and only if the values match act upon the inputs.

27.3.2 Input Parameters

Table 296 describes each of the input parameters for RollbackAmount function.

| Parameter | Description |
|---|---|
| KeyRef | For common key input signature: KeyRef.keyNum = Slot number of the key to be used for testing input signature. $SIG_E$ produced using $K_{KeyRef.keyNum}$ by the QA Device being upgraded. KeyRef.useChipId = 0 For variant key input signature: KeyRef.keyNum = Slot number of the key to be used for generating the variant key for testing input signature. $SIG_E$ produced using a variant of $K_{KeyRef.keyNum}$ by the QA Device being upgraded. KeyRef.useChipId = 1 KeyRef.chipId = ChipId of the device which generated $SIG_E$. |
| $_{M0}$OfExternal | All 16 words of $_{M0}$ of the QA Device being upgraded which failed to upgrade. |
| $_{M1}$OfExternal | All 16 words of $_{M1}$ of the QA Device being upgraded which failed to upgrade. |
| ChipId | ChipId of the QA Device being upgraded which failed to upgrade. |
| FieldNumL | $_{M0}$ field number of the local (refill) device from which the value was supposed to transferred. |
| FieldNumE | $_{M0}$ field number of the QA Device being upgraded to which the value was not transferred. |
| $R_E$ | External random value used to verify input signature. This will be the R from the input signature generator (i.e device generating $SIG_E$). The input signal generator in this case, is the device which failed to upgrade or a translation device. |
| $SIG_E$ | External signature required for authenticating input data. The input data in this case, is the output from the Read function performed on the device which failed to upgrade. A correct $SIG_E = SIG_{KeyRef}(Data \mid R_E \mid R_L)$. |

27.3.2.1 Input Signature Generation Data Format

Refer to Section 27.1.2.1 for details.

27.3.3 Output Parameters

| Parameter | Description |
|---|---|
| ResultFlag | Indicates whether the function completed successfully or not. If it did not complete successfully, the reason for the failure is returned here. See Section 12.1, Table 292 and Table 295. |

27.3.4 Function Sequence

The RollBackAmount command is illustrated by the following pseudocode:

```
Accept input parameters-KeyRef, M0OfExternal, M1OfExternal,
ChipId, FieldNumL, FieldNumE, RE,SIGE
#Generate message for passing into ValidateKeyRefAndSignature
function
data ←(RWSense|MSelect|KeyIdSelect|ChipId|WordSelect|M0|M1)
        # Refer to Figure 382.
----------------------------------------------------------------
# Validate KeyRef, and then verify signature
ResultFlag = ValidateKeyRefAndSignature(KeyRef,data,RE,RL)
If (ResultFlag ≠ Pass)
    Output ResultFlag
    Return
EndIf
----------------------------------------------------------------
# Check Seq Fields Exist and get their Field Num
# Get Seqdata field SEQ_1 num for the device being upgraded
XferSEQ_1FieldNum← GetFieldNum(M1OfExternal, SEQ_1)
# Check if the Seqdata field SEQ_1 is valid
If(XferSEQ_1FieldNum invalid)
    ResultFlag ←SeqFieldInvalid
    Output ResultFlag
    Return
EndIf
# Get Seqdata field SEQ_2 num for the device being upgraded
XferSEQ_2FieldNum← GetFieldNum(M1OfExternal, SEQ_2)
# Check if the Seqdata field SEQ_2 is valid
If(XferSEQ_2FieldNum invalid)
    ResultFlag ←SeqFieldInvalid
    Output ResultFlag
    Return
EndIf
----------------------------------------------------------------
# Get SeqData SEQ_1 data from device being upgraded
GetFieldDataWords(XferSEQ_1FieldNum,
    XferSEQ_1DataFromDevice,M0OfExternal,M1OfExternal)
# Get SeqData SEQ_2 data from device being upgraded
GetFieldDataWords(XferSEQ_2FieldNum,
                XferSEQ_2DataFromDevice,
M0OfExternal,M1OfExternal)
----------------------------------------------------------------
# Generate Seqdata for SEQ_1 and SEQ_2 fields with the data that
is read
XferSEQ_1Data = XferSEQ_1DataFromDevice + 1
XferSEQ_2Data = XferSEQ_2DataFromDevice + 2
# Check Xfer Entry in cache is correct - dataset exists, Field
data
# and sequence field data matches and Xfer State is correct
XferEntryOK ←CheckEntry(ChipId, FieldNumE, FieldNumL,
                XferSEQ_1Data, XferSEQ_2Data)
If( XferEntryOK= 0)
    ResultFlag ←RollBackInvalid
    Output ResultFlag
    Return
EndIf
# Get ΔFieldDataL from DataSet
GetVal(ChipId, FieldNumE, ΔFieldDataL)
# Add ΔFieldDataL to FieldNumL
AddValToField(FieldNumL, ΔFieldDataL)
# Update XferState in DataSet to complete/deleted
```

-continued

```
UpdateXferStateToComplete(ChipId, FieldNumE)
ResultFlag ←Pass
Output ResultFlag
Return
```

Functions

Upgrade Device (Printer Upgrade)

28 Concepts

This section is very similar to Section 26. The differences between this section and Section 26 have been summarised and underlined, where required.

28.1 Purpose

In a printing application, a printer contains a Printer QA Device, which stores details of the various operating parameters of a printer, some of which may be upgradeable. The upgradeable parameters must be written (initially) and changed in an authorised manner.

The authorisation for the write or change is achieved by using a Parameter Upgrader QA Device which contains the necessary functions to allow a write or a change of a parameter value (e.g. a print speed) into another QA Device, typically a printer QA Device. This QA Device is also referred to as an upgrading QA Device.

A parameter upgrader QA Device is able to perform a fixed number of upgrades, and this number is effectively a consumable value. The number of upgrades remaining is also referred to as count-remaining. With each write/change of an operating parameter in a Printer QA Device, the count-remaining decreases by 1, and can be replenished by a value upgrader QA Device.

The Parameter Upgrader QA Device can also be referred to as the Upgrading QA Device, and the Printer QA Device can also be referred to as the QA Device being upgraded.

The writing or changing of the parameter can also be referred to as a transfer of a parameter.

The Parameter Upgrader QA Device copies its parameter value field to the parameter value field of Printer QA Device, and decrements the count-remaining field associated with the parameter value field by 1.

28.2 Requirements

The transfer of a parameter has two basic requirements:

The transfer can only be performed if the transfer request is valid. The validity of the transfer request must be completely checked by the Parameter Upgrader QA Device, before it produces the required output for the transfer. It must not be possible to apply the transfer output to the Printer QA Device, if the Parameter Upgrader QA Device has been already been rolled back for that particular transfer.

A process of rollback is available if the transfer was not received by the Printer QA Device. A rollback is performed only if the rollback request is valid. The validity of the rollback request must be completely checked by the Parameter Upgrader QA Device, before the count-remaining value is incremented by 1. It must not be possible to rollback an Parameter Upgrader QA Device for a transfer, which has already been applied to the Printer QA Device i.e the Parameter Upgrader QA Device must only be rolled back for transfers that have actually failed.

28.3 Basic Scheme

Figure 383:
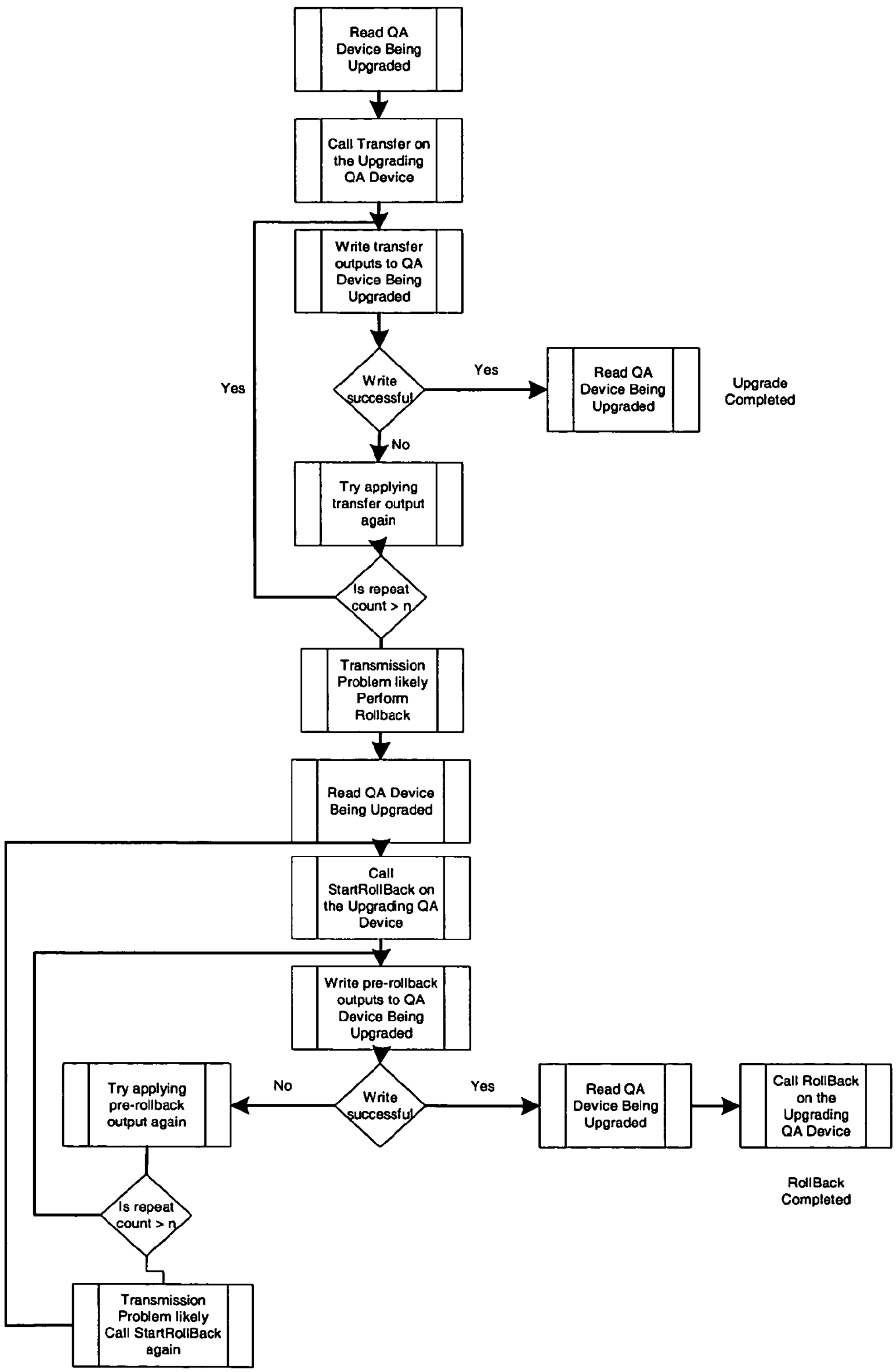

The transfer and rollback process is shown in FIG. 383.

Following is a sequential description of the transfer and rollback process:

1. The System Reads the memory vectors M0 and M1 of the Printer QA Device. The output from the read which includes the M0 and M1 words of the Printer QA Device, and a signature, is passed as an input to the Transfer Request. It is essential that M0 and M1 are read together. This ensures that the field information for M0 fields are correct, and have not been modified, or substituted from another device. Entire M0 and M1 must be read to verify the correctness of the subsequent Transfer Request by the Parameter Upgrader QA Device.
2. The System makes a Transfer Request to the Parameter Upgrader QA Device with the field in the Parameter Upgrader QA Device whose data will be copied to the Printer QA Device, and the field in Printer QA Device to which this data will be copied to. The Transfer Request also includes the output from Read of the Printer QA Device. The Parameter Upgrader QA Device validates the Transfer Request based on the Read output, checks that it has enough count-remaining for a successful transfer, and then produces the necessary Transfer output. The Transfer Output typically consists of new field data for the field being refilled or upgraded, additional field data required to ensure the correctness of transfer/rollback, along with a signature.
3. The System then applies the Transfer Output on the Printer QA Device, by calling an authenticated Write on it, passing in the Transfer Output. The Write is either successful or not. If the Write is not successful, then the System will repeat calling the Write function using the same transfer output, which may be successful or not. If unsuccessful the System will initiate a rollback of the transfer. The rollback must be performed on the Parameter Upgrader QA Device, so that it can adjust its value to a previous value before the current Transfer Request was initiated.
4. The System starts a rollback by Reading the memory vectors M0 and M1 of the Printer QA Device.
5. The System makes a StartRollBack Request to the Parameter Upgrader QA Device with same input parameters as the Transfer Request, and the output from Read in (4). The Parameter Upgrader QA Device validates the StartRollBack Request based on the Read output, and then produces the necessary Pre-rollback output. The Pre-rollback output typically consists only of additional field data along with a signature.
6. The System then applies the Pre-rollback output on the Parameter Upgrader QA Device, by calling an authenticated Write on it, passing in the Pre-rollback output. The Write is either successful or not. If the Write is not successful, then either (6), or (5) and (6) must be repeated.
7. The System then Reads the memory vectors M0 and M1 of the Printer QA Device.
8. The System makes a RollBack Request to the Parameter Upgrader QA Device with same input parameters as the Transfer Request, and the output from Read (7). The Parameter Upgrader QA Device validates the RollBack Request based on the Read output, and then rolls back its count-remaining field by incrementing it by 1.

28.3.1 Transfer

The Printer QA Device stores upgradeable operating parameter values in M0 fields, and its corresponding $M_1$ words contains field information for its operating parameter fields. The field information consists of the size of the field, the Type of data stored in field and the access permission to the field. See Section 8.1.1 for details.

The Parameter Upgrader QA Device also stores the new operating parameter values (which will be written to the Printer QA Device) in its M0 fields, and its coressponding $M_1$ words contains field information for the new operating parameter fields. Additionally, the Parameter Upgrader QA Device has a count-remaining field associated with the new operating parameter value field. The count-remaining field occupies the higher field position when compared to its associated operating parameter value field.

28.3.1.1 Authorisation

The basic authorisation for a transfer comes from a key, which has authenticated ReadWrite permission (stored in field information as KeyNum) to the operating parameter field in the Printer QA Device. We will refer to this key as the upgrade key. The same upgrade key must also have authenticated decrement-only permission to the count-remaining field (which decrements by 1 with every transfer) in the Parameter Upgrader QA Device.

After validating the input upgrade request, the Parameter Upgrader QA Device will decrement the value of the count-remaining field by 1, and produce data (by copying the data stored from its operating parameter field) and signature for the new operating parameter using the upgrade key. Note that the Parameter Upgrader QA Device can decrement its count-remaining field only if the upgrade key has the permission to decrement it.

The data and signature produced by the Parameter Upgrader QA Device is subsequently applied to the Printer QA Device. The Printer QA Device will accept the new transferred operating parameter, only if the signature is valid. Note that the signature will only be valid if it was produced using the upgrade key which has write permission to the operating parameter field being written.

The upgrade key has authenticated ReadWrite permission to the operating parameter field (which will change) in the Printer QA Device. The upgrade key has decrement-only permission to the the count-remaining field (which decrements by 1 with every transfer of field) in the Parameter Upgrader QA Device.

28.3.1.2 Data Type Matching

The Parameter Upgrader QA Device validates the transfer request by matching the Type of the data in the field information of operating parameter field (stored in M1) of Printer QA Device to the Type of data in the field information of operating parameter field of the Parameter Upgrader QA Device. This ensures that equivalent data types are being transferred i.e Network_OEM1_printspeed__1500 is not transferred to Network_OEM1_printspeed__2000.

28.3.1.3 Addition Validation

Additional validation of the transfer request must be performed before a transfer output is generated by the Parameter Upgrader QA Device. These are as follows:

For the Printer QA Device

1. Whether the field being upgraded is actually present.
2. Whether the field being upgraded can hold the changed value.

For the Parameter Upgrader QA Device:

1. Whether the new operating parameter field and its associated count-remaining is actually present.
2. Whether the count-remaining field has an upgrade left for the transfer to succeed.

28.3.1.4 Rollback Facilitation

To facilitate a rollback, the Parameter Upgrade QA Device will store a list of transfer requests processed by it. This list is referred to as the Xfer Entry cache. Each record in the list consists of the transfer parameters corresponding to the transfer request.

28.3.2 Rollback

A rollback request will be validated by looking through the Xfer Entry cache of the Parameter Upgrader QA Device. After the right transfer request is found the Parameter Upgrade QA Device checks that the output from the transfer request was not applied to the Printer QA Device by comparing the current Read of the Printer QA Device to the values in the Xfer Entry cache, and finally rolling back the Parameter Upgrader QA Device count-remaining field by incrementing it by 1. The Parameter Upgrader QA Device must be absolutely sure that the Printer QA Device didn't receive the transfer. This factor determines the additional fields that must be written along with new operating parameter data, and also the parameters of the transfer request that must be stored in the Xfer Entry cache to facilitate a rollback, to prove that the Printer QA Device didn't actually receive the transfer.

The rollback process increments the count-remaining field by 1 in the Parameter Upgrader QA Device.

28.3.2.1 Sequence Fields

The rollback process must ensure that the transfer output (which was previously produced) for which the rollback is being performed, cannot be applied after the rollback has been performed. How do we achieve this? There are two separate decrement-only sequence fields (SEQ__1 and SEQ__2) in the Printer QA Device which can only be decremented by the Parameter Upgrader QA Device using the upgrade key. The nature of data to be written to the sequence fields is such that either the transfer output or the pre-rollback output can be applied to the Printer QA Device, but not both i.e they must be mutually exclusive. Refer to Table 285 for details.

The two sequence fields are initialised to 0xFFFFFFFF using sequence key. The sequence key is different to the upgrade key, and has authenticated ReadWrite permission to both the sequence fields.

The transfer output consists of the new data for the field being upgraded, field data of the two sequence fields, and a signature using the upgrade key. The field data for SEQ__1 is decremented by 2 from the original value that was passed in with the transfer request. The field data for SEQ__2 is decremented by 1 from the original value that was passed in with the transfer request.

The pre-rollback output consists only of the field data for the two sequence fields, and a signature using the upgrade key. The field data for SEQ__1 is decremented by 1 from the original value that was passed in with the transfer request. The field data for SEQ__2 is decremented by 2 from the original value that was passed in with the transfer request.

Since the two sequence fields are decrement-only fields, the writing of the transfer output to QA Device being upgraded will prevent the writing of the pre-rollback output to QA Device being upgraded, since the sequence fields are decrement-only fields, and only one possible set can be written. If the writing of the transfer output fails, then pre-rollback can be written. However, the transfer output cannot be written after the pre-rollback output has been written.

Before a rollback is performed, the Parameter Upgrader QA Device must confirm that the sequence fields was successfully written to the pre-rollback values in the Printer QA Device. Because the sequence fields are decrement-only fields, the Printer QA Device will allow pre-rollback output to be written only if the transfer output has not been written.

28.3.2.1.1 Field Information of the Sequence Data Field

For a device to be upgradeable the device must have two sequence fields SEQ_1 and SEQ_2 which are written with sequence data during the transfer sequence. Thus all upgrading QA Devices, ink QA Devices and printer QA Devices must have two sequence fields. The upgrading QA Devices must have these fields because they can be upgraded as well. The sequence field information are defined in Table 298.

| Attribute Name | Value | Explanation |
|---|---|---|
| Type | TYPE_SEQ_1 or TYPE_SEQ_2. | See Appendix A for exact data. |
| KeyNum | Slot number of the sequence key. | Only the sequence key has authenticated ReadWrite access to this field. |
| Non Auth RW Perm[b] | 0 | Non authenticated ReadWrite is not allowed to the field. |
| Auth RW Perm[c] | 1 | Authenticated (key based) ReadWrite access is allowed to the field. |
| KeyPerm | KeyPerms[KeyNum] = 0 | KeyNum is the slot number of the sequence key, which has ReadWrite permission to the field. |
| | KeyPerms[Slot number of upgrade key] = 1 | Upgrade key can decrement the sequence field. |
| | KeyPerms[others= 0 . . . 7(except upgrade key)] = 0 | All other keys have ReadOnly access. |
| End Pos | | Set as required. Size is typically 1 word. |

[a]This is a sample type only and is not included in the Type Map in Appendix A.
[b]Non authenticated Read Write permission.
[c]Authenticated Read Write permission.

28.3.3 Upgrade States

There are three states in an transfer sequence, the first state is initiated for every transfer, while the next two states are initiated only when the transfer fails. The states are—Xfer, StartRollback, and Rollback.

28.3.3.1 Upgrade Flow

Figure 384:
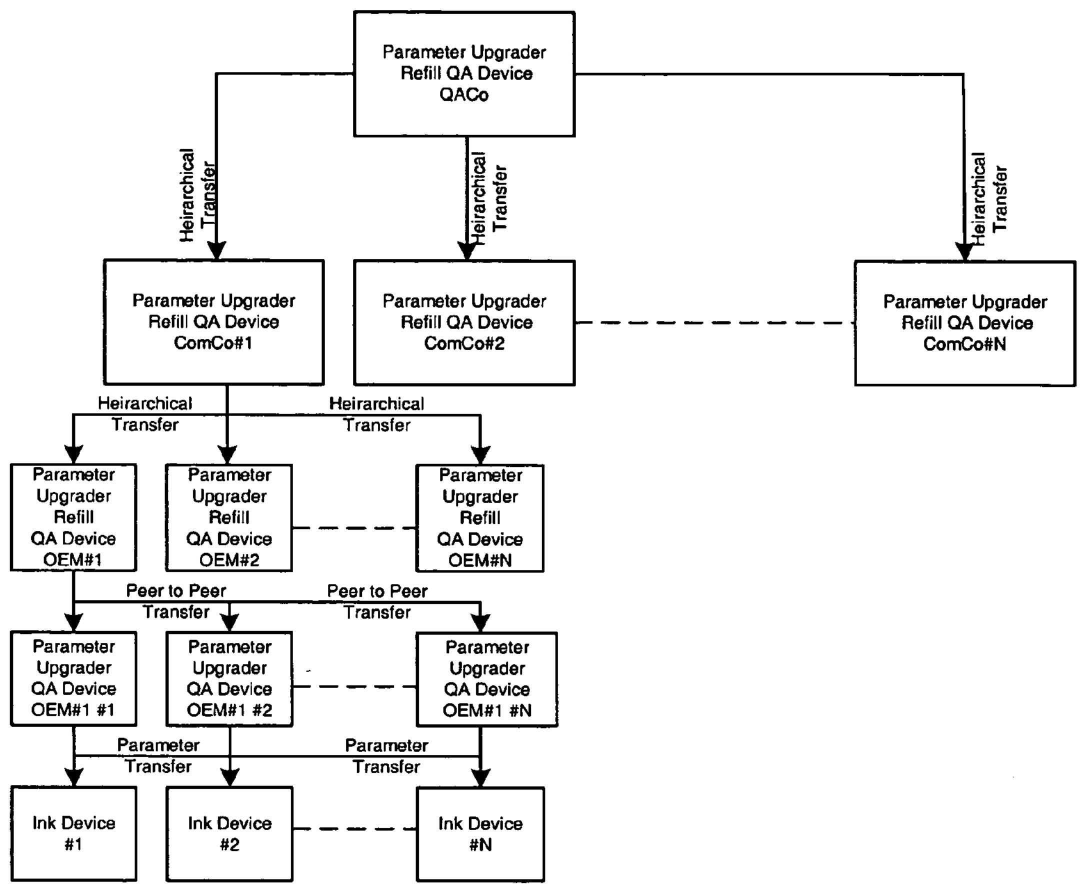

FIG. 384 shows a typical upgrade flow.

28.3.3.2 Xfer

This state indicates the start of the transfer process, and is the only state required if the transfer is successful. During this state, the Parameter Upgrader QA Device adds a new record to its Xfer Entry cache, decrements its count-remaining by 1, produces new operating parameter field, new sequence data (as described in Section 28.3.2.1) and a signature based on the upgrade key.

The Printer QA Device will subsequently write the new operating parameter field and new sequence data, after verifying the signature. If the new operating parameter field can be successfully written to the Printer QA Device, then this will finish a successful transfer.

If the writing of the new amount is unsuccessful (result returned is BAD SIG), the System will re-transmit the transfer output to the Printer QA Device, by calling the authenticated Write function on it again, using the same transfer output.

If retrying to write the same transfer output fails repeatedly, the System will start the rollback process on Parameter Upgrader QA Device, by calling the Read function on the Printer QA Device, and subsequently calling the StartRollBack function on the Parameter Upgrader QA Device. After a successful rollback is performed, the System will invoke the transfer sequence again.

28.3.3.3 StartRollBack

This state indicates the start of the rollback process. During this state, the Parameter Upgrade QA Device produces the next sequence data and a signature based on the upgrade key. This is also called a pre-rollback, as described in Section 26.3.2.

The pre-rollback output can only be written to the Printer QA Device, if the previous transfer output has not been written. The writing of the pre-rollback sequence data also ensures, that if the previous transfer output was captured and not applied, then it cannot be applied to the Printer QA Device in the future.

If the writing of the pre-rollback output is unsuccessful (result returned is BAD SIG), the System will re-transmit the pre-rollback output to the Printer QA Device, by calling the authenticated Write function on it again, using the same pre-rollback output.

If retrying to write the same pre-rollback output fails repeatedly, the System will call the StartRollback on the Parameter Upgrade QA Device again, and subsequently calling the authenticated Write function on the Printer QA Device using this output.

28.3.3.4 Rollback

This state indicates a successful deletion (completion) of a transfer sequence. During this state, the Parameter Upgrader QA Device verifies the sequence data produced from StartRollBack has been correctly written to Printer QA Device, then rolls its count-remaining field to a previous value before the transfer request was issued.

28.3.4 Xfer Entry Cache

The Xfer Entry data structure must allow for the following:

Stores the transfer state and sequence data for a given transfer sequence.

Store all data corresponding to a given transfer, to facilitate a rollback to the previous value before the transfer output was generated.

The Xfer Entry cache depth will depend on the QA Chip Logical Interface implementation. For some implementations a single Xfer Entry value will be saved. If the Parameter Upgrader QA Device has no powersafe storage of Xfer Entry cache, a power down will cause the erasure of the Xfer Entry cache and the Parameter Upgrader QA Device will not be able to rollback to a pre-power-down value.

A dataset in the Xfer Entry cache will consist of the following:

Information about the Printer QA Device:

a. ChipId of the device.

b. FieldNum of the M0 field (i.e what was being upgraded).

Information about the Parameter Upgrader QA Device:

a. FieldNum of the M0 field used to transfer the count-remaining from.

Xfer State—indicating at which state the transfer sequence is. This will consist of:

a. State definition which could be one of the following:—Xfer, StartRollBack and deleted (completed).

b. The value of sequence data fields SEQ_1 and SEQ_2.

The Xfer Entry cache stores the FieldNum of the count-remaining field of the Parameter Upgrader QA Device.

28.3.4.1 Adding New Dataset

A new dataset is added to Xfer Entry cache by the Xfer function.

There are three methods which can be used to add new dataset to the Xfer Entry cache. The methods have been listed below in the order of their priority:

1. Replacing existing dataset in Xfer Entry cache with new dataset based on ChipId and FieldNum of the Ink QA Device in the new dataset. A matching ChipId and FieldNum could be found because a previous transfer output corresponding to the dataset stored in the Xfer Entry cache has been correctly received and processed by the Parameter Upgrader QA Device, and a new transfer request for the same Printer QA Device, same field, has come through to the Parameter Upgrader QA Device.
2. Replace existing dataset cache with new dataset based on the Xfer State. If the Xfer State for a dataset indicates deleted (complete), then such a dataset will not be used for any further functions, and can be overwritten by a new dataset.
3. Add new dataset to the end of the cache. This will automatically delete the oldest dataset from the cache regardless of the Xfer State.

28.4 Upgrading the Count-Remaining Field

This section is only applicable to the Parameter Upgrader QA Device.

The transfer of count-remaining is similar to transfer ink-remaining because both involve transferring of amounts. Therefore, this transfer uses the XferAmount function.

The XferAmount function performs additional checks when transferring count-remaining. This includes checking of the operating parameter field, associated with the count-remaining. They are as follows:

- The operating parameter value of the upgrading QA Device and the QA Device being upgraded must match.
- The operating parameter field (in both devices) must be upgradeable by one key only, and all other keys must have ReadOnly access. This key which has authenticated ReadWrite permission to the operating parameter field, must be different to the key that has authenticated Read Write permission to the count-remaining field.
- The data Type for the operating parameter field in the upgrading QA Device must match the data Type for the operating parameter field in the QA Device being upgraded.

28.5 New Operating Parameter Field Information

This section is only applicable to the Parameter Upgrader QA Device.

This field stores the operating parameter value that is copied from the Parameter Upgrader QA Device to the operating parameter field being updated in the Printer QA Device.

This field has a single key associated with it. This key has authenticated ReadWrite permission to this field and will be referred to as write-parameter key.

| Attribute Name | Value | Explanation |
|---|---|---|
| Type | For e.g - TYPE_UPGRADE_PRINTSPEED_15[a] | Type describing the upgrade. |
| KeyNum | Slot number of the write-parameter key. | Only the write-parameter key has authenticated ReadWrite access to this field. |
| Non Auth RW Perm[b] | 0 | Non authenticated ReadWrite is not allowed to the field. |
| Auth RW Perm[c] | 1 | Authenticated (key based) ReadWrite access is allowed to the field. |
| KeyPerm | KeyPerms[KeyNum] = 0 | KeyNum is the slot number of the write-parameter key which has ReadWrite permission to the field. |
| | KeyPerms[others= 0 . . . 7] = 0 | All other keys have ReadOnly access. |
| End Pos | | Set as required. |

[a]This is a sample type only and is not included in the Type Map in Appendix A.
[b]Non authenticated Read Write permission.
[c]Authenticated Read Write permission.

28.6 Different Types of Transfer

There can be three types of transfer:

- Parameter Transfer—This is transfer of an operating parameter value from a Parameter Upgrader QA Device to a Printer QA Device. This is performed when an upgradeable operating parameter is written (for the first time) or changed.
- Hierarchical refill—This is a transfer of count-remaining value from one Parameter Upgrader Refill QA Device to a Parameter Upgrader QA Device, where both QA Devices belong to the same OEM. This is typically performed when OEM divides the number of upgrades from one of its Parameter Upgrader QA Device to many of its Parameter Upgrader QA Devices.
- Peer to Peer refill—This is a transfer of count-remaining value from one Parameter Upgrader Refill QA Device to Parameter Upgrader Refill QA Device, where the QA Devices belong to different organisations, say ComCo and OEM. This is typically performed when ComCo divides number of upgrades from its Parameter Upgrader QA Device to several Parameter Upgrader QA Device belonging to several OEMs.

Transfer of count-remaining between peers, and hierarchical transfer of count-remaining, is similar to an ink transfer, but additional checks on the transfer request is performed when transferring count-remaining amounts. This is described in Section 28.4.1.

Transfer of an operating parameter value decrements the count-remaining by 1, hence is different to a ink-transfer.

Figure 385:
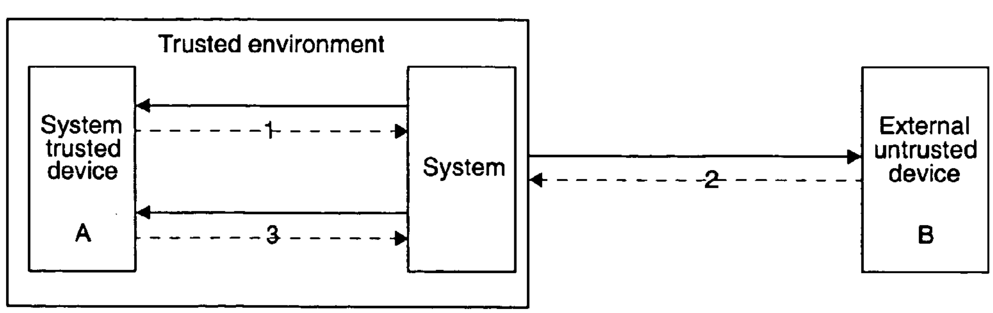

FIG. 385 is a representation of various authorised upgrade paths in the printing system.

28.6.1 Hierarchical Transfers

Referring to FIG. 385, this transfer is typically performed when count-remaining amount is transferred from ComCo's Parameter Upgrader Refill QA Device to OEM's Parameter Upgrader Refill QA Device, or from QACo's Parameter Upgrader Refill QA Device to ComCo's Parameter Upgrader Refill QA Device.

This transfers are made using the XferAmount function (and not with the XferField described in Section 29.1). because count-remaining transfer is similar to fill/refilling of ink amounts, where ink amount is replaced by count-remaining amount.

28.6.1.1 Keys and Access Permission

We will explain this using a transfer from ComCo to OEM.

There is a count-remaining field associated with the ComCo's Parameter Upgrader Refill QA Device. This count-remaining field has two keys associated with:

The first key transfers count-remaining to the device from another Parameter Upgrader Refill QA device(device is higher in the heirachy), fills/refills the device itself.

The second key transfers count-remaining from it to other devices (which are lower in the heirachy), fills/refills other devices from it.

There is a count-remaining field associated with the OEM's Parameter Upgrader Refill QA Device.

This count-remaining field has a single key associated with: This key transfers count-remaining to the device from another Parameter Upgrader Refill QA device (which is higher or at the same level in the heirachy), fills/refills (upgrades) the device itself, and additionally transfers count-remaining from it to other devices (which are lower in the heirachy), fills/refills (upgrades) other devices from it.

For a successful transfer of count-remaining from ComCo's refill device to an OEM's refill device, the ComCo's refill device and the OEM's refill device must share a common key or a variant key.

This key is fill/refill key with respect to the OEM's refill device and it is the transfer key with respect to the ComCo's refill device.

For a ComCo to successfully fill/refill its refill device from another refill device (which is higher in the heirachy possibly belonging to the QACo), the ComCo's refill device and the QACo's refill device must share a common key or a variant key. This key is fill/refill key with respect to the ComCo's refill device and it is the transfer key with respect to the QACo's refill device.

28.6.1.1.1 Count-Remaining Field Information

Table 300 shows the field information for an $_{M0}$ field storing logical count-remaining amounts in the refill device, which has the ability to transfer down the heirachy.

| Attribute Name | Value | Explanation |
|---|---|---|
| Type | TYPE_COUNT_REMAINING[a] | Type describes that the field is a count-remaining field. |
| KeyNum | Slot number of the refill key. | Only the refill key has authenticated ReadWrite access to this field. |
| Non Auth RW Perm[b] | 0 | Non authenticated ReadWrite is not allowed to the field. |
| Auth RW Perm[c] | 1 | Authenticated (key based) ReadWrite access is allowed to the field. |
| KeyPerm | KeyPerms[KeyNum] = 0 | KeyNum is the slot number of the refill key, which has ReadWrite permission to the field. |
| | KeyPerms[Slot Num of transfer key ] = 1 KeyPerms[others = 0 . . . 7(except transfer key)] = 0 | Transfer key can decrement the field. All other keys have ReadOnly access. |
| End Pos | Set as required. | Depends on the amount of logical ink the device can store and storage resolution - i.e in picolitres or in microlitres. |

[a]Refer to Type Map in Appendix A for exact value.
[b]Non authenticated Read Write permission.
[c]Authenticated Read Write permission.

28.6.2 Peer to Peer Transfer

Referring to FIG. 385, this transfer is typically performed when count-remaining amount is transferred from OEM's Parameter Upgrader Refill QA Device to another Parameter Device Refill QA Device belonging to the same OEM.

28.6.2.1 Keys and Access Permission

There is an count-remaining field associated with the refill device. This count-remaining field has a single key associated with:

This key transfers count-remaining amount to the device from another refill device (which is higher or at the same level in the heirachy), fills/refills (upgrades) the device itself, and additionally transfers ink from it to other devices (which are lower in the heirachy), fills/refills (upgrades) other devices from it.

This key is referred to as the fill/refill key and is used for both fill/refill and transfer. Hence, this key has both ReadWrite and Decrement-Only permission to the count-remaining field in the refill device.

28.6.2.1.1 Count-Remaining Field Information

Table 301 shows the field information for an $_{M0}$ field storing logical count-remaining amounts in the refill device with the ability to transfer between peers.

TABLE 301

Field information for ink-remaining field for refill devices transferring between peers

| Attribute Name | Value | Explanation |
|---|---|---|
| Type | TYPE_COUNT_REMAINING[a] | Type describes that the field is a count-remaining field. |
| KeyNum | Slot number of the refill key. | Only the refill key has authenticated ReadWrite access to this field. |
| Non Auth RW Perm[b] | 0 | Non authenticated ReadWrite is not allowed to the field. |
| Auth RW Perm[c] | 1 | Authenticated (key based) ReadWrite access is allowed to the field. |

TABLE 301-continued

Field information for ink-remaining field for refill devices transferring between peers

| Attribute Name | Value | Explanation |
|---|---|---|
| KeyPerm | KeyPerms[KeyNum] = 1 | KeyNum is the slot number of the refill key, which has ReadWrite and Decrement permission to the field. |
| | KeyPerms[others= 0 . . . 7(except KeyNum)] = 0 | All other keys have ReadOnly access. |
| End Pos | Set as required. | Depends on the amount of logical ink the device can store and storage resolution - i.e in picolitres or in microlitres. |

[a]Refer to Type Map in Appendix A for exact value.
[b]Non authenticated Read Write permission.
[c]Authenticated Read Write permission.

29 Functions

29.1 XferField

Input: KeyRef, $_{M0}$OfExtemal, $_{M1}$OfExternal, ChipId, FieldNumL, FieldNumE, InputParameterCheck (Optional), $R_E$, $SIG_E$, $R_{E2}$ Output: ResultFlag, Field data, $R_{L2}$, $SIG_{out}$ Changes: $_{M0}$ and $R_L$ Availablity: Parameter Upgrader QA Device

29.1.1 Function Description

The XferField is similar to the XferAmount function in that it produces data and signature for updating a given $_{M0}$ field. This data and signature when applied to the appropriate device through the WriteFieldsAuth function, will upgrade the FieldNumE ($_{M0}$ field) of a device to the same value as FieldNumL of the upgrading device.

The system calls the XferField function on the upgrade device with a certain FieldNumL to be transferred to the device being upgraded The FieldNumE is validated by the XferField function according to various rules as described in Section 29.1.4. If validation succeeds the XferField function produces the data and signature for subsequent passing into the WriteFieldsAuth function for the device being upgraded.

The transfer field output consists of the new data for the field being upgraded, field data of the two sequence fields, and a signature. When a transfer output is produced, the sequence field data in SEQ__1 is decremented by 2 from the previous value (as passed in with the input), and the sequence field data in SEQ__2 is decremented by 1 from the previous value (as passed in with the input).

Additional InputParameterCheck value must be provided for the parameters not included in the $SIG_E$, if the transmission between the System and Parameter Upgrader QA Device is error prone, and these errors are not corrected by the transimission protocol itself. InputParameterCheck is SHA-1[FieldNumL|FieldNumE|XferValLength|XferVal], and is required to ensure the integrity of these parameters, when these inputs are received by the Parameter Upgrader QA Device.

The XferField function must first calculate the SHA-1 [FieldNumL|FieldNumE], compare the calculated value to the value received (InputParameterCheck) and only if the values match act upon the inputs.

29.1.2 Input Parameters

Table 302 describes each of the input parameters for XferField function.

| Parameter | Description |
|---|---|
| KeyRef | For common key input and output signature: KeyRef.keyNum = Slot number of the key to be used for testing input signature and producing the output signature. $SIG_E$ produced using $K_{KeyRef.keyNum}$ by the QA Device being upgraded. SIGout produced using $K_{KeyRef.keyNum}$ for delivery to the QA Device being upgraded. KeyRef.useChipId = 0<br>For variant key input and output signatures: KeyRef.keyNum = Slot number of the key to be used for generating the variant key. $SIG_E$ produced using a variant of $K_{KeyRef.keyNum}$ by the QA Device being upgraded. SIGout produced using a variant of $K_{KeyRef.keyNum}$ for delivery to the QA Device being upgraded. KeyRef.useChipId = 1 KeyRef.chipId = ChipId of the device which generated $SIG_E$ and will receive SIGout. |
| $_{M0}$OfExternal | All 16 words of $_{M0}$ of the QA Device being upgraded |
| $_{M1}$OfExternal | All 16 words of $_{M1}$ of the QA Device being upgraded. |
| ChipId | ChipId of the QA Device being upgraded. |
| FieldNumL | $_{M0}$ field number of the local (updating) device. The data stored in this field will be copied from the upgrading device. |
| FieldNumE | $_{M0}$ field number of the QA Device being upgraded. This field will be updated to the value stored in FieldNumL within the upgrading device. |
| $R_E$ | External random value used to verify input signature. This will be the R from the input signature generator (i.e device generating $SIG_E$). The input signal generator in this case, is the device being upgraded or a translation device. |
| $R_{E2}$ | External random value used to produce output signature. This will be the R obtained by calling the Random function on the device which will receive the $SIG_{out}$ from the XferField function. The device receiving the $SIG_{out}$ in this case, is the device being upgraded or a translation device. |
| $SIG_E$ | External signature required for authenticating input data. The input data in this case, is the output from the Read function performed on the device being upgraded. A correct $SIG_E = SIG_{KeyRef}(Data \mid R_E \mid R_L)$. |

29.1.2.1 Input Signature Verification Data Format

Refer to Section 27.1.2.1.

29.1.3 Output Parameters

Table 303 describes each of the output parameters for XferField function.

| Parameter | Description |
|---|---|
| ResultFlag | Indicates whether the function completed successfully or not. If it did not complete successfully, the reason for the failure is returned here. See Section 12.1, Table 292 and Table 303. |
| FieldSelect | Selection of fields to be written<br>In this case the bit corresponding to SEQ__1, SEQ__2 and to FieldNumE are set to 1.<br>All other bits are set to 0. |
| FieldVal | Updated data words for sequence data field and FieldNumE for QA Device being upgraded.<br>Starts with LSW of lower field.<br>This must be passed as input to the WriteFieldsAuth function of the QA Device being upgraded. |
| $R_{L2}$ | Internal random value required to generate output signature This must be passed as input |

-continued

| Parameter | Description |
|---|---|
| | to the WriteFieldsAuth function or Translate function of the QA Device being upgraded. |
| $SIG_{out}$ | Output signature which must be passed as an input to the WriteFieldsAuth function or Translate function of the QA Device being upgraded. $SIG_{out} = SIG_{KeyRef}(data \mid R_{L2} \mid R_{E2})$ as per FIG. 373 |

TABLE 303

Result Flag definitions for XferField

| ReultFlag Definition | Description |
|---|---|
| CountRemainingFieldInvalid | The count-remaining field in Upgrading QA Device is invalid. |
| FieldNumEKeyPermInvalid | The upgrade field in the QA Device being upgraded doesn't have the correct authenticated permission. |
| NoUpgradesRemaining | The count-remaining field associated with the upgrade field in the Upgrading QA Device doesn't have any more upgrades left. |

29.1.3.1 Output Signature Generation Data Format

Refer to Section 27.1.3.1.

29.1.4 Function Sequence

The XferField command is illustrated by the following pseudocode:

```
Accept input parameters-KeyRef, M0OfExternal, M1OfExternal, ChipId,
FieldNumL, FieldNumE, R_E, SIG_E, R_E2
#Generate message for passing into ValidateKeyRefAndSignature
function
data ←(RWSense|MSelect|KeyIdSelect|ChipId|WordSelect|M0|M1)
        # Refer to Figure 382.
----------------------------------------------------------------
# Validate KeyRef, and then verify signature
ResultFlag = ValidateKeyRefAndSignature(KeyRef,data,R_E,R_L)
If (ResultFlag ≠ Pass)
    Output ResultFlag
    Return
EndIf
----------------------------------------------------------------
# Validatate FieldNumE
# FieldNumE is present in the device being upgraded
PresentFlagFieldNumE ←GetFieldPresent(M1OfExternal,FieldNumE)
# Check FieldNumE present flag
If(PresentFlagFieldNumE ≠ 1)
    ResultFlag ←FieldNumEInvalid
    Output ResultFlag
    Return
EndIf
----------------------------------------------------------------
# Check Seq fields exist and get their Field Number
# Get Seqdata field SEQ__1 for the device being upgraded
XferSEQ__1FieldNum← GetFieldNum(M1OfExternal, SEQ__1)
# Check if the Seqdata field SEQ__1 is valid
If(XferSEQ__1FieldNum invalid)
    ResultFlag ←SeqFieldInvalid
    Output ResultFlag
    Return
EndIf
# Get Seqdata field SEQ__2 for the device being upgraded
XferSEQ__2FieldNum← GetFieldNum(M1OfExternal, SEQ__2)
# Check if the Seqdata field SEQ__2 is valid
If(XferSEQ__2FieldNum invalid)
    ResultFlag ←SeqFieldInvalid
    Output ResultFlag
```

-continued

```
    Return
EndIf
-----------------------------------------------------------------
--------------
#Check write permission for FieldNumE
PermOKFieldNumE ←CheckFieldNumEPerm(M1OfExternal,
FieldNumE)
If(PermOKFieldNumE ≠ 1)
    ResultFlag ←FieldNumEWritePermInvalid
    Output ResultFlag
    Return
EndIf
-----------------------------------------------------------------
--------------
#Check that both SeqData fields have Decrement-Only permission
with the same key
#that has write permission on FieldNumE
PermOKXferSeqData ←CheckSeqDataFieldPerms(M1OfExternal,
                    XferSEQ__1FieldNum,
XferSEQ__2FieldNum,FieldNumE)
If(PermOKXferSeqData ≠ 1)
    ResultFlag ←SeqWritePermInvalid
    Output ResultFlag
    Return
EndIf
-----------------------------------------------------------------
----------
# Get SeqData SEQ__1 data from device being upgraded
GetFieldDataWords(XferSEQ__1FieldNum,
    XferSEQ__1DataFromDevice,M0OfExternal,M1OfExternal)
# Get SeqData SEQ__2 data from device being upgraded
GetFieldDataWords(XferSEQ__2FieldNum,
                XferSEQ__2DataFromDevice,
M0OfExternal,M1OfExternal)
----------------------------------------------------------------
# FieldNumL(upgrade value)is a valid field in the upgrading
device
PresentFlagFieldNumL ←GetFieldPresent(M1,FieldNumL)
If(PresentFlagFieldNumL ≠ 1)
    ResultFlag ←FieldNumLInvalid
    Output ResultFlag
    Return
EndIf
----------------------------------------------------------------
#Get the CountRemaining field associated with the upgrade
value field
# The CountRemaining field is the next higher field
from the upgrade value field
FieldNumCountRemaining← FieldNumL + 1
# FieldNumCountRemaining is a valid field in the
upgrading device
PresentFlagFieldNumCountRemaining
←GetFieldPresent(M1,FieldNumCountRemaining)
If(PresentFlagFieldNumCountRemaining ≠ 1)
    ResultFlag ←CountRemainingFieldInvalid
    Output ResultFlag
    Return
EndIf
----------------------------------------------------------------
#Check permission for upgrade value field. Only one key
(different from KeRef.keyNum) has write permissions to the
# field and no key has decrement permissions.
CheckOK ←CheckUpgradeKeyForField(FieldNumL,M1,KeyRef)
If(CheckOK ≠ 1)
    ResultFlag ←FieldNumEKeyPermInvalid
    Output ResultFlag
    Return
EndIf
----------------------------------------------------------------
#Find the type attribute for FieldNumE
TypeFieldNumE ←FindFieldNumType(M1OfExternal,FieldNumE)
#Find the type attribute for FieldNumL (upgrade value)
TypeFieldNumL ←FindFieldNumType(M1,FieldNumL)
If(TypeFieldNumE ≠ TypeFieldNumL)
    ResultFlag ←TypeMismatch
    Output ResultFlag
    Return
EndIf
----------------------------------------------------------------
```

-continued

```
# Check permissions for CountRemaining field
# Check upgrades are available in the CountRemaining field
of the
# upgrading device i.e value of CountRemaining is non-zero
positive number
CountRemainingOK ←CheckCountRemaining(FieldNumCountRemaining,
M0, M1)
If(CountRemainingOK ≠ 1)
    ResultFlag ←NoUpgradesRemaining
    Output ResultFlag
    Return
EndIf
----------------------------------------------------------------
#Get the size of the FieldNumL (upgrade value)
If(FieldNumL = 0)
    FieldSizeOfFieldNumL← MaxWordInM– M1[FieldNumL].EndPos
Else
    FieldSizeOfFieldNumL← M1[FieldNumL−1].EndPos–
M1[FieldNumL].EndPos
EndIf
#Get the size of the FieldNumE (field being updated)
If(FieldNumL = 0)
    FieldSizeOfFieldNumE←MaxWordInM–
    M1OfExternal[FieldNumE –
1].EndPos
Else
    FieldSizeOfFieldNumE← M1OfExternal[FieldNumE−1].EndPos
                       – M1OfExternal[FieldNumL].EndPos
EndIf
# Check whether the device being upgraded can hold the
upgrade value from
# FieldNumL
If(FieldSizeOfFieldNumE < FieldSizeOfFieldNumL)
    ResultFlag ←FieldNumESizeInsufficient
    Output ResultFlag
    Return
EndIf
----------------------------------------------------------------
# All checks complete . . . . .
# Generate Seqdata for SEQ_1 and SEQ_2 fields
XferSEQ_1DataToDevice = XferSEQ_1DataFromDevice – 2
XferSEQ_2DataToDevice = XferSEQ_2DataFromDevice – 1
# Add DataSet to Xfer Entry Cache
AddDataSetToXferEntryCache(ChipId,FieldNumE, FieldNumL,
XferSEQ_1DataFromDevice, XferSEQ_2DataFromDevice)
#Decrement CountRemaining field by one
DecrementField(FieldNumCountRemaining,M0)
#Get the upgrade value words from FieldNumE of the
upgrading device
GetFieldDataWords(FieldNumL,UpgradeValue,M0,M1)
#Generate new field data words for FieldNumE. The
upgrade value is copied to
FieldDataE
FieldDataE← UpgradeValue
# Generate FieldSelect and FieldVal for SeqData field
SEQ_1, SEQ_2
and
# FieldDataE. . .
CurrentFieldSelect← 0
FieldVal ←0
GenerateFieldSelectAndFieldVal(FieldNumE, FieldDataE,
XferSEQ_1FieldNum,
XferSEQ_1DataToDevice,XferSEQ_2FieldNum,
XferSEQ_2DataToDevice,
FieldSelect,FieldVal)
#Generate message for passing into GenerateSignature function
data ←(RWSense|FieldSelect|ChipId|FieldVal)# Refer to
Figure 373.
#Create output signature for FieldNumE
SIGout← GenerateSignature(KeyRef,data,RL2,RE2)
Update RL2 to RL3
ResultFlag ←Pass
Output ResultFlag, FieldSelect,FieldVal, RL2 ,SIGout
Return
EndIf
```

29.1.4.1 CountRemainingOK

CheckCountRemainingFieldNumL(FieldNumCountRemaining,M1,M0)

This functions checks permissions for CountRemaining field and also checks that upgrades are available in the CountRemaining field of the upgrading device.

```
AuthRW ←M1[FieldNumCountRemaining].AuthRW
NonAuthRW ←M1[FieldNumCountRemaining].NonAuthRW
DOForKeys ←M1[FieldNumCountRemaining].DOForKeys[KeyNum]
Type ←M1[FieldNumCountRemaining].Type
If(AuthRW = 1 ∧NonAuthRW = 0 ∧(DOForKeys = 1∧ (Type =
TYPE_COUNT_REMAINING)
    PermOK ←1
Else
    PermOK ←0
    Return PermOK
EndIf
#Get the count-remaining value from the upgrading device
GetFieldDataWords(FieldNumCountRemaining,CountRemainingValue,
M0,M1
)
If(CountRemainingValue <= 0)
    PermOK ←0
    Return PermOK
EndIf
PermOK ←1
Return PermOK
```

29.2 RollBackField

Input: KeyRef, $_{M0}$OfExternal, $_{M1}$OfExternal, ChipId, FieldNumL, FieldNumE, InputParameterCheck (optional), $R_E$, $SIG_E$ Output: ResultFlag Changes: $_{M0}$ and $R_L$ Availablity: Parameter Upgrader QA Device 29.2.1 Function Description The RollBackField function is very similar to the RollBackAmount function, the only difference being that the RollBackField function adjusts the value of the count-remaining field associated with the upgrade value field of the upgrading device, instead of the upgrade value field itself. A successful rollback, increments the count-remaining by 1.

The Parameter Upgrader QA Device checks that the Printer QA Device didn't actually receive the transfer message correctly, by comparing the sequence data field values read from the device with the values stored in the Xfer Entry cache. The sequence data field values read must match what was previously written using the StartRollBack function. After all checks are fulfilled, the Parameter Upgrader QA Device adjusts its FieldNumL.

Additional InputParameterCheck value must be provided for the parameters not included in the $SIG_E$, if the transmission between the System and Parameter Upgrader QA Device is error prone, and these errors are not corrected by the transimission protocol itself. InputParameterCheck is SHA-1[FieldNumL|FieldNumE], and is required to ensure the integrity of these parameters, when these inputs are received by the Parameter Upgrader QA Device.

The RollBackField function must first calculate the SHA-1[FieldNumL|FieldNumE], compare the calculated value to the value received (InputParameterCheck) and only if the values match act upon the inputs.

29.2.2 Input Parameters

Table 305 described each of the input parameters for RollBackField function.

| Parameter | Description |
|---|---|
| KeyRef | For common key input signature: KeyRef.keyNum = Slot number of the key to be used for testing input signature. $SIG_E$ produced using $K_{KeyRef.keyNum}$ by the QA Device being upgraded. KeyRef.useChipId = 0 For variant key input signature: KeyRef.keyNum = Slot number of the key to be used for generating the variant key. $SIG_E$ produced using a variant of $K_{KeyRef.keyNum}$ by the QA Device being upgraded. KeyRef.useChipId = 1 KeyRef.chipId = ChipId of the device which generated $SIG_E$. |
| $_{M0}$OfExternal | 16 words of $_{M0}$ of the QA Device being upgraded which failed to upgrade. |
| $_{M1}$OfExternal | 16 words of $_{M1}$ of the QA Device being upgraded which failed to upgrade. |
| ChipId | ChipId of the QA Device being upgraded which failed to upgrade. |
| FieldNumL | $_{M0}$ field number of the local (upgrading) device whose value could not be copied to the device being upgraded. |
| FieldNumE | $_{M0}$ field number of the QA Device being upgraded to which the upgrade value in FieldNumL couldn't be copied. |
| $R_E$ | External random value used to verify input signature. This will be the R from the input signature generator (i.e device generating $SIG_E$). The input signal generator in this case, is the device which failed to upgrade or a translation device. |
| $SIG_E$ | External signature required for authenticating input data. The input data in this case, is the output from the Read function performed on the device which failed to upgrade. A correct $SIG_E$ = $SIG_{KeyRef}$(Data \| $R_E$ \| $R_L$). |

29.2.2.1 Input Signature Generation Data Format

Refer to Section 27.1.2.1 for details.

29.2.3 Output Parameters

Table 306 describes each of the output parameters for RollBackField.

| Parameter | Description |
|---|---|
| ResultFlag | Indicates whether the function completed successfully or not. If it did not complete successfully, the reason for the failure is returned here. See Section 12.1, Table 292, Table 304 and Table 295. |

29.2.4 Function Sequence

The RollBackField command is illustrated by the following pseudocode:

```
Accept input parameters-KeyRef, M0OfExternal, M1OfExternal,
ChipId, FieldNumL, FieldNumE, R_E,SIG_E
#Generate message for passing into GenerateSignature function
data ←(RWSense|MSelect|KeyIdSelect|ChipId|WordSelect|M0|M1)
          # Refer to Figure 382.
----------------------------------------------------------------
# Validate KeyRef, and then verify signature
ResultFlag = ValidateKeyRefAndSignature(KeyRef,data,R_E,R_L)
If (ResultFlag ≠ Pass)
    Output ResultFlag
```

-continued

```
    Return
EndIf
----------------------------------------------------------------
# Check Seq fields exist and get their Field Number
# Get Seqdata field SEQ_1 num for the device being upgraded
XferSEQ_1FieldNum← GetFieldNum(M1OfExternal, SEQ_1)
# Check if the Seqdata field SEQ_1 is valid
If(XferSEQ_1FieldNum invalid)
    ResultFlag ← SeqFieldInvalid
    Output ResultFlag
    Return
EndIf
# Get Seqdata field SEQ_2 num for the device being upgraded
XferSEQ_2FieldNum← GetFieldNum(M1OfExternal, SEQ_2)
# Check if the Seqdata field SEQ_2 is valid
If(XferSEQ_2FieldNum invalid)
    ResultFlag ← SeqFieldInvalid
    Output ResultFlag
    Return
EndIf
----------------------------------------------------------------
# Get SeqData SEQ_1 data from device being upgraded
GetFieldDataWords(XferSEQ_1FieldNum,
    XferSEQ_1DataFromDevice,M0OfExternal,M1OfExternal)
# Get SeqData SEQ_2 data from device being upgraded
GetFieldDataWords(XferSEQ_2FieldNum,
            XferSEQ_2DataFromDevice,
M0OfExternal,M1OfExternal)
# Generate Seqdata for SEQ_1 and SEQ_2 fields with the data that
is read
XferSEQ_1Data = XferSEQ_1DataFromDevice + 1
XferSEQ_2Data = XferSEQ_2DataFromDevice + 2
# Check Xfer Entry in cache is correct - dataset exists, Field
data
# and sequence field data matches and Xfer State is correct
XferEntryOK ← CheckEntry(ChipId, FieldNumE, FieldNumL,
            XferSEQ_1Data, XferSEQ_2Data)
If( XferEntryOK= 0)
    ResultFlag ← RollBackInvalid
    Output ResultFlag
    Return
EndIf
# Increment associated CountRemaining by 1
IncrementCountRemaining(FieldNumCountRemaining)
# Update XferState in DataSet to complete/deleted
UpdateXferStateToComplete(ChipId,FieldNumE)
ResultFlag ← Pass
Output ResultFlag
Return
```

Example Sequence of Operations

30 Concepts

The QA Chip Logical Interface interface devices do not initiate any activities themselves. Instead the System reads data and signature from various untrusted devices, and sends the data and signature to a trusted device for validation of signature, and then uses the data to perform operations required for printing, refilling, upgrading and key replacement. The system will therefore be responsible for performing the functional sequences required for printing, refilling, upgrading and key replacement. It formats all input parameters required for a particular function, then calls the function with the input parameters on the appropriate QA Chip Logical Interface instance, and then processes/stores the output parameters from the function appropriately.

Validation of signatures is achieved by either of the following schemes:

Direct—the signature produced by an untrusted device is directly passed in for validation to the trusted device. The direct validation requires the untrusted device to share a common key or a variant key with the trusted device. Refer to Section 7 for further details on common and variant keys.

Translation—the signature produced by an untrusted is first validated by the translating device, and a new signature of the read data is produced by the translation device for validation by the trusted device. Several translation device may be chained together—the first translation device validates the signature from the untrusted device, and the last translation device produces the final signature for validation by the trusted device. The translation device must share a common key or a variant key with the trusted/untrusted device and among themselves, if several translation devices are chained together for signature validation.

30.1 Representation

Each functional sequence consists of the following devices (refer to Section 4.3):

System.

A trusted QA Device—which may be a system trusted QA Device, or an Parameter Upgrader QA Device, or a Ink Refill QA Device, or a Key Programmer QA Device depending on the function performed. This device is referred to as device A.

An untrusted QA Device—which may be a Printer QA Device, or an Ink QA Device. This device is referred to as device B.

A translation QA Device will be used if a translation scheme is used to validate signatures. This device is referred to as device C.

The command sequence produced by the system for further sequences will be documented as shown in Table 307.

TABLE 307

Command sequence representation

| Sequence No | Function | Parameters |
|---|---|---|
| Sequence order | Device.FunctionName | Input Parameters and their values.<br>Output parameters and their description. |

Therefore, a typical direct signature validation sequence can be represented by FIG. 386 and Table 308.

For a direct signature to be used, A and B must share a common or a variant key i.e $B.K_{n1}=A.K_{n2}$ or $B.K_{n1}$=FormKeyVariant($A.K_{n2}$, B.ChipId).

TABLE 308

Command sequence for direct signature validation

| Sequence No | Function | Parameters |
|---|---|---|
| 1 | A.Random | None<br>$R_A$ = RL |
| 2 | B.Read | KeyRef = n1, SigOnly = 0, MSelect = Any one M, KeyIdSelect = 0, WordSelectForDesiredM = Any one word in the selected M, RE = $R_A$<br>If ResultFlag = Pass then MWords = SelectedWordsOfSelectedMs as per input [MSelect] and [WordSelectForDesiredM],<br>$R_B$ = $R_L$, $SIG_B$ = SIGout Refer to Section 15.3.1. |

TABLE 308-continued

Command sequence for direct signature validation

| Sequence No | Function | Parameters |
|---|---|---|
| 3 | A.Test | KeyRef = n2, DataLength = Length of MWords in words preformatted as per Section 16.1, Data = MWords preformatted as per Section 16.1, RE = $R_B$,<br>SIGE = $SIG_B$<br>ResultFlag = Pass/Fail |

A typical signature validation using translation can be represented by FIG. 387 and Table 309.

For validating signatures using translation:

A and C must share a common or a variant key i.e $C.K_{n3}=A.K_{n2}$ or $C.K_{n3}$=FormKeyVariant($A.K_2$, C.ChipId).

B and C must share a common or a variant key i.e $C.K_{n2}=B.K_{n1}$ or $B.K_{n1}$=Form KeyVariant($C.K_{n2}$, B.ChipId).

TABLE 309

Command sequence for signature validation using translation

| Sequence No | Function | Parameters |
|---|---|---|
| 1 | C. Random | None<br>$R_C$ = RL |
| 2 | B. Read | KeyRef = n1, SigOnly = 1 or 0, MSelect = any, KeyIdSelect = any, WordSelectForDesiredM = any, RE = $R_C$<br>If ResultFlag = Pass then MWords = SelectedWordsOfSelectedMs as per input [MSelect] and [WordSelectForDesiredM],<br>$R_B$ = $R_L$, $SIG_B$ = SIGout<br>Refer to Section 15.3.1. |
| 3 | A. Random | None<br>$R_A$ = RL |
| 4 | C. Translate | InputKeyRef = n2, DataLength = Length of MWords in words preformatted as per Section 17.1, Data = MWords preformatted as per Section 17.1,<br>RE = $R_B$, SIGE = $SIG_B$,<br>OutputKeyRef = n3, RE2 = $R_A$<br>If ResultFlag = Pass then<br>$R_{C1}$ = $R_{L2}$, $SIG_C$ = SIGOut<br>Refer to Section 15.3.1 |
| 5 | A. Test | KeyRef = n2, DataLength = Length of MWords in words preformatted as per Section 16.1, Data = MWords preformatted as per Section 16.1,<br>RE = $R_{C1}$, SIGE = $SIG_C$<br>ResultFlag = Pass/Fail |

31 In Field Use

This section covers functional sequences for printer and ink QA Devices, as they perform their usual function of printing.

31.1 Startup Sequence

At startup of any operation (a printer startup or an upgrade startup), the system determines the properties of each QA Device it is going to communicate with. These properties are:

Software version of the QA Device. This includes SoftwareReleaseIdMajor and SoftwareReleaseIdMinor.

The SoftwareReleaseIdMajor identifies the functions available in the QA Device. Refer to Section 13.2 for details.

The number of memory vectors in the QA Device.

The number of keys in the QA Device.

The ChipId of the QA Device.

The properties allow the system to determine which functions are available in a given QA Device, as well as the value of input parameters required to communicate with the QA Device.

Table 310 shows the startup sequence

TABLE 310

Startup command sequence

| Sequence No | Function | Command |
|---|---|---|
| 1 | B. GetInfo | None<br>Major release identifier of the QA Device = SoftwareReleaseIdMajor, Minor release identifier of the QA Device = SoftwareReleaseIdMinor, Number of memory vectors in the QA Device = NumVectors, Number of keys in the QA Device = NumKeys, Id of the QA Device = ChipId 0 = VarDataLen No VarData in case of an ink or printer QA Device |

31.1.1 Clearing the Preauthorisation Field

Preauthorisation of ink is one of the schemes that a printer may use to decrement logical ink as physical ink is used. This is discussed in details in Section 31.4.3.

If the printer uses preauthorisation, the system must read the preauthorisation field at startup. If the preauthorisation field is not clear, then the system must apply (decrement) the preauth amount to the corresponding ink field, by performing a non-authenticated write of the decremented amount to the appropriate ink field, and then clear the preauthorisation field by performing an authenticated write to the preauthorisation field.

31.2 Presence only Authentication

The purpose of presence only authentication is to determine whether the printer should or shouldn't work with the ink cartridge.

31.2.1 Without Data Interpretation

This sequence is performed when the printer authenticates the ink cartridge. The authentication consists of verifying a signature generated by the untrusted ink QA Device (in the ink cartridge) using the system's trusted QA Device.

For signature to be valid, the trusted QA Device (A) and the untrusted ink QA Device (B) must share a common or a variant key i.e $B.K_{n1}=A.K_{n2}$ or $B.K_{n1}$=FormKeyVariant ($A.K_{n2}$, B.ChipId).

A single word of a single M is read because the system is only interested in the validity of signature for a given data.

If the printer wants to verify the signature and doesn't require any data from the ink cartridge (because it is cached in the printer), then the printer calls the Read function with SigOnly set to 1. The Read returns only the signature of the data as requested by the input parameters. The printer then sends its cached data and signature (from the Read function) to its trusted QA Device for verification. The printer may use this signature verification scheme if it has read the data previously from the ink QA Device, and the printer knows that the data in the ink QA Device has not changed from value that was read earlier by the printer.

Table 311 shows the command sequence for performing presence only authentication requiring both data and signature.

| Seq No | Function | Parameters |
|---|---|---|
| 1 | A.Random | None<br>$R_A$ = RL |
| 2 | B.Read | KeyRef = n1, SigOnly = 0, MSelect = Any one M, KeyIdSelect = 0, WordSelectForDesiredM = Any one word in the selected M, RE = $R_A$<br>If ResultFlag = Pass then MWords = SelectedWordsOfSelectedMs as per input [MSelect] and [WordSelectForDesiredM], $R_B$ = $R_L$, $SIG_B$ = SIGout<br>Refer to Section 15.3.1. |
| 3 | A.Test | KeyRef = n2, DataLength = Length of MWords in words preformatted as per Section 16.1, Data = MWords preformatted as per Section 16.1, RE = $R_B$, SIGE = $SIG_B$<br>ResultFlag = Pass/Fail |

31.2.2 With Data Interpretation

This sequence is performed when the printer reads the relevant data from the untrusted QA Device in the ink cartridge. The system validates the signature from the external ink QA Device, and then uses this data for further processing.

For signature to be valid, the trusted QA Device (A) and the untrusted QA Device (B) must share a common or a variant key i.e $B.K_{n1}=A.K_{n2}$ or $B.K_{n1}$=FormKeyVariant ($A.K_{n2}$, B.ChipId).

The data read assists the printer to determine the following before printing can commence:

Which fields in $_{M0}$ store logical ink amounts in the ink QA Device.

The size of the ink fields in the ink QA Device. Refer to Section 8.1.1.1.

The type of ink.

The amount of ink in the field.

Table 312 shows the command sequence for performing presence only authentication (with data interpretation).

| Seq No | Function | Parameters |
|---|---|---|
| 1 | A.Random | None<br>$R_A$ = RL |
| 2 | B.Read | KeyRef = n1, SigOnly = 0, MSelect = 0x03(indicates M0 and M1), KeyIdSelect = 0xFF (Read all KeyIds), WordSelectForDesiredM (for $_{M0}$) = 0xFFFF (Read all 16 $_{M0}$words), WordSelectForDesiredM (for $_{M1}$) = 0xFFFF(Read all 16 $_{M1}$words), RE = $R_A$<br>If ResultFlag = Pass then MWords = SelectedWordsOfSelectedMs as per input [MSelect] and [WordSelectForDesiredM], All 16 words of $_{M0}$ and $_{M1}$. $R_B$ = RL<br>$SIG_B$ = SIGout Refer to Section 15.3.1 |
| 3 | A.Test | Input Key = n2, DataLength = Length of MWords in words preformatted as per Section 16.1, Data = MWords preformatted as per Section 16.1, RE = $R_B$, SIGE = $SIG_B$<br>ResultFlag = Pass/Fail |

31.2.2.1 Locating Ink Fields and Determining Ink Amounts Remaining

Before printing can commence, the printer must determine the ink fields in the ink cartridge so that it can decrement these fields with the physical use of ink. The printer must also verify that the ink in the ink cartridge is suitable for use by the printer.

This process requires reading data from the ink QA Device and then comparing the data to what is required. To perform the comparison the printer must store a list for each ink it uses.

The ink list must consist of the following:

Ink Id—A identifier for the ink

KeyId—The KeyId of the key used to fill/refill this ink.

Type—This is the type attribute of the ink.

The ink list stored in the printer is shown in Table 313.

| Ink Id | KeyId | Type |
|---|---|---|
| 1- represents black ink | 1- represents KeyId of Network_OEM_InkFill/RefillKey[b] | 0x55 TYPE_REGULAR_BLACK_INK[a] |
| 2- represents cyan ink | 1- represents KeyId of Network_OEM_InkFill/RefillKey[b] | 0x9F TYPE_HIGHQUALITY_CYAN_INK[a] |
| 3- represents magenta ink | 1- represents KeyId of Network_OEM_InkFill/RefillKey[b] | 0x9A TYPE_HIGHQUALITY_MAGENTA_INK[a] |
| 4- represents yellow ink | 1- represents KeyId of Network_OEM_InkFill/RefillKey[b] | 0x9C TYPE_HIGHQUALITY_YELLOW_INK[a] |

[a]These Types are only used as an example.
[b]These KeyIds are only used as an example.

The printer will perform a Read of the ink QA Device's M0, M1 and KeyIds to determine the following:

The correct ink field ($_{M0}$ field) in the ink QA Device.

The amount of ink-remaining in the field.

The ink QA Device's M1 and KeyId helps the printer determine the location of the ink field and ink QA Device's M0 and M1 helps determine the amount of ink-remaining in the field.

31.2.2.2 FieldNum FindFieldNum(keyIdRequired, typeRequired)

This function returns a FieldNum of an M0 field, whose authenticated ReadWrite access key's KeyId is keyIdRequired, and whose Type attribute matches typeRequired. If no matching field is found it returns a FieldNum=255. This function must be available in the printer system so that it can determine the ink field required by it.

The function sequence is described below.

```
# Get total number of fields in the ink QA Device
FieldSize[16] ←0 # Array to hold FieldSize assuming there are 16
fields
NumFields← FindNumberOfFieldsInM0(M1,FieldSize) # Refer to
Section 19.4.1.
# Loop through KeyIds read assuming all KeyIds have been read
from ink QA Device
For i ←0 to 7
    #Check if KeyId read matches
    If(KeyIdi= keyIdRequired # Matching KeyId found
        KeyNum ← i        # Get the KeyNum of the matching KeyId
        # Now look through the field to check which field has
```

-continued

```
        #write permissions with this KeyNum
        For j ←0 to NumOfFields
            AuthRW ←M1[j].AuthRW # Isolate AuthRW for field
            # Check authenticated write is allowed to the field
            If(AuthRW = 1)
                KeyNumj← M1[j].KeyNum # Isolate KeyNum of the
                field
                Typej ←M1[j].Type #Islotate Type attribute of
                the field
                # Check if Key is write key for the field and
                type of
Ink Id#2
                If (KeyNum = KeyNumj) ∧(Typej = typeRequired)
                    FieldNum ← j
                    return FieldNum
                EndIf
            EndIf
        EndFor # Loop through to next field
        FieldNum ← 255 # Error - no field found
        return FieldNum
    EndIf
EndFor # Loop through to next KeyId
```

For e.g if the printer wants to find an ink field that matches Ink Id#2 (from Table 313) in the ink QA Device, it must call the function FindFieldNum with keyIdRequired=KeyId of Network_OEM_InkFill/Refill Key and typeRequired=TYPE_HIGHQUALITY_CYAN_INK.

31.2.2.3 Ink-Remaining Amount

This can be determined by using the function GetFieldDataWords(FieldNum,FieldData[ ], M0,M1) described in Section 27.1.4.14. FieldNum must be set to the value returned from function in Section 31.2.2.2. FieldData returns the ink-remaining amount.

The function GetFieldDataWords(FieldNum,FieldData[ ], M0,M1) must be implemented in the printer system.

31.3 Presence only Authentication through the Translate Function

This sequence is performed when the printer reads the data from the untrusted ink QA Device in the ink cartridge but uses a translating QA Device to indirectly validate the read data. The translating QA Device validates the signature using the key it shares with the untrusted QA Device, and then signs the data using the key it shares with the trusted QA Device. The trusted QA Device then validates the signature produced by the translating QA Device.

For validating signatures using translation:

A and C must share a common or a variant key i.e $C.K_{n3}=A.K_{n2}$ or $C.K_{n3}$=FormKeyVariant($A.K_{n2}$, C.ChipId).

B and C must share a common or a variant key i.e $C.K_{n2}=B.K_{n1}$ or $B.K_{n1}$=FormKeyVariant($C.K_{n2}$, B.ChipId).

Table 314 shows a command sequence for presence only authentication using translation

| Seq No | Function | Parameters |
|---|---|---|
| 1 | C.Random | None<br>$R_C$ = RL |
| 2 | B.Read | KeyRef = n1, SigOnly = 1 or 0, MSelect = any M, KeyIdSelect = 0, WordSelectForDesiredM = any, RE = $R_C$<br>If ResultFlag = Pass then MWords = SelectedWordsOfSelectedMs as per input |

-continued

| Seq No | Function | Parameters |
|---|---|---|
| | | [MSelect] and [WordSelectForDesiredM], $R_B = R_L$, $SIG_B$ = SIGout Refer to Section 15.3.1 |
| 3 | A.Random | None $R_A$ = RL |
| 4 | C.Translate | InputKeyRef = n2, DataLength = Length of MWords in words preformatted as per Section 17.1, Data = MWords preformatted as per Section 17.1, RE = $R_B$, SIGE = $SIG_B$, OutputKeyRef = n3, RE2 = $R_A$ If ResultFlag = Pass then $R_{C1}$ = RL1, $SIG_C$ = SIGOut Refer to Section 15.3.1 |
| 5 | A.Test | KeyRef = n2, DataLength = Length of MWords in words preformatted as per Section 16.1, Data = MWords preformatted as per Section 16.1, RE = $R_{C1}$, SIGE = $SIG_C$ ResultFlag = Pass/Fail |

31.4 Updating the Ink-Remaining

This sequence is performed when the printer is printing. The ink QA Device holds the logical amount of ink-remaining corresponding to the physical ink left in the cartridge. This logical ink amount must decrease, as physical ink from the ink cartridge is used for printing.

31.4.1 Sequence of Update

The primary question is when to deduct the logical ink amount—before or after the physical ink is used.

a. Print first (use physical ink) and then update the logical ink. If the power is cut off after a physical print and before a logical update, then the logical update is not performed. Therefore, the logical ink-remaining is more than the physical ink-remaining. Performing repeated power cuts will increase the differential amount, and finally any physical ink could be used to refill the QA Device.

b. Update the logical ink and then print (use physical ink). This is better than (a) because other physical inks cannot be used. However, if a problem occurs during printing, after the logical amount has already been deducted, there will be a disparity between logical and physical amounts. This might result in the printer not printing even if physical ink is present in the ink cartridge. The amount of disparity can be reduced by increasing the frequency of updating logical ink i.e update after each line instead of after each page.

c. Preauthorise logical ink. Preauthorise certain amount of ink (depends on the frequency of logical updates) before print and clear it at the end of printing. If power is cut off after a page is printed, then on start up, the printer reads the preauthorisation field, if it has not been cleared, it applies the preauth amount to the ink-remaining amount, and then clears the preauthorisation field.

31.4.2 Basic Update

Some printers may use one of methods described in Section 31.4.1 (a) or (b) to update logical ink amounts in the ink QA Device. This method of updating the ink is termed as a basic update. The decremented amount is written to the appropriate ink field (which has been previously determined using Section 31.2.2) in $M_0$ The printer verifies the write, by reading the signature of the written data, then passing it to the Test function of the trusted QA Device.

For signature to be valid, the trusted QA Device (A) and ink QA Device (B) must share a common or a variant key i.e $B.K_{n1}=A.K_{n2}$ or $B.K_{n1}$=FormKeyVariant($A.K_{n2}$, B.ChipId).

TABLE 315

Command sequence for updating the ink-remaining (basic)

| Seq No | Function | Parameter |
|---|---|---|
| 1 | B.WriteFields | VectNum = 0, FieldSelect = Select bits corresponding to the Ink fields, The ink field locations should have been determined before by using the method in Section 31.2.2.1 FieldVal = Decremented ink-remaining amount ResultFlag = Pass/Fail |
| 2 | A.Random | None $R_A$ = RL |
| 3 | B.Read | KeyRef = n1, SigOnly = 1, (We only need the signature because we already know the data) MSelect = $M_0$, KeyIdSelect = 0, WordSelectForDesiredM = corresponds to the ink fields written in Seq No 1, RE = $R_A$ If ResultFlag = Pass then SelectedWordsOfSelectedMs not returned because [SigOnly] = 1 in Seq 3, $R_B = R_L$, $SIG_B$ = SIGout Refer to Section 15.3.1 |
| 4 | A.Test | KeyRef = n2, DataLength = length in words as per Seq No 1 [MVal] preformatted as per Section 16.1, Data = as per Seq No 1 [MVal] preformatted as per Section 16.1, RE = $R_B$, SIGE = $SIG_B$ ResultFlag = Pass/Fail |

31.4.3 Preauthorisation

This section describes the update of logical ink amounts using preauthorisation.

The basic preauthorisation sequence is as follows:

a. Preauthorise before the first print. Preauthorisation amount depends on the printer model. Example amounts could be the ink required for an fully covered A4 page or an A3 page. Value corresponding to the preauth amount is written to the preauth field in the ink QA Device.

Note: The preauth value must be correctly interpreted on different printer models i.e if a preauthorisation amount of A4 page is set in the ink cartridge in printer1(model1), and later the ink cartridge is placed in printer2(model2) with its preauth still set, printer2 must deduct an A4 page worth of ink from ink-remaining amount.

b. Print the page.

c. Write the deducted logical amount to the ink field of the ink QA Device and validate the write by reading the signature of the ink field.

d. Repeat b to c till the last page has been printed.

e. Clear the preauth amount.

f. If the power is cut off before the preauth is applied, on startup apply the preauth amount to the corresponding ink field, by performing a non authenticated write of the decremented amount and clear the preauth amount by performing an authenticated write of the preauth field.

31.4.3.1 Set Up of the Preauth Field

Only a single preauth gield must exist in an Ink QA Device.

Preauth field will consist of a single $M_0$ word but can be optionally extended to two $M_0$ words by using a different value of type attribute. FIG. 388 shows the setup of preauth field's attributes in $M_1$.

The preauth field has authenticated ReadWrite access using the INK_USAGE_KEY i.e INK_USAGE_KEY can perform authenticated writes to this field. This key or its variant is shared between the ink QA Device and the printer QA Device to validate any data read from the ink cartridge.

For signature to be valid, $B.K_{n1}=A.K_{n2}$ or $B.K_{n1}$=FormKeyVariant($A.K_{n2}$, B.ChipId), where $K_{n1}$=INK_USAGE_KEY. The system performs a WriteAuth to the preauth field using this key, to set up the preauth amount, and to clear the preauth amount.

The preauth field is identified by two attributes:

Type attribute—TYPE_PREAUTH. Refer to Appendix A.

KeyId of KeyNum attribute must be the same as the KeyId of the INK_USAGE_KEY which the printer uses to validate the any data read from the ink QA Device.

The Preauth field can be applied to a single ink field or multiple ink fields.

31.4.3.2 Preauth Applied to a Single Ink Field

In this case the entire preauth field is used to store the preauth amount and is only linked to one ink field.

31.4.3.3 Preauth Applied to Multiple Ink Fields

Multiple preauth fields can be accommodated in a single $_{M0}$ field by a scheme shown in FIG. 388A.

This scheme supports a maximum of 8 ink fields being present in the Ink QA Device.

The field in $_{M0}$ is divided into two parts— preauth field select and preauth amount. Each bit in preauth field select corresponds to a single ink field, and the preauth amount for each ink field is the same. If an ink cartridge uses multiple inks which are preauthorised, then each of the inks will have a corresponding preauth field bit. Before a particular ink is used for printing the corresponding preauth field bit is set. The preauth amount field is also set if the previous amount is zero. At finish, the preauth field bit is cleared. If more than one ink is used, the preauth bit for each ink field is set, and at finish each bit is cleared with last bit clearing the preauth amount as well.

31.4.3.4 Locating Preauth Fields and Determining Preauth Field Value

The preauth field can be located in the same manner as the ink field. If the printer wants to find the preauth field in the ink QA Device, it must call the function FindFieldNum (see Section 31.2.2.2) with keyIdRequired=KeyId of Network_OEM_Ink_Usage_Key and typeRequired=TYPE_PREAUTH.

The preauth field value can be read in the same manner as the ink-remaining amount. This requires using of the function GetFieldDataWords(FieldNum,FieldData[ ], M0,M1) described in Section 27.1.4.14. FieldNum must be set to the value returned from function FindFieldNum, which in this case is the field number of the preauth field. FieldData returns the value of the preauth field.

31.4.3.5 Command Sequence

The command sequence can be broken up into three parts:

Start of print sequence.

During print sequence.

End of print sequence.

31.4.3.5.1 Start of Print Sequence

This sets up the preauth amount before the start of printing.

Table 316 shows the command sequence for start of print sequence. The first Random-Read-Test sequence determines the preauth field in the ink QA Device and its value. The Random-SignM-WriteFieldsAuth sequence, then writes to the preauth field the new preauth value.

TABLE 316

Updating the consumable remaining (preauth) start of print sequence

| Seq No | Function | Parameters |
|---|---|---|
| Random-Read - Test sequence to determine the location of the preauth field in the ink QA Device and its value | | |
| 1 | A.Random | None<br>$R_A$ = RL |
| 2 | B.Read | KeyRef = n1, SigOnly = 0, WordSelectForDesiredM (for $_{M0}$) = all 16 words of M0 and all 16 words of M1 MSelect = 0x03(indicates M0 and M1), KeyIdSelect = 0xFF (Read all KeyIds), WordSelectForDesiredM (for $_{M0}$) = 0xFFFF (Read all 16 $_{M0}$words), WordSelectForDesiredM (for $_{M1}$) = 0xFFFF(Read all 16 $_{M1}$words), RE = $R_A$<br>If ResultFlag = Pass then MWords = SelectedWordsOfSelectedMs as per input [MSelect] and [WordSelectForDesiredM], $R_B$ = $R_L$, $SIG_B$ = SIGout<br>Refer to Section 15.3.1 |
| 3 | A.Test | KeyRef = n2, DataLength = length of MWords in words preformatted as per Section 16.1, Data = MWords as per Seq No 2 preformatted as per Section 16.1, RE = $R_B$, SIGE = $SIG_B$<br>ResultFlag = Pass/Fail |
| Random-SignM-WriteFieldsAuth sequence to write the new preauth value | | |
| 4 | B.Random | None<br>$R_{B1}$ = RL |
| 5 | A.SignM | KeyRef = n2, FieldSelect = Select bit corresponding to the Preauth field, FieldVal = new preauth value, ChipId = ChipId of B, $R_E$ = $R_{B1}$<br>If ResultFlag = Pass then $R_{A1}$ = $R_L$<br>$SIG_A$ = SIGout Refer to Section 27.1.3.1 |
| 6 | B.WriteFieldsAuth | KeyRef = n1, FieldSelect = same as Seq 5 [FieldSelect], FieldVal = same as Seq 5 [FieldVal], RE = $R_{A1}$<br>SIGE = $SIG_A$<br>ResultFlag = Pass/Fail |

31.4.3.5.2

During Print Sequence

This set of commands are repeated at equal intervals to update logical ink amounts to the ink QA Device during printing.

Table 317 shows the command sequence for the print sequence. The WriteFields writes the updated value to the ink field. Random-Read-Test reads back the value written and tests whether the value read matches the value written.

TABLE 317

| Seq No | Function | Parameters |
|---|---|---|
| | | Updating the consumable remaining (preauth) during print sequence |
| Write the decremented ink-remaining account. | | |
| 7 | B.WriteFields | FieldSelect = Select bits corresponding to the Ink fields, FieldVal = Decremented ink-remaining amount for a single ink or multiple ink fields as per FieldSelect. ResultFlag = Pass/Fail |
| Random-Read-Test sequence to read and verify the ink-remaining amount written | | |
| 8 | A.Random | None $R_A$ = RL |
| 9 | B.Read | KeyRef = n1, SigOnly = 1 -(We only need the signature because we already know the data), MSelect = 0x01 (only $_{M0}$), KeyIdSelect = 0, WordSelectForDesiredM = corresponds to the ink fields written in Seq No 7, RE = $R_A$ If ResultFlag = Pass then SelectedWordsOf SelectedMs not returned because [SigOnly] = 1 in Seq 9 $R_B = R_L$, $SIG_B$ = SIGout Refer to Section 15.3.1. |
| 10 | A.Test | KeyRef = n2, DataLength = length in words as per Seq No 7 [MVal] preformatted as per Section 16.1, Data = as per Seq No 7 [MVal] preformatted as per Section 16.1, RE = $R_B$, SIGE = $SIG_B$ ResultFlag = Pass/Fail |

31.4.3.5.3 End of Print Sequence

This sequence clears preauth amount before the print sequence is completed.

Table 318 shows the command sequence for the end of print sequence.

The preauth field is read using the Random-Read-Test sequence. And the preauth field is cleared using the Random-SignM-WriteFieldsAuth sequence.

TABLE 318

| Seq No | Function | Parameters |
|---|---|---|
| | | Updating the consumable remaining (preauth) end of print sequence |
| Random-Read-Test sequence to read the preauth field and verify the preauth data | | |
| 11 | A.Random | None $R_A = R_L$ |
| 12 | B.Read | KeyRef = n1, SigOnly = 1, MSelect = 0x01 (only M0), KeyIdSelect = 0, WordSelectForDesiredM (for $_{M0}$) = Words corresponding to the Preauthfield that has been written to in Seq 5 [FieldSelect] in Table 317. RE = $R_A$ If ResultFlag = Pass then MWords = SelectedWordsOfSelectedMs as per Seq No 12 [MSelect] and [WordSelectForDesiredM], $R_B$ = $R_L$, $SIG_B$ = SIGout Refer to Section 15.3.1 |
| 13 | A.Test | KeyRef = n2, DataLength = length of MWords in words as per Seq No 12 preformatted as per Section 16.1, Data = MWords as per Seq No 12 preformatted as per Section 16.1, RE = $R_B$, SIGE = $SIG_B$ ResultFlag = Pass/Fail |
| Random-SignM-WriteFieldsAuth sequence clears the preauth field | | |
| 14 | B.Random | None $R_{B1} = R_L$ |
| 15 | A.SignM | KeyRef = n2, FieldSelect = Select bit corresponding to Pre authfield, FieldVal = Clear the preauth field, ChipId = ChipId of B, $R_E = R_{B1}$ If ResultFlag = Pass then $R_{A1}$ = $R_L$ $SIG_A$ = SIGout Refer to Section 27.1.3.1 |
| 16 | B.WriteFieldsAuth | KeyRef = n1, FieldNum = same as Seq 5 [FieldSelect], FieldData = same as Seq 5 [FieldVal], RE = $R_{B1}$, SIGE = $SIG_A$ ResultFlag = Pass/Fail |

31.4.4 Preauthorisation through the Translate Function

This is performed when the system trusted QA Device doesn't share a key with the ink QA Device, and uses a translating QA Device to Translate a Read from the ink QA Device, and to Translate a SignM to the ink QA Device.

The basic translate principle involves translating the Read data from the untrusted QA Device, to the Test data of the trusted QA Device, and translating the SignM data from the trusted QA Device, to the WriteFieldsAuth data of the untrusted QA Device.

For validating signatures using translation:

The trusted QA Device (A) and the translating QA Device (C) must share a common or a variant key i.e $C.K_{n3}=A.K_{n2}$ or $C.K_{n3}$=FormKeyVariant($A.K_{n2}$, C.ChipId).

The ink QA Device (B) and the translating QA Device (C) must share a common or a variant key i.e $C.K_{n2}=B.K_{n1}$ or $B.K_{n1}$=FormKeyVariant($C.K_{n2}$, B.ChipId).

Only the start of print sequence is described using Translate. The rest of the sequences in preauthorisation can be modified to apply translation using this example.

Table 319 shows the command sequence for preauth (start of print sequence) using translation.

TABLE 319

Preauth(start of print sequence) using translate command

| Seq No | Function | Parameter |
|---|---|---|
| Random-Read-Random-Translate-Test sequence reads the location of the preauth field and its value using the translating QA Device C | | |
| 1 | C.Random | None<br>$R_C$ = RL |
| 2 | B.Read | KeyRef = n1, SigOnly = 0, MSelect = 0x03(indicates M0 and M1), KeyIdSelect = 0xFF (Read all KeyIds), WordSelectForDesiredM (for $_{M0}$) = 0xFFFF (Read all 16 $_{M0}$ words), WordSelectForDesiredM (for $_{M1}$) = 0xFFFF (Read all 16 $_{M1}$ words), RE = $R_A$<br>If ResultFlag = Pass then MWords = SelectedWordsOfSelectedMs as per input [MSelect] and [WordSelectForDesiredM], $R_B$ = $R_L$, $SIG_B$ = SIGout Refer to Section 15.3.1 |
| 3 | A.Random | None<br>$R_A$ = RL |
| 4 | C.Translate | InputKeyRef = n2, DataLength (in words) = length of MWords in words as per Seq No 2 preformatted as per Section n 17.1, Data = MWords as returned from Seq No 2 preformatted as per Section 17.1, RE = $R_B$, SIGE = $SIG_B$ OutputKeyRef = n3, RE2 = $R_A$<br>If ResultFlag = Pass then $R_{C1}$ = RL2, $SIG_C$ = SIGOut Refer to FIG. 15.3.1 |
| 5 | A.Test | KeyRef = n2, DataLength = length of MWords in words as per Seq No 2 preformatted as per Section 16.1, Data = MWords as returned from Seq No 2 parameter preformatted as per Section 16.1, RE = $R_{C1}$, SIGE = $SIG_C$<br>ResultFlag = Pass/Fail |
| Random-SignM-Random-Translate-WriteFieldAuth sequence to write the new preauth value using the translating QA Device C | | |
| 6 | C.Random | None<br>$R_{C2}$ = $R_L$ |
| 7 | A.SignM | KeyRef = n2, FieldSelect = Select bit corresponding to Pre authfield, FieldVal = new value of preauth field, ChipId = ChipId of B, $R_E$ = $R_{C2}$<br>If ResultFlag = Pass then $R_{A1}$ = $R_L$ $SIG_A$ = SIGout Refer to Section 27.1.3.1 |
| 8 | B.Random | None<br>$R_{B1}$ = $R_L$ |
| 9 | C.Translate | InputKeyRef = n3, DataLength (in words) = length in words as per Seq 7 [FieldSelect] preformatted as per Section 17.1, Data = same as Seq 7 [FieldVal] preformatted as per Section 17.1, RE = $R_{A1}$, SIGE = $SIG_A$, OutputKeyRef = n2, RE2 = $R_{B1}$<br>If ResultFlag = Pass then $R_{C3}$ = $R_{L2}$, $SIG_C$ = SIGOut Refer to FIG. 15.3.1 |
| 10 | B.WriteFieldsAuth | KeyRef = n1, FieldNum = same as Seq 7 [FieldSelect], FieldData = same as Seq 7 [FieldVal], RE = $R_{C3}$, SIGE = $SIG_C$<br>ResultFlag = Pass/Fail, |

31.5 Upgrading the Printer Parameters

This sequence is performed when a printer's operating parameter is upgraded.

The Parameter Upgrader QA Device stores the upgrade value which is copied to the operating parameter field of the Printer QA Device, and the count-remaining associated with upgrade value is decremented by 1 in the Parameter Upgrader QA Device.

The Parameter Upgrader QA Device output the data and signature only after completing all necessary checks for the upgrade.

31.5.1 Basic

The basic upgrade is used when the Parameter Upgrader QA Device and Printer QA Device being upgraded share a common key or a variant key i.e $B.K_{n1}$=$A.K_{n2}$ or $B.K_{n1}$=FormKeyVariant($A.K_{n2}$, B.ChipId), where B is the Printer QA Device and A is the Parameter Upgrader QA Device.

Therefore, the messages and their signatures, generated by each of them can be correctly interpreted by the other.

The transfer sequence is performed using Random-Read-Random-XferField-WriteFieldsAuth. Table 320 shows the command sequence for a basic upgrade.

TABLE 320

| Seq No | Function | Parameter |
|---|---|---|
| | | Basic upgrade command sequence |
| Random-Read-Random-XferField-WriteFieldsAuth reads M0 and M1 of the QA Device being upgraded, Parameter Upgrader QA Device produces the upgrade value for FieldNumE and Sequence data fields SEQ_1 and SEQ_2, then these values are written to the Printer QA Device. | | |
| 1 | A.Random | None $R_A = R_L$ |
| 2 | B.Read | KeyRef = n1, SigOnly = 0, MSelect = 3 (indicates $_{M0}$ and $_{M1}$), KeyIdSelect = 0x00 (no KeyIds required), WordSelectForDesiredM (for $_{M0}$) = 0xFFFF (Read all $_{M0}$ words), WordSelectForDesiredM (for $_{M1}$) = 0xFFFF (Read all $_{M1}$ words), RE = $R_A$ If ResultFlag = Pass then MWords = SelectedWordsOfSelectedMs, as per input [MSelect] and [WordSelectForDesiredM], $R_B$ = RL,. $SIG_B$ = SIGout Refer to Section 15.3.1 |
| 3 | B.Random | None $R_{B1} = R_L$ |
| 4 | A.XferField | KeyRef = n2, $_{M0}$OfExternal = First 16 words of MWords, $_{M1}$OfExternal = Last 16 words of MWords, ChipId = ChipId of B, FieldNumL = The field storing the upgrade value in the Parameter Upgrader QA Device. The value of this field will be copied to FieldNumE. FieldNumE = The field which will be upgraded in the Printer QA Device. RE = $R_B$, $R_{E2} = R_{B1}$, $SIG_E$ = $SIG_B$ If ResultFlag = Pass then FieldSelectB1 = FieldSelect − Select bits for FieldNumE and Seq data fields SEQ_1 and SEQ_2 field, FieldValB1 = FieldVal -New Value for FieldNumE (Copied from FieldNumL of the Parameter Upgrader QA Device) and sequence data fields $R_{A1} = R_{L2}$, $SIG_A$ = SIGout = Refer to Section 27.1.3.1. |
| 5 | B.WriteFieldsAuth | KeyRef = n1, FieldSelect = FieldSelectB1, FieldData = FieldValB1, RE = $R_{A1}$, SIGE = $SIG_A$ ResultFlag = Pass/Fail |

31.5.2 Using the Translate Function

The upgrade through the Translate function is used when the Parameter Upgrader QA Device and the Printer QA Device don't share a key between them. The translating QA Device shares a key with the Parameter Upgrader QA Device and a second key with the Printer QA Device. Therefore the messages and their signatures, generated by the Parameter Upgrader QA Device and the Printer QA Device are translated appropriately by the translating QA Device. The translating QA Device validates the Read from the Printer QA Device, and translates it for input to the XferField function. The translating QA Device will validate the output from the XferField function, and then translate it for input to WriteFieldsAuth message of the Printer QA Device.

For validating signatures using translation:

The Parameter Upgrader QA Device (A) and the translating QA Device (C) must share a common or a variant key i.e $C.K_{n3}=A.K_{n2}$ or $C.K_{n3}$=FormKeyVariant($A.K_{n2}$, C.ChipId).

The Printer QA Device (B) and the translating QA Device (C) must share a common or a variant key i.e $C.K_{n2}=B.K_{n1}$ or $B.K_{n1}$=FormKeyVariant($C.K_{n2}$, B.ChipId).

Table 321 shows the command sequence for a basic refill using translation.

TABLE 321

| Seq No | Function | Command |
|---|---|---|
| | | An upgrade with translate command sequence |
| Random-Read-Random-Translate-Random-XferField-Random-Translate-Random-WriteFieldsAuth reads M0 and M1 of the Printer QA Device using the translating QA Device C and then does a write of the upgrade value to FieldNumE and new sequence data to the seq data fields SEQ_1 and SEQ_2 field of the Printer QA Device using the translating QA Device C. | | |
| 1 | C.Random | None $R_C = R_L$ |
| 2 | B.Read | KeyRef = n1, SigOnly = 0, MSelect = 0x03(indicates $_{M0}$ and $_{M1}$), KeyIdSelect = |

TABLE 321-continued

An upgrade with translate command sequence

| Seq No | Function | Command |
|---|---|---|
| | | 0x00 (no KeyIds required), WordSelectForDesiredM (for $_{M0}$)= 0xFFFF (Read all $_{M0}$ words), WordSelectForDesiredM (for $_{M1}$) = 0xFFFF (Read all $_{M1}$ words), $R_E = R_C$ |
| | | If ResultFlag = Pass then MWords = SelectedWordsOfSelectedMs as per input [MSelect] and [WordSelectForDesiredM], $R_B$ = RL, $SIG_B$ = SIGout Refer to Section 15.3.1 |
| 3 | A.Random | None |
| | | $R_A = R_L$ |
| 4 | C.Translate | InputKeyRef = n2, DataLength = MWords length in words as per Seq No 2 preformatted as per Section 17.1, Data = MWords as returned from Seq No 2 preformatted as per Section 17.1, RE = $R_B$, SIGE = $SIG_B$, OutputKeyRef = n3, RE2 = $R_A$ |
| | | If ResultFlag = Pass then $R_{C1}$, = RL2, $SIG_C$ = SIGOut Refer to Section 17.3.1 |
| 5 | C.Random | None |
| | | $R_{C2} = R_L$ |
| 6 | A.XferField | KeyRef = n2, $_{M0}$OfExternal = First 16 words of MWords, $_{M1}$OfExternal = Last 16 words of MWords, ChipId = ChipId of B, FieldNumL = The field storing the upgrade value in the Parameter Upgrader QA Device. FieldNumE = The field which will be upgraded in the Printer QA Device. $R_E = R_{C1}$, $R_{E2} = R_{C2}$, $SIG_E = SIG_C$ |
| | | If ResultFlag = Pass then FieldSelectB1 = FieldSelect − Select bits for FieldNumE and sequence fields, FieldValB1 = FieldVal − New Value for FieldNumE (Copied from FieldNumL of the Parameter Upgrader QA Device) and sequence fields SEQ_1 and SEQ_2, $R_{A1} = R_{L2}$, $SIG_A$ = SIGout Refer to Section 27.1.3.1 |
| 7 | B.Random | None |
| | | $R_{B1} = R_L$ |
| 8 | C.Translate | InputKeyRef = n3, DataLength = FieldValB1 length in words as per Seq No 6 preformatted as per Section 17.1, Data = FieldValB1 as returned from Seq No 6 preformatted as per Section 17.1, RE = $R_{A1}$, SIGE = $SIG_A$, OutputKeyRef = n2, RE2 = $R_{B1}$ |
| | | If ResultFlag = Pass then $R_{C3} = R_{L2}$, $SIG_C$ = SIGOut Refer to Section 17.3.1 |
| 19 | B.WriteFieldsAuth | KeyRef = n1, FieldSelect = FieldSelectB1, FieldVal = FieldValB1, RE = $R_{C3}$, SIGE = $SIG_C$ |
| 10 | | ResultFlag = Pass/Fail |

31.6 Recovering from a Failed Upgrade

This sequence is performed if the upgrade failed (for e.g Printer QA Device didn't receive the upgrade message correctly and hence didn't upgrade successfully). The Parameter Upgrader QA Device therefore needs to be rolled back to the previous value before the upgrade. In this case, the count-remaining associated with the upgrade value in the Parameter Upgrader QA Device is increased by one.

The Parameter Upgrader QA Device checks that the Printer QA Device didn't actually receive the message correctly using the StartRollBack function. The RollBack-Field performs further comparisons on sequence fields and FieldNumE of the Printer QA Device to values stored in the XferEntry cache. After performing all checks, the Parameter Upgrader QA Device increments the count remaining field associated with the upgrade value field by one. Refer to Section 26 and Section 28 for details.

The rollback is started using the Random-Read-Random-StartRollBack-WriteFieldsAuth and the rollback of the Parameter Upgrader QA Device is performed using Random-Read-RollBackField sequence.

Table 322 shows the command sequence for a rollback upgrade.

| Seq No | Function | Command |
|---|---|---|
| Random-Read-Random-StartRollBack-WriteFieldsAuth starts the rollback and updates data for the sequence fields. | | |
| 1 | A.Random | None |
| | | $R_A$ = RL |

-continued

| Seq No | Function | Command |
|---|---|---|
| 2 | B.Read | KeyRef = n1 , SigOnly = 0, MSelect = 0x03(indicates $_{M0}$ and $_{M1}$), KeyIdSelect = 0x00 (no KeyIds required), WordSelectForDesiredM (for $_{M0}$) = 0xFFFF (Read all $_{M0}$ words), WordSelectFor DesiredM (for $_{M1}$) = 0xFFFF(Read all $_{M1}$ words), $R_E = R_A$<br>If ResultFlag = Pass then MWords = SelectedWordsOf SelectedMs as per input [MSelect] and [WordSelectFor DesiredM], $R_B = R_L$, $SIG_B$ = SIGout Refer to Section 15.3.1 |
| 3 | B.Random | None<br>$R_{B1} = R_L$ |
| 4 | A.StartRoll Back | KeyRef = n2, $_{M0}$OfExternal = First 16 words of MWords, $_{M1}$OfExternal = Last 16 words of MWords, ChipId = ChipId of B, FieldNumE= The field which was not upgraded in the Printer QA Device, FieldNumL = The upgrade value in the Parameter Upgrader QA Device which couldn't be copied to FieldNumE of the Printer QA Device, $R_E = R_B$, $R_{E2} = R_{B1}$, $SIG_E = SIG_B$<br>If ResultFlag = Pass then FieldSelectB = FieldSelect − Select bits for sequence data fields SEQ_1 and SEQ_2, FieldValB = FieldVal − New values for SEQ_1 and SEEQ_2 fields $R_{A1} = R_{L2}$ $SIG_A$ = SIGout Refer to Section 27.1.3.1. |
| 5 | B.WriteFieldsAuth | KeyRef = n1, FieldSelect = FieldSelectB, FieldData = FieldValB, RE = $R_{A1}$, SIGE = $SIG_A$<br>ResultFlag = Pass/Fail |
| Random-Read-RollBackField performs a read of the QA Device being upgraded, checks its values are as per Xfer Entry cache, and then adjusts its count-remaining field. | | |
| 6 | A.Random | None<br>$R_{A2}$ = RL |
| 7 | B.Read | KeyRef = n1, SigOnly = 0, MSelect = 0x03 (indicates $_{M0}$ and $_{M1}$), KeyIdSelect = 0x00 (no KeyIds required), WordSelectForDesiredM (for $_{M0}$) = 0xFFFF (Read all $_{M0}$ words), WordSelectForDesiredM (for $_{M1}$) = 0xFFFF(Read all $_{M1}$ words), $R_E = R_{A2}$<br>If ResultFlag = Pass then MWords = SelectedWordsOfSelectedMs as per input [MSelect] and [WordSelectForDesiredM], $R_{B2}$ = RL, $SIG_B$ = SIGout Refer to Section 15.3.1 |
| 8 | A.Roll Back Field | KeyRef = n2, $_{M0}$OfExternal = First 16 words of MWords, $_{M1}$OfExternal = Last 16 words of MWords, ChipId = ChipId of B, FieldNumE = The field which was not upgraded in the Printer QA Device, FieldNumL = The upgrade value in the Parameter Upgrader QA Device which couldn't be copied to FieldNumE of the Printer QA Device, $R_E = R_{B2}$, $SIG_E = SIG_B$<br>ResultFlag = Pass/Fail |

31.7 Re/Filling the Consumable (INK)

This sequence is performed when an ink cartridge is first manufactured or after all the physical ink has been used, it can be filled or refilled. The re/fill protocol is used to transfer the logical ink from the Ink Refill QA Device to the Ink QA Device in the ink cartridge.

The Ink Refill QA Device stores the amount of logical ink corresponding to the physical ink in the refill station. During the refill, the required logical amount (corresponding to the physical transfer amount) is transferred from the Ink Refill QA Device to the Ink QA Device.

The Ink Refill QA Device output the transfer data only after completing all necessary checks to ensure that correct logical ink type is being transferred e.g Network_OEM1_infrared ink is not transferred to Network_OEM2_cyan ink. Refer to the XferAmount command in Section 27.1.

31.7.1 Basic Refill

The basic refill is used when the Ink Refill QA Device and the Ink QA Device share a common key or a variant key i.e $B.K_{n1}=A.K_{n2}$ or $B.K_{n1}$=FormKeyVariant($A.K_{n2}$, B.ChipId) where B is the Ink QA Device and A is the Ink Refill QA Device. Therefore, the messages and their signatures, generated by each of them can be correctly interpreted by the other.

The Xfer Sequence is started using Random-Read-Random-StartXfer-WriteAuth and the the Xfer Amount is written to the QA Device being refilled using Random-Read-Random-XferAmount-WriteFieldsAuth sequence.

TABLE 323 the command sequence for a basic refill.

| Seq No | Function | Parameter |
|---|---|---|
| Random-Read-Random-XferAmount-WriteFieldsAuth reads M0 and M1 of the Ink QA Device being refilled, produce updated amount for FieldNumE and sequence datat field by calling XferAmount on Ink Refill QA Device, and finally writing the updated value to Ink QA Device using WriteFieldsAuth. | | |
| 1 | A.Random | None<br>$R_A = R_L$ |
| 2 | B.Read | KeyRef = n1, SigOnly = 0, MSelect = 0x03(indicates $_{M0}$ and $_{M1}$), KeyIdSelect = 0x00 (no KeyIds required), WordSelectForDesiredM (for $_{M0}$) = 0xFFFF (Read all $_{M0}$ words), WordSelectForDesiredM (for $_{M1}$) = 0xFFFF (Read all $_{M1}$ words), RE = $R_A$<br>If ResultFlag = Pass then MWords = SelectedWordsOfSelectedMs as per input [MSelect] and [WordSelectForDesiredM], $R_B$ = RL, $SIG_B$ = SIGout Refer to Section 15.3.1 |
| 3 | B.Random | None<br>$R_{B1} = R_L$ |
| 4 | AxferAmount | KeyRef = n2, $_{M0}$OfExternal = First 16 words of MWords, $_{M1}$OfExternal = Last 16 words of MWords, ChipId = ChipId of B, FieldNumL = ink-remaining field of the Ink Refill QA Device, FieldNumE = ink-remaining field of the Ink QA Device, XferValLength = length in words of XferVal XferVal = Value to be transferred from Ink Refill QA Device to Ink QA Device being refilled, $R_E = R_B$, $R_{E2} = R_{B1}$, $SIG_E = SIG_B$<br>If ResultFlag = Pass then FieldSelectB1 = FieldSelect − Select bits for FieldNumE and sequence data field SEQ_1 and SEQ_2, FieldValB1 = FieldVal − New Value for FieldNumE (transferred from FieldNumL of the Ink Refill QA Device) and sequence data fields SEQ_1 and SEQ_2, $R_{A1} = R_{L2}$, $SIG_A$ = SIGout Refer to Section 27.1.3.1. |
| 5 | B.WriteFieldsAuth | KeyRef = n1, FieldSelect = FieldSelectB, FieldData = FieldValB, RE = $R_{A1}$, SIGE = $SIG_A$<br>ResultFlag = Pass/Fail |

31.7.2 Using the Translate Function

The refill through the Translate function is used when the Ink Refill QA Device and the Ink QA Device don't share a key between them. The translating QA Device shares a key with the Ink Refill QA Device and a second key with the Ink QA Device. Therefore the messages and their signatures, generated by the Ink Refill QA Device and the Ink QA Device, are translated appropriately by the translating QA Device. The translating QA Device validates the Read from the Ink QA Device, and translates it for input to the XferAmount function. The translating QA Device will validate the output from the XferAmount function, and then translate it for input to WriteFieldsAuth message of the Ink QA Device.

For validating signatures using translation:

The Ink Refill QA Device (A) and the translating QA Device (C) must share a common or a variant key i.e $C.K_{n3}=A.K_{n2}$ or $C.K_{n3}$=FormKeyVariant($A.K_{n2}$, C.ChipId).

The Ink Refill QA Device being refilled (B) and the translating QA Device (C) must share a common or a variant key i.e $C.K_{n2}=B.K_{n1}$ or $B.K_{n1}$=FormKeyVariant($C.K_{n2}$, B.ChipId).

TABLE 324

A basic refill using translation command sequence

| Seq No | Function | Command |
|---|---|---|
| Random-Read-Random-Translate-Random-XferAmount-Random-Translate-Random-WriteFieldsAuth - reads M0 and M1 of the Ink QA Device being refilled using the translating QA Device C, produce updated amount for FieldNumE and sequence data field by calling XferAmount on | | |

TABLE 324-continued

A basic refill using translation command sequence

| Seq No | Function | Command |
|---|---|---|
| Ink Refill QA Device, and finally writing the updated value to Ink QA Device using the translating QA Device. | | |
| 1 | C.Random | None<br>$R_C = R_L$ |
| 2 | B.Read | KeyRef = n1, SigOnly = 0, MSelect = 0x03(indicates $_{M0}$ and $_{M1}$), KeyIdSelect = 0x00 no KeyIds required), WordSelectForDesiredM (for $_{M0}$) = 0xFFFF (Read all $_{M0}$ words), WordSelectForDesiredM (for $_{M1}$) = 0xFFFF (Read all $_{M1}$ words), $R_E = R_C$<br>If ResultFlag = Pass then MWords = SelectedWordsOfSelectedMs as per input [MSelect] and [WordSelectForDesiredM], $R_B = R_L$, $SIG_B$ = SIGOut Refer to Section 15.3.1 |
| 3 | A.Random | None<br>$R_A = R_L$ |
| 4 | C.Translate | InputKeyRef = n2, DataLength = MWords length in words as per Seq No 2 preformatted as per Section 17.1, Data = MWords as returned from Seq No 2 preformatted as per Section 17.1, RE = $R_B$, SIGE = $SIG_B$, OutputKeyRef = n3, RE2 = $R_A$<br>If ResultFlag = Pass then $R_{C1} = R_{L2}$, $SIG_C$ = SIGOut Refer to Section 17.3.1 |
| 5 | C.Random | None<br>$R_L = R_{C2}$ |
| 6 | A.XferAmount | KeyRef = n2, $_{M0}$OfExternal = First 16 words of MWords, $_{M1}$OfExternal = Last 16 words of MWords, ChipId = ChipId of B, FieldNumL = ink-remaining field of the Ink Refill QA Device, FieldNumE = ink-remaining field of the Ink QA Device, XferValLength = length in words of XferVal XferVal = Value to be transferred from Ink Refill QA Device to Ink QA Device being refilled, $R_E = R_{C1}$, $R_{E2} = R_{C2}$, $SIG_E = SIG_C$<br>If ResultFlag = Pass then FieldSelectB1 = FieldSelect − Select bits for FieldNumE and sequence data field SEQ_1 and SEQ_2, FieldValB1 = FieldVal − New Value or FieldNumE (transferred from FieldNumL of the Ink Refill QA Device) and sequence data fields SEQ_1 and SEQ_2, $R_{A1} = R_{L2}$, $SIG_A$ = SIGout Refer to Section 27.1.3.1 |
| 7 | B.Random | None<br>$R_{B1} = R_L$ |
| 8 | C.Translate | InputKeyRef = n3, DataLength = FieldValB length in words as per Seq No 6 preformatted as per Section 17.1, Data = FieldValB as returned from Seq No 6 preformatted as per Section 17.1, RE = $R_{A1}$, SIGE = $SIG_A$, OutputKeyRef = n2, RE2 = $R_{B1}$<br>If ResultFlag = Pass then $R_{C3}$ = RL2, $SIG_C$ = SIGOut Refer to Section 17.3.1 |
| 9 | B.WriteFieldsAuth | KeyRef = n1, FieldSelect = FieldSelectB, FieldData = FieldValB, RE = $R_{C3}$, SIGE = $SIG_C$<br>ResultFlag = Pass/Fail |

31.8 Recovering from a Failed Refill

This sequence is performed if the refill failed (for e.g Ink QA Device didn't receive the refill message correctly and hence didn't refill successfully). The Ink Refill QA Device therefore needs to be rolled back to the previous value before the refill.

The Ink Refill QA Device checks that the Ink QA Device didn't actually receive the message correctly using the StartRollBack function. The RollBackAmount performs further comparisons on sequence data field and FieldNumE of the Ink QA Device, to values stored in the XferEntry cache. After performing all checks, the Ink Refill QA Device adjusts its ink field to a previous value before the transfer request was processed by it. Refer to Section 26 and Section 28 for details.

The rollback is started using the Random-Read-Random-StartRollBack-WriteFieldsAuth and the rollback of the Ink Refill QA Device is performed using Random-Read-RollBackAmount sequence.

TABLE 325

Rollback amount command sequence

| Seq No | Function | Command |
|---|---|---|
| Random-Read-Random-StartRollBack-WriteAuth starts the rollback and updates data for the sequence data fields SEQ_1 and SEQ_2. | | |
| 1 | A.Random | None<br>$R_A$ = RL |
| 2 | B.Read | KeyRef = n1, SigOnly = 0, MSelect = 0x03(indicates $_{M0}$ and $_{M1}$), KeyIdSelect = 0x00 no KeyIds required), WordSelectForDesiredM (for $_{M0}$) = 0xFFFF (Read all $_{M0}$ words), WordSelectForDesiredM (for $_{M1}$) = 0xFFFF (Read all $_{M1}$ words), $R_E$ = $R_A$<br>If ResultFlag = Pass then MWords = Selected WordsOfSelectedMs as per input [MSelect] and [WordSelectForDesiredM], $R_B$ = RL, $SIG_B$ = SIGout Refer to Section 15.3.1 |
| 3 | B.Random | None<br>$R_{B1}$ = $R_L$ |
| 4 | A.StartRollBack | KeyRef = n2, $_{M0}$Of External = First 16 words of MWords, $_{M1}$OfExternal Last 16 words of MWords, ChipId = ChipId of B, FieldNumL = ink-remaining field of the Ink Refill QA Device which will be adjusted to the value before the failed refill, FieldNumE = ink-remaining field of the Ink QA Device which failed to refill, $R_E$ = $R_B$, $R_{E2}$ = $R_{B1}$ $SIG_E$ = $SIG_B$<br>If ResultFlag = Pass then FieldSelectB = FieldSelect − Select bits for sequence data fields- SEQ_1 and SEQ_2, FieldValB = FieldVal − New value for sequence data fields SEQ_1 and SEQ_2 $R_{A1}$ = $R_{L2}$, $SIG_A$ = SIGout Refer to Section 27.1.3.1. |
| 5 | B.WriteFieldsAuth | KeyRef = n1, FieldSelect = FieldSelectB in Seq No 4, FieldData = FieldValB in Seq No 4 RE = $R_{A1}$, SIGE = $SIG_A$ |
| 10 | | ResultFlag = Pass/Fail |
| Random-Read-RollBackAmount performs a read of the Ink QA Device, checks its values are as per Xfer Entry cache, and then adjusts its ink-remaining field. | | |
| 11 | A.Random | None<br>$R_{A2}$. = RL |
| 12 | B.Read | KeyRef = n1, SigOnly = 0, MSelect = 0x03(indicates $_{M0}$ and $_{M1}$), KeyIdReq = 0 (not required), KeyIdSelect = 0x00 (no KeyIds required), WordSelectForDesiredM (for $_{M0}$) = 0xFFFF(Read all $_{M0}$ words), WordSelectForDesiredM (for $_{M1}$) = 0xFFFF (Read all $_{M1}$ words), RE = $R_{A2}$<br>If ResultFlag = Pass then MWords = SelectedWordsOfSelectedMs as per input [MSelect] and [WordSelectForDesiredM], $R_{B2}$ = $R_L$, $SIG_B$ = SIGout Refer to Section 15.3.1 |
| 13 | A.RollBackAmount | KeyRef = n2, $_{M0}$OfExternal = First 16 words of MWords, $_{M1}$OfExternal = Last 16 words of MWords, ChipId = ChipId of B, FieldNumL = ink-remaining field of Ink Refill QA Device which will be adjusted to the value before the failed refill, FieldNumE = ink-remaining field of Ink QA Device which failed to refill, $R_E$ = $R_{B2}$, $SIG_E$ = $SIG_B$<br>ResultFlag = Pass/Fail |

31.9 Upgrading/Refilling/Filling the Upgrader

This sequence is performed when a count-remaining field in the Parameter QA Device must be updated or when the ink-remaining field in the Ink Refill QA Device requires re/filling.

In case of the Parameter QA Device, another Parameter Upgrader Refill QA Device transfers its count-remaining value to the Parameter QA Device using the transfer sequence described in Section 31.4. Also refer to Section 28.6. This means the count-remaining in the Paramater Upgrader Refill QA Device must be decremented by the same amount that Parameter Upgrader QA Device is incremented by i.e a credit transfer occurs.

In case of the Ink Refill QA Device, another Ink Refill QA Device transfers its ink-remaining value to the Ink Refill QA Device using the transfer sequence described in Section 31.4. Also refer to Section 26.4. This means the logical ink-remaining in the Ink Refill QA Device must be decremented by the same amount that QA Device being refilled is incremented by i.e a credit transfer occurs.

32 Setting Up for Field Use

This section consists of setting up the data structures in the QA Device correctly for field use. All data structures are first programmed to factory values. Some of the data structures can then be changed to application specific values at the ComCo or the OEM, while others are set to fixed values.

32.1 Instantiating the QA Chip Logical Interface

This sequence is performed when the QA Device is first created. Table 326 shows the data structure on final program load.

TABLE 326

Data structure set up during final program load

| Data Structure Name | Value Set to | Fixed or Updatable |
|---|---|---|
| ChipId | Unique Identifier for QA Device | Fixed |
| NumKey | Number of keys the QA Device can hold | Fixed |
| $K_n$ | All $K_n = K_{batch}$. The $K_{batch}$ is unique for a production batch[a]. | Updateable if previous value is known |
| KeyId | All KeyIds = KeyId of $K_{batch}$. | Updateable along with $K_n$. |
| KeyLock | All KeyLock = unlocked | Updateable |
| NumVectors | Number of memory vectors in the QA Device. | Fixed |
| M0 | Set to zeros | Updateable |
| M0 | Set to zeros | Updateable |
| $M_{2+}$ | Set to zeros | Updateable |
| $P_n$ | Set to ones | Updateable |
| R | Set to an initial random value | Updateable |

Each key slot has the same $K_{batch}$. If each key slot had a different $K_{batch}$, and any one of the $K_{batch}$ was compromised then the entire batch would be compromised till the $K_{batch}$ was replaced to another key. Hence, each key slot having a different $K_{batch}$ doesn't have any security advantages but requires more keys to be managed.

32.2 Setting Up Application Specific Data

The section defines the sequences for configuring the data structures in the QA Device to application specific data.

32.2.1 Replacing Keys

The QA Devices are programmed with production batch keys at final program load. The COMCO keys replace the production batch keys before the QA Devices are shipped to the ComCo. The ComCo replaces the COMCO keys to COMCO_OEM when shipping QA Devices to its OEMs. The OEM replaces the COMCO_OEM to COMCO_OEM app as the QA Devices are placed in ink cartridges or printers.

The replacement occurs without the ComCo or the OEM knowing the actual value of the key. The actual value of the keys is only to known to QACo. The ComCo or the OEM is able to perform these replacements because the QACo provides them with a key programming QA Device with keys appropriately set which can generate the necessary messages and signatures to replace the old key with the new key.

Table 327 shows the command sequence for ReplaceKey. The GetProgramKey gets the new encrypted key from the key programming QA Device, and the encrypted new key is passed into the QA Device whose key is being replaced through the ReplaceKey function. Depending on the OldKeyRef and NewKeyRef objects a common encrypted key or a variant encrypted key can be produced for the ReplaceKey function

TABLE 327

ReplaceKey command sequence

| Seq No | Function | Command |
|---|---|---|
| 1 | B.Random | None<br>$R_B = R_L$ |
| 2 | A.GetProgramKey | OldKeyRef = Key Num of the old key. This key must be changed to the NewKeyRef in the QA Device whose key s being replaced. ChipId = Chip identifier of the QA Device whose key is being replaced. RE = $R_B$<br>KeyLock = Set depending on whether the new key is the final key for the key slot or it will be replaced further. NewKeyRef = Key Num of the new key. This key will change the OldKeyRef in the QA Device whose key is being replaced.<br>If ResultFlag = Pass then $R_A$ = RL, $KeyId_{new}$ = KeyIdOfNewKey<br>EncryptedNewKey = EncryptedKey<br>SIGA = SIGout Refer to Section 22.2.1. |
| 3 | B.ReplaceKey | KeyNumToBeReplaced = Old key number, the old key could be a common key or a variant key, KeyId = $KeyId_{new}$, EncryptedKey = EncryptedNewKey, RE = RA, SIGE = SIGA<br>ResultFlag = Pass/Fail |

32.2.2 Setting up ReadOnly Data

This sets the permanent functional parameters of the application where the QA Device has been placed. These parameters remain unchanged for the lifetime of the QA Device. In case of the ink cartridge such parameters are colour and viscosity of the ink. These values are written to $M_{2+}$ memory vectors using the WriteM1+ function, and its permissions are set to ReadOnly by SetPerm function. These values are typically set at the OEM.

Table 328 shows the command sequence for setting up ReadOnly data.

TABLE 328

ReadOnly data setup command sequence

| Seq No | Function | Command |
|---|---|---|
| 1 | B.WriteM1+ | VectNum = 2 or 3, WordSelect = the selected words to be written, MVal = words corresponding to word select starting from LSW<br>ResultFlag = Pass/Fail |
| 2 | B.SetPerm | (VectNum = same as Seq No 1 parameter [VectNum], PermVal = same as Seq No 1 parameter [WordSelect])<br>If ResultFlag = Pass then CurrPerm = NewPerm Current permission value after applying PermVal |

In case of the SBR4320, the values written to $M_{2+}$ memory vectors is write-once only i.e they are set to ReadOnly as soon as they are written to once, therefore the command sequence consists only of Seq No 1 in Table 329.

32.2.3 Defining Fields in M0

The QACo must determine the field definitions for M0 depending on the application of the QA Device. These field definitions will consist of the following:

Number of fields and the size of each field.

The Type attribute of each field.

The access permission for each field.

Following fields have been presently defined in an ink QA Device:

ink-remaining field. See Section 26 for details.

Preauthorisation field. See Section 31.4.3 for details.

Sequence data fields SEQ_1 and SEQ_2. See Section 26 for details.

Following fields have been presently defined in a printer QA Device:

Operating parameter field. See Section 28 for details.

Sequence data fields SEQ_1 and SEQ_2. See Section 26 for details.

After the field definitions are determined, they are formatted as per Section 8.1.1.4. These formatted values are then written to $_{M1}$ using a WriteM1+ function.

TABLE 329

Defining M0 fields command sequence

| Sequence No | Function | Command |
|---|---|---|
| 1 | B.WriteM1+ | VectNum = 1, WordSelect = The selected words corresponding to the attribute field/fields of $_{M0}$, MVal = words corresponding to word select starting from LSW) ResultFlag = Pass/Fail |

32.2.4 Writing Values to Fields in $_{M0}$

The writing of $_{M0}$ fields for an Ink QA Device will typically occur when the ink cartridge is filled with physical ink for the first time, and the equivalent logical ink is written to the Ink QA Device. Refer to Section 31.7 for details.

The writing of $_{M0}$ fields for a Printer QA Device will typically occur when the printer parameters are written for the first time. The procedure for writing of a printer parameter for the first time or upgrading a printer parameters is exactly the same. Refer to Section 31.5 for details.

Before any value is written to a field, the key slot containing the key which has authenticated ReadWrite access to the field must be locked.

Both Ink QA Device and Printer QA Device has a sequence data fields SEQ_1 and SEQ_2 as described in Section 27. These two fields must be initialised to 0xFFFFFFFF, refer to Section 27 for details.

The Ink QA Device/Printer QA Device and the trusted QA Device writing to it, share the sequence key or a variant sequence key between them i.e $B.K_{n1}=A.K_{n2}$ or $B.K_{n1}$=FormKeyVariant($A.K_{n2}$, B.ChipId), where B is the Ink QA Device/Printer QA Device and A is the trusted QA Device. The command sequence used is described in Table 330.

TABLE 330

Command sequence for writing sequence data fields to the QA Devices.

| Sequence No | Function | Parameters |
|---|---|---|
| 1 | B.Random | |
| 2 | A.SignM | $R_B$ = RL KeyRef = n2, FieldSelect = Select bit correponding to SEQ_1 and SEQ-2 FieldVal = both fields set 0xFFFFFFFF. Refer to Section 31.4.3.3 ChipId = ChipId of B, $R_E = R_B$ If ResultFlag = Pass then $R_A = R_L$ $SIG_A$ = SIGout Refer to Section 27.1.3.1 |
| 3 | B.WriteFieldsAuth | KeyRef = n1, FieldSelect = same as Seq 2[FieldSelect], FieldVal = same as Seq 2[FieldVal], RE = $R_A$, SIGE = $SIG_A$ ResultFlag = Pass/Fail |

32.3 Setting Up the Upgrading QA Device

The upgrading QA Device must be set up either as an Ink Refill QA Device or as a Parameter Upgrader QA Device.

Each upgrading QA Device must go through the following set up:

The upgrading QA Device must be set to factory defaults. Refer to Section 32.1. At the end of this process the upgrading QA Device is either an Ink Refill QA Device or a Parameter Upgrader QA Device with production batch keys and M0 fields set to deafult.

The upgrading QA Device must be programmed with the appropriate keys and upgrade data before it can start upgrading other QA Devices. Following must be performed on each upgrade QA Device:

a. The upgrading QA Device must be programmed with the appropriate keys required to upgrade other QA Devices and to upgrade itself when necessary.

b. The M0 fields must be correctly defined and set in M1.

For a Ink Refill QA Device the ink-remaining field must be defined and set. For a printer upgrade QA Device the upgrade value field and the count-remaining field must be defined and set.

All upgrade QA Devices must also have a sequence datat fields SEQ_1 and SEQ_2 which are used to upgrade the upgrading QA Device itself.

c. Finally, M0 fields defined in b must be written with appropriate values so that the upgrade QA Device can perform upgrades.

An Ink Refill QA Device will typically store the logical ink equivalent to the physical ink in a refill station, hence the Ink Refill QA Device's ink-remaining field must be written with the equivalent logical ink amount.

For a Parameter Upgrader QA Device the upgrade value field and the count-remaining field must be written. The upgrade value depends on the type of upgrade the Parameter Upgrader QA Device can perform i.e one Parameter Upgrader QA Device can upgrade to 10 ppm (pages per minute) while another Parameter Upgrader QA Device can upgrade to 5 ppm. The count-remaining is the number of times the Parameter Upgrader QA Device is permitted to write the associated upgrade value to other QA Devices. The count-remaining field must be written to a positive non-zero value for the Parameter Upgrader QA Device to perform successful upgrades.

Refer to Section 32.3.1 and Section 32.3.2 for details.

32.3.1 Setting Up the Ink Refill QA Device 32.3.1.1 Setting Up the Keys

The Ink Refill QA DeviceQA Device could be transferring ink between peers or transferring ink down the heirachy, accordingly the peer to peer Ink Refill QA Device has two keys (fill/refill key and sequence key) as described in Section 27, and a Ink Refill QA Device transferring down the heirachy has three keys (fill/refill key, transfer key and sequence key). These keys must be programmed into the Ink Refill QA Device using the sequence described in Section 32.2.1.

The Key Programming QA Device must be programmed with the appropriate production batch keys, and the fill/refill, transfer key and sequence key The GetProgramKey function is called on the Key Programming QA Device with OldKeyRef (OldKeyRef—refer to Section 32.2.1) pointing to a production batch key, and the NewKeyRef (NewKeyRef—refer to Section 32.2.1) pointing to either a fill/refill key or a transfer key or a sequence key. The outputs from the GetProgramKey (signature and encrypted New Key) is passed in to ReplaceKey function of the Ink Refill QA Device.

The GetProgramKey function must be called (on the Key Programming QA Device) for replacing each of the production batch keys in the Ink Refill QA Device. The output of the GetProgramKey will be passed in to the ReplaceKey function called on the Ink Refill QA Device. The successful processing of the ReplaceKey function will replace an old key(production keys) to a corresponding new key (either a fill/refill key or a transfer key or a sequence key).

32.3.1.2 Setting Up the M0 Field Information in $_{M1}$

The ink-remaining field and the sequence data fields SEQ_1 and SEQ_2 must be defined and set in the Ink Refill QA Device using the sequence described in Section 32.2.3.

32.3.1.3 Transferring Ink Amounts

Finally, the logical ink amounts are transferred to the ink-remaining field using the sequence described in Section 31.7.

The QACo will transfer to the ComCo Ink Refill QA Device at the top of the heirachy using the command sequence in Table 331.

For a successful transfer from QACo to ComCo, ComCo and QACo must share a common key or a variant key be i.e ComCo.$K_{n1}$=QACo.$K_{n2}$ or ComCo.$K_{n1}$=FormKeyVariant (QACo.$K_{n2}$, ComCo.ChipId)$K_{n1}$ is the fill/refill key for the ComCo refill QA Device.

TABLE 331

Command sequence for writing ink-remaining amounts to the highest QA Device in the heirachy.

| Sequence No | Function | Parameters |
|---|---|---|
| 1 | B.Random | $R_B$ = RL |
| 2 | A.SignM | KeyRef = n2, FieldSelect = Select bit correponding to the ink-remaining field, FieldVal = Ink amount to be transferred, Refer to Section 31.4.3.3 ChipId = ChipId of B, $R_E$ = $R_B$ If ResultFlag = Pass then $R_A$ = $R_L$ $SIG_A$ = SIGout Refer to Section 27.1.3.1 |
| 3 | B.WriteFieldsAuth | KeyRef = n1, FieldSelect = same as Seq 2[FieldSelect], FieldVal = same as Seq 2[FieldVal], RE = $R_A$, SIGE = $SIG_A$ ResultFlag = Pass/Fail |

32.3.1.4 Setting Up Sequence Data Fields

The Ink Refill QA Device has sequence data fields SEQ_1 and SEQ_2 (as described in Section 27) because its ink-remaining fields can be refilled as well. These two fields must be initialised to 0xFFFFFFFF, refer to Section 27 for details.

The Ink Refill QA Device and the trusted QA Device writing to it, share the sequence key or a variant sequence key between them i.e B.$K_{n1}$=A.$K_{n2}$ or B.$K_{n1}$=FormKeyVariant(A.$K_{n2}$, B.ChipId), where B is the Ink Refill QA Device and A is the trusted QA Device. The command sequence used is described in Table 331.

32.3.2 Setting Up the Parameter Upgrader QA Device 32.3.2.1 Setting Up the Keys

The Parameter Upgrader QA Device could be transferring upgrades between peers or transferring upgrades down the heirachy, accordingly the peer to peer Parameter Upgrader QA Device has three keys (write-parameter key, fill/refill key and sequence key) as described in Section 28.6 and Section 26, and a Parameter Upgrader QA Device transferring down the heirachy has four keys (write-parameter key, fill/refill key, transfer key and sequence Key). These keys must be programmed into the Parameter Upgrader QA Device using the sequence described in Section 32.2.1.

The Key Programming QA Device must be programmed with the appropriate production batch keys, and write-parameter key, fill/refill key, transfer key and sequence key The GetProgramKey function is called on the Key Programming QA Device with OldKeyRef (OldKeyRef—refer to Section 32.2.1) pointing to a production batch key, and the NewKeyRef (NewKeyRef—refer to Section 32.2.1) pointing to either a write-parameter key, or a fill/refill key, or a transfer key, or a sequence key. The outputs from the GetProgramKey (signature and encrypted New Key) is passed in to ReplaceKey function of the Parameter Upgrader QA Device.

32.3.2.2 Setting Up the M0 Field in $_{M1}$

The upgrade value field and the count-remaining field must be defined and set in the upgrade QA Device using the sequence described in Section 32.2.3.

32.3.2.3 Writing Upgrade Value to the Upgrade Field

The upgrade value is written to upgrade field using the write-parameter key. The upgrade QA Device and the trusted QA Device writing to it, share the write-parameter key or a variant write-parameter key between them i.e B.$K_{n1}$=A.$K_{n2}$ or B.$K_{n1}$=FormKeyVariant(A.$K_{n2}$, B.ChipId), where B is the upgrade QA Device and A is the trusted QA Device. The command sequence used is described in Table 331.

32.3.2.4 Transferring Count-Remaining Amounts

Finally, the logical count-remaining amounts are transferred to the count-remaining field using the sequence described in Section 31.7.

The QACo will also transfer to the ComCo's upgrade QA Device using the command sequence in Table 331.

For a successful transfer from QACo to ComCo, ComCo and QACo must share a common key or a variant key be i.e ComCo.$K_{n1}$=QACo.$K_{n2}$ or ComCo.$K_{n1}$=FormKeyVariant (QACo.$K_{n2}$,ComCo.ChipId). $K_{n1}$ is the fill/refill key for the ComCo upgrade QA Device.

32.3.2.5 Setting Up Sequence Data Fields

The Parameter Upgrader QA Device has sequence data fields SEQ_1 and SEQ_2 (as described in Section 27) because its count-remaining fields can be refilled as well. These two fields must be initialised to 0xFFFFFFFF, refer to Section 27 for details.

The Parameter Upgrader QA Device and the trusted QA Device writing to it, share the sequence key or a variant sequence key between them i.e $B.K_{n1}=A.K_{n2}$ or $B.K_{n1}$=FormKeyVariant($A.K_{n2}$, B.ChipId), where B is the Parameter Upgrader QA Device and A is the trusted QA Device. The command sequence used is described in Table 331.

32.4 Setting Up the Key Programmer

The key programming QA Device is set up to replace keys in other QA Devices.

Each key programming QA Device must go through the following set up:

The key programming QA Device must be instantiated to factory defaults. Refer to Section 32.1. At the end of instantiation the key programming QA Device has production batch keys and no key replacement data.

The key programming QA Device must be programmed with the appropriate keys and key replacement map before it can start to replace keys in other QA Devices.

32.4.1 Setting Up the Keys

The key programming QA Device must be programmed with the key replacement map key. The key replacement map key is described in details in Section 24.

The key programming QA Device must programmed with the old and new keys for the QA Devices it is going to perform key replacement on.

Each of the keys is set in the key programming QA Device using the sequence described in Section 32.2.1.

32.4.2 Setting Up Key Replacement Map Field Information

First the key replacement map field information is worked out as per Section 24.1. This field information is set in M1 as per the sequence described Section 32.2.3.

32.4.3 Setting Up Key Replacement Map

Finally, the key replacement map field must be written with the valid mapping using the key replacement map key. The key programming QA Device and the trusted QA Device writing to it must share the key replacement map key or a variant of the key replacement map key between them.

For a successful write of the key replacement map $B.K_{n1}=A.K_{n2}$ or $B.K_{n1}$=FormKeyVariant($A.K_{n2}$, B.ChipId), where B is the key replacement QA Device and A is the trusted QA Device. The command sequence used is described in Table 331.

Appendix A: Field Types

Table 332 lists the field types that are specifically required by the QA Chip Logical Interface and therefore apply across all applications. Additional field types are application specific, and are defined in the relevant application documentation.

TABLE 332

Predefined Field Types

| Value | Type | Description |
|---|---|---|
| 0x0000 | 0 | Non-initialised (default value after final program load) |
| 0x0001 | TYPE_PREAUTH | Defines a preauth field in an Ink QA Device |
| 0x0002 | TYPE_COUNT_REMAINING | Defines a countRemaining field in an Parameter Upgrader QA Device |
| 0x0003 | TYPE_SEQ_1 | Defines a sequence data field SEQ_1 in an Ink QA Device or in a Printer QA Device or in an upgrader QA Device |
| 0x0004 | TYPE_SEQ_2 | Defines a sequence data fields SEQ_2 in an Ink QA Device or in a Printer QA Device or in an upgrader QA Device |
| 0x0005 | TYPE_KEY_MAP | Defines a key replacement map in a Key Programmer QA Device |
| 0x0006 and above | reserved | reserved for future use |

Appendix B: Key and field definition for different QA Devices

B.1 Parameter Upgrader QA Device

B.1.1 Peer to Peer QA Device

TABLE 333

Key definitions for a peer to peer Parameter Upgrader QA Device

| Key Name | Purpose |
|---|---|
| Fill/refill Key | This key has is used for upgrading count-remaining values when the upgrade QA Device is upgraded by another upgrade QA Device and is also used to decrement the count-remaining when upgrading other QA Devices. |
| Sequence Key | This key is used to initialise sequence data fields SEQ_1 and SEQ_2 to 0xFFFFFFF. |
| Write Parameter Key | This key is used to write the upgrade value to the Parameter Upgrader QA Device. |

TABLE 334

Field definitions for a peer to peer Parameter Upgrader QA Device

| Field Name | Purpose | Field Attrinutes Type | KeyNum | A[a] RW | NA[b] RW | KPerms[c] | EndPos (Size) |
|---|---|---|---|---|---|---|---|
| CountRemaining | The field stores the number of times the Parameter Upgrader QA Device is permitted to upgrade a printer QA Device. | TYPE__COUNT__REMAINING | SN[f] fill/refill key | 1 | 0 | KPerms[KN[e]] = 1 Rest are 0 | Depends on the maximum number of upgrades that can be stored. |
| UpgradeValue | This stores the value that is copied from the Parameter Upgrader QA Device to the field being upgraded on the printer QA Device during the upgrade | Must define the type of the upgrade value i.e TYPE__PRINT__SPEED[d] | SN[f] write-parameter key | 1 | 0 | KPerms[KN[e]] = 0 Rest are 0 as well | Set as per upgrade value. |
| SEQ__1 | This field holds the data for sequence data field SEQ__1 when the Parameter Upgrader QA Device is being upgraded by another Parameter Upgrader Refill QA Device. | TYPE__SEQ__1 | SN[f] sequence key | 1 | 0 | KPerms[KN[e]] = 0 KPerms[fill/refill[g]] = 1 Rest are 0 as well. | Typically 32 bit. |
| SEQ__2 | This field holds the data for sequence data fieldsSEQ__2 when the Parameter Upgrader QA Device is being upgraded by another Parameter Upgrader Refill QA Device. | TYPE__SEQ__2 | SN[f] sequence key | 1 | 0 | KPerms[KN[e]] = 0 KPerms[fill/refill[g]] = 1 Rest are 0 as well. | Typically 32 bit. |

[a]Authenticated ReadWrite permission
[b]Non-authenticated ReadWrite permission
[c]KeyPerms
[d]This is a sample type only
[e]KeyNum
[f]Key Slot Number
[g]Fill/Refill key has authenticated decrement-only permission to the sequence data fields

B.1.2 Heirarchical Transfer QA Device

Key Definitions

TABLE 335

Key definitions for a Parameter Upgrader QA Device (transferring down the heirachy)

| Key Name | Purpose |
|---|---|
| Transfer Key | This key is used to decrement the count-remaining when upgrading other QA Devices. |

TABLE 335-continued

Key definitions for a Parameter Upgrader QA Device (transferring down the heirachy)

| Key Name | Purpose |
|---|---|
| Fill/refill Key | This key has is used for upgrading count-remaining values when the Parameter Upgrader QA Device is upgraded by another Parameter Upgrader QA Device Refill |

TABLE 335-continued

Key definitions for a Parameter Upgrader QA Device (transferring down the heirachy)

| Key Name | Purpose |
|---|---|
| | QA Device. |
| Sequence Key | This key is used to initialise sequence data fields SEQ_1 and SEQ_2 to 0xFFFFFFF. |

TABLE 335-continued

Key definitions for a Parameter Upgrader QA Device (transferring down the heirachy)

| Key Name | Purpose |
|---|---|
| Write Parameter Key | This key is used to write the upgrade value to the Parameter Upgrader QA Device. |

Field Definitions

TABLE 336

Field definitions for Parameter Upgrader QA Device transferring down the hierachy

| | | Field Attrinutes | | | | | |
|---|---|---|---|---|---|---|---|
| Field Name | Purpose | Type | KeyNum | A[a] RW | NA[b] RW | KPerms[c] | EndPos (Size) |
| CountRemaining | The field stores the number of times the Parameter Upgrader QA Device is permitted to upgrade a printer QA Device. | TYPE_COUNT_REMAINING | SN[f] fill/ refill key | 1 | 0 | KPerms[KN[e]] = 0 KPerms[Transfer Key] = 1 Rest are 0 | Depends on the maximum number of upgrades that can be stored. |
| UpgradeValue | This stores the value that is copied from the Parameter Upgrader QA Device to the field being upgraded on the printer QA Device during the upgrade | Must define the type of the upgrade value i.e TYPE_PRINT_SPEED[d] | SN[f] write-parameter key | 1 | 0 | KeyPerms[KN[e]] = 0 Rest are 0 | Set as per upgrade value. |
| SEQ_1 | This field holds the data for sequence data fields SEQ_1 when the Parameter Upgrader QA Device is being up-graded by another Parameter Upgrader Refill QA Device. | TYPE_SEQ_1 | SN[f] sequence key | 1 | 0 | KPerms[KN[e]] = 0 KPerms[fill/ refill[g]] = 1 Rest are 0 as well. | Typically 32 bit. |
| SEQ_2 | This field holds the data for sequence data fields SEQ_2 when the Parameter Upgrader QA | TYPE_SEQ_2 | SN[f] sequence key | 1 | 0 | KPerms[KN[e]] = 0 KPerms[fill/ refill[g]] = 1 Rest are 0 as well. | Typically 32 bit. |

TABLE 336-continued

| Field Definitions for Parameter Upgrader QA Device transferring down the hierachy | | | | | | | |
|---|---|---|---|---|---|---|---|
| | | Field Attrinutes | | | | | |
| Field Name | Purpose | Type | KeyNum | A[a] RW | NA[b] RW | KPerms[c] | EndPos (Size) |
| | Device is being upgraded by another Parameter Upgrader Refill QA Device. | | | | | | |

[a]Authenticated ReadWrite permission
[b]Non-authenticated ReadWrite permission
[c]KeyPerms
[d]This is a sample type only
[e]KeyNum
[f]Key Slot Number
[g]Fill/Refill key has authenticated decrement-only permission to the sequence data fields

B.2 Ink Refill QA Device

B.2.1 Peer to Peer QA Device

Key Definitions

TABLE 337

| Key definitions for a peer to peer Ink Refill QA Device | |
|---|---|
| Key Name | Purpose |
| Fill/refill Key | This key has is used for filling/refilling ink-remaining values when the Ink Refill QA Device is upgraded by another Ink Refill QA Device and is also used to decrement from the ink-remaining when transferring ink to other QA Devices (typically Ink QA Device). |

TABLE 337-continued

| Key definitions for a peer to peer Ink Refill QA Device | |
|---|---|
| Key Name | Purpose |
| Sequence Key | This key is used to initialise sequence data fields SEQ_1 and SEQ_2 to 0xFFFFFFF. |

Field Definitions

TABLE 338

| Field definitions for a peer to peer Ink Refill QA Device | | | | | | | |
|---|---|---|---|---|---|---|---|
| | | Field Attrinutes | | | | | |
| Field Name | Purpose | Type | Key Num | A[a] RW | NA[b] RW | KeyPerms[c] | EndPos (Size) |
| InkRemaining | The field stores the amount of logical ink-remaining in the ink refill QA Device. | Must define the type of Ink e.g TYPE_HIGHQUALITY_BLACK_INK[d] | SN[f] fill/refill key | 1 | 1 | KeyPerms[KN[e]] = 1 Rest are 0 | Depends on the maximum amount of ink that can be stored and the storage resolution i.e in pico litres or in micro litres. |
| SEQ_1 | This field holds the data for sequence data field SEQ_1 when the Ink Refill QA Device is being filled/refilled by another Ink | TYPE_SEQ_1 | SN[f] sequence key | 1 | 0 | KPerms[KN[e]] = 0 KPerms[fill/refill[g]] = 1 Rest are 0 as well. | Typically 32 bit. |

TABLE 338-continued

Field definitions for a peer to peer Ink Refill QA Device

| Field Name | Purpose | Type | Key Num | A[a] RW | NA[b] RW | KeyPerms[c] | EndPos (Size) |
|---|---|---|---|---|---|---|---|
| | | Field Attrinutes | | | | | |
| SEQ_2 | Refill QA Device. This field holds the data for sequence data field SEQ_2 when the Ink Refill QA Device is being filled/refilled by another Ink Refill QA Device. | TYPE_SEQ_2 | SN[f] sequence key | 1 | 0 | KPerms[KN[e]] = 0 KPerms[fill/refill[g]] = 1 Rest are 0 as well. | Typically 32 bit. |

[a]Authenticated ReadWrite permission
[b]Non-authenticated ReadWrite permission
[c]Decrement-Only For Keys
[d]This is a sample type only
[e]KeyNum
[f]Key Slot Number
[g]Fill/Refill key has authenticated decrement-only permission to the sequence data fields

B.2.2 Heirarchical Transfer QA Device

Key Definitions

TABLE 339

Key definitions for a ink refill QA Device (transferring down the heirachy)

| Key Name | Purpose |
|---|---|
| Transfer Key | This key is used to decrement from the ink-remaining when transferring ink to other QA Devices. |
| Fill/refill Key | This key has is used for filling/refilling ink-remaining values when the Ink Refill QA Device is upgraded by another Ink Refill QA Device. |

TABLE 339-continued

Key definitions for a ink refill QA Device (transferring down the heirachy)

| Key Name | Purpose |
|---|---|
| Sequence Key | This key is used to initialise sequence data fields SEQ_1 and SEQ_2 to 0xFFFFFFF. |

Field Definitions

TABLE 340

Field definitions for a Ink Refill QA Device (transferring down the heirachy)

| Field Name | Purpose | Type | KeyNum | A[a] RW | NA[b] RW | KeyPerms[c] | EndPos (Size) |
|---|---|---|---|---|---|---|---|
| | | Field Attrinutes | | | | | |
| InkRemaining | The field stores the amount of logical ink-remaining in the Ink Refill QA Device. | Must define the type of Ink e.g.-TYPE_HIGHQUALITY_BLACK_INK[d] | SN[f] fill/refill key | 1 | 0 | KPerms[KN[e]] = 0 KPerms[Transfer Key] = 1 Rest are 0 | Depends on the maximum amount of ink that can be stored and the storage resolution i.e in pico litres or in micro litres. |
| SEQ_1 | This field holds the data for sequence | TYPE_SEQ_1 | SN[f] sequence key | 1 | 0 | KPerms[KN[e]] = 0 KPerms[fill/refill[g]] = 1 Rest are 0. | Typically 32 bit. |

TABLE 340-continued

Field definitions for a Ink Refill QA Device (transferring down the heirachy)

| Field Name | Purpose | Type | KeyNum | A[a] RW | NA[b] RW | KeyPerms[c] | EndPos (Size) |
|---|---|---|---|---|---|---|---|
| | | Field Attrinutes | | | | | |
| | data field SEQ_1 when the Ink Refill QA Device is being filled/ refilled by another Ink Refill QA Device. | | | | | | |
| SEQ_2 | This field holds the data for sequence data field SEQ_2 when the Ink Refill QA Device is being filled/refilled by another Ink Refill QA Device. | TYPE_SEQ_2 | SN[f] sequence key | 1 | 0 | KPerms[KN[e]] = 0 KPerms[fill/ refill[g]] = 1 Rest are 0. | Typically 32 bit. |

[a]Authenticated ReadWrite permission
[b]Non-authenticated ReadWrite permission
[c]KeyPerms
[d]This is a sample type only
[e]KeyNum
[f]Key Slot Number
[g]Fill/Refill key has authenticated decrement-only permission to the sequence data fields

B.3 Key Programming QA Device

B.3.1 Key Definitions

TABLE 341

Key definitions for a Key Programming QA Device

| Key Name | Purpose |
|---|---|
| Key replacement map Key | This key is used to write the key replacement map. |
| Old Keys | These are the old keys of the QA Device whose keys will be replaced by the Key Programming QA Device. |
| New Keys | These are the new keys of the QA Device whose old keys will be replaced by the Key Programming QA Device. |

B.3.2 Field Definitions

TABLE 342

Field definitions for a key replacement QA Device

| Field Name | Purpose | Type | KeyNum | A[a] RW | NA[b] RW | KPerms[c] | EndPos (Size) |
|---|---|---|---|---|---|---|---|
| | | Field Attrinutes | | | | | |
| Key replacement map | This defines the mapping between the old key and the new key for the QA | TYPE_KEY_MAP | Key Replace-ment Map key | 1 | 0 | KPerms[KN[d]] = 0 Rest are 0 | 2 words (64 bits) |

TABLE 342-continued

Field definitions for a key replacement QA Device

| Field Name | Purpose | Type | KeyNum | A[a] RW | NA[b] RW | KPerms[c] | EndPos (Size) |
|---|---|---|---|---|---|---|---|
| | | Field Attrinutes | | | | | |
| | Device whose old key will be replaced by the new key. | | | | | | |

[a]Authenticated ReadWrite permission
[b]Non-authenticated ReadWrite permission
[c]KeyPerms
[d]KeyNum

B.4 Ink QA Device

B.4.1 Key Definitions

TABLE 343

Key definitions for a Ink QA Device

| Key Name | Purpose |
|---|---|
| Fill/refill Key | This key is used for fill/refilling ink-remaining amount in the ink QA Device. |
| Ink usage Key | This key is verifying the data read from the ink QA Device and for writing preauth data. |
| Sequence Key | This key is used to initialise sequence data fields SEQ_1 and SEQ_2 to 0×FFFFFFF. |

B.4.2 Field Definitions

TABLE 344

Field definitions for a Ink QA Device

| Field Name | Purpose | Type | Key Num | A[a] RW | NA[b] RW | KPerms[c] | EndPos (Size) |
|---|---|---|---|---|---|---|---|
| | | Field Attrinutes | | | | | |
| InkRemaining | The amount of logical ink-remaining in the ink QA Device. More than one ink-remaining field may be present depending on the number of physical inks stored in the ink cartridge. | Must define the type of Ink i.e TYPE_HQ_BLACK_INK[d] | SN[f] fill/refill key | 1 | 1 | KPerms[KN[e]] = 1 Rest are 0 | Depends on the maximum amount of ink that can be stored and the storage resolution i.e in pico litres or in micro litres. |
| Preauth | This field defines the preauth value. | TYPE_PREAUTH | SN[f] ink usage key | 0 | 1 | KPerms[KN[e]] = 0 Rest are 0 | Depends on preauth amount. Typically 32 bits, may be 64 bits to accomodate larger preauth amounts. |
| SEQ_1 | This field holds the data for sequence data field SEQ_1 when the Ink QA Device is being filled/ | TYPE_SEQ_1 | SN[f] sequence key | 1 | 0 | KPerms[KN[e]] = 0 KPerms[fill/refill[g]] = 1 Rest are 0. | Typically 32 bit. |

TABLE 344-continued

Field definitions for a Ink QA Device

| Field Name | Purpose | Field Attrinutes | | | | | |
|---|---|---|---|---|---|---|---|
| | | Type | Key Num | A[a] RW | NA[b] RW | KPerms[c] | EndPos (Size) |
| | refilled by a Ink Refill QA Device. | | | | | | |
| SEQ_2 | This field holds the data for sequence data field SEQ_2 when the Ink QA Device is being filled/ refilled by another Ink Refill QA Device. | TYPE_SEQ_2 | SN[f] sequence key | 1 | 0 | KPerms[KN[e]] = 0 KPerms[fill/ refill[g]] = 1 Rest are 0. | Typically 32 bit. |

[a]Authenticated ReadWrite permission
[b]Non-authenticated ReadWrite permission
[c]KeyPerms
[d]This is a sample type only
[e]KeyNum
[f]Key Slot Number
[g]Fill/Refill key has authenticated decrement-only permission to the sequence data fields

B.5 Printer QA Device

B.5.1 Key Definition

TABLE 345

Key definitions for a Printer QA Device

| Key Name | Purpose |
|---|---|
| Upgrade key (fill/refill key) | This key is used for writing/upgrading the functional parameter. |
| Ink usage Key | This key is verifying the data read from the Ink QA Device. |
| Sequence Key | This key is used to initialise sequence data fields SEQ_1 and SEQ_2 to 0×FFFFFFF. |

TABLE 345-continued

Key definitions for a Printer QA Device

| Key Name | Purpose |
|---|---|
| PECID/SOPECID Key | This key is used to verify the data read from the printer QA Device. This key is unique to each printer. Also used to translate data from the ink QA Device to the trusted printer system QA Device. |

B.5.2 Field Definition

TABLE 346

Field definitions for a Printer QA Device

| Field Name | Purpose | Field Attrinutes | | | | | |
|---|---|---|---|---|---|---|---|
| | | Type | Key Num | A[a] RW | NA[b] RW | KPerms[c] | EndPos (Size) |
| Functional parameter | The field stores an upgradeable functional parameter. More than one functional parameter can be stored in the printer QA Device. | Must define the type of print speed i.e TYPE_PRINT_SPEED[d] | SN[f] fill/ refill key | 1 | 0 | KPerms[KN[e]] = 0 Rest are 0 | Set as per functional parameter. |
| SEQ_1 | This field holds the data for sequence data | TYPE_SEQ_1 | SN[f] sequence key | 1 | 0 | KPerms[KN[e]] = 0 KPerms[fill/refill[g]] = 1 Rest are 0. | Typically 32 bit. |

TABLE 346-continued

Field definitions for a Printer QA Device

| Field Name | Purpose | Field Attrinutes Type | Key Num | A[a] RW | NA[b] RW | KPerms[c] | EndPos (Size) |
|---|---|---|---|---|---|---|---|
| | field SEQ_1 when the Printer QA Device is being filled/ refilled by a Parameter Upgrader QA Device. | | | | | | |
| SEQ_2 | This field holds the data for sequence data field SEQ_2 when the Printer QA Device is being filled/ refilled by another Parameter Upgrader QA Device. | TYPE_SEQ_2 | SN[f] sequence key | 1 | 0 | KPerms[KN[e]] = 0 KPerms[fill/refill[g]] = 1 Rest are 0. | Typically 32 bit. |

[a]Authenticated ReadWrite permission
[b]Non-authenticated ReadWrite permission
[c]KeyPerms
[d]This is a sample type only
[e]KeyNum
[f]Key Slot Number
[g]Fill/Refill key has authenticated decrement-only permission to the sequence data fields B.6 Trusted Printer System QA Device B.6.1 Key Definition

TABLE 347

| Key Name | Purpose |
|---|---|
| PECID/SOPECID Key | This key is used to verify the data read from the printer QA Device. This key is unique to each printer. This key is also used for verifying translated data from the ink QA Device. |

Introduction

1 Background

This document describes a QA Chip that can be used to hold contains authentication keys together with circuitry specially designed to prevent copying. The chip is manufactured using a standard Flash memory manufacturing process, and is low cost enough to be included in consumables such as ink and toner cartridges. The implementation is approximately 1 $mm^2$ in a 0.25 micron flash process, and has an expected die manufacturing cost of approximately 10 cents in 2003.

Once programmed, the QA Chips as described here are compliant with the NSA export guidelines since they do not constitute a strong encryption device. They can therefore be practically manufactured in the USA (and exported) or anywhere else in the world.

Note that although the QA Chip is designed for use in authentication systems, it is microcoded, and can therefore be programmed for a variety of applications.

2 Nomenclature

The following symbolic nomenclature is used throughout this document:

TABLE 348

Summary of symbolic nomenclature

| Symbol | Description |
|---|---|
| F[X] | Function F, taking a single parameter X |
| F[X, Y] | Function F, taking two parameters, X and Y |
| X \| Y | X concatenated with Y |
| $X \wedge y$ | Bitwise X AND Y |
| $X \vee Y$ | Bitwise X OR Y (inclusive-OR) |
| $X \oplus Y$ | Bitwise X XOR Y (exclusive-OR) |
| ¬X | Bitwise NOT X (complement) |
| X ←Y | X is assigned the value Y |
| X ←{Y, Z} | The domain of assignment inputs to X is Y and Z |
| X = Y | X is equal to Y |
| X ≠ Y | X is not equal to Y |
| ⇓X | Decrement X by 1 (floor 0) |
| ⇑X | Increment X by 1 (modulo register length) |
| Erase X | Erase Flash memory register X |
| SetBits[X, Y] | Set the bits of the Flash memory register X based on Y |
| Z ←ShiftRight[X, Y] | Shift register X right one bit position, taking input bit from Y and placing the output bit in Z |

3 Pseudocode 3.1 Asynchronous

The following pseudocode: var=expression means the var signal or output is equal to the evaluation of the expression.

3.2 Synchronous

The following pseudocode: var←expression means the var register is assigned the result of evaluating the expression during this cycle.

3.3 Expression

Expressions are defined using the nomenclature in Table 348 above. Therefore: var=(a=b)

is interpreted as the var signal is 1 if a is equal to b, and 0 otherwise.

4 Diagrams

Black lines are used to denote data, while red lines are used to denote 1-bit control-signal lines.

Logical Interface

5 Introduction

The QA Chip has a physical and a logical external interface. The physical interface defines how the QA Chip can be connected to a physical System, while the logical interface determines how that System can communicate with the QA ChIP. This section deals with the logical interface.

5.1 Operating Modes

The QA Chip has four operating modes—Idle Mode, Program Mode, Trim Mode and Active Mode.

- Active Mode is entered on power-on Reset when the fuse has been blown, and whenever a specific authentication command arrives from the System. Program code is only executed in Active Mode. When the reset program code has finished, or the results of the command have been returned to the System, the chip enters Idle Mode to wait for the next instruction.
- Idle Mode is used to allow the chip to wait for the next instruction from the System.
- Trim Mode is used to determine the clock speed of the chip and to trim the frequency during the initial programming stage of the chip (when Flash memory is garbage). The clock frequency must be trimmed via Trim Mode before Program Mode is used to store the program code.
- Program Mode is used to load up the operating program code, and is required because the operating program code is stored in Flash memory instead of ROM (for security reasons).

Apart from while the QA Chip is executing Reset program code, it is always possible to interrupt the QA Chip and change from one mode to another.

5.1.1 Active Mode

Active Mode is entered in any of the following three situations:

- power-on Reset when the fuse has been blown
- receiving a command consisting of a global id write byte (0x00) followed by the ActiveMode command byte (0x06)
- receiving a command consisting of a local id byte write followed by some number of bytes representing opcode and data.

In all cases, Active Mode causes execution of program code previously stored in the flash memory via Program Mode.

If Active Mode is entered by power-on Reset or the global id mechanism, the QA Chip executes specific reset startup code, typically setting up the local id and other IO specific data. The reset startup code cannot be interrupted except by a power-down condition. The power-on reset startup mechanism cannot be used before the fuse has been blown since the QA Chip cannot tell whether the flash memory is valid or not. In this case the globalid mechanism must be used instead.

If Active Mode is entered by the local id mechanism, the QA Chip executes specific code depending on the following bytes, which function as opcode plus data. The interpretation of the following bytes depends on whatever software happens to be stored in the QA ChIP.

5.1.2 Idle Mode

The QA Chip starts up in Idle Mode when the fuse has not yet been blown, and returns to Idle Mode after the completion of another mode. When the QA Chip is in Idle Mode, it waits for a command from the master by watching the low speed serial line for an id that matches either the global id (0x00), or the chip's local id.

- If the primary id matches the global id (0x00, common to all QA Chips), and the following byte from the master is the Trim Mode id byte, and the fuse has not yet been blown, the QA Chip enters Trim Mode and starts counting the number of internal clock cycles until the next byte is received. Trim Mode cannot be entered if the fuse has been blown.
- If the primary id matches the global id (0x00, common to all QA Chips), and the following byte from the master is the Program Mode id byte, and the fuse has not yet been blown, the QA Chip enters Program Mode. Program Mode cannot be entered if the fuse has been blown.
- If the primary id matches the global id (0x00, common to all QA Chips), and the following byte from the master is the Active Mode id bytes, the QA Chip enters Active Mode and executes startup code, allowing the chip to set itself into a state to subsequently receive authentication commands (includes setting a local id and a trim value).
- If the primary id matches the chip's local ID, the QA Chip enters Active Mode, allowing the subsequent command to be executed.

The valid 8-bit serial mode values sent after a global id are as shown in Table 349:

TABLE 349

Command byte values to place chip in specific mode

| Value | Interpretation |
|---|---|
| 10101011 | Trim Mode |
| (0xAB) | (only functions when the fuse has not been blown) |
| 10001101 | Program Mode |
| (0xAD) | (only functions when the fuse has not been blown) |
| 00000110 | Active Mode |
| (0x06) | (resets the chip & loads the localId) |

5.1.3 Trim Mode

Trim Mode is enabled by sending a global id byte (0x00) followed by the Trim Mode command byte (0xAB). Trim Mode can only be entered while the fuse has not yet been blown.

The purpose of Trim Mode is to set the trim value (an internal register setting) of the internal ring oscillator so that Flash erasures and writes are of the correct duration. This is necessary due to the 2:1 variation of the clock speed due to process variations. If writes an erasures are too long, the Flash memory will wear out faster than desired, and in some cases can even be damaged. Note that the 2:1 variation due to temperature still remains, so the effective operating speed of the chip is 7–14 MHz around a nominal 10 MHz.

Trim Mode works by measuring the number of system clock cycles that occur inside the chip from the receipt of the Trim Mode command byte until the receipt of a data byte. When the data byte is received, the data byte is copied to the trim register and the current value of the count is transmitted to the outside world.

Once the count has been transmitted, the QA Chip returns to Idle Mode.

At reset, the internal trim register setting is set to a known value r. The external user can now perform the following operations:

- send the global id+write followed by the Trim Mode command byte
- send the 8-bit value v over a specified time t
- send a stop bit to signify no more data
- send the global id+read followed by the Trim Mode command byte
- receive the count c
- send a stop bit to signify no more data At the end of this procedure, the trim register will be v, and the external user will know the relationship between external time t and internal time c. Therefore a new value for v can be calculated.

The Trim Mode procedure can be repeated a number of times, varying both t and v in known ways, measuring the resultant c. At the end of the process, the final value for v is established (and stored in the trim register for subsequent use in Program Mode). This value v must also be written to the flash for later use (every time the chip is placed in Active Mode for the first time after power-up). For more information about the internal workings of Trim Mode and the accuracy of trim in the QA Chip, see Section 11.2 on page 967.

5.1.4 Program Mode

Program Mode is enabled by sending a global id byte (0x00) followed by the Program Mode command byte.

If the QA Chip knows already that the fuse has been blown, it simply does not enter Program Mode. If the QA Chip does not know the state of the fuse, it determines whether or not the internal fuse has been blown by reading 32-bit word 0 of the information block of flash memory. If the fuse has been blown the remainder of data from the Program Mode command is ignored, and the QA Chip returns to Idle Mode.

If the fuse is still intact, the chip enters Program Mode and erases the entire contents of Flash memory. The QA Chip then validates the erasure. If the erasure was successful, the QA Chip receives up to 4096 bytes of data corresponding to the new program code and variable data. The bytes are transferred in order $byte_0$ to $byte_{4095}$.

Once all bytes of data have been loaded into Flash, the QA Chip returns to Idle Mode.

Note that Trim Mode functionality must be performed before a chip enters Program Mode for the first time. Otherwise the erasure and write durations could be incorrect.

Once the desired number of bytes have been downloaded in Program Mode, the LSS Master must wait for 80 μs (the time taken to write two bytes to flash at nybble rates) before sending the new transaction (e.g. Active Mode). Otherwise the last nybbles may not be written to flash.

5.1.5 After Manufacture

Directly after manufacture the flash memory will be invalid and the fuse will not have been blown. Therefore power-on-reset will not cause Active Mode. Trim Mode must therefore be entered first, and only after a suitable trim value is found, should Program Mode be entered to store a program. Active Mode can be entered if the program is known to be valid.

Logical View of CPU

6 Introduction

The QA Chip is a 32-bit microprocessor with on-board RAM for scratch storage, on-board flash for program storage, a serial interface, and specific security enhancements.

The high level commands that a user of an QA Chip sees are all implemented as small programs written in the CPU instruction set.

The following sections describe the memory model, the various registers, and the instruction set of the CPU.

7 Memory Model

The QA Chip has its own internal memory, broken into the following conceptual regions:

- RAM variables (3 Kbits=96 entries at 32-bits wide), used for scratch storage (e.g. HMAC-SHA1processing).
- Flash memory (8 Kbytes main block(+)128 bytes info block) used to hold the non-volatile authentication variables (including program keys etc), and program code. Only 4 KBytes(+)64 bytes is visible to the program addressing space due to shadowing. Shadowing is where half of each byte is used to validate and verify the other half, thus protecting against certain forms of physical and logical attacks. As a result, two bytes are read to obtain a single byte of data (this happens transparently).

7.1 RAM

The RAM region consists of 96×32-bit words required for the general functioning of the QA Chip, but only during the operation of the chip. RAM is volatile memory: once power is removed, the values are lost. Note that in actual fact memory retains its value for some period of time after power-down, but cannot be considered to be available upon power-up. This has issues for security that are addressed in other sections of this document.

RAM is typically used for temporary storage of variables during chip operation. Short programs can also be stored and executed from the RAM.

RAM is addressed from 0 to 5F. Since RAM is in an unknown state upon a RESET (RstL), program code should not assume the contents to be 0. Program code can, however, set the RAM to be a particular known state during execution of the reset command (guaranteed to be received before any other commands).

7.2 Flash Variables

The flash memory region contains the non-volatile information in the QA ChIP. Flash memory retains its value after a RESET or if power is removed, and can be expected to be unchanged when the power is next turned on.

Byte 0 of main memory is the first byte of the program run for the command dispatcher. Note that the command dispatcher is always run with shadows enabled.

Bytes 0–7 of the information block flash memory is reserved as follows:

- byte 0-3=fuse. A value of 0x5555AAAA indicates that the fuse has been blown (think of a physical fuse whose wire is no longer intact).
- bytes 4–7=random number used to XOR all data for RAM and flash memory accesses After power-on reset (when the fuse is blown) or upon receipt of a globalId Active command, the 32-bit data from bytes 4–7 in the information block of Flash memory is loaded into an internal ChipMask register. In Active Mode (the chip is executing program code), all data read from the flash and RAM is XORed with the ChipMask register, and all data written to the flash and RAM is XORed with the ChipMask register before being written out. This XORing happens completely transparently to the program code. Main flash memory byte 0 onward is the start of program code. Note that byte 0 onward needs to be valid after being XORed with the appropriate bytes of ChipMask.

Even though CPU access is in 8-bit and 32-bit quantities, the data is actually stored in flash a nybble-at-a-time. Each nybble write is written as a byte containing 4 sets of b/¬b pairs. Thus every byte write to flash is writing a nybble to real and shadow. A write mask allows the individual targetting of nybble-at-a-time writes.

The checking of flash vs shadow flash is automatically carried out each read (each byte contains both flash and shadow flash). If all 8 bits are 1, the byte is considered to be in its erased form[1], and returns 0 as the nybble. Otherwise, the value returned for the nybble depends on the size of the overall access and the setting of bit 0 of the 8-bit WriteMask.

[1]TSMC's flash memory has an erased state of all 1s

- All 8-bit accesses (i.e. instruction and program code fetches) are checked to ensure that each byte read from flash is 4 sets of b/¬b pairs. If the data is not of this form, the chip hangs until a new command is issued over the serial interface.
- With 32-bit accesses (i.e. data used by program code), each byte read from flash is checked to ensure that it is 4 sets of b/¬b pairs. A setting of $WriteMask_0=0$ means that if the data is not valid, then the chip will hang until a new command is issued over the serial interface. A setting of $WriteMask_0=1$ means that each invalid nybble is replaced by the upper nybble of the WriteMask. This allows recovery after a write or erasure is interrupted by a power-down.

8 Registers

A number of registers are defined for use by the CPU. They are used for control, temporary storage, arithmetic functions, counting and indexing, and for I/O.

These registers do not need to be kept in non-volatile (Flash) memory. They can be read or written without the need for an erase cycle (unlike Flash memory). Temporary storage registers that contain secret information still need to be protected from physical attack by Tamper Prevention and Detection circuitry and parity checks.

All registers are cleared to 0 on a RESET. However, program code should not assume any RAM contents have any particular state, and should set up register values appropriately. In particular, at the startup entry point, the various address registers need to be set up from unknown states.

8.1 GO

A 1-bit GO register is 1 when the program is executing, and 0 when it is not. Programs can clear the GO register to halt execution of program code once the command has finished executing.

8.2 Accumulator and Z Flag

The Accumulator is a 32-bit general-purpose register that can be thought of as the single data register. It is used as one of the inputs to all arithmetic operations, and is the register used for transferring information between memory registers.

The Z register is a 1-bit flag, and is updated each time the Accumulator is written to. The Z register contains the zero-ness of the Accumulator. Z=1 if the last value written to the Accumulator was 0, and 0 if the last value written was non-0.

Both the Accumulator and Z registers are directly accessible from the instruction set.

8.3 Address Registers 8.3.1 Program Counter Array and Stack Pointer

A 12-level deep 12-bit Program Counter Array (PCA) is defined. It is indexed by a 4-bit Stack Pointer (SP). The current Program Counter (PC), containing the address of the currently executing instruction, is effectively PCA[SP]. A single register bit, PCRamSel determines whether the program is executing from flash or RAM (0=flash, 1=RAM).

The PC is affected by calling subroutines or returning from them, and by executing branching instructions. The SP is affected by calling subroutines or returning from them. There is no bounds checking on calling too many subroutines: the oldest entry in the execution stack will be lost.

The entry point for program code is defined to be address 0 in Flash. This entry point is used whenever the master signals a new transaction.

8.3.2 A0–A3

There are 4 8-bit address registers Each register has an associated memory mode bit designating the address as in Flash (0) or RAM (1).

When an An register is pointing to an address in RAM, it holds the word number. When it is pointing to an address in Flash, it points to a set of 32-bit words that start at a 128-bit (16 byte) alignment. The A0 register has a special use of direct offset e.g. access is possible to (A0),0–7 which is the 32-bit word pointed to by A0 offset by the specified number of words.

8.3.3 WriteMask

The WriteMask register is used to determine how many nybbles will be written during a 32-bit write to Flash, and whether or not an invalid nybble will be replaced during a read from Flash.

During writes to flash, bit n (of 8) determines whether nybble n is written. The unit of writing is a nybble since half of each byte is used for shadow data. A setting of 0xFF means that all 32-bits will be written to flash (as 8 sets of nybble writes).

During 32-bit reads from flash (occurs as 8 reads), the value of $WriteMask_0$ is used to determine whether a read of invalid data is replaced by the upper nybble of WriteMask. If 0, a read of invalid data is not replaced, and the chip hangs until a new command is issued over the serial interface. If 1, a read of invalid data is replaced by the upper nybble of the WriteMask.

Thus a WriteMask setting of 0 (reset setting) means that no writes will occur to flash, and all reads are not replaced (causing the program to hang if an invalid value is encountered).

8.4 Counters

A number of special purpose counters/index registers are defined:

TABLE 350

Counter/Index registers

| Name | Register Size | Bits | Description |
|---|---|---|---|
| C1 | 1 × 3 | 3 | Counter used to index arrays and general purpose counter |
| C2 | 1 × 6 | 6 | General purpose counter and can be used to index arrays |

All these counter registers are directly accessible from the instruction set. Special instructions exist to load them with specific values, and other instructions exist to decrement or increment them, or to branch depending on the whether or not the specific counter is zero.

There are also 2 special flags (not registers) associated with C1 and C2, and these flags hold the zero-ness of C1 or C2. The flags are used for loop control, and are listed here, for although they are not registers, they can be tested like registers.

TABLE 351

Flags for testing C1 and C2

| Name | Description |
|---|---|
| C1Z | 1 = C1 is current zero, 0 = C1 is currently non-zero. |
| C2Z | 1 = C2 is current zero, 0 = C2 is currently non-zero. |

8.5 RTMP

The single bit register RTMP allows the implementation of LFSRs and multiple precision shift registers.

During a rotate right (ROR) instruction with operand of RB, the bit shifted out (formally bit 0) is written to the RTMP register. The bit currently in the RTMP register becomes the new bit 31 of the Accumulator. Performing multiple ROR RB commands over several 32-bit values implements a multiple precision rotate/shift right.

The XRB operand operates in the same way as RB, in that the current value in the RTMP register becomes the new bit 31 of the Accumulator. However with the XRB instruction, the bit formally known as bit 0 does not simply replace RTMP (as in the RB instruction). Instead, it is XORed with RTMP, and the result stored in RTMP, thereby allowing the implementation of long LFSRs.

8.6 Registers Used for I/O

Several registers are defined for communication between the master and the QA ChIP. These registers are LocalID, InByte and OutByte.

LocalId (7 bits) defines the chip-specific id that this particular QA Chip will accept commands for.

InByte (8 bits) provides the means for the QA Chip to obtain the next byte from the master. OutByte (8 bits) provides the means for the QA Chip to send a byte of data to the master.

From the QA Chip's point of view:

Reads from InByte will hang until there is 1 byte of data present from the master.

Writes to OutByte will hang if the master has not already consumed the last OutByte.

When the master begins a new command transaction, any existing data in InByte and OutByte is lost, and the PC is reset to the entry point in the code, thus ensuring correct framing of data.

8.7 Registers Used for Trimming Clock Speed

A single 8-bit Trim register is used to trim the ring oscillaor clock speed. The register has a known value of 0x00 during reset to ensure that reads from flash will succeed at the fastest process corners, and can be set in one of two ways:

via Trim Mode, which is necessary before the QA Chip is programmed for the first time; or via the CPU, which is necessary every time the QA Chip is powered up before any flash write or erasure accesses can be carried out.

8.8 Registers Used for Testing Flash

There are a number of registers specifically for testing the flash implementation. A single 32-bit write to an appropriate RAM address allows the setting of any combination of these flash test registers.

RAM consists of 96×32-bit words, and can be pointed to by any of the standard An address registers. A write to a RAM address in the range 97–127 does nothing with the RAM (reads return 0), but a write to a RAM address in the range 0x80–0x87 will write to specific groupings of registers according to the low 3 bits of the RAM address. A 1 in the address bit means the appropriate part of the 32-bit Accumulator value will be written to the appropriate flash test registers. A 0 in the address bit means the register bits will be unaffected.

The registers and address bit groupings are listed in Table 352:

TABLE 352

Flash test registers settable from CPU in RAM address range 0x80–0x87[2]

| adr bitSuper-scriptpara-numonly | data bits | name | description |
|---|---|---|---|
| 0 | 0 | shadowsOff | 0 = shadowing applies (nybble based flash access) 1 = shadowing disabled, 8-bit direct accesses to flash. |
| | 1 | hiFlashAdr | Only valid when shadowsOff = 1 0 = accesses are to lower 4 Kbytes of flash 1 = accesses are to upper 4 Kbytes of flash |
| | 2 | | |
| 1 | 3 | enable-FlashTest | 0 = keep flash test register within the TSMC flash IP in its reset state 1 = enable flash test register to take on non-reset values. |
| | 8–4 | flashTest | Internal 5-bit flash test register within the TSMC flash IP (SFC008_08B9_HE). If this is written with 0x1E, then subsequent writes will be according to the TSMC write test mode. You must write a non-0x1E value or reset the register to exit this mode. |
| 2 | 28–9 | flashTime | When timerSel is 1, this value is used for the duration of the program cycle within a standard flash write or erasure. 1 unit = 16 clock cycles (16 × 100 ns typical). Regardless of timerSel, this value is also used for the timeout following power down detection before the QA Chip resets itself. 1 unit = 1 clock cycle (= 100 ns typical). Note that this means the programmer should set this to an appropriate value (e.g. 5 μs), |

TABLE 352-continued

| Flash test registers settable from CPU in RAM address range 0x80–0x87[2] | | | |
|---|---|---|---|
| adr bitSuper-scriptpara-numonly | data bits | name | description |
| | | | just as the localId needs to be set. |
| | 29 | timerSel | 0 = use internal (default) timings for flash writes & erasures<br>1 = use flashTime for flash writes and erasures |

[2]This is from the programmer's perspective. Addresses sent from the CPU are byte aligned, so the MRU needs to test bit n + 2. Similarly, checking DRAM address > 128 means testing bit 7 of the address in the CPU, and bit 9 in the MRU.

[3]unshadowed

[4]shadowed

When none of the address register bits 0–2 are set (e.g. a write to RAM address 0x80), then invalid writes will clear the illChip and retryCount registers.

For example, set the A0 register to be 0x80 in RAM. A write to (A0), 0 will write to none of the flash test registers, but will clear the illChip and retryCount registers. A write to (A0), 7 will write to all of the flash test registers. A write to (A0), 2 will write to the enableFlashTest and flashTest registers only. A write to (A0), 4 will write to the flashTime and bmerSel registers etc.

Finally, a write to address 0x88 in RAM will cause a device erasure. If infoBlockSel is 0, then the device erasure will only be of main memory. If infoBlockSel is 1, then the device erasure is of both main memory and the information block (which will also clear the ChipMask and the Fuse).

Reads of invalid RAM areas will reveal information as follows:

- all invalid addresses in RAM (e.g. 0x80) will return the illChip flag in the low bit (illChip is set whenever 16 consecutive bad reads occur for a single byte in memory)
- all invalid addresses in RAM with the low address bit set (e.g. 0x81, or (A0), 1 when A0 holds 0x80), will additionally return the most recent retryCount setting (only updated by the chip when a bad read occurs). i.e. bit 0=illChip, bits 4–1=retryCount.

8.9 Register Summary

Table 353 provides a summary of the registers used in the CPU.

TABLE 353

| Register summary | | |
|---|---|---|
| Register name | Description | #bits |
| A[0–3] | address registers | 49 = 36 |
| Acc | Accumulator | 32 |
| C1 | general purpose counter and index | 3 |
| C2 | general purpose counter and index | 6 |
| IllChip | gets set whenever more than 15 consecutive bad reads from flash occurred (and any program executing has hung) | 1 |
| InByte | input byte from outside world | 8 |
| Go | determines whether CPU is executing | 1 |
| LocalId | determines id for this chip's IO | 7 |
| OutByte | output byte to outside world | 8 |

TABLE 353-continued

| Register summary | | |
|---|---|---|
| Register name | Description | #bits |
| Z | zero flag for last xfer to Acc | 1 |
| PCA | program counter array | 1212 = 144 |
| PCRamSel | Program code is executing in flash (0) or ram (1) | 1 |
| RetryCount | counts the number of retries for bad reads | 4 |
| RTMP | bit used to alow multi-word rotations | 1 |
| SP | stack pointer into PCA | 4 |
| Trim | trims ring oscillator frequency | 8 |
| flash test registers | various registers in the embedded flash and flash access logic specifically for testing the flash memory | 30 |
| | TOTAL (bits) | 295 |

8.10 Startup

Whenever the chip is powered up, or receives a 'write' command over the serial interface, the PC and PCRamSel get set to 0 and execution begins at 0 in Flash memory. The program (starting at 0) needs to determine how the program was started by reading the InByte register.

If the first byte read is 0xFF, the chip is being requested to perform software reset tasks. Execution of software reset can only be interrupted by a power down. The reset tasks include setting up RAM to contain known startup state information, setting up Trim and localID registers etc. The CPU signals that it is now ready to receive commands from an external device by writing to the OutByte register.

An external Master is able to read the OutByte (and any further outbytes that the CPU decides to send) if it so wishes by a read using the localId.

Otherwise the first byte read will be of the form where the least significant bit is 0, and bits 7–1 contain the localId of the device as read over the serial interface. This byte is usually discarded since it nominally only has a value of differentiation against a software reset request. The second and subsequent bytes contain the data message of a write using the localId. The CPU can prevent interruption during execution by writing 0 to the localId and then restoring the desired localId at the later stage.

9 Instruction Set

The CPU operates on 8-bit instructions and typically on 32-bit data items. Each instruction typically consists of an opcode and operand, although the number of bits allocated to opcode and operand varies between instructions.

9.1 Basic Opcodes (Summary)

The opcodes are summarized in Table 354:

TABLE 354

| Opcode bit pattern map | | |
|---|---|---|
| Opcode | Mnemonic | Simple Description |
| 0000xxxx | JMP | Jump |
| 0001xxxx | JSR | Jump subroutine |
| 0010xxxx | TBR | Test and branch |
| 0011xxxx | DBR | Decrement and branch |
| 0100xxxx | SC | Set counter to a value |
| 0101xxxx | ST | Store Accumulator in specified location |
| 0110000x | - | reserved |
| 01100010 | JPZ | Jump to 0 |
| 01100011 | JPI | Jump indirect |
| 011001xx | - | reserved |
| 01101xxx | - | reserved |

TABLE 354-continued

Opcode bit pattern map

| Opcode | Mnemonic | Simple Description |
|---|---|---|
| 01110000 | - | reserved |
| 01110001 | ERA | Erase page of flash memory pointed to by Accumulator |
| 01110010 | JSZ | Jump to subroutine at at 0 |
| 01110011 | JSI | Jump subroutine indirect |
| 01110100 | RTS | Return from subroutine |
| 01110101 | HALT | Stop the CPU |
| 0111011x | - | reserved |
| 01111xxx | LIA | Load immediate value into address register |
| 10000xxx | AND | Bitwise AND Accumulator |
| 10001xxx | OR | Bitwise OR Accumulator |
| 1001xxxx | XOR | Exclusive-OR Accumulator |
| 1010xxxx | ADD | Add a 32 bit value to the Accumulator |
| 1011xxxx | LD | Load Accumulator |
| 1100xxxx | ROR | Rotate Accumulator right |
| 11010xxx | AND | Bitwise AND Accumulator[5] |
| 11011xxx | OR | Bitwise OR Accumulator[Superscriptparanumonly] |
| 11100xxx | XOR | Bitwise XOR Accumulator[Superscriptparanumonly] |
| 11101xxx | ADD | Add a 32 bit value to the Accumulator[Superscriptparanumonly] |
| 11110xxx | LD | Load Accumulator[Superscriptparanumonly] |
| 11111xxx | RIA | Rotate Accumulator into address register |

[5]immediate form of instruction

Table 355 is a summary of valid operands for each opcode. The table is ordered alphabetically by opcode mnemonic. The binary value for each operand can be found in the subsequent sections.

TABLE 355

Valid operands for opcodes

| Opcode | Valid operands |
|---|---|
| ADD | immediate value<br>(A0), offset<br>(An), {C1, C2} [where n = 0–3] |
| AND | immediate value<br>(A0), offset |
| DBR | {C1, C2}, offset |
| ERA | |
| HALT | |
| JMP | address |
| JPI | |
| JPZ | |
| JSI | |
| JSR | address |
| JSZ | |
| LIA | {Flash, Ram}, An [where n = 0–3], {immediate value} |
| LD | immediate value<br>(A0), offset<br>(An), {C1, C2} [where n = 0–3] |
| OR | immediate value<br>(A0), offset |
| RIA | {Flash, Ram}, An [where n = 0–3] |
| ROR | {InByte, OutByte, WriteMask, ID, C1, C2, RB, XRB, 1, 3, 8, 24, 31} |
| RTS | |
| SC | {C1, C2}, {immediate value} |
| ST | (A0), offset<br>(An), {C1, C2} [where n = 0–3] |
| TBR | {0, 1}, offset |
| XOR | immediate value<br>(A0), offset<br>(An), {C1, C2} [where n = 0–3] |

Additional pseduo-opcodes (for programming convenience) are as follows:

DEC=ADD 0xFF.

INC=ADD 0x01

NOT=XOR 0xFF.

LDZ=LD0

SC {C1, C2}, Acc=ROR {C1, C2}

RD=ROR Inbyte

WR=ROR OutByte

LDMASK=ROR WriteMask

LDID=ROR Id

NOP=XOR 0

9.2 Addressing Modes

The CPU supports a set of addressing modes as follows:

immediate accumulator indirect indirect fixed indirect indexed 9.2.1 Immediate

In this form of addressing, the operand itself supplies the 32-bit data.

Immediate addressing relies on 3 bits of operand, plus an optional 8 bits at PC+1 to determine an 8-bit base value. Bits 0 to 1 of the opcode byte determine whether the base value comes from the opcode byte itself, or from PC+1, as shown in Table 356.

TABLE 356

Selection for base value in immediate mode

| $Opcode_{1-0}$ | Base value |
|---|---|
| 00 | 00000000 |
| 01 | 00000001 |
| 10 | From PC + 1 (i.e. $MIUData_{7-0}$) |
| 11 | 11111111 |

The base value is computed by using $CMD_0$ as bit 0, and copying $CMD_1$ into the upper 7 bits.

The resultant 8 bit base value is then used as a 32-bit value, with 0s in the upper 24 bits, or the 8-bit value is replicated into the upper 32 bits. The selection is determined by bit 2 of the opcode byte, as follows:

TABLE 357

Replicate bits selection

| $Opcode_2$ | Data |
|---|---|
| 0 | No replication. Data has 0 in upper 24 bits and baseVal in lower 8 bits |
| 1 | Replicated. Data is 32-bit value formed by replicating baseVal. |

Opcodes that support immediate addressing are LD, ADD, XOR, AND, OR. The SC and LIA instructions are also immediate in that they store the data with the opcode, but they are not in the same form as that described here. See the detail on the individual instructions for more information.

Single byte examples include:

LD 0

ADD 1

ADD 0xFF. . . # this subtracts 1 from the acc

XOR 0xFF. . . # this performs an effective logical NOT operation

Double byte examples include:

LD 0x05# a constant

AND 0x0F # isolates the lower nybble

LD 0x36. . . # useful for HMAC processing 9.2.2 Accumulator Indirect

In this form of addressing, the Accumulator holds the effective address.

Opcodes that support Accumulator indirect addressing are JPI, JSI and ERA. In the case of JPI and JSI, the Accumulator holds the address to jump to. In the case of ERA, the Accumulator holds the address of the page in flash memory to be erased.

Examples include:

JPI

JSI

ERA 9.2.3 Indirect Fixed

In this form of addressing, address register A0 is used as a base address, and then a specific fixed offset is added to the base address to give the effective address.

Bits 2–0 of the opcode byte specify the fixed offset from A0, which means the fixed offset has a range of 0 to 7.

Opcodes that support indirect indexed addressing are LD, ST, ADD, XOR, AND, OR.

Examples include:

LD (A0),2

ADD (A0), 3

AND (A0), 4

ST (A0), 7

9.2.4 Indirect Indexed

In this form of addressing, an address register is used as a base address, and then an index register is used to offset from that base address to give the effective address.

The address register is one of 4, and is selected via bits 2–1 of the opcode byte as follows:

TABLE 358

Address register selection

| $Opcode_{2-1}$ | address register selected |
|---|---|
| 00 | A0 |
| 01 | A1 |
| 10 | A2 |
| 11 | A3 |

Bit 0 of the opcode byte selects whether index register C1 or C2 is used:

The counter is selected as follows:

TABLE 359

Interpretation of counter for DBR

| $Opcode_0$ | interpretion |
|---|---|
| 0 | C1 |
| 1 | C2 |

Opcodes that support indirect indexed addressing are LD, ST, ADD, XOR.

Examples include:

LD (A2), C1

ADD (A1), C1

ST (A3), C2

Since C1 and C2 can only decement, processing of data structures typically works by loading Cn with some number n and decrementing to 0. Thus (Ax),n is the first word accessed, and (Ax), 0 is the last 32-bit word accessed in the loop.

9.3 ADD—Add to Accumulator

Mnemonic: ADD

Opcode: 1010xxxx, and 11101xxx

Usage: ADD effective-address, or ADD immediate-value

The ADD instruction adds the specified 32-bit value to the Accumulator via modulo $2^{32}$ addition.

The 11101xxx form of the opcode follows the immediate addressing rules (see Section 9.2.1 on page 946). The 1010xxxx form of the opcode defines an effective address as follows:

TABLE 360

Interpretation of operand for ADD (1010xxxx)

| bit 3 | interpretion | comment |
|---|---|---|
| 0 | (A0), offset | indirect fixed addressing (see Section 9.2.3 on page 948) |
| 1 | (An), Cn | indirect indexed addressing (see Section 9.2.4 on page 948) |

The Z flag is also set during this operation, depending on whether the result (loaded into the Accumulator) is zero or not.

9.4 AND—Bitwise AND

Mnemonic: AND

Opcode: 10000xxx, and 11010xxx

Usage: AND effective-address, or AND immediate-value

The AND instruction performs a 32-bit bitwise AND operation on the Accumulator.

The 11010xxx form of the opcode follows the immediate addressing rules (see Section 9.2.1 on page 946). The 10000xxx form of the opcode follows the indirect fixed addressing rules (see Section 9.2.3 on page 948).

The Z flag is also set during this operation, depending on whether the resultant 32-bit value (loaded into the Accumulator) is zero or not.

9.5 DBR—Decrement and Branch

Mnemonic: DBR

OpCode: 0011xxxx

Usage: DBR Counter, Offset

This instruction provides the mechanism for building simple loops.

The counter is selected from bit 0 of the opcode byte as follows:

TABLE 361

Interpretation of counter for DBR

| bit 0 | interpretion |
|---|---|
| 0 | C1 |
| 1 | C2 |

If the specified counter is non-zero, then the counter is decremented and the designated offset is added to the current instruction address (PC for 1-byte instructions, PC+1 for 2-byte instructions). If the specified counter is zero, it is decremented (all bits in the counter become set) and processing continues at the next instruction (PC+1 or PC+2). The designated offset will typically be negative for use in loops.

The instruction is either 1 or two bytes, as determined by bits 3–1 of the opcode byte:

If bits 3–1=000, the instruction consumes 2 bytes. The 8 bits at PC+1 are treated as a signed number and used as the offset amount. Thus 0xFF is treated as −1, and 0x01 is treated as +1.

If bits 3–1≠000, the instruction consumes 1 byte. Bits 3–1 are treated as a negative number (the sign bit is implied) and used as the offset amount. Thus 111 is treated as −1, and 001 is treated as −7. This is useful for small loops.

The effect is that if the branch is back 1–7 bytes (1 byte is not particularly useful), then the single byte form of the instruction can be used. If the branch is forward, or backward more than 7 bytes, then the 2-byte instruction is required.

9.6 ERA—Erase

Mnemonic: ERA

Opcode: 01110001

Usage: ERA

This instruction causes an erasure of the 256-byte page of flash memory pointed to by the Accumulator. The Accumulator is assumed to contain an 8-bit pointer to a 128-bit (16 byte) aligned structure (same structure as the address registers). The page number to be erased comes from bits 7–4, and the lower 4 bits are ignored.

Note that the size of the flash memory page being erased is actually 512 bytes, but in terms of data storage and addressing from the point of view of the CPU, there is only 256 bytes in the page.

9.7 HALT—Halt CPU Operation

Mnemonic: HALT

Opcode: 01110101

Usage: HALT

The HALT instruction writes a 0 to the internal GO register, thereby causing the CPU to terminate the currently executing program. The CPU will only be restarted with a new localId transaction from the Master or by a globalId plus Active Mode byte.

9.8 JMP—Jump

Mnemonic: JMP

Opcode: 0000xxxx

Usage: JMP effective-address

The JMP instruction provides for a method of branching to a specified address. The instruction loads the PC with the effective address.

The new PC is loaded as follows: bits 11–8 are obtained from bits 3–0 of the JMP opcode byte, and bits 7–0 are obtained from PC+1.

9.9 JPI—Jump Indirect

Mnemonic: JPI

Opcode: 01100011

Usage: JPI

The JPI instruction loads the PC with the lower 12 bits of the Accumulator, and sets the PCRamSel register with bit 15 of the Accumulator. Note that the stack is unaffected (unlike JSI).

9.10 JPZ—Jump to Zero

Mnemonic: JPZ

Opcode: 01100010

Usage: JPZ

The JPZ instruction loads the PC and PCRamSel with 0, thereby causing a jump to address 0 in Flash memory.

Programmers will not typically use the JPZ command. However the CPU executes this instruction whenever a new command arrives over the serial interface, so that the code entry point is known i.e. every time the chip receives a new command, execution begins at address 0 in flash. This does not change the status of any other internal register settings (e.g. the flash test registers).

9.11 JSI—Jump Subroutine Indirect

Mnemonic: JSI

Opcode: 01110011

Usage: JSI

The JSI instruction allows the jumping to a subroutine whose address is obtained from the Accumulator. The instruction pushes the current PC onto the stack, loads the PC with the lower 12 bits of the Accumulator, and sets the PCRamSel register with bit 15 of the Accumulator.

The stack provides for 12 levels of execution (11 subroutines deep). It is the responsibility of the programmer to ensure that this depth is not exceeded or the deepest return value will be overwritten (since the stack wraps). Programs can take advantage of the fact that the stack wraps.

9.12 JSR—Jump Subroutine

Mnemonic: JSR

Opcode: 0001xxxx

Usage: JSR effective-address

The JSR instruction provides for the most common usage of the subroutine construct. The instruction pushes the current PC onto the stack, and loads the PC with the effective address.

The new PC is loaded as follows: bits 11–8 are obtained from bits 3–0 of the JSR opcode byte, and bits 7–0 are obtained from PC+1.

The stack provides for 12 levels of execution (11 subroutines deep). It is the responsibility of the programmer to ensure that this depth is not exceeded or the return value will be overwritten (since the stack wraps). Programs can take advantage of the fact that the stack wraps.

9.13 JSZ—Jump to Subroutine at Zero

Mnemonic: JSZ

Opcode: 01110010

Usage: JSZ

The JSZ instruction jumps to the subroutine at flash address 0 (i.e. it pushes the current PC onto the stack, and loads the PC and PCRamSel with 0).

Programmers will not typically use the JSZ command. It exists merely as a result of opcode decoding minimization and can be used to assist with the testing of the chip.

9.14 LD—Load Accumulator

Mnemonic: LD

Opcode: 1011xxxx, and 11110xxx

Usage: LD effective-address, or LD immediate-value

The LD instruction loads the Accumulator with the 32-bit value.

The 11110xxx form of the opcode follows the immediate addressing rules (see Section 9.2.1 on page 946). The 1011xxxx form of the opcode defines an effective address as follows:

TABLE 362

Interpretation of operand for LD (1011xxxx)

| bit 3 | interpretion | comment |
|---|---|---|
| 0 | (A0), offset | indirect fixed addressing (see Section 9.2.3 on page 948) |
| 1 | (An), Cn | indirect indexed addressing (see Section 9.2.4 on page 948) |

The Z flag is also set during this operation, depending on whether the value loaded into the Accumulator is zero or not.

9.15 LIA—Load Immediate Address

Mnemonic: LIA

Opcode: 01111xxx

Usage: LIAF AddressRegister, Value # for flash addresses

The LIA instruction transfers the data from PC+1 into the designated address register (A0–A3), and sets the memory mode bit for that address register.

Bit 0 specifies whether the address is in flash or ram, as follows:

TABLE 363

Interpretation of memory mode for LIA

| bit 0 | interpretion |
|---|---|
| 0 | Flash |
| 1 | Ram |

The address register to be targetted is selected via bits 2–1 of the instruction.

9.16 OR—Bitwise OR

Mnemonic: OR

Opcode: 10001xxx, and 11011xxx

Usage: OR effective-address, or OR immediate-value

The OR instruction performs a 32-bit bitwise OR operation on the Accumulator.

The 11011xxx form of the opcode follows the immediate addressing rules (see Section 9.2.1 on page 946). The 10001xxx form of the opcode follows the indirect fixed addressing rules (see Section 9.2.3 on page 948).

The Z flag is also set during this operation, depending on whether the resultant 32-bit value (loaded into the Accumulator) is zero or not.

9.17 RIA—Rotate in Address

Mnemonic: RIA

Opcode: 11111xxx

Usage: RIAF AddressRegister # for flash addresses RIAR AddressRegister # for ram addresses The RIA instruction transfers the lower 8 bits of the Accumulator into the designated address register (A0 –A3), sets the memory mode bit for that address register, and rotates the Accumulator right by 8 bits.

Bit 0 specifies whether the address is in flash or ram, as follows:

TABLE 364

Interpretation of memory mode for RIA

| bit 0 | interpretion |
|---|---|
| 0 | Flash |
| 1 | Ram |

The address register to be targetted is selected via bits 2–1 of the instruction.

9.18 ROR—Rotate Right

Mnemonic: ROR

Opcode: 1100xxxx

Usage: ROR Value

The ROR instruction provides a way of rotating the Accumulator right a set number of bits. The bit(s) coming in at the top of the Accumulator (to become bit 31) can either come from the previous lower bits of the Accumulator, from the serial connection, or from external flags. The bit(s) rotated out can also be output from the serial connection, or combined with an external flag.

The allowed operands are as follows:

TABLE 365

Interpretation of operand for ROR

| bits 3–0 | interpretion |
|---|---|
| 0000 | RB |
| 0001 | XRB |
| 0010 | WriteMask |
| 0011 | 1 |
| 0100 | - (reserved) |
| 0101 | 3 |
| 0110 | 31 |
| 0111 | 24 |
| 1000 | C1 |
| 1001 | C2 |
| 1010 | - (reserved) |
| 1011 | - (reserved) |
| 1100 | 8 |
| 1101 | ID |
| 1110 | InByte |
| 1111 | OutByte |

The Z flag is also set during this operation, depending on whether resultant 32-bit value (loaded into the Accumulator) is zero or not.

In its simplest form, the operand for the ROR instruction is one of 1, 3, 8, 24, 31, indicating how many bit positions the Accumulator should be rotated. For these operands, there is no external input or output—the bits of the Accumulator are merely rotated right. Note that these values are the equivalent to rotating left 31, 29, 24, 8, 1 bit positions.

With operand WriteMask, the lower 8 bits of the Accumulator are transferred to the WriteMask register, and the Accumulator is rotated right by 1 bit. This conveniently allows successive nybbles to be masked during Flash writes if the Accumulator has been preloaded with an appropriate value (eg 1x01).

With operands C1 and C2, the lower appropriate number of bits of the Accumulator (3 for C1, 6 for C2) are transferred to the C1 or C2 register and the lower 6 bits of the Accumulator are loaded with the previous value of the Cn register. The remaining upper bits of the Accumulator are set as follows: bit 31–24 are copied from previous bits 7–0, and bits 23–6 are copied from previous bits 31–14 (effectively junk). As a result, the Accumulator should be subsequently masked if the programmer wants to compare for specific values).

With operand ID, the 7 low-order bits are transferred from the Accumulator to the LocalId register, the low-order 8 bits of the Accumulator are copied to the Trim register if the Trim register has not already been written to after power-on reset, and the Accumulator is rotated right by 8 bits. This means that the ROR ID instruction needs to be performed twice, typically during Global Active Mode—once to set Trim, and once to set LocalId. Note there is no way to read the contents of the localId or Trim registers directly. However the LocalId sent to the program for a command is available as bits 7–1 of the first byte obtained from InByte after program startup.

With operand InByte, the next serial input byte is transferred to the highest 8 bits of the Accumulator. The InByteValid bit is also cleared. If there is no input byte available from the client yet, execution is suspended until there is one. The remainder of the Accumulator is shifted right 8 bit positions (bit 31 becomes bit 23 etc.), with lowest bits of the Accumulator shifted out.

With operand OutByte, the Accumulator is shifted right 8 bit positions. The byte shifted out from bits 7–0 is stored in the OutByte register and the OutByteValid flag is set. It is therefore ready for a client to read. If the OutByteValid flag is already set, execution of the instruction stalls until the OutByteValid flag cleared (when the OutByte byte has been read by the client). The new data shifted in to the upper 8 bits of the Accumulator is what was transferred to the OutByte register (i.e. from the Accumulator). Finally, the RB and XRB operands allow the implementation of LFSRs and multiple precision shift registers. With RB, the bit shifted out (formally bit 0) is written to the RTMP register. The register currently in the RTMP register becomes the new bit 31 of the Accumulator. Performing multiple ROR RB commands over several 32-bit values implements a multiple precision rotate/shift right. The XRB operates in the same way as RB, in that the current value in the RTMP register becomes the new bit 31 of the Accumulator. However with the XRB instruction, the bit formally known as bit 0 does not simply replace RTMP (as in the RB instruction). Instead, it is XORed with RTMP, and the result stored in RTMP. This allows the implementation of long LFSRs, as required by the authentication protocol.

9.19 RTS—Return From Subroutine

Mnemonic: RTS

Opcode: 01110100

Usage: RTS

The RTS instruction pulls the saved PC from the stack, adds 1, and resumes execution at the resultant address. The effect is to cause execution to resume at the instruction after the most recently executed JSR or JSI instruction.

Although 12 levels of execution are provided for (11 subroutines), it is the responsibility of the programmer to balance each JSR and JSI instruction with an RTS. A RTS executed with no previous JSR will cause execution to begin at whatever address happens to be pulled from the stack. Of course this may be desired behaviour in specific circumstances.

9.20 SC—Set Counter

Mnemonic: SC

Opcode: 0100xxxx

Usage: SC Counter Value

The SC instruction is used to transfer a 3-bit Value into the specified counter. The operand determines which of counters C1 and C2 is to be loaded as well as the value to be loaded. Value is stored in bits 3–1 of the 8-bit opcode, and the counter is specified by bit 0 as follows:

TABLE 366

Interpretation of counter for SC

| bit 0 | interpretion |
|---|---|
| 0 | C1 |
| 1 | C2 |

Since counter C1 is 3 bits, Value is copied directly into C1.

For counter C2, $C2_{2\text{-}0}$ are copied to $C2_{5\text{-}3}$, and Value is copied to $C2_{2\text{-}0}$. Two SC C2 instructions are therefore required to load C2 with a given 6-bit value. For example, to load C2 with 0x0C, we would have SC C2 1 followed by SC C2 4.

9.21 ST—Store Accumulator

Mnemonic: ST

Opcode: 0101xxxx

Usage: ST effective-address

The ST instruction stores the 32-bit Accumulator at the effective address. The effective address is determined as follows:

TABLE 367

Interpretation of operand for ST (0101xxxx)

| bit 3 | interpretion | comment |
|---|---|---|
| 0 | (A0), offset | indirect fixed addressing (see Section 9.2.3 on page 948) |
| 1 | (An), Cn | indirect indexed addressing (see Section 9.2.4 on page 948) |

If the effective address in Flash memory, only those nybbles whose corresponding WriteMask bit is set will be written to Flash. Programmers should be very aware of flash characteristics (write time, longevity, page size etc. when storing data in flash).

There is always the possibility that power could be removed during a write to Flash. If this occurs, the flash will be in an indeterminate state. If the QA Chip is warned by the external system that power is about to be removed (via the master causing a transition to Idle Mode), the write will be aborted cleanly at the nearest nybble boundary (writes occur in the order of least significant to most significant).

9.22 TBR—Test and Branch

Mnemonic: TBR

Opcode: 0010xxxx

Usage: TBR Value Offset

The Test and Branch instruction tests the status of the Z flag (the zero-ness of the Accumulator), and then branches if a match ocurs.

The zero-ness is selected from bit 0 of the opcode byte as follows:

TABLE 368

Interpretation of zero-ness for TBR

| bit 0 | interpretion |
|---|---|
| 0 | true if Acc is zero (Z = 1) |
| 1 | true if Acc is non-zero (Z = 0) |

If the specified zero-test matches, then the designated offset is added to the current instruction address (PC for 1-byte instructions, PC+1 for 2-byte instructions). If the zero-test does not match, processing continues at the next instruction (PC+1 or PC+2). The instruction is either 1 or two bytes, as determined by bits 3–1 of the opcode byte:

If bits 3–1=000, the instruction consumes 2 bytes. The 8 bits at PC+1 are treated as a signed number and used as the offset amount to be added to PC+1. Thus 0xFF is treated as −1, and 0x01 is treated as +1.

If bits 3–1≠000, the instruction consumes 1 byte. Bits 3–1 are treated as a positive number (the sign bit is implied) and used as the offset amount to be added to PC. Thus 111 is treated as 7, and 001 is treated as 1. This is useful for skipping over a small number of instructions.

The effect is that if the branch is forward 1–7 bytes (1 byte is not particularly useful), then the single byte form of the instruction can be used. If the branch is backward, or forward more than 7 bytes, then the 2-byte instruction is required.

9.23 XOR—Bitwise Exclusive OR

Mnemonic: XOR

Opcode: 1001xxxx, and 11100xxx

Usage: XOR effective-address, or XOR immediate-value

The XOR instruction performs a 32-bit bitwise XOR operation on the Accumulator.

The 11100xxx form of the opcode follows the immediate addressing rules (see Section 9.2.1 on page 946). The 1001xxxx form of the opcode has an effective address as follows:

TABLE 369

Interpretation of operand for XOR (1001xxxx)

| bit 3 | interpretion | comment |
|---|---|---|
| 0 | (A0), offset | indirect fixed addressing (see Section 9.2.3 on page 948) |
| 1 | (An), Cn | indirect indexed addressing (see Section 9.2.4 on page 948) |

The Z flag is also set during this operation, depending on whether the result (loaded into the Accumulator) is zero or not.

Implementation

10 Introduction

This chapter provides the high-level definition of a CPU capable of implementing the functionality required of an QA ChIP.

10.1 Physical Interface 10.1.1 Pin Connections

The pin connections are described in Table 370.

TABLE 370

Pin connections to QA Chip

| pin | direction | description |
|---|---|---|
| Vdd | In | Nominal voltage. If the voltage deviates from this by more than a fixed amount, the chip will RESET. |
| GND | In | |
| SClk | In | Serial clock |
| SDa | In/Out | Serial data |

The system operating clock SysClk is different to SClk. SysClk is derived from an internal ring oscillator based on the process technology. In the FPGA implementation SysClk is obtained via a 5th pin.

10.1.2 Size and Cost

The QA Chip uses a 0.25 μm CMOS Flash process for an area of 1 $mm^2$ yielding a 10 cent manufacturing cost in 2002. A breakdown of area is listed in Table 371.

TABLE 371

Breakdown of Area for QA Chip

| approximate area ($mm^2$) | description |
|---|---|
| 0.49 | 8 KByte flash memory TSMC: SFC0008_08B9_HE (8K × 8-bits, erase page size = 512 bytes) Area = 724.688 μm × 682.05 μm. |
| 0.08 | 3072 bits of static RAM |
| 0.38 | General logic |
| 0.05 | Analog circuitry |
| 1 | TOTAL (approximate) |

Note that there is no specific test circuitry (scan chains or BIST) within the QA Chip (see Section 10.3.10 on page 965), so the total transistor count is as shown in Table 371.

10.1.3 Reset

The chip performs a RESET upon power-up. In addition, tamper detection and prevention circuitry in the chip will cause the chip to either RESET or erase Flash memory (depending on the attack detected) if an attack is detected.

10.2 Operating Speed

The base operating system clock SysClk is generated internally from a ring oscillator (process dependant). Since the frequency varies with operating temperature and voltage, the clock is passed through a temperature-based clock filter before use (see Section 10.3.3 on page 961). The frequency is built into the chip during manufacture, and cannot be changed. The frequency is in the range 7–14 MHz.

10.3 General Manufacturing Comments

Manufacturing comments are not normally made when normally describing the architecture of a chIP. However, in the case of the QA Chip, the physical implementation of the chip is very much tied to the security of the key. Consequently a number of specialized circuits and components are necessary for implementation of the QA ChIP. They are listed here.

Flash process

Internal randomized clock

Temperature based clock filter

Noise generator

Tamper Prevention and Detection circuitry

Protected memory with tamper detection

Boot-strap circuitry for loading program code

Data connections in polysilicon layers where possible

OverUnderPower Detection Unit

No scan-chains or BIST 10.3.1 Flash Process

The QA Chip is implemented with a standard Flash manufacturing process. It is important that a Flash process be used to ensure that good endurance is achieved (parts of the Flash memory can be erased/written many times).

10.3.2 Internal Randomized Clock

To prevent clock glitching and external clock-based attacks, the operating clock of the chip should be generated internally. This can be conveniently accomplished by an internal ring oscillator. The length of the ring depends on the process used for manufacturing the chIP.

Due to process and temperature variations, the clock needs to be trimmed to bring it into a range usable for timing of Flash memory writes and erases.

The internal clock should also contain a small amount of randomization to prevent attacks where light emissions from switching events are captured, as described below.

Finally, the generated clock must be passed through a temperature-based clock filter before being used by the rest of the chip (see Section 10.3.3 on page 961).

The normal situation for FET implementation for the case of a CMOS inverter (which involves a pMOS transistor combined with an nMOS transistor) as shown in FIG. 353.

During the transition, there is a small period of time where both the nMOS transistor and the pMOS transistor have an intermediate resistance. The resultant power-ground short circuit causes a temporary increase in the current, and in fact accounts for around 20% of current consumed by a CMOS device. A small amount of infrared light is emitted during the short circuit, and can be viewed through the silicon substrate (silicon is transparent to infrared light). A small amount of light is also emitted during the charging and discharging of the transistor gate capacitance and transmission line capacitance.

For circuitry that manipulates secret key information, such information must be kept hidden.

Fortunately, IBM's PICA system and LVP (laser voltage probe) both have a requirement for repeatability due to the fact that the photo emissions are extremely weak (one photon requires more than $10^5$ switching events). PICA requires around $10^9$ pases to build a picture of the optical waveform. Similarly the LVP requires multiple passes to ensure an adequate SNR.

Randomizing the clock stops repeatability (from the point of view of collecting information about the same position in time), and therefore reduces the possibility of this attack.

10.3.3 Temperature Based Clock Filter

The QA Chip circuitry is designed to operate within a specific clock speed range. Although the clock is generated by an internal ring oscillator, the speed varies with temperature and power. Since the user supplies the temperature and power, it is possible for an attacker to attempt to introduce race-conditions in the circuitry at specific times during processing. An example of this is where a low temperature causes a clock speed higher than the circuitry is designed for, and this may prevent an XOR from working properly, and of the two inputs, the first may always be returned. These styles of transient fault attacks are documented further in [1]. The lesson to be learned from this is that the input power and operating temperature cannot be trusted.

Since the chip contains a specific power filter, we must also filter the clock. This can be achieved with a temperature sensor that allows the clock pulses through only when the temperature range is such that the chip can function correctly.

The filtered clock signal would be further divided internally as required.

10.3.4 Noise Generator

Each QA Chip should contain a noise generator that generates continuous circuit noise. The noise will interfere with other electromagnetic emissions from the chip's regular activities and add noise to the $I_{dd}$ signal. Placement of the noise generator is not an issue on an QA Chip due to the length of the emission wavelengths.

The noise generator is used to generate electronic noise, multiple state changes each clock cycle, and as a source of pseudo-random bits for the Tamper Prevention and Detection circuitry (see Section 10.3.5 on page 962).

A simple implementation of a noise generator is a 64-bit maximal period LFSR seeded with a non-zero number.

10.3.5 Tamper Prevention and Detection Circuitry

A set of circuits is required to test for and prevent physical attacks on the QA ChIP. However what is actually detected as an attack may not be an intentional physical attack. It is therefore important to distinguish between these two types of attacks in an QA Chip:

where you can be certain that a physical attack has occurred.

where you cannot be certain that a physical attack has occurred.

The two types of detection differ in what is performed as a result of the detection. In the first case, where the circuitry can be certain that a true physical attack has occurred, erasure of flash memory key information is a sensible action. In the second case, where the circuitry cannot be sure if an attack has occurred, there is still certainly something wrong. Action must be taken, but the action should not be the erasure of secret key information. A suitable action to take in the second case is a chip RESET. If what was detected was an attack that has permanently damaged the chip, the same conditions will occur next time and the chip will RESET again. If, on the other hand, what was detected was part of the normal operating environment of the chip, a RESET will not harm the key.

A good example of an event that circuitry cannot have knowledge about, is a power glitch. The glitch may be an intentional attack, attempting to reveal information about the key. It may, however, be the result of a faulty connection, or simply the start of a power-down sequence. It is therefore best to only RESET the chip, and not erase the key. If the chip was powering down, nothing is lost.

If the System is faulty, repeated RESETs will cause the consumer to get the System repaired. In both cases the consumable is still intact.

A good example of an event that circuitry can have knowledge about, is the cutting of a data line within the chIP. If this attack is somehow detected, it could only be a result of a faulty chip (manufacturing defect) or an attack. In either case, the erasure of the secret information is a sensible step to take.

Consequently each QA Chip should have 2 Tamper Detection Lines—one for definite attacks, and one for possible attacks. Connected to these Tamper Detection Lines would be a number of Tamper Detection test units, each testing for different forms of tampering. In addition, we want to ensure that the Tamper Detection Lines and Circuits themselves cannot also be tampered with.

At one end of the Tamper Detection Line is a source of pseudo-random bits (clocking at high speed compared to the general operating circuitry). The Noise Generator circuit described above is an adequate source. The generated bits pass through two different paths—one carries the original data, and the other carries the inverse of the data. The wires carrying these bits are in the layer above the general chip circuitry (for example, the memory, the key manipulation circuitry etc.). The wires must also cover the random bit generator. The bits are recombined at a number of places via an XOR gate. If the bits are different (they should be), a 1 is output, and used by the particular unit (for example, each output bit from a memory read should be ANDed with this bit value). The lines finally come together at the Flash memory Erase circuit, where a complete erasure is triggered by a 0 from the XOR. Attached to the line is a number of triggers, each detecting a physical attack on the chip. Each trigger has an oversize nMOS transistor attached to GND. The Tamper Detection Line physically goes through this nMOS transistor. If the test fails, the trigger causes the Tamper Detect Line to become 0. The XOR test will therefore fail on either this clock cycle or the next one (on average), thus RESETing or erasing the chip.

FIG. 349 illustrates the basic principle of a Tamper Detection Line in terms of tests and the XOR connected to either the Erase or RESET circuitry.

The Tamper Detection Line must go through the drain of an output transistor for each test, as illustrated by FIG. 350.

It is not possible to break the Tamper Detect Line since this would stop the flow of 1s and 0s from the random source. The XOR tests would therefore fail. As the Tamper Detect Line physically passes through each test, it is not possible to eliminate any particular test without breaking the Tamper Detect Line.

It is important that the XORs take values from a variety of places along the Tamper Detect Lines in order to reduce the chances of an attack. FIG. 351 illustrates the taking of multiple XORs from the Tamper Detect Line to be used in the different parts of the chip. Each of these XORs can be considered to be generating a ChipOK bit that can be used within each unit or sub-unit.

A typical usage would be to have an OK bit in each unit that is ANDed with a given ChipOK bit each cycle. The OK bit is loaded with 1 on a RESET. If OK is 0, that unit will fail until the next RESET. If the Tamper Detect Line is functioning correctly, the chip will either RESET or erase all key information. If the RESET or erase circuitry has been destroyed, then this unit will not function, thus thwarting an attacker.

The destination of the RESET and Erase line and associated circuitry is very context sensitive. It needs to be protected in much the same way as the individual tamper tests. There is no point generating a RESET pulse if the attacker can simply cut the wire leading to the RESET circuitry.

The actual implementation will depend very much on what is to be cleared at RESET, and how those items are cleared.

Finally, FIG. 352 shows how the Tamper Lines cover the noise generator circuitry of the chip. The generator and NOT gate are on one level, while the Tamper Detect Lines run on a level above the generator.

10.3.6 Protected Memory with Tamper Detection

It is not enough to simply store secret information or program code in flash memory. The Flash memory and RAM must be protected from an attacker who would attempt to modify (or set) a particular bit of program code or key information. The mechanism used must conform to being used in the Tamper Detection Circuitry (described above).

The first part of the solution is to ensure that the Tamper Detection Line passes directly above each flash or RAM bit. This ensures that an attacker cannot probe the contents of flash or RAM. A breach of the covering wire is a break in the Tamper Detection Line. The breach causes the Erase signal to be set, thus deleting any contents of the memory. The high frequency noise on the Tamper Detection Line also obscures passive observation.

The second part of the solution for flash is to always store the data with its inverse. In each byte, 4 bits contains the data, and 4 bits (the shadow) contains the inverse of the data. If both are 0, this is a valid erase state, and the value is 0. Otherwise, the memory is only valid if the 4 bits of shadow are the inverse of the main 4 bits. The reasoning is that it is possible to add electrons to flash via a FIB, but not take electrons away. If it is possible to change a 0 to 1 for example, it is not possible to do the same to its inverse, and therefore regardless of the sense of flash, an attack can be detected.

The second part of the solution for RAM is to use a parity bit. The data part of the register can be checked against the parity bit (which will not match after an attack).

The bits coming from Flash and RAM can therefore be validated by a number of test units (one per bit) connected to the common Tamper Detection Line. The Tamper Detection circuitry would be the first circuitry the data passes through (thus stopping an attacker from cutting the data lines).

In addition, the data and program code should be stored in different locations for each chip, so an attacker does not know where to launch an attack. Finally, XORing the data coming in and going to Flash with a random number that varies for each chip means that the attacker cannot learn anything about the key by setting or clearing an individual bit that has a probability of being the key (the inverse of the key must also be stored somewhere in flash).

Finally, each time the chip is called, every flash location is read before performing any program code. This allows the flash tamper detection to be activated in a common spot instead of when the data is actually used or program code executed. This reduces the ability of an attacker to know exactly what was written to.

10.3.7 Boot-Strap Circuitry for Loading Program Code

Program code should be kept in protected flash instead of ROM, since ROM is subject to being altered in a non-testable way. A boot-strap mechanism is therefore required to load the program code into flash memory (flash memory is in an indeterminate state after manufacture).

The boot-strap circuitry must not be in a ROM—a small state-machine suffices. Otherwise the boot code could be trivially modified in an undetectable way.

The boot-strap circuitry must erase all flash memory, check to ensure the erasure worked, and then load the program code.

The program code should only be executed once the flash program memory has been validated via Program Mode.

Once the final program has been loaded, a fuse can be blown to prevent further programming of the chip.

10.3.8 Connections in Polysilicon Layers Where Possible

Wherever possible, the connections along which the key or secret data flows, should be made in the polysilicon layers. Where necessary, they can be in metal 1, but must never be in the top metal layer (containing the Tamper Detection Lines).

10.3.9 OverUnder Power Detection Unit

Each QA Chip requires an OverUnder Power Detection Unit (PDU) to prevent Power Supply Attacks. A PDU detects power glitches and tests the power level against a Voltage Reference to ensure it is within a certain tolerance. The Unit contains a single Voltage Reference and two comparators. The PDU would be connected into the RESET Tamper Detection Line, thus causing a RESET when triggered.

A side effect of the PDU is that as the voltage drops during a power-down, a RESET is triggered, thus erasing any work registers.

10.3.10 No Scan Chains or BIST

Test hardware on an QA Chip could very easily introduce vulnerabilities. In addition, due to the small size of the QA Chip logic, test hardware such as scan paths and BIST units could in fact take a sizeable chunk of the final chip, lowering yield and causing a situation where an error in the test hardware causes the chip to be unusable. As a result, the QA Chip should not contain any BIST or scan paths. Instead, the program memory must first be validated via the Program Mode mechanism, and then a series of program tests run to verify the remaining parts of the chip.

11 Architecture

FIG. 389 shows a high level block diagram of the QA ChIP. Note that the tamper prevention and detection circuitry is not shown.

11.1 Analogue Unit

FIG. 390 shows a block diagram of the Analogue Unit. Blocks shown in yellow provide additional protection against physical and electrical attack and, depending on the level of security required, may optionally be implemented.

11.1.1 Ring Oscillator

The operating clock of the chip (SysClk) is generated by an internal ring oscillator whose frequency can be trimmed to reduce the variation from 4:1 (due to process and temperature) down to 2:1 (temperature variations only) in order to satisfy the timing requirements of the Flash memory.

The length of the ring depends on the process used for manufacturing the chip. A nominal operating frequency range of 10 MHz is sufficient. This clock should contain a small amount of randomization to prevent attacks where light emissions from switching events are captured.

Note that this is different to the input SClk which is the serial clock for external communication.

The ring oscillator is covered by both Tamper Detection and Prevention lines so that if an attacker attempts to tamper with the unit, the chip will either RESET or erase all secret information.

FPGA Note: the FPGA does not have an internal ring oscillator. An additional pin (SysClk) is used instead. This is replaced by an internal ring oscillator in the final ASIC.

11.1.2 Voltage Reference

The voltage reference block maintains an output which is substantially independent of process, supply voltage and temperature. It provides a reference voltage which is used by the PDU and a reference current to stabilise the ring oscillator. It may also be used as part of the temperature based clock filter described in Section 10.3.3 on page 961.

11.1.3 OverUnder Power Detection Unit

The OverUnder Power Detection Unit (PDU) is the same as that described in Section 10.3.9 on page 965.

The Under Voltage Detection Unit provides the signal PwrFailing which, if asserted, indicates that the power supply may be turning off. This signal is used to rapidly terminate any Flash write that may be in progress to avoid accidentally writing to an indeterminate memory location.

Note that the PDU triggers the RESET Tamper Detection Line only. It does not trigger the Erase Tamper Detection Line.

The PDU can be implemented with regular CMOS, since the key does not pass through this unit. It does not have to be implemented with non-flashing CMOS.

The PDU is covered by both Tamper Detection and Prevention lines so that if an attacker attempts to tamper with the unit, the chip will either RESET or erase all secret information.

11.1.4 Power-On Reset and Tamper Detect Unit

The Power-on Reset unit (POR) detects a power-on condition and generates the PORstL signal that is fed to all the validation units, including the two inside the Tamper Detect Unit (TDU).

All other logic is connected to RstL, which is the PORstL gated by the VAL unit attached to the Reset tamper detection lines (see Section 10.3.5 on page 962) within the TDU. Therefore, if the Reset tamper line is asserted, the validation will drive RstL low, and can only be cleared by a power-down. If the tamper line is not asserted, then RstL=PORstL.

The TDU contains a second VAL unit attached to the Erase tamper detection lines (see Section 10.3.5 on page 962) within the TDU. It produces a TamperEraseOK signal that is output to the MIU (1=the tamper lines are all OK, 0=force an erasure of Flash).

11.1.5 Noise Generator

The Noise Generator (NG) is the same as that described in Section 10.3.4 on page 961. It is based on a 64-bit maximal period LFSR loaded with a set non-zero bit pattern on RESET.

The NG must be protected by both Tamper Detection and Prevention lines so that if an attacker attempts to tamper with the unit, the chip will either RESET or erase all secret information.

In addition, the bits in the LFSR must be validated to ensure they have not been tampered with (i.e. a parity check). If the parity check fails, the Erase Tamper Detection Line is triggered.

Finally, all 64 bits of the NG are ORed into a single bit. If this bit is 0, the Erase Tamper Detection Line is triggered. This is because 0 is an invalid state for an LFSR.

11.2 Trim Unit

The 8-bit Trim register within the Trim Unit has a reset value of 0x00(to enable the flash reads to succeed even in the fastest process corners), and is written to either by the PMU during Trim Mode or by the CPU in Active Mode. Note that the CPU is only able to write once to the Trim register between power-on-reset due to the TrimDone flag which provides overloading of LocalIdWE.

The reset value of Trim (0) means that the chip has a nominal frequency of 2.7 MHz–10 MHz. The upper of the range is when we cannot trim it lower than this (or we could allow some spread on the acceptable trimmed frequency but this will reduce our tolerance to ageing, voltage and temperature which is the range 7 MHz to 14 MHz). The 2.7 MHz value is determined by a chip whose oscillator runs at 10 MHz when the trim register is set to its maximum value, so then it must run at 2.7 MHz when trim=0. This is based on the non-linear frequency-current characteristic of the oscillator.

Chips found outside of these limits will be rejected.

The frequency of the ring oscillator is measured by counting cycles[6], in the PMU, over the byte period of the serial interface. The frequency of the serial clock, SClk, and therefore the byte period will be accurately controlled during the measurement. The cycle count (Fineas) at the end of the period is read over the serial bus and the Trim register updated (Trimval) from its power on default (POD) value. The steps are shown in FIG. 391. Multiple measure—read—trim cycles are possible to improve the accuracy of the trim procedure.

[6]Note that the PMU counts using 12-bits, saturates at 0xFFF, and returns the cycle count divided by 2 as an 8-bit value. This means that multiple measure-read-trim cycles may be necessary to resolve any amibguity. In any case, multiple cycles are necessary to test the correctness of the trim circuitry during manufacture test.

A single byte for both Fineas and Trimval provide sufficient accuracy for measurement and trimming of the frequency. If the bus operates at 400 kHz, a byte (8 bits) can be sent in 20 μs. By dividing the maximum oscillator frequency, expected to be 20 MHz, by 2 results in a cycle count of 200 and 50 for the minimum frequency of 5 MHz resulting in a worst case accuracy of 2%.

FIG. 392 shows a block diagram of the Trim Unit:

The 8-bit Trim value is used in the analog Trim Block to adjust the frequency of the ring oscillator by controlling its bias current. The two lsbs are used as a voltage trim, and the 6 msbs are used as a frequency trim.

The analog Trim Clock circuit also contains a Temperature filter as described in Section 10.3.3 on page 961.

11.310 Unit

The QA Chip acts as a slave device, accepting serial data from an external master via the IO Unit (IOU). Although the IOU actually transmits data over a 1-bit line, the data is always transmitted and received in 1-byte chunks.

The IOU receives commands from the master to place it in a specific operating mode, which is one of:

- Idle Mode: is the startup mode for the IOU if the fuse has not yet been blown. Idle Mode is the mode where the QA Chip is waiting for the next command from the master. Input signals from the CPU are ignored.
- Program Mode: is where the QA Chip erases all currently stored data in the Flash memory (program and secret key information) and then allows new data to be written to the Flash. The IOU stays in Program Mode until told to enter another mode.
- Active Mode: is the startup mode for the IOU if the fuse has been blown (the program is safe to run). Active Mode is where the QA Chip allows the program code to be executed to process the master's specific command. The IOU returns to Idle Mode automatically when the command has been processed, or if the time taken between consuming input bytes (while the master is writing the data) or generating output bytes (while the master is reading the results) is too great.
- Trim Mode: is where the QA Chip allows the generation and setting of a trim value to be used on the internal ring oscillator clock value. This must be done for safety reasons before a program can be stored in the Flash memory.

See Section 12 on page 970 for detailed information about the IOU.

11.4 Central Processing Unit

The Central Processing Unit (CPU) block provides the majority of the circuitry of the 4-bit microprocessor. FIG. 393 shows a high level view of the block.

11.5 Memory Interface Unit

The Memory Interface Unit (MIU) provides the interface to flash and RAM. The MIU contains a Program Mode Unit that allows flash memory to be loaded via the IOU, a Memory Request Unit that maps 8-bit and 32-bit requests into multiple byte based requests, and a Memory Access Unit that generates read/write strobes for individual accesses to the memory.

FIG. 394 shows a high level view of the MIU block.

11.6 Memory Components

The Memory Components block isolates the memory implementation from the rest of the QA Chip. The entire contents of the Memory Components block must be protected from tampering. Therefore the logic must be covered by both Tamper Detection Lines. This is to ensure that program code, keys, and intermediate data values cannot be changed by an attacker. The 8-bit wide RAM also needs to be parity-checked.

FIG. 395 shows a high level view of the Memory Components block. It consists of 8 KBytes of flash memory and 3072 bits of parity checked RAM.

11.6.1 RAM

The RAM block is shown here as a simple 96×32-bit RAM (plus parity included for verification).

The parity bit is generated during the write.

The RAM is in an unknown state after RESET, so program code cannot rely on RAM being 0 at startup.

The initial version of the ASIC has the RAM implemented by Artisan component RA1SH (96×32-bit RAM without parity). Note that the RAMOutEn port is active low i.e. when 0, the RAM is enabled, and when 1, the RAM is disabled.

11.6.2 Flash Memory

A single Flash memory block is used to hold all non-volatile data. This includes program code and variables. The Flash memory block is implemented by TSMC component SFC0008_08B9_HE [4], which has the following characteristics:

- 8 K×8-bit main memory, plus 128×8-bit information memory
- 512 byte page erase
- Endurance of 20,000 cycles (min)
- Greater than 100 years data retention at room temperature
- Access time: 20 ns (max)
- Byte write time: 20 μs (min)
- Page erase time: 20 ms (min)
- Device erase time: 200 ms (min)
- Area of 0.494 $mm^2$ (724.66 μm×682.05 μm)

The FlashCtrl line are the various inputs on the SFC0008_08B9_HE required to read and write bytes, erase pages and erase the device. A total of 9 bits are required (see [4] for more information).

Flash values are unchanged by a RESET. After manufacture, the Flash contents must be considered to be garbage. After an erasure, the Flash contents in the SFC0008_08B9_HE is all 1s.

11.6.3 VAL Blocks

The two VAL units are validation units connected to the Tamper Prevention and Detection circuitry (described in Section 10.3.5 on page 962), each with an OK bit. The OK bit is set to 1 on PORstL, and ORed with the ChipOK values from both Tamper Detection Lines each cycle. The OK bit is ANDed with each data bit that passes through the unit.

In the case of $VAL_1$, the effective byte output from the flash will always be 0 if the chip has been tampered with. This will cause shadow tests to fail, program code will not execute, and the chip will hang.

In the case of $VAL_2$, the effective byte from RAM will always be 0 if the chip has been tampered with, thus resulting in no temporary storage for use by an attacker.

12 IO Unit

The I/O Unit (IOU) is responsible for providing the physical implementation of the logical interface described in Section 5.1 on page 933, moving between the various modes (Idle, Program, Trim and Active) according to commands sent by the master.

The IOU therefore contains the circuitry for communicating externally with the external world via the SClk and SDa pins. The IOU sends and receives data in 8-bit chunks. Data is sent serially, most significant bit (bit 7) first through to least significant bit (bit 0) last. When a master sends a command to an QA Chip, the command commences with a single byte containing an id in bits 7–1 , and a read/write sense in bit 0, as shown in FIG. 396.

The IOU recognizes a global id of 0x00 and a local id of LocalId (set after the CPU has executed program code at reset or due to a global id/ActiveMode command on the serial bus). Subsequent bytes contain modal information in the case of global ID, and command/data bytes in the case of a match with the local id.

If the master sends data too fast, then the IOU will miss data, since the IOU never holds the bus.

The meaning of too fast depends on what is running. In Program Mode, the master must send data a little slower than the time it takes to write the byte to flash (actually written as 2×8-bit writes, or 40 µs). In ActiveMode, the master is permitted to send and request data at rates up to 500 KHz.

None of the latches in the IOU need to be parity checked since there is no advantage for an attacker to destroy or modify them.

The IOU outputs 0s and inputs 0s if either of the Tamper Detection Lines is broken. This will only come into effect if an attacker has disabled the RESET and/or erase circuitry, since breaking either Tamper Detection Lines should result in a RESET or the erasure of all Flash memory.

The IOU's InByte, InByteValID, OutByte, and OutByteValid registers are used for communication between the master and the QA ChIP. InByte and InByteValid provide the means for clients to pass commands and data to the QA ChIP. OutByte and OutByteValid provide the means for the master to read data from the QA ChIP.

Reads from InByte should wait until InByteValid is set. InByteValid will remain clear until the master has written the next input byte to the QA ChIP. When the IOU is told (by the FEU or MU) that InByte has been read, the IOU clears the InByteValid bit to allow the next byte to be read from the client.

Writes to OutByte should wait until OutByteValid is clear. Writing OutByte sets the OutByteValid bit to signify that data is available to be transmitted to the master. OutByteValid will then remain set until the master has read the data from OutByte. If the master requests a byte but OutByteValid is clear, the IOU sends a NAck to indicate the data is not yet ready.

When the chip is reset via RstL, the IOU enters ActiveMode to allow the PMU to run to load the fuse. Once the fuse has been loaded (when MIUAvail transitions from 0 to 1) the IOU checks to see if the program is known to be safe. If it is not safe, the IOU reverts to IdleMode. If it is safe (FuseBlown=1), the IOU stays in ActiveMode to allow the program to load up the localId and do any other reset initialization, and will not process any further serial commands until the CPU has written a byte to the OutByte register (which may be read or not at the discretion of the master using a localId read). In both cases the master is then able to send commands to the QA Chip as described in Section 5.1 on page 933.

FIG. 397 shows a block diagram of the IOU.

With regards to InByteValid inputs, set has priority over reset, although both set and reset in correct operation should never be asserted at the same time. With regards to IOSetInByte and IOLoadInByte, if IOSetInByte is asserted, it will set InByte to be 0xFF regardless of the setting of IOLoadInByte.

The two VAL units are validation units connected to the Tamper Prevention and Detection circuitry (described in Section 10.3.5 of the Architecture Overview chapter), each with an OK bit. The OK bit is set to 1 on PORstL, and ORed with the ChipOK values from both Tamper Detection Lines each cycle. The OK bit is ANDed with each data bit that passes through the unit.

In the case of $VAL_1$, the effective byte output from the chip will always be 0 if the chip has been tampered with. Thus no useful output can be generated by an attacker. In the case of VAL2, the effective byte input to the chip will always be 0 if the chip has been tampered with. Thus no useful input can be chosen by an attacker.

There is no need to verify the registers in the IOU since an attacker does not gain anything by destroying or modifying them.

The current mode of the IOU is output as a 2-bit IOMode to allow the other units within the QA Chip to take correct action. IOMode is defined as shown in Table 372:

TABLE 372

IOMode values

| Value | Interpretation |
|---|---|
| 00 | Idle Mode |
| 01 | Program Mode |
| 10 | Active Mode |
| 11 | Trim Mode |

The Logic blocks generate a 1 if the current IOMode is in Program Mode, Active Mode or Trim Mode respectively. The logic blocks are:

| | |
|---|---|
| $Logic_1$ | IOMode = 01 (Program) |
| $Logic_2$ | IOMode = 10 (Active) |
| $Logic_3$ | IOMode = 11 (Trim) |

12.1 State Machine

There are two state machines in the IOU running in parallel. The first is a byte-oriented state machine, the second is a bit-oriented state machine. The byte-oriented state machine keeps track of the operating mode of the QA Chip while the bit-oriented state machine keeps track of the low-level bit Rx/Tx protocol.

The SDa and SClk lines are connected to the respective pads on the QA ChIP. The IOU passes each of the signals from the pads through 2 D-types to compensate for metastability on input, and then a further latch and comparitor to ensure that signals are only used if stable for 2 consecutive internal clock cycles. The circuit is shown in Section 12.1.1 below.

12.1.1 Start/Stop Control Signals

The StartDetected and StopDetected control signals are generated based upon monitoring SDa synchronized to SClk. The StartDetected condition is asserted on the falling edge of SDa synchronized to SClk, and the StopDetected condition is asserted on the rising edge of SDa synchronized to SClk.

In addition we generate feSClk which is asserted on the falling edge of SClk, and reSClk which is asserted on the rising edge of SClk. Finally, feSclkPrev is the value of feSClk delayed by a single cycle. FIG. 398 shows the relationship of inputs and the generation of SDaReg, reSClk, feSClk, feSclkPrev, StartDetected and StopDetected.

The SDaRegSelect logic compensates for the 2:1 variation in clock frequency. It uses the length of the high period of the SClk (from the saturating counter) to select between sda5, sda6 and sda7 as the valid data from 300 ns before the falling edge of SClk as follows.

The minimum time for the high period of SClk is 600 ns. If the counter <=4 (i.e. 5 or fewer cycles with SClk=1) then SDaReg output=sda5 (sample point is equidistant from rising and falling edges). If the counter=5 or 6 (i.e. 6 or 7 samples where SClk=1), then SDaReg output=sda6. If the counter=7 (the counter saturates when there are 8 samples of SClk=1), then SDaReg output=sda7. This is shown in pseudocode below:

```
If ((counter2 = 0) ∨(counter = 4))
        SDaReg = sda5
    ElseIf (counter = 7)
        SDaReg = sda7
    Else
        SDaReg = sda6
    EndIf
```

The counter also provides a means of enabling start and stop detection. There is a minimum of a 600 ns setup and 600 ns hold time for start and stop conditions. At 14 MHz this means samples 4 and 5 after the rising edge (sample 1 is considered to be the first sample where SClk=1) could potentially include a valid start or stop condition. At 7 MHz samples 4 and 5 represent 284 and 355 ns respectively, although this is after the rising edge of SClk, which itself is 100 ns after the setup of data (i.e. 384 and 455 ns respectively and therefore safe for sampling). Thus the data will be stable (although not a start or stop). Since we detect stops and starts using sda5 and sda6, we can only validly detect starts and stops 6 cycles after a rising edge, and we need to not-detect starts and stops 4 cycles before the falling edge. We therefore only detect starts and stops when the counter is >=6 (i.e. when sclk3 and sclk2 are 0 and 1 respectively, sda2 holds sample 1 coincident with the rising edge, sdal holds sample 2, sda0 holds sample 3, we load the counter with 0 and sample SDa to obtain the new sda0 which will hold sample 4 at the end of the cycle. Thus while the counter is incrementing from 0 to 1, sda0 will hold sample 4. Therefore sample 4 will be in sda6 when the counter is 6.

12.1.2 Control of SDa and SClk Pins

The SClk line is always driven by the master. The SDa line is driven low whenever we want to transmit an ACK (SDa is active low) or a 0-bit from OutByte. The generation of the SDa pin is shown in the following pseudocode:

```
TxAck = (bitSM_state = ack) ∧((byteSM_state = doWrite)∨
    (((byteSM_state = getGlobalCmd) ∨(byteSM_state = checkId))∧
AckCmd))
TxBit ←(byteSM_state = doRead) ∧(bitSM_state = xferBit)∧
¬OutByte¬bitCount
SDa = ¬(TxAck ∨TxBit) # only drive the line when we are xmitting
a 0
```

The slew rate of the SDa line should be restricted to minimise ground bounce. The pad must guarantee a fall time >20 ns. The rise time will be controlled by the external pull up resistor and bus capacitance.

12.1.3 Bit-Oriented State Machine

The bit-oriented state machine keeps track of the general flow of serial transmission including start/data/ack/stop as shown in the following pseudocode:

```
idle
    EndByte = FALSE
    EndAck = FALSE
    If (StartDetected)
        state ←starting
    Else
        state ←idle
    EndIf
starting
    EndByte = FALSE
```

-continued

```
    EndAck = FALSE
    NAck ←0
    If (StopDetected)
        state ←idle
    ElseIf (feSClkPrev)
        bitCount ←0
        state ←xferBit
    Else
        state ←starting# includes StartDetected
    EndIf
xferBit
    EndAck = FALSE
    EndByte = (feSclkPrev ∧(bitCount = 0)) #
    after feSclk bitCount
must be 1..8
    If (feSClk)
        shiftLeft [ioByte, SDaReg] # capture the bit
        in the ioByte
shift register
        bitCount ←bitCount + 1 # modulo count due
        to 3 bit bitCount
    EndIf
    If (StopDetected)
        state ←idle
    ElseIf (StartDetected)
        state ←starting
    ElseIf (EndByte)
        state ←ack
    Else
        state ←xferBit
    EndIf
    ack
        EndByte = FALSE
        EndAck = feSclkPrev
        If (StopDetected)
            state ←idle
    ElseIf (StartDetected)
        state ←starting
    ElseIf (EndAck)
        state ←xferBit # bitCount is already 0
    Else
        If (feSClk)
            NAck ←SDaReg        # active low, so 0 = ACK,
            1 = NACK
        EndIf
        state ←ack
    EndIf
```

12.1.4 Byte-Oriented State Machine

The following pseudocode illustrates the general startup state of the IOU and the receipt of a transmission from the master.

```
rstL        # setup state of registers on reset
    IOMode ←ActiveMode # to force the fuse to be loaded
    OutByteValid ←0
    OutByte ←0
    InByteValid ←1 # required
    InByte ←0xFF            # byte = FF = the 'reset' command
    localId ←0 # loads localId with theglobalId so no localId
exists
    state ←wait4fuse
wait4fuse
    If (MIUAvail)
        If (FuseBlown) # this must be done same cycle as seeing
MIUAvail go high
            state ←wait4cpu
        Else
            IOMode ←IdleMode # CPU will now require an external
ActiveMode to start
            state ←idle
    Else
        state ←wait4fuse
    EndIf
```

-continued

```
wait4cpu
    If (CPUOutByteWE)          # wait for CPU reset activities to finish
        state ←idle               # note: we're still in ActiveMode
    Else
        state ←wait4cpu
    EndIf
idle
    If (StartDetected)
        state ←checkId
    Else
        state ←idle
    EndIf
```

The first byte received must be checked to ensure it is meant for everyone (globaild of 0) or specifically for us (localid matches). We only send an ACK to a read when there is data available to send. In addition, writes to the general call address (0) are always ACKed, but reads from the general call address are only ACKed before the fuse has been blown.

```
checkId
    isWrite = (ioByte0 = 0)
    isRead = (ioByte0 = 1)
    isGlobal = (ioByte7-1 = 0)
    globalW = isGlobal ∧isWrite
    localW = (ioByte7-1 = localID) ∧isWrite ∧¬isGlobal
    localR = (ioByte7-1 = localID) ∧isRead ∧(¬GlobalW∨
¬FuseBlown)
    If (StopDetected)
        state ←idle
    ElseIf (EndByte)
        AckCmd_in = (globalW ∨localW) ∨(localR ∧OutByteValid)
        AckCmd ←AckCmd_in
        If (localW)
            IOMode ←IdleMode # jic - any output was pending
            IOOutByteUsed = 1
            IOClearInByte = 1 # ensure there is nothing hanging
around from before
        EndIf
    ElseIf (EndAck)
        If (globalW) # globalW and localW are mutually exclusive
            state ←getGlobalCmd
        ElseIf (localW)
            IOMode ←ActiveMode
            IOLoadInByte = 1 # will set inByte to localW
            (lsb will be
0)
            state ←doWrite
        ElseIf (localR ∧IOMode1 ∧AckCmd) # Active mode (or Trim
when fuse intact)
            state ←doRead
        Else
            state ←idle # ignore reads unless first in active or
trim mode
        EndIf
    Else
        state ←checkId
    EndIf
```

With a new global command the IOU waits for the mode byte (see Table page 6 on page 934) to determine the new operating mode:

```
getGlobalCmd
    wantProg = ((ioByte = ProgramModeId) ∧¬FuseBlown)
    wantTrim = ((ioByte = TrimModeId) ∧¬FuseBlown)
    wantActive = (ioByte = ActiveModeId)
    If (StopDetected)
        state ←idle
```

-continued

```
    ElseIf (StartDetected)
        state ←checkId
    ElseIf (EndByte)
        AckCmd_in = wantActive ∨wantProg ∨wantTrim # only
        ACK cmds
we can do
        AckCmd ←AckCmd_in
        If (AckCmd_in)
            IOMode ←IdleMode # jic - any output was pending
            IOOutByteUsed = 1
            IOClearInByte = 1 # ensure there is nothing hanging
            around from before
        EndIf
    ElseIf (EndAck)
        If (wantProg)
            IOMode ←ProgramMode # don't load inByte (we only
            want the
data)
            state ←doWrite
        ElseIf (wantTrim)
            IOMode ←TrimMode # don't load InByte (we only
            want the
next byte)
            state ←doWrite
        ElseIf (wantActive) # must be Active
            IOMode ←ActiveMode
            IOSetInByte = 1 # 0 for all other cases & states.
            1 = sets
inByte to 0xFF
            IOLoadInByte = 1 # sets InByteValid (InByte is set
            to 0xFF
('reset' cmd))
            state ←wait4cpu# don't do anything til the cpu has
completed this task
        Else
            state ←idle # unknown id, so ignore remainder
        EndIf
    Else
        state ←getGlobalCmd
    EndIf
```

When the master writes bytes to the QA Chip (e.g. parameters for a command), the program must consume the byte fast enough (i.e. during the sending of the ACK) or subsequent bits may be lost.

The process of receiving bytes is shown in the following pseudocode:

```
doWrite
    If (StopDetected)
        state ←idle            # stay in whatever IOMode we
were in
    ElseIf (StartDetected)
        state ←checkId
    Else
        If (EndByte)
            IOLoadInByte = ¬InByteValid
        EndIf
        If (EndByte ∧InByteValid) # will only be when master sends
data too quickly
            state ←idle                    # ACK will not
be sent when in idle state
        Else
            state ←doWrite # ACK will be sent automatically after
byte is Rxed
        EndIf
    EndIf
```

When the master wants to read, the IOU sends one byte at a time as requested. The process is shown in the following pseudocode:

```
doRead
    If (StopDetected)
        state ←idle
    ElseIf (StartDetected)
        state ←checkId
    ElseIf (EndAck)
        If (NAck v¬OutByteValid)
            state ←idle
        Else
            state ←doRead
        EndIf
    Else
        If (EndByte)
            IOOutByteUsed = 1
        EndIf
        state ←doRead
    EndIf
```

13 Fetch and Execute Unit

13.1 Introduction

The QA Chip does not require the high speeds and throughput of a general purpose CPU. It must operate fast enough to perform the authentication protocols, but not faster. Rather than have specialized circuitry for optimizing branch control or executing opcodes while fetching the next one (and all the complexity associated with that), the state machine adopts a simplistic view of the world. This helps to minimize design time as well as reducing the possibility of error in implementation.

The FEU is responsible for generating the operating cycles of the CPU, stalling appropriately during long command operations due to memory latency.

When a new transaction begins, the FEU will generate a JPZ (jump to zero) instruction.

The general operation of the FEU is to generate sets of cycles:

- Cycle 0: fetch cycles. This is where the opcode is fetched from the program memory, and the effective address from the fetched opcode is generated. The Fetch output flag is set during the final cycle 0 (i.e. when the opcode is finally valid).
- Cycle 1: execute cycle. This is where the operand is (potentially) looked up via the generated effective address (from Cycle 0) and the operation itself is executed. The Exec output flag is set during the final cycle 1 (i.e. when the operand is finally valid).

Under normal conditions, the state machine generates multiple Cycle=0 followed by multiple Cycle=1. This is because the program is stored in flash memory, and may take multiple cycles to read. In addition, writes to and erasures of flash memory take differing numbers of cycles to perform. The FEU will stall, generating multiple instances of the same Cycle value with Fetch and Exec both 0 until the input MIURdy=1, whereupon a Fetch or Exec pulse will be generated in that same cycle.

There are also two cases for stalling due to serial I/O operations:

- The opcode is ROR OutByte, and OutByteValid=1. This means that the current operation requires outputting a byte to the master, but the master hasn't read the last byte yet.
- The operation is ROR InByte, and InByteValid=0. This means that the current operation requires reading a byte from the master, but the master hasn't supplied the byte yet.

In both these cases, the FEU must stall until the stalling condition has finished.

Finally, the FEU must stop executing code if the IOU exits Active Mode.

The local Cmd opcode/operand latch needs to be parity-checked. The logic and registers contained in the FEU must be covered by both Tamper Detection Lines. This is to ensure that the instructions to be executed are not changed by an attacker.

13.2 State Machine

The Fetch and Execute Unit (FEU) is combinatorial logic with the following registers:

TABLE 373

FEU Registers

| Name | #bits | Description |
|---|---|---|
| Output registers (visible outside the FEU) | | |
| Cycle | 1 | 0 if the FEU is currently fetching an opcode, 1 if the FEU is currently executing the opcode. |
| NewMemTrans | 1 | Is asserted during the start of a potential new memory access.<br>0 = this is not the first cycle of a set of Cycle 0 or Cycle 1<br>1 = this is the first cycle of a set of Cycle 0 or Cycle 1 (previous cycle must have been a Fetch or an Exec). |
| Go | 1 | 1 if the FEU is currently fetching and executing program code (i.e. a program is currently running), 0 if it is not. |
| Local registers (not visible outside the FEU) | | |
| CurrCmd | 8 + p | Holds the currently executing instruction (parity checked). |
| PendingKill | 1 | The currently executing program is waiting to be halted (waiting due to memory access) |
| PendingStart | 1 | A new transaction is waiting to be started (waiting due to memory access or an existing transaction not yet stopped) |
| WasIdle | 1 | The previous cycle had an IOMode of IdleMode. |

In addition, the following externally visible outputs are generated asynchronously:

TABLE 374

Externally visible asynchronous FEU outputs

| Name | #bits | Description |
|---|---|---|
| Fetch | 1 | 1 if the FEU is performing the final cycle of a fetch (i.e. Cycle will also be 0). It is set when the NextCmd output is valid. The local Cmd register is latched during the Fetch cycle with either the incoming MIU8Data or an FEU-generated command. |
| Exec | 1 | 1 if the FEU is performing the final cycle of an execute (i.e. Cycle will also be 1). It is set when the data required by the opcode from the MIU is valid. Other units can execute the Cmd and latch data from the MIU (e.g. from MIUData) during the Exec cycle. |
| Cmd | 8 | When Cycle = 0, this holds the next instruction to be executed (during the next Cycle = 1). Is generated based on incoming MIU8Data or substituted FEU command (e.g. JSR 0).<br>When Cycle = 1, this holds the current instruction being executed (based on theCmd). |

The Cycle and currCmd registers are not used directly. Instead, their outputs are passed through a VAL unit before use. The VAL units are designed to validate the data that passes through them. Each contains an OK bit connected to both Tamper Prevention and Detection Lines. The OK bit is set to 1 on PORstL, and ORed with the ChipOK values from both Tamper Detection Lines each cycle. The OK bit is ANDed with each data bit that passes through the unit.

In the case of $VAL_1$, the effective Cycle will always be 0 if the chip has been tampered with. Thus no program code will execute.

In the case of $VAL_2$, the effective 8-bit currCmd value will always be 0 if the chip has been tampered with. Multiple 0s will be interpreted as the JSR 0 instruction, and this will effectively hang the CPU. $VAL_2$ also performs a parity check on the bits from currCmd to ensure that currCmd has not been tampered with. If the parity check fails, the Erase Tamper Detection Line is triggered. For more information on Tamper Prevention and Detection circuitry, see Section 10.3.5 on page 962.

13.2.1 Pseudocode

```
reset conditions:
    Fetch = 0
    Exec = 0
    Cycle ←0
    currCmd ←0
    Go ←0
    pendingKill ←0
    pendingStart ←0
    newMemTrans ←0
    wasIdle ←1 # required to detect if IOU starts in a non-idle
state
```

The cycle by cycle combinatorial logic behaviour is shown in the following pseudocode:

```
isActive = (IOMode = ActiveMode)
wasIdle ←(IOMode = IdleMode)
wantToStart = (pendingStart ∨wasIdle) ∧isActive
newTrans = wantToStart ∧¬Go ∧MIUAvail
pendingStart ←wantToStart ∧¬newTrans
killTrans = Go ∧(¬isActive ∨pendingKill)
Fetch = newTrans ∨(Go ∧¬Cycle ∧MIURdy ∧¬killTrans)
inDelay = (currCmd = ROR InByte) ∧¬InByteValid
outDelay = (currCmd = ROR OutByte) ∧OutByteValid
ioDelay = inDelay ∨outDelay
Exec = Go ∧Cycle ∧MIURdy ∧¬ioDelay
If (Cycle)
    Cmd = currCmd
ElseIf (newTrans)
    Cmd = JPZ # jump to 0
Else
    Cmd = MIU8Data
EndIf
resetGo = (MIURdy ∧killTrans) ∨(Fetch ∧(Cmd = HALT))
pendingKill ←killTrans ∧¬resetGo
changeCycle = Fetch ∨Exec          # will only be 1 when Go = 1
Cycle ←newTrans ∨((Cycle ⊕ changeCycle) ∧¬resetGo)
newMemTrans ←newTrans ∨(changeCycle ∧¬resetGo)
If (Fetch)
    currCmd ←Cmd
EndIf
If (resetGo)
    Go ←0
ElseIf (newTrans)
    Go ←1
EndIf
```

14 ALU

The Arithmetic Logic Unit (ALU) contains a 32-bit Acc (Accumulator) register as well as the circuitry for simple arithmetic and logical operations.

The logic and registers contained in the ALU must be covered by both Tamper Detection Lines. This is to ensure that keys and intermediate calculation values cannot be changed by an attacker. In addition, the Accumulator must be parity-checked.

A 1-bit Z signal represents the state of zero-ness of the Accumulator. The Accumulator is cleared to 0 upon a RstL, and the Z signal is set to 1. The Accumulator is updated for any of the commands: AND, OR, XOR, ADD, ROR, and RIA, and the Z signal is updated whenever the Accumulator is updated. Note that the Z signal is actually implemented as a nonZ register whose output is passed through an inverter and used as Z.

Each arithmetic and logical block operates on two 32-bit inputs: the current value of the Accumulator, and the current 32-bit output of the DataSel block (either the 32 bit value from MIUData or an immediate value). The AND, OR, XOR and ADD blocks perform the standard 32-bit operations. The remaining blocks are outlined below.

FIG. 399 shows a block diagram of the ALU:

The Accumulator is updated for all instructions where the high bit of the opcode is set:

| | |
|---|---|
| $Logic_1$ | Exec $\wedge Cmd_7$ |

Since the WriteEnables of Acc and nonZ takes $Cmd_7$ and Exec into account (due to $Logic_1$), these two bits are not required by the multiplexor $MX_1$ in order to select the output. The output selection for $MX_1$ only requires bits 6–3 of the Cmd and is therefore simpler as a result (as shown in Table 375).

TABLE 375

| | Selection for multiplexor $MX_1$ | |
|---|---|---|
| | Output | $Cmd_{6-3}$ |
| $MX_1$ | immOut | 011x ∨1110 (LD) |
| | rorOut | 100x ∨1111 (RIA, ROR) |
| | from XOR | 001x ∨1100 (XOR) |
| | from ADD | 010x ∨1101 (ADD) |
| | from AND | 0000 ∨1010 (AND) |
| | from OR | 0001 ∨1011 (OR) |

The two VAL units are validation units connected to the Tamper Prevention and Detection circuitry (described in Section 10.3.5 on page 962), each with an OK bit. The OK bit is set to 1 on PORstL, and ORed with the ChipOK values from both Tamper Detection Lines each cycle. The OK bit is ANDed with each data bit that passes through the unit.

In the case of $VAL_1$, the effective bit output from the Accumulator will always be 0 if the chip has been tampered with. This prevents an attacker from processing anything involving the Accumulator. $VAL_1$ also performs a parity check on the Accumulator, setting the Erase Tamper Detection Line if the check fails.

In the case of $VAL_2$, the effective Z status of the Accumulator will always be true if the chip has been tampered with. Thus no looping constructs can be created by an attacker.

14.1 DataSel Block

The DataSel block is designed to implement the selection between the MIU32Data and the immediate addressing mode for logical commands.

Immediate addressing relies on 3 bits of operand, plus an optional 8 bits at PC+1 to determine an 8-bit base value. Bits 0 to 1 determine whether the base value comes from the opcode byte itself, or from PC+1, as shown in Table 376.

TABLE 376

Selection for base value in immediate mode

| $Cmd_{1-0}$ | Base value |
|---|---|
| 00 | 00000000 |
| 01 | 00000001 |
| 10 | From PC + 1 (i.e. $MIUData_{31-24}$) |
| 11 | 11111111 |

The base value is computed by using $CMD_0$ as bit 0, and copying $CMD_1$ into the upper 7 bits.

The 8-bit base value forms the lower 8 bits of output. These 8 bits are also ANDed with the sense of whether the data is replicated in the upper bits or not (i.e. $CMD_2$). The resultant bits are copied in 3 times to form the upper 24 bits of the output.

FIG. 400 shows a block diagram of the ALU's DataSel block:

14.2 ROR Block

The ROR block implements the ROR and RIA functionality of the ALU.

A 1-bit register named RTMP is contained within the ROR unit. RTMP is cleared to 0 on a RstL, and set during the ROR RB and ROR XRB commands. The RTMP register allows implementation of Linear Feedback Shift Registers with any tap configuration.

FIG. 401 shows a block diagram of the ALU's ROR block:

The ROR n, blocks are shown for clarity, but in fact would be hardwired into multiplexor $MX_3$, since each block is simply a rewiring of the 32-bits, rotated right n bits.

$Logic_1$ is used to provide the WriteEnable signal to RTMP. The RTMP register should only be written to during ROR RB and ROR XRB commands. The combinatorial logic block is:

| | |
|---|---|
| $Logic_1$ | Exec $\wedge(Cmd_{7-4}$ = ROR) $\wedge(Cmd_{3-1}$ = 000) |

Multiplexor $MX_1$ performs the task of selecting the 6-bit value from Cn instead of bits 13–8 (6 bits) from Acc (the selection is based on the value of $Logic_2$). Bit 5 is required to distinguish ROR from RIA.

| | |
|---|---|
| $Logic_2$ | $Cmd_{5-2}$ = 0x10 |

TABLE 377

Selection for multiplexor $MX_1$

| | Output | $Logic_2$ |
|---|---|---|
| $MX_1$ | Cn | 1 |
| | $Acc_{13-8}$ | 0 |

Multiplexor $MX_2$ performs the task of selecting the 8-bit value from InByte instead of the lower 8 bits from the ANDed Acc based on the CMD.

TABLE 378

Selection for multiplexor $MX_2$

| | Output | $Cmd_{4-0}$ |
|---|---|---|
| $MX_2$ | InByte | 0x110 |
| | $Acc_{7-0}$ | ¬(0x110) |

Multiplexor $MX_3$ does the final rotating of the 32-bit value. The bit patterns of the CMD operand are taken advantage of:

TABLE 379

Selection for multiplexor $MX_3$

| | Output | $Cmd_{3-0}$ | Comments |
|---|---|---|---|
| $MX_3$ | ROR 1 | 00xx | RB, XRB, WriteMask, 1 |
| | ROR 3 | 010x | 3 |
| | ROR 31 | 0110 | 31 |
| | ROR 24 | 0111 | 24 |
| | ROR 8 | 1xxx | RIA, InByte, 8, OutByte, C1, C2, ID |

14.3 IO Block

The IO block within the ALU implements the logic for communicating with the IOU during instructions that involve the Accumulator. This includes generating appropriate control signals and for generating the correct data for sending during writes to the IOU's OutByte and LocalId registers.

FIG. 402 shows a block diagram of the IO block:

$Logic_1$ is used to provide the LocalIdWE signal to the IOU. The localId register should only be written to during the ROR ID command. Only the lower 7 bits of the Accumulator are written to the localId register.

$Logic_2$ is used to provide the ALUOutByteWE signal to the IOU. The OutByte register should only be written to during the ROR OutByte command. Only the lower 8 bits of the Accumulator are written to the OutByte register.

In both cases we output the lower 8 bits of the Accumulator. The ALUIOData value is ANDed with the output of $Logic_2$ to ensure that ALUIOData is only valid when it is safe to do so (thus the IOU logic never sees the key passing by in ALUIOData). The combinatorial logic blocks are:

| | |
|---|---|
| $Logic_1$ | Exec $\wedge(Cmd_{7-0}$ = ROR ID) |
| $Logic_2$ | Exec $\wedge(Cmd_{7-0}$ = ROR OutByte) |

$Logic_3$ is used to provide the ALUInByteUsed signal to the IOU. The InByte is only used during the ROR InByte command. The combinatorial logic is:

| | |
|---|---|
| $Logic_3$ | Exec $\wedge(Cmd_{7-0}$ = ROR InByte) |

15 Program Counter Unit

The Program Counter Unit (PCU) includes the 12 bit PC (Program Counter), as well as logic for branching and subroutine control.

The PCU latches need to be parity-checked. In addition, the logic and registers contained in the PCU must be covered by both Tamper Detection Lines to ensure that the PC cannot be changed by an attacker.

The PC is implemented as a 12 entry by 12-bit PCA (PC Array), indexed by a 4-bit SP (Stack Pointer) register. The PC, PCRamSel and SP registers are all cleared to 0 on a RstL, and updated during the flow of program control according to the opcodes.

The current value for the PC is normally updated during the Execute cycle according to the command being executed. However it is also incremented by 1 during the Fetch cycle for two byte instructions such as JMP, JSR, DBR, TBR, and instructions that require an additional byte for immediate addressing. The mechanism for calculating the new PC value depends upon the opcode being processed.

FIG. 403 shows a block diagram of the PCU:

The ADD block is a simple adder modulo $2^{12}$ with two inputs: an unsigned 12 bit number and an 8-bit signed number (high bit=sign). The signed input is either a constant of 0x01, or an 8-bit offset (the 8 bits from the MIU).

The "+1" block takes a 4-bit input and increments it by 1 (modulo 12). The "−1" block takes a 4-bit input and decrements it by 1 (modulo 12).

Table 380 lists the different forms of PC control:

TABLE 381

Different forms of PC control during the Exec cycle

| Command | Action |
|---|---|
| JMP | The PC is loaded with the current 12-bit value as passed in from the MIU. |
| JPI | The PC is loaded with the current 12-bit value as passed in from the Acc. PCRamSel is loaded with the value from bit 15 of the Acc. |
| JPZ | The PC is loaded with 0. PCRamSel is loaded with 0 (program in flash) |
| JSZ | Save old value of PC onto stack for later. The PC is loaded with 0. PCRamSel is loaded with 0 (program in flash). |
| JSR, JSI | Save old value of PC onto stack for later. The PC is loaded with the current 12-bit value as passed in from either the MIU or the Acc. With JSI, PCRamSel is loaded from the value in bit 15 of the Accumulator. |
| RTS | Pop old value of PC from stack and increment by 1 to get new PC. |
| TBR | If the Z flag matches the TBR test, add 8-bit signed number (MIU8Data) to current PC. Otherwise increment current PC by 1. |
| DBR | If the CZ flag is set, add 8-bit signed offset (MIU8Data) to current PC. Otherwise increment current PC by 1. |
| All others | Increment current PC by 1 |

The updating of PCRamSel only occurs during JPI, JSI, JPZ and JSZ instructions, detected via $Logic_0$.

The same action for the Exec takes place for JMP, JSR, JPI, JSI, JPZ and JSZ, so we specifically detect that case in $Logic_1$. In the same way, we test for the RTS case in $Logic_2$.

| | |
|---|---|
| $Logic_0$ | $Cmd_{7-1} = 011x001$ |
| $Logic_1$ | $(Cmd_{7-5} = 000) \vee Logic_0$ |
| $Logic_2$ | $Cmd_{7-0} = RTS$ |

When updating the PC, we must decide if the PC is to be replaced by a completely new value (as in the case of the JMP, JSR, JPI, JSI, JPZ and JSZ instructions), or by the result of the adder (all other instructions). The output from $Logic_1$ ANDed with Cycle can therefore be safely used by the multiplexor to obtain the new PC value (we need to always select PC+1 when Cycle is 0, even though we don't always write it to the PCA).

Note that the JPZ and JSZ instructions are implemented as 12 AND gates that cause the Accumulator value to be ignored, and the new PC to be set to 0. Likewise, the PCRamSel bit is cleared via these two instructions using the same AND mechanism.

The input to the 12-bit adder depends on whether we are incrementing by 1 (the usual case), or adding the offset as read from the MIU (when a branch is taken by the DBR and TBR instructions). $Logic_3$ generates the test.

| | |
|---|---|
| $Logic_3$ | $Cycle \wedge (((Cmd_{7-4} = DBR) \wedge \neg CZ) \vee ((Cmd_{7-4} = TBR) \wedge (Cmd_0 \oplus Z)))$ |

The actual offset to be added in the case of the DBR and TBR instructions is either the 8-bit value read from the MIU, or an 8-bit value generated by bits 3–1 of the opcode and treating bit 4 of the opcode as the sign (thereby making DBR immediate branching negative, and TBR immediate branching positive). The former is selected when bits 3–1 of the opcode is 0, as shown by $Logic_4$.

| | |
|---|---|
| $Logic_4$ | If $(Cmd_{3-1} = 000)$ output MIU8Data<br>Else output $Cmd_4 \mid Cmd_4 \mid Cmd_4 \mid Cmd_4 \mid Cmd_4 \mid Cmd_{3-1}$ |

Finally, the selection of which PC entry to use depends on the current value for SP. As we enter a subroutine, the SP index value must increment, and as we return from a subroutine, the SP index value must decrement. $Logic_1$ tells us when a subroutine is being entered, and $Logic_2$ tells us when the subroutine is being returned from. We use $Logic_2$ to select the altered SP value, but only write to the SP register when Exec and $Cmd_4$ are also set (to prevent JMP and JPZ from adjusting SP).

The two VAL units are validation units connected to the Tamper Prevention and Detection circuitry (described in Section 10.3.5 on page 962), each with an OK bit. The OK bit is set to 1 on PORstL, and ORed with the ChipOK values from both Tamper Detection Lines each cycle. The OK bit is ANDed with each data bit that passes through the unit. Both VAL units also parity-check the data bits to ensure that they are valid. If the parity-check fails, the Erase Tamper Detection Line is triggered.

In the case of $VAL_1$, the effective output from the SP register will always be 0. If the chip has been tampered with. This prevents an attacker from executing any subroutines.

In the case of $VAL_2$, the effective PC output will always be 0 if the chip has been tampered with. This prevents an attacker from executing any program code.

16 Address Generator Unit

The Address Generator Unit (AGU) generates effective addresses for accessing the Memory Unit (MU). In Cycle 0, the PC is passed through to the MU in order to fetch the next opcode. The AGU interprets the returned opcode in order to generate the effective address for Cycle 1. In Cycle 1, the generated address is passed to the MU.

The logic and registers contained in the AGU must be covered by both Tamper Detection Lines. This is to ensure that an attacker cannot alter any generated address. The latches for the counters and calculated address should also be parity-checked.

If either of the Tamper Detection Lines is broken, the AGU will generate address 0 each cycle and all counters will be fixed at 0. This will only come into effect if an attacker has disabled the RESET and/or erase circuitry, since under normal circumstances, breaking a Tamper Detection Line will result in a RESET or the erasure of all Flash memory.

16.1 Implementation

The block diagram for the AGU is shown in FIG. 404:

The accessMode and WriteMask registers must be cleared to 0 on reset to ensure that no access to memory occurs at startup of the CPU.

The Adr and accessMode registers are written to during the final cycle of cycle 0 (Fetch) and cycle 1 (Exec) with the address to use during the following cycle phase. For example, when cycle=1, the PC is selected so that it can be written to Adr during Exec. During cycle 0, while the PC is being output from Adr, the address to be used in the following cycle 1 is calculated (based on the fetched opcode seen as Cmd) and finally stored in Adr when Fetch is 1. The accessMode register is also updated in the same way.

It is important to distinguish between the value of Cmd during different values for Cycle:

- During Cycle 0, when Fetch is 1, the 8-bit input Cmd holds the instruction to be executed in the following Cycle 1. This 8-bit value is used to decode the effective address for the operand of the instruction.
- During Cycle 1, when Exec is 1, Cmd holds the currently executing instruction.

The WriteMask register is only ever written to during execution of an appropriate ROR instruction. $Logic_1$ sets the WriteMask and MMR WriteEnables respectively based on this condition:

| | |
|---|---|
| $Logic_1$ | Exec $\wedge$($Cmd_{7-0}$ = ROR WriteMask) |

The data written to the WriteMask register is the lower 8 bits of the Accumulator.

The Address Register Unit is only updated by an RIA or LIA instruction, so the writeEnable is generated by $Logic_2$ as follows:

| | |
|---|---|
| $Logic_2$ | Exec $\wedge$($Cmd_{6-3}$ = 1111) |

The Counter Unit (CU) generates counters C1, C2 and the selected N index. In addition, the CU outputs a CZ flag for use by the PCU. The CU is described in more detail below.

The $VAL_1$ unit is a validation unit connected to the Tamper Prevention and Detection circuitry (described in Section 10.3.5 on page 962). It contains an OK bit that is set to 1 on PORstL, and ORed with the ChipOK values from both Tamper Detection Lines each cycle. The OK bit is ANDed with the 12 bits of Adr before they can be used. If the chip has been tampered with, the address output will be always 0, thereby preventing an attacker from accessing other parts of memory. The $VAL_1$ unit also performs a parity check on the Adr Address bits to ensure it has not been tampered with. If the parity-check fails, the Erase Tamper Detection Line is triggered.

16.1.1 Counter Unit

The Counter Unit (CU) generates counters C1 and C2 (used internally). In addition, the CU outputs Cn and flag CZ for use externally. The block diagram for the CU is shown in FIG. 405: Registers C1 and C2 are updated when they are the targets of a DBR, SC or ROR instruction. $Logic_1$ generates the control signals for the write enables as shown in the following pseudocode.

isDbrSc=($Cmd_{7-4}$=DR)← ($Cmd_{7-4}$=SC)
isRoeCn=($Cmd_{7-4}$=ROR)$\wedge$ ($Cmd_{3-2}$=10)
CnWE=Exec$\wedge$ (isRorCn)

C1we=CnWE$\wedge$ □$Cmd_0$
C2we=CnWE$\wedge$ $Cmd_0$

The single bit flag CZ is produced by the NOR of the appropriate C1 or C2 register for use during a DBR instruction. Thus CZ is 1 if the appropriate Cn value=0.

The actual value written to C1 or C2 depends on whether the ROR, DBR or SC instruction is being executed. During a DBR instruction, the value of either C1 or C2 is decremented by 1 (with wrap). One multiplexor selects between the lower 6 bits of the Accumulator (for ROR instructions), and a 6-bit value for an SC instruction where the upper 3 bits=the low 3 bits from C2, and low 3 bits=low 3 bits from Cmd. Note that only the lowest 3 bits of the operand are written to C1.

The two VAL units are validation units connected to the Tamper Prevention and Detection circuitry (described in Section 10.3.5 on page 962), each with an OK bit. The OK bit is set to 1 on PORstL, and ORed with the ChipOK values from both Tamper Detection Lines each cycle. The OK bit is ANDed with each data bit that passes through the unit. All VAL units also parity check the data to ensure the counters have not been tampered with. If a parity check fails, the Erase Tamper Detection Line is triggered.

In the case of $VAL_1$, the effective output from the counter C1 will always be 0 if the chip has been tampered with. This prevents an attacker from executing any looping constructs.

In the case of $VAL_2$, the effective output from the counter C2 will always be 0 if the chip has been tampered with. This prevents an attacker from executing any looping constructs.

16.1.2 Calculate Next Address

This unit generates the address of the operand for the next instruction to be executed. It makes use of the Address Register Unit and PC to obtain base addresses, and the counters from the Counter Unit to assist in generating offsets from the base address.

This unit consists of some simple combinatorial logic, including an adder that adds a 6-bit number to a 10-bit number. The logic is shown in the following pseudocode.

isErase = ($Cmd_{7-0}$ = ERA)
isSt = ($Cmd_{7-4}$ = ST)
isAccRead = ($Cmd_{7-6}$ = 10)
First determine whether this is an immediate mode requiring PC+1
isJmpJsrDbrTbrImmed = ($Cmd_{7-6}$ = 00) $\wedge$(¬$Cmd_5$ $\vee$($Cmd_{5-1}$ = 1x000))
isLia = ($Cmd_{7-3}$ = LIA)
isLogImmed = (($Cmd_{7-6}$ = 11) $\wedge$(($Cmd_5$ $\vee$$Cmd_4$) $\wedge$($Cmd_{5-3}$ ≠ 111)))$\wedge$
($Cmd_{1-0}$ = 10)

-continued

```
pcSel = Cycle ∨(¬Cycle ∧(isJmpJsrDbrTbrImmed ∨isLogImmed∨ isLia))
# Generate AnSel signal for the Address Register Unit
A0Sel = (isAccRead ∨isSt) ∧(¬Cmd_3 ∨(Cmd_{5-3} = 001))
AnSel_{1-0} = ¬A0Sel ∧Cmd_{2-1}
# The next address is either the new PC or must be generated
# (we require the base address from Address Register Unit)
nextRAMSel = AnDataOut_8 ∧¬isErase
If (nextRAMSel)
    baseAdr = 00 | AnDataOut_{7-0} # ram addresses are already word aligned
Else
    baseAdr = AnDataOut_{7-0} | 00 # flash addresses are 4-byte aligned
EndIf
# Base address is now word (4-byte) aligned
# Now generate the offset amount to be added to the base address
selCn = (isAccRead ∨isSt) ∧(Cmd_5 ∨Cmd_4) ∧Cmd_3
offset_0 = (A0Sel ∧Cmd_0) ∨(selCn ∧Cn_0)
offset_1 = (A0Sel ∧Cmd_1) ∨(selCn ∧Cn_1)
offset_2 = (A0Sel ∧Cmd_2) ∨(selCn ∧Cn_2)
offset_{5-3} = selCn ∧Cn_{5-3}
If (isErase)
    nextEffAdr_{11-4} = Acc_{7-0}
    nextEffAdr_{3-0} = don't care
Else
    # now we can simply add the offset to the base address to get the effective adr
    nextEffAdr_{11-2} = baseAdr + offset # 10 bit plus 6 bit, with wrap = 10 bits out
    nextEffAdr_{1-0} = 0 # word access, so lower bits of effadr are 0
EndIf
# Now generate the various signals for use during Cycle=1
# Note that these are only valid when pcSel is 0 (otherwise will read PC)
nextAccessMode_0 = 1 # want 32-bit access
nextAccessMode_1 = nextRAMSel # ram or flash access (only valid if rd/wr/erase set)
nextAccessMode_2 = isAccRead # pcSel takes care of LIA instruction
nextAccessMode_3 = isSt # write access
nextAccessMode_4 = isErase # erase page access
```

16.1.3 Address Register Unit

This unit contains 4×9-bit registers that are optionally cleared to 0 on PORstL. The 2-bit input AnSel selects which of the 4 registers to output on DataOut. When the writeEnable is set, the AnSel selects which of the 4 registers is written to with the 9-bit DataIn.

17 Program Mode Unit

The Program Mode Unit (PMU) is responsible for Program Mode and Trim Mode operations:

- Program Mode involves erasing the existing flash memory and loading the new program/data into the flash. The program that is loaded can be a bootstrap program if desired, and may contain additional program code to produce a digital signature of the final program to verify that the program was written correctly (e.g. by producing a SHA-1 signature of the entire flash memory).
- Trim Mode involves counting the number of internal cycles that have elapsed between the entry of Trim Mode (at the falling edge of the ack) and the receipt of the next byte (at the falling edge of the last bit before the ack) from the Master. When the byte is received, the current count value divided by 2 is transmitted to the Master.

The PMU relies on a fuse (implemented as the value of word 0 of the flash information block) to determine whether it is allowed to perform Program Mode operations. The purpose of this fuse is to prevent easy (or accidental) reprogramming of QA Chips once their purpose has been set. For example, an attacker may want to reuse chips from old consumables. If an attacker somehow bypasses the fuse check, the PMU will still erase all of flash before storing the desired program. Even if the attacker somehow disconnects the erasure logic, they will be unable to store a program in the flash due to the shadow nybbles.

The PMU contains an 8-bit buff register that is used to hold the byte being written to flash and a 12-bit adr register that is used to hold the byte address currently being written to.

The PMU is also used to load word 1 of the information block into a 32-bit register (combined from 8-bits of buff, 12-bits of adr, and a further 12-bit register) so it can be used to XOR all data to and from memory (both Flash and RAM) for future CPU accesses. This logic is activated only when the chip enters ActiveMode (so as not to access flash and possibly cause an erasure directly after manufacture since shadows will not be correct). The logic and 32-bit mask register is in the PMU to minimize chip area.

The PMU therefore has an asymmetric access to flash memory:

writes are to main memory reads are from information block memory

The reads and writes are automatically directed appropriately in the MRU.

A block diagram of the PMU is shown in FIG. 406.

17.1 Local Storage and Counters

The PMU keeps a 1-cycle delayed version of MRURdy, called prevMRURdy. It is used to generate PMNewTrans. Therefore each cycle the PMU performs the following task:

prevMRURdy ←MRURdy v (state=loadByte)

The PMU also requires 1-bit maskLoaded, idlePending and idlePending registers, all of which are cleared to 0 on RstL. The 1-bit fuseBlown register is set to 1 on RstL for security.

17.2 State Machine

The state machine for the PMU is shown in FIG. 407, with the pseudocode for the various states outlined below.

rstl prevMRURdy, maskLoaded, idlePending, adr ←0 #clear most regs fuseBlown ←1 # for security sake assume the worst state ← idle The idle state, entered after reset, simply waits for the IOMode to enter ProgramMode, ActiveMode, or TrimMode. Note that the reset value for fuseBlown means that ProgramMode and TrimMode cannot be entered until after a successful entry into ActiveMode that also clears the fuseBlown register. In state idle, PMEn=¬ maskLoaded, and in state wait4 Mode PMEn=0. In all other states, PMEn=1.

```
idle
    idlePending ←0
    PMEn = ¬maskLoaded
    PMNewTrans = 0
    If ((IOMode = ActiveMode) ∧MRURdy)
        If (maskLoaded)
            state ←wait4mode # no need to reload mask once loaded
        Else
            adr ←# the location of the fuse is within 32-bit word
0
            state ←loadFuse
        EndIf
    ElseIf ((IOMode = ProgramMode) ∧MRURdy ∧¬fuseBlown) # wait 4 access 2 finish
        maskLoaded ←0 # the mask is now invalid
        adr ←0 # the location of the fuse is within 32-bit word 0
        state ←loadFuse
    ElseIf ((IOMode = TrimMode) ∧MRURdy ∧¬fuseBlown) # wait 4
```

-continued

```
access 2 finish
        maskLoaded ←0 # the mask is now invalid
        adr ←0 # start the counter on entering TrimMode
        state ←trim
    Else
        state ←idle
    EndIf
```

The wait4mode state simply waits until for the current mode to finish and returns to idle.

```
wait4mode
    PMEn = 0
    PMNewTrans = 0
    If (IOMode = IdleMode)
        state ←idle
    Else
        state ←wait4mode
    EndIf
```

The trim state is where we count the number of cycles between the entry of the Trim Mode and the arrival of a byte from the Master. When the byte arrives from the Master, we send the resultant count:

```
trim
    # We saturate the adder at all 1s to make external trim control
easier
    lastOne = adr_0 ∧adr_1 ∧... adr_11
    If (¬lastOne)
        adr = adr + 1 # 12 bit incrementor
    EndIf
    # This logic simply causes the current adder value to be written
to the
    # outByte when the inByte is received. The inByte is cleared
when received
    # although it is not strictly necessary to do so
    PMOutByteWE = InByteValid # 0 in all other states
    PMInByteUsed = InByteValid # same as in loadByte state, 0 in all
other states
    If (IOMode ≠ TrimMode)
        state ←idle
    ElseIf (InByteValid)
        state ←wait4mode
    Else
        state ←trim
    EndIf
```

The loadFuse state is called whenever there is an attempt to program the device or we are entering ActiveMode and the mask is invalid (i.e. after power up or after a ProgramMode or TrimMode command). We load the 32-bit fuse value from word 0 of information memory in flash and compare it against the FuseSig constant (0x5555AAAA) to obtain the fuse value. The next state depends on IOMode and the Fuse.

```
loadFuse
    PMEn = 1
    PMNewTrans = prevMRURdy
    idlePending_in = idlePending ∨(IOMode = IdleMode)
    idlePending ←idlePending_in
    If (MRURdy)
        If (idlePending_in) # don't change state until the memory
access is complete
```

-continued

```
            state ←idle
    Else
            fuseBlown_in = (MRUData_{31-0} = FuseSig)
            fuseBlown ←fuseBlown_in
            If (IOMode = ProgramMode)
                If (fuseBlown_in)
                    state ←wait4mode # not allowed to
                    program anymore
                Else
                    state ←erase
                EndIf
            ElsIf (IOMode = ActiveMode)
                adr ←4 # byte 4 is word 1 (the location of the
XORMask)
                state ←getMask
            Else
                state ←idle
            EndIf
        EndIf
    Else
        state ←loadFuse
    EndIf
```

The erase state erases the flash memory and then leads into the main programming states:

```
    erase
        PMNewTrans = prevMRURdy
        PMEraseDevice = 1 # is 0 in all other states
        adr ←0
        idlePending_in = idlePending ∨(IOMode ≠ ProgramMode)
        idlePending ←idlePending_in
        If (MRURdy)
            If (idlePending_in)
                state ←idle
            Else
                state ←loadByte
            EndIf
    Else
        state ←erase
    EndIf
```

Program Mode involves loading a series of 8-bit data values into the Flash. The PMU reads bytes via the IOU's InByte and InByteValID, setting MUInByteUsed as it loads data. The Master must send data slightly slower than the speed it takes to write to Flash to ensure that data is not lost.

```
loadByte        # Load in 1 byte (1 word) from IO Unit
    PMNewTrans = 0
    PMInByteUsed = InByteValid # same as in TrimIn state, and 0 in
all other states
    If (IOMode ≠ ProgramMode)
        state ←idle
    Else
        If (InByteValid)
            buff ←InByte
            state ←writeByte
        Else
            state ←loadByte
        EndIf
    EndIf
writeByte
    PMNewTrans = prevMRURdy
    PMRW = 0 # write. In all other states, PMRW = 1 (read)
    PM320ut_{7-0} = buff # data (can be tied to this)
    PM320ut_{19-8} = adr # can be tied to this
    PM320ut_{31-20} = 12bitReg # is always this (is don't care during a
write)
    idlePending_in = idlePending ∨(IOMode ≠ ProgramMode)
```

-continued

```
    idlePending ←idlePending_in
    If (MRURdy)
        lastOne = adr0 ∧adr1 ∧... adr11
        adr ←adr + 1 # 12 bit incrementor
        If (idlePending_in)
            state ←idle
    ElseIf (lastOne)
        state ←wait4Mode
    Else
        state ←loadByte
    EndIf
Else
    state ←writeByte
EndIf
```

The getMask state loads up word 1 of the flash information block (bytes 4–7) into the 32-bit buffer so it can be used to XOR all data to and from memory (both Flash and RAM) for future CPU accesses.

```
getMask
    PMNewTrans = prevMRURdy
    PM32Out19-8 = adr   # adr should = 4, i.e. word 1 which holds the
CPU's mask
    PMRW = 1            # read (MUST be 1 in this state)
    idlePending_in = idlePending ∨(IOMode ≠ ActiveMode)
    idlePending ←idlePending in
    If (MRURdy)
        buff ←MRUData7-0
        adr ←MRUData19-8
        12bitReg ←MRUData31-20
        maskLoaded ←1
        If (idlePending in)
            state ←idle
        Else
            state ←wait4mode
        EndIf
    Else
        state ←getMask
    EndIf
```

18 Memory Request Unit

The Memory Request Unit (MRU) provides arbitration between PMU memory requests and CPU-based memory requests.

The arbitration is straightforward: if the input PMEn is asserted, then PMU inputs are processed and CPU inputs are ignored. If PMEn is deasserted, the reverse is true.

A block diagram of the MRU is shown in FIG. 408.

18.1 Arbitration Logic

The arbitration logic block provides arbitration between the accesses of the PM and the 8/32-bit accesses of the CPU via a simple multiplexing mechanism based on PMEn:

```
    ReqDataOut31-8 = CPUDataOut31-8
    If (PMEn)
        NewTrans = PMNewTrans
        AccessMode0 = PMRW # maps to 1 for reads (32 bits),
        0 for
writes (8 bits)
        AccessMode1 = 0 # flash accesses only
        AccessMode2 = PMRW ∧¬PMEraseDevice # read has lower
        priority than erase
        AccessMode3 = ¬PMRW ∧¬PMEraseDevice # write has lower
priority than erase
        AccessMode4 = 0 # pageErase
        AccessMode5 = PMEraseDevice # erase everything
```

-continued

```
            (main & info
block)
            WriteMask = 0xFF
            Adr = PM32Out19-8
            ReqDataOut7-0 = PM32Out7-0
    Else
            NewTrans = CPUNewTrans ∧(CPUAccessMode4-2 ≠ 000)
            AccessMode4-0 = CPUAccessMode
            AccessMode5 = 0 # cpu cannot ever erase entire chip
            WriteMask = CPUWriteMask
            Adr = CPUAdr
            ReqDataOut7-0 = CPUDataOut7-0
    EndIf
```

18.2 Memory Request Logic

The Memory Request Logic in the MRU implements the memory requests from the selected input.

An individual request may involve outputting multiple sub-requests e.g. an 8-bit read consists of 2×4-bit reads (each flash byte contains a nybble plus its inverse).

The input accessMode bits are interpreted as follows:

TABLE 382

Interpretation of accessMode bits

| Bit | Description |
|---|---|
| 0 | 0 = 8-bit access<br>1 = 32-bit access |
| 1 | 0 = flash access<br>1 = RAM access<br>this bit is only valid if bit 2, 3 or 4 is set |
| 2 | 1 = read access |
| 3 | 1 = write access |
| 4 | 1 = erase page access |
| 5 | 1 = erase entire (info and main) flash (only used within the MRU) |

The MRU contains the following registers for general purpose flow control:

TABLE 383

Description of register settings

| name | #bits | Description |
|---|---|---|
| ActiveTrans | 1 | Is there a transaction still running? If so, then extraTrans and nextToXfer can be considered valid. |
| badUntilRestart | 1 | 0 = memory (flash and ram) reads work correctly<br>1 = memory (flash and ram) reads return 0<br>Gets set whenever illChip gets set, and remains set until a soft restart occurs i.e. IOMode passes through Idle. |
| extraTrans | 1 | Determines whether there is an additional sub-transaction to perform. e.g. a 32 bit read from flash involves 4 sub-transactions in the case of 8-bit accesses, and 8 sub-transactions in the case of 4-bit accesses. |
| IllChip | 1 | 0 = 15 consecutive bad reads have not occurred<br>1 = 15 consecutive bad reads have occurred |
| nextToXfer | 3 | The next element (byte or nybble) number to transfer to/from memory |
| restartPending | 1 | 1 = IOMode passed through Idle while a transaction was being processed<br>0 = The transaction completed without IOMode passing through Idle |
| retryCount | 4 | Number of times that a byte has been read badly from flash. When a byte has been read badly 15 consecutive times illChip will be |

TABLE 383-continued

| Description of register settings | | |
|---|---|---|
| name | #bits | Description |
| | | set. |
| retryStarted | 1 | 0 = no retries encountered yet for this read<br>1 = retries have been encountered - retryCount holds the number of retries<br>The retryStarted register is used to stop retryCount being cleared on good reads - thus keeping a record of the last number of retries on a bad read. |

Table 383 lists the registers specifically for testing flash. Although the complete set of flash test registers is in both the MRU and MAU (group 0 is in the MRU, groups 1 and 2 are in the MAU), all the decoding takes place from the MRU.

TABLE 383

Flash test registers settable from CPU when the RAM address is > 128[7]

| adr bitSuperscriptparanumonly | bits | name | description |
|---|---|---|---|
| 0 | 0 | shadowsOff | 0 = regular shadowing (nybble based access to flash)<br>1 = shadowing disabled, 8-bit direct accesses to flash. |
| | 1 | hiFlashAdr | Only valid when shadowsOff = 1<br>0 = accesses are to lower 4 Kbytes of flash<br>1 = accesses are to upper 4 Kbytes of flash |
| | 2 | | |
| 1 | 3 | enableFlashTest | 0 = keep flash test register within the TSMC flash IP in its reset state<br>1 = enable flash test register to take on non-reset values. |
| | 8–4 | flashTest | Internal 5-bit flash test register within the TSMC flash IP (SFC008__08B9__HE).<br>If this is written with 0x1E, then subsequent writes will be according to the TSMC write test mode. You must write a non-0x1E value or reset the register to exit this mode. |
| 2 | 28–9 | flashTime | When timerSel is 1, this value is used for the duration of the program cycle within a standard flash write or erasure. 1 unit = 16 clock cycles (16 × 100 ns typical).<br>Regardless of timerSel, this value is also used for the timeout following power down detection before the QA Chip resets itself. 1 unit = 1 clock cycle (=100 ns typical).<br>Note that this means the programmer should set this to an appropriate value (e.g. 5 μs), just as the localId needs to be set. |
| | 29 | timerSel | 0 = use internal (default) timings for flash writes & erasures<br>1 = use flashTime for flash writes and erasures |

[7]This is from the programmer's perspective. Addresses sent from the CPU are byte aligned, so the MRU needs to test bit n + 2. Similarly, checking DRAM address >128 means testing bit 7 of the address in the CPU, and bit 9 in the MRU.

[8]unshadowed

[9]shadowed 18.2.1 Reset

Initialization on reset involves clearing all the flags:

MRURdy=0 # can't process anything at this point
activeTrans ←0
extraTrans ←0
illChip ←0
badUntilRestart ←0
restatPending ←0
retryCount ←0
retryStarted ←0
nextToXfer ←0# don't care
shadoOff ←0
hiFlashAdr ←0
infoBlochSel ←0# used to generate MRUMode$_2$

[8] unshadowed

[9] shadowed 18.2.2 Main Logic

The main logic consists of waiting for a new transaction, and starting an appropriate sub-transaction accordingly, as shown in the following pseudocode:

```
# Generate some basic signals for use in determining
accessPatterns
Is32Bit = AccessMode_0
Is8Bit = ¬AccessMode_0
IsFlash = ¬AccessMode_1
IsRAM = AccessMode_1
IsRead = AccessMode_2
IsWrite = AccessMode_3
noShadows = shadowsOff
doShadows = IsFlash ∧¬noShadows
continueRequest = (IOMode ≠ IdleMode)
okForTrans = ¬restartPending ∧continueRequest
startOfSubTrans = (NewTrans ∨extraTrans) ∧okForTrans
doingTrans = startOfSubTrans ∨(activeTrans ∧¬extraTrans)
IsInvalidRAM = doingTrans ∧IsRAM ∧(Adr_9 ∨(Adr_8 ∧Adr_7))
IsTestModeWE = doingTrans ∧IsRAM ∧IsWrite ∧Adr_9
IsTestReg_0 = IsTestModeWE ∧Adr_3 #write to flash test register -
bit 1 of word adr
IsTestReg_1 = IsTestModeWE ∧Adr_4 #write to flash test register -
bit 2 of word adr
MRUTestWE = IsTestReg_0 ∨IsTestReg_1
IsPageErase = AccessMode_4
IsDeviceErase = AccessMode_5 ∨(IsTestModeWE ∧(Adr_8-2 = 0001000)) #
bit 9 not req
IsErase = IsDeviceErase ∨IsPageErase
MRURAMSel = IsRAM ∧¬MRUTestWE ∧¬IsDeviceErase
IsInfBlock = (PMEn ∧(IsDeviceErase ∨IsRead))∨
            (¬PMEn ∧infoBlockSel∧
                  (IsDeviceErase ∨(IsFlash ∧(Adr_11-7 = 0) ∧¬(Adr_6∧
doShadows))))
# Which element (byte or nybble) are we up to xferring?
If (NewTrans)
      toXfer = 0
Else
      toXfer = nextToXfer
EndIf
# Form the address that goes to the outside world
If (IsFlash ∧noShadows)
      byteCount = toXfer_1-0
      MRUAdr_12 = hiFlashAdr # upper or lower block of 4Kbytes of flash
      MRUAdr_11-2 = Adr_11-2 # word #
      MRUAdr_1-0 = (Adr_1-0 ∧(¬Is32Bit|¬Is32Bit)) ∨byteCount # byte
Else
      byteCount = toXfer_2-1
      MRUAdr_12-3 = Adr_11-2 # word #
      MRUAdr_2-1 = (Adr_1-0 ∧(¬Is32Bit|¬Is32Bit)) ∨byteCount # byte
      MRUAdr_0 = toXfer_0 #nybble
EndIf
# Assuming a write, are we allowed to write to this address?
writeEn = SelectBit [WriteMask, ((MRUAdr_2 ∧doShadows)| MRUAdr_1-0)]#
mux: 1 from 8
# Generate the 4-bit mask to be used for XORing during CPU access
to flash
baseMask = SelectNybble (PM32Out, MRUAdr_2-0) # mux selects 4 bits of
32
If (PMEn)
      theMask = 0
Else
      theMask = baseMask # we only use mask for CPU accesses to flash
EndIf
# Select a byte (and nybble) from the data for writes
baseByte = SelectByte[ReqDataOut, byteCount] # mux: 8 bits from
32
baseNybble = SelectNybble [baseByte, toXfer_0] # mux: 4 bits from 8
outNybble = baseNybble ⊕ theMask # only used when nybble writing
```

-continued

```
# Generate the data on the output lines (doesn't matter for reads
or erasures)
MRUDataOut_{31-8} = ReqDataOut_{31-8} # effectively don't care for flash
writes
If (doShadows)
    MRUDataOut_7 = ¬outNybble_3
    MRUDataOut_6 = outNybble_3
    MRUDataOut_5 = ¬outNybble_2
    MRUDataOut_4 = outNybble_2
    MRUDataOut_3 = ¬outNybble_1
    MRUDataOut_2 = outNybble_1
    MRUDataOut_1 = ¬outNybble_0
    MRUDataOut_0 = outNybble_0
Else
    MRUDataOut_{7-0} = baseByte
EndIf
# Setup MRUMode
allowTrans = IsRAM ∨IsRead ∨(IsWrite ∧writeEn) ∨IsErase
If (doingTrans)
    MRUMode_2 = IsInfBlock
    MRUMode_1 = IsErase ∨IsTestReg_1
    MRUMode_0 = IsDeviceErase ∨(¬IsWrite ∧¬IsPageErase)∨
IsTestReg_0
    MRUNewTrans = startOfSubTrans ∧allowTrans∧
                (¬IsInvalidRAM ∨MRUTestWE ∨IsDeviceErase)
Else
    MRUMode_{2-0} = 001 # read (safe)
    MRUNewTrans = 0
EndIf
# Generate the effective nybble read from flash (this may not be
used).
# When there is a shadowFault (non-erased memory and invalid
shadows) we consider
# it a bad read when an 8-bit read, or when writeMask_0 is 0.
# Note: we always substitute the upper nybble of WriteMask for the
non-valid data,
# but only flag a read error if WriteMask_0 is also 1. When the
data is erased,
# we return 0 regardless of WriteMask_0.
finishedTrans = doingTrans ∧MAURdy
finishedFlashSubTrans = finishedTrans ∧IsFlash ∧¬IsErase
isWrittenFlash = (FlashData_{7-0} ≠ 11111111) # flash is erased to
all 1s
If (isWrittenFlash ∧((FlashData_{7,5,3,1} ⊕ FlashData_{6,4,2,0}) ≠ 1111))
    inNybble_{3-0} = WriteMask_{7-4}
    badRead = finishedFlashSubTrans ∧IsRead ∧(Is8Bit∨
¬WriteMask_0) ∧doShadows
Else
    inNybble_{3,2,1,0} = (theMask_{3,2,1,0} ⊕ FlashData_{6,4,2,0}) ∧isWrittenFlash
    badRead = 0
EndIf
# Present the resultant data to the outside world
MaskTheData = IsInvalidRAM ∨badRead ∨(badUntilRestart ∧¬IsRAM)
NoData = IsErase ∨IsWrite ∨¬doingTrans
If (NoData ∨MaskTheData)
    MRUData_0 = IsInvalidRAM ∧illChip
    MRUData_{4-1} = retryCount ∧(IsInvalidRAM ∧Adr_2) # mask all 4
count bits
    MRUData_{31-5} = 0 # also ensures a read that is bad returns 0
ElseIf (IsRAM)
    MRUData_{31-24} = SelectByte[RAMData, (Adr_{1-0} ∨Is32Bit|Is32Bit)] #
mux: 8 from 32
    MRUData_{23-0} = RAMData_{23-0} # lsbs remain unchanged from RAM
ElseIf (doShadows)
    MRUData_{31-28} = inNybble
    MRUData_{27-0} = buff_{27-0}
Else
    MRUData_{31-24} = FlashData
    MRUData_{23-0} = buff_{27-4}
EndIf
# Shift in the data for the good reads - either 4 or 8 bits
(writes = don't care)
If (finishedFlashSubTrans ∧¬badRead)
    buff_{3-0} ←buff_{7-4} # shift right 4 bits
    If (doShadows)
```

-continued

```
            buff23-4 ←buff27-8                # shift right 4
bits
            buff27-24 ←inNybble
        Else
            buff19-4 ←buff27-12 # shift right 8 bits, buff3-0 is don't care
            buff27-20 ←FlashData
        EndIf
EndIf
# Determine whether or not we need a new sub-transaction. We only
need one if:
# * there hasn't been a transition to IdleMode during this
transaction
# * we're doing 8 bit reads that are shadowed
# * we're doing 32 bit reads and we've done less than 4 or 8 (sh
vs non-sh)
# * wegot a bad read from flash and we need to retry the read
(jic was a glitch)
moreAdrsToGo = (¬toXfer0 ∧((Is8Bit ∧doShadows) ∨Is32Bit))∨
                        (¬toXfer1 ∧Is32Bit) ∨(¬toXfer2 ∧Is32Bit ∧doShadows)
needToRetryRead = badRead ∧(¬retryStarted ∨(retryCount ≠ 1111))
extraTrans_in = finishedFlashSubTrans ∧(moreAdrsToGo∨
needToRetryRead)
                        ∧okForTrans
nextToXfer ←toXfer + (finishedFlashSubTrans ∧(IsWrite∨
¬needToRetryRead))
# generate our rdy signal and state values for next cycle
MRURdy = ¬doingTrans ∨(doingTrans ∧MAURdy ∧¬extraTrans_in)
extraTrans ←extraTrans_in
activeTrans ←¬MRURdy # all complete only when MRURdy is set
# Take account of bad reads
triedEnough = badRead ∧retryStarted ∧(retryCount = 1111)
If (MAURdy)
    If (IsTestModeWE ∧(Adr5-2 = 0000)) # capture writes to local
regs
            illChip ←0
            retryCount ←0
    Else
            illChip ←illChip ∨triedEnough
            If (badRead)
                retryCount ←(retryCount ∧retryStarted) + 1 # AND all 4
bits
                retryStarted ←1
            Else
                retryStarted ←0# clear flag so will be ok for the next
read
            EndIf
    EndIf
EndIf
# Ensure that we won't have problems restarting a program
If {MRURdy ∧¬okForTrans) # note MRURdy (may not be running a
transaction!)
    shadowsOff,  hiFlashAdr,  infoBlockSel,  restartPending,
badUntilRestart ←0
Else
    badUntilRestart ←badUntilRestart ∨triedEnough
    If (doingTrans ∧¬ContinueRequest)
        restartPending ←1 # record for later use
    EndIf
    If (IsTestModeWE ∧Adr2) # the other writes are taken care of by
the MAU
            shadowsOff ←ReqDataOut0
            hiFlashAdr ←ReqDataOut1
            infoBlockSel ←ReqDataOut2
    EndIf
EndIf
```

19 Memory Access Unit

The Memory Access Unit (MAU) takes memory access control signals and turns them into RAM accesses and flash access strobed signals with appropriate duration.

A new transaction is given by MRUNewTrans. The address to be read from or written to is on MRUAdr, which is a nybble-based address. The MRUAdr (13-bits) is used as-is for Flash addressing. When MRURAMSel=1, then the RAM address (RAMAdr) is taken from bits 9–3 of MRUAdr. The data to be written is on MRUData.

The return value MAURdy is set when the MAU is capable of receiving a new transaction the following cycle. Thus MAURdy will be 1 during the final cycle of a flash or ram access, and should be 1 when the MAU is idle. MAURdy should only be 0 during startup or when a transaction has yet to finish.

When MRURAMSel=1, the access is to RAM, and MRUMode has the following interpretation:

TABLE 384

| Interpretation of MRUMode[10] for RAM accesses | |
|---|---|
| bits | action |
| xx0 | doWrite |
| xx1 | doRead |

[10]$MRUMode_{2-1}$ is ignored for RAM accesses

When MRURAMSel=0, the access is to flash, if MRUTestWE=0, then the access is to regular flash memory, as given by MRUMode:

TABLE 385

| Interpretation of MRUMode for regular flash accesses[11] | | |
|---|---|---|
| bits 1-0 | action when $MRUMode_2$=0 | action when $MRUMode_2$=1 |
| 00 | doWrite (main memory) | doWrite (info block) |
| 01 | doRead (main memory) | doRead (info block) |
| 10 | doErasePage (main memory) | doErasePage (info block) |
| 11 | doEraseDevice (main memory) | doEraseDevice (both blocks) |

[11]$MRUMode_2$ can be directly interpreted by the MAU as the IFREN signal required for embedded flash block SFC008_08B9_HE If MRUTestWE is 1, then $MRUMode_2$ will also be 0, and the access is to a flash test register, as given by MRUMode:

TABLE 386

| Interpretation of MRUMode for flash test register write accesses | |
|---|---|
| bits[12] | action |
| xx1 | If ($MRUData_3$ = 0), tie the flash IP test register to its reset state If ($MRUData_3$ = 1), take the flash IP test register out of reset state, and write $MRUData_{8-4}$ to the 5-bit flash test register within the flash IP (SFC008_08B9_HE) |
| x1x | Write $MRUData_{28-9}$ to the internal 20-bit alternate-counter-source register flashTime, and $MRUData_{29}$ to the corresponding 1-bit test register timerSel. |

[12]$MRUMode_2$ will always be 0 when MRUTestWE = 1.

19.1 Implementation

The MAU consists of logic that calculates MAURdy, and additional logic that produces the various strobed signals according to the TSMC Flash memory SFC0008_08B9_HE; refer to this datasheet [4] for detailed timing diagrams. Both main memory and information blocks can be accessed in the Flash. The Flash test modes are also supported as described in [5] and general application information is given in [6].

The MAU can be considered to be a RAM control block and a flash control block, with appropriate action selected by MRURAMSel. For all modes except read, the Flash requires wait states (which are implemented with a single counter) during which it is possible to access the RAM. Only 1 transaction may be pending while waiting for the wait states to expire. Multiple bytes may be written to Flash without exiting the write mode.

The MAU ensures that only valid control sequences meeting the timing requirements of the Flash memory are provided. A write time-out is included which ensures the Flash cannot be left in write mode indefinitely; this is used when the Flash is programmed via the IO Unit to ensure the X address does not change while in write mode. Otherwise, other units should ensure that when writing bytes to Flash, the X address does not change. The X address is held constant by the MAU during write and page erase modes to protect the Flash. If an X address change is detected by the MAU during a Flash write sequence, it will exit write mode allowing the X address to change and re-enter write mode. Thus, the data will still be written to Flash but it will take longer.

When either the Flash or RAM is not being used, the MAU sets the control signals to put the particular memory type into standby to minimise power consumption.

The MAU assumes no new transactions can start while one is in progress and all inputs must remain constant until MAU is ready.

19.2 Flash Test Mode

MAU also enables the Flash test mode register to be programmed which allows various production tests to be carried out. If MRUTestWE=1, transactions are directed towards the test mode register. Most of the tests use the same control sequences that are used for normal operation except that one time value needs to be changed. This is provided by the flashTime register that can be written to by the CPU allowing the timer to be set to a range of values up to more than 1 second. A special control sequence is generated when the test mode register is set to 0x1E and is initiated by writing to the Flash.

Note that on reset, timeSel and flashTime are both cleared to 0. The 5-bit flash test register within the TSMC flash IP is also reset by setting TMR=1. When MRUTestWE=1, any open write sequence is closed even if the write is not to the 5-bit flash test register within the TSMC flash IP.

19.3 Flash Power Failure Protection

Power could fail at any time; the most serious consequence would be if this occurred during writing to the Flash and data became corrupted in another location to that being written to. The MAU will protect the Flash by switching off the charge pump (high voltage supply used for programming and erasing) as soon as the power starts to fail. After a time delay of about 5 μs (programmable), to allow the discharge of the charge pump, the QA chip will be reset whether or not the power supply recovers.

19.4 Flash Access State Machine 19.5 Interface

TABLE 387

| MAU interface description | | |
|---|---|---|
| Signal name | I/O | Description |
| Clk | In | System clock. |
| RstL | In | System reset (active low). |
| MAURAMEn | In | Flag indicating whether the external user needs access to the RAM at a gross level (e.g. the CPU is active and therefore may want RAM access). 1 = wants access available, 0 = don't want. |
| MRUNewTrans | In | Flag indicating MRU wishes to start a new transaction. May only be asserted (=1) when MAURdy = 1. All inputs below must be held constant until MAU is ready. |
| MRURAMSel | In | 1 = RAM, 0 = Flash. |
| MRUMode2–0 | In | Type of transaction to be performed. |
| MRUAdr12–0 | In | Memory address from the MRU. |
| MRUDataOut31–0 | In | Data used to control and set test modes and timing. |

TABLE 387-continued

| | | MAU interface description |
|---|---|---|
| Signal name | I/O | Description |
| MRUTestWE | In | Flag indicating test mode transactions. |
| PwrFailing | In | Flag indicating possible power failure in progress. |
| MAURdy | Out | The MAU is ready when MAURdy = 1. It is always set for RAM transactions and held low during Flash wait states. |
| RAMOutEn | Out | 0 = enable the RAM to read or write this cycle (i.e. active low) 1 = disable the RAM this cycle (saves power, memory is intact) |
| RAMWE | Out | RAM write when RAMWE = 0 (Artisan Synchronous SRAM). |
| MemClk | Out | Inverted system clock to the RAM (required to meet timing). |
| FlashCtrl8–0 | Out | Control signals to the Flash. IFREN = information block enable, not used always = 0 XE = X address enable YE = Y address enable SE = sense amplifier enable (read only) OE = output enable (read only), hi-Z when OE = 0 PROG = program (write bytes) NVSTR = enables all write and erase modes ERASE = page erase mode MAS1 = mass erase mode |
| TMR | Out | TMR = Register reset for test mode |
| RAMAdr6–0 | Out | RAM address in the range 0 to 95. |
| FlashAdr12–0 | Out | Flash address, full range. |
| MAURstOutL | Out | Activates the global reset, RstL. |

19.6 Calculation of Timer Values

Set and calculate timer initialisation values based on Flash data sheet values, clock period and clock range.

```
# Note: Flash data sheet gives minimum timings
# Delays greater than 1 click cycle
clock_per=100 # ns
Flash_Tnvs=7500 # ns
Flash_Tnvh=7500 # ns
Flash_Tnvh1=150 # us
Flash_Tpgs=15 # us
Flash_Tpgh=100 # ns
Flash_Tprog=30 # us
Flash_Tads=100 # ns
Flash_Tadh=30 # us # Byte write timeout
Flash_Trcv=1500 # ns
Flash_Thv=6 # ms # Not currently used
Flash_Terase=30 # ms
Flash_Tme=300 # ms
Derive maximum counts (–1 since state machine is synchronous)
FLASH_NVS=Flash_Tnvs/clock_per-1
FLASH_NVH=Flash_Tnvh/clock_per-1
FLASH_NVS1=Flash_Tnh1*1000/clock_per-1
FLASH_PGS=Flash_Tpgs*1000/clock_per-1
FLASH_PGH=Flash_Tpgh/clock_per-1
FLASH_PROG=Flash_Tprog*1000/clock_per-1
FLASH_ADS=Flash_Tads/clock_per-1
FLASH_ADH=Flash_Tadh*1000/clock_per-1
FLASH_ADH_WRITE_PGH=FLASH_ADH+FLASH_PGH+1 # note is +1
FLASH_RCV=Flash_Trcv/clock_per-1
FLASH_HV=Flash_Thv*1000000/clock_per-1
FLASH_ERASE=Flash_Terase*1000000/clock_per-1
FLASH_ME=Flash_Tme*1000000/clock_per-1
count_size=24 # Number of bits in timer counter (newCount) determined by Tme
```

19.7 Defaults

Defaults to use when no action is specified.

```
        FlashTransPendingSet = 0
        FlashTransPendingReset = 0
        TMRSet = 0
        TMRRst = 0
        STLESet = 0
        STLERst = 0
        TestTimeEn = 0
        IFREN = FlashXadr7
        XE = 0
        YE = 0
        SE = 0
        OE = 0
        PROG = 0
        NVSTR = 0
        ERASE = 0
        MAS1 = 0
        MAURstOutL = 1
        If (accessCount ≠ 0)
            newCount =accessCount - 1
            # decrement unless instructed
    otherwise
        Else
            newCount = 0
        EndIf
```

19.8 Reset

Initialise state and counter registers.

```
# asynchronous reset (active low)
state←idle
accessCount←1
count←0
XadrReg←0
FalshTransPending←0
TestTime←0
TMR←1
STLEFlag←0
```

19.9 State Machine

The state machine generates sequences of timed waveforms to control the operation of the Flash memory.

```
idle
    FlashTransPendingReset = 1
    If (somethingToDo) # Flash starting conditions
        If (MRUTestWE)
            nextState = TM0
        Else
            Switch (MRUModeint)
            Case doWrite:
                nextState = writeNVS
                newCount = FLASH_NVS
            Case doRead:
                YE = 1
                SE = 1
                OE = 1
                XE = 1
                nextState = idle
            Case doErasePage:
                nextState = pageErase
                newCount = FLASH_NVS
            Case doEraseDevice:
                nextState = massErase
                newCount = FLASH_NVS
            EndSwitch
        EndIf
    EndIf
```

19.9.1 Flash Page Erase

The following pseducocode illustrates the Flash page erase sequence.

```
pageErase
    ERASE = 1
    XE = 1
    If (¬PwrFailing)
        If (countZ)
            newCount = FLASH_ERASE
            nextState = pageEraseERASE
        EndIf
    Else
        newCount = TestTime19-0
        nextState = Help1
    EndIf
pageEraseERASE
    ERASE = 1
    NVSTR = 1
    XE = 1
    If (¬PwrFailing)
        If (countZ)
            newCount = FLASH_NVH
            nextState = pageEraseNVH
        EndIf
    Else
        newCount = TestTime19-0
        nextState = Help1
    EndIf
pageEraseNVH
    NVSTR = 1
    XE = 1
    If (¬PwrFailing)
        If (countZ)
            newCount = FLASH_RCV
            nextState = RCVPM
        EndIf
    Else
        newCount = TestTime19-0
        nextState = Help1
        EndIf
RCVPM
    If (countZ)
        nextState = idle # exit
    EndIf
```

19.9.2 Flash Mass Erase

The following pseducocode illustrates the Flash mass erase sequence.

```
massErase
    MAS1 = 1
    ERASE = 1
    XE = 1
    If (countZ)
        If (¬TestTime20)
            newCount = FLASH_ME
        Else
            newCount = TestTime19-0 | 0000
        EndIf
        nextState = massEraseME
    EndIf
massEraseME
    MAS1 = 1
    ERASE = 1
    NVSTR = 1
    XE = 1
    If (countZ)
        newCount = FLASH_NVH1
        nextState = massEraseNVH1
    EndIf
massEraseNVH1
    MAS1 = 1
    NVSTR = 1
    XE = 1
```

-continued

```
    If (countZ)
        newCount = FLASH_RCV
        nextState = RCVPM
    EndIf
```

19.9.3 Flash Byte Write

The following pseducocode illustrates the Flash byte write sequence.

```
writeNVS
    PROG = 1
    XE = 1
    If (¬PwrFailing)
        If (countZ)
            If (¬STLEFlag)
                newCount = FLASH_PGS
                nextState = writePGS
            Else
                newCount = TestTime19-0 | 0000
                nextState = STLE0
            EndIf
        EndIf
    Else
        newCount = TestTime19-0
        nextState = Help1
    EndIf
writePGS
    PROG = 1
    NVSTR = 1
    XE = 1
    If (¬PwrFailing)
        If (countZ)
            newCount = FLASH_ADS
            nextState = writeADS
        EndIf
    Else
        newCount = TestTime19-0
        nextState = Help1
    EndIf
writeADS # Add Tads to Tpgs
    PROG = 1
    NVSTR = 1
    XE = 1
    FlashTransPendingReset = 1
    If (¬PwrFailing)
        If (countZ)
            If (¬TestTime20)
                newCount = FLASH_PROG
            Else
                newCount = TestTime19-0 | 0000
            EndIf
            nextState = writePROG
        EndIf
    Else
        newCount = TestTime19-0
        nextState = Help1
    EndIf
writePROG
    PROG = 1
    NVSTR = 1
    YE = 1
    XE = 1
    If (¬PwrFailing)
        If (countZ)
            newCount = FLASH_ADH_AND_WRITE_PGH
            nextState = writeADH
        EndIf
    Else
        newCount = TestTime19-0
        nextState = Help2
    EndIf
writeADH
    PROG = 1
    NVSTR = 1
    XE = 1
```

-continued

```
    FlashTransPendingSet = somethingToDo
    If (¬PwrFailing)
        If (¬FlashNewTrans)
            If (countZ) -- Gracefull exit after timeout
                newCount = FLASH_NVH
                nextState = writeNVH
            EndIf
        Else # -- Do something as there is a new transaction
            If ((MRUModeint = doWrite) ∧(¬XadrCh))
                newCount = FLASH_ADS -- Write another byte
                nextState = writeADS
            Else
                newCount = FLASH_NVH -- Exit as new
                trans is not Flash
write
                nextState = writeNVH
            EndIf
        EndIf
    Else
        newCount = TestTime_{19-0}
        nextState = Help1
    EndIf
writeNVH
    NVSTR = 1
    XE = 1
    FlashTransPendingSet = somethingToDo
    If (¬PwrFailing)
        If (countZ)
            newCount = FLASH_RCV
            nextState = RCV
        EndIf
    Else
        newCount = TestTime_{19-0}
        nextState = Help1
    EndIf
RCV         # wait til we're allowed to do another transaction
    FlashTransPendingSet = somethingToDo
    If (countZ)
        nextState = idle
    EndIf
```

19.9.4 Test Mode Sequence

The following pseducocode illustrates the test mode sequence.

```
    TM0 # Needed this due to delay on TMR
        IFREN = 0
        nextState = idle # default
        If ( MRUModeint_1)
            TestTimeEn = 1
        EndIf
        If (MRUModeint_0)
            If (¬MRUDataOut_3)
                TMRSet = 1
                STLERst = 1 # Reset flag as leaving test mode
            Else
                If (MRUDataOut_{8-4} = 11110)
                    STLESet = 1
                Else
                    STLERst = 1
                EndIf
                TMRRst = 1
                nextState = TM1 # Will get priority
            EndIf
        EndIf
    TM1
        IFREN = 0
        nextState = TM2
    TM2
        NVSTR = 1
        SE = 1
        IFREN = 0
        nextState = TM3
    TM3
        NVSTR = 1
```

-continued

```
        SE = 1
        MAS1 = MRUDataOut_4
        IFREN = MRUDataOut_5
        XE = MRUDataOut_6
        YE = MRUDataOut_7
        ERASE = MRUDataOut_8
        TMRSet = 1
        nextState = TM4
    TM4
        NVSTR = 1
        SE = 1
        MAS1 = MRUDataOut_4
        IFREN = MRUDataOut_5
        XE = MRUDataOut_6
        YE = MRUDataOut_7
        ERASE = MRUDataOut_8
        TMRRst = 1
        nextState = TM5
    TM5
        NVSTR = 1
        SE = 1
        MAS1 = MRUDataOut_4
        IFREN = MRUDataOut_5
        XE = MRUDataOut_6
        YE = MRUDataOut_7
        ERASE = MRUDataOut_8
        nextState = TM6
    TM6
        NVSTR = 1
        SE = 1
        nextState = idle
```

19.9.5 Reverse Tunneling and Thin Oxide Leak Test

The following pseudocode shows the reverse tunneling and thin oxide leak test sequence.

```
            STLE0
                XE = 1
                PROG = 1
                NVSTR = 1
                If (countZ)
                    newCount = FLASH_NVH
                    nextState = STLE1
                EndIf
            STLE1
                XE = 1
                NVSTR = 1
                If (countZ)
                    newCount = FLASH_RCV
                    nextState = STLE2
                EndIf
            STLE2
                If (countZ)
                    nextState = idle
                EndIf
```

19.9.6 Emergency Instructions

The following pseducocode shows the states used for emergency situations such as when power is failing.

```
Help1 # MAURdy -> 0 to hold MAU inputs constant, if not too late
    XE = 1
    If (countZ)
        nextState = Goodbye
    EndIf
Help2 # MAURdy -> 0 to hold MAU inputs constant, if not too late
    XE = 1
    YE = 1
    If (countZ)
        nextState = Goodbye
    EndIf
```

-continued

```
Goodbye
    XE = 1 # Prevents Flash timing violation
    MAURstOutL = 0 # Reset whole chip whether power fails
            # nothing else to do or recovers
```

19.10 Concurrent Logic

```
    accessCount ←newCount # update accessCount every cycle
    countZ ←(newCount = 0)
    XadrReg ←FlashXAdr # store the previous X address
    state ←nextState
    If (FlashTransPendingReset)
        FlashTransPending ←0 # Reset flag (has priority)
    Else
        If (FlashTransPendingSet)
            FlashTransPending ←1 # Set flag
        EndIf
    EndIf
    If (TestTimeEn)
        TestTime ←MRUDataOut29-9
    EndIf
    If (TMRSet) -- SRFF for TMR
        TMR ←1
    Else
        If (TMRRst)
            TMR ←0
        EndIf
    EndIf
    If (STLERst) -- SRFF for STLE tests
        STLEFlag ←0
    Else
        If (STLESet)
            STLEFlag ←1
        EndIf
    EndIf
    FlashNewTrans = MRUNewTrans ∧(¬MRURAMSel)
    RAMNewTrans = MRUNewTrans ∧MRURAMSel
    somethingToDo = FlashTransPending ∨FlashNewTrans
    quickCmd = (MRUModeint = doRead) ∧¬MRUTestWE
    FlashRdy = ((state = idle) ∧(¬somethingToDo ∨quickCmd))
        ∨(((state = writeADH)
        ∨(state = writeNVH)
        ∨(state = writeRCV)) ∧(¬FlashTransPendingSet))
        ∨((state = TM0) ∧(nextState = idle))
        ∨(state = TM6)
    If (MRURamSel)
        MAURdy = 1 # Always ready for RAM
    Else
        MAURdy = FlashRdy
    EndIf
    IandX = MRUMode2 | MRUAdr12-6
    FlashXAdr = IandX When ((¬XE) ∨(SE ∧OE)) Else XadrReg
    FlashAdr = FlashXAdr | MRUAdr5-0 # Merge X and Y addresses
    XadrCh = 1 When ((XadrReg /= IandX)∧
    XE ∧(¬SE) ∧(¬OE)
∧FlashNewTrans) Else 0
# Xadr change
    MRUModeint = MRUMode1-0 # Backwards compatability
    RAMAdr = MRUAdr9-3 # maximum address = 95,
    responsibility of
MRU for valid adr
    RAMWE = MRUModeint0
    RAMOutEn = ¬RAMNewTrans # turn off RAM if not using it
    FlashCtrl(0)            = IFREN
    FlashCtrl(1)            = XE
    FlashCtrl(2)            = YE
    FlashCtrl(3)            = SE
    FlashCtrl(4)            = OE
    FlashCtrl(5)            = PROG
    FlashCtrl(6)            = NVSTR
    FlashCtrl(7)            = ERASE
    FlashCtrl(8)            = MAS1
    MemClk                  = ¬Clk # Memory clock
```

20 Analogue Unit

This section specifies the mandatory blocks of Section 11.1 on page 965 in a way which allows some freedom in the detailed implementation.

Circuits need to operate over the temperature range −40° C. to +125° C.

The unit provides power on reset, protection of the Flash memory against erroneous writes during power down (in conjunction with the MAU) and the system clock SysClk.

20.1 Voltage Budget

The table below shows the key thresholds for $V_{DD}$ which define the requirements for power on reset and normal operation.

TABLE 388

$V_{DD}$ limits

| VDD parameter | Description | Voltage |
|---|---|---|
| VDDFTmax | Flash test maximum | 3.6[13] |
| VDDFTtyp | Flash test typical | 3.3 |
| VDDFTmin | Flash test minimum | 3.0 |
| VDDmax | Normal operation maximum (typ + 10%) | 2.75[14] |
| VDDtyp | Normal operation typical | 2.5 |
| VDDmin | Normal operation minimum (typ − 5%) | 2.375 |
| VDDPORmax | Power on reset maximum | 2.0[15] |

[13]The voltage VDDFT may only be applied for the times specified in the TSMC Flash memory test document.
[14]Voltage regulators used to derive VDD will typically have symmetric tolerance limits
[15]The minimum allowable voltage for Flash memory operation.

20.2 Voltage Reference

This circuit generates a stable voltage that is approximately independent of PVT (process, voltage, temperature) and will typically be implemented as a bandgap. Usually, a startup circuit is required to avoid the stable $V_{bg}$=0 condition. The design should aim to minimise the additional voltage above $V_{bg}$ required for the circuit to operate. An additional output, BGOn, will be provided and asserted when the bandgap has started and indicates to other blocks that the output voltage is stable and may be used.

TABLE 389

Bandgap target performance

| Parameter | Conditions | Min | Typ | Max | Units |
|---|---|---|---|---|---|
| Vbg[16] | typical | 1.2 | 1.23 | 1.26 | V |
| IDD | typical | | 50 | | μA |
| Vstart | worst case | 1.6 | | | V |
| Iout | | | | 10 | nA |
| Vtemp | | | +0.1 | | mV/oC |

[16]Over PVT, not including offsets 20.3 Power Detection Unit

Only under voltage detection will be described and is required to provide two outputs:

underL controls the power on reset; and

PwrFailing indicates possible failure of the power supply.

Both signals are derived by comparing scaled versions of $V_{DD}$ against the reference voltage $V_{bg}$.

20.3.1 $V_{DD}$ Monotonicity

The rising and falling edges of $V_{DD}$ (from the external power supply) shall be monotonic in order to guarantee correct operation of power on reset and power failing detection. Random noise may be present but should have a peak to peak amplitude of less than the hysteresis of the comparators used for detection in the PDU.

20.3.2 Under Voltage Detection Unit

The underL signal generates the global reset to the logic which should be de-asserted when the supply voltage is high enough for the logic and analogue circuits to operate. Since the logic reset is asynchronous, it is not necessary to ensure the clock is active before releasing the reset or to include any delay.

The QA chip logic will start immediately the power on reset is released so this should only be done when the conditions of supply voltage and clock frequency are within limits for the correct operation of the logic.

The power on reset signal shall not be triggered by narrow spikes (<100 ns) on the power supply. Some immunity should be provided to power supply glitches although since the QA chip may be under attack, any reset delay should be kept short. The unit should not be triggered by logic dynamic current spikes resulting in short voltage spikes due to bond wire and package inductance. On the rising edge of $V_{DD}$, the maximum threshold for de-asserting the signal shall be when $V_{DD}>V_{DDmin}$. On the falling edge of $V_{DD}$, the minimum threshold for asserting the signal shall be $V_{DD}<V_{DDPORmax}$.

The reset signal must be held low long enough ($T_{pwmin}$) to ensure all flip-flops are reset. The standard cell data sheet [7] gives a figure of 0.73 ns for the minimum width of the reset pulse for all flip-flop types.

2 bits of trimming ($trim_{1-0}$) will be provided to take up all of the error in the bandgap voltage. This will only affect the assertion of the reset during power down since the power on default setting must be used during power up.

Although the reference voltage cannot be directly measured, it is compared against $V_{DD}$ in the PDU. The state of the power on reset signal can be inferred by trying to communicate through the serial bus with the chip. By polling the chip and slowly increasing $V_{DD}$, a point will be reached where the power on reset is released allowing the serial bus to operate; this voltage should be recorded. As $V_{DD}$ is lowered, it will cross the threshold which asserts the reset signal. The power on default is set to the lowest voltage that can be trimmed (which gives the maximum hysterisis). This voltage should be recorded (or it may be sufficient to estimate it from the reset release voltage recorded above). $V_{DD}$ is then increased above the reset release threshold and the PDU trim adjusted to the setting the closest to $V_{DDPORmax}$. $V_{DD}$ should then be lowered and the threshold at which the reset is re-asserted confirmed.

TABLE 390

Power on reset target performance

| Parameter | Conditions | Min | Typ | Max | Units |
|---|---|---|---|---|---|
| Vthrup | T = 27° C. | 2.0 | | 2.375 | V |
| Vthrdn | T = 27° C. | 2.0 | | 2.1 | V |
| Vhystmin | | | 16 | | mV |
| IDD | | | 5 | | μA |
| Tspike | | | 100 | | ns |
| Vminr | | | 0.5 | | V |
| Tpwmin | | 1 | | | ns |

Power on Reset Behaviour

The signal PwrFailing will be used to protect the Flash memory by turning off the charge pump during a write or page erase if the supply voltage drops below a certain threshold. The charge pump is expected to take about 5 us to discharge. The PwrFailing signal shall be protected against narrow spikes (<100 ns) on the power supply.

The nominal threshold for asserting the signal needs to be in the range $V_{PORmax}<V_{DDPFtyp}<V_{DDmin}$ so is chosen to be asserted when $V_{DD}<V_{DDPFtyp}=V_{DDPORmax}+200$ mV. This infers a $V_{DD}$ slew rate limitation which must be <200 mV/5 us to ensure enough time to detect that power is failing before the supply drops too low and the reset is activated. This requirement must be met in the application by provision of adequate supply decoupling or other means to control the rate of descent of $V_{DD}$.

TABLE 391

Power failing detection target performance

| Parameter | Conditions | Min | Typ | Max | Units |
|---|---|---|---|---|---|
| Vthr | T = 27° C. | 2.1 | 2.2 | 2.3 | V[17] |
| Vhyst | | | 16 | | mV |
| IDD | | | 5 | | μA |
| Tspike | | | 100 | | ns |
| Vminr | | | 0.5 | | V |

[17]These limits are after trimming and include an allowance for VDD ramping.

2 bits of trimming ($trim_{1-0}$) will be provided to take up all of the error in the bandgap voltage.

20.4 Ring Oscillator

SysClk is required to be in the range 7–14 MHz throughout the lifetime of the circuit provided $V_{DD}$ is maintained within the range $V_{DDMIN}<V_{DD}<V_{DDMAX}$. The 2:1 range is derived from the programming time requirements of the TSMC Flash memory. If this range is exceeded, the useful lifetime of the Flash may be reduced.

The first version of the QA chip, without physical protection, does not require the addition of random jitter to the clock. However, it is recommended that the ring oscillator be designed in such a way as to allow for the addition of jitter later on with minimal modification. In this way, the untrimmed centre frequency would not be expected to change.

The initial frequency error must be reduced to remain within the range 10 MHz/1.4 1 to 10 MHz×1.41 allowing for variation in:

- voltage
- temperature
- ageing
- added jitter
- errors in frequency measurement and setting accuracy The range budget must be partitioned between these variables.

FIG. 411._Ring oscillator block diagram

The above arrangement allows the oscillator centre frequency to be trimmed since the bias current of the ring oscillator is controlled by the DAC. SysClk is derived by dividing the oscillator frequency by 5 which makes the oscillator smaller and allows the duty cycle of the clock to be better controlled.

20.4.1 DAC (Programmable Current Source)

Using $V_{bg}$, this block sources a current that can be programmed by the Trim signal. 6 of the available 8 trim bits will be used ($trim_{7-2}$) giving a clock adjustment resolution of about 250 kHz. The range of current should be such that the ring oscillator frequency can be adjusted over a 4 to 1 range.

TABLE 392

| Programmable current source target performance | | | | | |
|---|---|---|---|---|---|
| Parameter | Conditions | Min | Typ | Max | Units |
| Iout | Trim7 − 2 = 0 | | 5 | | μA |
| | Trim7 − 2 = 32 | | 12.5 | | |
| | Trim7 − 2 = 63 | | 20 | | |
| Vrefin | | | 1.23 | | V |
| Rout | Trim7 − 2 = 63 | 2.5 | | | MΩ |

20.4.2 Ring Oscillator Circuit

TABLE 393

| Ring oscillator target performance | | | | | |
|---|---|---|---|---|---|
| Parameter | Conditions | Min | Typ | Max | Units |
| Fosc[18] | | 7 | 10 | 14 | MHz |
| IDD | | | 10 | | μA |
| KI | | | 1 | | MHz/μA |
| KVDD | | | +200 | | KHz/V |
| KT | | | +30 | | KHz/° C. |
| Vstart | | 1.5 | | | V |

$K_I$ = control sensitivity,
$K_{VDD}$ = $V_{DD}$ sensitivity,
$K_T$ = temperature sensitivity
With the figures above, $K_{VDD}$ will give rise to a maximum variation of ±50 kHz and $K_T$ to ±1.8 MHz over the specified range of $V_{DD}$ and temperature.
[18]Accounting for division by 5

20.4.3 Div5

The ring oscillator will be prescaled by 5 to obtain the nominal 10 MHz clock. An asynchronous design may be used to save power. Several divided clock duty cycles are obtainable, eg 4:1, 3:2 etc. To ease timing requirements for the standard cell logic block, the following clock will be generated; most flip-flops will operate on the rising edge of the clock allowing negative edge clocking to meet memory timing.

TABLE 394

| Div5 target performance | | | | | |
|---|---|---|---|---|---|
| Parameter | Conditions | Min | Typ | Max | Units |
| Fmax | Vdd = 1.5 V | 100 | | | MHz |
| IDD | | | 10 | | μA |

20.5 Power on Reset

This block combines the overL (omitted from the current version), underL and MAURstOutL signals to provide the global reset. MAURstOutL is delayed by one clock cycle to ensure a reset generated when this signal is asserted has at least this duration since the reset deasserts the signal itself. It should be noted that the register, with active low reset RN, is the only one in the QA chip not connected to RstL.

[4] TSMC, Oct. 1, 2000, SFC0008_08B9_HE, 8K×8 Embedded Flash Memory Specification, Rev 0.1.

[5] TSMC (design service division), Sep. 10, 2001, 0.25 um Embedded Flash Test Mode User Guide, V0.3.

[6] TSMC (EmbFlash product marketing), Oct. 19, 2001, 0.25 um Application Note, V2.2.

[7] Artisan Components, January 1999, Process Perfect Library Databook 2.5-Volt Standard Cells, Rev1.0.

Other Applcations for Protocols and QA Chips

1 Introduction

In its preferred form, the QA chip [1] is a programmable 32 bit microprocessor with security features (8,000 gates, 3 k bits of RAM and 8 kbytes of flash memory for program and non-volatile data storage). It is manufactured in a 0.25 um CMOS process.

Physically, the chip is mounted in a 5 pin SOT23 plastic package and communicates with external circuitry via a two pin serial bus.

The QA chip was designed to for authenticating consumable usage and performance upgrades in printers and associated hardware.

Because of its core functionality and programmability the QA chip can also be used in applications that differ significantly from its original one. This document seeks to identify some of those areas.

3 Applications Overview

Applications include:

Regular EEPROM

Secure EEPROM

General purpose MPU with security features

Security coprocessor for microprocessor system

Security coprocessor for PC (with optional USB connection)

Resource dispenser—secure, web based transfer of a variable quantity from “source” to “sink”

ID tag

Security pass inside offices

Set top box security

Car key

Car Petrol

Car manufacturer “genuine parts” detection, where the car requires genuine (or authorised) parts to function.

Aeroplane control on motor-control servos to allow secure external control on an aircraft in a hijack situation.

Security device for controlling access to and copying of audio, video, and data (eg, preventing unauthorized downloading of music to a device).

4 Exemplary Application Descriptions 4.1 Car Petrol

Using mechanisms and protocols similar to those described in relation to ink refills, refilling of petrol can be controlled. An example of a commercial relationship this allows is selling a car at a discounted rate, but requiring that the car be refilled at designated service stations. Similarly, prevention of unauthorized servicing can be achieved.

4.2 Car Keys 4.2.1 Basic Advantages Over Physical Keys

Keys and locks can be easily programmed & configured for use

Can only be duplicated/reprogrammed by an authorised individual

The same key can be used for physical entry/exit and remote (radio-based) entry/exit Inbuilt security features 4.2.2 Single Key for Multiple Vehicles Useful when a family has more than one car.

Can be programmed so any keys fits any car.

Fewer number of duplicate keys.

Misplacing a key for a particular car—any key for any other car can be used as oppose to duplicate of the same key.

4.2.3 Multiple Keys for a Single Vehicle 4.2.3.1 Same Company Car Being Driven by Multiple Drivers Mileage can be logged per driver e.g. for accounting purposes.

Key permissions can be different per driver (e.g. boot/trunk access may be disabled)

4.2.3.2 Same Family Car Being Driven by Children and Parents

Time/date restrictions can be applied to (e.g. children's) keys

Speeds above a specified limit (and duration of that speed) can be logged for auditing purposes (may be less dangerous than actually enforcing a speed limit)

4.2.4 No Problem if Key Lost

Can easily:

make a new key the same as lost one (existing copies of key will still function)

reprogram the locks on car (and reprogram all non-lost keys to match) so the lost key will no longer function 4.2.5 No Problem if Key Left in Car Easy to create a one-time-use open-door-only key via roadside assistance based on secret password information, driver's license etc (prevents having to break into the car)

4.2.6 Car Rentals

Key can have an expiration date (e.g. some period past the rental end-date)

4.2.7 Single Physical Key for All Locks in Car

A single physical key can open all locks (door, immobiliser, boot/trunk, glovebox etc.).

The following documents are incorporated by cross-reference[

[1] IBM Cu-11 Databook: Macros, Mar. 21, 2002.

[2] Universal Serial Bus (USB) Specification Rev 1.1, Compaq Computer Corporation, Intel Corporation, Microsoft Corporation, NEC Corporation, Sep. 28, 1998.

[3] Synopsys DesignWare USB 1.1 OHCI Host Controller with AHB/PVCI Databook Version 2.6, February 2003.

[4] Open Host Controller Interface Specification (OpenHCI) for USB Rev1.0a, Compaq, Microsoft, National Semiconductor, Sep. 14 1999.

[5] inSilicon TymeWare USB 1.1 Device Controller (UDCVCI) Core User Manual Version 1.1, inSilicon Corporation, November 2000.

[6] Amphion, 2001, *CS*6150 *Motion JPEG Decoder Databook*, Amphion Semiconductor Ltd.

[7] ANSI/EIA 538-1988, *Facsimile Coding Schemes and Coding Control Functions for Group* 4 *Facsismile Equipment*, August 1988

[8] Bender, W., P. Chesnais, S. Elo, A. Shaw, and M. Shaw, *Enriching communities: Harbingers of news in the future*, IBM Systems Journal, Vol. 35, Nos. 3&4 , 1996, pp. 369–380

[9] CCIR Rec. 601–2, *Encoding Parameters of Digital Television for Studios*, Recommendations of the CCIR, 1990, Vol XI-Part 1, Broadcasting Service (Television), pp. 95–104.

[10] Farrell, J., *How to Allocate Bits to Optimize Photographic Image Quality*, Proceedings of IS&T International Conference on Digital Printing Technologies, 1998, pp. 572–576

[11] Humphreys, G. W., and V. Bruce, *Visual Cognition*, Lawrence Erlbaum Associates, 1989, p. 15

[12] ISO/IEC 19018-1:1994 , *Information technology—Digital compression and coding of continuous-tone still images: Requirements and guidelines,* 1994

[13]Lyppens, H., *Reed-Solomon Error Correction, Dr. Dobb's Journal* Vol. 22, No. 1, January 1997

[14] Olsen, J. *Smoothing Enlarged Monochrome Images*, in Glassner, A. S. (ed.), Graphics Gems, AP Professional, 1990

[15] Rorabaugh, C, *Error Coding Cookbook*, McGraw-Hill 1996

[16] Thompson, H. S., *Multilingual Corpus* 1 CD-ROM, European Corpus Initiative

[17] Urban, S. J., *Review of standards for electronic imaging for facsimile systems*, Journal of Electronic Imaging, Vol. 1(1), January 1992, pp. 5–21

[18] Wallace, G. K., *The JPEG Still Picture Compression Standard*, Communications of the ACM, Vo,. 34, No. 4, April 1991, pp. 30–44

[19] Wicker, S., and Bhargava, V., *Reed-Solomon Codes and their Applications*, IEEE Press 1994

[20] Yasuda, Y., *Overview of Digital Facsimile Coding Techniques in Japan*, Proceedings of the IEEE, Vol. 68(7), July 1980, pp. 830–845

[21] SPARC International, *SPARC Architecture Manual, Version*8, Revision SAV080SI9308

[22] Gaisler Research, *The LEON*-2 *Processor User's Manual, Version* 1.0.7, September 2002

[23] ARM Limited, *AMBA Specification*, Rev2.0, May 1999

[24] ITU-T, Reccomendation T30, Procedures for document facsimile transmission in the general switched telephone network, July 2003.

[25] Anderson, R, and Kuhn, M., 1997, *Low Cost Attacks on Tamper Resistant Devices*, Security Protocols, Proceedings 1997, LNCS 1361, B. Christianson, B. Crispo, M. Lomas, M. Roe, Eds., Springer-Verlag, pp. 125–136.

[26] Anderson, R., and Needham, R. M., *Programming Satan's Computer*, Computer Science Today, LNCS 1000, pp. 426–441.

[27] Atkins, D., Graff, M., Lenstra, A. K., and Leyland, P. C., 1995, *The Magic Words Are Squeamish Ossifrage*, Advances in Cryptology—ASIACRYPT '94 Proceedings, Springer-Verlag, pp. 263–277.

[28]Bains, S., 1997, *Optical schemes tried out in IC test—IBM and Lucent teams take passive and active paths, respectively, to imaging*. EETimes, Dec. 22, 1997.

[29] Bao, F., Deng, R. H., Yan, Y, Jeng, A., Narasimhalu, A. D., Ngair, T., 1997, *Breaking Public Key Cryptosystems on Tamper Resistant Devices in the Presence of Transient Faults*, Security Protocols, Proceedings 1997, LNCS 1361, B. Christianson, B. Crispo, M. Lomas, M. Roe, Eds., Springer-Verlag, pp. 115–124.

[30] Bellare, M., Canetti, R., and Krawczyk. H., 1996, *Keying Hash Functions For Message Authentication*, Advances in Cryptology, Proceedings Crypto'96, LNCS 1109, N. Koblitz, Ed., Springer-Verlag, 1996, pp. 1–15. Full version: http://www.research.ibm.com/security/keyed-md5.html

[31] Bellare, M., Canetti, R., and Krawczyk, H., 1996, *The HMAC Construction*, RSA Laboratories CryptoBytes, Vol. 2, No 1, 1996, pp. 12–15.

[32] Bellare, M., Guérin, R., and Rogaway, P., 1995, *XOR MA Cs: New Methods For Message Authentication Using Finite Pseudorandom Functions*, Advances in Cryptology, Proceedings Crypto'95, LNCS 963, D Coppersmith, Ed., Springer-Verlag, 1995, pp. 15–28.

[33] Blaze, M., Diffie, W., Rivest, R., Schneier, B., Shimomura, T., Thompson, E., Wiener, M., 1996, *Minimal Key Lengths For Symmetric Ciphers To Provide Adequate Commercial Security*, A Report By an Ad Hoc Group of Cryptographers and Computer Scientists, Published on the internet: http://www.livelinks.com/livelinks/bsa/cryptographers.html

[34] Blum, L., Blum, M., and Shub, M., *A Simple Unpredictable Pseudo-random Number Generator*, SIAM Journal of Computing, vol 15, no 2, May 1986, pp 364–383.

[35] Bosselaers, A., and Preneel, B., editors, 1995, *Integrity Primitives for Secure Information Systems: Final Report ofRACE Integrity Primitives Evaluation RIPE-RACE* 1040, LNCS 1007, Springer-Verlag, New York.

[36] Brassard, G., 1988, *Modern Cryptography*, a Tutorial, LNCS 325, Springer-Verlag.

[37] Canetti, R., 1997, *Towards Realizing Random Oracles: Hash Functions That Hide All Partial Information, Advances in Cryptology*, Proceedings Crypto'97, LNCS 1294, B. Kaliski, Ed., Springer-Verlag, pp. 455–469.

[38] Cheng, P., and Glenn, R., 1997, *Test Cases for HMAC-MD*5 *and HMAC-SHA*-1, Network Working Group RFC 2202, http://reference.ncrs.usda.gov/ietf/rfc/2300/rfc2202.htm

[39] Diffie, W., and Hellman, M. E., 1976, *Multiuser Cryptographic Techniques*, AFIPS national Computer Conference, Proceedings '76, pp. 109–112.

[40] Diffie, W., and Hellman, M. E., 1976, *New Directions in Cryptography*, IEEE Transactions on Information Theory, Volume IT-22, No 6 (November 1976), pp. 644–654.

[41] Diffie, W., and Hellman, M. E., 1977, *Exhaustive Cryptanalysis of the NBS Data Encryption Standard*, Computer, Volume 10, No 6, (June 1977), pp. 74–84.

[42]Dobbertin, H., 1995, *Alf Swindles Ann*, RSA Laboratories CryptoBytes, Volume 1, No 3, p. 5.

[43] Dobbertin, H, 1996, *Cryptanalysis of MD*4, Fast Software Encryption—Cambridge Workshop, LNCS 1039, Springer-Verlag, 1996, pp 53–69.

[44] Dobbertin, H, 1996, *The Status of MD*5 *After a Recent Attack, RSA Laboratories CryptoBytes, Volume* 2, No 2, pp. 1, 3–6.

[45] Dreifus, H., and Monk, J. T., 1988, *Smart Cards—A Guide to Building and Managing Smart Card Applications*, John Wiley and Sons.

[46] EIGamal, T., 1985, *A Public-Key Cryptosystem and a Signature Scheme Based on Discrete Logarithms*, Advances in Cryptography, Proceedings Crypto'84, LNCS 196, Springer-Verlag, pp. 10–18.

[47] EIGamal, T., 1985, *A Public-Key Cryptosystem and a Signature Scheme Based on Discrete Logarithms*, IEEE Transactions on Information Theory, Volume 31, No 4, pp. 469–472

[48] Feige, U., Fiat, A, and Sharnir, A., 1988, *Zero Knowledge Proofs of Identity*, J Cryptography, Volume 1, pp. 77–904.

[49] Feigenbaum, J., 1992, *Overview of Interactive Proof Systems and Zero-Knowledge*, Contemporary Cryptology—The Science of Information Integrity, G Simmons, Ed., IEEE Press, New York.

[50] FIPS 46-1, 1977, *Data Encryption Standard*, NIST, US Department of Commerce, Washington D.C., January 1977.

[51] FIPS 180, 1993, *Secure Hash Standard, NIST, US Department of Commerce*, Washington D.C., May 1993.

[52] FIPS 180-1, 1995, *Secure Hash Standard*, NIST, US Department of Commerce, Washington D.C., April 1995.

[53] FIPS 186, 1994 , *Digital Signature Standard*, NIST, US Department of Commerce, Washington D.C., 1994.

[54] Gardner, M., 1977, *A New Kind of Cipher That Would Take Millions of Years to Break*, Scientific American, Vol. 237, No. 8, pp. 120–124.

[55]Girard, P., Roche, F. M., Pistoulet, B., 1986, *Electron Beam Effects on VLSI MOS Conditions for Testing and Reconfiguration*, Wafer-Scale Integration, G. Saucier and J. Trihle, Eds., Amsterdam

[56] Girard, P., Pistoulet, B., Valenza, M., and Lorival, R., 1987, *Electron Beam Switching of Floating Gate MOS Transistors*, IFIP International Workshop on Wafer Scale International, Brunel University, Sep. 23–25, 1987.

[57] Goldberg, I., and Wagner, D., 1996, *Randomness and the Netscape Browser*, Dr. Dobb's Journal, January 1996.

[58] Guilou, L. G., Ugon, M., and Quisquater, J., 1992, *The Smart Card, Contemporary Cryptology—The Science of Information Integrity*, G Simmons, Ed., IEEE Press, New York.

[59] Gutman, P., 1996, *Secure Deletion ofData From Magnetic and Solid-State Memory*, Sixth USENIX Security Symposium Proceedings (July 1996), pp. 77–89.

[60] Hendry, M., 1997, *Smart Card Security and Applications*, Artech House, Norwood Mass.

[61]Holgate, S. A., 1998, *Sensing is Believing*, New Scientist, 15 Aug. 1998, p 20.

[62] Johansson, T., 1997, *Bucket Hashing with a Small Key Size*, Advances in Cryptology, Proceedings Eurocrypt'97, LNCS 1233, W. Fumy, Ed., Springer-Verlag, pp. 149–162.

[63] Kahn, D., 1967, *The Codebreakers: The Story of Secret Writing*, New York: Macmillan Publishing Co.

[64] Kaliski, B., 1991, *Letter to NIST regarding DSS,* 4 Nov. 1991.

[65] Kaliski, B., 1998, *New Threat Discovered and Fixed*, RSA Laboratories Web site http://www.rsa.com/rsalabs/pkcs1

[66] Kaliski, B., and Robshaw, M, 1995, *Message Authentication With MD*5, RSA Laboratories Crypto-Bytes, Volume 1, No 1, pp. 5–8.

[67] Kaliski, B., and Yin, Y. L., 1995, *On Differential and Linear Cryptanalysis of the RC*5 *Encryption Algorithm, Advances in Cryptology, Proceedings Crypto* '95, LNCS 963, D. Coppersrnith, Ed., Springer-Verlag, pp. 171–184.

[68] Klapper, A., and Goresky, M., 1994 , 2-*Adic Shift Registers*, Fast Software Encryption: Proceedings Cambridge Security Workshop '93, LNCS 809, R. Anderson, Ed., Springer-Verlag, pp. 174–178.

[69] Klapper, A., 1996, *On the Existence of Secure Feedback Registers*, Advances in Cryptology, Proceedings Eurocrypt'96, LNCS 1070, U. Maurer, Ed., Springer-Verlag, pp. 256–267.

[70] Kleiner, K., 1998, *Cashing in on the not so smart cards*, New Scientist, 20 Jun. 1998, p 12.

[71] Knudsen, L. R., and Lai, X., *Improved Differential Attacks on RC5*, Advances in Cryptology, Proceedings Crypto'96, LNCS 1109, N. Koblitz, Ed., Springer-Verlag, 1996, pp. 216–228

[72] Knuth, D. E., 1998, *The Art of Computer Programming—Volume 2/Seminumerical Algorithms,* 3rd edition, Addison-Wesley.

[73] Krawczyk, H., 1995, *New Hash Functions for Message Authentication*, Advances in Cryptology, Proceedings Eurocrypt'95, LNCS 921, L Guillou, J Quisquater, (editors), Springer-Verlag, pp. 301–310.

[74] Krawczyk, H., 199x, *Network Encryption—History and Patents*, internet publication: http://www.cygnus.com/~gnu/netcrypt.html

[75]Krawczyk, H., Bellare, M, Canetti, R., 1997, *HMAC: Keyed Hashing for message Authentication*, Network Working Group RFC 2104, http:reference.ncrs.usda.gov/ietf/rfc/2200/rfc2104.htm

[76] Lai, X., 1992, *On the Design and Security of Block Ciphers*, ETH Series in Information Processing, J. L. Massey (editor), Volume 1, Konstanz: hartung-Gorre Verlag (Zurich).

[77] Lai, X, and Massey, 1991, J. L, *A Proposal for a New Block Encryption Standard*, Advances in Cryptology, Proceedings Eurocrypt'90, LNCS 473, Springer-Verlag, pp. 389–404.

[78] Massey, J. L., 1969, *Shift Register Sequences and BCH Decoding*, IEEE Transactions on Information Theory, IT-15, pp. 122–127.

[79] Mende, B., Noll, L., and Sisodiya, S., 1997, *How Lavarand Works*, Silicon Graphics Incorporated, published on Internet: http://lavarand.sgi.com (also reported in Scientific American, November 1997 p. 18, and New Scientist, 8 Nov. 1997).

[80] Menezes, A. J., van Oorschot, P. C., Vanstone, S. A., 1997, *Handbook of Applied Cryptography*, CRC Press.

[81]Merkle, R. C., 1978, *Secure Communication Over Insecure Channels*, Communications of the ACM, Volume 21, No 4, pp. 294–299.

[82] Montgomery, P. L., 1985, *Modular Multiplication Without Trial Division*, Mathematics of Computation, Volume 44, Number 170, pp. 519–521.

[83] Moreau, T., *A Practical "Perfect" Pseudo-Random Number Generator*, paper submitted to Computers in Physics on Feb. 27, 1996, Internet version: http://www.connotech.com/BBS.HTM

[84] Moreau, T., 1997, *Pseudo-Random Generators, a High-Level Survey-in-Progress*, Published on the internet: http://www.cabano.com/connotech/RNG.HTM

[85] NIST, 1994 , *Digital Signature Standard*, NIST ISL Bulletin, online version at http://csrc.ncsl.nist.gov/nistbul/cs194-11.txt

[86] Oehler, M., Glenn, R., 1997, *HMAC-MD5 IP Authentication with Replay Prevention*, Network Working Group RFC 2085, http://reference.ncrs.usda.gov/ietf/rfc/2100/rfc2085.txt

[87] Oppliger, R., 1996, *Authentication Systems For Secure Networks*, Artech House, Norwood Mass.

[88]Preneel, B., van Oorschot, P. C., 1996, *MDx-MAC And Building Fast MACs From Hash Functions*, Advances in Cryptology, Proceedings Crypto'95, LNCS 963, D. Coppersmith, Ed., Springer-Verlag, pp. 1–14.

[89] Preneel, B., van Oorschot, P. C., 1996, *On the Security of Two MAC Algorithms*, Advances in Cryptology, Proceedings Eurocrypt'96, LNCS 1070, U. Maurer, Ed., Springer-Verlag, 1996, pp. 19–32.

[90] Preneel, B., Bosselaers, A., Dobbertin, H., 1997, *The Cryptographic Hash Function RIPEMD-160*, CryptoBytes, Volume 3, No 2, 1997, pp. 9–14.

[91] Rankl, W., and Effing, W., 1997, *Smart Card Handbook*, John Wiley and Sons (first published as Handbuch der Chipkarten, Carl Hanser Verlag, Munich, 1995).

[92] Ritter, T., 1991, *The Efficient Generation of Cryptographic Confusion Sequences*, Cryptologia, Volume 15, No 2, pp. 81–139.

[93] Rivest, R. L, 1993, *Dr. Ron Rivest on the Difficulties of Factoring*, Ciphertext: The RSA Newsletter, Vol 1, No 1, pp. 6, 8.

[94] Rivest, R. L., 1991, *The MD4 Message-Digest Algorithm, Advances in Cryptology, Proceedings Crypto'90*, LNCS 537, S. Vanstone, Ed., Springer-Verlag, pp. 301–311.

[95] Rivest, R. L., 1992, *The RC4 Encryption Algorithm*, RSA Data Security Inc. (This document has not been made public).

[96] Rivest, R. L., 1992, *The MD4 Message-Digest Algorithm*, Request for Comments (RFC) 1320, Internet Activities Board, Internet Privacy Task Force, April 1992.

[97] Rivest, R. L., 1992, *The MD5 Message-Digest Algorithm*, Request for Comments (RFC) 1321, Internet Activities Board, Internet privacy Task Force.

[98] Rivest, R. L., 1995, *The RC5 Encryption Algorithm, Fast Software Encryption, LNCS* 1008, Springer-Verlag, pp. 86–96.

[99] Rivest, R. L., Shamir, A., and Adleman, L. M., 1978, *A Method For Obtaining Digital Signatures and Public-Key Cryptosystems*, Communications of the ACM, Volume 21, No 2, pp. 120–126.

[100] Schneier, S., 1994 , *Description of a New Variable-Length Key, 64-Bit Block Cipher* (Blowfish), Fast Software Encryption (December 1993), LNCS 809, Springer-Verlag, pp. 191–204.

[101] Schneier, S., 1995, *The Blowfish Encryption Algorithm—One Year Later*, Dr Dobb's Journal, September 1995.

[102] Schneier, S., 1996, *Applied Cryptography*, Wiley Press.

[103] Schneier, S., 1998, *The Blowfish Encryption Algorithm*, revision date Feb. 25, 1998, http://www.counterpane.com/blowfish.html

[104] Schneier, S., 1998, *The Crypto Bomb is Ticking*, Byte Magazine, May 1998, pp. 97–102.

[105] Schnorr, C. P., 1990, *Efficient Identification and Signatures for Smart Cards*, Advances in Cryptology, Proceedings Eurocrypt'89, LNCS 435, Springer-Verlag, pp. 239–252.

[106] Shamir, A., and Fiat, A., Method, *Apparatus and Article For Identification and Signature*, U.S. Pat. No. 4,748,668, 31 May 1988.

[107] Shor, W., 1994, *Algorithms for Quantum Computation: Discrete Logarithms and Factoring*, Proc. 35th Symposium. Foundations of Computer Science (FOCS), IEEE Computer Society, Los Alamitos, Calif., 1994.

[108] Simmons, G. J., 1992, *A Survey of Information Authentication*, Contemporary Cryptology—The Science of Information Integrity, G Simmons, Ed., IEEE Press, New York.

[109] Tewksbury, S. K., 1998, *Architectural Fault Tolerance, Integrated Circuit Manufacturability*, Pineda de Gyvez, J., and Pradhan, D. K., Eds., IEEE Press, New York.

[110] TSMC, 2000, SFC0008_08B9_HE, 8K×8 Embedded Flash Memory Specification, Rev 0.1.

[111] Tsudik, G., 1992, *Message Authentication With One-way Hash Functions*, Proceedings of Infocom '92 (Also in Access Control and Policy Enforcement in Internetworks, Ph.D. Dissertation, Computer Science Department, University of Southern California, April 1991).

[112] Vallett. D., Kash, J., and Tsang, J., *Watching Chips Work*, IBM MicroNews, Vol 4, No 1, 1998.

[113] Vazirani, U. V., and Vazirani, V. V., 1984, *Efficient and Secure Random Number Generation,* 25th Symposium. Foundations of Computer Science (FOCS), IEEE Computer Society, 1984, pp. 458–463.

[114] Wagner, D., Goldberg, I., and Briceno, M., 1998, *GSM Cloning*, ISAAC Research Group, University of California, http://www.isaac.cs.berkeley.edu/isaac/gsm-faq.html

[115] Wiener, M. J., 1997, *Efficient DES Key Search—An Update*, RSA Laboratories CryptoBytes, Volume 3, No 2, pp. 6–8.

[116] Zoreda, J. L., and Otón, J. M., 1994, *Smart Cards*, Artech House, Norwood Mass.

[117] Authentication Protocols v0_2 29 November 2002. Silverbrook Research.

[118] H. Krawczyk IBM, M. Bellare UCSD, R. Canetti IBM, RFC 2104, February 1997, http://www.ietf.org/rfc/rfc2104.txt

[119] 4-3-1-2-QAChipSpec v4_09 17 April 2003, Silverbrook Research

[120] 4-4-9-4 SoPEC_hardware_design_v3_1 28 Jan. 2003

[121] Silverbrook Research, 2002, 4-3-1-8 *QID Requirements Specification.*

[122] TSMC, Oct. 1, 2000, SFC008_08B9_HE, 8K×8 Embedded Flash Memory Specification, Rev 0.1.

[123] TSMC (design service division), Sep. 10, 2001, 0.25 *um Embedded Flash Test Mode User Guide, V*0.3.

[124] TSMC (EmbFlash product marketing), Oct. 19, 2001, 0.25 *um Application Note, V*2.2.

[125] Artisan Components, Jan 99, Process Perfect Library Databook 2.5-Volt Standard Cells, Rev1.0.

[126] "4-3-1-2 QA Chip Technical Reference v 4.06", Silverbrook Research.

[127] National Institute of Standards and Technology—Federal Information Processing Standardshttp://csrc-.nist.gov/publications/fips/

[128] U.S. patent application Ser. No. 09/575,108, filed May 23, 2000, Silverbrook Research Pty Ltd

[129] U.S. patent application Ser. No. 09/575,109, filed May 23, 2000, Silverbrook Research Pty Ltd

[130] U.S. patent application Ser. No. 09/575,100, filed May 23, 2000, Silverbrook Research Pty Ltd

[131] U.S. patent application Ser. No. 09/607,985, filed May 23, 2000, Silverbrook Research Pty Ltd

[132] U.S. Pat. No. 6,398,332, filed Jun. 30, 2000, Silverbrook Research Pty

[133] U.S. Pat. No. 6,394,573, filed Jun. 30, 2000, Silverbrook Research Pty Ltd

[134] U.S. Pat. No. 6,622,923, filed Jun. 30, 2000, Silverbrook Research Pty Ltd

[135] U.S. patent application Ser. No. 09/517,539, filed Mar. 2, 2000, Silverbrook Research Pty Ltd

[136] U.S. Pat. No. 6,566,858, filed Jul. 10, 1998, Silverbrook Research Pty Ltd

[137] U.S. Pat. No. 6,331,946, filed Jul. 10, 1998, Silverbrook Research Pty Ltd

[138] U.S. Pat. No. 6,246,970, filed Jul. 10, 1998, Silverbrook Research Pty Ltd

[139] U.S. Pat. No. 6,442,525, filed Jul. 10, 1998, Silverbrook Research Pty Ltd

[140] U.S. patent application Ser. No. 09/517,384, filed Mar. 2, 2000, Silverbrook Research Pty Ltd

[141] U.S. patent application Ser. No. 09/505,951, filed Feb. 21, 2001, Silverbrook Research Pty Ltd

[142] U.S. Pat. No. 6,374,354, filed Mar. 2, 2000, Silverbrook Research Pty Ltd

[143] U.S. patent application Ser. No. 09/517,608, filed Mar. 2, 2000, Silverbrook Research Pty Ltd

[144] U.S. Pat. No. 6,334,190, filed Mar. 2, 2000, Silverbrook Research Pty Ltd

[145] U.S. patent application Ser. No. 09/517,541, filed Mar. 2, 2000, Silverbrook Research Pty Ltd

The invention claimed is:

1. An integrated circuit comprising a processor and memory, the memory storing a set of data representing program code and/or an operating value, wherein each bit of the data is stored as a bit/inverse-bit pair in corresponding pairs of physically adjacent bit cells in the memory.

2. An integrated circuit according to claim 1, further including a memory management unit configured to receive a request for the set of data and to test, during processing of the request, whether the respective pairs of physically adjacent bit-cells that correspond to the set of data contain bit/inverse-bit pairs, thereby to confirm the validity of the set of data as stored in the memory.

3. An integrated circuit according to claim 2, wherein the memory management unit is configured to store sets of data as sets of bit/inverse-bit pairs in the memory.

4. An integrated circuit according to claim 2, configured to implement a defensive action in the event the test fails.

5. An integrated circuit according to claim 4, wherein the defensive action includes resetting the integrated circuit.

6. An integrated circuit according to claim 4, wherein the defensive reaction includes returning second data other than that the subject of the test.

7. An integrated circuit according to claim 6, wherein the second data is a string of identical digits.

8. An integrated circuit according to claim 4, wherein the defensive reaction is different depending upon whether the set of data represents program code or an operating value.

9. An integrated circuit according to claim 8, wherein, in the event the test fails and the set of data is an operating value, the integrated circuit is configured to replace the failed value with a substitute value.

10. An integrated circuit according to claim 9, wherein the substitute value is selected to disrupt a program running on the integrated circuit.

11. An integrated circuit according to claim 8, wherein, in the event the test fails and the set of data is a program code, the integrated circuit is configured to replace the failed value with a substitute value.

12. An integrated circuit according to claim 11, wherein the substitute value is selected to disrupt a program running on the integrated circuit.

13. An integrated circuit according to claim 12, wherein the substitute causes at least some circuitry on the integrated circuit to reset.

14. An integrated circuit according to claim 2, wherein, in the event the test fails, the integrated circuit is permanently prevented from running software.

15. An integrated circuit according to claim 2, wherein, in the event the test fails, the integrated circuit is configured to delete from the memory some or all of the bit values associated with the set of data.

16. An integrated circuit according to claim 2, wherein, in the event the test fails, the integrated circuit is configured to delete some or all of the contents of the memory.

17. An integrated circuit according to claim 1, selectively operable in either of first and second modes, wherein:

in the first mode, the memory management unit is configured to receive and process a request for the set of data, and to test, during processing of the request, whether the respective pairs of physically adjacent bit-cells corresponding to the set of data contain bit/inverse-bit pairs, thereby to confirm the validity of the set of data as stored in the memory; and in the second mode, the memory management unit is configured to receive and process a request for data stored in the memory, without testing whether pairs of physically adjacent bit-cells contain bit/inverse-bit pairs.

18. An integrated circuit according to claim 17, wherein:

in the first mode, the memory management unit is configured to store a set of data associated with a memory write request as a corresponding set of bit/inverse-bit pairs, each of the bit/inverse-bit pairs being physically adjacent each other; and in the second mode, the memory management unit is configured to store a set of data associated with a memory write request as the set of data without corresponding inverse-bits.

19. An integrated circuit according to claim 17, configured to boot into the first mode by default.

* * * * *